US011856146B2

(12) United States Patent
Jorasch et al.

(10) Patent No.: US 11,856,146 B2
(45) Date of Patent: Dec. 26, 2023

(54) SYSTEMS, METHODS, AND APPARATUS FOR VIRTUAL MEETINGS

(71) Applicant: Science House LLC, New York, NY (US)

(72) Inventors: James Jorasch, New York, NY (US); Michael Werner, Seneca, SC (US); Geoffrey Gelman, New York, NY (US); Isaac W. Hock, Chicago, IL (US); Gennaro Rendino, Horseheads, NY (US); Christopher Capobianco, Hastings-on-Hudson, NY (US)

(73) Assignee: SCIENCE HOUSE LLC, New York, NY (US)

( * ) Notice: Subject to any disclaimer, the term of this patent is extended or adjusted under 35 U.S.C. 154(b) by 0 days.

(21) Appl. No.: 18/124,359

(22) Filed: Mar. 21, 2023

(65) Prior Publication Data

US 2023/0254412 A1 Aug. 10, 2023

Related U.S. Application Data

(62) Division of application No. 17/353,692, filed on Jun. 21, 2021, now Pat. No. 11,665,284.

(60) Provisional application No. 63/041,821, filed on Jun. 20, 2020.

(51) Int. Cl.

*H04M 3/56* (2006.01)
*H04L 12/18* (2006.01)
*H04N 21/478* (2011.01)
*H04L 65/403* (2022.01)
*H04N 21/2187* (2011.01)
*H04N 21/44* (2011.01)
*H04L 65/1089* (2022.01)

(52) U.S. Cl.

CPC ........ *H04M 3/567* (2013.01); *H04L 12/1827* (2013.01); *H04L 65/1089* (2013.01); *H04L 65/403* (2013.01); *H04M 3/568* (2013.01); *H04N 21/2187* (2013.01); *H04N 21/44008* (2013.01); *H04N 21/4781* (2013.01)

(58) Field of Classification Search

CPC ............... H04L 65/403; H04L 12/1822; H04L 65/1069; H04M 3/568; H04N 21/2187; H04N 21/44008; H04N 21/4781; H04N 7/147; A63F 13/213; A63F 13/338

See application file for complete search history.

(56) References Cited

U.S. PATENT DOCUMENTS 9,942,519 B1 * 4/2018 Pan ........................ H04N 21/47
2013/0117377 A1 * 5/2013 Miller ..................... A63F 13/35 709/205

* cited by examiner

*Primary Examiner* — Adil Ocak
(74) *Attorney, Agent, or Firm* — Buckley, Maschoff & Talwalkar LLC

(57) ABSTRACT

In accordance with some embodiments, systems, apparatus, interfaces, methods, and articles of manufacture are provided for providing information incorporating additional data feeds, creating common arrangements, and improving performance in a virtual meeting.

21 Claims, 131 Drawing Sheets

Copyright © 2021
Science House LLC

700

703

| USER ID 702 | NAME 704 | EMAIL ADDRESS 706 | PASSWORD 708 | PHONE NUMBER 710 |
|---|---|---|---|---|
| u637483 | Allen Jones | a.jones@xyz.com | tZ78nm3$ | 111-222-3333 |
| u637484 | Susan Brown | susanb@bigschool.edu | eagledove | 222-333-4444 |
| u637485 | Thomas Winters | thomas@peace.org | 4getmeknot | 333-444-5555 |

713

| NICKNAMES 712 | ADDRESS 714 | FINANCIAL ACCOUNT INFORMATION 716 | BIRTHDATE 718 |
|---|---|---|---|
| crusher987 | 567 Main Street, Anytown, USA 65432 | 1111-2222-3333-4444, Expires 06/2026 | 04/19/1982 |
| dragonfly123 | 222 Cedar Lane, Somewhere, USA, 89012 | Paypal susanb@bigschool.edu | 11/23/2002 |
| monoskate | 321 Memory Drive, Pleasantville, USA 76543 | 2222-3333-4444-5555, Expires 08/2025 | 02/21/1990 |

| MARITAL STATUS 720 | GENDER 722 | PRIMARY LANGUAGE 724 | IMAGES 726 |
|---|---|---|---|
| Single | Male | English | <image data> |
| Single | Female | Spanish | <image data> |
| Married | Male | English | <image data> |

| Network ID 802 | Network Name 804 | Network IP Address 806 | User ID 808 | Specified Connection Speed 810 |
|---|---|---|---|---|
| n423940 | Bob_apt | 3.98.106.14 | u193753 | 10 MB/s |
| n423941 | hr_dept | 6.116.10.122 | u827124 | 25 MB/s |
| n423942 | suite_28 | 16.215.67.44 | u328190 | 900 MB/s |

| Actual Upload-speed 812 | Actual Download-speed 814 | Encryption Type 816 | Uptime Percentage 818 |
|---|---|---|---|
| 12 MB/s | 10 MB/s | WPA | 99.98 |
| 22 MB/s | 26 MB/s | WPA2-AES | 99.0 |
| 600 MB/s | 900 MB/s | WPA-TKIP | 96.2 |

| User Device ID 902 | Form Factor 904 | Model 906 | Processor 908 | Processor Speed 910 | Number of Cores 912 |
|---|---|---|---|---|---|
| ud200187 | Desktop PC | XPS Tower | Intel® Core™ i7 9700 | 4.7 GHz | 8 |
| ud200188 | Laptop | Dell Inspiron 15 3000 | Intel® Core™ i5-1035G1 | 3.6 GHz | 4 |
| ud200189 | Tablet | Samsung Galaxy Tab S6 | Qualcomm Snapdragon 855 | 2.8 GHz | 8 |

| Graphics Card 914 | RAM 916 | Storage 918 | Year of manufacture 920 | Purchase year 922 | Operating System 924 |
|---|---|---|---|---|---|
| NVIDIA® GeForce RTX™ 2060 | 32 GB | 256GB SSD (Boot) + 1TB Hard Drive | 2020 | 2020 | Windows 10 |
| Intel® UHD Graphics | 8 GB | 1 TB Hard Drive | 2018 | 2019 | Windows 10 |
| Adreno 640 | 8 GB | 128GB | 2020 | 2020 | Android 10 |

| MAC Address 926 | Physical Location 928 | Timezone 930 | Owner ID 932 | Network ID(s) 934 | IP Address 936 |
|---|---|---|---|---|---|
| AC-98-2D-02-CA-1B | <owner's address> | Pacific | u498795 | n738511 | (N/A) |
| 00-1A-D2-7B-07-47 | 975 Red Brick Lane, Plainville, CT 98765 | Mountain | u399811 | n423942 | (N/A) |
| AF-98-2D-39-CA-1B | 468 Bluebird Drive, Shoreville, NC 23456 | Eastern | u455309 | NULL | 3.34.90.111 |

| Peripheral Device ID 1002 | Type 1004 | Model 1006 | Purchase year 1008 | IP Address 1010 |
|---|---|---|---|---|
| pd7218901 | mouse | FastByte VX983 | 2022 | 4.91.21.111 |
| pd7218902 | mouse | Tailspin A900-1 | 2021 | 3.59.10.98 |
| pd7218903 | keyboard | ActionKey UZ840A | 2024 | N/A |
| pd7218904 | headset | Rezon8 boom45 | 2023 | N/A |

| Physical Location 1012 | Owner ID 1014 | Linked User Device ID (s) 1016 | Communication modalities available 1018 | Network ID(s) 1020 |
|---|---|---|---|---|
| 369 Pebble Lane, Greenville, USA 01234 | u830269 | ud209412 | video, audio | NULL |
| 468 Seashell Drive, Beach Town USA 65432 | u302483 | ud100006 | audio | NULL |
| 8095 Palm Tree Lane, Woodgrove, USA 35921 | u284851 | ud370189 | video, LEDs | n587120 |
| 492 Greenbrook Lane, Brookville, USA 98421 | u948539 | ud370189 | audio | n995198 |

| Configuration ID 1102 | Peripheral Device ID 1104 | Variable 1106 | Default Setting 1108 |
|---|---|---|---|
| cf20093812 | pd8500000 | Headset camera resolution | High |
| cf20093813 | pd8500000 | Mouse color | Red |
| cf20093814 | pd9203664 | Presentation remote microphone sensitivity | High |

| Third-Party Control 1110 | Current Setting 1112 | Setting Expiration Time 1114 |
|---|---|---|
| Yes | Medium | 12:07PM 01/17/2023 |
| Yes | Green | After 300 clicks |
| No | Medium | Conclusion of meeting |

| Connection ID 1202 | Peripheral Device 1 ID 1204 | Peripheral Device 2 ID 1206 |
|---|---|---|
| pc100268421 | pd9471134 | pd4511008 |
| pc100268422 | pd8854811 | pd4427879 |
| pc100268423 | pd9858002 | pd1874206 |

| Time 1208 | Action 1210 | Maximum daily messages 1212 |
|---|---|---|
| 6:43PM 02/12/2023 | Initiate Connection | 1000 |
| 8:23PM 09/24/2025 | Terminate Connection | None |
| 11:43AM 02/26/2024 | Initiate limited connection | 5 |

| Peripheral Device Group ID 1302 | Group Name 1304 | Group Type 1306 | Settings 1308 |
|---|---|---|---|
| pg3719319 | Fortnite_kings | Game team | Direct device-to-device messaging |
| pg3719320 | Accounting_department | Functional | Direct device-to-device messaging |
| pg3719321 | Sams_home | Proximity | All can interact with the educational game |

| Formation Time 1310 | Group Leader Device 1312 | Member Peripheral Devices 1314 |
|---|---|---|
| 12:47 p.m. August 2nd 2022 | pd6551873 | pd6551873, pd9431820, pd7463109 |
| 4:39 p.m. October 23rd 2024 | NULL | pd1665578, pd5646120, pd6755008, pd1554075 |
| 3:49 p.m. January 15th 2025 | pd6886461 | pd6886461, pd5725876, pd2538754, pd4372186, pd9845009 |

| Connection ID 1402 | User 1 ID 1404 | User 2 ID 1406 | Time 1408 |
|---|---|---|---|
| uc491325973 | u204401 | u522978 | 2:27 p.m. January 3rd 2021 |
| uc491325974 | u376123 | u982396 | 9:42 a.m. March 15th 2024 |
| uc491325975 | u986456 | u255087 | 12:09 a.m. January 17th 2024 |

| Action 1410 | Relationship 1412 | Maximum daily messages 1414 |
|---|---|---|
| Initiate Connection | Friends | 100 |
| Terminate Connection | Teammates | none |
| Initiate limited connection | Co-workers | 1000 |

| User Group ID 1502 | Group Name 1504 | Group Type 1506 | Formation Time 1508 |
|---|---|---|---|
| ug8739534 | Finance weekly update meeting | Department | 7:58 p.m. July 13th 2023 |
| ug2948204 | Facilities | Department | 124 p.m. April 17th 2024 |
| ug7385798 | Learning meetings | Meeting Group | 1104 a.m. November 16th 2024 |

| Group Leader 1510 | Member Users 1512 |
|---|---|
| u167392 | u167392, u940342, u394583 |
| u201543 | u201543, u301234, u276109, u125427 |
| None | u386409, u876923, u932642, u899984, u487671, u465630 |

| Role assignment ID 1602 | User Group ID 1604 | User ID 1606 | Role 1608 |
|---|---|---|---|
| ra47980028 | ug4875303 | u984567 | Project Manager |
| ra47980029 | ug2489763 | u867113 | Tag Review Coach |
| ra47980030 | ug4775431 | u956512 | Mentor |

| Achievement ID 1702 | User ID 1704 | Time/Date 1706 | Achievement Type 1708 |
|---|---|---|---|
| ac3949229 | u592001 | 5 p.m. September 23rd, 2021 | Professional |
| ac3949230 | u487651 | 11:30 a.m. May 18th, 2024 | Meetings |
| ac3949231 | u476116 | 1:50 p.m. October 3rd, 2023 | Educational |

| Achievement 1710 | Reward 1712 | Provided 1714 |
|---|---|---|
| Got through all three out of three meeting agenda items | Office mouse glows purple for whole day of 7/22/20 | Yes |
| 100% of tags relating to meeting purpose are positive | Congratulatory message sent to all participants in the meeting | Yes |
| Learned pivot tables in Excel | Three free music downloads | Yes |

| Stored Value Account ID 1802 | Owner(s) 1804 | Password 1806 | Authentication Data 1808 |
|---|---|---|---|
| sv389410 | u110392 | rabbitpaw5 | Voiceprint and Iris Scan |
| sv3894103 | u473894; | b85fjyK | Fingerprint |
| sv3894104 | u138490 | jaybird99 | Voiceprint |

| Currency Type 1810 | Balance 1812 | Hold amount 1814 |
|---|---|---|
| Dollars | 985 | 100 |
| Bitcoin | 12 | 0 |
| Store Credit | 355 | 0 |

| Asset ID 1902 | Type 1904 | Title 1906 | Publisher 1908 | Artist 1910 |
|---|---|---|---|---|
| as40192382 | Software | Spreadsheet Plus | Biz+ | N/A |
| as40192383 | Music | Perfection | Crash Records | Rikka Lunard |
| as40192384 | Video Game | Volcano Adventure | World's End Gaming | N/A |

| Duration 1912 | Size 1914 | Synopsis 1916 | Reviews 1918 |
|---|---|---|---|
| N/A | 2 GB | "Cutting edge spreadsheet software for tablet computers" | 2.5 stars |
| 4:23 | 100 MB | "Jazz: Reminiscing about getting away from it all" | 67% |
| N/A | 1.5 GB | "Explore the terrifying World beneath" | "Riveting" |

| User Rights/License ID 2002 | Asset ID 2004 | User ID(s) 2006 | Rights 2008 |
|---|---|---|---|
| rl5682900125 | as9302355 | u404588 | Unlimited use |
| rl5682900126 | as3972653 | u622291, u685999 | Use until 2025 |
| rl5682900127 | as9864609 | u547278, u986154 | 3 downloads |
| rl5682900683 | as9863288 | u686276 | 5 seats |
| rl5682901098 | as9861122 | u686464 | Only when in corporate headquarters |

| User Device State Log ID 2102 | User Device ID 2104 | Time 2106 |
|---|---|---|
| ds200031945 | ud439555 | 1:45:10AM 3/15/2022 |
| ds200031946 | ud439007 | 3:11 p.m. April 17th 2024 |
| ds200031947 | ud752096 | 5:18 p.m. July 31st 2021 |
| ds200062387 | ud752879 | 7:24 p.m. May 7th 2023 |

| Program/App 2108 | Sub-App 2110 | Prominence 2112 |
|---|---|---|
| Chrome browser | Webpage - nytimes.com | Forefront |
| Microsoft Word | NULL | Background |
| Solitaire | NULL | Minimized |
| Photos | NULL | Sleeping |

| Peripheral Activity ID 2202 | Peripheral ID 2204 | Start Time 2206 | End Time 2208 |
|---|---|---|---|
| pa57482391122 | pd3582234 | 3:54:10.073PM 12/04/2024 | 3:54:10.215PM 12/04/2024 |
| pa574823911223 | pd3582235 | 10:42:09.836PM 06/01/2025 | 10:42:10.116PM 06/01/2025 |
| pa574823911224 | pd3582236 | 7:03:55.239PM 09/22/2023 | 7:03:55.469PM 09/22/2023 |

| Component 2210 | Action 2212 | Recipient Program 2214 |
|---|---|---|
| Left camera button | Pressing | Microsoft Paint |
| "j" key on keyboard | Tapping | Operating system |
| Moving, delta x of 120, delta y of -60 | Delta x of 120 | Chrome browser |

| Sensor Reading ID 2302 | Peripheral ID 2304 | Sensor 2306 |
|---|---|---|
| sr982053195710 | pd9022583 | Accelerometer |
| sr982053195711 | pd3492501 | Galvanic skin response |
| sr982053195712 | pd7773631 | Temperature |

| Start Time 2308 | End Time 2310 | Reading 2312 |
|---|---|---|
| 8:11:55.091AM 5/27/2023 | 8:11:59.744AM 5/27/2023 | <acceleration graph> |
| 11:30:21.05AM 2/13/2025 | 11:30:26.05AM 2/13/2025 | 3.4 micro-Siemens (µS) |
| 6:15:21PM 7/08/2024 | 6:15:26PM 7/08/2024 | 99.6F |

| Message ID 2402 | Time 2404 |
|---|---|
| pm58393092245 | 3:58:01.46AM 12/07/2024 |
| pm58393092246 | 9:45:33.98 4/12/2024 |
| pm58393092247 | 6:25:51.03 3/19/2023 |

| Initiating Peripheral ID 2406 | Receiving Peripheral ID 2408 | Message Content 2410 |
|---|---|---|
| pd3693772 | pd9389422, pd9389566 | Light up LED light #3 for three seconds |
| pd1349652 | pd6833341 | Play the following audio <audio data> |
| pd2849155 | pd8603200 | "Meeting room 8602 is running 20 minutes late" |

| Generic Action ID 2502 | Action/Message 2504 |
|---|---|
| ga283493 | "Nice going" |
| ga283494 | "Cover me" |
| ga283495 | Next slide |
| ga283496 | "Be there in five minutes" |
| ga283497 | Order cheese pizza |
| ga283762 | Nod up and down to indicate agreement with a decision |
| ga283933 | "Excellent presentation" |
| ga283017 | "We need a meeting break" |
| ga283388 | Submit tag |

| Mapping ID 2602 | Peripheral Type 2604 | Mode of peripheral 2606 |
|---|---|---|
| mp38279832 | Presentation remote | Action mode |
| mp38279833 | Presentation remote | Action mode |
| mp38279834 | Keyboard | In-use mode |
| mp38279867 | Mouse | Idle mode |

| Input Sequence 2608 | Action 2610 |
|---|---|
| left-click, laser pointer, left-click | Disable microphone on table |
| scroll up, tip down, shake | Begin audio storage of an idea |
| hit "j" three times quickly | "I'm going in" |
| ctrl-shift-click | Submit tag |

| User Game Profile ID 2702 | Game ID 2704 | User ID 2706 | Password 2708 | Screen Name 2710 |
|---|---|---|---|---|
| gp57493489 | gm48227 | u829102 | rnviw45%# | jamboree987 |
| gp57493490 | gm16673 | u395823 | osmosis3 | slyfox88 |

| Preferred Character 2712 | Preferred Avatar 2714 | Preferred Background music 2716 | Rating / Skill Level 2718 | Last Login 2720 |
|---|---|---|---|---|
| Wizard | Blue cone-hat turtle | Theme 45 | Apprentice | 11:45PM 7/9/2023 |
| Ninja | White-robed panda | Theme 21 | Distinguished magician | 4:41PM 8/4/2024 |

| Game Record ID 2802 | Game ID 2804 | Start Time 2806 | End Time 2808 |
|---|---|---|---|
| gr47197713 | gm15823 | 1:45:08PM 2/26/2024 | 2:49:16PM 2/26/2024 |
| gr47197714 | gm38451 | 10:06:55PM 3/5/2023 | 1:24:31AM 3/6/2023 |

| Participant ID(s) 2810 | Score 2812 | Winner 2814 | Highest Level Achieved 2816 | Location(s) played from 2818 |
|---|---|---|---|---|
| u930229 | 19500000 | Nancy Jones | Moon Level | Someplace, USA 20983 |
| u584266, u584488 | 289000, 456000 | N/A | 12 | IP Address 3.184.008.82 |

| Game Activity ID 2902 | Game ID 2904 | Participant ID 2906 | Start Time 2908 |
|---|---|---|---|
| ga483091204578 | gm62703 | u558091 | 2:02:19.091PM 12/04/2024 |
| ga483091204579 | gm48514 | u867421 | 6:19:21.087PM 12/19/2023 |
| ga483091204580 | gm29664 | u483993 | 1:55:17.722AM 5/01/2024 |

| End Time 2910 | Game State 2912 | Activity 2914 |
|---|---|---|
| 2:02:19.185PM 12/04/2024 | Level 6, 3rd screen | Shoot |
| 6:19:21.554PM 12/19/2023 | On spaceship | Switch to laser weapon |
| 1:55:19.210AM 5/01/2024 | Player 1 holds As, Jd, 9h, 9c, 2s, player 2 holds Kc, Qd, Jc, 10h, 10s, $50 in pot, player 1's turn | Player 1 checks |

| Game State ID 3002 | Game ID 3004 | Game Record ID 3006 | Time Remaining 3008 |
|---|---|---|---|
| gs48392382 | gm28744 | gr50991473 | 0:53:21 |
| gs48392383 | gm68402 | gr29569544 | N/A |

| Level 3010 | Score 3012a | Location 3014a | Power 3016a | Ammunition 3018a |
|---|---|---|---|---|
| 8 | 340,000 | 129 leagues North and 369 leagues West | 57% | 18 Silver bullets |
| Cliff Dwelling | 18950 | Mystic Waterfalls | 2380 | 5 Magic hatchets |

| Score 3012b | Location 3014b | Power 3016b | Ammunition 3018b |
|---|---|---|---|
| 275,000 | 131 leagues North and 358 leagues West | 70% | 12 Silver bullets |
| 41290 | Shrouded Mountain | 2174 | 6 winged arrows |

| Project ID 3102 | Project type 3104 | Participants 3106 | Data 3108 |
|---|---|---|---|
| pj8200983 | Text document, spreadsheet, presentation deck, whiteboard | u382014, u899281 | <Text> |
| pj8200984 | Architectural design, paintings, sculptures, drawings, virtual visual arrangements of interiors | u434592, u784338, u649311 | <Cell data> |
| pj8200985 | Music | u403809, u583044, u583924, u358432, u682251 | <Images> |

| Contribution ID 3202 | Project ID 3204 | Participant ID 3206 |
|---|---|---|
| cb383028347988 | pj4738230 | u348411 |
| cb383028347988 | pj7584579 | u292604 |

| Time of Contribution 3208 | Contribution type 3210 | Contribution content 3212 |
|---|---|---|
| 3:18PM 7/30/2023 | Main doc, Side chat message | "We should go aggressively into the rural market because of pent-up demand and no existing options." |
| 9:36AM 8/14/2026 | Thumbs up, vote | <image> |

| Advertisement ID 3302 | Advertiser 3304 | Ad server or Agency 3306 | Target Demographics 3308 |
|---|---|---|---|
| ad382941 | MobileSolutions Inc. | Google Ad Server | Males over 40 |
| ad382942 | BizApps Co. | PG One | Females in Information Technology |

| Ad Trigger 3310 | Limits 3312 | Presenting Devices 3314 |
|---|---|---|
| User's rate of play slows down 10% | No more than 1000 per day | Keyboard |
| Time is between 12pm and 2pm | Maximum 2 per user | Camera |

| Modalities 3316 | Ad Content 3318 |
|---|---|
| Image and Tactile | <image data> |
| Video | <video data> |

| Advertisement Presentation ID 3402 | Advertisement ID 3404 | User ID 3406 | Presentation Device 3408 |
|---|---|---|---|
| ap2986100595 | ad583923 | u583123 | ud903412 |
| ap2986100596 | ad793254 | u292675 | ud155230, ud178342 |

| Time 3410 | User Response 3412 |
|---|---|
| 7:23:20PM 2/27/2023 | click, open |
| 4:41:24PM 11/30/2024 | view, purchase |

| AI Model ID 3502 | Model Type 3504 | 'X' Data Source 3506 | 'Y' Data Source 3508 |
|---|---|---|---|
| ai4931 | Linear Regression | Game scores after first 5 minutes of play for game gm14821 | Final game scores for game gm14821 |
| ai4932 | Neural Network | Team messages passed for for game gm94813 | Final team scores gm94813 |

| Parameter Values 3510 | Accuracy 3512 | Last Update 3514 | Update Trigger 3516 |
|---|---|---|---|
| Intercept 5.8, Slope 21.2 | Root Mean Squared Error 5.44 | 12:00:00AM 5/11/2025 | Daily at midnight |
| -.053 x^2 + 10.14x + 1609.21 | Root Mean Squared Error 10.21 | 1:00:00PM 2/22/2024 | 1000 new data points come in |

| Authentication ID 3602 | User ID 3604 | Image(s) 3606 |
| --- | --- | --- |
| au659946 | u384921 | <image data> |
| au659947 | u589402 | NULL |
| au659948 | u389120 | <image data> |

| Fingerprint Images 3608 | Retinal Scans 3610 | Voiceprint 3612 | Gait 3614 | Head Movement 3616 |
| --- | --- | --- | --- | --- |
| <image data> | <image data> | <audio data> | <video data> | <video data> |
| <image data> | <image data> | <audio data> | <video data> | <video data> |
| NULL | <image data> | <audio data> | <video data> | <video data> |

| Privilege ID 3702 | Privilege 3704 | Authentication Points Required 3706 |
|---|---|---|
| pr39302482 | Read documents | 3 |
| pr39302483 | Edit documents | 5 |
| pr39302484 | Message group | 4 |

FIG. 37

Copyright © 2021
Science House LLC

Copyright © 2021
Science House LLC

Copyright © 2021
Science House LLC

Copyright © 2021
Science House LLC

Copyright © 2021
Science House LLC

Copyright © 2021
Science House LLC

Copyright © 2021
Science House LLC

Copyright © 2021
Science House LLC

5000

| Employee ID Number 5002 | Name 5004 | Start Date 5006 | Employee Level 5008 | Supervisor 5010 | Office/Cube Location 5012 |
|---|---|---|---|---|---|
| eid123456 | Chelsea Jones | 11/1/2021 | 1 | eid922210 | Room 123 |
| eid129342 | Rafael Smith | 3/5/1999 | Manager | eid841326 | Cube A, Floor 7 |
| eid492143 | Frank Astor | 8/17/2015 | Individual Contributor | eid961066 | Cube 23 |
| eid294023 | Anne Wong | 7/12/2010 | Vice President | eid875312 | Suite 4 |

| Subject Matter Expertise 5014 | Personality 5016 | Security Level 5018 | Security Credentials 5020 |
|---|---|---|---|
| Software Architecture | Agreeable | Basic | Password - 'sunrise' |
| Widget Markets | Data-oriented | 7 | <voiceprint data> |
| Finance, GAAP | Argumentative | Basic | <fingerprint data> |
| Project Dragon | Focused | High | <retinal scan data> |

| Preferences 5022 | Preferred Standard Device Configurations 5024 | Email 5026 | Phone 5028 |
|---|---|---|---|
| Meetings after 10AM | Voice messaging, alerts via audio | cjones@xyz.com | 883-651-5650 |
| Meet in rooms with windows | Text messaging, alerts with vibration | rafaels@xyz.com | 883-481-9623 |
| Meetings that have fewer than 12 participants | Show live transcript of meeting | fastor@xyz.com | 212-004-6528 |
| No alignment meetings | Alerts with vibration | awong@xyz.com | 212-707-2187 |

| Meeting Id 5102 | Meeting Name 5104 | Meeting Owner 5106 | Meeting Type 5108 | Level 5110 | Location 5112 |
|---|---|---|---|---|---|
| mt4839483 | Angle Bracket Troubleshooting | eid420345 | Innovation | General | Building 4 |
| mt2930421 | Widget Status Update | eid390294 | Alignment | Managers | Clarkville Campus |
| mt2940213 | Strategic Planning | N/A | Commitment | Vice Presidents | N/A |
| mt2940213 | Blockchain Informational | eid593103 | Learning | General | New York Office |

| Room Id 5114 | Start Date 5116 | Time 5118 | Duration (minutes) 5119 | Frequency 5120 | End Date 5122 |
|---|---|---|---|---|---|
| rm294 | 2/17/2025 | 10:00AM MST | 90 | One-time | 2/17/2025 |
| rm103 | 2/1/2025 | 2:30PM EST | 30 | Weekly | 3/29/2025 |
| zoom292012 | 9/21/2025 | 3:00PM PST | 60 | Monthly | 9/21/2026 |
| Webex292019 | 8/21/2025 | 12:30PM GMT | 120 | One-time | 8/21/2025 |

| Phone Number 5124 | Tags 5126 | Project Number or Cost Center Assoc. 5128 | Ratings 5130 | Priority 5132 | Related Meetings 5134 |
|---|---|---|---|---|---|
| 222-333-4444 | Problem Solving | pr20489523 | 3 | 5 | mt2309421 |
| 333-444-5555 | Widget | cc224 | Good | Medium | mt4921039 |
| 555-666-7777 | Status | pr49201521 | Fair | High | NULL |
| 444-555-6666 | Strategy | cc113 | 4 | Low | mt4293112 |

| Meeting Identifier 5202 | Date 5203 | Attendee Identifier 5204 | Role 5206 | Manner 5208 |
|---|---|---|---|---|
| mt4839483 | All | eid420345 | Owner | Video Conference |
| mt2930421 | 4/19/2025 | eid205831 | Note keeper | In-person |
| mt2940213 | 5/6/2025, 5/13/2025 | eid392091 | Attendee | Web Conference, Web Conference |
| mt2940213 | All | Jerry Fisherman (contractor) | Subject Matter Expert | Phone |

| Meeting Identifier 5302 | Date 5304 | Time 5306 | Attendee Identifier 5308 |
|---|---|---|---|
| mt5156875 | 3/22/2025 | 11:43AM | eid894259 |
| mt4884719 | 5/18/2025 | 3:14PM | eid776146 |
| mt4370171 | 4/2/2025 | 10:43:25AM | eid830851 |
| mt9293624 | 7/15/2025 | 3:58:21PM | eid282108 |

| Engagement Level 5310 | Engagement Indicator(s) 5312 | Burnout Risk 5314 | Burnout Indicators 5316 |
|---|---|---|---|
| High | Voice Detection, Rapid Speech | High | Loud Voice |
| Average | Posture, Heart Rate | Low | Steady Engagement |
| Low | Skin Conductivity | Low | None |
| None | Eye Tracking | Medium | 67% rate of declining invites, 95% calendar time full |

| Meeting Identifier 5402 | Effectiveness of Facilitation 5404 | Meeting Energy Level 5406 | Did the Meeting Stay on Track? 5408 |
|---|---|---|---|
| mt9176309 | 5 | 4 | 5 |
| mt1655325 | 2 | High | 3 |
| mt5813512 | High | Medium | Yes |
| mt2869394 | High | Low | 1 |

| Did the Meeting Start/End on Time? 5410 | Room Comfort 5412 | Presentation Quality 5414 | Overall Rating 5416 | Food Quality 5418 |
|---|---|---|---|---|
| Yes | 3 | High | 5 | 3 stars |
| Started on time, Ended 5 minutes late | High | N/A | 3 | 4 stars |
| No | Low | Low | Medium | 4 stars |
| 3 | 4 | 3 | Low | 2 stars |

| Room lighting 5420 | Clarity of purpose 5422 | Projector quality 5424 | Ambient noise levels 5426 |
|---|---|---|---|
| Excellent | 5 | Colors washed out | Loud |
| Too much sun in afternoon | 5 | Generates a lot of heat | Bird noises are a distraction |
| Lighting controls are difficult to understand | 4 | Hard to focus the image | AC is too loud |
| Average | 4.3 | Colors washed out | Voices can be heard from the adjacent meeting room |

| Strength of WiFi signal 5428 | Room cleanliness 5430 | View from room 5432 |
|---|---|---|
| Excellent | Trash cans need to be emptied | Fantastic view of the pond outside the north window |
| Weak | Empty soda cans in food service area | Overlooks the main building entrance |
| Connection droped three times in a one hour meeting | Food in refrigerator needs to be thrown out | No view |
| Excellent | Whiteboard has marks that are hard to erase | Only window faces the wall of the adjacent building |

| Meeting ID 5502 | Meeting Date 5504 | Employee 5506 | Role 5508 | Confirmed/ Declined Meeting 5510 |
|---|---|---|---|---|
| mt2197509 | 8/2/2025 | eid732447 | Owner | Confirmed |
| mt5020142 | 9/14/2025 | eid419542 | Observer | Confirmed |
| mt2997037 | 1/12/2025 | eid136319 | Attendee | Declined |
| mt2997037 | 1/12/2025 | eid410080 | Presenter | Confirmed |

| Time Arrived 5512 | Time Departed 5514 | Travel Time to Meeting Location 5516 | Travel Time from Meeting Location 5518 | Employee Rating by Others 5520 |
|---|---|---|---|---|
| 10:00AM | 11:00AM | 3 min | 4 min | 4.1 |
| 10:03AM | 10:45AM | 14 min | 14 min | 2.5 |
| N/A | N/A | N/A | N/A | N/A |
| 10:00AM | 11:00AM | Remote | Remote | High |

| Employee ID 5602 | Meeting ID 5604 | Subject 5606 | Category 5608 |
|---|---|---|---|
| eid238292 | mt2948201 | Status update | Meeting |
| eid202942 | N/A | Doctor call | Personal |
| eid992913 | mt4920191 | Strategy discussion | Meeting |
| eid284199 | N/A | Solitary work time | Individual |

| Date 5610 | Start Time 5612 | Duration in Minutes 5614 | Company / Personal 5616 |
|---|---|---|---|
| 3/4/2025 | 10AM | 120 | Company |
| 9/2/2025 | 3PM | 30 | Personal |
| 8/21/2025 | 11:30AM | 90 | Company |
| 11/5/2025 | 2PM | 180 | Company |

| Project ID 5702 | Name 5704 | Summary 5706 | Start Date 5708 |
|---|---|---|---|
| pr37697850 | OS Switch | Switch all employees to Linux | 1/18/2025 |
| pr53595075 | Remote Work Securitization | Set up secure environments for remote work | 7/12/2025 |
| pr22004632 | App Launch | Launch new customer app | 2/28/2025 |
| pr40311966 | Supplier Refresh | Re-bid supplier contracts | 9/12/2025 |

| Priority 5710 | Expected Duration 5712 | Percent Completion 5714 | Budget 5716 | Personnel Requirements 5718 |
|---|---|---|---|---|
| High | 10 weeks | 100% | $1 million | 5 @ full-time |
| 1 | 3 weeks | 20% | $5 million | 40 @ full-time |
| Medium | 1 month | 90% | $500,000 | 10 @ 75% time |
| Medium | 6 months | Not started | $20,000 | 1 @ 50% time |

| Project ID 5802 | Employee ID 5804 | Role 5806 |
|---|---|---|
| pr59552104 | eid528092 | Project manager |
| pr97886395 | eid906544 | Lead developer |
| pr80172431 | eid605192 | Communications strategist |
| pr34813883 | eid326860 | Procurement specialist |

| Project ID 5902 | Milestone ID 5904 | Sequence Number 5906 | Summary 5908 |
|---|---|---|---|
| pr14413154 | ml76882780 | 1 | Draft request for proposal |
| pr21180052 | ml68108100 | 3A | Implement pilot with legal group |
| pr79281479 | ml46682502 | 2 | Stress test of grinding machine |
| pr61684854 | ml46174624 | 5 | Completion of laser work with vendor |

| Due Date 5910 | Percent Complete 5912 | Approver(s) 5914 | Violations 5916 |
|---|---|---|---|
| 01/10/2025 | 100% | eid628141 | None |
| 10/24/2025 | 40% | eid305993, eid449341 | None |
| 11/27/2025 | 25% | eid628761 | Additional training required |
| 07/13/2025 | 0% | eid239875, eid832449 | Tags received that contradict published milestone completion updates |

| Asset ID 6002 | Asset Type 6004 | Meeting ID 6006 | Creation Date 6008 | Author 6010 |
|---|---|---|---|---|
| mtas10766643 | Deck | mt1859273 | 08/18/2025 | eid687447 |
| mtas16529041 | Notes | mt4731407 | 03/22/2025 | eid727665 |
| mtas29505046 | Meeting minutes | mt1418640 | 02/18/2025 | eid179157 |
| mtas75112623 | Decisions | mt2850507 | 11/02/2025 | Linda Smith |
| mtas78228629 | Meeting Summary | mt4636463 | 07/17/2025 | eid749134 |
| mtas80458235 | Action items | mt1778988 | 11/04/2025 | eid892632 |
| mtas71269039 | Photo of whiteboard | mt4460322 | 09/25/2025 | eid923890 |

| Version 6012 | Tags 6014 | Keywords 6016 | Rating 6018 | Asset Data 6020 |
|---|---|---|---|---|
| 3.1 | Rated 8/10 | Market impact | 4 | <data> |
| 2 | Author eid204920 | Breakeven | 5 | <data> |
| 1 | Computer transcription | Fibre cables | 3 | <data> |
| 1 | Needs VP confirmation | Cloud | 4 | <data> |
| 1 | Short-term items | Personnel, resources | 5 | <data> |
| 2 | All items approved by Legal | European market | Medium | <data> |
| 1 | Medium quality | SWOT analysis | High | <data> |

| Asset ID 6102 | Number of Slides 6104 | Number of Words 6106 | Size of the File 6108 | Presentation Software Version 6110 | Number of Graphics 6112 |
|---|---|---|---|---|---|
| mtas63999831 | 38 | 8333 | 12 Mb | Microsoft PowerPoint for Mac version 16.35 | 60 |
| mtas99765120 | 66 | 3124 | 2 Mb | Keynote | 76 |
| mtas89473810 | 26 | 7429 | 190 Kb | Google Slides | 10 |

| Number and Type of Tags 6114 | Number of Times Presented 6116 | Template Used 6118 | Time to Create Presentation 6120 | Key Points 6122 | Take Away Summary Included 6124 |
|---|---|---|---|---|---|
| 12 Descriptive, 19 Ratings | 5 | Learning template #3 | 12 hours | Sales decline | Yes |
| 20 Descriptive, 8 Ratings | 5 | Business Plan template #8 | 17 hours | Important defects | No |
| 5 Descriptive, 4 Ratings | 4 | Financials template #3 | 8 hours 45 minutes | Rollout Plans | Yes |

| Security Level 6126 | Presentation Creation Date 6130 | Presentation Rating 6132 | Acronyms 6134 | Tags 6136 |
|---|---|---|---|---|
| General | 06/23/2025 | 4 | DCE - Data communications equipment | pr75660791, pr71427249, DCE, Learning |
| Manager+ | 05/29/2025 | 3 | IMAP – Internet Message Access Protocol | Business plan, Market assessment |
| VP + | 05/05/2025 | 3 | FCE – Frame check sequence | Projections, Financials, pr96358600 |

| Asset ID 6202 | Component ID 6204 | Component Type 6206 | Average Rating 6208 |
|---|---|---|---|
| mtas97783941 | cpt3178759788 | Slide 7 | 7.5 |
| mtas76262658 | cpt4506080307 | Graphic #2 | 8.7 |
| mtas83890682 | cpt8656264119 | Topic 3 | 8.2 |

| Tag ID 6302 | Category 6304 | Label 6306 |
|---|---|---|
| tag24998092 | Positive | High impact |
| tag76634572 | Positive/person | Good point |
| tag38701367 | Positive/person | Key insight |
| tag15364897 | Negative/presentation | Congested |
| tag13928316 | Negative/person | Monotone |

| Meaning 6308 | Appearance 6310 | Rules 6312 |
|---|---|---|
| Has a high impact on the company – adds significant value | <image data> | Only VP's can use |
| Made a statement that improved understanding or moved a discussion forward and was not otherwise obvious | <GIF data> | General |
| Made a statement that was revelatory and/or the decisive factor in a decision | <image data> | One use per person per meeting |
| Presentation slide has too much information | <image data> | Only for tagging presentations |
| Speaker does not vary voice pitch enough | <audio data> | Only for tagging speakers |

| Room ID 6402 | Address 6404 | Building 6406 | Floor 6408 | Room Number 6410 | Room Name 6412 |
|---|---|---|---|---|---|
| rm703 | 123 Main St, Lincoln, Nebraska | John Casey Building | 7 | 703 | Casey Auditorium |
| rm486 | 456 Gold St, New York, NY | Building 1 | 4 | 486 | N/A |
| rm799 | 890 Riverside Road, Lakeville, Florida | Marketing Building | 7 | 799 | The Barn |

| Room Area 6414 | Room Height 6416 | Capacity 6418 |
|---|---|---|
| 10000 sq feet | 30 feet | 300 |
| 100 sq feet | 10 feet | 5 |
| 400 sq feet | 9 feet | 20 standing, 8 seated |

| Room Setup 6426 | Tables 6428 | Number of Chairs Present 6430 |
|---|---|---|
| Classroom/lecture | None | 300 |
| Chairs surrounding table | Large circular table | 5 |
| Horseshoe | 6 rectangular tables, Movable | 8 |

| AV Configuration 6436 | AV Quality 6438 | Acoustics Ratings 6440 | Wheelchair Accessibility 6446 |
|---|---|---|---|
| Learning | 5 | Good | Yes |
| Innovation | Medium | Good | Yes |
| Alignment | Low | 3 | No |

| Room ID 6502 | Peripheral ID 6504 | Location in Room 6506 |
|---|---|---|
| rm898 | pd2765435 | Center of the north wall |
| rm640 | pd5549904 | Corner of the far wall and right wall |
| rm128 | pd6544295 | On the floor |

| Vendor ID 6602 | Name 6604 | Category 6606 | Price 6608 |
|---|---|---|---|
| vnd3220 | Mchine Cleaners Express | Cleaning | $40/hour |
| vnd5880 | Printer Helper | Printing | $35/hour |
| vnd2756 | Strategy Consultants, Inc. | Consulting | $350/hour |

| Min Time 6610 | Hours 6612 | Ratings 6614 | Website 6616 | Phone 6618 |
|---|---|---|---|---|
| 90 minutes | 8AM - 5PM | 4.5 | cleanmachine.com | 392-459-4920 |
| 60 minutes | 11AM-3PM | High | bprinterhelper.com | 143-420-4583 |
| N/A | 9AM-5PM | 4.7 | strategyconsultants.com | 529-919-2049 |

FIG. 66

Copyright © 2021
Science House LLC

Copyright © 2021
Science House LLC

6900

| Event ID 6902 | Meeting ID 6904 | User ID 6906 | Event Type 6908 | Content 6910 |
|---|---|---|---|---|
| mevt40909545 | mt1463731 | u779826 | User comment | We need to test with more millennials |
| mevt84507887 | mt5591280 | u938125 | User presentation | mtas35184801 |
| mevt64073459 | mt9133354 | u753937 | User mediation | Good points on both sides – let's research this more for next meeting |
| mevt63083516 | mt1765758 | u384912 | Decision made | Hire 10 more developers by May 2022 |
| mevt27522904 | mt1191542 | u846582 | Task assigned | Retire three mainframe applications by Oct 2023 |

| Video ID 7002 | Content Summary 7004 |
|---|---|
| mtvd283542 | Training video |
| mtvd719065 | Training video |
| mtvd954661 | Course on lasers |
| mtvd462943 | Instruction Manual |

FIG. 70

Copyright © 2021
Science House LLC

7300

| Tagging instance identifier 7302 | Meeting identifier 7304 | Source 7306 | Tag identifier 7308 | Tag presentation language 7310 |
|---|---|---|---|---|
| tgin19543908 | mt1482690 | u282516 | tag80090652 | English |
| tgin91424409 | mt6945297 | u265022 | tag87860139 | English |
| tgin82204771 | mt5723659 | u780347 | tag22692482 | Spanish |
| tgin59727520 | mt7113128 | pd7218902 | tag93666584 | English |

| Tag presentation screen location 7312 | Tag target 7314 | Application time 7316 | Counter 7318 | Expiration time 7320 | Tag metadata 7320 |
|---|---|---|---|---|---|
| N/A | u163555 | 06/09/2025 13:18:52 | 48 | N/A | Appropriate |
| 30%, 70% | mtas35851725 | 08/13/2025 10:18:58 | N/A | 09/01/2025 | N/A |
| N/A | obj1786417 | 05/17/2025 10:50:39 | 16 | N/A | N/A |
| N/A | ug3539859 | 12/17/2025 14:34:30 | N/A | 12/17/2025 18:00:00 | Questionable |

| Appliance Sensor Reading ID 7502 | Appliance ID 7504 | Description 7506 | Start Time 7508 |
|---|---|---|---|
| asr774618611569 | appl660123 | Refrigerator door | 12/29/2025 22:36:59.139 |
| asr147115559837 | appl502005 | Microwave door | 04/27/2025 15:14:57.758 |
| asr793863106572 | appl758422 | Motion sensor 1 | 09/23/2025 03:24:59.146 |
| asr760810715578 | appl618340 | Motion sensor 2 | 08/09/2025 17:34:17.384 |
| asr962280973369 | appl534580 | Closed circuit TV | 09/24/2025 17:47:37.715 |
| asr143309929000 | appl391530 | Thermostat | 10/22/2025 04:39:15.668 |
| asr676084740727 | appl871181 | Refrigerator contents imager | 09/16/2025 01:09:26.709 |
| asr744345646698 | appl938298 | Refrigerator contents imager | 09/11/2025 21:13:52.632 |

| End Time 7510 | Reading 7512 |
|---|---|
| N/A | Open |
| N/A | Close |
| 09/23/2025 03:25:04.391 | Motion - 98% confidence |
| 08/09/2025 17:34:22.275 | Motion - 36% confidence |
| 09/24/2025 17:47:47.924 | <video data> |
| N/A | Set to 20 degrees Celsius |
| N/A | Milk put in |
| N/A | Cookie removed |

| Location 7602 | Date 7604 | Time 7606 | Temperature 7608 | Humidity 7610 |
|---|---|---|---|---|
| 298 Elm St, Somewhere, USA | 5/19/2023 | 8:35AM | 75 | 35% |
| 836 Dodge Lane, Somewhere, USA | 3/08/2022 | 3:22PM | 55 | 96% |
| 378 Main St., Anywhere, USA | 9/17/2024 | 4:35PM | 28 | 22% |
| 221 Crossville St, Anywhere, USA | 9/18/2023 | 1:24P | 80 | 48% |

| Wind Speed 7612 | Type of precipitation 7614 | Precipitation rate 7616 | Light level 7618 | Cloud cover 7620 |
|---|---|---|---|---|
| 8 mph | None | N/A | 9,000 lux | 15% |
| 3 mph | Rain | 0.15 inches/hour | 1,200 lux | 67% |
| 15 mph | Snow | 0.46 inches/hour | 900 lux | 85% |
| 12 mph | None | N/A | 10,500 lux | 30% |

FIG. 76

Copyright © 2021 Science House LLC

Copyright © 2021 Science House LLC

8100

| Recommendation ID 8102 | Meeting type 8104 | Meeting topic 8106 | Number of facilitators/ mediators 8108 |
|---|---|---|---|
| rcmd660481 | Innovation | Software tools | 1-2 |
| rcmd423150 | Learning | Tax law changes | 1 |
| rcmd907788 | Alignment | New bugs from code delivery | 1-2 |
| rcmd521389 | Commitment | Which OS to develop for first | 0 |

| Number of subject matter experts 8110 | Number of decision-makers 8112 | Total number of people 8114 | Room arrangement 8116 |
|---|---|---|---|
| 1-2 | 0 | 2-12 | Has whiteboards |
| 1 | 0 | 5-75 | Auditorium style |
| 1 | 0-1 | 5-25 | U-shape |
| 1 | 1-5 | 3-8 | Round-table in small room |

*FIG. 81*

Copyright © 2021
Science House LLC

Copyright © 2021
Science House LLC

8700

| Meeting ID 8702 | Meeting Configuration ID 8704 | Date 8706 | Start Time 8708 | Duration 8710 | Room ID 8712 |
|---|---|---|---|---|---|
| mt5320323 | mcfg3209340332 | 07/24/2025 | 1:00PM | 120 | rm430 |
| mt5320323 | mcfg3538102029 | 07/24/2025 | 1:00PM | 60 | rm982 |
| mt5320323 | mcfg6588418701 | 07/24/2025 | 3:00PM | 90 | rm430 |
| mt5320323 | mcfg4176702806 | 07/25/2025 | 11:00AM | 120 | rm802 |

| Attendees 8714 | Presence Score 8716 | Opportunity Cost 8718 | Total Score 8720 | Configuration Selected 8722 |
|---|---|---|---|---|
| u252952, u934194, u510612, u792362, u475415, u175906 | 245 | 160 | 85 | No |
| u252952, u934194, u510612, u792362, u715280, u908450 | 150 | 80 | 70 | No |
| u252952, u934194, u510612, u792362, u238333, u868040 | 197.5 | 120 | 77.5 | No |
| u252952, u934194, u510612, u792362, u446071 | 210 | 120 | 90 | Yes |

FIG. 87

Copyright © 2021 Science House LLC

Copyright © 2021
Science House LLC

Copyright © 2021
Science House LLC

9200

| Feed Location ID 9202 | Meeting ID 9204 | Time 9206 | Displayed Participant 9208 |
|---|---|---|---|
| fd455852 | mt2237387 | 12/07/2025 17:16:34 | u602011 |
| fd463733 | mt7141300 | 08/09/2025 17:35:46 | u192039 |
| fd521260 | mt9222678 | 03/23/2025 13:36:26 | u523239 |
| fd339908 | mt1391394 | 11/10/2025 10:24:15 | u514009 |
| fd785047 | mt5546003 | 06/01/2025 11:21:13 | u838588 |

| Location 9210 | Screen Arrangement 9212 | Viewing participant 9214 |
|---|---|---|
| a2 | 4x4 | u362267 |
| c3 | 4x3 | u736415 |
| b3 | 3x4 | u110898 |
| c1 | 3x1 | u276884 |
| a1 | 2x2 | u970820 |

*FIG. 92*

Copyright © 2021
Science House LLC

9500

| Component Type Identifier 9502 | Component Description 9504 | Manufacturer 9506 | Model 9508 |
|---|---|---|---|
| cmpt794967 | LED Red Diffused 3mm (T-1) 643nm 65mcd 60VA | Jameco Valuepro | UT6371-41-M1-R |
| cmpt666516 | MEMS Gauge Pressure Sensor +/-50kPa SOP6 | Omron Electronic Components | 2SMPP-03 |
| cmpt507611 | Conduction Sensor | EISCO Scientific and Science Educational Systems (SES) | ADGR-NL-NUL217 |
| cmpt309210 | Galvanic Skin Response Sensor | Fabrication Enterprises | GSR 2 |

| Component Identifier 9602 | Component Type 9604 | Reference Name 9606 | Address 9608 |
|---|---|---|---|
| cpnt20511457 | cmpt684363 | Left light #1 | 10010101 |
| cpnt39476632 | cmpt873911 | Right LED #2 | 11011011 |
| cpnt89848302 | cmpt799676 | Front speaker | 01010111 |
| cpnt52220341 | cmpt779842 | Top left pressure sensor | 0010110 |

| Signal Identifier 9702 | Component Type 9704 | Incoming/ Outgoing 9706 | Description 9708 | Signal 9710 |
|---|---|---|---|---|
| sign33733400 | cmpt62449166 | Outgoing | Turn light on | 11101110 |
| sign96676896 | cmpt62449166 | Outgoing | Turn light on dim | 11101111 |
| sign71312051 | cmpt22060346 | Outgoing | Tone at 440 hz for 0.5 sec | 00100110 |
| sign33878745 | cmpt28770733 | Incoming | Button pressed | 00010001 |

Top 5 Developers

| Name | Positive Tags | Highly Rated Tags | Total Tags | Rank |
|---|---|---|---|---|
| Jordan, Melanie | 132 | 35 | 175 | 1 |
| Davidson, Mark | 112 | 32 | 168 | 2 |
| Alia, Ashley | 97 | 41 | 147 | 3 |
| Zhao, Kelly | 98 | 30 | 145 | 4 |
| Svenson, Tania | 120 | 31 | 142 | 5 |

9930

Top 5 Software Architects

| Name | Positive Tags | Highly Rated Tags | Total Tags | Rank |
|---|---|---|---|---|
| Franklin, Alan | 97 | 46 | 151 | 1 |
| Meng, Shinso | 118 | 40 | 148 | 2 |
| Okada, Akio | 95 | 38 | 136 | 3 |
| Gonzalez, Pedro | 93 | 32 | 133 | 4 |
| Pepper, Tommy | 80 | 41 | 130 | 5 |

*FIG. 99*

Copyright © 2021 Science House LLC

10300

| Object Identifier 10302 | Instantiation 10304 | Description 10306 | Image 10308 | Dimensions 10310 |
|---|---|---|---|---|
| obj4219505 | Actual | Vase | <image data> | 20x8x8 inches |
| obj2721902 | Actual | AC Unit | <image data> | 30x20x30 inches |
| obj4271863 | Actual | Projector | <image data> | 20x25x10 inches |
| obj6816618 | Actual | Remote control | <image data> | 5x2x0.5 inches |
| obj6404665 | Actual | Laptop | <image data> | 14x1.5x10 inches |
| obj3811389 | Actual | Power outlet | <image data> | 3x2 inches |
| obj9043850 | Prototype | Painting | <image data> | 15x20x1 inches |

| Weight 10312 | Monetary Value 10314 | Sentimental Value 10316 | Fragility 10318 | Hazards 10320 |
|---|---|---|---|---|
| 10 lb | $250 | High | High | Falling, Sharding, Spillage |
| 70 lb | $600 | N/A | Low | Falling, Pinching |
| 20 lb | $800 | N/A | High | Falling, Electric shock |
| 4 oz | $5 | 1 | Medium | N/A |
| 2 lb | $700 | N/A | High | N/A |
| N/A | N/A | N/A | N/A | Electric shock |
| 6 lb | N/A | High | Medium | Falling |

| Event Identifier 10402 | Object Identifier 10404 | Event Description 10406 | Date 10408 | Location 10410 |
|---|---|---|---|---|
| evnt66549197 | obj3144470 | Birthday gift | 11/22/2021 | 123 Main St, Somewhere USA |
| evnt39213964 | obj3753666 | Purchased | 08/25/2018 | Andy's Antiques |
| evnt13369538 | obj7695862 | Moved | 1956 | To: 456 Central Plaza, Anywhere USA |
| evnt87766565 | obj9615915 | Worn during championship game | 02/24/2025 | Aviary Park, Someplace USA |
| evnt81023667 | obj3009006 | Received for distinguished service | 06/2005 | XYZ Enterprises Headquarters |
| evnt85715541 | obj60233594 | Found on beach | 07/22/2012 | Fire Island, NY |

| Party 1 10412 | Party 1 Function 10414 | Party 2 10416 | Party 2 Function 10418 | Assets 10420 |
|---|---|---|---|---|
| u207346 | Gift recipient | u751274 | Gift giver | <video data> |
| u577875 | Seller | u240048 | Buyer | <image data> |
| N/A | N/A | N/A | N/A | N/A |
| u631319 | Wearer | N/A | N/A | <image data> |
| u861542 | Award recipient | XYZ Enterprises | Presenter | <audio data> |
| u102790 | Finder | N/A | N/A | <image data> |

| Task Id 10502 | Object Id 10504 | Assignor 10506 | Assignee 10508 | Target State 10510 | Assignment Date 10512 |
|---|---|---|---|---|---|
| tsk818679 | obj6838944 | u165383 | u513529 | Put away on shelf | 02/19/2025 |
| tsk548740 | obj3938402 | u850358 | u607401 | Watered | 01/16/2025 |
| tsk263605 | obj5319709 | u531243 | u978013 | Polished | 04/06/2025 |
| tsk438857 | obj9511932 | u574602 | u383909 | Room TR67 | 12/02/2025 |
| tsk935716 | obj8446995 | u289800 | u700922 | New software | 11/07/2025 |

| Deadline 10514 | Notification method 10516 | Reward 10518 | Priority 10520 | Completion date 10522 | Coaching/ Instructions 10524 |
|---|---|---|---|---|---|
| 02/20/2025 | Flash laser pointer on object | $0.50 | Medium | 02/20/2025 | N/A |
| 01/20/2025 | Audio broadcast | $1 | High | Pending | Pour just one cup of water |
| 04/08/2025 | Shine spotlight on object | 30 minutes of video game time | Medium | 04/08/2025 | 1. Rinse with warm slightly soapy water, 2. Buff dry with microfiber cloth |
| 12/02/2025 | Spotlight with laser pointer | N/A | 4 | Not completed | N/A |
| 12/07/2025 | Project task on wall | Vending machine drink | 5 | 11/14/2025 | Bring laptop to IT (room TR91) |

FIG. 105

Copyright © 2021
Science House LLC

Copyright © 2021 Science House LLC

Copyright © 2021
Science House LLC

Copyright © 2021
Science House LLC

Copyright © 2021
Science House LLC

Copyright © 2021
Science House LLC

Copyright © 2021
Science House LLC

Copyright © 2021
Science House LLC

Copyright © 2021
Science House LLC

Copyright © 2021 Science House LLC

Copyright © 2021
Science House LLC

11800

11810

Copyright © 2021
Science House LLC

Copyright © 2021
Science House LLC

Copyright © 2021
Science House LLC

SYSTEMS, METHODS, AND APPARATUS FOR VIRTUAL MEETINGS

CROSS-REFERENCE TO RELATED APPLICATIONS

The present application is a divisional of U.S. patent application Ser. No. 17/353,692, titled "SYSTEMS, METHODS, AND APPARATUS FOR VIRTUAL MEETINGS", and filed Jun. 21, 2021 in the name of Jorasch et al., which was a Non-Provisional of, and claimed benefit and priority to U.S. Provisional Patent Application No. 63/041,821, titled "CALL ENGAGEMENT SYSTEM", and filed Jun. 20, 2020 in the name of Jorasch et al., the entirety of which are hereby incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

People attend meetings and virtual calls, often spending significant amounts of time. For companies with employees in such meetings, there can be a significant cost associated with the time of employees attending. Further, the meeting results are sometimes less than optimal because of inefficiencies of the person leading or those attending the meeting.

SUMMARY

Various embodiments comprise systems, methods, and apparatus for improving meetings. Various embodiments enable an integration of data from many sources, and enable intelligent processing of that data such that many elements of the system can be optimized and enhanced. Various embodiments enhance video calls, meetings, educational communications, or game experiences by improving interactions of people through creating common arrangements, incorporating additional data feeds, and the collection of images, video and/or sensor data from the camera and peripherals. Various embodiments may enhance the function of meetings and use of business software applications, authentication, gameplay experiences, recreational activities, household activities, social interactions and educational activities.

BRIEF DESCRIPTION OF THE DRAWINGS

An understanding of embodiments described herein and many of the attendant advantages thereof may be readily obtained by reference to the following detailed description when considered with the accompanying drawings, wherein:

FIGS. 7 through 37 are block diagrams of example data storage structures consistent with at least some embodiments described herein;

FIGS. 50 through 53 are block diagrams of example data storage structures consistent with at least some embodiments described herein;

FIG. 54A and FIG. 54B are block diagrams of example data storage structures consistent with at least some embodiments described herein;

FIGS. 55 through 63 are block diagrams of example data storage structures consistent with at least some embodiments described herein;

FIG. 64A and FIG. 64B are block diagrams of example data storage structures consistent with at least some embodiments described herein;

FIGS. 65 through 66 are block diagrams of example data storage structures consistent with at least some embodiments described herein;

FIGS. 69 and 70 are block diagrams of example data storage structures consistent with at least some embodiments described herein;

FIG. 73 is a block diagram of an example data storage structure consistent with at least some embodiments described herein;

FIGS. 75 and 76 are block diagrams of example data storage structures consistent with at least some embodiments described herein;

FIG. 81 is a block diagram of an example data storage structure consistent with at least some embodiments described herein;

FIG. 87 is a block diagram of an example data storage structure consistent with at least some embodiments described herein;

FIG. 92 is a block diagram of an example data storage structure consistent with at least some embodiments described herein;

FIGS. 95 through 97 are block diagrams of example data storage structures consistent with at least some embodiments described herein;

FIG. 99 is a chart from a user interface consistent with at least some embodiments described herein;

FIGS. 103 through 105 are block diagrams of example data storage structures consistent with at least some embodiments described herein;

DETAILED DESCRIPTION

Figure 1:
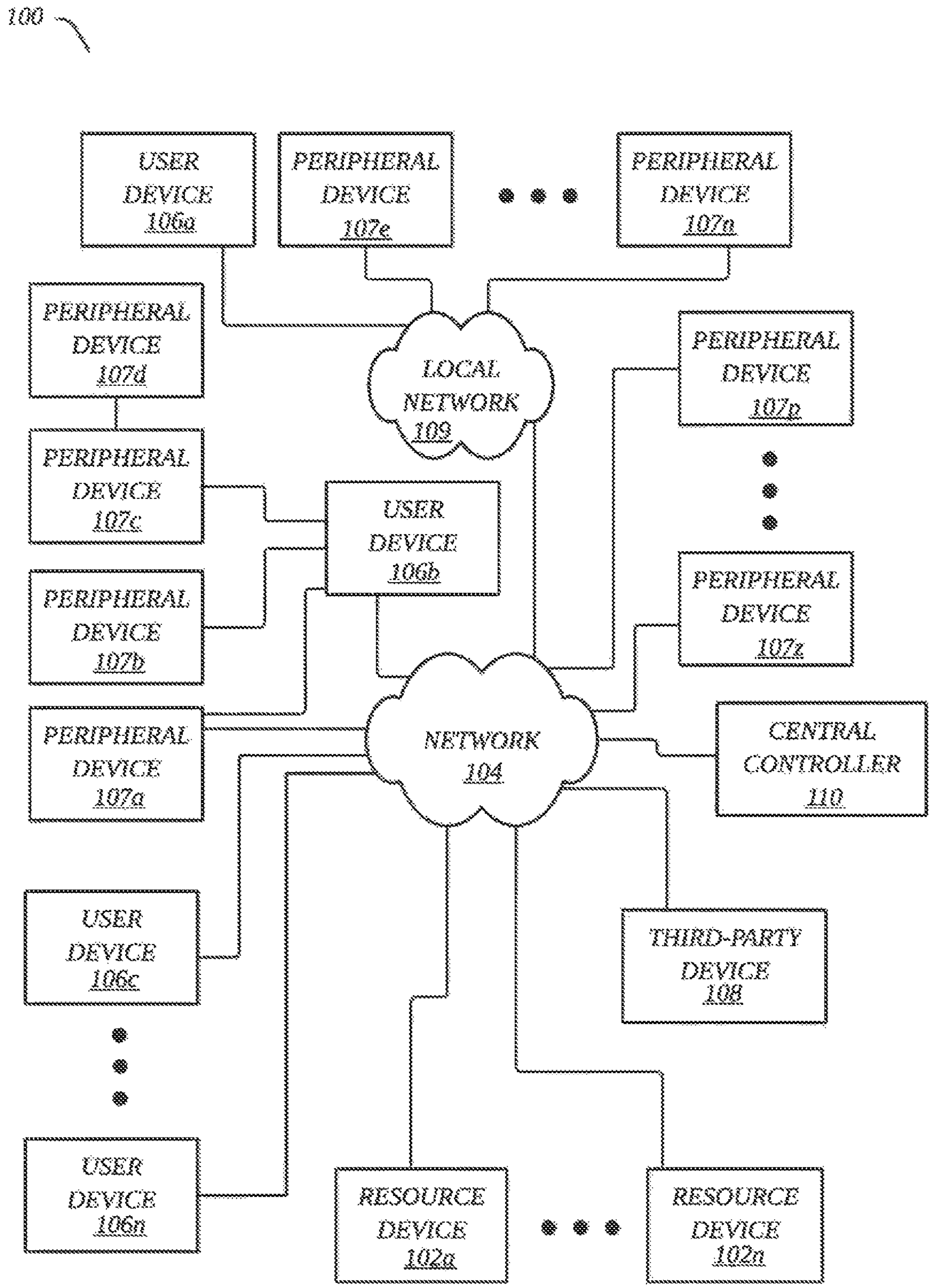
FIG. 1 is a block diagram of a system consistent with at least some embodiments described herein.

Embodiments described herein are descriptive of systems, apparatus, methods, interfaces, and articles of manufacture for utilizing devices and/or for managing meetings.

Headings, section headings, and the like are used herein for convenience and/or to comply with drafting traditions or requirements. However, headings are not intended to be limiting in any way. Subject matter described within a section may encompass areas that fall outside of or beyond what might be suggested by a section heading; nevertheless, such subject matter is not to be limited in any way by the wording of the heading, nor by the presence of the heading. For example, if a heading says "Mouse Outputs", then outputs described in the following section may apply not only to computer mice, but to other peripheral devices as well.

As used herein, a "user" may include a human being, set of human beings, group of human beings, an organization, company, legal entity, or the like. A user may be a contributor to, beneficiary of, agent of, and/or party to embodiments described herein. For example, in some embodiments, a user's actions may result in the user receiving a benefit.

In various embodiments, the term "user" may be used interchangeably with "employee", "attendee", or other party to which embodiments are directed.

A user may own, operate, or otherwise be associated with a computing device, such as a personal computer, desktop, Apple® Macintosh®, or the like, and such device may be referred to herein as "user device". A user device may be associated with one or more additional devices. Such additional devices may have specialized functionality, such as for receiving inputs or providing outputs to users. Such devices may include computer mice, keyboards, headsets, microphones, cameras, and so on, and such devices may be referred to herein as "peripheral devices". In various embodiments, a peripheral device may exist even if it is not associated with any particular user device. In various embodiments, a peripheral device may exist even if it is not associated with any particular other device.

As used herein, a "skin" may refer to an appearance of an outward-facing surface of a device, such as a peripheral device. The surface may include one or more active elements, such as lights, LEDs, display screens, electronic ink, e-skin, or any other active elements. In any case, the surface may be capable of changing its appearance, such as by changing its color, changing its brightness, changing a displayed image, or making any other change. When the outward service of a device changes its appearance, the entire device may appear to change its appearance. In such cases, it may be said that the device has taken on a new "skin".

As used herein, pronouns are not intended to be gender-specific unless otherwise specified or implied by context. For example, the pronouns "he", "his", "she", and "her" may refer to either a male or a female.

As used herein, a "mouse-keyboard" refers to a mouse and/or a keyboard, and may include a device that has the functionality of mouse, a device that has the functionality of a keyboard, a device that has some functionality of a mouse and some functionality of a keyboard and/or a device that has the functionality of both a mouse and a keyboard.

Systems

Referring first to FIG. 1, a block diagram of a system 100 according to some embodiments is shown. In some embodiments, the system 100 may comprise a plurality of resource devices 102*a-n* in communication via or with a network 104. According to some embodiments, system 100 may comprise a plurality of user devices 106*a-n*, a plurality of peripheral devices 107*a-n* and 107*p-z*, third-party device 108, and/or a central controller 110, In various embodiments, any or all of devices 106*c-n*, 107*a*, 107*p-z*, may be in communication with the network 104 and/or with one another via the network 104.

Various components of system 100 may communicate with one another via one or more networks (e.g., via network 104). Such networks may comprise, for example, a mobile network such as a cellular, satellite, or pager network, the Internet, a wide area network, a Wi-Fi® network, another network, or a combination of such networks. For example, in one embodiment, both a wireless cellular network and a Wi-Fi® network may be involved in routing communications and/or transmitting data among two or more devices or components. The communication between any of the components of system 100 (or of any other system described herein) may take place over one or more of the following: the Internet, wireless data networks, such as 802.11 Wi-Fi®, PSTN interfaces, cable modem DOCSIS data networks, or mobile phone data networks commonly referred to as 3G, LTE, LTE—advanced, etc.

In some embodiments, additional devices or components that are not shown in FIG. 1 may be part of a system for facilitating embodiments as described herein. For example, one or more servers operable to serve as wireless network gateways or routers may be part of such a system. In other embodiments, some of the functionality described herein as being performed by system 100 may instead or in addition be performed by a third party server operating on behalf of the system 100 (e.g., the central controller 110 may outsource some functionality, such as registration of new game players). Thus, a third party server may be a part of a system such as that illustrated in FIG. 1.

It should be understood that any of the functionality described herein as being performed by a particular component of the system 100 may in some embodiments be performed by another component of the system 100 and/or such a third party server. For example, one or more of the functions or processes described herein as being performed by the central controller 110 (e.g., by a module or software application of the central controller) or another component of system 100 may be implemented with the use of one or more cloud-based servers which, in one embodiment, may be operated by or with the help of a third party distinct from the central controller 110. In other words, while in some embodiments the system 100 may be implemented on servers that are maintained by or on behalf of central controller 110, in other embodiments it may at least partially be implemented using other arrangements, such as in a cloud-computing environment, for example.

In various embodiments, peripheral devices 107*b* and 107*c* may be in communication with user device 106*b*, such as by wired connection (e.g., via USB cable), via wireless connection (e.g., via Bluetooth®) or via any other connection means. In various embodiments, peripheral devices 107*b* and 107*c* may be in communication with one another via user device 106*b* (e.g., using device 106*b* as an intermediary). In various embodiments, peripheral device 107*d* may be in communication with peripheral device 107*c*, such as by wired, wireless, or any other connection means. Peripheral device 107*d* may be in communication with peripheral device 107*b* via peripheral device 107*c* and user device 106*b* (e.g., using devices 107*c* and 106*b* as intermediaries). In various embodiments, peripheral devices 107*b* and/or 107*c* may be in communication with network 104 via user device 106*b* (e.g., using device 106*b* as an intermediary). Peripheral devices 107*b* and/or 107*c* may thereby communicate with other devices (e.g., peripheral device 107*p* or central controller 110) via the network 104. Similarly, peripheral device 107*d* may be in communication with network 104 via peripheral device 107*c* and user device 106*b* (e.g., by using both 107*c* and 106*b* as intermediaries). In various embodiments, peripheral device 107*d* may thereby communicate with other devices via the network 104.

In various embodiments, local network 109 is in communication with network 104. Local network 109 may be, for example, a Local Area Network (LAN), Wi-Fi® network, Ethernet-based network, home network, school network, office network, business network, or any other network. User device 106*a* and peripheral devices 107*e-n* may each be in communication with local network 109. Devices 106*a* and 107*e-n* may communicate with one another via local network 109. In various embodiments, one or more of devices 106*a* and 107*e-n* may communicate with other devices (e.g., peripheral device 107*p* or central controller 110) via both the local network 109 network 104. It will be appreciated that the depicted devices 106*a* and 107*e-n* are illustrative of some embodiments, and that various embodiments contemplate more or fewer user devices and/or more or fewer peripheral devices in communication with local network 109.

It will be appreciated that various embodiments contemplate more or fewer user devices than the depicted user devices 106*a-n*. Various embodiments contemplate fewer or more local networks, such as local network 109. In various embodiments, each local network may be in communication with a respective number of user devices and/or peripherals. Various embodiments contemplate more or fewer peripheral devices than the depicted peripheral devices 107*a-n* and 107*p-z*. Various embodiments contemplate more or fewer resource devices than the depicted resource devices 102*a-n*. Various embodiments contemplate more or fewer third-party devices than the depicted third-party device 108. In a similar vein, it will be understood that ranges of reference numerals, such as "102*a-n*", do not imply that there is exactly one such device corresponding to each alphabet letter in the range (e.g., in the range "a-n"). Indeed, there may be more or fewer such devices than the number of alphabet letters in the indicated range.

In various embodiments, resource devices 102*a-n* may include devices that store data and/or provide one or more services used in various embodiments. Resource devices 102*a-n* may be separate from the central controller 110. For example, a resource device may belong to a separate entity to that of the central controller. In various embodiments, one or more resource devices are part of the central controller, have common ownership with the central controller, or are otherwise related to the central control. In various embodiments, resource devices 102*a-n* may include one or more databases, cloud computing and storage services, calling platforms, video conferencing platforms, streaming services, voice over IP services, authenticating services, certificate services, cryptographic services, anonymization services, biometric analysis services, transaction processing services, financial transaction processing services, digital currency transaction services, file storage services, document storage services, translation services, transcription services, providers of imagery, image/video processing services, providers of satellite imagery, libraries for digital videos, libraries for digital music, library for digital lectures, libraries for educational content, libraries for digital content, providers of shared workspaces, providers of collaborative workspaces, online gaming platforms, game servers, advertisement aggregation services, advertisement distribution services, facilitators of online meetings, email servers, messaging platforms, Wiki hosts, website hosts, providers of software, providers of software-as-a-service, providers of data, providers of user data, and/or any other data storage device and/or any other service provider.

For example, a resource device (e.g., device 102*a*), may assist the central controller 110 in authenticating a user every time the user logs into a video game platform associated with the central controller. As another example, a resource device may store digital music files that are downloaded to a user device as a reward for the user's performance in a video game associated with the central controller. As another example, a resource device may provide architectural design software for use by users designing a building in a shared workspace associated with the central controller. According to some embodiments, communications between and/or within the devices 102*a-n*, 106*a-n*, 107*a-n* and 107*p-z*, 108, and 110 of the system 100 may be utilized to (i) conduct a multiplayer game, (ii) conduct a meeting, (iii) facilitate a collaborative project, (iv) distribute advertisements, (v) provide teaching, (vi) provide evaluations and ratings or individuals or teams, (vii) facilitate video conferencing services, (viii) enhance educational experiences, and/or for any other purpose.

Figure 79A:
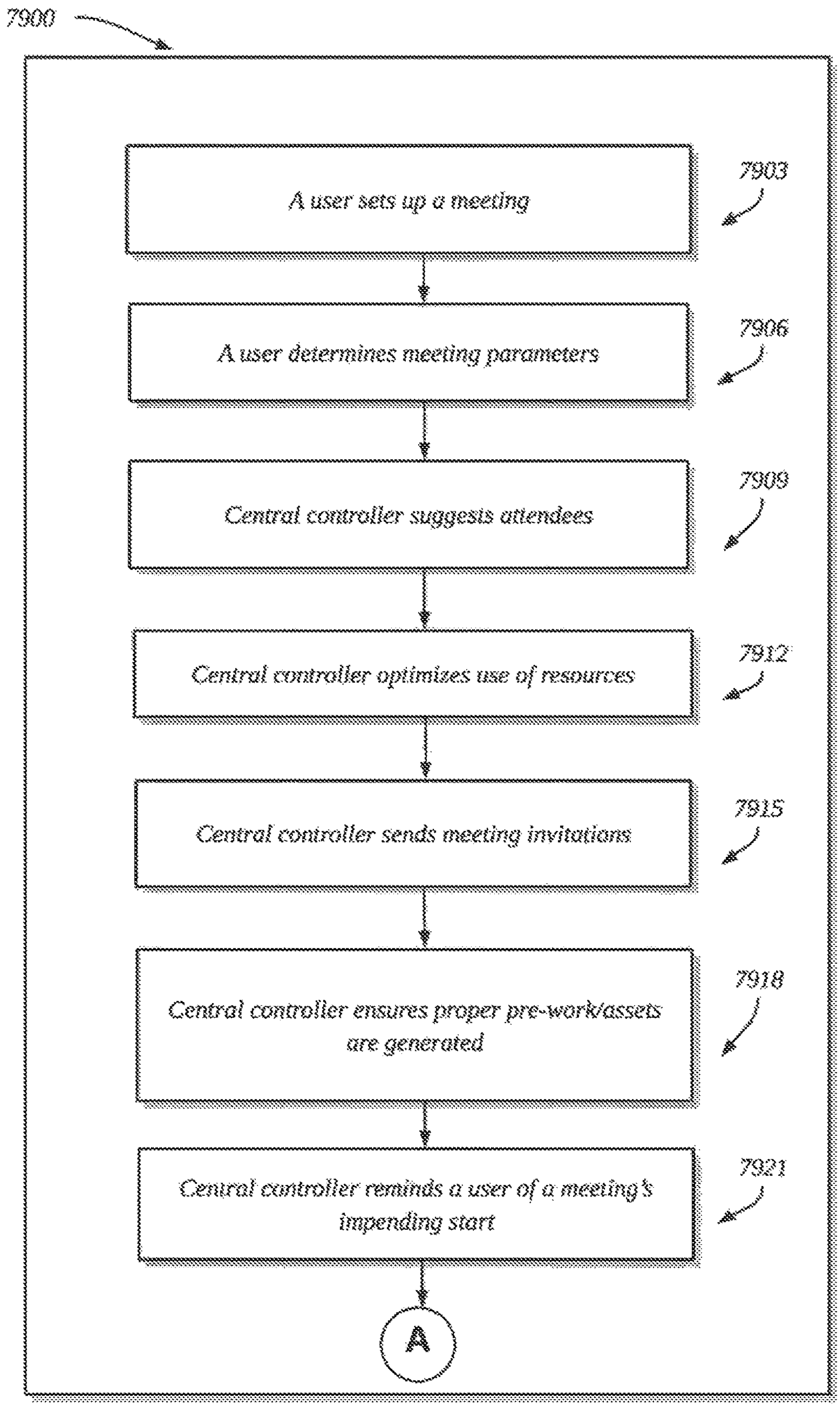
FIG. 79A, FIG. 79B, and FIG. 79C, together show a diagram of a process flow consistent with at least some embodiments described herein.
Figure 79B:
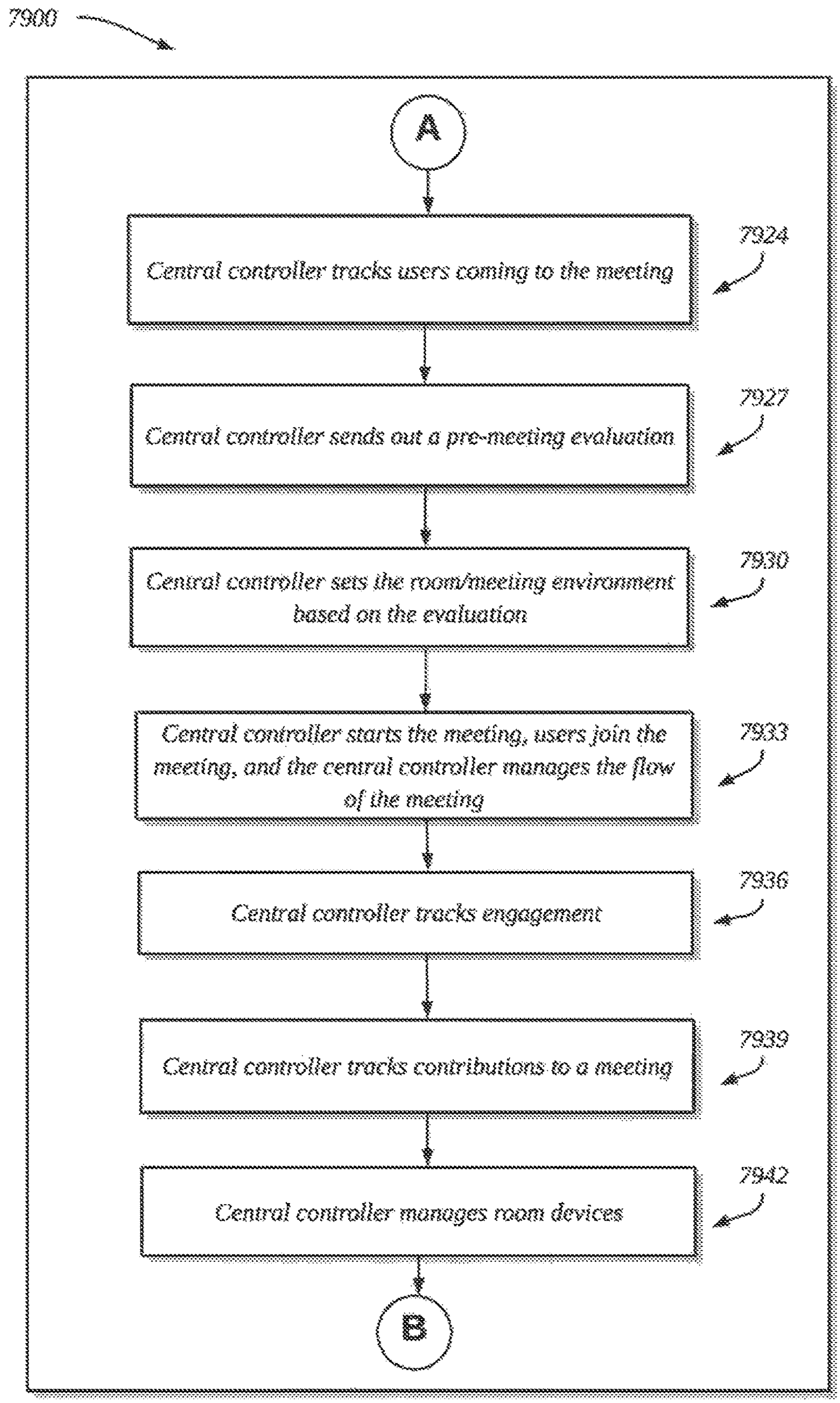
Figure 79C:
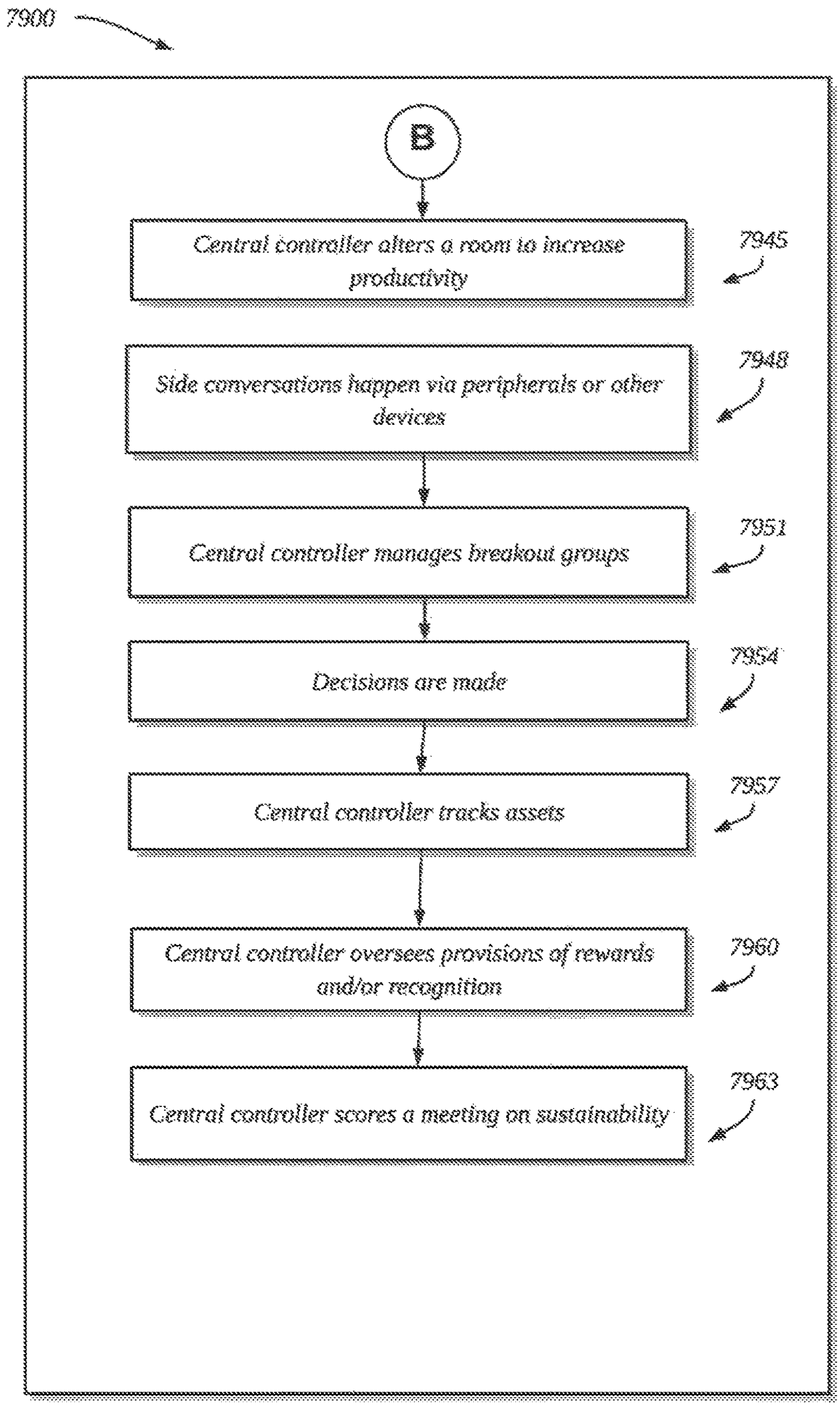
Figure 91A:
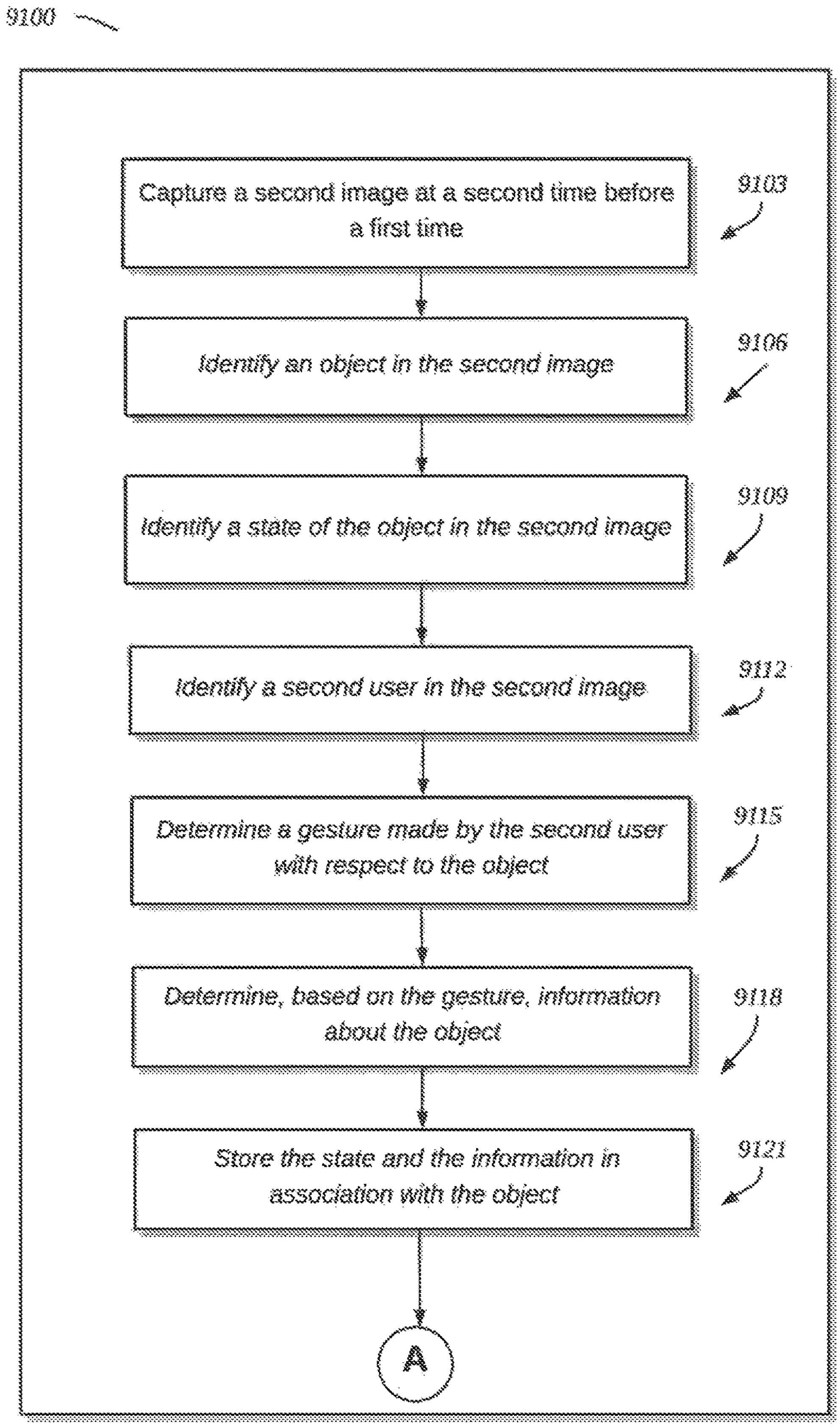
FIG. 91A and FIG. 91B, together show a diagram of a process flow consistent with at least some embodiments described herein.
Figure 91B:
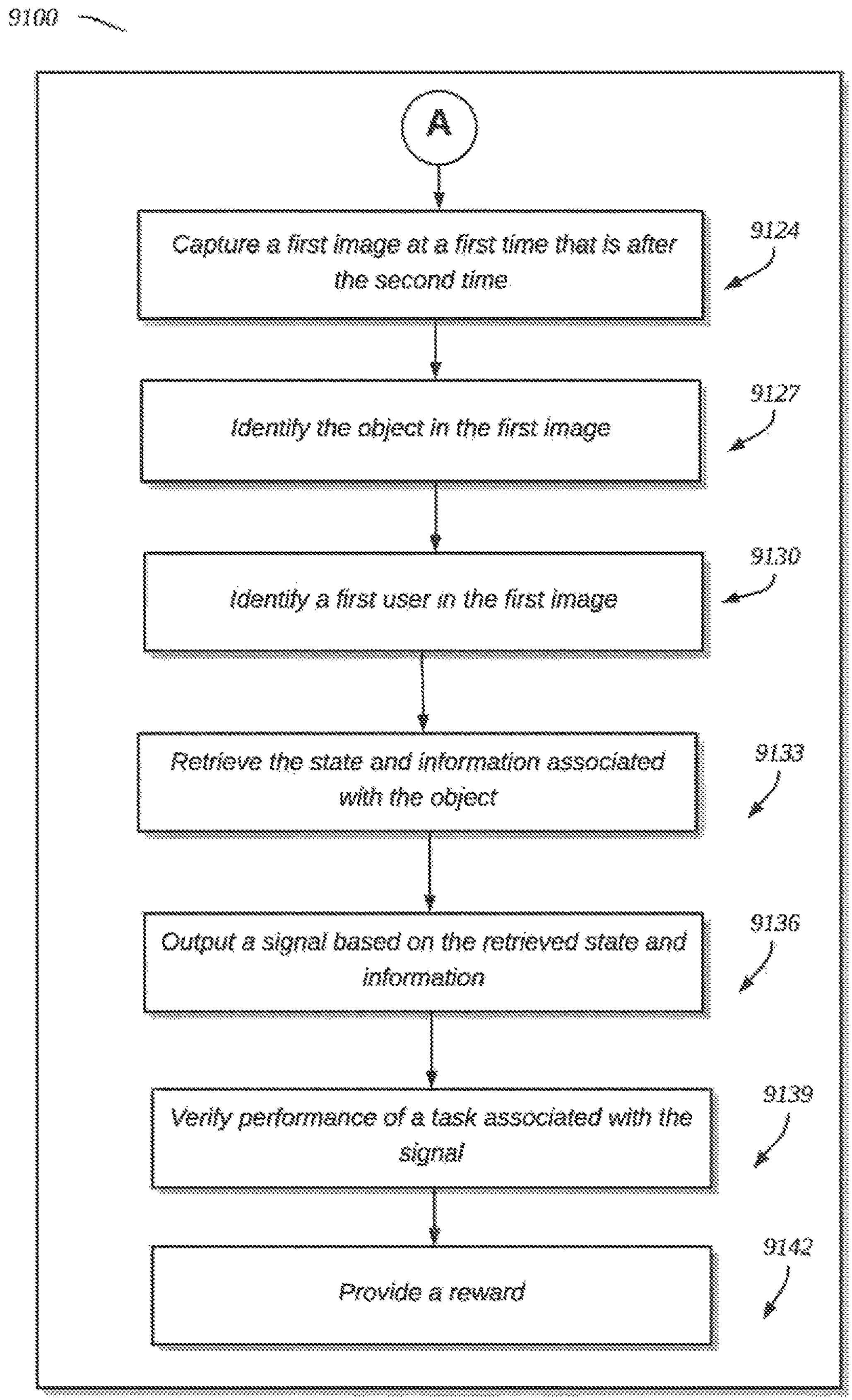

Fewer or more components 102*a-n*, 104, 106*a-n*, 107*a-n*, 107*p-z*, 108, 110 and/or various configurations of the depicted components 102*a-n*, 104, 106*a-n*, 107*a-n*, 107*p-z*, 108, 110 may be included in the system 100 without deviating from the scope of embodiments described herein. In some embodiments, the components 102*a-n*, 104, 106*a-n*, 107*a-n*, 107*p-z*, 108, 110 may be similar in configuration and/or functionality to similarly named and/or numbered components as described herein. In some embodiments, the system 100 (and/or portion thereof) may comprise a platform programmed and/or otherwise configured to execute, conduct, and/or facilitate the methods (e.g., 7400 of FIG. 74; 7900 of FIGS. 79A-C; 8600 of FIGS. 86A-C; 9100 of FIGS. 91A-B; 9800 of FIG. 98; 10100 of FIG. 101; 10200 of FIGS. 102A-B; 10600 of FIG. 106) herein, and/or portions thereof.

According to some embodiments, the resource devices 102*a-n* and/or the user devices 106*a-n* may comprise any type or configuration of computing, mobile electronic, network, user, and/or communication devices that are or become known or practicable. The resource devices 102*a-n* and/or the user devices 106*a-n* may, for example, comprise one or more Personal Computer (PC) devices, computer workstations, server computers, cloud computing resources, video gaming devices, tablet computers, such as an iPad® manufactured by Apple®, Inc. of Cupertino, CA, and/or cellular and/or wireless telephones, such as an iPhone® (also manufactured by Apple®, Inc.) or an LG V50 THINQ™ 5G smart phone manufactured by LG® Electronics, Inc. of San Diego, CA, and running the Android® operating system from Google®, Inc. of Mountain View, CA In some embodiments, the resource devices 102*a-n* and/or the user devices 106*a-n* may comprise one or more devices owned and/or operated by one or more users (not shown), such as a Sony PlayStation® 5, and/or users/account holders (or potential users/account holders). According to some embodiments, the resource devices 102*a-n* and/or the user devices 106*a-n* may communicate with the central controller 110 either directly or via the network 104 as described herein.

According to some embodiments, the peripheral devices 107*a-n*, 107*p-z* may comprise any type or configuration of computing, mobile electronic, network, user, and/or communication devices that are or become known or practicable. The peripheral devices 107*a-n*, 107*p-z* may, for example, comprise one or more of computer mice, computer keyboards, headsets, cameras, touchpads, joysticks, game controllers, watches (e.g., smart watches), microphones, etc. In various embodiments, peripheral devices may comprise one or more of Personal Computer (PC) devices, computer workstations, video game consoles, tablet computers, laptops, and the like. The network 104 may, according to some embodiments, comprise a Local Area Network (LAN; wireless and/or wired), cellular telephone, Bluetooth®, Near Field Communication (NFC), and/or Radio Frequency (RF) network with communication links between the central controller 110, the resource devices 102*a-n*, the user devices 106*a-n*, and/or the third-party device 108. In some embodiments, the network 104 may comprise direct communication links between any or all of the components 102*a-n*, 104, 106*a-n*, 107*a-n*, 107*p-z*, 108, 110 of the system 100. The resource devices 102*a-n* may, for example, be directly interfaced or connected to one or more of the central controller 110, the user devices 106*a-n*, the peripheral devices 107*a-n*, 107*p-z* and/or the third-party device 108 via one or more wires, cables, wireless links, and/or other network components, such network components (e.g., communication links) comprising portions of the network 104. In some embodiments, the network 104 may comprise one or many other links or network components other than those depicted in FIG. 1. The central controller 110 may, for example, be connected to the resource devices 102*a-n* via various cell towers, routers, repeaters, ports, switches, and/or other network components that comprise the Internet and/or a cellular telephone (and/or Public Switched Telephone Network (PSTN) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 104, 106*b-n*, 107*a*, 107*p-z*, 108, 109, 110 of the system 100. The network 104 may comprise one or more cellular telephone networks with communication links between the user devices 106*b-n* and the central controller 110, for example, and/or may comprise an NFC or other short-range wireless communication path, with communication links between the resource devices 102*a-n* and the user devices 106*b-n*, for example.

According to some embodiments, the third-party device 108 may comprise any type or configuration of a computerized processing device, such as a PC, laptop computer, computer server, database system, and/or other electronic device, devices, or any combination thereof. In some embodiments, the third-party device 108 may be owned and/or operated by a third-party (i.e., an entity different than any entity owning and/or operating either the resource devices 102*a-n*, the user devices 106*a-n*, the peripheral devices 107*a-n* and 107*p-z*, or the central controller 110; such as a business customer or client of the central controller). The third-party device 108 may, for example, comprise an advertiser that provides digital advertisements for incorporation by the central controller 110 into a multiplayer video game, and which pays the central controller to do this. The third-party device 108 may, as another example, comprise a streaming channel that purchases footage of video games from the central controller.

According to some embodiments, the third-party device 108 may comprise a plurality of devices and/or may be associated with a plurality of third-party entities. In some embodiments, the third-party device 108 may comprise the memory device (or a portion thereof), such as in the case the third-party device 108 comprises a third-party data storage service, device, and/or system, such as the Amazon® Simple Storage Service (Amazon® S3™) available from Amazon®.com, Inc. of Seattle, WA or an open-source third-party database service, such as MongoDB™ available from MongoDB, Inc. of New York, NY In some embodiments, the central controller 110 may comprise an electronic and/or computerized controller device, such as a computer server and/or server cluster communicatively coupled to interface with the resource devices 102*a-n* and/or the user devices 106*a-n*, and/or the peripheral devices 107*a-n* and 107*p-z*, and/or local network 109 (directly and/or indirectly). The central controller 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the central controller 110 may be located remotely from one or more of the resource devices 102*a-n* and/or the user devices 106*a-n* and/or the peripheral devices 107*a-n* and 107*p-z*. The central controller 110 may also or alternatively comprise a plurality of electronic processing devices located at one or more various sites and/or locations (e.g., a distributed computing and/or processing network).

According to some embodiments, the central controller 110 may store and/or execute specially programmed instructions (not separately shown in FIG. 1) to operate in accordance with embodiments described herein. The central controller 110 may, for example, execute one or more programs, modules, and/or routines (e.g., AI code and/or logic) that facilitate the analysis of meetings (e.g., contributors to the emissions of a meeting; e.g., of contributors to the performance of a meeting), as described herein. According to some embodiments, the central controller 110 may execute stored instructions, logic, and/or software modules to (i) determine meeting configurations consistent with requirements for a meeting, (ii) determine information about objects, (iii) determine tasks associated with objects, (iv) determine a route for a user to take, (v) conduct games, (vi) facilitate messaging to and between peripheral devices, (vii) determine alterations to a room that may enhance safety or productivity, (ix) provide an interface via which a resource and/or a customer (or other user) may view and/or manage meetings, and/or (x) perform any other task or tasks, as described herein.

In some embodiments, the resource devices 102*a-n*, the user devices 106*a-n*, the third-party device 108, the peripheral devices 107*a-n* and 107*p-z* and/or the central controller 110 may be in communication with and/or comprise a memory device (not shown). The memory device may comprise, for example, various databases and/or data storage mediums that may store, for example, user information, meeting information, cryptographic keys and/or data, login and/or identity credentials, and/or instructions that cause various devices (e.g., the central controller 110, the third-party device 108, resource devices 102*a-n*, the user devices 106*a-n*, the peripheral devices 107*a-n* and 107*p-z*) to operate in accordance with embodiments described herein.

The memory device may store, for example, various AI code and/or mobile device applications and/or interface generation instructions, each of which may, when executed, participate in and/or cause meeting enhancements, improvements to meeting performance, reductions in emissions associated with meeting, enhancements to online gameplay, or any other result or outcome as described herein. In some embodiments, the memory device may comprise any type, configuration, and/or quantity of data storage devices that are or become known or practicable. The memory device may, for example, comprise an array of optical and/or solid-state hard drives configured to store predictive models (e.g., analysis formulas and/or mathematical models and/or models for predicting emissions), credentialing instructions and/or keys, and/or various operating instructions, drivers, etc. In some embodiments, the memory device may comprise a solid-state and/or non-volatile memory card (e.g., a Secure Digital (SD) card such as an SD Standard-Capacity (SDSC), an SD High-Capacity (SDHC), and/or an SD eXtended-Capacity (SDXC)) and any various practicable form-factors, such as original, mini, and micro sizes, such as are available from Western Digital Corporation of San Jose, CA In various embodiments, the memory device may be a stand-alone component of the central controller 110. In various embodiments, the memory device 140 may comprise multiple components. In some embodiments, a multi-component memory device may be distributed across various devices and/or may comprise remotely dispersed components. Any or all of the resource devices 102*a-n*, the user devices 106*a-n*, the peripheral devices 107*a-n* and 107*p-z*, the third-party device 108, and/or the central controller 110 may comprise the memory device or a portion thereof, for example.

Resource Devices

Figure 2:
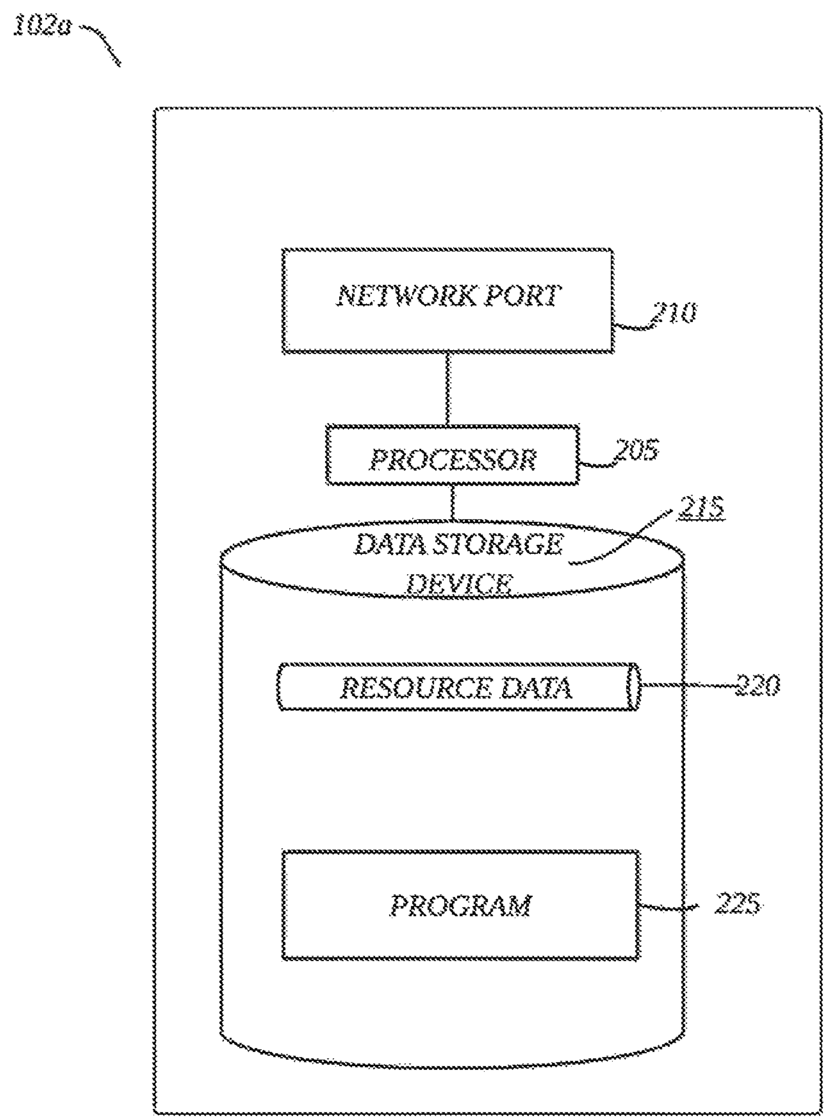
FIG. 2 is a block diagram of a resource device consistent with at least some embodiments described herein.

Turning now to FIG. 2, a block diagram of a resource device 102*a* according to some embodiments is shown. Although FIG. 2 depicts resource device 102*a*, it will be appreciated that other resource devices (e.g., resource devices 102*b-n*, may have similar constructions). In various embodiments, different resource devices may have different constructions. With reference to FIG. 2 (and to any other figures depicting software, software modules, processors, computer programs, and the like), it should be understood that any of the software module(s) or computer programs illustrated therein may be part of a single program or integrated into various programs for controlling processor 205 (or the processor depicted in the relevant figure). Further, any of the software module(s) or computer programs illustrated therein may be stored in a compressed, uncompiled, and/or encrypted format and include instructions which, when performed by the processor, cause the processor to operate in accordance with at least some of the methods described herein. Of course, additional and/or different software module(s) or computer programs may be included and it should be understood that the example software module(s) illustrated and described with respect to FIG. 2 (or to any other relevant figure) are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to an embodiment, the instructions of any or all of the software module(s) or programs described with respect to FIG. 2 (or to any other pertinent figure) may be read into a main memory from another computer-readable medium, such from a ROM to RAM. Execution of sequences of the instructions in the software module(s) or programs causes processor 205 (or other applicable processor) to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software. In various embodiments, resource device 102*a* comprises a processor 205. Processor 205 may be any suitable processor, logic chip, neural chip, controller, or the like, and may include any component capable of executing instructions (e.g., computer instructions, e.g., digital instructions). Commercially available examples include the Apple® eight-core M1 chip with Neural Engine, AMD® Ryzen™ Threadripper 3990x with 64 cores, and the Intel eight-core Core i9-11900K chip.

In various embodiments, processor 205 is in communication with a network port 210 and a data storage device 215. Network port 210 may include any means for resource device 102*a* to connect to and/or communicate over a network. Network port 210 may include any means for resource device 102*a* to connect to and/or communicate with another device (e.g., with another electronic device). For example, network port 210 may include a network interface controller, network interface adapter, LAN adapter, or the like. Network port 210 may include a transmitter, receiver, and/or transceiver. Network port 210 may be capable of transmitting signals, such as wireless, cellular, electrical, optical, NFC, RFID, or any other signals. In various embodiments, network port 210 may be capable of receiving signals, such as wireless, cellular, electrical, optical, or any other signals. Storage device 215 may include memory, storage, and the like for storing data and/or computer instructions. Storage device 215 may comprise one or more hard disk drives, solid state drives, random access memory (RAM), read only memory (ROM), and/or any other memory or storage. Storage device 215 may store resource data 220, which may include tables, files, images, videos, audio, or any other data. Storage device 215 may store program 225. Program 225 may include instructions for execution by processor 205 in order to carry out various embodiments described herein. Further, resource data 220 may be utilized (e.g., referenced) by processor 205 in order to carry out various embodiments described herein. It will be appreciated that, in various embodiments, resource device 102*a* may include more or fewer components than those explicitly depicted.

User Devices

Figure 3:
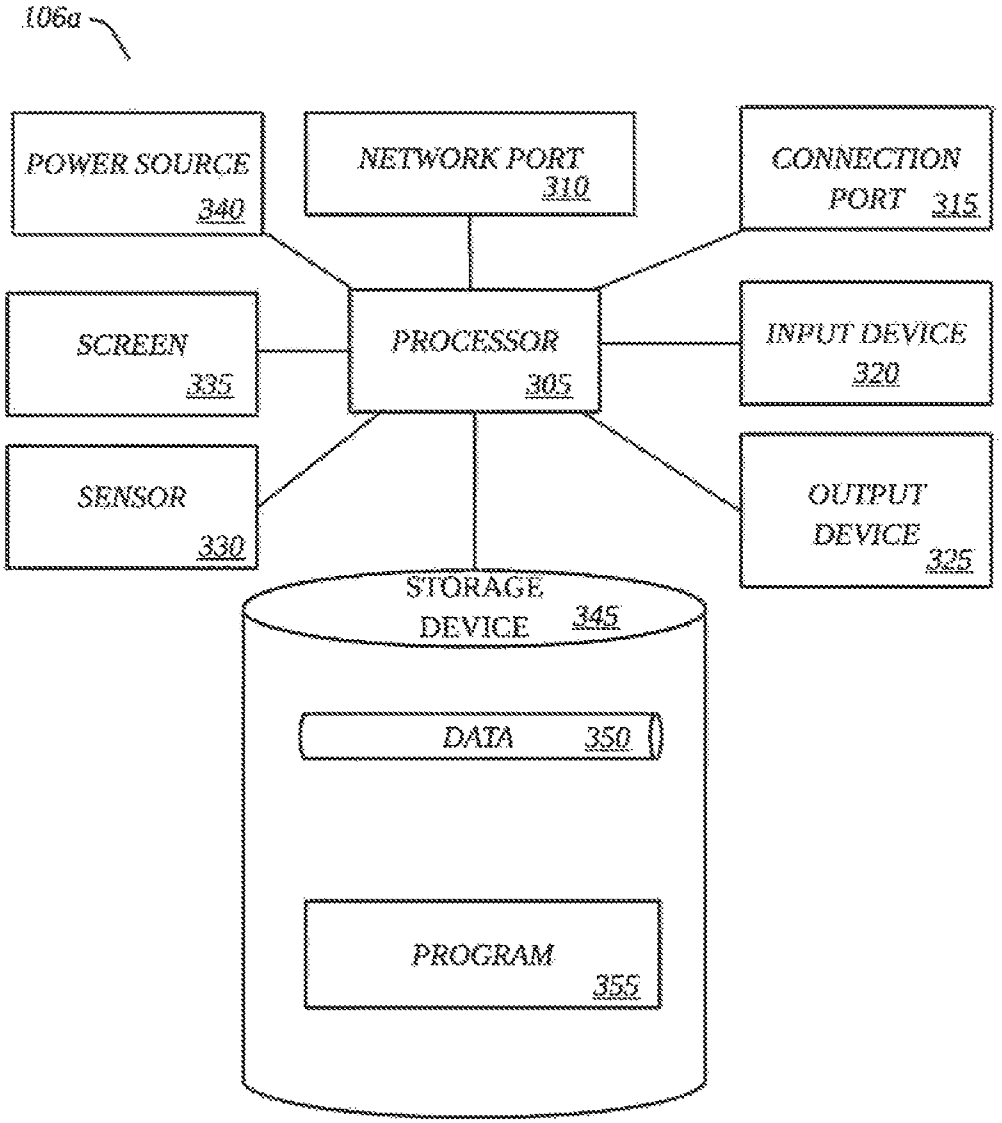
FIG. 3 is a block diagram of a user device consistent with at least some embodiments described herein.

Turning now to FIG. 3, a block diagram of a user device 106*a* according to some embodiments is shown. Although FIG. 3 depicts user device 106*a*, it will be appreciated that other user devices (e.g., user devices 106*b-n*, may have similar constructions). In various embodiments, different user devices may have different constructions. The user device manages the various peripheral devices associated with one or more users, facilitating communication between them and passing information back to the user device. In some embodiments the user device is a Mac® or PC personal computer with suitable processing power, data storage, and communication capabilities to enable various embodiments. In various embodiments, a user device may include a PC, laptop, tablet, smart phone, smart watch, netbook, room AV controller, desktop computer, Apple® Macintosh computer, a gaming console, a workstation, or any other suitable device.

Suitable devices that could act as a user device include: Laptops (e.g., MacBook® Pro, MacBook® Air, HP® Spectre™ x360, Google® Pixelbook™ Go, Dell® XPS™ 13); Desktop computers (e.g., Apple® iMac 5K, Microsoft® Surface™ Studio 2, Dell® Inspiron™ 5680); Tablets (e.g., Apple® iPad® Pro 12.9, Samsung® Galaxy™ Tab S6, iPad® Air, Microsoft® Surface™ Pro); Video game systems (e.g., PlayStation® 5, Xbox® One, Nintendo® Switch™, Super NES® Classic Edition, Wii U®); Smartphones (e.g., Apple® iPhone® 12 Pro or Android® device such as Google® Pixel™ 4 and OnePlus™ 7 Pro); IP enabled desk phone; Watches (e.g., Samsung® Galaxy® Watch, Apple® Watch 5, Fossil® Sport, TicWatch™ E2, Fitbit® Versa™ 2); Room AV Controller (e.g., Crestron® Fusion, Google® Meet hardware); Eyeglasses (e.g., Iristick.Z1™ Premium, Vuzix® Blade, Everysight® Raptor™, Solos®, Amazon® Echo™ Frames); Wearables (e.g., watch, headphones, microphone); Digital assistant devices (e.g., Amazon® Alexa® enabled devices, Google® Assistant, Apple® Siri™); or any other suitable devices. In various embodiments, user device 106*a* comprises a processor 305. As with processor 205, processor 305 may be any suitable processor, logic chip, controller, or the like.

In various embodiments, processor 305 is in communication with a network port 310, connection port 315, input device 320, output device 325, sensor 330, screen 335, power source 340, and a data storage device 345. As with network port 210, network port 310 may include any means for user device 106*a* to connect to and/or communicate over a network. Network port 310 may comprise similar components and may have similar capabilities as does network port 210, so the details need not be repeated. Connection port 315 may include any means for connecting or interfacing with another device or medium, such as with a peripheral device (e.g., a headset, mouse, a keyboard), a storage medium or device (e.g., a DVD, a thumb drive, a memory card, a CD), or any other device or medium. Connection port 315 may include a USB port, HDMI port, DVI port, VGA port, Display port, Thunderbolt, Serial port, a CD drive, a DVD drive, a slot for a memory card, or any variation thereof, or any iteration thereof, or any other port. Input device 320 may include any component or device for receiving user input or any other input. Input device 320 may include buttons, keys, trackpads, trackballs, scroll wheels, switches, touch screens, cameras, microphones, motion sensors, biometric sensors, or any other suitable component or device. Input device 320 may include a keyboard, power button, eject button, fingerprint button, or any other device.

Output device 325 may include any component or device for outputting or conveying information, such as to a user. Output device 325 may include a display screen, speaker, light, laser pointer, backlight, projector, LED, touch bar, haptic actuator, or any other output device. Sensor 330 may include any component or device for receiving or detecting environmental, ambient, and/or circumstantial conditions, situations, or the like. Sensor 330 may include a microphone, temperature sensor, light sensor, motion sensor, accelerometer, inertial sensor, gyroscope, contact sensor, angle sensor, or any other sensor. Screen 335 may include any component or device for conveying visual information, such as to a user. Screen 335 may include a display screen and/or a touch screen. Screen 335 may include a CRT screen, LCD screen, projection screen, plasma screen, LED screen, OLED screen, DLP screen, laser projection screen, virtual retinal display, or any other screen.

Power source 340 may include any component or device for storing, supplying and/or regulating power to user device 106*a* and/or to any components thereof. Power source 340 may include a battery, ultra-capacitor, power supply unit, or any other suitable device. Power source 340 may include one or more electrical interfaces, such as a plug for connecting to an electrical outlet. Power source 340 may include one or more cords, wires, or the like for transporting electrical power, such as from a wall outlet and/or among components of user device 106*a*.

Storage device 345 may include memory, storage, and the like for storing data and/or computer instructions. Storage device 345 may comprise one or more hard disk drives, solid state drives, random access memory (RAM), read only memory (ROM), and/or any other memory or storage. Storage device 345 may store data 350, which may include tables, files, images, videos, audio, or any other data. Storage device 345 may store program 355. Program 355 may include instructions for execution by processor 305 in order to carry out various embodiments described herein. Further, data 350 may be utilized (e.g., referenced) by processor 305 in order to carry out various embodiments described herein. It will be appreciated that, in various embodiments, user device 106*a* may include more or fewer components than those explicitly depicted. It will be appreciated that components described with respect to user device 106*a* need not necessarily be mutually exclusive. For example, in some embodiments, an input device 320 and a screen 335 may be the same (e.g., a touch screen). For example, in some embodiments, an input device 320 and a sensor 330 may be the same (e.g., a microphone). Similarly, components described herein with respect to any other device need not necessarily be mutually exclusive.

Peripheral Devices

Figure 4:
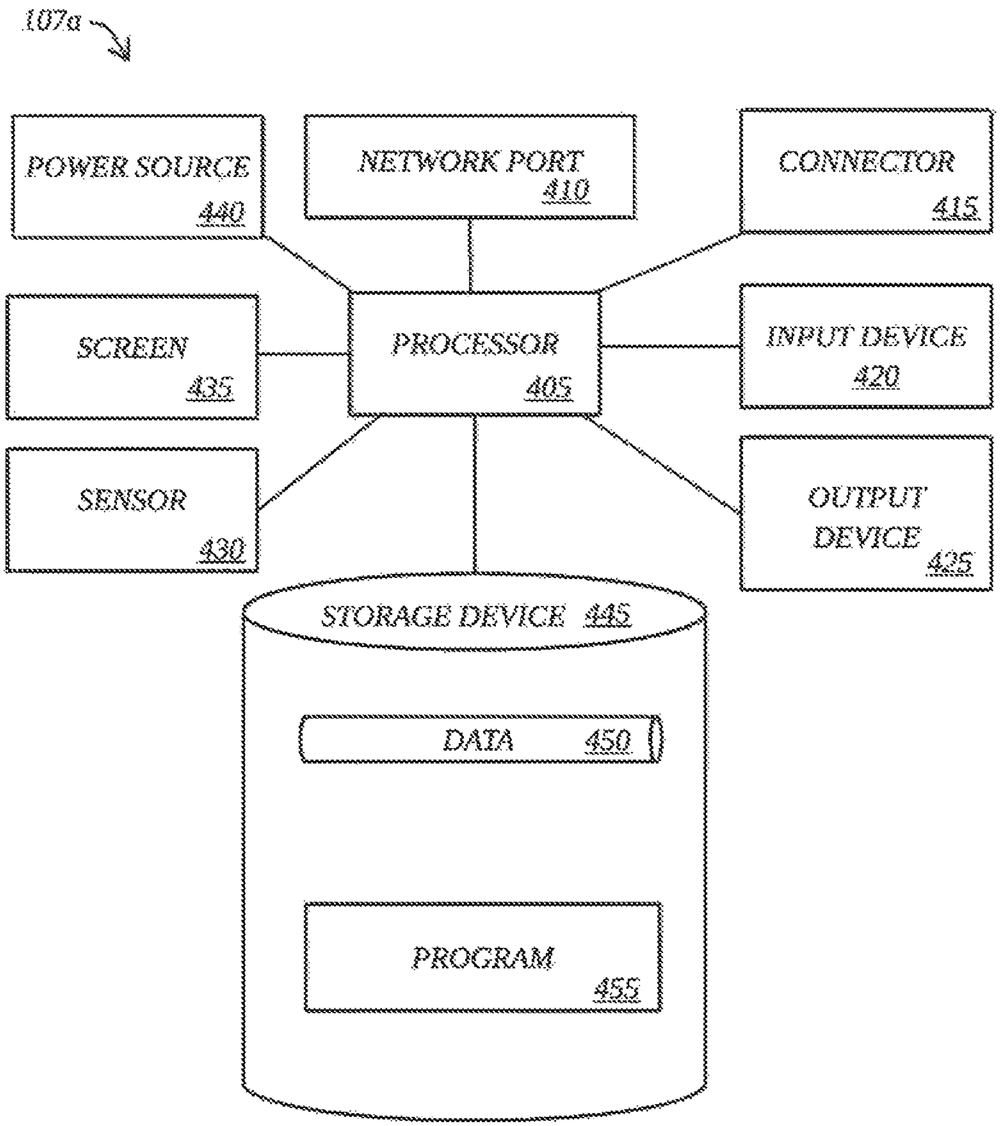
FIG. 4 is a block diagram of a peripheral device consistent with at least some embodiments described herein.

Turning now to FIG. 4, a block diagram of a peripheral device 107*a* according to some embodiments is shown. Although FIG. 4 depicts peripheral device 107*a*, it will be appreciated that other peripheral devices (e.g., peripheral devices 107*b-n* and 107*p-z*, may have similar constructions). In various embodiments, different peripheral devices may have different constructions. Peripheral devices 107*a* according to various embodiments include: mouse, presentation remote, trackpad, trackball, joystick, video game controller, wheel, camera (e.g., still image camera, video camera, portable camera), exercise device, footpad, pedals, pedal, foot pedal, yoke, keyboard, headset, watch, stylus, soft circuitry, drone or other action camera (e.g., GoPro®), or any other suitable device. Peripheral devices 107*a* might include suitably adapted furniture, accessories, clothing, or other items. For example, furniture might include built-in sensors and/or built-in electronics. Peripherals may include: chair, musical instrument, ring, clothing, hat, shoes, shirt, collar, backpack, mousepad, or any other suitable object or device. Peripheral devices 107*a* might include: green screens or chroma key screens; lights such as task lights, or specialized key lights for streaming; webcams; a desk itself, including a conventional or sit-stand desk; desk surface; monitor stand (e.g., which is used to alter the height of a monitor) or laptop computer stand (which may include charger and connections); monitor mount or swing arms; speakers; dongles, connecters, wires, cables; printers and scanners; external hard drives; pens; phones and tablets (e.g., to serve as controllers, second screens, or as a primary device); other desk items (e.g., organizers, photos and frames, coaster, journal or calendar); glasses; mugs; water bottles; etc.

Peripheral device 107*a* may include various components. Peripheral device 107*a* may include a processor 405, network port 410, connector 415, input device 420, output device 425, sensor 430, screen 435, power source 440, and storage device 445. Storage device 445 may store data 450 and program 455. A number of components for peripheral device 107*a* depicted in FIG. 4 have analogous components in user device 106*a* depicted in FIG. 3 (e.g., processor 405 may be analogous to processor 305), and so such components need not be described again in detail. However, it will be appreciated that any given user device and any given peripheral device may use different technologies, different manufacturers, different arrangements, etc., even for analogous components. For example, a particular user device may comprise a 20-inch LCD display screen, whereas a particular peripheral device may comprise a 1-inch OLED display screen. It will also be appreciated that data 450 need not necessarily comprise the same (or even similar) data as does data 350, and program 455 need not necessarily comprise the same (or even similar) data or instructions as does program 350.

In various embodiments, connector 415 may include any component capable of interfacing with a connection port (e.g., with connection port 315). For example, connector 415 may physically complement connection port 315. Thus, for example, peripheral device 107*a* may be physically connected to a user device via the connector 415 fitting into the connection port 315 of the user device. The interfacing may occur via plugging, latching, magnetic coupling, or via any other mechanism. In various embodiments, a peripheral device may have a connection port while a user device has a connector. Various embodiments contemplate that a user device and a peripheral device may interface with one another via any suitable mechanism. In various embodiments, a user device and a peripheral device may interface via a wireless connection (e.g., via Bluetooth®, Near Field Communication, or via any other means).

A peripheral may include one or more sensors 430. These may include mechanical sensors, optical sensors, photo sensors, magnetic sensors, biometric sensors, or any other sensors. A sensor may generate one or more electrical signals to represent a state of a sensor, a change in state of the sensor, or any other aspect of the sensor. For example, a contact sensor may generate a "1" (e.g., a binary one, e.g., a "high" voltage) when there is contact between two surfaces, and a "0" (e.g., a binary "0", e.g., a "low" voltage) when there is not contact between the two surfaces. A sensor may be coupled to a mechanical or physical object, and may thereby sense displacement, rotations, or other perturbations of the object. In this way, for example, a sensor may detect when a button has been depressed (e.g., contact has occurred between a depressible surface of a button and a fixed supporting surface of the button), when a wheel has been turned (e.g., a spoke of the wheel has blocked incident light onto an optical sensor), or when any other perturbation has occurred. In various embodiments, sensor 430 may be coupled to input device 420, and may thereby sense user inputs at the input device (e.g., key presses; e.g., mouse movements, etc.).

In various embodiments, sensor 430 may detect more than binary states. For example, sensor 430 may detect any of four different states, any of 256 different states, or any of a continuous range of states. For example, a sensor may detect the capacitance created by two parallel surfaces. The capacitance may change in a continuous fashion as the surfaces grow nearer or further from one another. The processor 405 may detect the electrical signals generated by sensor 430. The processor may translate such raw sensor signals into higher-level, summary, or aggregate signals. For example, processor 405 may receive a series of "1-0" signals from the sensor that is repeated 45 times. Each individual "1-0" signal may represent the rotation of a mouse wheel by 1 degree. Accordingly, the processor may generate a summary signal indicating that the mouse wheel has turned 45 degrees. As will be appreciated, aggregate or summary signals may be generated in many other ways. In some embodiments, no aggregate signal is generated (e.g., a raw sensor signal is utilized).

In various embodiments, processor 405 receives an electrical signal from sensor 430 that is representative of 1 out of numerous possible states. For example, the electrical signal may represent state number 139 out of 256 possible states. This may represent, for example, the displacement by which a button has been depressed. The processor may then map the electrical signal from sensor 430 into one of only two binary states (e.g., 'pressed' or 'not pressed'). To perform the mapping, the processor 405 may compare the received signal to a threshold state. If the state of the received signal is higher than the threshold state, then the processor may map the signal to a first binary state, otherwise the signal is mapped to a second binary state. In various embodiments, the threshold may be adjustable or centrally configurable. This may allow, for example, the processor 405 to adjust the amount of pressure that is required to register a "press" or "click" of a button.

Processor 405 may create data packets or otherwise encode the summary signals. These may then be transmitted to a user device (e.g., device 106*b*) via connector 415 (e.g., if transmitted by wired connection), via network port 410 (e.g., if transmitted by network; e.g., if transmitted by wireless network), or via any other means. User device 106*b* may include a computer data interface controller (e.g., as network port 410; e.g., as connector 415; e.g., as part of network port 410; e.g., as part of connector 415; e.g., in addition to network port 410 and/or connector 415), which may receive incoming data from peripheral device 107*a*. The incoming data may be decoded and then passed to a peripheral driver program on the user device 106*b*. In various embodiments, different models or types of peripheral devices may require different drivers. Thus, for example, user device 106*b* may include a separate driver for each peripheral device with which it is in communication. A driver program for a given peripheral device may be configured to translate unique or proprietary signals from the peripheral device into standard commands or instructions understood by the operating system on the user device 106*b*. Thus, for example, a driver may translate signals received from a mouse into a number of pixels of displacement of the mouse pointer. The peripheral device driver may also store a current state of the peripheral device, such as a position of the device (e.g., mouse) or state of depression of one or more buttons. A driver may pass peripheral device states or instructions to the operating system as generated, as needed, as requested, or under any other circumstances. These may then be used to direct progress in a program, application, process, etc.

Sensors

Various embodiments may employ sensors (e.g., sensor 330; e.g., sensor 430). Various embodiments may include algorithms for interpreting sensor data. Sensors may include microphones, motion sensors, tactile/touch/force sensors, voice sensors, light sensors, air quality sensors, weather sensors, indoor positioning sensors, environmental sensors, thermal cameras, infrared sensors, ultrasonic sensors, fingerprint sensors, brainwave sensors (e.g., EEG sensors), heart rate sensors (e.g., EKG sensors), muscle sensors (e.g., EMG electrodes for skeletal muscles), barcode and magstripe readers, speaker/ping tone sensors, galvanic skin response sensors, sweat and sweat metabolite sensors and blood oxygen sensors (e.g., pulse oximeters), electrodermal activity sensors (e.g., EDA sensors), or any other sensors. Algorithms may include face detection algorithms, voice detection algorithms, or any other algorithms.

Motion sensors may include gyroscopes, accelerometers, Wi-Fi® object sensing (e.g. using Wi-Fi® signals that bounce off of objects in a room to determine the size of an object and direction of movement), magnetometer combos (inertia measurement units), or any other motion sensors. Motion sensors may be 6 or 9 axis sensors, or sensors along any other number of axes. Motion sensors may be used for activity classification. For example, different types of activities such as running, walking, cycling, typing, etc., may have different associated patterns of motion. Motion sensors may therefore be used in conjunction with algorithms for classifying the recorded motions into particular activities. Motion sensors may be used to track activity in a restricted zone of a building, identify whether an individual is heading toward or away from a meeting, as a proxy for level of engagement in a meeting, steps taken, calories burned, hours slept, quality of sleep, or any other aspect of user activity. Motion sensors may be used to quantify the amount of activity performed, e.g., the number of steps taken by a user. Motion sensors can also be used to track the movement of objects, such as the velocity or distance traveled of a user's mouse. Motion sensors may be used to identify whether an individual is approaching an entry to a house, and if so, trigger a doorbell within the house, and send an alert to a user device or peripheral devices of a user associated with the house.

Motion sensors may use passive infrared (PIR) technology which can detect body and changes in body temperatures. Motion sensors using microwave technology send out microwave pulses and measure how those pulses bounce off moving objects. Ultrasonic motion sensors are another option. Motion sensors can also employ dual use technology by combining multiple detection methods, such as using both passive infrared and microwave technologies. Vibration motion sensors can pick up vibrations caused by people walking through a room. Area reflective motion sensors use infrared waves from an LED and can calculate the distance to an object based on the reflection of the waves.

Motion sensors may be used in conjunction with reminders, such as reminders to change activity patterns. For example, if motion sensors have been used to detect that a user has been sitting for a predetermined period of time, or that the user has otherwise been sedentary, a reminder may be generated for the user to encourage the user to stand up or otherwise engage in some physical activity.

Motion sensors may be used to detect wrist gestures, such as shakes, taps or double taps, or twists. Motion sensors may detect device orientation (e.g., landscape/portrait mode, vertical orientation). A motion sensor may include a freefall sensor. A freefall sensor may be used to monitor handling of packages/devices (e.g., that packages were not dropped or otherwise handled too roughly) or to protect hard drives (e.g., to refrain from accessing the hard drive of a device if the device is undergoing too much motion). In various embodiments, accelerometers may be used as microphones. For example, accelerometers may detect vibrations in air, in a membrane, or in some other medium caused by sound waves. In various embodiments, accelerometers may be used for image stabilization (e.g., to move a displayed image in a direction opposite that of a detected motion of a camera).

Tactile/touch/force sensors may include sensors that are sensitive to force, such as physical pressure, squeezing, or weight. Flex sensors may sense bending. 3-D accelerometers, such as the Nunchuck®/Wiichuck®, may sense motion in space (e.g., in three dimensions). Light sensors may sense ambient light. Light sensors, such as RGB sensors, may sense particular colors or combinations of colors, such as primary colors (e.g., red green and blue). Light sensors may include full spectrum luminosity sensors, ultraviolet (UV) sensors, infrared (IR) sensors, or any other sensors. Light sensors may include proximity sensors. Indoor positioning sensors may include sensors based on dead reckoning, pedestrian dead reckoning (such as the combination of accelerometer and gyroscope, including systems unreliable on infrastructure), geomagnetic or RF signal strength mapping, Bluetooth® beacons, or based on any other technology. Environmental sensors may include barometers, altimeters, humidity sensors, smoke detectors, radiation detectors, noise level sensors, gas sensors, temperature sensors (e.g., thermometers), liquid flow sensors, and any other sensors. Infrared sensors may be used to detect proximity, body temperature, gestures, or for any other application. Ultrasonic sensors may be used for range-finding, presence/proximity sensing, object detection and avoidance, position tracking, gesture tracking, or for any other purpose.

Outputs

In various embodiments, outputs may be generated by various components, devices, technologies, etc. For example, outputs may be generated by output device 325 and/or by output device 425. Outputs may take various forms, such as lights, colored lights, images, graphics, sounds, laser pointers, melodies, music, tones, vibrations, jingles, spoken words, synthesized speech, sounds from games, sounds from video games, etc. Light outputs may be generated by light emitting diodes (LED's), liquid crystals, liquid crystal displays (LCD's), incandescent lights, display screens, electronic ink (E-ink), e-skin, or by any other source. In various embodiments, outputs may include vibration, movement, or other motion. Outputs may include force feedback or haptic feedback. Outputs may include temperature, such as through heating elements, cooling elements, heat concentrating elements, fans, or through any other components or technologies. In various embodiments, an output component may include a motor. A motor may cause a mouse to move on its own (e.g., without input of its owner). In various embodiments, a first mouse is configured to mirror the motions of a second mouse. That is, for example, when the other second mouse is moved by a user, the motor in the first mouse moves the first mouse in a series of motions that copy the motions of the second mouse. In this way, for example, a first user can see the motions of another user reflected in his own mouse. In various embodiments, outputs may take the form of holograms. In various embodiments, outputs may take the form of scents or odors or vapors. These may be generated with dispensers, for example. In various embodiments, outputs may consist of alterations to an in-home (or other indoor) environment. Outputs may be brought about by home control systems. Alterations to the environment may include changing temperature, humidity, light levels, state of window shades (e.g., open are closed), state of door locks, security cameras settings, light projections onto walls, or any other alteration.

Third-Party Devices

Figure 5:
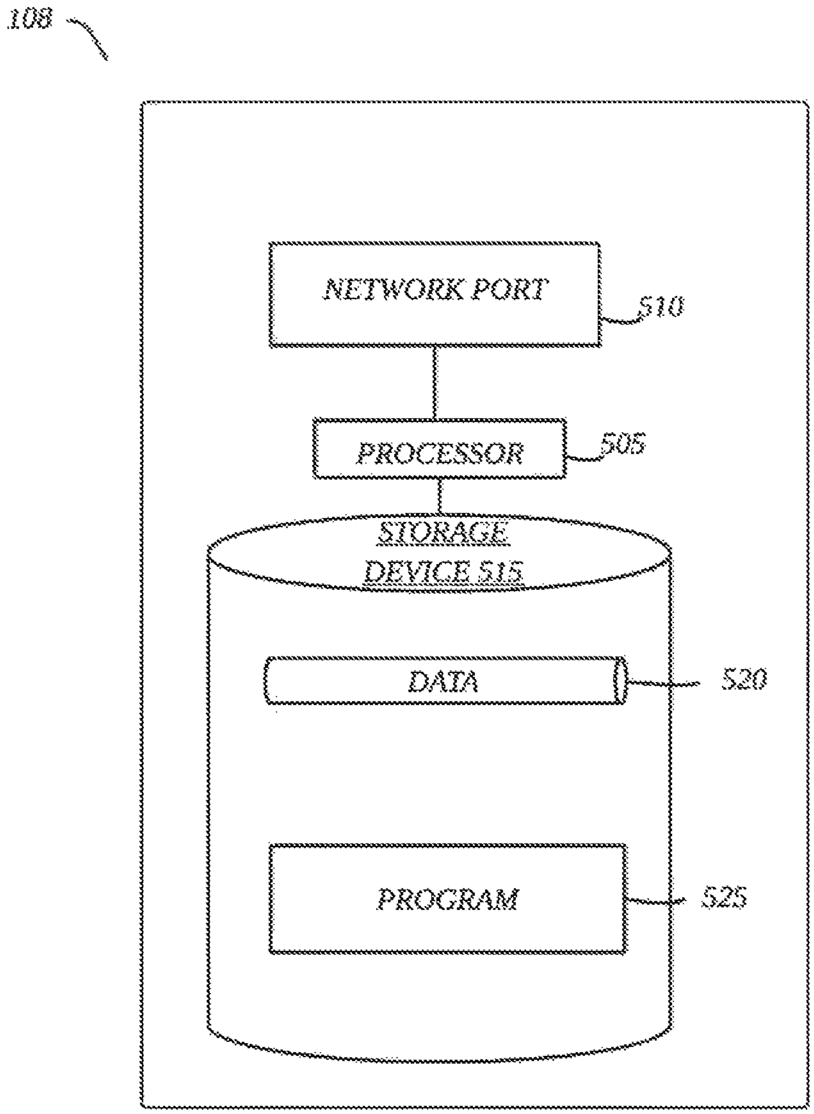
FIG. 5 is a block diagram of a third-party device consistent with at least some embodiments described herein.

Turning now to FIG. 5, a block diagram of a third-party device 108 according to some embodiments is shown. In various embodiments, a third-party device 108 may be a server or any other computing device or any other device. Third-party device 108 may include various components. Third-party device 108 may include a processor 505, network port 510, and storage device 515. Storage device 515 may store data 520 and program 525. A number of components for third-party device 108 depicted in FIG. 5 have analogous components in resource device 102*a* depicted in FIG. 2 (e.g., processor 505 may be analogous to processor 205), and so such components need not be described again in detail. However, it will be appreciated that any given resource device and any given third-party device may use different technologies, different manufacturers, different arrangements, etc., even for analogous components. It will also be appreciated that data 520 need not necessarily comprise the same (or even similar) data as does data 220, and program 525 need not necessarily comprise the same (or even similar) data or instructions as does program 225.

Central Controllers

Figure 6:
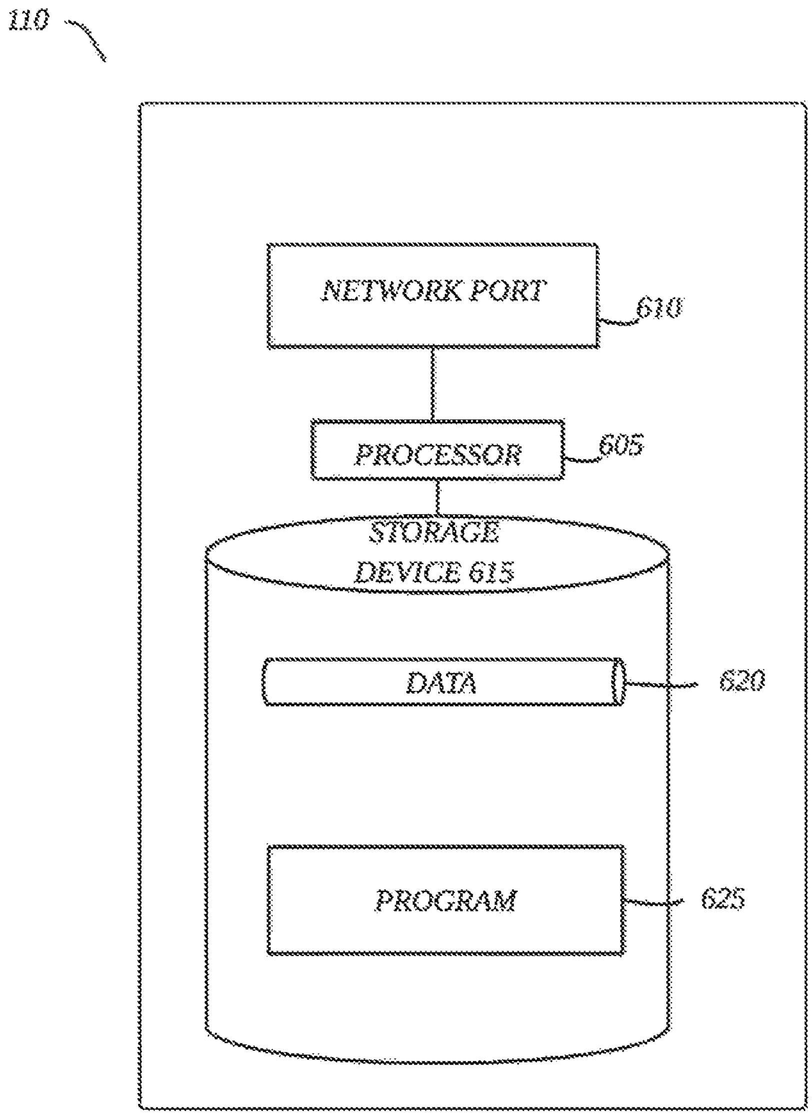
FIG. 6 is a block diagram of a central controller consistent with at least some embodiments described herein.

Turning now to FIG. 6, a block diagram of a central controller 110 according to some embodiments is shown. In various embodiments, central controller 110 may be a server or any other computing device or any other device. Central controller 110 may include various components. Central controller 110 may include a processor 605, network port 610, and storage device 615. Storage device 615 may store data 620 and program 625. A number of components for central controller 110 depicted in FIG. 6 have analogous components in resource device 102*a* depicted in FIG. 2 (e.g., processor 605 may be analogous to processor 205), and so such components need not be described again in detail. However, it will be appreciated that any given resource device and central controller 110 may use different technologies, different manufacturers, different arrangements, etc., even for analogous components. It will also be appreciated that data 620 need not necessarily comprise the same (or even similar) data as does data 220, and program 625 need not necessarily comprise the same (or even similar) data or instructions as does program 225.

In various embodiments, the central controller may include one or more servers located at the headquarters of a company, a set of distributed servers at multiple locations throughout the company, or processing/storage capability located in a cloud environment—either on premise or with an outside vendor such as Amazon® Web Services, Google® Cloud Platform, or Microsoft® Azure®. In various embodiments, the central controller may be a central point of processing, taking input from one or more of the devices herein, such as a user device or peripheral device. The central controller has processing and storage capability along with the appropriate management software as described herein. In various embodiments, the central controller may include an operating system, such as Linux, Windows® Server, Mac® OS X Server, or any other suitable operating system.

Communications with the central controller could include user devices, game controllers, peripheral devices, outside websites, conference room control systems, video communication networks, remote learning communication networks, game consoles, streaming platforms, corporate data systems, etc. In various embodiments, the central controller may include hardware and software that interfaces with user devices and/or peripheral devices in order to facilitate communications. The central controller may collect analytics from devices (e.g., user device, e.g., peripheral devices). Analytics may be used for various purposes, such as for the purpose of enhancing the experience of a user.

In various embodiments, the central controller may perform various other functions, such as authenticating users, maintaining user accounts, maintaining user funds, maintaining user rewards, maintaining user data, maintaining user work products, hosting productivity software, hosting game software, hosting communication software, facilitating the presentation of promotions to the user, allowing one user to communicate with another, allowing a peripheral device to communicate with another, or any other function.

In various embodiments, the central controller may include software for providing notifications and/or status updates. The central controller may notify a user when one or more other users is present (e.g., at their respective office locations, e.g., at their respective home computers), when another user wishes to communicate with the user, when a collaborative project has been updated, when the user has been mentioned in a comment, when the user has been assigned work, when the user's productivity has fallen, when the user has been invited to play in a game, or in any other circumstance. Notifications or status updates may be sent to peripheral devices, user devices, smartphones, or to any other devices.

In various embodiments, the central controller may include voting software. The voting software may facilitate voting, decision-making, or other joint or group action. Example votes may determine a plan of action at a company, or a strategy in a team video game. Voting software may permit users or other participants to receive notification of votes, receive background information about decisions or actions they are voting on, cast their votes, and see the results of votes. Voting software may be capable of instituting various protocols, such as multiple rounds of runoffs, win by the majority, win by the plurality, win by unanimous decision, anonymous voting, public voting, secure voting, differentially weighted votes, voting for slates of decisions, or any other voting protocol, or any other voting format. Voting results may be stored in data storage device 615, or sent to other devices for storage.

Game Controllers

In various embodiments, a game controller may include software and/or hardware that interfaces with the user device in order to facilitate game play. Example games include Pokemon®, Call of Duty®, Wii®, League of Legends®, Clash of Clans™, Madden® NFL®, Minecraft®, Guitar Hero®, Fortnite®, solitaire, poker, chess, go, backgammon, bridge, Magic: The Gathering®, Scrabble®, etc. In various embodiments, a game controller may be part of the central controller 110. In various embodiments, a game controller may be in communication with the central controller 110, and may exchange information as needed. In various embodiments, a game controller may be a standalone device or server (e.g., a server accessed via the internet). In various embodiments, a game controller could be housed within a user computer. In various embodiments, a game controller may be part of, or may operate on any suitable device. In various embodiments, the game controller enables gameplay and can communicate with a user device and one or more computer peripherals. In various embodiments, a game controller may perform such functions as maintaining a game state, updating a game state based on user inputs and game rules, creating a rendering of a game state, facilitating chat or other communication between players of a game, maintaining player scores, determining a winner of a game, running tournaments, determining a winner of a tournament, awarding prizes, showing in-game advertisements, are performing any other function related to a game, or performing any other function.

Data Structures

FIGS. 7-37, 50-66, 69-70, 73, 75-76, 81, 87, 92, 95-97, and 103-105, show example data tables according to some embodiments. A data table may include one or more fields, which may be shown along the top of the table. A given field may serve as a category, class, bucket, or the like for data in the table corresponding to the given field (e.g., for data in cells shown beneath the field). Each cell or box in a data table may include a data element. Data elements within the same row of a table may be associated with one another (e.g., each data element in a row may be descriptive of the same underlying person, object, entity, or the like). In various embodiments, data elements may include identifiers or indexes, which may serve to identify (e.g., uniquely identify) the current row and/or the underlying person, object, or entity. In various embodiments, data elements may include keys, which may allow a row from a first table to be associated with a row from a second table (e.g., by matching like keys in the first and second tables). Through use of keys (or through any other means) two or more data tables may be relatable to one other in various ways. In various embodiments, relationships may include one-to-one, one-to-many, many-to-many, or many-to-one relationships.

It will be appreciated that FIGS. 7-37, 50-66, 69-70, 73, 75-76, 81, 87, 92, 95-97, and 103-105 represent some ways of storing, representing, and/or displaying data, but that various embodiments contemplate that data may be stored, represented and/or displayed in any other suitable fashion. It will be appreciated that, in various embodiments, one or more tables described herein may include additional fields or fewer fields, that a given field may be split into multiple fields (e.g., a "name" field could be split into a "first name" field and a "last name" field), that two or more fields may be combined, that fields may have different names, and/or that fields may be structured within tables in any other suitable fashion. It will be appreciated that, in various embodiments, one or more tables described herein may include additional rows, that rows may be split or combined, that rows may be re-ordered, that rows may be split amongst multiple tables, and/or that rows may be rearranged in any other suitable fashion.

It will be appreciated that, in various embodiments, one or more tables described herein may show representative rows of data elements. Rows are not necessarily shown in any particular order. The rows are not necessarily shown starting from the beginning nor approaching the end in any conceivable ordering of rows. Consecutive rows are not necessarily shown. In some embodiments, fewer or more data fields than are shown may be associated with the data tables (e.g., of FIGS. 7-37, 50-66, 69-70, 73, 75-76, 81, 87, 92, 95-97, and 103-105). Only a portion of one or more databases and/or other data stores is necessarily shown in the data table 700 of FIG. 7, for example, and other fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein. In various embodiments, data or rows that are depicted herein as occurring in the same data table may actually be stored in two or more separate data tables. These separate data tables may be distributed in any suitable fashion, such as being stored within separate databases, in separate locations, on separate servers, or in any other fashion.

In various embodiments, data or rows that are depicted herein as occurring in separate or distinct data tables may actually be stored in the same data tables. In various embodiments, two or more data tables may share the same name (e.g., such data tables may be stored in different locations, on different devices, or stored in any other fashion). Such data tables may or may not store the same types of data, may or may not have the same fields, and may or may not be used in the same way, in various embodiments. For example, central controller 110 may have a "user" data table, and third-party device 108 may be an online gaming platform that also has a "user" data table. However, the two tables may not refer to the same set of users (e.g., one table may store owners of peripheral devices, while the other table may store rated online game players), and the two tables may store different information about their respective users. In various embodiments, data tables described herein may be stored using a data storage device (e.g., storage device 615) of central controller 110. For example, "data" 620 may include data tables associated with the central controller 110, which may reside on storage device 615. Similarly, "data" 520 may include data tables associated with the third-party device 108, which may reside on storage device 515. In various embodiments, data tables associated with any given device may be stored on such device and/or in association with such device.

Referring to FIG. 7, a diagram of an example user table 700 according to some embodiments is shown. User table 700 may, for example, be utilized to store, modify, update, retrieve, and/or access various information related to users. The user table may comprise, in accordance with various embodiments, a user ID field 702, a name field 704, an email address field 706, a password field 708, a phone number field 710, a nicknames field 712, an address field 714, a financial account information field 716, a birthdate field 718, a marital status field 720, a gender field 722, a primary language field 724, and an image(s) field 726. Although not specifically illustrated in user table 700, various additional fields may be included, such as fields containing unique identifiers of friends, user achievements, presentations delivered, presentation decks created, value earned, statistics (e.g., game statistics), character unique identifiers, game login information, preferences, ratings, time spent playing games, game software owned/installed, and any other suitable fields.

As depicted in FIG. 7, user table 700 is broken into three sections. However, this is only due to space limitations on the page, and in fact user table 700 is intended to depict (aside from the field names) three continuous rows of data elements. In other words, data elements 703 and 713 are in the same row. Of course, FIG. 7 is merely an illustrative depiction, and it is contemplated that a real world implementation of one or more embodiments described herein may have many more than three rows of data (e.g. thousands or millions of rows). Although not specifically referred to in all cases, other tables described herein may similarly be broken up for reasons of space limitations on the printed page, when in actuality it is contemplated that such tables would contain continuous rows of data, in various embodiments. User ID field 702 may store an identifier (e.g., a unique identifier) for a user. Password field 708 may store a password for use by a user. The password may allow the user to confirm his identity, log into a game, log into an app, log into a website, access stored money or other value, access sensitive information, access a set of contacts, or perform any other function in accordance with various embodiments.

Nicknames field 712 may store a user nickname, alias, screen name, character name, or the like. The nickname may be a name by which a user will be known to others in one or more contexts, such as in a game or in a meeting. In various embodiments, a user may have more than one nickname (e.g., one nickname in a first context and another nickname in a second context). Financial account information field 716 may store information about a financial account associated with the user, such as a credit or debit card, bank account, stored value account, PayPal® account, Venmo® account, rewards account, coupons/discounts, crypto currency account, bitcoin account, or any other account. With this information stored, a user may be given access to peruse his account balances or transaction history, for example. A user may be rewarded through additions to his account, and charged through deductions to his account. In various embodiments, a user may utilize his account to pay another user or receive payment from another user. Various embodiments contemplate other uses for financial account information. User table 700 depicts several fields related to demographic information (e.g., marital status field 720, gender field 722, and primary language field 724). In various embodiments, other items of demographic information may be stored, such as number of children, income, country of origin, etc. In various embodiments, fewer items of demographic information may be stored. Images field 726 may store one or more images associated with a user. An image may include an actual photograph of a user (e.g., through a webcam). The image may be used to help other users recognize or identify with the user. In various embodiments, image field 726 may store an item favored by the user, such as the user's pet or favorite vacation spot. In various embodiments, image field 726 may store an image of a character or avatar (e.g., an image by which the user wishes to be identified in a game or other online environment).

Referring to FIG. 8, a diagram of an example networks table 800 according to some embodiments is shown. In various embodiments, a local network may include one or more devices that are in communication with one another either directly or indirectly. Communication may occur using various technologies such as ethernet Wi-Fi®, Bluetooth® or any other technology. In various embodiments, devices on a local network may have a local or internal address (e.g., IP address) that is visible only to other devices on the local network. In various embodiments, the network may have one or more external-facing addresses (e.g., IP addresses), through which communications may be transmitted to or received from external devices or Networks. Networks table 800 may store characteristics of a user's local network, such as their connection speed, bandwidth, encryption strength, reliability, etc. With knowledge of a user's Network characteristics, the central controller may determine the content that is transmitted to or requested from a user. For example if the user has a slow network connection, then the central controller may transmit to the user lower bandwidth videos or live game feeds. The central controller may also determine the frequency at which to poll data from a user device or a peripheral device. For example, polling may occur less frequently if the user has a slower network connection. In another example, the central controller may determine whether or not to request sensitive information from the user (such as financial account information) based on the security of the user's network. As will be appreciated, Various other embodiments may consider information about a user's Network and may utilize such information in making one or more decisions.

In various embodiments, network table 800 may store characteristics of any other network. Network ID field 802 may include an identifier (e.g., unique identifier) for a user's network. Network name field 804 may store a name, such as a human readable name, nickname, colloquial name, or the like for a user's network. Network IP address field 806 may store an IP address for the network, such as an externally facing IP address. User ID field 808, may store an indication of a user who owns this network, if applicable. In various embodiments, the network may be owned by some other entity such as a company, office, government agency etc. Specified connection speed field 810 may store a specified, advertised, and/or promised connection speed for a network. The connection speed that is realized in practice may differ from the specified connection speed. Actual upload-speed field 812 may store an indication of an upload speed that is or has been realized in practice. For example, the upload speed may store an indication of the upload speed that has been realized in the past hour, in the past 24 hours, or during any other historical time frame. The upload speed may measure the rate at which a network is able to transmit data.

Actual download-speed field 814 may store an indication of a download speed that is or has been realized in practice (such as during some historical measurement period). The download speed may measure the rate at which a network is able to receive data. The download speed may be important, for example, in determining what types of videos may be streamed to a user network and/or user device. Encryption type field 816 may store an indication of the security that is present on the network. In some embodiments, field 816 stores the type of encryption used by the network. For example, this type of encryption may be used on data that is communicated within the network. In some embodiments, field 816 may store an indication of the security measures that a user must undergo in order to access data that has been transmitted through the network. For example, field 816 may indicate that a user must provide a password or biometric identifiers in order to access data that has been transmitted over the network. Uptime percentage field 818 may store an indication of the amount or the percentage of time when a network is available and/or functioning as intended. For example, if a network is unable to receive data for a one-hour period (perhaps due to a thunderstorm), then the one-hour period may count against the network uptime percentage. In various embodiments, an uptime percentage may be used to determine activities in which a user may engage. For example, a user may be allowed to participate in a multi-person video conference or video game requiring extensive team communication, only if the user's network uptime exceeds a certain minimum threshold.

Referring to FIG. 9, a diagram of an example user device table 900 according to some embodiments is shown. User device table 900 may store one or more specifications for user devices. The specifications may be used for making decisions or selections, in various embodiments. For example, a user may be invited to play in a graphically intensive video game or participate in a collaborative conference call only if the user device can handle the graphics requirements (such as by possessing a graphics card). In another example, a user interface for configuring a peripheral device may be displayed with a layout that depends on the screen size of the user device. As will be appreciated, many other characteristics of a user device may be utilized in making decisions and or carrying out steps according to various embodiments. User device ID field 902 may include an identifier (e.g., a unique identifier) for each user device. Form factor field 904 may include an indication of the form factor for the user device. Example form factors may include desktop PC, laptop, tablet, notebook, game console, or any other form factor.

Model field 906 may indicate the model of the user device. Processor field 908 may indicate the processor, CPU, Neural Chip, controller, logic, or the like within the device. In various embodiments, more than one processor may be indicated. Processor speed field 910 may indicate the speed of the processor. Number of cores field 912 may indicate the number of physical or virtual cores in one or more processors of the user device. In various embodiments, the number of cores may include the number of processors, the number of cores per processor, the number of cores amongst multiple processors, or any other suitable characterization. Graphics card field 914 may indicate the graphics card, graphics processor, or other graphics capability of the user device. RAM field 916 may indicate the amount of random access memory possessed by the user device. Storage field 918 may indicate the amount of storage possessed by that user device. Year of manufacture field 920 may indicate the year when the user device was manufactured. Purchase year field 922 may indicate the year in which the user device was purchased by the user.

Operating System field 924 may indicate the operating system that user device is running. MAC Address field 926 may indicate the media access control address (MAC address) of the user device. Physical location field 928 may indicate the physical location of the user device. This may be the same as the owner's residence address, or it may differ (e.g., if the owner has carried the user device elsewhere or is using it at the office, etc.). Timezone field 930 may indicate the time zone in which the user device is located, and or the time zone to which the user device is set. In one example, the central controller may schedule the user device to participate in a video conference call with a particular shared start time for all participants. In another example, the central controller may schedule the user device to participate in a multiplayer game, and wish to alert the user device as to the game's start time using the user device's time zone. Owner ID field 932 may indicate the owner of the user device. The owner may be specified for example in terms of a user ID, which may be cross-referenced to the user table 700 if desired. Network ID(s) field 934 may indicate a network, such as a local network, on which the user device resides. The network may be indicated in terms of a network ID, which may be cross-referenced to the network table 800 if desired.

IP address field 936 may indicate the IP address (or any other suitable address) of the user device. In some embodiments, such as if the user device is on a local network, then the user device's IP address may not be listed. In some embodiments, IP address field 936 may store an internal IP address. In some embodiments, IP address field 936 may store a network IP address, such as the public-facing IP address of the network on which the user device resides. As well be appreciated, user device table 900 may store various other features and characteristics of a user device.

Referring to FIG. 10, a diagram of an example peripheral device table 1000 according to some embodiments is shown. Peripheral device table 1000 may store specifications for one or more peripheral devices. Peripheral device ID field 1002 may store an identifier (e.g., a unique identifier) for each peripheral device. Type field 1004 may store an indication of the type of peripheral device, e.g., mouse, keyboard, headset, exercise bike, camera, presentation remote, projector, chair controller, light controller, coffee maker, etc. Model field 1006 may store an indication of the model of the peripheral device. Purchase year field 1008 may store the year in which the peripheral device was purchased.

IP Address field 1010 may store the IP address, or any other suitable address, of the peripheral device. In some embodiments, such as if the peripheral device is on a local network, then the peripheral device's IP address may not be listed. In some embodiments, IP address field 1010 may store an internal IP address. In some embodiments, IP address field 1010 may store a network IP address, such as the public-facing IP address of the network on which the peripheral device resides. In some embodiments, IP address field 1010 may store the IP address of a user device to which the associated peripheral device is connected.

Physical location field 1012 may store an indication of the physical location of the peripheral device. Owner ID field 1014 may store an indication of the owner of the peripheral device. Linked user device ID(s) field 1016 may store an indication of one or more user devices to which the peripheral device is linked. For example, if a peripheral device is a mouse that is connected to a desktop PC, then field 1016 may store an identifier for the desktop PC. Communication modalities available field 1018 may indicate one or more modalities through which the peripheral device is able to communicate. For example, if a peripheral device possesses a display screen, then video may be listed as a modality. As another example, if a peripheral device has a speaker, then audio may be listed as a modality. In some embodiments, a modality may be listed both for input and for output. For example, a peripheral device with a speaker may have 'audio' listed as an output modality, and a peripheral with a microphone may have 'audio' listed as an input modality.

In various embodiments, a peripheral device might have the capability to output images, video, characters (e.g., on a simple LED screen), lights (e.g., activating or deactivating one or more LED lights or optical fibers on the peripheral device), laser displays, audio, haptic outputs (e.g., vibrations), altered temperature (e.g. a peripheral device could activate a heating element where the user's hand is located), electrical pulses, smells, scents, or any other sensory output or format. In various embodiments, any one of these or others may be listed as modalities if applicable to the peripheral device. In various embodiments, a peripheral device may have the capability to input images (e.g., with a camera), audio (e.g., with a microphone), touches (e.g., with a touchscreen or touchpad), clicks, key presses, motion (e.g., with a mouse or joystick), temperature, electrical resistance readings, positional readings (e.g., using a positioning system, e.g., using a global positioning system, e.g., by integrating motion data), or any other sensory or any other sensor or any other information. Such input modalities may be listed if applicable to the peripheral device.

In some embodiments, modalities may be specified in greater detail. For example, for a given peripheral device, not only is the video modality specified, but the resolution of the video that can be displayed is specified. For example, a keyboard with a display screen may specify a video modality with up to 400 by 400 pixel resolution. Other details may include number of colors available, maximum and minimum audio frequencies that can be output, frame refresh rate that can be handled, or any other details. Network ID(s) field 1020 may store an indication of a network (e.g., a local network) on which a peripheral device resides. If the peripheral device does not reside on a network, or is not known, then a network may not be indicated. As will be appreciated, peripheral device table 1000 may store one or more other features or characteristics of a peripheral device, in various embodiments.

Referring to FIG. 11, a diagram of an example peripheral configuration table 1100 according to some embodiments is shown. Peripheral configuration table 1100 may store configuration variables like mouse speed, color, audio level, pressure required to activate a button, etc. A peripheral device may have one or more input and/or sensor components. The peripheral device may, in turn, process any received inputs before interpreting such inputs or converting such inputs into an output or result. For example, a mouse may detect a raw motion (i.e., a change in position of the mouse itself), but may then multiply the detected motion by some constant factor in order to determine a corresponding motion of the cursor. As another example, a presentation remote may receive audio input in the form of words spoken by a presenter. The presentation remote might, in turn, pass such pressure information through a function to determine whether or not to register or store the words. Table 1100 may store one or more parameters used in the process of converting a raw input into an output or a result. In various embodiments, parameters can be altered. Thus, for example, the sensitivity with which a mouse registers a click may be altered, the ratio of cursor motion to mouse motion may be altered, the ratio of page motion to scroll wheel motion may be altered, and so on.

Table 1100 may also store one or more parameters controlling how a peripheral device outputs information. A parameter might include the color of an LED light, the brightness of an LED light, the volume at which audio is output, the temperature to which a heating element is activated, the brightness of a display screen, the color balance of a display screen, or any other parameter of an output. Table 1100 may also store one or more parameters controlling a physical aspect or configuration of a peripheral device. A parameter might include the default microphone sensitivity, the angle at which a keyboard is tilted, the direction in which a camera is facing, or any other aspect of a peripheral device. Table 1100 may also store one or more parameters controlling the overall functioning of a peripheral device. In some embodiments, parameters may control a delay with which a peripheral device transmits information, a bandwidth available to the peripheral, a power available to the peripheral, or any other aspect of a peripheral device's function or operation.

In various embodiments, table 1100 may also store constraints on how parameters may be altered. Constraints may describe, for example, who may alter a parameter, under what circumstances the parameter may be altered, the length of time for which an alteration may be in effect, or any other constraint. Configuration ID field 1102 may store an identifier (e.g., a unique identifier), of a given configuration for a peripheral device. Peripheral device ID field 1104 may store an indication of the peripheral device (e.g., a peripheral device ID) to which the configuration applies. Variable field 1106 may include an indication of which particular parameter, variable, or aspect of a peripheral device is being configured. Example variables include mouse speed, mouse color, headset camera resolution, etc. Default setting field 1108 may include a default setting for the variable. For example, by default a mouse speed may be set to "fast". In some embodiments, a default setting may take effect following a temporary length of time in which a parameter has been altered.

Outsider third-party control field 1110 may indicate whether or not the parameter can be modified by an outsider (e.g., by another user; e.g., by an opponent). For example, in some embodiments, a user playing a multiplayer video game may have their peripheral device's performance degraded by an opposing player as part of the ordinary course of the game (e.g., if the opposing player has landed a strike on the player). In some embodiments, table 1100 may specify the identities of one or more outside third-parties that are permitted to alter a parameter of a peripheral device. In some embodiments, an outsider is permitted to alter a parameter of a peripheral device only to within a certain range or subset of values. For example, an outsider is permitted to degrade the sensitivity of a user's mouse, however the sensitivity can only be degraded to as low as 50% of maximum sensitivity.

Current setting field 1112 may store the current setting of a parameter for a peripheral device. In other words, if the user were to use the peripheral device at that moment, this would be the setting in effect. Setting expiration time field 1114 may store the time at which a current setting of the parameter will expire. Following expiration, the value of the parameter may revert to its default value, in some embodiments. For example, if the performance of a user's peripheral device has been degraded, the lower performance may remain in effect only for 30 seconds, after which the normal performance of the peripheral device may be restored. As will be appreciated, an expiration time can be expressed in various formats, such as an absolute time, as an amount of time from the present, or in any other suitable format. Expiration time can also be expressed in terms of a number of actions completed by the user. For example, the current setting may expire once a user has clicked the mouse button 300 times.

Referring to FIG. 12, a diagram of an example peripheral device connections table 1200 according to some embodiments is shown. In various embodiments, table 1200 stores an indication of which peripheral devices have been given permission to communicate directly with one another. Peripheral devices may communicate with one another under various circumstances. In some embodiments, two users may pass messages to one another via their peripheral devices. A message sent by one user may be displayed on the peripheral device of the other user. In some embodiments, user inputs to one peripheral device may be transferred to another peripheral device in communication with the first. In this way, for example, a first user may control the peripheral device of a second user by manipulating his own peripheral device (i.e., the peripheral device of the first user). For example, the first user may guide a second user's game character through a difficult phase of a video game. As will be appreciated, there are various other situations in which one peripheral device may communicate with another peripheral device.

In various embodiments, peripheral devices may communicate directly with one another, such as with a direct wireless signal sent from one to the other. In various embodiments, one peripheral device communicates with another peripheral device via one or more intermediary devices. Such intermediary devices may include, for example, a user device, a router (e.g., on a local network), the central controller, or any other intermediary device. In other embodiments, one peripheral device may communicate with two or more other peripheral devices at the same time.

As shown, table 1200 indicates a connection between a first peripheral device and a second peripheral device in each row. However, as will be appreciated, a table may store information about connections in various other ways. For example, in some embodiments, a table may store information about a three-way connection, a four-way connection, etc. Connection ID field 1202 may store an identifier (e.g., a unique identifier) for each connection between a first peripheral device and a second peripheral device. Peripheral device 1 ID field 1204 may store an indication of the first peripheral device that is part of the pair of connected devices. Peripheral device 2 ID field 1206 may store an indication of the second peripheral device that is part of the pair of connected devices. Time field 1208 may store the time when the connection was made and/or terminated. Action field 1210 may store the action that was taken. This may include the relationship that was created between the two peripheral devices. Example actions may include initiating a connection, terminating a connection, initiating a limited connection, or any other suitable action.

Maximum daily messages field 1212 may store one or more limits or constraints on the communication that may occur between two peripheral devices. For example, there may be a limit of one thousand messages that may be exchanged between peripheral devices in a given day. As another example, there may be constraints on the number of words that can be passed back and forth between peripheral devices in a given day. Placing constraints on communications may serve various purposes. For example, the owner of a peripheral device may wish to avoid the possibility of being spammed by too many communications from another peripheral device. As another example, the central controller may wish to limit the communications traffic that it must handle.

Referring to FIG. 13, a diagram of an example peripheral device groups table 1300 according to some embodiments is shown. Peripheral device groups may include peripherals that have been grouped together for some reason. For example, any peripheral device (e.g. presentation remote, headset, mouse, camera, keyboard) in a group is permitted to message any other device in the group, all peripheral devices in a group are on the same video game team, all peripheral devices are on the same network, any peripheral device is allowed to take control of any other, or any peripheral device in the group is allowed to interact with a particular app on a computer. Peripheral device group ID field 1302 may include an identifier (e.g., a unique identifier) for a group of peripheral devices. Group name field 1304 may include a name for the group. Group type field 1306 may include a type for the group. In some embodiments, the group type may provide an indication of the relationship between the peripheral devices in the group. For example, peripheral devices in a group may all belong to respective members of a team of software architects of a large software project. This group type may be called a functional team. In some embodiments, a group of peripheral devices may belong to meeting owners, such as people who often lead meetings at a company. Another group type may be for peripheral devices that are proximate to one another. For example, such peripheral devices may all be in the same home, or office, or city. Other types of groups may include groups of peripheral devices with the same owner, groups of peripheral devices belonging to the same company, groups of peripheral devices that are all being used to participate in the same meeting, or any other type of group.

Settings field 1308 may include one or more settings or guidelines or rules by which peripheral devices within the group may interact with one another and/or with an external device or entity. In various embodiments, a setting may govern communication between the devices. For example, one setting may permit device-to-device messaging amongst any peripheral devices within the group. One setting may permit any peripheral device in a group to control any other peripheral device in the group. One setting may permit all peripheral devices in a group to interact with a particular online video game. As will be appreciated, these are but some examples of settings and many other settings are possible and contemplated according to various embodiments. Formation time field 1310 may store an indication of when the group was formed. Group leader device field 1312 may store an indication of which peripheral device is the leader of the group. In various embodiments, the peripheral device that is the leader of a group may have certain privileges and/or certain responsibilities. For example, in a meeting group, the group leader device may be the only device that is permitted to start the meeting or to modify a particular document being discussed in the meeting. Member peripheral devices field 1314 may store an indication of the peripheral devices that are in the group.

Referring to FIG. 14, a diagram of an example user connections table 1400 according to some embodiments is shown. User connections table 1400 may store connections between users. Connections may include "co-worker" connections as during a video conference call, "friend" connections as in a social network, "teammate" connections, such as in a game, "tagging" connections which represent users who often send or receive tags from each other, etc. In various embodiments, table 1400 may include connections that have been inferred or deduced and were not explicitly requested by the users. For example, the central controller may deduce that two users are members of the same company, because they are each members of the same company as is a third user. Connection ID field 1402 may include an identifier (e.g., a unique identifier) that identifies the connection between two users. User 1 ID field 1404 may identify a first user that is part of a connection. User 2 ID field 1406 may identify a second user that is part of a connection.

Time field 1408 may indicate a time when a connection was made, terminated, or otherwise modified. Action field 1410 may indicate an action or status change that has taken effect with respect to this connection. For example, the action field may be 'initiate connection', 'terminate connection', 'initiate limited connection', or any other modification to a connection. Relationship field 1412 may indicate a type of relationship or a nature of the connection. For example, two users may be related as friends, teammates, family members, co-workers, neighbors, or may have any other type of relationship or connection. Maximum daily messages field 1414 may indicate one or more constraints on the amount of communication between two users. For example, a user may be restricted to sending no more than one hundred messages to a connected user in a given day. The restrictions may be designed to avoid excessive or unwanted communications or to avoid overloading the central controller, for example. Various embodiments may include many other types of restrictions or constraints on the connection or relationship between two users.

Referring to FIG. 15, a diagram of an example user groups table 1500 according to some embodiments is shown. Table 1500 may store an indication of users that belong to the same group. User group ID field 1502 may include an identifier (e.g., a unique identifier) of a user group. Group name field 1504 may include a name for the group. Group type field 1506 may include an indication of the type of group. The type of group may provide some indication of the relationship between users in the group, of the function of the group, of the purpose of the group, or of any other aspect of the group. Examples of group types may include 'Department', 'Project team X', 'Meeting group', 'Call group', 'Functional area', 'Tagging group', or any other group type. In some embodiments, a group type may refer to a group of people in the same functional area at a company, such as a group of lawyers, a group of developers, a group of architects or a group of any other people at a company. Formation Time field 1508 may indicate the time/date at which a group was formed. Group leader field 1510 may indicate the user who is the group leader. In some cases, there may not be a group leader. Member users field 1512 may store indications of the users who are members of the group.

Referring to FIG. 16, a diagram of an example 'user roles within groups' table 1600 according to some embodiments is shown. Table 1600 may store an indication of which users have been assigned to which roles. In some embodiments, there are standard predefined roles for a group. In some embodiments, a group may have unique roles. Role assignment ID field 1602 may include an identifier (e.g., a unique identifier) for a particular assignment of a user to a role. User group ID field 1604 may store an indication of the group in which this particular role has been assigned. User ID field 1606 may store an indication of the user to which the role has been assigned. Role field 1608 may store an indication of the particular role that has been assigned, such as 'Project Manager', 'Minutes Keeper', 'Facilitator', 'Tag Review Coach', 'Presenter', 'Mentor', 'Leader', 'Teacher', etc.

Referring to FIG. 17, a diagram of an example user achievements table 1700 according to some embodiments is shown. User achievements table 1700 may store achievements, accolades, commendations, accomplishments, records set, positive reviews, or any other noteworthy deeds of a user. Achievements may be from a professional setting, from a game setting, from an educational setting, or from any other setting. In various embodiments, achievements are related to tags received by a user, tags sent to other users, or actions taken as a result of tags. Achievement ID field 1702 may store an identifier (e.g., a unique identifier) of a particular achievement achieved by a user. User ID field 1704 may store an indication of the user (or multiple users) that have made the achievement. Time/date field 1706 may store the date and time when the user has achieved the achievement. Achievement type field 1708 may indicate the type of achievement, the context in which the achievement was made, the difficulty of the achievement, the level of the achievement, or any other aspect of the achievement. Examples of achievement types may include 'professional', 'gaming', 'educational', or any other achievement type. Achievement field 1710 may store an indication of the actual achievement. Example achievements may include: the user got through all three out of three meeting agenda items; the user received 10 positive tags relating to the quality of their ideas; the user provided additional insights regarding the tags of 25 other users, the user learned pivot tables in Excel®; or any other achievement.

Reward field 1712 may indicate a reward, acknowledgement, or other recognition that has or will be provided to the user for the achievement. Example rewards may include: the user's office mouse glows purple for the whole day of Jul. 22, 2020; a congratulatory message is sent to all participants in a meeting; the user receives three free music downloads; the user receives a financial payment (such as money, digital currency, game currency, game items, etc.); the user receives a discount coupon or promotional pricing, the user's name is promoted within a game environment; the user's video conference photo is adorned with a digital crown, or any other reward. Provided field 1714 may indicate whether or not the reward has been provided yet. In some embodiments, table 1700 may also store an indication of a time when a reward has been or will be provided.

Referring to FIG. 18, a diagram of an example stored value accounts table 1800 according to some embodiments is shown. Stored value accounts table 1800 may store records of money, currency, tokens, store credit, or other value that a user has on deposit, has won, is owed, can receive on demand, or is otherwise associated with a user. A user's stored-value account may store government currency, crypto-currency, game currency, game objects, etc. A user may utilize a stored-value account in order to make in-game purchases, in order to pay another user for products or services, in order to purchase a product or service, or for any other purpose. Stored value account ID field 1802 may store an identifier (e.g., a unique identifier) for a user's stored-value account. Owner(s) field 1804 may store an indication of the owner of a stored-value account. Password field 1806 may store an indication of a password required in order for a user to gain access to a stored-value account (e.g., to her account). For example, the password may be required from a user in order for the user to withdraw funds from a stored-value account. In other embodiments, authentication data field 1808 includes authentication values like a digital fingerprint and/or voice recording that are used to access stored value. In various embodiments, a table such as table 1800 may store a username as well. The username may be used to identify the user when the user is accessing the stored-value account.

Currency type field 1810 may store an indication of the type of currency in the stored-value account. The currency may include such traditional currencies as dollars or British pounds. The currency may also include stock certificates, bonds, cryptocurrency, game currency, game tokens, coupons, discounts, employee benefits (e.g. one or more extra vacation days), game skins, game objects (e.g. a +5 sword, a treasure map), cheat codes, merchant rewards currency, or any other type of currency or stored value. Balance field 1812 may store a balance of funds that the user has in her stored-value account. In some embodiments, a negative balance may indicate that a user has overdrawn an account and/or owes funds to the account. Hold amount field 1814 may indicate an amount of a hold that has been placed on funds in the user account. The hold may restrict the user from withdrawing funds beyond a certain amount, and/or may require the user to leave at least a certain amount in the account. The hold may ensure, for example, that the user is able to meet future obligations, such as financial obligations.

Referring to FIG. 19, a diagram of an example asset library table 1900 according to some embodiments is shown. Asset library table 1900 may store records of digital assets, such as music, movies, TV shows, videos, games, books, e-books, textbooks, presentations, spreadsheets, newspapers, blogs, graphic novels, comic books, lectures, classes, interactive courses, exercises, cooking recipes, podcasts, software, avatars, etc. These assets may be available for purchase, license, giving out as rewards, etc. For example, a user may be able to purchase a music file from the central controller 110. As another example, a user who has achieved a certain number of five star tags for excellence in meeting facilitation may have the opportunity to download a free electronic book. In various embodiments, asset library table 1900 may store analog assets, indications of physical assets (e.g., a catalog of printed books or software), or any other asset, or an indication of any other asset.

Asset ID field 1902 may store an identifier (e.g., a unique identifier) for a digital asset. Type field 1904 may store an indication of the type of asset, such as 'software', 'music', 'movie', 'video game', 'podcast', etc. Title field 1906 may store a title associated with the asset. For example, this might be the title of software, a movie, the title of a song, the title of a class, etc. Publisher field 1908 may store an indication of the publisher who created the asset. In various embodiments, table 1900 may store an indication of any contributor to the making of a digital asset. For example, table 1900 may store an indication of a songwriter, producer, choreographer, creator, developer, author, streamer, editor, lecturer, composer, cinematographer, dancer, actor, singer, costume designer, or of any other contributor. Artist field 1910 may store an indication of the artist associated with an asset. The artist may be, for example, the singer of a song. The artist could also be the name of a production company that created the asset. Duration field 1912 may store the duration of a digital asset. For example, the duration may refer to the length of a movie, the length of a song, the number of words in a book, the number of episodes in a podcast, or to any other suitable measure of duration. Size field 1914 may store an indication of the size of the digital asset. The size may be measured in megabytes, gigabytes, or in any other suitable format. Synopsis field 1916 may store a synopsis, summary, overview, teaser, or any other descriptor of the digital asset. Reviews field 1918 may store an indication of one or more reviews that are associated with the digital asset. The reviews may come from professional critics, previous users, or from any other source. Reviews may take various forms, including a number of stars, number of thumbs up, an adjective, a text critique, an emoji, or any other form.

Referring to FIG. 20, a diagram of an example 'user rights/licenses to assets' table 2000 according to some embodiments is shown. Table 2000 may store an indication of software, music, videos, games, books, educational materials, etc. that a user has acquired access to, such as through purchasing or winning a prize. Table 2000 may also store an indication of the nature of the rights or the license that a user has obtained to the acquired asset. User rights/license ID field 2002 may store an identifier (e.g., a unique identifier) for a particular instance of rights being assigned. The instance may include, for example, the assignment of a particular asset to a particular user with a particular set of rights in the asset. Asset ID field 2004 may store an indication of the asset to which rights, license and/or title have been assigned. User ID(s) field 2006 may store an indication of the user or users that has (have) acquired rights to a given asset. Rights field 2008 may store an indication of the nature of rights that have been conferred to the user in the asset. For example, the user may have acquired unlimited rights to view a movie, but not to show the movie in public. A user may have acquired rights to listen to a song up to ten times. A user may have acquired rights to download software up to five user devices. A user may have acquired rights to view an image on a particular peripheral device (e.g. she can listen to a song only via a headset that she has identified). A user may have acquired rights to play a video game for up to seventy-two hours. A user may have acquired rights to view a television series through the end of a particular season. A user may have acquired rights to download a lecture up to three times. A user may have acquired rights to use a software application on up to three devices. A user may have a right to use a movie clip in a presentation deck. A user may have a right to use software only while in a particular location. As will be appreciated, the aforementioned are but some examples according to some embodiments, and various embodiments contemplate that a user may receive other types of rights or licenses to an asset.

Referring to FIG. 21, a diagram of an example user device state log table 2100 according to some embodiments is shown. User device state log table 2100 may store a log of what programs or apps are/were in use at any given time. Table 2100 may include what program or app was at the forefront, what web pages were open, which app was the last to receive input (e.g., user input), which app occupies the most screen real estate, which app is visible on the larger of two screens, which app is using the most processor cycles, etc. Data stored in table 2100 may, for example, help to ascertain productivity of a user. Data stored in table 2100 may help to link keystrokes (or mouse movements, or other peripheral device activity) to a particular app the user was using. For instance, data stored in table 2100 may allow a determination that a particular set of keystrokes was intended to control the Excel app. In various embodiments, table 2100 may provide snapshots over time of the prominence of different programs, apps, or other processes. Data stored in table 2100 may also be used to detect cheating in a game or educational environment. In other embodiments, it provides an indication of the level of engagement of a person participating in a meeting or video conferencing session.

In various embodiments, table 2100 does not store a comprehensive state. Rather, for example, table 2100 may indicate the state of one or more apps, programs, or processes on a user device, such as at a given point in time. In various embodiments, table 2100 may store a substantially complete indication of a state of a user device, such as at a given point in time. In various embodiments, individual rows or records in table 2100 may store a partial state of a user device (e.g., each row may store information about a single app on the user device, such as the prominence of the app). In various embodiments, a more complete or a substantially complete indication of a state of a user device may be ascertained by combining information from multiple rows of table 2100. User device state log ID field 2102 may store an identifier (e.g., a unique identifier) of a state or partial state of a user device. User device ID field 2104 may store an indication of a user device for which the state or partial state is recorded. Time field 2106 may store an indication of a time at which the user device was in a particular state or partial state. Program/app field 2108 may store an indication of a program, app, or other process, such as a program that was running at the time indicated in field 2106. Program/app field 2108 could also store an indication of the operating system version of the user device. Sub-app field 2110 may store an indication of a subordinate program, app, or process, such as a subordinate program that was running at the time indicated in field 2106. The subordinate program, app, or process may be subordinate to the program, app, or process which is stored in field 2108. For example, field 2108 may refer to a browser (e.g., to the Chrome browser), while field 2110 may refer to a particular web page that is being visited by the browser (e.g., to the Google®.com page). Prominence field 2112 may indicate the prominence of the program or app of field 2108 and/or the prominence of the subordinate program or app of field 2110. The prominence may refer to the visibility, or other state of usage for the program, app, etc. Example prominence values may include 'forefront', 'background', 'minimized', 'sleeping', 'first tab', '50% of processor cycles', 'last used', 'full screen', or any other indication of a state of usage, etc.

Referring to FIG. 22, a diagram of an example 'peripheral activity log' table 2200 according to some embodiments is shown. Peripheral activity log table 2200 may keep track of activities of a peripheral device. Activities may include mouse movement and clicks, keystrokes, which lights on a peripheral device lit up, what direction a joystick was moved in, what image was displayed on a mouse, what direction a camera was facing, how much a headset was shaken, what direction a presentation remote is pointed, how fast an exercise bike wheel is spinning, tags created, tags submitted, or any other activity. Peripheral activity ID field 2202 may store an identifier (e.g., a unique identifier) of an activity in which a peripheral device was engaged. Peripheral ID field 2204 may store an indication of the peripheral device that was involved in the activity. Start time field 2206 may store the time at which the activity started. End time field 2208 may store the time at which the activity ended. For example, if an activity is a mouse motion, the activity start time may be recorded as the time when the mouse first started moving in a given direction, and the end time may be recorded as the time when the mouse either stopped moving or changed directions.

Component field 2210 may store the particular component or part of a peripheral device that was involved in an activity. The component field 2210 may store an indication of a button on a presentation remote, a key on a keyboard, a microphone on a headset, a scroll wheel on a mouse, or any other relevant component of a peripheral device. In some embodiments, the component may be the entire peripheral device, such as when an entire mouse is moved. Action field 2212 may store the action that was performed. Actions may include pressing, tapping, moving, shaking, squeezing, throwing, lifting, changing position (e.g., moving 120 mm in an 'x' direction and moving −80 mm in a 'y' direction) or any other action. Recipient program field 2214 may store the application, program, or other computer process towards which an action was directed. For example, if a user was using the program Microsoft® PowerPoint®, then a given action may have been directed towards doing something in Microsoft® PowerPoint®, such as advancing a slide. In some embodiments, an action may be directed towards an operating system, a browser, or to any other process. In various embodiments, peripheral device activities may be recorded at varying levels of granularity. In some embodiments, every keystroke on a keyboard may be recorded as a separate activity. In some embodiments, the typing of an entire sentence at a keyboard may be recorded as a single activity. In some embodiments, a series of related activities is recorded as a single activity. For example, when a presentation remote shakes back and forth, this may be recorded as a single shake of the presentation remote. In some embodiments, each individual motion of the presentation remote within the shake is recorded as a separate activity. As will be appreciated, various embodiments contemplate that peripheral device activities may be tracked or recorded at any suitable level of granularity.

Referring to FIG. 23, a diagram of an example 'peripheral sensing log' table 2300 according to some embodiments is shown. Peripheral sensing log table 2300 may store a log of sensor readings. In various embodiments, a peripheral device may contain one or more sensors. The sensors may, from time to time (e.g., periodically, when triggered) capture a sensor reading. In various embodiments, such sensor readings may capture passive or involuntary activities, such as a user's temperature, skin conductivity, glucose levels, brain wave readings, pupil dilation, breathing rate, breath oxygen levels, or heart rate. A sensor may capture ambient conditions, such as a temperature, ambient level of lighting, ambient light polarization, ambient level of noise, air pressure, pollution level, presence of a chemical, presence of a pollutant, presence of an allergen, presence of a microorganism, wind speed, wind direction, humidity, pollen count, or any other ambient condition or conditions. In various embodiments, a sensor may capture a position, location, relative position, acceleration, movement, direction of gaze, orientation, tilt, or the like. In various embodiments, a sensor may capture any suitable data.

Sensor reading ID field 2302 may store an identifier (e.g., a unique identifier) of a particular sensor reading. Peripheral ID field 2304 may store an indication of the peripheral device at which the sensor reading has been captured. Sensor field 2306 may store an indication of which sensor has captured the reading. For example, sensor field 2306 may explicitly identify a single sensor or type of sensor from among multiple sensors that are present on a peripheral device. The sensor may be identified, for example, as a heart rate sensor. In some embodiments, a sensor may have a given identifier, serial number, component number, or some other means of identification, which may be stored in field 2306. Start time field 2308 may store the time at which a sensor began to take a reading. End time field 2310 may store the time at which a sensor finished taking a reading. As will be appreciated, different sensors may require differing amounts of time in order to capture a reading. For instance, capturing a reading of a heart rate may require the reading to be taken over several seconds in order to allow for multiple heartbeats. Reading field 2312 may store the actual reading that was captured. For example, the field may store a graph of the acceleration of an accelerometer. In other embodiments, the reading may be a recording of an EKG signal from the start time to an end time.

Referring to FIG. 24, a diagram of an example peripheral message log table 2400 according to some embodiments is shown. Peripheral message log table 2400 may store messages that were passed from one peripheral to another. Message ID field 2402 may store an identifier (e.g., a unique identifier) for each message that is passed. Time field 2404 may store the time of the message. In various embodiments, the time represents the time when the message was transmitted. In other embodiments, the time represents the time that the message was received by a user. In various embodiments, the time may represent some other relevant time pertaining to the message. Initiating peripheral ID field 2406 may store an indication of the peripheral device that originated or sent the message. Receiving peripheral ID field 2408 may store an indication of the peripheral device(s) that received the message. Message content field 2410 may store the content of the message. In various embodiments, a message may comprise instructions, such as instructions for the receiving peripheral device. An example instruction might be that the receiving peripheral device (e.g. presentation remote, camera, headset) light up LED light #3 for three seconds, play an attached advertising jingle, or disable the left button (e.g., of a mouse). In some embodiments, the message may include human-readable content. The content might be intended for display by the receiving peripheral device. For example, the message might include the text "Meeting room 8602 is running 20 minutes late" or "good job", which would then be displayed by the receiving peripheral device. In various embodiments, the message may include further instructions as to how, when, where, or under what circumstances the message should be displayed.

Referring to FIG. 25, a diagram of an example 'generic actions/messages' table 2500 according to some embodiments is shown. Generic actions/messages table 2500 may store a set of generic or common actions or messages that might be initiated by a user. For example, in the context of a multiplayer video game, it may be common for one team member to send to another team member a message such as "nice going", or "cover me". In the context of a business meeting, messages could include expressions such as "good idea" or "excellent facilitation." In the context of an educational setting, messages might include "it's your turn" or "that answer is correct." In situations where certain messages or actions may be commonplace, it may be beneficial that a user have a quick way of sending such messages or taking such actions. In various embodiments, there may be a shortcut for a given action. In various embodiments, the shortcut may comprise a predefined series of motions, button presses, key presses, voice commands, etc. In some embodiments, having a shortcut to sending a message or taking an action may allow a user to overcome an inherent barrier of a given peripheral device. For example, a mouse may not have keys with letters on them, so sending a custom text message using a mouse might otherwise be cumbersome. Generic action ID field 2502 may store an identifier (e.g., a unique identifier) for a particular action. Action/message field 2504 may store an actual message or action. Example messages might include, "excellent presentation" or "I have an idea". Example actions might include a command to proceed to the next slide in a PowerPoint® presentation, an instruction to paste a stored format to a highlighted portion of a document, an instruction to order cheese pizza, an instruction to submit a tag, or any other message action or instruction.

Referring to FIG. 26, a diagram of an example 'mapping of user input to an action/message'table 2600 according to some embodiments is shown. Mapping of user input to an action/message table 2600 may store a mapping or correspondence between a user input and an associated action or message. The user input may be essentially a shortcut for the desired action or message. The user input may provide a quick or accessible means for sending what might otherwise be a more complicated or cumbersome message. The user input may provide a quick or accessible means for taking an action or issuing an instruction that would otherwise be cumbersome or difficult to specify. A user input may be, for example, a particular sequence of mouse clicks or keystrokes, movement of a presentation remote, a particular motion of the head, or any other user input. Actions might include giving a thumbs-up to another user, ordering a pizza, commenting on a tag, or any action specified in table generic actions/messages table 2500. Mapping ID field 2602 may store an identifier (e.g., a unique identifier) for a particular mapping between a user input and an action or message. Peripheral type field 2604 may store an indication of the type of peripheral on which the user input would be valid or relevant. For example, inputting a set of alpha-numeric keys may only be valid on a keyboard. Shaking one's head may only be valid using a headset, for example.

In various embodiments, a peripheral device may be in any of two or more different modes or states. For example, a peripheral device might be in "in use" mode, or it might be in "idle" mode. For example, a peripheral device might be in "game" mode, or it might be in "work" mode. When a peripheral device is in a first mode, it may be operable to initiate one or more actions. However, when a peripheral device is in a second mode, it may not be operable to initiate one or more actions. For instance, when a peripheral device is in "game" mode, the peripheral device may be operable to send a message to a teammate with just a few predetermined keystrokes. However, when the same peripheral device is in "work" mode, the same message might, at best, be meaningless, and at worst interfere with work. Mode of peripheral field 2606 may be a mode or state of a peripheral device that is relevant to a particular action. For example, field 2606 may store a mode in which a peripheral device is operable to take an associated action. In some embodiments, field 2606 may store a mode in which a peripheral device is not operable to take an associated action. In various embodiments, a given input sequence may be valid in more than one mode of a peripheral device, however the input sequence may have different meanings in the different modes. Example modes may include action mode, messaging mode, in-use mode, idle mode, etc.

Input sequence field 2608 may store the user inputs that will trigger an associated action. User inputs may comprise a set of clicks, button presses, motions, or any other set of inputs. Action field 2610 may store an action that the user wishes to take when he provides the user inputs. The action may include a generic action from table 2500, in which case an identifier for such an action from table 2500 may be stored in field 2610. The action may include any other action, message, instruction or the like. In some embodiments, certain actions may be valid only when both an originating peripheral device and a receiving peripheral device are both in the proper modes. For example, in order for a text message to be sent from one peripheral device to another peripheral device, the initiating peripheral device must be in "text" mode, and the receiving peripheral device must be in "idle" mode. In such embodiments, for example, table 2600 may store modes for two peripheral devices (e.g., for both an initiating and for a receiving peripheral device). In some embodiments, the relevant mode is the mode of the receiving peripheral device. In such embodiments, for example, table 2600 made store modes for the receiving peripheral device.

Referring to FIG. 27, a diagram of an example 'user game profiles' table 2700 according to some embodiments is shown. User game profiles table 2700 may store a user's profile with respect to a particular game, a particular gaming environment, a tournament, a game site, or any other situation. A user's profile may include login information, identifying information, information about preferences for playing the game, information about when a user is available for playing a game, information about users' communications preferences during a game, and/or any other information. User game profile ID field 2702 may store an identifier (e.g., a unique identifier) for a user game profile. Game ID field 2704 may store an indication of the game for which the user profile applies. In various embodiments, the game refers to a generic game such as "Call of Duty" rather than to a specific instance of that game. In other words, for example, a user's profile may govern how the user plays any game of a particular title. User ID field 2706 may store an indication of the user corresponding to the present user profile. Password field 2708 may store an indication of a password to be used by the user. The password may be used when the user logs in to a gaming site to play a game. In some embodiments, the password may be entered by the user when making an in-game purchase. In some embodiments, the password is stored in an encrypted form. As will be appreciated, the user may utilize the password for various other purposes. In some embodiments, table 2700 may store other or alternative identifying information, such as a user image, a user fingerprint, or some other biometric of the user. In some embodiments, a user may login via other means, such as by using credentials from another user account (e.g., a Google® or Facebook account belonging to the same user). Such alternative identifying information may also be encrypted while stored.

Screen name field 2710 may store a screen name, nickname, character name, alias, username, or any other name by which new user may be referenced in a game environment, or in any other environment. Preferred character field 2712 may store an indication of a user's preferred character to use in a game. For example, a game may allow a user to select a particular character to control within the game. Different characters may have different capabilities, different weaknesses, different looks, or other differences. In some embodiments, table 2700 may store a user's preferred role or function within a multiplayer game. For example, users on a team may assume different roles. For example, one user might be a navigator while another user is a gunner. Preferred avatar field 2714 may store an indication of a user's preferred avatar for use in a game, or in any other situation. A user's avatar may represent the way that the user or the user's character appears on screen. An avatar might appear as a human being dressed in a particular way, as a mythical being, as an animal, as a machine, or in any other form. Preferred background music field 2716 may store an indication of a user's preferred background music for use in a game, or in any other environment. Background music may include a melody, a song, a rhythm, a jingle, or any other music. In some embodiments, there may be multiple available music themes, which may be labeled numerically, such as theme 1, theme 2, etc. Field 2716 may then store a theme number as the user's preferred theme. Rating/skill level field 2718 may store an indication of a user's rating, skill level, experience, or any other metric of aptitude within the game. In one example, a user's FIDE chess rating could be stored for use on a chess playing website. Last login field 2720 may store an indication of the time when a user last logged into a game, game environment, game server, or the like. In some embodiments, table 2700 may store a user's login name, which may differ from their screen name. The login name may be used to identify the user when the user first logs in. The screen name may be used within a particular game to identify the user or the user's character within that game. As will be appreciated, login names or screen names may be used for various other purposes.

Referring to FIG. 28, a diagram of an example 'game records' table 2800 according to some embodiments is shown. Game records table 2800 may store records of games played, such as records of the participants, scores, results, and so on. Game record ID field 2802 may store an identifier, (e.g., a unique identifier) of a particular instance of a game that has been played. For example, this might be a particular instance of the game 'Frog Hunt III', that was played at 11:05 p.m. on Aug. 4, 2024. Game ID field 2804 may store an indication of the game title or type of game of which the present record is an instance. For example, game ID field 2804 may indicate that the present game was Frog Hunt III. Start time field 2806 may store an indication of the time when the game started. End time field 2808 may store an indication of the time when the game ended. Participant ID(s) field 2810 may store an indication of the participants in a game. Participants may be individual users, teams, or any other type of participant, in some embodiments. Score field 2812 may store an indication of the score achieved in a game. If there are multiple participants that were each scored separately, then a score may be recorded for each of the participants. Winner field 2814 may store an indication of the winner of the game, if applicable. This may be a team, a user, or even a side in a game (e.g., the Werewolves won against the Vampires). Highest level achieved field 2816 may store an indication of the highest level that was achieved in a game. The level might include a particular board, particular screen, particular boss, a particular difficulty level, a particular environment, or any other notion of a level. Location(s) played from field 2818 may include an indication of where a game was played from. This might be a geographical location, an IP address, a building, or any other indication of a location.

Referring to FIG. 29, a diagram of an example 'game activity logs' table 2900 according to some embodiments is shown. In various embodiments, game activity logs table may store activities, such as granular activities or specific activities, that occurred within a game. Such activities may include motions made, routes chosen, doors opened, villains destroyed, treasures captured, weapons used, messages sent, or any other activity that occurred within a game. In some embodiments, activities may include specific inputs made to a game, such as inputs made through a peripheral device. These inputs might include mouse motions, buttons pressed, or any other inputs. Inputs may include passive inputs, such as a heart rate measured for a player during a game. As will be appreciated, many other types of game activities may be recorded and are contemplated according to various embodiments.

Game activity ID field 2902 may include an identifier (e.g., a unique identifier) for a particular activity in a game. Game ID field 2904 may include an indication of a particular game title in which the activity occurred. In some embodiments, field 2904 may include an indication of a particular instance of a game in which an activity occurred. Participant ID field 2906 may include an indication of a participant or player in a game that performed the activity. Start time field 2908 may include an indication of the time when the activity was started or initiated. This time may represent, e.g., a time when a mouse movement was initiated, a time when a character started down a particular road, a time when an attack was ordered, a time when a particular mouse button was pressed, a time when a particular head motion was initiated, etc. End time field 2910 may include an indication of the time when the activity was completed. For example, a mouse movement was completed, an attack was repelled, a bullet hit its mark, etc. Note that, for example, end time 2910 may be mere fractions of a second after start time 2908. This may occur for example when very quick or granular activities are being recorded. However, in some embodiments, an activity may take a longer amount of time.

Game State field 2912 may store an indication of a game state or situation at the time that the activity took place. A game state might include a level within a game, a screen within a game, a location within a virtual world of a game, a health status of a character, an inventory of the possessions of a character, a state of a character (e.g., invisible, e.g., temporarily incapacitated) a location of one or more villains or opponents, a set of playing cards held in a character's hand (e.g., in a poker game), an amount of money or other currency possessed by a player, an amount of money in a pot or kitty (e.g., as in poker), an amount of money remaining with some other game entity (e.g., with the bank in Monopoly), an indication of whose turn it is, a position or location of game pieces or game tokens, an indication of which moves are currently available (e.g., in chess the en passant move is available), an indication of which cards remain in a deck (e.g., in Monopoly® which chance cards are remaining, e.g., in Blackjack, which cards remain in the shoe), or any other aspect of a game state. In some embodiments, a game state may be stored in such detail as to allow the recreation of the game from that state. Activity field 2914 may include an indication of the activity that was undertaken. Example activities include: shoot; move left; switch to laser weapon; draw 3 cards; e4×d5 (e.g., in chess), etc.

Referring to FIG. 30, a diagram of an example 'active game states' table 3000 according to some embodiments is shown. In various embodiments, active game states table 3000 may store the states of games that are in progress. Storing the states of games that are in progress may allow the central controller 110, a game server, or other entity to conduct a game, to render scenes from a game, to receive inputs from players in the game, to update a game to a succeeding state, to continue a game that has been stopped, to introduce a player back into a game after a connection has been lost, to arbitrate a game, or to perform any other desirable function. In various embodiments, table 3000 may store some or all information that is similar to information which is stored in field 2912. Game state ID field 3002 may store an identifier (e.g., a unique identifier) of a game state. Game ID field 3004 may store an indication of, or an identifier for, a game title that is being played. Game record ID field 3006 may store an indication of a game record (e.g., from game records table 2800) corresponding to a game for which the present state is an active game state, or a game state. For example, the present game State may be the state of a game that has been recorded in table 2800. Time remaining field 3008 may represent a time remaining in a game. For example, in a sports game this may represent the amount of time remaining on a game clock. In games where there are multiple periods (e.g., quarters or halves) this may represent the time remaining in the current period. In various embodiments, a stored game state may include an indication of the period that the game is in.

Level field 3010 may include an indication of the level where participants are at in the game. This may include a screen, a difficulty level, an environment, a villain, a boss, a game move number, a stage, or any other notion of level. In various embodiments, a game state might include separate information about two or more participants in the game. For example, each participant might have his or her own score, his or her own possessions, his or her own health status, etc. In some embodiments, table 3000 may have separate sets of fields for each participant. For example, each participant might have his or her own score field. Score fields 3012*a* and 3012*b* may include scores for a first and a second participant respectively (e.g., for participant 'a' and for participant 'b'). Location fields 3014*a* and 3014*b* may include locations for a first and a second participant, respectively. Power field 3016*a* and 3016*b* may include power levels for a first and a second participant, respectively. Ammo field 3018*a* and 3018*b* may include amounts of ammunition possessed by a first and a second participant, respectively. As will be appreciated, a game may have more than two participants, in various embodiments. In such cases, table 3000 may include additional fields for the additional players. For example, table 3000 may include fields 3012*c*, 3014*c*, and so on. The aforementioned represent but some information that may characterize a game state. It will be appreciated that a game state might comprise one or more additional items of information. Further, different games may warrant different descriptions or fields representative of the game state. It is therefore contemplated, according to various and embodiments, that table 3000 may include additional or alternative fields as appropriate to characterizing a game state.

Referring to FIG. 31, a diagram of an example shared projects table 3100 according to some embodiments is shown. Shared projects table 3100 may store information pertinent to joint, team, shared and/or collaborative work products or projects. Projects may include shared documents, collaborative workspaces, etc. Table 3100 may include data about the work product itself (e.g., an in-progress document), identities of contributors or collaborators to a project, a record of project states over time, historical snapshots of the project, goals for the project, checklist for the project, dependencies of different components of the project, or any other aspect of the project. Project ID field 3102 may store an identifier, (e.g., a unique identifier) for a project (e.g., for a shared project). Project type field 3104 may include an indication of the type of project. Example project types may include text document, spreadsheet, presentation deck, whiteboard, architectural design, paintings, sculptures, drawings, virtual visual arrangements of interiors, music, or any other project type. Participants field 3106 may store an indication of participants in the project. Participants may include contributors, collaborators, reviewers, or other stakeholders. Data field 3108 may include data about the work product. For example, if the project is to construct a text document, then field 3108 may include the text that has been generated so far. If the project is to create an advertising flyer, then field 3108 may include the text copy and the images that are to appear on the flyer. As will be appreciated, the data may take many other forms, and the form of the data may depend on the nature of the project.

Referring to FIG. 32, a diagram of an example of a 'shared project contributions' table 3200 according to some embodiments is shown. Shared project contributions table 3200 may record the individual contributions made by participants in shared projects. Contribution ID field 3202 may include an identifier (e.g., a unique identifier) of a contribution made to a project or task. Project ID field 3204 may include an indication of a project to which the contribution was made. The indication may be, for example, a project identifier that cross references to table 3100. Participant ID field 3206 may include an indication of the participant or participants who made a particular contribution. In some embodiments, an indication of who made a particular contribution may be based on one or more tags. Time of contribution field 3208 may store an indication of the time at which a contribution was made. Contribution type field 3210 may store an indication of the type of contribution that was made. A contribution may take various forms, in various embodiments. A contribution might add directly to the final work product. For example the contribution may be a paragraph in a text document. The contribution may be an idea or direction. The contribution may be feedback on a suggestion made by someone else. The contribution may be feedback on an existing work product. The contribution may be a datapoint that a contributor has researched which informs the direction of the project. The contribution may take the form of a message that is exchanged in a chat or messaging area. The contribution may take the form of a tag with information relevant to a project or task. A contribution may be a rating of the quality of the content created to that point. A contribution may be made in any applicable fashion or form. In various embodiments, contribution type field 3210 may store a place or location to which the contribution was made (e.g., "main document", "chat window"). In various embodiments, field 3210 may store the nature of the contribution. The nature of the contribution may be, for example, 'background research', 'work product', 'feedback', 'suggestion', 'vote', 'expert opinion', 'edit', 'correction', 'design', and so on. Contribution content field 3212 may store the content or substance of the contribution. For example, if the contribution was for the user to write part of a document, then field 3212 may store the text of what the user wrote. If the contribution was an image, then field 3212 may store the image or a link to the image. If the contribution was a suggestion, field 3212 may store the text of the suggestion. As will be appreciated, various embodiments contemplate that a contribution may be stored in other forms.

Referring to FIG. 33, a diagram of an example of advertisement table 3300 according to some embodiments is shown. Advertisement table 3300 may include information about one or more advertisements, promotions, coupons, or other marketing material, or other material. In various embodiments, an advertisement may be presented to a user. An advertisement may be presented to a user in various modalities, such as in a visual form, in audio form, in tactile form, or in any other applicable form. An advertisement may be presented via a combination of modalities, such as via visual and audio formats. In various embodiments, an advertisement may be presented to a user via one or more peripheral devices. For example, an advertisement may be displayed on a display screen built into a presentation remote. In another example, the advertisement is a message spelled out by sequentially lighting up individual keys of a user's keyboard. In various embodiments, an advertisement may be presented to a user via one or more user devices. Advertisement table 3300 may store the content of an advertisement, instructions for how to present the advertisement, instructions for what circumstances the advertisement should be presented under, or any other information about the advertisement. Advertisement ID field 3302 may store an identifier (e.g., a unique identifier) for an advertisement. Advertiser field 3304 may store an indication of an advertiser that is promoting the advertisement. For example, the advertiser may be a company with products to sell.

Ad server or agency field 3306 may store an indication of an ad server, an advertising agency, or other intermediary that distributed the ad. Target audience demographics field 3308 may include information about a desired target audience. Such information may include demographic information, e.g., age, race, religion, gender, location, marital status, income, etc. A target audience may also be specified in terms of one or more preferences (e.g., favorite pastimes, favorite types of vacations, favorite brand of soap, political party). A target audience may also be specified in terms of historical purchases, or other historical behaviors. In some embodiments, a target audience may be specified in terms of video game preferences. Such preferences may be readily available, for example, to a game server. Various environments contemplate that a target audience may be specified in any suitable form, and/or based on any suitable information available. In some embodiments, a target audience may be determined based on information associated with a tag, such as tags identifying a broken projector which determine a target audience in need of a new projector. Ad trigger field 3310 may store an indication of what events or circumstances should trigger the presentation of an ad to a user. Events may include the conclusion of a meeting, the completion of an agenda item, the assignment of a task, the generation of a tag, the content of a tag, the transmission of a tag, an initiation of gameplay by the user, a change in a user's performance while playing a game (e.g., a user's rate of play slows down 10%), a certain level being achieved in a game, a certain score being achieved in a game, or any other situation that occurs in a game. Triggers for presenting advertisements may include ambient factors, such as the temperature reaching a certain level, the noise level exceeding a certain threshold, pollution levels reaching a certain level, humidity reaching a certain level, or any other ambient factors. Triggers may include times of day, e.g., the time is 4 PM. Various embodiments contemplate that any suitable trigger for an advertisement may be used.

In various embodiments, limits field 3312 may store limits or constraints on when an ad may or must be presented, or under what circumstances an ad may be presented. For example, a limit may specify that no more than one thousand ads per day are to be presented across all users. As another example, a limit may specify that a maximum of two of the same advertisements may be presented to a given user. As another example, a constraint may specify that an ad should not be presented between the hours of 11 p.m. and 8 a.m. Another constraint may specify that an ad should not be presented when a mouse is in use (e.g., the ad may be intended for presentation on the mouse, and it may be more likely that the ad is seen if the user is not already using the mouse for something else). Various embodiments contemplate that any suitable constraints on the presentation of an advertisement may be specified. Presenting devices field 3314 may indicate which types of devices (e.g., which types of peripheral devices, which types of user devices), and/or which combination of types of devices, should be used for presenting an advertisement. Example presenting devices may include: a keyboard; a mouse; a PC with mouse; a tablet; a headset; a presentation remote; an article of digital clothing; smart glasses; a smartphone; or any other device; or any other device combination. Modality(ies) field 3316 may indicate the modalities with which an advertisement may or must be presented. Example modalities may include video; tactile; video and LED; image and tactile; heating, or any other modality or combination of modalities. In various embodiments, when an advertisement is presented, it is presented simultaneously using multiple modalities. For example, a video of a roller coaster may be displayed while a mouse simultaneously rumbles. As another example, an image of a relaxing ocean resort may be presented while a speaker simultaneously outputs a cacophony of horns honking (as if to say, "get away from the noise"). Ad content field 3318 may store the actual content of an advertisement. Such content may include video data, audio data, tactile data, instructions for activating lights built into peripheral devices or user devices, instructions for activating heating elements, instructions for releasing fragrances, or any other content or instructions. In some embodiments, ads may be attached to or associated with a tag.

Referring to FIG. 34, a diagram of an example of 'advertisement presentation log' table 3400 according to some embodiments is shown. Advertisement presentation log 3400 may store a log of which ads were presented to which users and when, in various embodiments. Advertisement presentation ID field 3402 may store an identifier (e.g., a unique identifier) of an instance when an ad was presented to a user. Advertisement ID field 3404 may store an indication of which advertisement was presented. User ID field 3406 may store an indication of the user to whom the ad was presented. Presentation device field 3408 may store an indication of one or more devices (e.g., user devices, peripheral devices) through which the ad was presented. For example, field 3408 may store an indication of a presentation remote on which a video was presented. In another example, field 3408 may store an indication of a keyboard and a speaker through which an ad was presented (e.g., using two different modalities simultaneously). Time field 3410 may store an indication of when the ad was presented. User response field 3412 may store an indication of how the user responded to the ad. Example responses might include, the user clicked on the ad, the user opened the ad, the user viewed the ad, the user responded with their email address, the user made a purchase as a result of the ad, the user forwarded the ad, the user requested more information, the user agreed to receive product updates via email, the user's heart rate increased after viewing the ad, the user took a recommendation made in the ad, the user had no response to the ad, or any other response.

Referring to FIG. 35, a diagram of an example of 'AI models' Table 3500 according to some embodiments is shown. As used herein, "AI" stands for artificial intelligence. An AI model may include any machine learning model, any computer model, or any other model that is used to make one or more predictions, classifications, groupings, visualizations, or other interpretations from input data. As used herein, an "AI module" may include a module, program, application, set of computer instructions, computer logic, and/or computer hardware (e.g., CPU's, GPU's, tensor processing units) that instantiates an AI model. For example, the AI module may train an AI model and make predictions using the AI model. AI Models Table 3500 may store the current 'best fit' model for making some prediction, etc. In the case of a linear model, table 3500 may store the 'best fit' values of the slope and intercept. In various embodiments, as new data comes in, the models can be updated in order to fit the new data as well.

For example, central controller 110 may wish to estimate a user's skill level at a video game based on just a few minutes of play (this may allow the central controller, for example, to adjust the difficulty of the game). Initially, the central controller may gather data about users' actions within the first few minutes of the video game, as well as the final score achieved by the users in the game. Based on this set of data, the central controller may train a model that predicts a user's final score in a game based on the user's actions in the first few minutes of the game. The predicted final score may be used as a proxy for the user's skill level. As another example, a central controller may wish to determine a user's receptivity to an advertisement based on the motions of the user's head while the user views the advertisement. Initially, the central controller 110 may gather data from users who watch an advertisement and subsequently either click the advertisement or ignore the advertisement. The central controller may record users' head motions while they watch the advertisement. The central controller may then train a model to predict, based on the head motions, the chance that the user will click the advertisement. This may allow the central controller, for example, to cut short the presentation of an ad if it is clear that the user is not receptive to the ad.

AI Model ID field 3502 may store an identifier (e.g., a unique identifier) for an AI model. Model type field 3504 may store an indication of the type of model. Example model types may include 'linear regression', '2nd degree polynomial regression', 'neural network', deep learning, backpropagation, and so on. Model types may be specified in terms of any desired degree of specificity (e.g., the number of layers in a neural network, the type of neurons, the values of different hyperparameters, etc.). 'X' data source field 3506 may store information about the input data that goes into the model. Field 3506 may indicate the source of the data, the location of the data, or may store the data itself, for example. Example input data may include game scores after the first five minutes of play for game gm14821, or the content of team messages passed for game gm94813. 'Y' data source field 3508 may store information about the data that is intended to be predicted by the model. This may also be data that is used to train the model, to validate the model, or to test the model. Field 3508 may indicate the source of the data, the location of the data, or may store the data itself, for example. Example output data may include final game scores for game gm14821, or final team scores for game gm94813. For example, a team's final score may be predicted based on the content of the messages that are being passed back and forth between team members. This may help to determine whether a team can improve its methods of communication.

Parameter Values field 3510 may store the values of one or more parameters that have been learned by the model, or which have otherwise been set for the model. Examples of parameters may include a slope, an intercept, or coefficients for a best fit polynomial. Accuracy field 3512 may store an indication of the accuracy of the model. The accuracy may be determined based on test data, for example. As will be appreciated, accuracy may be measured in a variety of ways. Accuracy may be measured in terms of a percentage of correct predictions, a root mean squared error, a sensitivity, a selectivity, a true positive rate, a true negative rate, or in any other suitable fashion. Last update field 3514 may store an indication of when the model was last updated. In various embodiments, the model may be retrained or otherwise updated from time to time (e.g., periodically, every day). New data that has been gathered may be used to retrain the model or to update the model. This may allow the model to adjust for changing trends or conditions. Update trigger field 3516 may store an indication of what would trigger a retraining or other update of the model. In some embodiments, a retraining is triggered by a date or time. For example, a model is retrained every day at midnight. In some embodiments, the model is retrained when a certain amount of new data has been gathered since the last retraining. For example, a model may be retrained or otherwise updated every time 1000 new data points are gathered. Various other triggers may be used for retraining or updating a model, in various embodiments. In various embodiments, a person may manually trigger the retraining of a model.

Referring to FIG. 36, a diagram of an example authentication table 3600 according to some embodiments is shown. Authentication table 3600 may store user data, such as biometric data, that can be used to authenticate the user the next time it is presented. In various embodiments, table 3600 may store multiple items of user data, such as multiple items of biometric data. Different applications may call for different types or different combinations of user data. For example, a very sensitive application may require a user to authenticate himself using three different points of data, such as fingerprint, voiceprint, and retinal scan. A less sensitive application may require only a single point of data for a user to authenticate himself. Authentication ID field 3602 may store an identifier (e.g., a unique identifier) that identifies the authentication data. User ID field 3604 may store an indication or identifier for a user, i.e., the user to whom the data belongs. Image(s) field 3606 may store an image of the user. These may be images of a user's eye, ear, overall face, veins, etc. Fingerprint images field 3608 may store fingerprint data for the user, such as images of the user's fingerprint. Retinal scans field 3610 may store one or more retinal or iris scans for the user. Voiceprint field 3612 may store voice data, voiceprint data, voice recordings, or any other signatures of a user's voice. Gait field 3614 may store body movements of a user. Head movement field 3616 may store the direction in which a user's head is pointing, head movements up and down, side to side, and angle of lean. In various embodiments, other types of data may be stored for a user. These may include other types of biometric data, such as DNA, facial recognition, keystroke data (e.g., a series of keystrokes and associated timestamps), electrocardiogram readings, brainwave data, location data, walking gait, shape of ear, or any other type of data. In various embodiments, data that is personal to a user and/or likely to be known only by the user may be stored. For example, the name of the user's first pet, or the user's favorite ice cream may be stored.

In various embodiments, when a user is to be authenticated, the user presents information, and the information presented is compared to user information on file in table 3600. If there is a sufficient match, then it may be concluded that the user is in fact who he claims to be. In one embodiment, after a user is authenticated, the central controller 110 looks up the user in employee table 5000 (or in some embodiments user table 700) to verify that the user is clear to work with objects in a particular location. For example, one user might be cleared to use a particular chemical, but is not allowed into a room because a different chemical is present which the user is not cleared to handle. So even though the user is authenticated, they may not have the right credentials as a user for the chemical in that particular location. Examples of things that may require a level of authentication include radioactive elements, hazardous chemicals, dangerous machinery, government contracts, encryption keys, weapons, company sensitive information such as financials or secret projects, personnel information such as salary data, confined space entry, etc.

Referring to FIG. 37, a diagram of an example privileges table 3700 according to some embodiments is shown. Privileges table 3700 may store one or more privileges that are available to a user, together with criteria that must be met for the user to receive such privileges. For example, one privilege may allow a user to read a document, and the user may be required to provide a single datapoint to prove his identity (i.e., to authenticate himself). As another example, a privilege may allow a user to delete a document, and the user may be required to provide three data points to prove his identity. The different number of data points required by different privileges may reflect the potential harm that might come about from misuse of a privilege. For example, deleting a document may cause more harm than can be caused merely by reading the document. Privilege ID field 3702 may store an identifier (e.g., a unique identifier) of a privilege that may be granted to a user. Privilege field 3704 may store an indication of the privilege that is to be granted. 'Points of authentication required' field 3706 may store an indication of the amount of authenticating or identifying information that would be required of a user in order to receive the privilege. In various embodiments, the amount of authenticating information required may be specified in terms of the number of data points required. For example, if two data points are required, then the user must provide two separate items of information, such as a retinal scan and a fingerprint. In some embodiments, some data points may carry more weight than others in terms of authenticating a user. For example, a retinal scan may be worth three points, whereas a fingerprint may be worth only two points. In this case, a user may satisfy an authentication requirement by using any combination of information whose combined point value meets or exceeds a required threshold. As will be appreciated, a user may be required to meet any suitable set of criteria in order to be granted a privilege. In one embodiment, the number of authentication points required may vary by the job title of a user, for example, a senior safety manager may require less authentication than a lower-level user.

Authentication

In various embodiments, various applications can be enhanced with authentication protocols performed by a peripheral, user device 107*a*, central controller 110, and/or other device. Information and cryptographic protocols can be used in communications with other users and other devices to facilitate the creation of secure communications, transfers of money, authentication of identity, and authentication of credentials. Peripheral devices could be provided to a user who needs access to sensitive areas of a company, or to sensitive information. The peripheral might be issued by the company and come with encryption and decryption keys securely stored in a data storage device of the peripheral. In various embodiments, encryption is an encoding protocol used for authenticating information to and from the peripheral device. Provided the encryption key has not been compromised, if the central controller can decrypt the encrypted communication, it is known to be authentic. Alternatively, the cryptographic technique of "one-way functions" may be used to ensure communication integrity. As used herein, a one-way function is one that outputs a unique representation of an input such that a given output is likely only to have come from its corresponding input, and such that the input can not be readily deduced from the output. Thus, the term one-way function includes hashes, message authenticity codes (MACs-keyed one-way functions), cyclic redundancy checks (CRCs), and other techniques well known to those skilled in the art. See, for example, Bruce Schneier, "Applied Cryptography," Wiley, 1996, incorporated herein by reference. As a matter of convenience, the term "hash" will be understood to represent any of the aforementioned or other one-way functions throughout this discussion.

Tamper Evidence/Resistance

One or more databases according to various embodiments could be stored within a secure environment, such as within a secure enterprise or off-premises datacenter within locked doors and 24/7 security guards, or in a cloud computing environment managed by a third party storage/compute provider such as Google® Cloud or Amazon® Web Services. These databases could be further secured with encryption software that would render them unreadable to anyone without access to the secure decryption keys. Encryption services are commonly offered by cloud database storage services. Security could be used to protect all databases according to various embodiments, or it could be applied only to select databases—such as for the storage of user passwords, financial information, or personal information. An alternative or additional form of security could be the use of tamper evident or tamper resistant enclosures for storage devices containing databases. For example, a dedicated computer processor (e.g., processor 605) may have all of its components—including its associated memory, CPU and clock housed in a tamper-resistant and/or tamper-evident enclosure to prevent and reveal, respectively, tampering with any of these components. Tamper-evident enclosures include thermoset wraps which, upon inspection, can reveal any attempt to physically open the structure. Tamper-resistant structures may electronically destroy the memory contents of data should a player try to physically open the structure.

Devices and Interactions

Figure 38:
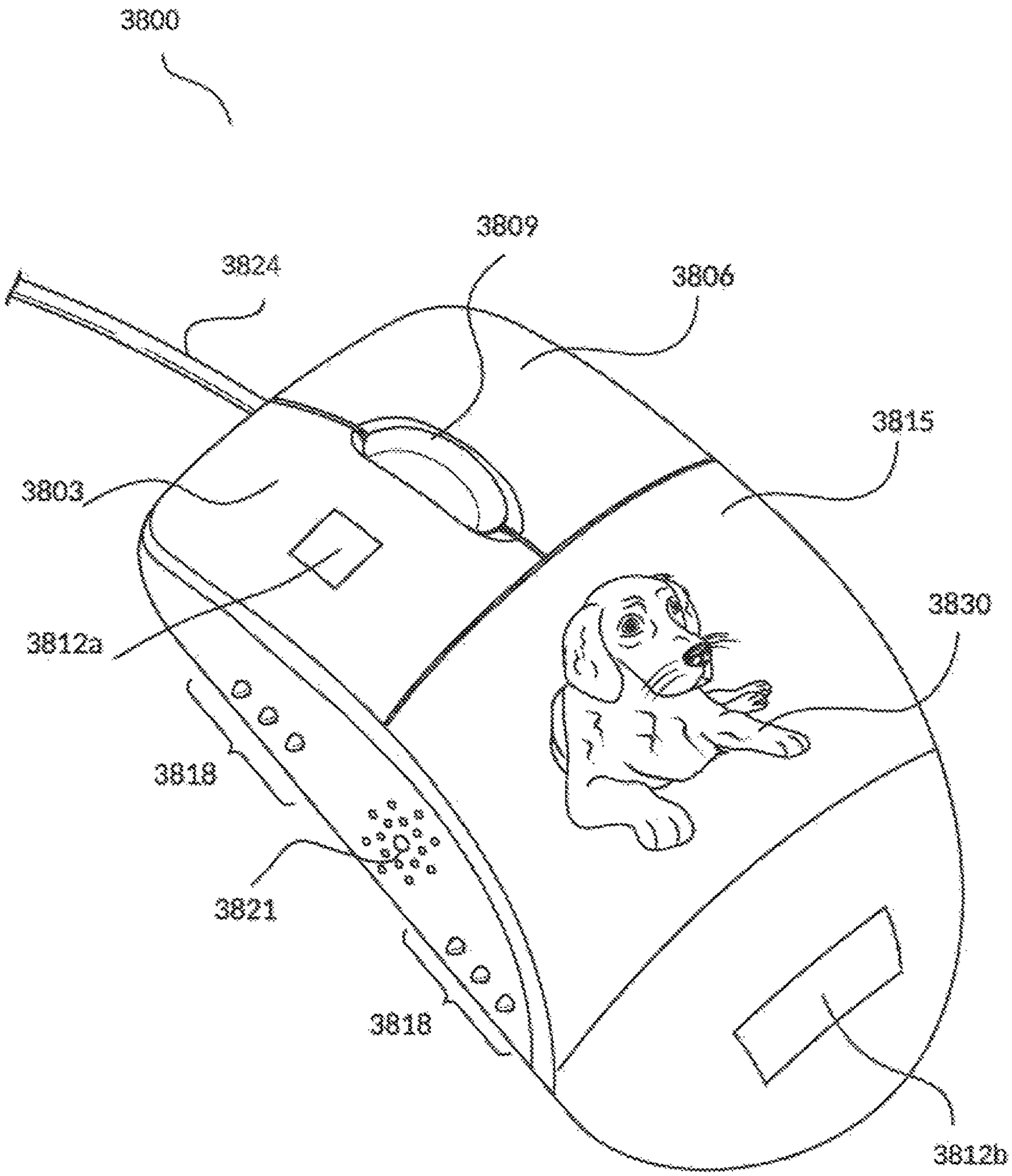
FIG. 38 is a computer mouse consistent with at least some embodiments described herein.

With reference to FIG. 38, a computer mouse 3800 according to some embodiments is shown. The mouse has various components, including left button 3803, right button 3806, scroll wheel 3809, sensors 3812*a* and 3812*b*, screen 3815, lights 3818, speaker 3821, and cord 3824. In various embodiments, hardware described herein (e.g., mouse 3800) may contain more or fewer components, different arrangements of components, different component appearances, different form factors, or any other variation. For example, in various embodiments, mouse 3800 may have a third button (e.g., a center button), may lack a cord (e.g., mouse 3800 may be a wireless mouse), may have more or fewer sensors, may have the screen in a different location, or may exhibit any other variation. In various embodiments, screen 3815 may be a display screen, touch screen, or any other screen. Screen 3815 may be a curved display using LCD, LED, mini-LED, TFT, CRT, DLP, or OLED technology or any other display technology that can render pixels over a flat or curved surface, or any other display technology. Screen 3815 may be covered by a chemically tempered glass or glass strengthened in other ways, e.g., Gorilla® Glass®, or covered with any other materials to stand up to the wear and tear of repeated touch and reduce scratches, cracks, or other damage. One use of a display screen 3815 is to allow images or video, such as dog image 3830, to be displayed to a user. Such an image could be retrieved from user table 700 (e.g., field 726) by central controller 110. Images displayed to a user could include game updates, game tips, game inventory lists, advertisements, promotional offers, maps, work productivity tips, tags, images of other players or co-workers, educational images, sports scores and/or highlights, stock prices, news headlines, and the like. In some embodiments, display screen 3815 displays a live video connection with another user which may result in a greater feeling of connection between the two users. Sensors 3812*a* and 3812*b* may be contact sensors, touch sensors, proximity sensors, heat sensors, fingerprint readers, moisture sensors, or any other sensors. Sensors 3812*a* and 3812*b* need not be sensors of the same type. Sensors 3812*a* and/or 3218*b* may be used to sense when a hand is on the mouse, and when to turn display 3830 off and on.

Figure 39:
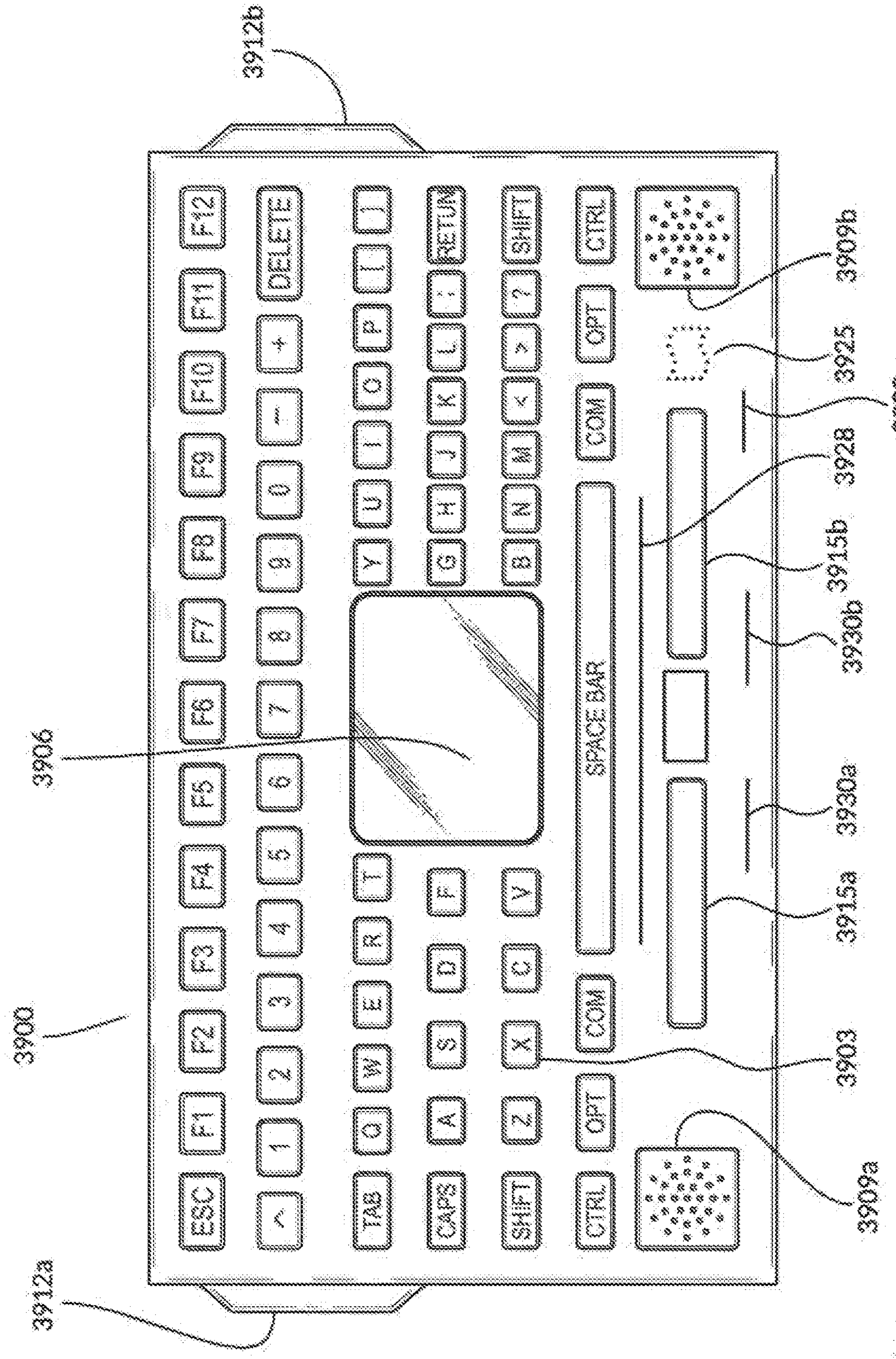
FIG. 39 is a computer keyboard consistent with at least some embodiments described herein.

With reference to FIG. 39, a computer keyboard 3900 according to some embodiments is shown. The keyboard has various components, including keys 3903, a screen 3906, speakers 3909*a* and 3909*b*, lights 3912*a* and 3912*b*, sensors 3915*a* and 3915*b*, microphone 3920, optical fibers 3928, 3930*a*, 3930*b*, and 3930*c*, and memory and processor 3925. In various embodiments, the keyboard is wireless. In some embodiments, the keyboard 3900 may connect to a user device, e.g., user device 106*b* (or other device), via a cord (not shown). Keyboard 3900 could be used by a user to provide input to a user device or to central controller 110, or to receive outputs from a user device or from central controller 110. Keys 3903 can be pressed in order to generate a signal indicating the character, number, symbol, or function button selected. It is understood that there may be many such keys 3903 within keyboard 3900, and that more or fewer keys 3903 may be used in some embodiments. Keys 3903 may be physical keys made of plastic. In some embodiments, keys 3903 are virtual keys or physical keys with display screens on top that can be programmed to display characters on top of the key which can be updated (e.g., updated at any time). Screen 3906 may include any component or device for conveying visual information, such as to a user. Screen 3906 may include a display screen and/or a touch screen. Screen 3906 may include a CRT screen, LCD screen, plasma screen, LED screen, mini-LED screen, OLED screen, TFT screen, DLP screen, laser projection screen, virtual retinal display, or any other screen, and it may be covered by a chemically tempered glass or glass strengthened in other ways, e.g., Gorilla® Glass®, or covered with any other materials to stand up to the wear and tear of repeated touch—and reduce scratches, cracks, or other damage. In some embodiments, displayed visual information can include game tips, game inventory contents, images or other game characters such as teammates or enemy characters, maps, game achievements, messages from one or more other game players, advertisements, promotions, coupons, codes, passwords, secondary messaging screens, presentation slides, data from a presentation, images of other callers on a virtual call, text transcriptions of another user, sports scores and/or highlights, stock quotes, news headlines, etc. In some embodiments, two players are using a keyboard 3900 with both keyboards connected through central controller 110. In these embodiments, one player can type a message using keys 3903 with the output of that typing appearing on screen 3906 of the other player. In some embodiments screen 3906 displays video content, such as a clip from a game in which one user scored a record high number of points, or a message from a company CEO. In some embodiments, light sources such as lasers, LED diodes, or other light sources, can be used to light up optical fibers 3928, 3930*a*, 3930*b*, and 3930*c* with a choice of colors; in some embodiments, the colors controlled by central controller 110 for the keyboards of various players in a game, or various participants in a meeting, can be synchronized, or used to transmit information among players or participants, e.g. when players or participants are available, unavailable, away for a time, in "do not disturb" mode, or any other status update that is desired.

Speakers 3909*a* and 3909*b* can broadcast sounds and audio related to games, background music, game character noises, game noises, game environmental sounds, sound files sent from another player, etc. In some embodiments, two game players can speak to each other through microphone 3920, with the sound being transmitted through microphone 3920 to memory and processor 3925 and then to central controller 110 to speakers 3915*a* and 3915*b* on the other player's keyboard 3900. Lights 3912*a* and 3912*b* can illuminate all or part of a room. In some embodiments, suitable lighting technology could include LED, fluorescent, or incandescent. In various embodiments, lights 3912*a* and 3912*b* can serve as an alerting system to get the attention of a user such as a game player or a virtual meeting attendee by flashing or gradually increasing the light's intensity. In some embodiments, one user can send a request signal to memory and processor 3920 to flash the lights 3915*a* and 3915*b* of the other user's keyboard 3900. Sensors 3915*a* and 3915*b* may include mechanical sensors, optical sensors, photo sensors, magnetic sensors, biometric sensors, or any other sensors. A sensor may generate one or more electrical signals to represent a state of a sensor, a change in state of the sensor, or any other aspect of the sensor. For example, a contact sensor may generate a "1" (e.g., a binary one, e.g., a "high" voltage) when there is contact between two surfaces, and a "0" (e.g., a binary "0", e.g., a "low" voltage) when there is not contact between the two surfaces. A sensor may be coupled to a mechanical or physical object, and may thereby sense displacement, rotations, or other perturbations of the object. In this way, for example, a sensor may detect when a surface has been touched, when a surface has been occluded, or when any other perturbation has occurred. In various embodiments, sensors 3915*a* and 3915*b* may be coupled to memory and processor 3925, and may thereby pass information on to central controller 110 or to a location controller 8305.

Microphone 3920 can pick up audible signals from a user as well as environmental audio from the surroundings of the user. In one embodiment, microphone 3920 is connected to memory and processor 3925. Memory and processor 3925 allows for the storage of data and processing of data. In one embodiment, memory and processor 3925 is connected to central controller 110 and can send messages to other users, receive files such as documents or presentations, store digital currencies or financial data, store employee ID numbers, store passwords, store cryptographic keys, store photos, store video, and store biometric values from the keypad and store them for processing. In various embodiments, memory and processor 3925 can communicate via wired or wireless network with central controller 110 and house controller 6305. Memory and processor 3925 may include memory such as non-volatile memory storage. In some embodiments, this storage capacity could be used to store software, user images, business files (e.g. documents, spreadsheets, presentations, instruction manuals), books (e.g., print, audio), financial data (e.g. credit card information, bank account information), digital currency (e.g., Bitcoin™), cryptographic keys, user biometrics, user passwords, names of user friends, user contact information (e.g., phone number, address, email, messaging ID, social media handles), health data (e.g. blood pressure, height, weight, cholesterol level, allergies, medicines currently being taken, age, treatments completed), security clearance levels, message logs, GPS location logs, and the like.

Various embodiments contemplate the use of diffusing fiber optics, such as optical fiber 3928 or shorter strand optical fibers 3930*a*, 3930*b*, and 3930*c*. These may include optical glass fibers where a light source, such as a laser, LED light, or other source is applied at one end and emitted continuously along the length of the fiber. As a consequence, the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., green when someone is available and red when unavailable), or provide diverse and/or visually entertaining lighting configurations.

Figure 40:
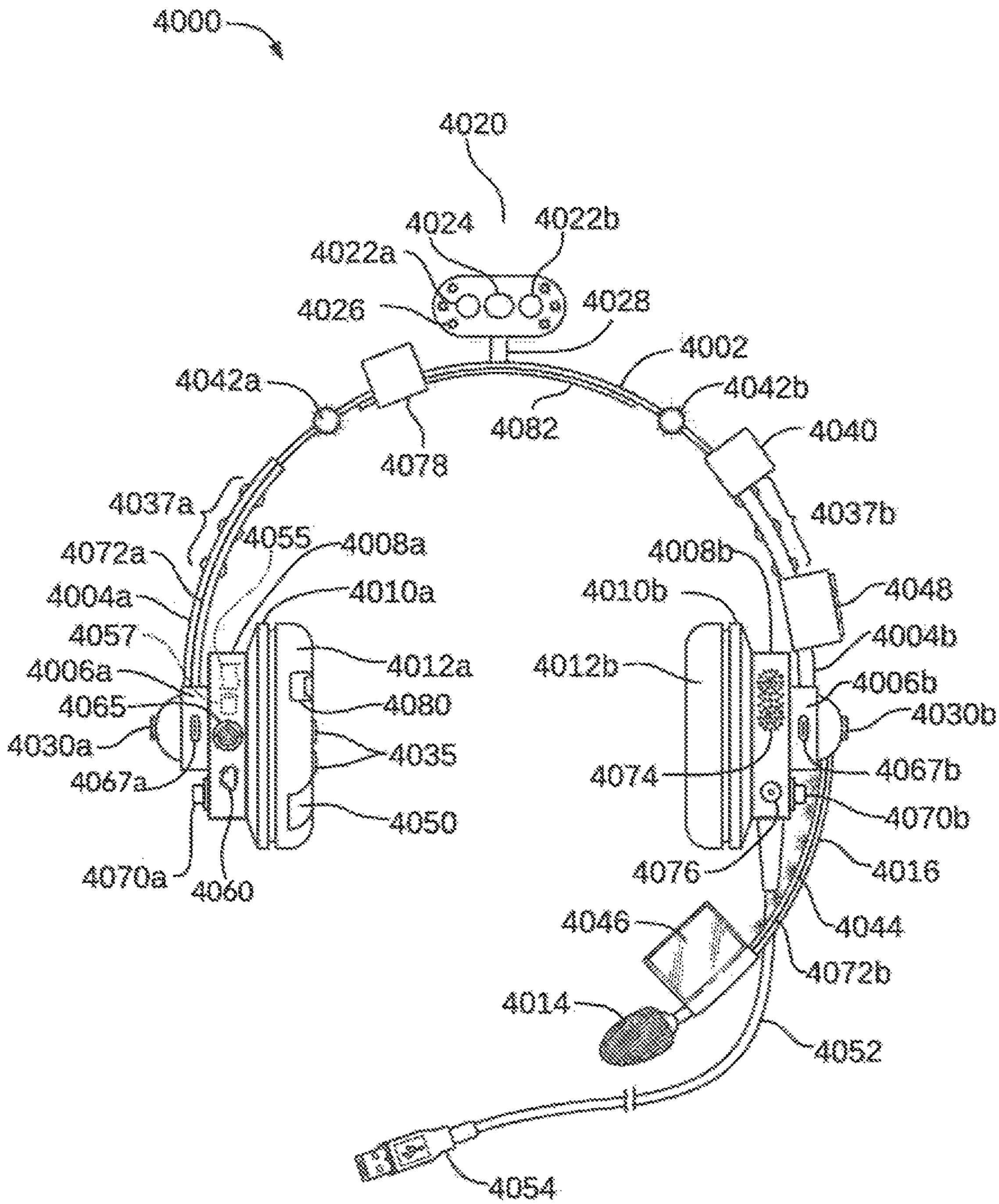
FIG. 40 is a headset consistent with at least some embodiments described herein.

With reference to FIG. 40, a headset 4000 according to some embodiments is shown. Headband 4002 may serve as a structural element, connecting portions of the headset that are situated on either side of the user's head. The headband may also rest on the user's head. Further, the headband may serve as a conduit for power lines, signal lines, communication lines, optical lines, or any other communication or connectivity between attached parts of the headset. Headband 4002 may include slidable components 4004*a* and 4004*b* (e.g., "sliders"), which may allow a user to alter the size of the headband to adjust the fit of the headset. Slidable component 4004*a* may attach to base 4006*a* and slidable component 4004*b* may attach to base 4006*b*. Right base 4006*a* and left base 4006*b* connect into slidable components 4004*a* and 4004*b*, and connect to housing 4008*a* and 4008*b*. In various embodiments, one or both of the left and right housings may comprise other electronics or other components, such as a processor 4055, data storage 4057, network port 4060, heating element 4065, or any other components. The left and right speakers 4010*a* and 4010*b* may broadcast sound into the user's left and right ears, respectively. Right cushion 4012*a* may substantially cover right speaker 4010*a*, thereby enclosing the right speaker. Right speaker cushion 4012*a* may be padded along its circumference to surround a user's right ear, and provide a comfortable contact surface for the user. Right speaker cushion 4012*a* may include perforations or other transmissive elements to allow sound from the left speaker to pass through to the user's ear. Left speaker cushion 4012*b* may have analogous construction and function for the user's left ear.

In various embodiments, one of right speaker cushion 4012*a* or left speaker cushion 4012*b* includes one or more tactile dots 4035. A tactile dot may include a small elevated or protruding portion designed to make contact with the user's skin when the headset 4000 is worn. This could allow for embodiments in which processor 4055 could direct a haptic signal to alert a user via tactile dots 4035, or direct heat via heating element 4065, or provide a puff of air. As the headset may have a similar appearance from the front and from the back, a tactile dot (when felt on the appropriate side) may also serve as a confirmation to the user that the headset is facing in the proper direction. A microphone 4014 together with microphone boom 4016 may extend from base 4006*b*, placing the microphone in a position where it may be proximate to a user's mouth. Headset 4000 may include one or more camera units 4020. Two forward-facing cameras 4022*a* and 4022*b* are shown atop the headband 4002. In some embodiments, two such cameras may provide stereoscopic capability. An additional camera (e.g., a backward facing camera) (not shown) may lie behind camera unit 4020 and face in the opposite direction. Camera unit 4020 may also include a sensor 4024 such as a rangefinder or light sensor. Sensor 4024 may be disposed next to forward facing camera 4022*a*. In some embodiments, sensor 4024 may be a laser rangefinder. The rangefinder may allow the headset to determine distances to surrounding objects or features. In one embodiment, sensor 4024 includes night vision capability which can provide data to processor 4055, which can in some embodiments direct the user in gameplay to avoid danger, capture enemies, or perform other enhanced maneuvers. Camera unit 4020 may include one or more lights 4026 which can help to illuminate objects captured by forward facing cameras 4022*a-b*.

Buttons 4030*a* and 4030*b*, may be available to receive user inputs. Exemplary user inputs might include instructions to change the volume, instructions to activate or deactivate a camera, instructions to mute or unmute the user, instructions to generate a tag, or any other instructions or any other inputs. In various embodiments, headset 4000 may include one or more additional input components. In some embodiments, an extendible stalk 4028 is included to allow the camera unit 4020 to be raised to a higher level, which could allow for sampling of air quality at a higher level, for example. In some embodiments, extendible stalk 4028 may be bendable, allowing a user to position camera unit 4020 at various angles.

In various embodiments, headset 4000 may include one or more attachment structures 4037*a* and 4037*b* consisting of connector points for motion sensors, motion detectors, accelerometers, gyroscopes, and/or rangefinders. Attachment structures 4037*a* and 4037*b* may be electrically connected with processor 4055 to allow for flow of data between them. Attachment structures 4037*a* and 4037*b* could include one or more points at which a user could clip on an attachable sensor 4040. In some embodiments, standard size structures could enable the use of many available attachable sensors, enabling users to customize their headset with just the types of attachable sensors that they need for a particular function. For example, a firefighter might select several types of gas sensors to be worn on the headset, or even attach a sensor for a particular type of gas prior to entering a burning building suspected of containing that gas. In another embodiment, the attachment structures 4037*a* and 4037*b* could be located on other portions of headset 4000 such as on speakers 4010*a-b* or on bases 4006*a-b*. The attachable sensors 4040 may be used to detect a user's head motions, such as nods of the head or shaking of the head. The sensors may be used for other purposes, too. In some embodiments, a user may take a sensor from attachment structures 4037*a* or 4037*b* and clip it to their clothing (or to another user's clothing) and then later return the sensor to attachment structures 4037*a* or 4037*b*.

In various embodiments, instead of forward facing cameras 4022*a-b* (or instead of a backward facing camera), headset 4000 may include a 360-degree camera on top of headband 4002 within camera unit 4020. This may allow for image capture from all directions around the user. In some embodiments, microphone boom lights 4044 may be capable of illuminating the user, such as the user's face or skin or head or other body part, or the user's clothing, or the user's accessories, or some other aspect of the user. In other embodiments, headband lights 4042*a* and 4042*b* may be disposed on headband 4002, facing away from a prospective user. Such lights might have visibility to other users, for example. When activated, such lights might signal that the user has accomplished something noteworthy, that it is the user's turn to speak, that the user possesses some rank or office, or the lights may have some other significance, some aesthetic value, or some other purpose.

Display 4046 may be attached to microphone boom 4016. In various embodiments, display 4046 faces inwards towards a prospective user. This may allow a user to view graphical information that is displayed through his headset. In various embodiments, display 4046 faces outwards. In various embodiments, display 4046 is two-sided and may thereby display images both to the user and to other observers. In various embodiments, an inward facing display and an outward facing display need not be part of the same component, but rather may comprise two or more separate components. Headband display 4048 may be disposed on headband 4002, e.g., facing away from a prospective user, and may thereby display images to other observers.

Cushion sensor 4050 may be disposed on right cushion 4012*a*. When the headset is in use, cushion sensor 4050 may be in contact with a user's skin. The sensor may be used to determine a user's skin hydration, skin conductivity, body temperature, heart rate, or any other vital sign of the user, or any other signature of the user. In various embodiments, additional sensors may be present, such as on left cushion 4012*b*. Cushion sensor 4050 may be used as a haptic for feedback to the user, to impart some sensory input, which may be a buzzing, a warm spot, or any other sensory information. In various embodiments, additional sensors may be present, such as on left cushion 4012*b*. Cable 4052 may carry power to headset 4000. Cable 4052 may also carry signals (e.g., electronic signals, e.g., audio signals, e.g., video signals) to and from the headset 4000. Cable 4052 may terminate with connector 4054. In some embodiments, connector 4054 is a USB connector.

Terminals 4067*a* and 4067*b* may lead into speaker bases 4006*a* and 4006*b*, and may serve as an attachment point for electronic media, such as for USB thumb drives, for USB cables, or for any other type of media or cable. Terminals 4067*a-b* may be a means for charging headset 4000 (e.g., if headset 4000 is wireless). data storage 455 may comprise non-volatile memory storage. In some embodiments, this storage capacity could be used to store software, user images, business files (e.g. documents, spreadsheets, presentations, instruction manuals), books (e.g. print, audio), financial data (e.g. credit card information, bank account information), digital currency (e.g., Bitcoin™), cryptographic keys, user biometrics, user passwords, names of user friends, user contact information (e.g. phone number, address, email, messaging ID, social media handles), health data (e.g. blood pressure, height, weight, cholesterol level, allergies, medicines currently being taken, age, treatments completed), security clearance levels, message logs, GPS location logs, current or historical environmental data (e.g. humidity level, air pressure, temperature, ozone level, smoke level, CO2 level, CO level, chemical vapors), and the like. In various embodiments, headset 4000 includes a Bluetooth® antenna (e.g., an 8898016 series GSM antenna) (not shown). In various embodiments, headset 4000 may include any other type of antenna. In various embodiments, headset 4000 includes an earbud (not shown), which may be a component that fits in the ear (e.g., for efficient sound transmission).

Headset 4000 may also include accelerometers 4070*a* and 4070*b* which are capable of detecting the orientation of headset 4000 in all directions and the velocity of headset 4000. Such accelerometers might be used for detecting the direction of gaze of a user, speed of walking, nodding of the user's head, etc. Optical fibers 4072*a* and 4072*b* are a thin strand of diffusing optical fiber. These may include optical glass fibers where a light source, such as a laser, LED light, or other source is applied at one end and emitted continuously along the length of the fiber. As a consequence, the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., red when a user is in an environment with low oxygen levels), or provide diverse and/or visually entertaining lighting configurations. In some embodiments, headset 4000 includes outward speakers 4074 which can generate a sound hearable by other users. A projector 4076 could be used to project information in front of a user. In some embodiments, projector 4076 may project text from a machine instruction manual onto a wall in front of the user. In some embodiments, a smell generator 4078 is capable of generating smells which may be used to alert the user or to calm down the user. Vibration generator 4080 may be used to generate vibrations that a user feels on the surface of cushion 4012*a*. Piezoelectric sensor 4082 may be attached to headband 4002 so as to detect bending of headband 4002 (e.g. detecting when a user removes or puts on a headset).

In some embodiments, a heads up display ("HUD") (not shown) and/or "helmet mounted display" ("HMD") (not shown) is included in headset 4000 and used to display various data and information to the wearer. In some embodiments, HUD and/or HMD capability may be incorporated into projector 4076. The HUD and/or HMD can use various technologies, including a collimator to make the image appear at an effective optical infinity, project an image on a facemask or windshield, or "draw" the image directly on the retina of the user. Some advantages of a HUD and/or HMD include allowing the user to check on various important data points while not changing their visual focus, which might be beneficial when used in aircraft and automobile embodiments. Other applications could include military settings, for motorcyclists, etc. A HUD and/or HMD may display important operational information in industrial settings, such as ambient temperatures, oxygen levels, a timer, the presence of toxic elements, or any other information or data that is needed. A HUD and/or HMD may display status information of another user, such as their heart rate, respiration rate, blood alcohol level, etc. A HUD and/or HMD may display environmental information of another user, such as oxygen level, temperature, location, presence of dangerous gasses, etc. A HUD and/or HMD may also display important information to a gamer, such as health levels, shield strength, remaining ammunition, opponent statistics, or any other relevant information. In some embodiments, a HUD and/or HMD may comprise text output such as instruction steps for fixing a machine, or text instructions for a student who is struggling with a math problem, or recipe instructions for a user baking a cake, etc. In some embodiments, a HUD and/or HMD can be utilized to present augmented reality ("AR") images, or virtual reality ("VR") images to the wearer. In some embodiments, a HUD and/or HMD can be used to enhance night vision, enabling the user to be more effective in industrial settings where light is low, or in gaming scenarios where night vision can aid in game play.

In some embodiments, headset 4000 may be constructed in such a way that the earpieces fit inside the ears rather than cover the ears. In these embodiments, headset 4000 is lighter and less cumbersome, and certain features, sensors, etc. are relocated. In embodiments that fit inside the ears, there is more situational awareness that is possible; this may be important in various industrial scenarios in which process noises, alerts, and emergency notifications need to be monitored for safety and/or productivity.

In various embodiments, headset 4000 may facilitate the ability to sense smoke and alert users to stop smoking. In some embodiments, sensors may be used to detect smoke and alert the user. A user may want to try and stop smoking cigarettes and need some coaching from headset 4000. A smoke sensor may be attached to connector point 4037*a-b* by the user or as displayed in attachable sensor example 4040. When a user lights a cigarette and smoke emits, an attachable sensor 4040 may detect the smoke, provide the information to processor 4055 and provide an alert to the user reminding them to stop smoking. This alert from the processor may be in the form of a vibration from vibration generator 4080, an audible alert saying, 'please stop smoking, it is bad for you' in speakers 4010*a-b*, or in any other forms of feedback (e.g. buzz, beep, chirp). Boom lights 4044 may display a color or pattern (e.g. red blinking) and/or display 4046 may provide an image to distract the user and remind the user to stop smoking (e.g. a video showing someone suffering from lung disease or a picture of their family). The alerts may be selected in advance by the user on a device (e.g., on a user device, peripheral device, personal computer, phone, etc.), loaded using network port 4060 and stored locally in data storage 4057.

In various embodiments, headset 4000 may facilitate the ability to sense smoke and provide safety warnings, with sensors used to detect smoke and alert the user or others around them. A user may be working in a warehouse or industrial setting in building 6802 with flammable substances. If a flammable substance ignites, the headset 4000 may detect the smoke and alert the user more quickly than human senses are possible. A smoke sensor may be attached to connector point 4037*a-b* by the user or as displayed in attachable sensor 4040. If a flammable substance ignites in an area away from the user, attachable sensor 4040 may detect the smoke, provide the information to processor 4055 and provide an alert to exit the area immediately. This alert from the processor may be in the form of a vibration from vibration generator 4080, an audible alert saying, 'smoke detected, please exit immediately and call 9-1-1' in speakers 4010*a-b*, lights 4042*a-b* flashing red to alert others around the user to evacuate and take the individual, boom lights 4044 on microphone boom 4016 may display a color or pattern (e.g. blinking red) and/or display 4046 may provide an image to alert the user to exit (e.g. a floor plan and path to the exit the room and building). Likewise, optical fibers 4072*a-b* may light up in orange for immediate visual alerts to others or emergency workers. The outward speaker 4074 may provide a high pitched burst of beeps to indicate the need to evacuate or a verbal warning that 'smoke has been detected, please exit immediately'. Attachable sensor 4040 may detect the type of smoke (e.g. chemical, wood, plastic) based on information stored in data storage 4057 and interpreted by processor 4055. If the smoke detected is from a chemical fire, communications to company safety teams may occur through internal satellite, Bluetooth® or other communications mechanisms within headset 4000 and housing 4008*a-b* to alert them to the type of fire for improved response and specific location. Projector 4076 may display a message on the wall indicating that 'smoke has been detected and it is a chemical fire—exit immediately—proceed to the wash station'. Also, the projector 4076 may display a map of building 6802 with the nearest exit or provide on display 4046.

In various embodiments, headset 4000 may facilitate the ability to sense various gases (e.g. natural gas, carbon monoxide, sulfur, chlorine) and provide safety warnings. In some embodiments, sensors (e.g. natural gas, carbon monoxide, sulfur) may be used to detect odors or gas composition (e.g. odorless carbon monoxide) and alert the user. A user may be working in their living room where a gas fireplace is located. During the day, the pilot light may go out, but the gas remains on due to a faulty fireplace gas sensor. The user's senses become saturated to a point they no longer smell the gas posing a danger to her family. The headset 4000 may detect the natural gas and alert the user more quickly than human senses are possible. A natural gas sensor may be attached to connector point 4037*a-b* by the user or as displayed in attachable sensor 4040. Attachable sensor 4040 may detect the natural gas, provide the information to processor 4055 and provide an alert to the user to exit the house immediately or open the windows and doors. This alert from the processor may be in the form of a headset vibration with vibration generator 4080, an audible alert saying, 'natural gas detected, please exit immediately and call 9-1-1' in speaker 4010*a-b* and/or outward speaker 4074, boom lights 4044 may display a color or pattern (e.g. blinking red) and/or display 4046 may provide an image to alert the user to exit (e.g. a floor plan and path to the exit the room and home). The attachable sensor 4040 may be used to detect the type of gas as well (e.g. natural gas, carbon monoxide, non-lethal sulfur, chlorine) based on information saved in data storage 4057 and interpreted by processor 4055. The headset 4000 may alert the fire department, other emergency agencies or family members with headsets through the communications mechanisms (e.g. antenna, satellite, Bluetooth®, GPS) within housing 4008*a-b* about the gas and composition and location of the user for more rapid response. Likewise, a research and development employee in building 6802 may be working on an experiment to make chlorine gas. Instead of adding small amounts of concentrated hydrochloric acid to the potassium permanganate solution, the researcher adds too much hydrochloric acid, creating an unstoppable reaction and creating too much lethal chlorine gas. The headset 4000 may immediately detect elevated levels of chlorine gas through the attachable sensor 4040 based on values in data storage 4057 and interpreted by processor 4055 and immediately alerts the employee, safety teams, public emergency works and other employees. This alert sent from processor 4055 may be in the form of a buzz from cushion sensor 4050, an audible alert in speaker 4010*a-b* saying, 'chlorine gas detected, please exit immediately and call 9-1-1', boom lights 4044 or headband lights 4042*a-b* may display a color or pattern (e.g. blinking and solid red variation) and/or display 4046 may provide an image to alert the user to exit (e.g. a floor plan and path to the nearest exit the room). Headset 4000 may alert the fire department, other emergency agencies, local safety team members or employees in close proximity with headsets through the internal communications (e.g. antenna, satellite, Bluetooth, GPS) within housing 4008*a-b* about the chlorine gas for more rapid and accurate response (e.g. correct equipment to combat the chlorine gas). Alerts (e.g. chlorine gas detected in room 6870) may also be displayed on building 6802 walls.

In various embodiments, headset 4000 may facilitate the ability for a user to progress through a checklist (e.g. recipe). In various embodiments, forward facing cameras 4022*a-b* may be able to detect steps on a checklist and assist the user. A user may store a recipe (e.g. pasta fagioli soup) in data storage 4057 using an electronic device (e.g. computer, phone, tablet) through network port 4060. This recipe may be interpreted by processor 4055 and stored in data storage 4057 with a unique name (e.g. pasta fagioli soup) for later retrieval. The user may access the recipe by speaking into microphone 4014 to request retrieval of the pasta fagioli soup using a voice command (e.g. 'retrieve pasta fagioli recipe'). As the user is preparing the soup, the forward facing camera 4022*a-b* on extendible stalk 4028 may capture the movements and steps and communicate with processor 4055. The processor may determine that the user has skipped adding a dash of tabasco sauce from the recipe and informs the user through speaker 4010*a-b* that a step was missed and tells the user the ingredient that was left out (e.g. tabasco). Likewise, display 4046 or projector 4076 may also show the steps of the recipe and indicate they are completed (e.g. crossing through the step, checking off the step). If a step is missed or performed out of order or incorrectly as determined by forward facing camera 4022*a-b* and processor 4055, the headset 4000 may provide alerts such as vibrations from the vibration generator 4080, notices on display 4046 (e.g. 'stop—a step was missed in the recipe'), boom lights 4044 may display yellow, outward speaker 4074 or speaker 4010*a-b* may provide verbal warnings (e.g. 'review steps or ingredients') of missed steps or missing ingredients. Likewise, a user may decide to by-pass the warning or message if they do not want to include the ingredient by pressing the button 4030*a-b* indicating to processor 4055 to skip the step or ingredient.

In various embodiments, headset 4000 may facilitate the ability to detect steps on a checklist and assist the user. A pilot or company may input the pre-flight checklist for all aircraft in the headset 4000 and save in data storage 4057 from an electronic device (e.g. computer, phone, digital tablet) through the network port 4060. The pilot, using microphone 4014, may request retrieval of the pre-flight checklist using a voice command (e.g. 'load pre-flight checklist for MD-11'). The pre-flight checklist may be shown on display 4046 as a reminder to the pilot along with scrolling capabilities. As the pilot is performing the pre-flight check, the forward facing camera 4022*a-b* may capture the movements and steps of the pilot during the pre-flight activities and communicate those with processor 4055. The accelerometer 4070*a-b* may detect that the head movement and focus did not occur on an element of the plane referenced in the checklist. The processor detects that the pilot may have skipped checking the flaps on the right wing and may inform the pilot through speaker 4010*a-b* (e.g. check right wing flaps), vibration to the pilot from vibration generator 4080 to alert the pilot of a missed step, colors on microphone boom lights 4044 (e.g. solid red) and/or communication to the flight control team through communication mechanisms (e.g. Bluetooth, satellite, cellular) that a step was missed. The flight control team may communicate directly to the pilot through the headset 4000 asking her to recheck the pre-flight steps or inform the captain. Likewise, display 4046 may also show the pre-flight checklist and indicate the completed (e.g. crossing through the step, checking off the step) or missing (e.g. highlighting in bold and red) steps.

In various embodiments, headset 4000 may facilitate the ability to coach a user through steps and provide analysis. There may be situations where repeating a step is needed for ongoing improvement and coaching analysis is needed. A new basketball player may have to shoot thousands of free throws to improve their performance. Coaching after every shot may not be appropriate. The headset 4000 with cameras 4022*a-b* may record each free throw taken by the player during practice. After every 50 shots, processor 4055 may perform an analysis of all shots and provide a coaching summary. The analysis may be in the form of written comments on display 4046 (e.g. 45% shots made, too many dribbles before shooting, not enough arch on the ball, too long of a delay before shooting), highlights of good and poor shots displayed on a wall with projector 4076 for review by the player, verbal feedback in speaker 4010*a-b* providing steps for improvement or encouragement (e.g. 'good shot'). Likewise, so as to not interrupt the player, feedback may be given to the coach or others watching. Headband lights 4042*a-b* may display green when processor 4055 determines the technique in shooting was performed well or red when improvements are needed. The coach observing the player may immediately see the lights and determine if they should stop the player and provide more coaching or encouragement.

In various embodiments, headset 4000 may facilitate the ability to coach or provide feedback to users regarding verification of performed steps. In some embodiments, a user may need to understand what steps of a process were missed for training purposes, but interruption during the process is not desired. A factory worker may be required to assemble small components on a computer board. The user may have been trained and now the employer needs to verify they can successfully complete the steps. The user wearing a headset 4000 begins to assemble the computer board. The forward facing cameras 4022*a-b* may record each step of assembly along with the duration of each step and communicate this information to processor 4055 and data storage 4057. Once the assembly is completed, processor 4055 may review the steps for accuracy and time and inform the user. The feedback may be through display 4046 or projector 4076 on a wall that a step was missed and/or the time to complete specific steps took too long (e.g. step 3 took 30 seconds and only 15 seconds is allocated). The user may make the necessary corrections and perform the steps again with headset 4000 until there are no missed assembly steps and the time to perform the steps are within an acceptable range. Likewise, when all steps are performed correctly and within an acceptable time, headband lights 4042*a-b*, lights 4026 or optical fibers 4072*a-b* may light up (e.g. solid green) to indicate to the supervisor that there are no issues. The factory worker may also get notification through boom lights 4044 (e.g. green) or display 4046 (e.g. "OK—great work") that there are no performance issues.

In various embodiments, headset 4000 may facilitate the ability to capture records of completing checklist items and/or assigned tasks for later recall. In some embodiments, there may be situations where a user needs to recall specific actions performed as proof that there were no deficiencies. In a manufacturing room where chemical cleaning occurs on parts, it may be necessary to provide evidence that a part was cleaned according to specific instructions and steps to defend the company's actions in court or appease an upset customer. Using headset 4000, forward facing cameras 4022*a-b* may record the actions of a user cleaning parts in the chemical room with acid tanks. The forward facing cameras record the specific part by reading the part measurements, barcode or image. The processor 4055 compares measurements or images to stored parts in data storage 4057 to retrieve the checklist or procedures for the specific part. While the user is cleaning the part, the forward facing cameras capture the video of the item, date, time, and procedures performed according to the documented checklist. This information may be stored in data storage 4057 for uploading to company databases from network port 4060 or other communications capabilities in housing 4008*a-b* (e.g. Bluetooth®, satellite, USB connection). In some embodiments, the information stored in data storage 4057 may be used as an audit trail which can be provided to company auditors, regulators, safety inspectors, etc. In various embodiments, a company may use information stored in data storage 4057 to prove in court that a part number was cleaned properly. The company may retrieve the part number and actions that were performed on the part to defend themselves in court. Likewise, they may retrieve all video of the part cleaning process to defend their standard operating procedure.

In various embodiments, headset 4000 may facilitate the ability to include a checklist with criteria that can be verified by eye gaze/head/body orientation. In some embodiments there may be situations where assembly line workers are needed to visually inspect items for quality control. An automobile manufacturer may require a visual inspection of final painted vehicles for scratches or paint flaws. The employee with a headset 4000 and forward facing cameras 4022*a-b* may inspect the automobiles coming off the assembly line. Accelerometers 4070*a-b* may be used to monitor eye gaze time and head movements to validate that a user is actually looking at the exterior of the automobile for defects and not in other locations. If the camera or accelerometer detects the user gazing in a direction other than the automobile, vibration from vibration generator 4080 may occur to alert the user to pay attention, a tone in speaker 4010*a-b* may occur (e.g. short chirping sound), headband lights 4042*a-b* may flash orange giving the supervisor and opportunity to coach the employee to pay more attention or the display 4046 may show a message to the worker to look in the direction of the automobile. Boom lights 4044 may also blink in red to alert the worker to pay attention.

In various embodiments, headset 4000 may provide an opportunity for another person to observe an action such as in industrial settings, construction, healthcare, fast food and the like without physically being in the room. In healthcare environments where highly contagious or seriously ill people require limited contact, it may be necessary for other medical professionals to assess the patient through the eyes of only one person in the room. A person suffering from meningitis may have a doctor with headset 4000 evaluate their condition while other physicians observe in remote locations. As this is a highly contagious disease, other doctors may want to evaluate them without entering the room. The forward facing cameras 4022*a-b* may record in the direction the physician is looking at the patient. The physician may dictate through microphone 4014 to turn on lights 4026 so she can evaluate the dilation of the eyes. A doctor watching in a remote location through the eyes of the on-site physician may notice a slow dilation response and ask the doctor in the room to perform a different alertness assessment. The physician may decide to prescribe a new drug and speak into microphone 4014 and show the dosage and drug interactions on display 4046 before writing the prescription. Later, the physician may want to perform a new evaluation technique but needs to see the exact process. Projector 4076 displays on the wall behind the patient the steps and video of the procedure before the doctor performs the evaluation. In some embodiments, evaluation of hearing may take place by having the physician request audible sounds be delivered from outward speaker 4074 so the patient can respond (e.g. hold up your hand if you hear a tone). The overall evaluation may be recorded by cameras 4022*a-b* and stored in data storage 4057 for future reference and training of interns.

In various embodiments, headsets may facilitate good cleaning practices. Office cleaning may become more important to remove germs and create a safe work environment. In some embodiments, maintenance personnel with headset 4000 may be instructed to spray the desk, wait for 30 seconds and wipe until dry, spending a minimum of 2 minutes per desk to ensure a safe work environment. During cleaning, forward facing cameras 4022*a-b* may collect the desk cleaning activities of the maintenance worker, send a record to processor 4055 for evaluation against standards and store the results in data storage 4057. The processor determines that in one situation cleaning spray was not applied and the speaker 4010*a-b* may alert the user to reclean the desk and apply a cleaning solution. The processor may also determine that desks are only being cleaned an average of 1 minute 30 seconds, not the required 2 minutes. Cushion sensor 4050 may provide a haptic response to the worker (e.g. buzz), while display 4046 reminds the worker with a message to clean each desk for 2 minutes and to redo the cleaning, and microphone boom lights flash in multicolors indicating the worker should reclean the surface. In some embodiments, this information may be sent from data storage 4057 by internal communications (e.g. Bluetooth®, satellite, cellular) in housing 4008*a-b* to the company facility and maintenance team databases for evaluation. This information may be reviewed with the cleaning company for improvement and compliance. Likewise, when employees approach their desk each day and don a headset 4000, the piezoelectric sensor 4082 may recognize the person is putting on a headset. Forward facing camera 4022*a-b* or GPS in the housing 4008*a-b* recognizes the specific desk and location. In some embodiments, processor 4055 may retrieve data from the company database and provide information regarding the cleaning status to display 4046 (e.g. all cleaned) and/or microphone boom lights 4044 (e.g. display solid green for cleaned desk or red for unclean desk) to the employee. Likewise, the employee may be presented with a brief video on display 4046 showing successful cleaning the night before indicating it is safe to sit and begin work.

In various embodiments, headset 4000 may allow a user to generate and transmit tags to other users, such as by recording an audio tag with microphone 4014 for storage in data storage 4057 and later transmission to central controller 110. Display 4046 may list available tag templates, available tag subjects/objects, tags received, aggregate tag information, etc. In some embodiments, buttons 4030*a-b* may be pressed in order to select items displayed on display 4046 or to issue tag-related commands (e.g. initiate a tag, apply a tag, store a tag, respond to a tag).

Figure 41:
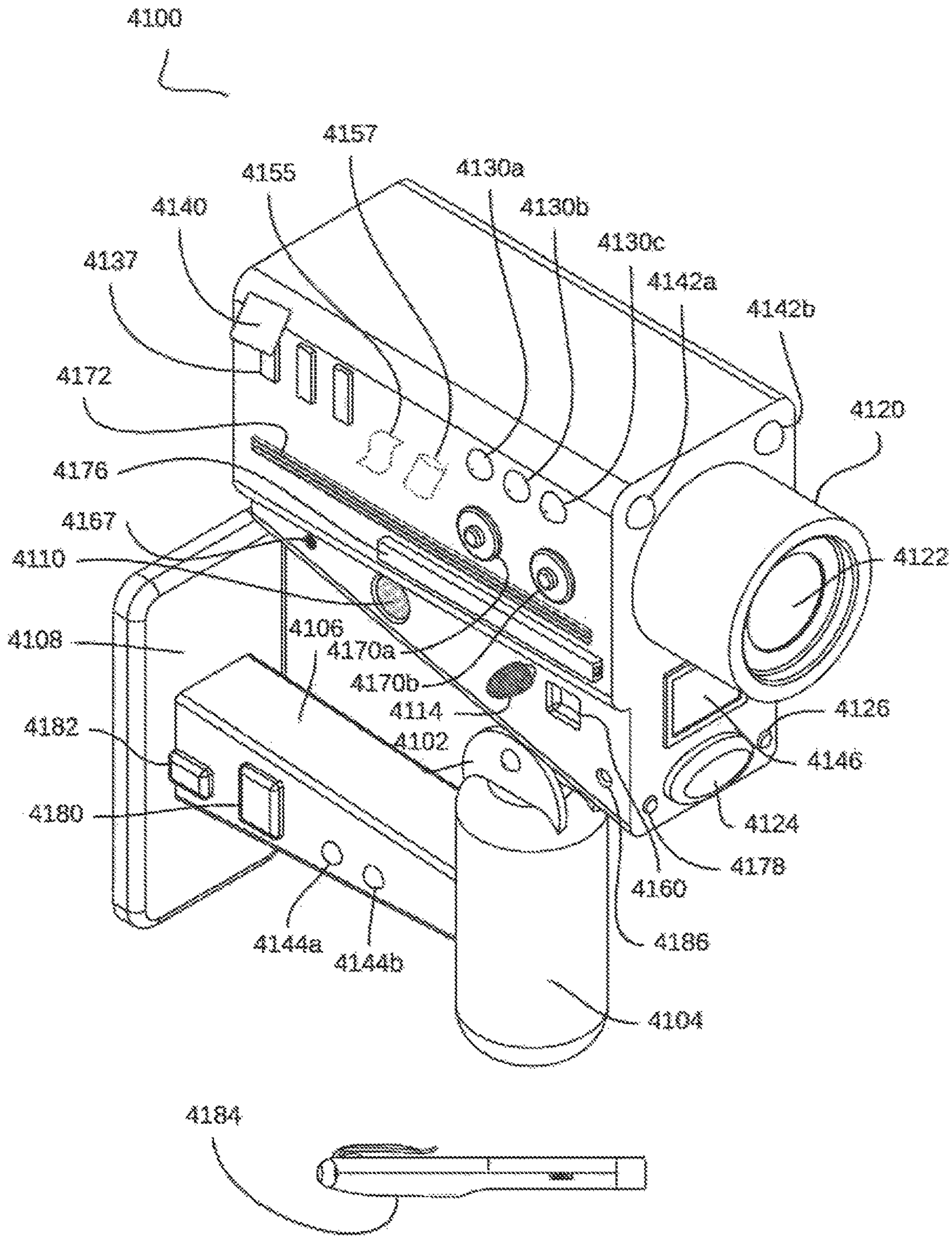
FIG. 41 depicts a camera consistent with at least some embodiments described herein.

With reference to FIG. 41, a camera 4100 according to some embodiments is shown. Mounting arm 4106 and mounting plate 4108 may serve as structural elements, in some embodiments serving to connect camera 4100 to a wall or other suitable surface that serves as a solid base. In some embodiments, rotational motor 4104 and rotational mechanism 4102 may also serve to function as mechanisms which may be used to pan, tilt, and swivel camera 4100, while also providing structure for anchoring camera 4100. In various embodiments, one or more of rotational mechanism 4102, rotational motor 4104, mounting arm 4106, and mounting plate 4108 may serve as a conduit for power lines, signal lines, communication lines, optical lines, or any other communication or connectivity between attached parts of the camera.

A speaker 4110 may be attached to the base of camera 4100, and allow for messages to be broadcast to users within hearing range. A microphone 4114 may be used to detect audio signals (e.g., user voices, crashing objects, dogs barking, kids playing in a pool, games being played).

A forward facing camera 4122 is shown at the front of camera 4100. In some embodiments, a side facing camera 4186 may be pointed 90 degrees in the other direction from forward facing camera 4122, allowing for a greater field of view, and in some embodiments enabling stereoscopic imaging when the two cameras are used together. Forward facing camera 4122 may be part of camera unit 4120 which may also include a sensor 4124 such as a rangefinder or light sensor. Sensor 4124 may be disposed next to forward facing camera 4122. In some embodiments, sensor 4124 may be a laser rangefinder. The rangefinder may allow the camera to determine distances to surrounding objects or features. In one embodiment, sensor 4124 includes night vision capability which can provide data to processor 4155, which can identify safety issues (e.g. an object blocking a pathway) even in low light situations. Camera unit 4120 may include one or more camera lights 4142*a* and 4142*b* which can help to illuminate objects captured by forward facing camera 4122. A thermal sensor 4126 may also be disposed next to forward facing camera 4122, and allow infrared wavelengths to be detected which can be used to detect hot machine parts, user temperatures, leaking window seals, etc. A projector 4176 and laser pointer 4178 may also be positioned on camera 4100 so as to output in the direction in which forward facing camera is facing. In some embodiments, projector 4176 and laser pointer 4178 may include rotational capabilities that allow them to point in directions away from forward facing camera 4122.

Buttons 4130*a*, 4130*b*, and 4130*c* may be available to receive user inputs. Exemplary user inputs might include instructions to change the volume, instructions to activate or deactivate a camera, instructions to mute or unmute the user, or any other instructions or any other inputs.

In various embodiments, camera 4100 may include one or more attachment structures 4137 consisting of connector points for motion sensors, motion detectors, accelerometers, gyroscopes, and/or rangefinders. Attachment structure 4137 may be electrically connected with processor 4155 to allow for flow of data between them. Attachment structure 4137 could include one or more points at which a user could clip on an attachable sensor 4140. In some embodiments, standard size structures could enable the use of many available attachable sensors, enabling users to customize the camera with just the types of attachable sensors that they need for a particular function. For example, a manufacturing facility might select several types of gas sensors to be attached to attachment structure 4137. In some embodiments, a user may take a sensor from attachment structure 4137 and clip it to their clothing (or to another user's clothing) and then later return the sensor to attachment structure 4137.

In various embodiments, instead of forward facing camera 4122, camera 4100 may include a 360-degree camera on top. This may allow for image capture from all directions around the environment. In some embodiments, camera lights 4142*a* and 4142*b* may be capable of illuminating a user, such as the user's face or skin or head or other body part, or the user's clothing, or the user's accessories, or some other aspect of the user. When activated, such lights might signal to users that there is a safety issue in the area of view of camera 4100.

Display 4146 may be directly beneath camera 4122. In various embodiments, display 4146 faces towards a prospective user. This may allow a user to view graphical information that is displayed by camera 4100, such as messages (e.g. maximum room occupancy has been exceeded, there is water on the floor, a child just dropped a hazardous object on the floor).

Terminal 4167 may serve as an attachment point for electronic media, such as for USB thumb drives, for USB cables, or for any other type of media or cable. Terminals 4167 may be a means for charging camera 4100 (e.g., if camera 4100 is wireless). Data storage 4157 may comprise non-volatile memory storage. In some embodiments, this storage capacity could be used to store software, user images, business files (e.g. documents, spreadsheets, presentations, instruction manuals), books (e.g. print, audio), financial data (e.g. credit card information, bank account information), digital currency (e.g., Bitcoin™), cryptographic keys, user biometrics, user passwords, names of user friends, user contact information (e.g. phone number, address, email, messaging ID, social media handles), health data (e.g. blood pressure, height, weight, cholesterol level, allergies, medicines currently being taken, age, treatments completed), security clearance levels, message logs, GPS location logs, current or historical environmental data (e.g. humidity level, air pressure, temperature, ozone level, smoke level, CO2 level, CO level, chemical vapors), and the like. In various embodiments, camera 4100 includes a Bluetooth® antenna (e.g., an 8898016 series GSM antenna) (not shown). In various embodiments, camera 4100 may include any other type of antenna. In various embodiments, camera 4100 includes an earbud (not shown), which may be a component that fits in the ear (e.g., for efficient sound transmission).

Camera 4100 may also include accelerometers 4170*a* and 4170*b* which are capable of detecting the orientation of camera 4100 in all directions and the velocity of camera 4100. Optical fibers 4172 are thin strands of diffusing optical fiber. These may include optical glass fibers where a light source, such as a laser, LED light, or other source is applied at one end and emitted continuously along the length of the fiber. As a consequence, the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., red when a user is in an environment with low oxygen levels), or provide diverse and/or visually entertaining lighting configurations.

Network port 4160 may allow for data transfers with user devices, peripheral devices, and/or with central controller 110. Mounting arm lights 4144*a* and 4144*b* may help to illuminate the view of camera 4100, and in some embodiments may be used to communicate to users (e.g., flashing red as a warning).

In some embodiments, a smell generator 4180 is capable of generating smells which may be used to alert the user or to calm down the user. Vibration generator 4182 may be used to generate vibrations that a user feels, such as a vibration that travels along a wall emanating from mounting plate 4108.

Supplemental camera 4184 may be associated with camera 4100, but be mobile and thus may be used to get video or photos from other angles and from other places. It may include a clip which allows supplemental camera 4184 to be attached to objects or clothing. In some embodiments, supplemental camera 4184 may store photos and video, or transmit them in realtime to camera 4100. In various embodiments, the supplemental camera is wired to camera 4100 to facilitate the transfer of data and to supply power. In some embodiments, the supplemental camera may include one or more capabilities of GPS, wireless communications, processing, data storage, a laser pointer, range finder, sensors, etc.

In various embodiments, camera 4100 may facilitate the ability to sense smoke and provide safety warnings, with sensors used to detect smoke and alert the user or others around them. A user may be working in a warehouse or industrial setting in building 6802 with flammable substances. If a flammable substance ignites, the camera 4100 may detect the smoke and alert the user more quickly than human senses are possible. A smoke sensor may be attached to attachment structure 4137 by the user or as displayed in attachable sensor 4140. If a flammable substance ignites in an area away from the user, attachable sensor 4140 may detect the smoke, provide the information to processor 4155 and provide an alert to exit the area immediately. This alert from the processor may be in the form of a vibration from vibration generator 4182, an audible alert saying, 'smoke detected, please exit immediately and call 9-1-1' from speaker 4110, camera lights 4142 flashing red to alert others around the user to evacuate and take the individual, and/or display 4146 may provide an image to alert the user to exit (e.g. a floor plan and path to the exit the room and building). Likewise, optical fibers 4172 may light up in orange for immediate visual alerts to others or emergency workers. The speaker 4110 may provide a high pitched burst of beeps to indicate the need to evacuate or a verbal warning that 'smoke has been detected, please exit immediately'. Attachable sensor 4140 may detect the type of smoke (e.g. chemical, wood, plastic) based on information stored in data storage 4157 and interpreted by processor 4155. If the smoke detected is from a chemical fire, communications to company safety teams may occur through internal satellite, Bluetooth® or other communications mechanisms within camera 4100 to alert them to the type of fire for improved response and specific location. Projector 4176 may display a message on the wall indicating that 'smoke has been detected and it is a chemical fire—exit immediately—proceed to the wash station'. Also, the projector 4176 may display a map of building 6802 with the nearest exit or provide on display 4146.

In various embodiments, camera 4100 may facilitate a user to generate and transmit tags to other users, such as by recording an audio tag with microphone 4114 (or video tag with camera 4122) for storage in data storage 4157 and later transmission to central controller 110. Display 4146 may list available tag templates, available tag subjects/objects, tags received, aggregate tag information, etc. In some embodiments, buttons 4130*a-c* may be pressed in order to select items displayed on display 4146 or to issue tag-related commands (e.g. initiate a tag, apply a tag, store a tag, respond to a tag).

Figure 42:
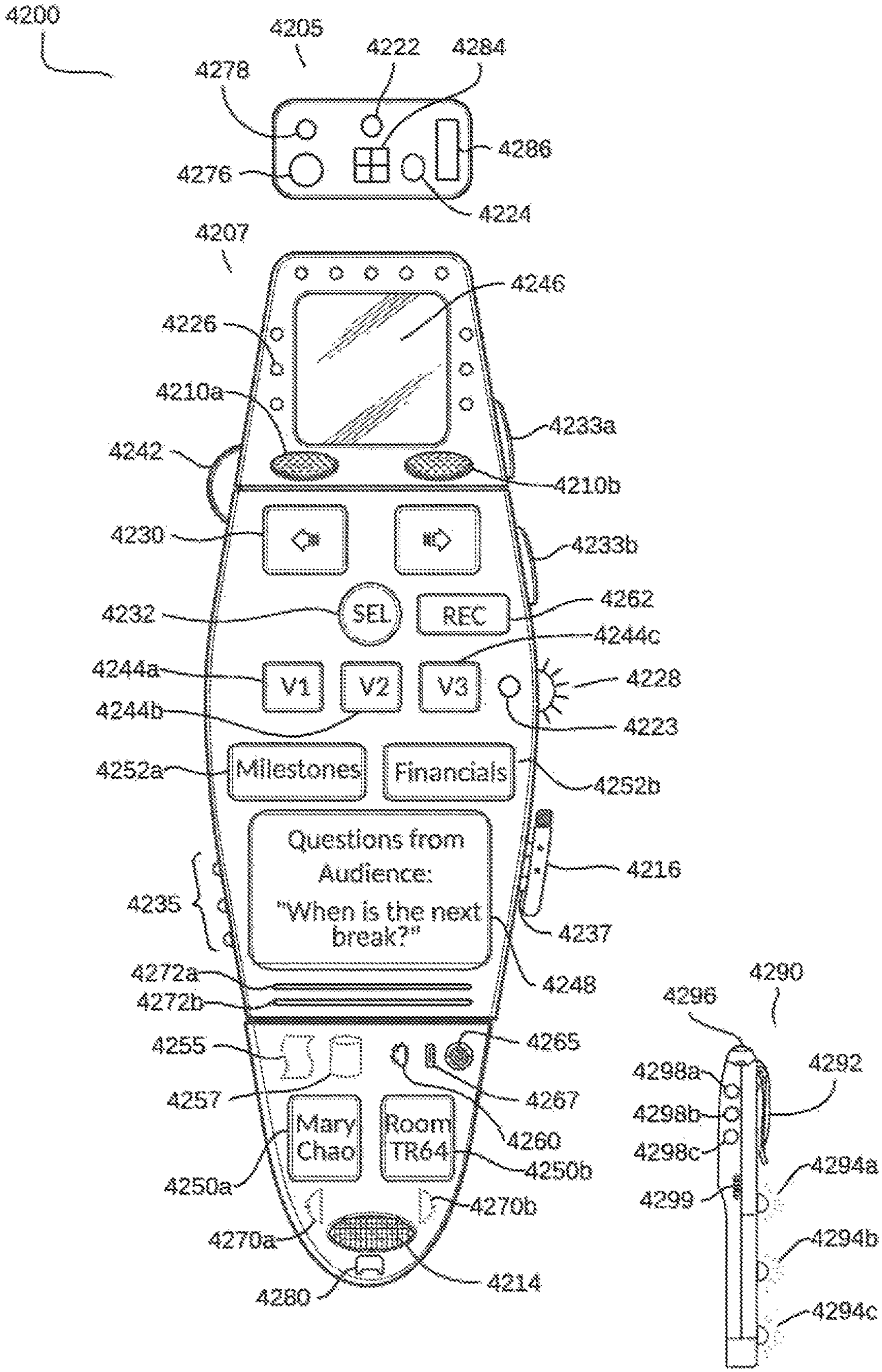
FIG. 42 is a presentation remote consistent with at least some embodiments described herein.

With reference to FIG. 42, a presentation remote 4200 according to some embodiments is shown. Two views of the presentation remote are shown: a top view 4207 and a front view 4205 (which shows elements at the front of the presentation remote in the direction in which it may be pointed). While various elements of presentation remote 4200 are described here in particular locations on/in the device, it is understood that elements may be placed in many different locations and configurations. Presentation remote 4200 may take many forms, such as being incorporated into a headset, projector, hat, belt, eyeglasses, chair, conference table, mouse, keyboard, etc.

Front view 4205 includes a forward facing camera 4222 at the front of presentation remote 4200 which may capture photos/video of objects (e.g. capturing an image/video of one or more meeting attendees, capturing an image of the setup of a room, capturing an image of a presentation slide) that the presentation remote is pointed at. In various embodiments, instead of (or in addition to) forward facing camera 4222, presentation remote 4200 may include a 360-degree camera. This may allow for a wider field of image capture. In various embodiments, an inward facing camera 4223 may be pointed toward the user of the device, allowing the capture of facial expressions of the user, biometric information of the user (e.g. iris, face geometry), gesture commands, etc. Front view 4205 also shows a sensor 4224 such as a rangefinder or light sensor. Sensor 4224 may be disposed next to forward facing camera 4222. In one embodiment, sensor 4224 includes night vision capability which can provide data to processor 4255, which can identify safety issues (e.g. an object blocking a pathway) even in low light situations. In another embodiment, sensor 4224 may be a thermal sensor which allows infrared wavelengths to be detected which can be used to detect hot machine parts, user temperatures, leaking window seals, etc. Front view 4205 may include one or more camera lights (not shown) which can help to illuminate objects captured by forward facing camera 4222. A projector 4276 and laser pointer 4278 may also be positioned on presentation remote 4200 so as to output in the direction in which forward facing camera 4222 is facing. In some embodiments, projector 4276 and laser pointer 4278 may include rotational capabilities that allow them to point in directions away from forward facing camera 4222. In some embodiments, laser pointer 4278 may be capable of displaying different colors, may flash in order to get the attention of the presenter and/or meeting participants, may display a variety of icons or symbols, may “draw” an image or text by quick movements of laser pointer 4278, etc. Front view 4205 may also include range finder 4284 which may be a laser rangefinder. The rangefinder may allow the presentation remote to determine distances to surrounding objects or people, and/or determine distances to a screen on which a presentation is being projected. A barcode reader 4286 may also be used, allowing presentation remote 4200 to read barcodes, such as a barcode on the wall of a meeting room which contains information about the room, or one or more barcodes incorporated into a presentation that provide supplemental information. Barcode reader 4286 may also be used to scan barcodes of objects (such as supplemental device 4290) in order to register that device with presentation remote 4200. In some embodiments, tag information attached to one or more elements of a presentation slide may be read using barcode reader 4286.

Presentation remote 4200 may include one or more physical buttons and/or one or more virtual buttons (e.g. small displays that can register touch input from a user). Selection button 4232 may allow a user to select from various options (e.g. a list of presentation files, names of meeting participants, tag information) presented on display screen 4246. Forward and back buttons 4230 may allow the user to step forward or backward in the slides of a presentation. Side buttons 4233*a* and 4233*b* may be physical (or virtual) buttons that allow a user to provide input while holding presentation remote 4200 in one hand even when looking in a different direction. Configurable buttons 4244*a*, 4244*b*, and 4244*c* may be virtual buttons that a user can define to allow for customizable functionality when pressed (e.g. pressing 4244*a* retrieves v1 of a presentation, pressing 4244*b* retrieves v2 of a presentation, pressing 4244*c* retrieves v3 or a presentation). Jump buttons 4252*a* and 4252*b* may be virtual buttons that can be programmed to jump to predetermined locations within a presentation (e.g. pressing jump button 4252*a* may bring up a ‘milestones’ slide that has an embedded tag named ‘milestones’) which may reduce having to go forward or back through many slides in order to get to a particular slide that is often used in a presentation. Exemplary user inputs might include entering data, changing slides, initiating presentation software, saving a voice file of an idea, selecting from options, identifying a meeting participant from an image, instructions to change the volume, instructions to activate or deactivate a camera, instructions to mute or unmute the user, or any other instructions or any other inputs. In some embodiments, another form of input is a scroll wheel, which allows for selections from display 4246 or other forms of input (e.g. moving forward or backward within a presentation, moving up or down in a list).

In various embodiments, presentation remote 4200 includes lights as signaling, alerts, communication, etc. Facing lights 4226 may be disposed around display 4246, and could alert a user by flashing when a new message or notification is displayed on the display. In some embodiments, facing lights could be associated with particular participants in a room. For example, six facing lights could be individually connected to supplemental devices 4290 of six meeting participants, so that a user of presentation remote 4200 would see one of the facing lights light up when that particular participant wanted to speak. Side lights 4228 could be used to signal to meeting participants, such as by flashing when a meeting break time has ended.

In various embodiments, presentation remote 4200 may include an attachment structure 4237 consisting of connector points for motion sensors, motion detectors, accelerometers, gyroscopes, microphones, speakers, accelerometers, supplemental devices, rangefinders, etc. Attachment structure 4237 may be electrically connected with processor 4255 to allow for flow of data between them. Attachment structure 4237 could include one or more points at which a user could clip on an attachable sensor (not shown). In some embodiments, standard size structures could enable the use of many available attachable sensors, enabling users to customize the presentation remote with just the types of attachable sensors that they need for a particular function. In some embodiments, a user may take a sensor from attachment structure 4237 and clip it to their clothing (or to another user’s clothing) and then later return the sensor to attachment structure 4237. A detachable microphone 4216 might be removed and placed in the middle of a conference room table in order to capture audio from the meeting, such as capturing what participants are saying.

In some embodiments, a record button 4262 may allow a user to store audio or video during a meeting or presentation. For example, a brainstorming session facilitator may press record button 4262 to record an idea, then press record button 4262 again to stop the recording and save the audio file to data storage 4257. The facilitator might then use presentation remote 4200 to transmit that audio file of the idea to another user.

Speakers 4210*a* and 4210*b* may allow for messages to be broadcast to users and for others (such as meeting participants) who are within hearing range. A microphone 4214 may be used to detect audio signals (e.g., voice of the user, voice of the presenter, room sounds, participant sounds).

Display 4246 may allow for messaging and displaying options to a user. In various embodiments, display 4246 faces towards a prospective user. This may allow a user to view graphical information that is displayed by presentation remote 4200, such as messages (e.g. meeting participants want to take a break, one meeting participant has not returned from a break, tags received from meeting participants, aggregate tag information about a meeting). In some embodiments, display 4246 is touch enabled so that options (e.g. list of presentation versions to use, list of tags received, list of tag subjects, list of participants in the room, list of questions that participants have asked) on display 4246 may be selected by a user touching them. In other embodiments, a user may employ selection button 4232 to select from items listed on display 4246. In some embodiments, a secondary display 4248 allows for additional information to be provided to the user, such as by displaying questions that have been received by an audience or meeting participants. Communication displays 4250*a* and 4250*b* may be touch enabled, allowing a user to touch one or more displays 4250*a-b* which show options to a user. In one example, communication display 4250*a* shows "Mary Chao" and will call her or open other forms of communication (e.g. text, instant messaging) when selected by a user. Similarly, touching communication display 4250*b* may open an audio channel to meeting room TR68 so that a meeting owner might check on whether or not that particular room was currently occupied, or to open communications with that room, such as for the purposes of asking an expert in that room to provide some needed knowledge.

Terminal 4267 may serve as an attachment point for electronic media, such as for USB thumb drives, for USB cables, or for any other type of media or cable. Terminal 4267 may be a means for charging presentation remote 4200 (e.g., if presentation remote 4200 is wireless). Processor 4255 may provide computational capability needed for the functionality (e.g. running software, managing communications, directing elements such as lights, processing inputs) of presentation remote 4200. Data storage 4257 may comprise non-volatile memory storage. In some embodiments, this storage capacity could be used to store software, presentations, user images, tag information, business files (e.g. documents, spreadsheets, presentations, instruction manuals), books (e.g. print, audio), financial data (e.g. credit card information, bank account information), digital currency (e.g., Bitcoin™), cryptographic keys, user biometrics, user passwords, names of user friends, user contact information (e.g. phone number, address, email, messaging ID, social media handles), health data (e.g. blood pressure, height, weight, cholesterol level, allergies, medicines currently being taken, age, treatments completed), security clearance levels, message logs, GPS location logs, current or historical environmental data (e.g. humidity level, air pressure, temperature, ozone level, smoke level, CO2 level, CO level, chemical vapors), and the like. In various embodiments, presentation remote 4200 includes a Bluetooth® antenna (e.g., an 8898016 series GSM antenna) (not shown). In various embodiments, presentation remote 4200 may include any other type of antenna. In various embodiments, presentation remote 4200 includes an earbud (not shown), which may be a component that fits in the ear (e.g., for efficient sound transmission).

Presentation remote 4200 may also include accelerometers 4270*a* and 4270*b* which are capable of detecting the orientation of presentation remote 4200 in all directions and the velocity of presentation remote 4200. Accelerometers can aid in determining the direction in which presentation remote 4200 is pointed (e.g. for determining which meeting participant that it is pointed at so as to identify the subject of a tag), as well as detecting the movements of a user (e.g. a presenter) during a presentation of meeting facilitation. Optical fibers 4272*a* and 4272*b* are thin strands of diffusing optical fiber. These may include optical glass fibers where a light source, such as a laser, LED light, or other source is applied at one end and emitted continuously along the length of the fiber. As a consequence, the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., red when a presentation is expected to exceed a meeting end time), or provide diverse and/or visually entertaining lighting configurations.

Network port 4260 may allow for data transfers with supplemental devices 4290, user devices, peripheral devices, and/or with central controller 110.

In some embodiments, tactile dots 4235 may include a small elevated or protruding portion designed to make contact with the user's skin when presentation remote 4200 is held. This could allow for embodiments in which processor 4255 could direct a haptic signal to alert a user via tactile dots 4235, or direct heat via heating element 4265, or provide a puff of air.

In some embodiments, a smell generator 4280 is capable of generating smells which may be used to alert the user or to calm down the user. Vibration generator 4282 may be used to generate vibrations that a user feels, such as a vibration (e.g. an alert to the user) that travels through presentation remote 4200.

Supplemental device 4290 may be associated with presentation remote 4200, but be mobile and thus may be provided to other users (e.g. meeting participants) in order to provide input and/or output capability during a meeting or presentation. It may include a clip 4292 which allows supplemental device 4290 to be attached to objects or clothing. In some embodiments, supplemental device 4290 may store photos and video, or transmit them in realtime to presentation remote 4200. In various embodiments, the supplemental device is wired to presentation remote 4200 to facilitate the transfer of data and to supply power. In some embodiments, the supplemental device may have display capabilities and/or include one or more capabilities of GPS, wireless communications, processing, data storage, a laser pointer, range finder, sensors, accelerometers, voting software, feedback software, signaling, vibrations, etc. In some embodiments, supplemental device 4290 includes signaling lights 4294*a*, 4294*b*, and 4294*c* which may be directed by presentation remote 4200 to light up (in many colors) in order to communicate to meeting participants. In various embodiments, signaling lights 4294*a-c* may also be under the control of the user, allowing a user to provide visual feedback to a presenter or to other participants in a meeting. In some embodiments, colors indicated via signaling lights 4294*a-c* may indicate that two participants are in alignment, that a participant would like to speak, that a participant is not clear about something, that a participant has a candid observation that they would like to make, etc. A supplemental camera 4296 may be used by a meeting participant to capture images (e.g. a whiteboard with brainstorming notes, photos of other participants, broken object in a room) and/or videos (e.g. capturing a meeting participant explaining a decision that has been made in a meeting). In some embodiments, input buttons 4298*a*, 4289*b*, and 4298*c* allow users to provide information (e.g. voting, ratings, tags, selections from options, questions, identifications or other participants, to presentation remote 4200 or to other supplemental devices 4290. Similarly, slider 4299 may allow for inputs from a user (e.g. providing a rating of meeting quality on a sliding scale).

In various embodiments, presentation remote 4200 may include communications functionality so that a user may connect to another user (e.g. over a phone network, cell network, WiFi, instant messaging, email) and communicate synchronously and/or asynchronously. In such an embodiment, microphone 4214 and speakers 4210*a* and 4210*b* may enable the user to speak and hear responses from another user. In one example, a presenter may point presentation remote 4200 at a meeting participant in order to initiate a text messaging channel so that the presenter may communicate in a side channel with the participant which does not disrupt the flow of the meeting. In some embodiments, meeting participants may text messages (e.g. feedback, questions, ratings) to presentation remote 4200 which are then displayed on display 4246.

In various embodiments, presentation remote 4200 may facilitate the ability to sense smoke and provide safety warnings, with sensors used to detect smoke and alert the user or others around them. If the smoke detected is from a chemical fire, communications to company safety teams may occur through internal satellite, Bluetooth® or other communications mechanisms within presentation remote 4200 to alert them to the type of fire for improved response and specific location. Projector 4276 may display a message on the wall indicating that 'smoke has been detected and it is a chemical fire—exit immediately—proceed to the wash station'. Also, the projector 4276 may display a map of a building with the nearest exit or provided on display 4246.

In various embodiments, presentation remote 4200 may facilitate the ability for a user to manage checklists (e.g. recipes, task lists, chores lists) as described more fully in FIG. 41.

Figure 43:
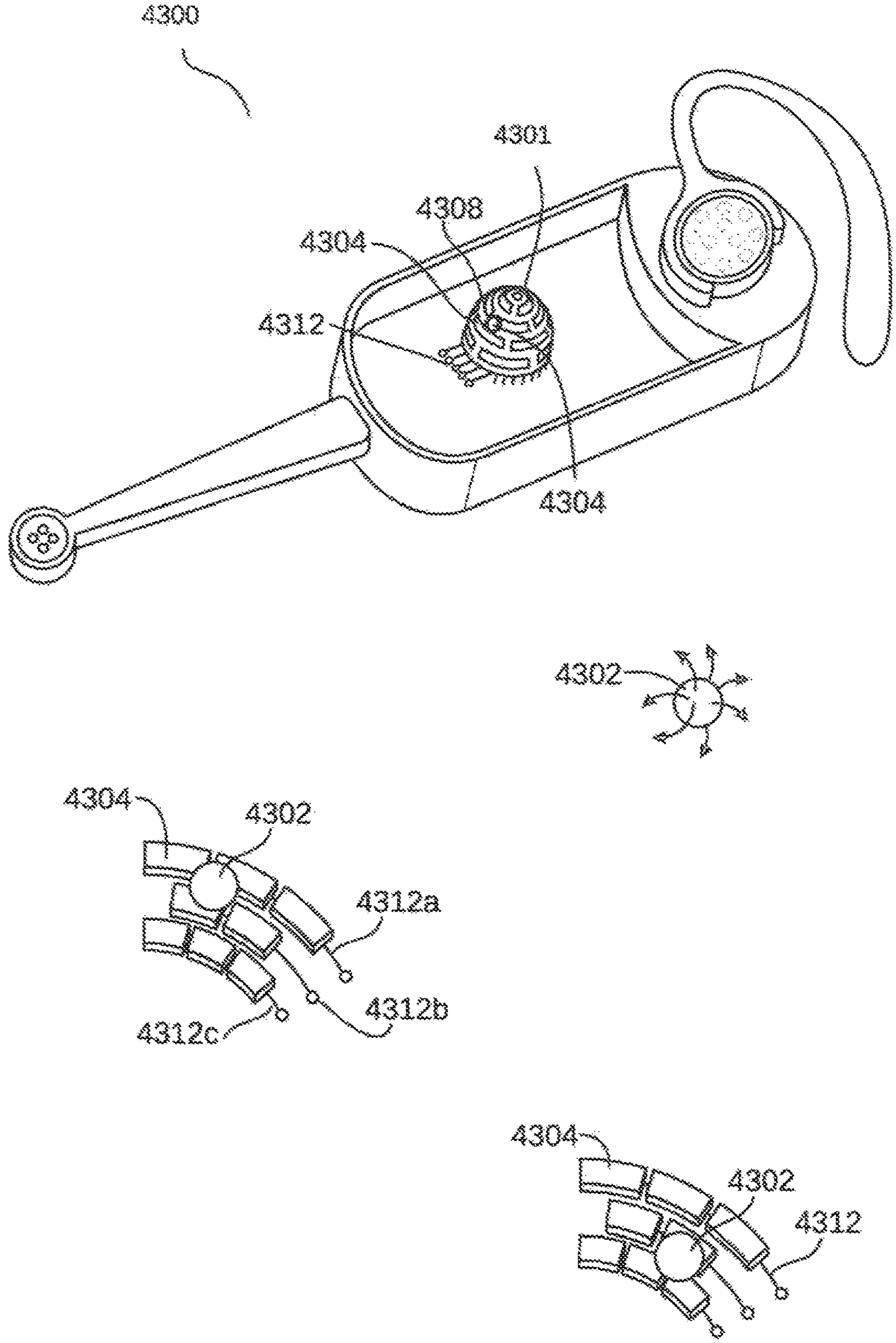
FIG. 43 is a headset with motion sensor consistent with at least some embodiments described herein.

With reference to FIG. 43, a headset 4300 with motion sensor 4301 according to some embodiments is shown. While FIG. 43 depicts a headset, motion sensor 4301 could just as well be a component of any other peripheral (e.g., camera, presentation remote). Motion sensor 4301 comprises a capsule 4308, which may be substantially spherical in shape. Multiple fixed conductors 4304 line the inside of capsule 4308. A movable conductor 4302 is free to move about inside the capsule. Movable conductor 4302 may be substantially spherical in shape. Fixed conductors 4304 may be in electrical communication with one of a plurality of wires 4312 (e.g., with wires 4312*a*, 4312*b*, and 4312*c*). In various embodiments, adjacent wires (e.g., 4312*a* and 4312*b*) are of opposite polarities (e.g., one is grounded while the other is connected to the positive supply voltage). When movable conductor 4302 bridges the gap between two fixed conductors on adjacent wires (e.g., between wires 4312*a* and 4312*b*), a circuit is completed.

The circuit completion can be detected by a logic gate bridging the two particular wires that are now in electrical communication. For example, an "AND" gate is connected at one input to the positive voltage supply (e.g., via wire 4312*a*), and at the other input (e.g., via wire 4312*b*), through a resistor, to ground. Normally, with only one input connected to the positive voltage supply (i.e., to logic "1"), the AND gate will output a "0" signal. However, when movable conductor 4302 bridges the two wires connecting to the respective inputs of the AND gate, both inputs will now be logically positive, and the AND gate will output a "1" signal. Depending on which AND gate outputs a logical "1" at any given time, it may be determined which two wires are being bridged by the movable conductor 4302. In various embodiments, other methods (e.g., other logic gates, etc.) may be used to determine which wires are bridged at any given time.

By sequentially detecting which wires are being bridged, a trajectory (or some information about a trajectory) of movable conductor 4302 may be inferred. Since movable conductor 4302 is under the influence of gravity, it may thereby be inferred how the headset has moved so as to change the relative location of movable conductor 4302 within capsule 4308. For example, if movable conductor 4302 is detected bridging wires 4312*a* and 4312*b*, it may be inferred that such wires are closest to the physical ground at the moment. In various embodiments, headset 4300 may contain multiple capsules, each with wires in different orientations relative to one another. In this way, for example, more precise positioning information may be obtained.

In various embodiments, repeatedly sampled position information from one or more sensors such as sensor 4301 may be differentiated to obtain velocity information, and may be twice differentiated to obtain acceleration information.

As will be appreciated, sensor 4301 represents a method of obtaining motion data according to some embodiments, but any suitable sensor or sensors may be used in various embodiments.

Motion sensor 4301 and other motion sensors may be found in U.S. Pat. No. 8,315,876, entitled "Headset wearer identity authentication with voice print or speech recognition" to Reuss issued Nov. 20, 2012, at columns 7-9, which is hereby incorporated by reference.

Call Platforms

Figure 44:
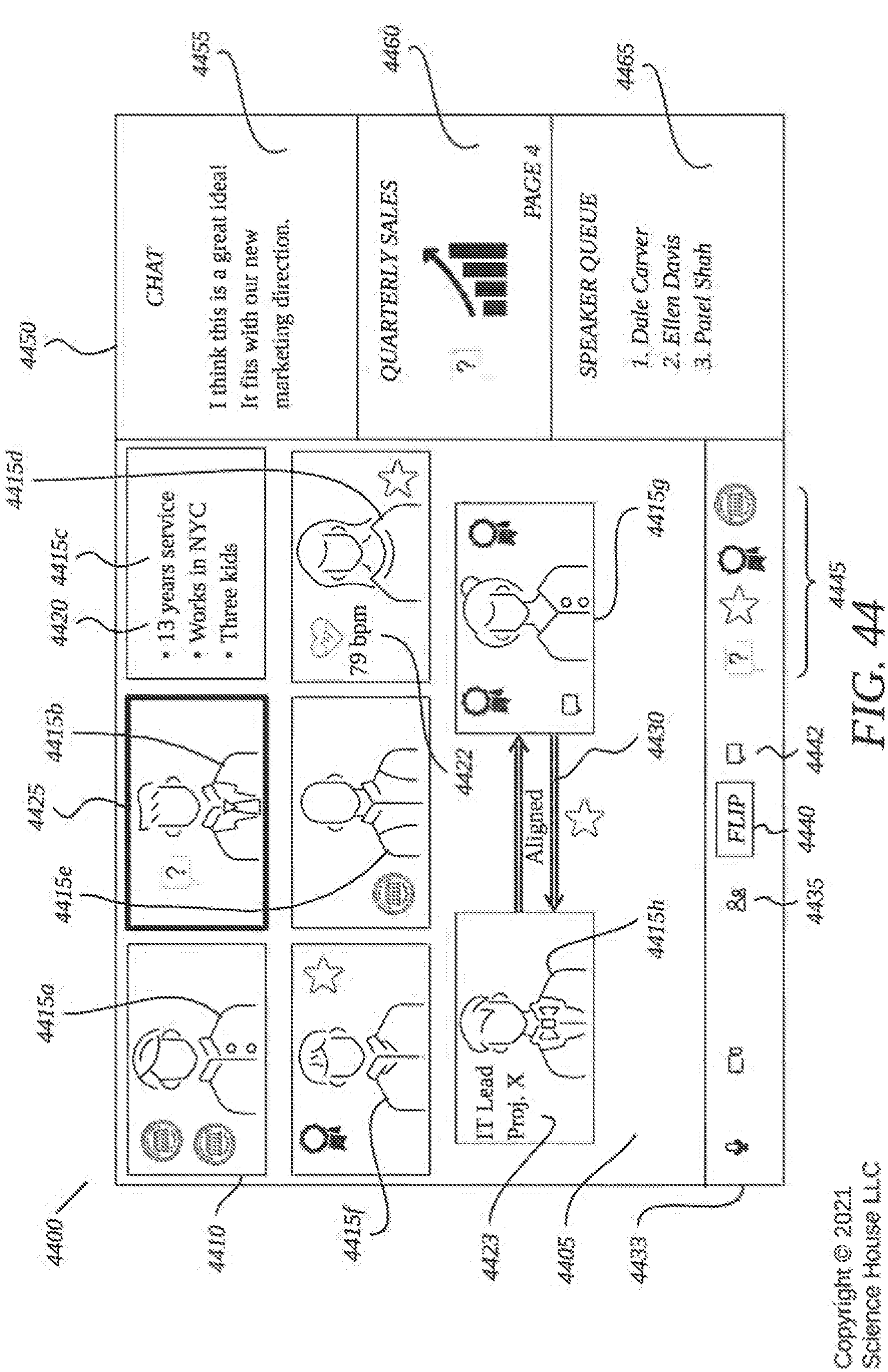
FIG. 44 is user interface for a virtual call consistent with at least some embodiments described herein.

With reference to FIG. 44, a display 4400 of call platform software from an app used by meeting participants according to some embodiments is shown. The depicted screen shows app functionality that can be employed by a user to participate in a virtual meeting in which participants may see each other during a virtual call. In some embodiments, data communication is managed through central controller 110 or network 104. In FIG. 44, the app may allow participants to join or leave the call at will, and various controls and features allow participants functionality during calls (e.g. sending text messages, displaying a presentation deck, being placed in a call queue, generating tags associated with other participants, generating tags associated with aspects of the call, receiving additional information about other call participants, providing rewards to other participants, highlighting one or more participants). Various embodiments contemplate that an app may receive data from peripheral devices used by meeting participants (e.g. headsets, presentation remote, keyboard, mice, cameras, desktop or laptop computers) and or user devices (e.g. smartphone).

FIG. 44 illustrates a respective graphical user interface (GUI) as it may be output on a peripheral device, mobile device, or any other device (e.g. on a mobile smartphone). The GUI may comprise several tabs or screens. The present invention allows for a greater variety of display options that make meetings more efficient, effective, and productive. Some embodiments can make calls more entertaining and help to bring up engagement levels and mitigate call fatigue. In accordance with some embodiments, the GUI may be made available via a software application operable to receive and output information in accordance with embodiments described herein. It should be noted that many variations on such graphical user interfaces may be implemented (e.g., menus and arrangements of elements may be modified, additional graphics and functionality may be added). The graphical user interface of FIG. 44 is presented in simplified form in order to focus on particular embodiments being described.

Display 4400 includes a GUI that represents callers in a single gallery view 4405. In this illustration, there are eight grid locations 4410 within the gallery view 4405, each of which contains one of callers 4415*a-h*. In this embodiment, a caller can see an image of other callers while verbally interacting with them. In some embodiments, the effectiveness of virtual meetings/calls is enhanced by allowing users to set a preferred grouping or ordering of gallery view 4405 based on a user's preferences—such as grouping caller images by hierarchy, job function, seniority, team, meeting role, etc. Call participants can take direct actions to manage the gallery view 4405 of participants on a call in a way that enhances the user's call experience. Call participants could be provided the ability to move the images of callers 4415*a-h* around during a call, ordering and placing the images in a way that is most beneficial to the user. For example, a user could click on caller image 4415*a-h* with a mouse and drag that image to a new grid location 4410. A user could drag multiple gallery images to form a circle, with the new image locations stored in an image location field of a gallery database stored with the central controller or call platform software. This stored set of image locations forming a circle could be associated with a keyword such that the user could, upon the initiation of subsequent similar calls, type in the keyword to retrieve the desired locations and have the current gallery images placed into a circular arrangement. A user could also double click on a caller image to remove it, gray it out, make it black and white, make it more transparent, eliminate the background, or crop it (such as cropping to non-rectangles such as circles, ovals, or hexagons), or make the image smaller. In some embodiments, a user may click on and drag a caller image with buttons 4230*a* and 4230*b* of presentation remote 4200.

Caller images 4415*a-h* can include still photos of the user, a drawing of the user, a video stream of a user, etc. In one embodiment of the present invention, a user can create a cartoon character as a video call avatar that embodies elements of the user without revealing all of the details of the user's face or clothing. For example, the user could be represented in the call as a less distinct cartoon character that provided a generic looking face and simplified arms and hands. The character could be animated and controlled by the user's headset (or a webcam of the user's computer detecting head movement). A user might create a cartoon character, but have his headset track movement of his head, eyes, and mouth. In this embodiment, when the user tilts his head to the left an accelerometer in his headset registers the movement and sends the movement data to the headset's processor and then to the call platform software which is in control of the user's animated avatar, tilting the avatar's head to the left to mirror the head motion of the user. In this way, the user is able to communicate an essence of himself without requiring a full video stream. The user could also provide a verbal command to his headset processor to make his avatar nod, even though the user himself is not nodding. One of the benefits to using an avatar is that it would require significantly less bandwidth to achieve (another way to reduce bandwidth used is to show a user in black and white or grayscale). The user's headset processor could also use data from an inward looking video camera to capture movement of the user's eyes and mouth, with the processor managing to send signals to the central controller or directly to the call platform software to control the user's avatar to reflect the actual facial movements of the user. In this way, the user is able to communicate some emotion via the user's avatar without using a full video feed.

While gallery views usually show just the face and name of the user, there is a lot of information about users that could be displayed as well. Such information could include what a call participant is thinking at that moment, which would allow for more informed and effective actions by the other call participants. Additional information could also include social information that could help other call participants get to know a user, or as an icebreaker at the start of a meeting. For example, the user might provide names of children and pets, favorite books, games played, sporting activities, and the like. In some embodiments, each caller has associated additional flip side information 4420 that can be seen by other callers by using a 'Flip' command 4440 to flip the caller image over to reveal the additional image on the back like looking at the reverse side of a baseball card. User image 4415*c* is illustrated as having been flipped to the back side, revealing that user 4415*c* has worked with the company for 13 years, currently works in New York City, and has three kids.

Alterations to the way in which call participants are displayed in the image gallery could be based on sensor data received and processed by the call platform software. In another embodiment, a user's heart rate could be displayed alongside a user image 4415. For example, the user's peripheral device (not shown) could be equipped with a heart rate sensor which sends a signal representing the user's heart rate 4422 to the call platform software (or central controller 110) in order to identify when a caller might be stressed. As illustrated, caller 4415*d* has an icon next to her caller image that indicates that her current heart rate is 79 beats per minute. In various embodiments, other biometric data (e.g. galvanic skin response) can be displayed alongside a user image. Supplemental background information 4423 could include information such as team affiliation, functional area, level, skill sets, past work/project history, names of their supervisors, etc. In the illustration, user 4415*h* has background information 4423 which indicated that he is an 'IT Lead' and is currently working on 'Project x'. The information could also include what the user is currently thinking (e.g. they want to respond to the last statement). In another example, a meeting owner could assign roles to call participants during the call, with those assigned roles appearing as supplemental information such as by adding a label of 'note taker' below a call participant's gallery view image. Supplemental information could include dynamic elements, such as showing a user's calendar information or current tasks that they are working on. Other dynamic supplemental information could include statistics around the meeting, such as the current average engagement level, percentage of agenda items completed, number of current participants, etc. This dynamic supplemental information could be about an individual, such as showing the user's current engagement level, talk time, number of tags placed, number of agenda items completed, badges received, etc.

In some embodiments, there are times on a call when a user would like to communicate with another call participant, but the number of participants makes that difficult to do without waiting for an opportunity to speak. In such embodiments, a user could communicate via a caller border 4425 around their caller image 4415*a-h* while on the call. For example, a user could double click (e.g. using a mouse, pointing a presentation remote) on their caller image in order to have the caller border 4425 flash three times or change color in order to quickly get the attention of other call participants. In another example, the user could communicate by changing the color of their caller border 4425 to red if they would like to make a candid statement or green if they are feeling very in tune with the other participants. In the current illustration, caller 4415*b* has elected to make the frame of caller border 4425 bolder in order to indicate that he is waiting to say something important. In addition to changing the look of the user's gallery view image, the present invention can also allow a call participant to see the ways that call participants are connected, revealing information that could help to enhance the effectiveness of the meeting. For example, callers 4415*h* and 4415*g* have a visible alignment 4430 indication. This alignment could be determined by call platform software in conjunction with central controller 110. For example, central controller 110 could determine that these two callers are both working to move a particular company software application to the cloud. Alignment 4430 could also reflect meeting ratings stored with central controller 110, with two callers aligned if their ratings were more than 90% the same.

In some embodiments, call participants can use call functions 4433 to provide more information to other users, reveal more information about other users, provide rewards and ratings to other users, indicate that they have a question about another user, etc. With a set alignment button 4435, a user could identify two callers who seem to be aligned in some way and have that alignment 4430 made visible to other call participants. A 'flip' button 4440 could allow a user to flip a second user's image to reveal additional information about that second user. A note 4442 could allow a user to attach a note to a second user's grid location 4410 or caller image 4415. The note might be a question, a comment, a clarification, a drawing, etc. In some embodiments, callers have access to tags 4445 which can be placed onto grid locations 4410 associated with other users. For example, a user might show some appreciation for an insightful statement from caller image 4415*d* by dragging a star symbol into her grid location. This star might be visible only to caller 4415*d*, only to members of her functional group, or visible to all call participants. The star could remain for a fixed period of time (e.g. two minutes), remain as long as the call is in progress, disappear when caller 4415*d* clicks on it, disappear when caller 4415*d* stops speaking, etc. In some embodiments, data relating to the tags could be stored in tag database table 7300. Other examples of tags being provided to other users in this illustration include two ribbon tags 4445 attached to caller 4415*g*, a star symbol attached to alignment 4430 and to caller 4415*f* and to caller 4415*d*, a question tag 4445 attached to caller 4415*b* indicating that another user has a question for him, and coin tags 4445 associated with caller 4415*a* (two coins) and one coin associated with caller 4415*e*. In the example of coins, these might be convertible into monetary benefits or might be exchangeable for digital assets like music or books. Such coins might encourage productivity and focus during calls as users seek to 'earn' coins with helpful comments, new ideas, good facilitation, etc. Many other suitable tags could be used for different purposes.

In other embodiments, modules area 4450 contains one or more software modules that could be selectable by users or established by meeting owners prior to a meeting. These modules can provide functionality which can enhance the effectiveness of a virtual call. For example, chat area 4455 allows call participants to chat with each other or to the group. A presentation module 4460 could show a thumbnail view of a presentation slide, which users could click on to enlarge it to full screen. Callers could also add comments or questions to a particular slide. In the illustrated example, a quarterly sales chart is shown on page 4 of the presentation. One caller is unclear about an aspect of the chart and adds a question symbol to alert the meeting owner or other callers that something is not clear. A speaker queue 4465 could allow callers to enter into a queue to speak during the call. In large meetings, it is common for one person to make a statement and for others to then want to verbally respond. But if there are many who want to respond, there is often a confusing time when multiple people are trying to respond at the same time, creating some chaos that is disruptive to the meeting.

The call platform software could determine a speaking queue by receiving requests from call participants who want to speak. As this queue is adjusted, the participants waiting to speak could be displayed in the gallery in speaking order. As the individual approaches their time to speak, the border 4425 on the gallery could begin to change colors or flash. In another example, the call platform software determines the order of the next five speakers and places a number from one to five as an overlay on top of each of the five participant's images, so the next participant due to speak has a number one on their image, the second has the number two, etc. In some embodiments, participants who want to speak could be presented with the ability to indicate how their contribution relates to elements of the conversation. An individual who wishes to speak could be presented with choices such as "I have the answer to your question"; "I agree"; "I want to offer an example;" "I'd like to highlight something that was just said"; "I want to offer a different opinion"; "I think that's not relevant;" "I want to summarize the discussion"; "I'd like transition or move on"; "I'd like to ask for a poll" "I'd like to ask for the feeling of the room" "I'd like to ask a question"; "I'd like us to take an action or make a decision." Participants could fill a short text box with information about what they are going to say. When individuals select an option to indicate how they want to contribute or input a description of what they want to say, the type of their contribution or their rationale could be visually indicated to others on the call.

In another embodiment, individuals could select from digital representations associated with contribution types known as "intenticons." Intenticons are abstract representations of intent similar to emojis or emoticons. The intenticon could be displayed next to the participant's name, could replace the participant's name, could be placed above, below, around or composited on top of the participant's image, or could replace the participant's image. Call participants who want to respond to a current speaker could enter text summarizing the nature of their response, allowing call platform software to merge one or more responses or bump up the priority of one or more responses. For example, two users might want to respond by pointing out a security issue brought up by the current speaker, in which case the call platform software picks only one of those responses to be made, sending a message to the other responder that their response was duplicative. Information about a potential responder's response could change the prioritization level, such as by a user who wants to bring up a potential regulatory issue with a previous statement.

In some embodiments, the meeting owner could allow participants to indicate which other participants they would like to hear next. For example, participants could reorder a visual queue containing the contributions or the names of participants in the speaking queue. For example, participants could click on other participants' images 4415*a-h*, grid locations 4410, or contributions to indicate. By indicating, the call platform could change the visual representation of the gallery view to highlight individuals that others think should talk next. A highlighted frame could appear around the user, or the user could be placed in a spotlight, for example. In other embodiments, individuals could upvote or downvote individuals in a speaking queue by clicking on a button indicating thumbs up/down, "speak next"/"don't speak next", or left mouse clicking or right mouse clicking, swiping left or swiping right. Individuals could remove themselves from the speaking queue. In one embodiment, the participant could click a "never mind" button. In another embodiment, a participant could remove oneself by right clicking on a visual representation of the queue and selecting an option to remove oneself. In various embodiments, a configuration may specify an order of speakers or presenters.

Figure 45:
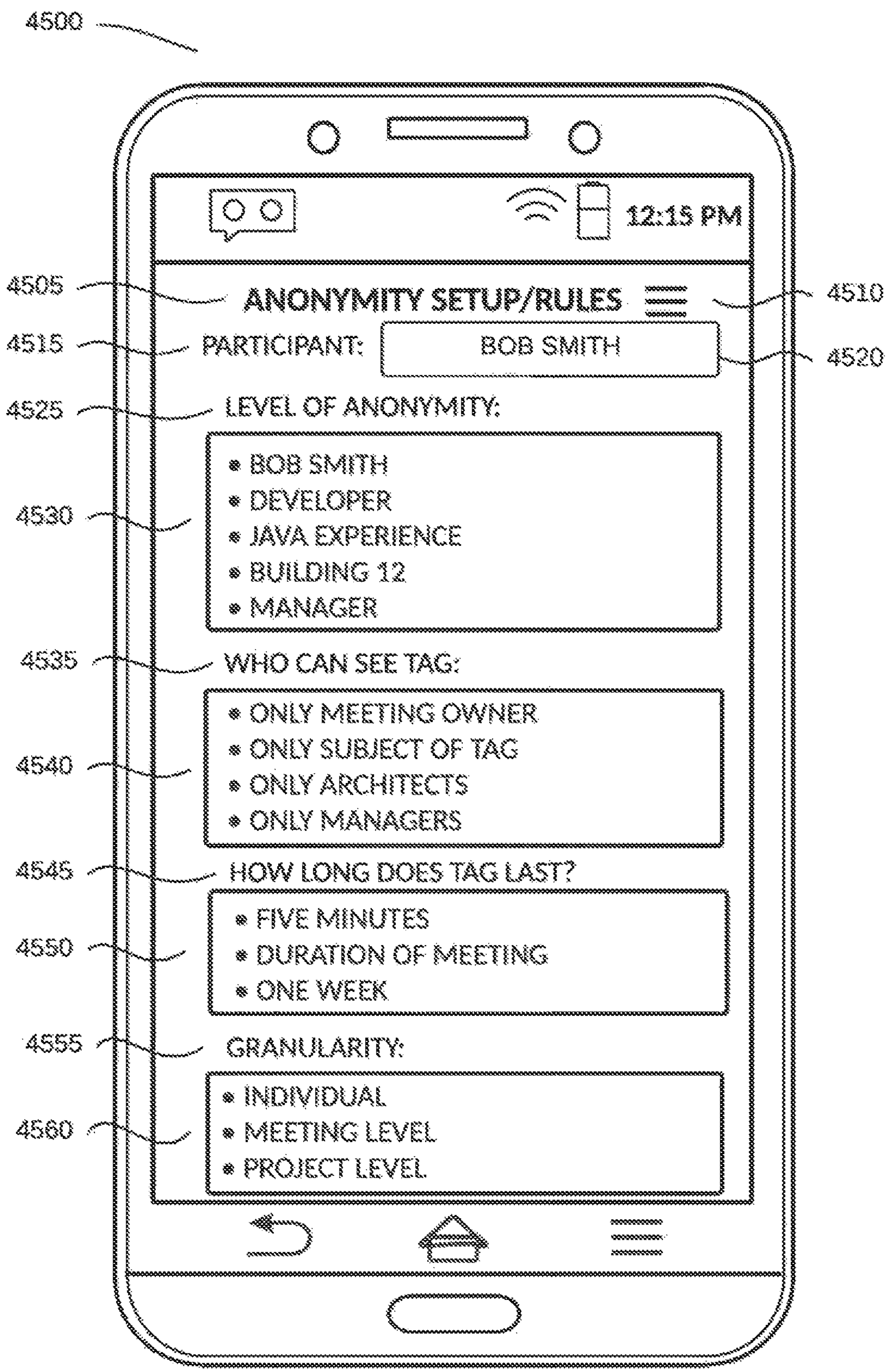
FIG. 45 is a screen from an app for determining rules for anonymity consistent with at least some embodiments described herein.

With reference to FIG. 45, a screen 4500 from an app controlled by users according to some embodiments is shown. The depicted screen shows a 'Anonymity setup/rules' 4505 functionality that can be employed by a user (e.g. meeting owner, meeting facilitator, meeting participant, employee, project manager, facilities manager, game player, teacher, tutor) to set anonymity-related rules for tags. These rules may dictate a level of anonymity that a user has when he applies a tag. For example, a rule may permit a user to apply a tag such that a recipient of the tag will not know the identity of the user. In various embodiments, anonymity-related rules may give users greater comfort in applying tags, in applying truthful tags, in providing tags to superiors or coworkers, in applying negative tags, etc. With a user's anonymity protected, the user may have less fear of retribution for certain tags, less fear of hurting feelings, etc.

In various embodiments, the rules may apply to an upcoming meeting. In various embodiments, the rules may apply indefinitely, until changed, for some fixed period of time, etc. In various embodiments, rules data may be stored in 'Tag meanings and representations' table 6300. In FIG. 45, the app is in a mode whereby users can set anonymity rules for applying tags.

In some embodiments, the user may select from a menu 4510 which displays one or more different modes of the software. In some embodiments, modes include 'anonymity setup/rules', 'tag rules', 'placing tags', 'choosing tags', 'responding to tags', 'upvoting tags', etc.

In some embodiments, the app may show the identity of the user setting anonymity rules for placing a tag, such as 'Participant' 4515 who in this case is 'Bob Smith' 4520. In this example, the user may enter this identity information via a virtual keyboard, via voice recording, retrieved from a processor of the user device, etc. In various embodiments, the user setting rules need not be a participant, but may be a meeting owner, a high ranking individual, and/or anyone else.

At 4525 the app user may set a level of anonymity, with various options listed at 4530. These options may represent how the tag will be attributed to the author (applier) of the tag. The first option, here given as "Bob Smith", provides the actual user's name, and therefore provides essentially no anonymity. Note that the first option (and other options described herein) may be tailored to the particular user listed at 4520. Thus, the first option on a particular user's app may list the name of the user, indicating that such a user would have no anonymity.

The second option, here listed as "Developer", provides the user's role or title (but, e.g., no name), and therefore provides more anonymity. However, as there may be a limited number of people with this role or title, the anonymity may not be perfect or complete. Other options listed indicate such things as a user's experience, a user's credentials, a user's office location, a user's rank or level in the company, etc.

In various embodiments, it may be desirable to provide at least some information about a user who is applying a tag. This may give greater credence to the tag. For example, if the tag represents some technical feedback, and the tag is attributable to a person in a technical role, then the tag may carry more weight or impact. On the other hand, it may be desirable to maintain a level of anonymity for the aforementioned reasons. Thus, there is a trade-off in terms of levels of anonymity. As such, providing a number of levels of anonymity may allow a person setting anonymity rules to carefully consider and weigh the trade-offs inherent in the different levels.

In various embodiments, multiple anonymity options may be selected, in which case a tag may include reference to all selected options. Since each selected option may provide more information about the tag's source/author, selecting multiple options may, in general, reduce a level of anonymity associated with a tag.

At 4535 the app user may set who can see the tag. In various embodiments, viewers may be specified in terms of individuals or in terms of groups or categories of people. For example, as depicted at 4540, a tag may be seen by only a meeting owner, only the subject of the tag, only architects, or only managers. Limiting who can see a tag may also provide some level of anonymity. For example, if a user knows that a close coworker will not see a tag, the user may feel more comfortable providing a negative tag related to that coworker.

At 4545 the app user may set how long a tag may last. For example, as depicted at 4550, a tag may last for 5 minutes, for the duration of a meeting, for one week, etc. In various embodiments, a time limit may be set for any other period of time. At the end of a defined time period (e.g., 5 minutes after a tag has been applied), a tag may disappear, become invisible, become unsearchable, become unattributable and/or otherwise expire. Setting a time limit on a tag may also make a user more comfortable applying the tag (e.g., knowing the tag will not represent an indefinite record of the user's authorship).

In various embodiments, a tag does not last past a single view of the tag. In various embodiments, a tag lasts only until after a predetermined number of views of the tag.

At 4555 the app user may set a level of granularity with which a tag may be viewed in relation to a larger pool of tags. At one extreme, as depicted at 4560, a tag may be viewed individually (e.g., as an individual tag). For a greater level of anonymity, a tag may be viewed only in aggregation with one or more other tags. For example, if ten meeting attendees each provide a tag with a rating of the meeting's importance, an average of the ten ratings may be viewable (e.g., to the meeting owner), but no individual rating may be viewable. In this way, for example, a meeting owner may have greater difficulty tracing a single negative rating to any particular individual. In various embodiments, tags may only be viewed in aggregation at the meeting level, at the project level (e.g., aggregated with all other tags submitted about a project), and/or at any other level.

In various embodiments, viewing an aggregated set of tags may include viewing an average of tags (e.g., numerical ratings provided in tags), viewing a sum of tags, and/or viewing any other statistic related to the set of tags.

In various embodiments, the depicted screen 4500 and/or the associated app may allow a user to set additional rules related to anonymity. In various embodiments, more or fewer settings may be depicted. In various embodiments, different settings may be depicted.

In various embodiments, a default set of anonymity rules initially exist for any tag. For example, at 4530, there may be highlighted by default the "Developer" option (or the equivalent for any given app user or tag author). However, it may then be possible to change settings from the initial default settings. In various embodiments, a user may specify default settings that may apply to any given tag unless specifically changed.

In various embodiments, anonymity settings may apply to (e.g., may be set for) tags of a certain type. For example, a user may prefer to have greater anonymity when applying a tag with negative sentiment or other negative connotation (e.g., because the user fears retribution). However, the user may be comfortable with less anonymity in relation to a positive tag. In various embodiments, anonymity settings may vary depending on the recipient of a tag (e.g., depending on the relationship between the author of the tag and the recipient of the tag). For example, a user may prefer to have greater anonymity when applying a tag to a close co-worker, lest the tag otherwise sour their relationship. However, a user may feel more comfortable with relatively little anonymity when applying a tag to someone he rarely sees.

In various embodiments, a tag may be shared under a pseudonym.

In various embodiments, a tag can be retracted (e.g., within some predetermined period of time after the tag has been applied). If retracted, the tag may never have had the opportunity to be seen (e.g., by the intended recipient of the tag). A person may feel more comfortable applying a tag knowing they have the opportunity to reconsider the tag.

In various embodiments, when the user hits a 'Submit rules' button, or the like, the app may transmit (e.g., to the central controller 110) the rules. Once rules have been submitted, the rules may be stored in a table (e.g., table 6300) or other data structure.

Figure 46:
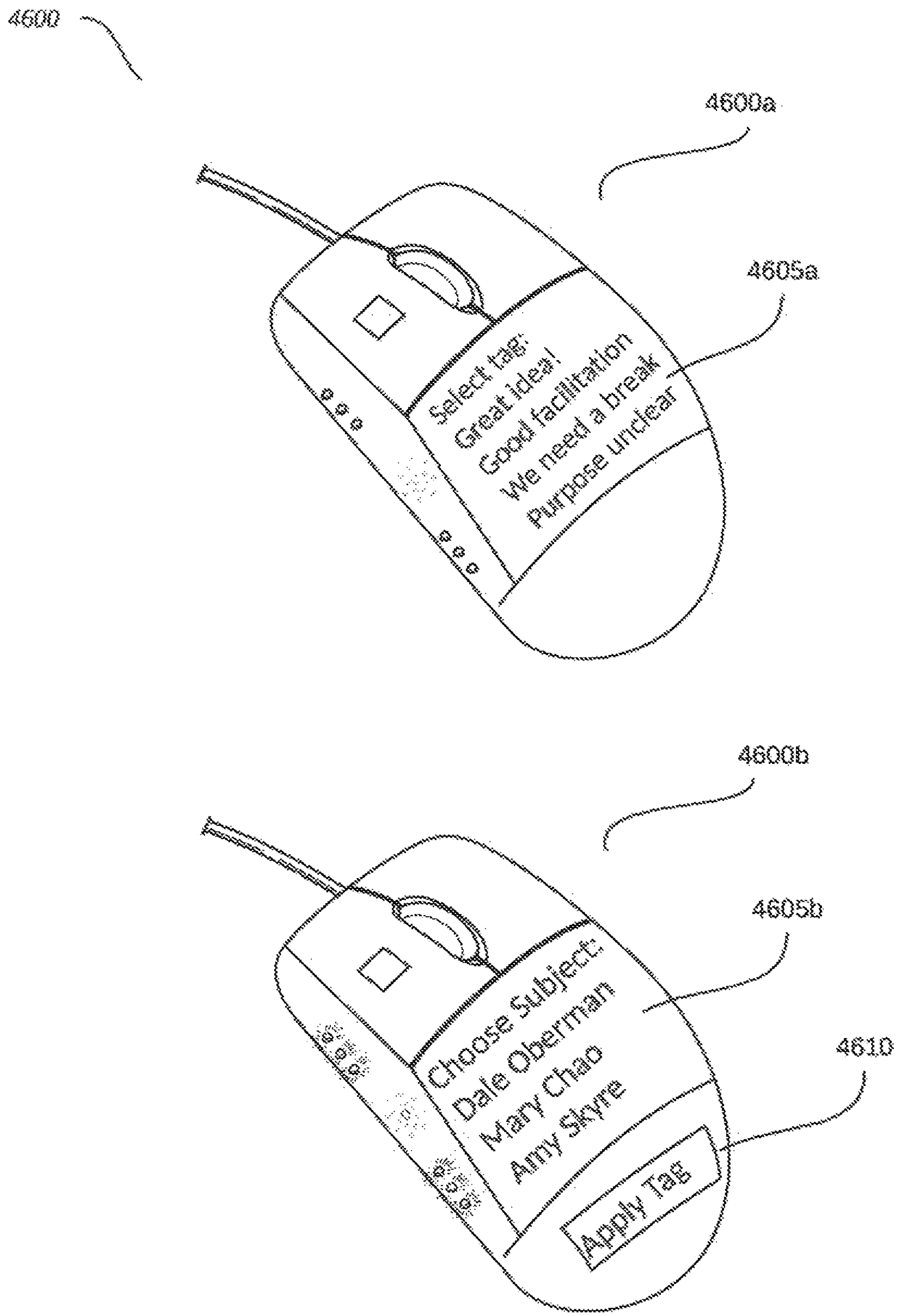
FIG. 46 is mouse with a screen consistent with at least some embodiments described herein.

With reference to FIG. 46, users may select and apply tags using a mouse 4600. The mouse in situation 4600*a* is presenting the user an option to select from among a number of possible tags on display 4605*a* which are stored in memory of mouse 4600 or retrieved from memory of central controller 110. Various embodiments contemplate that tagging capabilities may be made available to a user on a mouse or on any other peripheral device. A mouse 4600 that initiates a tagging protocol according to some embodiments is shown. The mouse in situation 4600*a* is presenting text options to the user on touch-enabled display 4605*a* to confirm selection of one or more tags (e.g. 'Good facilitation', 'We need a break'). The user selects a tag using touch-enabled display 4605*a*. The mouse in situation 4600*b* then allows the user to select a subject (e.g., a person to whom the selected tag will be applied) by touching a selection on touch-enabled display 4605*b*. Once the subject is selected, the user may then press an apply tag button 4610 in order to store and/or transmit the selected tag and subject for storage and/or later review.

Figure 47:
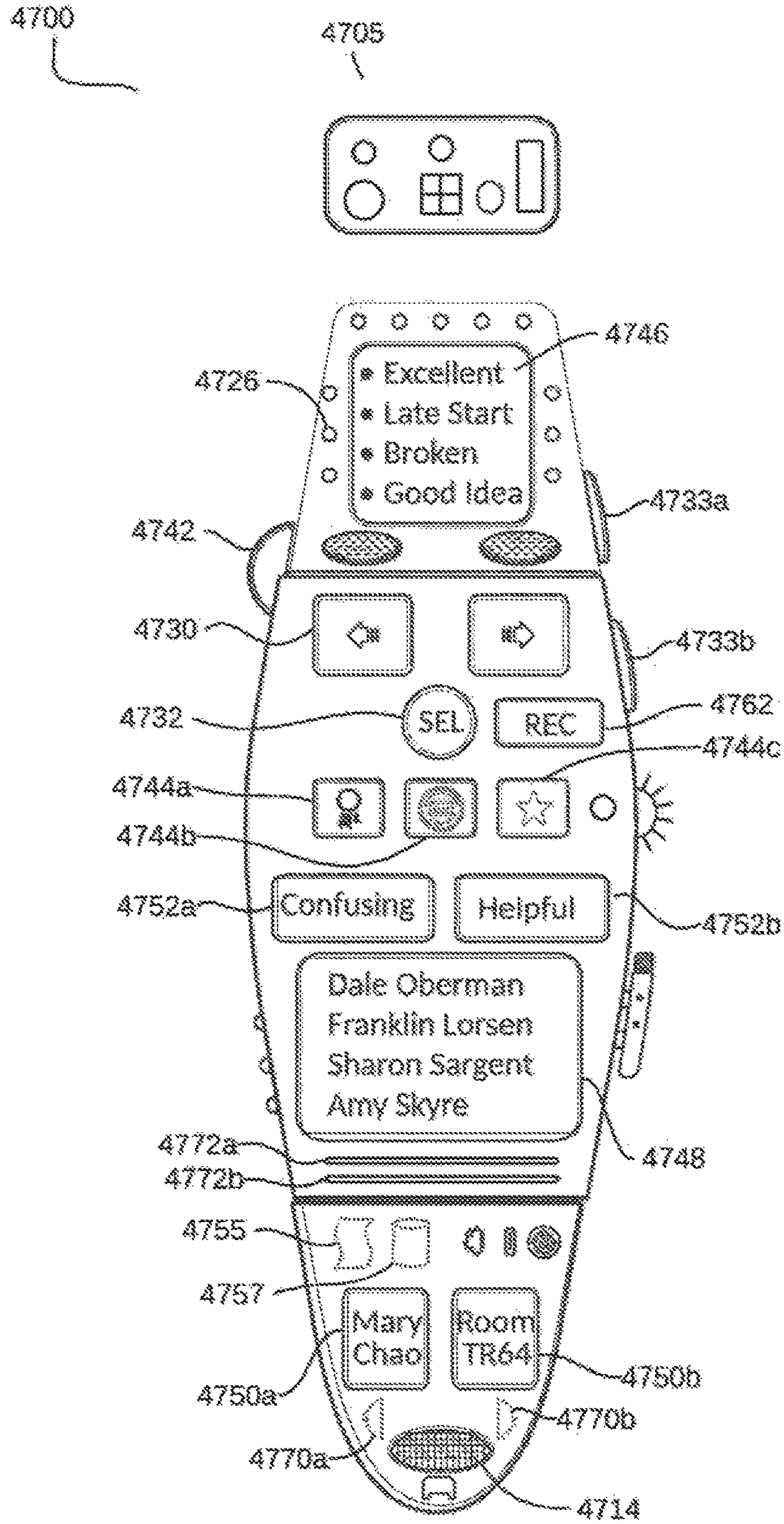
FIG. 47 is a presentation remote consistent with at least some embodiments described herein.

With reference to FIG. 47, a presentation remote 4700 according to some embodiments is shown. Presentation remote 4700 may contain some or all of the features of presentation remote 4200. While various elements of presentation remote 4700 are described here in particular locations on/in the device, it is understood that elements may be placed in many different locations and configurations. Presentation remote 4700 may take many forms, such as being incorporated into headset, projector, hat, belt, eyeglasses, chair, conference table, mouse, keyboard, etc. Presentation remote 4700 as shown illustrates some embodiments of tagging protocols that may be implemented using presentation remote 4700. Analogous to front view 4205 in FIG. 42, front view 4705 is a view of the front of presentation remote 4700.

Presentation remote 4700 may include one or more physical buttons and/or one or more virtual buttons (e.g. small displays that can register touch input from a user). Such buttons may be advantageously used to select tags and apply those tags to people, teams, objects, environments, etc. In various embodiments, buttons may be used to respond to tags. Selection button 4732 may allow a user to select from various tags (e.g., 'Excellent', 'Late Start', 'Broken', 'Good Idea') presented on display screen 4746. Forward and back buttons 4730 may allow the user to step forward or backward in a list of tags (e.g. potential tags, received tags) presented on display screen 4746. Side buttons 4733*a* and 4733*b* may be physical (or virtual) buttons that may also allow a user to choose from one or more tags and/or subjects of tags. Configurable buttons 4744*a*, 4744*b*, and 4744*c* may be virtual buttons that a user can define to allow for customizable functionality when pressed (e.g. pressing 4744*a* generates a ribbon tag, pressing 4744*b* generates a coin tag, pressing 4744*c* generates a star tag). Jump buttons 4752*a* and 4752*b* may be virtual buttons that can be programmed to generate particular tags when pressed, such as a tag of 'Confusing' when jump button 4752*a* is pressed and 'Helpful' when jump button 4752*b* is pressed. In some embodiments, another form of input is a scroll wheel 4742, which allows for selections from display 4746. In some embodiments, users may review tags that have been received from other users, such as by scrolling through a list of received tags on display screen 4746 using scroll wheel 4742.

In various embodiments, presentation remote 4700 includes lights as signaling, alerts, communication, etc. Facing lights 4726 may be disposed around display 4746, and could alert a user by flashing when a new message (e.g. a new tag, a new subject of a tag) or notification is displayed on the display. In some embodiments, facing lights could be associated with particular participants in a room. For example, six facing lights could be individually connected to supplemental devices (not shown) of six meeting participants, so that a user of presentation remote 4700 would see one of the facing lights light up when that particular participant sent the user a tag. Side lights 4728 could be used to signal to meeting participants, such as by flashing when a time window is open for participants to generate tags.

In some embodiments, a record button 4762 may allow a user to store audio or video during a meeting or presentation. For example, a meeting participant may press record button 4762 to record an audio tag (e.g. a verbal message to accompany a task request, a congratulatory message to a meeting facilitator who did a great job, a description of a broken piece of equipment in a conference room), then press record button 4762 again to stop the recording and save the audio file to data storage 4757 so that it can be associated with one or more tags. A microphone 4214 may be used to detect audio signals (e.g., voice of the user, voice of the presenter, room sounds, participant sounds). In some embodiments, the user might then use presentation remote 4700 to transmit the audio file and/or tag to another user.

Display 4746 may allow for messaging and displaying options to a user. In various embodiments, display 4746 faces towards a prospective user. This may allow a user to view graphical information that is displayed by presentation remote 4700, such as messages (e.g. text of a tag). In some embodiments, display 4746 is touch enabled so that options (e.g. list of tags, list of received tags) on display 4746 may be selected by a user touching them. In other embodiments, a user may employ selection button 4732 to select from items listed on display 4746. In some embodiments, a secondary display 4748 allows for additional information to be provided to the user, such as by displaying the names of other meeting participants who could be the subject of tags created by the user. Communication displays 4750*a* and 4750*b* may be touch enabled, allowing a user to touch one or more displays 4750*a-b* which show options to a user. In one example, communication display 4750*a* shows "Mary Chao" and will send her a tag when selected by a user. Similarly, touching communication display 4750*b* may send one or more tags to meeting room TR64 (e.g. displaying a tag on a wall or display screen of that room).

Processor 4755 may provide computational capability needed for the functionality (e.g. managing the generation, sending, and/or receiving of tags) of presentation remote 4700. Data storage 4757 may comprise non-volatile memory storage. In some embodiments, this storage capacity could be used to store tags, tag text, tag subjects, tag objects, software, presentations, user images, business files (e.g. documents, spreadsheets, presentations, instruction manuals), books (e.g. print, audio), financial data (e.g. credit card information, bank account information), digital currency (e.g., Bitcoin™), cryptographic keys, user biometrics, user passwords, names of user friends, user contact information (e.g. phone number, address, email, messaging ID, social media handles), health data (e.g. blood pressure, height, weight, cholesterol level, allergies, medicines currently being taken, age, treatments completed), security clearance levels, message logs, GPS location logs, current or historical environmental data (e.g. humidity level, air pressure, temperature, ozone level, smoke level, $CO2$ level, CO level, chemical vapors), and the like. In various embodiments, presentation remote 4700 includes a Bluetooth® antenna (e.g., an 8898016 series GSM antenna) (not shown). In various embodiments, presentation remote 4700 may include any other type of antenna. In various embodiments, presentation remote 4700 includes an earbud (not shown), which may be a component that fits in the ear (e.g., for efficient sound transmission).

Presentation remote 4700 may also include accelerometers 4770*a* and 4770*b* which are capable of detecting the orientation of presentation remote 4700 in all directions and the velocity of presentation remote 4700. Accelerometers can aid in determining the direction in which presentation remote 4700 is pointed (e.g. for determining which meeting participant that it is pointed at in order to associate a tag with that participant). Optical fibers 4772*a* and 4772*b* are thin strands of diffusing optical fiber. These may include optical glass fibers where a light source, such as a laser, LED light, or other source is applied at one end and emitted continuously along the length of the fiber. As a consequence, the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., 'blue' when a meeting participant is allowed to create tags), or provide diverse and/or visually entertaining lighting configurations.

Supplemental device (not shown) may be associated with presentation remote 4700, but be mobile and thus may be provided to other users (e.g. meeting participants) in order to provide input and/or output capability (e.g. generating tags, receiving tags, responding to tags) during a meeting or presentation. In some embodiments, the supplemental device may have display capabilities and/or include one or more capabilities of GPS, wireless communications, processing, data storage, a laser pointer, range finder, sensors, accelerometers, voting software, feedback software, signaling, vibrations, etc.

Task Scores

In a meeting (e.g., a status update meeting), a participant may indicate the degree to which a task or project is complete. For example, a participant says that a task is complete, 80% complete, stuck on an obstacle, etc. It may be possible that a participant is overly optimistic about the degree of task completion, overly pessimistic, unaware of one or more problems associated with the task, and/or that the participants may simply misrepresent the degree of task completion. In various embodiments, it may be advantageous to receive inputs from one or more additional participants as to their opinion of the degree of task completion and/or as to their opinion of the representations made by the first participant. For example, whereas the first participant might claim that the task is complete, another participant might believe the task is only 50% complete.

In various embodiments, each of a plurality of participants may indicate a degree of completion of a task or project. A participant may indicate a degree of completion using a quantitative measure (e.g., 60%, 6/10, etc.), using a qualitative measure (e.g., green/yellow/red, "partially complete", "complete", "snagged", etc.), and/or in any other fashion. In various embodiments, a participant may provide an accompanying explanation, such as a free-form text or verbal explanation as to their opinion of the degree of completion.

In various embodiments, the opinions indicated by the plurality of participants may be aggregated (e.g., averaged, averaged with a weighting, etc.). The aggregate may be presumed to provide a more accurate assessment of the task's degree of completion. In various embodiments, if a first participant provides a first assessment, and one or more additional participants provide a second assessment (e.g., in the aggregate) that differs from the first assessment (e.g., substantially, more than 10%, etc.), then there may be an attempt to resolve the discrepancy. The first participant and/or another participant may be asked to submit evidence substantiating the first assessment and/or the second assessment. Evidence may include approvals, testimonials by end users of a product, bug reports, error reports, complaint reports, demonstrations, prototypes, mockups, documentation, etc.

In various embodiments, a participant that represents a task as complete may require agreement or substantial agreement by one or more other participants before the task can truly be designated as complete. For example, the aggregated opinion of other participants must show the task to be 90% complete or better before the task is designated as complete.

Various embodiments may track the degree to which a participant's representation of a project status gels with the opinions of other participants. A participant may be scored highly if he has high consistency between his representations and the opinions of other participants. He may be scored more poorly otherwise. A score or other statistic measuring the accuracy of a participant's representation may be associated with the participant, such as on a scorecard, analogous to the back of a baseball card. In various embodiments, other statistics for a participant may be tracked, such as the accuracy of the participant's assessments of other peoples' status updates, and/or the accuracy of other predictions or assessments made by the participant.

Figure 48:
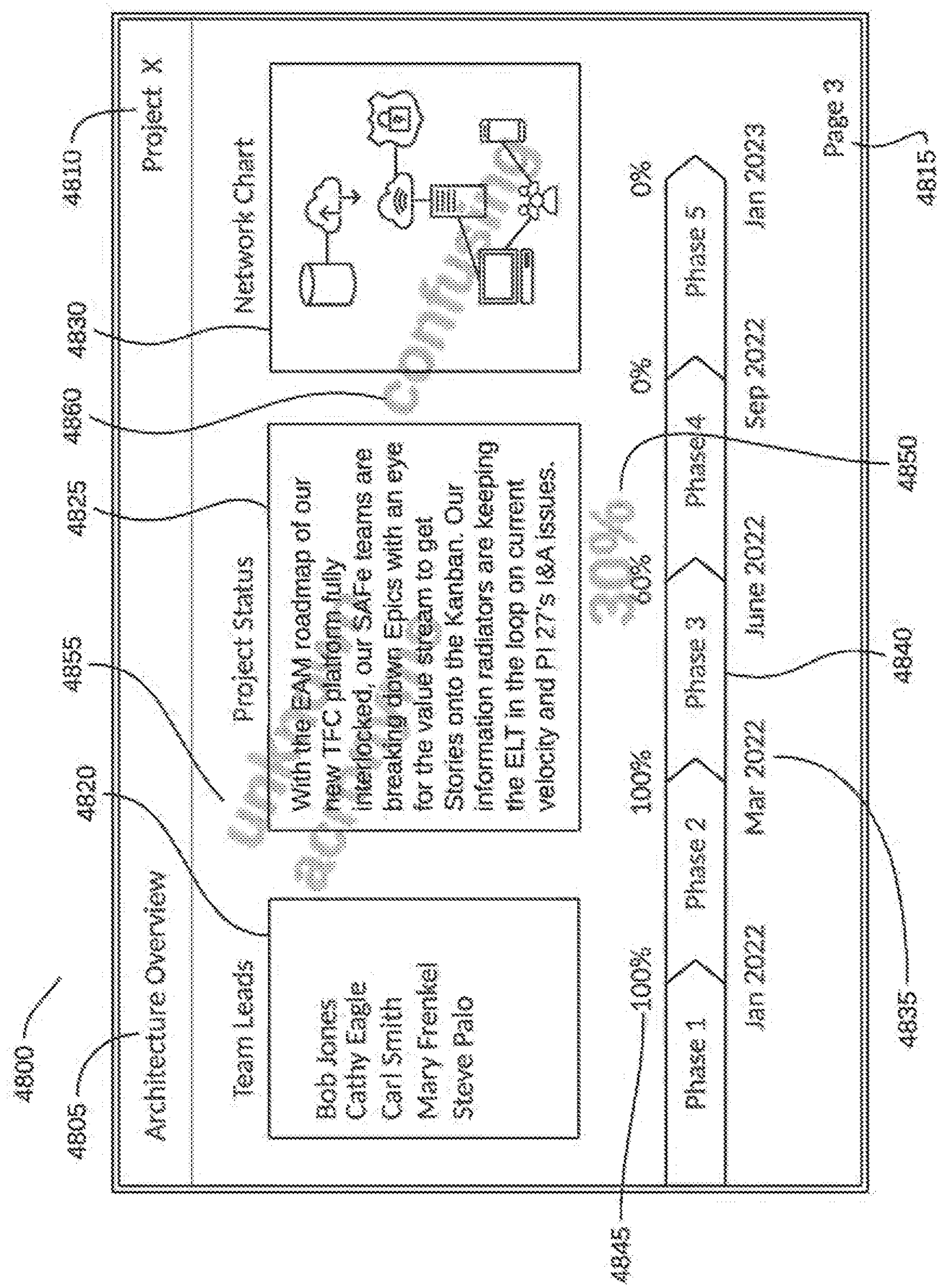
FIG. 48 is a depiction of a presentation slide consistent with at least some embodiments described herein.

With reference to FIG. 48, a slide 4800 from a slide presentation according to some embodiments is shown. Slide 4800 provides an illustrative example for the use of tagging in relation to slide presentations and/or content thereof. As will be appreciated, embodiments described herein may apply to any suitable slide, presentation, document, chart, etc.

Slide 4800 includes various information, such as a slide title 4805, a project being discussed in the presentation 4810, a page number 4815, a listing of "Team Leads" 4820, a "Project Status" 4825, a "Network Chart" 4830, a project timeline 4840, dates along the project timeline (e.g., date 4835), and completion levels for various project phases (e.g., completion level 4845 of "100%).

In various embodiments, completion levels for various project phases have been asserted (e.g., on the slide, by the presenter, by team leads 4820), but may in fact represent unclear or inaccurate characterizations. For example, the team leads may not wish to admit that they have fallen behind schedule, and so are asserting that, for example, "Phase 3" is 60% complete, when it is only really 30% complete.

In various embodiments, a meeting attendee or other consumer of slide 4800 may apply a tag to the slide (and/or to the presentation). The tag may be positioned physically at a given location on the slide, e.g., proximate to where the slide has listed the 60% completion statistic for phase 3 such as tag 4850 which reads "30%". The tag may be applied in any other fashion. The tag may question the printed figure, e.g., with the text of "doubtful". The tag may provide its own estimate of the completion percentage (e.g., "less than 30%"). The tag may provide evidence disputing the listed percentage and/or supporting the tag's estimate. For example, the tag may read, "only 30% of features signed off".

In various embodiments, a tag may be used in any other way to comment on a slide, such as by adding information, disputing information, calling printed information into question, providing a reaction (e.g., "nice accomplishment", "what is the roadblock?"), setting a task, calling for further research into a point listed on a slide, etc. In some embodiments, tags may be used to indicate a level of confusion with the content of a presentation slide. For example, a user might apply a tag 4855 of "unknown acronyms" to project status 4825 because of the references to "EAM", "TFC", "SAFe", "ELT", and "I&A". Users might apply a tag 4860 of "confusing" to Network Chart 4830.

Figure 49:
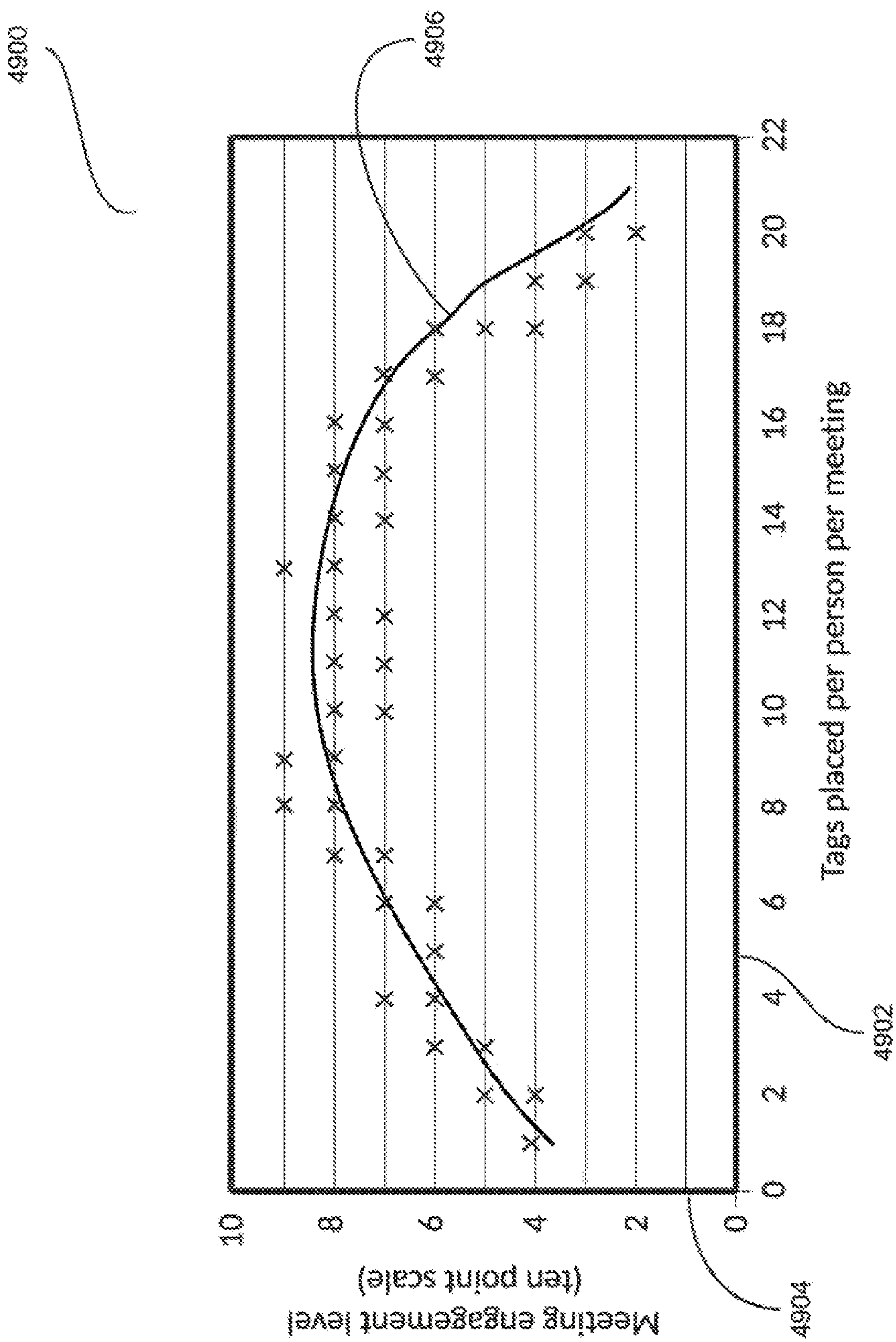
FIG. 49 is a plot of a derived machine learning model consistent with at least some embodiments described herein.

With reference to FIG. 49, a plot 4900 of a derived machine learning model according to some embodiments is shown. For the indicated model, data has been gathered relating a 'Tags placed per person per meeting' (represented on the 'X' axis 4902) to the user's meeting engagement level (represented on the 'Y' axis 4904). Each marker in the plot represents a single data point. Using the individual data points, a machine learning program has derived a best-fit model, represented by the continuous curve 4906. The machine learning model seeks to predict a level of meeting engagement based on how many tags a user has placed during a meeting, even where no data has been gathered for similar tag placement frequencies. In various embodiments, any suitable machine learning, artificial intelligence, or other algorithm may be used to derive a model from data. Any suitable cost or benefit function may be used, such as one that seeks to minimize a mean squared error between the model's prediction, and the measured values of the data. In various embodiments, more or less data may be used. Higher dimensional data may be used. Other types of data may be used. Other types of predictions may be made or sought.

Methods

Figure 86A:
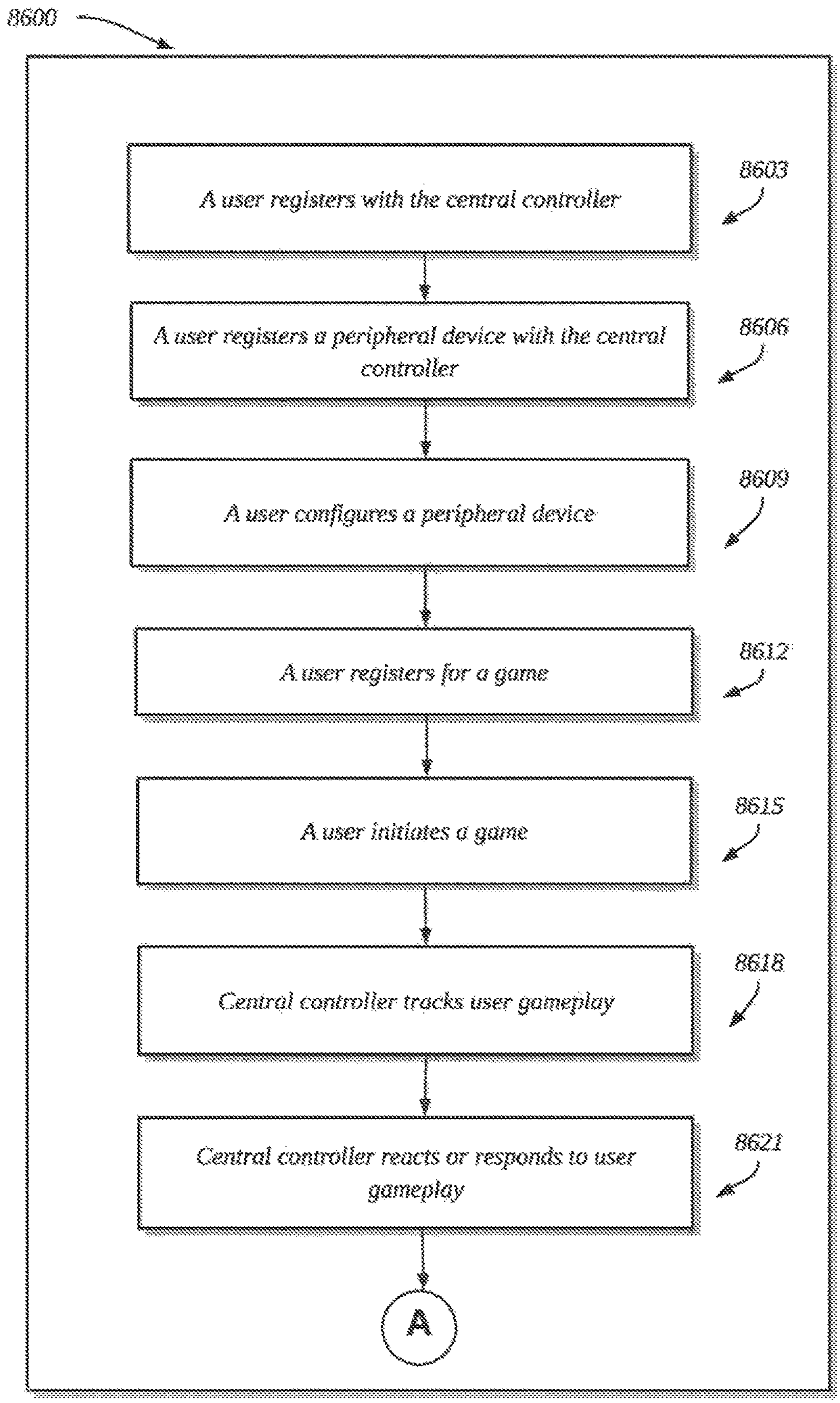
FIG. 86A, FIG. 86B, and FIG. 86C, together show a diagram of a process flow consistent with at least some embodiments described herein.
Figure 86B:
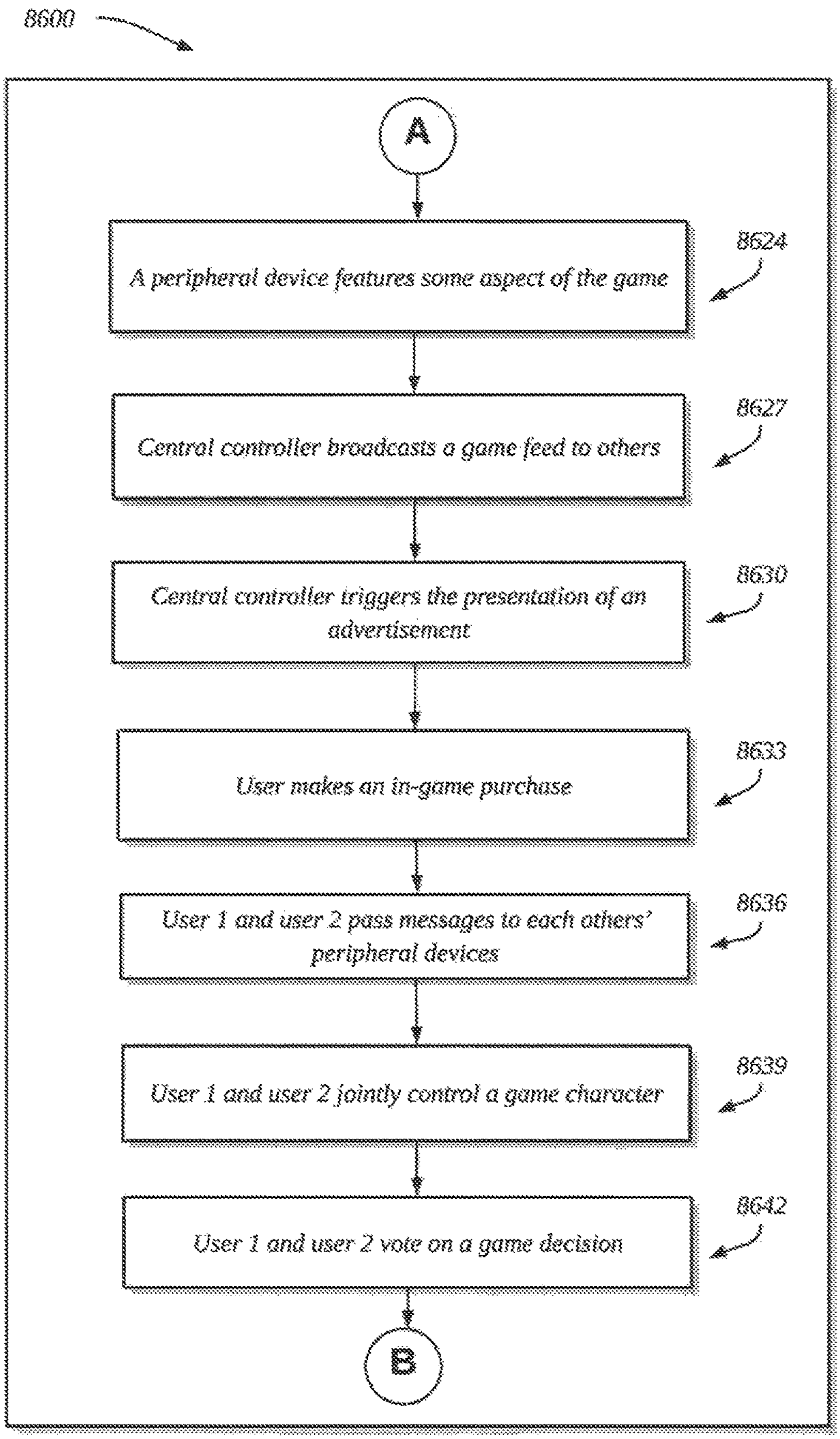
Figure 86C:
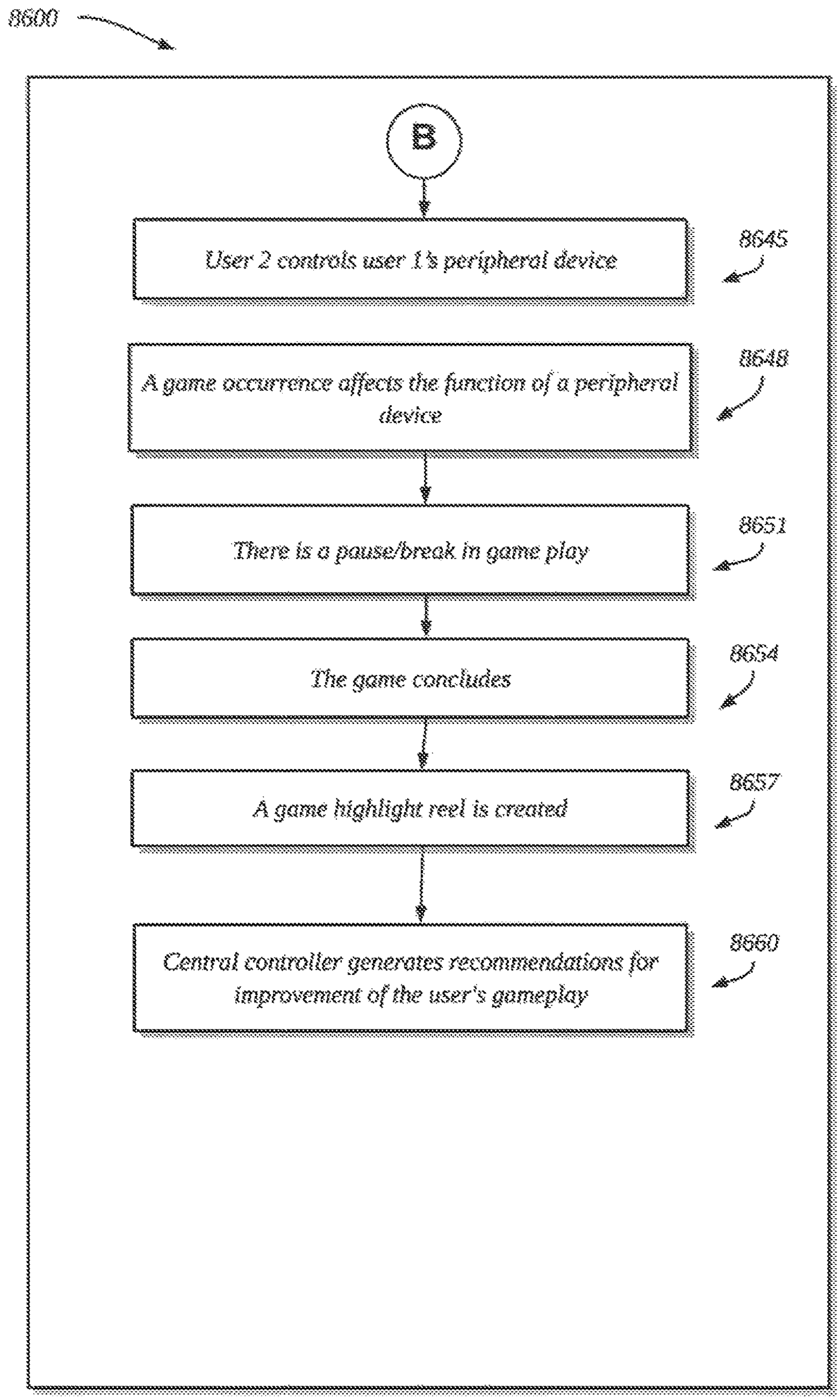

Referring now to FIGS. 86A, 86B, and 86C, a flow diagram of a method 8600 according to some embodiments is shown. In some embodiments, the method 8600 may be performed and/or implemented by and/or otherwise associated with one or more specialized and/or specially-programmed devices and/or computers (e.g., the resource devices 102*a-n*, the user devices 106*a-n*, the peripheral devices 107*a-n* and 107*p-z*, the third-party device 108, the and/or the central controller 110), computer terminals, computer servers, computer systems and/or networks, and/or any combinations thereof. In some embodiments, the method 8600 may cause an electronic device, such as the central controller 110 to perform certain steps and/or commands and/or may cause an outputting and/or management of input/output data via one or more graphical interfaces such as interfaces depicted herein.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 215, 345, 445, 515, 615) may store thereon instructions that when executed by a machine (such as a computerized processor) result in performance according to any one or more of the embodiments described herein. According to some embodiments, the method 8600 may comprise various functional modules, routines, and/or procedures, such as one or more AI-based algorithm executions.

Games

A process 8600 for conducting a game with a user participating in the game is now described according to some embodiments. At step 8603, a user may register with the central controller 110, according to some embodiments. The user may access the central controller 110 by visiting a website associated with the central controller, by utilizing an app that communicates with the central controller 110, by engaging in an interactive chat with the central controller (e.g., with a chatbot associated with the central controller), by speaking with a human representative of the central controller (e.g., over the phone) or in any other fashion. The aforementioned means of accessing the central controller may be utilized at step 8603 and/or during any other step and/or in conjunction with any other embodiments. Using the example of a website, the user may type into one or more text entry boxes, check one or more boxes, adjust one or more slider bars, or provide information via any other means. Using an example of an app, a user may supply information by entering text, speaking text, transferring stored information from a smartphone, or in any other fashion. As will be appreciated, the user may supply information in any suitable fashion, such as in a way that is consistent with the means of accessing the central controller 110. The user may provide such information as a name, password, preferred nickname, contact information, address, email address, phone number, demographic information, birthdate, age, occupation, income level, marital status, home ownership status, citizenship, gender, race, number of children, or any other information. The user may provide financial account information, such as a credit card number, debit card number, bank account number, checking account number, PayPal® account identifier, Venmo® account identifier or any other financial account information.

In some embodiments, the user may create or establish a financial account with the central controller 110. The user may accomplish this, for example, by transferring funds from an external account (e.g., from a Venmo® account) to the central controller 110, at which point the transferred funds may create a positive balance for the user in the new account.

In some embodiments, the user may provide information about one or more preferences. Preferences may relate to one or more activities, such as playing games, learning, professional development, interacting with others, participating in meetings, or doing any other activities. In the context of a game, for example, preferences may include a preferred game, a preferred time to play, a preferred character, a preferred avatar, a preferred game configuration, or any other preferences. In the context of learning, preferences may include a preferred learning format (e.g., lecture or textbook or tutorial, etc.; e.g., visual versus aural; e.g., spaced sessions versus single crash course; etc.), a subject of interest, a current knowledge level, an expertise level in prerequisite fields, or any other preferences. In various embodiments, a user may provide preferences as to desired products or services. These preferences may, for example, guide the central controller in communicating advertisements or other promotions to the user. In various embodiments, a user may provide preferences as to what tags are to be available for use in the game (e.g., for tagging game elements, game actions, game strategies, the performance of team members, etc.). In various embodiments, preferences may include preferences regarding any field or activity.

The central controller 110 may store user information and user preferences, such as in user table 700, user game profiles table 2700, and/or in any other table or data structure. In various embodiments, a user may provide biometric or other identifying or other authenticating information to the central controller 110. Such information may include, photographs of the user, fingerprints, voiceprints, retinal scans, typing patterns, or any other information. When a user subsequently interacts with the central controller 110, the user may supply such information a second time, at which point the central controller may compare the new information to the existing information on file to make sure that the current user is the same user that registered previously. Biometric or other authenticating information may be stored by the central controller in a table, such as in authentication table 3600. Further details on how biometrics can be used for authentication can be found in U.S. Pat. No. 7,212,655, entitled "Fingerprint verification system" to Tumey, et al. issued May 1, 2007, e.g., at columns 4-7, which is hereby incorporated by reference.

At step 8606, a user may register a peripheral device with the central controller 110, according to some embodiments. Through the process of registering a peripheral device, the central controller may be made aware of the presence of the peripheral device, the fact that the peripheral device belongs to (or is otherwise associated with) the user, and the capabilities of the peripheral device. The user may also provide to the central controller one or more permissions as to how the central controller may interact with the peripheral device. The user may provide any other information pertinent to a peripheral device. In various embodiments, registering a peripheral device may be performed partly or fully automatically (e.g., the peripheral device may upload information about its capabilities automatically to the central controller 110). The user may provide information about the peripheral itself, such as type, the manufacturer, the model, the brand, the year of manufacture, etc. The user may provide specifications for the peripheral. These specifications may indicate what buttons, keys, wheels, dials, sensors, cameras, or other components the peripheral possesses. Specifications may include the quantities of various components (e.g., a mouse may have two or three buttons; e.g., a mouse may have one, two, or more LED lights; e.g., a camera peripheral may have one, two, three, etc., cameras). Specifications may include the capabilities of a given component. For example, a specification may indicate the resolution of a camera, the sensitivity of a mouse button, the size of a display screen, or any other capability, or any other functionality.

In various embodiments, the central controller 110 may obtain one or more specifications automatically. For example, once given information about the model of a peripheral, the central controller may access a stored table or other data structure that associates peripheral models with peripheral specifications. In various embodiments, information about a peripheral may be stored in a table, such as in peripheral device table 1000. Any information stored in peripheral device table 1000 may be obtained from a user, may be obtained automatically from a peripheral, or may be obtained in any other fashion. In various environments, a user may provide the central controller with guidelines, permissions, or the like for interacting with the peripheral device. Permissions may include permissions for monitoring inputs received at the peripheral device. Inputs may include active inputs, such as button presses, key presses, touches, mouse motions, text entered, intentional voice commands, or any other active inputs. Inputs may include passive inputs (e.g., inputs supplied unconsciously or passively by the user), such as a camera image, a camera feed (e.g., a camera feed of the user), an audio feed, a biometric, a heart rate, a breathing rate, a skin temperature, a pressure (e.g., a resting hand pressure), a glucose level, a metabolite level, or any other passive input.

In some embodiments, separate permissions may be granted for separate types of inputs. In some embodiments, a global permission may be granted for all types of inputs. In some embodiments, a global permission may be granted while certain exceptions are also noted (e.g., the central controller is permitted to monitor all inputs except for heart rate). In various embodiments, permissions may pertain to how the central controller may use the information (e.g., the information can be used for adjusting the difficulty but not for selecting advertisements). In various embodiments, permissions may pertain to how long the central controller can store the information (e.g., the central controller is permitted to store information only for 24 hours). In various embodiments, permissions may pertain to what other entities may access the information (e.g., only that user's doctor may access the information). In various environments, the user may grant permissions to the central controller to output at or via the peripheral.

The user may indicate what components of the peripheral device may be used for output. For example, a mouse might have a display and a heating element. The user may grant permission to output text on the display, but not to activate the heating element. With reference to a given component, the user may indicate the manner in which an output can be made. For example, the user may indicate that a speaker may output at no more than 30 decibels, a text message on a screen may be no more than 50 characters, or any other restriction. The user may indicate when the central controller 110 may output via the peripheral (e.g., only during weekends; e.g., only between 9 p.m. and 11 p.m.). The user may indicate circumstances under which an output may be made on a peripheral. For example an output may be made only when a user is playing a particular type of game. This may ensure, for example, that the user is not bombarded with messages when he is trying to work.

In various embodiments, a user may indicate what other users or what other entities may originate a message, tag, or content that is output on the peripheral. For example, the user may have a group of friends or teammates that are granted permission to send messages or tags that are then output on the user's peripheral device. A user may also grant permission to a content provider, an advertiser, a celebrity, or any other entity desired by the user. In various embodiments, a user may indicate what other users or entities may activate components of a peripheral device, such as triggering a heating element. In various embodiments, a user may grant permissions for one or more other users to take control of the peripheral device. Permission may be granted to take full control, or partial control. When a second user takes control of a first user's peripheral device, the second user may cause the peripheral device to transmit one or more signals (e.g., signals that control the movements or actions of a game character; e.g., signals that control the progression of slides in a slide presentation; e.g., signals that control the position of a cursor on a display screen).

It may be desirable to allow a second user to control the peripheral device of a first user under various circumstances. For instance, the second user may be demonstrating a technique for controlling a game character. As another example, the second user may be indicating a particular place on a display screen to which he wishes to call the attention of the first user (e.g., to a particular cell in a spreadsheet). In various embodiments, a user may indicate times and/or circumstances under which another user may take control of his peripheral device. For example, another user may only control a given user's peripheral device when they are on the same team playing a video game. Permissions for another user or a third-party to control a peripheral device may be stored in a table, such as in peripheral configuration table 1100 (e.g. in field 1110). Aforementioned steps (e.g., granting of permission) have been described in conjunction with a registration process. However, it will be appreciated that in various embodiments, the aforementioned steps may be performed at any suitable time and/or may be updated at any suitable time. For example, at any given time a user may update a list of other users that are permitted to control the user's peripheral device. In various embodiments, a registration process may include more or fewer steps or items than the aforementioned.

At step 8609, a user may configure a peripheral device, according to some embodiments. The user may configure such aspects as the operation of the peripheral device, what key sequences will accomplish what actions, the appearance of the device, and restrictions or parental controls that are placed on the device. With regard to the operation of the peripheral device, the user may configure one or more operating variables. These may include variables governing a mouse speed, a mouse acceleration, the sensitivity of one or more buttons or keys (e.g., on a mouse or keyboard), the resolution at which video will be recorded by a camera, the amount of noise cancellation to be used in a microphone, or any other operating characteristic. Operating characteristics may be stored in a table, such as in peripheral configuration table 1100. In various embodiments, a user may configure input sequences, such as key sequences (e.g., shortcut key sequences). These sequences may involve any user input or combination of user inputs. Sequences may involve keys, scroll wheels, touch pads, mouse motions, head motions (as with a headset), hand motions (e.g., as captured by a camera) or any other user input. The user may specify such sequences using explicit descriptions (e.g., by specifying text descriptions in the user interface of a program or app, such as "left mouse button—right mouse button"), by checking boxes in an app (e.g., where each box corresponds to a user input), by actually performing the user input sequence one or more times (e.g., on the actual peripheral), or in any other fashion. For a given input sequence, a user may specify one or more associated actions. Actions may include, for example, "reload", "shoot five times", "copy formula" (e.g., in a spreadsheet), send a particular message to another user, send or apply a tag to another user (e.g., "good strategy", "enemy area"), or any other action. In various embodiments, an action may be an action of the peripheral itself. For example, pressing the right mouse button three times may be equivalent to the action of physically moving the mouse three feet to the right.

In various embodiments, a user may specify a sequence of actions that corresponds to an input sequence. For example, if the user scrolls a mouse wheel up and then down quickly, then a game character will reload and shoot five times in a row. A sequence of actions triggered by a user input may be referred to as a "macro". A macro may allow a user to accomplish a relatively cumbersome or complex maneuver with minimal input required. In some embodiments, a peripheral device (or other device) may record a user's actions or activities in a live scenario (e.g., as the user is playing a live video game; e.g., as the user is editing a document). The recording may include multiple individual inputs by the user (e.g., multiple mouse movements, multiple key presses, etc.). These multiple inputs by the user may be consolidated into a macro. Thus in the future, for example, the user may repeat a similar set of multiple inputs, but now using a shortcut input. Configuration of user input sequences may be stored in a table, such as in table "mapping of user input to an action/message" 2600.

In various embodiments, a user may configure the appearance of a peripheral device. The appearance may include a default or background image that will appear on the device (e.g., on a screen of the device). The appearance may include a color or intensity of one or more lights on the peripheral device. For example, LED lights on a keyboard may be configured to shine in blue light by default. The appearance may include a dynamic setting. For example, a display screen on a peripheral may show a short video clip over and over, or lights may cycle between several colors. An appearance may include a physical configuration. For example, a camera is configured to point in a particular direction, a keyboard is configured to tilt at a certain angle, or any other physical configuration. As will be appreciated, various embodiments contemplate other configurations of an appearance of a peripheral device. In various embodiments, a user may configure a "footprint" or other marker of a peripheral device. For example, the user may configure a mouse pointer as it appears on a user device (e.g., on a personal computer). In various embodiments, a configuration of an appearance may be stored in a table, such as in "peripheral configuration table" 1100. In various embodiments, a user may configure restrictions, locks, parental controls, or other safeguards on the use of a peripheral.

Restrictions may refer to certain programs, apps, web pages, Facebook® pages, video games, or other content. In various embodiments, a user may indicate a restriction using a tag. Different tags may be used to indicate different types of restrictions (e.g., "no access after 8:00 pm"; e.g., "no access by Billy"; e.g., "no more than 20 minutes per day of access", etc.). In various embodiments, a tag may be used to indicate the nature of programs, apps, content, etc. (e.g., "graphic"; e.g., "violent"; e.g., "mature"; etc.). Restrictions may automatically be implemented based on the nature of the content.

When an attempt is made to use a peripheral in conjunction with restricted content, the functionality of the peripheral may be reduced or eliminated. For example, if a user attempts to click on a link on a particular web page (e.g., a web page with restricted content), then the user's mouse button may not register the user's click. In various embodiments, restrictions may pertain to the motion or other usage of the peripheral device itself. A restriction may dictate that a peripheral device cannot be moved at more than a certain velocity, cannot be moved more than a certain distance, cannot be in continuous motion for more than some predetermined amount of time, cannot output sound above a particular volume, cannot flash lights at a particular range of frequencies (e.g., at 5 to 30 hertz), or any other restriction. Such restrictions may, for example, seek to avoid injury or other harm to the user of the peripheral, or to the surrounding environment. For example, a parent may wish to avoid having a child shake a peripheral too violently while in the vicinity of a fragile crystal chandelier. In various embodiments, a peripheral may identify its current user. For example, the peripheral may identify whether an adult in a house is using a peripheral, or whether a child in a house is using the peripheral. A peripheral may explicitly ask for identification (or some means of ascertaining identification, such as a password unique to each user), or the peripheral may identify a user in some other fashion (e.g., via a biometric signature, via a usage pattern, or in any other fashion).

In various embodiments, a peripheral may require authentication for a user to use the peripheral. For example, the peripheral may require a password, fingerprint, voiceprint or other authentication. In various embodiments, restrictions or parental controls may apply to individual users. For example, only the child in a particular house is restricted from accessing certain web content or video games. In this way, after identifying a user, a peripheral may implement or enforce restrictions only if such restrictions apply to the identified user. In various embodiments, a peripheral device may not function at all with one or more users (e.g., with any user other than its owner). This may, for example, discourage someone from taking or stealing another user's peripheral. In various embodiments, a user designates restricted content by checking boxes corresponding to the content (e.g., boxes next to a description or image of the content), by providing links or domain names for the restricted content, by designating a category of content (e.g., all content rated as "violent" by a third-party rating agency; e.g., all content rated R or higher) or in any other fashion. A user may designate one or more users to which restrictions apply by entering names or other identifying information for such users, by checking a box corresponding to the user, or in any other fashion. In various embodiments, a user may set up restrictions using an app (e.g., an app associated with the central controller 110), program, web page, or in any other fashion.

At step 8612, a user may register for a game, according to some embodiments. The user may identify a game title, a time to play, a game level, a league or other desired level of competition (e.g., an amateur league), a mission, a starting point, a stadium or arena (e.g., for a sports game), a time limit on the game, one or more peripheral devices he will be using (e.g., mouse and keyboard; e.g., game console controller), a user device he will be using (e.g., a personal computer; e.g., a game console; e.g., an Xbox), a character, a set of resources (e.g., an amount of ammunition to start with; e.g., a weapon to start with), a privacy level (e.g., whether or not the game can be shown to others; e.g., the categories of people who can view the game play), or any other item pertinent to the game. In various embodiments, a user may sign a consent form permitting one or more aspects of the user's game, character, likeness, gameplay, etc. to be shown, shared, broadcast or otherwise made available to others. In various embodiments, a user may pay an entry fee for a game. The user may pay in any suitable fashion, such as using cash, game currency, pledges of cash, commitments to do one or more tasks (e.g., to visit a sponsor's website), or in any other form.

In various embodiments, a user may register one or more team members, one or more opponents, one or more judges, one or more audience members, or any other participant(s). For example, the user may provide names, screen names, or any other identifying information for the other participants. In various embodiments, a user may designate a team identifier (e.g., a team name). One or more other users may then register and indicate that they are to be part of that team. Similarly, in various embodiments, a user may designate a game. Subsequently, one or more other users may then register and indicate that they are to be part of that game. Various embodiments contemplate that multiple participants may register for the same team or same game in any suitable fashion. In various embodiments, user information provided when registering with the central controller, when registering for a game, or provided at any other time or in any other fashion, may be stored in one or more tables such as in "user game profiles" table 2700. In various embodiments, when a user has registered for a game, the user may be provided with messages, teasers, reminders, or any other previews of the game. In various embodiments, a peripheral device may show a timer or clock that counts down the time remaining until the game starts. In various embodiments, a peripheral device may change colors as game time approaches. For example, the peripheral device might change from displaying a green color to displaying a red color when there are less than five minutes remaining until game time. In various embodiments, a peripheral may sound an alarm when a game is about to start.

In the lead-up to a game (or at any other time) a user may take a tutorial. The tutorial may explain how to play a game, how to efficiently play a game, how to execute one or more actions during a game, how to use a peripheral effectively during a game, or may cover any other task or subject. In various embodiments, one or more components of a peripheral will attempt to draw a user's attention during a tutorial. For example, a key or a button may blink, light up, or change color. In another example, a button may heat up or create a haptic sensation. The intention may be for the user to press or actuate whatever component is drawing attention. For example, if the tutorial is teaching a user to press a series of buttons in succession, then the buttons may light up in the order of which they should be pressed. Once the user presses a first button that has been lit, the first button may go off and a second button may light up indicating that it too should be pressed. In various environments, a tutorial uses a combination of text or visual instruction, in conjunction with hands-on actuation of peripheral device components by the user. The text or visual instruction may be delivered via a user device, via a peripheral device (e.g., via the same peripheral device that the user is actuating), or via any other means.

At step 8615, a user may initiate a game, according to some embodiments. In various embodiments, the game starts based on a predetermined schedule (e.g., the game was scheduled to start at 3 p.m., and does in fact start at 3 p.m.). In various embodiments, the user manually initiates gameplay (e.g., by clicking "start", etc.). When a user begins playing, any team members, opponents, judges, referees, audience members, sponsors, or other participants may also commence their participation in the game. In various embodiments, a user may join a game that has been initiated by another user. For example, the user may join as a teammate to the initiating user or as some other participant.

At step 8618, the central controller 110 may track user gameplay, according to some embodiments. The central controller 110 may track one or more of: peripheral device use; game moves, decisions, tactics, and/or strategies; vital readings (e.g., heart rate, blood pressure, etc.); team interactions; ambient conditions (e.g., dog barking in the background; local weather); or any other information. In various embodiments, the central controller 110 may track peripheral device activity or use. This may include button presses, key presses, clicks, double clicks, mouse motions, head motions, hand motions, motions of any other body part, directions moved, directions turned, speed moved, distance moved, wheels turned (e.g., scroll wheels turned), swipes (e.g., on a trackpad), voice commands spoken, text commands entered, messages sent, or any other peripheral device interaction, or any combination of such interactions. The peripheral device activity may be stored in a table, such as in 'peripheral activity log' table 2200. Each activity or action of the peripheral device may receive a timestamp (e.g., see fields 2206 and 2208). In this way, for example, peripheral device activity may be associated with other circumstances that were transpiring at the same time. For example, a click of a mouse button can be associated with a particular game state that was in effect at the same time, and thus it may be ascertainable what a user was trying to accomplish with the click of the mouse (e.g., the user was trying to pick up a medicine bag in the game).

Peripheral device activities may be stored in terms of raw signals received from the peripheral device (e.g., bit streams), higher-level interpretations of signals received from the peripheral device (e.g., left button clicked), or in any other suitable fashion. In various embodiments, two or more actions of a peripheral device may be grouped or combined and stored as a single aggregate action. For example, a series of small mouse movements may be stored as an aggregate movement which is the vector sum of the small mouse movements. In various embodiments, the central controller may track vital readings or other biometric readings. Readings may include heart rate, breathing rate, brain waves, skin conductivity, body temperature, glucose levels, other metabolite levels, muscle tension, pupil dilation, breath oxygen levels, or any other readings. These may be tracked, for example, through sensors in a peripheral device. Vital readings may also be tracked indirectly, such as via video feed (e.g., heart rate may be discerned from a video feed based on minute fluctuations in skin coloration with each heartbeat). Vital readings or biometrics may be tracked using any suitable technique.

In some embodiments, the vital readings of a first user may be broadcast to one or more other users. This may add a level of excitement or strategy to the game. For example, one player may be able to discern or infer when another player is tense, and may factor that knowledge into a decision as to whether to press an attack or not. In various embodiments, the central controller 110 may track ambient conditions surrounding gameplay. These may include room temperature, humidity, noise levels, lighting, local weather, or any other conditions. The central controller may track particular sounds or types of sounds, such as a dog barking in the background, a horn honking, a doorbell ringing, a phone ringing, a tea kettle sounding off, or any other type of sound. In various embodiments, ambient conditions may be correlated to a user's gameplay. For example, the central controller 110 may determine that the user tends to perform better in colder temperatures. Therefore, ambient conditions may be used to make predictions about a user's game performance, or to recommend to a user that he seek more favorable ambient conditions (e.g., by turning on the air conditioning). In various embodiments, ambient conditions may be detected using one or more sensors of a peripheral device, using a local weather service, or via any other means.

In various embodiments, the central controller 110 may track game moves, decisions, tactics, strategies, or other game occurrences. Such a occurrences may include a weapon chosen by a user, a road chosen by a user, a path chosen, a door chosen, a disguise chosen, a vehicle chosen, a defense chosen, a chess move made, a bet made, a card played, a card discarded, a battle formation used, a choice of which player will covered which other player (e.g., in a combat scenario, which player will protect the back of which other player), a choice of close combat versus distant combat, or any other game choice made by a player or team of players. In various embodiments, the central controller may track decisions made by referees, judges, audience members, or any other participants. In various embodiments, the central controller 110 may track team interactions. The central controller may track text messages, messages, voice messages, voice conversations, or other signals transmitted between team members. The central controller may track resources passed between player characters (e.g., ammunition or medical supplies transferred). The central controller may track the relative positioning of player characters. The central controller may track any other aspect of team interaction. In various embodiments, the central controller 110 may utilize an aspect of a user's gameplay to identify the user. For example, the user may have a unique pattern of moving a mouse or hitting a keyboard. In some embodiments, a user may be subsequently authenticated or identified based on the aspect of the user's gameplay.

In various embodiments, during gameplay (or at any other time), a user may tag an element or aspect of the game. A tag may represent an aid (e.g., memory aid) in a game. For example, a user may tag an opponent as a "good player" so as to know to be extra vigilant around that opponent. A tag may represent feedback for the user's own review (e.g., "practice archery"; e.g., "try door number two next time"; e.g., "the dragon's weak point is his left foot"; e.g., "starting the avalanche fails" etc.). A tag may represent tags for teammates or other users (e.g., "beware of hidden trap door here"). A tag may represent feedback for a game designer or publisher (e.g., "new sword doesn't work in caves", "don't like ship's design"; etc.). A tag may be used to lodge a protest (e.g., "bad call by referee"). A tag may be used for any other purpose.

At step 8621, the central controller 110 may react or respond to user gameplay, according to some embodiments. In various embodiments, the central controller may adjust one or more aspects of the game (e.g., difficulty level) based on user gameplay. The central controller may increase difficulty level if the user is scoring highly relative to other users, or relative to the current user's prior scores at the same game. The central controller may decrease difficulty level if the user is scoring poorly relative to other users, is dying quickly, or is otherwise performing poorly. In various embodiments, if a user is primarily or overly reliant on one resource (e.g., on one particular weapon or vehicle), or on a small group of resources, then the central controller 110 may steer the game in such a way that the one resource (or small group of resources) is no longer as useful. For example, if the user has been relying on a motorcycle as transportation, then the central controller may steer the game such that the user has to navigate a swamp area where other vehicles (e.g., a canoe) may be preferable to a motorcycle. This may incentivize the user to become acquainted with other resources and/or other aspects of the game. In various embodiments, the central controller 110 may steer a game towards circumstances, situations, environments, etc., with which the player may have had relatively little (or no) experience. This may encourage the player to gain experience with other aspects of the game.

In various embodiments, the central controller 110 may tag one or more user actions during a game and/or aspects of the game. The central controller may tag a juncture where a user made a good choice, a bad choice, an unusual choice, made a mistake, failed to take advantage of a resource, missed a hidden passage, engaged in a particular activity, etc. The central controller may tag a resource that a user did not use skillfully (e.g., a weapon that the user did not aim accurately). The central controller may tag any other aspect of the game. In various embodiments, the user and/or central controller may subsequently review the game and/or tags, e.g., in an effort to improve the user's skill at the game. In various embodiments, tags may be reviewed by a game designer or owner so as to improve the game itself. For example, if a particular activity received many tags (e.g., many game players engaged in that activity), the game designer may seek to incorporate more of the activity into the game. As another example, if users consistently failed to take advantage of a resource (e.g., a flying carpet), a game designer may update the game to make the resource more visible or obvious.

In various embodiments, elements of ambient conditions may be incorporated into a game itself. For example, if the central controller 110 detects a dog barking in the background, then a dog might also appear within a game. In various embodiments, the central controller 110 may advise or tell the user of an action to take based on observations of the user's gameplay. If the central controller has detected low metabolite levels (e.g., low sugar or low protein) with the user, the central controller may advise the user to eat and/or to quit. In various embodiments, the central controller may infer user health status from game play. In various embodiments, one or more vital signs (e.g., blood pressure) may be obtained directly or indirectly from sensors. In various embodiments, the central controller may utilize user actions as an indicator of health state or status. If a user's game performance has declined, then this may be indicative of health problems (e.g., dehydration, fatigue, infection, heart attack, stroke, etc.). In various embodiments, game performance may be measured in terms of points scored, points scored per unit of time, opponents neutralized, levels achieved, objectives achieved, time lasted, skill level of opponents beaten, or in terms of any other factor.

A decline in game performance may be defined as a reduced performance during a given time interval (e.g., the last 15 minutes, today, the most recent seven days) versus game performance in a prior time interval (e.g., the 15-minute period ending 15 minutes ago; e.g., the 15-minute period ending one hour ago; e.g., the 15-minute period ending this time yesterday; e.g., the day before yesterday; the seven-day period ending seven days ago; etc.). In various embodiments, the central controller may monitor for a decline of a certain amount (e.g., at least 10%) before conclusively determining that performance has declined. In various embodiments, a player's performance may be compared to that of other players (such as to that of other players of a similar skill level, such as to that of other players with a similar amount of experience, such as to all other players). If a player's performance is significantly worse than that of other players (e.g., 20% or more worse), then the central controller 110 may infer a health problem.

In various embodiments, improvements in a player's performance may be used to infer positive changes in health status (e.g., that the user is better rested; e.g., that the user has overcome an illness; etc.). In various embodiments, the central controller 110 may combine data on vital signs with data on player performance in order to infer health status. For example, an increased body temperature coupled with a decline in performance may serve as a signal of illness in the player. In various embodiments, the central controller 110 may initiate recording and/or broadcasting of user gameplay based on sensor readings from a peripheral. Such sensor readings may include readings of vital signs. The central controller may also initiate recording and/or broadcasting based on inferred vital signs. This may allow the central controller, for example, to detect a level of excitement with the user, and initiate recording when the user is excited. The central controller may thereby capture footage that is more likely to be exciting, interesting, memorable, or otherwise noteworthy. In various embodiments, the central controller 110 may initiate recording when a user's heart rate exceeds a certain level. The level may be an absolute heart rate (e.g., one hundred beats per minute) or a relative heart rate (e.g., 20% above a user's baseline heart rate). In various embodiments, the central controller may initiate recording in response to a change in skin conductivity, blood pressure, skin coloration, breath oxygen levels, or in response to any other change in a user's vital signs.

In various embodiments, the central controller 110 may stop or pause recording when a user's vital sign or vital signs have fallen below a certain threshold or have declined by predetermined relative amount. In various embodiments, the central controller 110 may start recording or broadcasting when vital signs have fallen below a certain threshold (or decreased by a certain relative amount). The central controller may stop or pause recording when vital signs have increased above a certain threshold. In various embodiments, the central controller 110 may use a combination of sensor readings (e.g., of user vital signs) and user gameplay as a determinant of when to commence or terminate recording. For example, if the user's heart rate increases by 10% and the number of clicks per minute has increased by 20%, then the central controller may commence recording. In various embodiments, the central controller may track sensor inputs or other inputs from other users or participants, such as from audience members. These inputs may be used to determine when to start or stop recording or broadcasting. For example, the central controller may detect excitement levels in an audience member, and may thereby decide to record the ensuing gameplay action, as it may have a high chance of being interesting.

In various embodiments, the central controller may tag one or more user actions or junctures in a game based on user vital signs, biometrics, etc. The central controller may tag a juncture where a user's heart rate peaked, a user's heart rate exceeded 100 beats/minute, where a user's breathing rate peaked, where a user's skin conductivity was in the 90th percentile, etc. The user and/or other users may subsequently review the tagged portions of the game, e.g., to relive exciting moments. Also, a game designer may review the tagged portions so as to improve the game itself (e.g., to incorporate more of the activity into the game that resulted in an elevated heart rate).

At step 8624, a peripheral device may feature some aspect of the game, according to some embodiments. In various embodiments, a peripheral device may feature, convey, or otherwise indicate some aspect of the game. In various embodiments, a peripheral device may feature a tag applied in a game, such as a tag applied by a team member, audience member, etc. A peripheral may explicitly display information, such as an amount of ammunition remaining with a player, a number of damage points sustained by a player, a set of coordinates detailing a player's location in a game, the number of opponent characters within a particular radius of the player's character, or any other game information. The information may be displayed using alphanumeric characters, bar graphs, graphs, or using any other means of presentation. In various embodiments, game information may be conveyed by a peripheral indirectly. In various embodiments, the color of a component of a peripheral (e.g., of an LED) may vary based on the health of the player's game character. For instance, if the game character is at full strength, the LED may be green, while if the game character is one hit away from dying, then the LED may be red. In various embodiments, the LED may show a range of colors between red and green (e.g., each color within the range having a different mixture of red and green), to convey intermediate health statuses of the game character.

In various embodiments, a peripheral device may convey game information (e.g., tags applied during a game) using a level of sound (e.g., louder sounds convey tags with higher urgency, such as "keep up the attack!"; e.g., louder sounds convey poorer health statuses of the game character), using a volume of sound, using a pitch of sound, using a tempo (e.g., which can be varied from slow to fast), using vibrations, using a level of heat, using a level of electric shock, or via any other means. In various embodiments, a peripheral device may display or otherwise convey an attribute of another player, such as an attribute of another player's gameplay or a vital sign of another player. For example, a peripheral device may display the heart rate of another player. As another example, the color of a component of a peripheral device may cycle in sync with the breathing cycle of another player (e.g., the LED varies from orange on an inhale to yellow on an exhale then back to orange on the next inhale, and so on).

At step 8627, the central controller 110 may broadcast a game feed to others, according to some embodiments. For example, the feed may be broadcast via Twitch, via another streaming platform, via television broadcast, or via any other means. In various embodiments, part or all of a feed may be broadcast to a peripheral device, such as a peripheral device of an observing user. A feed may seek to mimic or replicate the experience of the playing user with the observing user. For example, if the playing user is receiving haptic feedback in his mouse, then similar haptic feedback may be broadcast to an observing user's mouse.

At step 8630, the central controller 110 may trigger the presentation of an advertisement, according to some embodiments. In various embodiments, step 8630 may include the presentation of a promotion, infomercial, white paper, coupon, or any other similar content, or any other content. The advertisement may be triggered based on one or more factors, including: events in the game; detected user gameplay; sensor inputs; detected user vital signs; stored user preferences; ambient conditions; or based on any other factors. For example, upon detection of low glucose levels, an ad for a candy bar may be triggered. The advertisement may be presented to the user in various ways. the advertisement may appear within the gaming environment itself, such as on an in-game billboard. The advertisement may appear in a separate area on a screen, such as on the screen of a user device. The advertisement may appear as an overlay on top of the game graphics. The advertisement may temporarily interrupt gameplay, and may, e.g., appear full screen. In various embodiments, an advertisement may appear in full or in part on a peripheral device. For example, an advertisement may appear on a display screen of a mouse or of a keyboard. In various embodiments, a company's colors may be displayed with lights on a peripheral device. For example, LED Lights on a mouse may shine in the red white and blue of the Pepsi logo when a Pepsi advertisement is featured. In various embodiments, a peripheral device may broadcast sound, vibrations, haptic feedback, or other sensory information in association with an advertisement. For example, in conjunction with an advertisement for potato chips, a mouse may rumble as if to mimic the crunching of a potato chip.

At step 8633, the user makes an in-game purchase, according to some embodiments. The user may purchase a game resource (e.g., a weapon, vehicle, treasure, etc.), an avatar, an aesthetic (e.g., a background image; e.g., a dwelling; e.g., a landscape), a game shortcut (e.g., a quick way to a higher-level or to a different screen; e.g., a quick way to bypass an obstacle), a health enhancement for a game character, a revival of a dead character, a special capability (e.g., invisibility to other players, e.g., flight), or any other item pertinent to a game. In various embodiments, the user may purchase an item external to a game, such as an item that has been advertised to the user (e.g., a pizza from a local restaurant). In various embodiments, the user may make a purchase using a financial account, such as a financial account previously registered or created with the central controller 110. In various embodiments, prior to completing a purchase, the user may be required to authenticate himself. To authenticate himself, a user may enter a password, supply a biometric, and/or supply a pattern of inputs (e.g., mouse movements, e.g., keystrokes) that serve as a unique signature of the user. In various embodiments, an amount of authentication may increase with the size of the purchase. For example, one biometric identifier may be required for a purchase under $10, but two biometric identifiers may be required for a purchase over $10.

At step 8636, User 1 and user 2 pass messages to each other's peripheral devices, according to some embodiments. In various embodiments, a message may include words, sentences, and the like, e.g., as with traditional written or verbal communication. A message may include text and/or spoken words (e.g., recorded voice, e.g., synthesized voice). In various embodiments, a message may include images, emojis, videos, or any other graphic or moving graphic. In various embodiments, a message may include tags. In various embodiments, a message may include sounds, sound effects (e.g., a drum roll; e.g., a well-known exclamation uttered by a cartoon character) or any other audio. In various embodiments, a message may include other sensory outputs. A message may include instructions to heat a heating element, instructions for generating haptic sensations, instructions for increasing or decreasing the resistance of a button or scroll wheel or other actuator, instructions for releasing scents or perfumes or other olfactory stimulants, or instructions for inducing any other sensation. For example, user 1 may wish to send a message to user 2 with text "you are on fire!" and with instructions to increase the temperature of a heating element in user 2's mouse. The message may generate increased impact for user 2 because the message is experienced in multiple sensory modalities (e.g., visual and tactile).

In various embodiments, a user may explicitly type or speak a message. In various embodiments, a user may employ a sequence of inputs (e.g., a shortcut sequence) to generate a message. The central controller 110 may recognize a shortcut sequence and translate the sequence using one or more tables, such as "mapping of user input to an action/message" table 2600 and "generic actions/messages" table 2500. In various embodiments, a user may receive an alert at his peripheral device that he has received a message. The user may then read or otherwise perceive the message at a later time. The alert may comprise a tone, a changing color of a component of the peripheral device, or any other suitable alert. In various embodiments, a message may include an identifier, name, etc., for an intended recipient. In various embodiments, a message may include an indication of a peripheral device and/or a type of peripheral device that is the intended conveyor of the message. In various embodiments, a message may include an indication of a combination of devices that are the intended conveyors of the message. For example, a message may include instructions for the message to be conveyed using a mouse with a display screen and any peripheral device or user device with a speaker. In various embodiments, a message may be broadcast to multiple recipients, such as to all members of a gaming team. The message may be presented to different recipients in different ways. For example the recipients might have different peripheral devices, or different models of peripheral devices. In various embodiments, a message may contain instructions for conveying the message that specify a device-dependent method of conveyance. For example, if a recipient has a mouse with LED lights, then the LED lights are to turn purple. However, if a recipient has a mouse with no LED lights, then the recipient's computer monitor is to turn purple.

At step 8639, User 1 and user 2 jointly control a game character, according to some embodiments. In various embodiments, user 1 may control one capability of the game character while user 2 controls another capability of the game character. Different capabilities of the same game character may include: moving, using a weapon, firing a weapon, aiming a weapon, using individual body parts (e.g., arms versus legs; e.g., arms for punching versus legs for kicking), looking in a particular direction, navigating, casting a spell, grabbing or procuring an item of interest (e.g., treasure, e.g., medical supplies), building (e.g., building a barricade), breaking, solving (e.g., solving an in-game puzzle), signaling, sending a message, sending a text message, sending a spoken message, receiving a message, interpreting a message, or any other capability. For example, user 1 may control the movement of a character, while user 2 may control shooting enemy characters with a weapon. For example, user 1 may control the arms of a character, while user 2 may control the legs of a character. For example, user 1 may control the movement of a character, while user 2 communicates with other characters. In various embodiments, user 1 and user 2 jointly control a vehicle (e.g., spaceship, tank, boat, submarine, robot, mech robot), animal (e.g., horse, elephant), mythical creature (e.g., dragon, zombie), monster, platoon, army, battalion, or any other game entity. For example, user 1 may control the navigation of a spaceship, while user 2 may control shooting enemy spaceships.

In operation, the central controller 110 may receive inputs from each of user 1 and user 2. The central controller may interpret each input differently, even if they are coming from similar peripheral devices. For example, inputs from user 1 may be interpreted as control signals for a character's legs, while inputs from user 2 are interpreted as control signals for a character's arms. Prior to a game (e.g., during registration), two or more users may indicate an intent to control the same character. The users may then collectively select what aspect of the character each will control. For example, each user may check a box next to some aspect of a character that they intend to control. Subsequently, the central controller may interpret control signals from the respective users as controlling only those aspects of the character for which ta respectively signed up. In various embodiments, one or more users may indicate an intent to control the same character at some other time, such as after a game has started. In various embodiments, inputs from two or more users may be combined or aggregated in some way to control the same character, and even to control the same aspect(s) of the same character. For example, the motion of a character may be determined as the sum of the control signals from the respective users. For example, if both user 1 and user 2 attempt to move the character to the right, then the character may in fact move right. However, if user 1 and user 2 attempt to move the character in opposite directions, then the character may not move at all. In various embodiments, control signals from two or more users may be combined in different ways in order to determine an action of a character. For example, the control signal of one user may take priority over the control signal of another user when there is conflict, or the control signal of one user may be weighted more heavily than the control signal of another user. In various embodiments, more than two users may jointly control a game character, vehicle, animal, or any other game entity.

At step 8642, User 1 and user 2 vote on a game decision, according to some embodiments. A game decision may include any action that can be taken in a game. A game decision may include a route to take, a weapon to use, a vehicle to use, a place to aim, a shield to use, a message to send, a signal to send, an evasive action to take, a card to play, a chess piece to move, a size of a bet, a decision to fold (e.g., in poker), an alliance to make, a risk to attempt, a bench player to use (e.g., in a sports game), an item to purchase (e.g., a map to purchase in a game) or any other game decision. In various embodiments, when a decision is to be made, the central controller may explicitly present the available choices to all relevant users (e.g., via menu). Users may then have the opportunity to make their choice, and the choice with the plurality or majority of the vote may be implemented. In various embodiments, decisions are not presented explicitly. Instead, users may signal their desired actions (e.g., using standard game inputs; e.g., using a tag), and the central controller may implement the action corresponding to majority or plurality of received signals. As will be appreciated, various other methods may be used for voting on an action in a game and such methods are contemplated according to various embodiments. In various embodiments, the votes of different users may be weighted differently. For example, the vote of user 1 may count 40%, while the votes for each of users 2, 3 and 4 may count for 20%. A candidate action which wins the weighted majority or weighted plurality of the vote may then be implemented.

At step 8645, user 2 controls user 1's peripheral device, according to some embodiments. There may be various reasons for user 2 to control the peripheral device of user 1. User 2 may be demonstrating a technique, tactic, strategy, etc., for user 1. User 2 may configure the peripheral device of user 1 in a particular way, perhaps in a way that user 1 was not able to accomplish on his own. The peripheral device belonging to user 1 may have more capabilities than does the peripheral device belonging to user 2. Accordingly, user 2 may need to "borrow" the capabilities of user 1's peripheral device in order to execute a maneuver, or perform some other task (e.g., in order to instruct or control user 2's own character). User 2 may take control of the peripheral device of user 1 for any other conceivable reason. In various embodiments, to control the peripheral device of user 1, user 2 (e.g., a peripheral device of user 2, e.g., a user device of user 2) may transmit control signals over a local network, such as a network on which both user 1's peripheral and user 2's peripheral reside. In various embodiments, control signals may be sent over the internet or over some other network, and may be routed through one or more other devices or entities (e.g., through the central controller 110). In various embodiments, the peripheral device of user 1 may include a module, such as a software module, whose inputs are control signals received from user 2 (or from some other user), and whose outputs are standard component outputs that would be generated through direct use of the peripheral device of user 1. For example, a control signal received from user 2 may be translated by the software module into instructions to move a mouse pointer for some defined distance and in some defined direction.

In various embodiments, the peripheral device of user 1 may include a module, such as a software module, whose inputs are control signals received from user 2 (or from some other user), and whose outputs become inputs into the peripheral device of user 1 and/or into components of the peripheral device of user 1. For example, the output of the software module may be treated as an input signal into a mouse button, as an input signal to a sensor on the peripheral device of user 1, or as an input signal to the entire mouse. The output of the software module would thereby mimic, for example, the pressing of a mouse button on the peripheral device of user 1, or the moving of the peripheral device of user 1. In various embodiments, the software module may store a table mapping inputs (e.g., control signals received from user 2), to output signals for: (a) transmission to a user device; or (b) use as inputs to components of the peripheral device of user 1. In various embodiments, the software module may translate inputs received from another user into outputs using any other algorithm or in any other fashion.

In various embodiments, a control signal received from user 2 can be used directly (e.g., can be directly transmitted to the user device of user 1; e.g., can be directly used for controlling a game character of user 1), without modification. The peripheral device of user 1 would then be simply relaying the control signal received from user 2. In various embodiments, a hardware module or any other module or processor may be used for translating received control signals into signals usable by (or on behalf of) the peripheral device of user 1. In various embodiments, user 2 must have permission before he can control the peripheral device of user 1. User 1 may explicitly put user 2 on a list of users with permissions. User 1 may grant permissions to a category of users (e.g., to a game team) to which user 2 belongs. User 1 may grant permission in real time, such as by indicating a desire to pass control of a peripheral to user 2 in the present moment. In various embodiments, permissions may be temporary, such as a lasting a fixed amount of time, lasting until a particular event (e.g., until the current screen is cleared), lasting until ta are withdrawn (e.g., by user 1), or until any other suitable situation. In various embodiments, user 1 may signal a desire to regain control of his peripheral device and/or to stop allowing user 2 to control his peripheral device. For example, user 1 may enter a particular sequence of inputs that restore control of the peripheral device to user 2.

At step 8648, a game occurrence affects the function of a peripheral device, according to some embodiments. A game occurrence may include a negative occurrence, such as being hit by a weapon, by a strike, or by some other attack. A game occurrence may include crashing, falling into a ravine, driving off a road, hitting an obstacle, tripping, being injured, sustaining damage, dying, or any other mishap. A game occurrence may include losing points, losing resources, proceeding down a wrong path, losing a character's ability or abilities, or any other occurrence. A game occurrence may include striking out in a baseball game, having an opponent score points, having a goal scored upon you (e.g., in soccer or hockey), having a touchdown scored upon you, having a team player get injured, having a team player foul out, or any other occurrence. A game occurrence may include losing a hand of poker, losing a certain amount of chips, losing material in a chess game, losing a game, losing a match, losing a skirmish, losing a battle, or any other game occurrence.

The functionality of a peripheral device may be degraded in various ways, in various embodiments. A component of the peripheral device may cease to function. For example, a button of a mouse or a key on a keyboard may cease to register input. An output component may cease to function.

For example, an LED on a mouse may cease to emit light. A display screen may go dark. A speaker may stop outputting sound. In various embodiments, a component of a peripheral device may partially lose functionality. For example, a speaker may lose the ability to output sounds above a particular frequency. A display screen may lose the ability to output color but retain the ability to output black and white. As another example, a display screen may lose the ability to output graphics but may retain the ability to output text. In various embodiments, the peripheral may lose sensitivity to inputs. A button or key may require more pressure to activate. A button or key may not register some proportion or percentage of inputs. For example, a mouse button may not register every second click. Thus, in order to accomplish a single click, a player would have to press the mouse button twice. A microphone may require a higher level of incident sound in order to correctly interpret the sound (e.g., in order to correctly interpret a voice command). A camera may require more incident light in order to capture a quality image or video feed. Various embodiments contemplate that a peripheral may lose sensitivity to inputs in other ways.

In various embodiments, one or more categories of inputs may be blocked or disabled. A mouse motion in one direction (e.g., directly to the "East") may not register. (However, a user may compensate by moving the mouse first "Northeast" and then "Southeast"). In various embodiments, a sensor may be blocked or disabled. Thus, for example, the teammate of a user may be unable to ascertain the user's heart rate. Voice inputs may be disabled. Arrow keys may be disabled while text keys retain their function. Any other category of inputs may be blocked or disabled, according to some embodiments. In various embodiments, a peripheral device may generate outputs that are uncomfortable, distracting, and/or painful. For example, LED lights on a mouse may shine at full brightness, or may blink very rapidly. A heating element may become uncomfortably hot. A speaker might output a screeching sound. In various embodiments, a peripheral device may be degraded temporarily, for a predetermined amount of time (e.g., for 5 minutes) after which full functionality may be restored. In various embodiments, functionality returns gradually over some period of time. For example, functionality may return in a linear fashion over a period of 5 minutes. In various embodiments, full functionality may not necessarily be restored. In various embodiments, a peripheral device may return asymptotically to full functionality. In various embodiments, functionality is permanently effected (e.g., until the end of a game). In various embodiments, functionality may be improved or restored only upon the occurrence of some other game event (e.g., a positive game event for the player; e.g., the player successfully lands a shot on his opponent; e.g., the player finds a green ruby in the game).

At step 8651, there is a pause/break in game play, according to some embodiments. In various embodiments, a player desires to stop playing, such as to temporarily stop playing. Perhaps the player needs to get a drink or take a phone call. A player may take one or more actions to indicate he is taking a break. A player may turn over his mouse, flip over his keyboard, place his camera face-down, or otherwise position a peripheral in an orientation or configuration where it would not normally be used or would not normally function. The peripheral may then detect its own orientation, and signal to the central controller 110 that the user is taking a break. In various embodiments, when a user takes a break, the central controller takes note of a lack of input from the user (e.g., from a peripheral device of the user), and infers that the user is taking a break. When a user takes a break, the central controller 110 may pause gameplay, may inform other participants that the player has taken a break, may protect the player's character from attacks, may pause a game clock, or may take any other suitable action.

At step 8654, the game concludes, according to some embodiments. The central controller 110 may thereupon tally up scores, determine performances, determine winners, determine losers, determine prizes, determine any records achieved, determine any personal records achieved, or take any other action. The central controller 110 may award a prize to a user. A prize may include recognition, free games, game resources, game skins, character skins, avatars, music downloads, access to digital content, cash, sponsor merchandise, merchandise, promotional codes, coupons, promotions, or any other prize. In various embodiments, a peripheral device of the user may assume an altered state or appearance in recognition of a user's achievement in a game. For example, LEDs on a user's mouse may turn purple, a speaker might play a triumphant melody, a mouse may vibrate, a mouse may display a tag (e.g., a tag indicative of an achievement or performance level), or any other change may transpire. In various embodiments, user achievements may be broadcast to others. For example, the central controller 110 may broadcast a message to a user's friends or teammates detailing the achievements of the user.

At step 8657, a game highlight reel is created, according to some embodiments. The highlight reel may include a condensed or consolidated recording of gameplay that has transpired. The highlight reel may include sequences with high action, battle sequences, sequences where a player neutralized an opponent, sequences where a player sustained damage, sequences where a player scored points, or any other sequences. A highlight reel may include recorded graphics recorded audio, recorded communications from players, or any other recorded aspect of a game. In various embodiments, the highlight reel contains sufficient information to recreate a game, but does not necessarily record a game in full pixel-by-pixel detail. The highlight reel may store game sequences in compressed format. In various embodiments, a highlight reel may include sequences where a peripheral device has recorded sensor inputs meeting certain criteria. For example, a highlight reel may include all sequences where a player's heart rate was above 120. As another example, a highlight reel may include the 1% of the game where the user's measured skin conductivity was the highest. In various embodiments, a highlight reel may include game sequences or events that were tagged (e.g., with the tag "highlight" or the like; e.g., that were tagged based on high heart rate or other vital levels; etc.).

In various embodiments, a highlight reel may incorporate or recreate sensory feedback, such as sensory feedback to mimic what occurred in the game. For example, when a user's friend watches the highlight reel, the user's friend may have the opportunity to feel haptic feedback in his mouse just as the user felt during the actual game play. Thus, in various embodiments, a highlight reel may contain not only visual content, but also tactile content, audio content, and/or content for any other sensory modality, modality, or any combination of modalities. Further details on how haptic feedback may be generated can be found in U.S. Pat. No. 7,808,488, entitled "Method and Apparatus for Providing Tactile Sensations" to Martin, et al. issued Oct. 5, 2010, at columns 3-6, which is hereby incorporated by reference. In various embodiments, the central controller 110 may notify one or more other users about the existence of a highlight reel, e.g., by sending them the file, a link to the file, by sending an alert to their peripheral device, or in any other fashion.

At step 8660, the central controller 110 generates recommendations for improvement of the user's gameplay, according to some embodiments. In various embodiments, the central controller 110 may analyze the user's gameplay using an artificial intelligence or other computer program. The artificial intelligence may recreate game states that occurred when the user played, and decide what it would have done in such game states. If these decisions diverge from what the user actually decided, then the central controller may inform the player of the recommendations of the artificial intelligence, or otherwise note such game states. If the artificial intelligence agrees with what the user did, then the central controller may indicate approval to the user. In various embodiments, a user may have the opportunity to replay a game, or part of a game, from a point where the user did not perform optimally or did not make a good decision. This may allow the user to practice areas where his skill level might need improvement. In various embodiments, the central controller 110 may compare a user's decisions in a game to the decisions of other players (e.g., to skillful or professional players; e.g., to all other players) made at a similar juncture, or in a similar situation, in the game. If the user's decisions diverge from those of one or more other players, then the central controller may recommend to the user that he should have made a decision more like that of one or more other players, or the central controller may at least make the user aware of what decisions were made by other players.

Storage Devices

Referring to FIG. 71A, FIG. 71B, FIG. 71C, FIG. 71D, and FIG. 71E, perspective diagrams of exemplary data storage devices 7140*a-e* according to some embodiments are shown. The data storage devices 7140*a-e* may, for example, be utilized to store instructions and/or data such as: data in the data tables of FIGS. 7-37, 50-66, 69-70, 73, 75-76, 81, 87, 92, 95-97, and 103-105; instructions for AI algorithms; instructions for facilitating a meeting; instructions for facilitating game play; instructions for optimizing emissions of a meeting; and/or any other instructions. In some embodiments, instructions stored on the data storage devices 7140*a-e* may, when executed by a processor, cause the implementation of and/or facilitate the methods: 7400 of FIG. 74; 7900 of FIGS. 79A-C; 8600 of FIGS. 86A-C; 9100 of FIGS. 91A-B; 9800 of FIG. 98; 10100 of FIG. 101; 10200 of FIGS. 102A-B; 10600 of FIG. 106; and/or portions thereof, and/or any other methods described herein.

According to some embodiments, the first data storage device 7140*a* may comprise one or more various types of internal and/or external hard drives. The first data storage device 7140*a* may, for example, comprise a data storage medium 7146 that is read, interrogated, and/or otherwise communicatively coupled to and/or via a disk reading device 7148. In some embodiments, the first data storage device 7140*a* and/or the data storage medium 7146 may be configured to store information utilizing one or more magnetic, inductive, and/or optical means (e.g., magnetic, inductive, and/or optical-encoding). The data storage medium 7146, depicted as a first data storage medium 7146*a* for example (e.g., breakout cross-section "A"), may comprise one or more of a polymer layer 7146*a*-1, a magnetic data storage layer 7146*a*-2, a non-magnetic layer 7146*a*-3, a magnetic base layer 7146*a*-4, a contact layer 7146*a*-5, and/or a substrate layer 7146*a*-6. According to some embodiments, a magnetic read head 7148*a* may be coupled and/or disposed to read data from the magnetic data storage layer 7146*a*-2.

In some embodiments, the data storage medium 7146, depicted as a second data storage medium 7146*b* for example (e.g., breakout cross-section "B"), may comprise a plurality of data points 7146*b*-2 disposed with the second data storage medium 7146*b*. The data points 7146*b*-2 may, in some embodiments, be read and/or otherwise interfaced with via a laser-enabled read head 7148*b* disposed and/or coupled to direct a laser beam through the second data storage medium 7146*b*. In some embodiments, the second data storage device 7140*b* may comprise a CD, CD-ROM, DVD, Blu-Ray™ Disc, and/or other type of optically-encoded disk and/or other storage medium that is or becomes known or practicable. In some embodiments, the third data storage device 7140*c* may comprise a USB keyfob, dongle, and/or other type of flash memory data storage device that is or becomes known or practicable. In some embodiments, the fourth data storage device 7140*d* may comprise RAM of any type, quantity, and/or configuration that is or becomes practicable and/or desirable. In some embodiments, the fourth data storage device 7140*d* may comprise an off-chip cache such as a Level 2 (L2) cache memory device. According to some embodiments, the fifth data storage device 7140*e* may comprise an on-chip memory device such as a Level 1 (L1) cache memory device.

The data storage devices 7140*a-e* may generally store program instructions, code, and/or modules that, when executed by a processing device, cause a particular machine to function in accordance with one or more embodiments described herein. The data storage devices 7140*a-e* depicted in FIG. 71A, FIG. 71B, FIG. 71C, FIG. 71D, and FIG. 71E are representative of a class and/or subset of computer-readable media that are defined herein as "computer-readable memory" (e.g., non-transitory memory devices as opposed to transmission devices or media).

Room

Figure 72:
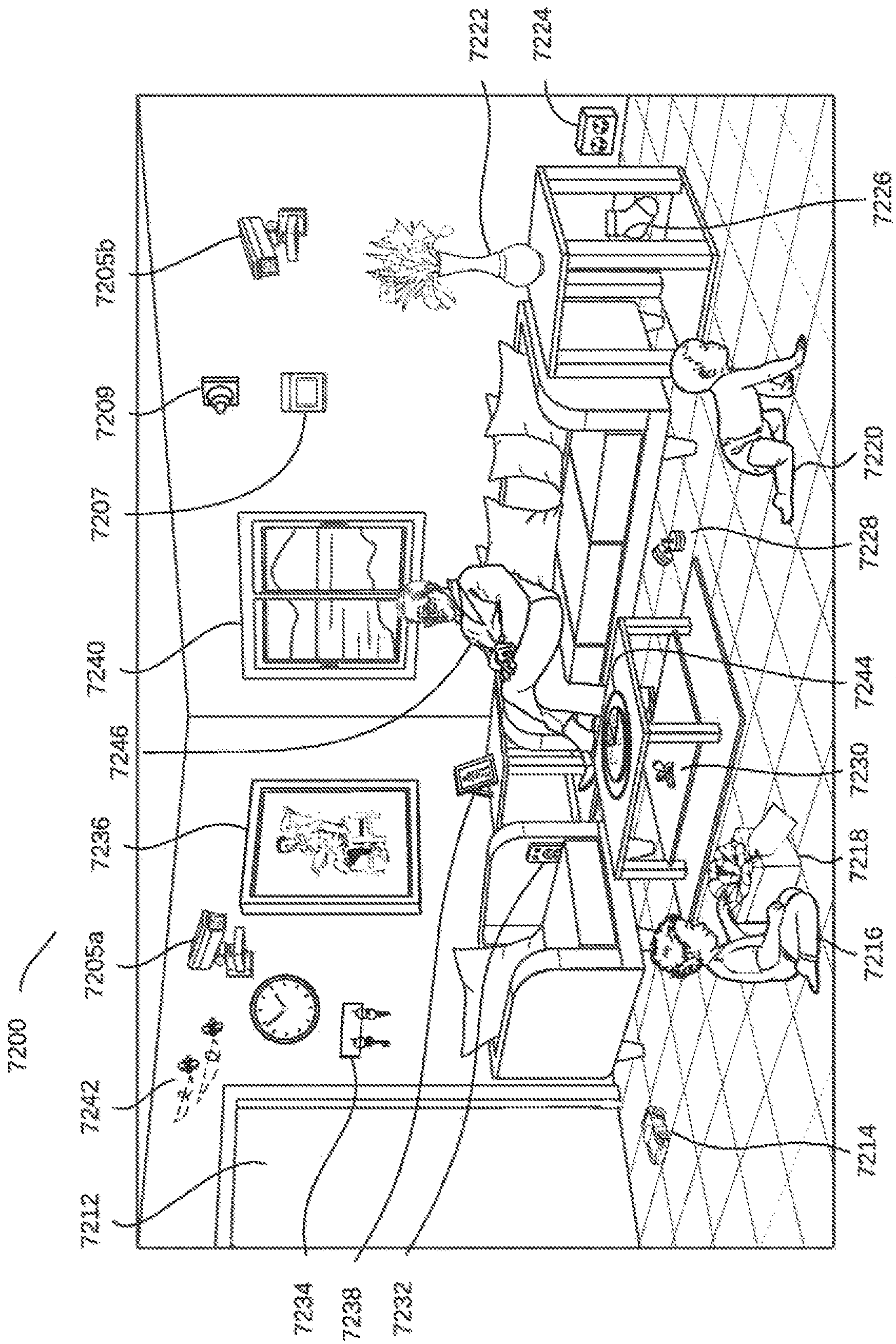
FIG. 72 is a room environment consistent with at least some embodiments described herein.

With reference to FIG. 72, a room 7200 with objects is depicted in accordance with various embodiments. Room 7200 may be a living room, such as in a home. Room 7200 may be any other room in any other location. Room 7200 may include one or more objects, such as toys, fixtures, furniture etc. Room 7200 may include one or more users. Room 7200 may include one or more devices. While room 7200 depicts an exemplary environment and arrangement of objects, users, and devices, various embodiments are applicable in any suitable environment and/or with any suitable arrangement of objects and/or users and/or devices.

In various embodiments, room 7200 includes devices and/or sensors such as cameras 7205*a* and 7205*b*, motion sensor 7207, projector 7209, and digital picture frame 7238. Room 7200 includes various objects.

Room 7200 includes, for example, door 7212, toy car 7214, present 7218, baby 7220, vase 7222, electrical outlet 7224, sock 7226, spinning tops 7228, pacifier 7230, tv remote 7232, keys 7234, painting 7236, window 7240, flies 7242, and pizza 7244. Room 7200 includes users such as adult 7246, child 7216, and child 7220.

In one or more examples, child 7220 is crawling towards vase 7222 and/or electrical outlet 7224, either of which present potential hazards. Namely, the vase can potentially fall and hurt the child, break, cause a mess, etc., and the outlet can cause shocks. One or more of cameras 7205*a* and 7205*b* and motion sensor 7207 may detect that the child is headed towards the vase and/or outlet. Projector 7209 may thereupon project a distracting image or video (e.g., a video of two fish playing) onto the floor in front of the child. This may delay the child. Camera 7205*a* (or some other device) may output an audible warning message for the adult 7246 to hear. The message may say, "Baby heading in a dangerous direction—please intervene" or the like.

In one or more examples, toy car 7214 lies on the floor near doorway 7212, and so causes a tripping hazard. Camera 7205*a* may cause projector 7209 (or a laser pointer, or any other light) to spotlight the toy car. The adult 7246 may see the spotlight, investigate, and realize he should pick up the car. Or, another person who enters the room may have their attention drawn to the car by the spotlight, and thereby avoid tripping.

In one or more examples, child 7216 is opening present 7218. This may represent a special moment that the gifter of the present (e.g., the child's aunt) would want to see. Accordingly, cameras 7205*a* and 7205*b* may capture and store images and/or video footage of the child opening the present. In various embodiments, images and/or video footage may be immediately streamed and/or sent to the gifter. In various embodiments, when the gifter subsequently visits the home and sees the opened gift, camera 7205*a* may detect and identify the interaction between the gifter and the gift, and retrieve historical information about the gift. Such historical information may include the video footage. The video footage may then be projected on a wall (e.g., by projector 7209) for the gifter to see. In various embodiments, an image of the child opening the gift may appear on digital picture frame 7238.

In one or more examples, spinning tops 7228 are on the floor near where a user (e.g., adult 7246) may step on them. Further the tops may not be in view of camera 7205*b*, but they may be in view of camera 7205*b*. Accordingly, camera 7205*b* may identify the tops in an image and, when adult 7246 stands up, cause a warning to be output to the adult. In various embodiments, the warning includes light illumination by projector 7209. However, since projector 7209 does not have a line-of-sight to the tops, projector 7209 may instead project onto the nearby coffee table an arrow, where the arrow is pointing toward the tops.

In one or more examples, a task may be associated with painting 7236. The task may be to move the painting so as to cover a crack in the wall. A camera (e.g., camera 7205*a*) may identify the crack, and cause projector 7209 to highlight the crack. The task may be assigned to adult 7246 and/or to another user.

In one or more examples, room 7200 includes lost or misplaced items, such as pacifier 7230, sock 7226 remote 7232, and pizza 7244. In various embodiments, a camera may identify such objects and assign a task to put them away (e.g., to put the pacifier in the sink to be washed, to put the sock in a hamper, to put the remote on the coffee table, to put the pizza in the refrigerator). When the task is assigned to a user, the projector 7209 may spotlight the objects so the user can more easily find them.

In one or more examples, room 7200 includes flies. In various embodiments, projector 7209 may spotlight the flies (e.g., guided by cameras 7205*a* and 7205*b*). An audio message may accompany the spotlight (e.g., "Please catch the flies").

In one or more examples, a user in the household returns from driving the family car, but forgets to leave the car key out for other drivers. Camera 7205*b* may identify the driver, and also determine that the key to the family car is not among keys 7234. Accordingly a prompt may be output to the user to leave the car key with the other keys 7234.

In various embodiments, a task defined for an object in room 7200 may be stored as a tag (e.g., in tagging table 7300). The tag may be associated with the object. The tag may be used to later trigger a prompt (e.g., when a user enters the room and has the ability to act on the prompt and fulfill the task).

Tags for objects need not only represent tasks. In various embodiments, a user is trying to decide what to do with objects in a room (e.g., in a cluttered room). The user may review the items and assign each a tag such as to "discard", "donate", "give away", "put in storage", etc. For example, car 7214 may receive a tag of "give to nephew", while pacifier 7230 may receive a tag of "discard".

In various embodiments, a tag may indicate a timeline or deadline. The tag may represent an intended action or disposition of an object, but the tag may indicate that the action should only be taken at some point in the future. For example, a user may apply a "donate" tag to a toy, but the tag may indicate that the donation should only happen after Jul. 1, 2025. This may be the anticipated time when a child is no longer interested in the toy.

Mouse Usage

In various embodiments, it may be useful to measure the utilization of a peripheral device. In various embodiments, a peripheral device utilization is measured without reference to any applications (e.g., without reference to user device applications to which the peripheral device utilization is directed, such as to Microsoft® PowerPoint® or to a video game). In various embodiments, it may be determined when a user's effectiveness in utilizing a peripheral device has declined. In various embodiments, it may be determined when a user's utilization of a peripheral device has the potential to be adverse or harmful to a user (e.g., by keeping the user up late at night, by impacting the user's health). In various embodiments, a determination of the effectiveness of the user's utilization of the peripheral device, or the potential for harm to a user may be determined by monitoring or comparing utilization of a peripheral device over time. In various embodiments, utilization of a peripheral device may be monitored for any suitable purpose.

In measuring the utilization of a peripheral device, one or more types of inputs may be measured. The types of inputs may include: presses of a button; releases of a button; clicks of a button; single clicks of a button; double clicks of a button (e.g., two clicks of the button happening in rapid succession); clicks of a right button; clicks of a left button; clicks of a central button; individual interactions with a scroll wheel; degree to which a scroll wheel is turned; direction in which a scroll wheel is turned; movements of the device itself (e.g., movements of the entire mouse); direction of movement of the device; velocity of movement of the device; acceleration of movement of the device; sub-threshold inputs (e.g., pressure placed on a button that was insufficiently strong to register as a click); clicks coupled with motions of the entire device (e.g., drags); or any other types of inputs, or any combination of inputs. In various embodiments, utilization may be measured with passive inputs, such as with inputs detected at one or more sensors but not consciously made by a user. Utilization may measure such inputs as: pressure sensed on a peripheral device (e.g., resting hand pressure); heat sensed at a device (e.g., the heat of a user's hand); a metabolite level of a user; a skin conductivity of a user; a brainwave of a user; an image of a user; an image of part of a user (e.g., of the user's hands; e.g., of the user's face), or any other inputs, or any combination of inputs.

In various embodiments, combinations of inputs may provide a useful measure of utilization. With respect to a presentation remote, a user who is effectively using the presentation remote may direct a presentation remote laser pointer from a first location to a second location using a motion that is substantially a straight line. In contrast, for example, a user who is not effectively using the presentation remote may move the presentation remote laser pointer in the wrong direction (e.g., in a direction that is 10 degrees off from the direction of the second location with respect to the first location), or may overshoot the second location. Because the user is not being economical with his presentation remote motions, changes in direction of the presentation remote motion may be more prevalent with the user. In various embodiments, a metric of utilization may be based on some statistic of inputs measured over some period of time and/or per unit of time. A metric may include the number of inputs measured over some period of time. For example, the number of button clicks measured during a one minute interval. In various embodiments, a metric may include the aggregate of inputs measured over some period of time. For example, the total distance moved by a presentation remote laser pointer in one minute, or the total number of degrees that a scroll wheel has turned in one minute. In various embodiments, a metric may include the proportion of one type of input to another type of input. For example, a metric may measure what proportion of button clicks on a presentation remote were left button clicks versus right button clicks.

In various embodiments, a metric may measure the proportion of time during which a user's hand was in contact with a peripheral. In various embodiments, a metric measures the proportion of sub-threshold clicks to actual clicks. If this metric increases over time, it may suggest, for example, that the user is tiring out and not concentrating on pressing a mouse button hard enough. In various embodiments, a metric measures: (a) the aggregate absolute changes in direction of a mouse's movement divided by (b) the total absolute distance moved by the mouse, all within some unit of time (e.g., one minute). To use a simple example, suppose in one minute a mouse moves 3 inches to a user's right, then 0.5 inches to the user's left, then 2 inches directly away from a user. The mouse has changed directions twice, first by 180 degrees, then by 90 degrees, for an aggregate change in direction of 270 degrees. The mouse has moved a total absolute distance of 5.5 inches (i.e., the absolute value of the distance of each motion is added up). The metric will then take the value of 270 degrees/5.5 inches, or approximately 49 degrees per inch. In various embodiments, this metric may be computed at different time intervals. If the size of the metric is increasing from one time interval to the next, it may be indicative that the user is becoming tired and less efficient with his mouse movements.

In some cases, there may be other explanations for a changing metric. For example, a particular encounter in a video game may require a rapid series of short mouse movements in different directions. However, in various embodiments, by computing a metric over a relatively long time interval (e.g., over 10 minutes), or by computing the metric over many different intervals (e.g., over 20 1-minute intervals), the significance of other explanatory factors can be reduced, smoothed out, or otherwise accounted for. For example, where a metric is computed over many time intervals, values that represent significant outliers can be discarded as probably occurring as a result of other explanatory factors (e.g., not due to the user's fatigue).

Adjustable Peripheral Device Parameters

In various embodiments, in response to utilization metrics (e.g., to values of a utilization metric, to changes in the value of a utilization metric over time), one or more parameters of a peripheral may be adjusted. Parameters that may be adjusted include: a sensitivity to clicks, a sensitivity to button presses, a color of a light (e.g., an LED), a brightness of a light, a background color of a display screen, a sensitivity of a touch screen, an image shown on a display screen, a rate at which a light blinks, a volume of audio output, a mapping of detected motion to reported motion (e.g., a mouse may detect 2 inches of mouse displacement but report only 1 inch of displacement, a presentation remote may detect a user hand speed of 6 feet per second, but report a speed of only two feet per second, a headset may detect a 30 degree turn of a user's head, but report only a 10 degree turn of the user's head), or any other parameter.

In various embodiments, a parameter may include whether or not a peripheral device registers an input at all (e.g., whether or not the mouse will register a right click at all). In various embodiments, a parameter may include whether or not a mouse registers any inputs at all. For example, a parameter may, upon assuming a given value, stop the mouse from functioning entirely.

Glass

Various embodiments contemplate the use of glass for such purposes as: coating substrates; display screens; touch screens; sensors; protective covers; glare reducers; fingerprint readers, or fingerprint reducers (such as so-called oleophobic screens and/or coatings); or for any other purpose. In various embodiments the Gorilla® Glass® line of glass products developed by Corning Inc. may be suitable for one or more purposes. The Gorilla® Glass® line includes such products as Gorilla® Glass™ 3, Gorilla® Glass™ 5, Gorilla® Glass™ 6, and others. Gorilla® Glass™ may provide such advantages as scratch resistance, impact damage resistance, resistance to damage even after drops from high places, resistance to damage after multiple impacts, resistance to damage from sharp objects, retained strength after impacts, high surface quality, optical purity and high light transmission, thinness, and/or lightness. Glass may be used as a flat or 2D panel, or in curved or 3D shapes to embed displays and other functionality in various surfaces and devices. Some exemplary types of glass are described in U.S. Patent RE47,837, entitled "Crack and scratch resistant glass and enclosures made therefrom" to Barefoot, et al., issued Feb. 4, 2020, the entirety of which is incorporated by reference herein for all purposes. One glass formulation described by the patent includes: "an alkali aluminosilicate glass having the composition: 66.4 mol % SiO.sub.2; 10.3 mol % Al.sub.2O.sub.3; 0.60 mol % B.sub.2O.sub.3; 4.0 mol % Na.sub.2O; 2.10 mol % K.sub.2O; 5.76 mol % MgO; 0.58 mol % CaO; 0.01 mol % ZrO.sub.2; 0.21 mol % SnO.sub.2; and 0.007 mol % Fe.sub.2O.sub.3". However, it will be appreciated that various embodiments contemplate that other suitable glass formulations could likewise be used. Other glass products that may be used include Dragontrail™ from Asahi™ and Xensation™ from Schotti™.

It will be appreciated that various embodiments contemplate the use of other materials besides glass. Such materials may include, for example, plastics, thermoplastics, engineered thermoplastics, thermoset materials, ceramics, polymers, fused silica, sapphire crystal, corundum, quartz, metals, liquid metal, various coatings, or any other suitable material.

Diffusing Fiber Optics

Various embodiments contemplate the use of diffusing fiber optics. These may include optical glass fibers where a light source, such as a laser, LED light, or other source is applied at one end and emitted continuously along the length of the fiber. As a consequence the entire fiber may appear to light up. Optical fibers may be bent and otherwise formed into two or three dimensional configurations. Furthermore, light sources of different or time varying colors may be applied to the end of the optical fiber. As a result, optical fibers present an opportunity to display information such as a current state (e.g., green when someone is available and red when unavailable), or provide diverse and/or visually entertaining lighting configurations.

Diffusing fiber optics are described in U.S. Pat. No. 8,805,141, entitled "Optical fiber illumination systems and methods" to Fewkes, et al., issued Aug. 12, 2014, the entirety of which is incorporated by reference herein for all purposes.

Terms

As used herein, a "meeting" may refer to a gathering of two or more people to achieve a function or purpose.

A "company" may be a for profit or not for profit company. It could also be a small group of people who have a shared purpose, such as a club. The company could have full or part time employees located at one or more physical locations and/or virtual workers.

A "meeting owner" may refer to a person (or persons) responsible for managing the meeting. It could be the speaker, a facilitator, or even a person not present at the meeting (physically or virtually) who is responsible for elements of the meeting. There could also be multiple meeting owners for a given meeting.

A "meeting participant" may refer to an individual or team who attends one or more meetings. In some embodiments, a meeting participant could be a software agent that acts on behalf of the person. In various embodiments, the terms "meeting participant" and "meeting attendee" may be used interchangeably.

An "Admin/Coordinator" may refer to an individual or individuals who play a role in setting up or coordinating a meeting, but may not participate in the meeting itself.

A "baton" may refer to a task, obligation, or other item that may be fulfilled in portions or parts (e.g., in sequential parts). The task may be assigned to a person or a team. Upon fulfilling their portion of the task, the person or team may hand the task over to another person or team, thereby "passing the baton". Such a task may be handed from one person to another—across meetings, across time, and/or across an organization. The task may ultimately reach completion following contributions from multiple people or teams. In various embodiments, a baton is first created in a meeting (e.g., as a task that results from a decision or direction arrived at in a meeting).

An "intelligent chair" may refer to a chair capable of performing logical operations (e.g., via a built-in processor or electronics), capable of sensing inputs (e.g., gestures of its occupants; e.g., voice commands of its occupants; e.g., pulse or other biometrics of its occupants), capable of sensing its own location, capable of outputting information (e.g., providing messages to its occupant), capable of adjusting its own configuration (e.g., height; e.g., rigidness; e.g., temperature of the backrest), capable of communicating (e.g., with a central controller), and/or capable of any other action or functionality.

As used herein, an "SME" may refer to a subject matter expert such as a person with expertise or specialized knowledge in a particular area (e.g. finance, marketing, operations, legal, technology) or a particular subdomain, such as the European market, server technology, intellectual property, or in any other area.

As used herein, a "Meeting Participant Device" or the like may refer to a device that allows meeting participants to send and receive messages before, during, and after meetings. A Meeting Participant Device may also allow meeting participants to take surveys about meetings, provide feedback for meetings and/or to engage in any other activity related to meetings. A meeting participant device may include: Smartphones (such as an Apple® iPhone® 11 Pro or Android™ device such as Google®™ Pixel 4™ and OnePlus™ 7 Pro); IP enabled desk phone; Laptops (MacBook Pro™, MacBook Air™, HP™ Spectre x360™, Google®™ Pixelbook Go™, Dell™ XPS 13™); Desktop computers (Apple® iMac 5K™, Microsoft®™ Surface Studio 2™, Dell™ Inspiron 5680™); Tablets (Apple® iPad™ Pro 12.9, Samsung™ Galaxy™ Tab S6, iPad™ Air, Microsoft® Surface Pro®); Watches (Samsung™ Galaxy™ Watch, Apple® Watch 5, Fossil™ Sport™, TicWatch™ E2, Fitbit™ Versa 2™); Eyeglasses (Iristick.Z1 Premium™, Vuzix Blade™, Everysight Raptor™, Solos™, Amazon®™ Echo™ Frames); Wearables (watch, headphones, microphone); Digital assistant devices (such as Amazon®™ Alexa™ enabled devices, Google® Assistant™, Apple® Siri™); and/or any other suitable device.

In various embodiments, a Meeting Participant Device may include a peripheral device, such as a device stored in table 1000. In various embodiments, a Meeting Participant Device may include a user device, such as a device stored in table 900.

As used herein, a "Meeting Owner Device" or the like may refer to a device that helps or facilitates a meeting owner in managing meetings. It could include the same or similar technology as described with respect to the Meeting Participant Device above.

Central Controllers

In various embodiments, central controller 110 may be one or more servers located at the headquarters of a company, a set of distributed servers at multiple locations throughout the company, or processing/storage capability located in a cloud environment—either on premise or with a third party vendor such as Amazon®™ Web Services™, Google®™ Cloud Platform™, or Microsoft®™ Azure™.

The central controller 110 may be a central point of processing, taking input from one or more of the devices herein, such as a location controller 8305 or participant device. The central controller may have processing and storage capability along with the appropriate management software as described herein. Output from the central controller could go to location controllers, room video screens, participant devices, executive dashboards, etc.

In various embodiments, the central controller may include software, programs, modules, or the like, including: an operating system; communications software, such as software to manage phone calls, video calls, and texting with meeting owners and meeting participants; an artificial intelligence (AI) module; and/or any other software.

In various embodiments, central controller 110 may communicate with one or more devices, peripherals, controllers (e.g., location controller 8305 (FIG. 83), equipment controllers); items of equipment (e.g., AV equipment); items of furniture (e.g., intelligent chairs); resource devices (e.g., weather service providers, mapping service providers); third-party devices; data sources; and/or with any other entity.

In various embodiments, the central controller 110 may communicate with: location controllers; display screens; meeting owner devices/participant devices, which can include processing capability, screens, communication capability, etc.; headsets; keyboards; mice (e.g. Key Connection Battery Free Wireless Optical Mouse & a USB 2' Wired Pad, Logitech®; Wireless Marathon™ Mouse M705 with 3-Year Battery Life); presentation remotes; chairs; executive dashboards; audio systems; microphones; lighting systems; security systems (e.g. door locks, surveillance cameras, motion sensors); environmental controls (e.g. HVAC, blinds, window opacity); Bluetooth® location beacons or other indoor location systems, or any other entity.

In various embodiments, the central controller 110 may communicate with data sources containing data related to: human resources; presentations; weather; equipment status; calendars; traffic congestion; road conditions; road closures; or to any other area.

In various embodiments, the central controller may communicate with another entity directly, via one or more intermediaries, via a network, and/or or in any other suitable fashion. For example, the central controller may communicate with an item of AV equipment in a given room using a room location controller for the room as an intermediary.

Embodiments

Referring to FIG. 50, a diagram of an example 'employees' table 5000 according to some embodiments is shown.

Employees table 5000 may store information about one or more employees at a company, organization, or other entity. In various embodiments, table 5000 may store information about employees, contractors, consultants, part-time workers, customers, vendors, and/or about any people of interest. In various embodiments, employees table 5000 may store similar, analogous, supplementary, and/or complementary information to that of users table 700. In various embodiments, employees table 5000 and users table 700 may be used interchangeably and/or one table may be used in place of the other.

Employee identifier field 5002 may store an identifier (e.g., a unique identifier) for an employee. Name field 5004 may store an employee name. Start date field 5006 may store a start date, such as an employee's first day of work. Employee level field 5008 may store an employee's level within the company, which may correspond to an employee's rank, title, seniority, responsibility level, or any other suitable measure.

Supervisor field 5010 may indicate the ID number of an employee's supervisor, manager, boss, project manager, advisor, mentor, or other overseeing authority. As will be appreciated, an employee may have more than one supervisor.

Office/cube location field 5012 may indicate the location of an employee's place of work. This may be, for example, the place that an employee spends the majority or the plurality of her time. This may be the place where an employee goes when not interacting with others. This may be the place where an employee has a desk, computer, file cabinet, or other furniture or electronics or the like. In various embodiments, an employee may work remotely, and the location 5012 may correspond to an employee's home address, virtual address, online handle, etc. In various embodiments, multiple locations may be listed for an employee, such as if an employee has multiple offices. In various embodiments, a location may indicate a room number, a cube number, a floor in a building, an address, and or any other pertinent item of information.

In various embodiments, knowledge of an employee's location may assist the central controller 110 with planning meetings that are reachable by an employee within a reasonable amount of time. It may also assist the central controller 110 with summoning employees to nearby meetings if their opinion or expertise is needed. Of course, knowledge of an employee's location may be useful in other situations as well.

Subject matter expertise field 5014 may store information about an employee's expertise. For example, an employee may have expertise with a particular area of technology, with a particular legal matter, with legal regulations, with a particular product, with a particular methodology or process, with customer preferences, with a particular market (e.g., with the market conditions of a particular country), with financial methods, with financials for a given project, or in any other area. In various embodiments, multiple areas of expertise may be listed for a given employee. In various embodiments, subject matter expertise field 5014 may assist the central controller 110 with ensuring that a meeting has an attendee with a particular area of expertise. For example, a meeting about launching a product in a particular country may benefit from the presence of someone with expertise about market conditions in that country. As will be appreciated, subject matter expertise field 5014 could be used for other situations as well.

Personality field 5016 may store information about an employee's personality. In various embodiments, information is stored about an employee's personality as exhibited within meetings. In various embodiments, information is stored about an employee's personality as exhibited in other venues or situations. In various embodiments, it may be desirable to form meetings with employees of certain personalities and/or to balance or optimize personalities within a meeting. For example, if one employee tends to be very gregarious, it may be desirable to balance the employee's personality with another employee who is focused and who could be there to keep a meeting on track. In various embodiments, it may be desirable to avoid forming meetings with two or more clashing personality types within them. For example, it may be desirable to avoid forming a meeting with two (or with too many) employees that have a confrontational personality. As will be appreciated, personality field 5016 may be used for other situations as well.

Security level field 5018 may store information about an employee's security level. This may represent, for example, an employee's ability to access sensitive information. An employee's security level may be represented numerically, qualitatively (e.g., "high" or "low"), with titles, with clearance levels, or in any other suitable fashion. In various embodiments, security level field 5018 may assist the central controller 110 in constructing meetings with attendees that have permission to view potentially sensitive information that may arise during such meetings.

Security credentials field 5020 may store information about credentials that an employee may present in order to authenticate themselves (e.g., to verify their identities). For example, field 5020 may store an employee's password. An employee may be required to present this password in order to prove their identity and/or to access secure information. Field 5020 may store other types of information such as biometric information, voiceprint data, fingerprint data, retinal scan data, or any other biometric information, or any other information that may be used to verify an employee's identity and/or access levels.

Temperature preferences field 5021 may store an employee's temperature preferences, such as an employee's preferred room temperature. This preference may be useful in calculating heating energy (or cooling energy), and/or any associated emissions that may be required to maintain a room at an employee's preferred room temperature. Employee temperature preferences may influence the temperature at which an employee's office is kept, the temperature at which a meeting room hosting the employee is kept, or any other applicable temperature.

Preferences

In various embodiments, meeting owners and meeting participants could register their preferences with the central controller relating to the management and execution of meetings. Example preferences of meeting participants may include:

I only want to attend meetings with fewer than ten people.
I do not want to attend any alignment meetings.
I prefer morning to afternoon meetings.
I do not want to attend a meeting if a particular person will be attending (or not attending).
I don't like to attend meetings outside of my building or floor.
I don't attend meetings that require travel which generates carbon output.
Gestures that invoke action can be set as a preference. Tap my watch three times to put me on mute.
Nodding during a meeting can indicate that I agree with a statement.
Food preference for meetings. I only eat vegetarian meals.
My personal mental and physical well-being at a given time.

Example preferences of meeting owners may include:

I don't want to run any meetings in room 7805.
I prefer a "U" shaped layout of desks in the room.
I prefer to have a five minute break each hour.
I prefer the lights to be dimmed 50% while I am presenting.
I never want food to be ordered from a particular vendor.
I want a maximum of 25 attendees at my Monday meetings.
I need to be able to specify camera focus by meeting type. For example, in a meeting at which a decision is being made I want the camera to be on the key decision makers for at least 80% of the time.
My personal mental and physical well-being at a given time.

Example preferences or conditions of the central controller may include:

There are certain days on which meetings cannot be scheduled.
For a given room, certain levels of management have preferential access to those rooms.

Preferences field 5022 may store an employee's preferences, such as an employee's preferences with respect to meetings. Such preferences may detail an employee's preferred meeting location or locations, preferred amenities at a meeting location (e.g., whiteboards), preferred characteristics of a meeting location (e.g., location has north-facing windows, the location has circular conference tables), room layouts (e.g. U-shaped desk arrangements), etc. Preferences field 5022 may include an employee's preferred meeting times, preferred meeting dates, preferred meeting types (e.g., innovation meetings), preferred meeting sizes (e.g., fewer than ten people), or any other preferences.

Preferred standard device configurations field 5024 may store information about how an employee would like a device configured. The device may be a device that is used in a meeting. The device may include, for example, a smartphone, a laptop, a tablet, a projector, a presentation remote, a coffee maker, or any other device. Exemplary preferences may include a preferred method of showing meeting attendees (e.g., show only the speaker on a screen, show all attendees on screen at once), a preferred method of broadcasting the words spoken in a meeting (e.g., via audio, via a transcript), a preferred method of alerting the employee when his input is required (e.g., via flashing screen, via a tone), a preferred method of alerting the employee when the meeting is starting, a preferred method of alerting the employee when a particular topic arises, a preferred method of showing the results of an in-meeting survey (e.g., via a bar graph, via numerical indicators for each available choice), or any other preferences.

Email field 5026 may store an employee's email address. In various embodiments, a company email address may be stored for an employee. In various embodiments, a personal email address may be stored for an employee. In various embodiments, any other email address or addresses may be stored for an employee.

Phone field 5028 may store an employee's phone number. In various embodiments, a company phone number may be stored for an employee. In various embodiments, a personal phone number may be stored for an employee. In various embodiments, any other phone number or numbers may be stored for an employee.

In various embodiments, any other contact information for an employee may be stored. Such contact information may include a Slack™ handle, a Twitter® handle, a LinkedIn® handle, a Facebook® username, a handle on a social media site, a handle within a messaging app, a postal address, or any other contact information.

In various embodiments, storing an employee's contact information may allow the central controller 110 to send a meeting invite to an employee, to send reminders to an employee of an impending meeting, to check in on an employee who has not appeared for a meeting, to remind employees to submit meeting registration information (e.g., a purpose or agenda), to send rewards to employees (e.g., to send an electronic gift card to an employee), or to communicate with an employee for any other purpose.

Referring to FIG. 51, a diagram of an example 'meetings' table 5100 according to some embodiments is shown. In various embodiments, a meeting may entail a group or gathering of people, who may get together for some period of time. People may gather in person, or via some conferencing or communications technology, such as telephone, video conferencing, telepresence, zoom calls, virtual worlds, or the like. Meetings (e.g., hybrid meetings) may include some people who gather in person, and some people who participate from remote locations (e.g., some people who are not present in the same room), and may therefore participate via a communications technology. Where a person is not physically proximate to other meeting attendees, that person may be referred to as a 'virtual' attendee, or the like.

Further details on how meetings may occur via conferencing can be found in U.S. Pat. No. 6,330,022, entitled "DIGITAL PROCESSING APPARATUS AND METHOD TO SUPPORT VIDEO CONFERENCING IN VARIABLE CONTEXTS" to Doree Seligmann, issued Dec. 11, 2011, at columns 3-6, which is hereby incorporated by reference.

A meeting may serve as an opportunity for people to share information, work through problems, provide status updates, provide feedback to one another, share expertise, collaborate on building or developing something, or may serve any other purpose.

In various embodiments, a meeting may refer to a single-event or session, such as a gathering that occurs from 2:00 PM to 3:00 PM on Apr. 5, 2025. In various embodiments, a meeting may refer to a series of events or sessions, such as to a series of ten sessions that occur weekly on Monday at 10:00 AM. The series of sessions may be related (e.g., they may all pertain to the same project, may involve the same people, may all have the same or related topics, etc.). As such, in various embodiments, the series of sessions may be referred to collectively as a meeting. Meetings may also include educational sessions like a Monday 2 PM weekly Physics class offered by a university for a semester.

Meeting identifier field 5102 may store an identifier (e.g., a unique identifier) for a meeting. Meeting name field 5104 may store a name for a meeting. A meeting name may be descriptive of the subject of a meeting, the attendees in the meeting (e.g., a meeting called 'IT Roundtable' may comprise members of the IT department), or any other aspect of the meeting, or may have nothing to do with the meeting, in various embodiments.

Meeting owner field 5106 may store an indication of a meeting owner (e.g., an employee ID, an employee name). A meeting owner may be an individual or a group of individuals who run a meeting, create a meeting, organize a meeting, manage a meeting, schedule a meeting, send out invites for a meeting, and/or who play any other role in the meeting, or who have any other relationship to the meeting.

Meeting type field 5108 may store an indication of a meeting type. Exemplary meeting types include learning; innovation; commitment; and alignment meetings. A meeting type may serve as a means of classifying or categorizing meetings. In various embodiments, central controller 110 may analyze characteristics of a meeting of a certain type and determine whether such characteristics are normal for meetings of that type. For example, the central controller may determine that a scheduled innovation meeting has more people invited then would be recommended for innovation meetings in general.

In various embodiments, central controller 110 may analyze the relative frequency of different types of meetings throughout a company. The central controller may recommend more or fewer of certain types of meetings if the number of a given type of meeting is out of proportion to what may be considered healthy for a company. In various embodiments, meeting types may be used for various other purposes.

Level field 5110 may store a level of a meeting. The level may represent the level of the intended attendees for the meeting. For example, the meeting may be an executive-level meeting if it is intended to be a high-level briefing just for executives. In various embodiments, prospective attendees with ranks or titles that do not match the level of the meeting (e.g., a prospective attendee's rank is too low) may be excluded from attending the meeting. In various embodiments, meetings of a first-level may take priority over meetings of a second level (e.g., of a lower level). Thus, for example, meetings of the first level may be granted access to a conference room before meetings of a second level when meeting times overlap. In various embodiments, meeting levels may be used for other purposes as well.

Location field 5112 may store a location of a meeting. The location may include a building designation, a campus designation, an office location, or any other location information. In various embodiments, if a meeting is to be held virtually, then no information may be stored in this field.

Room identifier field 5114 may store an identifier of a room in which a meeting is scheduled to occur. The room may be a physical room, such as a conference room or auditorium. The room may be a virtual room, such as a video chat room, chat room, message board, Zoom® call meeting, WebEx® call meeting, or the like. In some embodiments, a meeting owner or central controller 110 may switch the room location of a meeting, with the record stored in the room identifier field updated to reflect the new room.

Start date field 5116 may store the start date of a meeting. In various embodiments, the start date may simply represent the date of a solitary meeting. In various embodiments, the start date may represent the first in a series of sessions (e.g., where a meeting is recurring).

Time field 5118 may store a time of a meeting, such as a start time. If the meeting comprises multiple sessions, the start time may represent the start time of each session. In embodiments with offices in different time zones, time field 5118 may be expressed in GMT.

Duration field 5119 may store a duration of a meeting, such as a duration specified in minutes, or in any other suitable units or fashion. The duration may represent the duration of a single session (e.g., of a recurring meeting).

Frequency field 5120 may store a frequency of a meeting. The field may indicate, for example, that a meeting occurs daily, weekly, monthly, bi-weekly, annually, every other Thursday, or according to any other pattern.

End date field 5122 may store the end date of a meeting. For meetings with multiple sessions, this may represent the date of the last session. In various embodiments, this may be the same as the start date.

Phone number field 5124 may store a phone number that is used to gain access to a meeting (e.g., to the audio of a meeting; e.g., to the video of a meeting; e.g., to slides of a meeting; e.g., to any other aspect of a meeting). In various embodiments, phone number field 5124 or a similar type field may store a phone number, URL link, weblink, conference identifier, login ID, or any other information that may be pertinent to access a meeting.

Tags field 5126 may store one or more tags associated with a meeting. The tags may be indicative of meeting purpose, meeting content, or any other aspect of the meeting. Tags may allow for prospective attendees to find meetings of interest. Tags may allow for comparison of meetings (e.g., of meetings with similar tags), such as to ascertain relative performance of similar meetings. Tags may serve other purposes in various embodiments.

'Project number or cost center association' field 5128 may store an indication of a project and/or cost center with which a meeting is associated. Field 5128 may thereby allow tracking of the overall number of meetings that occur related to a particular project. Field 5128 may allow tallying of costs associated with meetings related to a particular cost center. Field 5128 may allow for various other tracking and/or statistics for related meetings. As will be appreciated, meetings may be associated with other aspects of an organization, such as with a department, team, initiative, goal, or the like.

Ratings field 5130 may store an indication of a meeting's rating. A rating may be expressed in any suitable scale, such as a numerical rating, a qualitative rating, a quantitative rating, a descriptive rating, a rating on a color scale, etc. A rating may represent one or more aspects of a meeting, such as the importance of the meeting, the effectiveness of the meeting, the clarity of the meeting, the efficiency of the meeting, the engagement of a meeting, the purpose of the meeting, the amount of fun to be had in the meeting, or any other aspect of the meeting. A rating may represent an aggregate of ratings or feedback provided by multiple attendees. A rating may represent a rating of a single session, a rating of a group of sessions (e.g., an average rating of a group of sessions), a rating of a most recent session, or any other part of a meeting.

In various embodiments, ratings may be used for various purposes. A rating may allow prospective attendees to decide which meetings to attend. A rating may allow an organization to work to improve meetings (e.g., the way meetings are run). A rating may aid an organization in deciding whether to keep a meeting, cancel a meeting, change the frequency of a meeting, change the attendees of a meeting, or change any other aspect of a meeting. A rating may allow an organization to identify meeting facilitators who run good meetings. A rating may be used for any other purpose, in various embodiments.

Priority field 5132 may store a priority of a meeting. A priority may be represented using any suitable scale, as will be appreciated. The priority of a meeting may serve various purposes, and various embodiments. A company employee who is invited to two conflicting meetings may attend the meeting with higher priority. If two meetings wish to use the same room at the same time, the meeting with higher priority may be granted access to the room. A meeting priority may help determine whether a meeting should be cancelled in certain situations (e.g., if there is inclement weather). Employees may be given less leeway in declining invites to meetings with high priority versus those meetings with low priority. As will be appreciated, the priority of a meeting may be used for various other purposes.

Related meetings field 5134 may store an indication of one or more related meetings. Related meetings may include meetings that relate to the same projects, meetings that are on the same topic, meetings that generate assets used by the present meeting (e.g., meetings that generate ideas to be evaluated in the present meeting; e.g., meetings that generate knowledge used in the present meeting), meetings that have one or more attendees in common, meetings that use assets generated in the present meeting, meetings run by the same meeting owner, meetings that occur in the same location, meetings that occur at the same time, meetings that occur at an approximate time, or meetings with any other relationship to the present meeting. Any given meeting may have no related meetings, one related meeting, or more than one related meeting, in various embodiments.

In various embodiments, table 5100, or some other table, may store an indication of meeting connection types. This may include an indication of types of devices that may be used to participate in a meeting (e.g., mobile, audio only, video, wearable). This may include an indication of types of connections that may be used to participate in the meeting (e.g., Wi-Fi®, WAN, 3rd party provider).

Referring to FIG. 52, a diagram of an example 'Meeting attendees' table 5200 according to some embodiments is shown. Meeting attendees table 5200 may store information about who attended a meeting (and/or who is expected to attend).

Meeting identifier field 5202 may store an indication of the meeting in question. Date field 5203 may store an indication of the date of the meeting or of a particular session of the meeting. In some cases, an attendee might attend one session of a meeting (e.g., of a recurring meeting) and not attend another session of the meeting.

Attendee identifier field 5204 may store an indication of one particular attendee of a corresponding meeting. As will be appreciated, table 5200 may include multiple records related to the same meeting. Each record may correspond to a different attendee of the meeting.

Role field 5206 may store a role of the attendee at the meeting. Exemplary roles may include meeting owner, facilitator, leader, note keeper, subject matter expert, or any other role or function. In various embodiments, a role may be 'interested participant' or the like, which may refer to a non-meeting participant, such as a CEO, CIO, VP/Director of Meetings, or Project Sponsor. In various embodiments, a role may be 'central controller administrator', 'central controller report administrator', or the like, which may refer to a participant that performs or oversees one or more functions of the central controller as it pertains to the meeting. In various embodiments, a role may be 'meeting room and equipment administrator' or the like, which may refer to a participant that oversees operations of the meeting room, such as ensuring that projectors and AV equipment are running properly.

An attendee with no particular role may simply be listed as attendee, or may be designated in any other suitable fashion.

Manner field 5208 may store an indication of the manner in which the attendee participated in the meeting. For example, an attendee may participate in person, via video conference, via web conference, via phone, or via any other manner of participation.

Referring to FIG. 53, a diagram of an example 'Meeting engagement' table 5300 according to some embodiments is shown. Meeting engagement table 5300 may store information about attendees' engagement in a meeting. Storing engagement levels may be useful, in some embodiments, for seeking to alter and improve meetings where engagement levels are not optimal. Engagement may refer to one or more behaviors of an attendee as described herein. Such behaviors may include paying attention, focusing, making contributions to a discussion, performing a role (e.g., keeping notes), staying on topic, building upon the ideas of others, interacting with others in the meeting, or to any other behavior of interest. In some embodiments, headset 4000 or camera 4100 may provide data that informs the determining of an engagement level (e.g. detection of head drooping down, eyes closing, snoring sounds).

Meeting identifier field 5302 may store an indication of the meeting for which engagement is tracked. Date field 5304 may store the date of the meeting or of a session of the meeting. This may also be the date for which engagement was recorded.

Time field 5306 may store an indication of the time when the engagement was recorded, measured, noted, observed, reported, and/or any other pertinent time. For example, engagement may be observed over a five minute interval, and time field 5306 may store the time when the interval finishes (or the time when the interval starts, in some embodiments). In various embodiments, time field 5306 may store the entire interval over which the engagement was recorded. In various embodiments, an attendee's engagement may be measured multiple times during the same meeting or session, such as with the use of surveys delivered at various times throughout a meeting. In such cases, it may be useful to look at changes in engagement level over time. For example, if an attendee's engagement has decreased during a meeting, then the attendee may be sent an alert to pay attention, may be provided with a cup of coffee, or may otherwise be encouraged to increase his engagement level. In one embodiment, if engagement levels are low for a particular meeting, central controller 110 may send an instruction to the company catering facilities to send a pot of coffee to the room in which the meeting is occurring.

Attendee identifier field 5308 may store an indication of the attendee for whom engagement is measured. Engagement level field 5310 may store an indication of the attendee's level of engagement. This may be stored in any suitable fashion, such as with a numerical level, a qualitative level, quantitative level, etc. In various embodiments, an engagement level may refer to a quantity of engagement, such as a number of comments made during a discussion. In various embodiments, an engagement level may refer to a quality of behavior, such as the relevance or value of comments made during a discussion. In various embodiments, an engagement level may refer to some combination of quality and quantity of a behavior. An engagement level may refer to any suitable measure or metric of an attendee's behavior in a meeting, in various embodiments.

In various embodiments, an engagement level may be connected to a biometric reading. The biometric may correlate to a person's visible behaviors or emotional state within a meeting. In various embodiments, for example, an engagement level may be a heart rate. A low heart rate may be presumed to correlate to low engagement levels. In various embodiments, field 5310 may store a biometric reading, such as a heart rate, breathing rate, measure of skin conductivity, or any other suitable biometric reading.

Engagement indicator(s) field 5312 may store an indication of one or more indicators used to determine an engagement level. Indicators may include biometrics as described above. Exemplary indicators include signals derived from voice, such as rapid speech, tremors, cadence, volume, etc. Exemplary indicators may include posture. For example, when a person is sitting in their chair or leaning forward, they may be presumed to be engaged with the meeting. Exemplary indicators may be obtained through eye tracking. Such indicators may include eye movement, direction of gaze, eye position, pupil dilation, focus, drooping of eyelids, etc. For example, if someone's eyes are just staring out into space, it may be presumed that they are not engaged with the meeting. As will be appreciated, many other engagement indicators are possible.

Burnout risk field 5314 may store an indication of an attendee's burnout risk. Burnout may refer to a significant or lasting decline in morale, productivity, or other metric on the part of an attendee. It may be desirable to anticipate a burnout before it happens, as it may then be possible to prevent the burnout (e.g., by giving the attendee additional vacation days, by giving the attendee less work, etc.). A burnout risk may be stored in any suitable fashion, such as on a "high", "medium", "low" scale, on a numerical scale, or in any other fashion.

A burnout risk may be inferred via one or more indicators. Burnout indicators field 5316 may store one or more indicators used to assess or detect an attendee's burnout risk. Exemplary indicators may include use of a loud voice, which may portend a high burnout risk. Exemplary indicators may include steady engagement, which may portend a low burnout risk. Burnout risk may also be inferred based on how often an attendee declines invites to meetings (e.g., an attendee might decline 67% of meeting invites). A high rate of declining invites might indicate that the attendee is overworked or is simply no longer interested in making productive contributions, and may therefore be burning out. An exemplary indicator might be a degree to which an attendee's calendar is full. For example, an attendee with a calendar that is 95% full may represent a medium risk of burnout. In various embodiments, multiple indicators may be used in combination to form a more holistic picture of an employee's burnout risk. For example, an employee's rate of declining meeting invites may be used in conjunction with the employee's calendar utilization to determine an employee's burnout risk.

Referring to FIGS. 54A and 54B, a diagram of an example 'Meeting feedback' table 5400 according to some embodiments is shown. Note that meeting feedback table 5400 extends across FIGS. 54A and 54B. Thus, for example, data in the first record under field 5420 (in FIG. 54B) is part of the same record as is data in the first record under field 5402 (in FIG. 54A).

Meeting feedback table 5400 may store feedback provided about a meeting. The feedback may come from meeting attendees, meeting observers, from recipients of a meeting's assets, from contributors to a meeting, from a meeting owner, from management, from facilities management, or from any other parties to a meeting or from anyone else.

Meeting feedback may also be generated via automatic and/or computational means. For example, the central controller 110 may process an audio recording received from microphone 4214 of presentation remote 4200 of the meeting and determine such things as the number of different people who spoke, the degree to which people were talking over one another, or any other suitable metric. In some embodiments, meeting feedback may be provided by a user via headset 4000, such as by a user providing a verbal message of support for another meeting attendee. In some embodiments, meeting feedback may be provided in the form of tags submitted by meeting participants.

In various embodiments, meeting feedback may be stored in aggregate form, such as the average of the feedback provided by multiple individuals, or such as the aggregate of feedback provided across different sessions of a meeting. In various embodiments, feedback may be stored at a granular level, such as at the level of individuals.

Meeting feedback may be useful for making changes and or improvements to meetings, such as by allowing prospective attendees to decide which meetings to attend, or for any other purpose. Meeting feedback can be expressed in any suitable scale, such as a numerical rating, a qualitative rating, a quantitative rating, a descriptive rating, a rating on a color scale, etc.

In various embodiments, feedback may be provided along a number of dimensions, subjects, categories, or the like. Search dimensions may cover different aspects of the meeting. In some embodiments, feedback could be provided regarding room layout, air conditioning noise levels, food and beverage quality, lighting levels, and the like.

Meeting identifier field 5402 may store an indication of the meeting for which feedback is tracked. Effectiveness of facilitation field 5404 may store an indication of effectiveness with which the meeting was facilitated. Other feedback may be stored in such fields as: 'Meeting Energy Level' field 5406; 'Did the Meeting Stay on Track?' field 5408; 'Did the Meeting Start/End on Time?'field 5410; 'Room Comfort' field 5412; 'Presentation Quality' field 5414; 'Food Quality' field 5418; 'Room lighting' field 5420; 'Clarity of purpose'field 5422; Projector quality'field 5424; 'Ambient noise levels' field 5426; 'Strength of Wi-Fi® Signal' field 5428; 'Room cleanliness' field 5430; and 'view from the room' field 5432 where the field labels themselves may be explanatory of the type of feedback stored in such fields.

'Overall rating' field 5416 may store an overall rating for a meeting. The overall rating may be provided directly by a user or by multiple users (e.g. via detachable speaker 4274 of presentation remote 4200). The overall rating may be computationally derived from feedback provided along other dimensions described herein (e.g., the overall rating may be an average of feedback metrics for effectiveness of facilitation, meeting energy level, etc.). The overall rating may be determined in any other suitable fashion.

Other feedback may be related to such questions as: Were meeting participants encouraged to provide their opinions?; Was candor encouraged?; Was the speaker's voice loud enough?; Was the speaker understandable?; Did the meeting owner know how to use the technology in the room?

In various embodiments, the central controller 110 may inform the meeting owner during or after the meeting that clarity is low (or may provide some other feedback to the meeting owner or to any other participant). Feedback could be private to the meeting owner (e.g. delivered via display 4246 of presentation remote 4200), or it could be made available to everyone in the room, or just to management.

In various embodiments, feedback about the meeting owner goes to the meeting owner's boss (or to any other person with authority over the meeting owner, or to any other person).

In various embodiments, feedback about the meeting may be metadata associated with the meeting. The metadata may be used in searching, for example.

In various embodiments, other feedback may relate to meeting content (e.g. presentation, presentation slides, agenda, meeting assets, ideas, discussions, graphs, flipchart notes), and may address such questions as: Was the content organized efficiently?; Was the content clear and concise?; Was the content appropriate for the audience? For example, was the presentation too technical for an executive level meeting?

In various embodiments, other feedback may relate to presentation material and slide content, and may address such questions as: How long did the presenter spend on each slide?; Were the slides presented too quickly?; Were some slides skipped?; What type of slides result in short or long durations?; How long did the presenter spend on slides related to the meeting purpose or agenda?; Did the presenter finish the presentation within the allotted time?; Were there too many words on each slide?; Did the presentation include acronyms?; Was there jargon in the presentation?; Were graphs, figures, and technical materials interpretable and readable?; Which slides were provided in advance to meeting participants for review? The answers to these questions could be used to tag low clarity scores to particular material, presentations, or individual slides.

In various embodiments, other feedback may relate to technology, and may address such questions as: Was all room equipment working throughout the meeting?; Did external factors (home Wi-Fi®, ISP provider, energy provider disruption) contribute to poor use of technology?; Was equipment missing from the room (for example chairs, projectors, markers, cables, flip charts, etc.)?

In various embodiments, other feedback may relate to room setup, and may address such questions as: Was the room difficult to locate?; Were participants able to locate bathrooms?; Was the room A/C or heating set appropriately for the meeting?; Was the room clean?; Were all chairs and tables available per the system configuration?; Was the screen visible to all participants?; Were the lights working?; Was the room unlocked?; Was the room occupied?; Was food/beverage delivered on-time and of high quality?

Referring to FIG. 55, a diagram of an example 'Meeting participation/Attendance/Ratings' table 5500 according to some embodiments is shown. Meeting participation/Attendance/Ratings table 5500 may store information about attendees' participation, attendance, ratings received from others, tags received from others, and/or other information pertaining to a person's attendance at a meeting. Information stored in table 5500 may be useful for trying to improve individual attendees' performances in meetings. For example, if an attendee is habitually late for meetings, then the attendee may be provided with extra reminders prior to meetings. Information stored in table 5500 may also be useful for planning or configuring meetings. For example, if it is known that many attendees had to travel far to get to a meeting, then similar meetings in the future may be held in a more convenient location. Information stored in table 5500 may be used for any other suitable purpose.

Meeting identifier field 5502 may store an indication of the meeting in question. Date field 5504 may store an indication of the date of the meeting or of a particular session of the meeting. In some cases, an attendee might attend one session of a meeting (e.g., of a recurring meeting) and not attend another session of the meeting.

Employee identifier field 5506 may store an indication of one particular employee or attendee of a corresponding meeting. Role field 5508 may store a role of the attendee at the meeting as described above with respect to field 5206. 'Confirmed/Declined meeting' field 5510 may store an indication of whether the employee confirmed his or her participation in the meeting or declined to participate in the meeting. In various embodiments, field 5510 may indicate that the employee actually attended the meeting, or did not actually attend the meeting.

'Time arrived' field 5512 may indicate when an employee arrived at a meeting. This may represent a physical arrival time, or a time when the employee signed into a meeting being held via conferencing technology, and/or this may represent any other suitable time. In some embodiments, time arrived data is received from presentation remote 4200 such as by a presenter who taps on the name of a meeting attendee on display 4246 when that attendee enters the meeting room.

'Time departed' field 5514 may indicate when an employee departed from a meeting (e.g., physically departed; e.g., signed out of a virtual meeting; etc.).

'Travel time to meeting location'field 5516 may indicate an amount of time that was required for the employee to travel to a meeting. The travel time may be the time it actually took the employee to reach the meeting. The travel time may be a time that would generally be expected (e.g., a travel time of the average person at an average walking pace, a travel time of the average driver at an average driving speed). In various embodiments, the travel time may assume the employee started at his office or his usual location. In various embodiments, the travel time may account for the employee's actual location prior to the meeting, even if this was not his usual location. For example, the travel time may account for the fact that the employee was just attending another meeting and was coming from the location of the other meeting.

'Travel time from meeting location'field 5518 may indicate an amount of time that was required for the employee to travel from a meeting to his next destination. Similar considerations may come into play with field 5518 as do with field 5516. Namely, for example, travel times may represent actual or average travel times, destinations may represent actual or typical destinations, etc.

'Employee rating by others' field 5520 may represent a rating that was given to an employee by others (e.g., by other attendees of the meeting). The rating may reflect an employee's participation level, an employee's contribution to the meeting, an employee's value to the meeting, and/or any other suitable metric. In some embodiments, employee rating information may be collected from one or more tags submitted by meeting participants.

Referring to FIG. 56, a diagram of an example 'Employee calendars' table 5600 according to some embodiments is shown. Table 5600 may store information about employees' scheduled appointments, meetings, lunches, training sessions, or any other time that an employee has blocked off. In various embodiments, table 5600 may store work-related appointments. In various embodiments, table 5600 may store other appointments, such as an employee's personal appointments. Table 5600 may be useful for determining who should attend meetings. For example, given two possible attendees, the central controller may invite the employee with more free time available on his calendar. Table 5600 may also be used to determine whether an employee's time is being used efficiently, to determine an employee's transit time from one appointment to another, in the nature of meetings with which employees are involved, or in any other fashion.

Employee identifier field 5602 may store an indication of an employee. Meeting identifier field 5604 may store an indication of a meeting. If the appointment is not a meeting, there may be no identifier listed. Subject field 5606 may store a subject, summary, explanation, or other description of the appointment. For example, field 5606 may store the subject of a meeting if the appointment is for a meeting, or it may describe a 'Doctor call' if the appointment is for the employee to speak to his doctor.

Category field 5608 may store a category of the appointment. Exemplary categories may include 'Meeting' for appointments that are meetings, 'Personal' for appointments that are not work related (e.g., for an appointment to attend a child's soccer game), 'Individual' for appointments to spend time working alone, or any other category of appointment. In various embodiments, categories are input by employees (e.g., by employees who create appointments, by meeting organizers, by employees conducting a manual review of calendars). In various embodiments, a category is determined programmatically, such as by classifying the subject of an appointment into the most closely fitting category.

Date field 5610 may store the date of the appointment. Start time field 5612 may store the start time of the appointment. Duration field 5614 may store the duration of the appointment. In various embodiments, a separate or alternate field may store an end time of the appointment.

'Company/personal' field 5616 may store another means of classifying the appointment. In this case, the appointment may be classified as either company (e.g., work-related), or personal (not work-related).

Referring to FIG. 57, a diagram of an example 'Projects' table 5700 according to some embodiments is shown. Table 5700 may store information about projects, initiatives, or other endeavors being undertaken by an organization. Tracking projects at an organization may be useful for various reasons. An organization may wish to see how many meetings are linked to a particular project. The organization may then, for example, decide whether there are too few or too many meetings associated with the project. The organization may also allocate a cost or a charge to the project associated with running the meeting. The organization may thereby, for example, see whether a project is overstepping its budget in light of the number of meetings it is requiring.

Project ID field 5702 may store an identifier (e.g., a unique identifier) for a project. Name field 5704 may store a name associated with a project. 'Summary' field 5706 may store a summary description of the project.

Exemplary projects may include a project to switch all employees' desktop computers to using the Linux™ operating system; a project to allow employees to work remotely from the office in a manner that maximizes data security; a project to launch a new app; a project to obtain up-to-date bids from suppliers of the organization. As will be appreciated, any other suitable project is contemplated.

Start date field 5708 may store a start date of the project. Priority field 5710 may store a priority of the project. Expected duration field 5712 may store an expected duration of the project.

Percent completion field 5714 may store the percentage of a project that has been completed. Various embodiments contemplate that other metrics of a project completion may be used, such as number of milestones met, percent of budget spent, quantity of resources used, or any other metric of project completion. Budget field 5716 may store a budget of the project.

Personnel requirements field 5718 may store personnel requirements of the project. In various embodiments, personnel requirements may be expressed in terms of the number of people required and/or in terms of the percentage of a given person's time (e.g., of a given workday) which would be devoted to a project. For example, a personnel requirement of '10 people at 75% time' may indicate that the project will require 10 people, and that each of the 10 people will be utilizing 75% of their time on the project. In various embodiments, personnel requirements may be specified in additional terms. For example, personnel requirements may indicate the departments from which personnel may be drawn, the number of personnel with a given expertise that will be required (e.g., the number of personnel with java expertise), the number of personnel with a given title that will be required (e.g., the number of project managers), or any other requirements for personnel.

Referring to FIG. 58, table 5800 may store information about employees or other people involved in projects. In various embodiments, table 5800 may store information about key personnel involved in projects. In some embodiments, table 5800 may include information beyond employees, such as contractors, vendors, trainers, safety inspectors, or regulators who may be involved in the project (e.g. a laser safety trainer).

Project ID field 5802 may store an identifier of a project. Employee ID field 5804 may store an indication of an employee who is somehow involved or associated with the project. Role field 5806 may store an indication of an employee's role within a project. Exemplary roles may include: project manager; lead developer; communications strategist; procurement specialist; or any other role, or any other function, or any other association to a project.

Referring to FIG. 59, a diagram of an example 'Projects milestones' table 5900 according to some embodiments is shown. Table 5900 may store information about project milestones, phases, goals, segments, accomplishments or other components of a project.

Project ID field 5902 may store an identifier of a project. Milestone ID field 5904 may store an identifier (e.g., a unique identifier) of a milestone.

Sequence number field 5906 may store a sequence number representing where the present milestone falls in relation to other milestones within the project. For example, the first milestone to be accomplished in a project may receive a sequence number of 1, the second milestone to be accomplished in a project may receive a sequence number of 2, and so on. As will be appreciated, sequence numbers may be designated in any other suitable fashion, such as with roman numerals, with letters of the alphabet, by counting up, by counting down, or in any other manner. In various embodiments, field 5906 (or another field) may also store an indication of the total number of milestones in a project, or of the highest sequence number in the projects. For example, a sequence number may be stored as "3 of 8", indicating that the milestone is the third milestone out of eight milestones in the project. In various embodiments, it may be intended that some milestones be completed in parallel. Exemplary milestones to be completed in parallel may be designated "3A", "3B", etc., or may use any other suitable designation.

Summary field 5908 may store a summary or other description of the milestone. Exemplary summaries include: draft request for proposal; implement pilot with legal group; stress test; review all vendor proposals; or any other summary or description.

Due date field 5910 may store a date when the milestone is due for completion. Percent complete field 5912 may store an indication of what percentage (or fraction) of a milestone has been completed.

Approver(s) field 5914 may store an indication of one or more people who have the authority or ability to approve that a milestone has been completed. For example, an approver might be a project manager, a vice president of a division overseeing a project, a person with expertise in the technology used to accomplish the milestone, or any other suitable approver. Violations field 5916 may store an indication of one or more violations that have occurred on a project. In some embodiments, violation information may come from received and/or stored tag information.

Referring to FIG. 60, a diagram of an example 'Assets' table 6000 according to some embodiments is shown. Assets may include encapsulated or distilled knowledge, roadmaps, decisions, ideas, explanations, plans, processing fees, recipes, or any other information. Assets may be generated within meetings (e.g., a meeting may result in decisions). Assets may be generated for meetings (e.g., included in presentation decks). Assets may be generated in any other fashion or for any other purpose.

Figure 68:
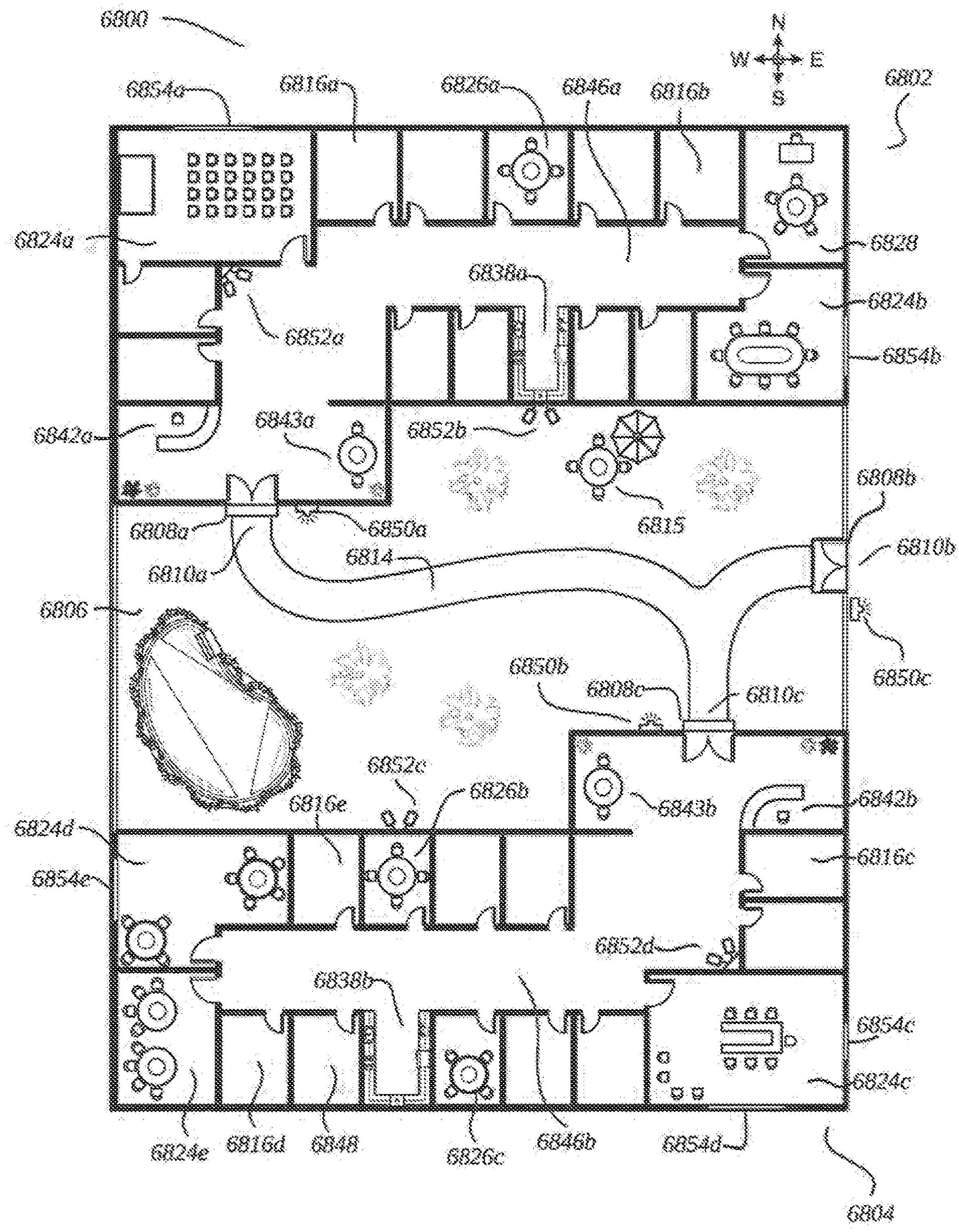
FIG. 68 is a map of a campus with buildings consistent with at least some embodiments described herein.
Figure 71A:
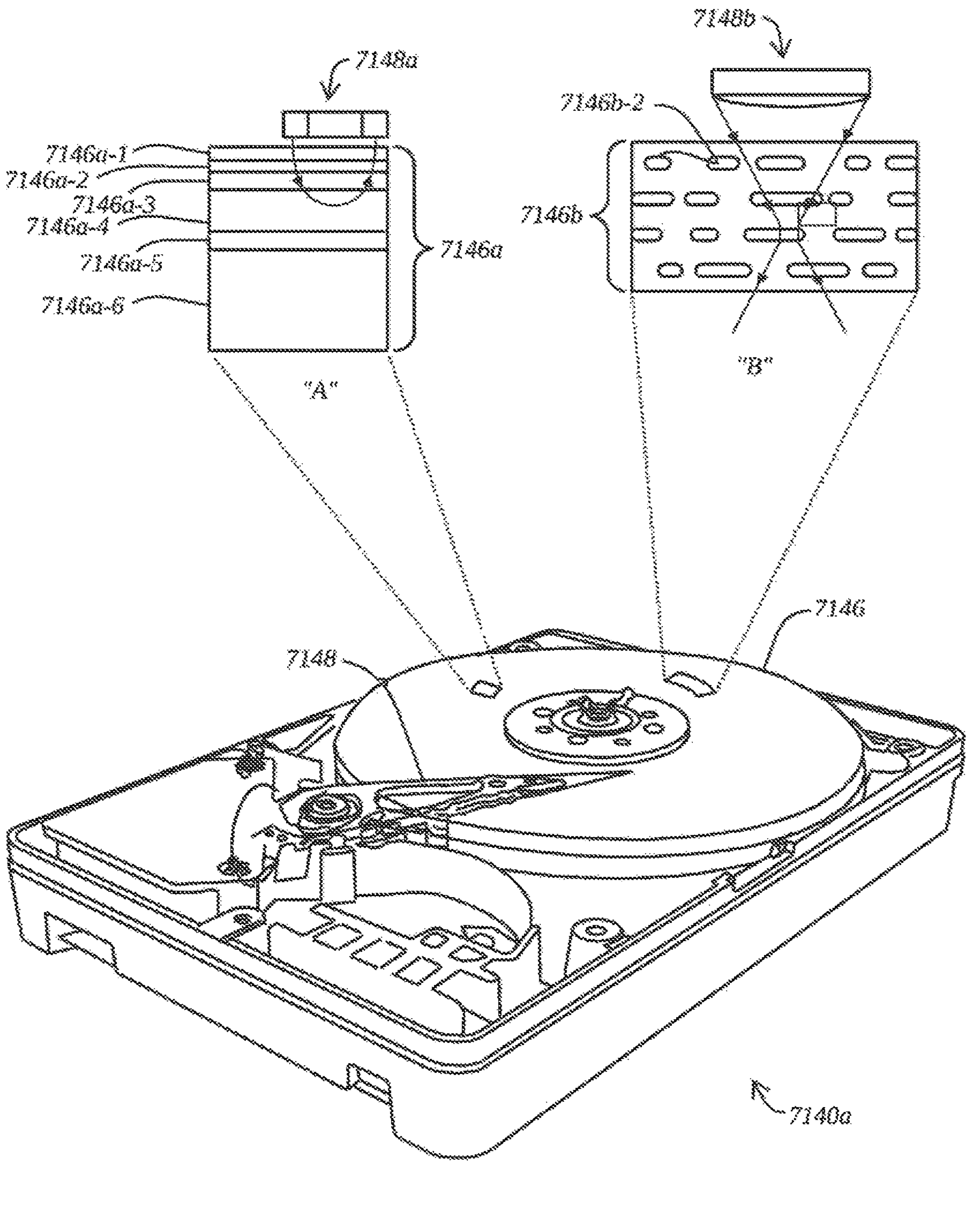
FIG. 71A, FIG. 71B, FIG. 71C, FIG. 71D, and FIG. 71E are perspective diagrams of exemplary data storage devices consistent with at least some embodiments described herein.
Figure 71B:
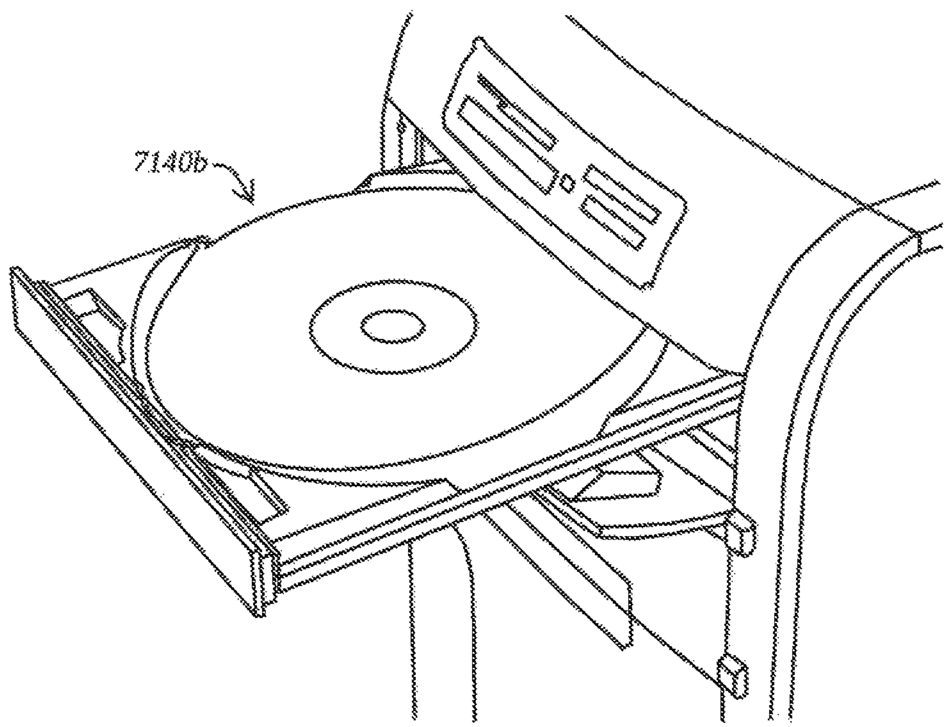
Figure 71C:
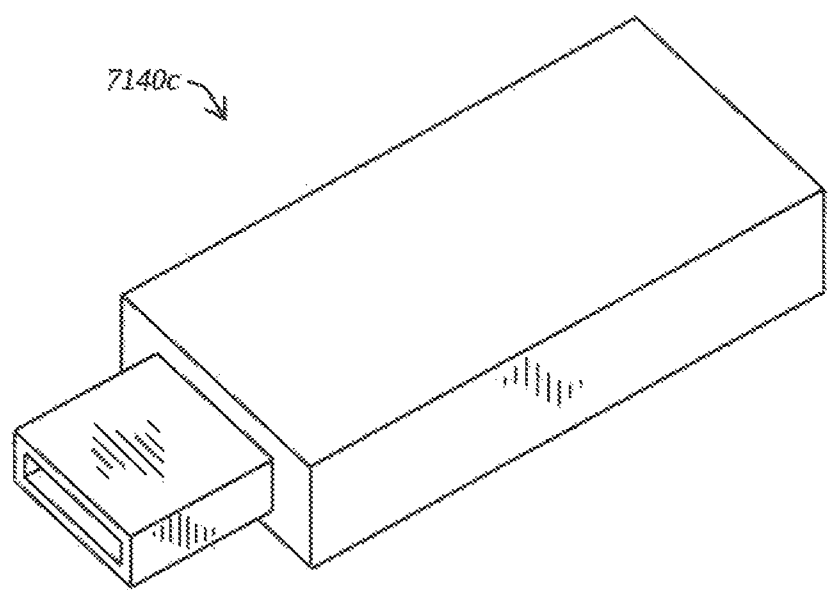
Figure 71D:
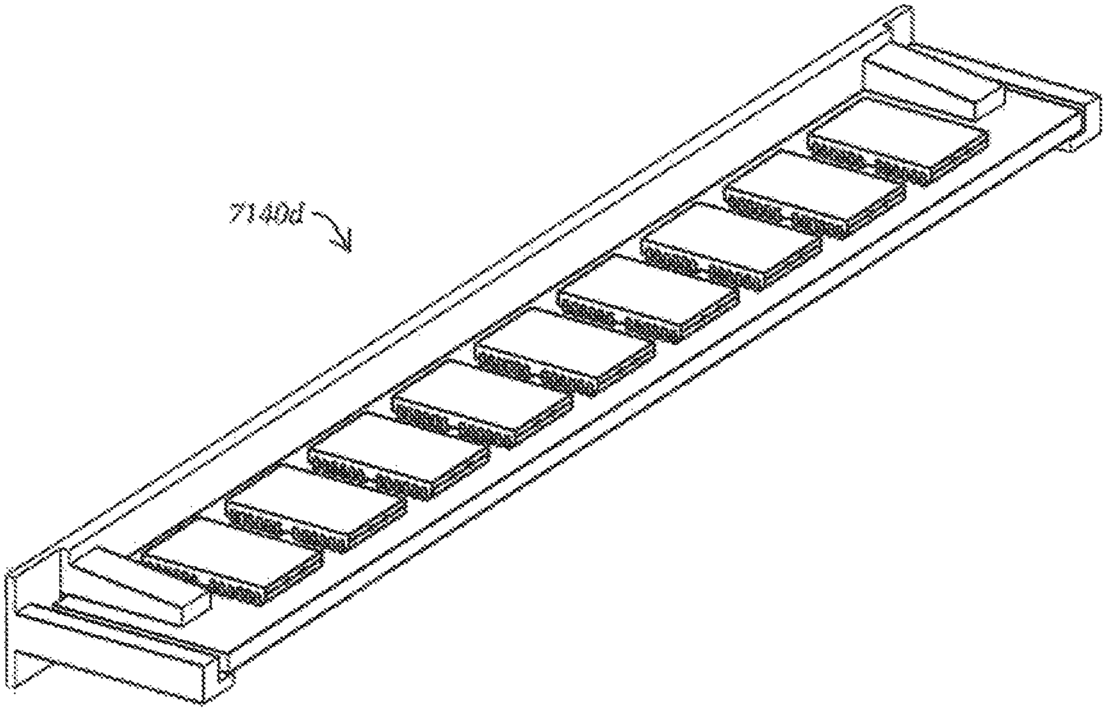
Figure 71E:
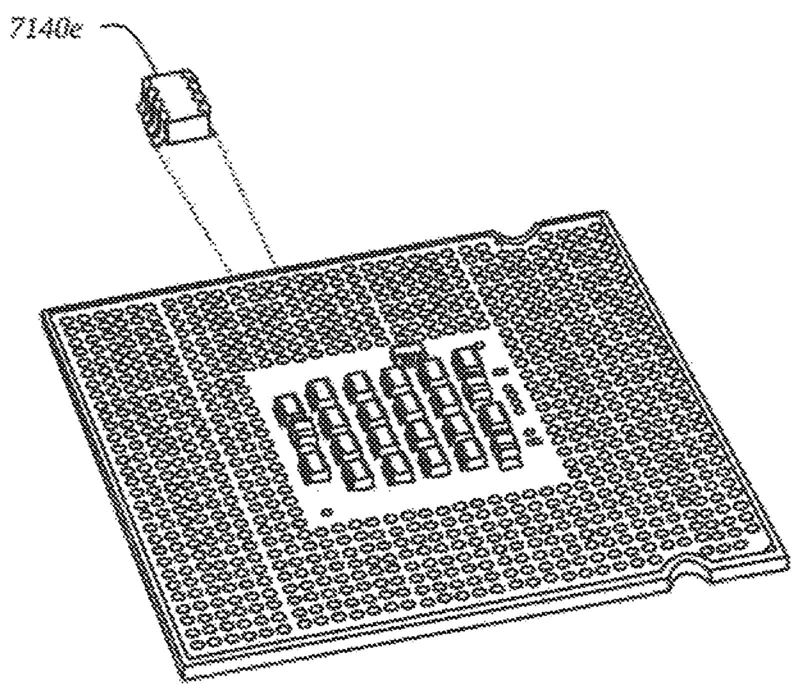

In various embodiments, an asset may include information for improving company operations, or improving meetings themselves. In various embodiments, an asset may include a map, an office map, a campus map, or the like. An exemplary map 6800 is depicted in FIG. 68. For example, a map may assist in planning for meetings by allowing for selection of meeting locations that minimize participant travel times to the meeting, or match the meeting to the nearest available location with the appropriate capacity or necessary technology.

Table 6000 may store information about assets. Table 6000 may be useful for a number of reasons, such as allowing an employee to search for an educational deck, allowing an employee to find a summary of a meeting that he missed, allowing employees to act in accordance with decisions that have been made, allowing employees to review what had been written on a whiteboard, etc. In various embodiments, table 6000 may be used in addition to, instead of, and/or in combination with asset library table 1900.

Asset ID field 6002 may store an identifier (e.g., a unique identifier) of an asset. Asset type field 6004 may store an indication of an asset type. Exemplary asset types may be: a presentation deck; notes; meeting minutes; decisions made; meeting summary; action items; photo of whiteboard, or any other asset type. Exemplary asset types may include drawings, renderings, illustrations, mock-ups, etc. For example, an asset might include a draft of a new company logo, a brand image, a mock-up of a user interface for a new product, plans for a new office layout, etc. Exemplary asset types may include videos, such as training videos, promotional videos, etc.

In various embodiments, an asset may include a presentation or presentation template formatted for a particular meeting type or audience (e.g., formatted for executives, members of the board of directors, a project sponsor, a team meeting, a one-on-one).

In various embodiments, an asset may include a progress report, progress tracker, indication of accomplishments, indication of milestones, etc. For example, an asset may include a Scrum Board, Kanban Board, etc.

In various embodiments, assets may be divided or classified into other types or categories. In various embodiments, an asset may have multiple classifications, types, categories, etc.

Meeting ID field 6006 may store an identifier of a meeting with which an asset is associated. For example, if the asset is a deck, the meeting may be the meeting where the deck was used. If the asset is a decision, the meeting may be the meeting where the decision was made.

Creation date field 6008 may store a date when an asset was created. In various embodiments, one or more dates when the asset was modified (e.g., the date of the most recent modification) may also be stored.

Author field 6010 may store the author or authors of an asset. In various embodiments, authors may include contributors to an asset. For example, if an asset is a photo of a whiteboard, then the authors may include everyone who was at the meeting where the whiteboard was populated.

Version field 6012 may store the version of an asset. In various embodiments, an asset may undergo one or more updates, revisions, or other modifications. Thus, for example, the version number may represent the version or iteration of the asset following some number of modifications. At times, it may be useful for an employee to search through older versions of an asset, perhaps to see what the original thinking behind an idea was before it got removed or changed.

Tags field 6014 may store one or more tags associated with an asset. Tags may provide explanatory information about the asset, indicate an author of an asset, indicate the reliability of the asset, indicate the finality of the asset, indicate the state of the asset, indicate the manner in which the asset was generated, indicate feedback about an asset, or provide any other information pertinent to an asset. Illustrative tags include: rated 8/10; author eid204920; computer transcription; needs VP confirmation; short-term items; all items approved by legal; medium quality, etc.

Keywords field 6016 may store one or more keywords or other words, numbers, phrases, or symbols associated with an asset. Keywords may be excerpted from an asset. For example, keywords may be taken from the title of the asset. Keywords may be words that describe the subject or the nature of the asset but are not necessarily literally in the asset. Keywords may be any other suitable words. In various embodiments, keywords may serve as a means by which an employee can locate an asset of interest. For example, if an employee wants to learn more about a certain topic, then the employee may search for assets where the keywords describe the topic. In some embodiments, sets of keywords may include: mission statement, vision, market impact, value prop, customer segments, breakeven, technology roadmap, fiber cables, cloud, personnel, resources, European market, SWOT analysis.

Rating field 6018 may store one or more ratings for the asset. Ratings may represent the utility of the asset, the quality of the asset, the importance of the asset, and/or any other aspect of the asset, and/or any combination of aspects of the asset.

Asset data field 6020 may represent the data comprising the asset itself. For example, if the asset is a deck, then data field 6020 may store the actual Microsoft® PowerPoint® file data for the deck. If the asset is a photograph, then data field 6020 may store an actual JPEG file of the photograph. In various embodiments, table 6000 may store a link or reference to an asset, rather than the asset data itself (e.g., the asset may be stored in a separate location and table 6000 may store a link or reference to such location).

Presentation Materials

Many company presentations include a deck such as a Microsoft® PowerPoint® presentation that is emailed to participants and projected for meeting participants to view and discuss during a meeting. Presentation materials can also include videos, white papers, technical documents, instruction manuals, checklists, etc. These presentation materials, however, are often stored on local computers that are not searchable by other individuals.

Various embodiments bring the content of all presentation materials into the central controller 110 (or stored in a cloud provider in a way that is accessible by the central controller) so that they are available to any meeting owner, participant, or employee of the company. A central store of all presentations could include access to historical presentations.

Referring to FIG. 61, a diagram of an example 'Presentations' table 6100 according to some embodiments is shown. Presentations may include decks (e.g., PowerPoint® decks, Apple® Keynote decks, Google® Side decks, etc.). Presentations may include other types of files, such as PDF files, Microsoft® Word® documents, multimedia files, or any other type of file or any other type of information.

Table 6100 may store information about presentations. Table 6100 may be useful for a number of reasons, such as allowing an employee to search for a particular presentation, a presentation on a topic of interest, the latest in a series of presentations, highly rated presentations, etc. Table 6100 may also allow, for example, comparison of different attributes of a presentation (e.g., number of slides, number of tables), in order to ascertain what attributes of a presentation improve the presentation's effectiveness. Table 6100 may also allow a user to search through presentation decks on a particular topic so that he or she can use material from those decks to aid in the creation of a new presentation deck. Table 6100 may be used for various other purposes as well.

In various embodiments, table 6100 may be used in addition to, instead of, and/or in combination with meeting assets table 6000. In various embodiments, a presentation is a type of asset.

Asset ID field 6102 may store an identifier of an asset, where, in this case, the asset is a presentation. Number of slides field 6104 may store the number of slides. Number of words field 6106 may store the number of words in the presentation. In various embodiments, a density of words per slide may be computed from fields 6104 and 6106 (e.g., by dividing the number of words described in 6106 by the number of slides described in 6104).

Size of the file field 6108 may store the size of a file that represents the presentation (e.g., the size of a PowerPoint® file comprising the presentation). Presentation software version field 6110 may store the software, software version, application, program, or the like used for a presentation (e.g., Microsoft® PowerPoint® for Mac® version 16.35; Keynote® 11.0; Google® Slides).

Number of graphics field 6112 may store the number of graphics used in the presentation. Graphics may include pictures, charts, graphs, tables, maps, animations, illustrations, word clouds, or any other graphic, or any other information.

Number and type of tags field 6114 may store an indication of the number and/or types of tags associated with a presentation. Tags may include descriptive tags, which may describe the nature, subject matter or content of the presentation (e.g., to aid in searching for the presentation), or a portion thereof. Tags may include ratings tags, which may evaluate the presentation, or a portion thereof, along one or more dimensions (e.g., quality, clarity, relevance, reliability, currency, etc.). In various embodiments, a tag may apply to the presentation as a whole. In various embodiments, a tag may apply to a portion of the presentation, such as to an individual slide, an individual graphic, a group of slides, a group of graphics, a section of the presentation, or to any other portion of the presentation. With tags, an employee may be able to search for the 'financials' portion of a presentation on the 'Mainframe architecture'project, for example. In some embodiments, a user may apply a tag to a slide (e.g. 'project milestone slide', 'Q1 sales chart', 'team members') so that a presenter using presentation remote 4200 can enter a tag via presentation remote 4200 in order to jump directly to that slide during a presentation.

Number of times presented field 6116 may store an indication of the number of times the presentation has been presented (e.g., the number of meetings in which the deck has been featured).

Template used field 6118 may store an indication of a template that was used in creating the presentation. In various embodiments, it may be desirable that presentations on certain topics or for certain purposes follow a specific format. This format may be dictated by a template. For example, a project evaluation committee may wish that all proposals for new projects follow a set format that is dictated by a 'Project proposal' template. As another example, it may be desirable that all presentations that are seeking to educate the audience follow a particular format that has been found conducive to learning. Such presentations may follow a 'Learning template'. The presence of templates may also assist the creator of a presentation in creating the presentation more rapidly.

In various embodiments, there may be multiple templates available for creating a certain type of presentation. For example, there may be multiple types of business plan templates. Those specific template children may depend on the nature of the business plan, the preferences of the presentation creator, or on any other factor. Example templates depicted for field 6118 include: learning template #3; business plan template #8; financials template #3.

Time to create presentation field 6120 may store an indication of the time it took to create the presentation. In various embodiments, this may be an indicator of the quality of a presentation. In various embodiments, a company may wish to make it easier or more efficient to create presentations, and therefore may wish to track how long it took to make every presentation and watch for decreases in creation time over time.

Key points field 6122 may store key points that are in the presentation. These may represent key insights, takeaways, summaries, topics, decisions made, or any other key points, or any other points. Field 6122 may allow employees to search for presentations covering points of interest to them.

Take away summary included field 6124 may indicate whether or not the presentation includes a take away summary. In various embodiments, it may be desirable to encourage presenters to include a take away summary, so the presence of such a summary may be tracked. In various embodiments, an employee with limited time may wish to search for presentations with takeaway summaries and read such summaries rather than reading the entire presentation. A takeaway summary may be used in other embodiments as well.

Security level field 6126 may indicate a security level of the presentation. The level may be expressed in terms of a minimum title or rank an employee must have in order to access the presentation. Example security levels include: general; manager+; VP+. Security levels may be expressed in other terms or scales as well. For example, security levels may be specified in terms such as 'general', 'sensitive', 'secret', 'top secret', or using any other scale or terminology.

In various embodiments, portions of a presentation may have their own security levels. For example, the first slide in a presentation may be available for general consumption at the company, whereas another slide may have a higher security level and be accessible only to managers and above. In various embodiments, security levels may apply to individual slides, groups of slides, sections of a presentation, individual graphics, groups of graphics, and/or any other portion or subset of a presentation.

Presentation creation date field 6130 may store the date the presentation was created. In various embodiments, this or another field may store the date of the last revision of the presentation.

Presentation rating field 6132 may store an indication of a rating given to the presentation. A rating may be expressed in any suitable scale (e.g., quantitative, qualitative, etc.). A rating may represent one or more aspects of a presentation, such as the importance of the presentation, the effectiveness of the presentation, the clarity of the presentation, or any other aspect of the presentation. A rating may represent an aggregate of ratings or feedback provided by multiple people. A rating may represent any other suitable statistic.

Acronyms field 6134 may store an indication of acronyms used in the presentation. The field may include an explanation or expansion of the acronym(s). In various embodiments, this may provide a convenient means for uninitiated readers to see what the acronyms mean. In various embodiments, acronyms may be tracked by a company with the desire to reduce the use of acronyms within presentations. Example acronyms include: DCE—data communications equipment; IMAP—internet message access protocol, FCE—frame check sequence.

Tags field 6136 may store one or more tags associated with a presentation. Tags may provide explanatory information about the presentation, indicate an author of the presentation, indicate the reliability of the presentation, indicate the finality of the presentation, indicate the state of the presentation, indicate the manner in which the presentation was generated, indicate feedback about an presentation, or provide any other information pertinent to an presentation. Illustrative tags include: pr75660791, pr71427249 (i.e., this presentation is associated with project IDs pr75660791 and pr71427249), DCE, learning; business plan, market assessment; Projections, financials, pr96358600.

Referring to FIG. 62, a diagram of an example 'Presentation Components' table 6200 according to some embodiments is shown. Presentations may include decks (e.g., PowerPoint® decks, Apple® Keynote® decks, Google® slide decks). Presentations may include other types of files, such as PDF files, Microsoft® Word documents, multimedia files, or any other type of file or any other type of information. A component of a presentation could be a subset of the content of the presentation.

Table 6200 may store information about components of presentations, such as a particular page of a PowerPoint® presentation or a chart from a pdf document. Presentation components could also include portions of a video or audio file. Table 6200 may be useful for a number of reasons, such as allowing meeting participants to rate particular components of a presentation, such as by providing a numeric rating (e.g. via headset 4000, via presentation remote 4200) for each of three important slides from a presentation as opposed to an overall rating for the presentation. Table 6200 may also allow a user to identify the highest rated sales chart from a large library of presentations, and to use that sales chart at a sales team Town hall presentation. Table 6200 may be used for various other purposes as well.

In various embodiments, table 6200 may be used in addition to, instead of, and/or in combination with meeting presentation table 6100. In various embodiments, a presentation component is a type of asset.

Asset ID field 6202 may store an identifier of an asset, where, in one embodiment, the asset is a presentation. Component ID field 6204 identifies a component of an asset, such as a single slide page from a presentation. In this example, the presentation is the asset and the component is the slide page. Each identified asset may contain many components identified by component ID 6204.

Component type field 6206 may store an indication of the component being identified. For example, a component type might be PowerPoint® slide 7, a graphic file from a Keynote™ presentation, a section of a presentation that discusses benefits of a new software package for the finance department, a two-minute audio clip from a 30-minute CEO all hands presentation, etc.

Average rating field 6208 may store one or more ratings for the component ID. Ratings may represent the utility of the component, the quality of the component, the importance of the component, and/or any other aspect of the component, and/or any combination of aspects of the component. Ratings could be aggregated numerical ratings one a scale of one to ten, such as ratings of 7.5 or 8.2. Ratings could be provided by meeting attendees (e.g. by using a smartphone to send ratings to presentation remote 4100) who attended one or more meetings in which the component was presented, providing a rating after review of the component via a user device in communication with central controller 110.

Ratings associated with presentation components could be useful in identifying employees who produce high quality assets. For example, a component with a high rating can be traced through component ID field 6204 to the corresponding meeting asset ID field 6202 and then, through presentation assets table 6000, to author field 6010 to determine the identity of the author or the presentation from which the component was a part.

Referring to FIG. 63, a diagram of an example 'tag meanings and representations' table 6300 according to some embodiments is shown. Table 6300 may store data descriptive of the meaning of a tag, the category of a tag, the appearance of a tag, and/or rules governing the use of a tag. Note that a given tag represented in a record (row) of table 6300 may be used more than one time. When a tag is used, table 6300 may serve as a reference for what the tag means.

Tag identifier field 6302 may store an identifier (e.g., a unique identifier) that identifies a tag.

Category field 6304 may store an indication of a category of a tag. In various embodiments, tags may be grouped into one or more categories. One category may be "positive tags", which may include any tag with a positive connotation (e.g., "good work", "nice comment", etc.). One category may be "negative tags", which may include any tag with a negative connotation (e.g., "speaking too fast", "confusing presentation", etc.). A category may include all tags with any other particular sentiment. A category may include all tags that can be applied to people (e.g., "creative", "hard worker"). A category may include all tags that can be applied to objects (e.g., "broken", "dangerous", "out of place", etc.). A category may include all tags that can be applied to some other set of recipients (e.g., to groups, locations, etc.). In various embodiments, tags may be categorized in any other suitable fashion.

Label field 6306 may store an indication of a label used by a tag. The label may be visible to a person using the tag, to a person receiving the tag, to a person who is viewing a report based on tags, and/or to any other person. For example, the label may appear on the tag, as part of the tag, and/or as the entire tag. The label may provide a summary or shorthand as to the tag's intended meaning or function. Exemplary labels may include "high impact", "good point", "key insight", "congested", "monotone", etc.

Meaning field 6308 may store an indication of a tag's meaning. The meaning may represent the intended comment or statement that is made by placing the tag. The meaning may be an expanded version of what was said on the label 6306. An example meaning of a tag (e.g., when applied to an employee) is "made a statement that improved understanding or moved a discussion forward and was not otherwise obvious".

Appearance field 6310 may store an indication of a tag's appearance. This may include image data for an image depicting the tag. This may include markup language, vector graphics definitions, and/or any other indication of a tag's appearance. An appearance may indicate that a tag appears as a gold star, a purple flower, an ice cream cone, a yellow square, a smiley face, or as any other depiction.

Rules field 6312 may store an indication of rules that govern the use of a tag. Rules may specify what individuals and/or categories of individuals can use a tag (e.g., only individuals of a certain rank, only individuals within a certain department, only individuals with a certain certification, etc.). Rules may specify situations in which a tag can be applied (e.g., only in meetings, only after comments, etc.). Rules may specify the subject or recipient of a tag (e.g., a tag may only be used on people, a tag may only be used on presenters, a tag may only be used on software developers, etc.). Rules may specify a maximum number of times that a given tag may be used (e.g., no more than twice per meeting, etc.). Rules may specify any other conditions, circumstances, and/or criteria under which a tag may be used.

Referring to FIG. 73, a diagram of an example 'Tagging' table 7300 according to some embodiments is shown. Table 7300 may store instances where a tag (e.g., a tag from table 6300) was actually assigned, placed and/or applied. For example, in a particular meeting, after being impressed by the meeting facilitator, a first meeting participant may assign a tag of "efficient facilitation" to the meeting facilitator. This assignment of a tag may be stored in table 7300. Table 7300 may include such information as the time and circumstances under which the tag was applied, the assignor, etc. In various embodiments, data stored in table 7300 may later be analyzed to determine an employee's performance, the efficiency of meetings, the effectiveness of a presentation, and/or any other aspect of an employee, object, meeting, group, team, organization, etc. Tags may be aggregated (e.g., the number of positive tags received by an employee may be determined). In various embodiments, actions may be taken based on a single tag application (e.g., an employee may receive a reward for a single positive tag). Tagging table 7300 may be used for any other purpose.

Tagging instance identifier field 7302 may store an identifier (e.g., a unique identifier) that identifies an instance of a tag being assigned or applied.

Meeting identifier field 7304 may store an identifier of a meeting. This may be the meeting during which a tag was applied.

In various embodiments, field 7304 may contain an indicator of a location (e.g., a room, address, etc.) if, for example, the tag is not applied in any particular meeting. In various embodiments, table 7300 may include an additional "location" field.

Source field 7306 may store an indication of a source of a tag. This may be a participant, employee, or other user who applied or assigned a tag. The source of a tag may also be a device (e.g., a camera, microphone, etc.). A device may receive data about a user (e.g., in the form of a video recording, audio recording, etc.), may analyze the data, and may assign a tag based on the analysis. For example, a microphone may receive audio data of a presenter, determine that the presenter is speaking too quickly, and automatically assign a tag, e.g., "speak too quickly". In various embodiments, central controller 110 and/or any other entity, combination of entities, combination of devices and entities, etc., may be the source of a tag.

Tag identifier field 7308 may store an indication of a tag that was assigned (e.g., a tag as stored in table 6300). Tag presentation language field 7310 may store an indication of a language in which the tag was presented. This may indicate the language used for any label or text associated with the tag.

'Tag presentation screen location' field 7312 may store an indication of a location or area on a screen or display window where a tag was placed or applied. The particular location at which a tag is placed may indicate a person or object to which the tag is referring (e.g., the target of the tag). For example, if a tag is placed at a location on a screen during a video conference call, the tag may be referring to a participant whose video is currently displayed at that same location on the screen (such participant may be identified, for example, by reference to table 9200). If a tag is placed at a location on a slide of a presentation, the tag may be referring to text or graphics appearing at that location on the slide. If a tag is placed on an image of a room, the tag may be referring to a person, object, presentation, or other item appearing in the image at the location the tag is placed. A tag's location may be used for any other suitable purpose.

In various embodiments, the location of a tag may be expressed using pixels (e.g., pixels from the top and pixels from the left of a screen or window), using a percentage of a screen, using inches or other units of measurement, and/or using any other units. Exemplary locations include b3; 30%, 70%; 100 px, 200 px; bottom right; etc.

Tag target field 7314 may store an indication of target or object of the tag. This may be a user, device, asset, item of furniture, object, group, and/or anything else. Thus, the tag may represent a comment, feedback, evaluation, question, note, and/or other statement for and/or about the target.

Application time field 7316 may store an indication of a time when the tag was applied or placed.

Counter field 7318 may store an indication of a count or running count of tags that have been applied. The counter may apply to tags in general, to tags of the same type used in this instance (e.g., tags having the same tag identifier field 7308), to tags used in the same meeting, to tags from the same source, to tags used during some period of time, to tags with the same target, and/or to some other set of tagging instances. For example, if the present tagging instance represents the 48th time a tag was applied during a given meeting, then counter field 7318 may store the number 48.

It may be desirable to maintain a running count of tags that have been applied in order to conform to any rules governing the application of tags (e.g., as described in table 6300). For example, there may be a maximum number of tags permitted during a meeting. In various embodiments, it may be desirable to track tag usage by an individual (e.g., to ascertain engagement of the individual), to track tag receipt by a target (e.g., to ascertain performance of the target), and/or to maintain a counter of tags for any other reason.

Expiration time field 7320 may store an indication (e.g., date and/or time) of when an applied tag expires. An expiration time may represent, for example, the latest time for which a tag will count towards an award (e.g., an award for receiving the most tags). In various embodiments, a tag is removed (e.g., made invisible to its target, removed from its target, etc.) following the expiration time. The expiration time may be used for any other purpose.

Tag metadata field 7322 may store an indication of any metadata associated with the tag, such as an opinion by another user as to whether or not the tag was used appropriately.

In various embodiments, table 7300 may include a field (not shown) storing an indicator of a tag strength, degree, level or severity. For example if a tag represents "confusion", then the strength of the tag represents a level of confusion. Thus, a level may provide a finer or more nuanced meaning to a tag.

Figure 74:
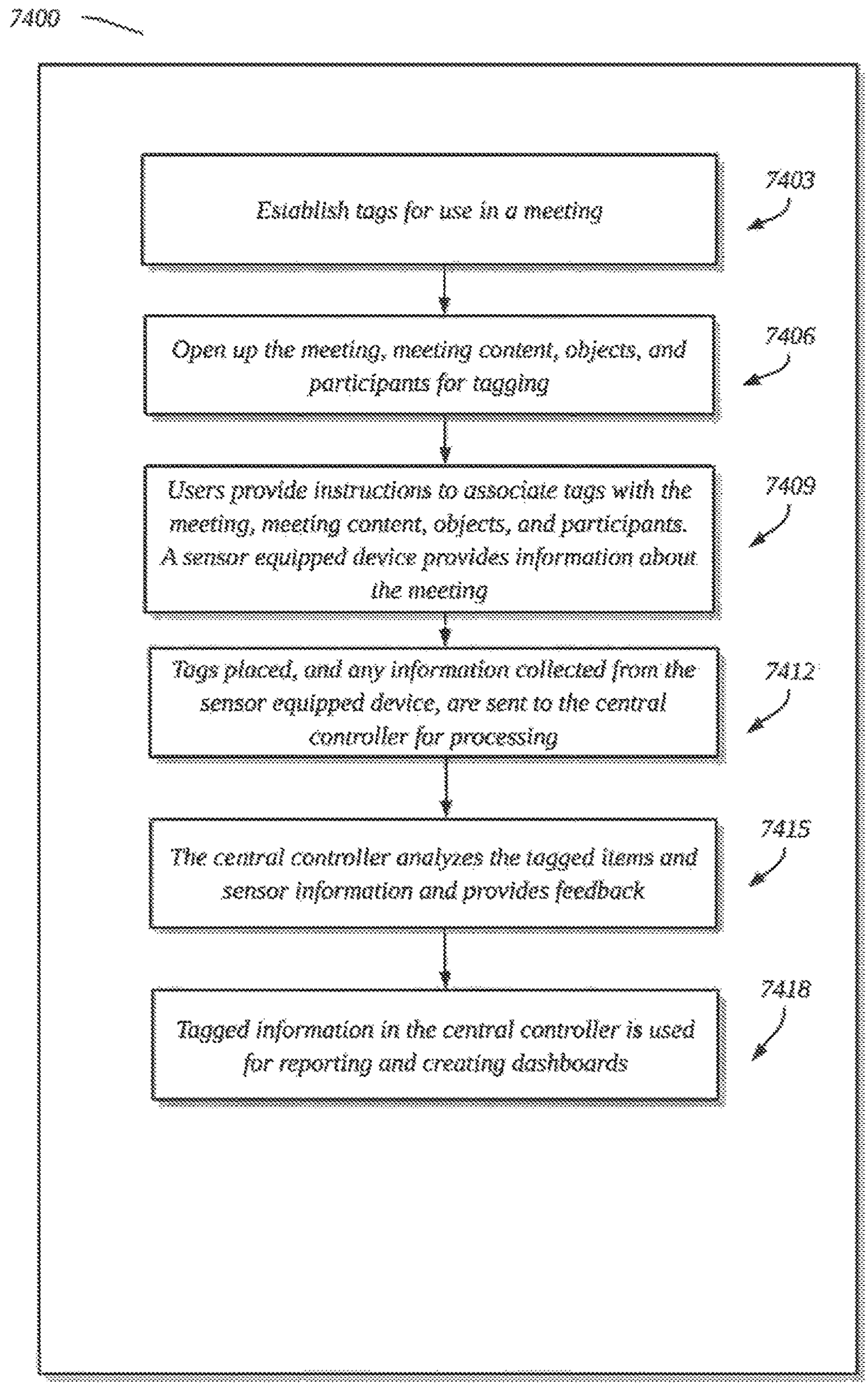
FIG. 74 shows a diagram of a process flow consistent with at least some embodiments described herein.

Referring now to FIG. 74, a flow diagram of a method 7400 according to some embodiments is shown. Method 7400 details, according to some embodiments, a flow of tag information from the time tags are initially specified through generation of feedback based on tags that were placed.

At step 7403 tags may be established or prepared for use, such as in an upcoming meeting. A meeting owner/participant accesses the central controller tag repository and selects tags for use or enters new tags as might be useful or appropriate for the meeting.

At step 7406 the meeting, meeting content, objects, participants and/or any information to be tagged are opened (e.g., made available to be tagged).

At step 7409 tags are placed, selected or associated with the content, people, objects, etc., in accordance with participant instructions. The placed tags may be tags from amongst the tags established at step 7403. A sensor equipped device may collect (e.g., automatically collect) information about the meeting.

At step 7412 the tags and associated information, and any information collected from the sensor equipped device, are sent to the central controller 110 for processing.

At step 7415 the central controller algorithm analyzes the content from the participant or group of participants and provides feedback. Feedback may take the form of dashboards, reports, visual indicators, words or meeting improvement suggestions provided to a participant(s) or meeting owner. The central controller may analyze information obtained via sensors and process it through an AI algorithm. The algorithm may generate responses for the participant(s) to use (actively or passively) or confirm.

At step 7418 the tagged information in the central controller is used for reporting and dashboard view, such as during the meeting and after the fact.

Thus, a process for utilizing tags may include: meeting is set up; meeting owner chooses tags; meeting starts; participants tag content and people; sensors collect data; signals are generated; actions are taken; a post-meeting reporting dashboard is created.

Referring to FIG. 64, a diagram of an example room table 6400 according to some embodiments is shown. In various embodiments, a room may entail a physical location in which people gather to conduct a meeting, presentation, lecture, class, seminar, government hearing, etc. The room may be physical, or it could be virtual such as an online meeting via some conferencing or communications technology, such as telephone, video conferencing, telepresence, zoom calls, virtual worlds, or the like. Room ID could also refer to a location such as a walking trail of a corporate campus in which a 'walking meeting' was to take place. In another embodiment, a room could be a place within a local park, or a particular table at a local restaurant. Rooms may be temporary in nature, such as the use of an employee office to host occasional meetings. Rooms (e.g., hybrid meetings) may include some people who gather in person, and some people who participate from remote locations (e.g., some people who are not present in the same room), and may therefore participate via a communications technology. Where a person is not physically proximate to other meeting attendees, that person may be referred to as a 'virtual' attendee, or the like. A meeting may serve as an opportunity for people to share information, work through problems, provide status updates, provide feedback to one another, share expertise, collaborate on building or developing something, or may serve any other purpose.

In various embodiments, a room could be part of a group of several meetings that are all used by a single meeting. For example, one meeting might be split over two rooms in different countries so as to avoid too much travel between locations for a meeting.

Room identifier field 6402 may store an identifier of a room in which a meeting is scheduled to occur. The room may be a physical room, such as a conference room or auditorium. The room may be a virtual room, such as a video chat room, chat room, message board, Zoom call meeting, WebEx call meeting, or the like. In some embodiments, a meeting owner or central controller 110 may switch the room location of a meeting, with the record stored in room ID field 6402 updated to reflect the new room.

Address field 6404 may store an address associated with the room. For example, a room may be located at 456 Gold Street in New York, NY While this may provide only a high-level designation of the location of a particular room, in some embodiments this information is helpful to employees or contractors who are visiting a meeting location for the first time and need to know how to find the building itself first.

Building field 6406 may store the name of a building within a group of buildings that host meetings. For example, this field might store 'Building 1' to indicate that of the eight buildings in a corporate campus, this meeting room is located in Building 1.

Floor 6408 may store an indication of the floor on which the room is located. Room number 6410 field may store a number associated with the room, such as room '486'. Such room numbers might be added to stored floor plan maps of a company building, allowing meeting attendees to quickly associate the room number of a meeting with a particular location on a digital map that might be sent to their user device such as a smartphone prior to the start of a meeting.

Room name field 6412 may store a name for a room. A meeting room may be descriptive of the location, such as the 'Casey Auditorium', so as to make it easier for meeting participants to quickly understand where the meeting room is located.

Room area field 6414 may store the square footage of the room. In some embodiments this may allow central controller 110 to approximate the number of people that may comfortably fit within the room.

Room height field 6416 may store the height of the room. This could be an average height, or a range of the highest to lowest points in the room. For example, a room might be '10 feet' high or '8 to 12 feet'high.

Capacity field 6418 may store a capacity limit of the room, such as a capacity of 300 people. In one embodiment, this capacity level is determined by the central controller based on data from room area field 6414.

Room setup field 6426 may store the way in which the room is typically set up. For example, the room may be set up in 'classroom/lecture'style—which may be good for presenters providing educational materials, though that style may be less effective for brainstorming.

Tables field 6428 may store the number and type of tables in the room. For example, a room may have '6 rectangular tables' which are 'movable'. In some embodiments this may be an ideal set up for meetings in which participants need to break up into small groups at some point during the meeting.

Number of chairs present field 6430 may store the number of chairs that are supposed to be present in the room. This information is useful when trying to find a room for a particular number of participants. In various embodiments, the chairs are peripheral devices which are in communication with central controller 110, and the chairs may update their room location (determined via GPS or other location system) so that that central controller 110 may update the number of chairs in a room with current and updated information.

AV configuration field 6436 may store a meeting type that is most appropriate for a particular room. For example, 'rm703' has an AV configuration of 'Learning', indicating that in some embodiments AV equipment in the room can support learning meetings in which one person is generally giving a presentation or lecture to a relatively large number of users. For example, the room may be equipped with a handheld microphone and flip charts.

AV quality field 6438 may store an average quality level of the AV equipment in the room. For example, a room might have an AV quality score of 5 out of 10 based on quality scores of the projector and the speakers in the room. In some embodiments, AV quality scores may come from users answering survey questions to gather feedback on the level of AV quality. In one embodiment, a meeting survey could include questions relating to AV equipment and forward the user's answers to central controller 110 where they can be aggregated into an average score for storage in field AV quality 6438 of room table 6400.

Acoustics ratings field 6440 may store an average score representing the acoustic quality of the room. This might be useful to users looking for a room in which music is being played as part of a meeting, or users in an educational setting looking for a meeting room in which to practice a musical instrument.

Wheelchair accessibility field 6446 may store an indication of whether or not the room is accessible to users in wheelchairs. In some embodiments, this includes a description of what the access looks like, such as a description of ramps, their materials, and the angle of the ramp. In other embodiments, this field could also store other accessibility information such as whether or not there are places in the room to store the wheelchair or if there are desks in the room that can accommodate a wheelchair.

Referring to FIG. 65, a diagram of an example room peripheral table 6500 according to some embodiments is shown. A meeting room may contain one or more user peripherals, at different locations throughout the room. For example, meeting participants may use headsets, keyboards, mice, presentation remote controllers, projectors, and chairs during a meeting. While some of these peripheral devices are removed by users at the end of the meeting, other peripherals may be left behind.

In various embodiments, peripherals, or other equipment may include video equipment, microphones, phones, display panels, chairs (intelligent and non-intelligent), and tables.

Room identifier field 6502 may store an identifier of a room in which a meeting is scheduled to occur. The room may be a physical room, such as a conference room or auditorium. The room may be a hybrid room, such as a physical room with some participants joining via video chat room, chat room, message board, Zoom® call meeting, WebEx® call meeting, or the like.

Peripheral ID field 6504 may store an identifier of each peripheral currently in the room. Location in room field 6506 may store the location of a peripheral within a meeting room. The location may be determined, for example, by a peripheral device locating itself via GPS or other suitable locating technology and then transmitting this location back to central controller 110. For example, the peripheral may be identified as in the 'corner of the far right wall' or in the 'center of the north wall.' In other embodiments, the location data is presented on a digital map so that the exact location in the room is immediately clear. In various embodiments, this peripheral location data may be provided to a user looking for that peripheral. For example, a meeting participant could be sent a digital map onto her user device for display of the map.

In various embodiments, peripheral or equipment models may be stored.

In various embodiments, training videos for using peripherals or equipment of a room or of any other part of system 100 may exist. Videos may be stored, such as in asset library table 1900 or in any other location.

Referring to FIG. 66, a diagram of an example vendor database table 6600 according to some embodiments is shown. In one embodiment, vendor database table 6600 service makes service calls easier by storing vendor information that can be sent out to user devices and/or peripheral devices through central controller 110.

Vendor ID field 6602 may store a unique identifier for each stored vendor. In some embodiments, these stored vendors are all company approved vendors that are known to perform a specific service. Name field 6604 may store the name of the vendor, such as 'Machine Cleaning Express' or 'Swift Copy Repair'. In some embodiments, vendors might include vendors supplying services for a meeting room such as supplying equipment, chairs, tables, cameras, lights, office supplies, training, etc. In some embodiments, vendors may offer services mediated by a remote person who delivers the services through a headset 4000 worn by an employee of the company, potentially decreasing the costs of vendor services.

Category field 6606 may store the type of service provided by the vendor. These categories may include 'cleaning', 'printing', 'repair', 'consulting', 'software development', 'training', 'maintenance', 'security', etc. Price field 6608 may store an average cost per hour for the service. This could be used by central controller 110 to generate total service cost estimates.

Min time field 6610 may store a minimum amount of time for a particular service call. For example, 'Machine Cleaners Express' requires 90 minutes per service call.

Hours field 6612 may store hours of service for a vendor.

Ratings field 6614 may store a numeric or level rating for the vendor, such as '4.5' on a five point scale. In some embodiments such ratings could be generated by user feedback through a user device or peripheral device (e.g. headset, presentation remote, camera) connected to central controller 110 and then aggregated and stored in ratings field 6614. Stored ratings could also be stored and presented individually, so that ratings data for a vendor includes many comments from users of the service. Website field 6616 and phone field 6618 may store contact information for vendors so that requests can be placed or followed up on.

Figure 67:
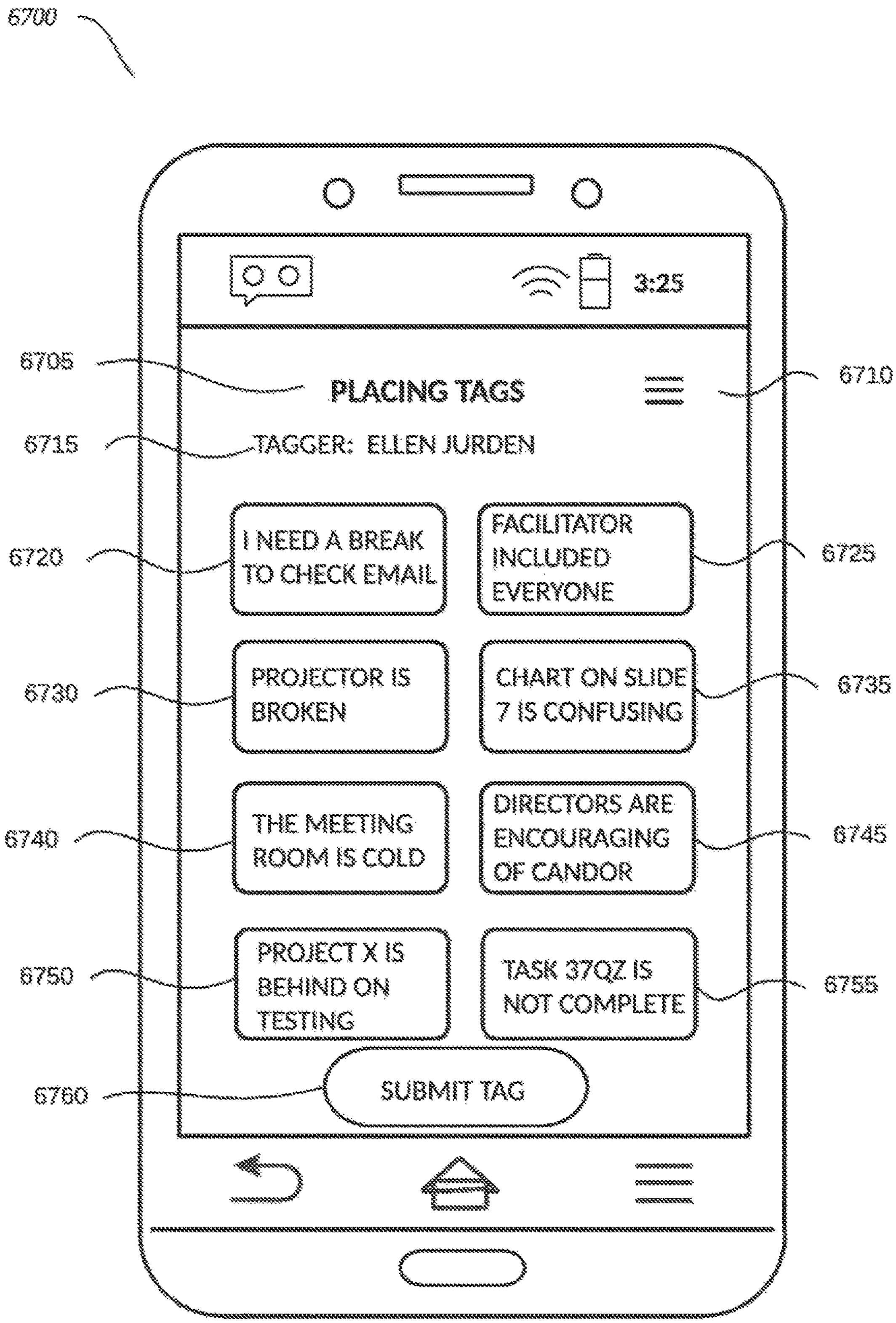
FIG. 67 is a user interface of an app for selecting tags consistent with at least some embodiments described herein.

FIG. 67 illustrates a graphical user interface which may be presented to a user in order to apply tags to people, teams, objects, environments, classrooms, teachers, tutors, etc. FIG. 67 illustrates a respective graphical user interface (GUI) as it may be output on a peripheral device, mobile device, or any other device (e.g. on a mobile smartphone).

In accordance with some embodiments, the GUI may be made available via a software application operable to receive and output information in accordance with embodiments described herein. It should be noted that many variations on such graphical user interfaces may be implemented (e.g., menus and arrangements of elements may be modified, additional graphics and functionality may be added). The graphical user interface of FIG. 67 is presented in simplified form in order to focus on particular embodiments being described.

With reference to FIG. 67, a screen 6700 from an app controlled by users according to some embodiments is shown. The depicted screen shows app placing tags 6705 functionality that can be employed by a user (e.g. meeting owner, meeting facilitator, meeting participant, employee, project manager, facilities manager, game player, teacher, tutor) to apply tags to people, teams, objects, environments, etc. In some embodiments, the tag data is provided via central controller 110 to one or more user devices (e.g. smartphone, tablet computer, display screen) and/or user peripherals (e.g. headset, camera, presentation remote, mouse, keyboard). In various embodiments, tag data may be obtained from 'Tag Meanings and Representations' table 6300. In FIG. 67, the app is in a mode whereby users can apply tags.

In some embodiments, the user may select from a menu 6710 which displays one or more different modes of the software. In some embodiments, modes include 'placing tags', 'choosing tags', 'responding to tags', 'upvoting tags', etc.

In some embodiments, the app may show the identity of the user placing a tag, such as 'Tagger' 6715 who is in this case 'Ellen Jurden'. In this example, the user may enter this identity information via a virtual keyboard, via voice recording, retrieved from a processor of the user device, etc. In other embodiments, tagger 6715 may elect to remain anonymous.

In various embodiments, the user is able to use screen 6700 to apply one or more tags by selecting from virtual and/or physical buttons and then pressing a 'submit tag' button 6760. Exemplary tags could reflect something that a user needs in the middle of a meeting, such as by pressing an 'I need a break to check email' button 6720. Facilitation proficiency could be identified through a tag such as a 'Facilitator included everyone'button 6725. Problems with a meeting room could be brought to the attention of facilities personnel with the selection of a button tagging that the 'Projector is broken' 6730. A button 6735 'Chart on slide 7 is confusing' may be applied while slide 7 is being displayed during a meeting, with the tag indicating confusion being transmitted to central controller 110 for association with slide 7 so that anyone using that presentation deck in the future might spend additional time on that slide explaining it, or might make changes to the slide ide to improve clarity. Environmental issues during a meeting might be tagged with a 'The meeting room is cold' button button 6740. Tags may also be applied to a group of people, such as by using a button 6745 'Directors are encouraging of candor' to indicate that Directors in general are positively supportive of candor. In this embodiment, the tag may be stored in a record of each Director in employee table 5000. Tags may also be placed on a project, such as by pressing a 'Project X is behind on testing' button 6750, which may be routed to a project manager associated with Project X. A button 6755 indicating that 'Task 37QZ is not complete' may be applied to task 37QZ (e.g. a task to debug one hundred lines of code) to indicate that this task is not yet completed.

In various embodiments, when the user hits 'Submit Tag', the app may transmit (e.g., to the central controller) such information as a tag identifier, identity of the user applying the tag, the time the tag was applied, the recipient of the tag, the meeting during which the tag was applied, and/or any other information. Once a tag has been submitted, an instance of the tag being applied may be stored in Tagging table 7300.

In various embodiments, the device running the app (e.g., a smartphone or tablet), may communicate directly with central controller 110 and directly with peripheral devices (e.g., via Bluetooth©; e.g., via local wireless network), or may communicate with the corresponding peripheral devices through one or more intermediary devices (e.g., through the central controller 110; e.g., through the user device), or in any other fashion.

With reference to FIG. 68, a depiction of an example map 6800 according to some embodiments is shown. The map may represent a map of a campus, an office building complex, a set of office buildings, or the like. In various embodiments, the map may represent a map of any building, set of buildings, or other environment.

Map 6800 depicts two buildings 6802 and 6804 with an outdoor area 6806 between them. As depicted in map 6800, buildings 6802 and 6804 each have only one floor. However in various embodiments, buildings with multiple floors may be depicted. In some embodiments, devices within the map 6800 are under the control of a central controller 110 which may use wired or wireless connections to send commands or requests to various devices and locations within the campus. This allows meeting owners, facilitators, participants, and observers to employ user devices (such as a smartphone) to communicate with central controller 110 in order to command various devices throughout the campus. It will be understood that this layout of a company or educational campus is for illustrative purposes only, and that any other shape or layout of a campus could employ the same technologies and techniques.

The depicted campus layout view includes various devices and represents one exemplary arrangement of rooms, paths, and devices. However, various embodiments contemplate that any suitable arrangement of rooms, paths, and devices, and any suitable quantity of devices (e.g., quantity of chairs, quantity of cameras) may likewise be used.

Building 6802 has entrance 6810*a* and building 6804 has entrance 6810*c*. The outdoor area 6806 has entrance 6810*b*. In various embodiments, 6810*b* is the only means of entry (e.g., permitted means of entry) into the campus from the outside. For example, the outdoor area 6806 may be otherwise fenced-off.

Entrances 6810*a*, 6810*b*, and 6810*c* may be connected via a walking path 6814. In various embodiments, the path may be available for various modes of transportation, such as walking, skating, scooter, bicycle, golf cart, etc.

Inside buildings 6802 and 6804 are depicted various rooms, including such offices as 6816*a*, 6816*b*, 6816*c*, 6816*d*, and 6816*e*; including such conference rooms as 6824*a*, 6824*b*, 6824*c*, 6824*d*, and 6428*e*; small conference rooms 6826*a*, 6826*b*, and 6826*c*; an office with small conference table 6828; and including such kitchens as 6838*a* and 6838*b*. In some embodiments, offices and conference rooms may have different layouts of chairs, tables, desks, stages, etc. For example, conference room 6824*a* shows a seating arrangement that may be conducive to large presentations or training sessions, while 6824*b* may be a better room layout for a small meeting such as a small decision making meeting. Conference room 6824*d* shows two small tables with access to ample wall space for brainstorming and interactive exercises. Such room layouts may change over time, and may be stored with central controller 110 so that employees can have access to digital layouts in order to find a room that is best suited to their needs. In some embodiments, room locations may have associated disadvantages stores with location controller 8305 and/or central controller 110, such as small conference room 6826*c* being located next to kitchen 6838*b* which may result in a greater degree of noise in the room which may be distracting for participants meeting there. In some embodiments, central controller 110 may suggest room layouts based on the parameters of meeting room requests as described more fully in FIG. 85. Various embodiments contemplate that buildings may include other types of rooms even if not explicitly depicted (e.g., gyms, cafeterias, roof areas, training rooms, restrooms, closets and storage areas, atrium space, etc.).

Building 6802 includes reception area 6842*a* with reception guest seating area 6843*a*, and building 6804 includes reception area 6842*b* with reception guest seating area 6843*b*.

Building 6802 includes hallway 6846*a*, and building 6804 includes hallway 6846*b*. Map 6800 depicts various cameras, such as camera 6852*b* which observes the outdoor area 6815, and camera 6852*a* which observes hallway area 6846*a*.

Inside buildings 6802 and 6804 are depicted various windows, including such windows 6854*a-e*. In various embodiments, windows may influence the heating and cooling requirements for rooms (e.g., for meeting rooms), may influence the mood within a meeting through the view that is visible out the windows, and/or may have any other effect on meetings and/or on other aspects of life within buildings 6802 and 6804.

Inside building 6804 is depicted a facilities room 6848 that may be used to house cleaning staff and supplies, which in some embodiments may be used to clean conference rooms (e.g. taking out the trash, cleaning whiteboards, replacing flipcharts, resupplying food and beverages, changing table and chair configurations). In some embodiments, employees can employ a user device (e.g. a smartphone) to provide cleaning requests to facilities via central controller 110. In other embodiments, central controller 110 may use images of a conference room to create a work request for facilities. For example, an image from a camera in conference room 6824*c* might indicate that a trash can is overflowing, triggering a signal to facilities room 6848 to send someone to empty the trash can. In some embodiments, an employee may tag an object in a room as needing the attention of facilities. For example, participants in a meeting may tag a chair as being broken (e.g. in conference room 6824*a* chair number CH739921 is broken) and transmit that tag for storage (e.g. storing it in tag database table 7300) for review by facilities personnel. Other room issues that may be identified with tags include, broken air conditioning units, stained carpets, projector bulbs burned out, missing conference table phones, broken coffee pots, etc.

It will be appreciated that map 6800 depicts an arrangement of rooms according to some embodiments, but that various embodiments apply to any applicable arrangement of rooms.

Motion sensors 6850*a*, 6850*b*, and 6850*c* may be positioned throughout campus floor plan 6800. In some embodiments, motion sensors 6850*a-c* capture movements of occupants throughout campus 6800 and transmit the data to central controller 110 for storage or processing, e.g., for the purposes of locating employees, identifying employees, assessing engagement and energy level in a meeting, etc. In some embodiments, location and identity information and engagement levels of employees may be automatically associated with tags generated by employees for storage with central controller 110. In some embodiments, motion sensors 6850*a-c* may transmit data directly to central controller 110. In some embodiments, motion sensors 6850*a-c* capture data about people entering or leaving campus 6800 and transmit data to location controller 8305 or directly to central controller 110, e.g. for the purposes of updating the meeting attendee list or controlling access to the meeting based on a table of approved attendees.

Cameras 6852*a*, 6852*b*, 6852*c*, and 6852*d* may be configured to record video or still images of locations throughout campus 6800. In some embodiments, Cameras 6852*a-d* capture a video signal that is transmitted to location controller 8305 via a wired or wireless connection for storage or processing. In some embodiments, location controller 8305 may then transmit the video to central controller 110. In other embodiments, any of cameras 6852*a-d* send a video feed directly to central controller 110. In one embodiment, a meeting owner might bring up the video feed from one or more of cameras 6852*a-d* during a break in a meeting so that the meeting owner could keep an eye on meeting participants who left the meeting room during a break. Such a video feed, for example, could allow a meeting owner in conference room 6824*d* to see a feed from camera 6852*a* to identify that a meeting participant had gone back to building 6802 during the break and was currently standing in hallway 6846*a* and would thus not be likely to return to the meeting in the next two minutes. In some embodiments, location and identity information from cameras 6846*a-d* may be associated with tags generated by the viewed employees.

Employee identification readers 6808*a*, 6808*b*, and 6808*c* are positioned at the entry points 6810*a-c*, and serve to identify employees and allow/deny access as they attempt to move through the entry points. For example, employee identification readers can be RFID readers to scan an employee badge, a camera to identify the employee via face recognition, a scanner to identify an employee by a carried user device, a microphone for voice recognition, or other employee identification technology. In some embodiments, employee identification readers 6808*a-c* transmit data about people entering or leaving campus 6800 and transmit data to location controller 8305 or directly to central controller 110, e.g. for the purposes of updating the meeting attendee list or identifying employees who are on their way to a meeting.

Windows 6854*a*, 6854*b*, 6854*c*, 6854*d*, and 6854*e* can include dynamic tinting technology. In some embodiments, examples include electrochromic glass, photochromic glass, thermochromic glass, suspended-particle, micro-blind, and polymer-dispersed liquid-crystal devices. Windows 6854*a-e* can have an associated direction. For example, window 6854*b* is facing east while window 6854*d* is facing south. Knowing the direction in which windows are facing can be helpful in those embodiments in which calculations are done to determine the carbon footprint of a meeting (e.g. determining the angle of the sun and the impact on room temperature and thus room air conditioning requirements to maintain comfortable temperature in the room), sun angle may be used to determine optimum times during the day for viewing of screens during a presentation, or for knowing during which time frame sunlight might be expected to be in the eyes of meeting attendees in a particular room.

In some embodiments, map 6800 may be stored with central controller 110, and could thus be sent to user devices and/or peripheral devices as a way to help users know where their next meeting is. For example, a meeting participant in conference room 6824*b* may be finishing a meeting that ends at 3:00 PM, and wants to know how long it will take to get to their next meeting which begins at 3:00 PM in conference room 6824*d*. By downloading map 6800 from central controller 110, the user can clearly see the location of the next conference room and estimate how long it will take to walk to that room. With that in mind, the meeting participant may leave conference room 6824*b* extra early given that it looks like a long walk to conference room 6824*d*. In one embodiment, central controller 110 draws a path on map 6800 from room 6824*b* to 6824*d* to make it easier for the user to identify how to get to that room. In some embodiments, alternate routes may be shown on map 6800. For example, there may be two paths to get to a meeting room, but only one path passes by a kitchen where a user can get some coffee on the way to the meeting. In some embodiments, users have preferences stored with central controller 110, such as a preference to drink coffee between 8:00 AM and 10:00 AM. In this example, central controller 110 may create a meeting path for a user that includes a stopping point at a kitchen when a user is attending meetings in the 8:00 AM to 10:00 AM timeframe.

In various embodiments, central controller 110 may estimate how long it will take for a user to get from one meeting room to another. For example, after determining a path to take, central controller 110 may calculate the distance and then multiply this distance by the user's walking speed to estimate how long of a walk it is from one meeting room to another. In some embodiments, a path between two meetings may employ one or more different modes of transportation which have different estimated speeds. For example, a user might walk for part of the path and then drive during another part of the path. In some embodiments, the speed of one mode may depend on the time of day or other factors. For example, getting from a conference room in one building to a conference room in another building across town may require a drive across town. That might take 10 minutes during off-peak times, but could take 30 minutes when there is traffic or bad weather. Central controller 110 can retrieve traffic information and weather data to help create a more accurate estimate of meeting participant travel time in such cases. With better estimates of the time it takes to get to a meeting room, users can better calculate an appropriate time to leave for the meeting room. In some embodiments, central controller 110 may determine a path and estimated travel time from a user's current location (e.g. from a GPS signal of her user device) to a meeting room. In some embodiments central controller 110 can suggest meeting locations to a meeting owner that take into account different factors. For example, conference room 6824*b* might have a low rating between the hours of 3:00 PM and 4:00 PM in April when the angle of the sun makes it difficult to view a display screen across from window 6854*b*. During this time period, central controller 110 may suggest conference room 6824*d* which has no sun issues at that time since window 6854*e* faces west. When meeting room space is very tight, central controller 110 might suggest locations that are less than desirable for very small groups. For example, reception guest seating area 6843*b* might be suggested as long as the agenda of the meeting does not include anything confidential given that there may be guests walking by reception guest seating area 6843*b*. As an alternative location, central controller 110 might suggest office 6828 which has a small five person table, but only during times when the occupant of room 6828 is not present. In some embodiments, central controller 110 suggests meeting rooms based on a best fit between current availability and the number of expected meeting participants. For example, a group of four might request conference room 6824*a*, but instead be told to use small conference room 6826*a* so as to leave room 6824*a* for larger groups. In this example, central controller 110 might suggest outdoor table 6815 for this four person group, but only if weather conditions are favorable at the desired meeting time.

Referring to FIG. 69, a diagram of an example 'meeting events' table 6900 according to some embodiments is shown. Table 6900 may store data descriptive of events that occur during meetings. Events may include presentations made, comments spoken, decisions made, tasks assigned, arguments, resolutions, videos watched, demonstrations, breaks taken, food served, new arrivals (e.g., of attendees), early departures, announcements, ideas generated, and/or any other event or occurrence during a meeting.

Event identifier field 6902 may store an identifier (e.g., a unique identifier) that identifies an event. Meeting identifier field 6904 may store an identifier for a meeting in which the event occurred. In various embodiments, table 6900 may store an indication of a particular session of a meeting where an event occurred.

User identifier field 6906 may store an identifier for a user who was at the center of an event. For example, the user made a comment, made a presentation, made a decision, or otherwise was a central figure, protagonist, major contributor, major factor, etc., in an event. In various embodiments, there may be multiple users listed (e.g., if the event was a discussion, argument, group decision, etc.).

Event type field 6908 may store an indication of an event type. This may be a category or other broad characterization of an event. Example event types include: user comment; user presentation; user mediation; decision made; task assigned; etc.

Content field 6910 may store an indication of event content, details, particulars, or the like. Field 6910 may include text of the words that were spoken during an event. Field 6910 may include an actual decision that was made, an idea that was generated, a slide that was shown, a comment that was made, a transcript of a discussion, and/or any other information or details about an event. Field 6910 may include video, audio, transcripts, and/or other data captured of an event.

In various embodiments, meeting events may be captured by cameras, microphones, and/or other peripherals and/or other devices in a conference room and/or in any other suitable location. The recording of meeting events may be triggered by a calendar time (e.g., recording my start when a meeting is scheduled to begin). The recording of meeting events may be triggered by the detection of cues indicative of a meeting's start (e.g., "Let's get started"). Recording may begin as a result of explicit instruction (e.g., by a meeting owner). Recording may commence for any other reason.

Referring to FIG. 70, a diagram of an example videos library database table 7000 according to some embodiments is shown. There are many opportunities for using video to help employees complete work in an efficient and safe manner. In this table, video content is stored for delivery across a range of communication channels of the company.

Video ID field 7002 may store a unique identifier associated with a piece of video content. In some embodiments, video ID field 7002 may be referenced in tags submitted by employees when referring to video content. Content summary field 7004 may store a brief description of the video content, such as 'training video' or 'instruction manual'. In various embodiments, videos stored in library database table 7000 may be accessible by peripheral devices (e.g. headset, presentation remote, camera, mouse, keyboard). For example, a presenter may use presentation remote 4200 to request video ID mtvd719065 which the presenter may request to be presented via projector 4276 onto a wall such that meeting participants could watch it.

Referring to FIG. 76, a diagram of an example local weather log database table 7600 according to some embodiments is shown. There are many opportunities for using weather data in order to enhance game play, improve the sense of connection between players, improve emotional connectedness during virtual calls, etc. In this table, weather data is stored for use by peripheral devices and user devices.

Location field 7602 may store an address of a user at which weather data is recorded.

Date field 7604 may store an indication of the date on which the weather data was recorded, while time field 7606 may store the time at which the weather data was recorded. Temperature field 7608 indicates the temperature in Fahrenheit at this location 7602, humidity field 7610 stores the percent humidity, and wind speed field 7612 may store the current wind speed in miles per hour.

The type of precipitation field 7614 may store types of precipitation such as rain, snow, hail, etc. Each form of precipitation may store an associated precipitation rate in precipitation rate field 7616, such as 0.15 inches per hour of rainfall or 0.46 inches per hour of snow. Light level field 7618 stores the number of lux, while cloud cover field 7620 provides a percentage of the sky that is covered by clouds.

In various embodiments, weather data could be entered by a user, received from a weather sensor, or received from government weather data agencies such as the National Weather Service. Weather data may be updated on a regular schedule, updated upon request of a user, or updated upon a triggering event such as when a user is detected to be walking out of a building.

Conference Room

Figure 77:
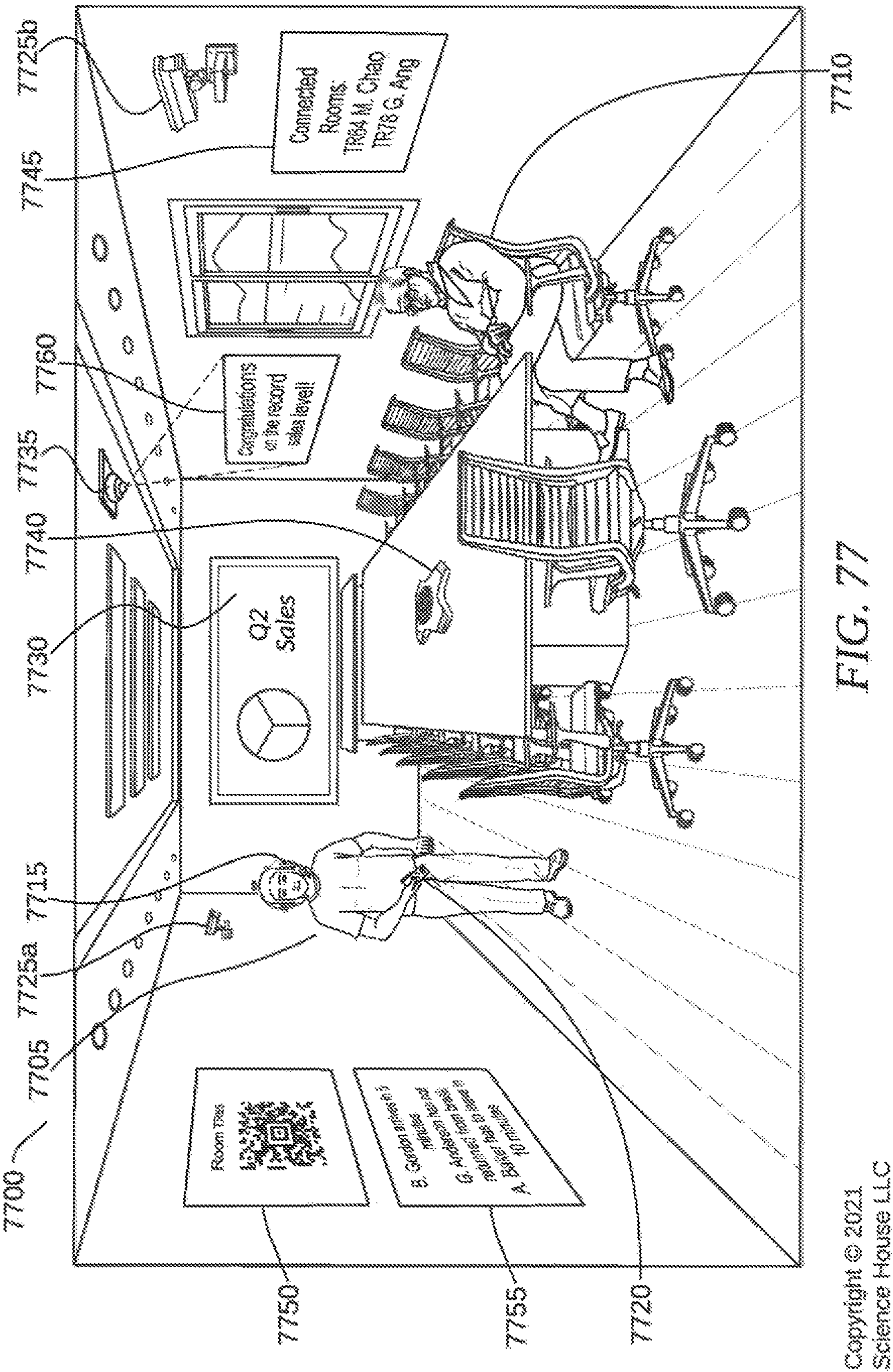
FIG. 77 is a conference room consistent with at least some embodiments described herein.

With reference to FIG. 77, a conference room 7700 is depicted in accordance with various embodiments. While conference room 7700 depicts an exemplary environment and arrangement of objects, devices, etc., various embodiments are applicable in any suitable environment and/or with any suitable arrangement of objects, devices, etc.

Presenter 7705 has a headset 7715 and/or presentation remote device 7720 that may be used to control the main presentation 7730 (e.g., PowerPoint® slides) as well as one or more other devices, and which may have one or more other functions.

Attendee 7710 is physically present in room 7700, e.g., to view the presentation. Other attendees may be participating from other rooms (e.g., overflow rooms) as indicated at sign 7745, which shows which other rooms are "connected".

Cameras **7725*a* and 7725*b*** may track one or more events during the meeting and/or take actions based on such events. Cameras may track attendee attentiveness, engagement, whether or not the meeting stays on track, etc. Cameras may track any other events.

Projector 7735 may output a timely message, such as a "Congratulations on the record sales level!" message 7760 to a meeting attendee who, e.g., has just set a sales record.

Conference phone 7740 (e.g., a Polycom®) may allow in-person attendees to communicate with remote attendees or others.

Physical sign 7750 with 2D barcode may allow a user to scan the barcode and obtain relevant information. In various embodiments, headset 7715 or presentation remote device 7720 acts as a barcode scanner. In various embodiments, a user may scan the barcode to obtain or load the presentation (e.g., the presentation for the current meeting), to get a list of meeting attendees, to get the room schedule (e.g., schedule of meetings), and/or for any other purpose.

Display screen 7755 may include messages and/or information pertinent to the meeting (e.g., logistics, attendee whereabouts, attendee schedules, location of meetings taking place during or after the current meeting, aggregated tag information), and/or any other information.

Gestures and Custom Gestures

Figure 78:
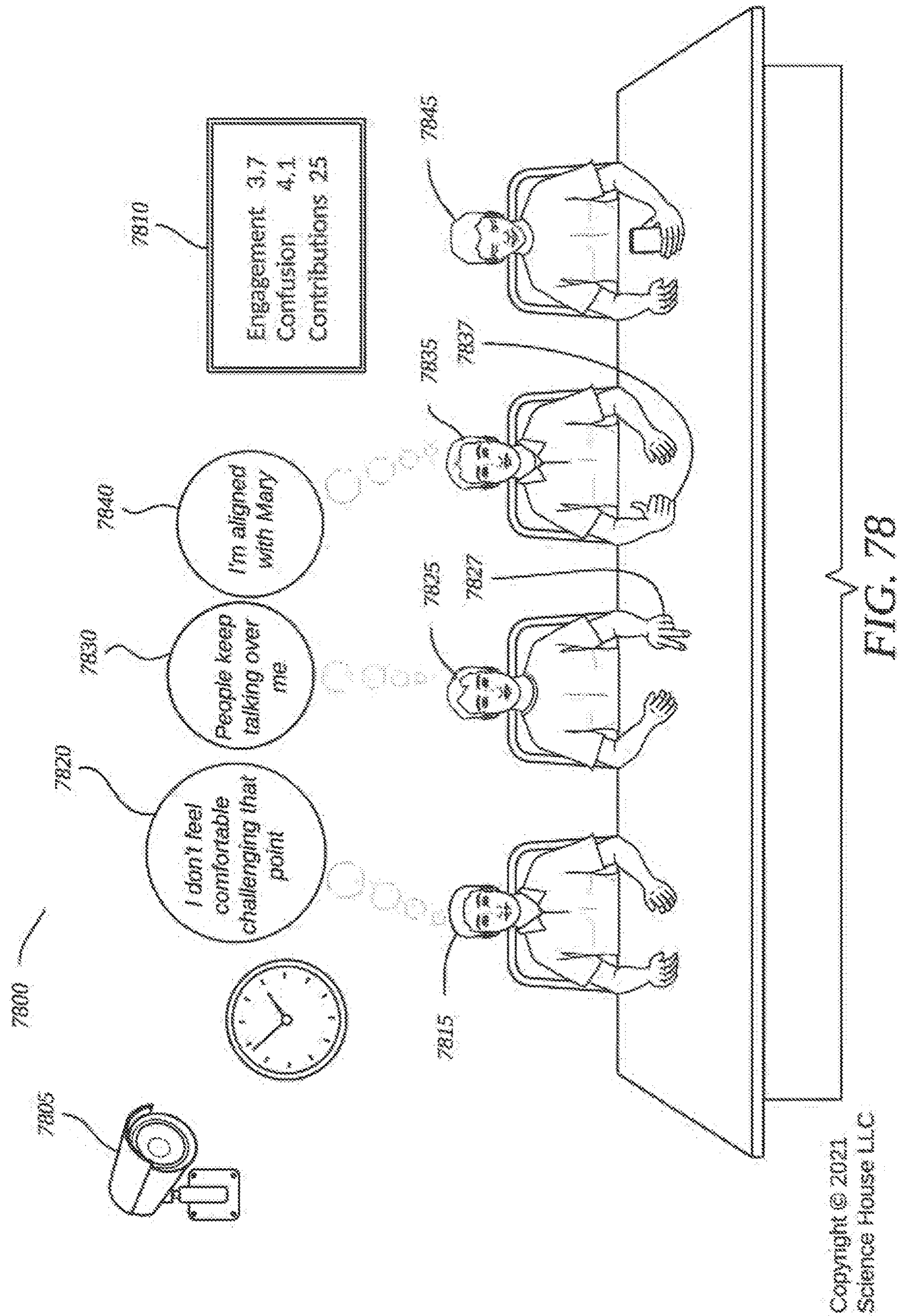
FIG. 78 is a conference room consistent with at least some embodiments described herein.

With reference to FIG. 78, a conference room 7800 is depicted in accordance with various embodiments. Conference room 7800 may include one or more users (e.g., meeting participants), objects, devices, sensors, fixtures, items of furniture, etc. While room 7800 depicts an exemplary environment and arrangement of users, objects, devices, etc., various embodiments are applicable in any suitable room or environment and/or with any suitable arrangement of objects, devices, etc.

As depicted, conference room 7800 includes four participants in a meeting (e.g., participants 7815, 7825, 7835, and 7845). Each participant is engaged in a thought process or other activity. In various embodiments, more or fewer participants may be present.

As may happen during a meeting, some participants may have unvoiced thoughts or opinions regarding the meeting. In various embodiments, it may be beneficial (e.g., to the function of the meeting; e.g., to the outcome of the meeting) that unvoiced thoughts be communicated in some fashion.

As depicted, participant 7815 is thinking, "I don't feel comfortable challenging that point" (7820) (e.g., challenging some recent point that was made during the meeting). Perhaps the point truly is not valid, and the failure of participant 7815 to challenge the point may lead to a poor decision or other meeting outcome.

As depicted, participant 7825 is thinking, "People keep talking over me" (7830). Perhaps participant 7825 has an important contribution to make, and his inability to obtain a speaking slot may also lead to a poor decision or other meeting outcome.

As depicted, participant 7835 is thinking, "I'm aligned with Mary" (7840). For example, participant 7835 may agree with Mary (another participant) on some issue. Perhaps if the alignment of participant 7835 with Mary was known, the issue could be brought to a quicker resolution, Mary would have the critical backing she needs to advance her side of the issue, etc.

As depicted, participant 7845 may be engaged in another activity (e.g., shopping) and not paying attention to the meeting. However, in various embodiments, participant 7845 may be answering a survey, submitting a tag, or otherwise engaging in an activity related to the meeting.

In various embodiments, participants in conference room 7800 may communicate or apply their unvoiced thoughts as tags. In various embodiments, participants in a meeting may make any other suitable communication in the form of a tag.

In various embodiments, a participant may indicate a tag (e.g., that they are assigning a tag), using a gesture. A gesture may indicate the type of tag, the degree or level of a tag, the assignee of a tag, the object of a tag, and/or any other pertinent information. In various embodiments, a gesture is made in public view, e.g., so the gesture can be picked up by a camera and interpreted (e.g., by central controller 110). As a consequence, the gesture may be visible to others. A participant may not want others to understand his gesture because, for example, the gesture may represent negative feedback. As such, in various embodiments, a participant may assign custom meanings to gestures and/or create custom gestures. In this way, another participant will not necessarily be able to understand the gesture.

In various embodiments, prior to a meeting, a user may interact with a program or app for assigning custom meanings to gestures. The custom meanings may be stored in association with the user and the gesture. When a camera (e.g., camera 7805) subsequently detects the gesture, the camera may identify the user, and look up the associated meaning of the gesture for the identified user.

Example gestures may include pointing two fingers down to the table (e.g., gesture 7827), pointing the thumb in the air (e.g., gesture 7837), spreading apart the ring and middle fingers, etc.

In various embodiments, a participant's thoughts or actions may be determined (e.g., determined automatically) even in the absence of an explicit gesture by the participant. For example, camera 7805 may detect that participant 7845 is looking down at his phone, and may thereby determine that participant 7845 is not thinking about the meeting at all.

In various embodiments, display 7810 may indicate statistics about an ongoing meeting. These may describe meeting engagement, a level of confusion among participants, a number of contributions made by participants and/or any other meeting statistics. In various embodiments, displayed statistics may represent an aggregation (e.g., sum, average, summary, etc.) of tags submitted by users, user actions, etc. Where statistics are displayed in the aggregate, individual instances of tagging by a participant need not reveal the identity of the participant. This may, for example, increase the comfort level of a participant in applying a tag (e.g., using a gesture).

Process Steps According to Some Embodiments

Turning now to FIG. 79, illustrated therein is an example process 7900 for conducting a meeting, which is now described according to some embodiments. In some embodiments, the process 7900 may be performed and/or implemented by and/or otherwise associated with one or more specialized and/or specially-programmed computers (e.g., the processor 605 of FIG. 6). It should be noted, with respect to process 7900 and all other processes described herein, that not all steps described with respect to the process are necessary in all embodiments, that the steps may be performed in a different order in some embodiments and that additional or substitute steps may be utilized in some embodiments.

Process Steps According to Some Embodiments

Turning now to FIG. 79, illustrated therein is an example process 7900 for conducting a meeting, which is now described according to some embodiments. In some embodiments, the process 7900 may be performed and/or implemented by and/or otherwise associated with one or more specialized and/or specially-programmed computers (e.g., the processor 605 of FIG. 6). It should be noted, with respect to process 7900 and all other processes described herein, that not all steps described with respect to the process are necessary in all embodiments, that the steps may be performed in a different order in some embodiments and that additional or substitute steps may be utilized in some embodiments.

Registering/Applying for a Meeting

At step 7903, a user may set up a meeting, according to some embodiments.

In setting up a meeting, the meeting owner might have to register the meeting or apply for the meeting with the central controller 110. This can provide a gating element which requires meeting owners to provide key information prior to the meeting being set up so that standards can be applied. For example, a meeting purpose might be required before having the ability to send out meeting invitations.

In various embodiments, the meeting owner (or meeting admin) could be required to apply to the central controller 110 to get approval for setting up a meeting. Without the approval, the central controller could prevent meeting invites from being sent out, not allocate a room for the meeting, not allow the meeting to be displayed on a calendar, etc. This process could be thought of as applying for a meeting license. To get a meeting license, the meeting might have to include one or more of the following: a purpose, an agenda, a designated meeting owner, a digital copy of all information being presented, an identification of the meeting type, an objective, a definition of success, one or more required attendees, evidence that the presentation has already been rehearsed, etc. Permitting may require meeting owner to apply a predefined number of points from a meeting point bank—e.g., different amounts of meeting points can be allocated to different employees, roles, expertise, levels once per given time period, with higher levels (e.g., VPs) being allocated more points (and accordingly being able to hold more meetings or meetings with more/higher 'value' attendees). Meeting points could also be earned, won, etc.

In various embodiments, the central controller 110 could also review the requested number of people in a meeting and compare that to the size of rooms available for that time slot. If a large enough room is not available, the central controller could make a recommendation to break the meeting into two separate groups to accommodate the available meeting size.

In various embodiments, the central controller could have a maximum budget for the meeting and determine an estimated cost of a requested meeting by using a calculation of the dollar cost per person invited per hour (obtained from HR salary data stored at the central controller or retrieved from HR data storage) multiplied by the number of people invited and multiplied by the length of the meeting in hours (including transportation time if appropriate). Such an embodiment would make the cost of meetings more immediately apparent to meeting organizers, and would impose greater fiscal responsibility in order to reduce the number of meetings that quickly grow in the number of attendees as interested—though perhaps not necessary—people join the meeting. In this embodiment, a meeting owner might be able to get budget approval for a meeting with ten participants and get that meeting on the calendar, but have requests for additional attendees approved only as long as the meeting budget is not exceeded. In various embodiments, the central controller could deny a meeting based on the projected costs, but offer to send an override request to the CEO with the meeting purpose to give the CEO a chance to allow the meeting because the achievement of that purpose would be so impactful in generating business value and shareholder value. Further, the central controller could allocate meeting costs to various departments by determining the cost for each attendee based on the time attended in the meeting.

In various embodiments, requesting a meeting could also require registering any projects(s) that the meeting is associated with. For example, a decision-making meeting might register one or more previously held brainstorming sessions which generated ideas that would serve as good fuel for the decision making session. Additionally, the meeting owner might be required to register any other meetings that will be held in the future that will be related to this meeting.

In various embodiments, meeting requests could require the meeting owner to tag elements associated with the meeting. For example, the meeting could be tagged with "Project X" if that is the main topic of the meeting. It might also be tagged with "Budget Decision" if the output will include a budget allocation amount. Another type of required tag could relate to whether or not legal representation is required at the meeting.

In various embodiments, when a meeting is requested, the meeting owner could be provided with meeting content/format/tips related to the type of meeting that they are trying to set up.

At step 7906, a user may determine meeting parameters, according to some embodiments.

Meeting Configurations

The central controller 110 may offer a number of standard configurations of equipment and software that will make it easier to configure a room.

In various embodiments, a meeting participant or meeting owner can set standard virtual meeting configurations. For example, there could be three standard packages available. Configuration #1 may include microphone type, camera to be used, volume levels, screens to be shared, multiple screen devices and background scenes to be used. Configuration #2 may include only audio/phone usage. Configuration #3 may include any combination of recognized devices to be used. Once settings are established, they may be controlled by voice activation or selection on any mobile or connected device.

In various embodiments, meeting owners can provide delegates with access to meeting set-up types (e.g. admins).

In various embodiments, a meeting owner assigns participants to meeting room chairs (e.g. intelligent and/or non-intelligent chairs). Intelligent chairs can pre-set the chair configuration based on the person sitting in the chair (height, lumbar, temperature).

In various embodiments, the central controller 110 automatically determines a more appropriate meeting place based on the meeting acceptance (in-person or virtual) to make the most efficient use of the asset (room size, participant role/title and equipment needed to satisfy the meeting purpose).

In various embodiments, a meeting presenter can practice in advance and the central controller 110 uses historical data to rate a presentation and the presenter in advance.

Meeting Right-Sizing

Many large companies experience meetings that start out fairly small and manageable, but then rapidly grow in size as people jump in—sometimes without even knowing the purpose of the meeting. Many employees are not familiar with how large meetings should be, and that the size of the meeting might need to vary significantly based on the type of meeting. For example, a decision-making meeting may work best with a small number of attendees.

Agenda

In various embodiments, the central controller 110 could understand the appropriate number of agenda topics for a meeting type and recommend adjustments to the agenda. For example, in a decision-making meeting, if the agenda includes a significant number of topics for a one-hour meeting, the central controller could suggest removing some of the decisions needed and moving them to a new meeting.

Participants

In various embodiments, the central controller 110 could recommend a range for the number of meeting invitees based upon the meeting type, agenda, and purpose. If a meeting owner exceeds the suggested number of invitees, the central controller can prompt the meeting owner to reduce the number of invitees, or to tell some or all of the invitees that their presence is optional.

Dynamic Right-Sizing During Meetings

Based upon the agenda, the central controller 110 can allow virtual participants to leave the meeting after portions of the meeting relevant to them have finished. A scrolling timeline GUI could be displayed, showing different portions of a meeting as the meeting progresses; e.g., with icons/avatars for attendees currently in, previously in, or expected to join for different sections/portions. Additionally, the central controller can identify portions of the meeting that contain confidential information and pause the participation of individuals without the appropriate permission to view that information.

Recurring Meetings

In various embodiments, the central controller 110 can prompt owners of recurring meetings to adjust the frequency or duration of meetings to right-size meetings over time. The central controller can also prompt owners of recurring meetings to explore whether invitees should still be participating as time goes on. The central controller can auto select time slots based on attendee list calendars, preferences, and/or historical data—such as higher measured level of attentiveness/interaction for one or more attendees at different times of day, days of week, etc.

Room Availability

Based upon the availability of larger meeting rooms, the central controller may prompt a meeting owner to reduce the number of participants or break the meeting into smaller meetings. Meetings that require more people than a room can accommodate, the central controller could recommend which participants should be present in the meeting room and those that should be virtual only. For example, if a decision-making meeting is taking place and three decision makers are key to achieving the goals, they should be identified as being required to be physically present in the meeting room. The other participants may only be invited to attend virtually.

Learning Algorithm

Over time, the central controller 110 may begin to collect information regarding the meeting type, agenda items, duration, number of participants, occurrences, time of day, logistics (e.g. building location, time zones, travel requirements, weather), health of employees (e.g. mental and physical fitness—for example the central controller could recommend smaller meetings during the peak of flu season) and meeting results to provide more informed right-sizing recommendations. In other words, an Artificial Intelligence (AI) module may be trained utilizing a set of attendee data from historical meetings to predict expected metrics for upcoming meetings and suggest meeting characteristics that maximize desired metrics.

Meeting Participant Recommendations

At step 7909, the central controller 110 may suggest attendees, according to some embodiments.

The central controller could take the agenda and purpose of the meeting and identify appropriate candidate meeting participants who could build toward those goals. In various embodiments, the central controller may take any other aspect of a meeting into account when suggesting or inviting attendees.

In various embodiments, given a meeting type (e.g., innovation, commitment, alignment, learning), the central controller may determine a good or suitable person for this type of meeting. In various embodiments, the central controller may refer to Meetings table 5100, which may store information about prior meetings, to find one or more meetings of a similar type to the meeting under consideration (or to find one or more meetings sharing any other feature in common with the meeting under consideration). In various embodiments, the central controller may refer to Meeting Participation/Attendance/Ratings table 5500 to determine a given employee's rating (e.g., as rated by others) for prior meetings.

In various embodiments, the central controller may refer to Employees table 5000 to find employees with particular subject matter expertise, to find employees at a particular level, and/or to find employees with particular personalities. Thus, for example, an employee can be matched to the level of the meeting (e.g., only an executive level employee will be invited to an executive level meeting). An individual contributor level meeting may, on the other hand, admit a broader swath of employees.

In various embodiments, if the meeting is about Project X then the central controller could recommend someone who has extensive experience with Project X to attend the meeting. The central controller may refer to meetings table 5100 (field 5128) to find the project to which a meeting relates. The central controller may recommend attendees who had attended other meetings related to Project X. The central controller may also refer to project personnel table 5800 to find and recommend employees associated with Project X.

The meeting owner, prior to setting up the meeting, could be required to identify one or more functional areas that will be critical to making the meeting a success, preferably tagging the meeting with those functional areas.

In various embodiments, the central controller 110 recommends meeting invites based on the ratings of the individuals to be invited (e.g., as indicated in Meeting Participation/Attendance/Ratings table 5500). For example, if this is an innovation meeting, the central controller can recommend participants that were given a high rating on innovation for the functional area they represent. In various embodiments, the central controller may find individuals or meeting owners with high engagement scores (e.g., as indicated in Meeting Engagement table 5300) involved in innovation, commitment, learning, or alignment meetings based on the relevant meeting tags (e.g., as indicated in Meetings table 5100, at field 5108).

In various embodiments, the central controller may find individuals named as inventors on patent applications and/or applications in different classifications, fields, technology areas that may be applicable to the meeting/project.

In various embodiments, the meeting owner in a meeting could request that the central controller 110 open up a video call with an employee who is going to be handed a baton as a result of the meeting discussions.

Cognitive Diversity

Having a diverse group of meeting participants can lead to better meeting outcomes, but it can be difficult to identify the right people to represent the right type of diversity. Employees can have a variety of backgrounds, experiences, personality types, and ways of thinking (cognitive types). These frameworks shape how individuals participate in meetings and interact with other members of the meeting. In various embodiments, the central controller 110 could improve meeting staffing by identifying employees' cognitive frameworks, suggesting appropriate mixes of these cognitive frameworks.

Identifying Cognitive Types

The central controller could identify employees' cognitive type through employee self-assessments, cognitive assessments or personality inventories (e.g., MMPI, 'big 5,' MBTI) conducted during hiring processes, or inductively through a learning algorithm of meeting data.

High Performance Meetings

Over time, the central controller 110 could learn which combinations of cognitive types are likely to perform better together in different types of meetings. High performance meetings can be assessed by measurements such as post-meeting participant ratings, by meeting engagement data, or by meeting asset generation. For example, the central controller could learn over time that innovation meetings produce ideas when individuals with certain cognitive types are included in the meeting.

Suggesting Invitees to Create Diversity

The central controller 110 could flag meetings with homogenous cognitive types and suggest additional meeting invitees to meeting owners to create cognitive diversity. Individual employees vary in their risk tolerance, numeracy, communication fluency, and other forms of cognitive biases. Meetings sometimes suffer from too many individuals of one type or not enough individuals of another type. The central controller can suggest to meeting owners that individuals be invited to a meeting to help balance cognitive types. For example, a decision-making meeting may include too few or too many risk tolerant employees. The central controller can prompt the meeting owner to increase or decrease risk aversion by inviting additional employees.

Optimization

At step 7912, the central controller 110 may optimize use of resources, according to some embodiments.

In order to maximize the business value from meetings, the central controller 110 can create optimal allocations of people, rooms, and technology in order to maximize enterprise business value. The central controller could have information stored including the goals of the enterprise, a division, a team, or a particular initiative. For example, if two teams requested the same room for an afternoon meeting, the team working on a higher valued project could be allocated that room.

In various embodiments, the central controller can balance requests and preferences to optimize the allocation of meeting rooms and meeting participants/owners.

In various embodiments, the central controller could allocate meeting participants to particular meetings based on the skill set of the meeting participant.

In the case of a meeting participant being booked for multiple meetings at the same time, the central controller could provide the meeting participant with the meeting priority. For example, a subject matter expert is invited to three meetings at the same time. Based on the enterprise goals and priorities, the central controller could inform the subject matter expert which meeting is the highest priority for attendance.

In the case of multiple key meeting participants being asked to attend multiple meetings at the same time, the central controller 110 could optimize participants so all meetings are covered. For example, five subject matter experts are invited to three meetings taking place at the same time. The central controller could inform the subject matter experts which meeting they should attend so all three meetings have at least one subject matter expert.

At step 7915, the central controller 110 may send meeting invitations, according to some embodiments. Meeting invites may be sent to an employee's email address or to some other contact address of an employee (e.g., as stored in table 5000). In various embodiments, meeting invites may be sent to peripheral devices (e.g. headset, mouse, presentation remote) and/or user devices (e.g. laptop computer, smartphone).

Automatic Meeting Scheduling

The central controller 110 could trigger the scheduling of a meeting if a condition is met based upon data from an external source. The central controller could suggest meeting invitees relevant to the event. For example, an extreme event such as an increase in service tickets or the forecast of a hurricane could trigger the scheduling of a meeting.

At step 7918, the central controller 110 may ensure proper pre-work/assets are generated (e.g., agenda, background reading materials), according to some embodiments.

Locking Functionality

In various embodiments, one or more privileges, access privileges, abilities, or the like may be withheld, blocked or otherwise made unavailable to an employee (e.g., a meeting owner, a meeting attendee). The blocking or withholding of a privilege may serve the purpose of encouraging some action or behavior on the part of the employee, after which the employee would regain the privilege. For example, a meeting organizer is locked out of a conference room until the meeting organizer provides a satisfactory agenda for the meeting. This may encourage the organizer to put more thought into the planning of his meeting.

In various embodiments, locking may entail: Locking access to the room; Preventing a meeting from showing up on a calendar; Video meeting software applications could be prevented from launching.

In various embodiments, locking may occur until a meeting purpose is provided. In various embodiments, locking may occur until a decision is made. In various embodiments, locking may occur if the meeting contains confidential information and individuals without clearance are invited or in attendance. In various embodiments, locking may occur if the meeting tag (e.g. identifying strategy, feature, commitment) is no longer valid. For example, a tag of 'Project X' might result in a lockout if that project has already been cancelled.

In various embodiments, locking may occur until the description of the asset generated is provided. In some embodiments, locking may occur if the budget established by Finance for a project or overall meetings is exceeded.

In various embodiments, a meeting owner and/or participants could be provided with a code that unlocks something.

In various embodiments, different meeting locations can be locked down (prevented from use) based on environmental considerations such as outside temperature (e.g., it is too costly to cool a particular room during the summer, so don't let it be booked when the temperature is too high) and/or all physical meeting rooms (or based on room size threshold) may be locked down based on communicable disease statistics such as a high rate of seasonal flu.

In various embodiments, during flu season, the central controller could direct a camera to determine the distances between meeting participants, and provide a warning (or end the meeting) if the distance was not conforming to social distancing protocols stored at the central controller.

At step 7921, the central controller 110 may remind a user of a meeting's impending start, according to some embodiments.

In various embodiments, a peripheral associated with a user may display information about an upcoming meeting. Such information may include: a time until meeting start; a meeting location; an expected travel time required to reach the meeting; weather to expect on the way to a meeting (e.g. from weather table 7600); something that must be brought to a meeting (e.g., a worksheet); something that should be brought to a meeting (e.g., an umbrella); or any other information about an upcoming meeting. In various embodiments, a peripheral may remind a user about an upcoming meeting in other ways, such as by providing an audio reminder, by vibrating, by changing its own functionality (e.g., a mouse pointer may temporarily move more slowly to remind a user that a meeting is coming up), or in any other fashion.

In various embodiments, the central controller may send a reminder to a user on a user's personal device (e.g., phone, smart watch). The central controller may text, send a voice message, or contact the user in any other fashion.

In various embodiments, the central controller 110 may remind the user to perform some other task or errand on the way to the meeting, or on the way back from the meeting. For example, the central controller may remind the user to stop by Frank's office on the way to a meeting in order to get a quick update on Frank's latest project.

At step 7924, the central controller 110 may track users coming to the meeting, according to some embodiments.

On the Way to a Meeting

Meetings are often delayed when one or more participants do not reach the meeting room by the designated start time, and this can cause frustration. In some cases, meeting information must be repeated when others arrive late.

Estimating Time of Arrival

The central controller 110 could estimate the time of arrival for participants from global positioning data and/or Bluetooth® location beacons and/or other forms of indoor positioning systems. The central controller could display these times of arrival to the meeting owner on display 4246 of presentation remote 4200, display them on a display of the meeting room, project them on a wall of the meeting room with a camera, etc.

Finding the Meeting

The central controller could provide meeting attendees with a building map indicating the location of the meeting room and walking directions to the room based upon Bluetooth® beacons or other indoor positioning systems. The central controller could also assist meeting participants in finding nearby bathroom locations or the locations of water fountains, vending machines, coffee machines, employee offices, copiers, chairs, security, etc.

Late Important Participants

The central controller could prompt the meeting owner to delay the start of the meeting if key members of the meeting are running late.

Late Participants Messaging

Late participants could record a short video or text message that goes to the meeting owner (e.g. 'I'm getting coffee/tea now', 'I ran into someone in the hallway and will be delayed by five minutes', 'I will not be able to attend', 'I will now attend virtually instead of physically').

Catching Up Late Arrivals

The central controller 110 could send to late arrivals a transcript or portions of a presentation that they missed, via their phones, laptops, or other connected devices.

Pre-Meeting Evaluation

At step 7927, the central controller 110 may send out pre-meeting evaluation, according to some embodiments.

Meeting agendas and presentations are often planned far in advance of the meeting itself. Providing meeting owners with information collected from attendees in advance of the meeting allows meeting owners and presenters flexibility to tailor the meeting to changing circumstances.

Pre-Meeting Status Update

The central controller could elicit responses from attendees prior to the meeting by sending a poll or other form of text, asking how the attendees feel prior to the meeting. Exemplary responses may include: 'Excited!'; 'Dreading it'; 'Apathetic'; 'Sick'; a choice from among emojis.

At step 7930, the central controller 110 may set the room/meeting environment based on the evaluation, according to some embodiments.

Dynamic Response

Based upon these responses, the central controller can alter the physical environment of the room, order different food and beverage items, and alert the meeting owner (e.g. via presentation remote 4200) about the status of attendees. The room can use this information, for example, to decide whether to: Request responses from participants; Order snacks/candy; Play more soothing music; Reduce/increase the number of slides; Change the scheduled duration of the meeting; Set chairs to massage mode; Turn the lights down/up; or to make any other decision.

Based on the type of meeting, agenda and the responses sent to the meeting organizer, the central controller 110 can provide coaching or performance tips to individual participants, via text or video or any other medium. For example, if there is an innovation meeting where the meeting participant is dreading the meeting, the central controller may text the individual to take deep breaths, think with an open mind, and not be judgmental. If there is a learning meeting where the meeting participant is excited, the central controller may advise the individual to use the opportunity to ask more questions for learning and share their energy.

In various embodiments, there may be attendee-specific rewards for attending, achieving and/or meeting goals. Rewards may be allocated/awarded by the meeting organizer and/or system.

At step 7933, the central controller 110 may start the meeting, according to some embodiments. Users may then join the meeting, according to some embodiments.

During the Meeting

Continuing with step 7933, the central controller manages the flow of the meeting, according to some embodiments.

Textual Feedback (Teleprompter)

In various embodiments, a presenter may receive feedback, such as from central controller 110. Feedback may be provided before a meeting (e.g., during a practice presentation), during a meeting, and/or after a meeting. In some embodiments, presenter feedback is provided via display 4246 of presentation remote 4200.

Presenters will sometimes use devices such as teleprompters to help them to remember the concepts that they are trying to get across. In various embodiments, a teleprompter may show textual feedback to a presenter. Feedback may specify, for example, if the presenter is speaking in a monotone, if the presenter is speaking too fast, if the presenter is not pausing, or any other feedback. In some embodiments, the teleprompter is under the control of presentation remote 4200, or the textual information may be displayed to the presenter on display 4146 (or speaker 4110) of presentation remote 4200.

In various embodiments, a teleprompter may act in a 'smart' fashion and adapt to the circumstances of a presentation or meeting. In various embodiments, some items are removed from the agenda if the meeting is running long. In various embodiments, the teleprompter provides recommendations for changes in the speed/cadence of the presentation.

In various embodiments, a presenter may receive feedback from a wearable device. For example, a presenter's watch may vibrate if the presenter is speaking too quickly.

Request an Extension

In various embodiments, a meeting owner or other attendee or other party may desire to extend the duration of a meeting. The requester may be asked to provide a reason for the extension. The requester may be provided with a list of possible reasons to select from.

In various embodiments, a VIP meeting owner gets precedence (e.g., gets access to a conference room, even if this would conflict with another meeting set to occur in that conference room).

In various embodiments, if a project is of high importance, the central controller may be more likely to grant the request.

In various embodiments, a request may be granted, but the meeting may be moved to another room. In various embodiments, a request may be granted, and the next meeting scheduled for the current room may be moved to another room.

Deadline and Timeline Indications

Companies often impose deadlines for actions taken to complete work. In the context of meetings, those deadlines can take a number of forms and can have a number of implications.

In various embodiments, there could be deadlines associated with actions for a particular meeting, like the need to get through an agenda by a certain time, or a goal of making three decisions before the end of the meeting. Based upon the meeting agenda, the central controller 110 can prompt the meeting owner if the current pace will result in the meeting failing to achieve its agenda items or achieve a particular objective. If meeting participants do not achieve an objective in the time allotted, the central controller could: end the meeting; end all instances of this meeting; move participants to a 'lesser room'; shorten (or lengthen) the time allocated to the meeting; require the meeting owner to reapply for additional meeting time; restrict the meeting owner from reapplying for additional time or from scheduling meetings without prior approval; etc.

Room Engagement Biometric Measurements

At step 7936, the central controller 110 tracks engagement, according to some embodiments.

In various embodiments, one or more of the following signs, signals, or behaviors may be tracked: Eye tracking; Yawning; Screen time/distraction; Posture; Rolling eyes; Facial expression; Heart rate; Breathing Rate; Number of overlapping voices; Galvanic skin response; Sweat or metabolite response; Participation rates by individuals.

In various embodiments, the central controller 110 may take one or more actions to encourage increased participation. For example, if Eric has not said anything, the central controller may ping him with a reminder or have him type an idea to be displayed to the room.

In various embodiments, there may be a range of 'ping styles' based on the MBTI of a participant, based on such aspects of personality as introversion/extroversion levels, or based on other personality characteristics. In various embodiments, a participant may choose their preferred ping style.

In various embodiments, one or more devices or technologies (e.g. peripheral devices and/or user devices) may be used to track behaviors and/or to encourage behavioral modification.

In various embodiments, a mobile phone or wearable device (watch) is used for collection of biometric feedback during the meeting to the central controller and for meeting owner awareness. Real-time information may include heart rate, breathing rate, and blood pressure. Analysis of data from all attendees alerts the meeting owner for appropriate action. This analysis may include: tension (resulting from higher heart and breathing rates), boredom from lowering heart rates during the meeting, and overall engagement with a combination of increased rates within limits.

In various embodiments, there exist wireless headsets 4000 with accelerometers 4070*a* and 4070*b* that detect head movement for communicating to central controller 110 and meeting owner. Downward movement includes boredom and lack of engagement. Nodding up and down can indicate voting/agreement by participants. Custom analytics of head movements may be based on attendee—for example, cultural differences in head movements may be auto-translated into expressive chat text, status, metrics, etc.

In various embodiments, virtual meetings display meeting participants in the configuration of the room for a more true representation of being in the room. For example, if the meeting is taking place in a horseshoe room known by the central controller 110, the video of each person in each chair around the table could be displayed. This may provide advantages over conventional views where you get a single view of a table. This can create a more engaged virtual participant.

Various embodiments may include custom or even fanciful virtual room configurations and/or locations.

Individual Performance Indicators

At step 7939, the central controller 110 tracks contributions to a meeting, according to some embodiments.

In various embodiments, the central controller could measure the voice volume of individual speakers and/or speaking time to coach individuals via prompts, such as sending a message to a speaker to tone it down a bit or to let others speak. The central controller could analyze speech patterns to tell individuals whether they are lucid or coherent and inform speakers whether they are not quite as coherent as usual.

At step 7942, the central controller 110 manages room devices, according to some embodiments. This may include air conditioners, lights, microphones, cameras, display screens, motion sensors, video players, projectors, and/or any other devices.

At step 7945, the central controller 110 alters a room to increase productivity, according to some embodiments. Alterations may include alterations to room ambiance, such as lighting, background music, aromas, images showing on screens, images projected on walls, etc. In various embodiments, alterations may include bringing something new into the room, such as refreshments, balloons, flowers, etc. In various embodiments, the central controller may make any other suitable alterations to a room.

Color Management

Color can be used for many purposes in improving meeting performance. In various embodiments, colors can be used to identify meeting types (e.g. a learning meeting could be identified as yellow, an innovation meeting could be identified as orange) and/or highlight culture (e.g., to proudly display company colors, show support for a group/cause).

In some embodiments, central controller 110 could use various inputs to determine whether or not the participants are aligned, and then color the room green, for example, if there is good perceived alignment based on non-verbal signals such as crossed arms, eye rolling, nodding/head shaking, people leaning toward or away from other participants, people getting out of their chairs, people pushing themselves away from the table, people pounding their fists on a table, etc. In some embodiments, room colors could be set to reflect the mood/morale of people in the room, or reflect confusion (e.g. a red color to indicate that there is a problem).

In some embodiments, when the meeting is going off topic the location controller 8305 could send a signal to lights in the room to cast a red light in the room as a reminder to participants that time may be being wasted. An orange light could be used to indicate whether meeting participants are bored.

Dynamic and Personalized Aroma Therapy

The central controller 110 can both detect and output smells to meeting participants as a way to better manage meetings. The central controller could be in communication with a diffuser that alters the smell of a room.

In some embodiments, when a meeting participant brings food into the room, the central controller could detect the strength of the smell and send a signal to the meeting owner that they may want to remove the items because it could be a distraction.

In various embodiments, when the central controller receives an indication that a meeting is getting more tense, it could release smells that are known to calm people—and even personalize those smells based on the participant by releasing smells from their chair or from a headset. During innovation meetings, the central controller could release smells associated with particular memories or experiences to evoke particular emotions.

Food/Beverage Systems

Getting food delivered during a meeting can be a very tedious process. Tracking down the food selections of participants, getting order changes, tracking down people who never provided a food selection, or having to call in additional orders when unexpected participants are added to the meeting at the last minute.

Various embodiments provide for vendor selection. The central controller 110 can store a list of company approved food providers, such as a list of ten restaurants that are approved to deliver lunches. When a meeting owner sets up a meeting, they select one of these ten vendors to deliver lunch. The central controller can track preferred food/drink vendors with menu selections along with preferences of each participant. If the meeting owner wants to have food, they select the vendor and food is pre-ordered.

Various embodiments provide for default menu item selections. The central controller 110 can have default menu selection items that are pre-loaded from the preferred food/beverage vendors. The administrator uploads and maintains the menu items that are made available to the meeting participants when food/beverages are being supplied. When participants accept an in-person meeting where food is served from an authorized vendor, the participant is presented with the available menu items for selection and this information is saved by the central controller.

Various embodiments provide for participant menu preferences. The central controller maintains the menu preferences for each individual in the company for the approved food/beverage vendors. This can be based on previous orders from the vendor or pre-selected by each meeting participant or individual in the company. For example, a participant might indicate that their default order is the spinach salad with chicken from Restaurant 'A', but it is the grilled chicken sandwich with avocado for Restaurant 'B'. In that way, any meeting which has identified the caterer as Restaurant 'B' will create an order for the chicken sandwich with avocado for that participant unless the participant selects something else in advance.

Various embodiments provide for an ordering process. Once a meeting participant confirms attendance where food will be served, participants select their menu item or their default menu preference is used. The central controller aggregates the orders from all meeting attendees and places the order for delivery to the food vendor. A first participant confirms attendance to a meeting and is presented with the food vendor menu, they select an available option and the central controller saves the selection. A second participant confirms attendance to a meeting and is presented with the food vendor menu, but elects to use the default menu item previously saved. For those participants that did not select a menu item or have a previously saved preference for the vendor, the central controller will make an informed decision based on previous orders from other vendors. For example, 'always orders salads', 'is a vegetarian', or 'is lactose intolerant' as examples. At the appropriate time, based on lead times of the food vendor, the central controller places the order with the food vendor.

Various embodiments provide for default meeting type food/beverage selections. The central controller 110 could store defaults for some meeting types. For example, any meeting designated as an innovation meeting might have a default order of coffee and a plate of chocolate to keep the energy high. For learning meetings before 10 AM, the default might be fruit/bagels/coffee, while alignment meetings after 3 PM might always get light sandwiches and chips/pretzels.

At step 7948, side conversations happen via peripherals or other devices, according to some embodiments.

In various embodiments, it may be desirable to allow side conversations to occur during a meeting, such as in a technology-mediated fashion. With side conversations, employees may have the opportunity to clarify points of confusion, or take care of other urgent business without interrupting the meeting. In various embodiments, side conversations may be used to further the objectives of the meeting, such as to allow a subset of meeting participants to resolve a question that is holding up a meeting decision. In various embodiments, side conversations may allow an attendee to send words or symbols of encouragement to another attendee.

In various embodiments, side conversations may occur via messaging between peripherals (e.g., headsets, keyboards, mice) or other devices. For example, a first attendee may send a 'thumbs up' emoji to a second attendee, where the emoji appears on a display screen of the mouse of the second attendee. Where conversations happen non-verbally, such conversations may transpire without disturbing the main flow of the meeting, in various embodiments.

In various embodiments, the central controller 110 may create a whitelist of one or more people (e.g., of all attendees) in a meeting, and/or of one or more people in a particular breakout session. An employee's peripheral device may thereupon permit incoming messages from other peripheral devices belonging to the people on the whitelist. In various embodiments, the central controller 110 may permit communication between attendees' devices during certain times (e.g., during a breakout session, during a break), and may prevent such communication at other times (e.g. during the meeting).

In various embodiments, the central controller may store the content of a side conversation. In various embodiments, if there are questions or points of confusion evident from a side conversation, the central controller may bring these points to the attention of the meeting owner, a presenter (such as by sending a message to display 4246 of presentation remote 4200), or of any other party.

At step 7951, the central controller 110 manages breakout groups, according to some embodiments.

In various embodiments, a meeting may be divided into breakout groups. Breakout groups may allow more people to participate. Breakout groups may allow multiple questions or problems to be addressed in parallel. Breakout groups may allow people to get to know one another and a more close-knit environment. Breakout groups may serve any other purpose.

In various embodiments, the central controller 110 may determine the members of breakout groups. Breakout group membership may be determined randomly, in a manner that brings together people who do not often speak to each other, in a manner that creates an optimal mix of expertise in each group, in a manner that creates an optimal mix of personality in each group, or in any other fashion. In various embodiments, breakout groups may be predefined.

In various embodiments, an employee's peripheral device, or any other device, may inform the employee as to which breakout group the employee has been assigned to. In various embodiments, a breakout group may be associated with a color, and an employee's peripheral device may assume or otherwise output the color in order to communicate to the employee his breakout group.

In various embodiments, a peripheral device may indicate to an employee how much time remains in the breakout session, and/or that the breakout session has ended.

In various embodiments, communications to employees during breakout sessions may occur in any fashion, such as via loudspeaker, in-room signage, text messaging, or via any other fashion.

Voting, Consensus and Decision Rules

At step 7954, decisions are made, according to some embodiments.

During meetings, participants often use rules, such as voting or consensus-taking, to make decisions, change the agenda of meetings, or end meetings. These processes are often conducted informally and are not recorded for review. The central controller 110 could facilitate voting, evaluating opinions, or forming a consensus.

The central controller 110 may allow the meeting owner to create a rule for decision making, such as majority vote, poll or consensus, and determining which meeting participants are allowed to vote.

The central controller may allow the votes of some participants to be weighted more/less heavily than others. This could reflect their seniority at the company, or a level of technical expertise, domain expertise, functional expertise, or a level of knowledge such as having decades of experience working at the company and understanding the underlying business at a deep level.

The central controller may share a poll with meeting participants, and may display the aggregated anonymized opinion of participants on decision or topic.

In some embodiments, the central controller may display the individual opinion of participants on a decision or topic. Such opinions might include a rationale for a vote either through preconfigured answers or open-ended responses. The central controller 110 may display a summary of rationales. For example, the central controller could identify through text analysis the top three factors that were cited by those voting in favor.

In various embodiments, the central controller may use a decision rule to change, add or alter the agenda, purpose or deliverable of the meeting. The central controller may facilitate voting to end the meeting or extend the time of the meeting.

In some embodiments, the central controller may record votes and polls to allow review, and transmit the results to a user (e.g. via a presentation remote 4200). The central controller may determine over time which employees have a track record of success/accuracy in voting in polls or who votes for decisions that result in good outcomes through an artificial intelligence module. The central controller may allow for dynamic decision rules which weight participants' votes based upon prior performance as determined by an artificial intelligence module.

In some embodiments, the meeting owner could add a tag to a presentation slide which would trigger the central controller to initiate a voting protocol while that slide was presented to the meeting participants.

In various embodiments, votes are mediated by peripherals. Meeting attendees may vote on a decision using peripherals. For example, a screen on a mouse could display a question that is up for a vote. An attendee can then click the left mouse button to vote yes, and the right mouse button to vote no. Results and decisions may also be shown on peripherals. For example, after a user has cast her vote, a screen in the meeting room shows the number of attendees voting yes and the number of attendees voting no.

At step 7957, the central controller 110 tracks assets, according to some embodiments.

In various embodiments, the central controller 110 solicits, tracks, stores, and/or manages assets associated with meetings. Assets may be stored in a table such as table 6000.

The central controller 110 may maintain a set of rules or logic detailing which assets are normally associated with which meetings and/or with which types of meetings. For example, a rule may specify that a list of ideas is one asset that is generated from an innovation meeting. Another rule may specify that a list of decisions is an asset of a decision meeting. Another rule may specify that a presentation deck is an asset of a learning meeting. In some embodiments, if the central controller does not receive one or more assets expected from a meeting, then the central controller may solicit the assets from the meeting owner, from the meeting note taker, from the meeting organizer, from the presenter, from a meeting attendee, or from any other party. The central controller may solicit such assets via email, text message, or via any other fashion.

In various embodiments, if the central controller does not receive one or more assets expected from a meeting (e.g., within a predetermined time after the end of the meeting, within a predetermined time of the start of the meeting, within a predetermined time before the meeting starts), then the central controller may take some action (e.g., an enforcement action). In various embodiments, the central controller may revoke a privilege of a meeting owner or other responsible person. For example, the meeting owner may lose access to the most sought-after conference room. As another, the meeting owner may be denied access to the conference room for his own meeting until he provides the requested asset. As another example, the central controller may inform the supervisor of the meeting owner. Other enforcement actions may be undertaken by the central controller, in various embodiments.

Rewards, Recognition, and Gamification

At step 7960, the central controller 110 oversees provisions of rewards and/or recognition, according to some embodiments.

While management can't always be in every meeting, various embodiments can provide ways for management to provide rewards and/or recognition to people or teams that have achieved certain levels of achievement.

In various embodiments, the following may be tracked: Participation rate in meetings; Engagement levels in meetings; Leading of meetings; Questions asked; Assets recorded; Ratings received from meeting owner or other participants; Post-meeting deliverables and/or deadlines (met or missed); Meeting notes typed up; Demonstrated engagement levels with meeting materials such as reading time or annotations; Tagging of presentation slides.

In various embodiments, reward/recognition may be provided in the form of: Promotions; Role changes (e.g. the central controller begins to identify those highly regarded in the organization for different meeting types, such as a meeting owner who received good scores for running Innovation Meetings might be chosen to run more Innovation sessions, or to be a trainer of people running or attending Innovation meetings); Salary increase (e.g. central controller aggregates meeting participant scores and informs their manager when salary increases are taking place); Bonuses; Meeting room/time slot preferences (e.g. top meeting owners/participants get preferred status for best rooms, meeting times, other assets); Additional allocation of meeting 'points' (e.g. for scheduling/permitting meetings); Name displayed on room video screen; A recipient's peripheral device changes its appearance (e.g. an employee's mouse glows purple as a sign of recognition); An employee's peripheral device may change in any other fashion, such as by playing audio (e.g., by playing a melody, by beeping), by vibrating, or in any other fashion; Identify a person as a top meeting owner or top participant.

In various embodiments, certain stats may be tracked related to performance, like baseball card stats for meetings or people or rooms. Meeting attendees could be rewarded for perfect attendance, finishing on time, developing good assets, reaching good decisions, feeding good outputs as inputs to subsequent meetings, etc.

After the Meeting

In various embodiments, the central controller 110 asks whether or not a user attended the meeting.

In various embodiments, the central controller requests notes, meeting assets, and vote(s) from an attendee (and perhaps others), including ratings on the room and equipment itself and other configured items established by the meeting owner.

In various embodiments, the central controller provides meeting engagement scores for participants (or meeting owner, facilitator, admin, etc.) and leadership improvement data. For example, the central controller 110 might identify people with higher meeting engagement scores for use during coaching sessions. In some embodiments, the central controller asks if the meeting should be posted for later viewing by others.

Sustainability

At step 7963, the central controller 110 scores a meeting on sustainability, according to some embodiments. Some contributions to sustainability may include: environmental soundness, reduced meeting handouts (physical), increased remote participation, etc.

Many companies are now working diligently to respect and preserve the environment via Corporate Social Responsibility (CSR) focus and goals. These CSR goals and initiatives are key in improving and maintaining a company's reputation, maintaining economic viability and ability to successfully recruit the next generation of knowledge workers. Various embodiments can help to do that. For example, companies may take the following thinking into consideration: Making virtual participation more effective allows for fewer participants having to travel for meetings, reducing car exhaust and airplane emissions; With smaller meetings, smaller meeting rooms can be chosen that require less air conditioning; Carbon dioxide elimination/Green score/Corporate Social Responsibility score by meeting and individual—participants that are remote and choose to use virtual meetings are given a CO2 elimination/green score which can be highlighted in corporate communications or on the company website; Not printing content and making all presentations, notes, feedback and follow-up available electronically, can generate a green score by participants/meeting/organization; Brainstorming sessions can be done regarding making environmental improvements, with the results of those sessions quickly made available to others throughout the enterprise, and the effectiveness of those suggestions tracked and evaluated; The company heating/cooling system could get data from the central controller in order to optimize temperatures (e.g. when engagement levels start to drop, experiment with changes in temperature to see what changes help to bring engagement levels up); When the central controller knows that a meeting room is not being used, the air conditioning can be turned off, and it can also be turned back on just before the start of the next meeting in that room (e.g. at 3 PM if the last meeting is done, the AC should go off and the door should be closed); When the central controller knows a meeting participant is attending a meeting in person, the air conditioning or heating temperature could be adjusted in the attendee's office to reflect that they are not in their office; Room blinds could be controlled to minimize energy requirements.

In some embodiments, headsets equipped with temperature, environmental and light sensors—along with cameras and microphones—could collect data from each user in a meeting room. This data could be sent to the central controller and communicated to location controller 8305 to adjust the environmental elements or provide feedback for adjustments. The dynamic changes could help to conserve power and contribute to a positive CSR score. CSR scores could be broadcast throughout the company's headsets for education and awareness purposes.

In various embodiments, headsets may facilitate heating/cooling adjustments. Headsets could collect the body temperature of each person. If the temperature increases beyond a particular threshold, the central controller 110 could communicate with the in-room location controller or central HVAC system to start the air conditioning. Likewise, if the body temperatures are too cold, the central controller could communicate with the in-room location controller or central HVAC system to stop the air conditioning and possibly turn on the heat.

In some embodiments, headsets with cameras (or cameras alone) could detect the number of people in a meeting room. If the number of people in the room is significantly less than the accommodating size (e.g. two people sitting in a twenty person conference room), the HVAC system is not adjusted and conserves power. This could mimic the environmental control behavior of the central controller when a room is not in use and encourage the use of other rooms or virtual meetings. Room blinds could also be controlled to minimize energy requirements. If the headset senses light shining on a presentation panel or the room is becoming too hot, the in-room location controller could obtain information from the central controller and close the blinds. Likewise, if the room becomes too dark on a sunny day, the in-room location controller could obtain information from the central controller and automatically open the blinds letting in light, thus reducing the need to turn on lights.

In various embodiments, headsets may facilitate maintenance. With respect to office equipment and furniture, peripheral devices (e.g. headsets, cameras, presentation remotes) could identify that chairs are missing from the room and notify the facilities department via the central controller 110 that chairs are missing and could be brought to the conference room. This could occur for any missing asset that is not registered with the central controller for the associated room (e.g. trash cans, markers).

In some embodiments, with respect to maintaining office cleanliness, the headsets with cameras could notice that the trash can is full of lunch from a previous meeting or that there are crumbs on the floor and the cleaning staff could be dispatched to clean the room via the central controller. In addition, if the trash can is not full or the room is clean, the cleaning crew could be notified to not access the room and save on maintenance and power costs.

In various embodiments, the central controller 110 could have access to the organization's environmental Corporate Social Responsibility (CSR) goals and targets. These could be preloaded into the central controller. When meetings are scheduled, the central controller informs the meeting lead and participants of the meeting's CSR target score based on the overall organization goals. When team members elect to participate remotely or not print documents related to the meeting, these are components that generate a CSR meeting score. This score can be maintained real-time by the central controller and used to monitor and update in real-time the CSR score to target goal. This score can be promoted on both internal sites for employee awareness as well as external sites for public viewing. For example, meeting owner 'A' schedules a meeting with 10 people in location ABC. 5 people are remote, 3 work from home and 2 are co-located in location ABC. The meeting owner is provided with the CSR target goal of 25%. If 3 of the 5 remote attendees elect to not fly to the location or rent a car or stay in a hotel in location ABC, the meeting receives a positive contribution to the CSR goal. When 2 people decide to fly to the meeting, they receive a negative contribution to the CSR goal since they are contributing to more carbon dioxide emissions, renting fossil fuel vehicles and staying in hotels that use more energy. Likewise, the 3 people that work from home and do not drive to the office contribute positively to the CSR goal. The 2 co-located meeting participants in location ABC receive a score as well since they drive to the office daily and consume utilities at their place of employment. Furthermore, as attendees see the meeting CSR score in advance of the meeting and make alternative choices in travel and attendance, the score adjusts. As more people elect to attend in person, the score begins to deteriorate. If people begin to print copies of a presentation, the network printers communicate to the central controller and the CSR score begins to deteriorate as well. As more people attend in person, the AC/Heating costs begin to increase and again, this contributes negatively to the CSR score. Upon completion of the meeting, the final CSR score is provided to all attendees and the central controller maintains the ongoing analytics of all meetings for full reporting by the organization.

Even when meetings are not taking place in a physical room, the room itself could be contributing to a negative CSR score. Rooms require heat and cooling even when no one is in the workplace. The meeting controller should be aware of all meetings and proactively adjust the heating and cooling of each room. For example, if the meeting controller knows a meeting is taking place in conference room ‘A’ from 8:00 AM-9:00 AM, the meeting location controller 8305 should alert the heating and cooling system to adjust the temperature to 76 degrees Fahrenheit at 7:45 AM. Also, the meeting location controller should also notice that another meeting is taking place from 9:00 AM-10:00 AM in the same room and hence should maintain the temperature. If, however, there is no meeting scheduled from 9:00 AM-11:00 AM, the central controller should inform the heating and cooling system to turn off the system until the next scheduled meeting. When temperatures are adjusted to match the use of the room, the CSR score is positively impacted since less energy is used.

Since the central controller 110 also knows which individuals are attending the meeting in person, if the individual has an office, the heating and cooling system should be adjusted in the office to conserve energy. For example, person ‘A’, who sits in an office, elects to attend a meeting in conference room ‘B’ in person at 8:00 AM. At 7:55 AM, or whenever the time to travel to the meeting begins for the individual, the central controller informs the heating and cooling system to adjust the temperature for an unoccupied room. In this case, it could be set to 80 degrees Fahrenheit. Since the office is not occupied during the meeting time, less energy is spent heating and cooling the office. This contributes positively to the overall CSR target score and the central controller maintains this information for use by the organization.

As temperature conditions in the room are impacted by sun through windows, the central controller should interface with the window blind system accordingly. For example, in the winter, the central controller could retrieve weather data from weather table 7600 to determine that it will be sunny and 45 degrees Fahrenheit outside and that the room windows face the south. In this case, in order to use solar energy, the blinds of the meeting room should be opened by the central controller to provide heat and hence use less energy resources. Likewise, in the summer, with a temperature of 90 degrees Fahrenheit, this same southern facing conference room should have the blinds closed to conserve cooling energy. This data should be provided by the central controller to the overall CSR target goals for the organization. The central controller could integrate to sites to calculate the CSR savings/Green savings by not flying or driving. Since the central controller knows where the meeting participant is located and where the meeting is taking place they can determine the distance between the locations and calculate the savings. For example, the central controller knows the meeting is taking place at 50 Main Street in Nashville, Tennessee. An individual in Los Angeles, California elects to participate remotely and not travel. The central controller can access a third party site to calculate the CO2 emissions saved thus the positive contribution to the CSR target. In addition, a person in a suburb of Nashville decides to participate remotely and not drive to the meeting. The central controller can access third party mapping software and determine the driving distance and access a third party site to calculate the CO2 emission saved. This information is collected by the central controller and provided to the organization for CSR reporting.

Camera

Figure 80:
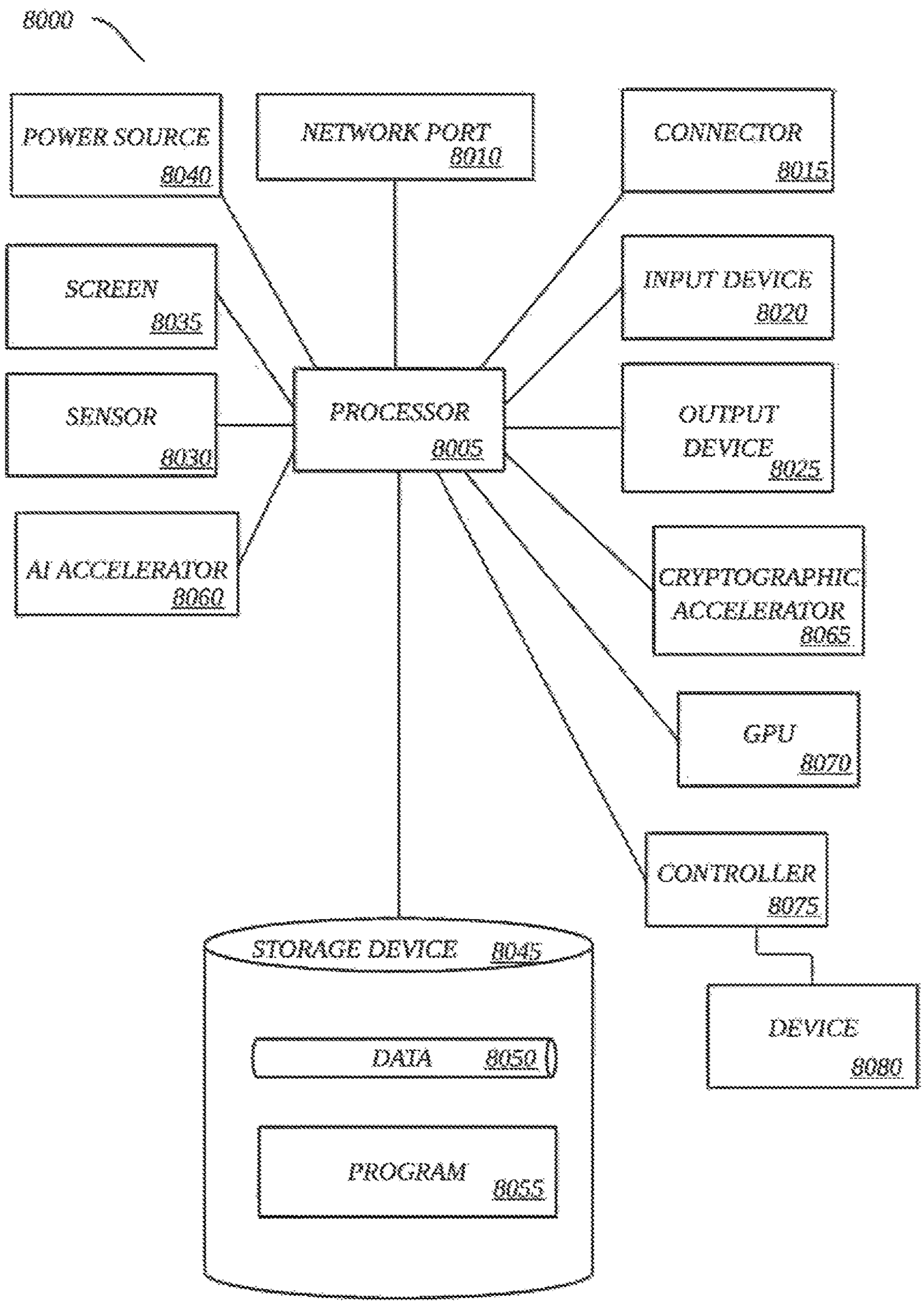
FIG. 80 is a block diagram of a peripheral consistent with at least some embodiments described herein.

Turning now to FIG. 80, a block diagram of a peripheral device 8000 according to some embodiments is shown. In various embodiments, a peripheral device (e.g., headset, camera, presentation remote, mouse, keyboard) may be a wearable device (e.g., built into a headset, worn on a belt, built into a ring, built into a mouse, built into eyeglasses) which receives inputs and provides outputs.

Peripheral device 8000 may include various components. Peripheral device 8000 may include a processor 8005, network port 8010, connector 8015, input device 8020, output device 8025, sensor 8030, screen 8035, power source 8040, storage device 8045, AI accelerator 8060, cryptographic accelerator 8065, and GPU (graphics processing unit) 8070. Storage device 8045 may store data 8050 and program 8055. A number of components for peripheral device 8000 depicted in FIG. 80 have analogous components in user device 106*a* depicted in FIG. 3 (e.g., processor 8005 may be analogous to processor 305) and in peripheral device 107*a* depicted in FIG. 4 (e.g. sensor 8030 may be analogous to sensor 430), and so such components need not be described again in detail. However, it will be appreciated that any given user device or peripheral device and any given presentation remote device may use different technologies, different manufacturers, different arrangements, etc., even for analogous components. For example, a particular user device may comprise a 20-inch LCD display screen, whereas a peripheral device may comprise a 2-inch OLED display screen. It will also be appreciated that data 8050 need not necessarily comprise the same (or even similar) data as does data 350 or data 450, and program 8055 need not necessarily comprise the same (or even similar) data or instructions as does program 355 or program 455. Input device 8020 may include audio input that may be provided by a user which results in a command sent to network port 8010.

In various embodiments, analogous components in different devices (and/or in different variations of a device) may use a similar and/or analogous numbering scheme. For example, reference numerals for like components may differ only in the “hundreds” or “thousands” digits, but may have similar trailing digits. For example, processor 305 in FIG. 3 and processor 405 in FIG. 4 may be analogous components, and have the same last two digits in their respective reference numerals. In various embodiments, where components in different figures have similar and/or analogous numbering schemes, such components may have similar and/or analogous functions and/or construction. In various embodiments, however, analogous numbering schemes do not necessarily imply analogous functions and/or construction.

In various embodiments, connector 8015 may include any component capable of interfacing with a connection port (e.g., with connection port 315). For example, connector 8015 may physically complement connection port 315. Thus, for example, peripheral device 8000 may be physically connected to a user device via the connector 8015 fitting into the connection port 315 of the user device. The interfacing may occur via plugging, latching, magnetic coupling, or via any other mechanism. In various embodiments, a peripheral device may have a connection port while a user device has a connector. Various embodiments contemplate that a user device and a peripheral device may interface with one another via any suitable mechanism. In various embodiments, a user device and a peripheral device may interface via a wireless connection (e.g., via Bluetooth®, Wi-Fi®, or via any other means).

AI accelerator 8060 may include any component or device used to accelerate AI applications and calculations. AI accelerator 8060 may use data collected by sensor 8030 and/or input device 8020 to use as input into various AI algorithms to learn and predict outcomes. AI accelerator 8060 may use storage device 8045 for both input and result data used in AI algorithms and calculations.

In various embodiments, AI accelerator 8060 can send a signal back to user device **106*a* upon making a prediction, determination, or suggestion. For example, if a user is giving a presentation and it is determined by AI accelerator 8060 that the user is performing poorly (e.g. not speaking loudly enough, moving too much, not making eye contact with the audience, keeping their hands in their pockets, slouching) a signal can be sent back to user device 106*a*** to recommend more training for the user.

In various embodiments, AI accelerator 8060 can use multifaceted data collected by sensor 8030 as input to induce actions. The AI accelerator can use this information, for example, to: trigger recording of the current presentation session when a presenter shows excitement, induce a vibration in the camera if the presenter is showing signs of being distracted or sleepy, etc.

In various embodiments, AI accelerator 8060 may combine data from various sources including sensor 8030 and input device 8020 with its own data calculated and/or stored on storage device 8045 over a long period of time to learn behaviors, tendencies, idiosyncrasies and use them for various purposes. For example, the AI accelerator may determine that the person using peripheral device 8000 currently is not an approved user based on movement patterns, ambient sound, voiceprint, facial recognition, etc. and prevent unauthorized access of peripheral device 8000. The AI accelerator may find concerning medical conditions through sensing of heart rate, thermal scan of body temperature, movement patterns and notify the user to seek medical attention. The accelerator may determine the user's learning capabilities and knowledge base to determine complexity settings on future presentations, applications, templates, etc.

Cryptographic accelerator 8065 may include any component or device used to perform cryptographic operations. Cryptographic accelerator 8065 may use data collected by various sources including but not limited to sensor 8030 and/or input device 8020 to use as input into various cryptographic algorithms to verify user identity, as a seed for encryption, or to gather data necessary for decryption. Cryptographic accelerator 8065 may use storage device 8045 for both input and result data used in cryptographic algorithms.

In various embodiments, cryptographic accelerator 8065 will encrypt data to ensure privacy and security. The data stored in storage device 8055 may be encrypted before being written to the device so that the data can only be usable if passed back through 8065 on output. For example, a user may want to store sensitive information on the storage device on peripheral device 8000 so that they can easily authenticate themselves to any connected user device **106*a*. Using the cryptographic accelerator to encrypt the data ensures that only the given user can decrypt and use that data. In some embodiments, cryptographic accelerator 8065 includes multifactor authentication capability so that peripheral device 8000** may be used in authentication protocols.

In various embodiments, cryptographic accelerator 8065 will encrypt signals to ensure privacy and security. Signals sent to user device **106*a* through connector 8015 and connection port 315 can be encrypted so that only a paired user device can understand the signals. Signals may also be encrypted by the cryptographic accelerator and sent directly via network port 8010 to another peripheral device 107*a* via that device's network port 410. For example, a user may use a microphone associated with peripheral device 8000 to record speech for private communications and that data can pass through cryptographic accelerator 8065** and be encrypted before being transmitted. The destination device can decrypt using its cryptographic accelerator using shared keys ensuring no other party could listen in.

GPU (graphics processing unit) 8070 may include any component or device used to manipulate and alter memory to accelerate the creation of images in a frame buffer intended for output on one or more display devices. GPU 8070 may use data collected by various sources including but not limited to sensor 8030 or from the attached user device via connector 8015 to use in graphics processing. GPU 8070 may use storage device 8045 for reading and writing image data.

In various embodiments, GPU 8070 will create image data that will be displayed on screen 8035 or output device 8025. For example, when a user is managing a presentation GPU 8070 can be used to process data and display the data on a camera display (output device 8025), and can assist in processing graphics data.

In some embodiments, peripheral device 8000 includes controller 8075 which can manage multiple devices 8080 in order to reduce the computational load on processor 8005.

In some embodiments, storage device 8045 may store financial data (e.g. credit card numbers, bank account numbers, passwords, digital currencies, coupons), medical data, work performance data, media (e.g. movies, songs, books, audio books, photos, instruction manuals, educational materials, training materials, presentations, art, software applications, advertisements), etc. In various embodiments, users may be required to authenticate themselves to peripheral device 8000 before gaining access to data stored in storage device 8045.

Referring to FIG. 81, a diagram of an example 'recommended capabilities by meeting type'table 8100 according to some embodiments is shown. Table 8100 may store recommendations for what capabilities should be represented at meetings, depending on the type and topic of the meeting. For example, table 8100 may recommend the number of subject matter experts that should be present at an innovation meeting on the subject of software tools.

Recommendation identifier field 8102 may store an identifier (e.g., a unique identifier) that identifies a recommendation. Meeting type field 8104 may store an indication of a meeting type (e.g., innovation, learning, alignment, commitment, etc.). Meeting topic field 8106 may store an indication of a meeting topic (e.g., software tools, tax law changes, new bugs from code delivery, which OS to develop for first, etc.).

Based on the meeting type and meeting topic, table 8100 includes recommendations for various meeting parameters (e.g., for the numbers of people that should fill different meeting roles). Recommendations may include fixed numbers or ranges (e.g., a recommendation may indicate that a meeting should have between fifty and seventy-five people).

'Number of facilitators/mediators' field 8108 may store an indication of a number of facilitators and/or mediators that are recommended for a meeting. 'Number of subject matter experts' field 8110 may store an indication of a number of subject matter experts that are recommended for a meeting. 'Number of decision-makers' field 8112 may store an indication of a number of decision-makers that are recommended for a meeting. 'Total number of people'field 8114 may store an indication of a total number of people that are recommended for a meeting.

'Room arrangement' field 8116 may store an indication of a room arrangement that is recommended for a meeting. A room arrangement may indicate the layout, arrangements, and/or orientations of tables, chairs, benches, podiums, or other furniture. A room arrangement may indicate the location of devices or equipment, such as a projector, speaker, etc. Exemplary room arrangements include: has whiteboards; auditorium style; u-shape; round-table in small room; etc.

Fields 8108, 8110, and 8112, 8114, and 8116 represent different meeting parameters that may be recommended according to some embodiments. It will be appreciated that other parameters may be recommended, in various embodiments. In various embodiments, there may be recommendations for other meeting roles, for meeting props, for meeting formats, and/or for any other aspect of a meeting.

In various embodiments, recommendations may vary based on other meeting parameters, such as meeting format, time of day, familiarity of the participants with one another, stage of a project, etc. For example, there may be a first recommended size for in-person meetings, and a second recommended size for meetings held via video conferencing. For example, there may be a first recommended number of facilitators for an early morning meeting (e.g., when people are fresh), and a second recommended number of facilitators for meetings held right after lunch (e.g., when people are lethargic from eating).

Figure 82:
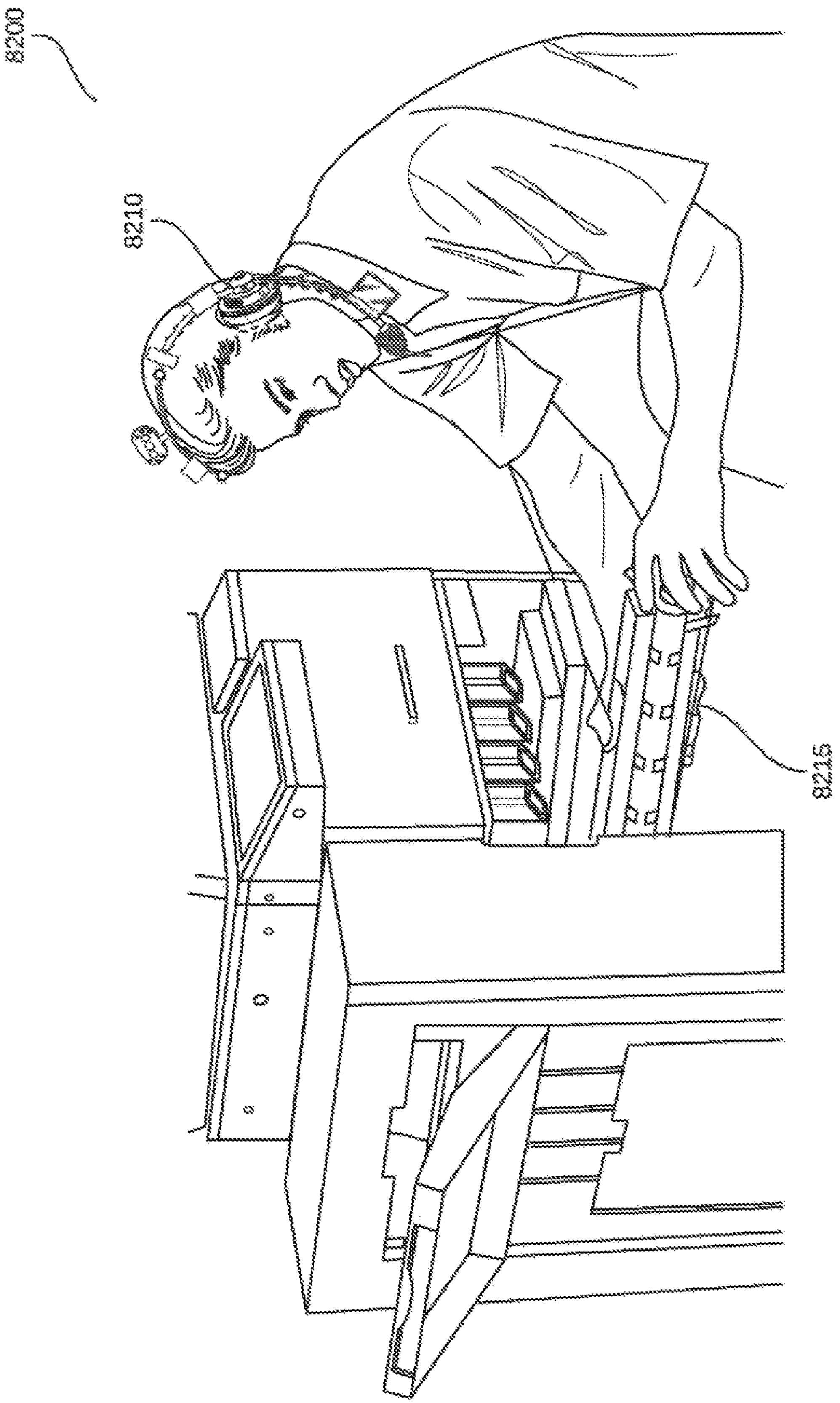
FIG. 82 is an employee wearing a headset consistent with at least some embodiments described herein.

With reference to FIG. 82 there is shown an illustration of a repair 8200. An office worker is attempting to repair broken machine 8215. The office worker is wearing headset 8210 which may include any of the functionality of headset 4000 of FIG. 40 (or of any other headset described herein) as well as the functionality of camera 4100 of FIG. 41. The office worker is needing assistance to repair the broken machine 8215 and uses headset 8210 to request that an experienced technician from the manufacturer provide instructions remotely. The office worker speaks into a microphone of headset 8210 and initiates a request to send a video feed of broken machine 8215 to the remote technician while looking at broken machine 8215. In some embodiments, the office worker may also generate a tag with information about one or more broken elements and apply that tag to broken machine 8215.

The remote technician joins with their headset and observes the broken machine 8215 and guides the office worker through the steps needed to repair the machine. Likewise, the office worker with headset 8215 may request that a video (e.g. a training video on how to fix the particular problem) be shown on the display to assist in fixing the broken machine 8215 independent of another person. The office worker may also request internal assistance from other workers who are more familiar with fixing the broken machine 8215 (e.g. an administrative assistant) using headset 8210. The office worker requests through the headset a display of all internal company employees with experience fixing the broken machine type. A list is provided on the headset display and the office worker selects an individual. Communication from the headsets is established with the other company employee and assistance is provided to fix the machine in a manner similar to the manufacturer representative.

Keyboard Output Examples

In various embodiments, a keyboard is used to output information to a user. The keyboard could contain its own internal processor. Output from the keyboard could take many forms.

In various embodiments, the height of keys serves as an output. The height of individual keys (depressed, neutral or raised) could be controlled as an output.

In various embodiments, a keyboard contains a digital display screen. This could be a small rectangular area on the surface of the keyboard which does not interfere with the activity of the user's fingers while using the keyboard. This display area could be black and white or color, and would be able to display images or text to the player. This display would receive signals from the user device or alternately from the central controller, or even directly from other peripheral devices.

In various embodiments, the screen could be touch-enabled so that the user could select from elements displayed on this digital display screen. The screen could be capable of scrolling text or images, enabling a user to see (and pick from) a list of inventory items, for example. The screen could be mounted so that it could be flipped up by the user, allowing for a different angle of viewing. The keyboard display could also be detachable but still controllable by software and processors within the mouse.

In various embodiments, a keyboard may include lights. Small lights could be incorporated into the keyboard or its keys, allowing for basic functionality like alerting a user that a friend was currently playing a game. A series of lights could be used to indicate the number of wins that a player has achieved in a row. Simple lights could function as a relatively low-cost communication device. These lights could be incorporated into any surface of the keyboard, including the bottom of the keyboard. In some embodiments, lights are placed within the keyboard and can be visible through a semi-opaque layer such as thin plastic. The lights could be directed to flash as a way to get the attention of a user.

In various embodiments, a keyboard may render output in the form of colors. Colors may be available for display or configuration by the user. The display of colors could be on the screen, keys, keyboard, adjusted by the trackball or scroll wheel (e.g., of a connected mouse; e.g., of the keyboard), or varied by the sensory information collected. The intensity of lights and colors may also be modified by the inputs and other available outputs (games, sensory data or other player connected devices).

In various embodiments, a keyboard may render outputs in the form of motion. This could be motion of the keyboard moving forwards, backwards, tilting, vibrating, pulsating, or otherwise moving. Movements may be driven by games, other players or actions created by the user. Motion may also be delivered in the form of forces against the hand, fingers or wrist. The keyboard device and keys could become more firm or softer based on the input from other users, games, applications, or from the keyboard's own user. The sensitivity of the keys could adjust dynamically.

In various embodiments, a keyboard may render outputs in the form of sound. The keyboard could include a speaker utilizing a diaphragm, non-diaphragm, or digital speaker. The speaker could be capable of producing telephony tones, ping tones, voice, music, ultrasonic, or other audio type. The speaker enclosure could be located in the body or bezel of the keyboard.

In various embodiments, a keyboard may render outputs in the form of temperature (or temperature changes). There could be a small area on the surface of the keyboard keys or in the keyboard bezel which contains heating or cooling elements. These elements could be electrical, infrared lights, or other heating and cooling technology. These elements could output a steady temperature, pulsating, or increase or decrease in patterns.

In various embodiments, a keyboard may render outputs in the form of transcutaneous electrical nerve stimulation (TENs). The keyboard could contain electrodes for transcutaneous electrical nerve stimulation. These electrodes could be located in the keys or the areas corresponding with areas used by fingertips or by the palm of the hand. These electrodes could also be located in an ergonomic device such as a wrist rest.

In various embodiments, a keyboard may render outputs in the form of scents, smells, or odors. A keyboard may include a scent machine (odor wicking or scent diffuser). The keyboard could contain an air scent machine, either a scent wicking device or a scent diffusing device. This air scent machine could be located in the body or bezel of the keyboard.

Referring to FIG. 87, a diagram of an example meeting configurations table 8700 according to some embodiments is shown. Meeting configurations table 8700 may store one or more configurations for meetings. Each meeting configuration may represent one option under consideration for holding a meeting. Thus, for a given prospective meeting, table 8700 may include multiple meeting configurations under consideration. Eventually, one such meeting configuration may be selected as the final meeting configuration to which the actual meeting will adhere.

Among other things, meeting configurations table 8700 may score each meeting configuration based on the value of having a set of attendees present versus the opportunity cost for the attendees to be present and not doing something else. In various embodiments, the meeting configuration ultimately selected for the actual meeting may be the meeting configuration with the greatest value from having a attendees present net of opportunity cost.

Meeting ID field 8702 may store an indication of a meeting. The meeting may or may not have transpired yet. The meeting is the meeting for which the configuration is (or was) being considered as one possible option for how the meeting will actually take place.

Configuration ID field 8704 may include an identifier (e.g., unique identifier) for a configuration. As is illustrated in table 8700, there may be more than one configuration associated with the same meeting. For example, meeting ID mt5320323 has illustrated at least four associated configurations, including configuration ID's mcfg3209340332, mcfg3538102029, etc. These are or were four possible configurations considered for this meeting. The configuration that is ultimately selected (e.g., as indicated in configuration selected field 8722) may then determine what actually transpires or transpired during the meeting.

Date field 8706 may include a date for the corresponding meeting. I.e., this would be the date of the corresponding meeting (field 8702) in the event that this configuration is chosen.

Start time field 8708 may include a start time for the corresponding meeting associated with this configuration. Duration field 8710 may include a duration for the corresponding meeting associated with this configuration. Room ID field 8712 may include an indication of a room for the corresponding meeting associated with this configuration.

Attendees field 8714 may include an indication of the attendees that would appear for the corresponding meeting associated with this configuration.

Presence score field 8716 may include an indication of a score associated with having the specified attendees present. The score may represent inherent value being created for an organization through having the attendees presents. Value creation may come because the attendees are solving a problem, moving a project forward, improving their own learning to better help the company, etc. In various embodiments, the score may be specified in monetary terms, in numerical terms, and/or in any other terms. In various embodiments, the score may attempt to faithfully approximate value created by an employee's presence (e.g., in true monetary terms, such as in terms of dollars saved by virtue of the employee's presence). In various embodiments, the score may be a reference or standard, but with no equivalent real-world meaning.

In various embodiments, there is a score associated with the presence of each individual attendee, and an overall presence score in field 8716 is determined by summing the presence scores associated with the individual attendees. In various embodiments, the presence score in field 8716 may be more than the sum of scores associated with the presence of each individual attendee (e.g., because of synergistic effects from having multiple people present). In various embodiments, the presence score in field 8716 may be less than the sum of scores associated with the presence of each individual attendee (e.g., because there is a redundancy among the attendees, such as multiple subject matter experts with the same expertise).

In one illustrative example, a score associated with the presence of a subject matter expert (SME) is 50 points for the first hour of a meeting, and 20 points per hour thereafter. A score associated with every other attendee is 20 points for the first hour, and 15 points per hour thereafter. Assume that meeting configuration mcfg3209340332 would have one SME and five other attendees. The score associated with the SME for this two-hour meeting would be 50+20=70. The score associated with each other attendee would be 20+15=35. Accounting for the respective quantities of SME's and other attendees, the total presence score for configuration mcfg3209340332 would be $1\times70+5\times35=245$ (e.g., assuming no synergies or redundancies).

In various embodiments, a presence score may be determined by a meeting owner, by a potential attendee, by a project manager, and/or in any other fashion. For example, a meeting owner may decide that a decision on a major project must be made urgently, and the decision requires the presence of a particular SME. Accordingly, the meeting owner may assign a very high presence score to the SME. In various embodiments, a potential attendee may decide that he does not have much to gain from a meeting, nor much to contribute, so the potential attendee may assign himself a low presence score.

Opportunity cost field 8718 may include an indication of a cost (e.g., a negative score) associated with having the specified attendees present. The cost may represent inherent value lost or foregone through having the attendees present, e.g., because the attendees are not working on other matters. In various embodiments, the cost may be specified in monetary terms, in numerical terms, and/or in any other terms.

In various embodiments, there is a cost associated with the presence of each individual attendee, and an overall opportunity cost in field 8718 is determined by summing the costs associated with the individual attendees.

In one illustrative example, a cost associated with the presence of a subject matter expert (SME) is 30 points per hour. A cost associated with every other attendee is 10 points per hour. Assume that meeting configuration mcfg3209340332 would have one SME and five other attendees. The cost associated with the SME for this two-hour meeting would be 2×30=60. The cost associated with each other attendee would be 2×10=20. Accounting for the respective quantities of SME's and other attendees, the total opportunity cost for configuration mcfg3209340332 would be 1×60+5×20=160.

Total score field 8720 may include an indication of a total score associated with having the specified attendees present. The total score may be determined by subtracting the opportunity cost from the presence score. For meeting configuration mcfg3209340332, the total score may be determined as 245-160=85.

Configuration selected field 8722 may store an indication of whether or not this configuration was selected. If no configuration has yet been chosen for a given meeting, then this may be indicated by a "choice pending" value, or by any other appropriate value. In various embodiments, the configuration with the highest total score (field 8720) is selected.

In various embodiments, an opportunity cost for an individual may vary by time and circumstances. For example, if an individual is currently facing a tight deadline on a task, or if the individual is in charge of overseeing an important product rollout, then the individual may have a high associated opportunity cost. An individual may have high opportunity cost for personal reasons, such as having a child's ballgame scheduled for the time of a meeting configuration. In various embodiments, an individual may indicate his opportunity cost at different times, such as by putting the opportunity cost in his calendar for each of the different times. In various embodiments, an individual may specify an opportunity cost in terms of a rate (e.g., a cost per hour, cost per day, etc.). An individual may specify an opportunity cost rate for a day (e.g., for a particularly busy day), for a week, etc.

In various embodiments, an opportunity cost may be determined automatically, such as through examination and analysis of an employee's calendar, projects, associated tasks, rank, experience, history of contributions, etc.

In various embodiments, selecting meeting configurations by considering costs and benefits of having potential attendees present may allow a company to operate more efficiently and make better use of its human resources. Where two people would serve equally well in a meeting, the person with the least opportunity cost may be invited to attend, thereby, e.g., allowing the other person to address an important matter. Where two dates or times would serve equally well, a date and time may be selected that allows for the attendance of an individual contributing greater value to the meeting. Various other benefits may also be realized, as will be appreciated.

Figure 88:
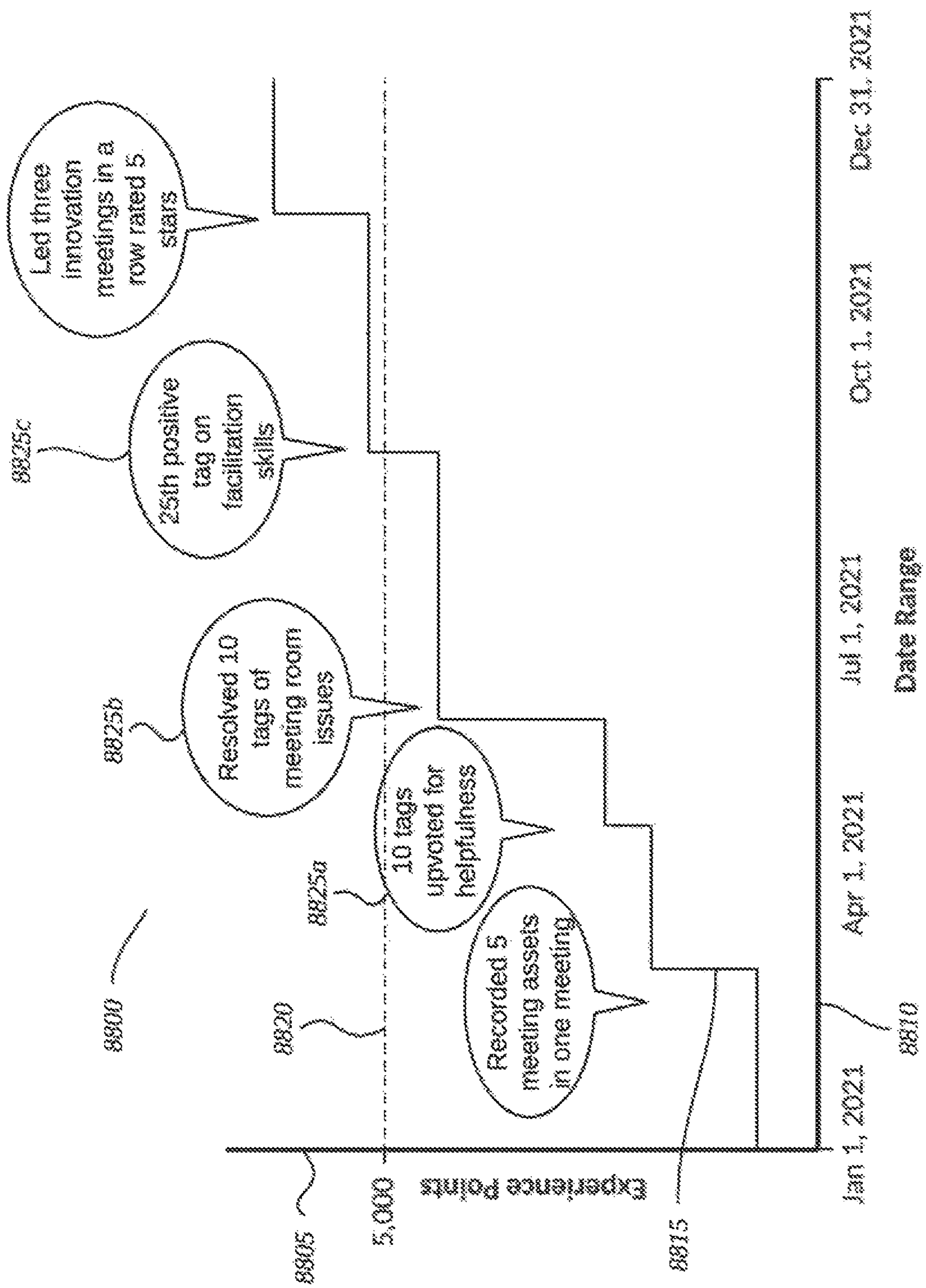
FIG. 88 is a chart consistent with at least some embodiments described herein.

Referring to FIG. 88, a graph 8800 of experience point data according to some embodiments is shown. For the indicated graph, data has been gathered over a date range of one year (represented on the 'X' axis 8810) with cumulative experience points earned (represented on the 'Y' axis 8805). The cumulative experience point levels are represented by a line 8815 which shows several points along the date range in which a user was awarded experience points based on tags received. At 8825*a* the user was awarded experience points because they had accumulated '10 tags upvoted for helpfulness' by other users. At 8825*b*, a larger experience point award was made because the user had 'Resolved 10 tags of meeting room issues' by that point in time, such as by finding a displaced chair, cleaning a whiteboard, replacing a bulb in a projector, etc. At 8825*c*, the user received a '25th positive comment tag on facilitation skills', which resulted in the user's cumulative experience points exceeding 5,000 points as illustrated in dashed line 8820. In some embodiments, users crossing certain thresholds of cumulative experience points may receive monetary awards, recognition, promotions, perks, etc. In various embodiments, users may have experience points taken away when negative tags are received.

Figure 90:
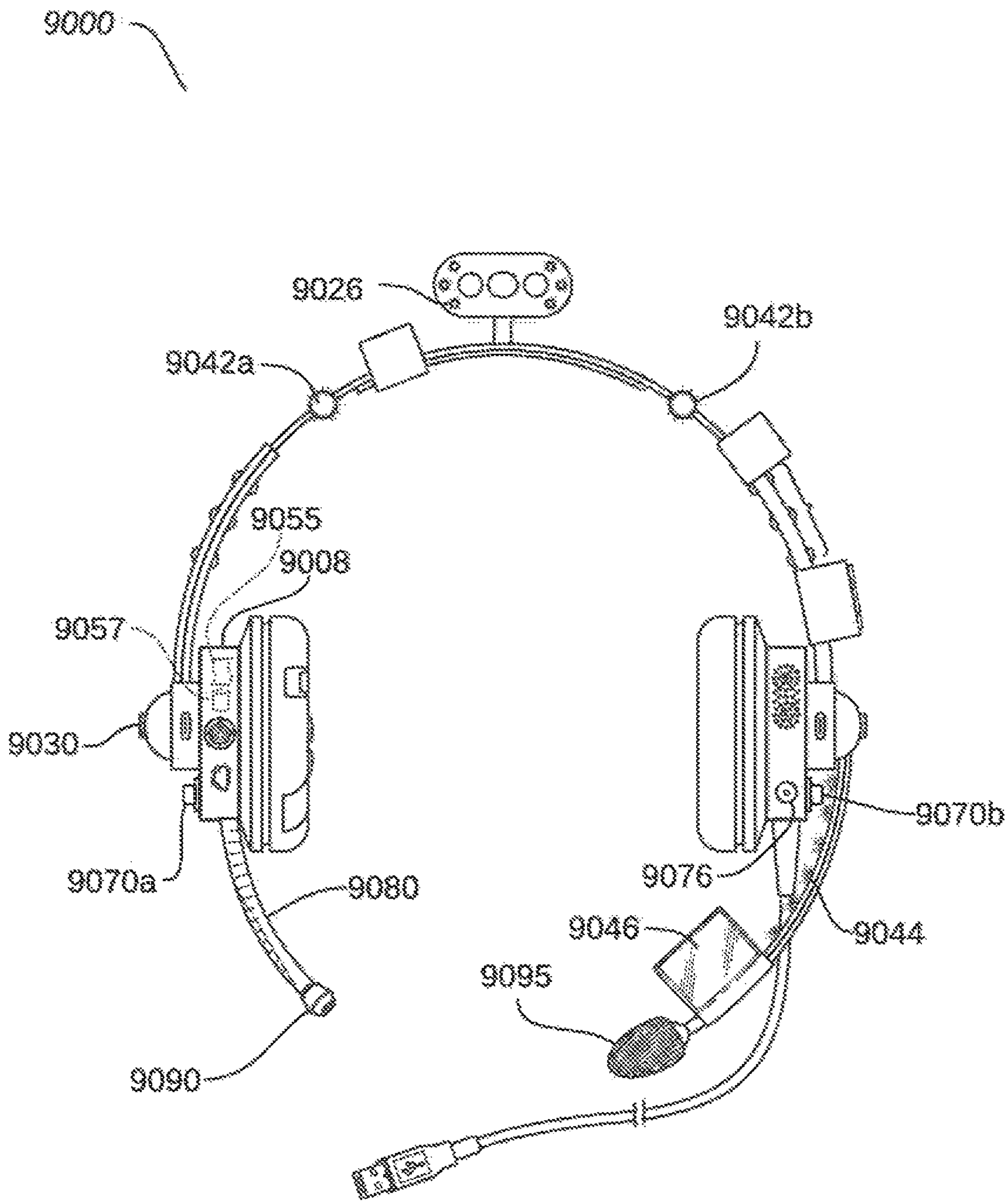
FIG. 90 is a headset consistent with at least some embodiments described herein.

With reference to FIG. 90, a headset 9000 according to some embodiments is shown. Headset 9000 includes a camera 9090 (which may have some or all of the functionality of camera 4100) attached to a bendable stalk 9080 which attaches camera 9090 to housing 9008. In various embodiments, bendable stalk 9080 allows a user to position camera 9080 to capture video or still images from many angles. In some embodiments, bendable stalk 9080 may be made from a material that is capable of bending, though it retains its position once bent. In some embodiments, camera 9090 may be detachable and communicate with headset 9000 or camera 4100, or may have the functionality of supplemental camera 4184. In various embodiments, camera 9090 may be aimed at an object in front of the user, aimed at another user (e.g. to determine the identity of a person who a user is applying a tag to), aimed at the user's face (e.g. to capture distances between eyes, ears, nose and mouth for biometric calculations), aimed at one of the user's eyes (e.g. to capture an image of the user's iris for a biometric calculation), aimed at the user's lips (e.g. to capture lip movements to help other user's understand what the user is saying), aimed at a tattoo of the user (e.g. to transmit a photo of the tattoo to central controller 110 to aid in identifying or authenticating the user), aimed at clothing or jewelry of the user, aimed at the hair of the user, aimed at the skin of the user's neck (e.g. to determine an approximate age of the user), aimed at written text, aimed at tools required to fix an object (e.g. copy machine), aimed at a pet (e.g. to aid in identifying or authenticating the user), aimed at the user's clothing, aimed at an aspect of the environment around the user which identifies the user's current location (e.g. street signs, a name plaque on a building, a recognizable building facade), etc. In some embodiments, lights 9042*a*, 9042*b*, 9044, and/or 9026 may be illuminated by headset 9000 in order to provide better lighting conditions for camera 9090. In some embodiments, camera 9090 includes one or more lights that may be directed at the object camera 9090 is pointed at. In some embodiments, headset 9000 includes microphone 9095.

In some embodiments, bendable stalk 9080 includes one or more motors which are under control of central controller 110 so that central controller 110 may "look around" the user. Such motors may also enable headset 9000 to maintain a video feed associated with a fixed object in the field of view even when the user turns her head.

In other embodiments, video captured by camera 9090 may be output via display screen 9046 and/or projector 9076, allowing the user to see what camera 9090 is pointed at. In some embodiments, headset 9000 uses data from accelerometers 9070*a* and 9070*b* in order to determine the position of the user's head, and uses that head position to better identify where the user is looking, such as for the purposes of determining the subject of a tag being applied by a user.

In various embodiments, headset 9000 may comprise other electronics or other components, such as a processor 9055, data storage 9057, etc.

Referring now to 91, a flow diagram of a method 9100 according to some embodiments is shown. Method 9100 may include a method for identifying an object, for associating history, tasks, and/or other information with the object, and/or for conveying the information to a user (e.g., when the user comes in contact with the object). For convenience, method 9100 will be described as being performed by camera 4100. However, as will be appreciated, various embodiments contemplate that method 9100 may be performed by central controller 110, by a user device, by a headset, by a peripheral device, and/or by any other device and/or combination of devices.

At step 9103, camera 4100 may capture a second image at a second time before a first time, according to some embodiments. The second image may be an image captured from a room or other location in a house (or other building or other location), an outdoor area for a house, a shed, a garage, a patio, a porch, and/or from any other location. In various embodiments, the "second time" when the second image is captured, is before a subsequent "first time" when a "first image" is captured. The first and second images may each show at least one object in common, and thus the "first image" may show the object at a later time than does the "second image".

In various embodiments, camera 4100 may capture a video of the object at the second time. The video may include the second image (e.g., as a frame in the video). In various embodiments, a video may allow camera 4100 to recognize a dynamic gesture made by a user (e.g., a sweep of the arm), to capture an audio clip from the user, to see the object from multiple vantage points, and/or to perform any other function.

At step 9106, camera 4100 may identify an object in the second image. The object may be a household item, item of furniture, fixture, location, part of a larger object, and/or any other item.

Camera 4100 may use any object recognition algorithm, object classification algorithm, and/or any other method for identifying an object. In various embodiments, camera 4100 may reference data (e.g., image data 10308) about a prototype object (field 10304) or about any other object in object table 10300. The second image may be compared to the reference data in order to identify the object in the second image. In various embodiments, a user may assist with identifying an object. For example, a user may view the second image via an app, and may enter or select information about the object.

In various embodiments, camera 4100 does not a priori seek to find any particular object or type of object. Rather, in various embodiments, camera 4100 may seek to identify any object that it finds in the second image. In various embodiments, camera 4100 may identify multiple images in the second image.

In various embodiments, camera 4100 does seek to find a particular object or type of object. In one or more examples, camera 4100 may seek to find artwork. In one or more examples, camera 4100 may seek to find antiques. In one or more examples, camera 4100 may seek to find a skateboard (or any other particular object and/or any other type of object).

In various embodiments, once identified, a record for the object may be created in objects table 10300.

At step 9109, camera 4100 may identify a state of the object in the second image. A state of the object may include the object's color, size (e.g., if the object is a plant), configuration, state of repair, location, orientation, an indication of a possessor of the object, an indication of a user of an object, and/or any other state of the object.

In various embodiments, a state of the object may be of future historical interest. For example, a user admiring a piece of furniture (at some future date) may be informed that the furniture used to be blue, but was later reupholstered in green. A user looking at a toy may be informed that it originally belonged to Sammy, but then was passed down to Joey.

In various embodiments, a state of the object may be of interest for future comparison (e.g., with respect to cleanliness). For example, at a future date, a user may desire to restore an object to an earlier state of shine, sparkle, smoothness, etc.

In various embodiments, a state of the object may be of interest for any suitable or applicable purpose.

At step 9112, camera 4100 may identify a second user in the second image. The second user may be responsible for indicating, designating, and/or otherwise pointing out the object in the first place. In various embodiments, the second user may indicate, designate, and/or otherwise provide information about an object.

In various embodiments, the second user may be identified using facial recognition algorithms, face-detection algorithms, person-detection algorithms, and/or any other suitable algorithms. In various embodiments, the second user may be identified using voice recognition. For example, the second user may speak at or near the second time, when the second image is captured. In various embodiments, the second user may be identified via any biometric, any gesture, or via any other means. In various embodiments, the second user may possess a mobile phone or other electronic device or other device that produces and/or reflects a signal. Such a signal may be used as a signature or other identifier of the second user.

In various embodiments, the object is identified in the second image based on the object's relationship (e.g., physical relationship) to the second user. The object may be identified based on its proximity to the second user, based on its possession by the second user, based on the second user being in contact with the object, based on the second user pointing to the object, based on the second user looking at the object and/or based on any other relationship to the second user.

At step 9115, camera 4100 may determine a gesture made by the second user with respect to the object. In various embodiments, the gesture serves to identify or designate the object (e.g., as an object of historical interest, as an object with which a task may become associated, etc.). In various embodiments, the gesture provides information about the object (e.g., historical information, background information, task information, a target state for the object, and/or any other information).

A gesture may take any form, in various embodiments. A gesture by the second user may include placing his hand on the object, touching the object, lifting the object, looking at the object, pointing at the object, standing next to the object, standing behind the object, holding the object, casting a shadow on the object holding his hands apart from one another (e.g., to indicate a size or measurement associated with the object), and/or making any other gesture. In various embodiments, the second user makes a gesture using an electronic device or other signal emitting (or reflecting) device. Camera 4100 may then identify the gesture based on the location and/or trajectory of the signal source.

Camera 4100 may identify, recognize, and/or interpret gestures in any suitable fashion. In various embodiments, camera 4100 identifies a user's hand (or other body part) and determines the hand's proximity to the object (e.g., determines whether the hand is in contact with the object based on the adjacency in the image of the user's hand to the object). In various embodiments, camera 4100 compares the second image (or a sequence of images) of the second user to one or more reference images, in which a given reference image is associated with a known gesture.

In various embodiments, camera 4100 determines an interaction between the object and the second user. The user may be opening a present containing the object (and thereby having his first interaction with the object). The second user may otherwise be unveiling the object. The user may be playing with the object (e.g., if the object is a toy). The user may be creating the object (e.g., if the object is a work of art, a piece of furniture, a culinary dish, etc.). The user may be watching, holding, wearing, using, sitting on, and/or otherwise interacting with the object, and/or otherwise associating with the object.

In various embodiments, camera 4100 identifies a third user in the second image. The third user may be interacting with the object and/or with the second user. For example, the third user may be gifting the object to the second user, selling the object to the second user, looking at the object with the second user, and/or otherwise interacting with or associating with the object and/or the second user.

In various embodiments, a record may be created in object history table 10400 in which an indication of the second user is stored at field 10412 ("Party 1") and an indication of the third user is stored at field 10416 ("Party 2"). Other fields in table 10400 may be populated as appropriate (e.g., with roles for the second and third users, etc.).

At step 9118, camera 4100 may determine, based on the gesture, the information about the object.

In various embodiments, if the second user first points at the object, then points away into the distance, the user's gesture indicates that the object should be put away (e.g., the user is assigning a task to put the object away). If the user makes small circular hand movements over the object, the user's gesture indicates that the object should be cleaned. If the user points to an object, then crosses his arms in front of his face, then the gesture means the object is dangerous. If the user holds an object to his chest, then the gesture means that the object has high sentimental value. In various embodiments, gestures may have any other predetermined meaning and/or any other meaning. In various embodiments, any other type of gesture may be used.

In various embodiments, camera 4100 determines a gesture by identifying and tracking two parts of a user's body (e.g., two "appendages"). In various embodiments, the two body parts are the user's face, and the user's hand. In various embodiments, camera 4100 determines the distance between the two body parts at any given time, and then tracks this distance over time (e.g., over many instants in time). In various embodiments, the distance between the two body parts is sampled at regular intervals, such as at every 50 milliseconds, at every frame, or over any other suitable interval.

In various embodiments, not only the distance, but the relative positions of the two body parts are tracked over time.

In various embodiments, one of the two body parts may be regarded as fixed (e.g., the user's head may be regarded as fixed). The gesture may then be represented as a function or waveform, with the dependent variable distance as a function of the independent variable time. If full relative positions are tracked, then the independent variable may be position (e.g., a position in x, y, and z coordinates). In various embodiments, the position may be represented as a vector, such as a vector in 1, 2, or 3-dimensional space. Changes in the position of the user's body parts may be represented as a "movement vector".

The process of gesture recognition may thereby be reduced to a process of matching a detected or determined waveform to waveforms for one or more reference gestures. In various embodiments, the reference gesture most closely matching the detected gesture (e.g., having the lowest sum-of-squares difference from the detected gesture) may be regarded as the intended gesture, and the user's meaning may be regarded as the meaning associated with the reference gesture. In various embodiments, detected gestures may be classified as reference gestures in any suitable fashion, such as by using any suitable classification algorithm.

In various embodiments, any two other body parts may be used to determine a gesture (e.g., the left and right hands, etc.). In various embodiments, more than two body parts may be used to determine a gesture. In various embodiments, a gesture may be determined in any other suitable fashion.

Further details on performing gesture recognition can be found in U.S. Pat. No. 9,697,418, entitled "Unsupervised movement detection and gesture recognition" to Shamaie, issued Jul. 4, 2017, e.g., at columns 17-20, which is hereby incorporated by reference.

In various embodiments, the second user may provide information to camera 4100 in any other fashion (e.g., in any fashion besides gestures). In various embodiments, a user provides information via an electronic device, user device and/or peripheral device. A user may interact with an app where the user can enter information about an object. The user may snap a picture of the object using a mobile phone (or other device), designate the object as an object of interest (e.g., as an object for storage in object table 10300), and enter information about the object (e.g., type in information, speak information, etc.). In various embodiments, a user may tag the object (e.g., using an app). The tag may describe or otherwise signify or encapsulate information about the object.

In various embodiments, the second user holds an electronic device near to an object (e.g., touching the object). The camera detects a signal from the electronic device (e.g., a Bluetooth® or Wi-Fi® signal), determines the location of the device, and thereby determines the location of the object. The camera may then capture a picture of the object. In this way, the second user may designate the object. In various embodiments, a user designates an object by placing a marker, pattern, beacon, sticker, signaling device, and/or any other indicator on the object. For example, the user may illuminate the object with the flashlight of his mobile phone. Camera 4100 may detect the resultant spot of light, and may thereby recognize that it should store information about the object on which the light is falling.

In various embodiments, the second user verbally describes information about the object, e.g., within audible range of camera 4100.

In various embodiments, a user wearing a headset may look at an object. The headset may include a camera, which may thereby see the object in its view. The user may designate the object, identify the object, say the name of the table, and/or provide any other information about the object. The camera 4100 may thereby associate information with the object.

In various embodiments, camera 4100 identifies an object and then asks the user to provide information about the object. The user may be asked when the image is captured and/or at a time substantially after the image is captured. For example, when a user is sitting at his home computer, the camera 4100 may communicate with the computer and cause an app on the computer to show images to the user that were captured by the camera. The app may ask the user about the images. For example, the app may provide one or more fields where the user can enter information about the images. In various embodiments, the user may drag tags onto objects in the image in order to tag such objects (e.g., to provide information about such objects).

In various embodiments, a camera 4100 captures an image of an object but does not necessarily recognize the image. The camera may ask the user to identify the object in the image (e.g., to provide a name, type, category, brand, model, use, purpose, etc. for the object).

At step 9121, camera 4100 may store information (which may include state information) in association with the object. Information may include state information (e.g., location, state of repair, orientation, etc.) for the object. Information may include background and/or historical information. In various embodiments, information may be stored in the form of an event, such as in object history table 10400. For example, a user's interaction with an object may be stored as an event. In various embodiments, information may be stored in the form of a tag, such as in tagging table 7300.

In various embodiments, camera 4100 may store actual images or footage of the second user's interaction with the object. The images and/or footage may include gestures made by the second user. In such embodiments, camera 4100 need not necessarily interpret such gestures. Rather, it may be presumed that such gestures will later be recognized by another user (e.g., a first user) to whom the footage is subsequently shown. For example, the first user will know that the gesture is telling the first user to put the object away (e.g., as part of a task).

In various embodiments, information may include a classification and/or category for an object. In various embodiments, an object may be classified as educational. A category or classification may be stored in a table such as table 10300 (classification field not shown), or tagging table 7300 (e.g., where a tag represents the classification).

Information may include task information, which may be stored, e.g., in task table 10500. Information may include tag information, which may be stored, e.g., in tagging table 7300. Information may include any other information about the object, about the second user, about the third user and/or about anything else.

Information may include information on dangers or hazards of an object. In various embodiments, an object may present such hazards as the potential to fall, cut, shock, create a mess, etc. In various embodiments, an object may present a hazard only under certain conditions. For example, a glass object may only be hazardous when a toddler or pet is present and able to reach the object.

In various embodiments, information may include a triggering condition which, when met, may cause a warning, alarm and/or other output to be generated. In various embodiments, a triggering condition may include the presence of a child, the presence of a pet, a predetermined proximity of a child or pet, etc. In various embodiments, a triggering condition may include that a child is heading in the direction of an object, a child is looking at an object, a child is reaching for an object, and/or any other suitable triggering condition.

At step 9124, camera 4100 may capture a first image at a first time that is after the second time. Put another way, the second time may be a "previous time" with respect to the first time. The first image may show a first user and the object (e.g., in the same room with one another, near to one another, touching, etc.). Camera 4100 may capture the first image as part of a video (e.g., as part of routine surveillance video). Camera 4100 may capture the first image in response to a sensor reading (e.g., a motion sensor signals that there is a user in the room, so the camera takes a picture). Camera 4100 may capture the first image for any other reason.

In various embodiments, the first image is captured by a different camera (or different device) than the camera (or device) that captured the second image. The first image may be captured in a different room or different location than the second image. The first image may be captured from a different vantage point than the second image. The object may have moved between the second time when the second image was captured, and the first time when the first image is captured.

At step 9127, camera 4100 may identify the object in the first image. Camera 4100 may identify the object using object recognition algorithms, using a beacon or signaling device placed on the object (e.g., a beacon with a unique identifying signal, an RFID tag) using the sound of an object (e.g., the sound of a wood sculpture as it is placed on a glass table), and/or based on any other property of the object.

In various embodiments, camera 4100 may identify the object using the location of the object. For example, camera 4100 may infer what an object is because of its location. For instance, if an object is on a bookshelf, camera 4100 may infer that it is a book. For example, if an object is on a shoe rack, camera 4100 may infer that it is a shoe. In various embodiments, camera 4100 may retrieve stored data about what object is typically at a given location, and may infer that an object seen at the location corresponds to the object from the stored data.

At step 9130, camera 4100 may identify a first user in the first image. The first user may be a friend, relative and/or other houseguest and/or other user who is looking at the object. The first user may be a child and/or other family member and/or other user. The first user may be a pet. The first user may be one and the same as the second user.

In various embodiments, camera 4100 may identify an interaction of the first user and the object. The interaction may be any sort of interaction as described herein with respect to the second user (and/or with respect to any other user). The first user may be looking at, holding, using, touching, approaching, reaching for, wearing, examining, and/or otherwise interacting with the object.

In various embodiments, camera 4100 may compute a distance or "proximity" from the first user to the object. The distance may be computed in any suitable fashion. In various embodiments, the distance may be computed via triangulation, as described herein. For example, camera 4100 may compute distances and angles to each of the object and the first user, thereby obtaining a "SAS" triangle amongst the object, user, and camera. The distance between the first user and the object may then be computed based on the known sides and angle of the triangle.

In various embodiments, camera 4100 may determine if the distance between the first user and the object is less than or equal to a predetermined proximity threshold (e.g., less than or equal to two feet, less than or equal to zero). In various embodiments, if the distance is less than or equal to a predetermined proximity threshold, a triggering condition may be satisfied, and a signal may subsequently be output (e.g., projected). Various embodiments contemplate other triggering conditions, such as conditions where the user is looking at the object, looking in the direction of the object, gesturing towards the object (e.g., a "movement vector" computed for the motion of the first user's appendages is directed towards the object), holding the object, and/or interacting with and/or relating to the object in some other way. In various embodiments, a triggering condition may trigger the output of a signal. In various embodiments, different signals may be associated with (e.g., output in the event of) different triggering conditions.

At step 9133, camera 4100 may retrieve information (which may include a stored state) associated with the object. Information may include background and/or historical information (e.g., from object table 10300, from object history table 10400; from tagging table 7300), task information (e.g., from task table 10500; e.g., from tagging table 7300), images, video, text, audio, and/or any other information. Information may include a prior location of the object, a prior use of the object, an identity of an individual from which the object was received, historic purchase data for the object, a date of manufacture of the object, and/or a country of manufacture of the object. Information may include a current value of the object, a sales price for the object, a status of the object, a video associated with the object, and/or audio associated with the object.

At step 9136, camera 4100 may output a signal based on the retrieved information. The signal may be output in any form, such as in the form of an audible broadcast, images, video, lighting, light changes, text, smells, vibrations, and/or in any other format. The signal may be output in accordance with notification method 10516.

The signal may be a directed spotlight, laser pointer, or other lighting output or change. The signal may be output from camera 4100 (e.g., from display 4146, speaker 4110, light 4142*a*/4142*b*, optical fibers 4172*a*/4172*b*, projector 4176, laser pointer 4178, smell generator 4180, vibration generator 4182), from a separate speaker, display screen, projector, laser, light, and/or from any other device.

In various embodiments, the signal may be output in such a way that it is likely to be perceived by the first user. For example, the signal may be a tag or text projected on a wall in front of the first user. For example, an audio signal may be output at sufficient volume as to be heard by a user (e.g., taking into account the user's proximity to camera 4100 or other audio output device, taking into account ambient noise levels, etc.).

In various embodiments, outputting a signal may include printing a document. For example, if there is a task associated with an object, camera 4100 may cause a printer to print a document describing the task (e.g., the goal of the task, instructions for performing the tasks, etc.). In various embodiments, outputting a signal may include sending an email, text message, electronic document, and/or any other communication.

In various embodiments, the signal may convey information (e.g., literal information about the object). For example, the signal may be a picture of the object as it was 5 years ago. For example, the signal may be text describing the date and circumstances of when the object was first acquired.

In various embodiments, the signal may convey information associated with a task. The signal may provide instructions (e.g., projected text, e.g., audible instructions) describing the task and/or how to perform the task. In various embodiments, the signal may convey information about a reward associated with the task (e.g., from field 10518). In various embodiments, the signal may convey any other information associated with a task.

In various embodiments, the signal represents an action or a part of an action that camera 4100 is taking based on the information. If there is a task associated with the object (e.g., as stored in table 10500), then the signal may follow or conform to the notification method 10516. In various embodiments, a signal is a laser beam, a laser pulse, a spotlight, or the like, that shines on the object. The resultant laser dot appearing on the object may convey to the user that there is a task associated with the object. In various embodiments, a signal is a laser beam, etc. that shines on another location, such as a location where the object should be put away, on another object with which the object is associated (e.g., a laser may alternately shine on three sculptures to show that the three are part of a set by the same artist), on a tool that the user needs to perform a task (e.g., on a screwdriver, on cleaning equipment), on a location where the object should not be placed (e.g., on a little shelf accessible to a child), on a place where the object should be connected or plugged in (e.g., an outlet where the object should be plugged in, a USB drive where the object should be connected, etc.), and/or any other location or object pertinent to the task.

In various embodiments, a signal describes a game in which the object will play a part. For example, the object may be a pillow and the game may involve 3 pillows (including the object), with the objective of stacking the three pillows in a particular arrangement. The signal may include a diagram or a rendering (e.g., projected on a wall) of how the pillows should be arranged. The signal may include a spotlight or other illumination of places where the pillows should be placed (e.g., in a row on a floor). The signal may include any other instructions or specifications for playing a game.

In various embodiments, a game is a geography-based game where a user must indicate a particular location or set of locations on a map. In various embodiments, the user must indicate a location using an object. For example, the user must toss the object (e.g., a beanbag) at a rendering of a map, and try to hit the geographic location of interest (e.g., Mount Everest). Various geographic game challenges may include showing where the "ring of fire" is located, locating a desert, pointing out a water-based route between two cities, etc.

In various embodiments, a user may interact with a map by casting a shadow on the map. For example, a user is asked to indicate the location of the state of Arkansas by casting a shadow onto that state on a map (e.g., on a projected map). In various embodiments, a user may interact with a map by pointing a laser pointer at the map, or in any other fashion.

In various embodiments, a game is an anatomy based game where the user is asked to point out bones, organs, limbs, and/or other anatomical features.

In various embodiments, the signal is a tone, a chime, a flashing light, or some other signal that may get a user's attention. In various embodiments, a signal may convey that there is danger or a warning associated with an object (e.g., a fragile object is near the edge of a table, a toddler is near a wall socket, a window is open during a storm, a pot is boiling over, a pipe is leaking, a door is unlocked at night, etc.).

In various embodiments, a signal may distract a pet, toddler, etc. from a potentially dangerous, destructive, or messy situation or encounter. For example, if a toddler is approaching a potted plant, camera 4100 may anticipate that the toddler could knock the plant over, and may therefore shine a laser pointer at a nearby toy to draw the toddler's attention to the toy. In various embodiments, camera 4100 need not necessarily anticipate a particular event, but rather may simply output a signal based on stored information or instructions. E.g., instructions associated with the plant may specify that, whenever a toddler is within 3 feet, a tone should be played, and a spotlight shined on the toy nearest the plant.

In various embodiments, camera 4100 attempts to divert an individual (e.g., user, toddler, pet) from an object by creating a distraction at least a threshold distance (e.g., a "threshold offset value") from the object. For example, camera 4100 attempts to create a distraction at least six feet away from the object. To do so, camera 4100 may determine, in an image, a first vector between the object and the individual (e.g., user, toddler, pet), which may represent a first distance and a first direction separating the object and the individual. Camera 4100 may also identify at least one location in the image that defines a second vector with the individual. The second vector may represent a second distance and a second direction separating the location and the individual. The location is where camera 4100 will create the distraction (e.g., by projecting a laser pointer or other light to the location). As such, the camera may identify the location such that the second vector is offset from the first vector by at least a threshold offset value, e.g., the distraction is at least the threshold offset value away from the object. The camera may then determine a direction ("bearing") from an output device (e.g., a laser pointer, light, etc.) to the location. The camera may then cause the output device to project a signal (e.g., the distracting signal) in accordance with the bearing (e.g., in the direction of the bearing).

At step 9139, camera 4100 may verify performance of a task (e.g., a task assigned via a signal and/or otherwise associated with the signal). The camera may take a third image. The camera may identify the object in the third image. The camera may determine a location, position, configuration, and/or other state of the object. If the determined state matches target state 10510 associated with the task, then camera 4100 may determine that the task has been completed. Camera 4100 may accordingly update completion field 10522 in table 10500 with the completion date.

At step 9142, camera 4100 may provide a reward. In various embodiments, if the task has been completed by deadline 10514, then camera 4100 may cause reward 10518 to be provided to assignee 10508. For example, camera 4100 may cause a stored value account associated with the assignee to be credited. Camera 4100 may notify the assignor 10506 that the task has been completed.

In various embodiments, once a task has been completed, camera 4100 may notify assignee 10508 of another task, such as the highest priority (field 10520) task that has been assigned to the assignee, and which has not yet been completed.

Referring to FIG. 92, a diagram of an example 'Video feed display cell' table 9200 according to some embodiments is shown. Table 9200 may store an indication of where on a viewing participant's screen is shown a particular feed (e.g., a video feed from another participant). For example, supposing Bob is logged into a video conference and sees the video of another participant, Sue, then table 9200 may store an indication that Sue's video appeared in the upper left-hand corner of Bob's screen.

Table 9200 may be useful, for example, in associating tags with meeting participants. For example, if Bob drags a tag to the upper left-hand corner of his screen, then table 9200 may be used to determine that Sue's video was then being displayed in the upper left-hand corner of his screen, and so the tag was intended for Sue. In various embodiments, a tag may be associated with anything in a feed or video (e.g., with a presentation), not just with another participant.

Feed location ID field 9202 may include an identifier (e.g., unique identifier) for circumstances under which a particular feed was displayed at a particular location on a screen. Meeting ID field 9204 may store an indication of a meeting. The meeting may be the meeting during which a feed appears (e.g., and is viewed).

Time field 9206 may store an indication of a date and/or time during which a feed appears at a particular location. This may be significant, for example, because the location of a participant's feed may change over the course of a call (e.g., as participants come and go).

Displayed participant field 9208 may store an indication of a participant who appeared in a feed (e.g., a video feed). In various embodiments, if the feed represents a presentation, video, or other object, then an identifier for such object may be stored in field 9208.

Location field 9210 may store an indication of a location of a feed on a screen. A location may be specified using any suitable units, such as pixels, inches, percentage of the screen, etc. In various embodiments, a screen or display window is assumed to be divided into a grid having some known width and some known height (e.g., a 5×5 grid). A grid location may be represented using a coordinate system, such as a letter of the alphabet to represent one dimension, and a number to represent the other dimension. Accordingly, "a1" may represent one corner of a 5×5 grid, while "c3" may represent the center of the grid. A grid location may be represented in any suitable fashion.

Screen arrangement field 9212 may store an indication of an arrangement of feeds on a screen or display window. If feeds are arranged in a grid formation, then the arrangement may be specified in terms of the dimensions of the grid (e.g., 3×4 may indicate an arrangement of three rows by four columns, or up to 12 feeds). In various embodiments, other arrangements are possible, such as a circular arrangement of feeds, hexagonal tiling of feeds, irregular arrangement, etc. In such cases, an arrangement may be specified in any suitable fashion (e.g., by indicating a specific location of each feed).

Viewing participant field 9214 may store an indication of a participant viewing the feed. In various embodiments, the viewing participant may place a tag on a particular feed, and the tag may then become associated with the displayed participant featured in that feed.

Figure 93:
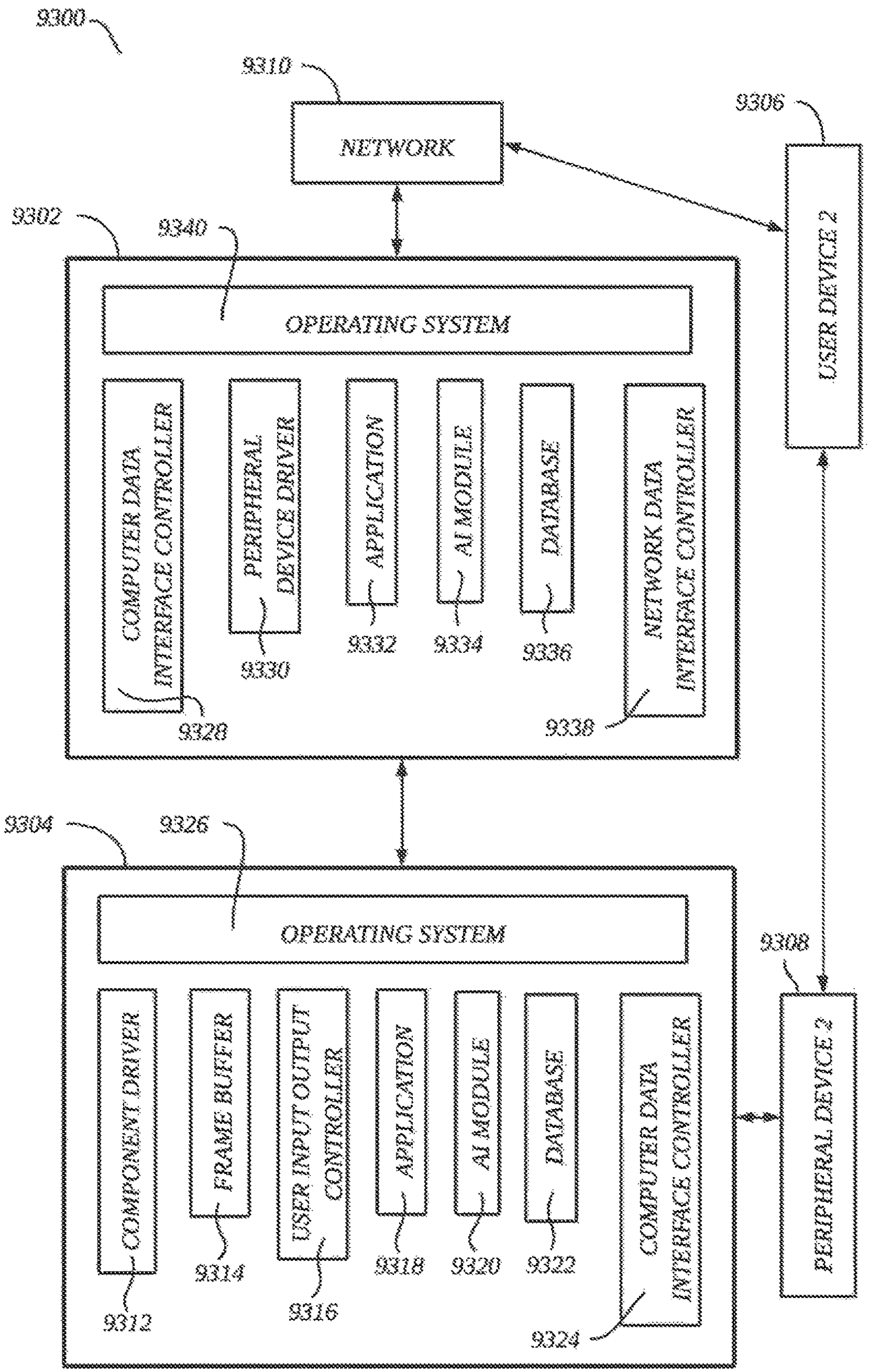
FIG. 93 is a block diagram of a system consistent with at least some embodiments described herein.

Turning now to FIG. 93, a block diagram of a system 9300, including devices with software modules, is shown according to some embodiments. System 9300 includes a first user device 9302 (e.g., a personal computer; e.g., a laptop computer), a first peripheral device 9304 (e.g., mouse, keyboard, camera, presentation remote, headset), a second user device 9306, and a second peripheral device 9308 (e.g., mouse, keyboard, camera, presentation remote, headset). One or more of devices 9302, 9304, and 9306 may be connected to a network (e.g., network 9310). Also, the first peripheral device 9304 may be in communication with the first user device 9302 (e.g., via a cable, via Wi-Fi® connection), and the second peripheral device 9308 may be in communication with the second user device 9302. Also, the first peripheral device 9304 may be in communication with the second peripheral device 9308 as will be appreciated, the depicted devices represent some exemplary devices, and system 9300 may include more or fewer devices, in various embodiments. Also, various embodiments contemplate that any combination of devices may be in communication with one another.

In various embodiments, a message is sent from the first peripheral device 9304 to the second peripheral device 9308. For example, the message may be a congratulatory message being sent from the owner of peripheral device 9304 to the owner of peripheral device 9308. The message may have any other form or purpose, and various embodiments.

The message originating from peripheral device 9304 may be transmitted via user device 9302, network 9310, and user device 9306 before reaching peripheral device 9308. At peripheral device 9308, the message may be output to a user in some fashion (e.g., a text message may be displayed on a screen of peripheral device 9308; e.g., an audible message may be broadcast from a speaker of a headset). In various embodiments, the message originating from peripheral device 9304 may be transmitted via network 9310, and via user device 9306 before reaching peripheral device 9308. In various embodiments, the message originating from peripheral device 9304 may be transmitted directly to peripheral device 9308 (e.g., if peripheral device 9304 and peripheral device 9308 are in direct communication).

In various embodiments, as a message is conveyed, the form of the message may change at different points along its trajectory. The message may be represented in different ways, using different technologies, using different compression algorithms, using different coding mechanisms, using different levels of encryption, etc. For example, when originally created, the message may have the form of electrical impulses read from a mouse button (e.g., impulses representing the pressing of the button). However, within the peripheral device 9304, the electrical impulses may be interpreted as discrete bits, and these bits, in turn, interpreted as alphanumeric messages. Later, when the message is transmitted from the user device 9302 to the network, the messages may be modulated into an electromagnetic wave and transmitted wirelessly.

Various embodiments include one or more modules (e.g., software modules) within devices 9304, 9302, 9306, and 9308. In various embodiments, such modules may contribute to the operation of the respective devices. In various embodiments, such modules may also interpret, encode, decode, or otherwise transform a message. The message may then be passed along to another module.

Modules may include programs (e.g., program 455), logic, computer instructions, bit-code, or the like that may be stored in memory (e.g., in storage device 445) and executed by a device component (e.g., by processor 405). Separate modules may represent separate programs that can be run more or less independently of one another and/or with some well-defined interface (e.g., API) between the programs.

Operating system 9326 may be a module that is capable of interfacing with other modules and/or with hardware on the peripheral device 9304. Thus, in various embodiments, operating system 9326 may serve as a bridge through which a first module may communicate with a second module. Further, operating system 9326 may coordinate the operation of other modules (e.g., by allocating time slices to other modules on a processor, such as processor 405). Further, operating system 9326 may provide and/or coordinate access to common resources used by various modules. For example, operating system 9326 may coordinate access to memory (e.g., random access memory) shared by other modules. Exemplary operating systems may include Embedded Linux™, Windows® Mobile Operating System, RTLinux™, Windows® CE, FreeRTOS, etc.

Component driver 9312 may serve as an interface between the operating system and an individual hardware component. As depicted, peripheral device 9304 includes one component driver 9312, but various embodiments contemplate that there may be multiple component drivers (e.g., one component driver for each component of the device). A component driver may translate higher level instructions provided by the operating system 9326 into lower-level instructions that can be understood by hardware components (e.g., into instructions that specify hardware addresses, pin numbers on chips, voltage levels for each pin, etc.). A component driver may also translate low level signals provided by the component driver into higher level signals or instructions understandable to the operating system.

Frame buffer 9314 may store a bitmap that drives a display (e.g., screen 435). When another module (e.g., application 9318) wishes to output an image to a user, the module may generate a bitmap representative of the image. The bitmap may then be transmitted to the frame buffer (e.g., via the operating system 9326). The corresponding image may then appear on the display. If another module (e.g., application 9318) wishes to output a video to a user, the module may generate a sequence of bitmaps representative of sequential frames of the video. These may then be transmitted to the frame buffer for display one after the other. In various embodiments, the frame buffer may be capable of storing multiple images at once (e.g., multiple frames of a video), and may thereby ensure that video playback is smooth even if there are irregularities in transmitting the video bitmaps to the frame buffer.

User input/output controller 9316 may serve as an interface between the operation system 9326 and various input and output devices on the peripheral. As depicted, peripheral device 9304 includes one user input/output controller 9316, but various embodiments contemplate that there may be multiple user input/output controllers (e.g., one controller for each input device and output device on the peripheral). A user input/output controller provides an interface that allows other modules (e.g. application 9318) to retrieve data or messages from an input device (e.g. the left button was clicked). The user input/output controller also provides an interface that allows other modules (e.g. application 9318) to send data or commands to an output device (e.g. vibrate the peripheral). The data or messages sent via this controller may be modified so as to translate module level data and commands into ones compatible with the input and output devices.

Application 9318 may be any computer code run in the operating system 9326 that runs algorithms, processes data, communicates with various components, and/or sends messages. As depicted, peripheral device 9304 includes one application 9318, but various embodiments contemplate that there may be multiple applications (e.g. one application to send messages to peripheral device 9308 and another that plays a video on screen 435). Applications may be run independently but may share resources (e.g. two applications running may both use database 9322 to read and store data).

AI Module 9320 may process various data input sources (e.g. input device 420) to learn and predict user behavior. The AI Module may apply various heuristics and algorithms to parse the input data to construct and update models that can predict future input (e.g. predict when the next mouse click will come) or prepare a custom output (e.g., display a congratulatory message on screen 435 when a user completes a new level in a game). The module may use database 9322 to read saved models, create new models, and update existing ones that are stored on storage device 445.

Database 9322 may serve as an interface to structured data on storage device 445. The database module provides an abstraction to other modules to allow high level read and write requests for data without knowledge of how the data is formatted on disk. As depicted, peripheral device 9304 includes one database 9322, but various embodiments contemplate that there may be multiple databases (e.g., one storing click history and another an AI model). The database may store data in any format (e.g. relational database) and may be stored in multiple files and locations on storage device 445. A database may also access remote data, either on user device 9302 or in the cloud via network 9310. The database may restrict access to data to certain modules or users and not allow unauthorized access.

Computer data interface controller 9324 may serve as an interface between the peripheral 9304 and the attached user device 9302 or peripheral device 9308. The interface controller allows messages and data packets to be sent in both directions. When another module (e.g., application 9318) wishes to send a message to a remote device, the module would use the API provided by the computer data interface controller 9324 to do so. The interface controller collects messages and data packets received by the peripheral and transmits them via operating system 9326 to the module that made the request or that is necessary to process them.

User device 9302 may include one or more modules, e.g., operating system 9340, computer data interface controller 9328, peripheral device driver 9330, application 9333, AI module 9334, database 9336, and network interface controller 9338. In various embodiments, user device 9302 may contain more or fewer modules, and may contain more or fewer instances of a given module (e.g., the user device may contain multiple application modules).

Operating system 9340 may have an analogous function on user device 9302 as does operating system 9326 on peripheral device 9304. Exemplary operating systems include Apple® macOS, Microsoft® Windows™, and Linux™.

Computer data interface controller 9328 may serve as an interface between the user device 9302 and the peripheral device 9304. Computer data interface controller 9328 may have an analogous function to computer data interface controller 9324 in the peripheral device 9304.

Peripheral device driver 9330 may translate unique or proprietary signals from the peripheral device 9304 into standard commands or instructions understood by the operating system 9340. The peripheral device driver may also store a current state of the peripheral device (e.g., a mouse position). Peripheral states or instructions may be passed to operating system 9340 as needed, e.g., to direct progress in application 9332.

In various embodiments, peripheral device driver 9330 may translate messages from an application or other module into commands or signals intended for the peripheral device 9304. Such signals may direct the peripheral device to take some action, such as displaying text, displaying an image, activating an LED light, turning off an LED light, disabling a component of the peripheral device (e.g., disabling the left mouse button), enabling a component of the peripheral device, altering the function of the peripheral device, and/or any other action.

Application 9332 may include any program, application, or the like. Application 9332 may have an analogous function to application 9318 on the peripheral device 9304. In various embodiments, application 9332 may include a user-facing application, such as a spreadsheet program, a video game, a word processing application, a slide program, a music player, a web browser, or any other application.

AI module 9334 and database 9336 may have analogous functions to AI module 9320 and database 9322, respectively, on the peripheral device 9304.

Network interface controller 9338 may serve as an interface between the user device 9302 and the network 9310. In various embodiments, network interface controller 9338 may serve as an interface to one or more external devices. The interface controller 9338 may allow messages and data packets to be sent in both directions (e.g., both to and from user device 9302). When another module (e.g., application 9332) wishes to send a message over network 9310 and/or to a remote device, the module may use an API provided by the network data interface controller 9338 to do so. The interface controller 9338 may collect messages and data packets received by the user device and transmit them via operating system 9340 to the module that made the request or that is necessary to process them.

Although not shown explicitly, user device 9302, peripheral device 9304, central controller 110, and/or any other device may include such modules as: a text to speech translation module; a language translation module; a face recognition module; and/or any suitable module.

Although not shown explicitly, user device 9306 may have a similar set of modules as does user device 9302. Although not shown explicitly, peripheral device 9308 may have a similar set of modules as does peripheral device 9304.

Figure 94:
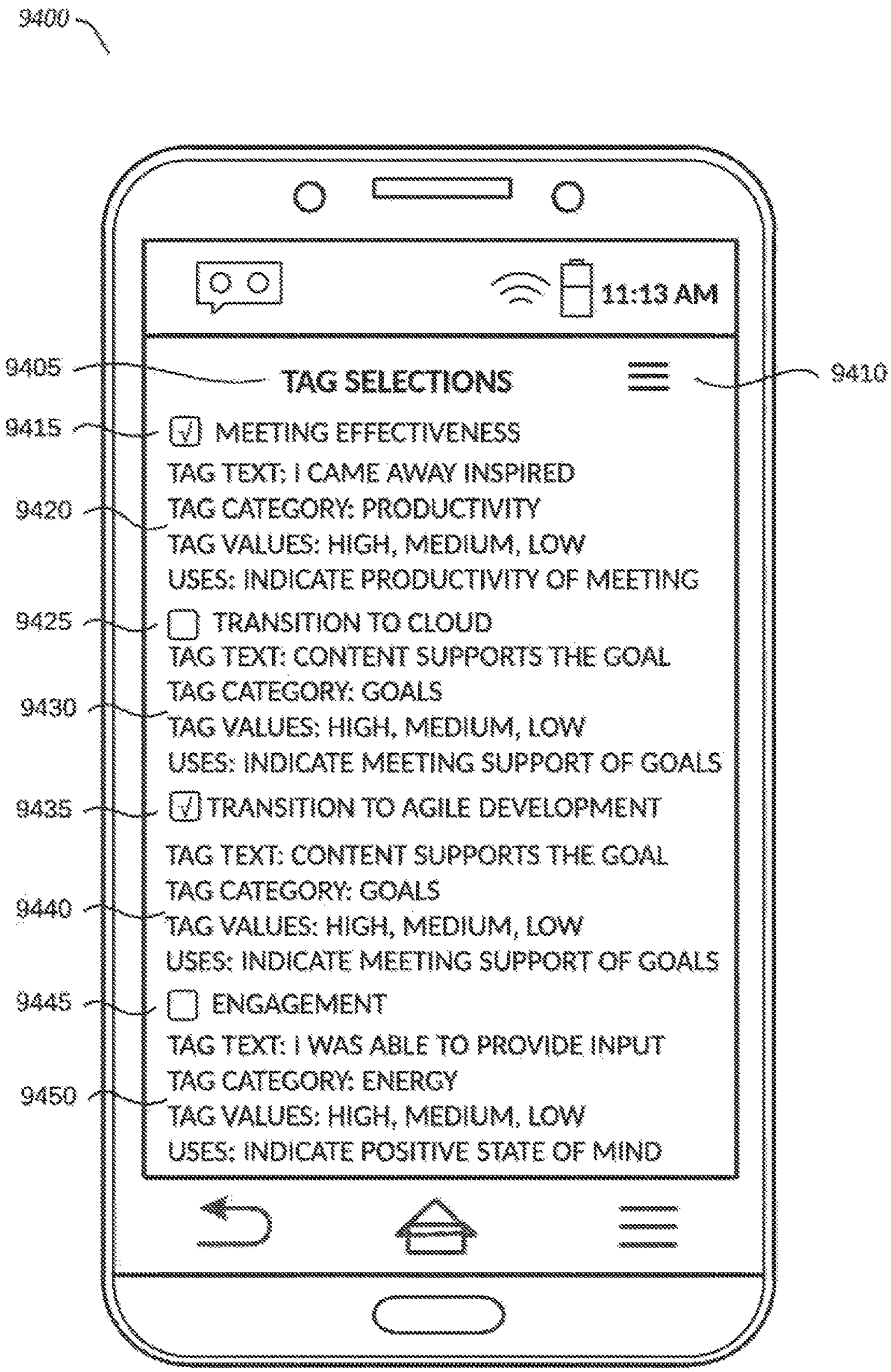
FIG. 94 is user interface of an app consistent with at least some embodiments described herein.

With reference to FIG. 94, a screen 9400 from an app controlled by users according to some embodiments is shown. The depicted screen shows a 'Tag selections' 9405 functionality that can be employed by a user (e.g. meeting owner, meeting facilitator, meeting participant, employee, project manager, facilities manager, game player, teacher, tutor) to select tags that can later be applied (e.g., tags that will later be available for application). In various embodiments, the tags may be available for an upcoming meeting. In various embodiments, the tags may be available indefinitely, until selections are changed, for some fixed period of time, etc. In various embodiments, tag availability may constitute a rule for using the tag. In various embodiments, tag availability data may be stored in 'Tag meanings and representations' table 6300. In FIG. 94, the app is in a mode whereby users can select tags for later application.

In some embodiments, the user may select from a menu 9410 which displays one or more different modes of the software. In some embodiments, modes include 'tag selections', 'tag rules', 'placing tags', 'choosing tags', 'responding to tags', 'upvoting tags', etc.

At 9415 is shown a tag name or other identifier (e.g., "Meeting effectiveness"), and an associated checkbox. By checking the box, an app user is able to select the tag and make it available for later use. At 9420 is shown additional information about the tag, including tag text (e.g., "I came away inspired"), a tag category (e.g., "Productivity"), possible values (e.g., degrees or levels) that the tag may assume (e.g., "high", "medium", or "low"), and possible or suggested uses of the tag (e.g., to "Indicate productivity of meeting"). The additional information may provide the app user with more context while deciding upon selection of a tag. In various embodiments, an app user is able to modify or customize tags, such as selecting more or fewer values that the tag may assume (e.g., only selecting "high" and "low" levels).

At 9425, 9435, and 9445 are shown additional tag names and associated checkboxes. At 9430, 9440, and 9450 are shown additional information, respectively, about tags 9425, 9435, and 9445.

As depicted, tags 9415 and 9435 are checked off, meaning only these two tags are currently selected by the app user.

In various embodiments, the depicted screen 9400 and/or the associated app may allow a user to select additional tags. In various embodiments, more or fewer tags may be depicted.

In various embodiments, different tags may be depicted. In various embodiments, a user is able to sort available tags by one or more fields (e.g., by "Tag text", by "Tag category", etc.), to filter tags, to perform searches (e.g., text searches), etc. This may allow a user to find a particular tag more easily (e.g., when there are too many tags to fit on screen 9400).

In various embodiments, screen 9400 may allow a user to select a particular meeting in which tags will apply. For example, the screen may provide one or more buttons, each representative of a meeting (e.g., a scheduled upcoming meeting). The user may then activate one or more buttons in order to select the corresponding meeting(s). Previously selected tags may then apply to the selected meeting.

In various embodiments, when the user hits a 'Submit tag availability' button, or the like, the app may transmit (e.g., to the central controller) an indication of the checked tags. Once tag availability has been submitted, the tag availability rules may be stored in a table (e.g., table 6300) or other data structure.

Referring to FIG. 95, a diagram of an example 'Peripheral component types' table 9500 according to some embodiments is shown. Peripheral component types table 9500 may store information about types of components that may be used in peripherals. Such components may include hardware output devices like LED lights, display screen, speakers, etc. Such components may include sensors and input devices, like pressure sensors, conduction sensors, motion sensors, galvanic skin conductance sensors, etc.

Component type identifier field 9502 may store an identifier (e.g., a unique identifier) for a particular type of component. Component description field 9504 may store a description of the component. This may indicate (e.g., in human-readable format) what the component does, what the function of the component is, what type of output is provided by the component, what type of input can be received by the component, what is the sensitivity of the component, what is the range of the component's abilities, and/or any other aspect of the component. For example, a component description may identify the component as an LED light, and may indicate the color and maximum brightness of the LED light.

Manufacturer field 9506 may store an indication of the component's manufacturer. Model field 9508 may store an indication of the component model. This may be a part number, brand, or any other model description.

In various embodiments, information in table 9500 may be useful for tracking down component specifications and/or for instructions for communicating with a component.

Referring to FIG. 96, a diagram of an example 'Peripheral component address table'table 9600 according to some embodiments is shown. Peripheral component address table 9600 may store information about particular components that are used in particular peripheral devices. By providing a component address, table 9600 may allow a processor 405 and/or component driver 9312 to direct instructions to a component and/or to interpret the origination of signals coming from the component.

Component identifier field 9602 may store an identifier (e.g., a unique identifier) for a particular component (e.g., for a particular LED light on a particular mouse). Component type field 9604 may store an indication of the component type (e.g., by reference to a component type listed in table 9500). Reference name field 9606 may store a description of the component, which may include an indication of the component's location on or within a peripheral device. Exemplary reference names include "Left light #1", "right LED #2", "Front speaker", and "Top left pressure sensor". For example, if there are two LED lights on the left side of a mouse, and two LED lights on the right side of a mouse, then a reference name of "Left light #1" may uniquely identify a component's location from among the four LED lights on the mouse.

Address field 9608 may store an address of the component. This may represent a hardware address and/or an address on a signal bus where a component can be reached.

Referring to FIG. 97, a diagram of an example 'Peripheral component signal' table 9700 according to some embodiments is shown. Peripheral component signal table 9700 may store an indication of what signal is needed (e.g., at the bit level) to achieve a desired result with respect to a type of component. For example, what signal is needed to turn on an LED light. Table 9700 may also indicate how to interpret incoming signals. For example, table 9700 may indicate that a particular signal from a particular button component means that a user has pressed the button.

Signal identifier field 9702 may store an identifier (e.g., a unique identifier) for a particular signal. Component type field 9704 may store an indication of the component type for which the signal applies.

Incoming/Outgoing field 9706 may store an indication of whether a signal is outgoing (e.g., will serve as an instruction to the component), or is incoming (e.g., will serve as a message from the component). Description field 9708 may store a description of the signal. The description may indicate what the signal will accomplish and/or what is meant by the signal. Exemplary descriptions of outgoing signals include "turn the light on" (e.g., an instruction for an LED component), "Turn the light on dim", and "tone at 440 Hz for 0.5 seconds" (e.g., an instruction for a speaker component).

Signal field 9710 may store an actual signal to be transmitted to a component (in the case of an outgoing signal), or a signal that will be received from a component (in the case of an incoming signal). As depicted, each signal is an 8-bit binary signal. However, various embodiments contemplate that a signal could take any suitable form. In the case of an outgoing signal, when a component receives the signal, the component should accomplish what is indicated in the description fields 9708. In the case of an incoming signal, when the signal is received (e.g., by component driver 9312), then the signal may be interpreted as having the meaning given in description field 9708.

In various embodiments, a complete instruction for a component includes a component address (field 9608) coupled with a signal (field 9710). This would allow a signal to reach the intended component, (e.g., as opposed to other available components). The component could then carry out a function as instructed by the signal.

Figure 98A:
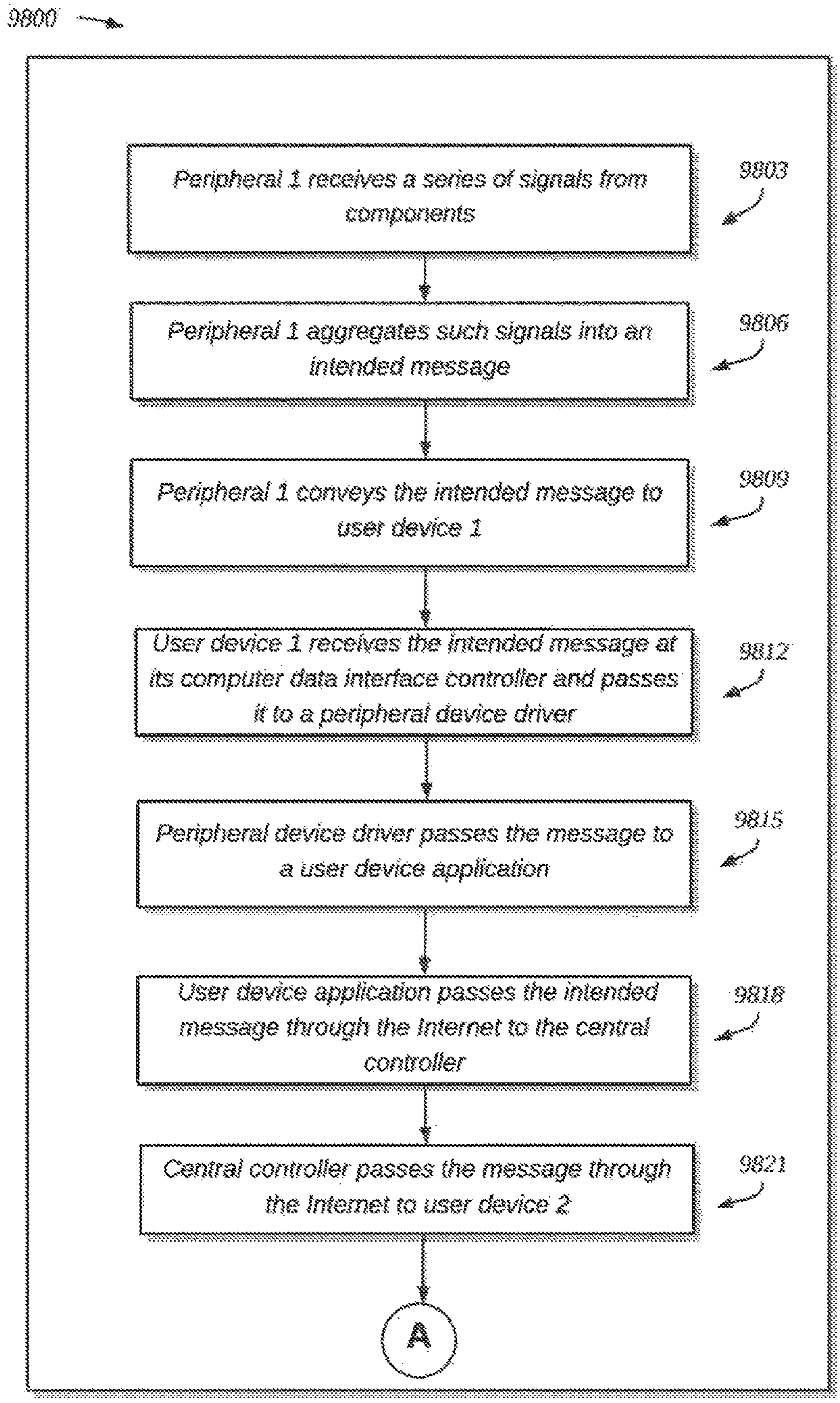
FIG. 98A and FIG. 98B together show a diagram of a process flow consistent with at least some embodiments described herein.
Figure 98B:
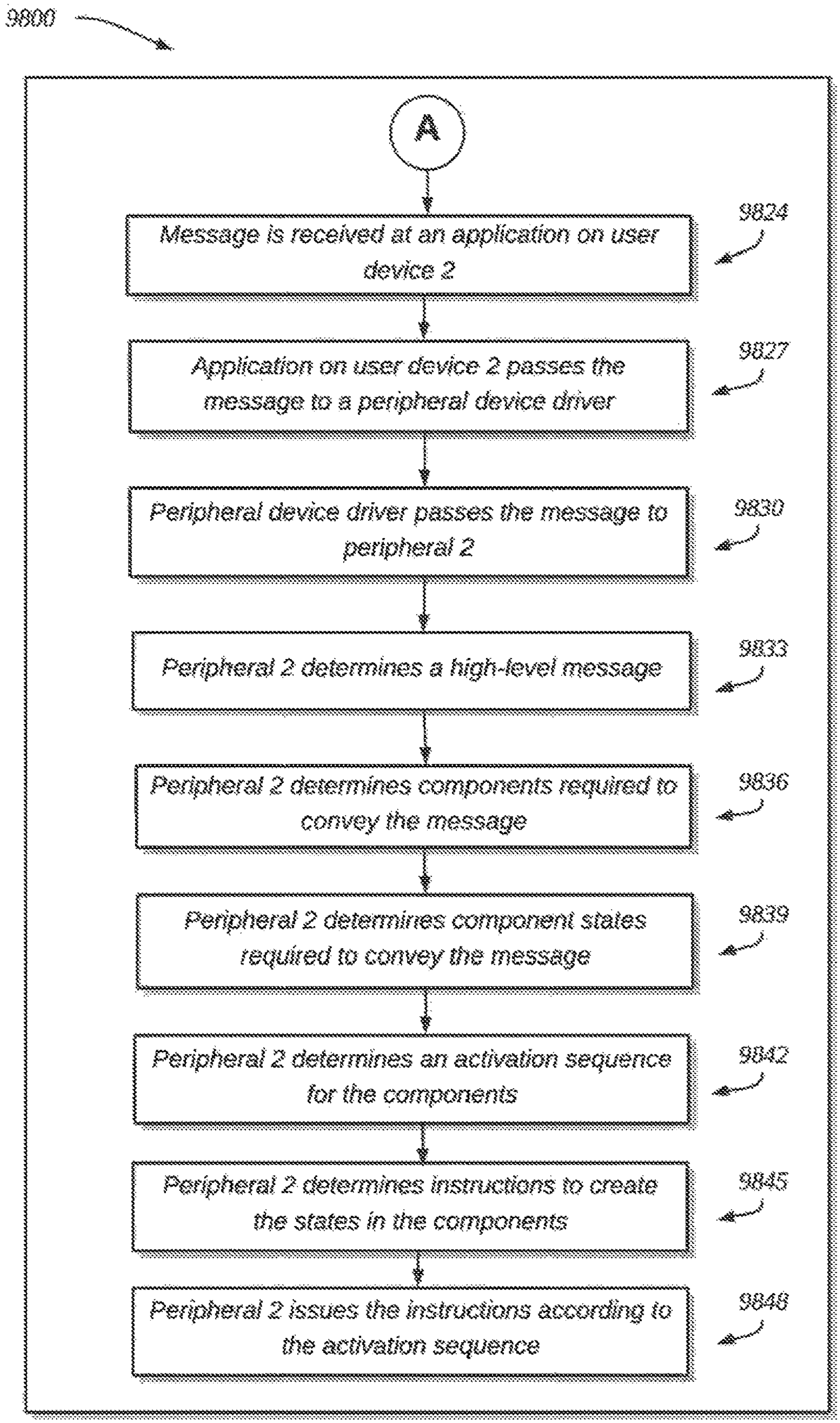

Referring now to FIG. 98, a flow diagram of a method 9800 according to some embodiments is shown. Method 9800 details, according to some embodiments, the trajectory of a message entered by a first user into a first peripheral ("peripheral 1") 9304 as it travels to a second peripheral ("peripheral 2") 9308 where it is conveyed to a second user. En route, the message may travel through a first user device ("user device 1") 9302, and a second user device ("user device 2") 9306. For the purposes of the present example, the message transmitted is a text message with the text "Good going!". However, various embodiments contemplate that any message may be used, including a message in the form of an image, video, vibration, series of movements, etc.

At step 9803, peripheral 1 receives a series of signals from components. These may be components of the peripheral device such as input device 420. Exemplary signals originate from button clicks (e.g., button clicks by a user), key presses, scrolls of a mouse wheel, movements of a mouse, etc.

Initially, signals may be received at component driver module 9312. As the signals are incoming signals (i.e., incoming from components), table 9700 may be used to interpret the meaning of such signals (e.g., "click of the right mouse button"). In various embodiments, signals are received at 'user input output controller' 9316. In various embodiments, signals received at component driver module 9312 are then passed to 'user input output controller' 9316, e.g., by way of operating system 9326.

At step 9806 peripheral 1 aggregates such signals into an intended message. Thus far, peripheral 1 only recognizes the received signals as a collection of individual component activations (e.g., as a collection of clicks). At step 9806, peripheral 1 may determine an actual message (e.g., a human-interpretable message; e.g., a text message) that is represented by the component activations.

The component driver 9312 or the user inputs/output controller 9316 may pass its interpretation of the incoming signals to the application 9318. The application may then aggregate, combine, or otherwise determine a message intended by the signals. Application may reference 'Generic actions/messages' table 2500 or 'Mapping of user input to an action/message'table 2600 in database 9322, in order to determine an intended message. In various embodiments, the signals may represent characters or other elementary components of a message, in which case such elementary components need only be combined (e.g., individual characters are combined into a complete text message). In various embodiments, a message may be determined using any other data table, and/or in any other fashion.

In various embodiments, there may not necessarily be a precise correspondence between incoming signals and a message. For example, mouse movements (e.g., gestures) may be representative of words or concept in American Sign Language. However, the precise boundaries between a gesture representing one concept and a gesture representing another concept may not be clear. In such cases, AI module 9320 may be used to classify a mouse movement as representative of one concept versus another concept. In various embodiments, AI module 9320 may be used in other situations to classify signals into one intended meaning or another.

At step 9809 peripheral 1 conveys the intended message to user device 1. Once application 9318 has determined the intended message, the application may pass the message to the computer data interface controller 9324. The message may then be encoded and transmitted to user device 1 (e.g., via USB, via firewire, via Wi-Fi®, etc.).

At step 9812 user device 1 receives the intended message at its computer data interface controller 9328. The received message may then be passed to peripheral device driver 9330, which may need to transform the message from a format understood by the peripheral device 9304 into a format understood by user device 9302 (e.g., by the operating system 9340 of user device 9302).

At step 9815 the peripheral device driver passes the message to a user device application (e.g., application 9332). In various embodiments, in accordance with the present example, application 9332 may be a messaging application that works in coordination with peripheral device 9304. The messaging application may maintain a running transcript of messages that have been passed back and forth to peripheral device 9304. In this way, for example, a user may scroll up through the application to see old messages in the conversation. However, in various environments, application 9332 on the user device may serve only as a relayer of messages.

At step 9818 the user device application passes the intended message through the Internet to the central controller 110. Application 9332 may initially pass the message to the network data interface controller 9338, where it may then be encoded for transmission over network 9310. In various embodiments, application 9332 may include an intended recipient and/or recipient address along with the message.

At step 9821 the central controller passes the message through the Internet to user device 2 (e.g., to user device 9306). In various embodiments, the central controller 110 may also log the message (e.g., store the message in a data table such as 'Peripheral message log' table 2400).

At step 9824 the message is received at an application on user device 2. The message may initially arrive at a network data interface controller of 'user device 2' 9306 before being decoded and passed to the application.

At step 9827 the application on user device 2 passes the message to a peripheral device driver.

At step 9830 the peripheral device driver passes the message to peripheral 2. In various embodiments, the peripheral device driver may pass the message by way of a computer data interface controller. Peripheral 2 may receive the message at its own computer data interface controller, where the message may be decoded and then passed to an application on peripheral 2.

At step 9833 peripheral 2 determines a high-level message. In various embodiments, a high-level message may be determined in an application. Example messages may include, display the text "Good going!", create a "wave" of green LEDs, output an audio jingle with the notes "C-C-G-G-A-A-G", etc.

At step 9836 peripheral 2 determines components required to convey the message. For example, if a message includes text or images, then a display screen, an LCD display, or any other suitable display may be used to convey the message. In various embodiments, if a message is text, then the message may be conveyed by depressing or lighting keys on a keyboard peripheral. If the message involves lights (e.g., sequences of light activation), then LEDs may be used to convey the message. If the message involves audio, then a speaker may be used to convey the message. In various embodiments, a message may be intended for more than one modality, in which case multiple components may be required.

Peripheral 2 may determine available components with reference to a database table, e.g., to table 9600. Table 9600 may also include component locations, so that peripheral 2 may determine the geometrically appropriate component required to convey a message (e.g., peripheral 2 may determine which is the frontmost LED as required by a message). In various embodiments, the application on peripheral 2 may determine the required components.

At step 9839 peripheral 2 determines component states required to convey the message. Component states may include whether a component is on or off, the intensity of an output from a component, the color of an output, the degree of depression of a key, and/or any other state. Exemplary component states include a light is green, a light is red, a light is dim, the "x" key is depressed by 1 mm, etc. In various embodiments, the application on peripheral 2 may determine the required component states.

At step 9842 peripheral 2 determines an activation sequence for the components. An activation sequence may specify which component will activate first, which will activate second, and so on. In various embodiments, an activation sequence may specify a duration of activation. In various embodiments, two or more components may be activated simultaneously and/or for overlapping periods. In one example, an LED goes on for five seconds, then a haptic sensor starts vibrating, etc. In various embodiments, the application on peripheral 2 may determine the activation sequence.

At step 9845 peripheral 2 determines instructions to create the states in the components. In various embodiments, determining instructions may entail determining component addresses and determining signals to transmit to the components. In various embodiments, component addresses may be obtained by reference to a database table, such as to table 9600 (e.g., field 9608). In various embodiments, signals may be obtained by reference to a database table, such as to table 9700 (e.g., field 9710). Since such signals will be part of instructions to a component, such signals may be listed as "outgoing" at field 9706. A complete instruction may be assembled from the address and from the signal to be sent to that address. For example, given an 8-bit address of "10010101", and an 8-bit signal of "11101110", a complete instruction may read "1001010111101110". In various embodiments, instructions may be determined in an application, in a user input/output controller and/or in a component driver of peripheral 2.

At step 9848 peripheral 2 issues the instructions according to the activation sequence. The instructions determined at step 9845 may be sequentially transmitted (e.g., at appropriate times) to the various components of peripheral 2. The instructions may be transmitted by a user input/output controller and/or by a component driver of peripheral 2. In various embodiments, an application may govern the timing of when instructions are issued. With instructions thus issued to a peripheral's components, the message may finally be related to the second user. E.g., user 2 may see on his mouse's display screen the message, "Good going!".

Process 9800 need not merely relate to inputs intentionally provided by a first user, but may also relate to actions, situations, circumstances, etc. that are captured by peripheral 1, or by other sensors or devices. In various embodiments, one or more sensors on peripheral 1 (or one or more other sensors) may capture information about the first user (e.g., the first user's breathing rate) and/or about the first user's environment. Sensor data may be aggregated or otherwise summarized. Such data may then be relayed ultimately to the second user's peripheral device, peripheral device 2. Peripheral device 2 may then determine how the data should be displayed, what components are needed, what states are needed, etc. User 2 may thereby, for example, receive passive and/or continuous communication from user 1, without the necessity of user 1 explicitly messaging user 2.

In various embodiments, a message transmitted (e.g., from peripheral 1 to peripheral 2) may include intentional inputs (e.g., inputs explicitly intended by user 1) as well as data passively captured about user 1 and/or user 1's environment. For example, if user 1 sends a "hello" text-based message to user 2, and user 1 is eating, the fact that user one is eating may be captured passively (e.g., using cameras) and the "hello" message may be rendered for user 2 on the image of a dinner plate.

Referring now to FIG. 99, a depiction 9900 of aggregated or summarized data about tags is shown, according to various embodiments. The depiction may represent a dashboard, a report and/or any other view or depiction of tag data. The depiction 9900 shows an ordered list of tag recipients (e.g., tag recipients shown by "Rank" 9925), and broken down by category of recipient. One category of recipients is "Developers" 9905. Another category of recipients is "Software architects" 9930. In various embodiments, any other category of recipients may be used. In various embodiments, all recipients fall within a single category (e.g., a general category). Although two categories are depicted, more or fewer than two categories may be depicted, in various embodiments. Breaking down recipients by category may allow a comparison of recipients who have similar work environments, similar roles, similar duties, similar responsibilities, similar opportunities, similar experiences, and/or any other similarity in common. Thus, a difference in numbers of tags received between two recipients on a single list is more likely to be attributable to a difference in recipient performances rather than simply to different environments or opportunities.

In various embodiments, the tag recipients are ordered according to "Total tags" 9920 received. Also shown for each recipient are numbers of received "Positive tags" 9910 and "Highly rated tags" 9915. Note that the "Total tags" 9920 may include "Positive tags" 9910, "Highly rated tags" 9915, and any other tags (not shown) received by the recipient. However, in various embodiments, recipients may be ordered in terms of any category of tag (e.g., positive tags, highly rated tags, negative tags, tags received in innovation meetings, etc.), any combination of categories of tags, and/or any other statistic related to tags received. Recipients may be ordered based on receipt of a single type of tag (e.g., based on a "Good meeting facilitation" tag). In various embodiments, a dashboard may show (e.g., rank) users based on tags given by the users to others. In various embodiments, recipients may not be ordered at all and/or may be ordered in a fashion that is unrelated to tags received (e.g., in alphabetical order by name, in order of employment duration, etc.).

The depiction 9900 illustrates five recipients in each category, however, any number of recipients per category may be listed. In various embodiments, a dashboard or other depiction shows a given number of tag recipients at a time, but a viewer is able to scroll, to page down, and/or to otherwise see additional recipients.

In various embodiments, a dashboard or other depiction allows for an overview (e.g., a rapid overview) of employee performance. For example, an employee who has received a large number of positive tags may be given a reward. For example, an employee who has received relatively few tags in a particular category may be given coaching to improve his performance in that category. In various embodiments, a viewer of a dashboard may not have a good idea of what might constitute "good" or "poor" performance with respect to tags received (e.g., what absolute number of tags received constitutes "good" or "poor" performance). By ranking recipients, a viewer can at least ascertain relative performance amongst tag recipients. It may then be assumed, for example, that the top 10% of recipients are exhibiting good performance, and the bottom 10% are exhibiting poor performance. However, any suitable set of assumptions about performance may be used, and/or any suitable actions may be taken based on dashboard findings.

In various embodiments, the output of a depiction such as depiction 9900 may be customized, such as based on one or more input parameters. For example, a viewer may set a date range, a category of tags, a category of recipients, a number of recipients to return in each category, etc. Thus, a viewer may obtain an overview of tag receipt that is most useful to their purposes.

Figure 100:
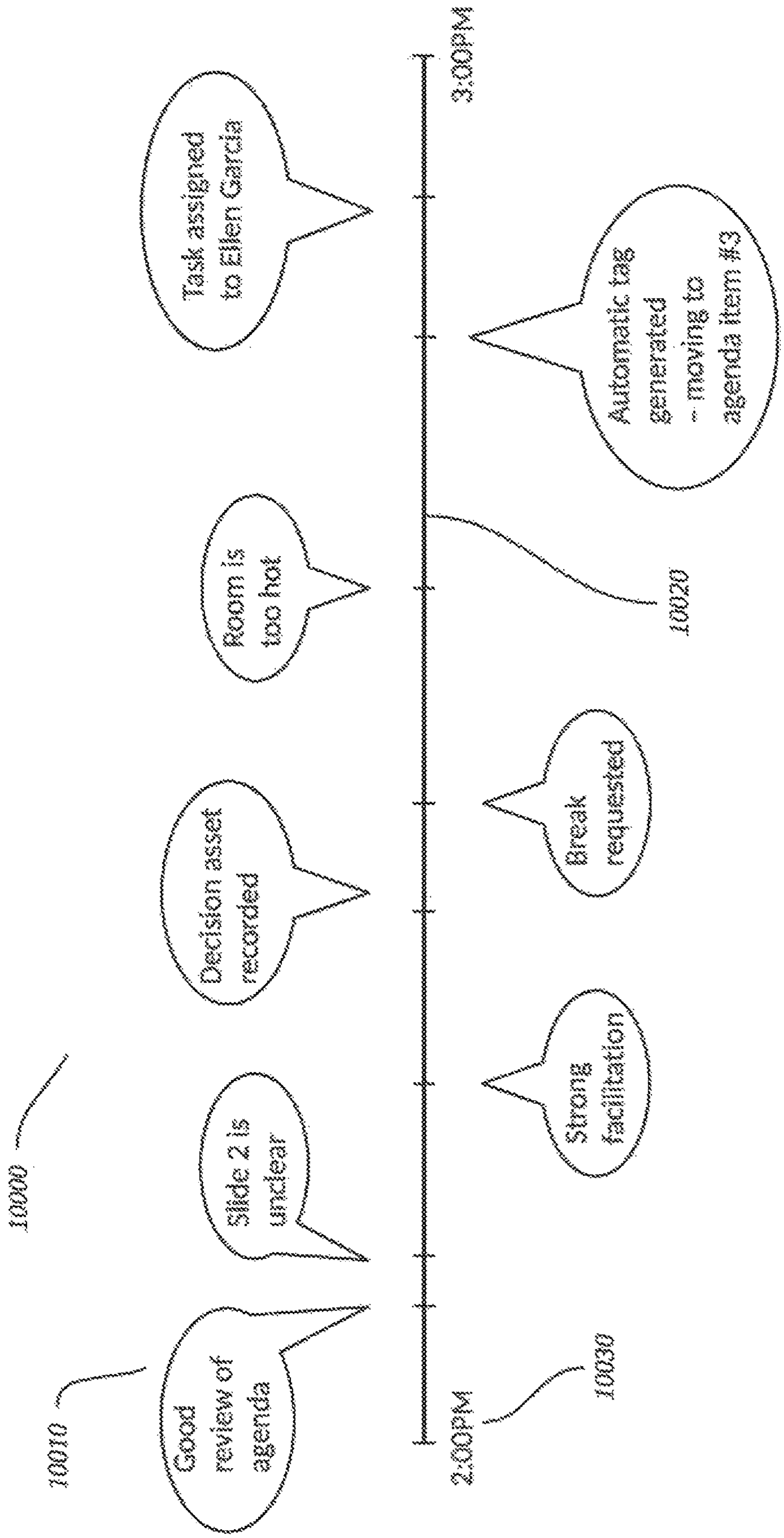
FIG. 100 is a chart from a user interface consistent with at least some embodiments described herein.

Referring now to FIG. 100, a depiction 10000 of aggregated or summarized data about tags is shown, according to various embodiments. The depiction may represent a dashboard, a report, a visualization, and/or any other view or depiction of tag data.

Depiction 10000 may represent a timeline 10020 of a meeting (or other event), with tags (e.g., tag 10010) shown at the points on the timeline when they were applied (or times when the tags were composed, or times that events happened to which the tags apply, etc.). For example, tag 10010 reads "Good review of agenda" and is applied towards the beginning of the meeting (e.g., when the agenda would have been reviewed). A viewer of the timeline 10020 (e.g., a meeting owner) may thus have an easier time associating a tag with a meeting event. Timeline 10020 may include references to a start time 10030 (e.g., 2:00 PM) and/or an end time (e.g., 3:00 PM).

In various embodiments, a timeline view may provide a good visualization of the cadence of tag application. For example, if lots of tags are applied within one 5-minutes interval, this may be readily apparent via a cluster of tagging activity at one point on the timeline. A meeting owner, or other interested party, may then take special note of events, discussions, decisions, etc. that happened during that interval.

In various embodiments, a user is able to zoom in on a portion of the timeline (e.g., if there is a dense cluster of tags that is otherwise difficult to parse). In various embodiments, a viewer may set the limits of the timeline (e.g., the start and end time).

In various embodiments, a timeline may be represented as a heat map of tags overtime. Time periods of high tag activity may receive warm colors (e.g., red, orange), while time periods of low tag activity may receive cool colors (e.g., blue, green).

Mouse and Keyboard Logins

In some embodiments, a mouse and/or keyboard may log into a user computer by transmitting a signal representing mouse movement or a keyboard character (e.g. a space bar character) in order to wake up a user computer. At that point, one or more usernames and passwords may be passed from a mouse and/or keyboard in order to log into the user device. Once logged in, the mouse and/or keyboard may then get access to the operating system of the user computer in order to read or write data. In some embodiments, a mouse logs into a user computer on a scheduled basis (e.g. every 20 minutes) in order to gather information about the status of another user. For example, software on the user computer may request status updates stored at central controller 110 every time the user computer is woken up. If there are any new updates since the last query, that information is then transmitted to storage device 445 of the user computer. In embodiments in which a mouse or keyboard autonomously logs into a user computer periodically in order to receive status updates relating to one or more other users, some functionality of the mouse may be disabled when a user is not present. For example, the xy positioning data generated by mouse movements may be disabled during these autonomous logins so that an unauthenticated person trying to use the mouse while it is logged into the user computer to get status updates will not be able to generate any xy data and will thus be unable to perform any actions with the user computer while it is activated by the autonomous logins.

Mouse and Keyboard Security

In some embodiments, a mouse may be used in a way that supplements the security of a user device. For example, passwords and cryptographic keys may be stored in storage device 445, or within an encryption chip (not shown). These keys may be transmitted to a user device in order to wake up and/or login to the user device. In such embodiments, passwords stored within the mouse may be more secure than those stored in the memory of a user device because the operating system of the mouse will not be familiar to potential attackers seeking to obtain (e.g. via hacking) those passwords or cryptographic keys. In embodiments in which a mouse autonomously logs into a user computer periodically in order to receive status updates relating to one or more other users, some functionality of the mouse may be disabled when a user is not present. For example, the xy positioning data generated by mouse movements may be disabled during these autonomous logins so that an unauthenticated person trying to use the mouse while it is logged into the user computer to get status updates will not be able to generate any xy data and will thus be unable to perform any actions with the user computer while it is activated by the autonomous logins.

Figure 83:
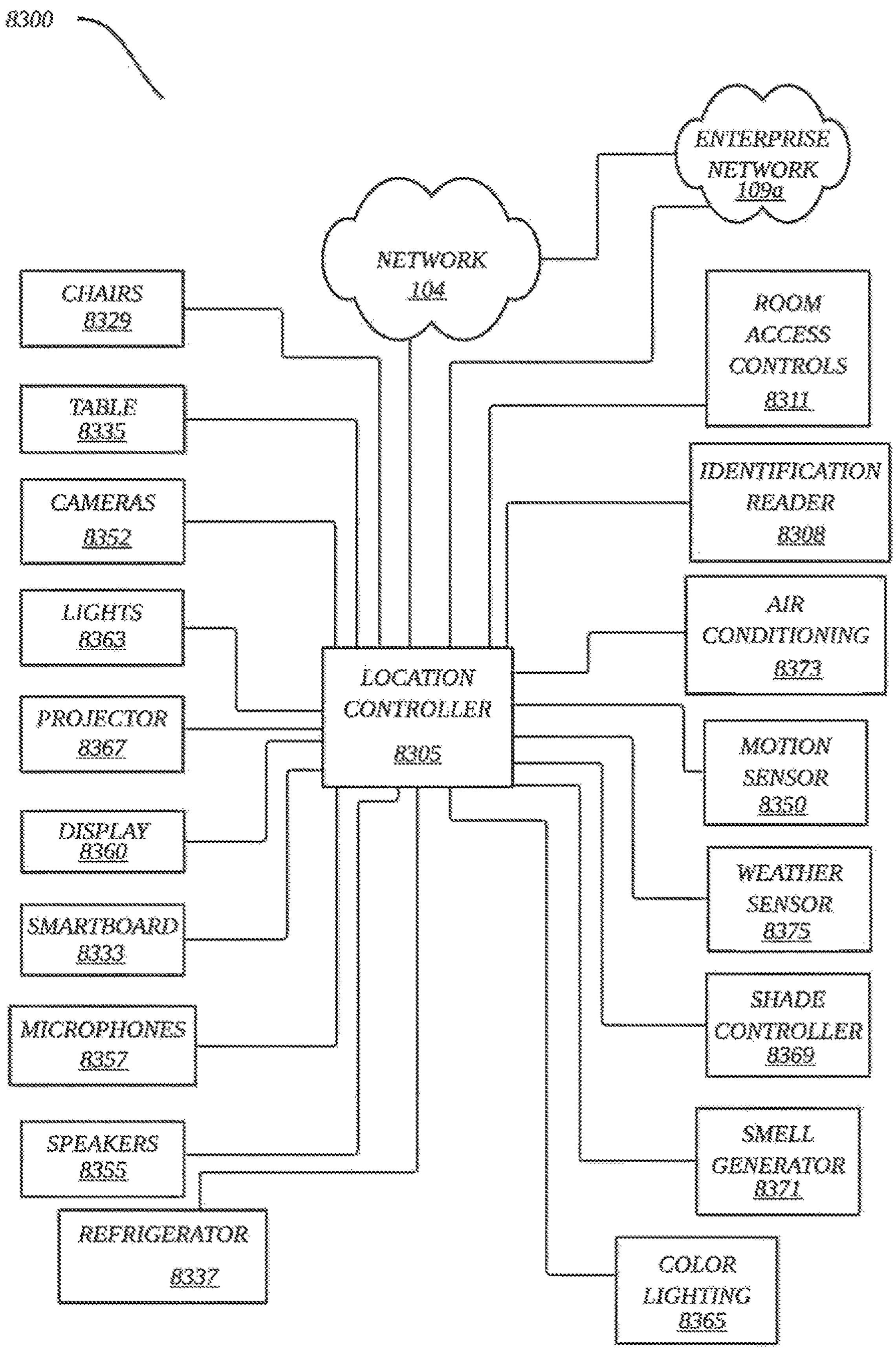
FIG. 83 is a block diagram of a system consistent with at least some embodiments described herein.

Referring to FIG. 83, a block diagram of a system 8300 according to some embodiments is shown. In some embodiments, the system 8300 may comprise a plurality of office or house devices in communication via location controller 8305 or with a network 104 or enterprise network 109*a*. According to some embodiments, system 8300 may comprise a plurality of office or house devices, and/or a central controller 110, In various embodiments, any or all of the office or house devices may be in communication with the network 104 and/or with one another via the network 104. Office or house devices within system 8300 include devices that may be found within an office or house which help to ensure effective management and support of the locations, including managing meetings, detecting safety issues, providing feedback, applying tags, object identification, game playing by users, etc. Office and house devices include chairs 8329, tables 8335, cameras 8352, lights 8363, projectors 8367, displays 8360, smartboards 8333, microphones 8357, speakers 8355, refrigerators 8337, color lighting 8365, smell generator 8371, shade controllers 8369, weather sensors 8375, motion sensors 8350, air conditioning 8373, identification readers 8308, and room access controls 8311.

Figure 84:
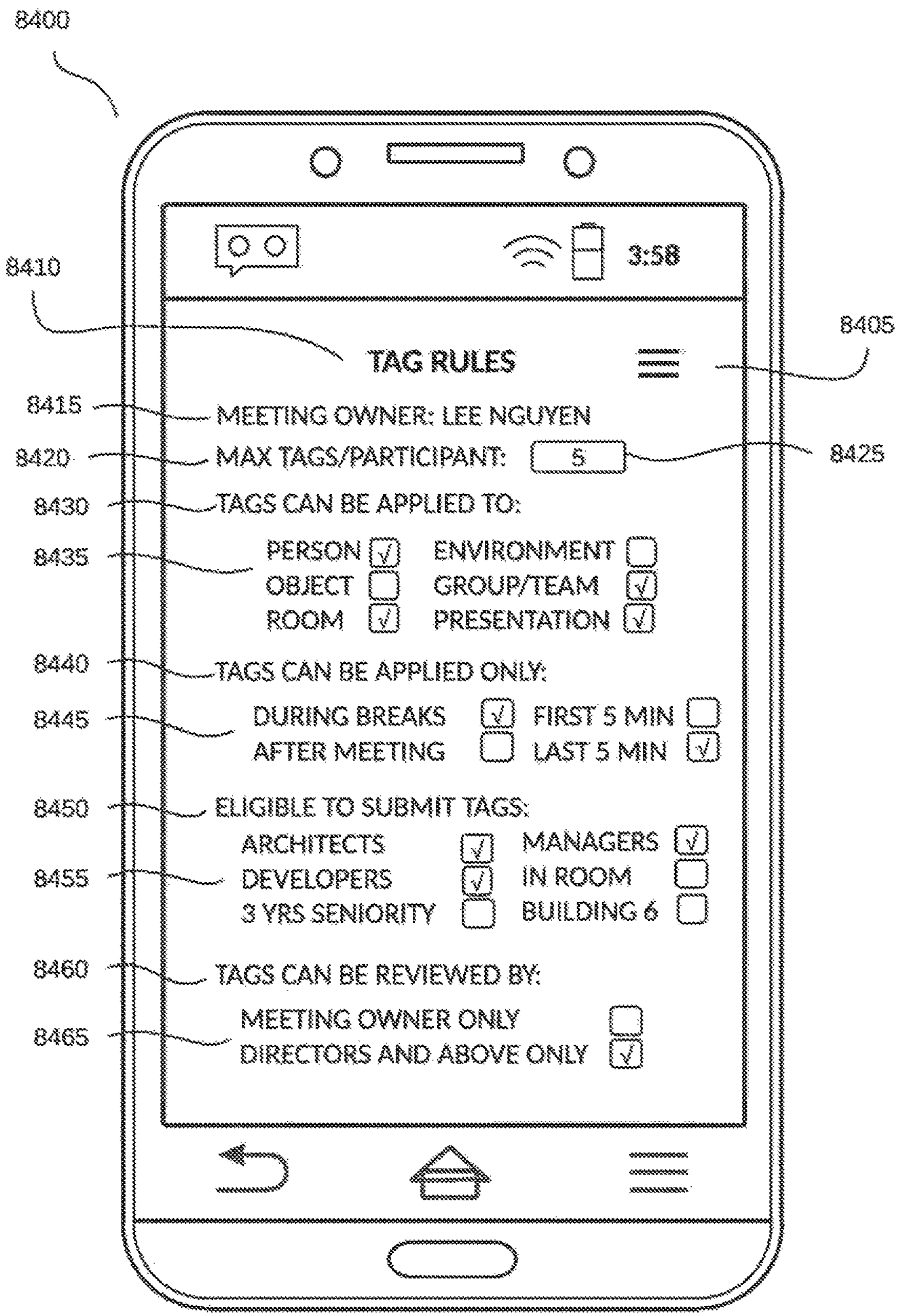
FIG. 84 is a user interface for creating a set of tag rules consistent with at least some embodiments described herein.

With reference to FIG. 84, a screen 8400 from an app controlled by users according to some embodiments is shown. The depicted screen shows a 'Tag rules' 8405 functionality that can be employed by a user (e.g. meeting owner, meeting facilitator, meeting participant, employee, project manager, facilities manager, game player, teacher, tutor) to set rules for applying tags. In various embodiments, the rules may apply to an upcoming meeting. In various embodiments, the rules may apply indefinitely, until changed, for some fixed period of time, etc. In various embodiments, rules data may be stored in 'Tag meanings and representations' table 6300. In FIG. 84, the app is in a mode whereby users can set rules for applying tags.

In some embodiments, the user may select from a menu 8410 which displays one or more different modes of the software. In some embodiments, modes include 'tag rules', 'placing tags', 'choosing tags', 'responding to tags', 'upvoting tags', etc.

In some embodiments, the app may show the identity of the user setting rules for placing a tag, such as 'Meeting owner' 8415 who is in this case 'Lee Nguyen'. In this example, the user may enter this identity information via a virtual keyboard, via voice recording, retrieved from a processor of the user device, etc. In various embodiments, the user setting rules need not be a meeting owner, but may be a high ranking individual, and/or anyone else.

At 8415 the app user may set a maximum number of tags that can be used by each participant 8420 (e.g., each participant in a given meeting). In screen 8400, the maximum number of tags is set at field 8425 to five.

At 8430 the app user may set the type of recipient 8435 to which a tag may be applied. Depicted types of recipients include person, object, room, environment, group, presentation. In screen 8400, the user has checked off four recipient types, indicating that the tags may only be applied to these types of recipients. In various embodiments, other types or categories of recipients may be listed and selectable. In various embodiments, more or fewer types or categories of recipients may be listed and selectable.

At 8440 the app user may set the times or circumstances 8445 in which a tag may be applied. Depicted times/circumstances include "During breaks", "After meeting", in the "First 5 minutes" of the meeting, and in the "Last 5 minutes" of the meeting. In screen 8400, the user has checked off two times/circumstances, indicating that the tags may only be applied during these times/circumstances. In various embodiments, other times/circumstances may be listed and selectable. In various embodiments, more or fewer times/circumstances may be listed and selectable.

At 8450 the app user may set people or categories of people 8455 who are eligible to submit tags. Depicted people/categories include "Architects", "Developers", people with "3 years seniority", "Managers", people "In the room" (e.g., in the meeting room at the time of the meeting), people "In building 6" (e.g., people who work in building 6). In screen 8400, the user has checked off three people/categories, indicating that the tags may only be applied by these people/categories. In various embodiments, other people/categories may be listed and selectable. In various embodiments, more or fewer people/categories may be listed and selectable.

At 8465 the app user may set people or categories of people 8465 who are eligible to review tags. Depicted people/categories include "Meeting owner only", and "Directors and above". In screen 8400, the user has checked off "Directors and above", indicating that the tags may only be reviewed by those with the title of Director or higher. In various embodiments, other people/categories may be listed and selectable. In various embodiments, more or fewer people/categories may be listed and selectable.

In various embodiments, the depicted screen 8400 and/or the associated app may allow a user to set additional rules, restrictions, constraints, etc. In various embodiments, more or fewer settings may be depicted. In various embodiments, different settings may be depicted.

A tag rule may restrict viewing of a tag for some period of time. For example, it may be desirable that a participant/team not observe tags until a certain point in time (e.g., until a meeting is finished, until the project is finished, until they have provided their own tags, etc.).

A tag rule may require that a minimum number of people are present in a meeting before the tag can be used.

In various embodiments, there is tag scarcity (eg., there is only 1 'MVP' tag). In various embodiments, only a limited number of tags can be visible or present. Thus, for example, adding tag forces or prompts removal of another tag.

In various embodiments, when the user hits a 'Submit rules' button, or the like, the app may transmit (e.g., to the central controller) the rules. Once rules have been submitted, the rules may be stored in a table (e.g., table 6300) or other data structure.

Figure 85:
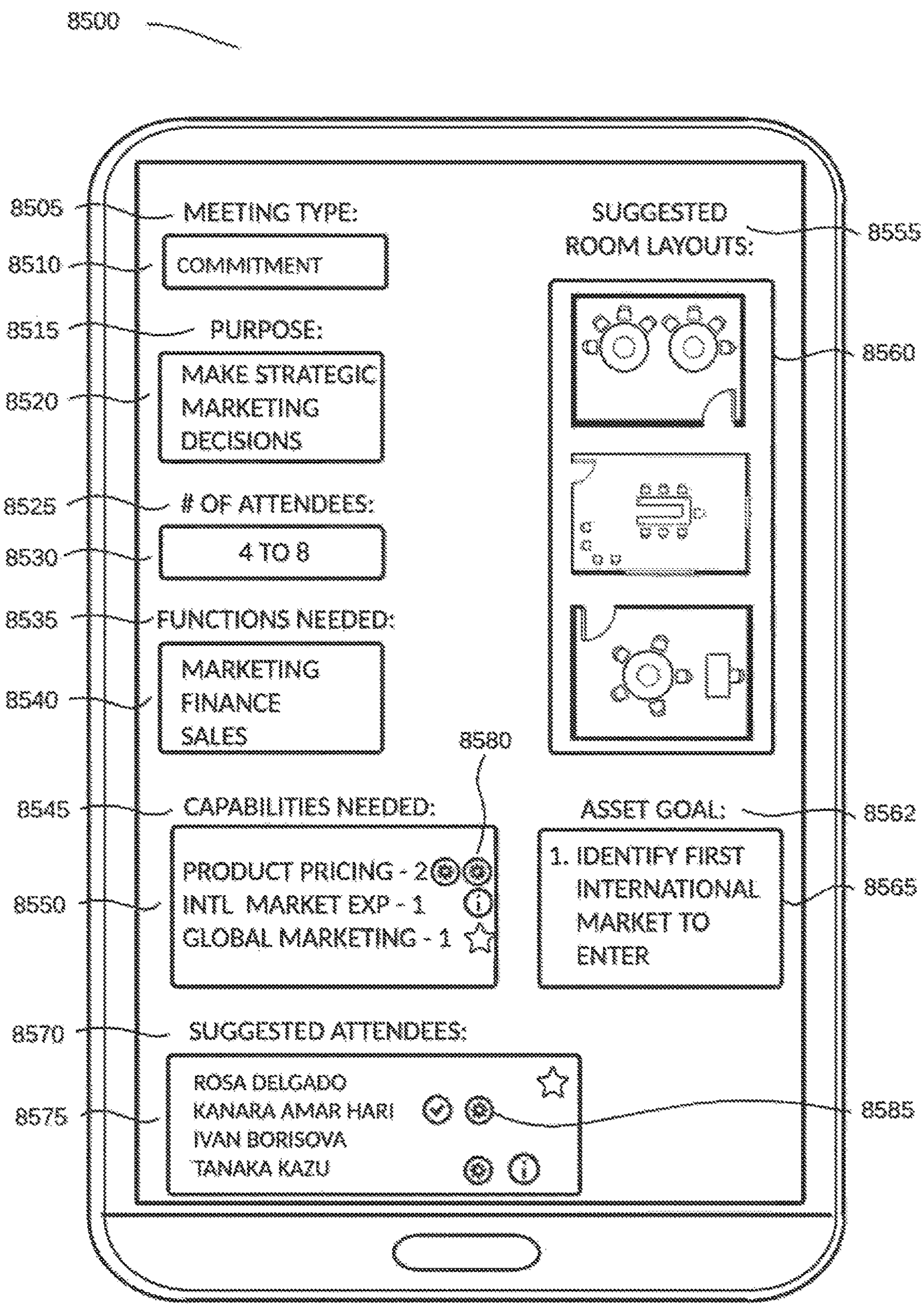
FIG. 85 is a user interface for creating a meeting consistent with at least some embodiments described herein.

With reference to FIG. 85, a screen 8500 from an app controlled by users according to some embodiments is shown. The depicted screen shows functionality that can be employed by a user (e.g. meeting owner, meeting facilitator, meeting participant, employee, project manager, facilities manager, game player, teacher, tutor) to create a meeting. In various embodiments, a user is able to specify one or more parameters of a meeting, and other parameters of the meeting (e.g., a meeting configuration) are then suggested and/or generated automatically (e.g., by the app, by the central controller 110). The suggestions may be made with the purposes of efficiently utilizing employee time (e.g., inviting only employees that are necessary, inviting sufficient employees as to allow the meeting to accomplish its purpose, scheduling only as much time for the meeting as necessary), efficiently utilizing meeting space, etc.

In some embodiments, the user may select from a menu (not shown) which displays one or more different modes of the software. In some embodiments, modes include 'meeting creation', 'tag selections', 'tag rules', 'placing tags', 'choosing tags', 'responding to tags', 'upvoting tags', etc.

At 8505 is shown a meeting parameter, namely "meeting type", and at 8510 is shown an associated value or values of the meeting parameter, namely "commitment". Thus, as depicted, the meeting type is a commitment meaning.

Other depicted meeting parameters include "purpose" 8515 (with an associated value of "make strategic marketing decisions" 8520); "number of attendees" 8525 (with an associated value of "4-8" 8530); "functions needed" 8535 (with associated values of "marketing", "finance", and "sales" 8540); "capabilities needed" 8545 (with associated values of "product pricing—2", "international market experience—1", and "global marketing—1" 8550); "suggested room layouts" 8555 (with three associated values 8560); "asset goal" 8562 (with an associated value of "identify first international market to enter" 8565); and "suggested attendees" 8570 (with associated values of "Rosa Delgado", "Kanara Amar Hari", "Ivan Borisova" and "Tanaka Kazu" 8575).

In various embodiments, a user may specify values for some number of parameters (e.g., for some subset of the depicted parameters), after which the app may generate or suggest values for one or more other parameters (e.g., for all other depicted parameters). For example, a user may specify values for the meeting type 8505, and meeting purpose 8515, after which the app may generate or suggest values for the other parameters.

In various embodiments, a user may specify some values for a given parameter, but not all values for the parameter. The app may thereupon generate or suggest remaining values for the given parameter. For example, a user may specify some meeting attendees, and the app may suggest other meeting attendees (e.g., until the meeting has sufficient attendees to fulfill the functions needed 8535, until the meeting has sufficient attendees to fulfill the capabilities needed 8545, until the meeting has obtained a suggested number of attendees 8525).

In various embodiments, a user may constrain values of a meeting parameter, and the app may suggest values for the parameter subject to those constraints. For example, a user may specify that a given employee should not attend a meeting, whereupon the app may suggest a set of attendees that does not include the given employee.

In various embodiments, capabilities may be required in various quantities. For example, the meeting may require two of a "Product pricing" capability. A quantity may refer to a number of people required with a given capability. For example, in the depiction 8500, two employees are required, each possessing a product pricing capability. A quantity of each capability required is indicated numerically at 8550 after the text description of the capability.

In various embodiments, capabilities may be represented with badges, icons, images, or the like. As depicted, each capability listed at 8550 (for meeting parameter 8545) has an associated badge 8580. In various embodiments a number of badges shown may indicate a quantity of a capability listed. For example, at 8550, two "Product pricing" capabilities are needed, and this is graphically illustrated using two like badges at 8580 shown to the right of the capability description. On the other hand, only one "International marketing experience" capability is needed. In various embodiments, a capability description is not shown at all, and only the badges are shown.

In various embodiments, capabilities possessed by an employee may be listed or illustrated in association with the employee's name (or other employee identifier). At 8575, suggested employees' names are listed, each followed by badges 8585 indicative of the employees' capabilities. An app user may thereby, for example, obtain a quick visual overview of capabilities of suggested attendees by visually scanning the badges representing the employee capabilities. Further, the app user may compare the badges associated with the suggested employees to the badges listed under capabilities required (at 8580). The app user may thereby, for example, receive a quick visual indication of capabilities possessed by suggested attendees versus capabilities needed. If the badges at 8580 and 8585 match up (e.g., capabilities possessed equal capabilities required; e.g., capabilities possessed exceed capabilities required), then the app user may know that a suggested list of attendees will satisfy the meeting requirements.

In various embodiments, badges indicating needed capabilities (e.g., badges at 8580) may assume different appearances based on whether such capabilities are currently fulfilled by attendees and/or suggested attendees. For example, a given badge may appear in a light or faded color if an associated capability is not fulfilled by a list of suggested attendees. On the other hand, the badge may appear darker or more saturated if the associated capability is fulfilled by a list of suggested attendees. In various embodiments, a badge's appearance may vary in other ways (e.g., the badge has a border in one case, but no border in another case, etc.). Where a badge's appearance may vary, an app user may obtain a quick visual indication of what meeting capabilities are still lacking amongst a list of attendees, e.g., by noting all badges that are displayed in a faded color.

In various embodiments, capabilities for suggested attendees may be shown only if such capabilities are among the capabilities needed (listed at 8550). In various embodiments, capabilities for suggested attendees may be shown even if they are not among the capabilities needed. This may allow an app user to invite an attendee with a "nice to have" capability, even if it is not absolutely needed.

In various embodiments, a capability (e.g., in an area, on a topic, with a subject, etc.) may be quantified in various ways. A capability in an area or subject may be quantified as a number of years experience (e.g., 3 years experience); a certification level (e.g., "2nd degree blackbelt", "master", etc.); a degree (e.g., bachelor's, master's, etc.); years of schooling on the subject; a number of years teaching the subject; a number of years in a position related to the subject (e.g., years as a professor of the subject); a number of products completed related to the subject (e.g., number of products built using jQuery); a number of others trained on the subject; a number of papers published on the subject; a number of citations received on this subject; an average rating of skill level received from others (e.g., a 4.3 star average rating of skill level); a skill level; a number of honors or rewards received in the subject; a number of lectures given on the subject; an amount of grant money received related to the subject; a number of achievements related to the subject (e.g., number of court battles won); an amount of prize money received related to the subject; and/or in any other suitable fashion.

In various embodiments, a capability is considered binary (e.g., an employee has the capability if he has more than three years of experience in a subject area, otherwise the employee does not have the capability). In various embodiments, a capability may be expressed in terms of more than two values, such as in terms of a positive integer value, a continuous value, etc. In various embodiments, a needed capability represented by some quantity (e.g., 5 years experience with microservices) may be satisfied by two or more employees who, in the aggregate, possess the needed capability, even if neither employee does on his own. In various embodiments, a single employee must, on his own, satisfy a needed capability.

Screen 8500 depicts badges in association with capabilities. However, badges may be depicted for other attributes, such as for an employee's function. Using a system of badges, for example, an app user may similarly ascertain whether a meeting has needed functions (or other needed attributes) sufficiently represented amongst a list of attendees.

Screen 8500 depicts an asset goal parameter 8562, with an example value of "Identify first international market to enter" depicted at 8565. An asset goal may be a goal for an asset that will be generated by a meeting. In this case, the goal would be to identify a first international market (e.g., the Japanese market, the Korean market) to enter.

In various embodiments, employee functions, capabilities, and/or other attributes may be obtained from a table such as employees table 5000. In various embodiments, employee functions, capabilities, and/or other attributes may be obtained or inferred from tagging table 7300, e.g., where employees may be tagged with capabilities possessed. In various embodiments, employee functions, capabilities, and/or other attributes may be obtained in any other fashion.

In various embodiments, suggested values for meeting parameters may be obtained from, or with reference to, 'Recommended capabilities by meeting type'table 8100. Given a user-provided meeting type at 8510 (and/or given one or more other user-provided meeting parameters), the app may reference table 8100 to obtain a recommended quantity of various capabilities (e.g., as listed at fields 8108, 8110, and 8112); a recommended total number of attendees (e.g., as listed at fields 8114); a recommended room arrangement (e.g., as listed at fields 8116); and/or any other recommended or suggested value of a meeting parameter.

In various embodiments, suggested values for meeting parameters may be obtained from, or with reference to meeting configurations table 8700. Using table 8700, for example, the app may suggest employees based on their opportunity costs for attending the meeting. Using table 8700 the app may determine a "Presence score" associated with each attendee based on capabilities possessed by the attendee, and based on whether such capabilities match the capabilities needed listed at 8550. For example, if an employee possesses needed capability, the employee may receive a presence score of twenty, otherwise the employee may receive a presence score of ten. In various embodiments, an employee's presence score may scale with a degree, strength or level of the employee's capability. For example, an employee's presence score may be set to twenty plus one for each year of experience the employee has with a particular capability.

In various embodiments, the depicted screen 8500 and/or the associated app may allow a user to specify additional meeting parameters. In various embodiments, more, fewer, or different suggestions may be made for parameter values (e.g., by the central controller). In various embodiments, values for more, fewer, and/or different parameters may be suggested.

In various embodiments, when the user hits a 'Submit configuration'button, or the like, the app may transmit (e.g., to central controller 110) an indication of the current meeting configuration (e.g., of the current values listed for the meeting parameter on screen 8500). Once the meeting configuration has been submitted, parameter values may be stored in one or more tables (e.g., meetings table 5100, meeting attendees table 5200, etc.) or other data structure. In various embodiments, further arrangements may be taken, such as sending invitations to suggested attendees, finding a room (e.g., finding a room matching a layout listed at 8560), reserving a room, etc.

Exercise Reminders

As modern workers increasingly sit all day doing information work, they run the risk of developing health issues if they do not get up and take occasional breaks to stretch and move around. In various embodiments, when a meeting participant has been in a long meeting, the chair could send a signal to the location controller 8305 indicating how long it had been since that participant had stood up. If that amount of time is greater than 60 minutes, for example, the central controller could signal to the chair to output a series of three buzzes as a reminder for the participant to stand up. The central controller could also send a signal to the meeting owner that a ten-minute break is needed for the whole room, or even initiate the break automatically. The central controller could send signals to smart variable-height desks to automatically adjust from sitting to standing position as an undeniable prompt that participants should stand up. In various embodiments, if the central controller identifies a meeting participant who is in back to back meetings for four hours straight, it could send a signal to the participant device with verbal or text reminders to stretch, walk, take some deep breaths, hydrate, etc. In various embodiments, if a meeting participant is scheduled for four hours of meetings in a row, the central controller could send the participant alternate routes to walk to those meetings which would take more steps than a direct route. In various embodiments, for virtual meeting participants, the central controller can also send reminders to participants that they should take a break and walk outside or spend a few minutes doing stretching/exercising. These suggestions could be linked to heart rate readings from a mouse, slouching or head movements seen by a camera, a fidgeting signal from a chair, etc.

Mental Fitness

As employees perform more and more information-driven work, keeping their minds functioning well is more critical than ever. An employee who is tired, distracted, unable to focus, or perhaps even burned out will have a hard time performing complex analytical tasks. Research has shown, for example, that software developers need large blocks of uninterrupted time in order to write good software. If their minds are not sharp, significant business value can be lost. In various embodiments, the central controller reviews the meeting schedule of all knowledge workers in order to assess the impact that the schedule may have on the mental fitness of the employee. For example, when the central controller sees that an employee has back to back meetings for a six hour block on two consecutive days, the employee may receive direction in ways to reduce some of the stress associated with those meetings. Stress alleviation suggestions could include: Meditation; Exercise (e.g., light yoga, stretching); Healthy snacks; Naps; Fresh air; Focus on a hobby or something of personal interest; Calming videos or photos; Positive/encouraging messages from company leadership; or any other suggestions. The central controller reviews the meetings of the knowledge worker and compares them to other knowledge workers in similar roles to see if any are getting oversubscribed. For example, if certain key subject matter experts are being asked to attend significantly more innovation meetings than other subject matter experts, the central controller can alert the management team of possible overuse. In addition, the overused subject matter expert could be alerted by the central controller to consider delegating or rebalancing work in order to maintain a healthy lifestyle. In the converse, as an example, if a subject matter expert or key role (e.g. decision maker) individual is currently undersubscribed compared to others, the central controller can alert management or other meeting leads to put this person at the top of the list if they have a need for this expertise.

In various embodiments, the central controller 110 may review information collected about a meeting participant to look for signs that an employee may be heading toward burning out. Such signals could include the employee is: Using a loud voice in a meeting; Having a rapid heartbeat; Slouching or not being engaged with other participants; Interrupting other participants; Declining meetings at a more significant rate than most in similar roles; Significantly more out of office or absentees in a short period of time; Changes in level of meeting engagement; No breaks for lunch; or any other signals. In various embodiments, the central controller 110 can also monitor biometric information (such as heart rate, posture, voice, blood pressure) and compare the results to the entire organization to determine if the pattern is higher than expected. For example, if the individual on the verge of burnout shows that they are interrupting individuals using a loud voice more frequently than most, the central controller can alert the individual during the meeting to consider alternative approaches for engagement such as, taking a break, breathing deeply, meditating or any predetermined approaches deemed appropriate by the organization. If the data continue to support potential burnout, the central controller can inform the individuals management for intervention and coaching. In various embodiments, the central controller 110 can interrogate the calendars of individuals to determine if they are getting uninterrupted time for lunch during a specific time. For example, the central controller can look at an individual's calendar over a month time period. If the time slot between 11:30 AM-1:30 PM is consistently booked with meetings more than 50% of the time, the central controller can alert the individual to reconsider taking lunch breaks for healthy nutrition and also inform meeting leads that the use of lunch meetings could be excessive.

In various embodiments, the central controller 110 could also have the ability to look at the home calendar of employees so that it has an understanding of how busy they might be outside of work. For example, the central controller can look to see if exercise routines are typically scheduled on an individual's calendar. If so, and suddenly they begin to not appear, the central controller can provide reminders to the individual to reconsider adding exercise routines to their calendar to maintain a healthy lifestyle. Another example could be for the central controller to view events on an individual's calendar outside of normal work hours (pre-8:00 AM and post-5:00 PM) to determine if enough mental free time is being allocated for mental health. If calendars are continually booked with dinner events, children's events, continuing education or volunteer work without time for rest, this could be early signs of burnout. The central controller could remind the individual to schedule free time to focus on mental rest, prioritize activities and provide access to suggested readings or activities to promote mental wellbeing. In various embodiments, the central controller 110 can maintain analytics on the number of declined meetings that are typical in an organization and compare to an individual. If the number of declined meetings for the individual is higher than average, helpful information can be provided. For example, if the organization typically has 5% of their meetings declined and meeting participant "A" has an average of 25% of meetings declined, the central controller can prompt to individual to consider other alternatives to declining a meeting such as delegating, discussing with their manager any situation prompting them to decline meetings, or make use of mental and physical wellness activities for improvement. Many enterprise organizations have access to an array of mental and physical health content and individual health providers via the insurance companies that provide health benefits. The central controller could identify these individuals and direct them to their health insurance provider. This immediate intervention and access to a professional in the field of mental health via their insurance providers could help mitigate the health issues.

Virtual Audience Feedback

When presenting at a meeting which has a high percentage of virtual participants, it can sometimes be disconcerting for a presenter to speak in front of a largely empty room. In various embodiments, one or more video screens are positioned in front of the speaker to provide images of participants, and to guide the presenter to make head movements that will look natural to virtual participants. In various embodiments, color borders (or other indicia) may be used for VPs, or other key people. In various embodiments, three people (e.g., stand-in people) are set up before the call (can be dynamic based on what slide the presenter is on). The presenter can then practice presenting to these three people. In various embodiments, it is oftentimes important to know the roles or organizational level of individuals in a meeting to make sure that the presenter is responding appropriately. For example, if a Decision meeting is taking place, it is important to quickly be able to identify these individuals so you can speak more directly to them. The central controller could gather this information from the meeting presenter in advance. Once they join the meeting, their images could have a border in a different thickness, pattern or color to more easily identify them. Since they are the key members in this particular meeting, their images could display larger than others and be represented on the various display devices. If any of these individuals speak, the central controller could adjust the border to brighten in color, flash a particular pattern and gray out the images of others. This allows the presenter to quickly focus on the key participant speaking and make better eye contact.

In various embodiments, an audience (emoji style) is displayed to the presenter. In meeting settings it is important to connect with the audience and even more so in a virtual meeting. Each meeting attendee can provide an image of themselves or use an already approved picture via a corporate directory to the central controller. When the meeting begins, the individual images are presented on the various display devices. As emotions and biometric data is collected by the central controller, the emoji can change to reflect the state of the individual. If the audience is happy, the emojis change to provide the presenter immediate feedback. Conversely, if the central controller detects the audience is confused or frustrated, the emoji changes immediately to reflect the new state. This feedback allows the presenter to collect real time audience information and adjust their presentation accordingly. Furthermore, if a presenter needs to practice a presentation remotely in advance of the live presentation, the central controller can present a random set of emojis and images for the presenter to practice. In various embodiments, a real-time emoji dashboard is displayed to the presenter for selected reactions. The central controller should allow the meeting participants to provide emoji style feedback to the presenter in real time. For example, if a presenter is training an audience on a new product and some attendees are confused, others are happy and some are bored, the audience members can provide the appropriate emoji to the presenter. The central controller collects all emojis and displays them in dashboard format to the presenter. In this case, 10 confused emojis, 50 happy emojis and 2 bored emojis appear on the dashboard bar chart for interpretation by the presenter. They may elect to pause and review the slide showing 10 confused faces. In addition, the central controller could record the emotions on each slide, along with the participant, and inform the presenter. After the meeting, the presenter can address the reaction on each slide with those that had the issue/concern.

In various embodiments, feedback can be presented to the speaker/coordinator/organizer in a graphical form that privately (or publicly) parses out responses, statuses, etc., by attendee. The speaker can easily view, for example, who has provided an answer to a question (e.g., a poll) and who still needs to answer. In various embodiments, as presenters are speaking, a feeling thermometer dynamic dashboard is presented for review and real-time adjustments to their presentation. For example, the central controller could provide each participant with an opportunity to rate the presentation using a feeling thermometer based on any dimension the meeting owner selects. Is the presentation material clear? The participant can adjust the thermometer to indicate very clear to very unclear. The collective ratings of all thermometer scores is dynamically presented to the presenter for any needed adjustments. In addition, the pace at which a presentation is being delivered can also be measured and presented on the dashboard as well.

Virtual Producer

As meetings become more virtual, it may be increasingly important for meeting owners and meeting participants to maintain a natural look during meetings. The way that they are looking and the angle of the head will convey a lot of non-verbal information. In this embodiment, the central controller uses software to make suggestions to participants and to pick camera angles much like a producer would in a control room of a television news show which can do things like cut to the best camera angle or include a small video frame to support the point that the presenter is making. In various embodiments, there are three cameras (or some other number have cameras) and the system picks the best angle. For example, the central controller 110 identifies who is speaking and where they are in relation to the display you are using. When you look in the direction of the person speaking (virtually or not) the appropriate camera focuses the angle in the direction you are looking. In various embodiments, the system tells you how to turn when you are on video. For example: As a presenter to a virtual audience, you may need to turn your head to appear to speak to a larger audience and not give the appearance that you are staring at them. The central controller can track how long you are focused in one direction and prompt you to move your head and look in a different direction. This provides a more realistic view of the presentation to the audience and can put them at ease as well.

In various embodiments, the presenter talks with his/her hands, the camera should zoom out. The central controller 110 could determine if you are using your hands to speak more or illustrate a point. Your hands and arms may appear to come in to focus more often. In this case, the central controller could communicate with the camera to zoom out and pick up movements in a larger frame. Pan-Tilt-Zoom (PTZ) camera can be auto controlled by the system to meet production goals (e.g., zoom in to emphasize speaker as speaker volume or role increases). In various embodiments, a meeting lead can determine if other speakers are brought in to view or remain focused on them only. Example: if I am a lecture or in a town hall, I may only want the camera in me and not go to others. The meeting lead can interact with the central controller in advance of the meeting to determine if participants will be brought in to focus during the meeting. If the preference is to not allow the participant to be in focus, when they speak, the central controller will not display the individual, but camera focus will remain on the presenter/meeting lead. In various embodiments, the system may bring participants in or out of focus. When a speaker comes in to focus, the other participants gray out or turn to a different hue. This forces people to focus on the person speaking. For example, in interview situations, question/answer sessions or learning meetings, it is important that the vast majority of participants stay focused on a primary individual. When an individual begins to speak for a few seconds, they quickly come into focus while the others are displayed in a monochromatic display. In this case, the eyes of the participants are drawn to the speaker that remains in full color. In various embodiments, the system determines if focus is on the content displayed or the presenter. During a presentation, while the attendees may be listening and watching the presenter, they are interested in the presentation content as well. In advance of the presentation, the presenter can set a preference via the central controller to make the presentation deck the main focus and a small image of the presenter in the corner of the screen. The central controller could know when the presentation is complete and refocus on the presenter. If the presenter goes back to the slide presentation, the central controller can revert back to the original setting.

Eye Tracking

Tracking where participants are looking can be very helpful in evaluating presentations and estimating the level of meeting participant engagement. Various embodiments track where on a slide that participants are looking. This could provide an indication of the level of engagement of the audience. Various embodiments track where in the room participants are looking. Automatically identify potential distractions; prompt the meeting owner or a particular meeting participant to turn off TV, close window blind, etc. Various embodiments track which other participants a participant is looking at and when. For example, the central controller could track eye movements of people to determine if an issue exists. If multiple participants look over at someone working on a laptop/phone this may mean they are frustrated with this person because they are not engaged. The central controller could track eye movements of people coming and going from the room which may be an indication that a break is needed. If a meeting participant is routinely looking at another participant during a presentation, this could indicate they are not in agreement with the content and looking for affirmation from another participant. Various embodiments include tracking eye rolling or other visual cues of agreement or disagreement. For example, if eyes roll back or are simply staring, this could indicate they are in disagreement with the topic or person and inform the meeting owner.

Gesture Tracking

With cameras, GPS, and accelerometers, there are many physical gestures that can be tracked and sent to the central controller. Example gestures include: arms folded; holding up some number of fingers (e.g., as a show of support or objection to some proposition; e.g., a fist of five); hands clasped together or open; clapping; fist on chin; getting out of one's chair; pushing back from a table; stretching or fidgeting. Some gestures of possible interest may include head movement. In various embodiments, head movement can be an excellent way to provide data in a natural way that does not disrupt the flow of the meeting. Head movements could be picked up by a video camera, or determined from accelerometer data from a headset, for example. In various embodiments, virtual participants could indicate that they approve of a decision by nodding their head, with their headset or video camera sending the information to the location controller 8305 and then summarizing it for the meeting owner. Participants could also indicate a spectrum of agreement, such as by leaning their head way left to indicate strong disagreement, head in the center for neutrality, or head far to the right to indicate strong agreement. In various embodiments, virtual participants could enable muting of their connection by making a movement like quickly looking to the right. For example, when a dog starts to bark, it is natural for participants who are not muted to look in the direction of the dog or child making noise, which would automatically mute that person. They could be muted for a fixed period of time and then automatically be taken off mute, or the participant could be required to go back off mute when they are ready. Virtual participants could also make a gesture that would bring up a background to hide something. For example, a participant who had a small child run up behind them while on a video call could tip their head backward to bring up the background which would prevent others on the call from seeing the child.

Verbal Queues not Intended for Meeting Participants

There are times when meeting participants make soft comments that are not meant to be heard by the meeting participants or that are not understood by the participants. These verbal queues oftentimes indicate some other emotion from the meeting participant. The central controller could detect these verbal queues and use them to generate the meeting participants immediate reaction or emotion. For example, if a participant is listening to a presentation and does not agree with the content, they may make comments like, 'I don't agree, no way, that's absurd or some other short phrase, the central controller could pick this phrase up and use it to populate the meeting owner dashboard or other device recording/displaying their emotion.

Help that can be Provided by the Central Controller

In various embodiments, the central controller 110 may manage the type of connection made from a user device. The central controller may manage the connection with a view to achieving a stable connection while also giving the user the best experience possible. In various embodiments, if the central controller determines that a user device can only maintain a low bandwidth connection, the central controller may admit the user to a meeting as a virtual participant using only a low-bandwidth feed (such as an audio-only feed or a low-resolution video feed). On the other hand, if the user device can maintain a stable connection at high bandwidth, then the user may be admitted as a virtual participant using a high-bandwidth feed, such as via high-resolution video. In various embodiments, if a connection to a meeting participant is lost, the central controller may inform the meeting owner, the meeting presenter, and/or some other party. The central controller may attempt to re-establish a connection, perhaps a lower bandwidth connection. Once a connection is re-established, the central controller may again inform the meeting owner.

Central Controller Actions

In various embodiments, the central controller 110 may monitor a meeting or a room for problems, and may take corrective action. In various embodiments, the central controller 110 may take away the room if you have three people in an eight person room. It can then suggest other available rooms with the needed amenities and a simple 1 button acceptance or suggested change with notification to all participants. If there are technical issues in a room, the central controller 110 may take such actions as: Shut down room and turn off lights; Have video screens with shut down signal; Reschedule all meetings for other rooms; Notify facilities/IT personnel. If the room is not clean or has not been serviced, the central controller may arrange for food/beverage/trash removal. If a meeting has not been registered, the meeting may use a conference room on a "standby" status. That is, the room can be taken away (e.g., If the room is required by a meeting that was properly registered). If a person is absent from a meeting, or it is desirable to bring a particular person into a meeting, then the central controller may assist in locating the person. The central controller may take such actions as: Can ping them; Can break into a call or meeting room to contact the person; Can cause their chair to buzz or vibrate; Can buzz their headset; Can text them. In various embodiments, the central controller may perform a system self/pre-check prior to the meeting to make sure all devices are functioning (e.g. audio, video, Wi-Fi®, display, HVAC) and alert the responsible technical party and meeting organizer/owner. Meeting options to be provided if not resolved within 1 hour prior to the meeting.

Tagging the Presentation

Presentations contain valuable information but must be linked in a way to quickly and easily retrieve information at any point in time. The central controller could maintain access to all presentations and content along with the relevant tags. Tags may be used in various ways. These include: The main slide with the financials is tagged "financials"; Tag the slide which begins discussions around Project X; Tag slides as "optional" so they can be hidden when time is running low; Tag a presentation as "main microservices training deck"; Show who is a delegate for someone else; Tag for HR review later (and send meeting notes); Tag for legal review later (and send meeting notes). As an example, during an alignment meeting, a meeting owner is asked about the financials for project ABC which are not included in the current meeting presentation. The meeting owner asks the central controller to retrieve the financial information for project ABC. The central controller responds by sending the most recent financial slides for project ABC for display in the meeting.

Generating Meeting Notes/Minutes

While many meeting owners and meeting participants have the best of intentions when it comes to creating a set of meeting notes or minutes at the end of a meeting, all too often they are forgotten in the rush to get to the next meeting. A more efficient and automatic way to generate notes would allow for greater transparency into the output of the meeting. This is especially important for individuals who count on meeting notes to understand the action items that have been assigned to them. In various embodiments, meeting participants could dictate notes during or after the meeting. If a decision was made in a meeting, for example, the meeting owner could alert the location controller 8305 by getting its attention by saying a key word expression like "hey meeting vault" or "let the record reflect", and then announcing that "a decision was made to fully fund the third phase of Project X." The location controller would then send this audio recording to the central controller which would use speech to text software to generate a text note which is then stored in a record associated with the unique meeting identifier. Similar audio announcements by meeting participants throughout the meeting could then be assembled into a document and stored as part of that meeting record. Voice recognition and/or source identification (e.g. which device recorded the sound) can be utilized to identify each particular speaker and tag the notes/minutes with an identifier of the speaker. In various embodiments, the central controller listens to key phrases for diagnostic purposes such as items "you're on mute," "can you repeat that," "we lost you," "who is on the call," "can we take this offline," "sorry I'm late . . . " In various embodiments, cameras managed by the location controller could take images (or video) of walls during the meeting. A team that had done some brainstorming, for example, might have notes attached to the walls. In various embodiments, meeting notes could be appended to another set of meeting notes. In various embodiments, decisions from one meeting could be appended to decisions from another set of meeting notes.

Using Meeting Notes

While storing meeting notes is important, it may be desirable to make it easier for meeting participants to use those notes to enhance effectiveness and boost productivity. In various embodiments, the full corpus of all notes is stored at the central controller and fully searchable by keyword, unique meeting ID number, unique meeting owner ID, tags, etc. In various embodiments, less than the full corpus may be stored, and the corpus may be only partially searchable (e.g., some keywords may not be available for use in a search). In various embodiments, notes are sent to some portion of attendees, or everyone who attended or missed the meeting. In various embodiments, attendees are prompted for voting regarding the notes/minutes—e.g., attendees vote to indicate their approval that the notes/minutes represent a complete and/or accurate transcript of the meeting. In various embodiments, meeting notes are sent to people who expressed an interest in the notes (e.g. I work in legal and I want to see any set of notes that includes the words patent, trademark, or copyright). Various embodiments provide for automatic tracking of action items and notification to meeting participants upon resolution/escalation.

Meeting Assets and Batons

It may be desirable that meetings generate value for the business. The central controller 110 can provide transparency into whether meetings create value by recording the assets created during a meeting. Additionally, there may be task items generated during the meeting that need to be assigned to a person or team. These task items become a kind of "baton" which is handed from one person to another—across meetings, across time, and across the enterprise.

Recording Meeting Assets

Based upon the type of meeting, the central controller 110 can record and tag the asset created during the meeting. For example, in a decision meeting, the central controller could record that a decision was made and the reasoning. For innovation meetings, the central controller could record the ideas generated during the meeting.

Action Items

Some meetings generate action items, to-do items, or batons as an asset. The central controller 110 could record these actions items, the owner of these action items, and who created these action items. The central controller could alert employees of new action items. The central controller could provide these employees with a link to the meeting notes and presentation of the meeting that generated the action item, which would provide information and context to the action item.

Links Between Meetings

The central controller 110, based upon batons or other assets, could identify links between meetings. The central controller could identify duplicative, overlapping, or orphaned meetings. This can trigger actions based on meeting hierarchy—e.g., sub-meeting resolutions may trigger parent meetings to discuss/review resolutions/assets from sub-meetings.

Dormant Assets and Action Items

The central controller 110 could identify dormant assets or action items and flag them for review by their owners or schedule a new meeting.

Low Value Meetings

The central controller could flag meetings that produce few assets, result in dormant action items, or produce few assets relative to the expense of holding the meeting.

CEO (or Project Sponsor) Controls

Various embodiments provide a CEO (or other leader, or other authority, or other person) a chance to ask a challenge question in advance of a meeting based on the registered purpose of the meeting. For example, if the purpose of the meeting is to make a decision, the CEO can have an experienced and highly rated meeting facilitator ask a meeting owner (or some other attendee) exactly what they are trying to decide. The CEO may require that the meeting owner has to respond before the meeting, or deliver the output as soon as the meeting is done. In various embodiments, a CEO has the option to require an executive summary immediately after a meeting (e.g., within half an hour), on decision(s), assets generated, outcomes, and/or Other aspects of a meeting.

Request an Approval

In various embodiments, it may be desirable to obtain an approval, authorization, decision, vote, or any other kind of affirmation. It may be desirable to obtain such authorization during a meeting, as this may allow the meeting to proceed, for example, further agenda items that are contingent upon the approval. The approval may be required from someone who is not currently in the meeting. As such, it may be desirable to contact the potential approver. In various embodiments, the central controller 110 may set up a real-time video link from a meeting room to a potential approval. In various embodiments, the central controller 110 may email the decision maker with the data from the meeting to get an asynchronous decision. In various embodiments, the central controller 110 may message someone authorized to make a decision (or vote), e.g., if the main decision maker is not available.

Subject Matter Experts (SMES)

In various embodiments, it may be desirable to find someone with a particular expertise. The expert may be needed to provide input in a meeting, for example. For example, meeting participants may desire to find the closest available SME with an expertise of "Java". Categories of expertise/SMEs may include the following: Coding; Supply chain/logistics; Finance; Marketing/Sales; Operations; Strategy; Value stream mapping; Quality/Lean; HR; IT Architecture; Customer Experience and Core Business knowledge; Meeting facilitator by meeting type (e.g. an SME whose expertise is facilitating Innovation Meetings); and/or Any other area of expertise.

Employee Handheld/Wearable Devices

In various embodiments, an employee device, such as a handheld or wearable device (e.g., a user device of table 900 or a peripheral device of table 1000), may assist an employee with various aspects of a meeting. In various embodiments, an employee device may: Show the employee the location of your next meeting; Show the employee who is running the meeting; Show the employee who the participants will be; Let the employee vote/rate during meetings; Connect the employee via chat/video with someone you need temporarily in a meeting; Display the meeting purpose; Display the slides of the deck; Take a photo of the whiteboard and send it to the central controller for that meeting ID number; Take a photo of stickies which the central Controller can OCR and add to meeting notes; and/or may I assist with any other action.

Network/Communications

In various embodiments, the central controller 110 could play a role in managing communication flow throughout the enterprise. If there are dropped connections from participants (e.g., from participant devices) provide immediate notification to the meeting owner for appropriate action. In various embodiments, a meeting owner could initiate a communication link between two ongoing meetings. The central controller could also automatically create a video link between two ongoing meetings that had agendas that were overlapping. For example, two meetings that identified Project X as a main theme of the meeting could be automatically connected by the central controller. In various embodiments, when network bandwidth is constrained, the central controller could turn off the video feeds of current virtual participants and switch them to audio only. If there is failed video/audio, the central controller may provide immediate notification to the meeting owner and other participants. Communication channels could also be terminated by the central controller. For example, a side channel of texting between two different meetings could be stopped while key decisions are being made in those meetings. During a meeting, the meeting owner could ask the central controller to be immediately connected to an SME who had expertise in data security.

Ratings and Coaching

A potentially important part of improving the performance of meetings (and employees) and bringing greater focus and purpose to work is to gather data from employees and then provide assistance in making improvements. One way to gather such data is by having participants provide ratings, such as polling all meeting participants in a 20-person meeting to ask whether or not the meeting has been going off track. Additionally, the central controller 110 could gather similar data via hardware in the room. For example, during that same 20-person meeting the central controller could review data received from chairs in the room which indicate that engagement levels are probably very low. These ratings by machine and human can be combined, building on each other. The ratings can then be used as a guide to improving performance or rewarding superior performance. For example, someone who was using a lot of jargon in presentations could be directed to a class on clear writing skills, or they could be paired with someone who has historically received excellent scores on presentation clarity to act as a mentor or coach. In this way, the performance of employees can be seamlessly identified and acted upon, improving performance levels that will translate into enhanced performance for the entire enterprise.

The ratings produced according to various embodiments can also be used to tag content stored at the central controller. For example, ratings of individual slides in a PowerPoint deck could be stored on each page of that deck so that if future presenters use that deck they have an idea of where the trouble spots might be. Edits could also be made to the deck, either by employees or by software at the central controller. For example, the central controller could collect and maintain all ratings for slides that deal with delivering financial information. Those financial slides with a high rating are made available to anyone needing to develop and deliver a financial presentation. This continual feedback mechanism provides a seamless way to continually improve the performance of the individual (person preparing the presentation) and the enterprise. Less time is spent on failed presentations and relearning which presentations are best at delivering information and making those available to anyone in the enterprise. Furthermore, in addition to providing the highly rated presentation, the actual video presentation could be made available for viewing and replication. If a presenter earned a high rating for delivering the financial presentation, the content and actual video output of the presentation could be made available to anyone in the enterprise for improvement opportunities. In various embodiments, ratings may be used to tag content. Thus, for example, content may become searchable by rating. Content may be tagged before, during, or after the meeting. Tags and ratings me until some of the feedback described with respect to FIG. 54.

Feeling Thermometer

As a PowerPoint™ presentation is being presented, meeting participants could use a dial on their meeting participant device to indicate whether the material is clear. As a speaker is leading a discussion, meeting participants could use the same dial to indicate the level of engagement that they feel in the meeting. The output of such continuous rating capabilities could be provided in a visual form to the meeting owner, such as by providing that meeting owner with a video of the presentation with a score at the top right which summarizes the average engagement score as indicated by the participants.

Rating Participants

Participants can be rated by other participants on various meeting dimensions. These may include, contribution to the meeting, overall engagement and value as the role being represented. The central controller could collect all participant feedback data and make available to the participant, meeting owner and manager for coaching opportunities.

Dynamic Ratings and Coaching

During meetings, the central controller 110 could prompt presenters and participants for ratings. For example, the central controller could provide cues to the meeting owner or presenter to slow down or increase the speed of the meeting based upon time remaining. The central controller also could prompt individual participants to rate particular slides or parts of a presentation if it detects low levels of engagement based, for example, on eye tracking or chair accelerometers. Based upon ratings from prior meetings, the central controller could assign a "Meeting Coach" who can provide feedback at future instances of the meeting.

Signage in Room

Meetings often start with administrative tasks taking place and waste time getting to the true purpose of the meeting. Reinforcing relevant information at the start of a meeting can help to streamline the meeting time and set a positive tone in advance of the actual start. In various embodiments, signage (or some other room device) displays the meeting purpose (or says it out loud). In various embodiments, the central controller 110 knows the purpose of the meeting based on the meeting owner's input in the invitation. The central controller could display the purpose on all monitors in the meeting room and display devices accessing the meeting remotely. In various embodiments, signage (or some other room device) shows a meeting presentation. The central controller 110 can queue up the appropriate presentation based on the meeting owner input. As the meeting agenda is followed, each subsequent presentation can be queued as to not cause a delay in connecting a laptop and bringing up the presentation. In various embodiments, signage (or some other room device) shows people who have not yet arrived. Many meetings take enormous amounts of time taking attendance. The central controller can dynamically list those that have not joined the meeting either in person or virtually. Those attendees that have informed the meeting owner they will be late or not attend via the central controller can be displayed and also when their estimated arrival time will be. Those that actually attend can be sent to the meeting owner.

In various embodiments, signage (or some other room device) shows people who need to move to another meeting. Signage may give people their "connecting gates" for their next meeting. The central controller could provide proactive alerts to attendees requiring them to leave the meeting in order to make their next meeting on time. This can be displayed on the monitors or on personal devices. For example, if participant "A" needs to travel to another meeting and it takes 15 minutes of travel time, the central controller could provide a message to display that participant "A" needs to leave now in order to make the next meeting on time. Likewise, if participant "B" in the same meeting only needs 5 minutes of travel time, participant “B” could be altered 5 minutes prior to the start of the next meeting. In various embodiments, signage (or some other room device) shows people who are no longer required at this meeting. As meetings progress through the agenda, certain topics no longer require specific individuals in a meeting. Providing a visual indication of only those participants needed can help streamlining decisions and make everyone more productive. For example, if the first agenda topic takes 10 people in a meeting, but the second agenda item only needs 5 people, the central controller could notify those 5 they can now leave the meeting and display the message on the monitor and devices. In various embodiments, signage (or some other room device) shows a decision that was made last week which was relevant to the current meeting topic. Each agenda item/action item has a tag identified. As action items are resolved and decisions made, these can be displayed in advance of the meeting or throughout the tagged agenda items. For example, the central controller has access to all agenda items, action items and decisions and each has an associated tag. As the meeting progresses and topics in the agenda are covered, the central controller can display resolved action items and decisions relevant to the agenda topic and used in the discussions.

In various embodiments, the room knows what to say. Using meeting time to celebrate and communicate important information not directly related to the agenda items can be a way to reinforce key topics and focus on the people aspects of a company. In various embodiments, the room may display messages. The central controller can access HR information (birthdays, work anniversaries, promotions), third party external sites (traffic, weather alerts, local public safety information) and internal text or video messages from key leaders (CEOs, Project Sponsors, key executives). Example messages may pertain to: Promotions; Anniversaries; Birthdays; Company successes; Employee Recognition; CEO message; Traffic updates; “We just shipped the fifth plane with medical supplies”; “Did you know that . . . ?” In various embodiments, it may be desirable that messages take the right tone and be at the right time. The central controller knows each type of meeting taking place (informational, innovation, commitment and alignment). Based on the meeting type, the central controller displays meeting specific information on display devices and to attendees in advance. Innovation sessions should have lighter/more fun messages. On the other hand, commitment meetings might prevent all such messages. Learning meetings could feature pub quiz type messages. Alignment meetings may show messages indicating other people or groups that are coming into alignment. For example, a message may show four other teams in Atlanta are meeting about this same project (show a map of locations). In various embodiments, a message or view may be changed based on a particular tag (e.g. a participant may select a tag to show all microservices meetings). As another example, a participant may ask to see the top priorities for other orgs/ARTs/teams.

Audio/Video

In various embodiments, the central controller 110 may store audio and/or video of a meeting. The central controller may store the full audio and/or video of a meeting. In various embodiments, the central controller may store part of the audio or video of a meeting based on one or more factors. The central controller may store part of the audio or video of a meeting based on a request from participants (e.g. “please record the next two minutes while I describe my idea for improving collaboration”) (e.g. “please clip the last two minutes of discussion”). The central controller may record any time loud voices are detected. The central controller may record any time the word “decision” or “action item” is heard. The central controller may record a random portion of the meeting. In various embodiments, a presentation has built in triggers on certain slides that initiate recording until the meeting owner moves to the next slide.

Other Hardware Devices

Various devices may enable, enhance and/or complement a meeting experience.

Virtual Reality

In various embodiments, virtual reality goggles may be used in a meeting. These may provide a more complete sense of being in a meeting and interacting with those around the wearer. In various embodiments, these may obviate the need for a camera, screens, rooms—instead, the meeting controller handles it all.

Headsets

As more and more meetings are held virtually, a greater number of meeting participants are not physically present in a room. Those participants are connecting via phone, or more commonly via video meeting services such as Zoom® or WebEx®. In these situations, it is common for participants to be wearing headsets. Connected into the central controller 110, this could allow a headset to help sense more information from meeting participants. The headset could contain any of the following sensors and connect to them the central controller: accelerometer, thermometer, heating and/or cooling device, camera, chemical diffuser, paired Wi-Fi® ring or smart watch, galvanic skin response sensors, sweat sensors, metabolite sensors, force feedback device. In various embodiments, an accelerometer is used to detect head movements, such as:

- Detecting whether or not a meeting participant is currently nodding in agreement or shaking their head from side to side to indicate disagreement.
- Detecting head movements along a continuum so that the participant can indicate strong agreement, agreement, neutrality, disagreement, or strong disagreement based on the position of their head in an arc from left to right.
- Detecting whether a person is getting sleepy or bored by having their head leaned forward for a period of time.
- If a head turns abruptly, this could indicate a distraction and mute the microphone automatically. When a dog enters or someone not a part of the meeting (a child), oftentimes people turn their head quickly to give them attention.
- Detecting whether someone has been sitting for long periods to remind the wearer to take breaks and stand up.
- Head movements coupled with other physical movements detected by the camera could be interpreted by the central controller. For example, if a participant’s head turns down and their hands cup their face, this may be a sign of frustration. Fidgeting with a headset might be a sign of fatigue.
- The central controller could interpret head movements and provide a visual overlay of these movements in video conferencing software. For instance, the central controller could interpret a head nod and overlay a “thumbs up” symbol. If the central controller detects an emotional reaction, it could overlay an emoji. These overlays could provide visual cues to meeting participants about the group’s opinion at a given moment.

In various embodiments, a thermometer is used to measure the wearer’s temperature and the ambient temperature of the room.

The central controller could record the wearer's temperature to determine if the wearer is healthy by comparing current temperature to a baseline measurement.

The central controller could determine if the individual is hot or cold and send a signal to environmental controls to change the temperature of the room.

The central controller could use temperature to determine fatigue or hunger and send a signal to the wearer or the meeting owner to schedule breaks or order food.

In various embodiments, a headset could contain a heating and/or cooling device to signal useful information to the wearer by change temperature, such as whether they are next in line to speak, whether a prediction is accurate ("hotter/colder" guessing), proximity in a virtual setting to the end of level or "boss", or signal time remaining or other countdown function. In various embodiments, the headset could have a camera that detects whether or not the user's mouth is moving and then check with virtual meeting technology to determine whether or not that user is currently muted. If they are currently muted, the headset could send a signal to unmute the user after a period of time (such as 10 seconds), or it could trigger the virtual meeting technology to output a warning that it appears the user is talking but that they are currently muted. In various embodiments, the headset could contain a chemical diffuser to produce a scent. This diffuser could counteract a smell in the room, use aromatherapy to calm an individual, evoke a particular memory or experience, or evoke a particular physical place or environment. In various embodiments, the headset could be paired with a Wi-Fi® ring/smart watch which would set off an alarm in the headset when the user's hand approached their face. This could allow presenters to avoid distracting an audience by touching their face, or it could be used to remind participants not to touch their face when flu season is in full swing. In various embodiments, the headset could contain galvanic skin response sensors, sweat sensors, and/or metabolite sensors. The central controller could record the galvanic skin response or the rate of sweat or metabolite generation to determine whether the wearer is healthy by comparing the current measurement to a baseline measurement. The central controller could then signal to the meeting owner whether the meeting should continue or be rescheduled.

Force Feedback

One or more devices could employ force feedback. This could include hardware associated with the device which causes the device to buzz when prompted. In various embodiments, the presentation controller could be used for the meeting owner to contact a meeting participant verbally. For example, a meeting owner may need to ask a question specific to another person without others hearing in the room. They could speak the question in the presentation controller and it could be heard by the meeting participant to respond. Also, they could use the same capability to request the meeting participant to engage in the discussion.

Microphones

Microphones may have various uses in meetings. Meetings are routinely interrupted by background sounds from remote meeting attendees causing a break in the meeting cadence and lost productivity. By using pre-recorded sounds that invoke a response by the central controller, the microphone could be put on mute automatically. For example, if your dog's bark is pre-recorded, the central controller could be listening for a bark and when recognized, the microphone is automatically put on mute. Similarly, if a doorbell or a cell phone ring tone is recognized, the microphone is put on mute automatically. In various embodiments, microphones should be muted automatically if they are outside the range of the meeting or the person is no longer visible on the video screen. Remote workers take quick breaks from meetings to take care of other needs. For example, a parent's child may start screaming and need immediate attention. If the meeting controller recognizes the meeting participant has moved from the video screen or several feet from their display device, mute the microphone automatically. Another example may be where someone leaves the meeting to visit the restroom. In various embodiments, a microphone is always listening (e.g., for a participant to speak). For participants that are on mute, once they begin to speak, the microphone detects this and automatically takes them off mute. For example, there are many occasions where meeting participants place themselves on mute or are placed on mute. Oftentimes, they do not remember to take themselves off of mute and it forces them to repeat themselves and delay the meeting.

Presentation Controllers and Remote Control Devices

Presentation controllers, remote control devices, clickers, and the like, may be useful in meetings. In various embodiments, hardware/software added to these devices can be used to increase their functionality, especially by allowing for direct communication with the central Controller 110 or location controller 8305. In various embodiments, a presentation controller and/or remote control device may include a Wi-Fi® transmitter/receiver (or Bluetooth®). This may allow the device to communicate with the central controller, a location controller, participant device, smartphones, screens, chairs, etc. Wi-Fi® data can also be used in determining the position of the device. In various embodiments, a presentation controller and/or remote control device may include a GPS or other positioning device. This may allow the central controller to determine where the presentation clicker is and whether it is moving. In various embodiments, a presentation controller and/or remote control device may include one or more accelerometers. By knowing the position of the device in three dimensions, it can be determined where the pointer is pointing within a room, which can allow for the presenter to obtain and exchange information with participants or devices within the room. In various embodiments, a presentation controller and/or remote control device may include a microphone. This could pick up voice commands from the meeting owner directed to the central controller or meeting controller to perform certain actions, such as recording a decision made during a meeting. In various embodiments, a presentation controller and/or remote control device may include a speaker. The speaker may be used to convey alerts or messages to a presenter. For example, the presentation controller may alert the user when one or more audience members are not paying attention. As another example, a member of the audience may ask a question or otherwise speak, and the presenter may hear the audience member through the remote control device. In various embodiments, messages intended for the audience (e.g., messages originating from the central controller, from the CEO, or from some other party), may be output through the speaker. As will be appreciated, a speaker may be used for various other purposes.

In various embodiments, a presentation controller and/or remote control device may include a force feedback. This could include hardware associated with the device which causes the device to buzz when prompted. In various embodiments, a presentation controller and/or remote control device may include a display screen. This could be touch enabled, and could show maps, meeting participant information, slide thumbnails, countdown clocks, videos, etc. In various embodiments, meeting participants need to quickly move between virtual meeting breakout rooms. In order to easily navigate between rooms, the attendee could touch the meeting room they need to attend and the central controller automatically puts them in the meeting room for participation. Furthermore, if attendees need to be assigned to a meeting breakout room, the meeting room owner could easily touch the person's picture and drag the icon to the appropriate room. This can be done individually or in bulk by clicking on multiple picture icons and dragging to the appropriate room. In various embodiments, a presentation controller and/or remote control device may include lighting, such as one or more lights capable of displaying different colors and capable of flashing to get the attention of the presenter. Presentation controllers and remote control devices may have one or more capabilities enabled, according to various embodiments. Capabilities may include alerting/communicating with other devices.

Capabilities may include responding to or interacting with an object being pointed at. A presenter (or other person) may point a presentation controller at people to get information about their mood. A presenter may point a presentation controller at a statistic on a slide to pull up additional info. A presenter may point a presentation controller at a chart on a slide to email it to someone. In various embodiments, a clicker vibrates when it is pointed at someone who is waiting to ask a question. In various embodiments, a clicker vibrates when it is pointed at someone who is confused. In various embodiments, Augmented Reality (AR), such as through smart glasses, highlights different attendees in different colors to identify different votes, answers, moods, status, participation levels, etc. In various embodiments, AR may highlight an attendee if the clicker is pointed at the attendee. In various embodiments, a presentation controller and/or remote control device may change colors. In various embodiments, the device can turn red to reflect stress levels of participants. The device can automatically cue up a coaching video on a room display screen based on the current stress level of the room. In various embodiments, voice recognition capabilities may be useful (e.g., as a capability of a presentation controller and/or remote control device) in that they allow for the presenter to perform tasks without having to type messages and without breaking the flow of the presentation. In various embodiments, voiced instructions could be used for jumping to particular slides For example, the presenter could tell the device to jump ahead to "slide 17". For example, the presenter could tell the device to jump ahead "five slides". For example, the presenter could tell the device to jump ahead "to the slide with the financials".

Managing a Meeting Break

Various embodiments may facilitate efficient meeting breaks. In various embodiments, a room screen shows everyone's current location. This may allow a meeting owner to more easily round up late returnees from a break. In various embodiments, people can text in a reason for being late to return. In various embodiments, participants could vote to extend the break. In various embodiments, the central controller could recommend a shorter break. In various embodiments, a countdown clock is sent to participant devices. In various embodiments, a countdown clock is sent to kitchen screens. In various embodiments, lights can go up during a break.

Playing Videos

In various embodiments, one or more videos may be played during a meeting, during a meeting break, prior to a meeting, or after a meeting. Videos may have a number of uses. During a meeting, videos may help to calm people down, instruct people, inspire people, get people excited, get people in a particular state of mind, etc. In various embodiments, a background image or video is used to encourage a particular mood for a meeting. For a commitment meeting, a calming image may be used, e.g., a beach. Music may also be chosen to influence the mood. For an innovation meeting, there may be upbeat music. There may also be a varying background. In various embodiments, the tempo of music (e.g., in a video) may be used to influence the mood. For example, music gets faster as you get closer to the end of the meeting. A video of the CEO may get participants thinking about purpose (e.g., a purpose for the meeting). The video may play two minutes before the meeting. An innovation session may start with a video of what problem the session is trying to solve. Financial stats scroll by so you can see where the company needs help. A program increment (PI) planning meeting (i.e., a standard meeting used as part of the SAFe/Agile development framework) may begin with a video explaining the purpose of the meeting as one to align employees to a common mission and vision. In various embodiments, any other meeting type may begin with a video explaining the purpose of the meeting.

In various embodiments, a background video may show customers being served. Meeting participants may get the feeling, "I want to be part of that". In various embodiments, a cell phone (or other participant device) shows each participant a photo of a different customer. Virtual participants in a meeting may feel a kind of emotional distance to other participants as a result of the physical distance and/or separation. It may be desirable to break down the space between two physically distant people, i.e., to "connect them" more deeply. In various embodiments, participants may pick emojis to represent themselves. Emojis may represent a mood, a recent experience (e.g., emojis show the three cups of coffee that the participant has consumed), or some other aspect of the participant's life, or some other aspect of the participant. In various embodiments, some description (e.g., personal description) of a participant may appear on screen to better introduce the participant. For example, text underneath the participant's video feed may show for the participant: kids names, hobbies, recent business successes and/or a current position in a discussion of a commitment. Various embodiments may include a library of Subject Matter Expert videos in which these SMEs explain technical issues or answer questions related to their subject matter expertise. Videos may be stored, for example, in assets table 6000. SME videos may give people more confidence to make decisions because they have a deeper understanding of technical issues that may improve the decision quality. Videos may provide methodical injections of confidence builders. Videos may provide feedback from previous decisions. Videos may provide Agile software user story expertise. In various embodiments, an attendee has an opportunity to provide reasons that he is late for a virtual or physical meeting. In various embodiments, the meeting platform (e.g., Zoom) texts the attendee and gives him several options to choose from, such as: I will be five minutes late; Having trouble with my PC; I forgot, logging in now; I will not be there.

Enterprise Analytics

In various embodiments, analytics may help with recognizing patterns and making needed adjustments for efficiency and may contribute to the success of an enterprise. The central controller could collect some or all data related to meetings to train Artificial Intelligence (AI) modules related to individual and team performance, meeting materials and content, and meeting processes. Insights from these data could be made available to leadership or other interested parties through a dashboard or through ad hoc reports. An AI module may be trained utilizing meeting data to identify individual performance in leading and facilitating meetings, creating and delivering presentations, and contributing to meetings. Additionally, an AI module may be trained to optimize meeting size, staffing requirements, and the environment and physical layout of meetings. An AI module may be trained to identify meetings that are expensive, require large amounts of travel, or result in few assets generated. Some examples of meeting data that could be used as a training set for these and other AI modules include:

- Meeting size (number of participants, split out into physical and virtual)
- Meeting length (including allocations for travel time if appropriate)
- Number of meetings per day
- Meeting type
- Results accomplished
- Spawned action items or new meetings
- Time of day/week
- Purpose
- Presentation materials
- Participation rate
- Meetings linked to enterprise goals
- Tagged meetings and assets
- Cost of meeting
- Number of meeting invites forwarded for attendance
- Rating of meeting by participants
- Biometric data (for example, average level of engagement as determined via a combination of data from cameras in the room and motion data tracked by headsets)
- All other collected meeting information Some examples of data related to meeting participants/owners that could be used as a training set for these and other AI modules include:

- Participant rating by meeting and aggregated over time
- Meeting owners rating by meeting and aggregated over time
- Ratings by seniority level. For example, do executives rate the meeting owner higher than their peers?
- Time spent in meetings over a period of time
- Number of meetings attended over time, by project and by enterprise goal
- Sustainability score by participant, owner, department and enterprise
- All other collected meeting information for participants and owners
- Hardware utilized
- Biometric data (for example, level of engagement of a particular meeting participant as determined via a combination of data from cameras in the room and motion data tracked by headsets).

In various embodiments, analytics may be used for generating reports, dashboards, overviews, analyses, or any other kind of summary, or any other view. Analytics may also be used for indexing, allowing for more efficient or more intelligent searches, or for any other purpose. In various embodiments, analyses may include:

- An overview of meeting assets generated.
- Reporting based on tags associated with meetings or presentation materials.
- Find the decision that was made on whether or not we are going into the German market; find the materials generated (e.g. the Kepner Tregoe method of decision analysis, the Porter's 5 forces analysis, the macroenvironment analysis, the Strengths, Weaknesses, Opportunities and Threats (SWOT)) that supported the decision to go into the German market based on asset tagging.
- Provide reporting for spikes in meetings. Provide reporting on the number of meetings on a certain day during a specific time period.
- Ratings. Provide reports on ratings for meeting, meeting types, assets and individuals (meeting owners and participants)
- System notices that the quality of meetings about Project X has decreased. This might then get a manager to audit the next meeting.
- Central controller has a database of pre/post meeting questions requiring rating by participants and selected by the meeting owner.
- Tables/chairs/layout (e.g. how many meeting rooms are "U" shaped, how many chairs does an average meeting room contain, etc.)/equipment type/equipment age
- Rooms (physical and virtual)
- Tend to go well—based on ratings by participants and meeting owners
- Facilities issues—based on ratings from meeting participants and meeting owners, including functioning equipment and cleanliness.
- Do people stay awake, engagement and mental and physical fitness based on biometric data collected during the meeting.
- Do actions (audio, warnings, lighting, AC changes, etc.) generate effects? Provide reporting based on environmental changes and the impact to meeting results and biometric data collected.
- All other collected meeting information for meeting rooms The central controller 110 could collect all data related to headset communications and functions so that statistics and insights could be sent back to individuals and teams using a headset. The collected data could also be used to train Artificial Intelligence (AI) modules related to individual and team performance, meeting materials and content, meeting processes, business and social calls, in-game communications, athletic performance, and the like. Insights from these data could be made available to interested parties through a dashboard or through ad hoc reports. An AI module may be trained utilizing headset data to identify individual performance in leading and facilitating meetings, creating and delivering presentations, contributing to meetings, managing calls, athletic achievement, social achievement, and achieving success in a game. Additionally, an AI module may be trained to optimize meeting size, meeting effectiveness, and meeting communications. An AI module may be trained to identify meetings that are expensive, require large amounts of travel, or result in few assets generated.

In some embodiments, a CEO is interested in being more connected with those who work for her, and wants to be able to help a greater number of employees without spending all of her time attending meetings. The CEO could designate "office hours" which could be transmitted to a central controller, or saved into a data storage device of the headsets of all company employees. This would allow employees to connect seamlessly with the CEO, regardless of where they are or where the CEO is. The user's headset could include information via a video display of the headset (or via speakers) with information on whether or not the CEO was already in a call, and an indication of how many people might be currently in line to speak with her. The CEO could also use her headset to manage the priority of incoming calls, moving callers on hold up or down in priority. Users could also provide a short audio clip summarizing the reason for the call via a microphone of the user's headset which can be made available to the CEO via a speaker of her headset, enabling more effective prioritization of calls.

In some embodiments, users could subscribe to audio channels by tag, such as a software architect subscribing to all current audio feeds tagged with "architecture."

Analytics regarding the performance of users on a call could also be provided to appropriate personnel at a company. Performance regarding call data could include speaking time, quality ratings from other participants, engagement levels of the user, etc. Input data could include call-related data, biometric inputs, user location, physical movements, volume and pitch of voice, direction of gaze, post-call 360*s*, tagging data, etc.

Predictive analytics could also be used to help user's avoid making mistakes or saying the wrong thing. For example, if a user's headset pulse rate sensor indicates that the user may be agitated while on a call, the processor of the headset may put the user on mute until his pulse rate drops to a level which indicates he is going to be more level-headed. Instead of automatically being muted, the user might be given a verbal warning by the headset or he might be connected via a sub-channel with a coach who can help guide him toward improved performance.

The user headset could also make predictions, either via the processor of the headset or in conjunction with the central controller, predicting when people are not at their best by reviewing camera, microphone, accelerometer, and other sensor data. Predictions by the headset could include whether or not the user is in good health, is tired, is drunk, or whether he might need a boost of caffeine.

Some examples of data that could be used as a training set for these and other AI modules include health data (e.g., blood pressure, pulse rate, pupil dilation, breathing rate, biometric data), athletic performance data (e.g., velocity, location, form, step length and width, exertion based on image evaluation, duration and type of activity), emotional data, environmental sensor data (e.g., pollution levels, noise levels).

Security

Maintaining a secure meeting environment may be important to an enterprise. It may be important that only those meeting participants and owners that have privileges to a meeting can actually join and participate. The central controller should maintain information about each person that is used as an additional layer of meeting security. Dimensions that can be used to authenticate a meeting owner and/or participant include: facial recognition; voiceprint; etc.

Various embodiments include a mouse that shows me that my opponent is someone that I have played against before. The mouse may also show prior moves or strategies of my opponent. Similar to how sports teams watch game videos to learn the playing style and strategies of other teams, the same approach may be used with peripherals. For example, Player 1 is invited to play a game with Player 2 or initiates play with Player 2 using a peripheral (e.g. mouse, keyboard). Player 1 requests through the peripheral 3800 to the network port 410 the previous opening game moves or typical movements from Player 2's processor 405 and storage device 445. Player 1 receives the stored game information from Player 2 through the house controller 6305*a-b* and central controller 110 to her device for display on screen 3815. Examples of the information Player 1 receives on the peripheral from Player 2 at the start of the game is that they frequently move to the right in the map sequence, hide behind a building in a combat game, during a chess match make the move 1.e4 75% of the time. This information may be displayed on Player 1's screen 3815 in text form or image form (e.g. chess board showing the typical moves). In addition, Player 1 may receive the complete statistics of Player 2 for a game being played such as the number of lives lost, the type and number of weapons used, the number of chess moves before a win or loss, the amount of time spent playing the game over some time period (e.g. 3 hours of Fortnite® during the last 7 days). All of the information allows Player 1 to gain more insight to Player 2's strategy, strengths and weaknesses for the game being played.

Authentication

In various embodiments, a user's pattern of interaction with a peripheral device may serve as a presumed unique identifier or authenticator of the user. In such embodiments, it may be assumed that different users interact differently with a peripheral device, and such differences can be discerned using an algorithm. For example, a user's interaction pattern with a peripheral device may be quantified in terms of one or more features. In a first example, when a user types the word "the" on a keyboard, the ratio of (1) the elapsed time between typing the "t" and the "h"; to (2) the elapsed time between typing the "h" and the "e", may serve as one feature. In another example, the absolute elapsed time between typing the "h" and the "e" may be another feature. In another example, the amount of pressure a user uses on a key (or on a button) may be another feature. In fact, there may exist a separate feature for each key or button. In another example, the top speed at which a user moves a mouse may be a feature. In another example, the average speed at which a user moves a mouse during the course of a motion may be a feature. In another example, the pressure a user exerts on a mouse button when the user is not clicking the button may be a feature.

For any given user, values for the aforementioned features, a subset thereof, or any other features, may be recorded and/or calculated based on historical usage data (e.g., based on three hours of usage).

When it is desirable to verify the identity of a user, or otherwise authenticate the user, a new sample of usage data may be obtained from the user. For example, the user may be asked to type a paragraph, or to perform a series of tasks on a website or app that involve clicking and moving a mouse. Usage features may be calculated from the newly obtained usage data. The new values of the usage features may be compared to the values of the usage features obtained from the user's historical usage data. If the newly obtained values match the historical values (e.g., the sum of the absolute values of the differences is less than a predetermined amount), then the user may be considered verified.

In various embodiments, a classification algorithm may be used (e.g., a decision tree), to classify an unknown user by deciding which known user's data is most closely matched by data newly obtained from the unknown user. As will be appreciated, various embodiments contemplate other ways in which the usage patterns of a peripheral device by a user may be used to authenticate the user.

In various embodiments, data passively obtained from users, such as via sensors (e.g., heart rate sensors) may also be used to create features, and/or to authenticate a user. In various embodiments, sensor data may be used in combination with usage data.

In various embodiments, usage patterns, features obtained from usage patterns, sensor data, and/or features obtained from sensor data may serve as a biometric.

In various embodiments, a biometric may serve as a way to identify or authenticate a user. In various embodiments, biometric may serve as a basis for responding to the user, adapting to the user, enhancing the user experience, or otherwise making a customization for the user. For example, a usage pattern may correlate to a skill level in a game, and the central controller may utilize the inferred skill level to adjust the difficulty of a game.

In various embodiments, certain activities may have legality, eligibility, regulatory, or other rules that vary from location to location. For example, gambling may be legal in one jurisdiction, but not in another jurisdiction. In various embodiments, a peripheral device may be used to authenticate a user's location, or some other aspect of the user, in order to comply with any applicable laws or regulations.

In various embodiments, a peripheral device includes a GPS sensor, a positioning sensor, or any other location sensor or determinant. When a user is contemplating a regulated activity, the peripheral device may transmit to the central controller, or to some other authority, an indication of the user's location. The user may then be granted permission to participate in the regulated activity based on whether or not the activity is permitted in the user's location.

In various embodiments, a peripheral device may be used as part of a process of multi-factor authentication. A user may initially be associated with a particular peripheral device (e.g., with a trusted peripheral device). For example, the user registers a trusted peripheral device in association with his name. Presumably, this peripheral device would henceforth be in the possession of the user. In various embodiments, when a user is attempting to authenticate himself for some reason, a temporary code, personal identification number (PIN), or the like may be sent to the same peripheral device. The user may then key in the same code (e.g., on some other device, such as on a personal computer) as part of the authentication process.

In various embodiments, as part of a multi-factor authentication process, a user is prompted to use a peripheral device. The user's unique pattern of usage may then serve as a confirmation of the user's identity.

The biometric data from the devices could be used for validating survey responses and embedded survey experiments. For example, whether a person actually took the survey and whether the individuals were confused or frustrated by particular survey questions. Additionally, the object of the survey could be to measure an individual's biometric responses when asked particular questions.

Online advertisers often pay per click or impression. These revenue systems are often spoofed by bots or other means. The devices according to various embodiments could be used to authenticate "true clicks" or "true impressions" by verifying that an actual person clicked or viewed the ad. In some embodiments, peripheral device (e.g. mouse, keyboard, headset) movements generated by a user may be transmitted to central controller 110 for correlation of their timing with any clicks on advertising. Clicks that are not associated with any peripheral movement would be deemed as illegitimate clicks. In other embodiments, cameras or sensors (e.g. motion sensors, microphones) may similarly send information to central controller 110 as corroborating data regarding verification of user mouse clicks on advertisements.

Many websites prohibit online reviews, posts, or comments which are posted by bots or other automated means. The devices according to various embodiments could be used to authenticate that online reviews, posts, or comments were made by an actual individual.

In various embodiments, peripheral devices may serve as a first or second check that a live user is providing information. Sensors built into peripheral devices, and vital signs or biometrics read from peripheral devices, may be used to verify that a live user is providing some information or instruction, such as a password, credit card number, review, post, game input, etc.

Advertisers often have difficulty in distinguishing between different users on shared devices and tracking individuals across multiple devices. The devices according to various embodiments could help advertisers disambiguate and track users, either because individuals sign into their devices, or because a user's "fist," or characteristic patterns of inputs could allow the central controller to identify particular individuals using a device or an individual across several devices.

Figure 89:
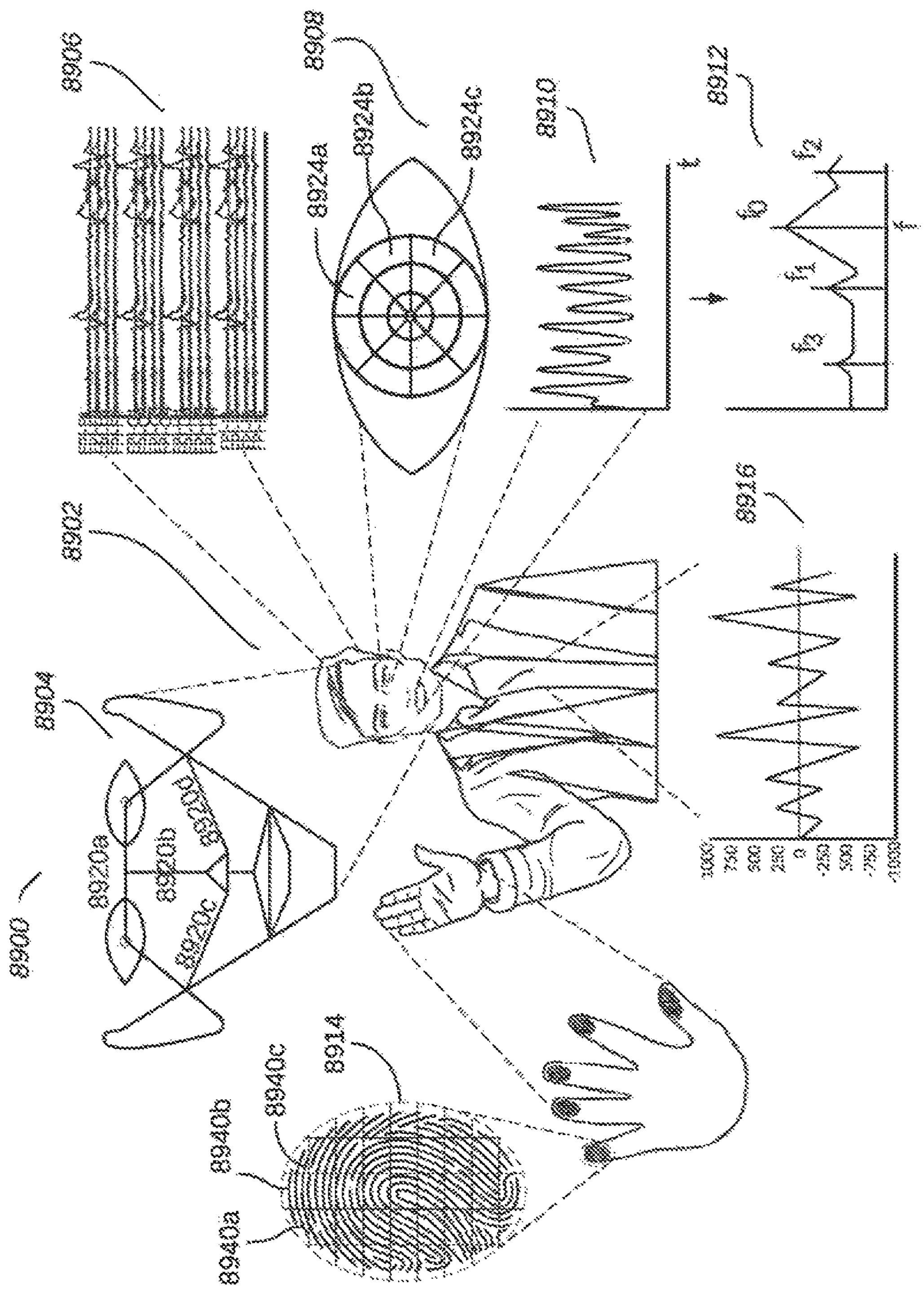
FIG. 89 is an illustration of an individual with biometric information consistent with at least some embodiments described herein.

Turning now to FIG. 89, a diagram of a person with associated biometric data 8900 according to some embodiments is shown.

The depicted biometric data is intended for illustrative purposes, and does not necessarily depict actual data read from an actual human being.

In FIG. 89, an individual 8902 has various types of associated biometric data. Further, a given type of biometric data may be associated with a given part of the body. Facial measurements 8904 are associated with the user's face. Electroencephalogram (EEG) data 8906 is associated with the user's head (i.e., with the brain). Iris and/or retinal data 8908 are associated with the user's eye(s). Voice data 8910 and 8912 is associated with the user's mouth. Fingerprint data 8914 are associated with the user's hand. Heart waveforms 8916, such as electrocardiogram (ECG/EKG), arterial pressure waves, etc. are associated with the user's heart. It will be noted, however, that associations between data and body parts are made for convenience and could be made in any suitable fashion. For example, voice data may just as well be associated with a user's lungs as with his mouth.

In various embodiments, biometric data is used to establish features and/or combinations of features that can be uniquely linked or tied to an individual. The following discussion represents some methods of extracting and using features according to some embodiments. However, it will be appreciated that other methods of extracting and features could be used and are contemplated by various embodiments herein.

With respect to facial measurements 8904, raw data may include an image of a face, such as an image captured by a video camera. The image may be processed (e.g., using edge detection, peak detection, etc.) to determine the location of "landmarks", such as the centers of eyes, the corners of lips, the tips of cheekbones, the bridge of a nose, etc. Distances may then be determined between various combinations of landmarks (e.g., between nearby landmarks). At 8904 are depicted various exemplary distances, including a distance between the centers of the eyes **8920*a*, a distance from the bridge of the nose to the tip of the nose 8920*b*, a distance from a first corner of the nose to a first cheekbone 8920*c*, and a distance from a second corner of the nose to a second cheekbone 8920*d***. In various embodiments, any suitable landmarks may be used, and any suitable distances may be used.

In various embodiments, to allow for different ranges from the subject at which an image may be captured, distances between landmarks may be normalized, such as by dividing all distances between landmarks by a particular distance (e.g., by the distance between the centers of the eyes **8920*a*). In such cases, all distances are effectively expressed as multiples of the particular distance (e.g., as multiples of distance 8920*a***). Normalized distances may then be used as the "X" input (i.e., a vector of inputs) to a classification algorithm, or other AI algorithm, or other algorithm.

Whereas some biometric markers remain relatively constant (e.g., fingerprints), EEG data can change in response to a user's actions or to stimuli experienced.

Methods for classifying individuals based on EEG data are discussed in the paper "Exploring EEG based Authentication for Imaginary and Nonimaginary tasks using Power Spectral Density Method", Tze Zhi Chin et al 2019 IOP Conf. Ser.: Mater. Sci. Eng. 557 012031, the entirety of which is incorporated herein for all purposes.

With respect to EEG data 8906, raw data may be determined from electrodes placed at two or more points on a user's head. In various embodiments, one of the electrodes is placed proximate to the motor cortex. In the "10-20 system", the electrode may correspond to the "C4" electrode.

A user is asked to imagine performing a task repeatedly, such as opening and closing his hand once every second for sixty seconds, where the seconds are marked with an audible tone (e.g., with a metronome). In various embodiments, any suitable task may be performed. In various embodiments, the task need not be repetitive.

As the user performs the imaginary task, a voltage differential is measured between two electrodes. An amplifier may be used to amplify the voltage differential. The voltage differential may be recorded as a function of time (e.g., using multiple samples; e.g., with a sample rate of 1024 Hz), thereby generating a time series waveform. In fact, voltage differentials may be recorded across multiple pairs of electrodes, thereby generating multiple waveforms (i.e., one waveform for each pair of electrodes). Graphic 8906 shows exemplary waveforms from 16 different pairs of electrodes.

The raw waveform(s) may be filtered to preserve only certain ranges of frequencies. Commonly recognized frequency bands with respect to EEG data include delta, theta, alpha, beta, and gamma frequency bands. In various embodiments, a bandpass filter (e.g., a Butterworth bandpass filter) is used to preserve the beta frequency band (from 13 to 30 Hz).

The spectral density of the filtered waveform is then estimated using Welch's method. Welch's method includes segmenting the filtered time-series into overlapping 1-second segments, applying a windowing function at each segment, transforming the results using a discrete Fourier transform, and computing the squared magnitudes of the transformed results. The squared magnitudes are then averaged across all the results (i.e., all the segments). At the end is a set of frequency "bins" and associated power measurements for each bin, i.e., a power spectral density. In various embodiments, other methods of computing a power spectral density may be used.

Features are then extracted from the power spectral density. In some embodiments, features include each of the: mean (i.e., the mean power magnitude across all the frequency bins), median, mode, variance, standard deviation, minimum and maximum.

In some embodiments, features are the individual power levels for the respective frequency bins.

Once extracted, features then serve as an input to a K-nearest neighbor classification algorithm. In various embodiments where authentication of a user is desired, the feature vector (i.e., the "X" vector) must fall within a predetermined "distance" of the reference vector (i.e., the "Y" vector) for the user in order to make an affirmative authentication. In various embodiments, any other suitable algorithm may be used.

In various embodiments, rather than asking a user to perform a particular task, the headset or central controller 110 may observe a task that the user is performing and/or a stimuli that the user is experiencing. For example, the headset may observe (e.g., via a forward facing camera in the headset) that a user is looking at a particular piece of machinery. A waveform may be determined at the time of the task or stimuli, and this waveform may be compared to a reference waveform generated under similar conditions (e.g., when the user was performing a similar task, or experiencing similar stimuli).

In various embodiments, a classification algorithm (or other algorithm), seeks to determine not whether a subject corresponds to a particular individual, but rather whether a subject's mental state corresponds to a particular mental state (e.g., "alert", "drowsy", "drunk"). For example, it may be desirable to assess whether an individual is in an alert mental state prior to entering a room containing dangerous equipment.

The process for classifying a mental state may proceed along similar lines, but where a reference signal is not necessarily derived from the subject being tested. Rather, a reference signal for an "alert" mental state may come from a different individual, or may represent an "average" signal from various individuals each of whom is known to be in an "alert" mental state.

Various embodiments seek to classify a mental state of "recognition" or "familiarity", in contrast to such states as "novelty" or "confusion". In such embodiments, a user may see or be shown a stimulus (such as a piece of lab equipment). After having experienced the stimulus (e.g., seen the object), the user's mental state may be classified as one of "recognition", or "novelty". It may thereby be determined whether or not the user has had prior experience with the stimulus (e.g., whether the user has seen the object before). In authentication embodiments, a user may be shown an object which the authentic user will likely recognize, but which an imposter likely will not. Then, based on the user's classified mental state, the user's identity may be confirmed, or not.

With respect to iris and/or retinal data 8908, raw data may include an image of an iris or retina. The captured image may be divided into sectors. These sectors may be of standardized size and shape (e.g., a sector encompasses 45 degrees of arc and one third the radius of the image of interest, e.g., one third the radius of the iris). Exemplary sectors are depicted at 8924*a*, 8924*b*, and 8924*c*. Various embodiments contemplate, however, that more or fewer sectors could be used, and differently shaped sectors could be used.

For each sector, an overall grayscale metric may be determined. For example, a sector that is very light in color receives a metric of 0, while a sector that is very dark in color receives a metric of 1. In various embodiments, the grayscale metric may be determined by averaging the color across the whole sector (e.g., by taking an average value of all the constituent pixels falling within a sector).

In various embodiments, to allow for different illuminations at which an image might be captured, grayscale values for sectors may be normalized. For example, the brightest sector receives a value of 0, the darkest sector receives a value of 1, and grayscale values for other sectors are scaled so that their proportionate distances from the values of the brightest and darkest sectors remain the same.

Once sectors receive grayscale values, such values may then be used as the "X" input to a classification algorithm, etc.

With respect to voice data 8910, raw data may include pressure data sampled from a microphone (e.g., at 48 kHz), thereby generating the depicted time series waveform. The waveform may be transformed into the frequency domain, such as via a Fourier transform, thereby generating a frequency spectrum 8912. A peak detection algorithm may then be used to find peak frequencies (i.e., frequencies representing local maxima in the frequency spectrum). A predetermined number of the most strongly represented peak frequencies may be selected. For example, the 10 strongest peak frequencies may be selected. These may be sorted by amplitude, and then used as the "X" input to a classification algorithm, etc.

In various embodiments, when peak frequencies are detected, only fundamental frequencies are considered, and harmonic frequencies are eliminated from consideration. For example, if there are peaks detected at 440 Hz and at 880 Hz, the peak at 880 Hz may be eliminated from consideration.

In various embodiments, rather than detecting peak frequencies, amplitudes a1, a2, a3, etc. may be recorded for a set of predetermined frequencies f1, f2, f3, etc. The amplitudes may then be used as the "X" input to a classification algorithm, etc.

With respect to fingerprint data 8914, raw data may include an image of a fingerprint. The captured image may be divided into regions. These regions may be of standardized size and shape (e.g., a region is a square 0.5 millimeters on a side). Exemplary regions are depicted at 8940*a*, 8940*b*, and 8940*c*. For each region, an overall grayscale metric may be determined. And analysis may proceed as described above with respect to iris/retinal data 8908.

With respect to heart waveforms 8916, raw data may include, for example, an ECG waveform. A typical ECG waveform may include five standard segments, labeled P, Q, R, S, and T. Each has a biological significance (e.g., the P segment corresponds to contraction of the atrium). Each segment may have an associated duration and an associated amplitude. For example, the P segment may last 0.11 seconds and have an amplitude of 0.3 mV. In addition, since not all segments are contiguous, additional segments may be defined with combinations of letters (e.g., where ST represents the interval from the end of S to the beginning of T).

In various embodiments, the durations and amplitudes of the different standard segments may serve as features. Additionally, durations for the additional segments (e.g., for ST) may also serve as features. These features may then be used as the "X" input to a classification algorithm, etc.

Gestures

In various embodiments, it may be desirable to identify someone based on their gestures, such as by their head motions when they are wearing a headset. As such, it may be desirable to extract and/or utilize certain features of detected gestures as input to a machine learning model, algorithm, AI algorithm, and/or as input to any other algorithm. For example, the output of such an algorithm may be an identification of an individual (e.g., from among multiple possible individuals), or the closeness of fit between an input gesture and a reference gesture (e.g., an indication of confidence that a person is who he says he is). In various embodiments, gestures may be recorded and/or detected by means of motion sensors, accelerometers (e.g., accelerometers 4070*a* and 4070*b*), or the like.

In various embodiments, features of gestures may include one or more of: the distance moved in one direction (e.g., the distance of a head motion from top to bottom when someone is nodding his head); the number of reversals in direction per unit time (e.g., the speed with which someone shakes their head or nods their head); the maximum upward distance moved when compared to a neutral position (e.g., how far does someone lift their head during a head nod); the maximum downward distance moved when compared to a neutral position; the most commonly assumed position (e.g., how does someone commonly hold their head, whether it be straight, tilted slightly to the right, tilted forward, etc.); the amount of head motion associated with speaking; the amount of head motion associated with drinking; the amount of head motion exhibited when responding to a voice from behind the user (e.g., does the user turn his head to face the other person); and/or any other suitable features.

Productivity/Performance Enhancements

In various embodiments, a peripheral device measures the performance of an associated user device (e.g., the speed, processor load, or other performance characteristics). The peripheral device may determine such performance in various ways. In some embodiments, a user device informs the peripheral device of the current processor load, the current availability for inputs, or some other measure of performance. In various embodiments, a peripheral device may sense how frequently it is being polled by the user device for user inputs at the peripheral device, how frequently the user device is accepting messages from the peripheral device, how frequently the user device is sending signals back to the peripheral device, or any other indication of the performance of the user device. In various embodiments, a peripheral device may indirectly infer the performance of a user device. For example, if a user is repeating the same input motions at a peripheral device, it may be inferred that the user device has been slow to register such motions. For instance, a user may be trying to click a tab on a web browser, however the tab may be very slow to come up on the user device because the user device is occupied with some other process or is otherwise exhibiting poor performance characteristics. A peripheral device may infer poor performance of a user device if the user is making repetitive inputs or motions, if the user is employing exaggerated motions, if the user is waiting an unusually long time between motions (e.g., the user is waiting for the user device to register an earlier motion before making a new motion), if the user's rate of typing has slowed down, or if the pattern of user inputs at the peripheral has changed in any other fashion.

In various embodiments, by providing insight into the performance of a user device, a peripheral device may assist in the pricing of a warranty or other service contract for the user device. For example, if the user device is exhibiting poor performance, a warranty may be priced more expensively than if the user device is exhibiting good performance characteristics. In various embodiments, peripheral devices may be used to suggest to a user that the user obtain professional assistance with improving the performance of the user device. In various embodiments, a peripheral device may trigger an application or other program that is designed to increase performance of a user device (e.g., a memory defragmenter).

In various embodiments, a peripheral device may adjust the data it sends to a user device based on the performance of the user device. For example, if the user device is exhibiting poor performance characteristics, then the peripheral device may limit data sent to the user device to only high-priority data. For example, the peripheral device may prioritize data on basic motions or other user inputs, but may refrain from sending data about the user's vital signs, ambient conditions, voice messages created by the user, or other types of data deemed to be of lesser priority. If performance characteristics of a user device later improve, then the peripheral device may send data or signals that had been previously held back.

In various embodiments, a peripheral device may be the property of a company, or other organization. In many organizations, peripheral devices are assigned to individuals. For example, an individual has his or her own desk, and peripheral devices reside more or less permanently at the desk. However, in situations where individuals do not work full-time, are not in the office full-time, are not at their desk frequently, or in other situations, a peripheral device may remain unused for a significant period of time.

In various embodiments, a company or organization may increase the utilization of peripheral devices by allowing such devices to be shared among different users. For example, users with complementary schedules (e.g., one user works mornings, and the other user works afternoons) could share the same peripheral device. This would allow a company or other organization to get by with fewer peripheral devices, or to permit greater usage of expensive peripheral devices.

In various embodiments, users may schedule time to use peripheral devices. When it is a given user's turn to use a device, the user's name, initials, or other identifying information may appear on the peripheral. In various embodiments, when it is a user's turn with a peripheral, only that user may activate the peripheral, such as with a password or a biometric.

In various embodiments, a peripheral may track its own usage. The peripheral may discover patterns of usage. For example, the peripheral may discover that it is never used on Wednesdays. Based on the pattern of usage, the peripheral may advertise its availability during times when it would otherwise be idle. For example, a peripheral may advertise its availability every Wednesday. A user in need of a peripheral during such idle times may sign up to use the peripheral at these times. Alternatively, a scheduler (e.g., the central controller) may assign peripherals to different users who are known to be in need at such times.

In various embodiments, a peripheral may provide instructions to a user as to where to leave the peripheral when a user is done with it (e.g., leave it on the conference table of the marketing department), so that the next assigned user can begin using the peripheral.

In various embodiments, a peripheral may be configurable to communicate with different user devices. A switch or other input device on the peripheral may allow the user to associate the peripheral with different user devices. For example, a user may place a switch on a keyboard in one position, after which the keyboard will direct keystrokes to a personal computer; the user may place the switch on the keyboard in another position, after which the keyboard will direct keystrokes to a tablet computer. The switch may be physical. In various embodiments, the switch is virtual, such as a picture of a switch on a touch screen.

In various embodiments, a peripheral device saves one or more inputs to the device. Such inputs may include key presses, button presses, wheel scrolls, motions, touches on a touchpad, turns of a trackball, or any other inputs. In various embodiments, a peripheral device may save sensor readings. Saved inputs may include timestamps or other metadata. Such data may allow the inputs to be placed in chronological order.

In various embodiments, a user may search through old inputs to a peripheral device. For example, a user may enter a sequence of inputs which he wishes to find from among historical inputs. In the case of a keyboard, a user may wish to search for a sequence of keystrokes, such as a word or a phrase. The user may key in such keystrokes into the keyboard. The keyboard may then display to the user (e.g., via a display screen) any matches to the user's search. The keyboard may display context, such as keystrokes that were entered before and after the particular keystrokes that are the subject of the search. In various embodiments, the keyboard may present search results in another fashion, such as by transmitting the results to a separate display device, by saving the results to a memory (e.g., to an attached USB thumb drive), or in any other fashion.

Where a user is able to search for inputs on a peripheral device, the search may effectively span across multiple applications and even across virtualized OS partitions. In other words, a single search may locate inputs that were directed to different applications, and even two different OS partitions.

In various embodiments, a peripheral device may track usage statistics. Such statistics may include number of buttons pressed, number of times a particular button was pressed, number of times a particular key was pressed, the distance a peripheral was moved, the number of different sessions during which a peripheral was used, the number of times a headset was put on, or any other usage statistic. Usage statistics may also be tracked by another device, such as a user device linked to a tracked peripheral device.

In various embodiments, an app may allow a user to view usage statistics. The app may communicate directly with a peripheral device, such as for the purposes of uploading usage statistics. In various embodiments, the app obtains usage statistics from the central controller, which in turn receives such statistics from a tracked peripheral device (e.g., directly, e.g., indirectly).

In various embodiments, a peripheral may track patterns of usage and associate such patterns with either productive or non-productive work. Examples of non-productive work may include playing video games, surfing the web, arranging photos, or any other activities. Initially, a peripheral may receive information about an app or program with which a user is interacting. Based on the type of app, the peripheral may classify whether such activity is productive or not. In various embodiments, a user may classify different apps or activities as productive or not, and may indicate such classifications to a peripheral device.

The peripheral device may then learn to recognize patterns of inputs associated with a productive activity, versus those associated with a non-productive activity. For example, in a game of solitaire, a peripheral device may learn to recognize the repetitive motions of dragging cards to different locations. A peripheral device may later classify a user's pattern of inputs without direct knowledge of the app to which such inputs are directed.

In various embodiments, if a peripheral device determines that a user is engaged in non-productive activities, the peripheral device may take one or more remedial actions. Actions may include: shutting off, reducing functionality, temporarily shutting off, alerting a user that he is engaged in a non-productive activity, or any other remedial action.

In various embodiments, video footage may be captured of a user typing. Video footage may be captured, for example, by a camera, such as by a camera peripheral device. The video footage may be used for improving auto suggestion, auto complete, computer generated text, or for any other tasks. Context clues from the video (e.g., derived from the video) may include speed, typing mistakes, deleted words, text that gets modified, and any other clues. These contextual clues or features may be used in combination with surrounding text in order to make new predictions (e.g., in order to predict the remaining words in a sentence). In various embodiments, contextual clues may be used for sentiment analysis. For example, if a user is typing in a very animated way, then a happy or excited sentiment may be inferred. In various embodiments, contextual clues are used in combination with the inferred meaning of the text in order to estimate a sentiment.

In various embodiments, a peripheral device may correct or otherwise alter user inputs. The peripheral device may make such corrections or alterations prior to transmitting the inputs to a user device. In various embodiments, a keyboard may correct typing inaccuracies before displaying, transmitting, or otherwise handling user inputs. For example, a user might type 'teh' and the keyboard outputs 'the' to the associated user device (e.g., computer).

In various embodiments, a peripheral device may make automatic corrections based on both a particular input (e.g., an erroneous input), and a user behavior (e.g., typing style). For example, one type of error may be common with a particular typing style. Thus, for example, if an error is detected, then the error may be corrected if it is known that the user employs that typing style. Identified errors or mistakes may be handled differently depending on whether the typing style is, for example, 'touch', 'chop-stick', 'looking at', 'anthropometry', etc.

In various embodiments, certain mistakes or errors may be more common with certain types of keyboards. For example, the relative key spacing on certain types of keyboards may make it more common for certain keys to be inadvertently interchanged. In various embodiments, an identified error may be corrected one way if a user has one type of keyboard, or another way if the user has another type of keyboard.

In various embodiments, a user's game performance, chess performance, productivity, etc., is predicted based on initial movements, initial activities, initial performances, and/or environmental queues. For example, the central controller may predict a user's ultimate score in a game based on his first five minutes of play. As another example, the central controller may predict a user's performance based on the ambient noise level. If it is predicted that the user will achieve a high performance, then the user may be encouraged to continue. However, if it is predicted that the user will achieve a poor performance, then the user may be advised to halt his activities (e.g., halt his game playing), seek to change his environment (e.g., move to a quieter place), or to take some other action (e.g., to take a deep breath).

In various embodiments, tracking performance on a game (or other task, e.g., typing speed) may be used to measure the effectiveness of vitamins, food, red bull, drugs, etc. For example, it may be desirable to market a product as a performance enhancer, or it may be desirable to ensure that a product does not have harmful side effects, which might manifest themselves as poor performance in a video game or other tasks. Thus, in various embodiments, players may be asked to document when they have ingested certain vitamins, food, drinks, or other items. The player's performance (e.g., game score) may then likewise be documented. In various embodiments, a player is asked to play a game or perform some other task both before and after ingesting a food, beverage, vitamin, drug, etc. In this way, the effects of the item ingested can be better discerned. In various embodiments, when a sufficient number of players have ingested an item and also performed a task, a conclusion may be drawn about the effects of the ingested item on the performance of the task.

Following an aforementioned experiment, for example, an energy drink manufacturer might advertise that after one drink, game performance is elevated for 2 hours, versus only 1 hour for the competition.

In various embodiments, a user's ingestion of an item may be documented in an automated fashion. For example, a pill bottle may communicate wirelessly with a user device, with the central controller, or with some other device. The pill bottle may automatically note when it has been opened, and transmit the time of opening to another device for documentation.

Functionality Enhancements

In various embodiments, a mouse or other peripheral may generate a collision alert. The alert may be generated when the mouse is in proximity to another item, when the mouse is heading in the direction of another item, or under some other suitable circumstance. It is not uncommon for a user to have a beverage (e.g., a hot beverage) on a desk with a peripheral. A collision detection alert may save the user from knocking over the beverage. In various embodiments, the alert may be in the form of a beep or some other audible sound. In various embodiments, a peripheral device will brake, such as by locking a wheel on the underside of the device.

In various embodiments, a mouse pointer may be configured to move in non-standard ways. For example, rather than moving in a continuous fashion that mirrors the motion of a mouse, a mouse pointer may follow an edge (e.g., of an application window), jump from one discreet location to another (e.g., from one text entry box to another), or take some other non-standard path. The configuration of mouse movement may be program or app dependent. For example, within the window of an app, the mouse pointer behaves one way, while outside the window of the app the mouse pointer behaves in another way.

In various embodiments, the motion of a mouse is projected from two dimensions into one dimension. The one dimension may correspond to some edge in an app, such as to the edge of a table, the edge of a row of cells (e.g., in a spreadsheet), the edge of a page, or to any other edge, or to any other one-dimensional object. Thus, for example, if a user moves the actual mouse perpendicular to the edge, then the mouse pointer does not move at all. On the other hand, if the mouse moves parallel to the edge, then the mouse pointer will move along the edge.

In various embodiments, a mouse pointer may move only between certain objects. For example, the mouse pointer moves only from one cell to another cell in a spreadsheet. As another example, a mouse pointer moves only between examples of a particular phrase (e.g., "increased revenue") in a text document. This may allow a user to quickly find and potentially edit all examples of a particular phrase or wording. In various embodiments, a mouse pointer moves only to instances of the letter "e". In various embodiments, a mouse pointer moves only to proper names. In various embodiments, a mouse pointer is configured to move only among instances of a particular category of words or other objects.

In various embodiments, a mouse pointer is configured to move from one text entry box to another. For example, if a user is filling in a form, each nudge of the mouse will automatically move the mouse pointer to the next box to fill in. The mouse may also auto-fill text entries based on stored information or based on deductions.

In various embodiments, a peripheral provides noise cancellation. A peripheral may receive an indication of ambient sounds, such as via its own microphone, or via signals from other devices. The peripheral may then emit its own sounds in such a way as to cancel the ambient sounds. For example, a peripheral device may emit sound waves that are of the same frequencies, but 180 degrees out of phase with the ambient sound waves. The peripheral device may further estimate the location of a user, such as via physical contact with the year, via a visual of the user (e.g., using a camera), via knowledge of a user's typical positioning with respect to the peripheral device, or in any other fashion. Having estimated the location of the user, the peripheral device may better generate sound waves that cancel the ambient sound waves at the location of the user.

Customization and Tailoring

In various embodiments, the outputs of a peripheral device (e.g., a mouse, keyboard, or headset) may be customized. Outputs may include beeps, tones, clicking sounds, pressing sounds, alerts, alerts to incoming messages, warning tones, lights, light blinks, or any other outputs. Customizations may include changing volume of a sound or other noise. For example, to avoid irritation, a user may wish to silence any audible outputs coming from a peripheral device. This may constitute a silence mode. In various embodiments, a volume of audio outputs may be set to any desired level.

In various embodiments, a particular melody, tune, jingle, tone, note, beat, rhythm, or other audio may be set for an output of a peripheral device. For example, a user may customize a sound that will be made by a mouse when there is an incoming message from another user. In various embodiments, a user may customize the sound of mouse clicks, scrolls of a mouse wheel, key presses on a keyboard, or any other sound. For example, a mouse click may assume the sound of a chime. In various embodiments, a user may customize any audible output that may be made by a peripheral device.

In various embodiments, sounds emanating or resulting from a peripheral device may be broadcast only by a headset. For example, the sound of a mouse click is broadcast only within a headset that a user is wearing. In this way, for example, sounds made by a peripheral device may avoid irritating other people in the vicinity.

In various embodiments, a user may purchase, download, and/or otherwise obtain sound effects for a peripheral device.

In various embodiments, the physical appearance and/or the physical structure of a peripheral device may be customizable. A user may have access to various component physical structures of a peripheral device. The user may have an opportunity to assemble the component structures in different configurations as desired by the user. For example, a user may have access to blocks, beams, rods, plates, or other physical structural components. These components may then snap together, bind together, screw together, join with hooks, or otherwise come together.

By assembling his or her own peripheral device, a user may customize the size of the device to best suit his hand size or hand orientation. A user may select components with a desired texture, hardness, weight, color, etc. A user may select components with a desired aesthetic. A user may also construct a peripheral device with an overall appealing shape.

In various embodiments, a user may add components that provide entertainment, distraction, or other appeal. For example, a user may build a fidget spinner into a mouse.

In various embodiments, inputs received at a peripheral device may be reflected or manifested in a game character, in a game environment, or in some other environment. Inputs received may include button presses, mouse motions, key presses, shakes of the head, nods of the head, scrolls of a wheel, touches on a touchpad or touch screen, or any other inputs. Inputs may include pressure used (e.g., to press a key or a button), speed (e.g., the speed of a mouse motion), or any manner of providing an input. Inputs may also include sensor readings, such as readings of a user's heart rate, breathing rate, metabolite levels, skin conductivity, etc. In various embodiments, features or derivative values may be computed based on inputs. For example, the rate at which keystrokes are made, the variation in time between mouse motions, the longest mouse motion in a given period of time, or any other value derived from inputs may be computed.

In various embodiments, inputs or derivatives of inputs may be translated into characteristics or attributes of a game character or game environments. Attributes may include the manner in which a character makes footsteps. For example, if a user's inputs are made with a relatively large amount of force (e.g., relative to the typical force used by a user), then the footfalls of a game character associated with the user may be more forceful. Attributes may include the footwear of a character, the attire of a character, the weight of a character, the speed at which a character moves, the facial expressions of a character, the breathing rate of a character, hairstyle of a character, or any other attribute of a character or a game environment.

In various embodiments, the weather in a game environment is dependent on user inputs. For example, if a user's heart rate is high, the clouds in the sky of a game environment may be moving quickly.

In various embodiments, a user may create custom mouse pointers. The user may create a mouse pointer that incorporates a favored picture (e.g., a picture of the user's dog), logo, or other graphic. In various embodiments, a user may send a custom mouse pointer to another user, such as by sending the mouse pointer to the other user's mouse. The other user may then have the opportunity to view the mouse pointer, e.g., reflected on a screen of an associated user device. The user may then have the opportunity to continue using the mouse pointer, or to decline to use the mouse pointer.

In various embodiments, a mouse pointer may react to its environment. For example, if the mouse pointer is a dog, and the mouse pointer comes near to a word (e.g., in a text document) describing a food item, then the dog may lick its lips.

Multiple Modes

In various embodiments, a mouse (or other peripheral device) may be capable of operating in different modes or states. Each mode may utilize received inputs (e.g., mouse click, mouse movements, etc.) in different ways. In a first mode, a mouse may allow interaction with a local or internal application (e.g., with an application 9318 running on the mouse). If the application is a survey application, then, for example, different mouse inputs (e.g., left button versus right button) may correspond to different answers to a multiple choice question. If the application is a messaging application, then, for example, the scroll wheel of a mouse may allow the user to scroll through different pre-composed messages for selection and submission to a friend.

In a second mode, a mouse may function as a traditional mouse, and inputs received at the mouse may be passed to a user device, such as to control an application being run on the user device.

As a mouse may have a limited number of input components (e.g., buttons), it may be difficult for the mouse to operate a local or internal application and serve as a traditional mouse at the same time. If the mouse attempted both, then a given input provided by a user for one purpose (e.g., to answer a survey question on the mouse) could be inadvertently misinterpreted as being intended for another purpose (e.g., as a click within an application on a user device).

Thus, it may be advantageous that a mouse can switch between modes whereby in one mode user inputs are directed to an internal application, and in another mode the mouse is functioning traditionally. In various embodiments, a user may switch between modes using some predetermined input (e.g., three rapid clicks on the right mouse button). In various embodiments, a mouse may include a dedicated switch, toggle, or other component for switching between modes. In various embodiments, a mouse may be capable of operating in more than two modes.

Social Connectivity

Various embodiments provide for a quick and/or convenient way for a player to initiate a game. Various embodiments provide for a quick and/or convenient way for a player to initiate a game with a select group of other players (e.g., friends). Various embodiments provide for a quick and/or convenient way for a player to invite other players into a gaming environment, such as a private gaming environment, or such as a private game server.

In various embodiments, a player may use a sequence of keystrokes or button presses (such as a hotkey sequence) to initiate a game, invite players to a game, invite players into a gaming environment, etc. For example, a single click of a mouse by a player brings the player's friends into a private game server.

In various embodiments, two or more peripheral devices are configured to communicate with one another. The lines of communication may allow transmission of messages (e.g., chat messages, taunts, etc.), transmission of instructions, transmissions of alerts or notifications (e.g., your friend is about to start playing a game), and/or transmission of any other signals.

However, in various embodiments, it may be desirable for a given user to indicate that the user is unwilling or unavailable to receive communications at his peripheral device. For example, the user may be working, or may be away from his user device and associated peripheral device. In various embodiments, a peripheral device may be configured to receive communications only during certain times, such as only on weekends, only between 8 a.m. and 10 p.m., etc. In various embodiments, a peripheral device may be configured to not receive communications during particular hours. These may be, e.g., "Do not disturb" hours.

In various embodiments, a peripheral device can be manually set to be unavailable as for communication. For example, when a user steps away from a peripheral device, the user may manually set the peripheral device to be unavailable to receive communications. In various embodiments, a peripheral device may automatically detect when a user has stepped away from the peripheral device, or is no longer using the peripheral device for the time being. For example, if there has been more than five minutes of inactivity, then a peripheral device may automatically configure itself to stop receiving communications. When a user returns to a peripheral device, the peripheral device may detect the usage by the user, and may once again configure itself to receive communications.

In various embodiments, if a peripheral device is configured to not receive communications, the peripheral device may transmit an indication of such configuration to any other device that attempts to communicate with it. For example, if a second user tries to communicate with the peripheral device of a first user, the peripheral device of the first user may send an automatic message to the second user indicating that the first user is not available to receive communications.

In various embodiments, a peripheral device may receive communications, but may also indicate that the user is away or is otherwise not paying attention to such communications. In such cases, for example, any communications received at the peripheral device may be stored and revealed to the user once the user is again available to peruse or respond to communications.

In various embodiments, a document may include metadata describing the author or creator of some part of the document. The document may be a collaborative document in which there have been many contributors. Example documents may include a slideshow presentation, a PowerPoint® presentation, a text document, a spreadsheet, or any other document. A user may click or otherwise select some portion of the document, such as a chart of financial data embedded within the document. The user may then be shown the creator of that part of the document. For example, the name of the creator may appear on the peripheral device of the user. In various embodiments, a user may click on a portion of the document and may thereupon become connected to the author of that part of the document. The connection may take the form of a communications channel between the peripheral devices of the initiating user and of the author.

Engagement

In various embodiments, it may be desirable to ascertain an engagement level of a user. This may measure the degree to which a user is focusing on or participating in a task, meeting, or other situation. In various embodiments, it may be desirable to ascertain an engagement level of a group of users, such as an audience of a lecture, participants in a meeting, players in a game, or some other group of users. If there is low measured engagement, it may be desirable to change course, such as changing the format of a meeting, allowing users to take a break, introducing exciting material, explicitly calling on one or more users, or making some other change.

In various embodiments, engagement may be measured in terms of inputs provided to a peripheral device. These may include button or key presses, motions, motions of the head, motions of a mouse, spoken words, eye contact (e.g., as determined using a camera), or any other inputs. Engagement may also be ascertained in terms of sensor readings, such as heart rate or skin conductivity. A level of engagement may be determined or calculated as a statistic of the inputs, such as an aggregate or summary of the inputs. For example, a level of engagement may be calculated as the number of mouse movements per minute, a number of head nods per minute, a number of words typed per minute, the percentage of time that eyes were directed to a camera, or as any other suitable statistic. As another example, engagement may be calculated as a heart rate plus five times the number of mouse movements per minute.

In various embodiments, some inputs may detract from a calculated engagement level. For example some movements of a peripheral device may be associated with distracted behavior (e.g., movements associated with playing a game while a meeting is in place). Thus, the more of such movements, the lower the perceived engagement level.

With respect to a group, an engagement level may be calculated as a mean or median of engagement levels for the individuals within the group. In various embodiments, an engagement level is calculated based on all the inputs received from the group. For example, a group is considered highly engaged if there are more than ten mouse movements amongst all the group members within a given time period. As will be appreciated, various embodiments contemplate other ways of calculating an engagement level.

Game Enhancements, Leveling the Playing Field

In various embodiments, a player may wish to celebrate, taunt, irritate, distract, or otherwise annoy another player. Ways in which one player can irritate another player include playing a sound in the other player's headset. These may include the sound of a mosquito, bee, baby crying, siren, fingers on a chalkboard, Styrofoam™ bending, a shrieking wind, or any other irritating or distracting sound. In some embodiments, the sound may be controlled by one player who has won a battle or a round of a game, and they may be able to continue the sound for a certain period of time, while the receiving player cannot turn it off, or down.

In various embodiments, a player may pay for pre-packaged taunts. These may include pre-recorded phrases, sounds, images, videos, or other media that can be used to taunt or annoy another player. In other embodiments, these may also include phrases, sounds, images, videos, or other media that the player can record themselves. When triggered by a first player, the taunts may be delivered to a second player (e.g., with the intermediation of the central controller or some other intermediate device). In various embodiments, a taunt is communicated directly from a first user's peripheral device to a second user's peripheral device.

In various embodiments, a player may receive pre-packaged or recorded media in other ways, such as a reward for winning.

A first player may also irritate a second player by causing the second player's mouse to act in various ways. The second player's mouse cursor may write out "you suck", or some other taunting phrase or gesture. The mouse pointer itself may change to "you suck", "Player 1 rules," or to some other taunting phrase or gesture.

In various embodiments, random inputs or outputs may be added to a player's peripheral device as a way to irritate the player. For example, random motions may be introduced to a player's mouse, or added to the intentional motions made by a player with a mouse; or the motions made by a player may be left-right swapped, or up-down swapped, or randomly magnified or scaled down, or randomly slowed down or sped up, or completely disabled for a period of time. Random keys may be pressed on a player's keyboard, or some keys may be disabled, or the entire keyboard may be disabled for a period of time. Random noise, or pre-recorded messages, music, or other sounds may be added to a player's audio feed so that the player has a harder time hearing and processing what is happening in a game. In other embodiments, a player's display may be dimmed, flipped upside down or left-right flipped, or random colors or images may be introduced, or the display could be completely disabled for a period of time. As will be appreciated, other distracting or random inputs or outputs may be added to a player's peripheral device or to any device associated with a player.

In various embodiments, a player of a game may wish to be informed of choices or actions made by other players under similar circumstances to those currently facing the player (or under circumstances that the player had encountered). This may allow a player to learn from the decisions of other players, to become aware of what other players did, and/or to compare his own performance to that of other players. When a player reaches a particular game state, the central controller may recount other times that other players had been in similar states. The central controller may generate statistics as to what decision or what actions were made by the other players in the similar game states. The central controller may cause such statistics to be presented to the player. For example, a player may be informed that 60% of players took a left at a similar juncture in the game, with an average subsequent score of 234 points. On the other hand, 40% of players took a right with an average subsequent score of 251. In various embodiments, a player may wish to see decisions of only a subset of other players. This subset of other players may be, for example, the player's friends, or top players.

Some Embodiments

In various embodiments, a user may receive offers of work, labor, jobs, or the like. Such offers may come via peripheral devices. For example, offers may be presented on the screen of peripheral devices. In various embodiments, the work offered may involve the use of such peripheral devices. For example, work may include editing documents, providing instruction on using a peripheral device (such as in the context of a particular application), controlling a video game character through a tricky sequence, answering a captcha question, assisting a handicapped user, or any other offer of work. In return for performing work, a user may receive payment, such as monetary payment, game currency, game privileges, or any other item of value or perceived value.

In various embodiments, the usage of peripheral devices may indicate the presence or absence of employees (or other individuals) at a company, or other organization. For example, if an employee's mouse is not used all day, it may be inferred that the employee was absent. Company-wide (or department-wide, etc.) data may be gathered automatically from peripherals to determine patterns of employee absence. Furthermore, peripheral devices may be capable of determining their own proximity to other peripheral devices. For example, a peripheral device may determine that it is near to another device because a wireless signal from the other device is relatively strong.

Proximity data, compared with usage data, may allow a company to determine a spatial pattern of absences among employees. This may, for example, represent the spread of an illness in a company. For example, it may be determined that 80% of employees within twenty feet of a given employee, were absent. Further, the presence or absence of employees may be tracked over time. In this way, a spatial pattern of absences may be correlated to a temporal pattern of absences. For example, it may be determined that, over a given five-day period, the number of absent employees has been increasing, and the distances of the desks of newly absent employees has been increasing relative to a fixed reference point (e.g., to the first employee in a company who was sick).

In various embodiments, peripheral devices may provide early warnings of contagious illness within a company. This may allow a company to take proactive actions to prevent further illness among its employees. This may, in turn, increase employee morale, reduce sick days, reduce insurance costs, or provide other benefits.

In various embodiments, peripheral devices may detect other signs of illness. Such signs may include sneezing (e.g., detected via a microphone), skin conductivity, or other vital signs, or other biometrics. Employees suspected of being ill may be allowed to leave early, may be given their own private offices, may be provided with a mask, etc.

In a gaming context, a player or a viewer may click on another player's character and see what hardware that character is using. There may be a link to purchase the hardware. An avatar may wear a logo or other indicia indicating which hardware is currently controlling it.

In various embodiments, a teacher, professor, or other educator may wish to receive feedback about student engagement. Feedback may be particularly useful in the context of remote learning where a teacher may have less direct interaction with students. However, feedback may be useful in any context. In various embodiments, feedback may take the form of biometrics, vital signs, usage statistics, or other data gathered at students' peripheral devices.

In various embodiments, a heart rate is collected for the entire class and the average (or some other aggregate statistic) is sent to the teacher (e.g., to the teacher's mouse). The statistic could be displayed in different colors depending on the value of the statistic. For example, if the average heart rate is high, the teacher might see the color red on her mouse, whereas the teacher might see green if the average heart rate is low. It could display in a different color if elevated. Information about students' heart rates, or other vital signs, may allow a teacher to determine when students are anxious, confused, unfocused, etc. The feedback may allow a teacher to adjust the learning activity.

In various embodiments, an educator may receive information about whether or not students' hands are on their respective mice. If there is a lack of mouse movement among students (e.g., on average) then this may be indicative of a lack of engagement by students.

In various embodiments, rather than receiving continuous feedback about student engagement, a teacher may receive alerts if engagement data or engagement statistics satisfy certain criteria. For example, a teacher receives an alert if the average number of mouse motions per student per minute falls below 0.5. The alert may take the form of a colored output on the teacher's peripheral device (e.g., the teacher's mouse turns red), or it may take any other form.

In various embodiments, a teacher may cause the peripheral devices of one or more students to generate outputs. Such outputs may be designed to grab the attention of students, to encourage student engagement, to wake up students, or to accomplish any other purpose.

In various embodiments, a teacher may cause a student's peripheral to exhibit movements (e.g., a mouse may vibrate, keyboard keys may depress and elevate), to produce sounds, to show color, or to otherwise generate outputs. Such outputs may be designed to encourage student engagement.

In various embodiments, a teacher pushes a quiz to students. The quiz may be presented via a student's mouse or via some other peripheral device. Each student may receive a randomized quiz. For example, each student may receive different questions, or each student may receive the same questions but in different orders, or each student may receive the same questions with multiple choice answers in different orders. The randomization of quizzes may reduce the chance of collaboration among students. Three clicks by one student may be the right answer/response for that one student, and two clicks and a tracking ball move may be the right answer to the same question for another student.

Mouse Output Examples

In various embodiments, a mouse is used to output information to a user. The mouse could contain its own internal processor. Output from the mouse could take many forms. Because some of these embodiments could include relatively expensive components, the mouse could include hardening or an external case of some kind to protect the mouse.

In various embodiments, a mouse includes a display screen, such as a digital display screen. This could be a small rectangular area on the surface of the mouse which does not interfere with the activity of the user's fingers while using the mouse. This display area could be black and white or color, and would be able to display images or text to the player. This display would receive signals from the user device or alternately from the central controller, or even directly from other peripheral devices. The screen could be touch enabled so that the user could select from elements displayed on this digital display screen. The screen could be capable of scrolling text or images, enabling a user to see (and pick from) a list of inventory items, for example. The screen could be mounted so that it could be flipped up by the user, allowing for a different angle of viewing. The mouse display could also be detachable but still controllable by software and processors within the mouse.

In various embodiments, a mouse includes one or more lights. Lights (e.g., small lights) could be incorporated into the mouse, allowing for basic functionality like alerting a user that a friend was currently playing a game. A series of lights could be used to indicate the number of wins that a player has achieved in a row. Simple lights could function as a relatively low-cost communication device. These lights could be incorporated into any surface of the mouse, including the bottom of the mouse. In some embodiments, lights are placed within the mouse and can be visible through a semi-opaque layer such as thin plastic. The lights could be directed to flash as a way to get the attention of a user.

In various embodiments, a mouse may display or otherwise output one or more colors. Colors may be available for display or configuration by the user. The display of colors could be on the screen, mouse buttons, or on any other part of the mouse (or on keys of keyboard). In various embodiments, colors (e.g., color, intensity, color mix, etc.) may be adjusted by the trackball or scroll wheel, or varied by the sensory information collected. The intensity of lights and colors may also be modified by the inputs and other available outputs (games, sensory data or other player connected devices).

In various embodiments, a mouse may generate output in the form of motion. This could be motion of the device forwards, backwards, tilting, vibrating, pulsating, or other motions. Motions may be driven by games, other players, actions created by the user, or by any other cause. Motion may also be delivered in the form of forces against the hand, fingers or wrist. The mouse/keyboard device could become more firm or softer based on the input from other users, games, applications, or by the actual user of the mouse/keyboard.

In various embodiments, a glove may be a peripheral device. In various embodiments, a glove may be part of a peripheral device. For example, a glove may be attached to a mouse. A device attached to a mouse could allow for compression or pulsing of the hand for therapy purposes. The device could provide feedback to the user from other users by simulating compression and pulsing as well.

In various embodiments, a mouse may generate output in the form of sound. The mouse could include a speaker utilizing a diaphragm, non-diaphragm, or digital speaker. The speaker could be capable of producing telephony tones, ping tones, voice, music, ultrasonic, or other audio type. The speaker enclosure could be located in the body of the mouse.

In various embodiments, a mouse may generate output in the form of temperature. There could be an area (e.g., a small area) on the surface of the mouse or on keyboard keys which contains heating or cooling elements. These elements could be electrical, infrared lights, or other heating and cooling technology. These elements could output a steady temperature, pulsating, or increase or decrease in patterns.

In various embodiments, a mouse may generate output in the form of transcutaneous electrical nerve stimulation (TENs). The devices could contain electrodes for transcutaneous electrical nerve stimulation. These electrodes could be located in the surface of the mouse corresponding with areas used by fingertips or by the palm of the hand. These electrodes could also be located in a mousepad or in ergonomic devices such as a wrist rest.

In various embodiments, a mouse or other peripheral device may generate output in the form of smells, scents, or odors. A peripheral device may output scent via an air scent machine (odor wicking or scent diffuser). The devices could contain an air scent machine, either a scent wicking device or a scent diffusing device. This air scent machine could be located in the body of the mouse.

In various embodiments, a mouse may convey messages or other information using standard signals provided to a user device, thereby causing a mouse pointer to move on the user device in a desired way. For example, a mouse may cause a mouse pointer to trace out the word “Hello”. In various embodiments, a mouse may cause a pointer to rapidly trace and retrace the same path, thereby creating the illusion of a continuous line, ark, or other shape. I.e., the mouse may cause the mouse pointer to move so quickly that the human eye is unable to discern the mouse pointer as its own distinct object, and sees instead the path traced out by the mouse pointer. In this way, a mouse may output text, stylized text, shapes (e.g., a heart shape), images, cartoons, animations, or any other output. An advantage of creating messages in this way is that such messages need not necessarily be application-specific. In other words, the mouse may cause a cursor to move along a particular trajectory regardless of the application at the forefront of the user device.

In various embodiments, a mouse may convey a message through interaction with an application on a user device. For example, a user device may have a keyboard app that allows a user to “type” alphanumeric keys by clicking on a corresponding area of a displayed keyboard. To convey a message, the mouse may automatically move the mouse pointer to appropriate keys and register a click on such keys, thereby causing the message to be typed out. For example, to convey the message “hello”, the mouse may sequentially cause the cursor to visit and click on the “h”, “e”, “I”, “I”, and “o” keys.

In another example, a mouse may interact with a drawing application (e.g., with Microsoft® Paint) to create shapes, drawings, etc., for a user to see.

In various embodiments, a mouse or other peripheral may store a script or other program that allows it to interact with an application in a particular way (e.g., so as to output a particular message).

In various embodiments, a mouse or other peripheral may have a message to convey to a user, but may require that the user be utilizing a particular application on the user device (e.g., the mouse may only be able to deliver the message through Microsoft® Paint). In various embodiments, the mouse may detect when a user is using the appropriate application from the user's mouse movements. The mouse may recognize certain emotions as indicative of use of a particular application. The mouse may then assume that such application is in use, and may then cause a message to be conveyed to the user with the aid of the application.

Software

The peripherals according to various embodiments may include processors, memory, and software to carry out embodiments described herein.

Mouse/Keyboard with Stored Value

Mice or keyboards according to various embodiments may become personalized, and could contain items of monetary value such as digital currencies, game rewards, physical items, coupons/discounts, character skins and inventory items, etc. It could also store the identity of the player (and the identity of her game characters), game preferences, names of team members, etc. Game highlight clips could also be stored for later viewing or uploading to a central controller. Access to the stored value/data could require the user to provide a voice print, password or fingerprint to gain access. The value could also be stored with a user device (or central controller) and accessed through a mouse or keyboard.

In various embodiments, users could store their identity for use across games, computers, and operating systems. For example, the mouse could store the player names and passwords associated with all of their favorite game characters. This would enable a player to take their mouse from their home and go to a friend's house to use it during game play there. The user device (e.g., game console) owned by their friend would then read in data from the user's mouse, enabling that user to log in with any of their characters and have access to things like saved inventory items like a +5 sword or a magic healing potion. The user's mouse could display the items in inventory on a display screen of the mouse, allowing the user to touch an item to select it for use, with the mouse transmitting the selection to the user device, game controller, or central controller. The user could also have access to store preferences and customization for things like custom light patterns on their mouse. The user's mouse might also have stored game value that would allow a user to buy game skins during a game session at their friend's house.

Because the mouse or keyboard might include items of value, in some embodiments the user must provide a password in order to gain access to the mouse. For example, the user might have to enter a PIN number by touching digits that are displayed on the surface of the mouse, or enter a PIN into the user device which then uses that PIN to get access information from the central controller in order to get access to the value in the mouse. Items stored within the mouse or keyboard could be encrypted, with the user required to provide a decryption key in order to retrieve the item. In other embodiments, unique biometrics (such as an iris scan, fingerprint, heart rate, and the like) could be required in order to gain access to the value stored in the mouse. In one embodiment, the value is unlocked when a unique pace of mouse movements or keyboard pacing matches to those of the user.

In various embodiments, the mouse itself could store encryption/decryption keys for use by the user device, allowing the mouse to act like a secure dongle.

With payment transaction software and processors/storage within the mouse, various embodiments could enable users to make microtransactions in-game. For example, a user could provide a credit card number to the central controller and arrange to have $20 in value loaded onto the storage area of the user's mouse. When the user is then playing a game, he could encounter an object like a Treasure Map that could be obtained for $1. The game controller sends the offer to the display screen of the user's mouse, and the user then touches an acceptance location and the $1 is taken out of the $20 in stored value and transferred to the game controller or central controller, after which the Treasure Map is added to the inventory items of the player, either in-game or within the user's mouse itself.

In various embodiments, micropayment transactions could also enable a user to rent game objects rather than buying them. For example, the user might want to obtain a rare game skin for his character in a game, but feels that the purchase price of $10 is too high. After rejecting the purchase, the game controller could send an offer to the user's mouse of a weekly rental period for the game character skin for $1/week. The user accepts the offer and $1 is transferred to the game controller or central controller and the character game skin is then enabled for that user. Each week the player pays $1 until cancelling the subscription. Alternatively, the subscription could be for a fixed period of time, or for a fixed period of game time. For example, the player could get ten hours of use of the game character skin for $1.

Another use for micropayment transactions is to allow a user to send small amounts of money to another player, transferring funds from the user's mouse to the central controller to the mouse of the other user. Such transactions could also be used to support game streamers by enabling simple and quick transfers of value to the streamer.

Some games have treasure chests that a user can elect to open, either by paying an amount of gold coins from the game or real money (such as a micropayment from stored value in the user's mouse) or by simply electing to open it. In one embodiment, the treasure chest requires a random selection from the user. For example, the player might pick a number between one and five (by pressing the number on the touch enabled display screen on the surface of the user's mouse), with the Treasure Chest only opening if the player selected the number four.

In various embodiments, a mouse may reveal or unlock items in a game. For example, a player using a mouse may see hidden trap doors when hovering the mouse pointer over a particular region in the game area. A mouse may enable access to particular game levels or areas that may otherwise be inaccessible.

By creating a physical storage location within the mouse, the user could store items like a ring, sentimental items, currency, coins, mementos, etc. For example, the user could store a thumb drive within a locked portion of the mouse, with access requiring the use of a password or thumbprint to access.

Physical items could also be included in the mouse by the manufacturer, with the user able to access that item after achieving a goal such as using the mouse for ten hours, achieving a particular level of a particular game, identifying a list of favorite games, or the like. Once this goal had been achieved, the user device could send a signal to the mouse unlocking the compartment which held the manufacturer's object. To make the object more secure, the compartment could be designed such that attempting to break the compartment open would result in the functionality of the mouse being disabled or reduced in capability. Attempts to break open the compartment could also generate a signal sent to the user device which would then initiate a phone call to the user of the device and also trigger a camera to get video/photos of the mouse.

Gameplay could also unlock keys on a keyboard. For example, the user's keyboard could have three keys that are initially non-functional. They are enabled as the user completes certain goals. For example, the user might have a key unlocked when the user defeats ten opponents in a 24-hour period. This unlocked key could enable a user to open a communication link to game secrets that would improve their chances to win a particular game.

Another aspect of the user's identity is rating information about the user's ability to play a particular game, or a rating of the user's ability to function well on a team. For example, a user's mouse might store an evaluation of the user's team skills, such as by storing a rating (provided by other players or determined algorithmically by one or more game controllers) of 9 on a 10 point scale. When the user uses his mouse to play in a new game, that new game can access the 9/10 rating from the user's mouse and use the rating to match the user with other players of a similar team rating level. Even though the user may have never played that particular game before, the user's team rating would allow the player to join a more experienced team than the user's beginner's status would at first indicate.

Access to a mouse or keyboard could also be used by other parties to restrict game play. For example, a parent might set play time parameters for a mouse that would lock out a user when that user exceeds three hours of game play in a given day, or it could lock the player out between the hours of 3 PM and 6 PM on weekdays. The mouse or keyboard could also be restricted to certain types of game. For example, the mouse could be set to not operate in a third person shooter type of game.

Access to the mouse could also be restricted based on the condition of the user. For example, the user device or game controller might determine that, based on the mouse inputs currently being received, the user seems to be reacting slower than normal. This might be due to the player being tired or sick. If the player falls below a threshold amount, such as a reaction time of 90% or less of normal, then the mouse could be instructed to end current game play for a predetermined period of time, such as one hour. After that hour is up, the user would again have access to the mouse, but further checks of reaction time would be made. The mouse could also end game play if the user appeared to not be playing their best game. For example, a user playing three minute speed chess might have the game controller set to send the user's current chess rating to be stored in the mouse, and when that rating falls by 100 points the mouse automatically ends game play for a period of time. A user playing poker might have access to the mouse and keyboard denied after the user most too much money or was playing in a way that was indicative of a player on tilt.

Stored value in a mouse could also be used to pay for items outside of a game environment. For example, a user at a coffee shop with a laptop computer and mouse could use value in the muse to pay for a coffee. In another embodiment, value stored in a mouse could be used to buy dinner via Seamless.

In various embodiments, value stored in a mouse could be locked up if the mouse was taken out of a designated geofenced area.

In various embodiments, stored value is associated with a mouse or with another peripheral. Value may take physical form, such as gold or currency physically locked inside of a mouse. Stored value may take other forms, such as cryptocurrency, electronic gift certificates, etc. In various embodiments, a user may perform certain actions on a peripheral in order to unlock, receive, or otherwise benefit from stored value. In various embodiments, a user must type in some predetermined number of words (e.g., one million words) to unlock value. In various embodiments, the words must be real words, not random key sequences. In various embodiments, a user must make a certain number of cumulative mouse motions in order to unlock value. For example, the user may move a mouse for one kilometer in order to unlock value.

In various embodiments, a mouse/keyboard or other peripheral device could respond to game conditions; in various embodiments, the mouse and keyboard may gain or lose functionality, or have altered functionality as a result of in-game development, and/or as a result of player actions during a game. In various embodiments, as a result of a player action, or an in-game development, a peripheral device becomes disabled for some period of time. For example, if, in a game, player one shoots the gun out of player two's hand, then player two's mouse may become disabled for thirty seconds. As another in-game example, if player one kills player two, player two's mouse and keyboard are disabled for five minutes. As another example, if a player takes damage in a game (e.g., in boxing), the player's mouse response lags or precision drops. As another example, if a player is drinking alcohol in a game (or while playing a game), mouse responsiveness becomes unpredictable, lags, or the keyboard begins to output more slowly or the wrong character now and then. Gamers would have the option of limiting this type of control to certain people.

In various embodiments, a player may pay to recover lost functionality of a peripheral device. The player may be able to pay to recover lost functionality immediately, or may pay to reduce the period of time for which functionality is lost. A player might pay the central controller, a game provider, or the person who caused the player to lose functionality in his peripheral device.

Mouse Extra Sensors Alter In-Game Character or Avatar or Actual Response from a Mouse-Keyboard A peripheral device (e.g., mouse, keyboard, etc.) may be equipped with various sensors that allow for collection of sensory data. This data could be used to alter the experience of the user(s) in both the virtual world (e.g. the game or virtual activity) and physical world (e.g. the physical mouse or keyboard).

In various embodiments, a mouse includes an accelerometer and/or another motion sensor. The sensor may be used to control the movement of objects in a game, including the movement of objects in three dimensions in a game. The sensor may also be used to control the movement of objects in other environments. In various embodiments, a user may provide an input to the sensor by positioning the mouse, such as positioning the mouse somewhere in 3-D space. A player in a game could use the accelerometer data to control the 3-D movement of objects either above, below, in front or behind the player. This is in contrast to the current 2-D dimensional play and movement. As an example, a player engaged in a combat game could pick up a flare and instead of using a 2-D enabled button or mouse control to launch the flare, the accelerometer equipped mouse could allow the user to move the mouse up to throw the flare up in the air or in the direction the mouse moves. This provides a more realistic experience for the game player.

In various embodiments, an accelerometer or other motion sensor may sense movement or momentum. For example, a user may move a mouse. In response, a character may move in the direction and pace of the mouse. Conventionally, movement of a character is controlled by static processing of buttons or joysticks to move the character in various directions within a game. In order to provide a more enhanced experience, the sensor-enabled mouse could be used to control the pace of movement and direction of the character. For example, if a character is running from the enemy, the mouse could be picked up and held with arms moving as if the user were running. The movement of the arms and pace of the arms could be reflected in the character and their movement. Once the arms stop moving, the character stops. If the user moves to the left, right, jumps up or lowers, the movement of the mouse in those directions could be reflected in the character as well.

In various embodiments, a user may move a mouse to perform a desired action in a game. Movements may include: the tap of the mouse on a surface; the tilting of the mouse to the left, right, front or back; quick movement to the left or right (front/back); or any other movements. Conventionally, mouse clicks or finger taps on a mouse may reflect some action that the user wants to occur on the screen. With a sensor-equipped mouse, the various unique movements of the user could reflect their specific choice in a game or any application setting. For example, as a card game player, the user may signal the dealer to deal another card by simply tapping the mouse; if the user wants to pass, they may quickly move the mouse to the right; or if the user wishes to fold and end the game, they may raise the back of their mouse. These movements could be configured to reflect actions particular to each game.

In various embodiments, a mouse may contain a tactile sensor. A tactile sensor may include galvanic sensors or other tactile sensors. The tactile sensor may be used, for example, to measure and adjust excitement level of the user. A tactile sensor may gather sensory information collected through the skin (e.g., temperature, pressure, moisture, metabolites, vibration).

Many games have predetermined levels and paths to successfully accomplish the game. Users either navigate successfully without much difficulty or fail repeatedly trying to accomplish a task. Measuring the relative excitement/intensity/frustration level (or lack thereof) may possibly make the game more fun. With the collection of sensory data in the mouse-keyboard, the tactile data collected could be used to alter the user experience and make the game more or less difficult. For example, a skilled game player may always navigate through a section of the game with little or no trouble. The tactile sensor is reading that the player's skin temperature, pulse rate and pressure applied to the mouse-keyboard are relatively consistent. In this case, to add to the excitement, the game could automatically introduce new and more challenging scenarios to raise the heart rate, force applied to the mouse-keyboard and overall temperature of the player. Conversely, if a novice player repeatedly fails in areas of the game and the tactile sensors are reading elevated levels, the game could provide on screen coaching to maneuver through the game or introduce easier levels to increase their skill.

In various embodiments, a tactile sensor may measure excitement levels in one player. Other players may then be apprised of the player's excitement level. In various embodiments, sensory information is collected through the skin (e.g., temperature, pressure, moisture, vibration information). Today, player information is either observed on screen or through audio queues. With the collection of tactile information from all players via mouse-keyboard, this information could be sent to each player's mouse-keyboard as another piece of data to enhance the experience and gain insight to their opponents reaction to the game. For example, a player may have an increased heart rate or elevated temperature during an intense battle. This information could be sent to an opponent's mouse-keyboard via lights/vibration during the game in order to adjust their playing style. If they are your enemy in the game, you may notice they are getting agitated and may wish to bring in other forces as they are nearing a point of failure. On the other hand, if the tactile sensory data provided indicates a teammate has increased sensory data and is reflected in your mouse/keyboard, you may wish to abandon your current task and go to assist.

In various embodiments, a tactile sensor may take measurements, which are then reflected in a user's avatar. In various embodiments, a tactile sensor may collect galvanic measure of temperature or moisture levels. Using galvanic measurements, the collected information could reflect in the in-game avatar. For example, if the sensor measures a person's temperature or moisture level (sweat) increasing, the in-game avatar could dynamically change to show the avatar sweating, face becoming red, facial expression of exhaustion, change of clothing to reflect body temperature (e.g., the avatar may wear lighter clothing), and/or the avatar may consume fluids. Conversely, if the sensor measures indicate a calm manner, the avatar could show a pleasant expression, casual stride or cooperative behavior.

In various embodiments a mouse or keyboard may include a biometric sensor. The sensor may determine a heart rate or other vital sign or other biometric measurement. The sensor reading may be incorporated into a game. In various embodiments, a finger sensor (or other sensor) collects the heart rate of the user. The heart rate of the player (user) is collected and provided to the other game players with sensor-enabled mice or keyboards. As the heart rate of the player is collected, the pulsing rate is sent to the other users in the form(s) of light pulses or actual vibration reflecting the exact heartbeat of the player. As a player enters an intense part of the game, or when the player loses the game, the player's heart rate may increase. In various embodiments, this increase in heart rate may be seen in another's mouse-keyboard and/or felt via a corresponding vibration. This allows each player to feel more connected to the physical person, making the game appear more realistic.

In various embodiments a mouse or keyboard may include a force sensor. In various embodiments, the force sensor may allow force or pressure controlled movement of game/application items. Forces applied to a mouse-keyboard can be used to invoke actions in a game or application. For example, in a combat game with multiple weapon types, each may require a different level of force to pull a trigger. Instead of clicking a button or moving a joystick to fire a weapon, force applied to a mouse could be used. If one weapon is easier to shoot, the force needed on the mouse could be minimal, whereas larger, more complex weapons may require a higher degree of pressure and/or may require pressure from multiple locations on the mouse-keyboard (e.g. two fingers and the palm of your hand).

As a competitor, the player may wish to manipulate the play of their opponent. The game could allow the player to increase the mouse pressure making it more difficult for an opponent to engage a weapon, or require them to use multiple force actions on the mouse-keyboard to engage a weapon.

In various embodiments, an amount of force or pressure sensed may indicate tension/frustration on the part of a player. Such tension or frustration may be reflected in an avatar. Using forces applied to the mouse-keyboard could indicate frustration by the user. In this case, the in-game avatar could display an expression of frustration or the game could adjust to make elements of the game easier until the frustration level is reduced. If the mouse-keyboard are slammed on the table, this could reflect frustration and cause the avatar to slam their fist on an object or stomp on the ground in a game.

In various embodiments a mouse or keyboard may include one or more lights. In various embodiments, lights may adjust light to display activity, such as player activity. In various embodiments, data about player activity may be collected including player progress, opponent progress, availability, excitement level, rating, etc. Player (user) information may be collected in game or on device; opponent (other user) information may be collected in game or on device or via other connected devices.

Using information collected from multiple sources such as sensor equipped mouse-keyboard, external data sources like weather alerts, amber alerts, alarm systems, temperature sensors, gaming data from other opponents, player availability indicators (active indication versus calendar notification), the lights on a mouse-keyboard could be turned on, off, adjust brightness and patterns to reflect the specific event taking place. For example, if the player is engaged in a combat gaming scenario, the lights on a mouse-keyboard may display a rapid pulsing bright red color on the mouse or keyboard to indicate the battle is intense. On the other hand, if my doorbell rings, my mouse may suddenly reflect a bright green light indicating someone is at the door. These colors, patterns and brightness levels can be adjusted by the user.

Players often have teammates they frequently engage in games. When one player wants to play a game, they may wish to alert others of their availability or see another player's availability. For example, if one player is available to play a game, they may simply press a button on the mouse-keyboard that immediately lights up a green indicator on their friend's mouse-keyboard. This signals to their friend to join a game. Conversely, if for some reason a player is not able to play a game, they could hit a button on the mouse that indicates to others they are not available. This could be a green color or any other visual indicator.

In various embodiments a mouse or keyboard may include one or more audio output devices. In various embodiments, the audio output may be used to locate a misplaced device. In various embodiments, users desire the ability to find devices. As the mouse-keyboard becomes more customized devices that are carried from location to location, the opportunity to lose the device increases. Users may desire the ability to ping their device. For example, if a player takes their mouse to a friend's house to play a game and it is misplaced, the user can log in to their other electronic device and ping the mouse. The sound from the mouse-keyboard can be heard and the device located.

Game players or other users can send an audio signal to a mouse-keyboard. During a game, a user may send their friend or opponent a sound to distract them, encourage them or alert them. For example, if a person is playing a combat game and they ambush an opponent, they could send a loud sound to their opponent to scare them or distract them. Likewise, if during a game they see their teammate about to be attacked, they could alert them via a sound. Furthermore, at the end of a successful win, all team members' sounds could play various tones indicating success.

In various embodiments a mouse or keyboard may include a metabolite sensor. The metabolite sensor may collect or detect chemical content (e.g., potassium, sodium content).

Game players, when alerted to low levels of potassium or sodium (or any measured chemical level via the sensor), could have the game and avatar modified to indicate the response requested in the physical world. For example, if the sensor detects low levels of potassium, the game avatar may suddenly pick up a banana to eat or have it incorporated in the game to find and eat as another challenge. This may also remind the player to actually eat a food rich in potassium to resolve the deficiency. Likewise, other players that notice this activity may also be reminded to encourage the player to eat a food rich in potassium. In this regard, all players are observing and suggesting to each other to maintain good health habits.

In various embodiments, a mouse or keyboard may include an electroencephalogram (EEG) sensor. The EEG sensor may collect brainwave activity.

Game play invokes brain waves and can provide insight into the physical impacts of games on a player's brain and also how to develop more challenging and intense games. A headband that measures brain waves could be used to collect this data and send the data to a central controller (possibly via a connected or associated mouse-keyboard) for analysis.

During a game, the EEG sensor could determine if you are having a headache and adjust the game to lessen the intensity. In addition, the brightness in the room, game, mouse-keyboard and any sensory controlled device in the room could be adjusted to lessen the impact on the brain and headache intensity.

During the game, if brain activity indicates stressful signals, the in-game avatar could dynamically change to indicate a potential issue by placing their hands on their head, taking a break or signaling to other players they are not feeling well. This could be an early indication to the player as well that a break from the game is needed.

During a game, if the brain signals are not very active, the game could dynamically change to introduce more complex or challenging activities to stimulate the brain.

In various embodiments a mouse or keyboard may include an electrocardiogram (EKG/ECG) sensor. The EKG/ECG may collect cardiac electrical waveforms. This may allow for game intensity to be measured and adjusted. As games become more complex or other players introduce activities that engage a player, the heart rate can be measured. If the heart rate increases, decreases or remains consistent, the game could be adjusted accordingly. For example, if a user is playing a soccer game and is constantly making goals while their heart rate remains constant, it may indicate the game is not challenging and could lead to boredom or switching the game. The game could introduce more challenging opponents or adjust the player skill and make it more difficult to score goals. Likewise, if the player's heart rate is elevated for an extended period of time, the game difficulty could be adjusted to allow for recovery of the heart and a slowing of the heat rate.

In various embodiments a mouse or keyboard may include an electromyography (EMG) sensor. The EMG sensor may collect muscle response.

The mouse-keyboard could be equipped with an EMG sensor to measure muscle activity in the hands, fingers, wrists and arms. The user's muscle response to a game can be measured and game play adjusted. For example, if the EMG recognizes that the hand on the mouse demonstrated weak muscle activity, the sensitivity on the mouse-keyboard could change dynamically to not require such intense pressure to invoke a function during a game. If a user is shooting a weapon and requires pressing of a button, the button friction could change to make it easier if the EMG recognizes weak muscle response.

In various embodiments, players' skills may be ascertained based on EMG data. Adjustments may be made to level the playing field among different players. In order to create a more uniform play for games requiring teams, the EMG data collected from all players could be used to adjust the necessary mouse-keyboard settings, removing any advantage any player may have. For example, if a group of players are engaged in a team sport (e.g., football) and the passing, kicking and handoffs require a mouse-keyboard to be used with some level of muscle activity, those with stronger muscles may have an advantage. Adjusting each player's mouse-keyboard to be consistent so all players' intensity is the same, could provide a more balanced game.

In various embodiments, an EMG sensor in a mouse (or other peripheral) may detect if a player is leaning forward.

In various embodiments, a mouse or keyboard may include a proximity (IR-Infrared) sensor. The proximity (IR-Infrared) sensor may collect information indicative of obstacles or objects in the room.

In various embodiments, using proximity sensors in a mouse-keyboard device can alert the user of objects in the room. Oftentimes a user's back is facing a door making it difficult to see if someone walks in or is looking at the user's computer screen. The proximity sensor can provide the user with immediate information that someone is near them. This can be done by interfacing to the computer screen (or application), providing a message or visual indication of the actual object. The mouse-keyboard could vibrate or display a different color as well.

External Sensors Change In-Game Environment or Virtual Environment

The proliferation of external sensors allow for the data collected to be included as part of a user's in-game experience and reflect an indication of what is taking place in the real world.

In various embodiments, weather sensor data is reflected in a game. The game can collect real-time data from the various weather sources (such as the national weather service) for the physical location in which the player is playing the game. If the central controller receives data indicating rain in the area, the on-screen game environment could change to make it appear that it is raining or provide a sound mirroring the real weather events. In addition, if it is raining in the game environment, an in-game avatar could change to reflect that rain gear is worn. Another example could be tornado activity in the area. If this occurs, the game could alert the player by flashing lights on the player's mouse to get his attention. The player, who may be distracted by the game, could be instructed to take cover and look for a safe place. Likewise, a tornado could display on the screen and disrupt the player's competitors.

The indication of thunder in real life could cause the mouse or keyboard of remote team members to vibrate to mirror the feeling of thunder. The same could be done if a snowstorm or heat wave is in the area and the temperature of the mouse or keyboard dynamically changes.

In various embodiments, garage door/doorbell data is reflected in a game. An increased number of garage doors are monitored and controlled electronically. This data could be displayed on the user's game screen or mouse display area as informational to the player/user. For example, as a teenager who is playing a game after school, they may want to be notified that the garage door/doorbell is being activated to determine who is home or to stop the game and focus on another activity (e.g., homework, chores, dinner).

In various embodiments, time of day can be mirrored in the sun/moon brightness on the mouse or keyboard. Based on the geographical location of the mouse, external sources such as the national weather service could provide the sunrise/sunset/cloudiness/moon brightness data. This information can be reflected in the mouse or keyboard display. For example, if the user is playing a game at 2 pm when the sun is bright, the keyboard backlighting could illuminate a bright sunny color. As time progresses and gets closer to dusk, the illumination in the keyboard backlighting could dynamically change to mirror the conditions outside—becoming less bright and softer in color. When sunset occurs and it is dark, depending on the brightness of the moon, the keyboard could adjust to reflect this intensity as well. A sun/moon could display on the mouse screen to match the ambient environment throughout the day.

In various embodiments, ambient sounds could change the in-game environment. Microphones on the user's peripheral devices could detect sounds within the environment of the player to incorporate into the game environment. For example, if the bark of a dog was picked up by a microphone, the game controller could add a barking dog character into the game environment. Users could transmit a photo of the dog to the game controller so that a virtual representation of the user's dog can be seen in the game environment. In another embodiment, when a peripheral microphone picks up loud sounds, the game controller could create a sign in the game environment above the head of the user's game character which says "Currently in noisy environment."

In various embodiments, local news/events could be incorporated in the in-game environment. Items from a newsfeed (e.g., a feed of news that is local to the player's location) can be incorporated into a game. For example, an in-game billboard may display, "Congratulations to the Jonesville high school football team!!"

Sharing of Video Highlight Reels

When game players have success while playing a game, they sometimes want to brag about it to their friends, but that process can be clumsy and complicated. Various embodiments allow for players to quickly and easily capture video of game highlights and make them available in a variety of formats that make sharing them more fun and enjoyable. One or more peripherals can enable clipping, commenting, editing and display of short video clips. These clips could be video, streams of text, audio, animations, or computer simulations of the player successes.

When a user believes that they are about to execute gameplay—such as a game character about to attempt a dramatic leap across a ravine—that they feel might be of interest to their friends, the user could tip back the front of their mouse to initiate a signal to start a recording of gameplay at that moment. For example, the accelerometer in the mouse could identify that the mouse was tipped back and then send a signal to the user device (or central controller, or a game controller) requesting that a video be started at that moment. Once the leap across the ravine was successfully completed, the user could again tip back the mouse in order to send a signal indicating that the video recording should be stopped at that moment. The user device (or game controller) could then save the clip and send the clip to the central controller for storage in an account associated with the user unique identifier. There are many ways in which the user could initiate and terminate a gameplay clip. For example, the user might tap the mouse twice to begin recording and three times to end the recording. Another option would be for the user to say "record" into a microphone of the mouse, with software in the mouse capable of speech to text that can translate that verbal request into a 'start recording' signal to the user device or game controller. A physical or virtual button on the mouse could also be used to provide start and stop signals for the generation of gameplay clips.

The game controller could also start and stop video recording based on user biometrics. For example, gameplay could be recorded whenever a heart rate sensor of the user's mouse exceeded a particular number of beats per minute. In this way, the player does not have to initiate the creation of the gameplay clips, but rather the clips are recorded whenever the heart rate biometric indicates that the player is in an excited state.

Another way to generate start and stop times for gameplay clips could be via algorithms of the game software that predict that the user is about to do something exciting in the game. For example, the game software might begin to record gameplay whenever a user is involved in a sword fight with a more experienced opponent. After the sword fight was concluded, the game software could ask the user whether or not they wanted a clip of that sword fight to be sent to the user's mouse for storage.

The user could also initiate a clip of gameplay to be recorded, but have the recording end within a particular period of time. For example, the user might set a preference stored in the mouse which indicates that clips should always end three minutes after initiation.

Rather than initiating a gameplay clip to be created as above, the user could initiate a streaming session by having the game software send all gameplay video directly to a video game streaming service such as Twitch. This initiation could be done via a series of taps on the mouse, verbal commands, biometric levels, or algorithmically by the game software.

Rather than creating video clips, the game software could be directed by the user to capture screenshots, audio files, maps of terrain traversed, a list of objects obtained, a list of enemies defeated, etc.

In various embodiments, the user initiates a video clip of his own face as seen through the front facing camera of the user device (e.g., user computer) during gameplay. For example, the user could send an initiation signal (such as taps on a mouse, or two quick blinks while facing the camera) to start a recording of the user's face while engaged in a particularly interesting or exciting activity in-game. Such a video could similarly be sent to the user's mouse for storage, or be sent directly to the central controller for storage in the user's account. This user video could be combined with a clip of the gameplay associated with the game character, and saved as two side-by-side videos synchronized to capture the emotions of the player while showing the exciting gameplay that produced the emotions.

User clips stored in his account at the central controller could allow the user to build a video game highlight reel that could be sent to friends. Such video clips could be listed by game or chronologically. This could be combined with game statistics much like a baseball card. For example, for a game like Fortnite® the player might have several video clips as well as statistical information like the number of games played and the average success rate in those games. For players on teams, statistics and gameplay clips could be cross posted to teammates' pages.

One of the advantages of storage at a central controller is that the user can accumulate videos and statistics across all game platforms and game types.

Device-Assisted Discovery of Social Connections

More than ever, people are searching and engaging in various forms of social connection, both virtually and physically. The mouse and/or keyboard could be devices that applications use to alert a user when a connection is made.

The mouse and/or keyboard could be devices that users use to indicate interest in an activity.

In various embodiments, applications alert a user via mouse-keyboard that a connection is made. As a user of an application, I may be interested in a topic or requesting recommendations. Once the request is sent in to various sites (e.g. Pinterest®, Nextdoor™, dating sites, local volunteer organizations, local interests (running club, chess club, gardening club), Ebay®), unless the user is routinely checking email, alerts may be missed. The mouse-keyboard could take these alerts and provide feedback that a connection or message has been made. Once notified, a simple mouse-keyboard movement could take a user instantly to the information. For example, a user is interested in getting a recommendation for the best appliance repair person in the area on Nextdoor™. After the request is submitted, the user resumes other activities using their mouse-keyboard. After some time, a recommendation is made. At that point, an alert is sent by Nextdoor™ to the user's mouse-keyboard. The mouse-keyboard could display a color, sound or skin display indicating that a message has been received.

In various embodiments, a user utilizes a mouse-keyboard to respond to connections. A user can respond to the mouse-keyboard indication that a connection is made in various ways. For example, once a user has indication that a message/connection is made via the mouse-keyboard, they can simply click the mouse (or press a key on the keyboard) and the message/action is immediately retrieved from the sending application. This not only provides immediate feedback to the sending application but makes a simple interaction between the user and the application thus creating efficiencies and improved experience. Likewise, in addition to retrieving messages in textual format, a user could open an audio or video channel to instantly connect to the application/other user. This could occur if a person is interested in playing a new game and is seeking an additional player. Once found and the device alerted, the person could communicate directly with the player to establish a time to play. If the response meets the user's needs or the connection is established, another simple click can turn off future alerts from the applications and end the communication.

In various embodiments, a mouse-keyboard assists in making or responding to in-game connections. An in-game player may want some immediate assistance from other players (already in the game or not) on the game overall or a particular section of the game. The user simply selects a mouse-keyboard action and a connection request is made to current and previous players. Once a player determines they want to connect (by selecting the action on the mouse-keyboard), the requesting player is notified on their mouse-keyboard. The connection is made by selecting the mouse-keyboard inputs and assistance is provided via a dedicated audio channel in-game, a textual message or video chat. Once either player decides to end the connection, a simple click on the mouse-keyboard is made.

In-Game Rewards Displayed on Socially-Enabled Peripherals

Game players sometimes gain abilities, levels, titles (like grandmaster, wizard), ratings, (such as a chess or backgammon rating) inventory items (like gold coins, weapons, ammunition, armor, potions, spells, extra lives, etc.) or other benefits achieved during game play. Players also accumulate statistics, such as win rates or accuracy rates. Many players like to show off such achievements, and to let their friends know how much they have achieved.

When a user achieves a level in the game, that level could be displayed on the surface of the user's mouse or keyboard. For example, a display area on the mouse could display that the user was a wizard who had achieved a level 50 of experience. This indication could be displayed whenever the player was using the mouse, or it could be displayed at all times. The user device or game controller could send a signal to the mouse of the achievement level and store it within storage media in the mouse. In another embodiment, the achievement level indication is displayed only when the mouse is not being used or does not have a hand on it. Pressure, temperature, or motion sensors built into the mouse could detect use and automatically turn off the ability level indication. The achievement level display could be an e-ink display which would reduce power consumption requirements.

An achievement level indication could change frequently during a game, such as when a chess player's rating moves up and down after a series of many blitz games with each lasting only a few minutes. The constantly updating rating could be displayed on the mouse display, or it could also be displayed on a keyboard according to various embodiments. For example, the keyboard could have back lighting for each individual key which is capable of causing keys to glow in an order determined by a signal from the user device or game controller. So if the user's new blitz chess rating was 2375, the "2" key would light up and then turn off, followed by the "3" key, then the "7" key, and then finally the "5" key.

Achievement level indicators could also be shared among multiple players. For example, a team of three users could have inventory items of all team members displayed on the mouse of each team member. For example, if player "A" has a Healing Potion, player "B" has a +5 Sword, and player "C" has 35 Gold Pieces, then each of these items would be listed on the display area of the three mice. So player "A" would see "Healing Potion, +5 Sword, and 35 Gold Pieces" displayed on his mouse. These items could be continuously displayed, with updates to the inventory items being sent from the game controller to the mouse whenever an item was added or used. Players could also trigger the display of the inventory items with the click of a button on the mouse, a verbal command to "show inventory", depressing a function key on the keyboard, or the like.

The mouse could also change its physical shape to reflect changing achievement levels. For example, in a first person shooter game the user's mouse could extend out a small colored plastic plate at the top and bottom of the mouse when the user achieved victory over five opponents in the game. This would allow other users present to see at a glance that the player was doing well, and the extended plates could be positioned to not interfere with ongoing game control via the mouse.

Multiple Controllers, Single Cursor

Devices according to various embodiments could enable multiple users to control a single instance of software. The inputs of individual devices could be communicated to the central controller and then communicated from the central controller to the game controller or software. By allowing multiple users to input into a single piece of software, the devices could enable social game play.

For example, users could swap control of the inputs of a single character, avatar, vehicle, or other aspect of gameplay. Players could swap control voluntarily. Alternatively, the game controller could swap control probabilistically or based upon another dimension, such as relative skill at different aspects of a game, which player has had the least time of control, or which player generates the most excitement for non-controlling players.

Users could control a single input type for a composite character, avatar, vehicle, or other aspect of game play. For example, control of X,Y,Z movement, visual field, and weapon might be controlled by separate players. For example, a player might control the movement of a vehicle such as a ship, while another player might control its ability to shoot.

In various embodiments, one user controls a primary character or entity, and another user controls a sub-entity. For example, a first user controls a mothership, while a second user controls a space probe released by the mothership. As another example, one user controls a main character (e.g., a foot-soldier), while another user controls an assistant, such as a bird or drone that flies overhead and surveys the terrain.

In various embodiments, opponents may take control of one or more functions of input while the device owner might retain other aspects of input. For example, opponents might control the facial expressions of a character, while the device owner retains all other control over the character. As another example, opponents might control the communications (e.g., text or voice messaging) from a character, while the device owner retains all other control of the character. As another example, opponents might control the speed of a character's movement, while the device owner retains control over the direction of the character's movement.

In various embodiments, the central controller might average, select the most popular input, or otherwise combine the input of several users to control aspects of game play. For example, the character's direction of motion may be determined by the direction that was selected by a majority of users having input to the character's actions. As another example, the character's motion may be determined as the vector sum of inputs received from users controlling the character. In various embodiments, all users controlling a character or other game aspect have to agree on an input before some action is taken.

In various embodiments, aspects of control of a character or of other gameplay may not be explicitly communicated to a user. In other words, a user may not always know what effects his inputs will have on a character or on gameplay in general. For example, a user may not know that a particular key on his keyboard controls the speed of a character's trajectory. The user may be left to experiment in order to figure out the effects of his input on character actions or on other aspects of gameplay. In various embodiments, the effects of a particular key (or other input) may change without notice. A user may then be left to figure out what he is now controlling, and what he is no longer controlling.

In various embodiments, two or more users may play a game where one user serves as an instructor while the other user is a student. The instructor may be helping the student learn how to play the game, or to learn how to improve his game play. In various embodiments, the student may be allowed to control a character, vehicle, or other aspect of gameplay. However, when the instructor deems it appropriate, the instructor may assume control and guide the character, vehicle, or other aspect of gameplay. The instructor may thereby help the student with a tricky sequence, with a strategy that had not occurred to the student, with an improved set of motions, or with any other aspect of the game.

Mouse Voting

Teams playing games sometimes require decision making by the group, requiring some discussions between team members.

In various embodiments, game players needing to make a decision could conduct voting protocols through the mice of the players. In this embodiment, a team of five players registers their names with the game controller for communication to the user device and/or the central controller (which can associate the player names with the unique mouse identifiers associated with those player names). The five players then use their mice in gameplay and tap the surface of the mouse three times to initiate a voting protocol. For example, Player #3 might initiate the voting protocol in order to facilitate the group deciding whether or not to cast a spell that would build a bridge over a river. In this example, Player #3 taps her mouse three times quickly and a signal is sent to the user device and then on to the central controller. The central controller then sends a signal out to the mice of all five players, which displays on the surface of those five mice a yes/no option. Each of the five players taps once for 'yes', and twice for 'no'. This selection is communicated back to the central controller, and the option receiving the most votes is then communicated back to be displayed on the surface of each of the five mice.

Many voting protocols could be stored with the central controller, allowing options like giving users the ability to provide greater weights to the votes of more experienced players, or requiring unanimous consent or a two-thirds majority in order to make a decision.

Voting by users could be done anonymously, or the votes could be connected to their real name or game character name.

Mouse to Mouse Communication

Communication between players is very common in game environments, with players often texting each other or calling each other to communicate. This can sometimes be clumsy as players may have to take their hands off of the keyboard or mouse to initiate, manage, or end the communications.

In various embodiments, mice are enabled to communicate directly with each other. For example, a user could triple tap the surface of their mouse to initiate a communication channel with a particular friend, and then speak into a microphone contained within the mouse. That audio signal would then be transmitted to the user device and sent to the user device of the user's friend, and finally sent to the friend's mouse for broadcast via an output speaker in the mouse. In this way, a pair of mice can communicate like a pair of hardwired walkie talkies.

The user could also store a list of the unique mouse identifiers of five of the user's friends, and then initiate a mouse to mouse connection by tapping once on the user's mouse to be connected to the mouse of Friend #1, tapping twice on the mouse to initiate communication with the mouse of Friend #2, etc.

Communication could also be conducted through a microphone within the user's keyboard in a similar manner. The user could say "Friend #3" into the microphone of the keyboard, which would then transmit the signal to the user device, which sends the signal to the user device of Friend #3, which then sends a signal to the speaker built into the keyboard of Friend #3, to thereby enable the direct communication from keyboard to keyboard.

Interactions with Streamers

Streaming platforms such as Twitch®, YouTube® Gaming, and Mixer™ now allow individuals to livestream video game sessions to audiences of thousands or even tens of thousands of fans. While fans can join chat streams with messages of encouragement, there is a need to allow fans to increase the level of interaction with streamers.

In various embodiments, fans of streamers can use their mice to vote for the actions that they want the streamers to take. For example, the streamer could send out a voting prompt to appear on the display screens of the mice of fans, asking them whether the streamer's game character should head North or South. Players then vote by touching the phrase "North" or "South" that is now displayed on their mouse. That signal would go to the user device and then to the central controller, and finally to the controller of the streaming platform to indicate to the streamer what action is requested by the fans.

In another embodiment, fans would be able to provide a direct input into the controls of one or more peripherals used by the streamer. For example, fans could provide input via their mice as to the direction and velocity with which to move over the next 60 seconds of gameplay, with the input from all of those mice combined by the central controller into a single aggregated direction and velocity with which the streamer's game character would be moved for the next 60 seconds.

The ability to subscribe, re-subscribe, donate, or tip small amounts of money would also be facilitated in embodiments where a user's mouse stores value (such as currency) that can be transmitted to the streamer via the central controller.

The streamer could also enable loot boxes, raffles, and giveaways to users that appear on the display screen of a user's mouse. The user's mouse could glow red whenever the streamer was currently streaming.

The user's mouse could include a streamer's insignia or an image of his face on the display screen of a user's mouse.

A streamer could design a custom mouse that included design elements or colors associated with his brand. Such a mouse could include stored preferences including ways for the user to easily connect with the streamer.

Device Changing Shape

While many people work or play games with others remotely, there is a need for increasing the feeling of connection that can help bridge the distance gap.

In various embodiments, the mouse of a user is configured to have a look and feel evocative of a pair of lungs that reflect the actual breathing rate of a second remote user. The rate of breathing can be determined by receiving a breathing rate sensor value from the mouse (or other peripheral capable of determining breathing rate) from the second user, and replicating that breathing rate on the first user's mouse. The breathing effect could be generated by having a soft light glow on and off at a rate equal to the second user's breathing rate. Alternatively, the first user's mouse could have an internal mechanism that allows the mouse to expand on a cadence with the breathing rate. In these embodiments, the breathing rate of the first user could be reflected on the second user's mouse while the second user's breathing rate could be reflected on the first user's mouse. In this way the two users would feel more connected even though they may be thousands of miles apart.

Another way in which the breathing effect could be embodied would be for some or all of the keys of the user's keyboard to be directed to move up and down reflective of the breathing rate of the second user (and vice versa).

The ergonomic shape of peripherals could also change based on the needs of a user. For example, a keyboard could be directed by the user device to incline by a few degrees based on data generated by the user's camera.

Peripherals could also change shape when a user signals that the peripherals are being put away for storage or are being transported to another location. The altered form factor could make the peripherals less likely to sustain damage from being bumped or jostled.

Devices according to various embodiments could include a foldable form-factor in which the devices fold, hinge, or otherwise enclose themselves to protect the device during travel.

Mouse Actions

There are other ways in which a mouse can provide inputs beyond traditional two dimensional plane movements, clicking, and rolling wheels or trackballs.

In various embodiments, the user generates a signal from a mouse by tipping up the front of the mouse, but keeping the rear end of the mouse relatively stationary.

In various embodiments, a mouse may remain fixed or stationary and may interpret mere pressure from different sides as signals to move a mouse pointer. For example, if a person applies pressure to the right side of a stationary mouse (as if moving a mobile mouse to the left), the mouse pointer may move to the left.

A user mouse could also generate a unique signal by turning the mouse over. For example, a user could turn the mouse over to indicate that they were temporarily away from their keyboard, and then turn the mouse back over when they return to gameplay. The game controller could then relate that time away from the keyboard to the other players so that they know the user will be unresponsive during that time.

Connected Devices for Mobile Work

Individuals often use mobile computing devices, such as laptops, tablets, or phones, to conduct work outside of traditional office or home settings. These devices have built-in input devices, and detached keyboards and mice are accessory peripherals. The devices according to various embodiments could improve the functionality of these accessories.

Accessory keyboards and mice are frequently stolen or lost. To prevent theft, a device owner, for example, could set an alarm mode, allowing the owner to leave the device unattended. If the device is touched, the device could be set to produce a loud noise or flash bright colors. In an alarm mode, the device could be set to take a picture if it moved. If the device is connected with another computing device while in alarm mode, it could, for example, trigger the device to send its current GPS coordinates or the IP address of the device to the original owner. For example, to locate a lost device, an individual might enable a "lost device" mode that causes the device to produce a loud noise or cause the device to flash a bright light.

Devices could have additional functionality enabled by geofences or other location-context information, such as the ability to order items and process transactions. For example, a device might recognize that its owner is using it at a cafe and allow the device owner to order a coffee. Prior transactions in the same location might be stored in the memory of the devices for ease of reordering.

Charging devices can be challenging for mobile workers when electrical outlets are scarce or unavailable. Devices according to various embodiments might be able to charge wirelessly from other peripheral devices or from a mobile computing device.

Mobile workers often transport mice and keyboards in purses, backpacks, briefcases, and other bags without putting them in protective cases. Devices according to various embodiments could include a foldable form-factor in which the devices fold, hinge, or otherwise enclose themselves to protect the device during travel.

Parents Playing Games with Kids

Some parents enjoy playing computer games with their kids, but they feel like it would be a better experience if they could more fully participate in the gameplay experience.

One way to improve the shared experience of gameplay would be to have the game allow a single game character to be controlled by two players at the same time. In this way, a parent and child could play a game as one character rather than as competing characters.

Another example would be for the adult to be able to control a particular element of the game character that might be more complicated (like handling spell casting), while the child had the ability to control a simpler element of the game character (like the direction that the character walks). In various embodiments, two or more players controlling a single game character need not have any particular relationship to one another (e.g., such players need not have a parent-child relationship).

Dynamically Change Game Difficulty, Excitement Level, or Other Game Content

A key challenge for game creators is sustaining engagement and excitement over time, as well as balancing difficulty level. Players often lose interest in games over time. Games that are too difficult frustrate less skilled players, while games that are too easy frustrate more skilled players. Mice and keyboard devices according to various embodiments could facilitate a game controller dynamically changing in-game content to increase excitement, difficulty level, game play time, amount of money spent in-game, the amount of social interaction among players, or another goal of the game controller.

Mice and keyboard devices according to various embodiments could facilitate the onboarding of new players or users. An onboarding tutorial or help function could use the outputs of the devices to indicate to new players which mouse actions, key actions, and combinations of inputs control game actions. For example, a tutorial could use the visual outputs to light up keys in a sequence to demonstrate how to perform a complicated movement.

The mouse and keyboard of this device could be utilized to train an AI module that analyzes player input data to detect how a player responds to particular in-game stimuli. An AI module could then predict how the player would respond to different variations of in-game content, difficulty level, in-game loot, resource levels or other aspects of gameplay in order to elicit particular emotional responses, such as excitement or fear. Likewise, an AI module could predict how a player would respond to variation in game play to increase engagement, game play time, amount of money spent-in game, levels of social interaction among players, or another goal of the game controller. For example, a horror game might use an AI module trained on past player responses to stimuli, as measured through galvanic responses or heart rate changes, to dial in the appropriate level of fright for an individual player. For example, an AI module might detect that a player has reduced levels of game engagement and increase the likelihood of a player earning in-game loot boxes or other rewards in order to stimulate higher levels of engagement.

The mouse and keyboard of this device could be utilized to train an AI module that analyzes player skill level in order to dynamically vary the difficulty of the game. This AI module could be trained using device inputs, such as cursor speed or keystroke cadence, to detect patterns of game play by users of different skill levels and to predict skill level of the device owner. An AI module could detect the rate of learning for players and adjust game difficulty or skill level dynamically in response to skill acquisition.

In many games, dominant or popular strategies emerge ("the metagame" or "meta"), as players discover which strategies are likely to succeed and which strategies counter other strategies. An AI module could be trained to detect clusters of player behavior ("strategies") and analyze the relationship between strategy and in-game success. An AI module could then dynamically alter the difficulty of the game through managing in-game resources, non-player characters, or other aspects of game play, either dynamically during a game or by creating new levels, maps, or forms of game play that add novelty to the meta.

Because the game controller has information about all player actions, as well as perfect information about procedurally generated aspects of the game such as resources, non-player characters, and loot boxes, an AI module could predict when something exciting or interesting is likely to happen. Exciting or interesting elements could be players converging in the same area, a less skilled opponent beating a high skilled opponent, an improbable event happening, or another aspect of game play that has in the past elicited high levels of engagement, spikes in biometric data, social media shares or another aspect of excitement. If the AI module predicts that something interesting is likely to happen, it could visually indicate it to players. It could also automatically generate a clip (e.g., video clip) of the event and share it with players in-game, post it to social media, or share it on the internet. For example, because the game controller knows the locations and could predict likely paths of players, the controller could trigger a camera to capture the facial expressions of an individual likely to be in a line of fire or about to be ambushed. For example, the controller could message "watch out" to a player who is likely to crash in a racing game or "close call" to a player who escaped a predicted crash.

Digital Skins and Game Environment Synchronized with Physical Device

Mice and keyboards according to various embodiments can be customized through visual outputs, such as lights, screens, e-inks, and other visual outputs. These visual customizations can be controlled by the player, by the game controller, by the central controller or by other software. These visual outputs ("digital skins") can change dynamically while using a piece of software or may be set in a persistent output that lasts after the user has stopped using a piece of software.

In-game content that a player has earned, acquired or purchased can be displayed on the device in a manner similar to a trophy case. For example, the device might output visual representations of badges, trophies, interesting or valuable loot items, "season passes", skill trees, personalized in-game content, or other representation of the game.

Game play or in-game content can dynamically alter the outputs of these devices. The status of a player, current player performance, or the digital environment of the game, for example, might be dynamically displayed via visual output, tactile output, or other device outputs. Game play could for example change the appearance of the device. For example, if a player in an action game is being attacked or wounded, the device can display an output to show the direction of attack or whether the attack succeeded. Player performance might change the appearance of the device to indicate a streak of performance. For example, keys might light up one by one as the streak increases in length. Likewise, a "hot" or "cold" streak might result in the temperature of the device increasingly growing cold or hot to indicate the length of the streak. If a player, for example, was approaching the end of a level, suffering in the game, close to a boss, low on resources or running out of time to complete a task, the temperature of the device could change to indicate the situation to the player. A game for example could utilize device outputs such as lights as keys, puzzles, or other aspects of unlocking game functionality. For example, synchronizing lights on a keyboard or mouse with combinations of lights in a game could solve a puzzle or be used as a key to open a door. Likewise, a game set in a particular environment could display visual representations of that environment, such as trees or mountains, vibrate to indicate in-game terrain, or increase or decrease in temperature to match in-game environment. If a player, for example, is playing a game in a space or futuristic setting, the device can display stars and parallax movement.

Video game players often create "digital skins" for digital content by customizing the color, patterns, and visual textures of in-game content, such as the appearance of a digital character, vehicle, weapon, or other object. Various embodiments allow the player or the game to synchronize these digital skins to the device's visual output. These visual outputs could be displayed only during the game, or they could be displayed, like a trophy, when the player is not playing.

Individuals often customize the digital appearance of software ("themes"). The devices in this presentation could be customized in a similar manner as visual extensions of the software theme. Users often create different themes that dynamically transition over time of day or level of ambient light to diminish discomfort or to reduce the amount of blue light, which affects circadian rhythms and other biological clocks. The devices could also change visually according to time of day and ambient light to create a "light or day" mode and a "night and dark mode." The devices could alter levels of blue light over the course of day, or they could be used to increase exposure to blue light when users have insufficient exposure.

The devices could indicate whether software is being used, for example showing the logo of an application the device owner is using. For example, during a videoconference, the device could visually indicate that a call is ongoing or is being recorded.

Other software controllers could alter the outputs of the device. For example, while watching digital videos or listening to music, the title and creator of a song or video could be displayed. Likewise, album cover art or a clip of the music video could be displayed.

User Customizations

Game players often like to customize their gameplay experience. Various embodiments allow users to store information about desired customizations for use in customizing gameplay experiences. Customizations could be for digital actions/characters, or for physical changes.

Physical customization that a user might establish could include elements like the height of a chair, the springiness of keys on a keyboard, the tracking speed of a mouse, the angle of view of a camera, and the like.

Customization of a mouse could also include the location of display areas, size of the mouse, preferred color patterns, the weight of the mouse, etc.

Virtual customization could allow players to establish preferences for a wide range of enhancements. For example, the player might save a preference that when his mouse signals that he is away from the keyboard that the other players are alerted that he will return in ten minutes time. Customizations could also include a list of friends who are desired team members for a particular game. These players could automatically be added to a chat stream when that particular game was initiated.

Customizations could be stored in a peripheral device such as a mouse, in the user device, or at the central controller.

Status Updates Via Peripherals

With many players engaging in cooperative games from remote locations, knowing the status of another player in another location can be challenging. Is the player on a break? Does the player want to quit soon? Do they currently have a good internet connection? Getting answers to these questions can be time consuming and distract from player focus during ongoing games.

In various embodiments, a user identifies a number of other game players that he wants to get status updates from. For example, a user might identify three friends that he likes to play games with—Friend #1, Friend #2, and Friend #3. The identity of these friends is transmitted to the central controller. Periodically, status updates generated by the peripherals of these three players are sent to the central controller and then made available to the user on one of his peripherals. In one example, every five minutes the mouse of each of the three players checks for movement, sending a signal to the central controller if there is movement. If one or more of the three mice are moving (in this example that might be only Friend #2), the central controller sends a signal to the user device of the user which sends a signal to the user's mouse, storing an indication that Friend #2 now seems to be active. The user's mouse might light up with a color associated with Friend #2, or an insignia associated with Friend #2 might be displayed on the user's mouse, such as an icon for a wizard character that Friend #2 often uses in games. In this embodiment, it is easy for the user to know which of his friends are currently starting a game session. For example, a high school student might come home from school with the intent to play a game. He looks at his mouse to see if any of his friends are currently playing. If not, the user might begin to work on his homework while keeping an eye on his mouse, looking out for the telltale color which indicates gameplay is now underway.

In another embodiment, the user's mouse shows a constant indication of the status of the mice of all three friends. For example, the mouse may have a display area which is segmented into three locations, with each location lighting up when the corresponding friend is now using their mouse.

Player status can be much more than just an indication of whether or not the player is currently moving their mouse. It could also indicate whether or not the player was typing on their keyboard, moving in their chair, moving their headset, or moving/being in the field of view of a computer camera.

In another embodiment, players register a current status with the central controller. For example, a player might register that they are currently ready to begin a game with one of their friends. The central controller then sends a signal to the mice of those friends and displays a flashing light to inform that player that a friend is currently looking for a game. Similarly, a status of "I'll be ready to play at 3 PM" could be communicated to the other friends. A player might also send a status that they would like to talk with another player.

Users can also get information during gameplay about the status of remote players. For example, a player could tap three times on their mouse to initiate a signal to the central controller that they were currently on a break. The break status of the player is then sent to the user device of each of the other friends for display on their mice.

Communicating the status of a remote player could be done via the keyboard of a user by backlighting individual keys, For example, the "G" could be backlit when Gary is currently looking to begin a game.

The user's mouse could display a wide range of statuses for remote friends. In one embodiment, a user sees an indication for each friend of the current quality of their internet connection. A user's mouse could also indicate the type of game that a friend currently wants to play, or the top three games that the friend would like to play.

The user's mouse could also display information regarding inventory items, resources, or in-game statistics or remote friends.

Another status that could be of value to remote players is the engagement level or level of fatigue of a player. These could be used as a proxy for whether or not a player should not be relied upon during an upcoming period of complex gameplay.

Figure 101:
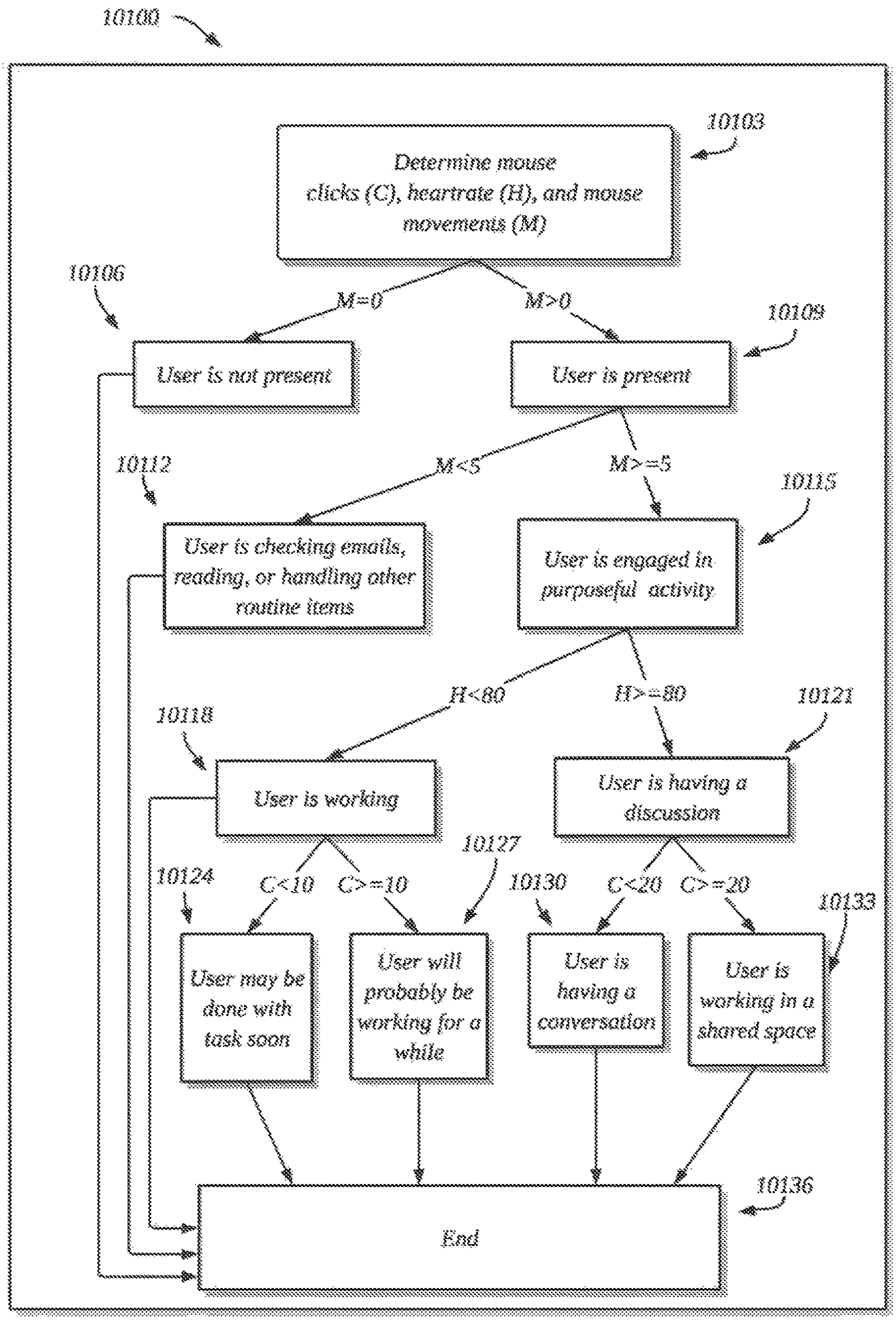
FIG. 101 is a diagram of a process flow consistent with at least some embodiments described herein.
Figure 102A:
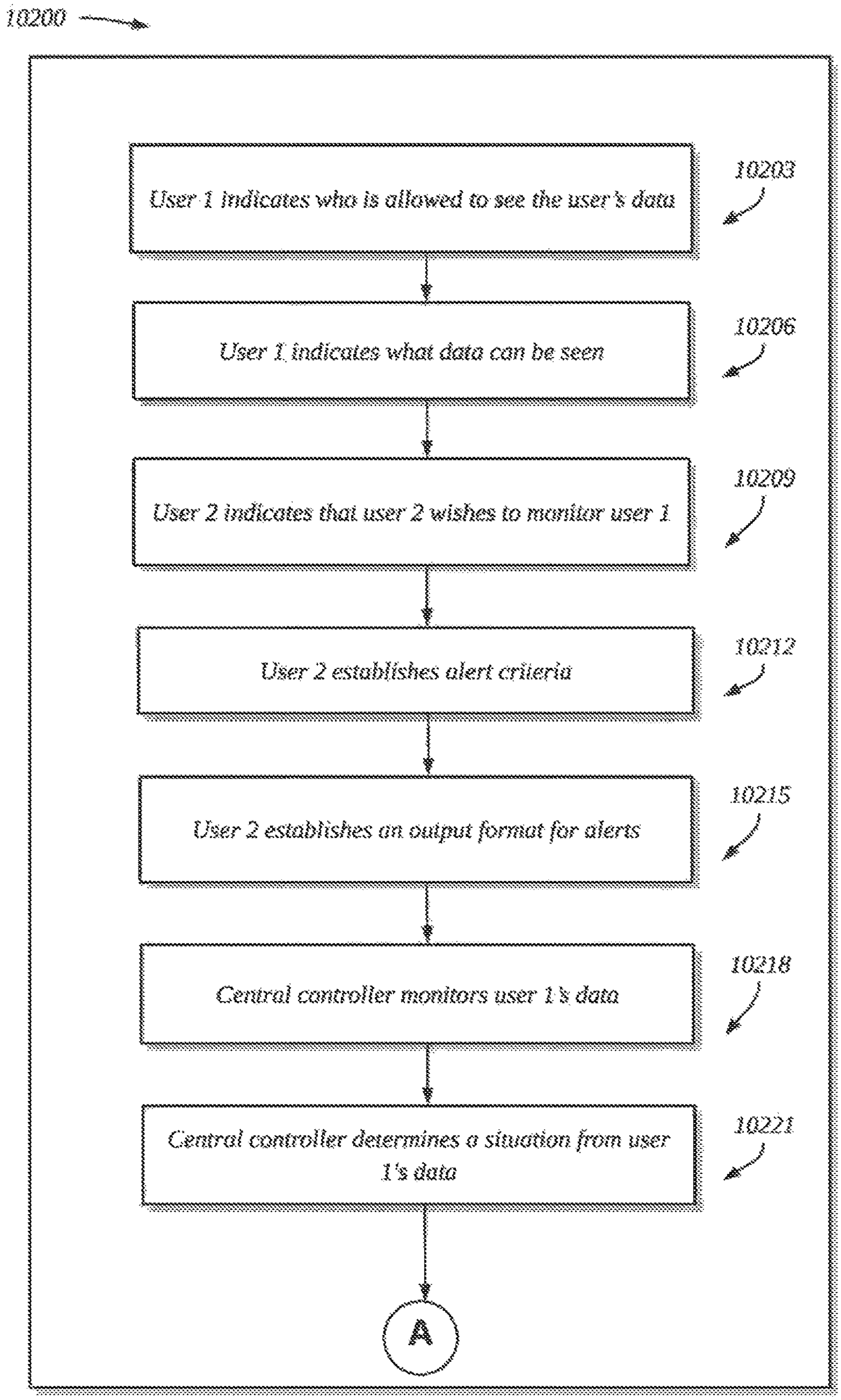
FIG. 102A and FIG. 102B, together show a diagram of a process flow consistent with at least some embodiments described herein.
Figure 102B:
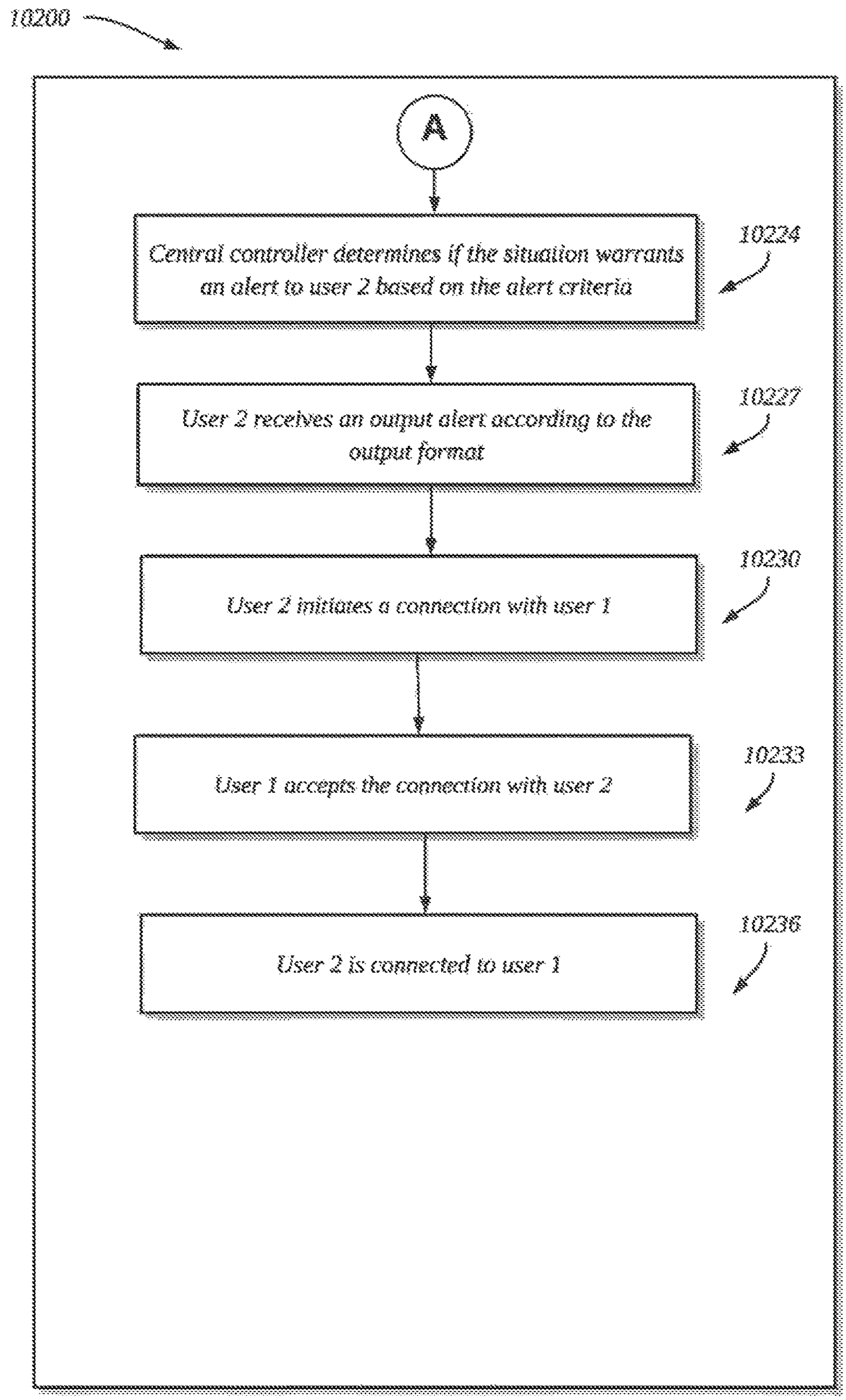

Referring now to FIG. 101, a flow diagram of a method 10100 according to some embodiments is shown. Method 10100 may be used to infer a user's activity and/or intention based on the user's actions and/or based on sensor data gathered from the user. As used in the illustrative example, method 10100 seeks to determine a user's activity with regards to a type of work the user is doing, and/or to determine the user's intention as to how long such activity will continue. If it is determined that the user's activity is "checking emails, reading, or handling other routine items", for example, then the user's activity may be communicated to another user (e.g., to the user's coworker), so that the other user may commence a meeting with the user. On the other hand, if it is determined that the user is engaged in purposeful work, then such activity may also be indicated to another user, but now with the purpose of tempering the other user's hopes of commencing a meeting with the first user.

It will be appreciated that the illustrative example represents some types of inferences, but that other types of inferences may also be performed, in various embodiments. For example, various embodiments may seek to infer a user's mood, a user's intended purchase, a type of game that a user would like to play, a type of video that a user would like to watch, or anything else.

In various embodiments, FIG. 101 may represent a decision tree, such as is used in machine learning and artificial intelligence applications. The terminal nodes, or leaf nodes in the decision tree may represent an inferred user activity and/or intention. Other nodes may branch in one direction or another based on the value of an input variable.

In the illustrative example depicted in FIG. 101, there are three input variables gathered from a user. These are: number of mouse movements in the last five minutes (represented by the variable "M"); number of clicks in the last five minutes (represented by the variable "C"); and heart rate (represented by the variable "H"). As will be appreciated, these represent exemplary inputs that may be gathered, and any other suitable inputs or combination of inputs may be used, in various embodiments. In various embodiments, other input variables may include: a number of keystrokes (e.g., at a keyboard); a number of mouse movements larger than five pixels; a number of turns of a mouse scroll wheel; a number of double clicks; a number of mouse drags; a number of different peripherals that have been used (e.g., 1 peripheral; e.g., 2 peripherals); a number of gestures made by the user (e.g., as detected by a camera); a number of words spoken by the user (e.g., as detected by a microphone); and/or any other input variables.

Also, data may be gathered or tallied over other time windows (e.g., over time windows greater than or less than five minutes). In various embodiments, a decision tree may use more or less than three input variables. In various embodiments, any suitable classification algorithm may be used aside from a decision tree (e.g., a support vector machine, random forest, neural network, etc.). In various embodiments, any suitable algorithm may be used to discern or infer user intent.

For the purposes of the present example, the variable M may be understood to represent any mouse movement, however great or small, that would be sufficient to register a change in an x or y coordinate of a mouse pointer, and which is delimited by a pause (i.e., lack of movement) lasting at least 0.1 seconds. For the purposes of the present example, the variable C may be understood to represent any mouse click, whether left, right, or middle. For the purposes of the present example, the variable H may be understood to represent the user's heart rate, in beats per minute, as measured over the preceding five-minute interval. However, as will be appreciated, any other suitable variable definitions could be used.

At block 10103, the values for variables M, C, and H are determined. Exemplary values might be 5, 11, and 77, respectively. The variable M is then compared to the predefined threshold of zero. If M is equal to zero, then it is inferred that the user is not present (block 10106). In other words, if there has been no mouse movement in the past five minutes, it may be inferred that the user is not present. Flow now stops (e.g., flow proceeds to "End" block 10136). If M is greater than 0, it is inferred that the user is present (block 10109).

At block 10109, M is compared to the predefined threshold of five. If M is less than five, it is inferred that the "User is checking emails, reading, or handling other routine items" (block 10112), and flow stops. If M is greater than or equal to five, it is inferred that the "User is engaged in purposeful activity", block 10115.

At block 10115, the variable H is compared to the predefined threshold of eighty. If H is less than eighty, it is inferred that the "User is working", and flow proceeds to block 10118. If M is greater than or equal to eighty, it is inferred that the "User is having a discussion", and flow proceeds to block 10121. In this example, a higher heart rate is assumed to correlate to the act of engaging in a discussion.

At block 10118, the variable C is compared to the predefined threshold of ten. If C is less than ten, it is inferred that the "User may be done with work soon" (block 10124), and flow stops. If C is greater than or equal to ten, it is inferred that the "User will probably be working for a while" (block 10127), and flow stops.

At block 10121, the variable C is compared to the predefined threshold of twenty. If C is less than twenty, it is inferred that the "User is having a conversation" (block 10130), and flow stops. If C is greater than or equal to twenty, it is inferred that the "User is working in a shared space" (block 10133), and flow stops. For example, if the user is in a shared workspace, the user may be making frequent mouse clicks as he alters elements of the workspace.

One or more actions may then be taken (e.g., by central controller 110), based on the outcome of the decision tree. For example, if it is determined that the user is checking emails, reading, or handling other routine items, a light on a second user's mouse may turn green, suggesting that the second user would likely be successful in commencing a meeting with the first user (e.g., should the second user decide to invite the first user). For example, if it is determined that the user is working but may be done with work soon, a yellow light on a second user's mouse may turn yellow, suggesting that the second user may be successful in commencing a meeting with the first user, at least if the second user waits a few more minutes. As will be appreciated, any suitable action may be taken resultant from an outcome of a decision tree.

Referring now to FIG. 102, a flow diagram of a method 10200 according to some embodiments is shown. Method 10200 may allow a user (user 2 in the present examples) to monitor the status and/or availability of other users (including user 1 in the present examples), so that user 2 may connect in some way with one of the monitored users (e.g., to initiate a meeting with the other user; e.g., to discuss the progress of a task with the other user; e.g., to play an online game together; e.g., to share in the experience of the other user; e.g., to exchange messages with the other user). In various embodiments, user 2 may see when another user is available (e.g., when user 1 is available), and may then invite the other user to a meeting. In various embodiments, user 2 may see when another user is available (e.g., when user 1 is available), and may then challenge the other user to a game. In various embodiments, user 2 may see that another user (e.g., user 1) is having an interesting experience (e.g., seeing a nice sunset; e.g., having a good performance in a video game; etc.) and may wish to share in the experience with the other user. In various embodiments, user 2 may see that another user is available to have a conversation and may wish to open up a dialogue with the other user.

At step 10203, user 1 indicates who is allowed to see the user's data. In various embodiments, a user's status or availability (e.g., user 1's status or availability) will be broadcast to other users (e.g., to coworkers of the user; e.g., to a supervisor of the user; e.g., to friends of the user). The user's status or availability may represent potentially sensitive information of the user. For example, a user's status information may indicate that the user is not home, sleeping, out of town, etc. As such, a user may wish to limit which other users may see information about the user's status or availability. In various embodiments, a user may indicate other users through a GUI.

In various embodiments, user 1 may indicate that another user (e.g., user 2) can see one type of data of user 1, and that still another user (e.g., user 3) can see another type of data of user 1. For example, user 2 is allowed to see when user 1 is available for a meeting, while user 3 is allowed to see if user 1 is home or not. In this way, for example, less sensitive data can be made available to a wider set of users, and more sensitive data (e.g., data about whether user 1 is home or not) can be restricted to a narrower set of users (e.g., to more trusted users).

At step 10206, user 1 indicates what data about the user can be seen. In various embodiments, data may include raw data, such as sensor readings, video footage, audio recordings, mouse movement data, etc. In various embodiments, data may include inferred, deduced, or conclusory data. For example, data may include an identity of an individual in user 1's home (e.g., as deduced from video footage in user 1's home). Data may include an activity the user is involved in (e.g., eating, working, watching TV, etc.). Data about a user's activity may also represent inferred data, since it may rely on interpretation of video footage, mouse movements, or other raw data inputs.

In various embodiments, data about user 1 may include peripheral usage data, such as mouse movements, keyboard strokes, head motions captured by a headset, etc. Such data may be stored in, and/or obtained from peripheral activity log table 2200.

In various embodiments, data about user 1 may include data obtained from sensors at user 1's peripheral device. Such data may be stored in, and/or obtained from peripheral sensing log table 2300. Data obtained from sensors may include a heart, a blood pressure, a skin conductivity, a metabolite level, and/or any other sensor data.

In various embodiments, data about user 1 may include user device usage data. Such data may be stored in, and/or obtained from user device state log table 2100. Data obtained about user device usage may include data about what applications a user was using, when the user was using such applications, what the user was doing with such applications (e.g., which websites the user was viewing using a browser; e.g., what type of document the user with editing using a word processing application), and/or any other user device usage data.

In various embodiments, data about user 1 may include data gathered from one or more devices (e.g., sensing devices; e.g., home automation devices; e.g., appliances) in the user's home. Such devices may include motion sensors, video cameras, thermal sensors, audio sensors, light sensors, and/or any other sensors. In various embodiments, data about user 1 may include data gathered from one or more home automation devices or appliances. For example, a thermostat may report data on when it was used, what settings it was placed at, when settings were changed, etc. As another example, a refrigerator may report when it was opened. As another example, a microwave oven may report when it was used and for how long. As another example, a closed circuit television camera may report video footage.

Data from home sensors and/or appliances may be stored in a table, such as in 'Home sensor and appliance logs' table 7500 of FIG. 75. With reference to FIG. 75, 'Appliance sensor reading ID' field 7502 may store an identifier (e.g., a unique identifier) of a reading or setting from a home sensor or appliance. Field 7504 may store an indication of a home sensor or appliance (e.g., an identifier or name for the appliance). Description field 7506 may store a description of the sensor, appliance, or component thereof (e.g., "refrigerator door"). Fields 7508 and 7510 may store, respectively, start and end times for when the reading was taken or received. Field 7512 may indicate the nature of the reading (e.g., that a door was opened). In various embodiments, field 7512 may store raw data, such as video footage from a camera.

User 1 may indicate what data can be seen by other users. The user may indicate what data can be seen by the central controller 110. The user may indicate, by user, or by group of users, which other users can see which items of data. For example, users in group A (e.g., a group as stored in user groups table 1500) can see raw motion sensor data from user 1's home. On the other hand, users in group B can only see inferred data about what room user 1 is in.

At step 10209 user 2 indicates that user 2 wishes to monitor user 1. User 2 may indicate that he wishes to monitor one or more other users as well. For example, user 2 may provide a list of friends that user 2 wishes to monitor. These may represent people with whom user 2 might wish to connect at some point (e.g., in order to play a game; e.g., in order to share an experience; etc.). As another example, user 2 may provide a list of co-workers that the user wishes to monitor. The user may wish to know when such coworkers are available, in case the user needs to talk to one of them.

In various embodiments, when user 2 indicates that he wishes to monitor user 1, the central controller 110 may verify that user 2 is among the people who are allowed to see user 1's data (e.g., as determined at step 10203; e.g., by verifying that user 2 is a member of a user group in table 1500 whose users are allowed to see user 1's data).

In various embodiments, user 2 may only wish to monitor user 1 at certain times of the day. For example, if user 1 is a coworker of user 2, then user 1 may only wish to monitor user 2 during working hours when user 1 might be available for a meeting. As another example, if user 1 is a prospective opponent of user 2 in an online video game, then user 1 may only wish to monitor user 2 during days or times when user 1 might want to play in a video game. Thus, for example, user 2 may wish to monitor user 1 only during evenings, because user 2 does not typically play video games in the mornings. On the other hand, user 2 may wish to make a different sort of connection with another user during the mornings (e.g., with a potential carpool buddy), and so user 2 may wish to monitor another user during the mornings.

Thus, in various embodiments, user 2 may specify not only another user that he wishes to monitor, but also dates and times during which user 2 wants to monitor the other user.

In various embodiments, user 2 may specify other circumstances for when he wishes to monitor user 1. For example, user 2 may specify that he only wishes to monitor user 1 when user 2 is in his office. As another example, user 2 may specify that he only wishes to monitor user 1 when user 2 is at home. For example, if user 2 only plays video games when he is at home, there may be little reason to monitor user 1 (a prospective video game opponent), when user 2 is not home. In various embodiments, user 2 may specify any suitable circumstances for when he wishes to monitor user 1 or any other user.

At step 10212 user 2 establishes alert criteria. Alert criteria may specify what data or situation about user 1 will trigger an alert to user 2. Example alert criteria may include one or more of: user 1 is in his office; user 1 is at the coffee machine; user 1 is home; user 1 has gone upstairs; user 1 has gone into a particular room (e.g., into the room in user 1's house where user 1 typically plays video games); user 1 has just finished working; user 1 has just woken up; another member of user 1's household has just left the house; another member of user 1's household has just entered the house; user 1 looks bored; user 1 laughs; user 1 begins speaking; user 1 has just finished a phone conversation; it has started raining in the locale of user 1; and/or any other criteria.

At step 10215 user 2 establishes an output format for alerts. In various embodiments, an output format may detail the manner in which the alert will be conveyed to user 2.

The output format may include what device, devices, and/or device components will convey an alert. For example, a particular light on a mouse will be used to convey the alert (e.g., the third light from the front on a mouse). In various embodiments, user 2 may configure his mouse (or other peripheral device) so that different components (e.g., different lights) on the mouse correspond to different users that user 2 is monitoring. Thus, for example, when a particular light on his mouse goes on, user 2 may recognize automatically that his friend Bruce Gonzales is now home and possibly available to play a video game.

In various embodiments, other components besides a light may convey an alert. An alert may be generated using a haptic generator, an audio speaker, a heat generator, a display screen, a motor, an electric current generator, etc. In various embodiments, alerts may be generated using components of a peripheral. In various embodiments, alerts may be generated using other devices. Other devices may include home alarms, televisions, cellular phones, phones, clock, smoke alarms, signage, digital picture frames, etc.

In various embodiments, an alert may be conveyed to a user via a user device (e.g., via a personal computer, tablet, etc.). For example, an app on a user device may flash a message to user 2 indicating that user 1 is at home in his gaming room.

In various embodiments, when user 2 establishes the output format of the alert, user 2 may specify the modality of the alert. The output format may include the modality of the alert. The modality may include one or more details about how the alert will be conveyed. Modality may include duration, intensity, and/or frequency of alert. For example, user 2 may specify that, as an alert, an LED light on his mouse will light up bright orange for 3 seconds, turn off for one second, light up bright orange for 3 seconds, turn off for 1 sec, and repeat the cycle for five minutes.

With respect to a light (e.g., an LED), an alert modality may specify a color, brightness, duration of turning on, duration of turning off, frequency of turning on and off, and any other pertinent parameter. A modality may specify that light is to alternate colors or cycle through colors.

In various embodiments, user 2 may establish different output formats corresponding to different users that user 2 is monitoring. For example, an LED light on user 2's mouse may show a blue light when user 2's friend Jack is available, and a purple light when user 2's friend Sam is available. In this way, for example the same component may be used to alert user 2 for multiple different monitored users.

With respect to a speaker or other audio generator, an alert modality may specify a frequency, a volume, a duration, or any other suitable parameter. In various embodiments, an alert may take the form of a pre-recorded audio message, song, jingle, or the like. For example, when user 2's friend Bob is available, a series of notes from a trumpet may play. When user 2's friend Suzy is available, a guitar riff may play.

Various embodiments contemplate that any other suitable modality may be used for presenting an alert.

At step 10218 the central controller 110 monitors user 1's data. The central controller may monitor data, readings, settings, usage statistics, etc. of any device, appliance or the like associated with user 1. The central controller may monitor readings from motion sensors, mouse movements, light levels, sounds, video footage, etc. The central controller may monitor use of a refrigerator, microwave, coffee maker, oven, stove, television, cable television, router, thermostat, window blind controller, etc.

In various embodiments, the central controller 110 monitors for the sounds of pets, sounds of doors opening or closing (e.g., room doors; e.g., a refrigerator door; e.g., a microwave door), the sound of footsteps, the sound of voices, the sound of a television, the sound of a phone conversation, or any other sound. For example, such sounds may allow the central controller to make an inference about user 1's availability to connect to user 2. For example, if the central controller detects the sound of a television, the central controller may infer that user 1 is engaging in leisure activities, and may therefore be available to connect with user 2 for an online video game.

In various embodiments, the central controller 110 may monitor Wi-Fi® signals within user 1's home. Wi-Fi® signals within a given location may change as a result of activity in the location. For example, a person walking between a Wi-Fi® source and a Wi-Fi® receiver may cause the strength of the received signal to temporarily change. It may thus be inferred that a person has walked past. Thus, in various embodiments, the central controller may use W-Fi® signals to infer the availability of user 1, and/or to infer any other aspect of user 1.

In various embodiments, the central controller 110 may monitor a medical device associated with user 1. Exemplary medical devices may include an electrocardiogram (EKG), heart monitor, glucose monitors, scales, skin patches, ultrasounds, etc. In various embodiments, the central controller 110 may monitor data from a health or exercise monitoring device (e.g., from a Fitbit®, treadmill, etc.).

In various embodiments, the central controller 110 may monitor data pertinent to user 1 that is not necessarily generated by user 1, or even generated at user 1's household. For example, knowing the location of user 1's house, the central controller may monitor the weather at user 1's location (e.g., using a public weather feed). In various embodiments, the central controller may monitor pollen count, the occurrence of local events (e.g., parades, softball games, etc.), traffic, crime statistics, or any other state of affairs that may impact user 1.

For example, if the central controller 110 determines that there is bad weather, or high pollen count in the vicinity of user 1, the central controller may infer that user one prefers to stay inside, and may thereby be potentially available to connect with user 2. On the other hand, if there is a local event going on, then the central controller may infer that user 1 may wish to go outside and attend the local event, and will therefore be unavailable to connect with user 2.

At step 10221 the central controller determines a situation from user 1's data. In various embodiments, using data gathered from or about user 1, the central controller 110 may infer, deduce, or otherwise determine a situation, a circumstance, an intent, and/or any other state of user 1. In various embodiments, the central controller may determine a current activity in which the user 1 is engaged (e.g., eating, sleeping, watching TV, playing a game, working, reading, speaking with a spouse, playing with children, doing chores, cooking, and/or any other activity). In various embodiments, the central controller may determine an intended activity of user 1 (e.g., an intention to eat, sleep, etc.). In various embodiments, the central controller may determine the state of user 1's environment (e.g. is user 1 hot, cold; e.g., is it noisy; e.g., is it rainy; e.g., is it bright outside). In various embodiments, the central controller may determine the state of user 1's health (e.g., is user 1 sick, injured, on medication, undergoing physical therapy, or in any other state of health). In various embodiments, the central controller may determine user 1's mood. In various embodiments, the central controller may determine user 1's location (e.g., room in the house; e.g., inside or outside the house; e.g., presence or absence from the house). In various embodiments, the central controller may determine any other aspect of user 1.

In various embodiments, user 1's mood may be determined from data from one or medical devices, such as from an EKG, galvanic skin response (GSR) sensor, electroencephalogram (EEG), heart rate monitor, skin temperature sensor, respiration sensor, or any other sensor. Baseline correlations between mood and sensor data may be determined by capturing sensor data at times when the mood is known (e.g., when it is known that a user is happy because of a recent win in a game) and/or when the mood can be determined through other means (e.g., through analysis of facial expressions). When recognized sensor readings subsequently appear, these sensor readings can be used to determine a mood through the established baseline correlations. For example, high heart rate and high skin conductivity may correlate to a stressed mood.

In various embodiments, the central controller 110 may determine an aspect of another member of user 1's household. For example, the central controller may determine what room user 1's spouse is in. Knowing the circumstances of other members of user 1's household may have a bearing on user 1's ability to connect with user 2. For example, if there is another member of user 1's household in the same room as user 1, it may be inferred that user 1 is paying attention to the other member of the household, and may be unavailable to connect with user 2.

The following are some methods for determining a situation of user 1. If a motion sensor in a particular room detects motion, it may be inferred that user 1 is in that room. If an appliance in a given room reports usage (e.g., if a light in a given room is turned on) then it may also be inferred that user 1 is in that room. If certain types of appliances report usage (e.g., microwaves, refrigerators, stoves, etc.), then it may be inferred that user 1 is engaged in cooking and/or eating. Usage of other appliances may represent other activities (e.g., usage of a washer, dryer, or iron may indicate that a user is doing laundry). If audio of user 1 is recorded, user 1's mood may be inferred from tone of voice, pace of speaking, heaviness of footsteps, etc. If video of user 1 is recorded, user 1's mood may be determined from facial expressions. Video may also be used to infer an activity in which user 1 is engaged (e.g., through classification of captured video frames using a machine learning algorithm). As will be appreciated many methods are contemplated for inferring user 1's situation (e.g., using various algorithms; e.g., using various decision rules; e.g., using various sensors; e.g., using various data).

In various embodiments, a situation, circumstance, or other aspect of user 1 may be determined using methods described with respect to process 10100 (FIG. 101). For example, based on received data about user 1, a decision tree (or any other suitable algorithm) may be used to discern or infer an intent (or other circumstance) of user 1.

In various embodiments, data about user 1 is received from one or of: (a) a peripheral device of user 1, (b) a sensor in range of user 1; (c) an appliance; (d) a third-party data source (e.g., a weather service); and/or from any other suitable source. Such data may be transmitted to and/or aggregated on a peripheral device of user 1. The peripheral device of user 1 may then determine a situation of user 1. In various embodiments, such data may be transmitted to and/or aggregated on a user device of user 1. The user device of user 1 may then determine a situation of user 1. In various embodiments, such data may be transmitted to and/or aggregated on a peripheral device of user 2. The peripheral device of user 2 may then determine a situation of user 1. In various embodiments, such data may be transmitted to and/or aggregated on a user device of user 2. The user device of user 2 may then determine a situation of user 1.

In various embodiments, two or more devices in cooperation may determine a situation of user 1. In various embodiments, peripheral and user devices of user 1 may, in combination, determine a situation of user 1. In various embodiments, peripheral and user devices of user 2 may, in combination, determine a situation of user 1.

In various embodiments, once a situation of user 1 has been determined, a tag may be generated based on the situation. The tag may be descriptive of the situation (e.g., the tag may indicate that user 1 is working, user 1 is in a meeting, user 1 is available, user 1 is bored, etc.). The tag may represent an evaluation based on the situation (e.g., user 1 is using too much jargon in a meeting; user 1 is too loud; there is no coffee left in a coffee machine; etc.). The tag may be responsive to a situation in any other fashion.

The tag may be communicated to user 1, such as via a peripheral device of user 1. For example, the tag may appear on a display screen of a mouse or keyboard belonging to user 1. In various embodiments, the tag may be communicated to user 2 (e.g., to user 1's coworker or supervisor), and/or to any other user. The tag may also be stored for further reference or analysis, such as in tagging database 7300.

At step 10224 the central controller 110 determines if user 1's situation warrants an alert to user 2 based on the alert criteria. For example, if user 2 requested an alert when user 1 is in user 1's gaming room, and the central controller determines that user 1 is in user 1's gaming room, then the central controller may determine that an alert to user 2 is warranted.

At step 10227 user 2 receives an output alert according to the output format. For example, if user 2 has requested that an alert take the form of a particular audio jingle played from his mouse, then user 2's mouse may now play the jingle.

At step 10230 user 2 initiates a connection with user 1. User 2 may request to connect with user one in various ways. User 2 may click a button or otherwise activate a component on his mouse or other peripheral device that corresponds to user one. For example, if a particular light on user 2's mouse has been activated (e.g., lit up) to indicate the availability of user 1, then user 2 may press a mouse button near to (e.g., closest to) that light in order to initiate a connection with user 1. In various embodiments, user 2's mouse (or other peripheral) may instruct user 2 to click or press a particular button (e.g., "i" on a keyboard; e.g., the right mouse button) to initiate a connection. The connection may initiate, by default, with the other user who has triggered the most recent alert.

In various embodiments, user 2 may access a list of other users he is monitoring (e.g., available users he is monitoring), and select one such user (e.g., user 1) with whom to initiate a connection.

In various embodiments, a connection may be initiated automatically on behalf of user 2, such as when user 2 receives an alert related to user 1.

Various embodiments contemplate any other suitable method by which user 2 may initiate a connection with user 1.

At step 10233 user 1 accepts the connection with user 2. In various embodiments, user 1 receives a request to connect with user 2. For example, user 1 may receive a message on his mouse or other peripheral device. Use 1 may be asked to press a button or key, move his mouse, or take any other suitable action in order to accept the connection request from user 2.

In various embodiments, a connection may be initiated automatically between user 1 and user 2 even without an explicit acceptance on the part of user 1. Various embodiments contemplate any other suitable method by which user 1 may accept a connection with user 2.

At step 10236 user 2 is connected to user 1. In various embodiments, once connected, a peripheral device of user 2 may reflect (e.g., replicate; e.g., illustrate; e.g., represent) some aspect of the environment of user 1. A peripheral device of user 2 may reflect the local weather in the vicinity of user 1. For example, if it is raining at user 1's location, user 2's mouse may rumble to reflect the patterning of rain on a rooftop. If the sun is setting at user 1's location (e.g., user 1 and user 2 may be in different time zones), then user 2's mouse may turn orange and pink to represent the sunset. User 2's mouse may show an image or video of the sunset (e.g., as captured by a camera at user 1's house). User 2's mouse may show a rendering or animation of the sunset. In various embodiments, any representation of the weather at user 1's location may be shown on user 2's mouse (or other peripheral device).

As another example, if there are sounds at user 1's location (e.g., the sound of a dog barking; e.g., the sound of children laughing), then user 2's peripheral device may reflect the sounds, such as by outputting the sounds from a speaker in user 2's peripheral device. As another example, if it is hot at user 1's location, a heating element in user 2's mouse may activate and thereby allow user 2 to feel heat as well.

In various embodiments, if it is windy at user 1's location, then user 2's peripheral device may show (e.g., output on a display device) imagery evocative of the wind. Such imagery may include leaves being carried around in the wind, tree swaying, grass bending, an animal's fur being blown about, sand being stirred up, etc.

In various embodiments, once connected, a peripheral device of user 2 may reflect some aspect of user 1's vital signs. User 2's peripheral device may reflect a heartbeat of user 1. User 2's peripheral device may reflect the breathing of user 1.

In various embodiments, once connected, a peripheral device of user 2 may reflect some aspect of user 1's mood. User 2's peripheral device may reflect an anxiety level, confusion level, or any other aspect of user 1's mood. Other moods that may be reflected may include excitement, happiness, sadness, frustration, or any other mood.

In various embodiments, user 1's mood may be reflected using imagery, such as an emoji representative of the mood being depicted. For example, if user 1 is anxious, then an emoji with teeth chattering may be depicted on user 2's mouse. Mood may be reflected using color. For example, anger can be depicted using progressively darker shades of red (e.g., for progressively increasing anger levels). Mood may be reflected using text. For example, user 2's mouse may show the text, "Jack is confused" (e.g., if user 1's name is Jack). As another example, a series of question marks may also represent confusion on the part of user 1.

One Player Effects Another Player's Peripherals

One of the advantages of connecting peripherals from one player to another is that the peripherals can be used to make a gameplay session feel more connected, and allow for greater creativity in how players interact with each other. Such enhanced connections can occur before a game, during a game, or after a game—and some aspects of the communication can last until an event happens (like losing a game) or even be more permanent.

Various embodiments allow one user to control aspects of another user's game characters, game environments, or even the peripherals of the other user.

In various embodiments, a user is able to control elements of a second user's game character. For example, a first user might win a contest with the second user and earn the right to make an alteration to the second user's game character. The game controller could send a list of three potential game character changes to the first user's mouse display area. For example, the first user might see "1) make character look like a baby; 2) make character look like a rabbit; 3) make character have big ears".

In various embodiments, a user is able to control elements of another user's game environment. For example, a first user could direct that a sign be put up in the second user's game environment mentioning what a skilled player the first user is.

In various embodiments, changes could be made to the room environment of a second user, such as by directing the second user's user device to project an image onto the wall of the room in which the second user was sitting.

In various embodiments, a user is able to control peripherals of a second user.

In various embodiments, a first user can make changes to the mouse of a second user, such as by enabling a light to be lit green for the next ten minutes on the mouse of the second user.

In various embodiments, a first user can make changes to the keyboard of a second user. A first user could change the backlighting of the keyboard of a second user in a way that spells out words to the second user one letter at a time.

By allowing for communications between peripherals, the central controller can facilitate many cooperative and supporting behaviors between players. Such cooperation can enhance feelings of camaraderie during gameplay and make the human connection between players felt more strongly, even with remote players thousands of miles away.

At the end of a game, the central controller may facilitate such behaviors as shaking hands, patting each other on the back, nodding and/or smiling, allowing one player to place a dunce cap on another player, or any other behavior.

In various embodiments, the central controller may facilitate shaking hands.

Once play is complete (or a meeting is complete), individuals could select an on-screen player (meeting participant), press a button on the device to cause a vibration, color or slight movement (simulating the feel of a handshake) of the other person's mouse, indicating that a handshake is in order. The corresponding player (or meeting participant) could acknowledge this and perform a corresponding action on their device to reciprocate the gesture.

The device could also interface with the game and allow a player to select another player, invoke the handshake and the avatar simulate the handshake with the other player.

The device skin could change to show an outreached hand, simulating a handshake. The other person could reciprocate and when their device is invoked, both device skins could move (or render movement) simultaneously to simulate a handshake.

In various embodiments, the central controller may facilitate having players pat each other on the back.

Once play is complete (or a meeting is complete), individuals could select an on-screen player (meeting participant), press a button on the device or use the force sensor to cause a vibration, color or rapid pulse movement (simulating the feel of a pat on the back) on the other person's mouse, indicating a pat on the back. The corresponding player (or meeting participant) could acknowledge this and perform a corresponding action on their device to reciprocate the gesture.

The device could also interface with the game and allow a player to select another player, invoke the pat on the back action and the avatar simulate the pat on the other player.

The device skin could change to show an outreached hand, simulating a pat on the back. The other person could reciprocate and when their device is invoked, both device skins could move (or render movement) simultaneously to simulate a pat on the back.

In various embodiments, the central controller may facilitate having players nod and smile before exiting.

Once play is complete (or a meeting is complete), individuals could select an on-screen player (meeting participant), press a button on the device to cause a vibration, color (yellow representing a happy emotion) or slow/calming pulse movement in the device, indicating nod or smile. The corresponding player (or meeting participant) could acknowledge this and perform a corresponding action on their device to reciprocate the gesture.

The device could also interface with the game and allow a player to select another player to provide a response. The avatar could change and display a nod or smile to the other player(s).

The device skin could change to show a smiley face or a head that is nodding. The other person could reciprocate and when their device is invoked, both device skins could simultaneously move (or render movement) to show each are smiling or nodding.

Each player could also simply hit a button on the device which invokes an emoji on the screen representing a smile or nod.

In various embodiments, the central controller may facilitate having one player place a dunce cap upon the other player.

Once play is complete, and a game is lost, individuals could select the player that lost on screen, press a button on the device to cause a dunce cap to be placed on the head of the losing player.

The device skin for the losing player could change to show a dunce cap. Participants in the game could select the losing player's avatar and place a unique dunce cap on them.

Each player could also simply hit a button on the device which invokes an emoji on the screen representing a dunce cap.

During a game, the central controller may facilitate such behaviors as indicating visual alignment, sharing positive verbal messages, and having other observers cheer players (e.g. voice overlay, text, images).

In various embodiments, the central controller may facilitate having players indicate visual alignment.

There may be times in a game (or meeting) where individuals want to demonstrate alignment using a visual cue and not a verbal remark for others to hear. For example, during a game, if a teammate is wanting to go to the left to search for the enemy, but does not want this to be made known to anyone else in the game, they can select the players to provide visual cues. The device is used to select a button/key and provide a pulsing color/vibration (or other visual cue, or other cue) to the selected player. If the player agrees, they select a button/key on the device and this is sent to the requesting players. The visual cue changes indicating acceptance. If they do not agree, the requesting player's color changes to a solid red color. The responses are displayed for a brief period of time before resetting.

The skins on the device can change indicating a need for alignment. For example, a person leading a meeting may need to get alignment on an issue after a discussion. Instead of verbally polling everyone, they simply invoke a button on their device, and each participant's device displays a thumbs up icon on the screen. If they agree, the participants press a corresponding button to accept or reject the alignment item.

In various embodiments, the central controller may facilitate the sharing of positive verbal messages.

The device could be used to deliver pre-recorded or unique messages to other game players or meeting participants. For example, if a person makes a good move in a game (or positive contribution in a meeting), the team players could select a device button/key that delivers a verbal message to the player either pre-recorded or recorded in real-time using the device. This could be in the form of a textual message (e.g. 'good job', 'great move') displayed only for the game character, displayed for all other players to see or an actual verbal message heard by the player in their headset.

In various embodiments, the central controller may facilitate having other observers cheer players (voice overlay, text, images, etc.).

The device could be used to deliver pre-recorded or unique messages to other game players from observers/virtual audience members. For example, if a person makes a good move in a game, the team players could select a device button/key that delivers a verbal message to the player either pre-recorded or recorded in real-time using the device. This could be in the form of a textual message (e.g. 'good job', 'great move') displayed only for the game character, displayed for all other players to see or an actual verbal message heard by the player in their headset.

Observers could use the device to display images and text to the player (meeting participants). For example, if someone contributes an innovative idea in a meeting, other participants could use their device to provide on-screen text or video saying, 'great idea' or send a device skin to the person showing an image of hands clapping.

Various embodiments contemplate audio cheering (such as in a game or by a third party not directly participating in a game). During a game, a player could send an audio message to another player or team cheering them on using a mouse or keyboard. Also, if a device owner is not engaged in the game (third party observer), they can still use their mouse-keyboard to send an audio cheer to an individual player or team. The device could also be used in a business context to cheer/motivate employees.

In various embodiments, the central controller may facilitate flirting. On social sites (e.g., dating sites, Facebook®, Twitter®) and in communication between individuals, a user could deliver flirting actions to another person using peripheral devices. In various embodiments, if a person wishes to give a wink, the receiving participant's device color flashes briefly and/or the device skin shows an eye winking. The receiving participant can elect to reciprocate, ignore or block the flirting by selecting a corresponding button/key on the device.

In various embodiments, if a person wishes to give a smile, the receiving participant's mouse color displays color and gets brighter or a skin is shown with a smiley face. The receiving participant can elect to reciprocate, ignore or block the flirting by selecting a corresponding button/key on the device.

In various embodiments, if a person wishes to give a kiss gesture, the receiving participant's mouse displays a hot red or the skin is shown with a pair of lips. The receiving participant can elect to reciprocate, ignore or block the flirting by selecting a corresponding button/key on the device.

In various embodiments, if a person wishes to pass a note/message, the receiving participant receives an alert on his mouse to check messages. A private message may be sent to an individual. The originator can record a message using the device or send a brief written message to the individual. The receiver's device could display a color to indicate they need to check their email message for a response. The skin on the receiver's device could change to display an envelope on the device as a reminder to check their messages. A brief text message could display on the device (e.g., 'meet me at 6 pm'). The receiver can confirm/reject by selecting a button/key on the device and have the sender notified on their device.

In various embodiments, if a person wishes to brush someone casually, the receiving participant's device could vibrate or change color indicating someone is wanting to meet them. In some embodiments, the shape of the keyboard could change based on another user indicating they are brushing up against you to get your attention. In some embodiments, the firmness of a key could change. For example, if a user wants to casually connect via brushing against you, the "E" on the keyboard could become significantly easier to press, thus getting your attention.

In various embodiments, one or more users may engage in a dance routine. In various embodiments, a multicolored display on a device may facilitate a dance routine.

Dancing is oftentimes a community activity. In various embodiments, peripheral devices can facilitate this. Those wanting to participate in dancing can modify the colors on their mouse and keyboard to be synchronized with the music and displayed for others to see.

In various embodiments, a peripheral device may feature a dance move as an image or "skin" of the device. If a user wants to display a dance move to others, they could select a dance move and have a static image displayed on their peripheral device or projected to another user's peripheral device. In addition to a static image, the display screen on the device could also display a video showing the dance move.

In various embodiments, a device may assist in showing or broadcasting a celebration dance. If a participant wins a game, they could use their device to select and show a winning dance to others. This could be in the form of displaying colors, presenting a dancing avatar or changing the skin of others to show a dance move in celebration of a win.

In various embodiments, a device may show, broadcast, or simulate laughter. In various embodiments, a device pulses to simulate a laugh. During a game/meeting, if an individual wants to show they are laughing without being heard, they could select a key/click combination on the selected devices of other users to begin the pulsating.

In various embodiments, a device color changes to represent a laugh. During a game/meeting, if an individual wants to show they are laughing without being heard, they could select a key/click combination on the selected devices of others and a color(s) display representing a laugh.

In various embodiments, a device skin changes showing a laughing face. During a game/meeting, if an individual wants to show they are laughing without being heard, they could select a key/click combination on the selected devices of other users to show a laughing face.

In various embodiments, an avatar changes to show someone laughing. During a game, if an individual wants to show they are laughing without being heard, they could select a key/click combination on the selected devices of others to make their avatar laugh.

In various embodiments, a peripheral device may facilitate praise. Using a peripheral device, a message could be displayed above the character and who sent it. The sending player selects the receiving player, the message and uses a button/key on the device to send. In comparison, this same approach could be used in a business setting for meeting participants.

In various embodiments, a specific quality is recognized in a person. For example, the phrase "good team player" is displayed above the player in the game or shown on the device skin.

In various embodiments, a specific skill is recognized in a person. For example, the phrase "great accuracy in shooting" is displayed above the player in the game or shown on the device skin.

Boasting

Part of gameplay often includes an element of playful boasting when one player defeats another player. This is normally good natured, and can enhance the competitive spirit of the players and spur greater efforts in improvement before returning to battle with greater skills next time. The device can be used to send and receive messages, images, colors and movement representing the various actions below.

A taunt may be brought about in various ways. When one player defeats another player in a game, the losing player may suffer one or more of the following taunts: (1) his game character shrinks in size; (2) he loses a weapon; (3) he starts to cry; (4) he has to bow to the winner; (5) his face gets distorted; (6) he gains weight; (7) he loses weight and becomes scrawny; (8) his mouse is less responsive for a period of time; (9) his Zoom background is swapped for something of the winning player's choosing.

In various embodiments, when one player defeats another, the winning player's name is displayed on the losing player's mouse or keyboard (e.g., the keys of the winning player's first name rise up and cannot be used for 60 seconds). In various embodiments, something is projected onto the walls behind the losing player, like a skull and crossbones.

In various embodiments, a player may engage in trolling behavior. Such a player may seek to annoy or get a rise out of another player. In various embodiments, a player can clip something, add text or filters, and send it to the opponent. A player may cause an opponent's mouse to play classical music (or any other music type, or any other music). In various embodiments, a player's character may be placed in various locations in the game for the opponent to discover. In various embodiments, a player's character is allowed to follow an opponent's character. In various embodiments, a player is notified when a previous opponent is playing a game in order to join them in the same game. In various embodiments, a player can send short videos to another user's display device. In various embodiments, a player is able to control the movement or vibration of another person's mouse-keyboard.

In various embodiments, a player may engage in bullying behavior. In various embodiments, this type of behavior is permitted as part of the game. In various embodiments, while the behavior may be permitted, there may be efforts to identify and call out bullies.

In various embodiments, a player may get a virtual bully cap on their character. A player's audio channel or character may get a silly voice. In various embodiments, signs with taunting messages may appear in game (e.g., one player causes such signs to appear). In various embodiments, a player is permitted to 'trash talk' players and their skill or appearance. In various embodiments, a character's appearance changes to show the associated player as a bully for all to see and react. In various embodiments, a player's device begins to move or vibrate for a brief period of time (e.g., if such a player is being bullied). In various embodiments, a player's key functions are manipulated by an opposing player to disrupt their play briefly. These may be changing function or force, making it more difficult/easy to press a key.

Intentional Poor Performance

There are times in games that alternative objectives are being pursued by a player. For example, a player is trying to sabotage himself and/or his team. For example, the player is purposefully performing poorly. These behaviors can be made known to others in the game using peripheral devices.

In various embodiments, a player's character slows in movement in an exaggerated way. The user is able to select clicks/buttons to control the avatar movement indicating they are not playing.

In various embodiments, a player's game skill (shooting, running, throwing, etc.) is reduced significantly. Other player devices could display the reduced accuracy of the player via changing colors, text on their respective displays or movement of their respective devices.

In various embodiments, text is presented to others that a player is not playing their best game, on purpose.

In various embodiments, text or images are presented to a player's team's display indicating the player's performance is degraded or the player is no longer playing to win.

In various embodiments, another player is able to control the use of the self-sabotaging player's device so they are not able to use it for a period of time, and cannot thereby cause the team to lose.

One Player Controls Another Player's Game Character

There are times in a game when one player may want to control another player's character using functions of a peripheral device, such as through buttons, clicks or movements.

In various embodiments, a first player could cause a second player's character to lie on the ground and take a nap on the ground. The first player could accomplish this by selecting the character and lifting the mouse to force the character to drop to the ground.

In various embodiments, a user could select a character and continually send messages not related to the game to display above the character, in the audio of others, or in visual display devices.

In various embodiments, text, images, colors or device movement is presented to other players indicating that a given player is not playing his best game or not playing to win. In this case, the other players could use the device to immobilize the given player's character.

In various embodiments, the user could select a character and remove weapons or game attributes using the peripheral device. This may reduce the chance that the character's poor performance would hinder the team or allow an opposing player to gain an advantage.

Sharing Information

In various embodiments, it may be desirable to share information, such as a team logo, team flag, updates, minutes from most recent strategy sessions, etc. There are times in business settings that information needs to be shared quickly with people and using peripheral devices can facilitate this type of communication.

In embodiments involving a team logo or flag, the device could allow for members of a team to have a color, pattern, image or text to indicate the particular team they are associated with.

Various embodiments involved grouping employees. In certain business settings it is important to group individuals for tasks to complete. This is often done by self-selection.

The meeting owner or lead could use enabled devices to group people automatically by color, image or text. Large groups of people could be grouped by having five mouse-keyboards light up red, five others light up yellow and five others light up blue. Likewise, the images on the device could each be different allowing another way to group individuals in smaller teams.

Various embodiments involve announcements. In various embodiments, employees and teams need and/or want to be kept informed. For example, the new CIO has selected a person for a promotion. This information could be quickly shared with people through peripheral devices by displaying the name, announcement or color. Another example may be in the case of important decisions. If a decision is made that impacts a team, instead of sending emails and waiting for people to see it, the sender of the announcement could send the information directly to the peripheral devices. The peripheral devices may each then show an image, text or color representing a signal for the peripheral device owners to check their email. This process may have advantages over texting, since with texting it is often cumbersome to obtain all phone numbers for large groups, and texting may also generate group chatter.

Various embodiments involve bringing all hands on deck. In cases where immediate action is necessary, emails and texts may be delayed, whereas peripheral devices can deliver quick information for action. For example, if a significant IT outage takes place, a message in the form of text, visual image, vibration or color can be sent to needed participants indicating there is a need to resolve the outage. The participants can respond immediately, affirming that they received the message using their peripheral devices.

In various embodiments, a user may shame or embarrass their own teammates or opponents. In such cases, an opponent's character may turn red; an opponent's character may change posture (e.g., with head turned down, with slouching, etc.); an opponent's character may provide blank stares to others; a skin on a device may change to match a character; an opponent's device color can change to red to show embarrassment; the force on the opponent's peripheral device lessens to indicate a collapse of the character; or any other indicator of embarrassment, or any other indicator may be put into effect.

Do Not Disturb

In various embodiments, a user may indicate that he wants no interaction, wants to be left alone, does not want to be disturbed, or any similar sentiment. In various embodiments, a user's avatar indicates this sentiment via a new color or persona, such as a bubble placed around them, which may be triggered by a peripheral device. In various embodiments, a user's avatar freezes and accepts no message or interaction.

Asking for Help

In various embodiments, a user wishes to ask for help. In various embodiments, the user may create an SOS alert. In various embodiments, there may be a physical, real world emergency and the player would like to let others know.

In various embodiments, a player/participant initiates a message (visual image, message, vibration or color) using the device to indicate help is needed.

In various embodiments, if a player's mood is declining or the player is depressed, the player may seek help from others via the device. In various embodiments, biometric data can be used to ascertain changes in a player's mood, and, if needed, may automatically send alerts to other users' devices.

In various embodiments, skins of opponents' or other players' devices display '9-1-1' messages with the name of the distressed player. In various embodiments, opponents' or other players' devices initiate 9-1-1 alerts. In various embodiments, on-screen messages are displayed to players to refocus attention on the emergency. In various embodiments, other players and opponents can change the appearance of a player's device indicating a medical image. In various embodiments, sensory data collected from the device indicates a physical problem and alerts others.

In various embodiments, a user may express his feelings towards interacting with others, such as to receiving taunts or to delivering taunts. The player may no longer want this type of interaction and may use a device to indicate this sentiment to others (e.g., via color, skin image or device motion). In various embodiments, the player may set his device to block taunts.

In various embodiments, a player may wish that other characters keep a certain distance away from the player's character. If other characters do not keep such a distance, the player may feel that the other characters are in the player's space. A character may then be asked to move away from their opponent (e.g., from a character whose space they are occupying). In various embodiments, a character is given a force field so others cannot get within a certain distance.

In various embodiments, a player may desire help from a competitive standpoint (e.g., help at achieving a goal in a game). A player's character may need backup in a game from teammates. A player may need advice in a game to accomplish a goal. In various embodiments, help may be solicited through changing colors, changing skins, or through any other mechanism applied to another player's peripheral device.

In various embodiments, a device's color can change indicating game play is correct after receiving input. In various embodiments, a device may display text or image indicating a player is close to completing the game or overtaking the opponent.

In various embodiments, a player may desire cooperative or coordinating help from other players. A player's character may need backup in a game from teammates. The player's device may then display text to others with information about the game and where the player needs assistance. In various embodiments, a player's character needs advice in a game to accomplish a goal. Other players can send text or image assistance to complete the game. In various embodiments, sensor data collected can be used to provide assistance. If EKG or galvanic information indicates stress, other players are notified and may offer their assistance in the game (or meeting).

Game or Other Players can Change the Performance of Your Inputs Devices

In various embodiments, occurrences in a game, or instructions by other players may cause changes in the performance of a given player's device. Such changes may include: slowing a mouse velocity; adjusting the pressure on the mouse or keys required to invoke action on the device; altering or swapping the actions accomplished on a device by particular buttons or keys (e.g., the functions of the left mouse button and the right mouse button are swapped); randomly displaying colors and patterns on the device to distract a player or get their attention (as with a meeting participant); changing audio input by adding static, decreasing/increasing volume, adding random noises (e.g., animal noises, children, vehicle sounds, nature sounds, etc.); disabling button/key actions on a peripheral device (or any other device), or any other changes. Disabling button/key action on a device may include disabling the ability to fire a weapon or vote on a decision in a meeting for a period of time.

In various embodiments, a device may project a visual into a room or behind a player. The visual may show: a map of a game; in-game movements of one or more other players (e.g., of all players); banner of awards; messages; (e.g., text and pictures); colors, such as colors representing game intensity; player images; game title; and advertisements. In the context of a meeting, a device may project such visuals as meeting agendas, presentations, list of ideas, decisions, participant lists, to-do lists, and a virtual desktop.

Visual Customization and "Skins" for Education and Business

Various embodiments have applications in the world of business and education. For example, there are many ways in which a user's mouse or keyboard could be used to display performance indications, status, levels, ratings, etc.

Almost all companies offer awards to high performing employees or teams—such as public recognition at town hall meetings, or written praise in a company internal newsletter. In various embodiments, indications of employee achievements could be displayed on an employee's mouse. For example, when a user is designated as "Employee of the Month for June," those words could be transmitted to the employee's mouse and shown on a display screen for the entire month. Instead of displaying the words, the mouse could also be enabled to display a signature color which indicates that the employee was currently Employee of the Month (similar to the yellow jersey for the leader of the Tour de France). This would allow someone walking by the cube or office of the Employee of the Month to immediately see that status level, and it would be a psychological boost to the awardee while working at their desk. The employee's keyboard could also be configured to display an insignia reflecting that they are the current Employee of the Month, such as by enabling a special color backlight for the keys. Such an employee could bring the mouse and/or keyboard to meetings where other employees would have a chance to see the visual designations of the Employee of the Month status.

The employee's mouse could also display key metrics that are important for the employee to be aware of. For example, the employee's mouse could display a time signal indicating how long the employee had been working without a break. The keyboard could also make the keys harder to press as the length of time without a break increased. After a designated amount of time without a break, such as two hours, the keyboard itself could stop processing the employee's inputs until a break of at least ten minutes was taken.

The employee's mouse could also be enabled to show an indication that an employee was not engaged with work or was spending a large amount of time on websites or applications unrelated to work. For example, an insignia could appear on the mouse when the employee spent less than 50% of their time in the last hour using an application other than Microsoft® Word, Excel®, or PowerPoint®. The keyboard keys could also be made more difficult to depress when the employee was using particular websites.

Employers worry if remote workers are capable of functioning at a high level. They might be worried, for example, that remote workers are drinking alcohol during work hours. An AI module could be trained to determine whether employees are functioning within normal performance parameters. Such a module could be trained, for example, using a device owners' "fist," or their keystroke cadence, level of typing mistakes, and other aspects of typing that together create a pattern of baseline typing performance. An AI module could also be trained using biometric data from the device.

Notifications could also be done through a mouse or keyboard. For example, an employee's mouse could flash as a ten minute warning that a meeting was about to begin. Similarly, the keyboard backlighting could be made to flash when a meeting was fifteen minutes from the designated ending time.

In an educational context, teachers could create rewards for students such as virtual "stickers" or gold stars that can be displayed on a student's mouse. For example, a student might get a special Platinum Star when they finish reading ten books, with the Platinum Star being visible on the student's mouse. In another embodiment, the student's computer camera could display the Platinum Star in the upper right corner of any school video learning session for all call participants to see.

In a business meeting embodiment, the mouse display area could display a red color if the user is of a particular business group, such as a software developer. Alternatively, the mood of meeting participants could be reflected in the color of the keyboard backlights of their laptop computers in a meeting.

Social Devices for Education and Learning

Education, courses, training, examinations and other forms of learning increasingly use software, take place in digital environments or over videoconferencing, or utilize telepresence technologies. The devices according to various embodiments could enable improved measurement and feedback of learning and teaching outcomes, as well as provide coaching to students and teachers.

The devices could be used for verification of student identity and ensuring integrity for teaching, courses, and online examinations. Verifying that the correct individual is taking an exam and ensuring that individuals don't cut, copy, or paste material from outside of the exam into the exam software are challenges to replacing in-person exams with online exams. The devices could utilize biometric sensors or stored identity information to verify that the individual using the input device is the individual supposed to be taking the exam. Additionally, the device or central controller could lock functionality to cut, copy, or paste exam material into exams, or limit the ability to access non-exam software.

Devices according to various embodiments could be used for detecting plagiarism and other forms of cheating through one or more means. The devices could transmit a record of mouse clicks or a key log to the central controller, which would permit the automated comparison of the text of an assignment, paper, or exam against the input log. Additionally, an AI module could be trained based upon the inputs of the device that classify whether a given body of text was likely to have been produced by the device owner through classification of device owners' "fist" or unique cadence of keystrokes.

During classes, training, or exams, the central controller could detect whether the device owner is utilizing non-education software or whether the device owner is present in front of the computing device. The central controller could prompt the device owner to return to the educational software or could lock the functionality of the devices for non-education purposes during classes; until a task, assignment, or homework has been completed; or until the teacher permits a class break.

The devices could provide a real time measure of student engagement through an AI module that is trained using the devices inputs, such as biometric sensors. Using galvanic skin responses, heart rate or other biometric data, this AI module could detect whether the student is excited, apathetic, confused, stressed, or having some other emotional response to the learning material. Both level and type of engagement could be provided to either the student or the instructor through the visual output of the devices or through other means.

Such an AI module might be utilized in many ways. For example, an AI module could provide coaching to students about material they find difficult or frustrating. Or an AI module could detect material students find stimulating and give supplemental or additional course material. Additionally, an AI module could measure over time the effectiveness of different teaching strategies for teachers. The AI module could prompt teachers to alter ineffective teaching strategies, reinforce effective teaching strategies, or individualize strategies to different types of students. The AI module could track over time student responses to similar material to measure learning outcomes or to enable improved material presentation. An AI module could choose among multiple versions of teaching material to individualize learning to an individual student by dynamically matching versions with a student's learning history, or the module could offer another version if the AI module detects that student is not learning from a particular version.

The devices could be used to train an AI module that predicts the difficulty of learning material and would allow a teacher or educational software to "dial in" the difficulty of learning material to individualize learning content—either to decrease difficulty or increase difficulty.

The devices could be used to train an AI module that combines device inputs and sensor inputs to ascertain whether documents, presentations, or other material are challenging to read or comprehend. Such an AI module could be used to create an automated comprehension tool akin to "spell check" or "grammar check" that would prompt users of the comprehensibility of the document, presentation, or other material and suggest improvements.

The device could facilitate collaboration of multiple users by allowing individuals to quickly find where others' cursor or text input is located in a shared document, presentation, or other file. The device could communicate to the central controller whether an individual cursor or text input within a software program is located and then share that location with another user's computer. For example, the present system knows where an individual's cursor is located in a document, allowing another user to say "Take me there" and the other user's mouse cursor is taken to the same location.

The outputs of the devices according to various embodiments could be utilized for providing feedback to students in the form of visual, tactile, or audio feedback. These feedback can be controlled by the teacher, the central controller, the game or software controller, or an AI module. For example, a student could receive feedback, in the form of visual, vibration, or temperature changes, after they input an answer to the question. The teacher, software, central controller, or AI module could identify whether the question is correct and output a visual signal if correct (e.g., "yes", "thumbs up,").

Peripherals to Improve Onboarding, Software Training and Help Functions

Software users face the challenge of learning to control the functionality of software—whether as new users who are on-boarding or existing users seeking to improve their functional experience. The present devices allow for game or software creators to improve onboarding, learning tutorials, and help functions.

Referring now to FIG. 100, a flow diagram of a method 10000 according to some embodiments is shown. In various embodiments, method 10000 may be used to train a user to accomplish a task. Method 10000 may be used to train a user to accomplish a task using a peripheral device. Method 10000 may be implemented by a peripheral device (e.g., peripheral device 107*a*), by a user device (e.g., by user device 106*b*; e.g., by a user device in communication with a peripheral device), by central controller 110, and/or by any other suitable combination of devices. For the purposes of the present example, user device 106*b* will implement the method while in communication with peripheral device 107*a*. However, it will be understood that the method need not only apply to this device combination.

At step 10003, user device 106*b* determines a task to accomplish. In some cases, a user may explicitly ask for help with accomplishing some task (e.g., with performing a mail-merge; e.g., with utilizing a particular attack sequence in a game). In some cases, a task may be predetermined as part of a lesson plan and/or a tutorial. A task may be determined in any other suitable fashion.

In various embodiments, an AI module could be trained using the inputs of the devices to detect when a user is struggling, confused, or unable to perform an input task. The module could then prompt the user with a tutorial, wizard, or help feature. The module could also infer what function the user was attempting to perform and demonstrate the input function by providing a visual, tactile, or audio output to help the user learn the correct combination of inputs. For example, in a game that requires simultaneously pressing keys to perform a move, the AI module could detect when a player is attempting to use that move but is not pressing the correct key combination. The game controller would then provide a visual output to show which keys to press.

An AI module could be trained using the inputs of the devices to detect when a user's performance using a piece of software has decreased or increased. This AI module could be used, for example, to detect whether a user is "rusty" due to taking a break from using the software and decrease the difficulty level of a game or education software; suggest a fresher tutorial; or use the devices' outputs to prompt the user with keys, mouse movements, shortcuts, or combos. The module could also prompt the user or lock the device if it detects a dramatic decline in performance.

At step 10006, user device 106*b* determines a sequence of user inputs to a peripheral device required to accomplish the task. Required input sequences may be determined from instructions, manuals, and/or specifications of a given application. In various embodiments, user device 106*b* may obtain such input sequences from central controller 110, from the creator of a software application, from a help menu associated with a software application, or through any other means. In various embodiments, one or more user devices may monitor use of a software application. The devices may learn (e.g., using an AI module) what inputs are necessary to accomplish a given task. These inputs may then be shared across user devices (e.g., through the intermediation of the central controller 110).

At step 10009, user device 106*b* causes the activation of an output component on the peripheral device to indicate the next required input in the sequence.

During onboarding, a tutorial could dynamically use the outputs of the device to indicate which keys, mouse clicks, or combination of inputs allow users to control certain functions. For example, keys could light up, vibrate, increase or decrease in height, change the temperature of keys to show a game player how to perform a certain move or combo. For example, in help features, these outputs could be used to show a user which combination of keys forms a shortcut for a particular function.

At step 10012, user device 106*b* receives an indication of a user input at the peripheral device. For instance, the user has pressed some keys, moved the mouse, clicked some buttons, or otherwise provided user inputs.

At step 10015, user device 106*b* determines that the user input matches the next required input. If the user input is the correct input required to accomplish the pertinent task, then user device 106*b* may determine that the user has made the correct input. If the user has not made the correct input, then user device 106*b* may wait for the correct input, may provide a hint to the user (e.g., in the form of a lit or depressed key, etc.), may display a message to the user (e.g., on peripheral device 107*a*; e.g., on user device 106*b*), or may take any other action.

At step 10018, user device 106*b* determines if there are any more required inputs in the sequence. If so, flow may proceed back to step 10009, only now with regards to the next required input. If there are no more required inputs in the sequence, then it may be determined that the user has successfully accomplished the required task, and flow may terminate (e.g., proceed to "End" block 10021). In various embodiments, the user may be given the opportunity to practice the task again (e.g., with fewer or no hints).

Video Game Analytics and Coaching

Video gaming analytics and video game coaching are increasingly popular with players seeking to improve their own performance. Devices according to various embodiments could facilitate the development of new measurements of gaming performance and enable new forms of AI-based coaching and performance improvement.

Devices according to various embodiments could combine mouse telemetry data, keystroke data, biometric data, and other forms of input data from the devices. These inputs could be communicated with the game controller, local software on the user's computing device, or communicated with the central controller. By compositing input data with visual footage of gameplay, the device owner could review in depth what the player attempted to do in game with what the player actually did in game. The device, game controller, local software, or the central controller could measure the velocity of mouse cursor movement or key inputs during particular aspects of gameplay or to ascertain reaction times between in-game stimuli and player responses. For example, it could measure how quickly a player could bring a targeting reticle (such as a gunsight) on a target via mouse cursor velocity.

An AI module could be trained to identify whether a player is skilled at a game, as well as identify dimensions of skill related to a particular game. The module could allow a player to review their skill rating or the underlying dimensions of skill, or the module could provide automated feedback about which dimensions the player needs to improve. An AI module analyzing dimensions of skill for a particular game could be used to enable a leader, allowing a player to compare their skills with others. A leader board might also allow players to compare their performance in relation to the amount of money spent on in-game purchases.

An AI module could be trained to highlight particular kinds of clips for the player to review. This module could allow a player to see similar types of game situations and review performance data across these situations. The module could also flag clips with inflection points in the game for the player to review their decision making. The module could also allow a player to compare their gameplay with clips of more skilled players in similar game situations.

Utilizing biometric inputs from the devices, an AI module could be trained that analyzes physical and mental performance aspects of game play. For example, time of day, sleep deprivation, consumption of caffeine and performance enhancing substances, hunger, thirst, physical fatigue, length of games, length of gaming sessions, and other variables might affect individual performance. An AI module could identify factors affecting gameplay and allow the player to review these insights or provide automatic advice through on-screen prompts or through the output devices of the device. For example, the module might detect that a player performs poorly in a given match and the player had a slight hand tremor as measured by an EMG sensor or inferred from mouse or keyboard pressure. The AI module might prompt the player with a prompt to ask if they had consumed too much caffeine. The AI module might also allow players to optimize the scheduling of important matches or time gaming sessions to optimize performance by sharing insights with players.

The devices could enable the development of metrics regarding "general purpose" game skills. Rather than measuring performance within a single game software, the devices could enable tracking of player device inputs, player performance, and qualitative feedback from other plays across multiple games. The devices could communicate to the central controller, in addition to the game controller, which would permit the training of an AI module to measure general purpose gaming skills. These skills might be clustered by genre of game, for example, or they might be across all video games. The AI module could permit comparisons of players across different games to allow for rankings, leaderboards, a "pound for pound" best player, or other forms of public comparison. The module could also allow game designers to handicap games, allowing players with different levels of general purpose skills to compete on a level playing field. For example, players with low levels of dexterity or visual acuity due perhaps to age or other physical condition could compete with players with high levels of dexterity or visual acuity, with the game balancing the general purpose skills of both players.

In various embodiments, a given game may also be handicapped through adjustments to the capabilities of different player peripherals. If one player has a quicker reaction time than another player, then a delay may be added to any inputs provided by the first player to his peripheral device. For example, if the first player moves his mouse at time t, the mouse movement may only be transmitted at time t+50 milliseconds. Other adjustments that may be made to peripheral devices include adjusting sensitivity, adjusting pressure required to create an input, adjusting the resistance of buttons, keys or wheels, or any other adjustments. In various embodiments, adjustments may include enhancements or handicaps made to a peripheral device. For example, a game may be made more competitive by enhancing the weaker player's peripheral device, handicapping the stronger player's peripheral device, or some combination of both.

The inputs of the devices according to various embodiments could be trained to identify player skill at common roles within games dependent on team play. Using the devices' inputs, an AI module might identify clusters of player behavior to identify roles within teams and create an index of a player's skill at performing those roles. An AI module might also identify which roles a player commonly fulfills, which they enjoy, and which they might be good at. The AI module could provide insight to the player about how to improve at a given role or make suggestions about how to better contribute to a team by changing roles.

Within games, players often identify a set of strategies that are more likely to result in winning, succeeding, or countering opponents' strategies. The set of commonly played strategies and how to respond to them is described by gamers as the "metagame" or the "meta." The inputs of the devices according to various embodiments could be used to train an AI module to identify the "meta" for a game. The inputs from individual devices and the game controller could be communicated to the central controller. The game controller could communicate with the central controller about the location of in-game resources, player spawn points, non-player characters or other game attributes. The central controller could contain a large dataset of individual players' inputs, which could be used to train an AI module which identifies clusters of individual player behavior (strategies), relationships between these clusters (which strategies are played together or against each other), and which clusters result in particular game outcomes. This AI module could also identify individual player preferences for strategies. This AI module could improve player performance in several ways. For example, the AI module could identify whether a player is utilizing a non-meta strategy, whether a strategy is weak or strong in a given meta, whether a player is utilizing the strategy correctly, whether a player is suited to particular strategies more than others, or which strategy to choose to counter common opponent strategies.

Players might improve their game play by reviewing the gameplay and performance metrics of better players. By synchronizing the history of skilled players' device inputs with visual clips, a player might be able to review how a more skilled player accomplished what they accomplished. An AI module might inform a player about the performance difference between their current skill level and more advanced levels and offer tips, tutorials or other forms of coaching about how to narrow specific performance gaps.

AI assisted coaching might occur in-game rather than after a match. An AI module could be trained that would provide guidance of a player's overall choice of strategies, highlight good or poor decision making at various points in the game, or analyze specific patterns of game play. An AI module could identify the meta of a given match, whether the player picked a correct strategy, or offer suggestions in light of the performance of an opponent. An AI module might review health and mental performance markers and make in-game suggestions to improve game play. For example, if the module detects elevated cortisol levels from metabolite sensors or an increase in sweat secretion from a sweat sensor, the module could provide feedback to the player to calm down, breathe, or relax. An AI module might utilize the device outputs, such as visual displays or tactile feedback, to provide prompts during gameplay.

Match-Making for Video Games

Video games utilize match-making systems to connect players together for gameplay. Matchmaking is integral to making adversarial, team games, or other forms of multi-player enjoyable. These systems often attempt to create matches between players of similar skill or level, while minimizing time spent queuing between matches as these systems attempt to create matches. The devices of the present system could enable pairing, creating teams, or making matches along other dimensions, such as level of engagement, excitement, or practice or educational value. The devices of the present system could also enable tracking of player skill, level, ability, across different games. From a players' perspective, the enjoyment of games is often associated with the "meta" of a game, or how common patterns of gameplay by players interact with other patterns of game play. The devices according to various embodiments could help identify a game's "meta" and utilize that information for improved matchmaking.

A player's skill level might vary with fatigue, health, time of day, amount of recent practice or gameplay and other factors. The inputs of the devices according to various embodiments could be utilized to train an AI module that calculates a relative skill level, based upon long-run player performance adjusted for fatigue, time of day and other factors. A matchmaking system could utilize these adjusted skill levels to create more balanced pairings, team making, and match making. For example, a player's skill might decline over a long gaming session, and the AI module adjusts the player's skill level, the matchmaking system incorporates this adjusted skill level, and the system matches the player with increasingly lower level games.

Match making systems might create matches between players of different skill levels to allow weak players to practice and improve their game play. The inputs of the devices according to various embodiments could be utilized to train an AI module that identifies which types of pairings and matches are likely to result in skill transfer or improved game play, predicts which kinds of pairings would improve the skills of an individual player and create matches based upon the likelihood of players improving their skills. For example, the AI module could detect that a weaker player might benefit from playing more skilled or higher ranked players and create matches based upon the likelihood of improvement. For example, the AI module could detect whether a player is weak in a particular dimension of gameplay and create matches in which that player might be forced to use that dimension of gameplay more often than in other matches or where that player might observe other plays demonstrating that skill in that dimension.

Match making systems might match players to maximize enjoyment or another emotional response to the game. The devices according to various embodiments could be used to train an AI module that utilized biometric feedback and in-game telemetry data to identify matches or parts of matches that players enjoy, for example. The AI module could predict whether a potential match would likely elicit that emotional response and make matches that optimize the enjoyment of players. For example, an AI module might identify that users that spend money on in-game purchases enjoy utilizing those purchases or showing them off to other players and facilitate matches that allow the use of those in-game purchases.

Match making systems might create matches that alter common patterns of gameplay ("meta") to improve enjoyment. Within games, players often identify a set of strategies that are more likely to result in winning, succeeding, or countering opponents strategy. The inputs of the devices according to various embodiments could be used to train an AI module to identify the "meta" for a game. The inputs from individual devices and the game controller could be communicated to the central controller. The central controller could contain a large dataset of individual players' inputs, which could be used to train an AI module which identifies clusters of individual player behavior (strategies), relationships between these clusters' (which strategies are played together or against each other), and which clusters' result in particular game outcomes or player enjoyment. This AI module could also identify individual player preferences for strategies. Such an AI module could inform improved game play in many ways. For example, a matchmaking system might match players based upon the meta to facilitate competitive matches, or match players of weak strategies together to facilitate casual game play. Likewise, the AI module could communicate with the game controller to inform the strategies of non-player characters, locations of in-game resources, or other aspects of gameplay, either to counter player strategies or to facilitate player strategies.

Match making systems might match players to alter team play, to improve team performance, increase excitement level, and improve the skills of individual players. The inputs of the devices according to various embodiments could be trained to identify player skill at common roles within games dependent on team play. Using the devices' inputs, an AI module might identify clusters of player behavior to identify roles within teams and create an index of a player's skill at performing those roles. An AI module might also identify which roles a player commonly fulfills, which they enjoy, and which they might be good at if the player attempts to fulfill that role. An AI module might also be trained to identify how team composition affects team success, excitement level, or post-match ratings by players. A matchmaking system might incorporate these indexes in many ways—to form teams where individuals fill all roles, to balance the strength of teams, to increase excitement level for all players, by optimizing the composition of teams (for example, by having no players in a given role on either team), or to improve the excitement for players who spend more on the game. Likewise, the matchmaking system could create diverse game play experiences by allocating players to games which nudge players to try different roles or by allocating players to games where common sets of roles associated with the "meta" are unlikely to be played.

Match making systems could incorporate post-match feedback, in the form of player surveys or other methods for eliciting player feedback. This feedback could improve matchmaking in many ways, for example, by determining what kinds of matches players enjoyed, whether individuals were skilled teammates in team games, or individuals were abusive or bullying. The devices according to various embodiments could facilitate post-match feedback from other participants in many ways. For example, players could utilize lights on the devices to rate other players or the game could display questions, feeling thermometers or other survey tools on the devices through their visual outputs. For example, a player could control the temperature outputs of the devices to rate other players. Likewise, the devices' outputs could allow the device owner to observe how other players rated them. For example, post-match performance or feedback could be displayed through the device's visual outputs, the devices could change temperature, or they could use other outputs, such as vibration or sound. Players that receive negative feedback could be prompted to work on their skills or avoid certain behaviors. Feedback from other players about abusive or bullying behavior might lock the device owner's ability to participate in matches or disable the functionality of the device for a period of time.

Match making systems might incorporate information from player performance and/or ratings from other players across games. The devices according to various embodiments could allow tracking of player device inputs, player performance, and feedback from other players across multiple games. The devices could communicate device telemetry, biometrics, player feedback, and other information to the game controller and the central controller, and in turn the central controller could communicate this information to other game controllers. Match making systems might incorporate a measure of general video gaming skill, beyond skill in an individual game. For example, a system might incorporate information about player performance in analogous games or within the same genre of game. For example, a matchmaking system in a game dependent on visual acuity, hand-eye coordination, or reaction times might utilize a measurement of player performance drawn from other games to inform match making.

Social Peripherals for Art, Music, and Creativity

Creativity in the form of art and music could be facilitated by the mouse-keyboard. Many organizations and individuals collaborate to form paintings, sculptures, drawings, virtual visual arrangements of interiors and music. Collaborating virtually in these art forms, and allowing the mouse-keyboard to be a participant in the process could facilitate an enhanced experience and end product.

In various embodiments, a peripheral may facilitate music creation or listening.

In various embodiments, a mouse-keyboard acts as a conductor. With many people collaborating and using technology to create music, along with homeschooling, the mouse-keyboard could act as a conductor. For example, the user (e.g., conductor) could click the mouse to get the attention of the players, as if wielding a baton on the music stand. The user could establish beat patterns by using the mouse to conduct, set the beat rate using the touch control on the mouse, use the mouse to cut off the players/singers, use a visual metronome on the mouse or perform or utilize any other conductor related functions. These conductor motions could be displayed visually to the remote players/singers using the mouse-keyboard as the conductor without actually seeing the conductor and incurring a delay.

In various embodiments, such as where a mouse-keyboard has sensors, music could be streamed that matches a user's current physical mood. For example, if the EKG sensor in the mouse-keyboard indicates an elevated heart rate during a game, the user may want to have a soothing song or a more intense song to match the game play. These would be pulled from songs in the user's existing playlist.

In various embodiments, a painting is created using the mouse-keyboard as the brush and pallet. In various embodiments, a painting is created based on sensor activity. With all of the sensors in the mouse-keyboard, the mouse-keyboard could use the data to reflect the sensor activity in the creation of a piece of art. For example, if the user has elevated heart rate, blood pressure and brain waves, the mouse-keyboard may show vibrant colors and shapes to reflect the physical state the user is in at the moment the art is being created. The brush size could also reflect a more intense mood, making it larger as well.

In various embodiments, painting may be a cooperative activity. With multiple mouse-keyboard connected devices, users can contribute to a painting/drawing (or any other art form) by contributing their creativity to a piece of art. For example, one user may be skilled at drawing landscapes, while another is skilled at drawing figures; these can be done independently and brought together to form the final piece of art. Likewise, each may contribute simultaneously to the painting and control each other's pallet or brush to complete the piece.

Various embodiments contemplate sculpting using the mouse-keyboard as a chisel. With force sensors in the keyboard-mouse, virtual sculpting becomes a possibility. For example, if the virtual stone is displayed to the user, they can select a chisel and begin removing stone to create their masterpiece. The chisel force to remove the stone is controlled by the mouse-keyboard with the force sensor. If the force sensor recognizes a tighter grip or faster movement of the mouse, the chisel reflects a similar movement and more stone is removed. Likewise, if a smaller grip or shorter movements with the mouse are recognized, more detailed work is being done to the stone and less removed. The same approach could be used in collaborative sculpting as well.

Various embodiments contemplate molding and creating pottery using the mouse-keyboard. The force sensor equipped mouse-keyboard allows for a user to create a virtual sculpture. For example, the mouse-keyboard can be used to control the speed of the turning wheel and the force sensor on the mouse used to apply pressure and adjust the clay on the turning wheel. This activity allows the user to be in control of all aspects of the creation of the pottery piece.

Chatbot, User Experience, and Advertising

Companies routinely use behavioral insights to inform product design, increase customer satisfaction, customize product offerings, and improve the effectiveness of advertising. Many of these behavioral insights are drawn from imperfect metrics, such as ad clicks or cursor tracking, due to the difficulty of obtaining more direct measurements of individual engagement, mood, and attention. Various embodiments could allow for improved behavioral insights.

The devices according to various embodiments could allow an AI module to be trained that predicts the device owner's engagement level, mood, and level of alertness or attention. Mice or keyboards according to various embodiments could be equipped with sensors such as heart rate sensors, galvanic skin response sensors, sweat and metabolite sensors, or other biometric sensors. The data generated by these biometric sensors could be mouse telemetry data, mouse clicks, keystroke data, or other digital device inputs. The devices according to various embodiments could send biometric data to the owner's computing device or an external server. An AI module could be trained using these inputs which would predict dimensions about the physical and mental state of the device user, such as engagement.

Health Embodiments

Comprehensive health data is increasingly important to healthcare professionals and active health management by the individual. The mouse-keyboard device is outfitted with sensors to collect heart rate, blood pressure, tremors, finger/body temperature and grip strength, oxygen levels and hydration levels. With more telemedicine taking place among physicians, the more data points collected to assist in evaluating the health of the patient is needed. All data can be used to make the appropriate diagnosis.

In various embodiments, body temperature may be collected. Mouse-keyboard devices are equipped with sensors to collect temperature. As the temperature is collected, spikes or increases in body temperature are sent to central controller 110 and to the user for awareness of possible infection.

In various embodiments, blood pressure may be collected. In embodiments where a mouse (or other peripheral device) has an associated glove, blood pressure can be collected and monitored. Readings that fall outside of the acceptable range can be sent to central controller 110 and the individual for awareness and action.

In various embodiments, grip strength may be collected. The mouse is equipped with a sensor to collect grip strength (dynamometer). Grip strength is a measure of upper body strength and overall muscular fitness. Furthermore, using a grip strength facilitating device regularly can reduce blood pressure. The mouse is equipped with a dynamometer and the connected device alerts the user to perform various grip strength tests throughout the day while gripping the mouse. The measurements are sent to central controller 110 and also the user. Data collected over time, in conjunction with other health data, can be used to assess the health of an individual.

In various embodiments, oxygen levels may be collected. Oxygen level is a key indicator of overall health fitness. The mouse-keyboard, according to various embodiments, could read and monitor oxygen levels. For example, a user of the mouse-keyboard could routinely have their oxygen levels monitored. Depending on the level, the device may alert them via colors, sounds, vibration or on-screen display to take deeper breaths. If oxygen levels are detected at a significantly low level, others in the area could be alerted at their mice or keyboards or other devices, or 911 calls made. All data may be sent to a central health control system.

In various embodiments, mouse movement or force data may be collected. If the mouse detects rapid movement for an extended period of time, this could be an indication of hand tremors or other more serious medical conditions. The data is collected by central controller 110 and user notified for appropriate action. In addition, if force is applied to the mouse for an extended period of time, this may indicate a seizure and data may be sent to the central health control system and user for evaluation.

In various embodiments, electrocardiogram (EKG/ECG) data may be collected. The mouse-keyboard is equipped with EKG/ECG sensors. These sensors measure heart activity and provide indications of overall heart health. Together with other health data, the EKG/ECG information may be sent to a central health control system, which may be the user's insurance company or physician. The data may be collected for evaluation over time, immediate feedback/action or discarded. Various embodiments provide more data points for both the user and physician to monitor the overall health of an individual. In the case of data indicative of a possibly severe condition, immediate response can be provided to the user to take action and contact a health professional.

In various embodiments, metabolic data may be collected. A metabolite sensor can be defined as a biological molecule sensor that detects changes, presence and/or abundance of a specific metabolite. Metabolite levels may be detected within a biological system or network, such as within the human circulatory system, human organ systems, human tissue, human cells, the human body as a whole, or within any other biological networks. Metabolite levels may be indicative of a state of a biological network, such as cellular activity, cellular composition, tissue composition, tissue health, overall health, etc. In various embodiments, the metabolite sensor in the mouse-keyboard (or any other peripheral) could measure the cell activity/composition (or any other status of a biological network) and transmit the results to central controller 110 that determines the abundance of cells, nutritional status and energy status of the user (or any other aspect of user health or function). Levels determined by the controller could be used to alert the user or physician of necessary actions.

In various embodiments, electroencephalogram (EEG) data may be collected. The headband device connected could measure brain activity using EEG sensors. This data could be sent to central controller 110 and used to measure brain health both immediately and over time. This information can be used by the user or the intended physician. In the case of severe issues indicating abnormal brain activity, alerts can be sent to medical personnel or identified caregivers.

In various embodiments, electrocardiogram (EKG/ECG) data may be collected. Heart rate and the associated readings are an indication of a well-functioning heart or potential health issues. The mouse-keyboard could be used to measure the EKG/ECG signals and sent to central controller 110 for analysis. The collection of this data may give a user early indication of health issues that may lead to heart attacks or other severe heart disease that may go unnoticed.

In various embodiments, electromyography (EMG) data may be collected. The mouse-keyboard could be equipped with EMG sensors. Electromyography (EMG) measures muscle response or electrical activity in response to a nerve's stimulation of the muscle. The test is used to help detect neuromuscular abnormalities. With significant game play or mouse-keyboard activity, the nerves in the fingers, hands, wrists could become damaged or fatigued. The EMG sensor could measure this activity and send it to central controller 110 for analysis. Results could be sent to the user and medical personnel for evaluation and diagnosis.

In various embodiments, a device may render infrared (IR) therapy. The mouse-keyboard could be equipped with IR light. Infrared therapy is suggested for pain management, jaundice, eczema, wrinkles, scars, improved blood circulation, and to help wounds and burns heal faster. At the request of the user, the IR light could be turned on for a period of time to assist with conditions in the fingers, hand and wrist. If the IR therapy is used, the data regarding time used and IR wavelengths used could be sent to central controller 110 for analysis and reporting.

In various embodiments, a device may perform ultraviolet (UV) light sanitization. Controlling bacteria on surfaces is becoming more important. Bacteria are present on surfaces that are routinely used by multiple people, like a mouse-keyboard. The mouse and keyboard could be installed with UV lights that help control bacteria. For example, if the user selects a sanitizing mode on the mouse-keyboard, the UV light could illuminate for a period of time, render the mouse-keyboard unusable during this time and thoroughly clean the device. When finished, the UV lights on the keyboard and mouse are turned off and the device ready for use again.

Relaxation

Relaxation and meditation activities facilitated by physical devices are becoming increasingly more popular and important in our society as a way to control stressful activities. With biometric sensors included in a mouse to measure various physical events (heartbeat, temperature, breathing rate, moisture content), the mouse could be enabled to facilitate relaxation.

In various embodiments, a mouse may be adapted with a compression glove. Swaddling of infants provides a sense of security and calms them. In a similar manner, the use of a glove-equipped mouse could provide a sense of calm to the user when the biometric data indicates they are becoming stressed or if they elect to enable the function. As an example, if the heartbeat of the user is elevated, the glove may begin to constrict slightly to provide a more secure feel between the glove and mouse. Once the heartbeat drops to acceptable levels or the glove is disengaged by the user, the glove loosens. The compression of the glove could also cycle to promote increased blood flow through the hand.

In various embodiments, a mouse may be adapted with a vibration mechanism. If biometric sensors in the mouse indicate elevated stress levels, the mouse could begin to vibrate as a way to control stress levels. This vibration can relax the finger, hand and wrist muscles to result in less tension for the user. In addition, the mouse can detect the breathing rate and the mouse can mirror this rate with a vibration. This vibration provides the user with a conscious awareness of their breathing rate. As the user is made aware of the breathing rate, the user can take steps to decrease it, and this decrease is also reflected in the mouse.

In various embodiments, a mouse may be equipped with massage roller balls. As a user is stressed or the hand/fingers are tired from overuse of a mouse-keyboard, the massage roller ball equipped mouse could be invoked to relax the hand. If biometric sensors in the mouse-keyboard indicate elevated stress levels, or upon user invocation, the mouse could begin to move the massage roller balls as a way to control stress and simply relieve the fingers/hand of tension. These rollers could move from front to back and side to side simulating a massage action.

In various embodiments, a mouse may be equipped with a TENS unit. Pain, muscle twitches, or weak muscles brought on by overuse can sometimes be relieved by applying small electrical impulses to muscles. If the mouse-keyboard indicates stress or the user invokes the action due to muscle discomfort, the TENS unit can be activated. For example, with a glove equipped mouse, TENS electrodes can be placed at the appropriate places in the glove and when invoked, small electrical impulse can be sent to the glove while holding the mouse. The TENS unit sets a cycle time and, when complete, it turns off automatically. The mouse can continue to be used while the TENS unit is functioning or turned off at the request of the user.

In various embodiments, a mouse functions as a breathing coach ('breathing' mouse). Controlled breathing is a way to calm a person and help the person relax. Oftentimes people do not realize their breathing is elevated and find it difficult to control breathing on their own. With the sensor equipped mouse-keyboard, if the breathing rate is elevated, the mouse could display lights matching the breathing rate or vibrate accordingly. Central controller 110 could coach the individual through controlled breathing exercises. As the breathing rate decreases, the lights and/or vibration on the mouse-keyboard could change to reflect the current rate.

In various embodiments, a mouse has temperature control. The application of warmer or cooler temperatures to a user's hands can have a calming effect on them. With a mouse configured with heating and/or cooling elements, the user device or central controller 110 would be able to direct warmer or cooler temperatures to a user's hands. For example, on a hot day the user's computer screen could display cool images like an iceberg, while simultaneously causing the user's mouse to glow in a light blue color. At the same time the mouse may engage cooling elements such as fans or a small refrigeration element to cool the user's hand.

Behavioral Modification and Behavioral "Nudges"

Behavioral "nudges," or the use of insights gleaned from the academic fields of behavioral sciences, are tools for individuals to improve their well-being by utilizing psychological tricks. The devices according to various embodiments could facilitate behavioral nudges because users frequently spend large amounts of time using keyboards and mice, and when they are not in use, these devices often occupy prominent physical locations.

The devices according to various embodiments could be used for behavioral nudges for habit formation and making progress toward goals. For example, the device could produce visual indications of streaks of behavior or progress by lighting up keys individually as progress is made or by showing a digital timer feature (count-up or count-down) on the devices. If positive or negative behavior is detected, for example, the user could be prompted by a reminder spelled out on lit up or raised/depressed keys. If negative behavior is detected, for example, the device could output calming music, vibrate, initiate TENs stimulation of the user's hand, or use another of the devices' outputs as a form of reminder. Repeated negative behavior could result in escalating reminders.

Device users could utilize "social accountability", enabled by the devices according to various embodiments, to improve progress towards goals. Users could share goals with others, via social media, internet, or software, and the devices could help measure progress towards those goals. The devices could display to others whether the device owner has made progress toward goals. The device could also display a leaderboard of individuals' progress.

Progress towards habits or goals could result in rewards, such as unlocking device functionality, while backsliding or failing to result in progress could result in locking device functionality. Users for example could set goals, such as visiting a favorite website or playing a favorite game, and then lock the device's functionality for those goals until progress is achieved. Locking and unlocking functionality could be used for enabling third-party rewards. For example, positive behavior could result in users accumulating progress toward digital rewards, which could be redeemed by certain levels of progress toward a goal. A user might be encouraged not to redeem their progress but instead continue to earn progress points for a better digital reward.

The devices could enable users to create a "time diary," which would summarize device usage by software program, and help individuals meet their goals. For example, an individual user might be prompted to categorize different software, websites or other forms of digital interaction, and the user would receive a daily or weekly summary of time usage. For example, the user might be shown time spent on productive tasks vs non-productive tasks. By connecting individual devices and survey responses with the central controller, an AI module could be trained to provide recommendations to individuals about how to make progress toward their goals.

An AI module could be trained to detect a variety of physical and mental impediments to individual well-being, such as detecting flagging attention or whether an individual's productivity was affected by hydration, sleep, excessive sitting or excessive screen time, and other variables. The AI module could prompt the user with coaching advice. In some embodiments, the AI module could prompt the user to get up and walk around for a few minutes after a pre-set amount of time sitting has been reached.

In various embodiments, peripheral devices could be used as a timekeeper—either a count-up or count-down function could be set to visually show when a user is getting close to the end of time. A user could set a timer, for example, by turning the device clockwise or counterclockwise to add or subtract time from the timer. The timekeeping function could be useful when users have their screens occupied by tasks, such as giving a presentation. If a user, for example, has thirty minutes to give a presentation, they could set the mouse to change colors or vibrate when five minutes remain.

Power Remaining

In various embodiments, a mouse (or other peripheral) may have a limited amount of power or energy (e.g., the mouse may be battery operated). In various embodiments, different activities may consume different amounts of power. For example, playing a video game may consume a relatively large amount of power compared to browsing the Internet. Thus, it may be desirable for a user to know how much time the peripheral would be expected to last given his current or expected activities. In particular, if the user will be involved in a video game or other activity where he cannot take a break without adverse consequence (e.g., losing the game), then the user may be keen to know that his peripheral will not quit in the middle of the activity.

In various embodiments, a mouse or other peripheral provides an estimate of battery life at current or projected activity levels. An estimate may be shown in terms of an actual time remaining (e.g., a display may show 8 minutes remaining). An estimate may be shown with a colored light on the mouse (e.g., green for more than ten minutes remaining, red for less than five minutes remaining, etc.). An estimate may be shown in any other suitable fashion. In various embodiments, a mouse may provide multiple estimates, one corresponding to each type of use (e.g., one estimate for gaming activities, and one estimate for word processing activities). In various embodiments, a mouse may provide an estimate in terms of a quantity of activity that can be completed with remaining power levels. For example, a mouse may indicate that the mouse should be good for two more video games.

In various embodiments, if power levels are running low, a peripheral device may shut down one or more items (e.g., one or more modules; e.g., one or more hardware components). For example, if a mouse is low on power, it may shut off a display screen. In various embodiments, to conserve power, a peripheral may reduce functionality of one or more modules and/or of one or more components.

Automatic Completion

In various embodiments, a peripheral tracks a user's activities (e.g., clicks, mouse movements, keystrokes, etc.). The peripheral may note activities that are performed frequently and/or repetitively. For example, the user may frequently move a mouse from left to right, then quickly click the left mouse button three times. The peripheral may offer to make a script, macro, or shortcut for the user whereby the peripheral may receive a single (or condensed) instruction from the user in order to accomplish the activity that the user had been performing repetitively.

In various embodiments, a mouse or other peripheral may anticipate a user's actions. In various embodiments, the peripheral may automatically perform the anticipated actions, thereby saving the user the trouble of providing additional inputs to the peripheral. In various embodiments, the peripheral may first ask for confirmation from the user to perform the actions.

A peripheral may anticipate a user's actions based on having monitored prior actions of a user. If a pattern of actions has occurred repeatedly, and the peripheral now receives inputs consistent with the pattern, then the peripheral may anticipate that subsequent actions will conform to the pattern.

In various embodiments, a peripheral may illustrate or demonstrate actions that it intends to perform automatically on behalf of the user. For example, a mouse may show a 'ghost' or 'tracer' mouse pointer moving on a screen (e.g., on the screen of a user device) where the mouse anticipates that the user wishes the mouse pointer to go. If the user then clicks (or otherwise confirms), and then the mouse pointer may in fact follow the suggested trajectory of the mouse pointer.

In various embodiments, a mouse can show a whole series of clicks and drags (e.g., with clicks represented by circles and drags represented by arrows). In a chess example, when a user moves a mouse to a pawn's location the mouse may anticipate the next click and drag to advance the pawn 1 square. The mouse may therefore show a circle at the pawn's current location (to represent a click on the pawn), and an arrow going from the pawn's current location to the next square on the chessboard in front of the pawn (to represent dragging the pawn).

In various embodiments, a peripheral (e.g., a keyboard) may correct spelling, grammar, or any other input. The peripheral may make such corrections before any signal is transmitted to a user device (e.g., a user device running a word processing application), so that the user device receives corrected text. In various embodiments, a peripheral may alter text in other ways, such as to alter word choice, alter salutations, use preferred or local spellings, etc. For example, where a keyboard is used in the United Kingdom (or where an intended recipient of text is in the U.K.), the word "theater" may be altered to use the preferred British spelling of "theatre". In some embodiments, the peripheral may be set up to ask for confirmation before making an alteration. A peripheral device may use GPS information or other location information in order to determine what corrections to make.

In various embodiments, a peripheral may alter idioms based on location. For example, the American idiom of "putting in your two cents" may be altered, in the U.K., to read "put in your two pence worth".

Peripheral Coordination

In various embodiments, two or more peripherals may coordinate their activities. For example, a mouse or keyboard may adjust illumination to a user's face so that the user shows up better on camera (e.g., on a video conference). The illumination may adjust based on ambient lighting. In various embodiments, when one peripheral needs help from another, the first peripheral can send a message to the second peripheral requesting some action on the part of the second peripheral.

Trackpad

While trackpads are used to provide input similar to that of a mouse, various embodiments envision other functionality that could be incorporated into trackpads to enhance their functionality.

With display capability built into the trackpad, users could be guided through tutorials which teach the user how to perform trackpad gestures. For example, the trackpad could display the words "Show Desktop" with three lines below it to represent three fingers swiping to the right. This would help users to learn and remember trackpad gestures.

The trackpad surface could also be partitioned into separate sections, allowing a user to control a game character from one portion while operating a work application from another partition.

Mousepad

According to various embodiments a mousepad could perform non-traditional functions by adding the functionality of the peripherals described above.

The mousepad could include a matrix of individually addressable small lights to enable it to operate as a display screen. For example, it could represent a game map. The user's mouse could be configured with a small tip at the top, allowing the user to position the tip over a point in the map, allowing the user to click on that point and be instantly taken to that location in the game.

In another embodiment, the mousepad could be used to display the faces of game characters, and could enable other users to send images of their own game character to appear on the user's mousepad.

The mousepad with addressable lights could also display a 2d barcode that would allow an optical scanner built into the base of the user's mouse to read the barcode.

In various embodiments, a mouse functions as a barcode scanner. The mouse may be adapted to this function by taking advantage of the LED or other light on many existing mice. In various embodiments, a user may scan products he likes, or may show what he is eating, drinking, or consuming now. In various embodiments, a mousepad has different barcodes for common products you might want, e.g., soda, chips, pizza, etc. A player can roll his mouse over the right barcode and order with one click.

In various embodiments, consumption of drink may be correlated with game performance.

In various embodiments, a mouse may camouflage itself. As it traverses a patterned surface, the skin of the mouse may change to match the surface beneath. The mouse may recognize the pattern of the surface beneath using a camera or one or more light sensitive elements on its underside. Where a mouse is camouflaged, a desk or other working environment might have a more aesthetically pleasing, or less cluttered look. In various embodiments, a mouse does not necessarily attempt to camouflage itself, but may rather take on a color that is complementary to other colors or items in its vicinity.

In various embodiments, a mouse learns the pattern of the surface beneath it (e.g., of the mousepad) with use. Eventually, the mouse can be used to return an absolute position rather than simply a change in position. The mouse can do this by recognizing where on the mousepad it is.

In various embodiments, a mouse gets charged via the mouse pad. Charging may occur while the mouse is in use, or while the mouse is idle. Charging may occur via inductive charging, or via any other suitable technology.

Power Management

As devices become more sophisticated in terms of data collected via sensors and output collected from users, power needs will increase. In addition, as these devices can perform outside of a direct connection with a computer, alternative power supplies will be needed.

Physical movement of the device could generate power for Wi-Fi® connectivity or processing of software. Kinetic energy can be harnessed, conserved and stored as power for use by the device.

With respect to a mouse, use of the buttons, roller and physical movement of the device can generate kinetic energy. This energy can be used to support the functions of the mouse, including collection of sensory data, color display, skin display and connection to other devices.

With respect to a keyboard, numerous keystrokes are collected by users on a keyboard. The force applied to the keyboard can be used to power the device and provide energy to other connected devices. If the kinetic energy stored from a keyboard is collected, it could be shared with other devices (mouse, sensors) to power specific functions.

Power conservation of devices is important for overall carbon footprint management and longevity of a device. In various embodiments, if devices are not in use for a set period of time, even if connected to a computer, they automatically go in sleep mode. For example, if the device is displaying colors or continually collecting sensory information while not in use, they are consuming power. The device may turn off automatically and only support those features where alerts/messages can be received from another person. Once the device is touched, moved or message received, the device turns back on and is available for use.

In various embodiments, a device uses infrared (IR) to detect whether a user is at the device or near the device and powers on/off accordingly. A proximity sensor in the device may turn on a computer/device and other room monitored devices. For example, if the user has not been in the room for some time and the computer, lights, thermostat, and device have all been turned off, then once the user walks in the room, the proximity sensor (IR) in the device notices that they have returned and automatically turns on aforementioned and/or other devices. This reduces the amount of start up time and ancillary activities to reset the room for use. In addition, since the proximity sensor can determine the size of the object, the devices should only restart if the image is of a size comparable to previous users. For example, a pet or small child walking in the room should not restart the devices.

In various embodiments, an accelerometer detects certain patterns of movement (such as walking) and turns off the device (e.g., a device left in a backpack or briefcase gets powered off). Devices are equipped with features that make them more personal and thus more mobile. They are carried by users to different meeting rooms, classrooms, home locations and between locations (home to school, home to home, and work to home). Oftentimes these devices are quickly placed in a case and not turned off, thus reducing the lifespan of the device and using energy needlessly. The device is equipped with an accelerometer that notices movements of the device that are not consistent with owner use. If this is the case, the device will turn off automatically after a set period of time. Likewise, on a mouse, if the galvanic sensor does not get a reading, the device could also turn off after a period of time.

In various embodiments, parental control may be used for power management. Parents could control the power of a separate device by using their device to turn on or off the separate device. For example, if a child is not allowed to play games until 5 pm, after homework is done, the parent could simply set a preference in their child's device to not allow the device to be turned on until this time. In addition, if the device needs to be turned off when it is time for dinner, the parent could send a signal from their device or application to turn the device off.

Controlling the Home Via Mouse or Keyboard

As people spend a larger portion of their day at a computer, there will be more times at which they will need to initiate changes to house systems—such as changing temperature, moving shades up and down, turning lights on/off, opening a front door remotely, opening a garage door, turning on/off music, etc. Various embodiments allow for such changes to be made in an efficient manner without disrupting workflows. By allowing peripherals such as a mouse or keyboard access to house control systems, a user can make quick changes without breaking focus.

In various embodiments, users can change house lighting conditions while playing a game. For example, a user could tap three times on his mouse to bring up a sliding scale indicating a temperature range from 60 degrees to 70 degrees. The user uses one finger to identify the desired temperature and then taps the mouse three times to have that desired temperature sent to the user device which then sends the signal to the environmental controller which operates the temperature control systems. The user device could also display temperature controls in-game, so that a user could be presented with two targets in a shooting game. By shooting one target a signal is sent to the environmental controller to increase room temperature by one degree, while shooting at the other target would cause a signal to be sent decreasing the temperature by one degree. The user device could provide such in-game temperature targets upon a trigger level reached via temperature sensors on the user's mouse and/or keyboard, or by an infrared temperature sensor operating in the computer's player facing camera.

Users could also adjust home or room lighting levels via a mouse, such as by shaking the mouse left and right several times to turn lights on, or turning the mouse sideways to turn lights off. In another embodiment, whenever the user is in-game, the game controller adds light switches throughout the game. The user can then use the game controls to move the light switch up to turn lights on and down to turn lights off.

A user could also turn down the volume on a television when there is an incoming phone call by tapping twice on a mouse, or turning the mouse over. This would initiate a signal to the user device which could then signal the television to decrease the volume. The volume would then return to the previous setting when the mouse is again turned over.

With players often being in complex game play situations when there is an incoming call, various embodiments allow players to answer the call without taking their hands off of the mouse and keyboard. For example, their cell phone could send a signal to the user device that there is an incoming call, and the user device could send a signal to the game controller to display an icon in game which can be clicked on to connect the call or decline it.

Connected Devices and Ergonomics

Computer users frequently suffer from overuse or repetitive use strains and injuries due to poor ergonomics and posture. Users rarely position devices, screens, and furniture in ways that consider their own anthropometry. Users tend not to vary positions over the course of long computing sessions or over multiple sessions. Over the course of a computing session, the positioning of devices, monitors and furniture may be knocked or moved from ideal alignments into sub-ideal alignments. Devices according to various embodiments could improve ergonomics and reduce overuse injuries.

The devices according to various embodiments could track the location, orientation, heights, and positioning of screens, input devices, and furniture, such as desktops, chairs, or keyboard trays. The devices could also track user anthropometry, including posture, eye gaze and neck angle, internal rotation angles of the elbows or shoulders, and other key ergonomics data. Position, orientation, and angle data could be obtained through camera tracking, such as a webcam, a camera built into a computer screen, or via other cameras. Position, orientation, or angle data could also be obtained through range finding and positioning systems, such as infrared camera, ultrasonic range finders, or "lighthouse" optical flashes.

Data on location, orientation, angles, and furniture heights, as well as user positioning relative to devices and furniture could be used to train an AI module that optimizes individual ergonomics. An AI module could detect the anthropometry of device users and alert users to device, monitor, and furniture configurations that are associated with repetitive-use strains or injuries. The AI module could prompt the user to alter specific positions, orientations, and heights of monitors, input devices or furniture to reduce the likelihood of repetitive or overuse injuries.

The AI module could also dynamically alter positions, orientations, and heights of specific devices or furniture. It could alter these devices or pieces of furniture by sending a signal to enable wheels, actuators, or other movement controls to move the devices or furniture into positions associated with improved anthropometry. The AI module could track and dynamically alter positioning to improve ergonomics or posture over the course of a computing session. People use headsets for listening to music and for providing data to computers for enabling communications. For example, headsets are commonly used to enhance the audio quality of video calls, such as business meetings, online classes, or video game team communications. Headsets are also commonly used to listen to music or video files.ve setups for different kinds of computing sessions (gaming or word processing, for example), allowing multiple individuals to use the same devices, or allowing an individual to port their ergonomic settings to any other socially-enabled work setup.

Headsets

As more and more interactions (meetings, games, social and recreational events) are held virtually, a greater number of participants are not physically present in a room. Those participants are connecting via phone, or more commonly via video meeting services such as Zoom® or WebEx® using a laptop/PC/gaming device. In these situations, it is common for participants to be wearing headsets.

According to various embodiments, headsets improve the interactions and feedback by gathering and delivering more information to participants. Various embodiments also allow for enhanced experiences in the physical world by using a headset for in-person meetings, social interactions, gaming and recreational activities.

Audio Sources

In various embodiments, a headset may be well suited to playing or broadcasting audio from one or more audio sources. Audio sources may include: meetings; other business contexts; talking with friends, family, acquaintances (vocal); gaming; audiobooks; podcasts; watching videos (entertainment); watching sounds only from videos; theatre, concerts and in-person entertainment; listening to music; making music, video editing; ambient and environmental sounds; white noise; alerts and signals; or any other audio source.

Verbal Output (Speaking into Microphone)

In various embodiments, a headset microphone may capture vocal input (e.g., from a wearer) and background information. The interpretation of the vocal and background sounds and actions are collected by the headset processor 405, sent to the user device 107*a* and transmitted to the central controller 110 for AI analysis and appropriate feedback/action/response to the user(s).

The microphone could always be listening. For participants that are on mute, once they begin to speak, the microphone detects this and automatically takes them off mute. For example, there are many occasions where meeting participants place themselves on mute or are placed on mute. Oftentimes, they do not remember to take themselves off of mute and it forces them to repeat themselves and delay the meeting. The microphone in the headset could communicate with the headset processor 405, once the headset processor 405 hears a verbal sound and sent to the central controller AI system to interpret, the central controller responds to the computer and headset processor 405 indicating to turn the microphone on. In contrast, if the central controller took the participant off mute, once they stop speaking or there is a designated pause, the headset processor 405 or central controller could put the user back on mute.

Microphones could be muted automatically if they are outside the range of the meeting or the person is no longer visible on the video screen. Remote workers take quick breaks from meetings to take care of other needs. For example, a parent's child may start screaming and need immediate attention. If the meeting controller recognizes the meeting participant has moved from the video screen or computer camera and are several feet from their display device, mute the microphone automatically. Another example may be where someone leaves the meeting to visit the restroom. The camera on the computer detects the individual is no longer in view, the user device 107*a* communicates to the headset processor 405 and the microphone is put on mute. Once the camera detects the individual is in view again, the user device 107*a* indicates to the headset processor 405 to turn the microphone on for the individual.

Various embodiments allow a wearer to speak to a controlled list of people. The headset could allow vocal commands that automatically link others for a private conversation. For example, if the user wants to initiate a quick conversation with 2 other people from a larger conference call, they could say, 'link, followed by the NAME(S)'. Those people are immediately brought into a private conversation while others remaining on the larger conference call have no indication that they left the meeting or rejoined. The headset processor 405 collects the verbal command, is transmitted to the computer and central controller AI system. The central controller AI system interprets the command and names (e.g. 'link' and participant names), sends the information to the appropriate user's user device 107*a* and headset processor 405, and places them in a secure conversation. Once any participant uses the command, 'delink', the headset processor 405 transmits the command to the computer and central controller AI system and removes them from the conversation and rejoins them to the larger conference call.

Various embodiments allow a wearer to speak to a streamer or single individual over the internet. The streamer profession is growing in use and popularity. The desire to speak securely and directly to a streamer/individual could be appealing to the users of a headset as part of this invention. For example, if the user of a headset subscribed to a streamer using a headset, the user could simply 'whisper' something directly to the streamer in their headset without others hearing. The vocal command (e.g. 'whisper') by the user could initiate a secure (e.g. VPN enabled) quick conversation with the streamer/individual. If the command is accepted by the streamer/individual, the user could speak directly to the streamer securely. The user may ask the streamer/individual to repeat the last phrase in the meeting, provide another example or explain in more detail during a demo or show a particular skill while playing a game. The headset processor 405 collects the verbal command, is transmitted to the user device 107*a* and central controller AI system. The central controller AI system interprets the command (e.g. 'whisper'), opens a secure channel via VPN or shared encryption/decryption keys within the headset or in the controllers and places them in a secure conversation. Once the conversation is complete, the connection is disconnected by using an appropriate command (e.g. 'stop conversation').

Various embodiments allow a user to speak to a single individual locally. In cases where both individuals are in the same geographic location, there is no need to transmit the communication via the computer and central controller. The headset could have encryption/decryption capabilities that enable secure conversations to occur outside of the internet. For example, if two users of the headsets want to have a conversation, one of the users simply initiates a vocal command (e.g. 'whisper, local, Name) to indicate they are wanting to connect directly to another headset of the named individual. This could be useful for two people in close proximity or walking together to have a brief conversation without others knowing who you are communicating. Another use is not providing confidential information on a network or risk that someone else is attempting to listen to the conversation. The headset processor 405 collects the verbal command, is transmitted directly to the receiver's headset. The sending and receiving headsets are paired and the encryption/decryption keys are exchanged opening a secure connection. Once the conversation is complete, the connection is disconnected by using an appropriate command (e.g. 'stop conversation').

Various embodiments allow a user to broadcast audio to multiple individuals and meetings. There are times when leaders and individuals wish to communicate information simultaneously to people. Using email often slows the communication, appears less than personal and can be interpreted differently by those simply reading the content. In addition, going from meeting to meeting to communicate the same information can be time consuming and reduce productivity. The sender could transmit a message to those using the headset and those participants in meetings connected to a central controller AI system. For example, as a CEO of the company, I may wish to inform them of the latest competitive pressures within the industry. The CEO could use the headset, speak the 'broadcast' command, indicate the user audience (e.g., all employees, VPs only, named project teams; e.g., based on tagging of individuals/groups), record the message and send it immediately to the indicated group. The users with the headsets on at the time or the participants in meetings connected to the central controller AI system could immediately hear the message from the CEO. Another example may be when an SME (Subject Matter Expert) or Architect needs to communicate to various scrum teams during a PI (Program Increment) event. The verbal command (e.g. 'broadcast') is transmitted to the headset, computer and central controller AI system. The central controller AI system interprets the command and names (e.g. 'broadcast'), sends the message/information to the appropriate users' user devices (e.g., 107*a*) and headset processors (e.g., 405).

Various embodiments allow a user to speak to pay with value stored in the headset. Using cash and other forms of payment are becoming less common. In many cases, it is still necessary to authenticate and pay using a stored payment on another device. The headset could securely store payment types for the user. When purchases or transfers of cash (e.g., VENMO®, Paypal®) are made via a computer or in-person at a retailer, the device could transmit payment to the merchant. For example, the user goes to Starbucks® to order a coffee, when payment is requested, the headset could securely connect to Starbucks® and transfer funds via a push of a button or via a verbal command (e.g. 'pay Starbucks®'). Funds or forms of payment are loaded to the headset securely. The headset processor 405 communicates directly with the merchant POS device and transfers funds. Alternatively, if the headset is connected to a secure network, the central controller could also act as another form of secure transfer across the internet to the merchant.

Voice Control

Various embodiments include voice control, or use of commands to control the features of the headset or other non-human interactions. All data flows from the headset processor 405 to immediately enable/disable the function, to the user device 107*a* (if not connected via Wi-Fi®), to the central controller to record the action for future analysis purposes.

When other voice control devices are not present, the headset could allow the user to speak commands that are understood by the headset or central controller. For example, if the user is listening to music and wants to switch songs, the user could simply say, 'switch songs'. Likewise, if the user wants functions to turn on or off, they could simply state, 'turn on camera' or 'turn off assistant'.

There may be times when the user wants to disable or enable functions on a headset. For example, the user may want to turn off sensors and can simply say, 'disable all sensors' or 'disable temperature sensor'. In other cases, the user may wish to enable functions that had previously been turned off, for example, 'enable camera' when I need to record a situation and have no time to pull out my phone and record. This may include a child doing a memorable activity (first walk, laughing) or in the case of abuses (property and physical). This may also include statements like, 'mute, power off, conserve power, increase/decrease volume, turn on lights . . . '

In various embodiments, the headset could allow for control of internet enabled devices in the home/office and automobile that are paired to the headphone for secure communication. For example, the user could speak in the headset to turn on the alarm, turn off the lights, turn on the oven to 350 degrees, turn down the thermostat in my work office prior to arriving in the summer or start my car and turn on the heat.

In various embodiments, the headset could be built with Alexa® or Siri® enabled technology or any voice activated remote controls (e.g. Netflix®, Comcast®, AT&T® UVerse®).

Various embodiments assist with interpretation of semantic content. Semantic barriers to communication are the symbolic obstacles that distort the sent message in some other way than intended, making the message difficult to understand. The meaning of words, signs and symbols might be different from one person to another and the same word might have hundreds of meanings. Users of the headsets, when indicating confusion, could get a different representation to the comments. As more teams are formed around the globe, the semantics used in meetings can be frustrating and cause people to take actions not intended. The user of headsets could get a different interpretation of the meeting contents to remove the semantics. For example, if a meeting owner conducts a global meeting and states, 'we all need to run now', this can be interpreted differently by those listening around the world. The central controller AI system could understand the semantic differences and communicate different meanings to those on the call. The system could recognize the statement and send an alternative meaning such as, 'we all need to end the meeting now'removing confusion.

Various embodiments assist with interpretation of sentiment. It has been recently studied that "vocal bursts" are found to convey at least 24 kinds of emotion. These vocal sentiments and their corresponding emotions could be used to measure engagement of individuals and teams, support of an idea, frustration, embarrassment and so forth and collected by the central controller AI system for evaluation, measurement and reporting to the individual and organization. For example, on a call, a leader pitches a new idea and various individuals respond with statements like, 'great'. These can be analyzed to mean, great, another project to distract me and for me to work longer hours or great, I can't wait to get started. Each has a different sentiment. If all of these vocalizations are collected by the headset and analyzed by the central controller AI system, individuals can be informed about how their statements are perceived for improvement or reinforcement and the leader can get a collective sense of the overall presentation. This can enhance human and overall organizational performance.

Various embodiments assist with verbal tagging (e.g. new idea, good idea, up next to talk reminder), such as by using AI system action. Meetings often have varying degrees of notes or categorization of content. Using the headset, the meeting owner or individuals could state a verbal tag for the central controller 110 to collect and categorize for the meeting and make available. For example, a meeting participant describes a solution to a problem they are discussing. The meeting owner can simply say, 'good idea' and the central controller tag the last 2 minutes of the conversation for later evaluation and reporting. Another example may be for voting purposes. If the meeting owner asks for a 'vote', the central controller can tag, record and count the number of yes and no votes for later reporting in the meeting minutes.

Vocal Tags

In various embodiments, vocal statements invoke AI detection and action. During meetings or games, vocal statements could be interpreted by the central controller AI system and action taken.

For example, during a meeting, the owner may step through the agenda by providing vocal queues. When the agenda gets to the next topic, the central controller AI system could inform the agenda topic owner that they are next to speak. This could be delivered to the headset via a sound queue in the ear or a vibration on the ear bud. This improves productivity and human performance.

As another example, if a topic is generating a larger than expected/average amount of engagement or is taking more than the allotted time, it may mean the topic could be tabled or moved to a separate meeting. The central controller AI system can collect the amount of discussion by member, time spoken, ideas/solutions/resolution generated based on keywords/statements (e.g. complete, resolved, new idea, more issues, don't agree) and communicate to the meeting owner and participants that the topic could be tabled or resolved quickly.

As another example, during a meeting, if multiple ideas are being generated to solve a problem, the central controller AI system could interject and summarize the ideas and request that a vote be taken. This improves productivity and human performance.

As another example, if during a game, the player is using the controller to shoot a gun, but could use vocal commands to launch a grenade or invoke a airstrike, this provides another opportunity to engage with the game. In this case, the headset microphone and statements become another point to control the gaming experience.

Gamification of Meetings

In order to encourage meeting participants to be more engaged during meetings, a company could gamify the meeting by providing participants with points for different positive meeting behaviors. Awarding of points could be managed via the user's headset processor 405, and could be done during both virtual and physical meetings.

In some embodiments, the user's headset has a stored list of actions or behaviors that will result in an award of points that can be converted into prizes, bonus money, extra time off, etc. For example, the storage device of the headset might indicate that a user earns one point for every minute they speak during a meeting. This might apply to all meetings, or only to some designated meetings. A microphone of the headset identifies that the user is speaking, and calculates how long the user is talking. When the user stops talking, the processor of the headset saves the talking time and stores it in a point balance register in the data storage device, updating the total points earned if the user spends more time talking during the meeting. At the conclusion of the meeting the user's new point balance could be transferred to the central controller, or kept within the headset data storage device so that the user could—after authenticating his identity to the headset—spend those points such as by obtaining company logo merchandise. In an alternative embodiment, the user earns points for each minute spoken during a meeting, but only when at least one other meeting participant indicates that the quality of what the user said was above a threshold amount.

In various embodiments, points could be earned by the user for other actions such as drafting meeting minutes after the meeting concludes, or for taking ownership of one or more task items. In the case where a user earns points for ownership of a task item, the headset processor 405 could store that task item in the data storage device of the headset for later review by the user. When that task item is completed, the user could be awarded with more points. The headset could also provide audio reminders to the user of any open task items and the deadlines for completion of these items.

Points could also be awarded when the user makes a decision in a meeting, or provides support for one or more options that need to be decided upon. In this embodiment, the points may be awarded not by the headset processor 405, but by the other participants in the meeting. For example, a meeting owner or participant with a headset might say "award Gary ten points for making a decision" which would then trigger that participant's headset to award ten points to the headset of Gary.

Participants could also be awarded with points for tagging content as a meeting is underway. For example, a user might receive two points every time they identify meeting content as being relevant to the accounting department.

Another valuable behavior to award points for is providing feedback to others in a meeting. For example, the user might be awarded five points for providing, via a series of taps on a microphone of the headset, a numeric evaluation of the effectiveness of the meeting owner.

Users could also receive points based on their location. For example, a user might receive five points for walking around a one mile walking path at the company, with the headset verifying that the authenticated user completed the entire walk.

Listening Via Headset

As more information becomes captured and communicated in digital form, users can easily be overwhelmed by a tidal wave of information. The headset can serve in the role of filtering out some data while enhancing other data.

In some embodiments, a user wants to review the audio from a large meeting that lasted for several hours. Rather than listening to the entire meeting, the headset could be configured to only play back the audio from the CEO. This filtering could be done by the central controller, comparing the voice of speakers on the call to voice samples from all executives of the company, and deleting all audio not produced by the CEO. The central controller would then send that CEO-only audio to the user's headset for playback via speakers of the headset. In another embodiment, the user could request of his headset that the audio from a particular meeting be filtered down to only that audio related to the third and fourth agenda items as determined by tagging data provided by the meeting participants.

Users may also want to have background noise filtered out of a call or a recording of a call. For example, the user's headset processor 405 could have sound samples from the user's dog stored in the data storage device, and the microphone of the headset could transmit a barking sound to the headset processor so that the barking could be deleted from the user's audio before it is sent out to other call participants. The headset could generate the sound samples for the user's dog barking by periodically asking the user during the day if a given barking sound was his dog, and then training AI within the headset on the dataset.

In various embodiments, safety information is amplified by the use of the headset. For example, with GPS capability the user's headset could determine that the user has wandered into some new construction of a new area of the third floor of the building in which the user works. This could trigger the headset processor to send a warning message such as "please leave this restricted area" to the user via the speaker of the headset. In another embodiment, the user headset instead opens up a direct channel of communication with a safety officer who can talk with the user and make sure they understand how to exit the restricted area. The GPS data could be used in conjunction with other data, such as a video feed from the user's forward facing camera, to better understand the precise location of the user in the building.

At a coffee shop where the environment is quite noisy, the headset could relay messages to the user's headset from the coffee shop, such as telling the user that his coffee is ready. This message could replace any music that the user was listening to at the moment, ensuring that the user easily hears the message.

The headset could also get the user's attention when the user shows signs of losing focus or engagement in a meeting. For example, an inward facing camera or accelerometer could determine that the user's head is dropping in a meeting, sending an alert (e.g. audio, vibration, light flashing) to the user's headset in order to communicate that his attention to the meeting may be dropping and perhaps suggest a cup of coffee or tea.

Listening (Non-Vocal Noises)

Headset microphones inadvertently capture non-vocal noises and ambient noises. Such noises can be a distraction to conversations, and devices according to various embodiments could be used to remove these distracting noises and improve audio quality. Yet non-vocal noises and ambient noises also provide insight into headset wearers, their behavior and their environment.

The central controller 110 could record and analyze non-lexical and ambient noises. Non-lexical noises include man made noises that are not words such as guttural noises (e.g. grunts), throat clearing, vocal hesitation words (e.g. "um," "ah"), sighs, non-lexical mutter, sub vocalizations and other noises produced by exhalation. Common ambient noises include office and household appliances, HVAC systems, outdoor noises, animals, children, neighbors, track, vibrations created by electronic devices, pings, ringtones, furniture, eating and drinking sounds, weather, typing, writing noises, and paper shuffling.

An AI module could be trained to detect nonlexical noises and ambient noises. The central controller could filter or mask unwanted nonlexical noises or ambient noises to improve the audio quality of listeners. This processing, filtering and or masking could occur locally in the headset, on a connected phone or computing device, or by the central controller.

An AI module could be trained to detect nonlexical noises or gestures that indicate that an individual is ready to speak.

The central controller could mute non speaking participants to reduce ambient non and unmute individuals dynamically based upon signal of intent to speak. For example, individuals could lean forward or flip down the microphone arm prior to speaking. For example, individuals could inhale sharply prior to speaking or could begin with a vocal hesitation word such as "um".

In various embodiments, the central controller could mute or prompt individuals to mute microphones that are inadvertently left on.

In various embodiments, the central controller 110 could automatically mute individuals when it detects certain noises. By using pre-recorded sounds that invoke a response by the central controller 110, the microphone could be put on mute automatically. For example, if your dog's bark is pre-recorded, the central controller could be listening for a bark and when recognized, the microphone is automatically put on mute. Similarly, if a doorbell or a cell phone ring tone is recognized, the microphone is put on mute automatically.

In various embodiments, the central controller 110 could record and analyze sub vocalizations, muttering and other forms of self-talk when individuals are working alone or when in meetings or conversation. Sighs and other forms of muttering could be analyzed as nonlexical responses to conversation that indicate the affective response of the speaker to others speech. For example, the central controller could detect excitement, disgust or other emotional responses through nonlexical noises. When working alone, the central controller could record and analyze self talk. The central controller could provide coaching based upon the content of self talk. Sometimes individuals think out loud. The central controller could record this form of self talk and transcribe it into notes. Other forms of self talk involve confusion, hesitation or other forms of uncertainty. The central controller could detect this form of self talk, the context for the self talk, and provide suggestions or recommendations from an autocomplete or recommender AI module.

In various embodiments, the central controller could record and analyze audio elements such as voice quality, rate, pitch, loudness, as well as rhythm, intonation and syllable stress.

In various embodiments, the central controller could record ambient audio from the headset even when the device owner is muted. Ambient audio could be analyzed by the central controller to indicate engagement, intent to speak, affective response and other forms of conversational diagnostics.

In various embodiments, the headset could use nonlexical noises as device inputs. Clicking, tsking, clucking and other sounds could be used as inputs.

In various embodiments, the headset could detect environmental noises requiring the device owner to perform actions such as microwave beeping, a kettle whistling or a doorbell. The central controller could place the individual on mute during a call if it detects an environment noise requiring a response. The central controller could prompt the device owner if the device owner ignores the environmental noise, such audio, video, tactile feedback either on the headset or a connected device. For example, individuals sometimes become involved with tasks and forget to respond to environment noises that are signals to engage in behavior.

Security and Authentication

Applications according to various embodiments can be enhanced with authentication protocols performed by the headset processor 405, user device 107*a*, or central controller 110. Information and cryptographic protocols can be used in communications with other users and other devices to facilitate the creation of secure communications, transfers of money, authentication of identity, and authentication of credentials. Such a headset could be provided to a user who needs access to sensitive areas of a company, or to sensitive information. The headset might be issued by the company and come with encryption and decryption keys securely stored in a storage device 445 of the headset.

In various embodiments, the user authenticates themselves to the headset by providing a password or other access token. For example, the user might enter a password or PIN via a numeric keypad presented on a display screen of the headset. In this way, the headset can be assured that the user is a legitimate user, and could provide access to stored value, passwords for access to networks, or access to particular applications within data storage of the headset.

The user could also authenticate themselves by providing a voiceprint by saying a passphrase into a microphone of the headset. For example, the user could say the phrase "Gary Smith access request for level three capabilities," which could then be compared to stored voice samples within data storage of the headset, with the headset processor 405 using stored algorithms to compare the voiceprints and then enable level three access if the voiceprint matches. In some embodiments, the headset data storage stores voiceprints from multiple users and stores digital content (like stored value of access credentials) for each user, enabling access to the stored content only if a user successfully provides a matching voiceprint. Alternatively, or in addition to the voiceprint, the user might provide a password or PIN by voice into the headset microphone, with the processor of the headset converting that voice signal into text and then comparing to a stored password or PIN with a match required in order for the user to be able to gain access to the functionality of the headset. For example, the user might say "PIN 258011" with the microphone of the headset sending the voice segment to the headset processor 405 where it is translated into the text and compared with the stored PIN value prior to allowing access.

The headset could also manage user access by an iris and/or retinal scan. In this embodiment, the user might enable a camera that is pointed toward the eyes of the user, with the headset camera sending the visual signal to the headset processor 405 which then identifies the iris/retina pattern of the user and compares it with a stored sample of that user's iris/retina. For an iris based authentication, the headset processor 405 might match the image of the user's iris with an iris stored with the central controller 110.

The headset can also gather biometric information from the user's hands and fingers using a camera attached to the headset (or attached to the user device 107*a*). For example, the camera could be outward facing and pick up the geometry of the user's hands or fingers, sending that information to the headset processor 405 for processing and matching to stored values for the user. Similarly, a fingerprint could be read from a camera.

The headset camera could also read the pattern of the user's veins on his face or hands.

Other biometric data that could be read by the headset includes ear shape, gait, odor, typing recognition, signature recognition, etc.

In some embodiments, a user might be authenticated when a second user is able to authenticate the face/eyes of the first user.

Headsets could communicate with each other, making frequent attempts to authenticate other users.

In various embodiments, the user may be required to authenticate via multiple forms in order to provide high enough confidence that they are who they claim to be in order to enter a restricted area, access restricted information, or use restricted resources. This is done by a point system where each authentication method is scored by its relative strength. The user must attain a score equal to or greater than the requirement for the area/data/resource. The headset will force the user to authenticate until such time as their authentication score is high enough for access or the user stops the attempts. In another embodiment, a user might need 10 points to access a particular database, but the user currently only has 8 points. The central controller might then allow access, but only if the user allows a video feed from the user's headset to be transmitted live to security personnel of the company while access to the database is taking place. If the user attempts to take his headset off in a high security location, the headset processor 405 could generate a loud warning siren, or give the user a warning that they need to put the headset back on in the next ten seconds.

When in a restricted setting, a user may be required to re-authenticate to maintain access if any of their credentials expire and their authentication score dips below the necessary level. They must regain the needed score within a threshold timeframe or have their access revoked.

When in a restricted setting, the headset may record events through the camera and microphone to keep a record of the actions taken by the user. This video can be sent to the central processor to allow for security review, either live or a later time from the stored video/audio recording.

When in a restricted setting, the functionality of the headset may be restricted to prevent the user from performing forbidden actions. For example, the internet access may be cut off when entering a restricted area to prevent sending data outside. In another embodiment, the camera on the headset may be disabled to prevent the user from taking video or photographs of confidential or secret data. Another example, the file system may be forced into a read-only mode to prevent the user from copying and storing confidential or secret information.

When in a restricted setting, if a user removes their headset, disables it, or removes or adds components, or interferes with its authentication ability the headset can take one or more actions to alert others. For example, the headset can give a verbal warning to the user to undo the action they took. In another embodiment, the headset can produce a loud alarm and/or flash lights on the headband warning others in the area of the potential security breach. Another example is the headset may communicate with company security to inform them of the situation.

A headset can log failed attempts at authorization to keep a record. This information can be stored locally on the headset and/or sent to the central controller. This log can contain the attempted method of authentication, the incorrect information provided, photo or video evidence of the attempt, audio recording of the attempt, time, location, and/or other authentication data collected by the headset, e.g., automatically. The data once collected can be used in a variety of ways: to improve the authentication methods if the person trying to authenticate was the actual person and the attempt should have been successful, to find who the person actual was if their data was in the system, or to alert security or the authorities to the attempted fraud.

By removing a headset a user can revoke all the active credentials on the headset. This prevents another from taking another's headset and gaining all accesses of another.

A headset can authenticate others in the area through facial and/or voice recognition to help ensure that unauthorized people cannot maintain access to places they do not belong. For example, when a user is walking around the office they pass others doing so the headset can take facial and/or voice samples and send them to the central controller to verify the identity. This can be done on a random sample basis or, when in times of heightened security, on every person encountered.

By authenticating himself to the headset, the headset verifies the identity of the user so that the headset processor 405 can make additional functionality of the headset available to the user. For example, the headset processor 405 could enable the user to listen to music at any time, but in order to make calls via the headset the user is required to first authenticate himself. In another embodiment, after the user successfully authenticates himself to the headset, the headset retrieves stored credentials of the user. For example, the headset processor 405 might search a credentials database stored in the data storage device of the headset (or user computer) and retrieve information indicating that the user is a licensed physician in the state of New York. This could be especially useful at the beginning of a telemedicine session in which the stored credential can be sent via text or email to a patient as proof that the physician on the other end of the call is a certified physician. Other examples of stored credentials include SAFe 4.6 instructor, Patent Agent, Heart Surgeon with more than ten years of pediatric cardiac surgery experience, Chess Grandmaster, Electrical Engineering Masters degree, fluent in German and French, licensed electrician in California and Nevada, currently active pilot's license, chef at a five star restaurant, top secret security clearance, retired police officer, member of the American Institute of Biological Sciences, Ambassador to Mexico, employee of IBM, a Subject Matter Expert on Project X at IBM, etc. These credentials could be communicated to others once the user is authenticated. For example, a user on a virtual call could authenticate himself to the headset which then emails or texts those credentials so that other participants on the virtual call can be assured that the user is a licensed heart surgeon. This credential information could include a license number of the physician. In some embodiments, the headset could display a visual indication of the credentials of a user on a display area of the headband of the headset. For example, a video game streamer could authenticate to the headset so that his insignia is illuminated on the headband of the headset.

In various embodiments, virtual calls for company XYZ could be set up where only authenticated Subject Matter Experts in microservices are allowed to join the call. Alternatively, the call could be set up so that only those authenticated Subject Matter Experts could be allowed to speak on the call, though other non-credentialed users could not be allowed to speak. A user could also be credentialed as someone who is on the list of approved participants on a given call. In this case, the user authenticates with the headset, such as by using a password spoken out loud and picked up by a microphone of the headset, with the user's name communicated to a central controller which then compares it to a list of stored invitee names for the call and allows the user on the call if his name is matched to one of the names on the list.

Once a user is authenticated to the headset, it could enable the headset processor 405 access to stored demographic information such as age, gender, race, marital status, location, income, etc. A user ordering food delivery via the headset, for example, could authenticate himself to the headset which enables the headset processor 405 to retrieve the address and age of the user and transmit that information to the food provider via email.

In various embodiments, the user provides periodic or continuous authentication information to the headset. For example, the user might initially authenticate himself to the headset processor 405 by providing a particular passphrase verbally to a microphone in the headset which then passes it to the headset processor 405 to be authenticated by comparing it to a stored passphrase for that user. Once this authentication process is complete, the headset processor 405 could frequently sample voice information from the headset's microphone, such as by taking a voice sample every five seconds, and comparing that sample to see if the characteristics of the voice matched that of the user's stored voice characteristics in the data storage device of the headset. In another embodiment, the user authenticates his identity with the headset processor 405, and then an inward facing camera controlled by the headset processor 405 continuously views the face of the user and sends still images from the video feed to a biometric processor which compares the video stills with information stored in the headset storage device related to face information of the user. The headset processor then makes a determination for each video frame whether or not the user is still the same as the user who first authenticated with the device. In such an embodiment, the headset processor could be assured that the user had not removed the headset and had someone else put on the headset. For example, a company gathering statistics relating to the television source that a user is watching could have the user wear a headset while watching television/cable/internet programs. The headset could authenticate the user at the start of the session, and the headset could engage in periodic or continuous authentication while the user was watching, ensuring that a different user had not replaced the original user during the session.

In various embodiments, the headset can sample environmental information in order to supplement ongoing authentication of a user. For example, the user could provide the headset with samples of the sound of her dog barking, with those sounds saved in a data storage device of the headset. After authenticating the user, the headset could periodically or continuously use a microphone to sample sounds from the user's environment, sending any barking sounds (identified via machine learning software of the headset processor 405) to be compared to the user's previously stored barking sounds so as to determine if it was the user's dog that was barking. This information could add to the confidence of the headset processor 405 that the user's identity is known and has not changed.

The ability to authenticate a user can also be valuable in embodiments in which a user has valuable information stored in a data storage device of the headset processor 405. Valuable information could include credit/debit card info, account numbers, passwords, login data, digital currency, saved music and video and books, saved conversations, stored documents, medical data, etc. For example, the headset could be configured to transmit credit card information (including the user's name, card month and year of expiration, zip code, and ccv data) to a central controller (or directly to an online merchant) to facilitate the sale and delivery of an item. The information could be communicated in an electronic manner or it could be read out by text to speech software via a phone connection with the central controller or third party merchant. In this example, the user requests the information to be sent to the merchant, but the headset processor 405 is first required to complete a successful authentication of the user, upon which the information is then forwarded along. In this example, the user is relieved of the need to transmit the financial data, speeding up and simplifying the purchase transaction. In another example, the headset allows a user to subscribe to music stored in the storage device of the headset processor 405. Payment could be made on a monthly basis to allow the user access to the stored music.

In various embodiments, encryption is an encoding protocol used for authenticating information to and from the headset. Provided the encryption key has not been compromised, if the central controller can decrypt the encrypted communication, it is known to be authentic. Alternatively, the cryptographic technique of "one-way functions" may be used to ensure communication integrity. As used herein, a one-way function is one that outputs a unique representation of an input such that a given output is likely only to have come from its corresponding input, and such that the input cannot be readily deduced from the output. Thus, the term one-way function includes hashes, message authenticity codes (MACs-keyed one-way functions), cyclic redundancy checks (CRCs), and other techniques well known to those skilled in the art. See, for example, Bruce Schneier, "Applied Cryptography," Wiley, 1996, incorporated herein by reference. As a matter of convenience, the term "hash" will be understood to represent any of the aforementioned or other one-way functions throughout this discussion.

In various embodiments, the headset could store authentication information to make virtual meetings with people outside of the company more fluid. The user headset could store HR "rules" for communication, with required standards of authentication. All audio and video with outside people could be automatically captured and stored/encrypted/hashed in a data storage device of the headset processor 405 or a central controller. Other data that could be captured from calls (or used to manage calls) with people outside the company include work history, licenses, certifications, ratings and reviews from prior contracts, and stored lists of outsiders under NDA. In one embodiment, a user headset could initiate all calls with people outside the company by verbally declaring that "this call is "on the record."

For enhanced security applications, the user headset could include a connected security token (via USB or audio jack).

In various embodiments, audio recordings could be encrypted when stored in a data storage device of the headset processor 405.

Brainwaves

Various embodiments include a headset (e.g., headset 8000, headset 107*a*, and/or headset 4000) for authenticating a first user based on brain activity of the first user.

In various embodiments, a headset 8000 includes an electronic processing device (e.g., a processor 405). In various embodiments, the headset includes a set of electrodes (e.g., two electrodes 8085), each electrode operable to detect an electrical potential at a respective point on a head of a first user (e.g., on the head of the wearer of the headset.

In various embodiments, the headset includes an amplifier (e.g., amplifier 8090) in communication with each of the set of electrodes 8085 and with the electronic processing device. The amplifier may be operable to amplify differences in electrical potentials detected at the respective electrodes. In various embodiments, the amplifier may amplify a relatively small voltage difference detected across two electrodes into a relatively larger voltage difference.

In various embodiments, headset 8000 includes a camera in communication with the electronic processing device 405.

In various embodiments, headset 8000 includes a network device (e.g., network port 8010) in communication with the electronic processing device 405.

In various embodiments, headset 8000 includes a memory (e.g., storage device 8045). The memory may store image analysis instructions, which may comprise instructions for analyzing images and/or videos, and/or for determining objects or contents that appear in the images and/or videos.

The memory may store brain wave data. The brain wave data may include voltage readings from one or more individuals' brains or heads. The brain wave data may include data previously obtained from the wearer of headset 8000. The brain wave data may include EEG data. The brain wave data may include data previously obtained from users who were viewing familiar objects. The brain wave data may include data previously obtained from users who were viewing unfamiliar objects. In various embodiments, the brain wave data may serve as reference data against which new brain wave data will be compared.

The memory may store processing instructions that, when executed by the electronic processing device 405, result in one or more embodiments described herein.

Turning now to FIG. 103, illustrated therein is an example process 10300 for authenticating a first user based on brain activity of the first user, which is now described according to some embodiments.

At step 10303, in various embodiments, electronic processing device 405 outputs an instruction directing the first user to look at an object.

At step 10306, in various embodiments, electronic processing device 405 captures, at a first time, an image by using the camera. The camera may be a forward facing camera (e.g., one or both of cameras 4022*a* and 4022*b*) and may thereby capture an image of an object or scene at which the user (i.e., the wearer of the headset) is currently looking. The object may be the object at which the user was instructed to look.

At step 10309, in various embodiments, electronic processing device 405 may execute the image analysis instructions to identify an object in the image. This may be accomplished via object recognition algorithms, for example.

At step 10312, in various embodiments, the electronic processing device 405 may identify the object as an object that should be familiar to the first user. Electronic processing device 405 may retrieve a portion of the stored object data. In various embodiments, electronic processing device 405 retrieves stored image(s) and/or recorded video from a database table (e.g., from peripheral sensing log table 2300; e.g., from sensor log table 7500), where the presumed user (i.e., headset wearer 8000) is known or believed to have seen such images or videos and/or the contents thereof. For example, the retrieved image may also have been recorded by headset 8000 when worn by the user. If the retrieved image(s) and/or video match the presently identified object in the image, then it may be presumed that the presently identified object is familiar to the first user.

In various embodiments, the retrieved portion of the stored object data comprises data descriptive of a location of the object. For example, the data may indicate that the object had been in a particular room, or on a particular wall. In various embodiments, the electronic processing device 405 may identify that the object should be familiar to the first user by identifying that the first user has previously been to a nearby or proximate location to the location of the object. For example, the first user has previously been to the room where the object has been located.

In various embodiments, the portion of the stored object data comprises data descriptive of a certification associated with the object. For example, the object may be a piece of machinery, and the certification may be a certification for proper use of the piece of machinery. The electronic processing device 405 may identify that the object should be familiar to the first user by verifying that the first user has obtained the certification. For example, if the first user has obtained a certification on how to use a piece of machinery, then that piece of machinery should be familiar to the user.

At step 10315, in various embodiments, electronic processing device 405 may sense a waveform representing a time-varying difference in electrical potentials across two electrodes of the set of electrodes. This waveform may be sensed, received, and/or determined by the set of electrode(s) 8085 and/or by amplifier 8090. The waveform may represent brain waves of the user wearing the headset 8000. The waveform may be an electroencephalogram. The waveform may be sensed at a second time proximate to and following the first time.

The waveform may represent the user's response or reaction to seeing the object, since it occurs right after the image of the object has been captured (and therefore, presumably, right after the user has seen the object in the image). In various embodiments, the waveform is sensed from the first time until one second after the first time. In various embodiments, the waveform is sensed from 1 millisecond after the first time until 500 milliseconds after the first time. As will be appreciated, the waveform may be sensed (and thus the second time may occur) at any suitable time and for any suitable duration of time.

In various embodiments, the electronic processing device 405 may determine that the waveform represents cognitive recognition. In other words, the user's brainwaves show that the user recognized the object he was presumed to be familiar with.

At step 10318, in various embodiments, electronic processing device 405 may compare the sensed waveform to the stored brain wave data. The electronic processing device 405 may thereby identify a deviation of the waveform from the stored brain wave data. For example, the device 405 may subtract the sensed waveform from the stored brain wave data to determine a deviation. As another example, the device 405 may determine a degree or percentage of similarity between the sensed waveform and the stored brainwave data.

At step 10321, in various embodiments, the electronic processing device 405 may compare the identified deviation to a stored threshold. Based on the comparison, the electronic processing device 405 may identify that the first user has exhibited a brain wave response to the object in the image. For example, if the stored brain wave data represents data from an individual viewing an unfamiliar object, and the sensed waveform deviates from the stored waveform by more than 20% (or by more than some other predetermined threshold), then the device 405 may identify that the user has exhibited a brain wave response representing recognition. As another example, if the stored brain wave data represents data from an individual viewing a familiar object, and the sensed waveform deviates from the stored waveform by less than 10% (or by less than some other predetermined threshold), then the device 405 may identify that the user has exhibited a brain wave response representing recognition.

In various embodiments, electronic processing device 405 identifies a brain response in the first user if the sensed waveform is closer to a stored brainwave of a user viewing a familiar object than it is to a stored brainwave of a user viewing an unfamiliar object.

In various embodiments, electronic processing device 405 identifies a brain response from the sensed waveform in relation to the stored brain wave data in any other fashion.

At step 10324, in various embodiments, electronic processing device 405 may authorize, in response to the identifying of the brain wave response to the object in the image, the first user to access a resource. The resource may be an electronically-actuated access device (e.g., an electronic door lock, a lock to a safe, an ignition for a car), a computing device, an electronic storage address, or any other resource.

Authorizing the first user to access the resource may include transmitting, by the network device, a wireless command indicative of the authorization for the first user to access the resource.

In various embodiments, electronic processing device 405 may cause an indication of the authorization to be stored in memory. In various embodiments, so long as an indication of the authorization is stored in memory, the first user may continue to access the resource.

In various embodiments, the electronic processing device 405 may detect a removal of the headset by the first user. The electronic processing device 405 may then erase the stored indication of the authorizing. Thus, upon removing the headset, the first user may lose access to the resource.

Multi-Tiered Authentication

Various embodiments include a headset (e.g., headset 8000, headset 107*a*, and/or headset 4000) for authenticating a first user based on an on-going, multi-tiered authentication process.

As used herein, the term "authentic user" may refer to an individual that is a true, trusted, authorized, and/or known individual. In embodiments described herein a given user, of possibly unknown or uncertain identity, may attempt to represent himself as the "authentic user", e.g., so as to be granted access to a resource. Accordingly, embodiments described herein attempt to determine whether a given user is the "authentic user".

In various embodiments, the headset 8000 may include an electronic processing device (e.g., a processor 405), a speaker (e.g., speaker 4010*a* and 4010*b*) in communication with the electronic processing device; a microphone (e.g., microphone 4014) in communication with the electronic processing device; a positioning system (e.g., sensor 4040, which may be a GPS or other positioning sensor) in communication with the electronic processing device; an accelerometer (e.g., 4070*a* and 4070*b*) in communication with the electronic processing device; a network device in communication with the electronic processing device (e.g., network port 4060); a camera in communication with the electronic processing device (e.g., camera unit 4020, cameras 4022*a* and 4022*b*); a biometric device in communication with the electronic processing device; and a memory (e.g., storage device 8045).

The memory may store point allocation instructions, which may comprise instructions for allocating points to a user based on how much evidence the user has provided to verify his identity. The memory may store referential instructions, which may comprise reference data or instructions against which to compare identifying information provided by the user.

The memory may store processing instructions that, when executed by the electronic processing device 405, result in one or more embodiments described herein.

Turning now to FIG. 104, illustrated therein is an example process 10400 for authenticating a first user based on multiple factors, which is now described according to some embodiments.

At step 10403, in various embodiments, the electronic processing device 405 may output, by the speaker, a query to a user. The query may comprise a voice prompt. The query may ask the user for a personal identification number (PIN), a password, an item of personal information, a piece of information only the user would be likely to know, and/or any other query.

At step 10406, in various embodiments, the electronic processing device 405 may receive, by the microphone and in response to the query, a response from the user. For example, the user may provide an oral response spoken into the microphone. In various embodiments, the user may respond in other ways, such as with a gesture, pressing of a button, typing in a message, and/or providing a response in any other fashion.

At step 10409, in various embodiments, the electronic processing device 405 may execute the point allocation instructions to compute, based on the response from the user, a first number of points. For example, the point allocation instructions may detail a number of points to allocate to the user upon a correct or accurate response to the query. For instance, if the user correctly provides his password, then the user may receive four points. In various embodiments, the user may receive less than a maximum allowable number of points if the user provides a partially correct answer. For example, if a user provides a PIN with only three out of four digits correct, then the user may receive an allocation of only two out of a possible four points. In various embodiments, the user is allocated points based on the speed of his response. The user may receive ten points for a correct response given within one second, and may receive one fewer point for each additional second the user needs to respond. In various embodiments, point allocation instructions may provide instructions to allocate points in any other suitable fashion.

At step 10412, in various embodiments, the electronic processing device 405 may identify, by the positioning system, a location of the user. For example, device 405 may identify a latitude and longitude, a city, an intersection, a landmark, a building, an address, a room, a door, a proximity to an object, or any other indication of a location of the user.

At step 10415, in various embodiments, the electronic processing device 405 may compute, by an execution of the point allocation instructions and based on the location of the user, a second number of points. In various embodiments, point allocation instructions specify that the user is allocated a first number of points if the user is in a first location, and a second number of points if the user is in a second location. For example, if the user is in a particular room, the user is allocated five points, but the user is otherwise allocated zero points. In various embodiments, point allocation instructions may provide instructions to allocate points in any other suitable fashion. In various embodiments, it may be desirable to confirm that a user is in a particular location, because an authentic user would likely be in that location (and, e.g., an imposter would not likely be in that location).

In various embodiments, the user's location may be computed in other ways. In various embodiments, electronic processing device 405 may prompt the user to sequentially orient the camera in a plurality of directions; capture, by the camera and at each orientation, an image of an environment surrounding the user; and compute, by an execution of the referential instructions based on the images of the environment surrounding the user, the location of the user. For instance, referential instructions may cause device 405 to compare the images of the environment to known images, locations, landmarks, etc. If there is a match, it may be presumed that the user is currently located at the same location as the known images, locations, landmarks, etc.

At step 10418, in various embodiments, the electronic processing device 405 may sense, by the microphone, background noise in an environment of the user. For example, the device 405 may sense the sound of machinery in the background, the sound of a dog barking, the sound of traffic from a highway in the background, the sound of planes taking off from an airport in the background, and/or any other background noise.

Device 405 may retrieve stored data descriptive of reference background noise. The reference background noise may represent noise that is associated with the authentic user. For example, the reference background noise may be background noise that had previously been recorded in the background of the authentic user (e.g., at the authentic user's house, at the authentic user's office, etc.). The reference background noise may be a pre-recorded sound of a dog barking in an environment of the user.

At step 10421, in various embodiments, the electronic processing device 405 executes the referential instructions to identify a deviation of the background noise to a stored data descriptive of reference background noise. The referential instructions may instruct device 405 to determine a deviation in terms of volume level, frequency content, type of sound (e.g., cars, dogs, birds, machinery, etc.), voices heard, spoken words heard, and/or any other type of deviation.

At step 10424, in various embodiments, the electronic processing device 405 computes, by an execution of the point allocation instructions, and based on the deviation of the background noise, a third number of points. In various embodiments, point allocation instructions may specify a maximum number of points that may be allocated (e.g., 10 points), and may specify that some number of points is to be deducted from the maximum number that is proportional to the deviation of the background noise. For example, if the background noise deviates by 10% from the reference background noise, then there are 9 points allocated, e.g., 10×(1-10%) points allocated. In various embodiments, point allocation instructions may provide instructions to allocate points in any other suitable fashion.

At step 10427, in various embodiments, the electronic processing device 405 senses, by the accelerometer, a movement of the user. In various embodiments, the electronic processing device 405 identifies, by an execution of the referential instructions and based on the movement of the user, a gesture corresponding to the movement of the user. For example, referential instructions may include reference movements against which the movement of the user may be compared. Each reference movement may be associated with a reference gesture. Where the movement of the user is most closely matched to a particular reference movement, a gesture associated with the reference movement may be ascribed to the user. In various embodiments, a gesture of the user may be identified in any other suitable fashion.

In various embodiments, referential instructions include reference movements or gestures of the authentic user.

At step 10430, in various embodiments, the identified gesture and/or movement of the user may be compared to a reference movement or gesture of the authentic user. A degree of similarity or dissimilarity may be determined. An amount of deviation may be determined. In various embodiments, any other suitable comparison may be made between the identified gesture and a reference movement or gesture of the authentic user.

At step 10433, in various embodiments, the electronic processing device 405 may compute, by an execution of the point allocation instructions and based on the gesture, a fourth number of points. In various embodiments, point allocation instructions may specify a number of points to be allocated based on a degree of similarity, dissimilarity, and/or deviation of the identified gesture and a reference movement or gesture of the authentic user. For example, a maximum of 6 points (for example) may be allocated, with 1 point deducted from the maximum for each 10% deviation of the identified gesture from a reference gesture. In various embodiments, point allocation instructions specify that a predetermined number of points will be allocated if the identified gesture matches a reference gesture, and no points will be allocated otherwise. In various embodiments, point allocation instructions may provide instructions to allocate points in any other suitable fashion.

At step 10436, in various embodiments, the electronic processing device 405 may calculate, based on the first, second, third, and fourth numbers of points, an authorization score. In various embodiments, the electronic processing device 405 adds up the respective numbers of points. In various embodiments, the device 405 multiplies the respective numbers of points. In various embodiments, the device 405 adds up the three highest numbers of points (or the N highest for some number N). The device 405 may calculate an authorization score in any other suitable fashion.

In various embodiments, an authorization score may be calculated based on more or fewer numbers of points (e.g., based on only three numbers of points rather than four; e.g. based on two numbers of points; e.g., based on five numbers of points, etc.). In various embodiments, an authorization score is further calculated based on a fifth number of points. In various embodiments, an authorization score may be determined based on any other factors in addition to and/or besides the aforementioned (e.g., in addition to and/or besides query responses, location, etc.). In various embodiments, an authorization score may be determined based on any subset, superset, combination, etc., of the aforementioned factors and/or of any other factors.

In the aforementioned discussion, ordinal references such as "first", "second", etc., are made for convenience only, and do not imply that the user must take actions or receive points in any particular order. Nor do such references imply that any given action is a precondition or must occur at all in order for another action to occur. For example, in various embodiments, a user may obtain the second number of points without obtaining the first number of points (or without even having the opportunity to obtain the first number of points).

At step 10439, in various embodiments, the electronic processing device 405 identifies that the calculated authorization score meets a threshold criterion for authorization. In various embodiments, the authorization score must exceed a predetermined threshold number (e.g., must exceed the number 10). In various embodiments, the authorization score must fall below a predetermined threshold number.

At step 10442, in various embodiments, the electronic processing device 405 authorizes, in response to the identifying that the calculated authorization score meets the threshold criterion for authorization, the first user to access a resource. Authorization may include transmitting, by the network device, a wireless command indicative of the authorization for the first user to access the resource.

In various embodiments, "points" need not be numerical, but may represent any tally, record, quantity, fraction, portion, piece, component, etc. For example, in various embodiments, a user receives a piece of a puzzle for a query response, another piece of a puzzle for a movement, etc. The user may ultimately receive authorization if he receives enough pieces to complete the puzzle.

In various embodiments, the resource may be an electronically-actuated access device, a computing device, and/or an electronic storage address.

In various embodiments, the electronic processing device 405 captures, by the camera, an image of an environment surrounding the user (e.g., an image of the user's workplace, an image of the user's home, etc.). In various embodiments, the electronic processing device 405 identifies an object in the image (e.g., with object recognition algorithms). In various embodiments, the electronic processing device 405 prompts (e.g., via an audible instruction output from a speaker) the user to provide an identification of the object. In various embodiments, the electronic processing device 405 receives, in response to the prompting, a user-indicated identification of the object (e.g., a verbal response received at a microphone 4014 of the headset 8000).

In various embodiments, the electronic processing device 405 compares the user-indicated identification of the object to the identification of the object by the electronic processing device.

In various embodiments, the electronic processing device 405 computes, by an execution of the point allocation instructions and based on the comparing, a fifth number of points. In various embodiments, point allocation instructions specify that a predetermined number of points will be allocated if the user-indicated identification of the object matches the identification of the object by the electronic processing device and no points will be allocated otherwise. In various embodiments, point allocation instructions may provide instructions to allocate points in any other suitable fashion.

In various embodiments, the electronic processing device 405 senses, by the biometric device, a biometric reading of the user (e.g., a voice print, retinal image, iris image, etc.). In various embodiments, the electronic processing device 405 computes, by an execution of the point allocation instructions and based on the biometric reading, a fifth number of points. In various embodiments, point allocation instructions specify that a predetermined number of points (e.g., five points) will be allocated if the biometric reading matches a stored biometric reading from the authentic user and no points will be allocated otherwise. In various embodiments, point allocation instructions specify that a number of points will be allocated, up to a predetermined maximum number of points, based on (e.g., proportional to) the degree or confidence of a match between the biometric reading and a stored biometric reading from the authentic user. In various embodiments, point allocation instructions may provide instructions to allocate points in any other suitable fashion.

In various embodiments, the electronic processing device 405 identifies an electronic device in proximity to the location of the user (e.g., a security camera); transmits a command to the electronic device, the command being operable to cause the electronic device to output a verification (e.g., to send a wireless signal to headset 8000); detects an indication of the verification; and computes, by an execution of the point allocation instructions and based on the detecting of the indication of the verification, the fifth number of points.

Various embodiments comprise a headset for authenticating a first user based on verification of the first user by a second user. The headset may comprising an arcuate housing operable to be removably coupled to a head of a first user; an electronic processing device (e.g., processor 405) coupled to the housing; a camera in communication with the electronic processing device; a speaker in communication with the electronic processing device; a microphone in communication with the electronic processing device; a network device in communication with the electronic processing device; and a memory. The memory may store (i) human identification instructions, (ii) speech recognition instructions, and (iii) processing instructions that, when executed by the electronic processing device, result in one or more embodiments described herein.

In various embodiments, the electronic processing device (e.g., processor 405) may identify a proximity of a second user with respect to the first user. In various embodiments, the electronic processing device may identify, by an execution of the human identification instructions, the second user.

The electronic processing device may identify the second user by matching a portion of an image captured of an area proximate to the first user that is captured by the camera, to stored data descriptive of a plurality of users. Based on the matching, the electronic processing device may identify an association between the portion of the image and the second user.

In various embodiments, the electronic processing device may determine that the second user is a member of a trusted group of users.

The electronic processing device 405 may output, by the speaker, an audible instruction requesting that the second user verify an identity of the first user. Device 405 may compute a distance to the second user, and select an output volume based on the distance to the second user.

The electronic processing device may receive, by the microphone, a verbal response from the second user. The device 405 may compute, by an execution of the speech recognition instructions and based on the verbal response from the second user, an indication of a verification of the first user by the second user. The device 405 may authorize, in response to the computing of the indication of the verification of the first user by the second user, the first user to access a resource.

In various embodiments, authorizing may include transmitting, by the network device, a wireless command indicative of the authorization for the first user to access the resource.

Turning now to FIG. 92, illustrated therein is an example process 9200 for granting access to a secure location, which is now described according to some embodiments. For purposes of illustration, process 9200 will be described in the context of room 6900 of FIG. 69, although it will be appreciated that process 9200 may occur in any applicable location. In various embodiments, process 9200 may be performed by a headset 4000 worn by a user (e.g., "user 1" 6985*b*) who is seeking access to a secure location (e.g., the "Laser facility" behind door 6905. In various embodiments, process 9200 may be performed in conjunction with one or more other devices, such as central controller 110.

At step 9203, headset 4000 may receive a request for user 1 to access a secure location, according to some embodiments. The request may come from user 1. For example, user 1 may verbally ask to open a particular door or enter a particular room. The request may be implied, e.g., because user 1 is standing next to a particular door. In various embodiments, the request may come from another device. For example, an electronic door lock proximate to user 1 may initiate the request on behalf of user 1. The request may come from central controller 110, such as after user 1 has expressed a desire to the central controller 110 to access the secure location. For example, user 1 may interact with an app and use the app to request entry into the secure location. In various embodiments, the request may come from any applicable party and may occur in any suitable fashion.

At step 9206, headset 4000 may locate a second user ("user 2"), according to some embodiments. The purpose of locating user 2 may be so that user 2 can confirm the identity of user 1 and/or otherwise indicate approval for user 1 to receive access to the secure location.

In various embodiments, user 2 may confirm that user 1 is dressed appropriately (e.g., is not wearing a tie or other clothing that can be caught in equipment), that user 1 is wearing appropriate safety equipment, that user 1 is competent (e.g., user 1 does not appear to be intoxicated; e.g., user one does not appear to be fatigued), that user 1 is not under duress, and/or that user 1 is otherwise in a suitable state to receive access to the secure location.

In various embodiments, headset 4000 seeks to locate a second user that is proximate in location to user 1. In this way, for example, user 2 may directly observe user 1 (e.g., visually observe use 1). User 2 may also directly listen to user 1, smell user 1 (e.g., to detect the smell of alcohol), or otherwise interact with user 1.

In various embodiments, headset 4000 seeks a particular individual (e.g., a plant manager) to observe user 1. In various embodiments, headset 4000 may seek any of a group of individuals, or any individual who happens to be available (e.g., nearby).

In various embodiments, headset 4000 may locate user 2 via another headset or other device worn by user 2. Headset 4000 may pick up a Bluetooth®, Wi-Fi®, radio, or other signal (e.g., a short-range) signal from the device worn by user 2, thereby inferring the presence of user 2. In various embodiments, headset 4000 may locate user 2 via the central controller 110. For example, the central controller may be in communication with headset 4000 and with a device associated with user 2 (e.g., with user 2's headset). User 1's headset and user 2's device (e.g., headset) may each have positioning sensors (e.g., GPS). User 1 and user 2's devices may need to report their respective positions to the central controller. The central controller may thereby determine whether user 2 is proximate to user 1. If user 2 is proximate to user 1, the central controller may indicate such proximity to headset 4000.

In various embodiments, headset 4000 may detect user 2 via sensors, including a camera, image sensor, infrared sensor, motion sensor, microphone, or via any other suitable sensor. In various embodiments, camera 4022*a* and/or 4022*b* may capture an image of user 2. Processor 4055 may use face-detection or face-recognition algorithms to recognize the presence of a person (i.e., user 2) in the image.

In various embodiments, user 2 may be specifically identified from an image captured by headset 4000. Headset 4000 (or central controller 110) may scan through the authentication database table 3600 to find image data (field 3606) most closely matching a captured image. The user ID for the associated user may then be found at field 3604 for the matching row.

In a similar fashion, user 2 may be specifically identified from audio captured by the headset 4000. Audio data may be compared to stored "Voiceprint" data (field 3612), in order to determine the user ID for a matching voiceprint. In various embodiments, user 2 may be identified via iris or retinal scans (field 3610), or in any other fashion.

In various embodiments, microphone 4014 may detect user 2's voice, footsteps, or some other sign of user 2. Voice recognition or other audio processing algorithms may be used to detect or confirm the presence of user 2.

In various embodiments, user 1 may see or hear user 2 himself, and then, e.g., report the presence of user 2 to headset 4000.

In various embodiments, user 2 may be located in any suitable fashion.

In accordance with the present illustrative example, user 2 may be user 6985*a*, since this user is proximate to user 1 6985*b* and is therefore in a good position to identify user 1 and/or otherwise observe user 1.

At step 9209, headset 4000 may determine that user 2 is one of a group of trusted users, according to some embodiments. In various embodiments, a determination that user 2 is an employee of a company (e.g., user 2 is listed in user table 700 and/or in employees table 5000) is sufficient to establish that user 2 is a trusted user. In various embodiments, user groups table 1500 includes a group of trusted users (e.g., a group of users known to work at a particular facility). If user 2 is a member of this group (i.e., as indicated at field 1512), then user 2 may be deemed to be a trusted user. In various embodiments, if user 2 has at least a minimum security level (e.g., as indicated in field 5018 of employees table 5000), then user 2 may be deemed to be a trusted user. Headset 4000 may determine that user 2 is a trusted user in any other suitable fashion.

At step 9212, headset 4000 may ask user 2 to identify user 1, according to some embodiments. In various embodiments, a speaker (e.g., speaker 4010*a* and/or 4010*b*) may output audio at a sufficient volume so as to be audible to user 2, even though user 2 is not the person wearing the headset. In various embodiments, the headset may first warn user 1 to take the headset off his ears so as not to hurt his ears with the louder-than-usual output. In various embodiments, headset 4000 may include an externally directed speaker 4074 (i.e., a speaker not directed to the wearer of the headset), and may employ this speaker to output audio to be heard by user 2.

In various embodiments, headset 4000 may transmit a message to a device of user 2 (e.g., to user 2's headset). The message may be, for example, "Please look over at the person standing by the entrance to the laser room, and say their name." In various embodiments, headset 4000 may take on a noticeable appearance (e.g., headset 4000 may display flashing red lights), so it is clear to user 2 whom user 2 should identify. In such a case, a message may be, for example, "Please look over at the person with the flashing red headset, and say their name."

In various embodiments, headset 4000 may visually convey a message to user 2, such as by displaying text for user 2 to read (e.g., via display 4046).

In various embodiments, rather than asking user 2 to explicitly identify user 1, headset 4000 may ask user 2 to confirm the identity of user 1. For example, headset 4000 may ask user 2 to confirm that user 1 is "Joe Smith".

In various embodiments, user 2 is asked only to show support for (e.g., to approve) user 1's request for entry or access.

At step 9215, headset 4000 may receive a response from user 2, according to some embodiments. The response may be a verbal response from user 2, and may be received, e.g., at microphone 4014 of the headset. In various embodiments, a "thumbs up", a head nod, or other gesture showing approval for user 1's request may be received, e.g., at camera unit 4020. In various embodiments, a response may come in any other form, such as an electronically transmitted message from user 2 to headset 4000.

At step 9218, headset 4000 may determine, based on the response, an identity of user 1, according to some embodiments. Headset 4000 may use speech recognition algorithms to determine user 1's name from user 2's verbal response, which presumably contains user 1's spoken name. If user 2 has indicated approval for user 1, then headset 4000 may determine that an identity that was previously presumed for user 1 (e.g., an identity that was provided by user 1) is in fact correct. If user 2 has provided a text message with user 1's identity, then user 1's identity may be read from the text message.

In various embodiments, headset 4000 may correct for any nicknames, misspelling, mispronunciations, etc., that may be contained in user 2's response. For example, headset 4000 may compare a first name contained in user 2's response to a list of one thousand common names, and assume user 2's response represents the most closely matching name from the list. The headset 4000 may perform a similar procedure for user 1's last name, for user 1's middle name, for user 1's salutation, for user 1's suffix (e.g., "Jr.") and/or for any other names or identifiers for user 1.

At step 9221, headset 4000 may determine, based on the identity of user 1, that user 1 is one of a group of trusted users, according to some embodiments. In various embodiments, confirmation that user 1 is one of a group of trusted users may occur along the same lines as how the determination was made for user 2 at step 9209.

At step 9224, headset 4000 may authorize user 1 to access the restricted location. If the headset has determined that user 1 is one of a group of trusted users, then headset 4000 may authorize user 1 to access the restricted location. In various embodiments, final authorization is provided by a separate entity (e.g., by central controller 110). The separate entity may rely upon identification and/or confirmation provided by user 2, which may be relayed to the entity via headset 4000, in various embodiments.

In various embodiments, once user 1 has been authorized, an electronic door lock may be opened, headset 4000 may show green lights or other indications of authorization for user 1, and/or any other event may transpire.

Process of 9200 has been described herein with respect to granting authorization for user 1 to enter a secure location. Various embodiments contemplate that a similar process may be used for granting access or permission for user 1 to view a document, view a resource, listen to a conversation, speak to an individual, take possession of an item, be left in an area alone or unsupervised, access a network, access a computing system, use a piece of equipment, and/or take any other action of a sensitive nature, and/or take any other action.

Sensors

The headset could be equipped with various off the shelf sensors that allow for collection of sensory data. This sensory data could be used by the various controllers; headset, computer, game and central AI controllers to enhance the experience of the user(s) in both the virtual world (e.g. the game or virtual meeting) and physical world (e.g. exercise, meetings, physical activities, coaching, training, health management, safety, environmental and other people using headsets). The data collected from the sensors could also provide both real-time and post activity feedback for improvement. The sensors could be embedded directly in the headset or attached as an add-on accessory. The sensors could also be powered using the internal power management system of the headset or run independently using battery power. Data collected could flow from the sensor to headset processor 405 to user device 107*a* (if connected) to central controller AI where the data is stored and interpreted. Once processed the data is returned to the headset using the reverse data flow.

Examples of sensors that could be included in the headset and their uses are as follows.

Accelerometer

An accelerometer is an electromechanical device used to measure acceleration forces. Such forces may be static, like the continuous force of gravity or, as is the case with many mobile devices, dynamic to sense movement or vibrations. This sensor headset could be used to detect head movements and the information processed through the controllers which could be made available to the owners of the headset, participants and virtual players (e.g. games). Furthermore, this sensory data could also invoke responses from other accessories on the headset (e.g. lights, microphone, cameras, force, vibration). The following are examples.

In various embodiments, a headset may detect (e.g., using an accelerometer) whether or not a meeting participant is currently nodding in agreement or shaking their head from side to side to indicate disagreement. The physical movement could alert the meeting owner or participant of their vote without actually getting a verbal response or selecting a choice.

In various embodiments, a headset may detect head movements along a continuum so that the participant can indicate strong agreement, agreement, neutrality, disagreement, or strong disagreement based on the position of their head in an arc from left to right.

In various embodiments, a headset may detect whether a person is getting sleepy or bored by having their head leaned forward for a period of time.

If a head turns abruptly, this could indicate a distraction and mute the microphone automatically. When a dog enters or someone not a part of the meeting (a child), oftentimes people turn their head quickly to give them attention.

In various embodiments, a headset may detect whether someone has been sitting for long periods and the headset used to remind the wearer to take breaks and stand up.

In various embodiments, head movements coupled with other physical movements detected by the camera could be interpreted by the central controller. For example, if a participant's head turns down and their hands cup their face, this may be a sign of frustration. Fidgeting with a headset might be a sign of fatigue.

The central controller could interpret head movements and provide a visual overlay of these movements in video conferencing software. For instance, the central controller could interpret a head nod and overlay a "thumbs up" symbol. If the central controller detects an emotional reaction, it could overlay an emoji. These overlays could provide visual cues to meeting participants about the group's opinion at a given moment.

In various embodiments, movements of the head could be superimposed on an avatar in a game giving them movements similar to the player. Movements could also directly control a game character's movements, the use of objects in a game, or as a data input method.

In various embodiments, detachable accelerometers could be placed on other locations of the body to measure force during an activity. This could be applied to the leg to measure force during an exercise or used to mirror the movement of a person for superimposing on an avatar.

Thermometer

Various embodiments include a sensor to measure the wearer's temperature and the ambient temperature of the room. The headset could be equipped with sensors to collect temperature. The temperature could be collected through an in-ear thermometer or external to the body. As the temperature is collected, changes in body or ambient temperature could be sent to a central controller for user awareness and possible actions.

The central controller 110 could record the user's temperature to determine if the user is healthy by comparing current temperature to a baseline measurement. If elevated, alerts could be sent to the user for possible infection. The central controller could determine if the individual is hot or cold and send a signal to environmental controls to change the temperature of the room. The central controller could use temperature to determine fatigue or hunger and send a signal to the wearer or the meeting owner to schedule breaks or order food. The central controller could use ambient temperature information to alert the user to dress warmer or remove clothing to cool.

The central controller could use body and ambient temperature data to mirror game play. If the player is cold, the avatar could dress in a coat. If the room temperature is hot, the avatar could sweat and dress in shorts. Likewise, the ambient temperature could determine the landscape of the environment the game is played. A warm room could have the avatar playing in the desert.

Visual Motion

Visual motion can be used to indicate position and physical movement that invokes functions on a headset or its other connected devices.

In various embodiments, the headset could have a camera that detects whether or not the user's mouth is moving and then check with virtual meeting technology to determine whether or not that user is currently muted. If they are currently muted, the headset could send a signal to unmute the user after a period of time (such as 10 seconds), or it could trigger the virtual meeting technology to output a warning that it appears the user is talking but that they are currently muted.

The headset could have a camera that detects if a person is quickly approaching and alerts the user to move out of the way.

The headset could have a camera that detects the movement of a person and displays the movements on the avatar in a game setting.

The headset could have a camera that detects physical movements that are interpreted by the central controller. If a person is frustrated, they may throw up their hands, cross their arms, clinch their fists or not smile. This information could be interpreted by the central controller to inform the user how their movements are being portrayed or to the meeting owner to modify their approach for the user.

The visual motions could be captured and used as virtual coaching in various activities. If two people have cameras and participate in a dance, the virtual coach could, through the central controller, could provide feedback to both participants on corrections to the dance movements.

Chemical Diffuser

Smells evoke strong memories, mask other scents and can be used as relaxation therapy. The headset could contain a chemical diffuser to produce a scent. This diffuser could counteract a smell in the room, use aromatherapy to calm an individual, evoke a particular memory or experience, or evoke a particular physical place or environment.

For example, during a meeting, participants become agitated about a change in scope. The central controller or meeting owner may recognize this and produce a scent of fresh baked cookies or lavender to calm the individuals or cause them to think about more pleasant things.

Travelling in a confined space could put the user in surroundings with unpleasant smells. The headset or owner could recognize this and diffuse a cleaner aroma, such as freshly washed linens.

Accessory to Headset Sensor

Other external accessories could be paired with the headset to work together to produce a response that could be used as behavior modification or collection of data for reporting and measuring to the user.

In various embodiments, the headset could be paired with a Wi-Fi® ring/smart watch which could set off an alarm in the headset (e.g. vibration, cooling/heating, sound) when the user's hand approached their face. This could allow presenters to avoid distracting an audience by touching their face, or it could be used to remind participants not to touch their face when flu season is in full swing.

Some users have habits of tapping their feet during meetings or while waiting causing distractions around them. A sensor in their shoe could produce an alert in the headset when the user's foot is tapping excessively.

The headset could be paired with an electronic pen that recognizes when someone is writing too much during a meeting and indicating a lack of attention or using the pen to tap the table as a nervous behavior. In both cases, the headset could produce an alarm/alert to notify the user to stop the behavior.

Galvanic Sensor

The headset could contain galvanic skin response sensors or sweat sensors. The central controller could record the galvanic skin response or the rate of sweat to determine whether the wearer is healthy by comparing the current measurement to a baseline measurement.

In various embodiments, an athlete uses the headset during a workout. During the workout, the galvanic sensor could collect data to determine that the athlete is not sweating to the same degree as previous exercises of similar intensity. The information is sent to the central controller and results provided to the athlete letting the user know they could drink more electrolytes or take a break.

In various embodiments, a headset may create awareness of nervousness. During a presentation the user of a headset may not recognize they are sweating prior to a presentation. The central controller could inform the user that this is taking place so they can engage in relaxation exercises to get control of their emotions.

A user plays a game using a headset and the intensity of the game increases causing the user to sweat. This reaction could be displayed on the avatar, causing the avatar to sweat. In addition, the other players of the game could be made aware so they know to keep up the pressure in an effort to win the game.

As women age, hot flashes occur regularly, but seldom are tracked for medical intervention. The headset and central controller could measure the random sweats for analysis. The quantity and intensity of the hot flashes could be made available to medical personnel for evaluation and treatment.

Electroencephalography (EEG) Sensor

An EEG measures brain wave activity of a person and is used as a first-line method of diagnosis for tumors, stroke and other focal brain disorders. Mental faculties also measured through EEG include cognitive skills such as language, perception, memory, attention, reasoning, and emotion. The headset device could measure brain wave activity using EEG sensors. This data could be sent to a central controller and used to measure brain health both immediately and overtime. It could also be used to measure activity during activities, both while awake and asleep. This information could be used by the user for awareness, to dynamically modify responses or provided to the intended physician. In the case of severe issues indicating abnormal brain activity, alerts could be sent to medical personnel or identified caregivers.

Further details on how headsets can be used as an EEG can be found in U.S. Pat. No. 10,076,279, entitled "System and method for a compact EEG headset" to Nahum issued Sep. 18, 2018, at columns 11-14, which is hereby incorporated by reference.

In one example, a worker using the headset consistently attends strategy meetings in the early morning. While work may be done, the sensors detect areas of the brain that are not functioning as well when compared to other times of the day. While there is no health issue, the information collected by the central controller could inform the user that conducting these types of meetings later in the day may provide better results.

Oftentimes people must recall images, facts and experiences, but it is difficult. Using the headset, the user could be informed through the central controller that areas of the brain responsible for memory are not functioning to the level needed. The central controller could suggest exercises to improve memory for improved performance and recall.

Games provide an experience that could be dynamically adjusted based on EEG data. If a user is playing a game (or has played the same game multiple times), the headset and central controller could determine that the user is bored or the game is not giving the level of excitement as expected. The brain activity may be much less than expected. In this case, the game could dynamically change to add a more challenging task or introduce environmental stimulus in the game. Furthermore, the environment itself could change to dim or brighten room lights, introduce noise in the headset or provide force/vibrations to the user.

Many times people exhibit emotions that are not observed. The headset could measure if a person is happy, sad or even angry. In the case of a status update or performance review, if someone is having a 'bad' day, the employee's boss could have information and determine if rescheduling is more appropriate. The headset could inform the boss through audio alerts or information sent prior to the meeting.

During a town hall meeting an executive delivers information about a new program for employee development. While the creators of the program believe this is what the employees want and need, they do not know how well it will be perceived. The headsets on each employee could provide immediate information as to how well the new program is perceived by the employees. If the program is not perceived well, the EEG data collected and analyzed by the central controller could immediately be sent to the creators. The delivery of information could change or additional feedback gathered from employees to make the program more appealing.

Heart Rate Sensor

The heart rate sensor could measure heart activity and provide indications of overall heart health or level of excitement. With all health data, the heart rate information could be sent to the central controller 110 and to the user's insurance company, physician, games or others the person is engaged. The data could be collected for evaluation over time, immediate feedback/action or discarded. It provides more data points for both the user and physician to monitor the overall health of an individual or other parties and games. In the case of severe data, immediate response can be provided to the user to take action and contact a health professional. For more casual uses, the heart rate data may be used as a way to gauge excitement in an activity (game, performance, meeting) or engagement overall (conversation) with recommendations for relaxation or to influence player strategy. Furthermore, to create a more connected experience, the user participating in games or other activities could sense the heart rate of other people.

In various embodiments, a user may not realize the variation of their heart rate during times of sedentary activity. The heart rate could be collected by the headset and analyzed by the central controller 110. If the variation in heart rate is significant, the user and associated health provider could be informed for awareness and corrective action.

Workers may be put in stressful situations causing the heart rate to increase, but they are unaware. If the heart rate increases before or during a task, the headset could inform the user that this is taking place and provide calming background noises or recommendations for relaxation techniques.

Gamers could sense the heart rate of other players. If a person is playing a war game and their opponent is being attacked, their heart rate could be elevated indicating excitement or nervousness. The player, with a headset could receive the heart rate of the opponent through a pulse in their ear, a force in the headset or a blinking light. The game itself could also reflect the same heart rate on the avatar.

Irregular heart rates can lead to serious health issues. The continual heart rate of the user could be collected through the headset. If the rate changes are recognized by the central controller as being abnormal, the information is sent to medical personnel and the user for immediate action.

Metabolite Sensor

A metabolite sensor is defined as a biological molecule sensor that detects the changes/presence of a specific metabolite and transmits the information of metabolite abundance into biological networks. The headset could contain metabolite sensors. The central controller could record the metabolite generation to determine whether the wearer is healthy by comparing the current measurement to a baseline measurement. The metabolite sensor in the headset could measure the cell activity/composition and transmit the results to a central controller that determines the abundance of cells, nutritional status and energy status of the user. Levels determined by the controller could be used to alert the user or physician of necessary actions.

In one example, the user of the headset may feel a bit worn out. The headset could inform the user that their nutritional levels responsible for cellular/molecular health are at levels lower than expected. Recommendations of proper eating to improve the user's health could be sent.

Gamers spend many hours sitting and engaging with others in computer games. Over time, they may forget to eat which could impact their playing skills. The headset could evaluate the player's metabolism and provide information on eating to improve attention and skill.

Someone taking prescription or over the counter drugs may not realize they are impaired. The user wearing the headset could be alerted if the sensor detects they have been taking a drug for which they may be impaired. This alert could protect the user and others.

Oxygen Sensor

Sensor to measure oxygen levels. Oxygen level is a key indicator of overall health fitness. The headset could read and monitor oxygen levels. Depending on the level, the device may alert them via colors, sounds, vibration or on-screen display to take deeper breaths. If oxygen levels are detected at a significantly low level, others in the area with mouse-keyboard enabled devices could be alerted or 911 calls made. All data is sent to a central controller.

People may feel fatigued or tired during normal day to day activities. This could be a result of low oxygen levels. The headset is continually monitoring oxygen levels. If these drop or show a progressive drop over a period of time, the headset could inform the user to take deep breaths to increase oxygen levels.

During exercise, people will sometimes forget to breathe and cause them to get light headed and faint or fall. The headset could monitor oxygen levels during this activity and prompt the user to breath if levels are decreased.

Photoplethysmography Sensor

Photoplethysmography (PPG) is a simple optical technique used to detect volumetric changes in blood in peripheral circulation. It is a low cost and non-invasive method that makes measurements at the surface of the skin. The sensor could be enabled through the headset touching the skin or remotely using the camera.

For example, the photoplethysmography sensor could be included in the headset to measure cardiac health. If the sensor, through the central controller, indicates low blood volumetric flow, the user could be notified that they may have a heart condition or other health related conditions that require medical attention.

Impairment

In various embodiments, a person may be considered impaired under one or more conditions. When considered impaired, a person may be denied access (e.g., to a location; e.g., to the use of equipment; e.g., to sensitive information) or privileges and/or any other abilities.

In various embodiments, a person is considered impaired if their blood alcohol level (BAC) is above a certain threshold (e.g., above 0.05%; e.g., above 0.08%); if blood oxygen levels are below a certain threshold (e.g., below 88%); if carbon dioxide levels are below a certain threshold, e.g., 23 mEq/L (milliequivalent units per liter of blood) or above a certain threshold, e.g., 29 mEq/L; if opioid levels above a certain level (e.g., blood serum oxycodone levels above 50 ng/ml); if delta9-THC-COOH (a metabolite of marijuana) levels in urine are above 50 ng/mL; and/or if any other applicable criteria are met.

Force Sensor

Headphones according to various embodiments, are equipped with sensors to adjust the force (e.g. squeezing) or vibration (e.g. buzzing, vibrating) or electrical sensation in the padding on a headphone/headband. There could be situations where a user wants a more passive approach to alerting someone or enhancing an experience (e.g. computer game) where a typical audio voice may be disruptive. The headset/presentation controller could be used to not only deliver the intended force to someone else, but also receive a force signal.

The presentation controller could be used for the meeting owner to contact the meeting participant. For example, a meeting owner may need to ask a question specific to another person without others hearing in the room. They could speak the user's name in the presentation controller and it could get the attention of the other person via the intended sensation (e.g. buzz, vibration, apply force as a squeeze) Also, they could use the same capability to request the meeting participant to engage in the discussion.

Game players could alert/contact other players to challenges in the game via sounds, vibrations and forces with headsets.

Game players could feel the vibration of a gun shoot, movement of another player, explosion by having the headset vibrate.

Game players could sense through vibration, pulsing or headset squeezing the breathing rate and heart rate of another player. This could intensify the excitement level and connectedness of the players. In addition, the force/pressure sensor could adjust as well to provide a sense of feeling the breathing rate.

Game players could feel the force/pressure of the headset when a gun is fired, explosion heard or intensity of a game increases.

In cases where a user is wanting to eliminate a bad behavior, the headset could vibrate, buzz or provide force when the headset recognizes they are engaging in the bad behavior. If the attached camera recognizes the person is reaching for a cigarette, the headset could buzz to remind them to not smoke. Likewise, If a meeting participant has consumed a considerable amount of time speaking in a meeting, or feedback was collected from other participants, the person could be alerted. The microphone could pick up on the voice of the intended speaker and immediately vibrate reminding them to not speak or carefully consider their contribution in the meeting.

The headset could act as a reminder to complete tasks or collect items. For example, if the central controller recognizes patterns of an individual it could store these and remind users if they miss collecting items or completing tasks. If the user leaves work each day and collects their ID badge, lunch, briefcase, laptop, cell phone, gym clothes and kids backpacks, the headset could recognize each day if any of these items are not collected and remind the user through alerts (e.g. audio, pictures, vibrations, forces or buzzes). The items not collected could be gathered and the central controller recognizes if the user has completed all tasks/gathered items before departing.

Environmental Light-Time of Day Sensor

Light is a guide for people to determine time of day and also enhance the mood of an individual. Natural light is used as sensory input and for a user and also provides a reference for people. The light and cues assists people in performing functions and engaging others. Without visual light cues, people could feel a sense of isolation or not give others an understanding of the time of day a person is engaging (e.g. day, night, dusk, dawn). Various embodiments, through the headset, could simulate light for the user and provide an indication to the user of someone else's time of day.

A gaming user may be playing a game in the middle of the day when it is sunny. Their opponent, on the other side of the world, may be playing the game at night, in the dark. The headset could automatically provide a light to the person playing in the day while the person at night receives no light. Each player could have the game environment change to match the lighting conditions of the real environment.

Various embodiments include sound cues to match time of day. Light provides users with indications of time of day, but there are other auditory cues that can indicate time of day or support the time of day. For example, if a user is on a conference call early in the morning, the user could have auditory cues provided through the headset such as chirping of birds, school buses moving, coffee brewing, showers starting to name a few. Later in the day, around noon, the user may hear a noon siren that is common in many cities, bells ringing from a church to indicate time, rustling of lunch plates, or the mailman delivering mail. In the evening, the user may have more silence and calming noises, lullabies, rush hour traffic, or sporting event noises. These sounds, in combination with the light to simulate the outdoors, could provide the user with a more realistic experience of what is taking place around them throughout the day.

In various embodiments, a light controller monitors the lighting conditions and provides increased light where needed, automatically. For example, a user is working at home during the day with sunlight in their office. As the evening approaches, the light headset could automatically detect the room is getting darker and provide the light gradually to assist in the tasks being performed.

In various embodiments, a virtual display changes color to simulate local time for remote participants. Global conference calls are common in different time zones. As part of each participant's background, the headset could communicate to the central controller to lighten backgrounds for people working during the day and provide darker backgrounds for those working at night. This dynamically changing background environment could provide everyone with a visual cue regarding the time of day each person is working and a deeper appreciation for their surroundings.

In various embodiments, a headset may determine individual time-of-day productivity and use light control to extend productive periods. As people work at different times of the day, the headset could gather biometric feedback to determine the time of day a person is most productive. This time of day could be simulated using light for an individual using the headset. For example, if the headset collected biometric data indicates the person is most productive from 1:00 pm-3:00 pm in the day, but is forced to work from 8:00 pm-10:00 pm, the headset could simulate light from 1:00 pm. The light at 1:00 pm, even though it is 8:00 pm, could stimulate or trick the brain into thinking it was earlier and improve user productivity. This light could be enabled through both the inward and outward facing lights.

A headset according to various embodiments may include a task light. Users performing certain tasks need more lighting. For example, reading, sewing, cooking, routine home maintenance or cleaning require task specific light. The headset could recognize the task being performed (through the central controller) and automatically switch light on the headset for the user. The person sewing may need very targeted lighting, while the person doing routine home maintenance may need broad lighting with a wide angle.

Air Quality Sensor

Air quality is key to the health and productivity of people, in a work and recreational environment. Continually monitoring and measuring air quality in the form of pollutants, particles and levels, and alerting users to the conditions through the headset could assist in allowing the user to make different choices and protect their overall health.

In one example, a user is walking a baby through a crowded street at rush hour, they typically walk in the mid-morning when traffic is light and pollution is minimal. At rush hour, the headset could inform the user that the air quality is poor and recognizes high levels of CO/CO2 and other carbon emissions. The headset could also instruct the user on a different path allowing them to avoid the highly polluted area at that time.

In one example, a headset reports high levels of ozone. A user of the headset decides to go to the beach for a run. They have mild asthma and routinely run this path. On this day, the headset could inform the user that running should not take place as the levels of ozone could harm their lungs.

In one example, a headset reports carbon monoxide. The headset could detect high levels of carbon monoxide. Users of the headset could be alerted if carbon monoxide reaches dangerous levels in their home. The headset could provide audible alerts, messages in the earphones or light signals to warn the user to get out of the house.

Pliable Sensing Fabric

Headsets equipped with pliable sensing fabric could inform the device to turn on, off or adjust various controls. The pliable fabric contains small connected electronic signals that recognize when a device is moved or bent. As an example, when the headset is picked up and stretched apart to put on the ears, the sensor could detect this and automatically turn the device on and connect to the network. This saves time for the user. When the headset is removed, the reverse could occur and the device turned off.

Ambient Noise Sensors

Ambient noise level is the collection of all noise at one time. Given the sensors provide instructions and feedback in terms of audible announcements, it is important to measure the ambient noise levels, adjust the levels or provide instructions for the user. The headset microphone could have an ambient noise detector and continually provide this data to the central controller for analysis. In addition the overall collection of sounds being heard could be collected from the headset and processed by the central controller.

In various embodiments, a headset may adjust volume. There may be times when the headset and central controller need to inform the user of an impending danger. The ambient noise could be lowered so the announcement to the user is heard and the volume overall is acceptable to the user. There may be times when the user is listening to games, music and other sounds that are above dangerous hearing level. The headset could dynamically change sound levels to protect the hearing of the individual.

In various embodiments, a headset may filter sounds. The headset and central controller could detect ambient noise in the background and filter out the sounds before presenting the audio to other listeners. An example could be a dog barking or a baby crying while on a conference call.

In various embodiments, a headset may inform companies about situations regarding ambient noise. During periods of construction, a worker may be presented with sounds from many pieces of equipment (e.g. dump truck, loader, concrete mixing, welding) and activities. The headset could monitor the volume of all ambient sounds in the area for the user. If the sound level is too high for a period of time, the company could be informed by the central controller of the dangerous levels for the employee or reported to a governing agency. The user could also be informed by the headset to protect ears or leave the area.

Thermal Sensing Camera

The camera could include a thermal sensor to collect thermal readings from the user's surroundings and alert them accordingly.

In one example, a user with a headset enters their place of employment. As they greet various coworkers, the thermal sensor could measure the body temperature of those around them. If the sensor collects information and sends it to the central controller for analysis, it could indicate the body temperature is high. This may mean the person has a fever. The user is alerted through the headset (audio message/sound or forced alert like a buzz) of the condition of the person around them. The user could inform a person without a headset that they may be ill or simply avoid the individual to protect their health.

A person playing a game with a headset could involve others in the room in the game. A user may wish to display a character and their motions in a game which they are not playing. The thermal enabled camera on the headset could discover people in the physical room and display their character on the screen using their thermal image. The motions and avatar could represent the images collected by the headset and processed through the central controller.

360 DEGREE CAMERA

A 360 degree camera included in the headset invention allows for complete viewing of all activities of the user. This could be useful for detecting objects, people and movement from all angles supporting many of the embodiments from safety, recreation and exercise and gaming to name a few. Companies manufacturing 360 degree cameras include Ricoh® (THeta Z1™ as an example) and Insta360™ (One X™ as an example).

In one example, a person may be working with little distraction. Someone walking up behind the person may cause them significant fear. The headset with the 360 degree camera could alert the user that someone is approaching them from behind and alert them sooner.

A person running, walking, biking or any activity in a public area may want to be aware if someone is approaching them quickly from behind. Many accidents are caused due to people moving in front of an object/person that is approaching them from the rear (e.g. runner being hit by a bike or car, dog approaching pedestrians from the rear or someone walking to their car alone at night).

Light in Earphone

Lights in earphones could be used as indicators to others around a user or internal as a sensor to measure light absorption in the ear. Light absorption in the ear could be a way to determine wax buildup and inform the user of possible ear infections.

Ear wax is normal in most people, but the coloration of ear wax can indicate more serious issues. Dark brown/red wax could indicate an infection or bleeding, while clear or light yellow is acceptable. The color of wax absorbs light differently. Darker colors absorb more light while lighter colors reflect more light. The headset with a light in the earphone could produce a light to measure absorption and communicate the information to the central controller AI system. If the light is absorbed in the range for dark brown/colors, the user could be notified that they may have wax build up and to clean their ears or seek medical attention. The reading could indicate an infection or the onset of an infection.

The headphone colors could change to indicate to others if they are available or are participating in an activity that can be interrupted. For example, a user may be on a conference call and the central controller understands they are actively participating based on the amount of dialogue. The headphones could change to red indicating they can't be interrupted. If the meeting is on break, the headphones could change to yellow indicating to others that they are on a break and can talk briefly. If the user is listening to music, a podcast or an audiobook, the headphones could flash yellow indicating it is fine for someone to interrupt them. Finally, if the user is listening to white noise, the headset could be turned green allowing interruptions.

Form Factor

The physical device of the headset could accommodate/connect the various features including sensors and other named features: Accelerometer, Thermometer, Visual/Camera, Chemical, Accessory to headset, Galvanic, Electroencephalography, Metabolite, Oxygen, Force Sensor, Force Feedback, Environmental Light Controller, Air Quality, Photoplethysmograpghy (PPG) Sensor, Pliable sensing fabric, Heating and cooling, Thermal camera, 360 degree camera, headphone with light, water resistance, knobs, slide controllers, power input, microphone(s), cameras (inward, outward and 360 degree), flexible arm(s), plug and play, speakers, lights (camera, illumination, ultraviolet), ear cushions, ear lobe clip, volume controls, detachables/add-ons (e.g. sensors, accessories), laser, video screen, mouth protection guard, air diffuser, headset holder/clip, elastic headband, plug and play with game controllers, connections for USB, audio and micro-USB, and internal and external power supply.

The flow of information for these scenarios is from the headset processor 405 to the user device 107*a* (if connected to a computer) or central controller AI systems for interpretation and analysis. The analysis of results and response could be returned from the central controller to the user device 107*a* (if connected) and the headset processor 405 for response to the user. The connection directly to the central controller from the headset processor 405 can occur if there is not a connection to the user device 107*a* and a cellular connection exists. Likewise, the headset processor 405 can be used to collect sensory data and stored until uploaded to the central controller once a connection is established.

The collection of sensors and other functioning devices could be integrated to form a lightweight wearing headset. This lightweight device could make it more appealing for users of the device.

In various embodiments, a headset may be a modular device. In various embodiments, a headset may have wireless connectivity, such as with Bluetooth® Connectivity. There may be times when a user needs to share functions of their headset with others. This could include the sharing of audio (speaker content) or video content from a camera. In addition, the user may want to have another person participate in a conversation with their microphone audio or provide sensor information. These devices could be add-ons and connected to another person's device via Bluetooth® with connection and facilitation of communication enabled through the Bluetooth® enabled add-on device, the headset processor 405 and central controller AI system.

Various embodiments include a share function (e.g., to deliver information). For example, the owner of the headset device is on a conference call. The owner wishes to share their audio of the meeting with another person nearby. The owner could give the other person an add-on that is connected to their phone via Bluetooth® and listen to the conference call.

Headset Arm

In various embodiments, a headset has a flip up/down small display on the voice arm. The display screen could be used to view short video clips, communication chats with individuals or as an extra way to observe what the camera is displaying.

In various embodiments, an audio arm could act as a joystick, laser pointer or electronic pen. This could be a detachable arm that could be used as a pointer/presentation controller to be used in meetings, an electronic pen to be used for taking notes on electronic material or as a joystick to be used in various games.

In various embodiments, flipping down the flexible arm without talking starts a count up clock and increases priority overlays during a call. The functions of the arm could be used for more than holding the microphone or other accessories. They could also be used to invoke a timer, when moved down, the timer starts, when it is moved up, the timer is stopped. This could be useful during meetings when control of the agenda timing is necessary. Move the arm to the left and this mutes the person talking, move to the right and it advances the slide on the presentation. Flipping down the arm could also initiate a countdown timer of five minutes when a break has been called for a meeting.

In various embodiments, the headset arm has a camera facing the user (it could focus on the user's face, eyes, lips, jaw, or other parts of the face as required by various embodiments, and could even be pointed up to a ceiling or down to a floor).

In various embodiments, the headset arm contains a camera that could be pointed to the user to assist the hearing impaired to read lips. Many people with hearing loss read lips. A camera placed close to the lips and displayed for those with hearing loss and the ability to read lips provides a more complete experience for the hearing impaired. The user's lips could have a substance applied—such as a lipstick of a color that helps the lips stand out from the background of the user's face) which makes it easier for the camera to accurately measure the lip movements.

In various embodiments, a user may speak silently (i.e., uses lip movement which gets processed which then generates output as audio). There could be situations where the user wants to move their lips forming words and statements but does not want others around them to hear. The camera on the arm could collect the lip movements, process them through the headset processor 405 to user device 107*a* and the central controller AI system. The AI engine could interpret the lip movements and translate them to the listener in audio format, keeping the comments private. The AI engine could also create a running text transcript while reading the user's lips and scroll that text on a display screen of the user device 107*a* or on a display screen of the headset.

In various embodiments, a headset arm includes lights (forward and inward facing) are attached to the arm for use by the camera(s) or as illumination for the user during an activity.

Headband/Earphones

In various embodiments, the headband connects the two earphones across the top of the head. They are adjustable and provide various functions for the user.

In various embodiments, detachable headband/earphones becomes a speaker for others to hear. When others without a headset want to listen to the audio, the earphone on the headband could be detached and used by the other person. This earphone could have a moveable loop that could hang directly on the ear of the person so their hands are free to perform other tasks.

In various embodiments, the color and/or shape of the headband/earphone display indicates an employee's function/role at a company. The role of the employee, favorite sports team, name of the project, or other items could be established and sent from the central controller 110 or user device 107*a* and displayed on the headband/earphone display. For example, if I am a graduate of Cornell, the school mascot could display on the headband. Also, if I am an IT architect in a company, this role could be displayed on the headband and earphones.

In various embodiments, headbands/earphones create visible status indicators for others on a call or meeting. For example, if the meeting owner has completed a presentation and requests decision makers to vote on an option, the user could vote using the on device controller or computer and the headband/earphone displays the color of the vote, green for approval and red for denial.

Various embodiments include lights on or over the headband/earphone. These lights could be used to illuminate a document for reading, for security/safety in a dimly lit area of a city or parking lot, etc. The lights could be on flexible stalks to allow for pointing them in any direction.

In various embodiments, a headband may be bendable. Because the headsets have to fit over heads, the material could be pliable enough to stretch.

In various embodiments, the headset could contain a heating and/or cooling device to signal useful information to the wearer by a change in temperature. The device could turn cold to indicate they are next in line to speak, whether a prediction or answer to a question is accurate ("hotter/colder" guessing and response), becoming warm if the user is close to completing a level in a virtual setting or signal time remaining or other countdown function using temperature control. These temperature indications could be less disruptive than a sound or hearing a voice to signal these changes and give a gradient of awareness as well.

In various embodiments, the headband could be constructed of an elastic material that could be worn anywhere on the head.

In various embodiments, a headset may include a face/mouth guard. A mouth protection guard may include a plexiglass or plastic mouth shield (which could be made transparent or opaque). The protection guard could be moved from the top or side of the headset or to shield people from exhaled breath and protect from potential airborne pathogens.

In various embodiments, a headset may include a face/mouth guard that functions to hide part of the face or mouth. People have a need to conduct conversations on conference calls and in open spaces in a private setting, but there is a risk that such conversations might be compromised if people could read lips. The mouth guard could be pulled down from above or from the side of the headset to visually distort the mouth/lips and prevent people from reading lips. The guard could also be created to isolate the user's voice to only project into their headset's microphone and not to those around the user, thus creating a more secure conversation.

In various embodiments, speakers are included in the earphones for amplification of sounds received to the headset. In addition, speakers could take the form of conduction devices that allow for sound to be heard through placing the device on the bone behind the ear. Speakers could also be disconnected from the headset and used for external listening or placed in another object (e.g. chair, pillow).

Various embodiments include a headset in a pillow. A pillow is used for many functions and throughout different parts of the day. The headset could be fitted in a pillow, allowing a user to watch TV or a movie, participate in a conference call, engage in a video game, listen to music or audiobook without disturbing anyone.

The headset pillow could include a microphone and allow for a user to also engage in conversations (e.g. conference calls, friendly social chats or gaming activities) while using.

In various embodiments, a microphone in a pillow could be used for detecting the characteristic sounds of sleep apnea, snoring, or teeth grinding. The microphone in the headset could be detached and placed in a pillow or placed on any surface near the user to record sounds of the individual during their sleep or waking activity. The central controller AI analysis could provide feedback on potential sleep and dental issues.

In various embodiments, a headset with detachables could be in a contoured pillow allowing for both listening, speaking, viewing, sensing and recording (microphone). The pillow could take the form of a neck pillow or sleep pillow containing the mentioned accessories that could be contoured to the individual's head as needed. As an example, this form could be useful during times of rest where the user wants to listen while resting and also allows continued monitoring of sensory data for feedback and analysis from the central controller AI system.

The headset in a pillow could project an image/video on the ceiling and allow the user to engage with the video (e.g. conference call or game) using the microphone, speaker and other sensors included in the device. The central controller could collect and deliver needed content.

Various embodiments include a headset in a desk chair. The sensors and devices included in a headset (with the exception of a holder) could be built in the chair including, the back, head rest, seat, and arms. The cameras, lights, microphone could be attached/detached from the chair but collect the same information as a worn headset. The chair could also be powered and supply the needed power to the functions of the headset. The communication of the collected information from the chair replaces the headset processor 405 and could be thought of as a 'chair controller'.

Various embodiments include a headset in hat form. Hats are popular forms of fashion and clothing. The headset functions could be available in a hat form.

Various embodiments include clip cameras or display screens for attachment to the bill of the cap. The detachable camera(s) could be placed on the bill of the hat or attached wherever the user could secure the device.

Various embodiments include electroencephalography (EEG) sensors in cap. The EEG sensors measure brain waves from various locations on the head. Placing these sensors in a hat more closely resembles those used in medical practice making the information collected more reliable.

The hat may include microphones in the seam of the hat running alongside the side of the hat. The hat may include all other sensors (as mentioned above) around the rim of the hat that could be detached.

Various embodiments include Transcranial Direct-Current Stimulation (tDCS) in a cap. Stimulating the brain has proven to increase various chemical responses and improvements in associated physical human performance. The small stimulation of the brain via the hat could be measured and associated to task completion for reporting.

Various embodiments include Transcranial magnetic stimulation (TMS) in a cap. Stimulating the brain has proven to increase various chemical responses and improvements in associated physical human performance. The small stimulation of the brain via the hat could be measured and associated to task completion for reporting.

Various embodiments include a built-in heat dissipating function. Use of sensors and other powered devices in the hat could cause heat buildup. The hats could be made of heat dissipating material which is a self-regulating fabric from infrared-sensitive yarn that reacts to temperature and humidity assisting to dissipate heat.

Microphone

Various embodiments contemplate alternate form factors for microphones. Form factors could include cavity microphones in teeth or detachable microphones to be used on other parts of the body to capture sounds (e.g. foot, nose, stomach, knees or hips). The microphones could also be flexible to assist in attaching to objects.

Detachable microphone (dual mic) or an earbud to share. The headset could be fitted with two microphones on each side of the face. As an example, if a person is on a call and wishes to have someone without a headset listen and contribute, the user could detach the earphone and microphone and provide it to the other person for temporary use. Another example is when someone makes a call and others want to participate. Today, a speakerphone is often used but reduces clarity. The use of a secondary microphone that could be shared improves the listening and speaking experience.

Various embodiments contemplate switching between two microphones. A user could switch between single and omnidirectional microphone functions to include, in the latter case, someone standing next to the user and speaking. At times, the microphone could only be enabled to pick up the voice of the headset owner/wearer (single person) and not others around you. This could take place in meetings, in public places or where background noise is being filtered. In other cases, the microphone could allow omnidirectional input for people wanting to contribute to a conversation. The omnidirectional mode could have a wider field of sound to pick up on the voices and sounds around the headset owner.

A microphone could be set to allow for multiple modes, i.e., functions or combinations of functions. A "talk only" mode is where the microphone is only detecting and sending verbal content to the headset processor 405, user device 107*a* and central controller AI for analysis. Background noise, non-verbal is excluded from the collected audio information to provide feedback to the user(s).

A "listen only" mode is where the microphone is listening for audio (non-verbal sounds, background noise) on behalf of the user and not during active engagement (e.g. a meeting, game) where continual feedback from the central controller AI system is taking place. This is a mode where the microphone is in stealth mode and will wake up and collect information that is not part of a normal activity. For example, a user may have the headset on and the microphone continues to measure the number of times you cough, produce a short burst of air in exasperation and later provide analysis to the user for awareness as a way to help the user lower their risk of transmitting a disease to someone else.

In a "bot mode", the user may have the headset and microphone respond to routine questions as a bot. For example, a customer service agent may initially discuss an account with a person. As they progress through the conversation, the bot may continue the interview process (e.g. routine collection of personal data) on behalf of the headset owner and later come back to finish the inquiry in person.

There may be times when the headset owner experiences a soundscape they wish to share with others. This could include a concert experience, nature noises (e.g. birds, waterfall, ocean waves) or a loud neighbor. The headset owner could collect these soundscapes through the microphone and make them available to any other person using a headset in real-time, recorded or as part of a gaming experience.

In various embodiments, a headset may include a clip. Headphones are routinely placed on a desk or table and take up valuable space. When not in use, headphones are routinely hung on various pieces of furniture, specialized holders, the side of a monitor, a laptop or thrown in a drawer. If placed on the corner of the monitor, it could obstruct the display itself. The headphones could be designed with a padded flip clip that could be used to easily engage and attach over the back of a monitor/laptop, on a desk/drawer handle or the edge of a table/desk serving to hold the headset and conserve space on the desk/table.

A headset may include a camera. A headset may include one or more of an inward facing camera, outward facing camera and 360 degree cameras. A camera may be situated on a boom/telescoping arm, on the cord with a microphone, or on top of the headband (360 degree camera). Having a camera on the headset could allow the user and central control AI system to collect and interpret facial visual information for feedback to the user and others. If the user looks confused, the facial expressions are interpreted by the central AI controller and the meeting owner alerted to help address the confusion. In addition, an outward facing camera allows the central controller AI system to collect information about the user's environment and provide feedback to the user, both immediately and after the fact. An example includes the person running could have the camera detect a biker quickly passing on the right side of them and alerting the runner so there is not a collision.

Camera functions may provide hybrid between phone call and video call with the ability to switch from one to the other. A camera may increase or decrease video quality, or otherwise manage video quality in response to the connection bandwidth (e.g., the camera may reduce video quality where there is a low bandwidth connection).

In various embodiments, the user has the ability to engage or disengage the camera for protection of privacy and/or other sensitive information.

In a multi-tasking embodiment, the camera could be engaged to monitor external environmental factors like exercising while the other functions are focused on other tasks, like meetings. The user could have the ability to define the preferences based on activity or priority of activities.

In various embodiments, a camera may participate in object detection, e.g., detection of cars, people, pets, trash, potholes, uneven sidewalks and alerting the user of the headset of potential issues and feedback for user action.

Further details on object detection and classification in images can be found in U.S. Pat. No. 9,858,496, entitled "Object detection and classification in images" to Sun et al., issued Jan. 2, 2018, e.g., at columns 12-16, which is hereby incorporated by reference.

In various embodiments, a camera could inform the 'tuning' of a microphone, such as by instructing the microphone as to which audio source to pick up. For example, if the camera has a particular person in its field of view, the user is presumably listening to that person, so the microphone may tune itself to the sound (e.g., to the direction) of that person.

A camera may maintain a steady focus on a subject (e.g., on another person's face) even if the user's head changes direction (e.g., looks to the side).

In various embodiments, various form factors such as knobs, sliders, and buttons, could be used to control headset functions. The functions of the controls may be customizable for the user.

Controls may be on a wire (e.g., on a headset connector). Sliders on the wire may allow for volume, light control, camera placement, sensor control (on/off), etc. Beads on a slider may be used as a controller, such as for volume, light control, camera placement, sensor control (on/off).

In various embodiments, an LED colored wire has visual controls of volume. As fingers are moved over the wire and heat generated, the wire absorbs the heat and the colors change to reflect the volume change.

Controls on Headband

Various embodiments include controls on the headband of a headset and/or on any other part of a headset. Controls may be located on earbuds, earphones, and/or on any other wearable device, and/or on any other device. Controls may be used to control attachable/detachable sensors or other components (e.g., the headset may communicate control signals wirelessly to sensors, such as when the sensors are detached from the headset). In various embodiments, attachable/detachable sensors may include built-in on/off controls. Sensors (e.g., attachable/detachable sensors) may include: cameras, lights, mouth guards, microphones, microphones with arms, etc. Other components may include displays, speakers, etc. In various embodiments, controls may include knobs (e.g., to control microphone volume, speaker volume, light intensity, power to a sensor or device, etc.). In various embodiments, controls may include a connection and power indicator. In various embodiments, controls may include a screen display.

Headsets could have various functions, from meeting/corporate use, exercise enthusiasts, gamers or bloggers/streamers, or casual internet surfers. The form factor of the headset could allow for add-ons to support the needs of the user. A base version of the headset could be developed to support minimal function and collection of data. Add-ons that the headset could support include: forward facing camera; inward facing camera; any and all sensors described herein; a secondary microphone; lights, etc.

In various embodiments, a headset may include a screen display for viewing by a user. Such a screen could allow a user to view teleprompter text which includes the agenda of a meeting or a small copy of each PowerPoint slide from the user's presentation.

Add-ons on a headset may include collectables for games played, gamer status, accomplishments (e.g. agile certification, college degree) or other status symbols could be collected and attached to the headband, earphones.

In various embodiments, a MOLLE (Modular Lightweight Load-carry Equipment) device could be attached to the earphones or the headband to carry all of the add-ons and collectables. These could be used by the headset owner when switching between tasks. Adding those devices to the headset while exercising, but removing them when simply browsing the internet and later others attached for a remote video conference call.

Various embodiments include a frame-based headset (e.g., a glasses headset). Sensors, cameras and microphones could be fitted in or on the frame of glasses. The glasses could support a limited number of sensors and functions to provide a more specialized use. For example, the exercise glasses could include a galvanic sensor, heart rate monitor, accelerometer, camera, speaker, microphone and lights. They could be rechargeable with additional ports that allow for connecting of other devices and add-ons. The glasses could be provided with prescription lenses or without and allow for external charging and uploading of data (Wi-Fi® connected).

Multiple Audio Channels and Subchannels

As communications become more integrated into the way we do work and communicate with friends, there is a need for technologies that can allow for more fluid consumption of multiple audio channels.

In various embodiments, the user's headset is configured to allow access to multiple audio channels at the same time. For example, the processor of the headset processor 405 could direct two incoming channels of sound to the user's ears. The speaker associated with one ear gets a first audio feed while the speaker of the other ear gets a second audio feed. The user could listen to both at the same time, moving her attention from one to the other as needed. For example, the first audio feed might be the sound of an audio conference call, while the second audio feed was light background music. The second audio feed could be ambient office sounds, the audio feed from a different call that is of interest to the user, the sound of the user's own voice, etc. The second audio feed could be continuous, as in a music feed, or it could be intermittent, such as periodic traffic or weather updates. This would allow a user to participate in a call while getting access to information relevant to whether or not the user needs to begin her commute home early due to bad weather or traffic, for example. The processor of the headset could access GPS data while the user was on the call, and automatically end the weather or traffic audio feed (but keep the meeting audio) if the user appears to be heading to the location of her car in the company parking lot for an early return home.

The user could also juggle multiple audio streams at the same time. For example, the user could press a button on the headset to instruct the headset processor to swap one audio feed with a second audio feed, or replace two current audio feeds with two different audio feeds. The user could similarly press a button, or provide a voice command, to switch the right ear audio feed with the left ear audio feed. When two audio feeds are directed to two ears, the user could adjust the relative volumes of those audio feeds, such as by saying the voice command "louder in left ear" or by simply saying "new balance" and tipping her head left or right, generating a signal from an accelerometer of the headset that would go to the headset processor to initiate more volume in the left ear if the user tilts her head to the left.

In embodiments where the user is receiving a single audio feed to both ears, the user could elect to sample a number of other audio feeds by saying "next audio feed." For example, the user might be listening to classical music and then say "next audio feed" and get a jazz music audio feed instead. Alternatively, the user could select a desired audio feed, such as by the user saying "play 80s music" into the microphone of the headset, with the headset processor using voice to text software to generate a command that could be sent to the central controller where a search could be conducted for audio feeds matching the phrase "80s music." If a match is found, the central controller initiates access to that audio feed to the user's headset processor 405.

Meeting participants sometimes want to have small side conversations with others in different locations of the meeting room (or with those virtually dialed in) without disturbing others or interrupting the meeting. In this embodiment, the headset could allow the user to invite a subset of participants to join a concurrent meeting sub-channel. As other participants are invited and accept the invitation, their headphones (or gallery view boxes) could light up in a different color. The users of the sub-channel can now speak in low tones with each other to exchange information without disrupting others. When communication via the sub-channel is finished, or if a participant wishes to leave the group, a button could be pressed on the headset to instruct the processor of that headset to terminate that user's access to the sub-channel. Alternatively, sub-channel communications could be made permanent. Sub-channels could also be established by default, such as by two employees who designate that they always want to be connected in a sub-channel in any meetings that they are both attending.

In various embodiments, the user is on mute for a video call, but not on mute for two other participants. For example, the user can press a "mute" button or press a "mute except for Gary and Jennifer" button. Or the user could mute themselves to everyone except for all of the Architects on the call.

Setting up sub-channels under a main call could be especially useful in cases where a large number of people are on a call on an emergency basis to determine the cause of a system outage or software failure. In cases like these, it could be helpful to create one or more sub-channels for groups with a particular area of expertise to have side conversations. For example, on a main call of 75 people, a group of 12 network engineers might establish a sub-channel for communication amongst themselves and have their left ear follow the main call while their right ear follows the sub-channel for discussions of the network engineers. There could be many sub-channel groups created, and some people might be members of many sub-channel groups at the same time. In this example, the owner of the call could have the ability to bring a sub-channel conversation back up into the main call, and then later push that conversation back down to the sub-channel from which it came.

In various embodiments, large calls could also allow the call owner to mute groups of participants by function or role. For example, all software developers could be muted, or everyone except for decision makers could be muted. Participants could also elect to mute one or more groups of participants by function or role. In the case of education, a teacher could be allowed to mute groups of kids by age level or grade level.

Coaching could be done through the use of sub-channels, with one user in a large video meeting having a sub-channel open with a coach so they can talk about the call and about the performance of the first user in the call.

Sub-channels could also be used to share content to a subset of the participants on a video call. For example, a financial presentation could be shared with the entire group, but a particular slide with more sensitive financial information could be shared only with a sub-channel consisting of Directors and VPs.

In various embodiments, users could switch between different types of audio feeds. For example, dispatchers could switch between radio and phone feeds. The headset processor 405 would include software capable of processing each type of audio input and switch to the appropriate software as the user selected a particular audio feed.

In various embodiments, an audio feed could be selected based on the location of the user. For example, a user with a GPS headset might go on a walking tour of a large city, subscribing to tour information that is delivered when the user gets to a particular location. The user's headset could store in a data storage device 50 modules of short audio segments by a tour guide. Each of the 50 modules would have corresponding GPS data of the location of each of those segments, and when the user's headset GPS readings indicated that the user was in one of these 50 locations, the headset processor would retrieve the corresponding audio segment and play it back to the user via a speaker of the headset.

Headsets could also be used for direct headset to headset communication, functioning like a walkie-talkie half duplex communication system. This could be a good communication option for individuals in a family house who want easy communications with others in the house without interrupting their current gameplay or music listening.

In various embodiments, one or more audio feeds may be transcribed (e.g., in real time) and presented to a user. In this way, for example, a user may follow the transcript of one audio feed while listening to the other.

Inward Facing Camera

Headset functionality can be greatly enhanced with the use of an inward facing camera that is able to capture video of a user's face, hands, arms, fingers, shoulders, clothing, and details of the room behind him. This visual data feed can be used by the headset processor 405 in many ways to make communication via the headset more efficient, more fun, and more secure. In some embodiments inward facing video feeds can also be used to improve a user's health, such as by monitoring blood flow levels in the face or detecting that a user seems to be sleep deprived.

Forward Facing Camera

A forward facing camera can also enhance the effectiveness of a user headset, such as by allowing others to be able to "see through the eyes" of the user as they attempt a complex repair of an engine. The forward facing camera can also enable lots of functionality which requires seeing the user type, such as allowing for smarter typographical error correction.

Eye Gaze and Head Orientation Tracker

Conventional eye gaze systems often rely on cameras facing the individual. Eye gaze tracking systems thus are either limited to fixed settings such as in-front of a television or particular setting arrangements, or require large numbers of cameras to track gaze as individuals move within environments. The device according to various embodiments could facilitate eye gaze or head orientation tracking in mobile settings or without the use of large numbers of games. Eye gaze or head orientation tracking enables improved functionality for device wearers such as more precise advertising, user experience functionality, workplace monitoring, or insurance pricing.

A headset could be used as an eye gaze or head orientation tracker. The headset could contain a camera oriented toward the device owners face, located either in the microphone arm or in another location. The camera could be used to detect patterns of gaze, eye fixation, pupil dilation, blink rate, and other information about the device owner's visual patterns. The headset could be used as a head orientation tracker. Accelerometers located in the headband, ear cups, or other locations in the device could be used to detect head orientation in X, Y, Z coordinates, as well as tilt, pitch, velocity and acceleration of the head. The orientation of the head could be used alone, in combination with eye tracking, or combined with a forward facing camera, to detect what the device wearer is looking at.

Data on head orientation or eye tracking could be combined with other eye data such as patterns of fixation, blink rate. Data on head orientation or eye tracking could be combined with other device inputs such as audio or biometric data. Eye gaze, head orientation, and correlated audio, biometric and behavioral data could be stored by the central controller. Access to the data could be made available to the device owner or to third parties through an API.

Signing into the device, authenticating the device owner's identity, or other biometric patterns could allow the central controller to solve the disambiguation problem of multiple users on televisions, computers and other devices. Shared devices present a difficult tracking and user identity problem for security, advertising and other uses that rely on knowing the identity of who is using the device. Individuals are commonly served ads that are targeted to them based upon other users of the device. For example if a woman's voice is recognized, the marketer could not send advertisements to them regarding male hair baldness products. Additionally, knowing the identity of the headset could allow the central controller to track an individual's eye gaze and other data across multiple devices such as computers, phones, and televisions. Knowing the identity of the device owner could allow tracking of individual data across physical and digital environments. For example, the central controller could track eye gaze in a physical store as well as in an online store.

Mobile eye gaze or head orientation tracking could be used to improve the measurement and effectiveness of advertising. Devices could facilitate the measurement of the number of individuals viewing advertising such as billboards, signs, flyers, and other forms of physical advertising. Devices could be used to measure the number of individuals viewing digital advertising on television shows, movies, digital videos, games, internet pages, within apps and software on mobile or computing devices and other forms of digital advertising. devices could be used to measure the number of people viewing product placement and other promotional materials either in physical or digital settings. In addition to measuring the number of people viewing ads, devices could be used to measure individual engagement with particular ads—through eye fixation, blink rates, and other visual data. Other data, such as audio or biometric data, could also be used to measure individual engagement with particular ads. Combining eye gaze, head tracking, and other forms of data from the headset could allow advertising to measure how an individual's affective state responds to particular forms of advertising.

Devices according to various embodiments could allow an AI module to be trained that predicts key demographic, lifestyle and potential spending data for marketing purposes such as age, gender, education level, occupation type, income bracket, housing and household attributes, spending patterns, patterns of life, daily locational movements, beliefs, ideologies, daily activities, interests, and media consumption of the device wearer.

Headsets could allow ads to be customized to the device wearer—either physical or digital advertising—using demographic, lifestyle, and potential spending level. By combining location data and other data on the wearer with eye gaze or engagement data, the central controller could allow micro-targeting of advertising to very specific segments.

Inputs of vocal statements, emotions and gender could be interpreted by the central controller AI system and used to deliver content or not deliver content. The central controller 110 could detect whether an individual is tired, fatigued, or has a particular affective state. The central controller could detect whether certain kinds of emotional valence in ads is effective and determine under what conditions a particular kind of ad is likely to be effective. For example, it could determine that a negative valence ad is unlikely to be effective based upon certain times of day, fatigue levels, or health conditions.

The central controller 110 could detect the type of activity an individual is engaging in and allow advertising to be customized by activity. For example, the central controller could allow advertisers to place contextual advertising when an individual is engaged in an activity. For example, if it detected that an individual was jogging, it could allow advertising to place contextual ads for running clothes. For example, if the individual sneezed, it could place an antihistamine ad.

The central controller 110 could detect if an individual was shown an ad and then engaged in intent-to-purchase behavior, such as looking up a particular product after being shown an ad, browsing the company's website, or looking at similar products within a category.

The central controller 110 could detect if the user has purchased an item recently and thus should not be shown ads within that category.

The central controller 110 could detect if an individual is engaged in intent-to-purchase behavior and then display appropriate ads. For example, it could detect whether an individual has asked a friend about something she is wearing and then display an ad for that product or product category.

A headset could allow physical advertising to change dynamically based upon the kinds of users within vicinity of the ad or who is looking at the ad. The central controller could communicate with the billboard or other form of advertising to display different types of ads, target the ad toward high value individuals, or use different techniques or valances based upon who is in the vicinity. The central controller could play audio ads to accompany visual advertising when individuals come within physical proximity to the ad, sight line of an ad or look at the ad. Individuals could interact with the ad through vocal commands. For example, individuals could tell the central controller that they are not interested in particular kinds of ads or they could ask for more information or "remind me later".

If the central controller 110 detects that a device wearer makes positive or negative comments about a product, it could use that information to adjust ad delivery. For example, if a wearer makes negative comments about a product, the central controller could serve an ad for a competing or substitute product.

The pricing of billboards and other physical ads could change based upon data captured by the central controller 110, such as the number of impressions as measured by eye gaze, the value of particular demographics looking at the ad, or whether individuals who viewed the ad then display intent-to-buy or actually purchase the product.

The pricing of digital ads could change based upon data captured by the central controller such as the number of impressions as measured by eye gaze, the value of particular demographics looking at the ad, or whether individuals who viewed the ad then display intent-to-buy or actually purchase the product. headsets could be used to authenticate ad impressions to defeat ad viewing bots, ad click bots and other forms of advertising fraud.

Many websites, apps, and other software prohibit online reviews, posts, or comments which are posted by bots or other automated means. The devices according to various embodiments could be used to authenticate that online reviews, posts, or comments were made by an actual individual.

Headsets could allow tracking of eye gaze, engagement, and other forms of nonverbal behavioral information as individuals browse stores, look at shelves and displays, or interact with sales people. Eye gaze, engagement and other forms of nonverbal behavioral information could be used to optimize store layouts, shelving and display layouts. The central controller could inform sales people of which shoppers to concentrate their attention on (based on intent-to-purchase, eye gaze, or other markers) and which marketing approaches would be likely to result in a purchase or positive interaction.

Headsets could allow adaptive pricing based, for example, upon intent to purchase, eye gaze, or other data recorded by the central controller. For example, if an individual fixates on a particular item but looks as if they are walking away, the central controller could communicate with the store's software or with a smart pricing display to alter the price.

Headsets could allow dynamic software, app, and website designs. For example some individuals could be more engaged with ads or buy buttons displayed in certain areas of the screen. The central controller could communicate with the site owner to display ads, buy buttons, or other aspects of website arrangement to increase engagement, buy conversion, or other metrics. For example, apps or software to rearrange windows, menus, and other aspects of user experience to improve functionality for individuals based upon their eye gaze and engagement levels.

Headsets could improve cashier-less checkout processes in physical stores by tracking device owners' eye gaze and tracking which products they take off of shelves without installing extensive camera systems in store.

Headsets could be used for monitoring, auditing, and regulating workplaces and monitoring worker safety. Eye tracking functionality, combined with authentication and data recording, could create auditable data on the wearers eye gaze and attention. For example, a headset could be used to detect workplace safety issues such as inattention drivers or machine operators. The central controller could prompt the user of their inattentiveness, alert a supervisor, regulator or law enforcement, or could disable the ability of the wearer to operate a vehicle or a machine. If a workplace accident occurred, the headset wearer's data could be reviewable to determine whether the wearer engaged in appropriate behavior.

Headsets could be used for monitoring whether employee functionality is impaired. Alcohol, THC, opioids and other psychoactive substances can cause changes to individuals' visual movement, such as speed of eye tracking, blink rate, and pupil dilation. An AI module could be trained to detect whether dimensions of an individual's visual activity correspond to an impaired individual. The central controller 110 could prompt the device wearer, inform the wearer's manager, or disable functionality of vehicles, equipment or other work equipment.

In some embodiments, eye gaze tracking, combined with other device functionality, could be used to better price insurance risks—whether the device wearer engages or does not engage in certain kinds of risk. Device wearers could receive improved insurance pricing as increased information allows insurers to remove sources of uncertainty regarding individual behavior from their pricing models.

Micro-Expressions and Nonverbal Signals

Individuals frequently engage in micro-expressions and other nonverbal signals of emotion. These signals however are often difficult to detect. Devices according to various embodiments could enable the detection of micro-expressions, nonverbal signals of emotion and other "tells."

Micro-expressions are nearly imperceptible facial movements that result from simultaneous voluntary and involuntary emotional responses. Micro expressions occur when amygdala responds to stimuli in a genuine manner, while other areas of the brain attempt to conceal the specific emotional response. Micro-expressions are often not discernible under ordinary circumstances because they may last a fraction of a second and may be masked by other facial expressions. In addition to microexpressions, individuals may provide other visual cues as to their emotional state such as eye contact, gaze, frequency of eye movement, patterns of fixation, pupil dilation and blink rate. Likewise, audio elements such as voice quality, rate, pitch, loudness, as well as rhythm, intonation and syllable stress could provide cues about a speaker's emotional state. Additionally, individuals may have "micro-head movements" or changes in their head orientation, body positioning, or pose that may correspond with particular cognitive or affective states, such as head tilting.

A major challenge for measuring microexpressions is the use of a single channel of information—facial expressions—without other context information such as nonverbal communication data such as tone, rate, pitch, loudness and speaking style. By combining cameras, accelerometer data, and nonverbal elements of audio data, an AI module could be trained to detect micro-expressions and other "tells". The devices according to various embodiments could enable the detection of micro-expressions through several sensors, such as cameras, microphones, accelerometers, and strain gauges. The device could be enabled to detect microexpressions of the device owner through a camera located in the microphone arm. Expressions could be associated with particular head or facial movements which could be detected by accelerometers or strain gauges located in the headset's headband or ear cups. Micro expressions could also be detected using lidar, light pulses, or lasers. These types of expression data could be supplemented with camera data of eye movements and audio data. An AI module could be trained with these types of data to detect microexpressions and the affective state of the device owner. Insights from this AI module could be shared with the device owner—whether the device owner has a "tell" or exhibits certain forms of micro-expressions. For example, while negotiating, the device owner may subtly reveal information via an emotional response during negotiations. The AI module might prompt the device owner to modulate their "tell". Insights into the device owner's emotional state could also be stored by the central controller and be made available via an API.

Devices according to various embodiments may detect the microexpressions and "tells" of individuals with whom the device owner is interacting. Forward facing cameras could be used to detect facial expressions. Expression data could be combined with imagery of eye movements and audio data. An AI module could be trained utilizing these kinds of data to detect micro-expressions, nonverbal cues, and other "tells". The central controller could communicate to the device owner its prediction of the affective state of individuals with whom the device owner is interacting. Insights from the AI module could also be stored for later review by the device owner or be made available via an API.

In some embodiments, the micro-expressions of the device owner or others with whom the device owner is interacting could be used to gain insight into creativity or learning by detecting "glimmers" of surprise or moments of intuition, discovery or mastery. The central controller could record audio and video before and after that insight, as well as flagging those clips for review by the device owner. Micro-expressions could be used as a non-test method of measuring learning outcomes. Micro-expressions could be used to facilitate cross-cultural interactions by helping device owners interpret non-verbal communication and reduce misunderstandings.

Adaptive Technologies

Each person has unique physical characteristics that can be considered. These are in the form of vision, hearing, and other sensory items that could be learned and known by the headset device to improve the experience of the user.

Various embodiments contemplate lip reading on video chat. Many people lose their hearing over time to varying degrees. For those people with a reduction in hearing, the central controller AI system could remember this and adapt the headset experience. The camera/video recording the speaker could automatically adjust for the individual user with hearing loss so that the lips are presented in a magnified manner. In this case, since the lips are larger, the person with hearing loss and ability to read lips could more easily understand what is being said and contribute to the conversation. This is an example of ADA (Americans Disability Act) function.

For those with hearing loss, the central control system could automatically transcribe the conversation in real time, allowing it to be presented on the screen for reading or later published for review.

Various embodiments include light illumination for those with poor vision. Those with poor vision could be known by the central controller AI system. The lights on the headset could illuminate the workspace to improve the vision capabilities of the user.

Various embodiments include sensory feedback adaptation. The sensory information for each individual is unique. The central controller AI system could learn the individual's sensory levels and adjust the responses accordingly or suppress feedback. For example, if the heart rate of a typical person of similar size/age/gender is 65 beats per minute, but the headset owner has a rate of 45 beats per minute, the central control AI system could not continue to warn the individual. Likewise, if a person that exercises has an unusually high galvanic skin response, this may not indicate any hydration concerns, but the responses adapted to the individual.

Various embodiments include an adaptive cloth covering. The adaptive cloth covering could compensate for heat generated by the headset and/or by the user. The headset could be created or wrapped in adaptive cloth over the headphone, headband or other devices touching the skin. The adaptive cloth could adjust to allow heat dissipation and for the skin to cool.

Health Awareness

Comprehensive health data is increasingly important to healthcare professionals and active health management by the individual. The headset device according to various embodiments is equipped with sensors to collect heart rate, head movement, temperature, hydration, brainwave activity, metabolite, blood flow and air quality levels. With more telemedicine taking place among physicians, the more data points collected and analyzed by the central controller AI system to assist in evaluating the health of the patient is needed. All data could be used to make the appropriate diagnosis. The collection and process flow of data occurs from the headset processor 405 to the user device 107*a* (if connected) to the central controller AI system. Once evaluated, the feedback from the central controller AI system could be sent to subscribers of the information (healthcare provider or insurance company) and the headset owner.

Hearing Evaluation and Control

Hearing loss is sometimes a progressive condition that is not recognized by the user. This could occur due to various factors. The headset and central controller could monitor various conditions and behaviors to alert the user of potential hearing loss with corrective actions.

Various embodiments include volume controls, which may include system and/or user generated volume controls.

The user may increase the volume of the headset over time. This could be an early indication of hearing loss and the central controller could alert the user to seek medical attention. The central controller could also suggest lowering the volume to acceptable levels or taking the headset off to protect the user's hearing.

If the user has known hearing loss and the volume needs to be at a certain level, the central controller or headset processor 405 could establish this volume level in advance of the activity, based on the preference of the user (higher level for meetings or less for games).

Various embodiments permit the fixing or locking of volume levels. The user preference or via a parental control could set a volume level on the headset that is not allowed to be adjusted without permission. This fixed volume level using the headset could protect the hearing of the user.

Various embodiments include ambient noise control. In various embodiments, ambient noise can be removed. Those with hearing loss can be distracted by ambient noises. The central controller 110 and headset processor 405 equipped with an ambient noise sensor could remove ambient noises if the person is known to have hearing loss. This could improve the overall hearing experience.

In various embodiments, volume may be adjusted based on ambient noise. Users may turn up the volume when ambient noises are loud or in the background. When the person leaves the area, the user does not adjust the headphone volume and it remains high. The headset processor 405 could detect from the ambient noise sensor that the noise has been reduced. If this is the case, the user could be alerted via the headset to reduce the volume or this could be done automatically, thus protecting the hearing of the user.

In various embodiments, headphones may function as hearing aids and assistants. In various embodiments, a headset may perform a digital transformation to move audio into range that people can hear. There are certain auditory ranges that individuals have difficulty hearing. The central controller AI system, in conjunction with the headset, could understand this and modify the audio to a range that is more easily heard by the user. For example, as you age, it is more difficult to hear higher frequency ranges, the headset could amplify these making it easier for those with hearing disabilities.

In various embodiments, a headset may provide in-bone conduction hearing functionality. The use of the headset could allow the user to replace the speakers with in-bone conduction devices. This modified use allows those with hearing loss the ability to use the functions of the headset.

In various embodiments, a headset may detect whether people are struggling with listening. A headset may include cameras and accelerometers. There are subtle indications that people are struggling to hear. These may include someone making facial expressions (micro-expressions as well) of intensity while trying to listen, leaning forward in the direction of sound or someone speaking, having no response when spoken to, tilting the head or asking some to 'repeat the question', saying 'what', or pausing for lengthy periods of time as a few examples. These visual and auditory clues are collected from the microphone and camera and sent to the headset processor 405 and central controller AI system. The analysis of this information can be provided to the headset user with suggestions on volume control or to seek medical attention.

In various embodiments, a headset may create 'white' noise to create the cocktail effect. People can focus on a single conversation in a crowded, noisy environment. This is the 'cocktail effect'. However, for some people, this is difficult. The headset could allow the user to initiate a 'cocktail effect' by introducing white noise in the headset by selecting on a knob or control and selecting the single voice they are wanting to listen to. This could improve the hearing capabilities of the user.

Sensor Based Hearing Evaluation

EEG Brain waves can indicate hearing loss. In various embodiments, a headset is equipped with an EEG sensor to measure brain waves. As people age, the alpha brain waves are modified. The central controller AI system could evaluate the brain waves of individuals and compare to the hearing performance of others. If there is a change in brain wave activity affecting hearing, the central controller 110 could alert the user via the headset to adjust volume or seek medical attention.

EEG brain waves may indicate signal perception (where a sound is originating). At each ear, a slightly different signal (sound) will be perceived and by analyzing these differences, the brain can determine where the sound originated. The two most important localization cues are the Interaural Time Difference, or ITD, and the Interaural Intensity Difference or IID. The headset equipped with an EEG sensor can measure the brain waves during a sound test. For example, the headset processor 405 could initiate a hearing test to measure signal perception. The sound could be generated and brain waves measured. The ITD and IID results could be evaluated by the central controller AI system and provide the user with an indication of hearing loss or recommendations. Furthermore, if the user has a deficiency in one of the ears, the headset processor 405 could adjust the output of the sound to adjust for this impairment.

In various embodiments, a camera can measure head acoustics. The shape of the head can affect the hearing of an individual due to head shadows and obstruction of sound to the ear. The headset equipped with a camera could measure facial features and the central controller AI system compares it to others with similar features and hearing loss. The central controller could provide recommendations to turn up the volume in one of the earphones or seek medical attention.

Various embodiments assist with sensing and hearing sounds above and below a user. Individuals have difficulty recognizing sounds coming from above and below you (Z Direction). The headset could adjust sounds to provide the user with a clearer sense of where the sounds are coming from. For example, if the user is playing a video game and an airplane is flying above to drop a bomb, the audio in the headset could adjust the sound of the airplane to give a more realistic experience that the plane was flying above the user.

In various embodiments, an earbud may serve as an in-ear thermometer. An in-ear temperature sensor can be an accurate way of collecting body temperature. The in-ear thermometer could actively monitor the body temperature throughout the day. If the body temperature appears to change, the central controller could inform the user to take necessary steps.

Various embodiments may facilitate home hearing tests. Hearing tests are indications of hearing impairment. The user of the headset could initiate a hearing test by selecting a function on the headphone or with the application. The headphone could generate sounds of different frequencies and request the user to acknowledge those sounds by touching the headphone screen sensor or pressing an enabled button. The collected information is sent to the central controller AI system for analysis. The results of the test could be provided to the user and medical professional for review. Signs of hearing loss could generate preventative action by the user.

In various embodiments, earbuds convert to earplugs. Oftentimes hearing could be protected or external, ambient noises blocked with the use of earplugs. Using the sensory data in the headset, the earbuds/earphones could automatically change form to act like an earplug.

In one example, a person is using the earbuds in bed to listen to music and falls asleep. The music turns off and the earbuds remain in the user's ears. Later in the night, the headset with a microphone picks up on the sound of a snore. The earbuds could automatically convert to earplugs to not disturb the user from sleeping.

In one example, during construction work sounds of heavy construction vehicles or construction noise (e.g. placing steel beams in the ground). These noises can damage the ear and hearing. The headset could listen for sudden changes in ambient noise and send the single to the central controller for analysis. If the noise is in a range to damage hearing, the earbud/headphone could automatically change to an earplug, protecting the construction worker's hearing.

Health Evaluations

Health evaluations can be provided using the headset sensors to collect information, which may then be analyzed by the central controller AI system. These evaluations and recommendations can provide users with immediate information to change behaviors and avoid long term health issues.

A microphone can be used as an active or passive listener to alert users of potential health issues. In various embodiments, the microphone can detect when a person is grinding their teeth. This sound could be communicated to the central controller AI system via the headset processor 405 to determine if teeth grinding is occurring. If this is the case, the headset could deliver calming music, a vibration to stop the user or recommendations to prevent teeth grinding.

In various embodiments, a microphone can detect sleep apnea or other sleep noises. Sleep apnea and snoring are key health concerns. The microphone on the headset could collect and deliver these sounds to the central controller AI system via the headset processor 405 to determine if sleep apnea or snoring is occurring. If this is the case, the headset could deliver calming music or a vibration to stop snoring or a more forceful vibration or sound (e.g. alarm) to awaken the user in the case of sleep apnea. The collection and analysis of the sounds could provide the user and medical representative with the information to further diagnose the condition.

In various embodiments, a camera and accelerometer may be used in combination to detect health issues. One such issue is Temporomandibular (TMJ)/Jaw tension, i.e., pain in the TMJ joint associated with stress and other health conditions. The headset with a camera and accelerometer can monitor and measure the clenching of teeth, tension in the face and jaw, movement of the mouth from side to side and other micro facial expressions. The collection and analysis of the collected information by the central controller AI system could provide the user and medical representative with the information to further diagnose the condition. The system could also provide remediation steps to prevent or reduce the TMJ pain.

A camera and accelerometer may be used to identify headaches and strain. Headaches are caused by various conditions, poor lighting, eye strain, length of time in an activity to name a few. The headset and sensors could collect the various forms of data. If, for example, the user indicates to the central controller AI system that they have a headache, the system could immediately produce a report showing the biometric sensor feedback with possible remediation steps to alleviate the headache. For example, a user that has spent 10 hours on the computer with the headset, shows signs of dehydration and facial expression of fatigue and eyes turning red may be indications that the user could drink water, take a break and use relaxation techniques.

A camera and accelerometer may be used to identify posture and ergonomics related to neck strain. The headset with accelerometer and cameras could notice the movement of the head, posture of the user in the sitting position, walking posture or continual focus of the head (e.g. in a downward position). The central controller AI system could compare these images and movements to users with good posture in similar positions and provide recommendations. The system could also alert you if your posture or head position is good. For example, if a user is sitting in a chair on a conference call for 2 hours, the camera and accelerometer could notice that the user's head is dropping over time and the user is moving further down the chair in a slouching position. The headset could alert the user to sit up straight and light their head. These recommendations could prevent fatigue and pain in the future.

In various embodiments, a headset equipped with cameras can record and monitor the surroundings of the patient and the patient himself to predict and prevent health concerns.

A headset may facilitate fall prevention. The camera could continually look for potential fall hazards in a home. For example, if the camera notices a rug with an upturned edge or a toy in the middle of the stairway, it could send an alert to the user to address. The camera could also evaluate the pathway a runner is taking and alert them if there is a branch, an uneven sidewalk or pot hole so they can alter their run/bike direction.

A headset may facilitate proprioception training (out of the rehab setting into the home setting). The camera could be used to monitor the rehabilitation of an individual at home. The camera could record the movement of individuals for the prescribed exercises or general movement and provide feedback to the patient for encouragement or correction. In addition, the results could be delivered to the health care professional for evaluation of the patient.

A forward facing camera/screen, rangefinder may facilitate home eye tests. The gradual decline of vision is common. The headset can be used to administer an eye test. The headset could initiate a vision test requiring the user to observe images on the screen in different lighting. In addition, the camera could measure the physical characteristics of the eye as additional pieces of information used in the exam. The collected information sent to the central controller AI system for analysis. The results of the test could be provided to the user and medical professional for review. Indications of vision loss could generate preventative action by the user.

In various embodiments, a headset equipped with an accelerometer could monitor movement over a period of time. If the central controller does not notice movement, it could provide a message for the user to move, stand up or take a break.

In various embodiments, a headset equipped with an accelerometer could facilitate fall prevention. The headset with accelerometer could continually monitor movement and more specifically, abrupt movement. If the central controller AI system notices frequent abrupt movements, this could indicate the user is at a greater risk of falling or a more serious health condition like Parkinson's disease.

Cleaning—Sterilization

Headphones rarely get cleaned by most users and collect germs. The headphones could be made of a plastic where a ultraviolet (UV) light can be installed and powered on for sterilization by the user. The sterilization process is set for a designated period of time (for example 5 minutes) to disinfect the headphones.

Telemedicine Facilitated by Headset

The use of telemedicine is becoming more prevalent. The headset could be used to collect information in real time and provide it to the medical professional for evaluation. Today, the only view a medical professional receives is from a camera on the computer and audio. The sensor headset, along with other cameras and lights can provide the medical professional with a more complete picture of the patient's health. The sensory data collected can be delivered to the medical professional over a secure connection from the central controller AI system. For example, if the patient is using a telemedicine connection with their physician, the headset could provide the doctor with the patient's temperature, hydration levels, heart rate and if needed focus on a particular part of the body with movable cameras and lights. If the doctor wanted to look at the patient's throat, the user could move the camera closer to their mouth, turn on the light and allow the doctor to example the throat. All of this information collected from the sensors and using devices (e.g. microphone, camera) to provide the doctor with more complete information to diagnose and assist the patient.

Brain Data and Stimulation

In various embodiments, a headset may gather EEG brain data. Brain waves could be measured by the EEG sensor placed in the headset. EEG measurements could be a first-line method to diagnose tumors, stroke and other focal brain disorders. The data collected by the EEG sensor could be transmitted from the headset to the central controller AI system to evaluate the brain waves and compare it to other brain waves. If the brain waves indicate a potential stroke, tumor or other brain disorder, the information can be delivered to the user immediately to the headset with a verbal update or provided in the form of a text report.

In various embodiments, a headset may facilitate brain stimulation. Transcranial Direct Current Stimulation (tDCS) are devices used to deliver low levels of constant current for neurostimulation. Scientific studies have shown that tDCS has the ability to enhance language and mathematical ability, attention span, problem solving, memory, and coordination. These are key contributors to improving human performance. In addition, tDCS has also been documented as having impressive potential to treat depression, anxiety, PTSD, as well as chronic pain. The headset could be equipped with tDCS stimulators to deliver the current to the user over a specific period of time and current level. These devices could be turned on and intensity established using control knobs. The duration and current levels could be collected and provided to the central controller AI system along with the associated brain waves to measure the long term impact on the brain and associated activities (working; learning, brainstorming, decision making, aligning; exercising, gaming and casual engagements). Improvements or recommendations could be provided to the user for alignment to skills or further stimulation.

Transcutaneous Electrical Nerve Stimulation (TENS) is a noninvasive device placed on the skin that can help control pain. Use of this device can block pain signals from reaching the brain and potentially reduce pain medication. The headset could be equipped with a removable TENs unit allowing the user to place the device wherever pain may be occurring. The duration and intensity of the TENs unit can be controlled by the headset. Information collected from the headset can be delivered to the central controller AI system for ongoing monitoring and reporting to the user.

Audio Management, Mixing, Smart Sound Producer, Tracks

Audio is used to hear sounds from another person, game, music or artificial sounds. In this invention with a headset, controllers and AI system, the management of the audio experience is enhanced and made available, before, during and after the activity. Vocal commands (e.g. in the form of 'hey, Siri') and non-vocal actions (buttons, knobs, user selections) could be used to enhance audio content delivery, establish and control connections, categorize audio content, and use and control non-audio content.

Enhanced Audio Content Delivery

Sounds could be used to set a mood that is personalized by the individual or owner in any setting; exercise, meetings, games or casual use. Users of the headset could layer sounds together to enhance their overall experience by using a pre-programmed soundscape or adding, removing or adjusting the musicals layers in a soundscape and storing on the central controller AI system or within the headset or user device 107*a*. For example, a meeting owner is conducting a learning meeting and establishes a very energetic soundscape with modern tones. Users of the headset could hear this at the start of the meeting once they authenticate. If the user wants to modify the soundscape, they could use their headset to dynamically adjust the various tones (or volume) and remove specific sounds/layers using knobs/buttons. In addition, they could introduce new tones not provided based on their individual preference. The sounds could be made available in the central controller, computer or headset processor 405. As another example, a user playing a computer game could alter the soundscape provided by the game by removing, adding or adjusting the soundscape of the game based on their preferences. The personalized soundscapes could be stored on the central controller AI system and made available to other gamers as add-ons to enhance their experience.

Various embodiments may include soundboard functoriality, which may permit such things as injecting clips, music, laugh tracks, etc. Enhancing the audio and overall experience of an activity (meeting, game, exercise, casual event) could be made available to users of the headset This could be controlled by the owner of the activity or a participant. Audio clips in the form of music, vocal feedback, non-vocal sounds and pre-programmed tracks could be used at the appropriate time. For example, in a learning meeting, the meeting owner may be introducing a topic and use a joke to establish rapport with the audience. When the joke is finished, the meeting owner could use the headset to layer on laughter to enhance the experience and get people more comfortable in the meeting setting. As another example, during a decision making meeting, a meeting participant could ask in the headset to find the latest revenue numbers for the APAC region. This information is found and delivered to the participants through the central controller AI system and the headsets. Furthermore, if a meeting owner schedules a break, they could indicate in their headset by saying, 'break'. The central controller AI system could deliver the personalized audio content for each individual using the headset. For some, it may be Rock, Jazz or Country. For others, it may be resuming their favorite podcast.

In various embodiments, a headset may facilitate a "Laugh track" effect. Laugh tracks are effective ways to make people feel more comfortable, safe and secure and feel they are part of a group. This is increasingly important as more teams work virtually and may feel disconnected. The central controller AI system could listen to laughter from an individual(s) when a funny statement is made and immediately layer in a laugh track to mimic the intensity and volume of laughter. This injection of laughter could provide support to the meeting owner and provide the team with a sense of levity and comradery. Likewise, the meeting owner or user could turn off the laugh track as well through the headset and AI system.

In various embodiments, a headset may facilitate equalization of volume, such as with a smart audio mixer. Users of various equipment (microphones, headsets, speakers, computers) in unique settings (e.g. home, offices, outside) can cause sound to be distorted for each listener, sometimes without the speaker being aware. At times, the non-uniformity of sound from all participants makes it difficult for the listener to continually refocus on the content being delivered. The central controller AI system, along with the headset could remove these differences and deliver a uniform listening experience. For example, in a meeting, a user could be speaking in an open space with a lot of reverberation using a low setting on the clip-on microphone, while another user may be in an office space using a computer microphone picking up every sound very loudly. The listeners of each have completely different experiences and hear each person uniquely, making it difficult to focus or hear every statement in some cases. The central controller AI system could analyze each audio input and compare the difference (volume, sound quality, reverberation). The audio content could be delivered to the headset with the correct volume and equalization based on the current headset settings of the listener. Because each listener using a different headset has a unique setting, the audio could be personalized and delivered to each individual so that the varying inputs from each speaker were normalized and all sounded the same. This could reduce distractions and allow listeners to focus on the actual content.

In various embodiments, an indication of the microphone, camera, headset, and speaker make/model, along with connection type (e.g. phone, computer, laptop, game system), could be provided to the central controller AI for a record of how the user is listening to audio at any given time.

In various embodiments, speaker settings, make and model may be provided to the central controller AI system. Each user speaker system (computer connected) is controlled to deliver the sound unique to their preferences. The central controller 110 and user device 107*a* could interpret the sounds delivered to the user and the speakers optimized to provide the highest quality listening experience that matches the user's preference. The central controller could also maintain the speaker specifications (make and model) and listening settings (EQ and volume) for the user based on connection type (on a computer, from a phone, via wireless speakers). For example, the user is listening to friends on a conference call using wireless Bose speakers. The user has tuned the speaker to a volume level of '5', with the bass turned up to the highest level. Each friend is speaking into their individual device and the quality of audio does not match the output the user prefers. The central controller has saved the Bose speaker model and preferred audio settings for the user. When the sound of each user is collected, the sound waves are transformed by the central controller before sending to the user's Bose speaker to match their listening preference and previous experience on other calls (music, games, conference).

Establish and Manage Connections

In various embodiments, a headset facilitates walkie talkie functoriality for communicating with a door bell or door camera. The user could communicate to objects to manage their function using a headset without communicating over the Internet. For example, the user's door camera could be paired to the headset. The user could simply say to the door camera to begin recording by using a simple command. The headset understands the user's voice and is able to manage the functions of objects in their surrounding that are paired.

In various embodiments, a meeting is locked to individuals who do not have appropriate clearance for confidential information. Each headset is owned by a specific individual and can only be allowed access to meetings to which the headset owner has been invited, or otherwise only to prerecorded content. For example, a meeting owner plans to discuss a sensitive HR topic and only wants two people to attend the call. The owner invites the two people to the call. Each user accesses the call from their headset. The central controller knows that the specified user was invited and is using their unique headset. So, they are allowed to access the confidential call and information. However, one of the users forwarded the invite to another person not allowed to attend or have access to the confidential information. While they have the meeting passcode, the headset is not recognized by the central controller and they are not allowed permission to join the meeting. The meeting organizer is informed and can determine if the person could be allowed and override the system.

Various embodiments may facilitate anonymous contribution of content, even if contributed vocally. Various embodiments may prevent recording or facilitate masking of voices for anonymity purposes. There may be times when a person's anonymity could be maintained, but the content delivered. This can come in the form of masking someone's voice or not displaying the name/title or affiliation of the member. For example, a speaker is delivering feedback to a senior officer in the company and does not want to be identified. The user with the headset could provide their comments and the central controller AI system masks their voice, job title and name before sending the audio to others. This masking could be in the form of changing the modularity of the voice so that the content is understood, but the voice is not recognizable.

In various embodiments, a headset could allow the user to select specific people that they want to listen to on their audio feed. For example, the user of the device indicates to the headset (verbally) that they only wish to listen to the meeting owner, James and Mary. The central controller knows these individuals and only provides their audio content to the owner. It could save a favorite people list and only get their audio feed. Another example, a meeting owner tells the participants to go on a break. The users of the headset only want to talk/listen to their friends. This friends list was previously stored in the central controller. Once the central controller knows the user is on break, it automatically connects them to their friends for listening or active conversation. Once the break ends or the user indicates through pushing the disconnect button, the user is automatically rejoined to the meeting.

Various embodiments facilitate prank calling, or spontaneously connecting headset users (headset phreaking). Users may want to hear and engage in a prank call scenario, wherever that may be taking place. If the user of the headset indicates they are available for this type of activity, the central controller could store this information. The central controller could determine a prank call is starting and automatically connect the intended users to listen to the call. If the user is the person playing a prank, they could schedule a prank call type with the central controller and this be the indication when others wanting to join are connected.

Various embodiments allow users to control multiple audio channels on a headset. There may be times users want to listen to multiple channels simultaneously. The user could select the various meetings, audio content (music, white noise, podcast) or games by selecting buttons or knobs to have information delivered.

Various embodiments allow parental control to communicate to headphones. Controlling time spent on games and social media is a challenge for parents. The headset could have time of day or time limits established in the central controller by the parents. If the child attempts to access the headset outside of an allowed time or exceeds time spent on the headphones, the device will not power on. In addition, parents may want to interject a comment on the headsets. They could press a button on their headset and inform other connected headsets that dinner is ready or it is time to do homework. This is acting like an intercom device.

Meeting owners may want to change audio controls for meeting participants. As an example, if a meeting owner wants individuals to have a few minutes break to think, they may push 'white noise' to all headsets. In addition, the meeting owners only want architects to discuss a topic in a meeting. The headsets for architects are connected so a conversation can only take place with those key participants. When complete, the connection is closed and the architects rejoin the meeting.

Various embodiments may facilitate audio sharing with someone else on a headset via Bluetooth®. There are times users want to share an audio experience. A user may be listening to a new recording of their favorite artist. The user on the headset could press a button and their other friend's Bluetooth® enabled device could immediately receive the audio stream. Both are able to share the same audio experience. In addition, someone in a meeting may only want to make a quick comment to another person. In the same manner, the person on the headset could press a button and be immediately connected via Bluetooth® to another headset to make a comment.

Headset Swap Control

Various embodiments facilitate the swapping of headphones between devices. As a user, I may want to remove my headset in the middle of a game or meeting. The motion of removing the headphones could allow a different device to automatically connect. For example, I am using my headphones for a period of time at my desk. At some point, I decide I want to remove my headphones. The device could understand I'm removing and swap my listening device and microphone to my computer (my next connected device).

Various embodiments facilitate switching of headset between devices (laptop, phone, car, PC/desktop, in-room conference). Switching between devices is common, but the management and seamless transition between devices is cumbersome. The central controller 110/headset processor 405/user device 107*a* could know which device the headset is connected to. If the connected device (e.g. computer, car, iPhone®) changes or is outside of range (Wi-Fi®/Bluetooth®), the device could automatically connect to the selected or available paired device. For example, a user of a headset is connected to a meeting at home on their laptop. When the user leaves for the office and enters their car, the headset could automatically join the cellular network or in-car Wi-Fi® network without dropping the call. Later, the person walks from the parking lot to their office. The headset could automatically connect via the user's phone network and again, without losing a connection to the call. Once in the office and they enter the meeting room, the headset is connected to the meeting room for completion of the call.

Various embodiments include pre-programmed channels, which may allow ease of movement between each (button press, knob, etc.). The switch between various channels (music, games, podcast, book audio, conference call or, favorite people lists, white noise, coaching session or any listening activity) should be as easy as tuning to a different channel like on a car radio. For example, the user of the headset is playing a game with friends and discussing strategy, sometime during the game the user decides to join a phone call with friends. The user could simply select a button/knob or vocal command and the channel is immediately connected to the friend's call. Likewise, if the user is listening to a podcast and a conference call begins, the headset could automatically know (via the central controller) that the conference call should be connected and with no intervention from the user. At the end of the call, the headset could transfer the user back to the podcast or any other preferred channel.

Categorize and Edit Audio Content

Audio collected from users could be stored with hash values making searching for content easier. The central controller could mark each audio file with a unique user, event type and subject/content. The audio could later be searched by any index (audio, visual or text) and results provided to the user.

The headset could provide hash values for a subject matter expert (SME named 'John') providing a discussion on microservices and stored on the central controller 110. Much later in time, a person with an interest in learning about microservices (or any person) with a headset could make an inquiry to the central controller and ask to provide the SME John discussion of microservices. The central controller could retrieve the audio content and provide what John recorded earlier and provide it to the user. Another example may be to retrieve decisions made by a team that occurred years earlier to understand how a project failed. Collection, assigning a hash value to audio and retrieving from the central controller provides a way to easily, quickly and securely obtain information for evaluation in the context needed by users of a headset.

Various embodiments facilitate instant replay of audio from the last 60 seconds (or any duration) into one ear. Oftentimes people are asked to repeat something that was just said. This is because the listener was distracted or was simply not paying attention. Instead of stopping everyone else in a meeting or looking foolish, the user of the headset could ask the central controller to repeat a portion of the missed conversation. For example, during a call, the presenter discusses a complex topic. The listener of a headset did not quite understand the statement and could request the central controller, either via a verbal command (not heard by others while on mute) or selection of a knob (to dial in the amount of time needed for the replay)/button (default time), to replay the content in one ear. Another example, a meeting owner hears a terrific explanation to solving a problem. Instead of asking the person to restate it and provide focus for the entire team on the idea, the user simply makes a request to the central controller to replay the last comments over 2 minutes.

Editing the Audio

Various embodiments allow audio content to be edited before being submitted to listeners, in case it needs to be deleted. For example, on a call with investors, the executive committee may be responding to investor questions. An executive using a headset through a central controller may provide an answer that gives insight into a future strategy for their competition using a key phrase. Since the audio is delayed and not sent, the user or designee could immediately delete the key phrase from the audio before being sent thus protecting the company and market position.

Various embodiments facilitate editing people out. There are comments that are sometimes not meant for all listeners on a call or game and the invention could allow the blocking of people from the audio. For example, during a decision making meeting, the actual decision makers may want to have a brief discussion before bringing in all other listeners. Instead of dropping the call or having another meeting with only those decision makers, the users (the decision makers in this case) could inform the central controller that only the decision makers need to communicate. Once the communication occurs, they are placed back in the call to resume the meeting by simply requesting the central controller to join the call.

Various embodiments facilitate editing people out or including only certain people. For example, a user could only listen to certain people that spoke during a call. It may not be possible to attend a conference call but the user of the headset wants to listen to key portions from certain people. The user with the headset could request the central controller to replay the meeting and edit out all discussions that did not include the Architects. During the replay, the central controller could provide the audio content for only those Architects and save time for the listener.

There may be times when sudden noises consume large amounts of time in a meeting and are not needed for archival or replay. Various embodiments allow the headset to recognize the content and the central controller 110 to edit out the non-essential audio for storing and replay. For example, each time a dog barks, someone apologizes, a child screams in the background, the doorbell rings or a siren is heard, the meeting is disrupted and time is lost. The central controller could take those noises and edit them from the overall meeting content making them more efficient and less distracting.

Various embodiments facilitate the ability to delay comments on a call. In some cases, a user wishes to retract or rephrase statements he wishes he did not say. Various embodiments allow content to be delayed in its submission to listeners in case it needs to be deleted. For example, on a call with investors, the executive committee may be responding to investor questions. An executive using a headset through a central controller may provide answers that give insight into a future strategy for their competition. Since the audio is delayed and not sent, the user or designee could immediately prevent the audio from being sent and allow another response to be provided.

Various embodiments facilitate clarification of comments. Various embodiments facilitate putting multiple audio clips together. Various embodiments facilitate smart transcripts with tagging. The headset and central controller could allow the user to combine clips to make for a cohesive response. A subject matter expert may have provided an explanation for the use of a new technology to multiple teams, but in a slightly different way or with some revisions along the way, making their original comments outdated. Instead of meeting with all teams again, the subject matter expert using a headset could retrieve the tagged comments from all team discussions via the central controller, edit the most relevant and best explanations and provide corrected statements where needed and resend to all teams. In this case, all teams could now have the most current information at the same time and add efficiency for the subject matter expert.

Various embodiments facilitate speeding up audio to catch up. Users are oftentimes late for meetings. Instead of asking for a recap of the meeting to get them up to speed and delay everyone else, the user of the device could request the central controller play them the portion of the meeting missed and in an accelerated manner. The user could slow the audio down with the headset device if there is a particular piece that interests them the most before catching up to the meeting.

In some situations, for example, a user has not adequately prepared prior to a meeting, and requests a summary. The central controller 110 could analyze the content uploaded for a meeting (video, audio, presentation content or other supporting content) and summarize for the user that failed to do prep work prior to a meeting. For example, if a user of a device is attending a meeting, they could request the central controller provide a summary of the content. The audio provided could scour the content and previous meeting content and provide a verbal summary. If the meeting was in regards to financial update on a project, the attendee could be presented with bottom line financials, key points of contention, comparison of financial information from the previous meeting and submitter as an example. The central controller could also begin to learn the patterns (questions asked, context, learning style (written verbal, pictures) to help provide feedback in these types of situations). This could give the user quick information to be effective in the meeting.

Various embodiments facilitate music that can be broken into constituent instruments. A user may be interested in hearing the different instruments on a recording for purposes of learning or mimicking. For example, the user of a headset may want to learn to play a specific piano piece, the chords, rhythms and meter. The users could request the central controller 110 to only play the piano portion of the recording which could allow the user to more closely match their playing to the recording. In addition, there may be situations where audio mistakes on recordings are made and a user needs to correct (e.g. sound engineer). In this case, the sound engineer could inquire with the central controller via the headset and request only certain instruments be played on the device. This could give the engineer quick attention to these parts for feedback and corrective action.

Use and Control Non-Audio Content

Various embodiments facilitate voting to move on to the next topic, slide, image or video. There may be times when meeting attendees need to move quickly through presentation material due to time constraints or familiarity with a topic. In this case, the user of the headset could signal (audio vote, selection on headset) and indicate to the presenter to move to the next topic, slide, image or video. This invention could allow for a dramatic improvement in meeting efficiency or allow for more time to be spent on topics of most interest to the attendees.

Various embodiments facilitate picking up on social cues or signals. One cue may be to pause and not move on during a presentation. Non-verbal signals may be given to people during a presentation that should delay moving on to a new topic but are often not picked up on by a presenter. For example, some presenters want to quickly move through slides and not allow people to digest content for meaningful questions or dialogue. Sometimes this is a nervous habit or a strategy so no questions are asked, when listeners really need time to formulate their questions. This is especially true for complex topics. For example, a junior marketer may be pitching a new product to a group of executives that includes a lot of background market data and a complex product. While the marketer is open to questions and asks for feedback, there is silence and the user quickly moves to the next slide/topic. The user of the headset/central controller could get visual feedback from the attendees that indicate an inquisitive look on their faces. The central controller could inform the marketer to pause and allow them to think or rephrase a topic. Once the central controller recognizes these expressions have changed to a more accepting look, or questions have been asked, the marketer could move on.

One cue may be to leave a person alone. Sometimes people do not want to be engaged in a conversation but their social cues are not interpreted correctly by others. Users of a headset could interpret the other person's non-verbal cues from the camera, such as not making eye contact, moving their body in the opposite direction, blank facial expression or shrugging to indicate they do not want to be engaged in conversation. The users headset could inform them to not engage the person and to leave them alone at that time.

Visual Alerts

There are times when the user of a headset wants to communicate information to others without having to speak or actively communicate—letting others understand the user's state of mind without having to address them directly.

In some embodiments, the user establishes his status (such as "busy", "available to talk", "free to talk at 11 AM", "can talk if the question is important", "do not interrupt", "email me if you have a question") which is then saved in a data storage device of the headset. The user's current status could be entered into the headset by saying the phrase "busy" into a speaker of the headset which is then transmitted to the headset processor and converted via voice to text software and then stored in a data storage device of the headset as a status of "busy." Alternatively, the user could indicate that he is busy by pressing an input button or setting a switch on the headset processor 405 that indicates a status of "busy." The user could also use an application on his computer to indicate his status and have that transmitted to the headset processor 405, or the user could send a text from a mobile phone directly to a communication device of the headset processor 405 indicating a current status. Once a status has been identified, lights controlled by the headset processor could be used to communicate that status on a persistent basis to others.

In some embodiments, communication of the user's status could take the form of light, motion, or sound from the user's headset. For example, the ear coverings of the headset could contain one or more LED lights (under the control of the headset processor) which light up when the user is busy. The headset headband could also contain one or more display areas that communicate the exact status of the user to others. A color scheme could be used such as Green, Yellow, and Red to indicate whether or not the user is comfortable with being interrupted. In this scheme green could indicate that the user is free to talk, yellow indicates that they are willing to talk if something is important, and red means that the user could prefer not to talk unless there is an emergency of some kind.

The status of the user could also be determined based on actions taken by the user. For example, when a user is on a video call the headset processor stores a status of "yellow" when the user is currently on mute, with the headband of the headset automatically displaying a yellow color indicating to others on the call or to passersby that they can communicate with the user. If the user is actively engaged in the call/meeting/game, the outer ring of the headband could display a different color (red for example) to indicate to others on the call or passersby that the user should not be interrupted.

Users could also update their status to indicate a request to others. For example, it is often difficult to speak on a conference call (video or audio) when participants vocally overlap each other, causing frustration. In one embodiment, a user in a conference call could use the headphones to display a different color or display a text request in order to get the attention of a meeting owner/moderator to request that the moderator mute everyone else and allow the user to speak, thus providing opportunities for everyone to engage in conversation in a more managed way. The Central Controller could also know which participants have been waiting the longest to speak, and send information to the meeting owner to help them moderate who is able to speak next. At any time, the meeting participant could elect to withdraw their question/comment and the color or the headphone returns to a normal color.

Social Connectedness

While many employees now spend more and more time working remotely from home, video calls with co-workers sometimes do not have quite the same level of social connectedness that in-person meetings have. Workers can spend time connecting via video calls, but they often miss having people drop by their office to chat, engaging in small talk with a coworker while getting coffee, bumping into someone in the company parking lot, eating together at the company cafeteria, and the like. Some of the sounds that help to give an office space its character may be rarely heard by remote workers from home, resulting in reduced social connection to employees in the office.

In some embodiments, the headset is able to simulate sounds from an office environment to supplement the experience of remote workers. For example, while a user is on a video call the headset processor could periodically retrieve from data storage a sound associated with an office and present it to the user via a speaker of the user's headset. For example, the headset might periodically play the sound of water dispensers gurgling as users get water, low level conversations among worker, windows being opened, phones ringing, doors opening and shutting, air conditioning units going on or off, footsteps on a floor, coffee pots boiling, airplanes flying overhead, cars honking, etc. Such sounds could help a remote worker to feel as though they were at the office rather than working from home, and could help the remote worker to feel more connected to the other workers on the call who were in the office.

In some embodiments, the remote user's headset could receive samples of actual sounds from a physical office. For example, the physical office could be outfitted with a number of microphones which pick up audio throughout the office—including the sounds of phones ringing, doors closing, air conditioners turning on, etc. These sound feeds would be transmitted to a central controller which would then relay the sounds to the speaker of the user's headset during video calls. The central controller could also store a map of employee locations in the physical office relative to the microphones so that when a remote user is on a video call with a group of employees from a particular location in the physical office, during those calls the audio feed would represent sounds that the office workers might be currently hearing, allowing remote viewers to share in the sound experience of the office workers.

In some embodiments, a remote user can log into a particular location in a physical office, connecting directly to a microphone that is currently receiving sounds from that area. For example, the remote user could connect via her headset to a microphone and/or camera in the break room where employees often make coffee in the morning. While listening to those sounds and conversation, the remote user could make coffee at her own home and feel more connected to the office. In this example, employees present in the break room could activate forward facing cameras on their headsets with the video feed going to the headsets of employees working from home.

After transmitting a live video or audio feed from a physical office location to the central controller, the central controller could transform that data into a more generic form. For example, a live video feed of office workers making coffee could be converted into more of a cartoonish or abstract version in which the identities of individuals in the video could not be determined, though the abstract representation would still give the remote user at hone a sense of being by the coffee machine without knowing exactly who was currently there. The cartoon version of employees could also identify the employee by name, and could include information about that employee that could be helpful in starting a conversation, such as an identification of a key project that they are working on, their to do list for the day, or a technology issue that they are currently struggling with. A company could also allocate physical rooms for the purpose of helping remote workers informally interact with workers physically present at a location. For example, a company could paint a room with a beach theme and connect employees entering the room with virtual attendees from remote locations. The room would enable physical and virtual employees wearing headsets to engage each other in a relaxing environment as a way to motivate social bonding and collaboration.

Pairing, Organizing Teams and Managing

Organizing teams, pairing individuals to work together and connecting teams with experts within or without the organization are central challenges for businesses and organization. Devices according to various embodiments could facilitate team formation, pairing individuals, connect teams with appropriate experts, and connecting organizations with contractors or other forms of expertise outside of the organization.

Within meetings, devices could be used to pair individuals on opposite sides of an argument or on opposite sides of a decision to be made. Meeting owner or central controller could poll meeting participants and match them based upon their responses to a poll. The meeting owner or central controller could assign individuals to particular roles, positions or arguments and pair them with similar or dissimilar individuals. For example, the central controller could ask to pair two individuals together and ask them to defend the opposite position from the one they agree with.

Within meetings, the meeting owner or central controller 110 could pair individuals by engagement level, mood, length of time at the company or in a particular role, or by skill levels. For example, a new employee or a new team member could be paired with an experienced employee or team member. A participant with high levels of engagement could be paired with someone with a low level of engagement to encourage the low engagement employee. The central controller could use employment history, CVs, 360 evaluations, post-meeting evaluations, post-project evaluations, or other more holistic measures of experience and skills to pair employees on other dimensions. The central controller could for example pair employees from different backgrounds or different parts of the company.

The central controller 110 could detect the cognitive type of individuals based upon cognitive task batteries such as the rationality quotient or the elastic thinking measurement. The central controller could use cognitive type to pair individuals or to organize small teams. The central controller could pair individuals to balance out each other's weaknesses or to ensure that the team has a certain threshold number of individuals of particular types. The central controller could utilize the meeting agenda or other criteria supplied by the meeting owner or project manager to discern which types of individuals would be suited for the meeting or project. The central controller could attempt to ensure cognitive diversity by balancing types, or it could use the cognitive types to avoid staffing individuals to certain kinds of meetings or tasks. For example, an individual that is low on a rationality quotient score could be excluded from a decision making meeting.

A common problem in meetings is that the meeting lacks a subject matter expert for a particular technical issue that arises during the meeting. The central controller 110 could provide meeting owners or meeting participants with a list of subject matter experts who have availability on their calendar to be patched into the meeting. The central controller could record, tag and make available throughout the project or enterprise the questions asked of the SME and how the SME answered those questions to disseminate those answers and avoid re-asking those questions of an SME at a later date.

A common problem during meetings is that an outside expert, consultant, contractor, or vendor is not invited to meetings and their expertise is required. The central controller 110 could provide meeting owners or meeting participants with a list of relevant individuals outside of the firm who have availability on their calendar to be patched into the meeting. The central controller could record, tag and make available throughout the project or enterprise the questions asked of the outsider and how the expert answered those questions to disseminate those answers and avoid re-asking those questions of the outsider at a later date.

Outside of meetings, the central controller 110 could detect members of the organization have free time. The central controller could check calendar availability and then detect down time or inactivity beyond a certain threshold. The central controller could then pair a manager with an inactive team member or two inactive team members. The central controller or the project manager could provide conversation prompts for the pair to discuss or could ask a team member to update the other half pair of their work. The central could also pair a busy employee with an inactive employee on a similar project to facilitate the work of the busy employee.

Outside of the meeting, the central controller 110 could pair individuals or organize teams of individuals who work well together. An AI module could be trained based upon audio of prior meetings, 360 evaluations, post-meeting evaluations, post-project evaluations, or other data to determine how well employees interact with each and their contributions to team performance. The AI module could pair or assemble teams or make staffing suggestions to a hiring manager or project manager about the optimal composition of a pair or a team.

Hiring contractors, consultants, vendors and other individuals from outside of the organization is often a high-friction task. Consequently organizations face hurdles to assembling a temporary team designed for specific tasks or projects. Individual contractors, consultants, vendors and other individuals from outside of the organization could store in their headset their work history, CV, licenses, reviews from previous employers or review from previous interactions with the business, as well as their work authorization and financial information. When a manager is looking to staff a project or hire an outsider, the manager could post an opening and receive authorization from the headset owner to review these forms of confidential information. The central controller could then display these forms of confidential information to the manager and expedite hiring. The central controller could facilitate pay or contract negotiation by allowing contractors to set reservation wages or stipulations, by allowing contractors to engage in a Dutch auction for the contract, or through other market design mechanisms. The contractor could be onboarded and sign a non-disclosure agreement and a contract through a biometric signature. The company could release payment to the contractor and use the stored financial information of the device owner to transfer payment. After the contract is completed, the manager could leave feedback for the contractor to facilitate future hiring.

Devices could allow for leaders of an organization to hold office hours or create availability for employees to ask quick questions. A leader could designate certain calendar availability for office hours. The central controller could determine if the leader has calendar availability and then determine if the leader is inactive. An individual with a question could then ask to be added to a queue to speak with the leader. The queue could be prioritized by the leader or by the individual inputting a description, rationale, or ranking of importance of the need for their access to the leader holding office hours. Based upon the queue, the central controller could connect the leader and the individual seeking office hours. The central controller could allocate time to individuals based upon time slots or dynamically depending on the priority of the conversation or number of others in the queue.

The central controller 110 could create a "peek inside" function for organization leaders, allowing them to drop into ongoing meetings in an observer or participant mode. The leader could be visible or not visible to meeting participants in order to not disturb or interrupt the meeting, or to indicate that someone was monitoring the meeting. The leader could choose which meetings to "peek inside." The central controller could suggest meetings for the leader to review, based upon several criteria such as the agenda items, the cost of the meeting as measured by salaries of individuals involved, the type of meeting, meetings that receive high or low post-meeting evaluations.

Headsets according to various embodiments could facilitate a snippet view, allowing meeting owners, project managers, or organizational leadership to poll or survey select employees and theme review audio responses to the poll or survey questions. Individuals could hear the question or take the poll or survey and have a chance to record an audio snippet. Those snippets could be analyzed by the central controller or the leader could review those snippets directly.

De-Biasing Group Interactions and Improving Group Behavior

Business and organizations seek to reduce discrimination and social biases in the workforce. Many biases however are subtle and unintentional. Headsets could be used to reduce biases through detecting biases, providing bias metrics at team or enterprise levels, coaching, or through signals processing that could alter some biased cues that individuals use to process information about other individuals.

Within a meeting or video conferencing session, the central controller 110 could record the amount of time each person speaks. The central controller could detect how much time each headset wearer spends in different conversational roles such as speaker, direct addressee, audience, and bystander roles. The central controller could provide descriptive statistics about the amount of time individuals of legally protected groups or other groups of interest speak during meetings or the amount of time spent in particular conversational roles. The central controller could allow individuals to access their own speaking data and compare their metrics to other members of the team or enterprise, or compare averages for similar roles within the organization. The central controller could also allow individuals to access project or enterprise aggregate data broken down by legally protected groups.

Audio and other device inputs could be used to train an AI module that detects how speakers engage with one another based upon sentiment content in verbal audio content. This module could be trained using verbal content or it could be combined with other device inputs such as facial imagery to detect facial expressions or microexpression or biometric data to detect biophysical responses to stimuli during conversations. Likewise, audio elements such as voice quality, rate, pitch, loudness, as well as rhythm, intonation and syllable stress could be used to train an AI module that analyzes how individuals react to the speech of others. A module could be trained using eye contact, gaze, frequency of eye movement, patterns of fixation, pupil dilation, blink rate and other eye movement data to detect how individuals respond to the speech of others. A module could be trained to detect patterns of interaction utilizing 360 degree reviews, post-meeting performance surveys, in-meeting tagging, in-meeting rating of participants, or other metrics supplied by other members of a group.

These modules individually or as an ensemble could be used to detect biases, discrimination and common patterns of negative by individuals toward members of legally protected groups or toward other groups of interest. These modules individually or as an ensemble could be used to detect how individuals engage with other members along positive dimensions of interest to the organization such as cooperativeness, helpfulness, and thoughtfulness. These modules individually or as an ensemble could be used to detect how individuals interact with others along negative dimensions such as dismissiveness, aggression, or hostility. The central controller could allow individuals to access AI insights for themselves or aggregate behavior for a team, project or the enterprise as a whole.

The central controller 110 could track patterns of interaction by individuals or between individuals across meetings and across time. The central controller could identify trends in interaction over time, detecting whether relationships were improving or deteriorating. The central controller could provide data, insights and trends to individuals, team leaders, HR, organization leadership, or 3rd parties. These insights could be available at the level of individuals, teams, the project-level, clusters within networks, the whole network, or the whole enterprise level. The central controller could identify individuals who work well with particular teammates or who do not work well with particular teams to inform project or team staffing. The central controller could identify problematic relationships for a manager or HR member to intervene and could also identify managers who are adept at managing problematic relationships or reducing negative behavior among subordinates.

During or after meetings, the central controller 110 could detect problematic spoken behavior and prompt the individual with alternative language, framings of problems, or other language. During or after meetings, the central controller could prompt a speaker to apologize to particular individuals or suggest that the individual receive additional coaching or training. Prior to meetings, the central controller could prompt an individual with a history of biased interaction with particular individuals with coaching prior to the meeting.

The central controller 110 could use signals processing techniques to alter the audio or video content of a meeting to reduce biases. Just as orchestras often hold auditions behind a screen, the central controller could hide the face of a speaker, genericize their audio output, or use other visual or audio masking techniques to hide potentially bias-inducing or non-relevant information such as the gender or race of a meeting speaker.

Using masking techniques could also improve how groups use non-relevant (but potentially non-discriminatory) information as cues for information processing. Individuals within groups do not independently form beliefs about information but instead use cues from others about how they should think about information, such as taking cues from authority figures, what they perceive the majority of the group to think, what they think the group believes to be appropriate. These and other forms of social cues can lead to distorted information processing and compromised decision making. The central controller could utilize masking techniques to reduce the ability of individuals to use cues from other group members and increase the individuals reliance on their own judgement. For example, it could turn off visual output from devices and mask all voices. For example it could ask participants to record their opinions and then display them anonymously as text in video or in chat. This feature could be enabled as a default or certain kinds of meetings, such as in high stakes decision making meetings.

Pitch, loudness, quality of audio and other facets of speech have been shown to induce bias in group interactions. Studies have shown for example that louder or deeper voices are perceived as more confident or more authoritative than quieter or higher pitch voices. The central controller could use equalizers, masking or other signal processing techniques to amplify or reduce the volume of quiet/loud voices or increase or decrease the pitch of voices.

Genericizing, anonymizing, masking and other signals processing techniques could be controlled by an individual headset wearer, the meeting owner, enterprise leadership, or the central controller. An individual, meeting owner, leader, or central controller could place some or all output channels as masked or anonymized. For example, a leader might want to reduce their own biases and mask the audio and video content for themselves but allow other participants to be unmasked. The central controller could detect biased behavior on the part of some individuals and mask audio or video output for the remainder of the meeting for some or all participants.

Mood Contagion

Businesses and other organizations often seek to improve the performance of small teams by creating social environments that enhance employee engagement and individual performance. The devices according to various embodiments could facilitate improved social dynamics in small groups by harnessing a social psychological phenomenon known as "mood contagion" or "affective transfer." The behavior of individuals within groups is shaped by their perception of the mood, emotions, or affective state of other members of the group. Through the data generated by the device, an AI module could be trained that could provide feedback to the device owner on the affective states of others, how others perceive the device owner's mood, and through coaching or signals processing, subtly alter the emotional state of the group to improve group performance.

Recent research in social psychology and cognitive neuroscience finds that mood is contagious. More specifically, listeners may mirror the emotional or affective state of a speaker. Individual listeners process aspects of spoken language such as volume, tone, and word cadence as signals of the speaker's affective state. In turn, listeners subtly mirror the speaker's emotional state. That is, unintentional vocal signals of mood can induce a congruent mood on the part of the listener.

Additionally, cognitive neuroscience research has shown that affective states influence group behavior by shaping cooperativeness and information processing. When groups have a positive affective state, they may be more creative, make better decisions and be more thorough in performing a task. They may also be more risk averse, less likely to discern between strong and weak evidence, and more easily persuaded by peripheral cues and irrelevant data. When groups have a negative affective state, they have higher levels of pessimism and negative judgements of others, more likely to engage in in-group/out-group reasoning, and increase risk tolerance. They may also be more likely to use a structured decision making protocol and less likely to rely on peripheral cues and irrelevant data. Depending on the group task, particular group affective states may be more or less optimal.

A headset could improve team behavioral dynamics by altering, inducing or counteracting mood contagion effects. The central controller could detect whether the affective states of individuals in the group correspond to desirable affective states for performing group dynamics. Individuals such as the device owner, meeting owner, or members of the group could input information about the group's task and/or the desired affective state. Alternatively, the central controller could detect a desired affective state from a meeting agenda, the vocal or visual content of a group interaction, or other contextual information. Data generated by the device, such as audio, biometric or visual data could be shared with the central controller. This data could be used to train an AI module that detects the mood of the device owner or other participants in a call, video conference meeting, or other group interaction. The AI module could compare the affective state of individual group members against the group's task. The module then could provide audio, visual, or tactile prompts to the device owner to alter their tone, volume, cadence or other aspects of communication to induce the desired affective state. Likewise, the module could provide feedback to the device owner on whether mood contagion effects were occurring or being used successfully. The central controller could also use signals processing techniques to automatically alter tone, volume, cadence or other aspects of communication to induce the desired affective state. For example, when if it detects that a speaker is angry and is causing other members of the group to have a negative affective state while the group's task required a positive affective state, the central controller could reduce the volume of the speaker's voice or shift the pitch of the speaker's voice to modulate how other group members perceive the speaker's voice.

Integration of Audio, Content, and Messaging

A headset according to various embodiments is well suited to allow users to integrate voice notes into content being reviewed. Many business conference calls involve multiple participants reviewing a presentation deck on a shared screen. While there can be a lot of discussion on the content, those discussions are sometimes lost when the meeting is concluded.

In some embodiments, users on a video conference call are able to append voice notes to the content being discussed. For example, while discussing slide three of a presentation, one user might mention to all call participants that the new product prototype might require more engineering review of the metal casing. The headset could be configured such that the user could say "apply the last five minutes of audio to slide three" at which point the processor of the user's headset retrieves the last five minutes of audio from the user headset data storage device and sends the sound file to the central controller where it could be integrated into slide three of the presentation. After all such sound files are appended, the meeting owner could email the slides with appended audio notes out to all call participants who could pull up slide three and then click any audio files associated with that slide. Audio files could also be associated and stored with particular portions of the slide. For example, the audio clip regarding the need for more engineering review of the metal casing might be associated with a bullet point mentioning the steel casing. That would allow others on the call to review the audio notes for a particular slide (or portion of a slide) of interest later. In addition, the slide presentation could be sent to a representative from the engineering group for review, with the appended audio notes providing substantial additional information. In another embodiment, the user could apply a tag to the appended audio file such as "engineering" or "metal." In this example, the user could say the expression "tag audio comment with engineering" which would be picked up by a microphone controlled by the headset processor, translated to text, and then parsed into a command that associates the tag "engineering" with the stored five minute audio clip. In this way, a representative from engineering could do a search of all presentations stored within data storage of the central controller for the tag "engineering" and then pull up all of the audio files and presentation files which included that tag. This tag could also trigger the central controller to automatically send any audio file with the tag of "engineer" to a particular engineering representative of the company.

Audio files could be recorded and stored before, during, or after a presentation. For example, a user could review a presentation file before a meeting and then add several audio notes to the presentation as described above, sending the presentation file with the audio notes back to the meeting owner who could then aggregate audio files from other meeting participants who had done a similar pre-meeting review of the presentation. During the meeting, the meeting owner could have the option to play one or more of the audio files during the presentation. Users with headsets could also request to privately hear an audio file, or request to privately hear all of those audio files including a tag connected to their area of expertise or interest. Participants could also add audio files to a presentation after the presentation was over. Such post-meeting appended audio files could include suggestions for improvement of the presenter, or could include reminders of action items to be completed by other participants.

In various embodiments, a user listening on a video conference call could send an audio file to another person talking on the call. For example, a user might be listening to a participant and realize that the participant is missing a critical piece of information. Rather than trying to interrupt the participant, the user could instead command the headset processor to take a message by saying "begin message." The user then records an audio file via the microphone of the headset processor 405, and finishes by saying "end message." This triggers the headset processor to end the recording. The user then says "send to Gary Jones" and the headset processor emails the file to Gary Jones for later review.

Appending of audio files could also be used in gaming embodiments. For example, a game character could record an audio comment (such as a suggested new game strategy) and append it to a location on a game for later review by a team member, or it could be sent to all of the user's team members or later review.

Gaming Embodiments

Game audio is central to video gaming experience—facilitating player communication, providing information to players, and heightening immersiveness. Headsets however also could be utilized as game controllers, as enabling dynamic forms of game play and changes to the game environment, facilitating player functionality of transaction and controlling game settings, and enabling social interactions between game players.

In various embodiments, headsets could be used as game controllers. The headset could include accelerometers or tension strain gauges in the headband or the earcups which could detect head orientation, positioning, turning, tilting, or facial expressions. These inputs could be utilized in games for example to control character visual fields, control camera angles, control vehicles. Turning the head for example could be used as a steering wheel in a racing game. Devices could allow for in-game character movements to mirror changes in head or torso orientation. For example, a player might look around the corner of a wall by leaning forward and turning the head. headsets could also include eye tracking cameras which could be used to change the visual field of a character or control in-game functionality. For example, a player might be able to switch inventory items by tracking their gaze across different items. Cameras directed toward the player's mouth might allow games to be controlled by subvocalization. For example, a player could move their mouth in ways that the central controller could interpret as in-game actions.

Eye gaze and head orientation captured by devices could be used for gaming analytics. For example, a player could review how quickly their eyes track to new in-game stimuli. For example, a player could review what parts of the screen they do and not engage with.

Headsets could facilitate a game controller dynamically changing in-game content to increase excitement, difficulty level, game play time, amount of money spent in-game, the amount of social interaction among players, or another goal of the game controller. Attributes of the game could change dynamically in response to head orientation or eye gaze. The game controller for example could path enemies in ways that surprise players by directing their paths through areas of low eye gaze. For example, valuable rewards could be placed in screen locations that players are less likely to view. Attributes of the game could also change in response to engagement levels, affective state, and other nonverbal signals of emotional response such as changes in heart rate, blink rate, galvanic response and other biophysical responses to gameplay.

Verbal and non-verbal auditory data created during gameplay could be recorded by the central controller 110 or game controller. For example, a player could be required to speak certain lines or read from a script during a game. For example, a player speaking with another player could enable game play. For example player to player communication—either with teams, between teams, or between non-team players—could be recorded and used as inputs for metrics. A player for example could be scored on communication skills or one a sub dimension of interpersonal skills such as cooperativeness, helpfulness, coaching other players through game scenarios. These metrics could be used to unlock game functionality—for example, a helpful player could receive certain skills, rewards, or other in-game functionality. Likewise, a game could reward treachery, misinformation, or deceitfulness with in-game skills or rewards. Player spoken audio could transform storylines or alter gameplay. Player spoken inputs captured by the game could be reviewed after a game or made into a transcript.

Non-verbal auditory data such as muttering, exclamations, or breathing rates could be used to enable game functionality. For example, a player muttering under their breath could be mirrored by an in-game character. The respiration rate of the player could also be mirrored in game. The central controller could utilize non-verbal auditory data (e.g. tone, cadence, breathing rates) to detect the sentiment and engagement level of the player and dynamically change game content. Non-verbal audio data could also be used as a metric for reviewing player performance post-game.

Players often use visual skins to customize their characters. Devices according to various embodiments could facilitate "audio skins" or customization of in-game character voices. For example, players could speak character vocal lines or scripts. For example, a voice track could be generated based upon a player's voice. A player could be prompted to provide a training set for an AI module by speaking particular lines or vocal cues. The AI module could then generate in-game audio based upon their voice. Players could modify character voices through audio filters. Players could purchase audio filters of either their own voice or of in-game characters. Players could utilize game character voices within their own player-to-player audio channels.

Attributes of gameplay could alter a player's or game character's voice, either in-game audio or in player-to-player audio channels. For example, a loot drop box could contain items that change the pitch or volume of a player's voice, alter the comprehensibility of a player's voice, or alter the player's ability to speak. For example, game functions could create a helium-like filter for a player or it could make the player slur their words.

Attributes of the game environment could shape audio functionality. For example, the ability of players to communicate with other players or non-player characters could be affected by loud in-game noises. For example, an in-game waterfall or thunderstorm could drown out audio or intermittently mask audio. For example if I am playing a game in an open field you could hear sounds of nature or the sound is digitized to sound like you are outside. Another example is the sound if you are being shot at and hear the bullet go past you. Another example is that if you are in an open room (concrete room) you may hear reverb. If players are inside buildings or around corners from each other, game communication could be disabled to match the performance of radios or communication devices.

Devices according to various embodiments could enable players to interact with other player's headsets—to communicate, alter the functionality or otherwise interact via the devices' outputs. For example, a player could make another player's headset vibrate or change color. If you are getting close to your opponent, you may want to send noises or comments that make them more anxious. This is in an effort to make your opponent be on edge a bit more and make mistakes. If for example you are killed in-game by another player, they could temporarily control your headsets audio, visual or tactile outputs. For example, the headset could output an audio clip of the other player's choice or have their name displayed on your devices.

The central controller 110 could detect the sentiment of player communications, prompt or coach players on their tone, or control access to the game or chat functions. For example, it could send messages to a player when it detects aggressive language, tone or intensity. The central controller could prompt the player to calm down, apologize, or suggest alternative language. If the player continues to engage in inappropriate behavior, the central controller could remove the player's communication abilities, pause the player's inputs (allowing other players to take advantage of the non-responsive controls), remove the player from the game, add the player to a ban list, or otherwise punish the player. Positive behavior could be incentivized. The game controller, the central controller, or a third party such as a parent or regulator could set a list of particular words, phrases, or behaviors to encourage or discourage. The game controller, the central controller or third parties such as parents could set a threshold of behavior that triggers positive or negative consequences. Positive in-game behavior could be used to offset negative behavior.

Devices could allow offline modes for games or for headset-to-headset gaming. In some embodiments, game software could be installed in the headset's memory and/or could run using the headset's processor. Games could be played via the headset, with or without additional controllers, when players are not connected to phones, computers, or other computing devices. Headset based localization of games could be useful when players have limited connectivity to networks, such as while driving in rural areas or playing inside subways or dense urban areas. headsets could be connected to each other via Bluetooth®, local area networks, Wi-Fi®, cell data, or other networking methods. In some embodiments, headsets could communicate directly with other headsets. Connecting headsets with other headsets could enable location-based game functionality. Connecting headsets with other headsets could also enable social discovery—connecting players within an area with other players playing the same game or gaming in general. Connecting headsets with other headsets could create hybrid or blended real and game environments, such as live action role playing.

Headsets could connect with cars, vehicles and other modes of transportation, allow players to continue playing games while moving or allow new forms of game functionality, such as location-based game modes. For example, while playing a game while moving, a headset could permit the in-game character to move using an analogous form of transportation. If I am driving a car, then I could be driving a wagon in game.

Physical movement, visiting a particular real world location or travel in the real world could be required to move a character in-game, unlock particular game items, skills or functionalities. Actions taken in the real world could be detected by the headset based upon location data from GPS, Bluetooth® beacons, or other form of positioning system. Accelerometer data could be used to detect particular forms of physical movement. headsets could use location information to dynamically change the game based upon location context. For instance, to unlock a new area of the game, I could be required to visit a particular store or location in the real world. The game controller could detect that I had visited a physical location or performed a particular activity and then unlock in-game functionality. For example, visiting a particular store could unlock a customized digital skin or in-game loot. For example, I could be required to exercise or go outside of my home before a character could level up.

Headsets could allow for the manipulation of information and communication as a controllable aspect of gameplay. In some embodiments, a player might control another's headset, listen in on another's communication in whole or in part, insert disinformation, encrypt or decrypt another's communication, jam or disrupt, or otherwise manipulate another player's in-game audio. For example, a player might use an in-game listening device, such as planting a bug, to spy on another team and gain access to their physical headsets. For example, if a character is killed in game, a player might be able to pick up that character's radio and listen in or send broadcasts. For example, a game might temporarily provide tidbits of radio chatter or team audio as part of a scenario or as in-game loot or reward.

In-game microtransactions could be enabled by the headsets in accordance with various embodiments. The headset could store identity and financial details of the device user. The device owner could set a pin, passphrase, or other form of authentication to unlock in-game purchasing ability. In-game purchases could be enabled by voice command. For example, a player could purchase a temporary level-up, skill, or functionality during a boss fight by saying "buy a potion."

In-game audio controls, such as the volume of player communication, game music, or ambient game noises, could be controlled via inputs on the headset. Buttons, sliders and toggles either on the headset or located on the headset wires could be used to control these functionalities. The headset could control these audio settings via voice recognition. Setting preferences for individual device users could be saved in the headset, either overall preferences or preferences based upon particular games, game scenarios, or types of games. The device could remember these settings or utilize preloaded settings based upon the type of gaming being played. The device could manipulate these settings based upon game play performance, engagement or affective state. For example, when a player is performing poorly, it could increase the game audio and reduce music audio. Game music tracks could be controlled dynamically by the headset, game controller, or central controller based engagement levels or affective states. For example, the game controller could change music genre to create new stimuli or because it detects that a player doesn't like a particular genre of in-game music.

Avatar Management

Video conferencing calls often have participants in a gallery view so that you can see most or all of the participants. Participants can decide to enable a video feed of themselves if they have a camera, or they can have a still photo of themselves to represent them, or they can have a blank representation typically with only a name or telephone number shown. There are situations, however, when a user would like a greater amount of control in how they are represented in a video call.

In various embodiments, a user can create a cartoon character as a video call avatar that embodies elements of the user without revealing all of the details of the user's face or clothing. For example, the user could be represented in the call as a less distinct cartoon character that provided a generic looking face and simplified arms and hands. The character could be animated and controlled by the user's headset. A user might create a cartoon character, but have his headset track movement of his head, eyes, and mouth. In this embodiment, when the user tilts his head to the left an accelerometer in his headset registers the movement and sends the movement data to the headset's processor which is in control of the user's animated avatar, tilting the avatar's head to the left to mirror the head motion of the user. In this way, the user is able to communicate an essence of himself without requiring a full video stream. The user could also provide a verbal command to his headset processor to make his avatar nod, even though the user himself is not nodding. One of the benefits to using an avatar is that it would require significantly less bandwidth to achieve (another way to reduce bandwidth used is to show a user in black and white or grayscale). The user's headset processor could also use data from an inward looking video camera to capture movement of the user's eyes and mouth, with the processor managing to control the user's avatar to reflect the actual facial movements of the user. In this way, the user is able to communicate some emotion via the user's avatar without using a full video feed.

In various embodiments, the user headset includes detachable sensors that can be clipped to the clothing of the user in order to feed whole body movements into the control of the avatar. For example, the user might clip one sensor on each leg and one sensor on each arm. These sensors would provide position data with Bluetooth® or Wi-Fi® to the user's headset processor so as to allow the processor to generate the user's avatar to reflect the arm and leg motions of the user. For example, this would enable the user to be able to raise his right arm and see his avatar raise its corresponding right arm as well. By employing a larger number of sensors, the user could enable the creation of an avatar with a greater level of position control.

The user's avatar could be created to look something like the user, such as by matching the user's hair color, hair style, color of eyes, color of clothing, height, etc. Clothing color could be picked up by an inward facing camera of the user's headset and reflected in the clothing color of the user's avatar. Users could also have several different avatars, selecting the one that they want to use before a call, or switching avatars during the call. Alternatively, the user could define triggers which automatically change his avatar, such as changing the avatar whenever the user is speaking. The owner of the call could also change a user's avatar, or even substitute one of the meeting owner's avatars for the one that the user is currently employing.

Avatars could be licensed characters, and could include catch phrases or motions that are associated with that character.

Users might have one avatar for use in game playing, another avatar for use in school online lessons, and another avatar for video calls with friends and family. The user could also deploy his game avatar while participating in a video call with friends.

Avatars could also be used as ice breakers in video meetings. For example, a user might have an avatar that can add or remove a college football helmet of his alma mater. The owner of the call might also be able to add a helmet to each meeting participant based on their alma mater. The user could have a separate avatar for his dog which appears whenever the dog begins to bark.

In various embodiments, the user is able to have control of the space that appears behind her on a video call. Instead of putting up a photo as a virtual backdrop behind her, the user could use her headset to create a more dynamic background that could entertain or inform other call participants. For example, the user might speak into a microphone of the user's headset, with the audio signal being processed by the processor of the headset with speech to text software. The resulting text could be displayed in the space behind the user on the video call.

In various embodiments, the user creates small drawings or doodles using a mouse that is wirelessly connected to the headset. The headset processor 405 then sends these images to the meeting video feed so that they appear behind the user during a video call. Users could create a "thought bubble" to the right or left of their image on a call. Alternatively, the user could do a drawing but have it overlaid on top of the image of another call participant's head. For example, the user could sketch a pair of eyeglasses to appear on the face of another call participant.

Users could also direct the headset processor to alter the images of other participants on a video call, flipping the images upside down or sideways, or invert the image right to left. Such alterations could be done to appear only in the call video feed that the user sees, or in the call video feed that every call participant sees.

In various embodiments, the user employs degrees of blurring of their face during a video call. For example, a user just waking up might not want other call participants to see that their hair was not combed and elect to blur out their image somewhat, or elect to blur out just their hair.

Non-Player Character Management

While call participants are used to dealing with photos and videos of other call participants, along with the occasional backdrop image, various embodiments provide options for far greater interactivity and creativity in the way the traditional video call gallery looks.

In various embodiments, software used to host online calls is enabled to allow non-player characters to move about in a gallery view of call participants. For example, a non-player character could be a cartoon image of a sheriff which shows up randomly on the backdrops of users in a video call. For example, a user might have a video feed of himself displayed to all of the other users on a video call when the sheriff character shows up next to the image of the user. These non-player characters could appear on some user backgrounds but not others. They could be programmed to only show up during breaks or in between agenda items when users are looking for a moment to have fun and relax.

In various embodiments, two non-player characters could interact with each other. For example, a sheriff character and a thief character might show up in the backgrounds of two different users. The sheriff character then throws a lasso over to the thief character and reels him into the background in which the sheriff is currently positioned.

Non-player characters could add some fun to calls, but could also serve useful roles on a call and could help to improve the behaviors of users on the call. For example, a librarian character could show up in the background of a user who seemed to have forgotten to go off mute, with the librarian character telling the user to be quiet. The participants on a call could have the option to double click on the image of a participant who they think should be on mute, summoning the librarian character to appear and give a warning to the offending user. In this way, a light hearted and anonymous measure can be taken to improve call behaviors.

Non-player characters could also be associated with particular roles on a call. For example, the call owner could have a dragon character by the side of his video image as a reminder to the rest of the users that he holds a lot of power on the call. A character with a wooden hook could "pull" a user out of a gallery frame when they speak too long.

Non-player characters could be used to amplify or exaggerate the emotional state of a call participant, such as by having a devil character appear next to the image of a user who has been speaking loudly.

These characters could appear to walk by, appear behind a user, or peak out from behind a user.

Examples of non-player characters include a Sheriff (who might appear when the meeting is drifting away from the agenda), Barkeep (when someone is listening and fully engaged according to that user's headset), Villain, "Damsel" in distress (for a user who is struggling with the call software), Fire fighter, Trickster, Snake oil salesman, Time keeper, round keeper, Master of Ceremonies, DJ, Boxing announcer, Messenger (when one user wants to initiate a sub-channel communication with another user), Ambassador, etc.

Non-player characters could also be licensed characters that are purchased from the central controller. Examples include Simpsons characters, King Kong, the Godfather character, Disney princesses, Star Wars characters who can have light saber battles during a call, and the like. These licensed characters could also have associated sound bite catch phrases or short video clips of licensed content.

Appearance of non-player characters could be determined by a vote of the call participants, or an appearance could be triggered by the request of a single call participant. In another embodiment, a user not currently on the call could initiate the appearance of a character to explain why the user was late for the call.

These characters do not have to be characters. In some embodiments, the non-player character is a lightning strike that hits a call participant who was identified by the meeting owner as having a good brainstorming idea. There could be a conch shell object that a user "hands over" to another user when the first user is done talking.

Non-player characters can interact with user images, such as a firefighter character pouring water on a user who has been talking for more than five minutes continuously.

Games could be facilitated to entertain users on a call or serve as a warm up exercise. The call platform could prompt everyone at the start of a call to say a word that begins with "R." Or the call platform randomly picks a first user and requests that they say a word or sentence beginning with the letter "A", and then picks a second user at random to start a word or sentence with the letter "B", and so on until "Z." In an improv game of Count to Twenty, users could start by shouting out the number 1, then 2, then 3, etc. But if two users say the same number at the same time, the platform determines that a word collision has occurred, and the users have to start back at number 1. A non-player character could introduce the rules to the users.

Non-player characters could be awarded to call participants for tagging content, taking notes, helping others on the call, being supportive, or encouraging a shy participant to speak up. Meeting owners could also award participants coins for good behavior, with users buying non-player characters with those coins.

In some embodiments, call participants could buy a subscription to licensed characters, or buy clothing that would trigger the appearance of non-player characters.

Heating, Cooling and Power Management

The inclusion of sensors and other accessories may consume power and generate heat. The management of these devices and controlling the heat may be beneficial, e.g., to make the headset more comfortable.

Heat dissipation may be accomplished in various ways. A fan may be used for cooling the headset and person. Liquid cooling may be utilized, such as cooling that allows for the flow of a supercooled substance to regulate the temperature of the device. In various embodiments, adaptive fabrics are used on the covering of the headset to release heat more efficiently and at the same time cool the user. In various embodiments, a headset may be adaptive to outdoor and body temperature. If the outside temperature is cold or the body is cold, the sensors could continue to function and provide body warmth.

In various embodiments, sensors may be controlled with a view to heat dissipation. A headset may control processes to regulate sensor/processing to reduce heat. There may be times that sensors need to be turned off in the case of malfunction or to reduce heat. The central controller 110 could monitor the temperature of the overall headset and once it reaches a level or if a sensor is malfunctioning, begin to turn off the appropriate sensor. The order the sensors are turned off could be a preference the user sets based on their use. For example, a casual user on a walk may prefer that all biometric sensors be turned off, but the camera, microphone and light feature be left on for safety purposes. In the event that all sensors are turned off, the user could be notified for corrective action (repair, removal or to get to a cooler place).

Sensors may switch on and off dynamically, altering which is recording. The use of some sensors may be prioritized over the use of other sensors. If the headset reaches temperatures in excess of the stated limits, the headset could turn off sensors and other functions to reduce thermal output. For example, the inward camera could be turned off, the various sensors turned off in order (e.g. EEG, Oxygen, temperature) but leave core functions like the microphone enabled. Once the temperature returns to a normal state, the sensors could be automatically turned on and the user informed.

In various embodiments, the headset may control the use of the sensors and other functions based on the power level (0% to 100%) of the headset.

A headset may employ equalizer-like controls. The headset could be equipped with knobs/buttons/sliding wire controls that allow the user to dynamically manage the power consumption and function of the sensors when the overall power level is low. For example, the user may use a control knob to reduce the video quality of the camera, turn the inward camera off or stop recording the EEG and temperature readings.

Various embodiments may facilitate prioritization of sensors, quality of or frequency of input readings, and/or mode (connected or not). The central controller 110 could allow the user to set power consumption preferences related to the priority of senor use and level (more or less sensor readings), quality of reading and recordings or connectivity (cellular, Wi-Fi® or no connectivity). As the power is consumed, the headset and central controller could alert the user which sensor and functions are reduced in capability or turned off. At a certain point in power consumption, the user could be informed that the device is turning off and to recharge.

The headset could be powered by a direct wired connection, USB connection, magnetic connection or any other computer or device where sharing of power is available.

A headset according to various embodiments may offload processing to another device or PC. Using headset processing to enable the device could consume power. The headset could have the ability to connect to another processing device (e.g. computer, cell phone, tablet, watch, central controller) and use their processing power to collect and analyze data collected from the headset. This could reduce the power consumption needs of the headset.

A headset according to various embodiments could be outfitted to allow for wireless charging. An example could be the use of magnetic charging.

Various embodiments facilitate power generation from head movement. Kinetic energy may be generated from the movement of the head while a user is wearing a headset. The kinetic energy generated could be stored in the headset and used to power the various sensors and functions.

A headset could have a power supply (e.g., batteries) that could be swapped and recharged for use at a later time. The power pack could be put in a rechargeable device and used later when power is depleted on the headset.

In various embodiments, sensors/modules have their own batteries. The sensors or any supported function/add-on in the headset could be powered by their own batteries. This could offload power consumption from the main headset power.

In various embodiments, a headset (or any sensor or other component thereof) may be solar powered. The headband on the headset could be equipped with a solar panel. The energy collected from the solar panel could be used to power the headset and sensors on the headset.

Based on a user's activity (start and end), the headset could go from sleep mode to active mode. For example, prior to a meeting, the headset could be sitting on the user's desk and in sleep mode. Once the meeting begins and the headset is placed on the head, the headset could automatically go into active mode with all sensors and functions activated. If the user is a participant only and not playing a defined role (e.g. decision maker, innovator, SME, meeting owner), the headset power could go into conservation mode and disable power consumption for specified sensors (e.g. EEG, EKG, outward camera) or based on the preferences of the user.

In various embodiments, geofencing controls power modes. The headset device could enable/disable sensors and functions based on the established geography of the device. For example, if a company owned headset is to be used only for on-property purposes, the headset could be powered only when the device is in the geography of the company. In addition, if a runner wants to have exercise-type sensors function for a running path, the user could establish the route in a preference and only those sensors would then be powered by the headset in the defined geography.

Emergency and Safety

The use of devices to alert emergency personnel or prevent accidents from occurring is a potential benefit in various embodiments. The headset, e.g., via its sensors and cameras, could continually monitor the user's environment and respond to vocal/non-vocal events to provide emergency services and feedback.

Various embodiments facilitate alerts to complete activities. There are times when users are distracted and forget to complete a task. The headset equipped with a camera can record the activity, send the information to the central controller AI system and alert them if the task was not completed. This can help with improving human performance and focus on a task to completion.

For example, a parent may put a child in the car during a hot summer day to go to daycare. The parent is distracted with conference calls and mental wandering and drives to work, forgetting to drop off the child. When the user arrives at work and closes the door, the headset and central control AI system recognizes the task of removing the child from the car seat did not take place and alerts the user via the headphone audio ('get child from car') or emergency vibration.

As another example, a user may decide to cook a steak on the grill. They place the steak on the grill and leave the patio. They are distracted by someone coming to the door and starting a conversation. 15 minutes later they recall the steak was left on the grill and burned. With the headset, the camera could record the user putting a steak on the grill. The central controller AI system knows the steak is being grilled, in 7 minutes of cooking does not record movement to the grill and alerts the user to complete the activity and move to the grill to turn the steak.

As another example, in business, interruptions occur all the time. The camera could record a user preparing an expense report, but is interrupted. The central controller AI system could later alert the user that the activity was not completed.

Various embodiments facilitate voice activated connections. For example, a user could request to be connected with "poison control". The headset could respond to vocal commands and call the appropriate emergency department. Examples included 9-1-1, Poison Control or Animal Control.

Various embodiments facilitate voice activated feedback, such as emergency feedback. The headset could recognize that any emergency call has been placed and immediately provide helpful feedback. Examples include directing the user to begin CPR, not induce vomiting for ingestion of certain cleaners, applying pressure to a cut or providing calming sounds if the headset notices a spike in heart rate or blood pressure.

Various embodiments facilitate sound enabled connections. Various embodiments facilitate providing useful information to emergency authorities. In an exemplary situation, a user says "Contact Security, active threat". The headset could understand these types of statements and call a company's security department and local authorities. While connected, all sounds could be recorded and delivered. These may be gunshots, statements made by the people involved in the incident, video of the actual event and global positioning. All of this information collected by the central controller AI system, in combination with the actual layout of the facility, could be made available to emergency responders and analyzed for the best plan of action prior to arriving at the scene.

In the event of someone falling while they are alone, the headset could contact emergency responders, record the user's vital signs using the enabled sensors and provide authorities with video footage of the incident. Furthermore, the responders could also deliver information to the person as a way to help them regain consciousness or inform them that assistance is on the way.

Various embodiments facilitate telling a person where to go and how to get there. In the case of a fire or places that are unfamiliar to a user when an emergency begins, the headset could provide guidance. For example, if a fire started in a building that is unfamiliar to the user, the headset could use information from the central controller (with access to public information) to inform the user how to exit. The emergency responders could inform the user which path to take to avoid closures or where there is impending danger.

Various embodiments facilitate coaching a user through a Heimlich maneuver or CPR. Bystanders are often used to engage in emergency procedures while waiting on emergency responders. At times, users do not have immediate recall or lack the basic understanding to perform the emergency function without some coaching. The headset could coach the user through emergency procedures. For example, if a person is choking at a restaurant, a user of a headset could request coaching on the Heimlich maneuver. The central controller could respond with the steps or a video. In addition, since the camera is enabled, it could inform the user of any corrections needed during the maneuver.

Various embodiments facilitate engaging emergency lights on top of the headset. There may be situations where a user is stranded and need to inform others. For example, if a car is broken down on the side of a road, the user could enable the lights on the headset to signal an emergency. Likewise, if a biker is wearing the headset and falls or is hit, the headset could also light up automatically. Headset sensors could be automatically enabled to collect data and send to emergency responders through the central control AI system.

In various embodiments, an inbound emergency headset contact number and conditions get patched through immediately. Users participate in activities by themselves (e.g. biking, running, walking, shopping) or with people that do not have headsets. If an emergency occurs the headset may contact the user's emergency contacts immediately and inform them of the location and connect them to the individual. In addition, the emergency contact information and health data of the individual is immediately provided via the central controller 110 to the emergency personnel during the dispatching process.

Various embodiments facilitate overriding a user's phone settings, e.g., with respect to blocked calls or with respect to a silent mode. There are situations where people do not answer cell phone calls after repeated attempts because they do not have their phone, silence their phone or leave it in their office/home. But, they need to be contacted. For example, a mother leaves their child at daycare and the child becomes ill. The mother, a user of a headset, is attending an important meeting and silences her cell phone or leaves it in her office. The daycare needs to desperately contact her, but fails. After repeated attempts to the phone, the phone call can be immediately transferred to the headset for connection. The list of priority individuals where a call can be automatically transferred and event interrupted could be maintained in the user's preference on the central controller (e.g. daycare, school child, spouse, parents).

Various embodiments facilitate use of a headset as a driving assistant. There are examples where headsets can prevent accidents. For example, with the accelerometer and inward/outward camera, the headset could notice the head dropping and determine the user is falling asleep while driving. In this case, the headset could alert the user via vibration alerts and vocal alerts to stop the car. In cases where there are environmental distractions, the headset could inform the driver to take corrective action. For example, the headset could notice it is raining outside, there are multiple people in the car speaking/yelling/singing, visibility is reduced, the music is turned up to excessive levels and the biometric sensor data collected notices a high heart rate, irregular EEG and reduced breathing. In this case the headset could inform the user to slow down, turn down the music, encourage people to stop talking and take a few deep breaths to avoid an accident.

Situational (Environmental) Awareness

Environmental conditions, sounds and images are constantly collected by the user to take action or ignore. Many of these indicators are but casually observed, overlooked or not even noticed given other senses are fully engaged. The headset can provide ongoing environmental awareness and alert the user, even when they are not engaged mentally.

In various embodiments, a headset microphone collects audio information from the environment. In various embodiments, audio collection of siren (emergency) noise causes runners/bikers to be alerted for action. For example, if a person on a bike wearing a headset hears a siren (via the microphone), the biker is alerted in the headphone (e.g. 'emergency vehicles approaching') or the headphones vibrate.

A microphone may collect audio from animals. The headset could listen for animal noises to alert the user in advance. For example, if a person is walking, listening to music, they may not hear a dog approaching them (angry or friendly). This could startle the user and create panic in the animal with unintended consequences. The headset could listen for the barking dog running toward the walker. The headset could notify the user that a dog is approaching.

In various embodiments, a headset camera collects visual information from the environment. Consistent with some examples, footsteps/bicycle images behind (or in front of) the user are collected from the camera(s). If the user attempts to move to the left or right and the microphone or camera notices someone approaching quickly, vibrate the earphone so the user does not move over in front of them or give you an opportunity to alert those behind you.

In various embodiments, a forward facing camera can provide the user with the distance to an identified point (e.g., the camera can serve as a rangefinder). For example, a runner wants to know how far down the path until they run 0.5 miles. The user could speak into the microphone of the headset and make a request (e.g. 'show location in 0.5 miles'), the camera could be engaged and headset respond from the central controller AI system with the landmark in front of the user (e.g. 'to the red brick house on the right' or show on the display screen).

In various embodiments, a camera can trigger a volume adjustment. Users in public often listen to other audio (e.g. books, podcast, music, telephone calls). When the camera on a headset notices another user approach and begin to speak, the volume could be turned down or muted for listening. In addition, if the camera notices heavy traffic before the user wants to cross in the intersection, the audio volume could automatically be turned off or reduced.

Various embodiments facilitate litter control. Those searching for litter to clean the environment could be alerted by the headset. Using the forward facing camera, the camera could continually monitor the environmental surroundings and detect trash. The display screen or audio alert could notify the user of trash in proximity so it can be picked up and disposed of. This could be considered the 'metal detector for trash' using a camera.

Various embodiments facilitate sharing and/or evaluation of images (e.g., among large groups of people). Groups of people with headsets equipped with cameras, audio and sensors could share information with others via the central controller AI system and relay this to others when appropriate. For example, if a person goes for a walk on a path and discovers that it is covered with rain from the night before, the GPS, camera and audio could pick up this information and store it in the central controller AI system. Later that morning, another person on the same path using a headset could be alerted in advance that the path is covered with water and to reroute their walk.

Air Quality Sensor

A headset according to various embodiments may include an air quality sensor. The sensor may detect pollution and alert one or more people as to the presence of the pollution. People desire to breathe clean air while outside or inside. The sensor equipped headset could continually monitor air particulates, volatile organic compounds, pollen levels, ozone levels or other aspects of air quality. The headset could alert the user if they reach unacceptable levels. For example, if the family is outside on a casual bike ride and ventures past a paper processing plant, the headset could alert the user that they are entering a zone with high levels of methane gas. The alert could be in the form of an audio announcement or vibration. When the family exits the area and air quality improves, another announcement is made through the headset.

Various embodiments facilitate obtaining crowd-sourced data about pollution. If multiple people with headsets pick up the pollution, the information could be sent to the EPA (Environmental Protection Agency) or appropriate local authorities. For example, each morning, people drive cars to offices and are routinely stuck in traffic creating CO2 and other pollutants. The headset picks up the pollutants and informs the central controller AI system. The central controller AI system could know the traffic patterns of drivers and alert them to avoid the area due to pollution. This could be sent to their audio headset or in report format. In addition, the local authorities or EPA could be informed by the central controller of high pollution levels for notification to the community at large. Crowd sourced pollution data could also be shared via an API. For example, crowd sourced data could be integrated into mapping software to route walking, running or cycling individuals away from point sources of pollution or prompt users to avoid using human mobility during certain times of day. For example, crowd sourced pollution data could be integrated into health and exercise software to inform individuals about their exposures to different sources of pollution across different time scales, such as daily exposure to small particulates or VOCs. Air quality data could be integrated with other sensor data such as respiration or heart rate data to model how air quality impacts different aspects of exercise or health such as running performance, asthma risks, or lung cancer risks. Crowd sourced pollution data from headsets could be used to inform advertising, insurance or other commercial purposes. For example, if an individual has been exposed to outdoor pollen, the central controller via an API could share that data with companies marketing antihistamines. A company might improve insurance models by utilizing crowd sourced pollution data. For example, a company might increase insurance rates for a business if distributed pollution sensors such as headsets reveal that individuals downwind of the business are exposed to higher levels of pollution.

In various embodiments, a headset, e.g., using a microphone, may monitor ambient noise, such as to measure noise pollution. Individuals are continually exposed to ambient noise levels that may damage their hearing, reduce cognitive performance or otherwise affect their health. The device could utilize the main microphones as an ambient sound sensor or could include an ambient noise sensor. A headset could communicate ambient noise data to a connected cell phone, computing device, other headsets in a local network, or to the central controller. Ambient noise data from the central controller could be made available via an API. The device could be enabled to collect ambient noise data when the device is not being worn. Device owners could be prompted with visual, tactile, or audio alerts about high levels of noise pollution or dangerous forms of ambient noise, such as particular frequencies. The central controller could collect aggregate noise exposure data for individuals. The central controller could also collect ambient noise data to develop crowdsourced geospatial data on noise pollution. The central controller could prompt local government authorities about high levels of ambient noise. For example, the central controller could contact the government about noise complaints from loud parties, construction work, or overhead aircraft. Crowd sourced noise data from headsets could be used to inform real estate, advertising, insurance or other commercial purposes. For example, ambient noise data could be used in real estate to gauge the desirability of living in a particular neighborhood or whether an individual apartment within an apartment building is noisy.

Public Health Embodiments

Many public health issues require collecting fine-grained, disaggregated data about individuals' health and their social contacts. Obtaining high levels of resolution both spatially and temporally, while respecting the privacy of individuals whose data is being collected, is a difficult challenge. The devices according to various embodiments could detect individual level health data, could anonymize and share that data with public authorities, healthcare workers and researchers, and could enable social contact tracing for communicable diseases.

Devices could contain many sensors that could be used to aid in the detection of disease symptoms for the device owner and symptoms in others, such as thermal cameras, ear thermometers, forward facing RGB cameras and other sensors. For communicable diseases such as SARs-2 Covid 19, an AI module could be trained that could detect common symptoms such as coughing, elevated temperature, and muscle rigors (shaking from chills) using forward facing thermal cameras or RGB cameras in the device. The central controller could compare an individual's temperature with baseline readings and prompt the individual with an alert if they had an elevated temperature. An AI module could be trained to detect whether the device owner was sick, detecting for example sneezing, coughing or muscle rigors from accelerometer data or through an inward-facing camera in the microphone arm. The central controller could then prompt the device owner through an alert that the device owner was likely to be sick.

Devices could also aid in detecting whether others around the device owner were likely to be sick and aid in contact tracing. The device for example could record when others sneeze, cough, or display visual indications of a disease. The device could also record the identity of others in the vicinity through for example facial imagery, through Bluetooth® proximity data or through a token protocol. The device could communicate with other devices and/or the central controller to share both the symptoms and the identity of individuals who had been likely to be exposed. The central controller could prompt the owners of devices that they had been in the vicinity of individuals displaying symptoms and suggest they engage self-quarantine and also prompt public health officials with an alert to test the individuals who had potentially been exposed. Health and social contact data shared with the central controller could be made available to public health officials, medical personnel or researchers via an API.

By logging into the device or otherwise authenticating the identity of the wearer, the headset could enable public health authorities to detect whether individuals were observing a quarantine. Using a location geofence around the wearer's place of residence, the central controller could detect whether an individual had left their home and broken the quarantine. Likewise, the central controller could detect whether individuals had visited a quarantined individual.

Headsets for Exercise

Comprehensive exercise data is increasingly important to athletes, both novice and professional. The data is used to improve endurance, form and to reduce injuries. Many devices (e.g. Smart Watch) currently collect data for observation during the activity and analysis after the exercise, but provide limited immediate feedback to improve the athlete. The headset device is equipped with sensors to collect heart rate, oxygen levels, galvanic (sweat/hydration levels), accelerometer and temperature. In addition, the use of the camera on the headset is used to gather visual data for immediate/post analysis of the exercise for feedback to the athlete.

Real-time monitoring and feedback of athletic performance to athletes. A runner, biker, weightlifter, basketball player, soccer player or athlete of any type may have varying degrees of performance at various times, but not enough comprehensive data to make the needed adjustments. These can be the time of day, type of exercise, length of exercise or physical condition of the athlete. The headset, with sensors and cameras can collect the following information, process via the headset processor 405 and feedback provided to the athlete during the exercise activity.

Various embodiments facilitate monitoring oxygen levels. Measuring oxygen levels is important feedback to provide the athlete as a reminder to intake more air and breath. The headset oxygen sensor monitors the oxygen levels in the body, transmits this to the headset processor 405 which is sent to the central controller for AI analysis. If the oxygen level is low, the results are transmitted to the athlete via the central controller to the headset processor 405.

Various embodiments facilitate monitoring heart rate. The heart rate is something done in devices today, but analysis of the data and feedback to the athlete is minimal. The headset heart rate monitor measures the heart rate, transmits this to the headset processor 405 which is sent to the central controller for AI analysis. If the heart rate level is too low or high, the results are transmitted to the athlete via the central controller to the headset processor 405 with a reminder to slow the heart rate or increase the pace to increase the heart rate if that is the goal of the athlete.

Various embodiments facilitate monitoring galvanic/hydration levels. Dehydration is a serious concern for many athletes, especially in a location with high temperature/humidity, and is sometimes a dangerous condition. The headset galvanic sensor measures the hydration level of the athlete, transmits this to the headset processor 405 which is sent to the central controller for AI analysis. If the hydration level is too low, the results are transmitted to the athlete via the central controller to the headset processor 405 with a reminder to drink more fluids.

Various embodiments facilitate monitoring acceleration, e.g., via an accelerometer. Measuring acceleration for runners, walkers, bikers or other activities with forward motion may help with improving performance. Many devices measure average speed over a distance, but few provide real time information of acceleration during the exercise activity. The headset accelerometer measures the athlete's acceleration, transmits this to the headset processor 405 which is sent to the central controller for AI analysis. The results are transmitted to the athlete via the central controller to the headset processor 405 with information indicating that the acceleration is consistent with the athlete's desired goal or to increase their acceleration or to adjust their gait to increase/decrease acceleration.

Various embodiments facilitate monitoring temperature. Athlete temperature is a serious concern for many athletes, especially in locations with high temperature/humidity or cold/dry climates. The temperature sensor measures the body/skin temperature of the athlete, transmits this to the headset processor 405 which is sent to the central controller for AI analysis. If the temperature of the athlete is too low, the results are transmitted to the athlete via the central controller to the headset processor 405 with a reminder to dress warmer or indications of other issues, like dehydration. If the results indicate the body temperature is too high, the reminder to the athlete from the central controller may be to remove clothing, slow/stop the exercise, drink more fluids, get to shade or assist in contacting emergency personnel.

In various embodiments, athletic form is captured and evaluated by using a forward facing camera. Proper form is a key element to preventing injury and improving athletic performance, but is rarely captured unless you have a coach observing and providing feedback or you have access to a mirror to observe yourself. The forward facing camera as part of the headset invention could capture movement of the athlete during the exercise for arm movement, stride/leg extension, foot placement, posture and vertical motion. For example, during a run, the camera could capture the stride of the runner and placement of the foot on the ground. If the stride is too long and the leg fully extended, this could cause injury to the knee. Whereas, a shorter stride, where the leg is not fully extended and the stride length reduced could result in lesser injuries. This information could be collected by the headset processor 405 via the forward facing camera, transmitted to the central controller and feedback provided to the runner, real-time or after the fact. This allows the runner to be coached immediately for improved performance. Another example is for weightlifters. Incorrect form could cause serious injuries. If someone is performing a deadlift with an arched back, incorrect hand placement on the weight when bent over, or incorrect stance, The forward facing camera, as part of the headset invention, could provide feedback to the user for weight lifting form and movement of the athlete during the exercise. This information could be collected by the headset processor 405 via the forward facing camera, transmitted to the central controller and feedback provided to the weight lifter, real-time or after the fact. This allows the weightlifter to be coached immediately for improved performance with feedback to pull your shoulders back and not arch your back, place your feet shoulder width apart or place your hand closer together on the weights. Another example could be for use in yoga. As these moves can be complex, the headset with camera could monitor the move and provide feedback if the yoga position were incorrect. This could result in improved performance and less injury.

Various embodiments facilitate monitoring rehabilitation (e.g., compliance with rehabilitation exercises). For example, if the physical therapist provides a list of stretching exercises in the form of a piece of paper with written instructions, the execution of those at home and on your own is not continually observed by the therapist for immediate correction. With the forward facing camera, the therapy movements could be captured by the camera via the headset processor 405, transmitted to the central controller for AI analysis and immediate corrective feedback or encouragement sent to the individual. This could accelerate the therapeutic impacts and reduce healing time as well as provide confirmation to the therapist that the patient performed the exercises correctly.

In various embodiments, a headset may flash or glow to alert bystanders or signal turns. indicator. Many people are using the same space to exercise (run, bike, walk . . . ), walk with pets, ride motorized vehicles (e-bikes, scooters) at various speeds and response patterns. This is increasing the rate of accidents between these various people and activities. The headset could be equipped with a flashing light/glowing symbol to indicate to those in front of you and behind you of your intention and movement direction. For example, with the voice, accelerator and camera headset, if you are approaching another person, you could move your head to the left or say 'left move' which could light the headset symbol on the front and back indicating you are moving to the left. If you are intending to stop, you could shake your head multiple times or say 'stop' and the headset symbol on the front and back could display a stop sign symbol. The information could be facilitated by the sensor collecting information, transmitting to the headset processor 405 and the headset activating the light, glow or symbol.

In various embodiments, a headset may include a path light for exercise or other activity. People that exercise at the end of the day or evening are oftentimes met with changing conditions from dusk to full darkness. The light headset could activate the light when the outside conditions turn dark or cloudy, thus increasing visibility. If the camera senses that visibility is reduced, the lights on the headset could turn on automatically providing visibility to the individual.

In various embodiments, a 360 degree camera on the headset could be configured to provide continual feedback to users. For example, suppose a runner is on a path and decides to move to the left. The 360 degree camera could see a biker or car coming up quickly behind them and inform them to not move to the left, avoiding a collision.

The collection of the sensor data from the headset could also be stored locally during the exercise and analysis/feedback not performed real time. The headset processor 405 with sensors could collect the data, the user connects the headset to the user device 107*a*, the user device transmits the data to the central controller 110 for AI analysis and feedback provided to the individual of the activity they complete. The feedback could be in the form of audio coaching, video coaching showing your activity overtime using the enabled camera, or text of results and improvement opportunities post the activity.

Keyword Review

There are many communications (such as meetings, one-on-one sessions, or inbound calls) in which one participant is operating under regulations or guidelines that restrict what he or she can say in that session.

In some embodiments, a user saying a particular keyword or key phrase into a microphone of the user headset triggers immediate intervention from an authorized representative of a company or a regulatory body. For example, an employee conducting a job interview who asks the interviewee an impermissible question might trigger the headset to initiate a call to an HR representative of the company to provide guidance on what the employee needs to do next, or tells the employee to wait until an HR representative comes to the interview room. In this embodiment, the user headset might also provide audio warnings during the interview when such impermissible questions are asked.

Users might also be able to initiate a sub-channel call during an inbound call from a customer. This could be initiated by a user who is not sure about what he should be telling the customer. For example, the user could press a button on his headset when a call comes in asking about warranty options for a new product. The headset then opens a call with the user's supervisor, but only the user can hear the supervisor, and the customer is not able to hear the communication between the user and the supervisor.

A call regarding an employee reference might also be monitored for particular keywords so as to ensure compliance with company policy. For example, the company might have a policy not to verify a previous employee's salary level. If a reference call comes in, the headset could listen to the call content and then generate an audible warning to the employee answering the call if the caller used the word "salary" during the call.

In various embodiments, meeting transcripts could be searched for keywords after the meeting was concluded. For example, a transcript with the word "regulations" could be flagged for further review by a representative of the regulatory department.

In various embodiments, the stress levels of a user during a call, such as an elevated heart rate picked up by a heart rate monitor of the user's headset, could trigger a sub-channel call with someone from HR.

Education

Education, courses, training, examinations and other forms of learning increasingly use software, take place in digital environments, occur over videoconferencing, or utilize telepresence technologies. The devices according to various embodiments could enable improved measurement and feedback of learning and teaching outcomes, as well as provide coaching to students and teachers. devices could allow for personalized educational content or methods of instruction.

Devices according to various embodiments could be used for verification of student identity and ensuring integrity for teaching, courses, and online examinations. Verifying that the correct individual is taking an exam and ensuring that individuals don't cut, copy, or paste material from outside of the exam into the exam software are challenges to replacing in-person exams with online exams. The functionality of exam software could depend on the device owner wearing a headset. A headset according to various embodiments could use authentication, passwords, biometrics sensors or other stored identity information to verify that the individual using the input device is the individual supposed to be taking the exam. Additionally, a forward facing camera in the headset could be used to track the visual field of the device owner and could be used to detect cheating behaviors. For example, it could detect whether individuals were typing answers or whether individuals are cutting, copying, or pasting material into the exam. For example, it could detect individuals were looking at material outside of the exam software. The headset could also be used to detect whether individuals had biometric data consistent with someone taking an exam on their own rather than reading notes or communicating with someone. The exam software could use micro-expressions as an anti-cheat measure. For example, the exam software could ask a question such as "are you cheating?" and then the central controller could use the individual's micro-expressions to detect whether the individual is attempting to conceal information.

During classes, training, or exams, the central controller 110 could detect whether the device owner is utilizing non-education software or whether the device owner is present in front of the computing device through the use of a forward facing camera. The central controller could prompt the device owner to return to the educational software or could lock the functionality of the devices for non-education purposes during classes; until a task, assignment, or homework has been completed; or until the teacher permits a class break.

Devices according to various embodiments could provide a real time measure of student engagement and learning outcomes through an AI module that is trained using the device's inputs, such as camera, audio and biometric sensors. A forward facing camera or the audio data could allow the AI module to detect what kind of learning task or type of material the student is attempting to learn. A camera in the microphone arm or an external camera could provide eye tracking data. In addition, the device could utilize head accelerometer data or tension strain sensors located in the device headband or ear cups to measure head orientation, angles and movements, as well as hand gestures such as a head tilt, facepalming, or intertwining of hands in hair. Other sensors such as galvanic skin responses, heart rate data, thermal cameras, and other biometric sensors could be used to detect physiological responses to different kinds of learning tasks or material. Using these kinds of inputs, an AI module could be trained to detect: engagement levels, affective or emotional states, and microexpressions or other "tells." For example, the AI module could detect excited, apathetic, confused, stressed, or other emotional responses by learning material.

A headset and AI module could be utilized in many ways. Devices could be used to measure learning processes and outcomes during classes, during homework, or during exams. For example, it could provide real time feedback to both learners and teachers about student's engagement levels. For example, an AI module could provide coaching to students about material they find difficult or frustrating. Or an AI module could detect material students find stimulating and give supplemental or additional course material. Additionally, an AI module could measure over time the effectiveness of different teaching strategies for teachers. The AI module could prompt teachers to alter ineffective teaching strategies, reinforce effective teaching strategies, or individualize strategies to different types of students. devices could be used to coach teachers on more effective instruction techniques, the proportion of students with different learning styles, and how to customize material students' learning styles and speeds.

The AI module could track over time student responses to similar material to measure learning outcomes or to enable improved material presentation. An AI module could choose among multiple versions of teaching material to individualize learning to an individual student by dynamically matching versions with a student's learning history, or the module could offer another version if the AI module detects that student is not learning from a particular version.

Devices according to various embodiments could be used to train an AI module that predicts the difficulty of learning material and would allow a teacher or educational software to "dial in" the difficulty of learning material to individualize learning content—either to decrease difficulty or increase difficulty. Devices could also allow the creation of customized syllabi or learning modules, which present the material to students in different sequences depending on learning styles and engagement levels.

Devices according to various embodiments could be used to train an AI module that combines device inputs and sensor inputs to ascertain whether documents, presentations, or other material are challenging to read or comprehend. A headset containing a camera in the microphone arm or in another location that focuses on the wearer's eyes or a headset that contains an accelerometer could be used as an eye tracker or head orientation tracker. This data could be combined with a forward facing camera to detect what the device owner is looking at. By tracking eye gaze or head orientation, an AI module could be trained to detect what material individuals spend time looking at and what they do not. By combining eye gaze or head orientation data with other device sensor data such as biometric data, an AI module could be trained that detects micro-expressions, affective states, or other nonverbal "tells" related to viewing material. These insights could be provided to the device owner, the meeting owner or stored in the central controller. These insights could be used to create a coaching tool to improve the quality of presentations and presentation materials.

An eye gaze or head orientation tracker 110 could allow the central controller to measure how much time students are spending on homework or practice outside of the classroom and whether they are engaged with the material ("effective practice").

Devices according to various embodiments could allow third parties such as parents, tutors, school administrators, or auditors to review engagement and learning data as measured by the central controller. Learning data and AI insights could be made available via an API. For example, because a headset could allow measurement of learning outside of traditional testing environments, continual measurement might defeat "teaching to the test." Educational testing could be replaced with engagement levels or other learning metrics from devices. School administrators or other third parties could develop metrics of which teachers are effective from learning data derived from the central controller rather than relying upon existing systems of measurement and evaluation.

Headsets according to various embodiments could permit teachers to pair students for practice session small tasks, assignments, or group projects based upon student's engagement levels, proficiency with the material or other dimension. Students could be able to communicate on an audio channel within the group which the instructor could access.

The inputs of the device could allow for quick quizzes, polls, or answers without students raising a head and waiting to be called on. Students could digitally shout out the answer, which could or could not be shared on the main audio channel of the class, and receive feedback from the teacher or software. Similarly, a student could ask a question out loud and the central controller would recognize the question and not share it with the main audio channel. Consequently, a student would be able to ask a question without waiting for the teacher to ask for questions or raise their hand. Any question could be displayed to the teacher in real time or collected for a later moment. The central controller could store the questions for analysis either by the teacher or by an AI module.

The outputs of the devices according to various embodiments could be utilized for providing feedback to students in the form of visual, tactile, or audio feedback. This feedback can be controlled by the teacher, the central controller, the game or software controller, or an AI module. For example, a student could receive feedback, in the form of visual, vibration, or temperature changes, after they input an answer to the question. The teacher, software, central controller, or AI module could identify whether the question is correct and output a visual signal if correct (e.g., "yes", "thumbs up"), if incorrect, ("no", "thumbs down").

Students could utilize a tagging or clipping feature to take notes during classes. Students could tag content using keywords, themes, sentiments ("I didn't understand") or action items ("review this" or "ask a question about this"). Additionally, they could clip portions of a class audio and/or presentation material. These tags and clips could be overlaid with audio or text notes generated by the student. These tags, clips, and notes could be made available to the teacher or used by the central controller for analysis.

Devices according to various embodiments could be used for learning a language. For example, it could allow software to detect whether students pronounce words correctly or visually detect whether words are formed using the correct part of the mouth. Gamification of language practice could be enabled by these devices. For example, language practice software could be installed locally on the device hard drive and run using local processors allowing a student to learn while wearing the device but away from a computer, phone, or connected device. For example, while practicing language skills, the central controller could detect whether the speaker is using correct pronunciation, word choice, grammar, and word ordering and give audio or tactical feedback to the speaker. A student or teacher could customize the type of feedback (e.g. vocabulary or grammar rather than both) and also the level of feedback (during a conversation or after the conversation for example). The central controller could detect language errors and then create focused practice to help the learner.

Childcare

Parents are often overwhelmed by the parenting process, especially when they have multiple small children who require a lot of attention. Any help that they can get in making this process easier to manage would be greatly appreciated.

In various embodiments, sensors of a parent's headset can help to make visible issues that previously went unseen. By making the invisible more visible, the parent is able to make more informed decisions and is better able to understand the needs of children.

In one example, the parent's headset includes a sensitive microphone that can pick up sounds outside of the normal human hearing range, or sounds so soft that an aging parent would normally completely miss it. For example, a baby might have an upset stomach that is making very soft gurgling sounds that might easily be missed by a parent. But by wearing a headset with a sensitive microphone, the headset processor could detect these sounds and amplify them for replay into a speaker of the headset, enabling the parent to become aware of the sounds and perhaps alter their behavior in some way as a result.

With a thermal camera attached to a parent's headset, it would be possible for the headset processor 405 to generate a heatmap of a baby which indicated where the baby was warm or cool. This map could be emailed to the parent, or presented to the parent on a display screen of the parent's headset.

With an outward facing camera, the headset could be programmed to detect changes in skin color which might be a precursor to the onset of Jaundice. The video/photo data collected could also be used to detect the earliest stages of the onset of a rash, or reveal how a cut has been healing over time. Data related to the health of the child could be stored in a data storage device of the parent's headset, and it could be transmitted to a physician for review. Video clips, for example, could be shown to a physician via a telemedicine session relating to the child's health.

In various embodiments, the parent could detach a Bluetooth® paired motion sensor from their headset and attach it to an arm or leg of the baby so that the headset could detect small changes in the baby's mobility over time, which could allow a parent to be able to better predict in advance when a baby is going to get sick.

Babies make a lot of movements that are often mistaken for seizures, including having a quivering chin, trembling hands, and jerky arm movements. The outward camera could detect these micro-movements and assure the parent there is nothing to worry about or compare to babies of similar age and alert the parent if they should take the baby for further diagnosis.

The parent's headset could include a camera and microphone that could record and tag the emotions of a child. For example, parents want to capture the development of their children, including laughing, cooing, and new movements like clapping and rolling over. These emotions and movements could be captured more quickly than retrieving a cell phone and tag these for storage and retrieval. The parents could also compare responses from a child over time (from night to day) and compare to see if emotions are getting stronger.

With an outward camera and microphone, the parent could capture if the baby is in pain or which body part is affected. The emotions, movements and complete body scanning could be captured and compared to a bank of other baby responses. This comparison could assist the parent and indicate if the emotion is common among babies or if there is a need for further diagnosis. Parents could be relieved from overeating to conditions typical in children. These sounds and images could also be shared with medical professionals for evaluation.

Audiobooks and Podcasts

Listening to audiobooks and podcasts is a popular pastime, with sales growing significantly as people consume more and more content digitally.

In various embodiments, the headset processor 405 allows for easier and more adaptive means of controlling the rate at which the audiobook audio is presented to the user. For example, the headset could automate the regulation of playback speed by having the headset processor 405 detect the level of engagement of the user as she listens, such as by a camera of the headset processor 405 determining that the user is yawning above a fixed threshold of frequency. In this example, when the user yawns more the playback rate of the audio is automatically slowed down. EEG data read from the headband of the user's headset could also provide base data on which an engagement level could be determined and used to adjust playback speed up or down.

Playback speed could also be adjusted based on verbal requests from the user. For example, users could listen to an audiobook and say "slower" or "faster" at any point in the book to change the speed of the audio. Data from multiple users aggregated at the central controller could allow users to elect to have the audiobook playback slow down or speed up based on an average of the data collected by the central controller for that page of the audiobook.

Volume level could be adjusted via an audible request from the user, or pressing an up/down volume indicator on the headband or ear cup of the user's headset. Volume changes could also be made automatically based on the level of sound in the user's environment. For example, the audio might be at a medium level while a user walks down a quiet street towards a coffee shop, but increases in volume if the headset detects that the coffee shop is a noisier environment.

Audiobook content could also automatically be stopped based on the headset picking up what seems to be a verbal request from someone. For example, a user in line to buy coffee might listen to an audiobook, but when a camera and microphone of the headset detect that a question has been asked of the user, such as an employee asking for an order, the headset processor temporarily stops the audio feed of the audiobook.

Audio content such as audiobooks or podcasts could also be stored within the data storage device of the headset, allowing users to pay for and access content without having to make a purchase at a third party merchant. The headset could also be sold with bundled content stored within, available to a user as long as they are able to authenticate themselves to the headset.

Audiobook content could also be made more dynamic by having the content change based on where the user was when she listened to it or the time of day. For example, the audio content could avoid the words "car accident" if it was determined by the headset that the user was traveling more than 40 miles per hour.

In various embodiments, audio content such as an audiobook or audioplay could be customized to the individual. Akin to a "choose your own adventure story," the audio content could allow the listener to make decisions between different aspects of a plot tree or storyline. The audiobook or play would prompt the listener to make a decision from several options, the listener could use device buttons or voice commands to choose an option, and the audiobook could deliver the branch of the plot tree associated with that choice.

Music

Currently digital media use masking and other forms of information reduction as a form of compression. Music could be provided in an unmixed, multichannel form allowing individuals to customize their own mix or equalizer settings for instrumental and vocal parts. The headset could record the equalizer settings, store these settings for playback of the song at a later time, or enable sharing of these settings as "remixes" with others.

Musicians, producers, and labels could release filters that could enable the headset to alter their audio inputs or outputs to match the style of their favorite artists. Using equalizer settings, masking and signals processing technique, the filter could alter my audio input or output. I could alter all music or audio through a particular filter, or my microphone output could be transformed by the filter. For example, I could buy a licensed filter from my favorite producer or band. I could have all of my vocal output put through a Rick Rubin filter, or my voice could sound like Kanye West's.

The headset could facilitate improved sing-along and karaoke functionality. The central controller 110 could detect whether the headset wearer is singing along to the song and then display lyrics on connected devices with a screen output or the headsets visual outputs. The central controller could also provide upcoming lyrics in an audio channel in one ear to provide coaching on the next lyrics. The central controller could detect when individuals are singing incorrect lyrics, signing off pitch or off tempo.

The devices according to various embodiments could provide feedback or coaching for individuals learning to play music. The central controller could detect what piece of music you are practicing and correct mistakes such as inappropriate changes in tempo, missing noises, inappropriate dynamic range or other musical mistakes. For certain instruments, the central controller could provide audio coaching about changes to finger positioning, vocal embouchure or other physical aspects of the instrument. When it detects repetition of particular errors, the central controller could suggest particular forms of practice or drills to improve weak areas. The central controller could track the amount of deliberate practice (focused repetition) that the wearer is engaging in. For group musical compositions, the headset could play the other musical parts or provide the vocal equivalent of a conductor, telling the wearer when to perform certain musical actions.

Individuals enjoy dancing to music but sometimes struggle to find an appropriate rhythm. The central controller 110 could detect dancing movements through an accelerometer in the headband of the headset, in the ear cups, or located elsewhere in the device. The central controller could enable a metronome or provide feedback on whether the wearer is dancing to the beat of the song.

The central controller 110 could dynamically create playlists depending on contextual information from the headsets inputs. Dynamic playlists could be created depending on time of day, activity, the affective state or mode of the device owner (to counteract affective states or to amplify affective states), sleep, fatigue levels, and location. For example, the central controller could detect that I am lifting weights, am low energy, and am surrounded by other individuals in a gym. It could then create a playlist designed to increase performance by playing loud heavy metal.

Soundtracks may be important audio elements of shows, movies, and digital movies. They are often designed to evoke particular feelings. Yet different types of music produce different affective states in different individuals. TV, movie and video creators could insert metadata into videos that allow the central controller to determine what kind of emotion the creator intended to create and dynamically choose appropriate music for that scene, taking into account the individual's past affective responses to music. Or creators could choose a small number of musical clips and allow the central controller to choose the best option.

Individuals often have pieces or phrases of music "stuck in their head" but can't remember the rest of the song or the name of the song or artist. The wearer could sing or describe the phrase stuck in their head, and the central controller could make suggestions about which piece of music the wearer has stuck in their head. The controller could play clips and the wearer could search using vocal or button controls until they hear the piece or phrase they were thinking of.

Individuals could trade songs or playlists with other wearers of headsets. Often people wearing headsets look as if they are listening to a particularly compelling song or playlist. If they are wearing a headset, another person could query them for permission to listen to their music or they could set permissions to allow individuals around them to sample their audio. Individuals could set a friends list or permission list that allows select other headset wearers to sample their audio. One person could subscribe to someone else's headset, such as a celebrity, a musician or band, or a DJ. Permissions could be geofenced so a first person could make anyone in their vicinity able to hear the first person's playlist. The headset could also suggest songs or playlists to be based upon what other people on a person's friend list or within the person's vicinity are listening to. The central controller could suggest social connections to the person based on the correspondence of his/her musical tastes and the tastes of other individuals in his/her location/area.

In various embodiments, headsets could allow individuals on friends or permissions list to control the music playing in other devices. For example, one person could make a playlist or choose songs for a particular friend.

Individuals feel a sense of pride for discovering obscure or unfollowed music. The central controller could curate a playlist of unpopular songs either in the wearer vicinity or in their friend list. As songs become listened to more and more, the central controller could suggest new obscure music. Some obscure music is obscure for a reason. The central controller could optimize obscurity with other metrics based upon music that the wearer enjoys. For example, the playlist could be the most obscure things that sound like songs I already like.

Headsets could allow musicians to stream concerts and live music directly to headset wearers. Individuals could receive a notification if a musician they like is about to go live, and they could pay for a concert ticket using stored value in the headset. Individuals could use buttons or voice control to tip the musician during the concert.

Individuals could store music in the headset in order to listen to music when they are not connected to other devices or to a network connection.

The central controller 110 could suggest local bands or upcoming concerts based upon the wearer's location data and music listening history. The headset could show me what concerts other people in my vicinity are going to attend, so I don't miss a show that will be attended by my peers. The headset could prompt me if I come into contact with other future attendees to facilitate finding a "concert buddy" to go to a show together.

A venue could communicate with the headset to authenticate that an individual had attended an event. Individuals could visually display "social proof" of their attendance on their headset or other connected devices. Headsets could exchange tokens with other headsets in their vicinity or on the same network. People who attend the same concert or event could be prompted when they come in contact with someone else who attended the concert or event, facilitating discovery of individuals with shared interests.

Tickets for a concert, festival, or event could be purchased or traded from headset to headset. I could use voice command or button functionality to find a concert, find available tickets either from the venue or on the secondary market, and purchases or trade for those tickets. Tickets could use the devices authentication and encryption capabilities so that individuals could verify they have purchased valid tickets on the secondary market. My headset could contain my ticket, which would allow me to enter a concert, festival or event without scanning a physical ticket. Headset ticket holders for example could have a shorter queue into a venue. Venues could re-sell tickets based upon event capacity if authenticated ticket holders do not show up to the show at a certain time. I could be prompted if a ticket becomes available during the opening act.

Preferences/Customization

A headset according to various embodiments can become personalized by the user so that the user's preferences are reflected in the functionality of the headset and the way that the headset can be employed by the user. Various embodiments allow users participating in virtual calls to customize many aspects of how those communications are heard, seen, and managed. Game players can customize their gameplay experience. The present invention allows users to store information about desired customizations for use in customizing headset experiences. Customizations could be for digital actions, or for physical changes of the headset.

Game players could store their identity for use across games, computers, and operating systems. For example, the headset could store player logins and passwords associated with all of their favorite game characters. This could enable a player to take their headset from their home and go to a friend's house to use it during game play there. The computer or game console owned by their friend could then read in data from the user's headset processor 405, enabling the user to log in with any of their characters (such as by having the headset processor 405 retrieve the appropriate login and password from the storage device of the headset, sending that information to the computer of the user's friend to be used to initiate a game session for the user) and have access to things like saved inventory items such as a +5 sword or a magic healing potion. The user's mouse could display the items in inventory on a display screen of the user's headset, allowing the user to touch an item on the display screen to select it for use, with the headset processor 405 transmitting the selection to the user device 107*a* or central controller 110. The user could also have access to stored preferences and customization for things like custom light patterns on their headset. The user's headset might also have stored game value that could allow a user to buy game skins during a game session at their friend's house.

The headphone owner could be given options to personalize their headphones visually on the physical headset display device for viewing by other users—such as by designating a lighting pattern on a series of LED lights across the headband of the headset. Such lighting patterns could be done to demonstrate the user's mood for the day (green for happy, blue for sad, red for energetic, etc.), a special event (e.g. the user's birth day, month and year scroll across one or more display screens on the headset headband), a recent accomplishment (certification, graduation, birth of a child), or any topic to discuss (such as something in the news that day) or any emoji of interest. If it was the user's birthday that day, the user may want to have the sides of the headphones display a party hat or cake with a candle. Likewise, if the user just received their Agile Certification, the headphone could display their certification badge. In a meeting setting, the meeting owner could call on the person or highlight the person based on the headset display.

Attendees on a conference call are often presented with 'canned' music. In various embodiments, the headphones could automatically retrieve from the data storage device of the headset the type of music that the user prefers, and play that via speakers of the headset that music to the participant while they are waiting. Preferences can be stored with the central controller 110 or made available via the headset data storage device. The headphones can also be used to select different music channels by simply hitting a button on the arm of the headset, or tapping one or more times on the ear cup of the headset.

Similarly to a green screen or background image, a user could be enabled to modify the virtual display of her headphones to be visible to others during a meeting. For example, if the weather is cold outside, I may want to select a headphone background/image to show as ear muffs to others in the meeting.

Physical customization that a user might establish could include elements like the length of the headset band, the tension of the headset band, the direction of one or more cameras, the sensitivity of one or more microphones, the angle of view of a camera, and the like.

Customization of a headset could also include the location of display areas, sensors, cameras, lights, foam padding, length of the headset arm, preferred color patterns, the weight of the headset, etc.

Virtual customization could allow players to establish preferences for a wide range of enhancements. For example, the player might save a preference that when his headset signals that he is away from his computer that any other connected users are alerted that he will return in ten minutes time. Customizations could also include a list of friends who are desired team members for a particular game, or a list of co-workers for virtual business meetings. These other people could automatically be added to a chat stream when that particular game or business call was initiated.

Customizations could be stored in a data storage device of the headset, in a detachable token that can be plugged into the headset processor 405, in the user device 107*a*, or at the central controller 110.

Customization could also be tied to the location of the user. For example, information in a data storage device of the headset might be unlocked for a user only when he is within a particular geographical area. The functionality of the headset could also vary depending on the location of the user. For example, a user who steps away from his desk while on a call could trigger the headset processor to automatically mute the user.

Nudges

Nudges may include brief reminders to users to be aware of their current behavior for possible modification. These nudges are more passive in nature and various embodiments can assist the user in correcting and improving the desired behavior.

Nudges may help people stop the use of phrases. Some people have bad habits they try to stop, and the headset could provide alerts (audio, visual or movement) when the phrase or habit is recognized. In some embodiments, if someone uses phrases like, 'you always act like . . . ' or'stop yelling at me', the virtual assistant could provide audio coaching and tell the user to stop the use of the phrase. This could be in the form of an audio announcement or audio cue (e.g. vibration, beep). In other embodiments, the user may use too casual of word choices for a conversation and need to be informed to correct. These could include using the term 'bro' with people in authority or in a more formal discussion. Furthermore, the assistant could provide alternative steps to correct the action based on available resources.

In some embodiments, nudges may help avoid vocal hesitations and distractions. For example, delivering a presentation or content to another person can be distracting if there are overuses of phrases or delay tactics. Examples include using the words, 'um,' ah', 'like; or use of slang and stalling. The headset could inform or nudge the user of these words for immediate correction or provide a summary feedback (via the central controller) to the user after the event (e.g., number of times a word was used, amount of delay).

In some embodiments, nudges may serve as human performance reminders. There are times that users fail to recall the coaching provided by their managers, peers or professional coaches and need to be reminded. Headset 4000 could allow those individuals ('coaches') the ability to 'nudge' the user to take some action or improve based on observations. In some embodiments, if a manager has coached an employee to be more assertive in meetings, when there is a meeting taking place where the employee is being perceived as passive, the manager could simply send a reminder through the headset that alerts the employee to exhibit more assertive behavior. These could take the form of non-verbal or verbal reminders. This real-time coaching reminder is valuable to increase the chances of modifying behavior and improving human performance in a way that is not distracting to others or calls attention to the person needing to improve.

Coaching and Training

Coaching and training are key developmental activities that both employees and employers are continually looking to deliver. Individuals also desire coaches for both recreational activities, self-help studies and those are or are perceived as successful in their field of expertise. Coaching and training requires investment in time and resources to not only observe the behavior of a person, but also the skills to deliver effective feedback, suggest improvements and motivate them to continue. In many cases, timely delivery of feedback is not possible and hence the effectiveness diminishes. The headset and central controller AI system could allow the users to subscribe (or receive) to coaching and training based on their level of interest or goals, observe the behavior and provide feedback on improvements or encouragement on performing the activity and match the feedback to the learning style of the user. This coaching and training is dynamic and could be provided in real time when the activity occurs or after the fact.

Various embodiments include a headset equipped with a virtual assistant. Users sometimes need to be coached through a task or simply inquire about an issue. In various embodiments, a headset could not only provide audio feedback, but also video. For example, if the user is refinishing a piece of furniture and needs to see instructions for removing varnish, the user could simply say to the headset to coach me through refinishing. Both audio and video cues could be delivered to the user.

In various embodiments, micromovements and/or voice commands turn on an assistant. The headset equipped with a camera/microphone could always be monitoring the user for physical movements, vocal commands and biometrics If the user's heart rate, facial expression (e.g. scowling or perplexed look) or comments (e.g. 'I'm not sure about this', 'how do I do this', 'this doesn't feel right') indicates there is an opportunity for assistance, the virtual assistant could automatically offer coaching and training.

Various embodiments include voice controls and/or a virtual assistant. The central controller could be aware of the task or activity the user is participating in, or the user simply requests the virtual assistant for help. For example, a user is wanting to bake a chocolate cake and requests assistance from the virtual assistant. Instead of simply delivering a static version of a recipe, the virtual assistant could walk through each step of the recipe with the user, observe the step and approve before moving on using the headset with camera(s). The headset with camera could see that the dry ingredients were not mixed thoroughly and provide the user with feedback to continue mixing. In addition, if the user was supposed to use two eggs and the assistant observes only one egg, feedback could be provided that only one egg was used. In this way, the user could not only get verbal instructions, but also observation of the task, making coaching and training more effective.

In various embodiments, a virtual assistant could remind users of behavioral issues, such as talking over each other. Coaching people for behavioral corrections is difficult because they need to occur at the time the behavior is noticed and not after the fact. In a business setting or conference call, this is not always possible or appropriate during a professional setting. The virtual assistant could remind users of behavioral issues in real time. In addition, various embodiments could allow a message to appear on a screen indicating that people are speaking over each other. For example, if a person is always interrupting others on a call, the headset could notice this behavior and inform the user to be more conscious and wait until others are finished talking. Likewise, a message on their screen could say, 'wait your turn, others are speaking' as a reminder.

Various embodiments facilitate a prompter. The central controller 110 could provide prompts to the user regarding content being delivered. For example, a user may be delivering key updates using summary slides. The slides may contain details in the notes section but are not easily accessible during a presentation. If the presenter is asked a question, the central controller could interpret the question and provide the user with prompts regarding relevant details in the notes section or other sources of information.

In various embodiments, a virtual assistant can help a manager to provide coaching to an employee or other individual. Managers may observe behaviors (good and bad) that need to be delivered to an employee, but full schedules by both do not allow for timely feedback and discussion. The headset could allow a manager to record feedback for the employee. The central controller 110 could tag the feedback and make it available to both parties for review at a convenient time. In addition, the central controller could edit the feedback to be more succinct and use words that are more coaching oriented (start with positive feedback, provide specific examples referencing the audio/video/content recorded) to achieve increased employee performance and acceptance of the feedback.

In various embodiments, coaching and training may be delivered in a user's preferred learning style. Users may desire a coach that gives them commands on how to perform better, while others may respond better to feedback from a more encouraging style. Still others may prefer to receive feedback as areas of opportunity and not corrections/errors. The headset and central controller could allow the user to select their preferred learning style and the feedback adapted to match the style.

In various embodiments, coaching may be provided based on goals and desired feedback levels. Users performing activities may have different goals. Some may desire to achieve a level of improvement in a certain time period while others are just interested in some helpful techniques. The headset and central controller could allow the user to specify their goals and tailor the amount of feedback during or after an activity accordingly. For example, if a person is wanting to compete in a 5K running race in one month, the central controller could provide a coach that is frequently telling the user to run certain distances, start eating healthier and set a pace goal, while at the same time giving feedback during the activity on progress and corrections in more of a militant style. On the other hand, another user may want to simply run a 5K sometime in the next 6 months and do so casually. In this case, the virtual coach may provide helpful techniques on running durations, food items to each and in a more encouraging tone.

Various embodiments facilitate coaching a user for or during a game. There is increased interest in the gaming community to improve skills and learn from others. Various embodiments could use the camera(s) and headset to provide coaching advice to gamers during the game or after the game. The user of the head set could act as a coach or student at any point in time. For example, the headset with a camera could show the hand position while playing a game so that others on my team can learn from the players style and see how the keyboard is laid out. Or, as an in game option, the observers could click on a character to see what the keyboard layout of the player looks like.

Various embodiments facilitate provision of feedback to a user regarding the user's current coaches. People often enlist the help of coaches and trainers that have little impact on the user's performance over a given period of time. In this case, various embodiments could use the camera, microphone and headset to give feedback to the user that after observing the interactions of their coach, there are other alternatives that could help them improve. If the user hires a coach for delivering effective presentations, but the coach rarely provides actionable points or does not engage the presenter, the headset could provide the user with a list of more qualified coaches. Moreover, if the coach is providing good feedback, the headset could tell the user to continue and to work harder or listen to the coach's feedback.

Various embodiments facilitate training a user to ignore factors and people. There may be individuals or behaviors that are disruptive to the user. The headset with a central controller could learn the people and behaviors and remind the user at times to ignore this until they no longer are distracted. For example, there may be an executive who attends a weekly update meeting that is continually making negative facial expressions which throw off the presenter. The central controller with headset/camera could recognize the individual and coach the user to ignore the face or look beyond them or beside them. These coaching tips could help to improve the overall performance of the individual.

Various embodiments facilitate comparison coaching. There are people who are competitive and are motivated by knowing where they rank in a class or people of similar skill. The headset could provide them ongoing feedback as to their ranking and improvement within the collective benchmark. For example, if a person is trying to achieve a perfect score on the ACT, the coach may provide insight into the person's relative ranking based on the results of each practice exam and provide helpful coaching on sections to study more.

Various embodiments facilitate coach matching. There are times when a person makes a connection with a coach based on factors other than pure skill. Various embodiments could facilitate the matching of coaches with students by providing short term coaching engagements on a trial basis. The headset could monitor the biometric data of the student and provide feedback if there is a match where they are exhibiting signs of general favorability.

Various embodiments facilitate coaching on audio and headset set-up. The set up of technology can be difficult for some users or they don't enable all capabilities. The headset could instruct the user how to set-up the audio for the environment they are in or how to enable all functions of the headset.

Various embodiments facilitate coaching on conversation coach, such as how to handle awkward pauses. Awkward pauses are challenging for individuals that are not versed in conversation. The headset could realize this by measuring pauses and assist in prompting individuals with discussion topics that are unique to the individual and previously learned by the central controller. For example, the user finishes some introductory comments with an individual and their mind goes blank and there is a pause. The headset, at the prompting of the user or automatically, could provide the user with topics unique to the other person. The central controller could know the individual is interested in NBA basketball and prompts the user to ask them about their favorite team. This type of assistant can help the user learn to engage others and improve overall human performance. Other examples of information that could be provided include the Individual's name, role, how the user met the individual, etc. The headset could also provide factual information including news articles, information in their current context (e.g. school subject, game attending, project being worked), and so on.

Various embodiments provide coaching on conversations, including coaching on social awareness. There are people who do not notice the minor verbal/non-verbal feedback from others to help guide the conversation. When the headset notices these, coaching or non-verbal feedback could be given to the user to assist them in moving to another topic or ending the conversation. Social cues could include total time spoken in relation to the entire conversation. Social cues may include biometric feedback collected from the other person to measure engagement, including smiling, eye contact, micro-expressions. Social cues may include tone and meter of speech. Social cues may include vocal variety and modulation of voice.

Digital Audio Ads

Digital audio advertising is a growing segment as users switch from radio listening to digital audio, music, audiobooks, and podcasts. Headsets described according to various embodiments could improve ad targeting for digital audio and allow customization of digital ads based upon data collected by the device such as the wearer's affective state, the wearer's current activity, engagement or attention level, sleep, fatigue, or health status.

Devices of according to various embodiments could allow an AI module to be trained that predicts key demographic, lifestyle and potential spending data for marketing purposes such as age, gender, education level, occupation type, income bracket, housing and household attributes, spending patterns, patterns of life, daily locational movements, social embeddedness, beliefs, ideologies, daily activities, interests, and media consumption of the device wearer. headsets could allow ads to be customized to the device wearer—either physical or digital advertising—using demographic, lifestyle, and potential spending level. By combining location data and other data on the wearer with eye gaze or engagement data, the central controller could allow micro-targeting of advertising to very specific segments.

Devices according to various embodiments could allow an AI module to be trained that predicts the device owner's engagement level, mood, and level of alertness or attention. Headsets could be equipped with such as heart rate sensors, galvanic skin response sensors, sweat and metabolite sensors, or other biometric sensors. The data generated by these biometric sensors could be. The devices according to various embodiments could send biometric data to the owner's computing device or an external server. An AI module could be trained using these inputs which would predict dimensions about the physical and mental state of the device user, such as engagement, affective state, or persuadability.

By gathering information about the activities that a wearer is engaging in, the central controller could dynamically serve ads or price ads. The central controller could detect competing stimuli such as visual distractions or whether the wearer is engaged in a physical task such as running or typing either to improve ad targeting based upon contextual information or price ads based upon whether audio ads would be competing with other sources of stimuli.

Headsets could allow the central controller 110 to record, sample, or analyze audio played by the device wearer such as music, audiobooks, digital radio, digital music, podcasts, digital videos played in the background as audio, spoken conversations and ambient environmental noise. The central controller could use information gleaned from sampling or analyzing device audio inputs and outputs to increase granularity of advertising segmentation, to provide more relevant advertising based upon contingent and contextual information, or to customize the kinds of messaging and advertising techniques to individuals prefer.

An AI module of user engagement could permit advertisers to target ads optimally to the user's mental and physical state and dynamically target ads based upon these states. For example, an advertiser might predict that their ad is more likely to be effective when users are alert or when users are hungry. The devices according to various embodiments could enable dynamic pricing of advertisements, for example, based upon what activity a device is being used for or based upon individual user's mental and physical states. For example, an ad placement might be less valuable if a user is typing, which indicates that they may not be paying attention to the ad.

By combining device data from sensors such as the forward facing camera, the central controller 110 can gain insights into aspects of the marketing funnel such as conversion of ads from impressions into behavior.

The central controller 110 could help optimize the insertion of digital audio ads into audio content by measuring engagement, intent-to-buy and purchasing behavior in response to different types of ads. Many attributes of inserting audio ads could be tailored to individual device wearers such as whether individuals prefer clustered or spaced out ads, whether certain lengths of ads are more or less effective, or whether certain aspects of the audio such as volume, tone, word cadence, etc., should be tailored to the device wearer.

Paste Before Copy

During word processing and other common tasks (e.g., computer-related tasks), a conventional method for copying and pasting is to first copy (e.g., copy a stretch of text), then paste (e.g., paste the stretch of text previously copied). According to various embodiments, the sequence of copy and paste is reversed. A user first indicates a desire to "paste" at a first location (e.g., at a first location in a document). For example, the user hits ctrl-v. The user subsequently highlights text, or otherwise selects text or some object (e.g., at a second location in the document) and hits ctrl-c. The computer (or other device), thereupon automatically pastes the selected text (or other object) into the first location. Advantageously, if a user starts the process with his cursor at a location where pasting is desired, the user can immediately indicate his desire to paste without first having to move the cursor to copy, and then return the cursor to the starting location to paste.

Cameras

A variety of cameras may be used, in various embodiments. Cameras may include action cameras such as GoPro® Hero®, DJI Osmo®, Sony Yi®, Olfie One®, Five, SJCam® SJ8, Garmin® Virb®. Cameras may include closed-circuit television cameras (e.g., bullet, dome, or mini-dome or turret). Cameras may include internet protocol (IP) cameras such as HIKVISION® HD Smart 4 Megapixel®, Hikvision® DS-2CD2432F, Nest® Cam IQ®, Ring Stick® up Cam®, NetGear® Arlo®, and Simplisafe® Simplicam®. Cameras may include a drone camera and/or any other cameras.

Cameras may include a 360 degree camera. A 360 degree camera may allow for complete viewing of all activities of the user. This could be useful for detecting objects, people and movement from all angles supporting many of the embodiments from safety, recreation and exercise and gaming to name a few. Companies manufacturing 360 degree cameras include Ricoh® (Theta Z1® as an example) and Insta360® (One X® as an example).

Authentication and Security

Various embodiments include authentication protocols performed by the camera processor 4155, peripheral device driver 9330, and/or central controller 110. Information and cryptographic protocols and/or facial recognition can be used in communications with other users and other devices to facilitate the creation of secure communications, transfers of money, authentication of identity, and/or authentication of credentials.

The camera could also manage user access by an iris and/or retinal scan. In various embodiments, the user might enable a camera that is pointed toward the eyes of the user, with the camera sending the visual signal to the camera processor 4155 which then identifies the iris/retina pattern of the user and compares it with a stored sample of that user's iris/retina.

The camera can also gather biometric information from the user's hands and fingers. For example, the camera could be outward facing and pick up the geometry of the user's hands or fingers, sending that information to the camera processor 4155 for processing and matching to stored values for the user. Similarly, a fingerprint could be read from a camera by having the user fold up a finger facing the camera.

The camera could use face recognition for authentication, or it could be more specific by also reading the pattern of the user's veins on his face or hands. Other biometric data that could be read by the camera includes ear shape, gait, odor, typing recognition, signature recognition, etc.

Audio from the camera feed could also be used to authenticate the user by the camera requesting the user to speak while on camera. Such voice authentication could be done on a continuous basis as the user interacted with the camera.

In various embodiments, the camera 4100 can sample environmental information in order to supplement ongoing authentication of a user. For example, the user could provide the camera with samples of the sound and video of her dog barking, with that saved in a data storage device of the camera. After authenticating the user, the camera could periodically or continuously sample the user's environment, sending any barking video/sounds (identified via machine learning software of the camera) to be compared to the user's previously stored barking video/sounds so as to determine if it was the user's dog that was barking. This information could add to the confidence of the camera 4100 that the user's identity is known and has not changed.

Other indicators in the camera's field of view could be used to authenticate the user. For example, the user's hairstyle, type of glasses, typical jewelry worn, fingernail colors, and the like could all be matched with images stored with the camera 4100 or central controller to authenticate the user.

Sensors

The camera could be equipped with various sensors (e.g., off-the-shelf-sensors, custom sensors) that allow for collection of sensory data. This sensory data could be used by the various controllers, camera(s), headset, computer, game and central AI controllers to enhance the experience of the user(s) in both the virtual world (e.g. the game or virtual meeting) and/or physical world (e.g. exercise, meetings, physical activities, coaching, training, health management, safety, environmental and other people using cameras and headsets). The data collected from the sensors could also provide both real-time and post activity feedback for improvement. The sensors could be embedded directly in the camera. The sensors could also be powered using the internal power management system of the camera or run independently using battery power. Data collected could flow from the sensor to camera 4100 to peripheral device driver 9330 (if connected) to central controller AI where the data is stored and interpreted. Once processed the data is returned to the user in the form of an image or response. In various embodiments, data collected from sensors may be processed on any other device (e.g., the data may be processed at the camera 4100).

Photoplethysmography Sensor

Photoplethysmography (PPG) is an optical technique used to detect volumetric changes in blood in peripheral circulation. It is a low cost and non-invasive method that makes measurements at the surface of the skin. The sensor could be associated with a headset or other wearable device, and may be touching the skin. In various embodiments, the sensor could operate, and may be associated with a camera (e.g., the sensor may be attached to a camera, the camera may function as a PPG sensor).

The photoplethysmography sensor could be included in or with the camera to measure cardiac health. If the sensor, through the central controller 110, indicates low blood volumetric flow detected through the camera, the user could be notified that they may have a heart condition or other health related conditions that require medical attention.

Environmental Light-Time of Day Sensor

Light is a guide for people to determine time of day and also enhance the mood of an individual. Natural light is used as sensory input and for a user and also provides a reference for people. The light and cues assists people in performing functions and engaging others. Without visual light cues, people could feel a sense of isolation or not give others an understanding of the time of day a person is engaging (e.g. day, night, dusk, dawn). This invitation, through the camera, could simulate light for the user and provide an indication to the user of another user's time of day.

In various embodiments, a gaming user may be playing a game in the middle of the day when it is sunny. Their opponent, on the other side of the world, may be playing the game at night, in the dark. The camera could automatically provide a light on the person playing in the day while the person at night receives no light. Each player could have the game environment or light in the camera to change to match the lighting conditions of the real environment.

In various embodiments, a light controller monitors the lighting conditions and could provide increased light where needed, automatically. For example, a user is working at home during the day with sunlight in their office. As the evening approaches, the light camera could automatically detect the room is getting darker and provide the light gradually to assist in the tasks being performed.

Virtual displays change color to simulate local time for remote participants. Global conference calls are common in different time zones. As part of each participant's background, the camera could communicate to the central controller to lighten backgrounds for people working during the day and provide darker backgrounds for those working at night. This dynamically changing background environment could provide everyone with a visual cue regarding the time of day each person is working and a deeper appreciation for their surroundings.

Various embodiments facilitate determining individual time of day productivity and use light control to extend productive periods. As people work at different times of the day, the camera could gather biometric feedback to determine the time of day a person is most productive. This time of day could be simulated using light for an individual using the camera. For example, if the camera collected biometric data indicates the person is most productive from 1:00 pm-3:00 pm in the day, but is forced to work from 8:00 pm-10:00 pm, the camera could signal to displays to simulate light from 1:00 pm. The light at 1:00 pm, even though it is 8:00 pm, could stimulate or trick the brain into thinking it was earlier and improve user productivity. This light could be generated via the inward and/or outward facing lights.

In various embodiments, a camera includes a task light. Users performing certain tasks need more lighting. For example, reading, sewing, cooking, routine home maintenance or cleaning require task specific light. The camera could recognize the task being performed (through the central controller) and automatically switch light on the camera for the user. The person sewing may need very targeted lighting, while the person doing routine home maintenance may need broad lighting with a wide angle.

Environmental Sensors—Flow

Cameras could be placed in various locations in a home to measure liquid flow and alert users of potential problems. For example, a camera placed on the back of a refrigerator could alert the user if the ice maker water line begins to leak.

A water heater in an upstairs attic could be enabled with a camera and the user alerted when a leak begins. As homes are constructed, cameras could be installed in strategic places where water lines are placed. If leaks due to normal wear or freezing of a water line occurs, the user could be alerted before significant damage takes place.

Air Quality Sensor

Air quality may be beneficial to health and productivity of people, in a work and recreational environment. Continually monitoring and measuring air quality in the form of pollutants, particles and levels, and alerting users to the conditions through the camera could assist in allowing the user to make different choices and protect their overall health.

In various embodiments, a user is walking a baby through a crowded street at rush hour, whereas they typically walk in the mid-morning when traffic is light and pollution is minimal. At rush hour, the camera could inform the user that the air quality is poor and recognizes high levels of CO/CO2 and other carbon emissions. The camera could also instruct the user on a different path allowing them to avoid the highly polluted area at that time.

Various embodiments facilitate alerts related to high levels of ozone. For example, a user of the camera decides to go to the beach for a run. They have mild asthma and routinely run this path. On this day, the camera could inform the user that running should not take place as the levels of ozone could harm their lungs.

Various embodiments facilitate carbon monoxide detection. The camera could detect high levels of carbon monoxide. Users of the camera could be alerted if carbon monoxide reaches dangerous levels in their home. The camera could provide audible alerts, messages in the earphones or light signals to warn the user to get out of the house.

Ambient Noise and Noise Pollution Sensors

Various embodiments include ambient noise and/or noise pollution sensors in the camera. Given the sensors provide instructions and feedback in terms of audible announcements, it may be important to measure the ambient noise levels, adjust the levels or provide instructions for the user. The camera microphone could have an ambient noise detector and continually provide this data to the central controller for analysis. In addition the overall collection of sounds being heard could be collected from the camera and processed by the central controller.

Various embodiments facilitate adjusting volume. There may be times when the camera and central controller need to inform the user of an impending danger. The ambient noise could be lowered so the announcement to the user is heard and the volume overall is acceptable to the user. There may be times when the user is listening to games, music and other sounds that are above dangerous hearing level. The camera could dynamically change sound levels to protect the hearing of the individual.

Various embodiments facilitate filtering sounds. The camera 4100 and central controller 110 could detect ambient noise in the background and filter out the sounds before presenting the audio to other listeners. An example could be a dog barking or a baby crying while on a conference call.

Various embodiments facilitate informing companies about sound levels and/or sound exposure. During periods of construction, a worker may be presented with sounds from many pieces of equipment (e.g. dump truck, loader, concrete mixing, welding . . . ) and activities. The camera 4100 could monitor the volume of all ambient sounds in the area for the user. If the sound level is too high for a period of time, the company could be informed by the central controller of the dangerous levels for the employee or reported to a governing agency. The user could also be informed by the camera to protect ears or leave the area.

Various embodiments facilitate monitoring individual exposure to noise pollution. Individuals are continually exposed to ambient noise levels that may damage their hearing, reduce cognitive performance or otherwise affect their health. The device could utilize the main microphones (e.g., microphone 4114) as an ambient sound sensor or could include an ambient noise sensor. a camera could communicate ambient noise data to a connected cell phone, computing device, other cameras in a local network, or to the central controller 110. Ambient noise data from the central controller could be made available via an API. The device could be configured to collect ambient noise data when the device is not being worn. Device owners could be prompted with visual, tactile, or audio alerts about high levels of noise pollution or dangerous forms of ambient noise, such as particular frequencies. The central controller could collect aggregate noise exposure data for individuals. The central controller could also collect ambient noise data to develop crowdsourced geospatial data on noise pollution. The central controller could prompt local government authorities about high levels of ambient noise. For example, the central controller could contact the government about noise complaints from loud parties, construction work, or overhead aircraft. Crowd sourced noise data from cameras could be used to inform real estate, advertising, insurance or other commercial purposes. For example, ambient noise data could be used in real estate to gauge the desirability of living in a particular neighborhood or whether an individual apartment within an apartment building is noisy.

Thermal Camera Sensor

The camera could be equipped with a thermal sensor to collect thermal readings from the user's surroundings and alert them accordingly.

In an illustrative example, a user with a camera enters their place of employment. As they greet various coworkers, the thermal sensor could measure the body temperature of those around them. If the sensor collects information and sends it to the central controller for analysis, it could indicate the body temperature is high. This may mean the person has a fever. The user is alerted through the audio outputs of the camera, connected headsets or speakers (audio message/sound or forced alert like a buzz) of the condition of the person around them. The user could inform a person without a headset that they may be ill or simply avoid the individual to protect their health.

A person playing a game with a headset camera could involve others in the room in the game. A user may wish to display a character and their motions in a game which they are not playing. The thermal camera on the headset could discover people in the physical room and display their character on the screen using their thermal image. The motions and avatar could represent the images collected by the headset and processed through the central controller.

Infrared Sensor

An infrared sensor is an electronic instrument that may be used to sense certain characteristics of its surroundings. It does this by either emitting or detecting infrared radiation. Infrared sensors are also capable of measuring the heat being emitted by an object and detecting motion.

In various embodiments, an infrared sensor in a camera could detect motion around the user. If they are working and someone comes up from behind them, the camera could alert the user long before they are startled, giving them time to react. In addition, a camera could detect individuals entering a conference room prior to the meeting and such individuals could thereupon be welcomed and referenced by name.

Ultrasonic Sensor

In various embodiments, an ultrasonic sensor is an instrument that measures the distance to an object using ultrasonic sound waves. An ultrasonic sensor uses a transducer to send and receive ultrasonic pulses that relay back information about an object's proximity. The camera could include an ultrasonic sensor.

If a user with a camera in a headset approaches a raised portion of concrete on a sidewalk, the user could be informed of the protuberance so they can step over the portion and not fall. If a runner is approaching a fallen limb or a low branch, they could be alerted and direction changed via a headset.

At a sporting event, a facility could be equipped with cameras and if an object is falling in the vicinity of the spectators, an audible alert could be generated. In baseball games, many users are injured due to fly balls and not paying attention. If the stadium were equipped with the cameras, a section of the stadium could be alerted of an approaching fly ball.

In various embodiments one or more sensors (e.g., all sensors) may be detachable and clippable. Each sensor/light on the camera could be detached or embedded as a suite of sensors. This allows the user to determine which sensors they are most interested in using at a given time.

Form Factors

The physical device of the camera could take many forms and accommodate/connect the various features, including sensors and other features described herein. Such forms could include cameras with detachable sensors, cameras on servos, and actuators that can be controlled by software.

In various embodiments, a camera is relatively small and can be moved or placed by the user. For example, the camera could be incorporated into a button worn by the user. Cameras could also be made small and light enough to be attached to other objects. For example, the user could attach a camera to her lapel, to the brim of a hat, or to her mouse or keyboard. Such embodiments allow for great flexibility in the use of the camera, and can be easily swapped from one location to another. This camera positioning is beneficial in that the user has her hand's free to accomplish other tasks. There are many ways to enable these forms of attachment, such as through the use of grippers, clamps, suction cups, tripods, track systems, gimbels, or a camera ball and head. Sticky or gummy attachments could also be used.

In various embodiments, cameras could be affixed (temporarily or permanently) to objects that can be moved into place. For example, the camera could be placed at the end of a flexible metal stalk that allowed the camera to be pointed and held in almost any direction. The flexible arm could also be a telescoping, swing arm, or bendable arm that allows change of angle of the camera. Cameras could be attached in a ball and socket arrangement that allows the user to point the camera in many directions.

In various embodiments, the camera could be hung from various locations. For example, it could dangle from a wire or chain so that a user could hang it from a curtain rod, a kitchen cabinet knob, coat rack, etc.

One or more cameras could also be movable along a fixed track or frame. For example, the user's computer monitor could have a track mounted along the back edge, allowing cameras to move along the track as positioned by the user, or under motorized control by the user's camera or the central controller. Alternatively, the track could be integrated into the user's desk or office/cubicle walls.

Cameras could be attached or embedded into office chairs or gaming chairs. For example, the headrest of a gaming chair could have a camera on a flexible stalk that could be pointed toward the face of the user so that the user's emotions can be projected onto an avatar by the camera processor 4155.

Cameras could be enabled to easily detach or re-attach. For example, a user might unplug a video camera from his headset and plug it into a game console handheld controller.

Glasses could also be incorporated into eyeglass frames of the user, allowing for hands free actions by the user.

By attaching wheels to a tripod, the user could more easily move around a camera affixed to the mounting plate of the tripod. The wheels could also be driven by motors so that the entire tripod assembly with the mounted camera could move under the control of autonomous software, or be directed by instructions from the camera processor 4155, peripheral device driver 9330, or central controller.

Cameras according to various embodiments could employ different kinds of lenses such as macro, wide angle, normal, and telephoto—and could be used depending on the type of tasks required of the camera. Multiple lenses could be available, allowing for the camera processor 4155 to choose an appropriate lens for the right application.

In one example, the camera could take the form factor of a webcam, built into a desktop computer, tablet device, or smartphone. Stand-alone webcam devices that connect in a wired or wireless manner to a user computer could also be employed. For example, various embodiments include a smartphone camera that is able to communicate with the user's peripherals such as a keyboard, mouse, headset, or game controller.

Instantiated as a security camera, the camera according to various embodiments could have 24/7 views of many areas inside and outside the user's home or office.

Camera Watches, Interprets and Responds

The use of a camera by an individual to capture movement and have the central controller 110 provide responses/actions appropriately may be advantageous in various embodiments. In various embodiments, the interpretation of movements, images and actions are collected by the camera processor 4155, sent to the peripheral device driver 9330 and transmitted to the central controller for AI analysis and appropriate feedback/action/response to the user(s). In various embodiments, analysis may occur at the camera and/or at any other device.

In various embodiments, a camera monitors people to turn them on/off mute. For participants that are on mute, once they begin to speak, the camera detects this and automatically takes them off mute. For example, there are many occasions where meeting participants place themselves on mute or are placed on mute. Oftentimes, they do not remember to take themselves off of mute and it forces them to repeat themselves and delay the meeting. The camera is enabled to communicate with the computer, central or headset controller. Once the camera detects someone wanting to speak, the central controller AI system interprets this action and turns the mute off. In contrast, if the central controller took the participant off mute, once they stop speaking or there is a designated pause, the camera processor 4155 via the central controller could put the user back on mute.

In various embodiments, microphones could be muted automatically if the camera recognizes that a user is outside the range of the meeting or the person is no longer visible on the video screen. Remote workers take quick breaks from meetings to take care of other needs. For example, a parent's child may start screaming and need immediate attention. If the camera recognizes the meeting participant has moved from the video screen or computer camera and is several feet from their display device, the camera could mute the microphone automatically. Another example may be where someone leaves the meeting to visit the restroom. The camera on the computer detects the individual is no longer in view, and the peripheral device driver 9330 communicates mutes the individual's microphone. Once the camera detects the individual is in view again, the peripheral device driver 9330 reactivates the microphone.

Activity Completion Alerts/Dynamic Activity List

There are times when users are distracted and forget to complete a task. A headset equipped with a camera can record the activity, send the information to the central controller AI system and alert them if the task was not completed. This can help with improving human performance and focus on a task to completion.

In an illustrative example, a user may decide to cook a steak on the grill. They place the steak on the grill and leave the patio. They are distracted by someone coming to the door and starting a conversation. Fifteen minutes later they recall the steak was left on the grill and burned. With the headset (e.g., worn by a user), the camera could record the user putting a steak on the grill. The central controller AI system knows the steak is being grilled, in 7 minutes of cooking does not record movement to the grill and alerts the user to complete the activity and move to the grill to turn the steak.

In business, interruptions may occur regularly. The camera could record a user preparing an expense report, but is interrupted. The central controller AI system could later alert the user that the activity was not completed.

Various embodiments facilitate crowd-sourced images and evaluation for sharing. Groups of people with headset cameras, audio and sensors could share information with others via the central controller AI system and relay this to others when appropriate. For example, if a person goes for a walk on a path and discovers that it is covered with rain from the night before, the GPS, camera and audio could pick up this information and store it in the central controller AI system. Later that morning, another person on the same path using a headset could be alerted in advance that the path is covered with water and to reroute their walk.

Various embodiments facilitate use of range finding, such as to detect when a user is leaning toward or away from webcam. Images can become distorted or distracting as an individual moves toward and away from a camera. If the individual moves close to the camera, the camera could recognize this and refocus or move further away from the user. Conversely, if the user moves further away from the camera, making it difficult for others to see, the camera could adjust focus and zoom in to the user.

Various embodiments facilitate displaying a user's mood. The camera could detect the mood of a person based on video history and current images and display an indication of this mood to others. There are times where others on a video call need to understand the mood of a person. This often takes several minutes or multiple interactions to determine and adjust accordingly. Various embodiments could collect video/images throughout a given time period and provide an assessment to others on the video call (via avatar, background or simple message) or in advance of a call (via an alert, text, or email). For example, a manager has had three project updates where all dates have slipped and they are not pleased. The user's emotions have escalated in each meeting, showing increased vocal volume and inflections, intense eye contact and glare, defensive body language and demanding short commands. According to various embodiments, the upcoming project team making a presentation is made aware of these emotions via an avatar, background or text. The presenters may decide to reorder the presentation and lead with good news, reschedule the meeting or provide a more calming atmosphere prior to delivering the message. In this case, the video/image data is used to determine the mood and adjust to be more responsive to the person's emotions at the given time.

Privacy

Privacy has become a big concern for users of devices, including how data collected about will be used by others. In some cases, the information is more than just the person and words, but also the objects that surround them. The concern is primarily due to the fact that information is continually collected when the user is unaware, with little control over the availability or use of the information by others. According to various embodiments, the user could have the ability to pre-determine images/video that they wish to always block in their entirety or as pieces of a larger display. Furthermore, they could have the ability to also edit content prior to making it public or remove altogether.

Various embodiments facilitate disabling the recording of video, images, audio, etc., such as upon request by a user. The user may desire that during certain interactions, their image not be captured or recorded by anyone. Various embodiments could facilitate the user to quickly (by making a gesture, selecting a button on a peripheral, or vocal command) to immediately stop projecting their image or allowing their camera to transmit/record images. For example, a user is on a video call and their child runs into the room screaming and crying. The user could signal to the camera to stop recording and transmitting image content to others. This is much faster than navigating through menus or searching for a way to stop.

Various embodiments facilitate disabling the recording of video, images, audio, etc., based on pre-selected facial images. The user could provide the central controller 110, using the camera 4100, with images of people that should never be recorded or images projected. For example, a user wishes to keep his family from being viewed. The user captures images of these individuals as part of their 'do not record' preferences. While using the camera, if any of these individuals appear in view, the camera could either stop recording or blur out the image of the person, protecting their privacy.

Various embodiments facilitate disabling the recording of video, images, audio, etc., based on the location of the recording (e.g., based on whether the recording is being performed in pre-selected rooms). The user could provide the central controller 110, using the camera 4100, with images of rooms or locations that should never be recorded or have images projected. For example, a child's bedroom could be an area where the user never wants a video recorded. During a dinner date while the parents are away, the kids take the family computer to the bedroom to record a short video playing. The central controller 110 and/or camera 4100 may recognize the room and disable the ability to record, thus protecting the privacy of the family.

Various embodiments facilitate disabling the recording of video, images, audio, etc., based on the presence or absence of pre-selected objects. The user could provide images or a description of objects that should never be recorded. For example, a person may not wish to display personal objects in their home while on a video conference call. These could be family photos in a frame, key expensive artwork, a safe or security alarm system or room layouts. In this case, the camera and central controller could remove or blur the objects from being recorded and images delivered to others.

Various embodiments facilitate disabling the recording of video, images, audio, etc., based on real-time selection (e.g., by the user). There may be times where a user may want to blur or remove an object from being recorded/displayed while on a video call. For example, prior to a video call, executives conducted a brainstorming session in a conference room regarding a new product idea and launch. This information was written on a whiteboard and not erased. The executive quickly joins a video call already in progress. While on the call, the executive quickly realizes the white board is being displayed to others. The user could immediately select the image and the camera/central controller blur the image so that the content is not displayed to others.

Various embodiments facilitate replacing images/video based on pre-selected images or on-demand. There may be times when images that come into view on the camera could be replaced by other predetermined images/video. For example, when a person's child walks in to the room, instead of disrupting the call or announcing to everyone that they have to leave to take care of a situation, various embodiments include replacing the current image/video with a previous (e.g. three minutes earlier) video/image of the person. In this case, the child and distraction are removed from the view of others and the focus is not disrupted by announcing to others that they need to address a situation with their child.

Various embodiments facilitate injecting an avatar into a video/image. Users may want to display an avatar of themselves or others to protect their privacy. This can be a lighthearted approach to engage others. For example, while talking to friends, a roommate may walk through the room after just getting out of bed. Instead of embarrassing the person, the user could immediately select (or automatically per the central controller) an avatar of a messy person and display it as a way to bring levity to the situation.

Various embodiments facilitate looping a video or image. There may be times when a user needs to leave the view of the camera to take care of a situation, but does not want others to notice they are gone or disrupt the flow of a meeting or game. In this case, a camera according to various embodiments could notice that the person is no longer in view of the camera and is replaced with a looping video from an earlier recording or an avatar. Once the person rejoins and is in view of the camera, the real video/image is provided to others.

Various embodiments facilitate granting rights to recordings, video, and/or images to others. A user may only want to give recording rights to certain individuals. These could be trusted friends and colleagues only, and not to those they are unfamiliar. For example, there may be a large meeting where a presentation on a new idea is taking place. The presenter is not aware of the role or interest of all people on the video call. According to various embodiments, the user could pre-selected only those individuals granted the rights to record the session. Those without the rights do not have the ability to record the sessions.

Various embodiments facilitate obfuscation of video. A user may want all video/images obfuscated until they provide the appropriate decoding keys to others. For example, due to the sensitive nature of a 'special' company project where few are to know the details, a video call could be recorded with obfuscation introducing the effort. As more people are given permission to work on the 'special' project, the video could be shared with them, but only viewed once providing they have been given the keys to view the video.

Various embodiments facilitate parental controls. The central controller 110 could verify the identity of an individual using the camera 4100 to participate in a video call, stream or other setting. It could prevent individuals based upon a white/blacklist from using connected devices or some aspects of the device. In some embodiments, the camera may be used for verification or authentication purposes even if it is not recording or transmitting. The central controller could use visual verification or other aspects of identity authentication to control inward bound communication. It could use verification to control which users are allowed to call connected devices or send images or videos of themselves to connected devices. Individuals on a blacklist could not send calls, send images or send videos even if they switch numbers, email addresses, logins, etc. The central controller could verify whether a minor is speaking on video chat with another minor or a whitelisted adult. If it detects a non whitelisted adult, it could end the call, record the call for review, or prompt a minor's guardian.

Gamification of Meetings or Calls

In order to encourage meeting or call participants to be more engaged during those sessions, a company could gamify them (e.g., turn them into games) by providing participants with points for different positive behaviors. Awarding of points could be managed via the user's camera processor 4155, and could be done during both virtual and/or physical meetings.

In some embodiments, the user's camera has a stored list of actions or behaviors that will result in an award of points that can be converted into prizes, bonus money, extra time off, etc. For example, the storage device 4157 of the camera 4100 might indicate that a user earns one point for every minute they speak during a meeting. This might apply to all meetings, or only to some designated meetings. A microphone of the camera identifies that the user is speaking, and calculates how long the user is talking. When the user stops talking, the camera processor 4155 saves the talking time and stores it in a point balance register in the data storage device, updating the total points earned if the user spends more time talking during the meeting. At the conclusion of the meeting the user's new point balance could be transferred to the central controller, or kept within camera storage 4157 so that the user could—after authenticating his identity to the camera processor 4155—spend those points such as by obtaining company logo merchandise. In various embodiments, the user earns points for each minute spoken during a meeting, but only when at least one other meeting participant indicates that the quality of what the user said was above a threshold amount.

Points could be earned by the user for other actions such as supporting comments of other participants, or maintaining a positive atmosphere during the meeting. The camera processor 4155 could store the achievement of such actions in the data storage device of the camera for later review by the user, for which the user could be awarded points.

Points could also be awarded when the user makes a decision in a meeting, or provides support for one or more options that need to be decided upon. In this embodiment, the points may be awarded not by the camera processor 4155, but by the other participants in the meeting. For example, a meeting owner or participant on camera might say "award Gary ten points for making a decision" which would then trigger that participant's camera processor 4155 to award ten points to the camera of Gary.

Participants could also be awarded with points for tagging content as a meeting is underway. For example, a user might receive two points every time they identify meeting content as being relevant to the accounting department.

Another valuable behavior to award points for is providing feedback to others in a meeting. For example, the user might be awarded five points for providing, via a series of hand gestures, a numeric evaluation of the effectiveness of the meeting owner.

Users could also receive points based on healthy behaviors. For example, a user might receive five points for standing up and doing a stretch, with the camera verifying that the authenticated user completed the stretch.

Mannerisms and Appropriate Behavior

Individuals on video calls, video conferences and on video streams often engage in distracting or inappropriate behavior. Individuals may not be aware that common physical or verbal mannerisms are distracting or inappropriate. Individuals may also not be aware that they are engaging in inappropriate behavior for a given situation. The devices according to various embodiments could be used to remove these distracting mannerisms or inappropriate behavior from video calls or recording. The devices according to various embodiments could also provide indications to the user to change their behavior. Personal behavior often follows norms about what kind of behavior is appropriate in different settings. As individuals increasingly utilize videoconferencing, video calls and streaming, norms of behavior in video, hybrid reality, and virtual reality settings are evolving. The devices according to various embodiments could track behavior, discern appropriateness and norm following from others reactions, and prompt the user with coaching about following norms of appropriate behavior.

Mannerisms are often caught on camera. Physical mannerisms include brushing hair off of face, playing with hair, stroking a beard; taking glasses on or off, playing with glasses; playing with hair ties, jewelry, watches, etc; fidgeting; leaning forward or side-to-side; rubbing eyes; wiping nose; picking a nose; yawning; stretching; chewing nails; playing with things at the desk; checking phone; etc. Auditory mannerisms include verbal and nonverbal noises such as muttering, coughing, sniffling, grinding teeth, etc. During calls, streams, and video conferences, these mannerisms are frequently recorded and transmitted to other users. Software could be created or an AI module created to detect these physical and verbal mannerisms from still or video recordings of individuals captured by the cameras according to various embodiments. Visual data could be combined with audio data, or audio could be used alone to train an AI module. Other sensor data, either from the devices according to various embodiments or connected peripheral devices such as headsets, keyboard, mice, microphones, could be used to detect mannerisms. Video or still images could be combined with data from these devices, such as audio, accelerometer data, biometric sensors and other types of data about individuals movements.

The camera 4100, call platform, producer software or central controller 110 could utilize software or an AI module trained to detect mannerisms that are distracting, irritating, or produce strong affective responses on the part of viewers. The camera 4100, call platform, producer software or central controller could switch camera views, minimize a user, stop the video stream, transpose prior footage of the user while they are not performing the mannerism for footage where they are performing the mannerism, or otherwise mask, filter or edit out mannerisms that prompt strong affective responses on the part of viewers. Mannerisms could be masked, filtered or edited for some viewers but not for others—for instance only those with strong responses to the mannerism. Mannerisms could be masked, filtered, or edited only after many repetitions or when a threshold of affective response is met. Masking, filtering or editing of mannerisms could take place in live streams or in recordings of the call or stream.

Various embodiments facilitate coaching. Individuals are often unaware of their own mannerisms. An individual could receive an inventory of their common mannerisms and the frequency of performing that mannerism. An individual could also receive more detailed information about when that individual is likely to perform a mannerism (type of day, fatigue or engagement level, during certain kinds of tasks, certain types of social interactions). In some embodiments, the camera 4100 or the central controller 110 could create an edit, compilation or highlight reel of an individual's common manners to demonstrate to the individual their common mannerisms. Individuals could select mannerisms for which they would like to receive coaching and habit formation guidance/reminders. Cameras during calls could prompt users when they are performing a mannerism on the habit formation list or a mannerism that is particularly distracting to other users.

Mannerisms, bodily functions and other behaviors are often embarrassing. Likewise, people often do things that they do not realize are inappropriate, norm breaking or distracting to others. Software could be created or AI modules could be trained to detect common embarrassing mannerisms, pratfalls or inappropriate behavior. Software could be created or an AI module for example could be trained to detect verbal signals ("I'm sorry"), laughter or other nonverbal signals, physical movement signals (such as shifting side in a chair), biophysical reactions (such as flushing in the face) or emotions such as embarrassment, anger, frustration or apology. Data from camera sensors could be combined with data from other connected peripherals such as headsets, keyboards, mice, microphones, watches, wearables, etc. Software or an AI module could be trained based upon user-generated tags or individuals could label embarrassing moments within their own camera streams. The software or AI module could signal to the camera 4100, producer software or central controller 110 to avoid showing the video feed containing embarrassing mannerisms, pratfalls, or inappropriate behavior. The software or AI module could signal to the camera, producer software or central controller to remove footage containing mannerisms, pratfalls, or inappropriate behavior from recorded footage or to edit these out. In some embodiments, the camera, producer software or central controller could create an edit of an individual's or group's pratfalls and other embarrassing mannerisms to create a "gag" reel or a compilation of funny moments. In some embodiments, the camera, producer software or central controller could create an edit of an individual or group's inappropriate behavior. This edit could be sent to others within an organization to trigger coaching, interventions by managers or human resources, to document behavior for reviews, to provide a recording for legal purposes, etc.

Groups may evolve their own standards of appropriate or inappropriate behavior. Individuals may be unaware that their mannerisms or behaviors are embarrassing or inappropriate in cross-cultural settings or settings where they are newcomers. The software or AI module could detect whether a behavior is potentially embarrassing or inappropriate, compare how current viewers are reacting to reactions by other viewers in previously recorded footage, and suggest to the user that they may have committed a faux paux.

Microexpressions

Individuals frequently engage in micro-expressions and other nonverbal signals of emotion. These signals, however, are often difficult to detect. Devices according to various embodiments could enable the detection of micro-expressions, nonverbal signals of emotion and other "tells."

Micro-expressions are nearly imperceptible facial movements that result from simultaneous voluntary and involuntary emotional responses. Micro-expressions occur when the amygdala responds to a stimulus in a genuine manner, while other areas of the brain attempt to conceal the specific emotional response. Micro-expressions are often not discernible under ordinary circumstances because they may last a fraction of a second and may be masked by other facial expressions. In addition to microexpressions, individuals may provide other visual cues as to their emotional state such as eye contact, gaze, frequency of eye movement, patterns of fixation, pupil dilation and blink rate. Likewise, audio elements such as voice quality, rate, pitch, loudness, as well as rhythm, intonation and syllable stress could provide cues about a speaker's emotional state. Additionally, individuals may have "micro-head movements" or changes in their head orientation, body positioning, or pose that may correspond with particular cognitive or affective states, such as head tilting.

A major challenge for measuring microexpressions is the use of a single channel of information—facial expressions—without other context information such as nonverbal communication data such as tone, rate, pitch, loudness and speaking style. Another major challenge is changing face-camera angles and/or inconsistent lighting. By combining camera(s) video data, audio data from camera microphones or other microphones, and/or data from other connected peripherals, an AI module could be trained to detect micro-expressions and other "tells." The devices according to various embodiments could facilitate the detection of micro-expressions through camera data. Micro expressions could also be detected using lidar, light pulses, or lasers. An AI module could combine visual data from multiple cameras—using different focuses, zoom levels, or camera angles. A camera or multiple cameras could be placed on gimbals, tripods, tracks, wire systems or other moveable attachment points to keep a user's face always centered in view or to keep a constant face-camera angle/azimuth. Lighting in visible, near visible, or infrared spectra, could be directed toward the face to maintain consistent illumination. The AI module could control camera angles and lighting to ensure consistent tracking settings. These types of expression data could be supplemented with camera data of eye movements and audio data. An AI module could be trained with these types of data to detect microexpressions and the affective state of individuals within the eye of the camera. For cameras facing the device owners such as webcams, insights from this AI module could be shared with the device owner—whether the device owner has a "tell" or exhibits certain forms of micro-expressions. For example, while negotiating, the device owner may subtly reveal information via an emotional response during negotiations. The AI module might prompt the device owner to modulate their "tell." Insights into the device owner's emotional state could also be stored by the central controller and be made available via an API.

Devices according to various embodiments detect the microexpressions and "tells" of individuals within the view of the camera. Expression data could be combined with imagery of eye movements, audio data, and data from other connected peripherals. An AI module could be trained utilizing these kinds of data to detect micro-expressions, nonverbal cues, and other "tells." The central controller could communicate to the device owner its prediction of the affective state of individuals with whom the device owner is interacting. Insights from the AI module could also be stored for later review by the device owner or be made available via an API.

In some embodiments, the micro-expressions of the device owner or others with whom the device owner is interacting could be used to gain insight into creativity or learning by detecting "glimmers" of surprise or moments of intuition, discovery or mastery. The central controller could record audio and video before and after that insight, as well as flagging those clips for review by the device owner. Micro-expressions could be used as a non-test method of measuring learning outcomes. Micro-expressions could be used to facilitate cross-cultural interactions by helping device owners interpret non-verbal communication and reduce misunderstandings.

In some embodiments, insights from micro-expression analysis could be displayed to individuals on a call, stream, or videoconference—both insights into their own affective state and into the state of others. A user could be prompted about their own tells or affective state. A user could see insights into the tells or affective state of others on the call. These insights could be displayed continuously in real time or conditionally such as when particular tells or affective states occur, when high levels of an affective state occur or high levels of confidence about the predictions are reached. In some embodiments, insights from micro-expression analysis could be used for analytics, predictions and other AI modules. Insights may or may not be displayed to individuals on the call.

Social Connectedness

While many employees now spend more and more time working remotely from home, video calls with co-workers sometimes do not have quite the same level of social connectedness of in-person meetings. Workers spend time socially connecting via video calls, but they often miss having people drop by their office to chat, engaging in small talk with a coworker while getting coffee, bumping into someone in the company parking lot, eating together at the company cafeteria, and the like. Some of the images and sounds that help to give an office space its character may be rarely heard or seen by remote workers from home, resulting in reduced social connection to employees in the office.

In various embodiments, a remote user can log into a particular location in a physical office, connecting directly to a camera that is currently receiving images from that area. For example, the remote user could connect via her headset to a microphone and/or camera in the break room where employees often make coffee in the morning. While listening to those sounds and seeing the conversations, the remote user could make coffee at her own home and feel more connected to the office. In this example, employees present in the break room could activate forward facing cameras on their headsets with the video feed going to the headsets of employees working from home.

After transmitting a live video or audio feed from a physical office location to the central controller 110, the central controller could transform that data into a more generic form. For example, a live video feed of office workers making coffee could be converted into more of a cartoonish or abstract version in which the identities of individuals in the video could not be determined, though the abstract representation would still give the remote user at home a sense of being by the coffee machine without knowing exactly who was currently there. The cartoon version of employees could also identify the employee by name, and could include information about that employee that could be helpful in starting a conversation, such as an identification of a key project that they are working on, their to-do list for the day, or a technology issue that they are currently struggling with. A company could also allocate physical rooms for the purpose of helping remote workers informally interact with workers physically present at a location. For example, a company could paint a room with a beach theme and connect employees entering the room with virtual attendees from remote locations. The room would enable physical and virtual employees wearing headsets to engage each other in a relaxing environment as a way to motivate social bonding and collaboration.

Various embodiments facilitate collection of video/images to prompt group action or show emoticons. Cameras could detect people doing physical activity and promote to others on the video call or in a game. For example, if a person/people begin to clap their hands during a celebration, the system according to various embodiments could begin to display hands clapping or generate a sound reflecting people clapping. This could also help to promote an action they wish other viewers to display. Other physical/emotional acts include laughing, thumbs up, crying, contemplation/reflection/solace, excitement, and fear.

Others can control some or all of the cameras in the constellation. During typical conversations, people are observing other objects around them. For virtual engagements, to reflect a true interaction, the user could control the camera(s) to focus on different objects. For example, during a video call, with three people, the user's eye could focus on a picture in one person's background, the face of another and the dog playing in another person's video feed. Each of these images could dynamically be introduced to the user's video feed of each individual representing a more dynamic interaction which mimics in-person interaction.

In various embodiments, multiple cameras may be used to project multiple perspectives. Today, cameras primarily are used to display a single focus on the individual. With multiple cameras attached to users and surroundings, viewers are able to see all angles of what another person is seeing. For example, with cameras enabled to clothing, inward facing, outward facing and rear facing, the viewer can see a user walking to the refrigerator, the TV display behind them while walking to the refrigerator, the object in front of them and the dog walking beside them. All angles projected give the user a more realistic view of the person they are observing and create a connection greater than the single forward facing camera view.

Managing Peripherals

While the camera's function is normally to capture video or still images of the user, there are also functions that the camera can perform in managing peripherals owned by the user.

In some embodiments, the camera captures a field of view in which other peripherals of the user are located (this could be accomplished with a camera with a fisheye lens, a camera that can move to sweep across a large area, or via one or more mirrors attached around a webcam of a computer which serves to increase the field of view). For example, the camera view might include a view of the user's mouse, keyboard, smartphone, printer, headset, chair, etc. The camera could inform the user when one or more of these peripherals are no longer in view, or when an unrecognized hand took a particular peripheral. The camera could also inventory the user's desk objects, and let the user know at the end of the day what objects she might want to take home, like a laptop or a headset. If the user's desk is being cleaned that night, the camera could inform the user via a speaker when she stands up after 5 PM that she needs to remove all peripherals and personal effects from the desk surface, including photos, coffee mugs, clothing, food items, etc. An item left at the end of the day could be identified and photographed and texted to the user and company facilities or cleaning personnel for placement into a storage locker. Having a view of all peripherals on a desk surface could also provide a company with information about the amount of work activity performed by the user that day.

The camera could also identify the make and model of the user's peripherals by comparing the images with images of peripherals stored with the central controller 110. As updates are made to peripheral models owned by the user, the central controller could alert the user to upgrade offers or notify the user of new software/firmware. The central controller could also alert the user when the user's use of a peripheral indicates that a different peripheral might be desired. For example, the camera might note that the user rarely uses the numeric keypad of the user's keyboard, and let the user know of other keyboard models which lack the numeric keypad and thus leave more room for mouse movements.

In some embodiments, the user's peripherals could help to manage the camera. For example, a fingerprint reader on the user's mouse could authenticate the user so as to activate the user's access to one or more cameras. The mouse might also be capable of providing sketches created by the user moving the mouse that could be transmitted to the camera and incorporated into the video feed provided to a video call platform so that other participants in a video call could see the sketches of the user in the background area within the gallery frame of the user.

The camera could also request that the user hold up a sheet of paper recently printed by the user, allowing the camera to determine whether a change in the ink cartridge is recommended.

The camera could also direct an attached mechanical arm to move objects on the desktop of the user. For example, when the user leaves his desk, the camera could determine that the keyboard and mouse are not in their normal position, and adjust them back to the user's preferred state on his desk. Other objects like staplers, pencil cups, mugs, notepads and the like could similarly be moved back into position by the camera's mechanical arm.

The peripherals of the user could also have the capability to communicate amongst themselves and with the camera. For example, the camera might detect a level of fatigue in the face and shoulders of the user, and send an instruction to the user's mouse to generate a buzzing alert to inform the user to take a short break.

Camera Outputs

There are a number of ways in which the camera could generate outputs, such as via lights, position, or by controlling peripherals, such as a projector.

In various embodiments, a camera generates lighting and/or causes lighting to be generated. Lighting may be built into cameras, built around a camera, situated near a camera, etc. Lighting can be controllable and/or automatic. Lighting can be infrared, visible, and/or of any other frequency band.

Lighting may include natural lighting (which may, for example, be managed by controlling curtains or moving shades up/down).

Lighting may be generated via a mirror that redirects or bounces light toward/away from a user or object. In various embodiments, a mirror may create a spotlight effect, such as by directing light to a particular region.

A spotlight and/or spotlight effect may have various uses. A spotlight effect may be used to highlight something or to enhance a psychological feeling of a user. In various embodiments, a camera or central controller can turn lights into a spotlight when a user is talking. Lights can be turned down when the user is on mute and/or when the user is not talking.

Lighting may employ colored lights, such as red or green lights. Lights may blink or flash in a pattern, such as to draw attention, signal a message, and/or indicate anything else. In various embodiments, the color of light may be used to identify the role of a user on a video call. For example, the project manager is bathed in a green light, while an engineer is bathed in a blue light. In various embodiments, a color of lights identifies what side of a decision a user supports. In various embodiments, lighting may be used for enhancing or diminishing background.

In various embodiments, lighting may be configured insofar as the temperature of light, making lighting mimic daylight, using actual daylight, or in any other fashion.

Lighting may also be effected through adjusting positioning of camera or adjusting a lens.

In various embodiments, camera outputs may include lights, speakers, alarms, and/or projectors.

In various embodiments, a detachable camera could include a speaker. This could allow, for example, a user to see their kids doing something and tell them to stop. In various embodiments, a camera (e.g., a detachable camera) could include ultrasonic output, flashing lights, etc.

In various embodiments, a camera includes a reminder mode and/or a "find" mode, such as "find me" lights. For example, the camera shows flashing lights so that the camera can more easily be found (e.g., if the camera is mobile). In various embodiments, a camera may output position data and/or any other data or signal, such as via Wi-Fi™.

In various embodiments, a projector may project an image of a speaker to a more convenient location for viewing the speaker. In a car, various embodiments provide for projecting an image of a user speaking from a backseat into the driver's visual range so the driver doesn't have to turn around to talk to the user in the backseat. Likewise, the image of the driver could be displayed on a screen of one or more of the seat backs, towards the backseats.

Software Enhanced Video Production, Streaming and Editing

Creating an optimal and individualized camera recording, stream or video edit is laborious. Setting up camera shots, controlling multiple cameras, getting settings right for cameras and microphones, and other aspects of digital recording are skill-intensive. Devices according to various embodiments could allow for the dynamic control of cameras and attached peripherals before and during recording or streaming. During calls and streams, the devices according to various embodiments could control cameras, switch between cameras, change what angles and zooms cameras use, dynamically track objects, and utilize a variety of overlays and composites. After a recording, the devices of the present invitation could allow novel editing features and customized edits of video recordings.

Producer Software

In various embodiments, software that manages a video, stream, or broadcast may be referred to as "producer software". In various embodiments, producer software controls the audio, video, still photography, and/or other outputs of a video recording, streaming or webcasting, or video conferencing session. Producer software may do this by controlling, communicating with, or networking together cameras (e.g., two or more cameras) and/or one or more additional devices (e.g., central controller 110). The producer software could also control, communicate with, or network together computers, computer peripherals, or equipment such as tripods, gimbals, lighting, flashes, strobes, etc.

The producer software could be used to control and edit a variety of video formats and interactions. It could be used for person-to-person video calls such as Facetime® or Skype®. It could be used for a live video feed shared to many viewers such as a stream or webcast such as Twitch® or Youtube® Live®. It could be used for a shared video call in which individuals simultaneously create and share video to others simultaneously such as Zoom® or WebEx®. It could be used for recorded video such as a Youtube® video or a Vimeo® video. The producer software could also enable a format of video in which each viewer receives or creates a customized or personalized livestream, or has a personalized edit of recorded video or collection of video clips.

The producer software could be controlled by an individual. The producer software could be controlled by an individual video creator, video call participant or streamer. The producer software could be controlled by the individual who initiates or hosts a video call, meeting, or video conferences. An individual could also control the producer software if they have been designated or permissioned by the meeting owner, stream creator or host. In some embodiments, video viewers, stream viewers or call participants could control the producer software to create their own version or edit of the meeting feed, stream video. In some embodiments, viewers could create versions or edits for other call participants. In some embodiments, an AI module could choose between an individual's edits and then share those with others.

The producer software could be controlled by an AI module designed to maximize engagement, excitement or some other dimension of affect, knowledge transfer, advertising value, or other dimension.

The producer software could utilize local, edge, and cloud storage and processing capacity located in the hardware of connected camera devices, in other hardware peripherals such as a video editing controller or video control board, in the computing controller such as a connected computer, in a gaming device, and/or on a server or cloud computing network.

The producer software could control the video, audio, still photography, and other outputs of connected devices, such as cameras, microphones, lights, video conferencing equipment, drones, telepresence devices.

Producer software may control cameras. The producer software could control which video or still cameras are powered on/off, which are recording, or which are being shown to viewers. In some embodiments, the producer chooses between multiple recording cameras. In some embodiments, camera feeds could be recorded for playback or for analytic purposes but not be shown in live streams or video conferences. The producer software could control the settings of individual cameras such as zoom, focus or aperture controls, frame rate, aspect ratio, iso, shutter speed, white balance and color temperature and saturation. The producer software could control the video quality, bit rate, compression and decompression protocols, codex, rendering CPU usage, and other aspects of recording, storage and network transmission of video. The producer software could control audio recording settings from microphones in video or still cameras. Camera could be located in a computing device, attached via cables or wiring to a computing device, or connected via wireless, radio frequency, or Bluetooth® to a computing device. Cameras could also be located in phones, peripherals and other networked devices.

Producer software may control camera positioning, zoom, and lens. The producer software could control the positioning, camera angles, lens choices and lens switching, and zoom levels. The producer software could control cameras directly or indirectly. Cameras could be mounted to devices such as gimbal, tripods, and other devices which could be moved by servomotors, actuators, wheels, treads, pulleys, or track systems. Cameras could be attached to drones, which could be connected to the producer. Cameras could be attached to fixed mounting points such as walls or room corners. Cameras could be attached to swivels or wire control systems. Cameras could be attached to track systems allowing movement in X,Y,Z, coordinates or in arcs. The producer software could control the view or vantage point of a camera within a 3d dimensional space by moving the attachment point such as gimbal or tripod. The producer software could control the azimuth and/or elevation of the camera relative to a fixed point such as the gimbal head. The producer software could attach or switch between lenses on multiple lens cameras. The producer software could zoom in or out using analog zoom or digital zoom.

Producer software may facilitate camera shot control. The producer software could control camera shot type through the focus, zoom, movement of the attachment point and the rotation of a camera around a fixed point. Using a combination of these types of controls, the producer software could control the shot size, camera framing, shot focus, camera angle, and camera movement. Through movement, zoom, or cropping the producer software could create different shot sizes such as extreme closeup, closeup, medium closeup, medium shot, cowboy shot, medium full shot, full shot, long shot or wide shot, extreme wide shot, or establishing shot sizes. The producer software could also control the framing—setting and framing a single subject, a 2-shot of two subjects, a three-shot or group shot with three or more subjects. The producer software could control an over-the-shoulder or over-the-hip-shot, or a point of view shot. The producer could utilize focus and depth-of-field such as rack focus or focus pull, shallow focus, deep focus, or tilt-shift. The producer software could control angles to create different types of angle such as eye level, low angle, high angle, hip angle, knee level, ground level, shoulder-level shot, Dutch angle, birds-eye-view or overhead shots, or aerial, drone or helicopter-style shots from above.

Producer software may facilitate setting up shots. The producer software could position cameras to capture different shot types and/or switch between different camera shot types. An individual, such as a device owner, meeting owner, or a call host, could select shots and the producer software could position cameras to create those shots. The producer software could maneuver the positioning of gimbals, tripods or other camera attachment points. The producer could adjust angles, zooms and focuses to create chosen shots. The individual could select these shots from presets or menus. The producer software could display a preview of a shot prior to the individual selecting the shot. The producer software could suggest different shot types based on context, type of content and other factors. For example, the producer software could suggest repositioning for better room coverage or for different or more interesting angles. The producer software could adjust shot types prior to recording or during recording. An individual could save these shot types as presets or favorites.

In various embodiments, an AI may position and establish camera settings. An AI module could be trained to position cameras to capture different types of shots, to predict which shots would be optimal under different kinds of circumstances or content, or to adjust shot types to maximize a dimension chosen by individuals. An AI module could be used to maximize dimensions such as keeping an individual or object in focus and centered in a frame or maximizing excitement. An AI module could be used to suggest particular shots, which an individual would approve and then the producer software would position and establish the settings for those shots, or an AI module could automatically set up cameras and establish settings depending on signals.

For example, an individual streaming a video game, such as a first person shooter, might want multiple camera feedbacks to capture their facial expressions, the movement of their hands on game controllers, and a view of their upper body and body language. The streamer could select from the program controller shots that match those characteristics: a close-up shot of the face, an over-the-shoulder shot focused on the streamer's hands, and a medium focus shot focused on the streamer's head and torso. The program controller could communicate with the camera processor **4155*s*** and controllers of attached equipment to position the camera to capture those shots, select regions of interest to track and focus, and select appropriate zoom levels. An individual could save those settings as a preset and use those presets to set up shots for the next time they are streaming. An AI module for example could also detect that an individual was streaming a first person shooter game, and suggest or automatically set up shots based upon that context.

In various embodiments, producer software may respond to and/or effect lighting. The producer software could detect lighting levels, control lighting equipment and/or correct light levels in still photographs and video recordings and streams. The producer software could receive inputs from ambient light sensors, camera inputs, and other forms of light metering equipment and detect whether levels are appropriate or within desired ranges. The producer equipment could control lighting equipment such as clamp lights, studio lights, key lights, rim lights, fill lights, strobes, ring lights, flashes, light umbrellas, light boxes, softboxes, diffusers, filters and films, tripods and gimbals, blinds, shades, mirrors, etc. The producer software could bounce, diffuse, supplement or reduce lighting within a space. The producer software could position lights via moving tripods, tracks, and other attachment points, could alter the angle and azimuth of lights, could position and switch diffusers, filters, and films. The producer software could detect appropriate lighting for particular objects, individuals, or content types and suggest arrangements of lighting to achieve appropriate lighting for particular camera setups.

An individual, such as a device owner, meeting owner, or a call host, could select lighting arrangements and the producer software could position lighting equipment to create those shots. The producer software could maneuver the positioning of gimbals, tripods or other lighting attachment points. The producer software could adjust angles, zooms and focuses to create chosen types of illumination. The individual could select these shots from presets or menus. The producer software could display a preview of a shot with the lighting arrangement prior to the individual selecting the lighting arrangement. The producer software could suggest different lighting types based on context, type of content and other factors. The producer software could adjust lighting arrangement types prior to recording or during recording. An individual could save these lighting arrangements as presets or favorites.

In various embodiments, an AI may position and establish light settings. An AI module could be trained to position lighting equipment to create different types of lighting effects, to predict which type of lighting would be optimal under different kinds of circumstances or content, or to adjust lighting equipment to maximize a dimension chosen by individuals. An AI module could be used to maximize dimensions such as keeping an individual's face illuminated by key, rim and fill lights, placing a cluttered background in shadow or producing flat illumination for someone viewing a technical task. An AI module could be used to suggest lighting arrangements shots, which an individual would approve and then the producer software would position and establish the settings for these lighting arrangements, or an AI module could automatically setup lighting equipment and establish settings depending on signals.

Producer software may facilitate signal processing. The producer software could use digital signal processing techniques to process recorded video to alter the white balance, color temperature, saturation, etc. to improve the quality of recorded images. The producer software could use digital signals processing techniques to create visual effects or to create filters that mimic properties of analog film or darkroom techniques. The producer software could use digital signals processing techniques to select appropriate encoding and compression settings for streaming or webcasting, to improve image quality, to reduce bandwidth usage, to reduce CPU processing and other hardware utilization, etc.

Producer software may facilitate microphone placement, and may control sound levels, and equalization. The producer software could control microphones built into cameras, mobile phones and computers. The producer software could turn microphones on/off, adjust sensitivity and volumes, equalize or adjust levels in different frequencies, mask or process unwanted recurring sounds, mute or censor individual words or phrases. The producer software could control microphone placement, the movement and angle of microphone boom arms to improve sound quality. Microphones fixed to equipment enabled with wheels, actuators, tracks, etc could be repositioned by the producer software. The producer software could detect ambient or environmental noise levels and adjust microphone positioning and/or settings to minimize ambient noise in recordings. The producer software could utilize information from cameras, range finders (e.g., the HDL-64e from Velodyne™ Inc.), and other sensors to determine whether the camera was indoors or outdoors, the shape of the room, building materials, the location of windows and other physical determinants of sound quality. The producer software could utilize information about the room and ambient noise levels—current readings and past readings—to suggest microphone positioning, audio settings, and other aspects of audio signals processing to the user. An AI module could be trained to position microphones and establish audio settings. The producer software could suggest settings to the user or the AI module could automatically position or establish audio settings prior to the start of the recording or call, during the recording or call, or after the recording or call. Environmental sounds, the voice levels or the quality of the speaker's audio, feedback from the central control, feedback from other users, etc. could cause the producer software or AI module to adjust microphone and audio settings during the recording or call. The producer software or AI module could utilize masking or filtering techniques to remove ambient sounds, music or the voices of non-call participants from the recording or call. The producer software or AI module could detect whether microphones and speakers were creating negative feedback and reposition/adjust microphone positioning and settings to reduce reverb and other forms of negative feedback. Microphone positioning and audio settings could be controlled and changed depending on the type of recording activity, the content of a call, signals from the central controller about the affective or other aspects of viewers, etc. Microphone positioning and audio settings could be saved as presets or favorites.

Producer software may control speakers and audio output. The producer software could control speakers and/or the audio output from other users on the call. The producer software could control speakers or other audio output devices attached to the user's computing device or phone, in the camera, in other attached peripherals such as a mouse or keyboard, and other speakers attached via cables, wires, wirelessly, cell signal, radio frequency or Bluetooth® to the device owner's computing device or phone. The produced software could turn on/off speakers, adjust audio volume, control equalizer settings, and other aspects of audio outputs. The producer software could suggest to the user where to position speakers or could reposition speakers mounted on moveable equipment. The producer software could detect ambient or environmental noise levels and adjust speaker positioning and/or settings to minimize ambient noise in recordings.

The producer software could utilize information from cameras, range finders, and other sensors to determine whether the camera was indoors or outdoors, the shape of the room, building materials, the location of windows and other physical determinants of sound quality. The producer software could utilize information about the room and ambient noise levels—current readings and past readings—to suggest speaker positioning, output settings, and other aspects of audio signals processing to the user. The producer software could detect the content of the call or recording and adjust audio output settings based upon call type, sentiment, the quality of audio from other speakers, the user's affect or sentiment, and other feedback signals. The producer software could increase audio volume or adjust other settings in response to ambient noise, music, or other people's voices in the camera device owner's vicinity. An AI module could be trained to control speaker positioning and audio output settings. Speaker positioning and audio output settings could be saved as presets or favorites.

The producer software could receive input signals from and output signals to headsets, headphones and other wearable devices. The producer software could utilize headsets, headphones and other wearables to obtain body positioning, head orientation, and/or eye gaze of individuals on the call or recording session. Body positioning data, head orientation, and or eye gaze tracking data could be obtained for individuals making the call or recording, individuals within the same physical space or room as the individual making the call or recording, or from individuals viewing the call or recording. The camera could also use the headset, headphones or other wearables as a focus point for the camera or as an optical target set or reflective marker for motion capture technologies. Bullseye, reticles, cross-hairs and other visual indicators on these devices could aid focus and tracking. Optical target sets, reflectors and other active or passive motion capture could aid focus, tracking and motion capture.

The producer software could utilize body positioning, head orientation, and eye gaze to control camera shots, angles and focus, to switch shots, angles, and focus, or to track individuals, objects and subjects. For example, when an individual on a video conference looks away from their screen, the camera could track what they are looking at (such as an individual entering the room). Eye gaze could be used to track objects that the camera device owner is tracking with their own eyes. The producer software could use body positioning, head orientation and/or eye—either from wearables or from their own cameras—to control the production settings of a call or recording. The producer software could have an AI module trained to detect creator or viewer body language, affect, engagement, or other metrics of interest and select camera shots, angles and focus that maximize those metrics of interest. Similarly, the AI module could use other aspects of audio and video production to maximize that metric. The producer software could access other signal inputs from headsets, headphones, and wearables such as heart rate, accelerometer data, biometrics, etc. The producer software could output signals to headsets, headphones and other wearables, such as audio, video, tactile, temperature, and odor. The producer software could turn on and off connected headsets, headphones and other wearables and adjust settings such as volume, equalizer settings and other aspects of audio output.

The producer software could receive input signals from and output signals to mouse, keyboards, meeting clickers and pointers, game controllers and other networked attached peripherals. The producer software could be controlled by these devices. The producer software could turn on/off these devices, adjust their settings, or utilize their outputs such as audio, video, tactile or haptic feedback, temperature and odor. The producer software could also use input data from these devices such as click and keydata, accelerometer data, biometric data, etc. The producer software could have an AI module trained to detect creator or viewer affect, engagement, or other metrics of interest and select camera shots, angles and focus that maximize those metrics of interest. Similarly, the AI module could use other aspects of audio and video production to maximize that metric.

The producer software could control monitors, displays, and other visual outputs of the computing device, phone, or attached peripherals. Monitors, displays and other visual outputs attached to moveable equipment could be repositioned by the producer software. The producer software could turn on/off monitors and other displays. The producer software could change the video settings of monitors and other displays such as resolution, refresh rate, color profile settings, screen orientation, brightness, contrast, gamma, sharpening, dynamic range. The producer software could control overdrive, super resolution, black equalizer, motion blur reduction, and visual overlays such as reticles, heads up displays, timers, picture-in-picture or picture-by-picture settings. The producer software could detect the presence of multiple displays and/or monitors used in dual, multi display or continuous display settings. The producer software could control blue light output by using filtering techniques to reduce or increase user exposure to blue light depending on time of day, fatigue, sleep cycles. The producer software could suggest settings for different types of calls, meetings, streaming or recordings or for different types of content. The producer software could automatically detect the type of call or content and adjust settings. Video settings could be saved as presets or favorites.

The producer software could control other peripherals such as green screens, projector screens, teleprompters, room blinds, doors and locks, telepresence devices, drones, etc. The producer software could turn on/off these peripherals and adjust their settings. The producer software could furl/unfurl green screens, detect the presence of a green screen, adjust video capture settings for a green screen, composite a background, or composite an individual into another video.

The producer software could control other output devices within a camera itself such as lights, speakers, displays, projectors, etc.

Videos Accessible to Producer Software

The producer software could receive video input from one or more cameras attached or networked to the computing device, call platform, or to the central controller. The cameras can be from a single user or from multiple users. These cameras could form a networked "constellation"-individual or multiple cameras from individual users could be networked together and controlled by the producer software. A user could control another's cameras or vice versa, or the producer software could control some or all cameras in the constellation. A user could receive individual feeds from their own local camera. A user could receive some or all feeds from others cameras. The producer software could select some or all feeds to be shown to users—some users could receive individualized feeds, or the producer software could select feeds for all users.

The producer software could access camera feeds for analytics purposes even if that feed is not shared with other users—such as individuals with low bandwidth or with privacy reasons for not sharing their feed. The producer software could also access subchannel video feeds that are only shared with some participants. The producer software could use these non-public feeds for affect, sentiment, engagement analysis. The producer software could use these non-public feeds for coaching or other AI modules.

The producer software could have access to other video feeds such as CCTV and other monitoring cameras. These cameras could be remote or on-site cameras.

The producer software could overlay green screen, lightboard, and other camera feed types to composite video feeds.

The producer software could have access to video recordings stored locally, in the cloud, or on the central controller. Access to video recordings could be permissioned and made available based upon criteria, such as meeting participants, the type or purpose of the meeting, the plan or agenda of a meeting, the content of a call, etc. The producer software could also allow some call participants to access recorded footage but not all participants based upon, for example, organizational roles, meeting roles, access to confidential information, etc. The producer software could also access tags and other metadata about the recordings. Individuals could use the producer software to replay tagged video, timestamped video, or other video based upon metadata. Individuals could replay specific portions of the current recording or past recording. Individuals could control these replay features using device inputs, voice inputs, eye gaze, or other forms of input control. An AI module could be trained to suggest video clips that are relevant for replay based upon aspects of the current recording, such as content, tags, metadata, or affect.

The producer software could anticipate future camera streams and adjust audio and video capture based upon its predictions. For example, the producer software could adjust camera positioning, camera shots, camera focus, microphone positioning and settings in response to anticipated camera streams. These anticipated camera streams could be based upon timing, upon a script, upon an agenda, upon the content of the call, etc. These predictions could also come tracking particular individuals, objects or subjects within a shot. The producer software could pass recording the individual, object or subject from one camera to another in the constellation. An AI module could be trained to predict which shot the producer would select next in order to position cameras and adjust audio and video capture settings to optimize the capture of that anticipated shot. For example, an AI module could be used to predict or anticipate exciting parts of a movie or game and position cameras to capture individuals' responses to these exciting moments, which then could be displayed to other users.

The producer software could split screens between feeds, arrange feeds, create picture-in-picture feeds, and/or overlay feeds on top of each other.

Camera Tracking

The producer software could reposition cameras or utilize digital focus or zoom techniques to reposition cameras as individuals, objects, and subjects move, or the content of the stream changes. The producer software could keep items or people in frame by moving a camera. The producer software could keep items or people in frame by positioning and handing off recording from one camera in the constellation to another. The producer software could track or focus on things that are tagged, clicked on or selected by the camera 4100, the device owner, the meeting or stream owner, or by other users. The producer software could track things of interest ("this is not normal" or "out of the ordinary").

The producer software could reposition cameras or use digital focus or zooms to transition between shots or establish new shots.

The producer software could detect if a camera in the constellation is not working and could reposition other cameras to take the shot or widen its field of vision to keep recording coverage. The producer software could detect a malfunctioning camera and alter users to fix or replace the camera. In some security camera embodiments, cameras could be directed to keep other cameras in their field of vision. By interlocking fields of vision, cameras could detect whether someone was attempting to disable one.

The producer software could detect when users are using non-connected cameras within its field of vision. These cameras might include handheld cameras, action cameras, phone cameras etc. The producer software could detect when non-connected cameras are pointed at an object or in a direction. The producer software could redirect cameras in the constellation to record footage of what the non-connected cameras are looking at. An AI module could reduce false positives for redirecting the constellation. It could have a threshold of cameras pointed at the same object, a threshold that is dynamically set, or could learn which objects in view are commonly photographed or recorded. For example, in a tourist destination, the AI module could learn not to redirect the constellation in common places where tourists take photos.

In some embodiments, individuals could be on a privacy or do not transmit list. Camera footage could be recorded for analytics purposes (primarily to determine whether a person was on the privacy list) but not transmitted, or the recording could be processed locally on the camera device or computing device and not sent to other networked devices or cloud computing resources. The producer software could track individuals on this list and keep those individuals from being broadcast, dynamically repositioning non-tracking cameras and/or turning on/off non-tracking cameras to avoid recording those individuals. The producer software could also track individuals on the privacy list and pixelate portions of the video containing the individual.

In some embodiments, the constellation tracks sight lines of individuals within the field of constellation cameras and dynamically changes ads to maximize viewership or the place ads in the view of particular individuals.

Cues for the Producer Software

The producer software could switch between camera feeds and adjust camera shots, angles, and focus based upon a variety of cues or signals. The producer software could switch between feeds and adjust shots based upon user inputs. The producer software could use a plan, script, agenda, timing or schedule to switch between feeds and adjust shots based upon user inputs. The producer software could use the content of the call, meeting or stream to switch between feeds and adjust shots based upon user inputs. The content of a call, meeting or stream could be detected based upon other programs that users have open (eg. gaming software), signals from user input devices, user tagging, other metadata, AI content analysis modules.

The producer software could switch between feeds and adjust shots based upon engagement or affect. The call initiator, meeting owner, or streamer could adjust the desired affect or engagement level, the producer software could access AI modules designed to predict affect or engagement, and the producer software could select feeds, camera shots, and overlays to raise or lower levels of the desired affect or engagement level. The producer software could access inputs, biometric sensors and other sensor inputs from connected peripherals such as mouse, keyboards, headsets. These inputs could allow the producer software to detect engagement, affect, sentiment and other dimensions of creator or viewer response to recording. The producer software could take cues or signals from other pieces of software such as games.

An AI module could be trained based upon how an individual controller switches feeds or setups of camera shots, angles and focuses. This AI module could be trained for particular types of meetings, calls or feeds, or the AI module could be trained for a particular user's preferred feeds and camera shot types. These AI modules could automatically switch feeds or control shots, or these AI modules could suggest to individuals when to switch feeds or change shot types.

Overlays, Composites, Added Content

The producer software could insert, composite, overlay non-video material or create picture-in-picture feeds. The producer software could display inserted, composited, or overlaid material to some or all users. Users could select material to be overlaid, shared with others, or removed from their screens. The meeting owner could allow users to control their overlays or could have overlays for all users or select groups of users.

The producer software could insert, composite or overlay a text chat thread between some or all users. Individual subchannels could also have chat threads. These could be shown to meeting or stream owners, to members of the subchannel or to all users. The producer software could create break out rooms with picture in picture displays—the breakout room could feature streams from some users while displaying a feed for other users in picture-in-picture mode. The producer software could insert, composite or overlay cartoons, dynamic graphics and interactable visual content which change depending on user inputs. The producer software could insert, composite, or overlay digital drawing or writing features such as a digital whiteboard or lightboard.

The producer software could insert, composite or overlay static pictures, photographs, slides, drawings, maps, transparency, rasterized images, etc. The producer software could insert, composite, or overlay polls, surveys, question boxes, answer boxes, feeling thermometers and other forms of audience interaction. These forms of audience interaction could be displayed to some or all viewers. Data from these interaction boxes could be shared with the meeting owner, select users or all viewers. The meeting or stream owner could select individual answers to be displayed to some or all participants.

The producer software could display a dynamic queue for questions and answers, showing the order in which individuals ask questions, the priority or importance of their questions, or an ordering created by the meeting owner.

The producer software could create and display transcripts, translations, or closed captions for call, meeting or stream audio. The producer software could save these transcripts, translations and closed captions for later review or use these texts to generate tags and metadata.

The producer software could insert text, audio, video or other types of digital artification for particular types of participants based upon permissions, authorizations and other user groups. For example, it could insert regulatory or HR disclaimers. For example, based on other software modules, it could detect and warn someone using text, audio or video if the individual is using profanity.

The producer software could display a link to an external file or portions of that file to some or all users. Video could be permissioned, paused, or otherwise conditioned on viewers interacting with the linked file. For example, the producer software could detect that an individual viewer has not signed a waiver or NDA, insert a link to the relevant file, pause the stream, and condition continued participation based upon signing the waiver or NDA.

The producer software could insert, composite or overlay captcha or verification software into the video to verify if viewers are human or bots, or if the viewer has left the feed running. The producer software could insert, composite, or overlay interactable objects to verify engagement.

The producer software could insert, composite or overlay a video, photograph, digital or audio ads to some or all viewers. The producer software could permission, paused or otherwise condition continued viewing of the call, stream or meeting upon interacting with the ad.

The producer software could allow users to interact with the stream by adding emoticons, intenticons, drawings, text, and other forms of graphics. The producer software could allow drawings, doodles, sticky notes, and other forms of graphics to be inserted into some or all of the individuals' feeds, or added to a recorded (nonlive) version of the meeting, stream or recording. The producer software could allow user feeds to be rendered into cartoons, avatars, or hybrid reality versions of the feed. For example, a user could be rendered as a digital composite of their face and body based upon movement in a video stream. For example, the producer software could render someone's background as a cartoon or hybrid reality while displaying a video feed of their face and body composed on top. The central controller could switch between video and cartoon (avatar) based upon bandwidth/connection, excitement/entertainment and privacy/anonymizer.

The producer software could insert, overlay, or composite recorded video of the stream from earlier in the recording or from previously unshown feeds (replay functions), recorded video from different streams or unshown camera feeds from different streams or from recorded video from monitor or environmental cameras.

The producer software could dynamically rearrange split screens, picture within picture, or video gallery views. For example, if someone walks into a room when the device owner is on a call, the producer software could initiate a feedstream focused on that individual and split the screen into a two window version with feeds focused on the device owner and the newcomer.

The producer software could provide name tags, labels, and other identifying overlays. The producer software could create these overlays as boxes or labels above/below/around particular feeds. The producer software could create them as labels, arrows or cations within a feed. The producer software could create them as labels, arrows, or captions attached to particular individuals, objects or subjects. As those objects move, the label could move and "float" above, below, or around them. The producer software could use agenda data, meeting participant data, user-created tags, or metadata to label objects. Individuals could be labeled by their names, permissions, groups, organizational roles, subscriber/non-subscriber, recent donor/tipper, the amount of money donated or tipped, etc. Labels could change dynamically during a call based upon the attributes of the feed or object.

The producer software could create visual or overlaid transitions between camera shots or between speakers.

People in the Loop

The producer software could be controlled by individuals, individuals assisted by software or AI module suggestions, or automatically by software or AI modules. Some aspects of the producer software could be controlled by individuals, while other aspects could be controlled by software or AI modules. Software or AI control could be overridden by individuals.

The producer software could be controlled by device inputs such as video editor controllers, a mouse, joystick, game controller, keyboard, etc.

A meeting or stream owner could control some or all aspects of the producer software. A meeting or stream owner could designate or permission some individuals to control the producer software. A meeting owner or stream owner could allow individuals to control some or all aspects of the stream.

Control of the producer software could be shared, delegated or transitioned before, during or after the stream. A meeting owner could switch which individuals could control the producer software. Some groups or subchannels could have additional control functionality. Voting, auction, payments or reward systems could be used to gain control or co-control of some or all aspects of the producer software. Voting, auctions, payments or reward systems could be used to unlock additional producer software functionality. Control could pass randomly between a group of individuals. In some embodiments, individual device owners could allow others to control some or all of their camera feeds, camera shot selection, or camera positioning. The producer software could allow individuals to view how others are arranging or editing the camera streams. An individual could designate someone to control their producer software, or they could mirror another's feed. An individual could channel surf between different streams. The producer software could select particular edits or versions of the stream created by individuals to show to other individuals, groups or to all viewers. The producer software could select these individuals' streams based upon a past history of creating interesting or engaging streams, previewing them to others, or through voting or payment mechanisms. An AI module could detect which streams are most engaging, interesting, or receive high levels on a metric, predict which individuals might like which streams and then display those streams. Individuals could up or down vote recommended streams.

In some embodiments, the producer software allows others to control a camera directly or manipulate a digital version of a camera stream. The producer software could allow others to control its functionality—its zoom, cropping, focus, etc. For example, a user could zoom into a whiteboard or bring particular aspects of a background into focus. In some embodiments, this remote view functionality could be used to zoom into whiteboards and slides, to detect whether individuals are engaged, to detect whether individuals are doing other tasks or are distracted, or to detect whether individuals are cheating. In other embodiments, the producer software could use this remote view functionality to enable hands-free control of the camera to free hands for a task. A remote viewer could adjust and control a camera while the device owner is doing a task, enabling the device owner to use both hands. For example, an individual streaming a cooking show could allow someone else to control the video while they use both hands to cook. In some embodiments, remove view functionality permissions could be controlled by voting, auctions, payments, donations, tips or rewards.

In some embodiments, a meeting owner or a device owner could highlight or click an object in the videofeed, and the cameras could be repositioned to focus and track that object.

The producer software could be voice controlled (e.g., "get me camera 2").

The producer software could detect items of interest and suggest that users tune into that feed or it could save those clips into a folder of high interest clips.

In some embodiments, people could control which camera feeds a user receives, which overlays a user receives, or what cameras show to that user. For example a streamer could allow their fans to control what overlays or feeds they see. For example, a portion of a screen might be blocked, a particular user's feed highlighted, or an image or gif displayed on the streamer's display.

Producer Modes

Settings for the producer software could be saved as modes, presets, or favorites either based upon user settings or AI modules trained for specific types of meetings, calls or content. Producer software settings could depend on whether the call, meeting or stream is a one-off stream or is a recurring event.

In some embodiments for a producer software, producer software selections could be based on agenda, meeting type, presentation slides, tags. At the start of the stream, video from prior streams could be played, as a form of recap or synopsis: "Previously on . . . ".

In some embodiments, the producer software could focus on the organizational roles or hierarchy of individuals within a meeting, focusing particular speakers, leaders, or roles. The producer software could detect bad light, angles, behavior for leaders within an organization and not feature those feeds to avoid embarrassing individuals. In some embodiments, the producer could focus or zoom in on slides or technical documents being presented.

In some embodiments, the producer software could facilitate the creation of new meetings or video streams. For example, an individual could say, "let's table this." The producer software could create a clip of the prior conversation and add it a new meeting stream as a starting point for the tabled discussion The producer software could be used to fork a meeting into different workstreams with their own streams (with rewind capabilities for the shared portion). The producer software could also be used to facilitate break out sessions or small group discussions—streams are forked and then spliced back together after the sessions are concluded.

In some embodiments, the producer software could detect based upon the individuals in the call, content or sentiment what kind of genre of stream is occurring (streamer mode, meeting mode, hanging out mode, goofy mode etc). The producer software could tailor shot selection, transitions, filters, overlays etc based upon those modes.

In various embodiments, producer software may provide coaching. Producer software may provide coaching about setup, coaching during a call about oneself, coaching about others during call, etc.

Producer Software as Editor

After a stream has ended, the producer software could aid editing, encoding and sharing of individual streams either individually or spliced together into an edit. The producer could cut streams from clips that did not receive high levels of engagement or affect, clips tagged as not interesting, or clips with poor audio or video quality. The producer software could make suggestions to individuals controlling edits, automatically create edits, or create an edit and then prompt for human review prior to distribution.

Edits could be individualized by tags, metadata, function, project, high or low interest, affect or other dimension. For example, an individual could review all portions of a call related to a specific project or all portions of the call when they were addressed by a speaker. In another example, the producer software could create an edit and share it with relevant users based upon clips mentioning keywords or user-generated tags, for instance, anything that needs "legal review" or "engineering review." For example, the producer software could create an edit based upon action-items or to-do list items, clipping the context for the creation of that action item and who it was assigned to.

The producer software could create a synopsis, trailer or shortened version of the meeting based upon tags, content, or affect. Synoposes of different lengths could be available (a 5 minute version, a 10 minute version).

Individuals could subscribe to edits of recurring meetings based upon tags, metadata, function, project, high or low interest, affect or other dimension. For example, I could subscribe to all action items tagged to me, any discussion of me in a meeting, or any discussion related to my project.

The producer software could use metrics both during the meeting and during replays to dynamically tailor edits.

Individuals could review edits of clips corresponding to high and low levels of engagement, interest or affect. For example, the producer software could make the "boring cut"-featuring what people were not-excited about.

Leaders, departments and other groups within an organization could subscribe to edits of high or levels of emotional affect—clips of when individuals are very angry, bored, etc. For example, HR or organizational coaches could subscribe to angry stream clips to enhance detection of personnel problems.

The producer software could create context or content specific edits or highlight reels and enable sharing of those edits.

Video/Image Editing/Masking of Surroundings

Video and/or image editing is common in the marketplace today, but most is done after the fact using sophisticated software. In various embodiments, when using a camera and central controller, the user could have the ability to edit and mask video or images of their surroundings, self and others to provide the experience desired.

Editing Capabilities

In various embodiments, the background of the user could be modified. A user could modify the background of the person they are watching. If one user wants to see the presenter with a beach background, while another person wants to see the presenter with a solid blue background, it can be modified to their desire.

In various embodiments, the background could be photoshopped (enhanced, removed, replaced). In this case, the user could manipulate objects in a user's background. For example, if they do not like the color of the walls behind a user in their home, they can virtually paint them. If they are more interested in having the user's aquarium visible in the background, they could select the object and have it be the focal point. If the user wanted to replace an ugly desk lamp with a more fashionable one, they could replace the image of the ugly lamp with the more fashionable one in the background.

Various embodiments facilitate photoshop editing of video and decluttering. There are times when a desk, office or room has too much clutter and is distracting. The user (presenter or viewer) could 'clean' the background by removing or rearranging objects to give a more clean appearance. There may be times when books, toys and leftover pizza boxes are in the background. The user may not have time to pick this up before a call, but could edit out all of the images or rearrange them to make the room appear more clean.

Various embodiments facilitate "slide transitions" for video between speakers. When switching between speakers or providing an indication to others that a new speaker is about ready to begin, various embodiments could allow the user to uniquely transition in and out of the display. For example, a first person is completing their part of an update. The next agenda item is to be covered by a second person. During this speaker transition, the first person may actually start to disappear slowly while the second person has a more animated picture of them starting to appear. This could give the viewers a visual indication of who is finishing and who is next to speak.

Various embodiments facilitate use of cropping or masking. There may be times when the camera angle is positioned in a way to present the user appropriately. The device could crop the video/image. For example, the user's laptop camera may be gathering video of the family dog playing in the background, making it distracting to others. The camera and central controller could detect this and simply crop the dog and its movements from the video feed.

Various embodiments facilitate looping of recorded video. The user could use previous video responses to respond on their behalf. For example, as a Subject Matter Expert (SME) on a topic, a user may be asked to explain a theory or technical approach in many different forums. Instead of always delivering the same information and taking time to do this, the camera and central controller could retrieve the appropriate video answer from the archives and display it for the user. Once complete, the user could rejoin the call. This allows time for the person to focus on other activities while the pre-recorded video is displayed.

Various embodiments facilitate compositing together different stills and videos. There are times when users take multiple pictures/videos of the same background because one piece is not as appealing. For example, a family is taking a picture with the mountains in the background. In one picture, someone is blinking, in another a person is looking away, in another a rare bird is caught, in another the sunset is perfect. However, none of these pictures all capture the most interesting and appealing portions of the picture/video. With the camera according to various embodiments, the images from all pictures could be overlaid to provide all of the best aspects of each picture.

Various embodiments facilitate video conferences, such as with a gallery view. Many people on a video call sit at various positions and distances from the camera. The enabled system could harmonize each person so they appear to be at the same angle and distance from the camera, thus providing a more uniform look and less distracting to others watching.

Various embodiments facilitate cameras that turn on or off, and/or cameras that turn with you so you are always facing forward in shots. If the angle of the camera is not looking directly at the user, the camera could turn on/off and only display a still image/previous video. Also, the camera could adjust so it is always following the user's face and displays a forward looking view.

Various embodiments facilitate editing out people that are falling asleep or not engaged. One embodiment of the camera could edit people out of the video/image that are falling asleep or do not appear engaged. The user's being recorded do not want unflattering images of this behavior being displayed to others. In addition, sensors in the camera could measure the level of engagement. If the eyes are closed, fist is resting and holding up the chin, or eyes are focused on another object for a long period of time, this could be interpreted as not being engaged. The camera could adjust the focus of the user's camera to not display (or blur) the image to others and alert the user of the perception they are reflecting. This would give the user the opportunity to correct their focus and begin displaying to others again.

Various embodiments facilitate edit based on ranking/roles. Some people may want their image and visual to be projected in the best way possible. The camera according to various embodiments could understand the role of the people on the video call and detect if they are displaying a behavior that could be interpreted as embarrassing or unflattering (e.g. sleeping, yawning, sneezing, scratching). Various embodiments could edit these people and actions out of the video stream or replace them with a more appealing shot. This assists the user in managing their personal brand and image.

Various embodiments facilitate automatic tagging of videos and images. The device could continually collect images of the user and their surroundings. As these images are collected, they could be compared to similar images and tagged accordingly for use at a later time. For example, someone delivering a presentation using the camera could collect this video, compare it to others doing a similar activity and tag it as a presentation. Likewise, a person leading a brainstorming meeting with a camera could be tagged automatically as 'brainstorming'. If the user or anyone in the company wants to see examples of brainstorming, the tagged videos could be shared with others for learning purposes. In a recreational sense, if a child is learning to ride a bike, a person with a camera watching the activity could collect the image and it be tagged as 'child learning to ride a bike'. In a future conversation with relatives, the video could be shared by simply asking the camera (or other display device) to present the child riding a bike.

In some embodiments, videos could be customized based on tags applied to a video stream. For example, on a video call a number of participants could tag a user's idea as being an excellent idea. After the call, the camera could then apply a special border around the user's video during that call so that participants reviewing video of the call could easily identify that the user had achieved something special during the call.

Masking Capabilities

Avatar lips move on behalf of the user when the user is away from the camera or when the camera is off. Users may have a need to move in and out of the camera's view for a variety of reasons. They may not want to alert people or distract from the flow of a conversation, and may not want participants on the video call to think the user is not engaged. For example, during a video call, a user may need to step away to accept a package at the front door. Instead of completely going off screen, they may want a representation of their face and lips to display and continue to move while talking—with words spoken by the user picked up by a microphone on the user and transmitted back to his computer which then generates the video image of lips moving in sync with what the user is actually saying. This allows the user to continue to show that they are engaged, but also to alert others they are not actually in front of the camera.

Various embodiments facilitate looping of self to show engagement. Users may want to give the appearance they are engaged. Various embodiments allow the user to select a portion of a video stream and continually loop the section for others to see. This continually looping gives the appearance a person is engaged or used to not distract others when they actually need to leave for a period of time.

Various embodiments facilitate a controllable camera iris/masking device (physical and digital masking). The camera could detect portions of the image and video to mask from other's display. For example, a user may be having a cocktail while working from home and is asked to join a quick video call. The camera could detect this cocktail and mask it from the others on the call.

In various embodiments, the camera masks certain positions of the visual field for glare and/or privacy. A user may be sitting in front of an open window allowing the sun to shine in. The sun causes a glare to appear making it difficult for others to see the person. The camera could detect this glare and mask the sunlight coming in the window so the user's appearance is not distorted by the glare. This masking could be done purely in software, or it could be done physically. For example, the camera could control a small metal disk which could be positioned using a controlled mechanical arm, positioning the disk in between the source of the light and the user or the user's camera.

In various embodiments, a camera masks some or all backgrounds. A user may want to conduct a call outside in their backyard. The yard may have a pool, gardens, swing set and other items of interest to others on the call. This could be very distracting. The camera could reduce the sunlight and mask all of the objects in the user's backyard. This modification of the surroundings could allow the user to continue to work outside without distracting others on the call.

In various embodiments, a camera masks the speaker and leaves only a background. There may be situations when a user needs to be masked for privacy or to remove biases. Situations include interviews where anonymity is needed, interviews for a job, customer feedback sessions, employee feedback sessions and consumer product testing. For example, if a Human Resources department needs to gather candid feedback from employees on the performance of their leadership team, they could conduct interviews on cameras where the video masks out the individual's image. This masking would allow the interview to be conducted but with the assurance from the team members that their comments would remain anonymous. In addition, market researchers may want to gather feedback but without any bias toward the physical appearance of a person. They could record this feedback but mask the image to an avatar in order to only hear the words, inflections and body movements of the consumer.

In various embodiments, an avatar could reflect engagement even if the camera is off. A person may want to show engagement but not display themselves or their surroundings to others. In this case, while the camera appears to be off, the individual's actions could only be a representation of some physical movements of the user. In this case, the avatar would have some minimal movement representing the person while in the meeting. In other cases, with only a voice, the image displayed on the screen could display the avatar using only vocal messages or inflections. For example, a user could respond to a comment by asking a question. The enabled system could display the avatar of the person with eyebrows raised or a hand going up to show they have a question. Another may be laughter. If the person's voice is heard laughing, the avatar could display a similar reaction.

Sub-Channels

As communications become more integrated into the way we do work and communicate with friends, there may be advantages associated with technologies that can allow for more fluid consumption of multiple communication channels.

Meeting participants sometimes want to have small side conversations with others in different locations of the meeting room (or with those virtually dialed in) without disturbing others or interrupting the meeting. In this embodiment, the camera processor 4155 could allow the user to invite a subset of participants to join a concurrent meeting sub-channel. As other participants are invited and accept the invitation, their video representations could light up in a different color. The users of the sub-channel can now speak in low tones with each other to exchange information without disrupting others. When communication via the sub-channel is finished, or if a participant wishes to leave the group, the camera processor 4155 could instruct the processor to terminate that user's access to the sub-channel. Alternatively, sub-channel communications could be made permanent. Sub-channels could also be established by default, such as by two employees who designate that they always want to be connected in a sub-channel in any meetings that they are both attending.

Setting up sub-channels under a main call could be especially useful in cases where a large number of people are on a call on an emergency basis to determine the cause of a system outage or software failure. In cases like these, it could be helpful to create one or more sub-channels for groups with a particular area of expertise to have side conversations. For example, on a main call of 75 people, a group of 12 network engineers might establish a sub-channel for communication amongst themselves. There could be many sub-channel groups created, and some people might be members of many sub-channel groups at the same time. In this example, the owner of the call could have the ability to bring a sub-channel conversation back up into the main call, and then later push that conversation back down to the sub-channel from which it came.

In some embodiments, large calls could also allow the call owner to mute groups of participants by function or role. For example, all software developers could be muted, or everyone except for decision makers could be muted. Participants could also elect to mute one or more groups of participants by function or role. In the case of education, a teacher could be allowed to mute groups of kids by age level or grade level.

On video calls, users often want to provide feedback—like clapping—for the valuable insights of another participant. But with many participants on a call, such clapping might be a distraction to others. By using a sub-channel, this situation could be improved. For example, the user could clap for a second user, but the clapping sound could be communicated only to the second user and not to all of the other participants. The video call platform could automatically create sub-channels for each instance of clapping so that multiple users could clap to one the user who was just speaking. A silent thumbs up image could be captured and added to the background gallery frame of another user, with users competing to win as many thumbs up as possible to add to their "trophy case" of thumbs up in their gallery frame.

Coaching could be done through the use of sub-channels, with one user in a large video meeting having a sub-channel open with a coach so they can talk about the call and about the performance of the first user in the call.

Sub-channels could also be used to share content to a subset of the participants on a video call. For example, a financial presentation could be shared with the entire group, but a particular slide with more sensitive financial information could be shared only with a sub-channel consisting of Directors and VPs.

Body Language and Expressions

Every person has body language and expressions that are interpreted by others. Sometimes these interpretations can be negative or positive, but may not actually be conveying the image the person desires. The camera could monitor the body language and expressions of the person and provide direct feedback (via the central controller 110) to them along with ideas to change or confirm the interpreted expression, if so desired. In addition, the viewers of an individual could get feedback on another person's expressions to help remove their initial bias regarding the person. Lastly, for large group settings, the camera could gather and provide the presenter a general summary of the room attendees and their reactions to a specific topic or individuals.

In some situations a user is aware of the image projected, but not to the degree. For example, a user has been up all night with a sick dog and has only slept two hours. They join a video conference call in the morning. Their facial features show dark circles under their eyes, messy hair, slouched posture and a blank stare. The camera notices this and provides feedback to the user that they appear to be unprepared or uninterested. Recommendations provided to the user are to sit up straight, brush their hair and lean forward to be more attentive. The user follows these recommendations and their expressions are now interpreted more favorably.

In some situations a user projects an intended image. For example, an executive is conducting a video call to discuss the severity of an IT outage where someone did not follow the documented procedures—which cost the company millions of dollars. The executive's eyes are intense and fixed at the camera, the mouth shows no smiling, their tone is stern and their gestures very deliberate. The camera could recognize these and indicate this to the executive. The executive might intentionally ignore the input since they want this appearance to be delivered to the listeners given the severity of the conversation.

In some situations, a user projects unfiltered self images, and these are interpreted differently by others. A person who has been on many video conference calls in the past and routinely has their eyes closed for thinking and their arms crossed for comfort could be collected and catalogued by the central controller. Others join the call and notice the expressions and body language of the person. They immediately think the person is uninterested and has something to hide based on their body language. The central controller could alert the other users of this incorrect assumption and inform them that this is the typical expression of the person and to not interpret it any differently or negatively.

In one example, an executive is giving an update to a large organization on a new strategy to be implemented in three years. The executive needs to get a sense of the acceptance of the idea. The camera(s) could scan the audience to collect expressions and body gestures from each participant. The executive is given a summary that indicates 20% of the people are excited about the new direction, 75% are skeptical of the new direction and 5% are bored. This provides immediate feedback to the executive that there is more communication and convincing to do in order to get all employees aligned on the new direction. The camera processor 4155 could identify instances of particular types of body language that indicate acceptance or skepticism and assign a number of positive or negative points for each instance of that body language seen. For example, every time a participant smiles, they are assigned +1 point, and every time they nod their head they are awarded +3 points. On the other end of the spectrum, a participant who crosses their arms might be assigned −2 points, and −1 point for each frown. The running total of such points could be used to indicate a positive or negative association with the presentation of an idea.

Various embodiments facilitate a user aligning others to himself. In a meeting, the camera may detect that you are not aligned with a decision. The user may want to know who else in the meeting has the same feeling (via expressions collected from the camera) without verbally asking. The user could indicate their interest via a computer device and the central controller responds with those who project a similar visual indication collected by the camera.

Various embodiments facilitate user attention detection. There may be times when the central controller via the camera could inform the user to correct an action. For example, if the user is on an important call in the middle of the night and begins to doze off, the camera could detect the person's head dropping and eyes closing, and alert them to stay awake, take a deep breath and get coffee. In another example, a user may be on a video call and be straightening their desk, reading other emails, engaging in brief side conversations while on mute and reading other material. The camera could detect that their attention is not on the meeting at hand and inform the user of how others may be perceiving them on the call.

In various embodiments, the virtual world and real world could be merged through the use of images. An avatar could display an interpretation of the image a person is projecting. In a more subtle approach and to bring levity to a situation, an avatar could be displayed on a video call that matches the interpretation of the user's expressions and gestures. For example: Through the use of a camera, if a user is disgruntled with a decision and continually shakes their head, frowns and furrows their brow, a disgruntled avatar could replace the actual image of the person. This could give a subtle indication to the user or those watching the image being portrayed. In some cases, this could bring levity to the situation and cause others to be more aware of their expressions and body language.

Various embodiments facilitate animated movements made interactive. A user may desire to shake someone's hand in a game. To do so, the user would make a hand shake signal to the camera which would be interpreted by the game and initiate an animated handshake between the two characters. In a similar fashion, a video conference call where greetings take place, a person may wish to greet another with a handshake or hug and the corresponding person accepts. On screen, however, an avatar of each person shaking hands or hugging could be displayed.

Other physical movements could be interpreted by the cameras and system while in a game or video call and displayed as an avatar or simple image of the action.

In one or more examples, a user swipes his hand to initiate a high-five. The user raises his hands and makes a high-five movement gesture. The avatar shows the person giving a high-five or the high-five symbol is displayed for those on the video call. Others are able to respond in the same manner.

Various embodiments facilitate a "fist of five" gesture. Voting using fist of five is common in software development methodologies and practices. The camera could detect how many fingers you (and all participants) are holding up and provide to the meeting owner to give an indication of the support of an effort. Three people may hold up five fingers, 2 people hold up four fingers and 1 person holds up 1 finger. The system can quickly tally the votes and inform the meeting owner of the person that voted with only one finger and give them a chance to discuss the issue.

Various embodiments facilitate interpretation of a shoulder shrug. The camera could interpret this gesture as disgust, mistrust or complacency.

Various embodiments facilitate interpretation of slouching. Cameras could be used to interpret the movement as tiredness or simply poor posture and feedback provided to the user.

Various embodiments facilitate interpretation of clapping. In one or more examples, a user claps their hands toward the camera. The avatar shows the person clapping for those on the video call. Others are able to respond in the same manner creating a shared reaction and support.

Speakers may need feedback on their presentation skills. The camera could assist the person with body movements to improve. For example, a presenter may use very infrequent hand gestures, and when they do, they are below the waist. In addition, they may never move from behind the lectern. In both cases, the camera could inform the user to use more hand movements and make sure they are above the waist along with moving from behind the lectern, making the speaker appear more confident and engaging. Lastly, the speaker may forget to smile causing the listeners to be bored or skeptical of the presentation material. The camera could provide cues to the presenter to smile at times.

Listeners often think they are to be entertained and consider themselves passive participants in a presentation or meeting at times. Their body language and expressions can have a significant impact on those presenting or performing. For example, during a dynamic presentation by a speaker, listeners are slouching in their chair, leaning their face on their fist, closing their eyes and looking with a blank stare or fidgeting with a pen. The camera could detect these gestures and expressions and provide feedback to the listener to engage and provide a modified action (e.g. sit up straight, look at the presenter, stop playing with items . . . ). In addition, users may be tired of the presentation topic as it has been covered many times in the past. If the majority of the people are providing cues to the camera that they are bored, this could alert the presenter to consider moving to the next topic or ask for feedback.

Cross-cultural interpretations of movements and expressions can vary widely between people unfamiliar with the differences and meanings. People from around the globe have gestures and movements that are not interpreted the same by others. The camera could help to interpret these gestures from different cultures and provide coaching tips or feedback to assist in clearing up any misunderstandings.

For example, moving the head from side-to-side as a sign of disagreement is often misinterpreted by many. In this case, the camera could provide viewers of a different culture that the movement is not meant to be interpreted as in disagreement and to gain clarification and support using words.

As another example, in some cultures, hierarchy may play a larger or smaller role in decision making. Some cultures rely heavily on hierarchy to give feedback and decision making. If a person the user typically has an open conversation with is now not speaking or looks to their superior, the camera could interpret this and allow the user to adjust their style of questioning and information gathering.

In some cultures, the nod of the head to indicate they are in favor of a proposal is misinterpreted. The camera could detect the culture (or location of the person) and provide an indication to the user to not assume that a head nod means they are in favor of your idea.

Some cultures value family and the sense of community much more than others. Oftentimes, other cultures do not acknowledge this in their routine conversations to build trust and support. If a user encounters a person from this type of a culture, the camera could prompt the user to ask questions about the person's family or engage in conversation with others in a larger setting (e.g. breakroom, outside of a cube, cafeteria or cafe break).

Training yourself to be an extrovert or other style is difficult and not well understood by many (e.g. "leader type", "sales person type", "better listener', "more engaging", "technical guru" . . . ). Overtime, the camera and central controller, could capture and catalogue behaviors of those with the desired leadership style or trait. As a person desires to modify their behavior and actions to mimic the 'experts', the central controller could provide video/still image information to the user as a way to compare their behaviors to those of the person. For example, if a person wants to be more outgoing at parties, the central controller could provide examples of people in the same situation and how they handled themselves. They may have approached people with a list of questions, asked people about themselves, ordered drinks for others, mingled a certain number of minutes with multiple people, made good eye contact and smiled. These are all examples of things the user could do and be reminded of during the party.

In various embodiments, gestures could provide a signal to move objects. For example, if a person is on a video call with a user and they wish to move the person's camera to see the white board, they could simply point to their camera and move the camera to the direction of the white board. As another example, a user may point to their window blinds and make a gesture to close them. The camera could detect this and communicate with the central controller to close the blinds.

In various embodiments, gestures may help find objects. A camera could find objects for a user. For example, they may have left their car keys in the house. They mouth the words 'lost keys' to the camera or hold up another (different)

set of keys. The central controller reviews the footage where keys were a part of the image and presents the user the location of the keys (e.g. on the floor next to the bed).

Various embodiments facilitate interpretation of throat, chin and lip movements. The collective movements of the throat, chin and lips can indicate to others specific meaning. The camera and Central Controller could read these movements and interpret them. For example, a person with a clenched jaw and chin, forced lip closure and non-movement of the throat could indicate an angry person. If this is the case, the meeting owner could be alerted that something may have been said to irritate the user or inform the user of the perceived facial expressions, movements. Likewise, someone moving their lips to the side could indicate they are thinking and potentially have a question, but are not sure they should ask it. This could prompt the meeting owner to pause or ask for feedback from the person.

In the absence of audio, a video feed of a user's lips could also be used by the AI module to determine what the user is saying by using lip reading software/algorithms. The accuracy of this lip reading could be improved with an additional video feed (or wider view of the first video feed) of the user's chin/jaw. Video of the throat would also help in the accuracy rate of reading lips, and could be taken at an angle that optimizes the ability for the AI module to extract the most information, such as at an angle from below the level of the user's head looking upward at the throat area.

In group settings, the producer software could detect how individuals position themselves with respect to others, which individuals group or cluster together, or how individuals move toward or away from others. The producer software could detect how individuals' verbal and nonverbal communication, as well as body changes, changes in proximity to other individuals. Visual data could be combined with other sensor data types such as biometrics, accelerometers, behavioral data, data from peripherals, etc. An AI module could be trained to detect how individuals affect changes in response to the presence of individuals or how it responds to different types of interactions with individuals Over time, the central controller could detect patterns or configurations of individuals, the strengths of connections and the kinds of affective responses an individual has to another individual. An AI module could use these types of data to produce a social graph of the network structure of an organization. An AI module could be trained to detect which individuals work well together or which individuals form cliques or informal networks within an organization. An AI module could be trained to detect attributes or dimensions of individuals regarded as "soft skills" or those skills enable someone to interact effectively and harmoniously with other people. Analyzing how others body language and physical positioning respond to a particular individual, an AI module could generate measures of interaction. An AI module could be trained to detect manipulative verbal or nonverbal communication. Individuals have well documented psychological propensities to respond to particular verbal and noverbal cues. An AI module could be trained to detect these kinds of "click-whirr effects" or "dark marketing effects" to help users detect whether they are biased, fooled, or manipulated.

Eye Gazing

Systems for tracking visual attention and eye gaze are useful for understanding where individual's direct their attention, what information is or is not seen by individuals, and for assessing engagement. Systems for tracking aspects of vision are also useful for tracking fatigue, affective or emotional states, or impaired performance. The cameras according to various embodiments could facilitate eye gaze tracking to improve workplace performance, increase user experience functionality, increase the precision of advertising, prevent or reduce accidents and injuries and facilitate better risk control, management and insuring.

Existing eye gaze systems often rely on fixed cameras facing an individual of interest and often rely upon a single channel of information—visual attention and/or attributes of vision—to make predictions about a user's attention and other attributes. Additionally, these systems struggle with changes in eye-camera angle and/or inconsistent lighting. The devices according to various embodiments could use a single camera or multiple cameras, producer software, the central controller, and/or an AI module to detect patterns of gaze, eye fixation, pupil dilation, blink rate, blood flow in the eye, and other information about the device owner's visual patterns. The camera 4100, producer software, central controller 110 and/or AI module could control camera angles, focuses, and zoom levels to maintain a consistent eye-camera angle and azimuth. These controllers could reposition cameras attached to gimbals, tripods, telescoping arms, tracks, wheels, wire control systems, etc to maintain an optimal orientation toward the subject's eyes even if the subject moves their head or body. These controllers could also control lighting settings of video recordings through the movement, repositioning, and output settings of networked lighting devices and their attachment points. In low light settings, the central controller for example, could utilize an infrared illumination device on the camera to increase the ability of the system to capture details.

In some embodiments, a camera 4100 attached to the central controller 110 could record video of an individual who is identified by the central controller as a person of interest, which could trigger the initiation of eye gaze and other vision tracking. The central controller or producer software could turn on/off, reposition cameras and lighting, and initiate the tracking of this individual's eye gaze. In some embodiments, an individual's eye gaze and/or sight line could trigger the central controller to reposition cameras to capture what an individual is looking at. In some embodiments, eye gaze and/or sight lines could be used to predict how individuals might move through a physical space, which could allow the central controller to reposition cameras to track the individual as they move.

Eye gaze and other aspects of vision tracking could be combined with other channels of information such as audio, accelerometer data, biometric sensor data, behavioral data, mouse, keyboard and other device inputs. Combining eye tracking with other signals could allow the central controller 110 to disambiguate between behaviors whose corresponding eye tracking data is observationally equivalent but whose corresponding signals from other sensors are not observationally equivalent. For example, visual fixation on a particular part of a screen or slide could indicate confusion, daydreaming, or high levels of engagement. Combining eye tracking data with biometric data, eeg data, accelerometer data, or other sensor streams could rule out one or more of observationally equivalent indicators.

Signing into the device, authenticating the device owner's identity, or other biometric patterns could allow the central controller 110 to solve the disambiguation problem of multiple users on televisions, computers and other devices. Shared devices present a difficult tracking and user identity problem for security, advertising and other uses that rely on knowing the identity of who is using the device. Individuals are commonly served ads that are targeted to them based upon other users of the device. For example if a woman's voice is recognized, the marketer could not send advertisements to them regarding male hair baldness products. Additionally, knowing the identity of the headset could allow the central controller to track an individual's eye gaze and other data across multiple devices such as computers, phones, and televisions. Knowing the identity of the device owner could allow tracking of individual data across physical and digital environments. For example, the central controller could track eye gaze across phones, laptops, and in person (via a camera constellation).

The central controller 110 could use eye gaze to predict patterns of cognition. The central controller could detect if gaze is directed at connected peripherals. For example, if a user is looking at their hands while typing, the central controller could determine if the user was a poor typer, confused, frustrated, engaged in thought etc. The central controller could determine if individuals are looking at menu functions, searching for how to do something, etc.

The central controller 110 could determine gaze and vision patterns while individuals interact with slides, documents and other digital artifacts. The producer software, call platform, or central controller could detect where viewers have directed their visual attention in meetings or video conferences, or in physical meeting environments with cameras, the central controller could determine what individual viewers are looking at such as non-speaking people, parts of the background, or aspects of a slide. The producer software, call platform, or central controller could detect where viewers have directed their visual attention. If the attention of particular viewers has fixated on someone other than the speaker, a part of their background, or another visual aspect of the call, the central controller could prompt the user. It could determine what information is viewed, where an individual directs proportions of their visual attention, how fatigue, engagement and other factors alter visual attention. During meetings and calls, individual device owners could be prompted about information they are not viewing or whether their attention is wandering. Presenters and meeting owners could see what individual or the collective is directing their attention to—whether they are viewing important information or whether they are fixating on particular parts of a presentation individuals or meeting owners could determine whether mannerisms, clothing, backgrounds, visual effects, etc. are causing fixation and distracting from meeting information or the presenter.

The layout and appearance of slides, documents, and software could dynamically respond to eye gaze. For example, the central controller or software controller could rearrange the positioning of information, change the size of images, alter font attributes (type, size, color, emphasis), increase cursor size and manipulate other visual aspects of digital artifacts and user interfaces to place information in areas of high attention. For example, the central controller could place things in areas of high collective attention (where the average viewer or a threshold of viewers is likely to see the information).

Education

Education, courses, training, examinations and other forms of learning increasingly use software, take place in digital environments, occur over videoconferencing, or utilize telepresence technologies. The devices according to various embodiments could enable improved measurement and feedback of learning and teaching outcomes, as well as provide coaching to students and teachers. devices could allow for personalized educational content or methods of instruction.

The devices according to various embodiments could be used to verify and authenticate the identity of a student for attendance and verifying identity for exam purposes.

In some embodiments, a teacher, proctor or third party could control one or more cameras in the environment of the student. A teacher could verify during an example whether a student is using outside material or engaging in other forms of cheating. In other teaching contexts, a teacher could control a camera to see if a student is doing a task or performing a task or skill correctly. For example, a music teacher could zoom into a part of an instrument to see if a student is using correct technique.

In some embodiments, a remote student could control a camera in a classroom or in another physical environment. A lab or practicum could be based upon controlling and exploring an object or environment via a remote controlled camera. For example, an anatomy class could be taught remotely. A student could control the movement, angle, zoom and focus of a camera to focus on a particular tissue or to zoom in a microscope-like function.

Sensor inputs from the devices according to various embodiments could be used to track eye gaze and other aspects of visual attention, body language, microexpressions and other nonverbal visual cues. Tracking visual attention, body language, microexpressions and other nonverbal visual cues could be combined with other types of sensor inputs, such as input data from mice or keyboards, accelerometers, biometrics, etc. The central controller 110 could utilize tracking of visual nonverbal cues to measure what documents, slides, videos, and other digital artifacts students are interacting with. Within those artifacts, the central controller could determine what materials students view, how the pace of eye tracking changes over time or in response to aspects of material such as difficulty or novelty, how attention, affect, energy is affected by presentation of material, etc. Insights from eye tracking technology, body language, and other nonverbal visual cues could be made available to teachers in real time during video class meetings or after class meetings. Tracking visual attention, body language, microexpressions and other nonverbal visual cues could be conducted outside of class hours when students do homework, practice or otherwise continue their education in unsupervised learning settings. Tracking visual attention, body language, microexpressions and other nonverbal visual cues could verify if students did their homework, which aspects of homework or practice were difficult for students, and which parts of the material students found interesting, confusing, boring etc.

Insights from tracking visual attention, body language, microexpressions and other nonverbal visual cues could allow dynamic and personalized presentation of material to students. An AI module could be trained to use signals of engagement or affect to present material in sequences that produce high levels of engagement. An AI module could be trained to use signals of engagement or affect to change the length of classes or practice sessions, or to alter the type of learning exercise or practice based upon high/low levels of engagement. For example, the module could stop practice sessions when a student's engagement or affect is declining to eliminate boredom, resentment etc and allow for positive feelings toward learning or practice. For example, the AI module could alternate types of problems, practice, or games depending on engagement—to use novelty to increase engagement. For example, the AI module could detect which kinds of problems, tasks, or drills a student requires high or low levels of attention to perform well at and structure sessions that place different kinds of problems, tasks, or drills into periods when students have the requisite levels of attention, energy, or affect.

The producer software according to various embodiments allows students to receive individualized edits of recorded classes. Students for example could receive a searchable library of clips corresponding to different parts of classes. A student for example could receive a personalized highlight reel of parts of a lecture where the central controller detected that they were confused or were not paying attention to. The central controller could generate clips of material where the student's eyes were not focused on information and could use visual overlays or other forms of signaling to direct students to material they missed. Because video recordings are clipped, tagged and searchable, students could find segments of material easily for review or could replay answers to questions. Students could add comments or questions to particular time stamps when they review material, allowing the teacher to see what clips students do not understand.

Gaming Embodiments

There are many ways in which the camera could be used to make game playing more fun and engaging for a user.

According to various embodiments, a user can control an in-game avatar that embodies elements of the user. For example, the user could be represented in the game as a less distinct cartoon character that provided a generic looking face and simplified arms and hands. The character could be animated and controlled by the movements of the user picked up by the user's camera. A user might create a cartoon avatar, but have his camera track movement of his head, eyes, and mouth. In this embodiment, when the user tilts his head to the left the software in his camera registers the movement and sends the movement data to the game software controlling the user's animated avatar, tilting the avatar's head to the left to mirror the head motion of the user. In this way, the user is able to communicate an essence of himself in a game without requiring a full video stream. The user's camera could also pick up the breathing rate of the user by identifying movement of the user's chest, and that data could be transmitted by the camera to the game software so that the user's game avatar character's breathing reflects the current breathing rate of the user. The user's direction of eye gaze could also be used to control the eye movements of the in-game character. The user could also provide a verbal command to a microphone of the camera, for example, in order to make his avatar nod, even though the user himself is not nodding.

The user's in-game avatar could also display an interpretation of the emotions of the user. For example, an avatar could be displayed in-game that matches an interpretation of the user's expressions and gestures as seen by the user's camera. If a user is angry with a game decision and continually shakes their head, frowns and furrows their brow, the user's avatar could be shown to reflect those same emotional markers. In some cases, this could bring levity to the game situation and cause other players to desire to bring their own emotions into the game. User emotions could also be projected onto the faces of enemy game characters in-game.

In various embodiments, the user camera includes an attachable sensor 4140 that can be clipped to the clothing of the user in order to feed whole body movements into the control of the in-game avatar. For example, the user might clip one sensor on each leg and one sensor on each arm. These sensors would provide position data with Bluetooth® or Wi-Fi® to the user's camera processor 4155 so as to allow the processor to generate the user's avatar to reflect the arm and leg motions of the user. For example, this would enable the user to be able to walk with the gait of the user, or allow the user to dance and have that dance reflected in the movements of the user's game avatar. By employing a larger number of sensors, the user could enable the creation of an avatar with a greater level of position control.

The user's avatar could be created to look something like the user, such as by matching the user's hair color, hair style, color of eyes, color of clothing, height, etc. Clothing color could be picked up by the camera of the user and reflected in the clothing color of the user's avatar. Users could also have several different avatars for a given game that could be switched between.

Avatars could be used to represent game characters, non-player characters, or even objects within a game. The user could have a separate avatar which represents his child or his dog which appears in-game.

For users looking to find a partner for a game, match making systems might match players by finding players with similar emotional responses to the game. The camera according to various embodiments could be used to train an AI module that uses camera data to identify matches or parts of matches that players enjoy, for example. The AI module could predict whether a potential match would likely elicit that emotional response and make matches that optimize the enjoyment of players. For example, an AI module might identify that users who laugh a lot during game play tend to enjoy playing on a game team with other players who laugh a lot during game play.

In another embodiment, the user creates small drawings or doodles that are picked up by a user's camera. For example, the user could use a pen to draw a team crest on a piece of paper on his desktop. The user could then position a camera on a flexible stalk to get an image directly above the image of the team crest. This image could then be transmitted to the game software so that the image could be applied to all of the shield's of each team member. Users could similarly draft hand written notes which could be picked up by the user camera and sent to other characters in-game.

A camera with infrared capability could be used to sense the temperature of the user and map the temperature differentials onto an in-game avatar of the user. For example, a user playing a car driving game might have warm hands from gripping a wheel controller to control the car, with the infrared camera picking up the relatively warm temperatures of the user's hands and having that reflected in the user's in-game racing character's hands.

The user's camera could also facilitate capturing expressions/reactions of the user at his desk while the user is playing in-game. For example, game software could determine that a game character is likely to be very stressed given that the game character is in a battle that is not going his way. The game software could then send a signal to a central controller which then relays a signal to the user's computer which then commands the user's camera to begin recording a video feed of the user while his in-game character is in peril. Video clips of the user could then be sent back to the central controller for storage and later viewing by the user. Such clips could also be shared with the user's friends and game teammates, especially when expressive emotional clips are captured.

The user's camera could also be configured to identify emotions crossing the user's face (such as a smile, frown, arched eyebrow, or the dilation of his pupils), and to begin recording video of the user's face while simultaneously sending a signal to the game software to capture a video clip of what the user's character was doing at that moment. These two clips—one real and one in-game—could be sent to the central controller to be combined together in a single video with the two clips playing side by side so that the user could see actions in-game and how they are reflected in his real life face.

In various embodiments, the user initiates a video clip of his own face by using gestures as seen through the user camera of the user computer during gameplay. For example, the user could send an initiation signal, such as two quick blinks while facing the camera, to start a recording of the user's face while engaged in a particularly interesting or exciting activity in-game.

User clips stored in his account at the central controller could allow the user to build a video game highlight reel that could be sent to friends. Such video clips could be listed by game or chronologically. This could be combined with game statistics much like a baseball card. For example, for a game like Fortnite the player might have several video clips as well as statistical information like the number of games played and the average success rate in those games. For players on teams, statistics and gameplay clips could be cross posted to teammate's pages.

The user camera could collect data for gaming analytics, such as by capturing the movement and/or positioning of the user's hands while playing a game.

Avatar Management

Video conferencing calls often have participants in a gallery view so that you can see most or all of the participants. Participants can decide to enable a video feed of themselves if they have a camera, or they can have a still photo of themselves to represent them, or they can have a blank representation typically with only a name or telephone number shown. There are situations, however, when a user would like a greater amount of control in how they are represented in a video call.

In various embodiments, a user can create a cartoon character as a video call avatar that embodies elements of the user without revealing all of the details of the user's face or clothing. For example, the user could be represented in the call as a less distinct cartoon character that provided a generic looking face and simplified arms and hands. The character could be animated and controlled via the user's interactions with the camera. A user might create a cartoon character, but have his camera track movement of his head, eyes, and mouth. In this embodiment, when the user tilts his head to the left, his camera registers the movement and sends the movement data to the video call platform which is in control of the user's animated avatar, tilting the avatar's head to the left to mirror the head motion of the user. In this way, the user is able to communicate an essence of himself without requiring a full video stream. The user could also provide a verbal command to his camera to make his avatar nod, even though the user himself is not nodding. One of the benefits to using an avatar is that it would require significantly less bandwidth to achieve. The user's camera processor 4155 could also use data from a video camera to capture movement of the user's eyes and mouth, with the processor managing to control the user's avatar to reflect the actual facial movements of the user. In this way, the user is able to communicate some emotion via the user's avatar without using a full video feed. In this embodiment, the user could communicate agreement with a proposal in a meeting by having his avatar nod in agreement.

The user's avatar could be created to look something like the user, such as by matching the user's hair color, hair style, color of eyes, color of clothing, height, etc. Clothing color could be picked up by the user's camera and reflected in the clothing color of the user's avatar. Users could also have several different avatars, selecting the one that they want to use before a call, or switching avatars during the call. Alternatively, the user could define triggers which automatically change his avatar, such as changing the avatar whenever the user is speaking. The owner of the call could also change a user's avatar, or even substitute one of the meeting owner's avatars for the one that the user is currently employing.

Avatars could be licensed characters, and could include catch phrases or motions that are associated with that character.

Users might have one avatar for use in game playing, another avatar for use in school online lessons, and another avatar for video calls with friends and family. The user could also deploy his game avatar while participating in a video call with friends.

Avatars could also be used as ice breakers in video meetings. For example, a user might have an avatar that can add or remove a college football helmet of his alma mater. The owner of the call might also be able to add a helmet to each meeting participant based on their alma mater. The user could have a separate avatar for his dog which appears whenever the dog begins to bark.

In various embodiments, the user creates small drawings or doodles using a mouse that is wirelessly connected to the camera. The camera processor 4155 then sends these images to the meeting video feed so that they appear behind the user during a video call. Users could create a "thought bubble" to the right or left of their image on a call. Alternatively, the user could do a drawing but have it overlaid on top of the image of another call participant's head. For example, the user could sketch a pair of eyeglasses to appear on the face of another call participant.

In various embodiments, the user employs degrees of blurring of their face during a video call. For example, a user just waking up might not want other call participants to see that their hair was not combed and elect to blur out their image somewhat, or elect to blur out just their hair.

Computational/Virtual Cameras in Video Games or Virtual Environments

Some gaming environments allow one or more players to freely move through a three dimensional world, encountering players or non-player characters, magical objects, traps and puzzles, etc.

According to various embodiments, the central controller 110 (which may act as a gaming controller) could identify interesting elements within the game that the player might have missed and capture those elements with a computational camera. The computational camera would determine a location, direction, focal point and field of view and then calculate what a video camera would see from those starting conditions—taking into account all current player positions and actions, as well as any changes to the landscape and objects of the game environment. Those initial conditions could be used to create a computational still photo, or a stream of computational video over time. Such a computational video could be provided to players or made available to people who are not players of that game but might be interested in what was happening in-game. Because the videos are done computationally, the game software could generate many such videos, and could create videos both during game play and after game play has concluded. A computational camera could also implement shots not possible with physical cameras, such as being able to zoom in or out infinitely.

In various embodiments, a computational video is created by algorithms/rules of the game software. Examples of algorithms/rules could include: always follow (and take the perspective of) the person who has the most points, follow the best player currently left alive, follow the biggest current battle, follow the player with the basketball, follow the player with the current "hot hand," follow any player solving the maze challenge for the next 60 seconds, follow any team that is moving north, follow any team that just found the +5 sword, etc. Multiple conditions could also be implemented in a rule. For example, the rule could be to always follow the player with the most points who is currently engaged in a battle and also has a potion of healing.

Because the game software may have information about all player actions, as well as information (e.g., perfect information) about procedurally generated aspects of the game, such as resources, non-player characters, and treasure chests, an AI module could predict when something exciting or interesting is likely to happen. Exciting or interesting elements could be players converging in the same area, a less skilled opponent beating a high skilled opponent, an improbable event happening, or another aspect of game play that has in the past elicited high levels of engagement, spikes in biometric data, social media shares or another aspect of excitement. If the AI module predicts that something interesting is likely to happen, it could visually indicate it to players. It could also automatically create a computational video of the event and share it with players in-game, post it to social media, or share it on the internet. For example, because the game software knows the locations and could predict likely paths of players, the software could trigger a computational camera to capture the facial expressions of an individual likely to be in a line of fire or about to be ambushed. For example, the controller could message "watch out" to a player who is likely to crash in a racing game or "close call" to a player who escaped a predicted crash.

In various embodiments, a video call platform could create computational videos from the content of one or more video calls. For example, a company might host dozens of video calls with hundreds of participants every day. The video call platform could review video feeds for those tagged with "important idea" and create a computational video by concatenating all or some of those videos together for later review by company executives. Computational videos could also be assembled by identifying all video clips in which more than 90% of the participants are judged to be "very engaged" during that clip by the video call platform. The video clips generated could be provided to a CEO as a way for her to get a sense of important issues being discussed at her company.

Childcare

Parents are often overwhelmed by the parenting process, especially when they have multiple small children who require a lot of attention. Any help that they can get in making this process easier to manage would be greatly appreciated.

In various embodiments, sensors of a parent's camera can help to make visible issues that previously went unseen. By making the invisible more visible, the parent is able to make more informed decisions and is better able to understand the needs of children.

With a thermal camera, it would be possible to generate a heatmap of a baby which indicated where the baby was warm or cool. This map could be emailed to the parent, or presented to the parent on a display screen connected to the camera or camera processor 4155.

With an outward facing camera, a headset could be programmed to detect changes in skin color which might be a precursor to the onset of jaundice. The video/photo data collected could also be used to detect the earliest stages of the onset of a rash, or reveal how a cut has been healing over time. Data related to the health of the child could be stored in a data storage device of the parent's headset, and it could be transmitted to a physician for review. Video clips, for example, could be shown to a physician via a telemedicine session relating to the child's health.

In various embodiments, the parent could detach a Bluetooth® paired motion sensor from their headset or additional camera and attach it to an arm or leg of the baby so that the headset could detect small changes in the baby's mobility over time, which could allow a parent to be able to better predict in advance when a baby is going to get sick.

Babies make a lot of movements that are often mistaken for seizures, including having a quivering chin, trembling hands, and jerky arm movements. The outward or attachable camera could detect these micro-movements and assure the parent there is nothing to worry about or compare to babies of similar age and alert the parent if they should take the baby for further diagnosis.

The parent's headset or additional camera and microphone could record and tag the emotions of a child. For example, parents want to capture the development of their children, including laughing, cooing, and new movements like clapping and rolling over. These emotions and movements could be captured more quickly than retrieving a cell phone and tag these for storage and retrieval. The parents could also compare responses from a child over time (from night to day) and compare to see if emotions are getting stronger.

With a camera and microphone, the parent could capture if the baby is in pain or which body part is affected. The emotions, movements and complete body scanning could be captured and compared to a bank of other baby responses. This comparison could assist the parent and indicate if the emotion is common among babies or if there is a need for further diagnosis. Parents could be relieved from overeating to conditions typical in children. These sounds and images could also be shared with medical professionals for evaluation.

Children often need to be monitored for safety purposes. A camera could be used to monitor children in another room and alert the parents, via the Central Controller AI, if they are about to engage in an activity deemed unsafe. If the child is climbing on a shelf, approaching an outlet, sitting on another child or hurting them, throwing an object indoors. This monitoring would allow for the parent to work or perform other duties and only be alerted when the AI picks up activities that need their immediate attention.

In various embodiments, a camera may serve as a chaperone. Many times parents are concerned about their child and the places they go and more importantly the people they may encounter. The detachable camera could be worn by a child that allows the parent to monitor their movements and activities. If a child is walking home from school, the child could wear a detachable camera to record and transmit movements until they enter the home safely.

Various embodiments facilitate the use of a camera for telepresence when parents are away (on trip, at work). Parents/grandparents sometimes need to miss key events while working or away at other functions. Attachable cameras could be worn by children at parties, games, school functions to give the parent an upclose reaction of the child and to be more engaged in the child's activities.

In various embodiments, camera 4100 may be used to promote the health of a child and alert those providing childcare. The temperature of a child during periods of illness may advantageously be monitored continuously rather than at points in time as is the typical case. Camera 4100 with thermal sensor 4126 may be directed at a child in a bed, crib, play area or any other location. The camera may record the temperature and communicate with processor 4155. The processor may compare the child's temperature with an acceptable temperature range saved in data storage 4157 and communicated through network port 4160 to a caretaker. The delivery of information to a caretaker may be in the form of an audible alert (e.g. buzz, beep), audio message (e.g. temperature exceeds the limit), lights (e.g. red for a fever and green for normal body temperature), or a video of the child showing the skin (e.g. are they red and hot, covered with too many blankets). A child with a cold may be put to bed for a nap. In some embodiments, camera 4100 may be placed in the child's room facing the child. The thermal sensor 4126 may begin collecting the body temperature of the child. As the child sleeps, a fever may begin to form. The thermal sensor in the camera may detect the temperature as 100 degrees Fahrenheit. The processor 4155, when comparing to information stored in data storage 4157, may determine that the temperature is a fever since normal body temperatures are 98.7 degrees Fahrenheit. The camera may alert the caretaker by the processor signaling to other peripherals (e.g. camera, headset, keyboard, mouse) that the child has a fever and provides an audible beep, a red light displays on the camera, or a message saying, 'child has a fever' is displayed or spoken through speaker 4110.

In various embodiments, camera 4100 may be used to monitor skin conditions of a person and provide an alert. Individuals may be asked to monitor the size and rate at which a rash spreads and take action. Oftentimes the progression of the rash is slow and is not recognizable to individuals until immediate action is needed. A camera 4100 may be focused on a rash of a child. The camera may monitor the size and color of the rash throughout the day. As the camera monitors the rash, the size and color may be compared by processor 4155 to earlier images collected and saved in data storage 4157. The rash may grow from 2 cm to 4 cm and color turn from light red to bright red. The camera may alert the caretaker through the processor to other devices (e.g. headset, lights, mouse) that the child's rash is increasing in size and color intensity is changing and provide an audible beep, a red light displays on the device, or a message saying, 'check the rash' is displayed or spoken. Also, a video image of the rash may also be sent for display on camera display 4146. The processor may also provide information to the caretaker about first aid that can be delivered to promote healing of the rash through speaker 4110 or camera display 4146. In this case, the display may provide a message (e.g. apply ointment every 4 hours, apply a cold compress, call a physician if size increases to 6 cm).

In various embodiments, the camera 4100 may be used to monitor a child's emotions and movements to assist in diagnosing a health concern. New parents or those who rarely want children may not recognize health concerns since they are not familiar with typical indicators. Camera 4100 may be focused on a child that is suspected of having attention deficit hyperactivity disorder (ADHD). The camera may monitor and record the emotional responses of a child throughout the day. The camera records and stores in data storage 4157 that the child is having 5 emotional outbursts during the day (e.g. one at dinner, one while playing with another child and not sharing, cutting in line and screaming at the parent). The parent may think this is normal behavior for a 3 year old and never address the issue until later when the child enters school, making it more difficult to address. The camera processor 4155 may upload the video images to location controller 8305 and/or central controller 110 for evaluation by physicians and comparison to children of similar background. The feedback may be delivered to the parent on camera display 4146 or a manner of their choosing (e.g. mail, electronic, voice). Display 4146 may indicate that the child exhibits behaviors requiring professional attention and to make an appointment with the physician. The parent may take the child to the physician for an examination and show the physician the recordings of the child or the images from the camera already provided through the central controller for evaluation. The physician may provide a diagnosis and coping exercises for the parent to try with the child. As the coping exercises are implemented, the camera records the behavior of the child and these are uploaded to the physician for review or evaluated by processor 4155 for ongoing care. Feedback may be delivered to the parent by the camera processor 4155 to continue with the exercise, modify the exercise or set-up a follow-up appointment with the physician.

In various embodiments a supplemental camera 4184 may be used to monitor the activities and location of a child for safety. A child may be walking home from school and wearing a detachable camera clipped to their shirt. As the child walks home, the supplemental camera may record her journey and provide the images or video to the central controller. The camera processor 4155 for the parent retrieves the images from the central controller 110 and displays the images to the parent on the camera display 4146 while they are at work. The parent may also receive video or image feeds from the supplemental camera on other display devices (e.g. mobile phone, computer, display screen, projector on wall) through the central controller to monitor the child. As the child is walking home, they may decide to take a new path, a route not approved by the parent. The parent notices on their camera display that the typical path is not being followed and contacts the child through their device (e.g. headset, phone) communicating with the central controller or location controller 8305 while at the office. The child returns to the normal route and walks home. The parent sees through the camera display or other display (e.g. mobile device, monitor, panel board) that the child has made it home safely and disconnects the camera feed from the child.

In various embodiments a supplemental camera 4184 may be used to monitor the activities of a child not in the same room as a parent. A child is playing in room 8721*c* with supplemental camera 4184 attached to his shirt while the parent is in the living room 8715*a* reading a book. The child may crawl toward the electrical wall outlet on a wall in room 8721*c* with a metal paperclip they found on the floor. The supplemental camera may detect the child approaching the wall outlet and is 1 foot away and communicate through the central controller 110 and alert the parent by displaying a message on the wall from projector 8767*a* (e.g. child in danger, attend to child) or a sound from speaker 8755*a* (e.g. siren, buzz, beep). Likewise, if the child moves away from the wall outlet and is now 3 feet away, the supplemental camera may detect that the child is a safe distance from the outlet and the central controller informs the projector and speaker to turn off the alerts.

In various embodiments, camera 4100 may be used to establish virtual boundaries in home 8700 that alerts a parent when a child crosses them. Camera 4100 may be used by a parent to record boundaries around a pool 8779 in order to protect the child and alert the parent when a child breaks the virtual boundary. The parent may also use the supplemental camera 4184 to set up the virtual boundary by walking around the perimeter of the pool using the recording function. The recording may be uploaded to location controller 8305 or central controller 110 for use in monitoring the child's movement around the pool. The supplemental camera 4184 may be worn by the child around the pool area. The child may be playing in an area outside of the recorded boundary (e.g. safe zone) and when compared by the camera processor 4155, no alert is sent to the parent. However, as the child approaches the boundary within 3 feet, the supplemental camera may upload the image for evaluation by the camera processor and the parent alerted in house 8700 on display 8760*a* (e.g. child approaching the pool), color lighting device 8765*b* may begin to blink yellow or speaker 8755*c* may begin to make beeping noise. If the child crosses the recorded boundary, the supplemental camera may upload the image through the central controller for evaluation by the camera processor and the parent alerted on display 8760*a* (e.g. child in danger around the pool), color lighting device 8765*b* may begin to blink red or speaker 8755*c* may begin to alert the parent (e.g. take immediate action, child in danger). Likewise, camera 4100 may record other adults in the pool area attending to the child. Processor 4155 may determine that the child is not in danger since other adults are attending to the child and no alerts are initiated to the parent.

In various embodiments, camera 4100 may be used to alert a parent when objects, people or animals enter the yard. A child may be playing outside in the backyard while the father is cooking in kitchen 8719*a*. A ball may be kicked into the yard by the neighborhood bully. The camera 4100 detects the ball in the yard and alerts the parent through speaker 8755*b* (e.g. foreign object in year, investigate). The parent may walk to the backyard and see the ball and throw it back over the fence. Likewise, the child may be playing in the yard and other people enter the yard. The camera processor 4155 may detect people in the yard, uploads the information to the central controller and alerts the parent through speakers 8755*a-i* (e.g. people in yard, go outside to check), projector 8767*a* (e.g. shows the people in the yard) or display 8760*a* (e.g. shows the people in the yard). The parent may take immediate action to keep the child safe.

Health and Safety

In various embodiments, a camera may advantageously be used to alert emergency personnel, prevent accidents from occurring and/or inform users of health concerns. The camera and its sensors could continually monitor the user's environment and respond appropriately to video and images being collected and interpreted.

In one or more examples, a parent may put a child in the car during a hot summer day to go to daycare. The parent is distracted with conference calls and mental wandering and drives to work, forgetting to drop off the child. When the user arrives at work and closes the door, the camera and central control AI system recognizes the task of removing the child from the carseat did not take place and alerts the user via the headphone/text/email audio ('get child from car') or emergency vibration and also emergency personnel.

Various embodiments facilitate telling a person where to go and how to get there. In the case of a fire or places that are unfamiliar to a user when an emergency begins, the camera could provide guidance. For example, if a fire started in a building that is unfamiliar to the user, the camera could send image/video information of the building and real-time event to the central controller (with access to public information) and inform the user how to exit. The emergency responders could inform the user which path to take to avoid closures or where there is impending danger since they would have a real time feed of what the user is actually seeing.

Various embodiments facilitate coaching a user through a Heimlich maneuver or CPR. Bystanders are often used to engage in emergency procedures while waiting on emergency responders. At times, users do not have immediate recall or lack the basic understanding to perform the emergency function without some coaching. The camera could coach the user through emergency procedures. These detachable cameras could be placed in AEDs (Automated External Defibrillators) and worn by anyone needing to use the AED. For example, if a person is choking at a restaurant, a user could request coaching on the Heimlich maneuver. The central controller could respond with the steps or a video and communicated the activity to emergency personnel. In addition the camera could inform the user of any corrections needed during the maneuver. Likewise, if a person is having a heart attack, the user performing CPR and using the AED could attach the camera. The emergency personnel could observe the actions of the person and coach them through the use of the AED or CPR. In addition, the camera could collect the visual condition of the person being assisted.

Various embodiments facilitate the use of a headset with a camera as a driving assistant. There are examples where headsets can prevent accidents. For example, with the accelerometer and inward/outward camera, the headset could notice the head dropping and determine the user is falling asleep while driving. In this case, the headset could alert the user via vibration alerts and vocal alerts to stop the car or via integration with the automobile's driving assistant software. In cases where there are environmental distractions, the camera could inform the driver to take corrective action. For example, the camera notices it is raining or foggy outside, the user could be contacted to slow down the vehicle or reminders to drive safely.

A person may be working with little distraction. Someone walking up behind the person may cause them significant fear and cause them to 'jump'. The headset with the 360 degree camera could alert the user that someone is approaching them from behind and alert them sooner.

In various embodiments, footsteps/bicycle images behind (or in front of) the user are collected from the camera(s). If the user attempts to move to the left or right and the camera notices someone approaching quickly, a signal is provided to the user so they do not move over in front of them or give you an opportunity to alert those behind you.

Various embodiments facilitate adjusting volume. Users in public often listen to other audio (e.g. books, podcasts, music, telephone calls). When the camera on the headset notices another user approaching them and beginning to speak, the volume could be turned down or muted for listening. In addition, if the camera notices heavy traffic before the user wants to cross in the intersection, the audio volume could automatically be turned off. or reduced.

Various embodiments facilitate litter control. Those searching for litter to clean the environment could be alerted by the headset. Using the forward facing camera, the camera could continually monitor the environmental surroundings and detect trash. The display screen or audio alert could notify the user of trash in proximity so it can be picked up and disposed of. This could be considered the 'metal detector for trash' using a camera.

Various embodiments facilitate use of a camera in surgery. Surgeons may need various cameras to observe or display images and other camera sensor information of a patient during a procedure. These can be to assist them or used as an educational tool for residents. A detachable camera could be placed on/near the patient to collect granular content, while a surgeon may wear multiple cameras to collect the angle (the patient, the instruments, the diagnostic machines and all displays for viewing in a headset or other display device(s).

Various embodiments include a camera that assists with ergonomics. A camera could adjust connected chairs, keyboards and desks to match the preferred ergonomic state of the user. If the chair is at the wrong height or desk height/angle or keyboard layout, the camera could notice this and adjust those pieces of connected hardware. Over time, through use during the day, the connected equipment could get out of place and the camera notices this and adjusts. For example, the chair may slowly recline or lower, the mouse may become further from the user or the user's standing desk may not have been raised in some time (e.g. user has been sitting for an extended period of time). The camera could communicate with the user and devices and adjust to get back to the preferred state. This preferred state could assist in preventing injuries or simply causing the person to become tired more quickly.

In various embodiments, a camera assists surgeons with devices available during surgery. A visual checklist could be completed by the camera. For example, prior to the specific surgeon, the surgeon has indicated the need for certain devices and equipment. As the surgeon enters the Operating Room, the camera searches for all of the needed equipment compared to the request. If present, the surgeon is notified that it is ok to proceed. If anything is missing, they are also informed accordingly.

Surgeries could be monitored by others (e.g. surgeons, residents, medical professionals, salespeople) and direct the camera remotely to locations most interested. The salespeople may want to see how the device is packaged or opened in a surgery, a resident may want to get a better view of how the medical device is inserted, while a resident may want to look at the entire Operating Room to learn the interaction of all the medical professionals. Each person could direct a camera to focus on their unique interests.

In the world of virus prevention and general cleanliness, cameras could detect and inform others which surfaces were touched over time, residue on desks and other surfaces and potentially finger prints generating a 'hotspot' type of feedback. There are potentially surfaces touched each day that are never cleaned because people are unaware that they need to be cleaned. For example, many people throughout the week may be opening cabinets in the breakroom looking for coffee, sweetener and plasticware or touching the lightswitch in a remote area of the building or moving tables in a conference room. The hotspot display of surfaces touched could be provided to building maintenance personnel for inspection and adjustments to cleaning protocols and schedules. This information could serve as a way to provide a cleaner and safer work environment for employees.

It may be hoped or assumed that cleaning crews are actually cleaning all surfaces in a manner intended, but this may not necessarily be the case. In various embodiments, a camera could monitor all areas and objects to ensure they are being cleaned. For example, a cleaning crew may be instructed to clean all desks and chairs nightly. While they typically do a good job, due to miscommunication, one entire aisle of desks is missed. The camera could alert the cleaning supervisor that the desks were not cleared and the mistake corrected. Another area of potential viruses and germs are on doorknobs. If doorknobs are not wiped, the cameras could again alert the cleaning crew.

Sharing of devices could spread germs and viruses. In a world where workers share desks, it is important to eliminate sharing of objects on desks and remove them at the completion of their shift. With a camera, the controller could have an inventory of objects that belong to the person. At the end of the shift, if all owned objects are not removed from the desk, the device could alert the user. For example, at the end of a shift, the worker collects their keyboard, personal picture, umbrella and iPhone. However, they forget to pick up their mouse. The camera could alert the user that they are missing an object and instruct them to retrieve it before leaving the location. This inventorying and alerting mechanism could reduce the amount of contact with others' objects and reduce the spread of germs.

In various embodiments, camera 4100 may be used to observe the physical movements of a person and alert them when they are not performing the activity correctly. In some embodiments, a person may be given instructions to perform a physical therapy activity. This therapy may be saved into the camera data storage 4157 by a doctor and accessed by the camera when the individual is performing the activity. When the activity is performed, the individual informs the camera 4100 that the activity is taking place by motioning to the camera (e.g. showing a fist, thumbs up) or providing a verbal command (e.g. physical therapy activity #1).

The camera may begin capturing the individual performing the physical therapy activity and compares it to the stored activity. If the activity being performed is the same (or within an acceptable range, e.g. 90%), the individual may be alerted with positive feedback from the display (e.g. good job), lights (e.g. green) or audio. Conversely, if the activity viewed is not the same, the camera may alert the user through the camera processor 4155 to a device (e.g. headset, display screen, speaker, lights) or camera display 4146 to pause and review the correct activity. This feedback can be in the form of a message on the camera display (e.g. stop activity and review), speaker 4110 (e.g. buzz) or camera lights 4142*a-b* (e.g. red flash). Likewise, the camera may capture the amount of time spent on the activity (e.g. 10 minutes stretching exercise) and save it in the camera data storage 4157 for later review by the physician or individual for audit purposes through the central controller. These alerts may help improve the individual's health by observing and correcting physical therapy movement while also providing positive feedback.

In various embodiments, camera 4100 may be used to observe the physical position of a person and alert them when they are not at an ergonomically optimal position. The camera may capture the posture of an office worker sitting at her desk or standing or other ergonomic positions (e.g. hand position on keyboard, hand position on mouse, leg crossing position) and alert the user when they may not be in the optimal position. The camera unit 4120 may capture the user slouching in their chair for 10 minutes. The camera may collect the image and the camera processor 4155. The images may be compared to correct posture images saved in data storage 4157 and provide alerts back to the user on display 4146 (e.g. shows correct sitting posture). The images compared by camera processor 4155 may also communicate this to the user and alert them through speaker 4110 (e.g. sit up), lighting 4142*a-b* (e.g. turns yellow which means to sit up) or projected on the wall with projector 4176 (e.g. life size images of someone sitting with correct posture). In a similar manner the camera may detect the user's hand on a mouse being held in the wrong position and inform the user at their desk through vibration generator 4182 (e.g. vibrates to notify poor hand position), display 4146 (e.g. correct hand positioning on the mouse), speaker 4110 (e.g. move hand on mouse), or projector 4176 (e.g. shows hand placement on mouse video).

In various embodiments, camera 4100 may facilitate good cleaning practices. Office cleaning may become more important to remove germs and create a safe work environment. In some embodiments, maintenance personnel may be instructed to spray the desk, wait for 30 seconds and wipe until dry, spending a minimum of 2 minutes per desk to ensure a safe work environment. During cleaning, one or more cameras 4100 may have a view of cleaning activities, with a forward facing camera 4122 collecting the desk cleaning activities of the maintenance worker, sending a record to processor 4155 for evaluation against standards and store the results in data storage 4157. The camera processor may determine that in one situation cleaning spray was not applied and speaker 4110 may alert the maintenance personnel to reclean the desk and apply a cleaning solution. The processor may also determine that desks are only being cleaned an average of 1 minute 30 seconds, not the required 2 minutes. Speaker 4110 may provide an alert response to the worker (e.g. buzz or verbal reminder to clean longer), display 4146 may remind the worker with a message to clean each desk for 2 minutes and to redo the cleaning, or camera lights 4142*a* and 4142*b* may light up (e.g. red to show longer cleaning is needed). Likewise, at the end of a shift, projector 4176 may retrieve a list of all desks cleaned from data storage 4157 and provide that list on a wall for the maintenance worker to verify. Desks not cleaned may be listed on the wall for checking by the supervisor or recleaning. In some embodiments, this information may be sent from data storage 4157 by internal communications (e.g. Bluetooth®, satellite, cellular) through central controller 110 to the company facility and maintenance team databases for evaluation. This information may be reviewed with the cleaning company for improvement and compliance.

In various embodiments, camera 4100 may detect an individual or object and notify a speaker of headset 4000 to adjust the volume to promote engagement and safety. In some embodiments, a user near camera 4100 may be walking and listening to music in their headset 4000, unaware of their surroundings. Camera 4100 with sensor 4124 (e.g. IR rangefinder) may detect that an individual is approaching the user, looking at the user and beginning to move their mouth to talk. The camera, using processor 4155, may recognize this action and communicate (e.g. via speakers) to the headset through central controller 110. The volume of the headset may be reduced to allow the user to converse with the individual much faster and not ask them to repeat themselves. Likewise, in some embodiments, a pedestrian near camera 4100 may be wearing a listening device (e.g. headset, speakers) and jogging on a busy road. As the pedestrian approaches an intersection, they may not hear or see cars around them which may inadvertently turn into their running path causing harm. Camera 4100 on a rotational mechanism 4102 may turn to face the area behind the pedestrian. As the pedestrian approaches an intersection, camera unit 4120 with sensor 4124 (e.g. IR rangefinder) or thermal sensor 4126 (e.g. detects a hot engine) sends a signal to processor 4155 which may determine that a car is turning into the intersection. The processor, through the central controller, may communicate with the listening device (e.g. headset, speaker) and lower the volume so the pedestrian can hear the car moving near them and stop. An auditory alert may be sent to the listening device (e.g. 'stop', 'car approaching', buzz, beep) indicating to the pedestrian that they should stop and check their surroundings. The camera lights 4142*a-b* may begin to flash bright red to alert the user of someone behind them and to stop or look around to avoid danger. The display 4146 may also provide a message (e.g. 'Stop Immediately') to alert the pedestrian. Likewise, in some embodiments, people or objects (e.g. dogs, a group of people) approaching a pedestrian from behind could cause concern and startle the individual. Camera 4102 may be facing the rear of the pedestrian. As a dog approaches the person from behind while walking, sensor 4124 (e.g. IR rangefinder) may detect the object (e.g. dog) within 20 feet of the pedestrian. This information may be collected by processor 4155 and used to alert the user that a dog is approaching from behind through display 4146 (e.g. picture of a dog), camera lights 4142*a* flash white light indicating that the dog or any object (e.g. person) is approaching from behind, projector 4176 displays an image of the dog on a nearby building wall or sidewalk in front of the pedestrian. All alerts may be used as input to the pedestrian to adjust their route or be fully aware of their surroundings for enhanced safety.

In various embodiments, camera 4100 may capture the form of an athlete during an activity and provide feedback to improve their health and promote safety of the individual. Proper form is a key element to preventing injury and improving athletic performance, but is rarely captured unless you have a coach observing and providing feedback or you have access to a mirror to observe yourself. Forward facing camera 4122 or camera unit 4120 may capture movement of the athlete during the exercise for arm movement, stride/leg extension, foot placement, posture and vertical motion. In some embodiments, during a run on a treadmill in the gym, the camera may capture the stride of the runner and placement of the foot on the ground. Processor 4155 may evaluate the elements of the run (e.g. stride, foot placement, arm movement) and compare to acceptable ranges from data storage 4157. If the stride is short, where the leg is not fully extended, the camera speaker 4110 may alert the runner to extend their stride, display 4146 may provide an image of a runner with acceptable stride length, projector 4176 may provide a video on a wall showing an example of a runner with the perfect stride after their run. This may result in fewer injuries to the runner over time. This may also allow the runner to be coached immediately for improved performance.

In various embodiments, camera 4100 may be used to help individuals monitor and control their own health conditions. An individual may be at work on a conference call discussing an important matter. As the meeting progresses, the user may get upset and begin breathing rapidly. Forward facing camera 4122, through sensor(s) 4124 may detect the expressions of the individual becoming more tense (e.g. scowling, downward positioning of lips, hands put on face) and skin color becoming more flush (e.g. red) and breathing rate increasing. Processor 4155 may use the images and data collected from the camera and sensors to determine that the individual is becoming very emotional and stressed. The speaker 4110 may provide a verbal alert (e.g. 'take a break', 'breathe', 'slow down', 'be aware of your actions') to the individual so they can adjust their expression and breathing rate and become more in control of their emotions. Display 4146 or projector 4176 may provide an image/video of their favorite location (e.g. beach) that is saved in data storage 4157 to calm them, smell generator 4180 may emit lavender as a way to calm the individual as well or camera lights 4142*a-b* may be used to turn the room a soft blue color to help reduce stress and anxiety.

In various embodiments, camera 4100 may be used to coach an individual through an emergency health situation. An individual may be at work in the cafeteria eating lunch alone. While eating, the individual swallows an almond and begins choking. Camera unit 4120 may record the individual grasping their throat, evaluating the video with processor 4155 which determines that the person is choking. The camera speaker 4110 may begin to play an emergency siren, provide a verbal alert (e.g. 'person choking', 'do the Heimlich maneuver and/or call 9-1-1') and laser pointer 4178 points to the person choking alerting others of the location. A second individual may review the camera display 4146 which may show video of how to correctly perform the Heimlich maneuver. The second individual watches the video and may dislodge the almond.

In various embodiments, camera 4100 may be used to inform users of an intruder. A group of employees are meeting in a conference room of an office building. During the meeting, an unidentified intruder may enter through the side door which is under the surveillance of camera 4100. The image of the intruder may be analyzed by processor 4155 and determined to be an individual who was recently fired from the organization based on images in data storage 4157. Camera 4100 in the conference room may provide an image of the intruder on display 4146 with a message to report the individual to security immediately. Camera light 4142*a-b* may turn bright yellow to also indicate an intruder is in the building. As the intruder's location is determined by other cameras in the building and nearing the conference room, the camera may provide additional alerts. Speaker 4110 may provide a buzz and message to lock the conference door immediately and call security, camera 4100 using rotational mechanism 4102 and rotational motor 4104 may turn to face the door so that emergency personnel can observe anyone entering or exiting. If the intruder enters the conference room, the camera lights 4142*a-b* and laser pointer 4178 may be turned on to the highest intensity to impair the vision of the intruder. The speaker 4110 may also play loud sounds (e.g. rock music or high decibel beeps) to distract the intruder. These are deterrents that may distract the intruder temporarily allowing the workers to more quickly overtake the intruder or safely exit the room.

In various embodiments, camera 4100 may be used to inform users of an emergency and identify the safest exit. A group of students may be in a classroom on the third floor of a Chemistry building. During an experiment on the second floor in a chemistry laboratory, a fire breaks out. Camera 4100 in the laboratory with thermal sensor 4126 detects the fire and sends the information to processor 4155 and the central controller 110. Camera 4100 and processor 4155 in the third floor classroom receives the information from the central controller 110. The classroom camera 4100 may begin to provide an emergency alert to exit the building from speaker 4110 (e.g. 'fire—exit immediately'), camera lights 4142*a-b* or laser pointer 4178 may illuminate the exit that should be taken, and display 4146 may provide a map and message of the exit route based on the location of the fire (e.g. 'exit right, take first staircase to exit'). As the students exit, each camera 4100 along the exit route may provide a message and image of the path or an alert with updates or confirmation of exit path. The message camera 4100 with rotational motor 4104 may scan the classroom to collect images of students, if any, and send them to the central controller. Emergency personnel monitoring the fire may be alerted on devices that (e.g. radios, displays) no students are in the classroom. In some embodiments, one or more cameras 4100 or central controller 110 may display safety information on a wall using projector 4176.

In various embodiments, camera 4100 may be used to provide sensory information to a cook in a kitchen. A teenager may be interested in learning to cook and modify recipes, and approaches kitchen 8719*a* to begin preparing food (e.g. guacamole). The camera may collect images of the avocado, cilantro and lime juice and processor 4155 may determine that the teenager is attempting to make guacamole. Display 4146 may show a guacamole recipe on the screen for the cook to follow, or projector 4176 may project the recipe on a wall of kitchen 8719*a*. During the mixing of the ingredients, the teenager may not be sure what the cumin spice is or if they may like it. The teenager shows the cumin jar to camera 4100 and smell generator 4180 may emit the smell of cumin for the teenager. This gives the cook an idea if they want to use the spice or limit the amount before adding to the mixture. Likewise, display 4146 may also provide a tutorial video on how to safely cut and remove an avocado pit.

In various embodiments, camera 4100 may be used to inventory items in advance of an activity. A surgeon may be preparing to perform a complex orthopedic surgery needing various instruments, implants and monitoring devices. The surgeon may provide a list of required surgery items to the camera data storage 4157 for later comparison. Prior to the patient entering the surgery room, the camera pans the room using rotational mechanism 4102 and rotational motor 4104 and records each item (e.g. sterilization tray with all trail sizes of implants, retractor, drills, drill guide, cutting saw, blood pressure cup). The processor 4155 compares the recorded items with the items in the data storage. The processor may determine that the sterilization tray is missing the large size of the trial implant. The camera may communicate to the controller and alert the surgery tech to place the missing trial implant in the tray. The camera display 4146 may provide the name and image of the missing trial implant, projector 4176 may show an image of the missing implant on the wall, and camera lights 4142*a-b* may show as solid red to indicate a missing item. The inventory capabilities and alerts provide advance warning to the medical staff prior to the start of a surgery saving time and reducing risk to the patient.

Many public health issues require collecting fine-grained, disaggregated data about individuals' health and their social contacts. Obtaining high levels of resolution both spatially and temporally, while respecting the privacy of individuals whose data is being collected, is a difficult challenge. The devices according to various embodiments could detect individual level health data, could anonymize and share that data with public authorities, healthcare workers and researchers, and could enable social contact tracing for communicable diseases.

Devices could contain many sensors that could be used to aid in the detection of disease symptoms for the device owner and symptoms in others, such as thermal cameras, forward facing RGB cameras and other sensors. For communicable diseases such as SARs-2 Covid 19, an AI module could be trained that could detect common symptoms such as coughing, elevated temperature, and muscle rigors (shaking from chills) using forward facing thermal cameras or RGB cameras in the device. The central controller could compare an individual's temperature with baseline readings and prompt the individual with an alert if they had an elevated temperature. An AI module could be trained to detect whether the device owner was sick, detecting for example sneezing, coughing or muscle rigors from accelerometer data or through an inward-facing camera in the microphone arm of a headset. The central controller could then prompt the device owner through an alert that the device owner was likely to be sick.

Devices could also aid in detecting whether others around the device owner were likely to be sick and aid in contact tracing. The device, for example, could record when others sneeze, cough, or display visual indications of a disease. The device could also record the identity of others in the vicinity through for example facial imagery, through Bluetooth® proximity data or through a token protocol. The device could communicate with other devices and/or the central controller to share both the symptoms and the identity of individuals who had been likely to be exposed. The central controller 110 could prompt the owners of devices that they had been in the vicinity of individuals displaying symptoms and suggest they engage in self-quarantine and also prompt public health officials with an alert to test the individuals who had potentially been exposed. Health and social contact data shared with the central controller could be made available to public health officials, medical personnel or researchers via an API.

By logging into the device or otherwise authenticating the identity of the wearer, the headset could enable public health authorities to detect whether individuals were observing a quarantine. Using a location geofence around the wearer's place of residence, the central controller could detect whether an individual had left their home and broken the quarantine. Likewise, the central controller could detect whether individuals had visited a quarantined individual.

Recreational

Comprehensive exercise data is increasingly important to athletes, both novice and professional. The data is used to improve endurance, form and to reduce injuries. Many devices (e.g. Smart Watch) currently collect data for observation during the activity and analysis after the exercise, but provide limited immediate feedback to improve the athlete. The camera with sensors to collect oxygen levels, blood flow, accelerometer and temperature can be useful as added elements of the user's overall activity fitness level. In addition, the use of the camera on the headset is used to gather visual data for immediate/post analysis of the exercise for feedback to the athlete.

Real-time monitoring and feedback of athletic performance to athletes. A runner, biker, weightlifter, basketball player, soccer player or athlete of any type may have varying degrees of performance at various times, but not enough comprehensive data to make the needed adjustments. These can be the time of day, type of exercise, length of exercise or physical condition of the athlete. The camera, with sensors, could collect the following information, process via the headset controller and feedback provided to the athlete during the exercise activity.

Various embodiments facilitate monitoring oxygen levels. Measuring oxygen levels is important feedback to provide the athlete as a reminder to intake more air and breath. The camera oxygen sensor monitors the oxygen levels in the body. If the oxygen level is low, the results are transmitted to the athlete for action.

Various embodiments facilitate monitoring heart rate. The heart rate is something done in devices today, but analysis of the data and feedback to the athlete is minimal. The camera could detect the heart rate and transmit to the central controller for AI analysis. If the heart rate level is too low or high, the results are transmitted to the athlete with a reminder to slow the heart rate or increase the pace to increase the heart rate if that is the goal of the athlete.

Various embodiments facilitate monitoring acceleration, such as by using an accelerometer. Measuring acceleration for runners, walkers, bikers or other activities with forward motion may help with improving performance. Many devices measure average speed over a distance, but few provide real time information of acceleration during the exercise activity. The camera with an accelerometer measures the athlete's acceleration over a terrain. If a runner is accelerating over a flat terrain and suddenly begins to run up a steep incline, the camera with an accelerometer could notice this change and coach the running through the incline or reduce the amount of feedback since the runner may begin to slow and decrease their acceleration. The results are transmitted to the athlete with information indicating that the acceleration is consistent with the athlete's desired goal or to increase their acceleration or to adjust their gait to increase/decrease acceleration based on the images collected and evaluated.

Various embodiments facilitate monitoring temperature. Athlete temperature is a serious concern for many athletes, especially in locations with high temperature/humidity or cold/dry climates. The camera enabled with a temperature sensor measures the body/skin temperature of the athlete, transmits this to the headset controller which is sent to the central controller for AI analysis. If the temperature of the athlete is too low, the results are transmitted to the athlete with a reminder to dress warmer or indications of other issues, like dehydration. If the results indicate the body temperature is too high, the reminder to the athlete from the central controller may be to remove clothing, slow/stop the exercise, drink more fluids, get to shade or assist in contacting emergency personnel.

In various embodiments, athletic form is captured and evaluated by using a forward facing camera. Proper form may help in preventing injury and improving athletic performance, but is rarely captured unless you have a coach observing and providing feedback or you have access to a mirror to observe yourself. The forward facing camera could capture movement of the athlete during the exercise for arm movement, stride/leg extension, foot placement, posture and vertical motion. For example, during a run, the camera could capture the stride of the runner and placement of the foot on the ground. If the stride is too long and the leg fully extended, this could cause injury to the knee. For some runners, a shorter stride, where the leg is not fully extended and the stride length reduced, could result in fewer injuries. This information could be collected by the headset controller via the forward facing camera, transmitted to the central controller and feedback provided to the runner, realtime or after the fact. This allows the runner to be coached immediately for improved performance.

Another example is for weightlifters or powerlifters, for whom incorrect form could cause serious injuries. If someone is performing a deadlift with a rounded back, incorrect hand placement on the weight when bent over, or incorrect stance, the forward facing camera could provide feedback to the user for technique or form, and movement of the athlete during the exercise. This allows the lifter to be coached immediately for improved performance with feedback to, for example, pull your shoulders back, place your feet shoulder width apart, or place your hands closer together on the barbell. In some embodiments, reference points can be placed on various body parts, joints, or the barbell, enabling camera 4100 to capture data for analysis of form and technique, allowing the athlete and/or their coach to identify flaws and improve technique. Another example could be for use in yoga. As these moves can be complex, the headset with camera could monitor the move and provide feedback if the yoga position were incorrect. This could result in improved performance and less injury.

Various embodiments facilitate rehabilitation. For example, if the physical therapist provides a list of stretching exercises in the form of a piece of paper with written instructions, the execution of those at home and on your own is not continually observed by the therapist for immediate correction. With the forward facing camera, the therapy movements could be captured by the camera transmitted to central controller 110 for AI analysis and immediate corrective feedback or encouragement sent to the individual. This could accelerate the therapeutic impacts and reduce healing time as well as provide confirmation to the therapist that the patient performed the exercises correctly.

Various embodiments include a flashing/glowing camera for bystander alert or for use as a turn indicator. Many people are using the same space to exercise (run, bike, walk, etc.), walk with pets, ride motorized vehicles (e-bikes, scooters) at various speeds and response patterns. This could increase the rate of accidents between these various people and activities. The camera could be enabled with a flashing light/glowing symbol to indicate to those in front of you and behind you of your intention and movement direction. If someone is approaching you from behind and you decide to change positions, the camera with enabled light could display your intentions of moving to the left or right. Alerting someone behind could make them aware and allow them time to adjust before a collision occurs.

Various embodiments include a path light headset for exercise activity. People that exercise at the end of the day or evening are oftentimes met with changing conditions from dusk to full darkness. The light camera could activate the light when the outside conditions turn dark or cloudy, thus increasing visibility. If the camera senses that visibility is reduced, the lights on the headset could turn on automatically providing visibility to the individual.

The 360 degree camera on the headset could be enabled to provide continual feedback to users. For example, if a runner is on a path and decides to move to the left. The 360 degree camera could see a biker or car coming up quickly behind them and inform them to not move to the left, avoiding a collision.

The 360 degree camera could detect images that a person may not see because they are not focused in a particular direction. For example, while biking with the family, the camera may see a stray dog running toward them several meters ahead. The users with the camera could be alerted and inform their family to turn in a different direction. Another example is obstacle detecting while exercising. Running outside has environmental considerations such as potholes, mud puddles and tree branches. Oftentimes athletes only observe what is a few feet away from them and must make quick decisions impacting form. The camera could detect these obstacles much sooner and alert the user to look ahead and make needed adjustments to their route.

Various embodiments facilitate range finding, such as with rangefinders. In various embodiments, a forward facing camera can provide the user with the distance to an identified point. For example, a runner wants to know how far down the path until they run 0.5 miles. The user could speak into the microphone of the headset and make a request (e.g.

'show location in 0.5 miles'), the camera could be engaged and headset respond from the central controller AI system with the landmark in front of the user (e.g., 'to the red brick house on the right' or show on the enabled screen).

The collection of the sensor/video/image data from the camera could also be stored locally during the exercise and analysis/feedback not performed real time. The user connects the camera to the computer (or via a Wi-Fi® connection). The peripheral device driver 9330 transmits the data to the central controller 110 for AI analysis and feedback is provided to the individual for the activity completed. The feedback could be in the form of audio coaching, video coaching showing your activity overtime using the camera, or text of results and improvement opportunities post the activity.

In some embodiments, camera 4100 may be used to collect physical and biometric data on an athletic user to provide more complete and instantaneous feedback without the need to wear restrictive equipment. The user may decide to run on a publicly maintained jogging trail through a park. A number of cameras 4100 may be placed along the path allowing for constant monitoring of individuals, objects (e.g. rocks, broken branches, broken glass), animals (e.g. large dogs, coyotes, snakes), infrastructure issues (e.g. cracks, tree roots, sinkholes), environmental hazards (e.g. lighting, smoke, fire) along the entire path. As the activity begins, a first camera 4100 may capture the runner's image with camera unit 4120 and transmit the information to central controller 110. This information is evaluated with a processor using information in data storage (e.g. a user database table 700) to determine the runner's personal information (e.g. name, weight, previous running paces, typical body temperature). At the start of the run, the camera's thermal sensor 4126 may detect the starting body temperature being normal at 98.7 degrees and display 4146 or speaker 4110 may provide a message (e.g. 'hello Mary, enjoy your run today'). As the user runs along the path, the subsequent cameras 4100 provide ongoing progress and coaching to the runner. Camera 4100 at position 3 along the path (e.g. a position 0.5 miles from the start or the path) using sensor 4124 (e.g. IR range finder) may detect the runner approaching and provide an announcement from speaker 4110 (e.g. 'keep up your pace, you're only 100 yards from the next checkpoint'), thermal sensor 4126 may detect a significant increase in the user's body temperature (e.g. from 98.7 to 100.5 degrees Fahrenheit) and camera lights 4142*a-b* turn blue to remind the runner to drink water or get in the shade.

In some embodiments, the difference between time and distance between each camera may be used to calculate the pace of the runner and display it on the path with projector 4176 for easy viewing (e.g. total distance 0.75 miles—pace 9:08 min/mile). Speaker 4110 may provide positive messages to the user (e.g. 'I see you working harder, keep it up'). If the runner desires to maintain a certain pace, the processor may determine how much faster or slower the runner must run to the next camera and provide a message from speaker 4110 (e.g. 'run 15 seconds faster to the next camera with an increase of 15 steps per minute') as the runner approaches. The cameras may also detect changes in running form along the path. The camera(s) 4100 may record the running form at each point along the path and send it to the controller for evaluation by processor(s). During the run, a processor may determine that the runner has started to modify their foot strike from the toe to the heel, causing a much harder landing and potentially increasing the risk of injury. At the next interval, the camera display 4146 may alert the user to pay attention to the foot strike (e.g. 78% of steps on heel, modify to toe). Similarly, if the image of the head position at the start is looking forward but shifts to looking downward, camera display 4146 may alert the runner to raise their head and look forward. As the runner exercises during the evening or early morning, sensor 4142 (e.g. light sensor) may detect that visibility on the path has diminished. Lights 4142*a-b* may activate, illuminating the path, and provide increased visibility for the runner. Such monitoring of an exercise and alerting the user along a path without having to wear or carry a device provides for enhanced ease and more continual coaching without the need for another person.

Coaching and Training

A camera could capture video and images of a person to assist them in improving a skill, activity or expression. The central controller may determine behaviors associated with types of expressions and coach people to mimic others as well.

In one or more examples, a person who has been on many video conference calls in the past and routinely has their eyes closed for thinking and their arms crossed for comfort could be collected and catalogued by the central controller. Others join the call and notice the expressions and body language of the person. They immediately think the person is uninterested and has something to hide based on their body language. The central controller could alert the user of the possible interpretations by others and provide tips and coaching advice to improve.

Avatar could display an interpretation of the image you are projecting. In a more subtle approach and to bring levity to a situation, an avatar could be displayed on a video call that matches the interpretation of the user's expressions and gestures. For example, through the use of a camera, if a user is disgruntled with a decision and continually shakes their head, frowns and furrows their brow, a disgruntled avatar could replace the actual image of the person. This could give a subtle indication to the user of the image being portrayed. In some cases, this could bring levity to the situation and cause the person to be more aware of their expressions and body language. The camera and Central Controller could also provide tips for improving their expressions during times of fear, irritation and frustration.

Various embodiments facilitate fitness coaching. Athletic form captured and evaluated by using a forward facing camera. Proper form may be important for preventing injury and improving athletic performance, but is rarely captured unless you have a coach observing and providing feedback or you have access to a mirror to observe yourself. The forward facing camera could capture movement of the athlete during the exercise for arm movement, stride/leg extension, foot placement, posture and vertical motion. For example, during a run, the camera could capture the stride of the runner and placement of the foot on the ground. If the stride is too long and the leg fully extended, this could cause injury to the knee. Whereas, a shorter stride, where the leg is not fully extended and the stride length reduced could result in lesser injuries. This information could be collected by the headset controller via the forward facing camera, transmitted to the central controller and feedback provided to the runner, realtime or after the fact. This allows the runner to be coached immediately for improved performance.

Various embodiments facilitate providing dance lessons. Oftentimes people consider themselves not capable of participating in an activity since they are not trained or skilled enough. With a camera, the central controller AI system could observe the dance moves of the user and their partner. The analysis of the dance could provide them with steps to improve their skill in the safety and comfort of their home.

Various embodiments facilitate providing cooking lessons. Cooking is considered a skill by many and requires not only following a recipe but also observing the texture and doneness of the dish. A user may wish to prepare a complex meal with many ingredients and steps. The camera could observe each step of the preparation and provide guidance in preparing the meal and any corrective steps (missing ingredient, not mixed well, undercooked (e.g. a cake)).

Corporations spend a lot of money on training programs each year with no real way to measure the use of the material after the course. The camera would record the training content that the user took and compare the usage after the sessions. For example, a new method of coaching to higher performance is rolled out with scenario based exercises. After the course, all management is told to use the new skills. During the next one-on-one, the camera could observe if the skills learned were being used and used according to the training provided. If the system sees there is opportunity for improvement, the user could be informed that they did not follow the steps and how to improve. If the new techniques were followed well, the system could record for demonstration later to others and as encouragement to the user. This use could allow companies to see a greater and faster return on the training investment.

Various embodiments facilitate coaching on hygiene or unusual behavior.

There are times when people do not know how to adequately respond to situations so they are interpreted in a proper way for the social setting. Sometimes the expressions and reactions are natural for the person, but unnatural for those observing them, creating an uncomfortable situation. The camera and knowledge collected by the central controller AI system could respond to the user as an appropriate response.

In one or more examples, a person is going to be presented with an award at a town hall meeting. They don't typically like the 'spotlight' and get very nervous. The user could inquire to the central controller to provide videos/images of people receiving similar awards that are considered to be similar in their response types. This provides the user with tips and images so they can rehearse their acceptance.

In one or more examples, a user is going to a formal cocktail event with colleagues. They do not like small talk and routinely sit against the wall. The camera could track their movements and monitor their responses to these short engagements. If the Central Controller detects responses (e.g. sitting against the wall, not making eye contact, not asking follow-up questions . . . ) that are not appropriate for the social setting, the user could be provided with guidance to improve. As they improve, the virtual coach could provide encouragement and reinforcement to their new approaches.

Power and Heat Management

In various embodiments, a camera and integrated sensors may require power management as well as the ability to control heat dissipation for optimal functioning. The following are examples of how power could be used and managed by the device.

Power Management

A camera and/or sensors may be solar powered. The camera and sensors could be equipped with solar sensors, collectors, panels, or the like. The energy collected from light sources could be used to power the camera and any sensor.

A camera and/or sensors may be battery powered. Each camera and sensor could be powered by one or multiple individual batteries.

A camera and/or sensors may receive direct power. The camera and sensor could be powered by a direct connection to a power source.

A camera and/or sensors may be powered via USB. The camera power could be obtained from any device with USB connection. For example, if a user wants to connect his camera to a USB device (e.g. car stereo, laptop . . . ), it can receive power from this source.

A camera and/or sensors may be powered with kinetic energy. When the camera is used and moved, the accelerometer could generate and store power for use by the camera or any sensor.

A camera and/or sensors may be powered by wind energy. As cameras will be used more for outdoor recreational purposes, the cameras could be equipped with wind collection devices. This source allows wind to generate the power for the camera and sensors. This turbine type device could also be the same fan that cools the camera/sensors.

Heat Management

In various embodiments, a camera may be equipped with an internal fan for cooling. Once the temperature is detected to be above a certain level, the fan is initiated to cool the device.

In various embodiments, a camera may cool through air circulation or movement. The camera may include options to open 'doors' on the camera device while being used indoors (or where weather is not a factor) that allows for air flow to cool the device.

In various embodiments, a camera may cool via a cooling liquid. A liquid (e.g., a supercooled liquid) could be used to surround the camera that absorbs the heat.

In various embodiments, a camera may offload computing power. If the camera is connected to another computing device (e.g. laptop, phone), the camera may offload computing power needed by the camera to these devices. This could result in less heat being generated by the camera.

For both power and heat management, the camera should have a priority of function determined by the device itself or through the preferences established by the user. If power is reduced to a suboptimal level or heat is in excess of desired temperatures, the functions should be switched off to preserve the overall functioning of the device. For example, if the camera is running low on power with all sensors enabled, the sensors could shut down while still maintaining the ability of the device to collect video images. In addition, the number of frames captured could be reduced over time as well. The same applies to heat management. Those devices generating the most heat could be switched to off or lesser functionality until the temperature returns to a normal level.

Preferences and Customization

Users are accustomed to setting their own preferences and customizing behaviors of devices. The camera could allow a user to customize features and functions based on their needs and desires.

In various embodiments, a user may establish settings. Users could identify those objects, places, backgrounds and people that should not be recorded. For example, in one embodiment, the user may elect to not have expensive artwork displayed in a video. The user could save the image in the preferences and when the camera detects the image, it is blurred or removed from the scene. In another embodiment, users could decide to not have their children photographed or videoed. The children's image could be stored in preferences and not included in any scene being collected by the camera.

Users could set avatars, overlay features on their image and any adjustments to their background based on their emotions. For example, the user could preselect the smile type or disgruntled face they would like to use when the camera determines these emotions. This would be displayed on the avatar for all to see.

Users could establish a list of preferred people who can receive their images or control their camera. Users could have a list of 'favorites' that are only allowed to control their camera or see their images/videos.

Users could block users from access to their images/video. A user could dynamically or in advance determine if a person or group of people should be blocked from seeing their images or video. For privacy purposes, an executive could block everyone from seeing their image except for their direct reports.

Users could set preference of sensors and functions based on power and heat management levels. In this embodiment, the user could select the order of sensors with the highest priority in cases where power should be managed. If power runs low, the sensor or function with the lowest priority could be disabled.

Users could set background light and producer effects based on their preferences. Users could indicate the lighting they prefer and not allow the camera to override the settings.

One or more embodiments could be controlled by preferences/customizations.

Users could establish levels of training and coaching based goals set. In this embodiment, a user could elect to only have coaching tips provided in summary at the end of a one-on-one session with an employee based on what the camera and Central Controller determine and not dynamic feedback. In other cases, a runner, for example, may want more immediate feedback based on the settings to coach them during a long run.

Users could set unique behavior and mannerisms so it is not considered in emotional management or display. In this embodiment, a user may have facial mannerisms that are not controllable (ticks, twitches in muscles, stroke patients) and inform the camera and Central Controller not to use them in the feedback.

Users could pre-establish channels for communication with others. A user could preselect people and channels for communication so that they can easily and quickly access during a call or game.

Users could select a language and currency of choice.

Analytics

Analytics may be useful in recognizing patterns and making needed adjustments for efficiency and performance improvement. The central controller could collect all data related to camera communications and functions so that statistics and insights could be sent back to individuals and teams using peripheral devices. The collected data could also be used to train Artificial Intelligence (AI) modules related to individual and team performance, meeting materials and content, meeting processes, business and social calls, in-game communications, athletic performance, and the like. Insights from these data could be made available to interested parties through a dashboard, through ad hoc reports or dynamic feedback. An AI module may be trained utilizing camera data to identify individual performance in leading and facilitating meetings, creating and delivering presentations, contributing to meetings, managing calls, athletic achievement, social achievement, and achieving success in a game. Additionally, an AI module may be trained to optimize meeting size, meeting effectiveness, and meeting communications. An AI module may be trained to identify meetings that are expensive, require large amounts of travel, or result in few assets generated.

Analytics regarding the performance of users on a call could also be provided to appropriate personnel at a company. Performance regarding call data could include speaking time, quality ratings from other participants, engagement levels of the user, etc. Input data from the camera could include video/image data, biometric inputs, user location, physical movements, direction of gaze, tagging data, etc. This data could be used with the AI module to provide an overall score to the user regarding their performance compared to others.

Analytics regarding user interaction in meetings could be collected by the camera. The body language, biometrics and movements of meeting participants could be collected and sent to the AI module. The module could analyze the data to determine the overall sentiment of the meeting, people or content being delivered. For example, if during a meeting 50% of the people are not looking at the slides and many others have their eyes closed, the AI module could inform the user via the Presentation Controller or other peripheral that the audience appears disinterested. The presenter could adjust the delivery style or move through the agenda more rapidly.

Analytics could be captured from the camera for athletic performance analysis. In the case of running, weight lighting, yoga, or physical therapy, the camera could collect data and send it to the AI Module related to the form, pace, body movement, and exertion levels through facial expressions. The data collected could be compared to others of similar structure and reports sent or real time coaching for improved performance.

Gaming analytics could be captured using the camera by monitoring the hand, feet, body and biometric data for analysis by the AI module and feedback to the user. Users that perform at a high level are compared to those of a lesser skill level and feedback on improved hand placement, body movements and breathing patterns are used for feedback to players.

Analytics related to the emotions of users could be collected by the camera. This ongoing monitoring could be used by the AI module to inform the user how they are being interpreted or reaction to their message.

Predictive analytics could also be used to help user's avoid making mistakes or controlling facial expressions. For example, if a user's camera indicates that the user may be agitated while on a call and is frequently rolling their eyes or making other negative expressions, the processor of the camera may put the privacy screen on until his facial reactions return to a more controlled and normal state. Instead of automatically enabling the privacy screen, the user might be given a verbal warning by a device (e.g. headset, controller) or a display warning visible only to the user.

The user camera could also make predictions, either via the processor of the camera or in conjunction with the central controller, predicting when people are not at their best by reviewing camera, microphone, accelerometer, and other sensor data. Predictions by the headset could include whether or not the user is in good health, is tired, is drunk, or whether he might need a boost of caffeine.

The user camera could collect analytics about the development of a child, collecting movements and expressions to gauge the overall health and growth progress. This could be used by the AI module to compare to children of similar age.

Some examples of data that could be used as a training set for these and other AI modules include safety data, such as cleanliness of room and objects, high touched objects, compliance to cleaning procedures, visual surroundings and potential hazards.

Examples of data further include body language and gestures, including movements and eye placement on screens and objects.

Examples of data further include power and heat management, such as the power consumption by device and sensor, heat generated by sensor, and overall usage.

Examples of data further include other connected peripheral devices, such as other cameras, lights, controllers, games, chairs, laptops/pc, mouse, etc.

Examples of data further include emotional data, such as data gathered from biometric sensors. Such data may include brain waves, facial expressions, hormone levels, etc.

Distance Estimation

In various embodiments, it may be desirable to estimate the distance from a camera to an object. Distance estimation may be performed in various ways. In some embodiments, light (e.g., pulsed laser light) is aimed at the object, and reflected light is subsequently detected. The time of flight (e.g., the time for the light to reach the object and be reflected back) is then used to calculate the distance to the object (e.g., distance is determined as the time of flight multiplied by the speed of light and divided by two). A similar procedure may be used with sound waves, e.g., now using the speed of sound in the calculation of distance.

In various embodiments, distance to an object is measured based on the appearance of the object's size (e.g., in an image) as compared to a known or reference size. For example, if an object is known to be 10 inches wide, and would span X pixels (e.g., 500 pixels) when situated at a first distance (e.g., 3 feet), and the object is found to span Y pixels (e.g., 250 pixels) in an image, then the object may be assumed to be at a distance of X/Y times the first distance (e.g., at 500/250×3 feet, or 6 feet).

In various embodiments, distance to an object is measured using one or more reference distances (e.g., for known objects, landmarks, etc.). For example, if a camera is located at the opposite end of a room from an object, and the room is known to be 20 feet long, then the distance to the object can be estimated at 20 feet.

In various embodiments, a distance to an object is measured using triangulation. For example, each of two cameras, situated a known distance from one another, seek to determine distances from each of the respective cameras to the object. Geometrically, the two cameras and the object together form a triangle (assuming all three are not lined up). Each of the two cameras proceed to detect the object in their respective fields of view. Each camera may determine an angle to the object relative to a fixed reference line (e.g., relative to the reference line that would connect the two cameras). With the two angles determined, and with the distance between cameras known, the distances can be determined from each of the respective cameras to the object (e.g., using the formula that angles of a triangle sum to 180 degrees, and using the law of sines which says that the ratio of the length of the side of a given triangle to the sine of the opposite angle is the same for all sides of the given triangle).

In various embodiments, distance to an object is measured by focusing a camera at different distances, and determining the distance that best brings the object into focus.

In various embodiments, a beacon or other signal is detected from the object or from a location proximate to the object. For example, a user holds a cell phone near the object and designates the object as an object of interest. The distance to the object may then be estimated by measuring the strength of the received signal, by measuring the time of flight of the signal from the object to the camera, or in any other fashion.

In various embodiments, distance to an object is determined using parallax. For example, the camera may translate itself and watch for the apparent motion of the object. The closer the object is, the more it will appear to move within the camera's field of view.

As will be appreciated, any suitable method for distance estimation may be used and is contemplated according to various embodiments.

Spotlight Targeting

In various embodiments, it may be desirable to spotlight, illuminate, highlight (e.g., with a laser pointer) or otherwise draw attention to an object and/or to a location (e.g., on a floor, on a shelf, etc.). For example, the central control 110 may spotlight an object in order to inform a user that there is a task associated with the object.

In various embodiments, a camera detects an object or location in its field of view. The camera 4100, the central controller 110, or some other device may determine that the object should be spotlighted.

In various embodiments, the camera may have an integrated laser pointer or spotlight that, e.g., is aligned with the camera's field of view. In such cases, the camera may maneuver itself (e.g., turn itself, steer itself, translate itself, etc.) so as to bring the object into the center of its field of view (or to some other suitable or predetermined position within its field of view). Then, the spotlight or laser pointer will be pointing towards the object, and the camera can activate the spotlight or laser pointer in order to spotlight the object.

In various embodiments, a camera may be integrated with a laser, spotlight, etc., but the two may be independently steerable. In this case, the camera may detect an object within its field of view, but need not necessarily point directly at the object. Rather, the camera may determine an angle (or angles) of the object with respect to some reference line (e.g., with respect to the center of an image). Determination of the angle may, in some cases, require determination of the distance to the object (e.g., as described above). The camera may then direct the laser or spotlight to steer to the determined angle (or angles) and, at which point the laser and/or spotlight may be activated to illuminate the target.

In various embodiments, a camera may be separate and/or distinct from a spotlight, laser, or the like. The camera may be located in a first location, while the laser or spotlight is located in a second location. In this case, various embodiments seek to determine the angle at which the laser or spotlight should be directed. In various embodiments, this angle may be determined via triangulation.

In various embodiments, the distance from the camera to the laser/spotlight may be assumed to be known. If not, such distance may be determined as described above, where now the laser is the "object" (or the camera is the "object"). The camera may then proceed to determine a distance to the object (e.g., as described above). The camera may then proceed to determine an angle to the object relative to a fixed reference line (e.g., relative to the reference line that would connect the camera and laser/spotlight).

Now amongst the camera, laser, and object, there exists a "SAS" triangle (i.e., a triangle where the length of two sides is known, and the intervening angle is known). The remaining features of the triangle can then be determined using known techniques (e.g., using the law of cosines, the law of sines, and the formula that angles of a triangle add up to 180 degrees). In particular, the angle of the laser/spotlight can be determined. The laser/spotlight may then be steered to the appropriate angle, and then activated to illuminate the target.

In various embodiments, a laser, spotlight, or the like may be directed at an object using a trial and error approach, iterative approach, or the like. In various embodiments, a laser may be steered in a plurality of directions, and the laser may illuminate whatever it is pointing at. Meanwhile, a camera may monitor a desired object and determine whether a laser dot, spotlight, or other illumination appears on the object. If such a dot is detected, then the direction in which the laser was then steered may be maintained. This direction may also be stored for later reference, e.g., so the laser can subsequently illuminate the object without further trial and error.

In various embodiments, as a laser illuminates in one or more directions, the camera monitors an entire scene. The camera may determine a trajectory of the laser dot with respect to an object (e.g., is the laser dot getting closer or further from the object). The camera may then direct the laser to steer in a particular direction that will bring the laser dot closer to the object.

Object Information

Referring to FIG. 103, a diagram of an example objects table 10300 according to some embodiments is shown. Objects may include one or more items of interest, such as in an office or household. Objects may include whiteboards, chairs, tables, projectors, laptops, computer mice, computer keyboards, books, toys, electronics, dishes, utensils, clothing, shoes, exercise equipment, furniture, food, etc. Objects may include fixtures, such as wall outlets, lights, windows, mirrors, floorboards, vents, doors, ceiling fans, faucets, etc. Objects may include parts or components of some larger object or structure (e.g., a leg of a couch, a corner of a room, a panel of a window, etc.). In various embodiments, objects may include inanimate or animate objects. In various embodiments, objects may include plants, pets, and/or people.

Objects may be associated with information, such as history, tasks, etc. For example, an office manager inspecting a projector may be informed about last time the projector was serviced. For example, a guest interacting with an object (e.g., with a painting) may be informed about the object's history (e.g., about the artist, time of purchase, etc.). In various embodiments, such as in an office setting, an employee may be assigned tasks associated with an object (e.g., to repair the object, to give the object to someone, etc.). In various embodiments, such as in a home setting, a family member (e.g., a child) may be assigned tasks associated with an object. For example, a child is assigned a task to put away a toy. In various embodiments, attributes of the object can also be used to trigger warnings about associated hazards, or to prioritize tasks related to the object. For example, if an object is heavy and is elevated (e.g., a vase on the table), the object may trigger a warning to a parent if a two-year-old child comes within the vicinity of the object.

Object identifier field 10302 may include an identifier (e.g., a unique identifier) for an object.

Instantiation field 10304 may include an indication of whether the record refers to an "actual" object (e.g., to a particular toy that exists in a home), or to a "prototype" object. A record that refers to a "prototype" object may allow a camera (or the central controller) to recognize/classify new objects that it finds in the office or home if such objects resemble the prototype object. For example, by reference to data about a prototype standing desk, the camera may be capable of recognizing a standing desk in an image it captures, even if the particular standing desk has never been registered with or otherwise indicated to the camera.

Description field 10306 may include description of an object, such as "vase", "toy car", "potted plant", etc.

Image field 10308 may include image data (e.g., jpeg files, png files, bitmap files, compressed images, image features, etc.) for one or more images of an object. In various embodiments, the camera 4100 may reference image data in field 10308 in order to identify objects in newly captured images. In various embodiments, field 10308 may include image data for the object in one or more orientations, one or more different lighting conditions (e.g., strong light, weak light, colored light, light incident from different angles, etc.), at one or more distances, in one or more configurations (e.g., a "door" object may have associated images for the open and closed positions; e.g., a "plate" may have associated images with and without food on top of it) and/or under one or more other circumstances and/or in one or more other states. In various embodiments, a given image may be annotated or otherwise have associated information describing the state or circumstance of the object as shown in the image.

Dimensions field 10310 may include dimensions of the object, such as a length, width, and height. In various embodiments, dimensions represent dimensions of a cross-section of the object (e.g., of the widest cross-section as it might appear in an image). This may make it more convenient to identify the object from an image. In various embodiments, more complicated or involved measurements may be stored, such as dimensions of different components of an object, dimensions of an object in different configurations, or any other suitable dimensions, measurements, or the like.

Weight field 10312 may include a weight (or mass) of the object. Knowing an object's weight may allow the camera 4100 and/or central controller 110 to judge hazards, assign tasks, and/or perform any other applicable functions. For example, if an object is heavy, any task requiring moving the object may be assigned only to an adult. Also, if the object is heavy, the camera may generate a warning if there is a possibility the object might fall.

Monetary value field 10314 may include a monetary value of the object (if applicable). Objects that cannot readily be sold (e.g., a wall outlet) may not have any associated monetary value.

Sentimental value field 10316 may include a sentimental value of the object. This may be designated using any suitable scale (e.g., "high/medium/low", 1-10, etc.).

A monetary or sentimental value may allow the camera 4100 and/or central controller 110 to assign tasks, prioritize tasks, determine what to keep and what to discard, and/or to perform any other applicable function. For example, if an object has a high sentimental value, the camera 4100 may broadcast an urgent warning if a puppy is about to chew the object.

Fragility field 10318 may include an indication of an object's fragility. For example, an object made of glass or porcelain may have a "high" associated fragility, whereas a book, cushion or pair of pants may have a "low" associated fragility.

Hazards field 10320 may include an indication of any potential hazards associated with an object. Hazards may include hazards to people, hazards to pets, hazards to property, and/or any other potential hazards, dangers, or inconveniences. For example, a potted plant has associated hazards of falling (e.g., falling onto a person or pet), sharding (e.g., breaking and creating sharp shards that can harm a person or pet) and staining (e.g., breaking and dispersing, mud and water).

Information about an object's fragility and/or associated hazards may allow camera 4100 and/or central controller 110 to assign tasks, prioritize tasks, generate warnings, and/or perform any other suitable function. For example, camera 4100 may prioritize tasks to put away objects that are hazardous as compared to putting away objects with no associated hazards.

Referring to FIG. 104, a diagram of an example object history table 10400 according to some embodiments is shown. Object history table 10400 may include historical events, background information, context and/or other information about objects. With reference to object history table 10400, camera 4100 and/or central controller 110 may recount (e.g., output) information about an object for the benefit of a user (e.g., a user who is viewing or handling the object). For example, a company visitor may look at an object whereupon an electronic speaker may inform the visitor that the object was the first prototype ever built of the company's product. As another example, a relative who has given an object as a gift to a child may pick up the object when they visit the child's home. The camera may then cause an output device (e.g., a projector or a television) to display a video of the child when he first opened the gift. In various embodiments, an object's history may be utilized in any other suitable fashion and/or for any other purpose.

Event identifier field 10402 may include an identifier (e.g., a unique identifier) for an event. Object identifier 10404 may include an identifier for an object that is the focus or subject of an event. In various embodiments, there may be multiple events associated with a given object, and therefore multiple rows may have the same entry for field 10404.

Event description field 10406 may include a description of an event with which an object was involved. The object may have been associated with a company milestone (e.g., a major product launched), object may have been a birthday gift, the object may have been purchased, the object may have been moved (e.g., when the owner brought the object along during a change of address), the object may have been worn during a significant occasion (e.g., the object may be a jersey worn during a championship game), the object may have been received as an award, the object may have been found (e.g., the object was found on a remote beach), or the object may have been part of any other event.

Date field 10408 may include a date and/or a time of the event. Location field 10410 may include a location of the event.

Party 1 field 10412 may include an indication of a first user, entity, or other party involved in an event. Party 1 function field 10414 may include an indication of the function or role that party 1 played in the event. Similarly, party 2 field 10416 and party 2 function field 10418 may include, respectively, an indication of a second party involved in an event and a function played by the second party in the event. In various embodiments, only one party is involved in an event. In various embodiments, no parties are involved. In various embodiments, more than two parties are involved.

In one or more examples, an event is the gifting of the object, party 1 is the gift recipient, and party 2 is the gift giver. In one or more examples, an event is the purchase of the object, party 1 is the seller, and party 2 is the buyer. In one or more examples party 1 is the wearer of an object. Various embodiments contemplate that parties may be involved in an event in any suitable fashion.

Assets field 10420 may include pictures, video, audio, and/or any other digital assets, and/or any other assets associated with the event and/or object.

In various embodiments, central controller 110 finds images, videos, and/or other media associated with the object on a social media platform (e.g., on Instagram®), on a website, online, and/or in any other location. The central control 110 may save such images, media, etc. in assets field 10420.

In various embodiments, an initial image of an object may come from social media, a website, etc. The central controller 110 may find the image, determine background information about the object (e.g., from text posted to the social media platform, e.g., from the user), and then create one or more records associated with the object (e.g., in objects table 10300, in object history database 10400).

Referring to FIG. 105, a diagram of an example task table 10500 according to some embodiments is shown. Task table 10500 may include one or more tasks, such as tasks that are associated with objects. Tasks might indicate that an object should be put away (e.g., in its customary place), that an object should be cared for (e.g., polished in the case of silver, or watered in the case of plants), that an object should be fixed and/or that any other action should be taken. In various embodiments, a task does not involve a particular object (or any object at all). In various embodiments, a task involves more than one object.

In various embodiments, a task may be signified or otherwise indicated via a tag. In various embodiments, a task is one type or instance of a tag. For example a tag associated with an office chair may indicate that the chair should be put into room TR67. For example a tag associated with a laptop may indicate that the laptop should be updated with a new version of an operating system.

Task identifier field 10502 may include an identifier (e.g., a unique identifier) for a task. Object identifier 10504 may include an identifier for an object that is the focus or subject of a task.

Assignor field 10506 may include an indication of a user who has assigned the task. This may or may not be the same user who has created the task.

Assignee field 10508 may include an indication of a user who has been assigned to perform the task.

In various embodiments, an assignee may be the central controller 110, the camera 4100, and/or any device or system according to various embodiments. For example, a task may specify that an object (e.g., a painting) be put in better lighting. The camera 4100 or central controller 110 may fulfill the task by directing lights, controlling lights, changing the color of lights, changing the brightness of lights, etc.

Target state field 10510 may include an indication of a target state for an object. A target state may represent a state of the object after the task has been completed. As such, the task itself may represent the process of bringing the object from its initial or current state to its target state. A target state may be for the object to be in a particular location (e.g., the task is to put the object in that location). A target state may be for the object to be clean (e.g., the task is to clean the object). A target state may be for the object to be watered (e.g., the object is a plant and the task is to water the plant). A target state may be for the object to have new batteries (e.g., the object is a clock and the task is to put new batteries in the clock).

In various embodiments, a target state represents a location of an object, a configuration of an object (e.g., a target state specifies that an item of clothing should be folded), a state of cleanliness of an object, a state of repair of an object, a position of an object relative to another object (e.g., a target state specifies that a book should be next to a companion book), a state of construction or assembly of an object (e.g., a target state specifies that a new bicycle should be assembled), and/or any other state of an object.

In various embodiments, a target state is specified in general, somewhat general, abstract, and/or non-specific terms. It may then be left up to the assignee to perform a task (e.g., in a discretionary way) which leaves the object in the target state. For example, a target state for a vase should be "not dangerous". It may then be left to the assignee to decide where to put the vase, so long as the vase is not dangerous wherever or however it ends up. For example, the task may be adequately completed by putting the vase on any of four available shelves that are out of reach of a 2-year old child. Or the task may be adequately completed by putting the vase on its side on the ground.

In various embodiments, a target state is specified in relative terms, such as in relation to an initial or current state. In one or more examples, a target state specifies that an object should be in a "better", "improved", "cleaner", "less dangerous", and/or "better working" state, or in any other relative state. It may then be left to the assignee to decide what to do with the object to reach a state that satisfies the specified target state. In various embodiments, a target state is specified as an optimized condition or state. For example, a crystal chandelier should look as clean as possible, or as shiny as possible.

In various embodiments, a target state is conditional on one or more circumstances. For example, by default, a target state may be for a vase to be located on a coffee table, where it may be most visible. However, in the event that a toddler is present, the target state for the vase may be to be located on an upper shelf where it is out of reach of the toddler.

In various embodiments, a task may be specified in terms of a process or action rather than in terms of a final state of an object. In various embodiments, a task may be specified in any suitable fashion.

Assignee date field 10512 may include an indication of a date and/or time the task was assigned. Deadline field 10514 may include an indication of a date and/or time the task is due to be completed.

Notification method field 10516 may include an indication of a method by which the assignee of a task should be notified about the task. Notification methods may include flashing a laser pointer on the object (e.g., the object indicated in field 10504), shining a spotlight on the object, circling the object with a laser pointer, and/or any other highlighting of the object. These methods may catch the assignee's attention. They may also indicate to the assignee what object he will be dealing with when performing the task.

Notification methods may include an audio broadcast. In various embodiments, the central controller 110 and/or camera 4100 may cause an audible message to be output (e.g., via a speaker associated with the camera or via a standalone speaker). The message may describe the task to be performed (e.g., "dust the bookshelf"). In various embodiments, a statement of the task is projected on the wall.

Reward field 10516 may include an indication of a reward to be provided upon completion of the task (e.g., to the assignee of field 10508). A reward may take the form of cash, sweets, permission to play video games for a certain period of time (e.g., as granted to a child), and/or an award may take any other form.

Priority field 10518 may include an indication of a priority of a task. The priority may be indicated using any suitable scale (e.g., "high/medium/low", 1-10, etc.). In various embodiments, the central controller 110 or camera 4100 may inform assignees of tasks based on the tasks' priorities. For example, if there are two tasks assigned to an assignee, central controller 110 may inform the assignee of the higher priority task first.

Completion date field 10520 may include an indication of a date and/or time when a task was completed. A task that is still open may be listed as "Pending" or the like, and a task that was not completed by the deadline (field 10514) may be listed as "Not completed" or the like.

Coaching/Instructions field 10524 may include an indication of instructions or coaching on how to perform the task. In various embodiments, the camera 4100 and/or the central controller 110 may output such instructions to the assignee of the task. For example, if a task is to water plants, instructions may specify, "pour just one cup of water". Instructions may be output in any suitable fashion, such as via audio, display screen, projection, message to the assignee's mobile device, etc. In various embodiments, the camera 4100 and/or the central controller 110 may output instructions to an assignee step by step as needed (e.g., as performed) by the assignee.

In various embodiments, coaching/instructions may include spotlighting or highlighting (e.g., with a laser pointer or spotlight) an object or location that is pertinent to the task at hand. In one or more examples, camera 4100 causes a laser pointer to spotlight a drawer where batteries can be found (e.g., when the task is to replace the batteries in the remote control). In one or more examples, camera 4100 causes a laser pointer to trace out a path (e.g., on the floor) that an assignee should follow to reach the location where he can put away an object.

Figure 106:
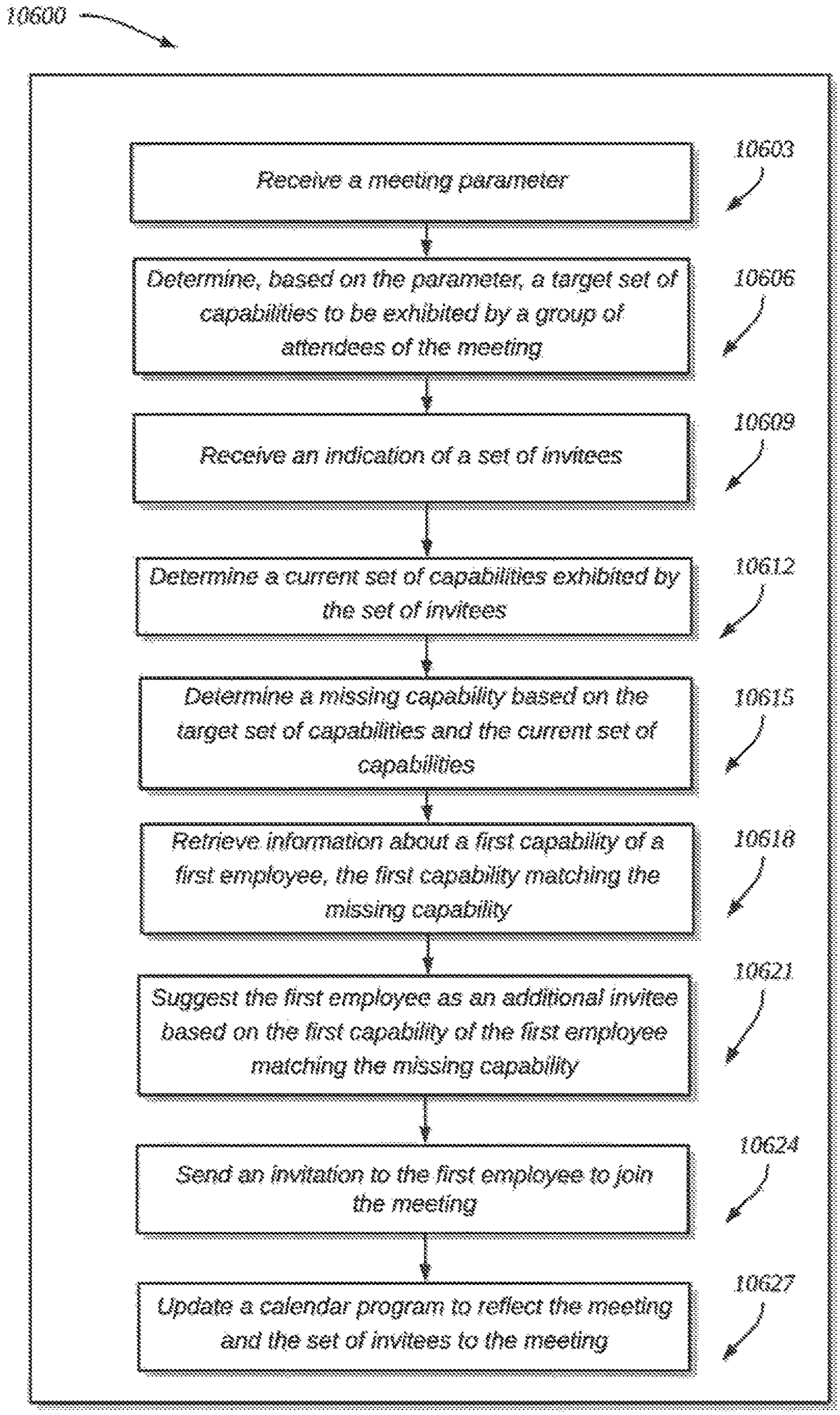
FIG. 106 is a diagram of a process flow consistent with at least some embodiments described herein.

Referring now to FIG. 106 a flow diagram of a method 10600 according to some embodiments is shown. For the purposes of illustration, method 10600 will be described as being performed by the central controller 110. However, in various embodiments, method 10600 may be performed by any suitable device and/or combination of devices. In various embodiments, the central controller may receive information described herein from an app, where such information may be entered into a user interface, e.g., a UI as depicted at screen 8500.

At step 10603, the central controller 110 receives a meeting parameter (e.g., a value of a meeting parameter). The meeting parameter may be a parameter depicted at screen 8500, such as a meeting type, meeting purpose, and/or one or more desired attendees. Examples of meeting types include: "commitment", "alignment", "innovation", and "learning".

At step 10606, the central controller 110 determines, based on the parameter, a target set of capabilities to be exhibited by a group of attendees of the meeting. Capabilities may include areas of expertise, technical skills, meeting facilitation skills, connections, knowledge, roles, permissions, decision-making capabilities, etc. In various embodiments, it may be desirable that the target set of capabilities be exhibited by the group of attendees as a whole. Thus, for example, a single attendee may exhibit multiple desired capabilities, or the capabilities may be relatively evenly distributed amongst the attendees. In various embodiments, the central controller may reference 'Recommended capabilities by meeting type'table 8100 to determine a target or recommended set of capabilities.

At step 10609, the central controller 110 receives an indication of a set of invitees. These may be invitees that the meeting organizer would like to have at the meeting. However, these need not represent all the people who will attend the meeting. Rather, it may be left to the central controller to determine additional invitees for the meeting.

At step 10612, the central controller 110 determines a current set of capabilities exhibited by the set of invitees. For example, the central controller may refer to employees table 5000 to determine capabilities associated with employees who are on the invite list.

At step 10615, the central controller 110 determines a missing capability based on the target set of capabilities and the current set of capabilities. For example, if the target set of capabilities includes expertise in mesh networking, and none of the current invitees (e.g., as received at step 10609) has this expertise, then expertise in mesh networking may be determined to be a missing capability.

In various embodiments, the central controller may determine more than one missing capability (e.g., three target capabilities may remain unfulfilled by current invitees).

At step 10618, the central controller 110 retrieves from stored employee data information about a first capability of a first employee, the first capability matching the missing capability. The central controller may refer to employees table 5000 to determine capabilities associated with an employee who is not among the current invitees. The central controller may find or otherwise determine an employee who has a capability that matches the missing capability (e.g., an employee who is an expert in mesh networking). In various embodiments, the central controller may specifically search for employees in table 5000 who possess the missing capability.

In various embodiments, if there are multiple missing capabilities, the central controller may find multiple employees (e.g., multiple employees that together possess the missing capabilities), or a single employee that possesses all of the missing capabilities.

In various embodiments, the central controller may filter employees based on other factors (e.g., based on whether such employees are available at the time of a prospective meeting).

At step 10621, the central controller 110 suggests the first employee as an additional invitee based on the first capability of the first employee matching the missing capability. For example, the central controller may transmit to an app of the meeting organizer an indication of the first employee. The first employee may then appear as a suggested attendee 8570 listed at 8575. Also, the central controller and/or app may cause a badge to appear in association with the name of the first employee, the badge representative of the missing capability.

In various embodiments, the meeting organizer (e.g., via the app) may confirm the first employee as a suitable invitee.

At step 10624, the central controller 110 may send an invitation to the first employee to join the meeting. The central controller may send out invitations to the list of invitees, including invitees suggested by the meeting organizer and/or invitees found to provide otherwise missing capabilities.

At step 10627, the central controller 110 updates a calendar program to reflect the meeting and the set of invitees to the meeting. The central controller may place an indication or notification of the meeting on a calendar program, e.g., in the calendars of one or more of the invitees. The notification may include meeting parameters (e.g., purpose, time, date, location, etc.).

Improving a Venue's Appearance

In various embodiments, it may be desirable to move an object (e.g., within a room, venue, or other location) with an objective of improving the appearance or overall appearance of the venue. In various embodiments, an object is moved so as to hide, mask, cover, and/or obscure an undesirable attribute of a room. An undesirable attribute may include a crack in a wall, chipped paint, a leak, broken glass, a stain or marking (e.g., on a wall), discoloration, an ill-fitting fixture (e.g., a misaligned cabinet door), a missing floor-board, and/or any other attribute.

In various embodiments, camera 4100 determines a target location for an object that places the object proximate to the undesirable attribute. The target location may be determined as a location where the object would hide or obscure a view of the undesirable attribute. For example, a target location for a picture may be hanging over a crack in a wall.

In various embodiments, it may be desirable to hide or mask another object and/or part of another object in a room. The other object may include an undesirable attribute. In various embodiments, an undesirable attribute may include damage, improper placement, conflicting color, and/or any other attribute.

In various embodiments, camera 4100 determines a target location for an object that is proximate to (e.g., that obscures the view of) the other object.

In various embodiments, an object may be moved for other reasons. For example, moving an object may increase color-coordination and/or other aesthetic properties amongst objects in the room and/or for the room environment as a whole.

In various embodiments, an object may be moved for reasons of convenience. For example, it may be convenient that all plants in a room are on the same table, so that they can all be watered together.

In various embodiments, an object may be moved for any suitable reason, and/or camera 4100 may determine a target location and/or target state for an object for any suitable reason.

Highlight Objects Based on User

In various embodiments, camera 4100 may identify a user in the first image. Perhaps the user is not near a particular object and/or not interacting with the object. The object may not even be in the first image. Nevertheless, camera 4100 may determine that the object may be of interest to the user. Accordingly, camera 4100 may spotlight the object and/or otherwise draw the user's attention to the object.

In various embodiments, camera 4100 may recognize the user (e.g., using facial recognition algorithms). In various embodiments, camera 4100 may be informed of the user's identity (e.g., a homeowner may inform camera 4100 that his cousin Sarah is coming to visit). Camera 4100 may retrieve information about the user (e.g., preference information), such as from user table 700.

Knowing the user's identity, camera 4100 may retrieve information about one or more objects (e.g., from objects table 10300 and/or objects history table 10400). Camera 4100 may determine (e.g., based on the user, user preferences, and/or object information) one or more objects that may be of interest to the user. The camera may then highlight or otherwise draw attention to the one or more objects.

In various embodiments, camera 4100 highlights one or more objects that the user gave to another user (e.g., to the homeowner, to the homeowner's child, etc.). For example, the user may have given a number of toys as gifts to her nieces and nephews in a home, and such toys may be spotlighted when the user comes to visit.

In various embodiments, camera 4100 highlights one or more objects that feature the user. For example, the user may appear in one or more photos around a house, and such photos may be spotlighted. In various embodiments, camera 4100 may cause one or more photos or videos to be displayed (e.g., one or more photos featuring the user). The photos or videos may be displayed on a digital picture frame, via a projector, on a television, and/or in any other fashion.

In various embodiments, camera 4100 highlights one or more objects that relate to a user's career, hobbies, and/or interests. For example, if a user is interested in art, then camera 4100 may draw attention to works of art in the house.

In various embodiments, camera 4100 highlights one or more objects that are new since a user's last visit. For example, camera 4100 may highlight a new decorative rug that has been acquired since the user's last visit.

In various embodiments, camera 4100 may draw attention to an object based on any other relevance to the user, and/or based on any other criteria.

Highlight Categories of Objects

In various embodiments, it may be desirable to get an idea of one or more objects belonging to a category. For example, a couple may be reminiscing about their life in their first apartments, and may wish to be reminded of objects they had when they were in their first apartment. For example, when a child is in a room it may be desirable to highlight educational toys in the room, in order to increase the likelihood of the child playing with such toys. In various embodiments, a user may select and/or otherwise indicate a category of objects to camera 4100.

In various embodiments, camera 4100 may highlight one or more objects belonging to a category. A category may include: objects that were acquired before a certain date (e.g., before 2005); objects that were acquired during a particular time window (e.g., between 2005 and 2008); objects that were acquired for an occasion (e.g., for a wedding, for a child's birth); objects that belong to a given user; objects that were received from a particular person; objects that were acquired on a trip; objects that were acquired when a user or users were living in a particular location (e.g., objects that were required when a couple was living in their first apartment); objects that were inherited; objects that were inherited from a particular person; objects of a particular type (e.g., artwork, cooking appliances, antiques, toys, clothes, pictures, paintings, etc.); objects that are FSA eligible and/or fall into some other category of tax deductible items; objects having more than a certain monetary value; object having a high sentimental value; objects that have recently been used; objects that have not been used in the last year (or in some other period of time); objects that are in disrepair; objects that are in need of cleaning; objects that are out of place; objects that are educational; and/or any other category objects.

Mapping

In various embodiments, a given camera, laser and/or other light source may have limited coverage. For example, a laser may be capable of covering only a single room or even part of a room in a house. Outside such room, the laser may be blocked by a wall, for example. Thus, in various embodiments, when a user exits the coverage area of a first laser (or other light source), another laser may take over and continue to guide the user within its own coverage area.

In various embodiments, camera 4100, the central controller 110, and/or any other device may construct and/or maintain a 3D model of a house, room, building, and/or other location. In various embodiments, one or more images/photographs may be taken within the location, where such photographs may be taken from different vantage points and/or from different locations. The photographs may be taken by camera 4100, by multiple cameras stationed at different locations, by a moving or roving camera, by a user device (e.g., a mobile phone), and/or by any other device. The photographs may be stitched together (e.g., using overlapping features seen in the photographs), and three-dimensional information about the location may be derived. For example, the apparent convergence of parallel lines may be used to extract depth information from an image. For example the apparent sizes in a photograph of different objects (including their apparent sizes relative to each other) may be used to extract distance and depth information from an image.

Further details on reconstructing a three-dimensional model from two-dimensional photographs can be found in U.S. Pat. No. 9,001,120, entitled "Using photo collections for three dimensional modeling" to Steedly et al., issued Apr. 7, 2015, e.g., at columns 2-5, which is hereby incorporated by reference.

In various embodiments, camera 4100 may create a map of a home, building, location, etc. The map may be created from a three-dimensional model created from images/photographs. The map may be determined or derived from floor plans or other plans (e.g., floorplans uploaded to the central controller 110). The map may be determined from a series of photographs of the floors (e.g., of the floors in different rooms and/or locations).

In various embodiments, camera 4100 and/or central controller 110 may map a house or location by detecting the trajectories of mobile devices or other signal-emitting devices. For example, by detecting the strength and/or bearing of a signal from a mobile device over time, camera 4100 and/or central controller 110 may determine paths or routes (e.g., common paths or routes) taken by users in a home. The camera 4100 may then determine that such paths represent locations of hallways, rooms, and/or other venues within a home. In some embodiments, if a user's mobile device is detected for long periods of time at a given location, then it may be assumed such a location corresponds to a living room, couch, nightstand, and/or other area where a user might tend to spend a lot of time. In some embodiments, if a user's mobile device is typically detected in motion within a particular area, the area may be assumed to be a hallway.

In various embodiments, a series or mesh of devices may be used to map the interior of a home or other location. For example, a home may include multiple cameras or other devices located in different rooms. The devices could send signals to one another at known powers and/or at known times. Based on the strength and/or timing of received signals from other devices, it may be determined whether intervening walls are present, and how far apart such devices are. A map (e.g., a rough map) may then be reconstructed based on this information.

Further details on mapping an interior based on photographs and/or sensor readings can be found in U.S. Pat. No. 9,400,930, entitled "Hybrid photo navigation and mapping" to Moeglein et al., issued Jul. 26, 2016, e.g., at columns 29-32, which is hereby incorporated by reference.

In various embodiments, once a map has been determined, camera 4100, central controller 110, and/or any other device may determine routes through the house (e.g., routes from a location of an object to a location where the object should be put away). Routes may be determined using any suitable direction finding, route planning, mapping, etc. algorithm.

Guidance Through Tasks

In various embodiments, as a user is performing a task, (e.g., putting an object back in its place) camera 4100 may provide guidance to the user. In various embodiments, as the user is carrying or moving the object, a camera laser (or other light source) traces or otherwise illuminates a path along the floor to the destination of where to put the object. For example, if the user picks up the object in the living room of a house, and the task is to put the object away in a bedroom of the house, then a laser may trace a path from the living room, through a hallway, and to the bedroom. The laser may continue to trace a path up to a shelf where the object is to be placed. The laser may even show the particular shelf and/or the location on the shelf where the object is to be placed.

In various embodiments, a task specifies a location where an object is to be put away. The camera 4100 may retrieve the location from a house map and determine a path (e.g., the shortest path) from the object's current location, to the location where the object is to be put away. The laser may then trace out the path for a user.

In various embodiments, a task specifies that an object should be put away, without explicitly mentioning a location. In such embodiments, camera 4100 may retrieve background or historical information about the object (e.g., from object history table 10400) to find one or more other locations where the object has been. The camera 4100 may determine that one such location represents the location where the object should be put away. For instance, a location in a shelf, closet, bookcase, drawer, etc. may represent the location where the object should be put away. For instance, a location where an object has spent most of its time in the past may represent the location where the object should be put away. The camera 4100 may then show the user a path to the location, or otherwise communicate the location to the user (e.g., to the task's assignee).

In various embodiments, a laser (or other light source) traces a path at some constant (e.g., predetermined) rate. It may be assumed that the user (e.g., task assignee) is following the traced path. In various embodiments, the laser (or other light source) repeatedly traces that path, thereby, e.g., allowing that the user could be anywhere along the path and still pick up the laser signal.

In various embodiments, camera 4100 tracks the user and moves the pointer in front of the user, so that the user is able to follow the pointer. Also multiple cameras can "hand off" the user to each other as the user exits one field of view and enters another.

In various embodiments, camera 4100 projects the floor plan of a house, building, etc., on a wall. A path is then shown through the floor plan guiding the user to the location where the object should be placed. The path may be part of the projected image and/or the path may be overlaid onto the projected image with a laser pointer (or other lighting means).

In various embodiments, a user is led to a destination (e.g., a place to put away an object) via audio signals (e.g., verbal commands, tone, etc.). In various embodiments, the pitch of a tone guides the user as to whether he is going in the correct direction or not. If the user is going in the correct direction, the pitch may get higher, otherwise the pitch may get lower. In various embodiments, any suitable pitches or audio cues may be used. In various embodiments, verbal commands tell a user where to go (e.g., "go straight", "go right", "open the third right from the top", etc.).

In various embodiments, camera 4100 may seek to call a user's attention (e.g., the first user's attention) to a first object. However, a laser (e.g., laser pointer) may not have a direct line of sight to the object. Accordingly, in various embodiments, the laser may illuminate a second object/location that is near to the first object and that is line-of-sight to the laser. The user may then presumably realize what he is supposed to be looking at.

In various embodiments, the user himself does not have a direct line-of-sight to a first object, even if the laser is able to illuminate the first object directly. In such embodiments, the laser may also illuminate a second object that is proximate to the first object (e.g., where the second object is line of sight to the user). The laser may project an arrow on a surface to point to the first object, and/or attempt to draw the user's attention to the first object in any other fashion.

In various embodiments, a laser (or projector or other light source) may call a user's attention to an object by projecting or drawing a representation of the object (e.g., on a wall or other flat surface or other surface). For example, a laser may trace the shape of a telescope on a wall in order to draw the user's attention to an antique telescope (which may be nearby). In various embodiments, a laser may spell out an indication or description of the object using text (e.g., "telescope"). In various embodiments, a laser may project an arrow on a wall or surface that points in the direction of the object to which it seeks to draw the user's attention.

Light Precautions

Various embodiments contemplate use of lasers, spotlights, and/or other lighting source sources. It may be desirable to take one or more precautions or mitigation strategies to avoid shining in a user's eyes (e.g., for reasons of safety and/or avoiding annoyance).

In various embodiments, a laser or other light source is inactivated if someone looks at a camera. In various embodiments, the laser is redirected away from the user. In various embodiments, a laser is inactivated and/or redirected if a user is proximate to the path of the laser and/or if the user could potentially cross paths with the laser within some predetermined period of time (e.g., the user is running and could, at his current pace, cross paths with the laser within 0.5 seconds).

Some details on safety protocols used in range finding with lasers can be found in U.S. Pat. 10,185,027, entitled "LIDAR WITH SMART SAFETY-CONSCIOUS LASER INTENSITY" to O'Keeffe, issued Jan. 22, 2019, e.g., at columns 8-11, which is hereby incorporated by reference.

In various embodiments, a laser and/or other light source may be inactivated and/or redirected if it would otherwise shine on a person, an animal (e.g., a pet), a reflective object (e.g., a mirror or television screen), and/or an electronic device that could be activated or impacted by the light (e.g., a camera, a cable box, etc.). In various embodiments, lasers may avoid windows, doors, and/or other openings, e.g., due to the potential to hit someone on the outside.

In various embodiments, ordinary lights in a room are configured (e.g., dynamically configured) to avoid having a light shine directly in a user's eyes and/or to avoid having a potentially disturbing level of light shine in a user's eyes. The lights may otherwise be configured to provide ample or significant light to the room. In various embodiments, a light shade or globe (or other covering) is capable of altering its transmissibility (e.g., dynamically). If a user is looking in the direction of the light, the shade or globe may decrease transmissibility, so less light reaches the user. However, if a user is not looking in the direction of the light and/or is absent, the shade or globe may increase transmissibility, thereby allowing more light through to illuminate the room or surrounding area.

In various embodiments, a light source (e.g., lamp) may selectively block or reduce light emitted in one particular direction. This may be in the direction of a user. As the user moves to a new location, the light source may selectively block or reduce light emitted to the new location. The light source may also restore the intensity of light emitted to the user's first location. Thus, in various embodiments, a "shadow" follows a user around, while the rest of a room is fully illuminated.

In various embodiments, a light source (e.g., lamp) includes an opaque surface that can move in an arc (e.g., in a full circle) around a central lighting element (e.g., a light bulb). In various embodiments, a camera (and/or motion sensor and/or other device) determines the location of a user with respect to the lamp, and the opaque surface is moved so as to lie directly between the user and the light source. In this way, for example, the user may avoid having bothersome light shine directly in his eyes, while still ensuring that the room as a whole is well lit. In various embodiments, the surface may cover (e.g., shield) 10 degrees of arc in a plane parallel to the floor. Of course, in various embodiments, the surface may cover some other size of arc.

In various embodiments, rather than opaque, the surface may be partially transparent, while still blocking a significant portion of incident light (e.g., 80%). In this way, the user may still receive some direct light from the light source, but at a lesser intensity.

In various embodiments, a surface may have the ability to move not just in an arc around a light source, but also along a curved region in space (e.g., along a region defining a sphere or portion thereof). Thus, the surface may have the ability to selectively block light in horizontal directions, in vertical directions, and in combinations thereof. For example, if the user is directly beneath the light, the surface can block light going directly downwards, while allowing light to be freely transmitted in all horizontal directions (e.g., in all compass directions).

In various embodiments, a light covering (e.g., lamp shade, globe) may comprise material with an adjustable tint. In various embodiments, it may be possible to independently adjust the tinting of different portions of the covering. Thus, in various embodiments, a light covering (e.g., lamp shade) may be darkly or heavily tinted at a region that lies between a light source and a user, while remaining minimally tinted (e.g., substantially transparent) at other locations. In this way, the intensity of light falling directly on the user may be reduced (e.g., to a non-disturbing level), while ample light is transmitted in other directions, e.g., to create a well-lit room.

Games

In various embodiments, a user may wear a headset. The headset may have accelerometers or motion sensors. The user may utilize the headset while playing a game. The headset may sense motions of the head, and may steer and/or move a game character accordingly. In various embodiments, camera 4100 may project a game board or game environment on a wall or other surface. A user may utilize his headset to steer a character through the game environment. The progress of the game character may be shown in the projected game environment.

In various embodiments, a virtual scene is projected on one or more walls or surfaces in a room. The room may be transformed into a virtual environment. For example, views of a jungle may be projected onto the walls and ceiling, so that the user appears to be in a jungle no matter which direction he looks. In various embodiments, the user may "move" through the virtual environment (e.g., causing the scenery to change as if the user is walking through it). The user may simulate motion and/or cause apparent motion of the projected scenery by physically walking or moving (e.g., through his room, through his house), by gesturing (e.g., waving his hand forward to move forward), by pointing a laser pointer in a particular direction (e.g., in the direction he wishes to move within the virtual environment), and/or in any other fashion.

In various embodiments, camera 4100 may capture gestures made by a user, interpret such gestures, and cause the virtual scene to change accordingly.

In various embodiments, camera 4100 may give a user different choices of environment to experience. For example, camera 4100 may project a different virtual environment on each of four different walls of a room. The user may gesture towards one of the four walls in order to select the corresponding environment. Camera 4100 may thereupon project the selected environment on all four walls.

Immersive Book

In various embodiments, a user may listen to an audio book, or some other audio program (e.g., radio, podcast, etc.). The camera 4100 may cause a projector, speaker, and/or another device to incorporate visuals, sounds, smells, vibrations, and/or other effects into the user's environment (e.g., home environment). For example, if the audio book is a mystery book, the camera 4100 may cause the sound of footsteps to be broadcast from a speaker at an appropriate time.

Call Platform

Various embodiments comprise an improved system for the visualization of call platform layouts and methods for enhancing the entertainment of a video call and ways to improve participant engagement. Various embodiments provide for an alteration of call data such as by changing the order or appearance of images associated with call participants. Various embodiments serve to enhance the focus, clarity, and purpose of meetings, while at the same time making meetings more fun.

In various embodiments, a "call platform" may refer to software used to represent audio and video feeds of a call.

In various embodiments, a "participant view" may refer to still images or video feeds of the participants associated with a call hosted on a call platform.

Participant Views Options Based on Participant Characteristics

In various embodiments, the effectiveness of virtual meetings/calls is enhanced to allow for the view of participants to be determined by characteristics of the participants. In some embodiments, users can set a preferred participant view based on their own preferences, storing those preferences with central controller 110. Various embodiments allow for a greater variety of display options that make meetings more efficient, effective, and productive. Some embodiments can make calls more entertaining and help to bring up engagement levels and mitigate call fatigue.

Figure 107:
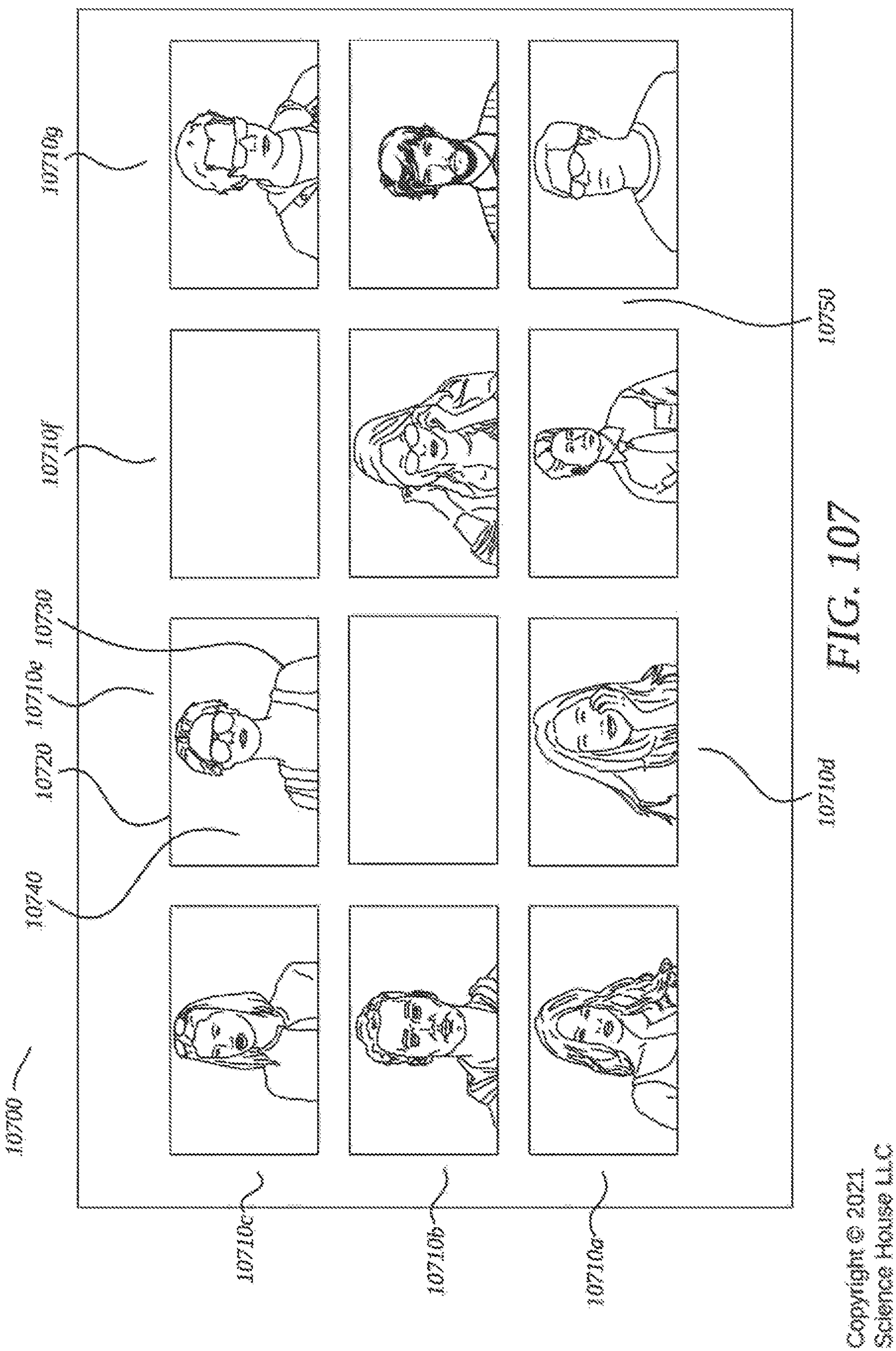
FIGS. 107 through 120 are user interfaces of call platform software consistent with at least some embodiments described herein.

With reference to FIG. 107, a display 10700 of call platform software from an app used by meeting participants according to some embodiments is shown. The depicted screen shows app functionality that can be employed by a user to participate in a virtual meeting in which participants may see each other during a virtual call. In some embodiments, data communication is managed through central controller 110 or network 104. In FIG. 107, the app may allow participants to join or leave the call at will, and various controls and features allow participants functionality during calls (e.g. managing views, allowing interactivity between participants, game play, sending text messages, displaying a presentation deck, being placed in a call queue, generating tags associated with other participants, generating tags associated with aspects of the call, receiving additional information about other call participants, providing rewards to other participants, highlighting one or more participants). Various embodiments contemplate that an app may receive data from peripheral devices used by meeting participants (e.g. headsets, presentation remotes, keyboards, mice, cameras, desktop or laptop computers) and or user devices (e.g. smartphone).

FIG. 107 illustrates a respective graphical user interface (GUI) as it may be output on a peripheral device, mobile device, or any other device (e.g. on a mobile smartphone). The GUI may comprise several tabs or screens. Various embodiments allow for a greater variety of display options that make meetings more efficient, effective, and productive. Some embodiments can make calls more entertaining and help to bring up engagement levels and mitigate call fatigue. In accordance with some embodiments, the GUI may be made available via a software application operable to receive and output information in accordance with embodiments described herein. It should be noted that many variations on such graphical user interfaces may be implemented (e.g., menus and arrangements of elements may be modified, additional graphics and functionality may be added). The graphical user interface of FIG. 107 is presented in simplified form in order to focus on particular embodiments being described. As will be understood, FIGS. 108-120 may employ similar GUIs and software.

The layout of FIG. 107 includes cells which represent locations on a user screen which may be used to display one or more participants in a call. These cells may be arranged in a grid format, with each column having an associated letter and each row having an associated number. For example, cell 10710*a* having the designation 'A1', cell 10710*b* having the designation 'A2', cell 10710*c* having the designation 'A3', cell 10710*d* having the designation 'B1', cell 10710*e* having the designation 'B3', cell 10710*f* having the designation 'C3', and cell 10710*g* having the designation 'D3'. As will be understood, other representational schemes may be used as well. Cell 10710*e* includes a border 10720, an image (or other representation) of a call participant 10730, a background 10740, and interstitial space 10750 (an area between borders).

In some embodiments, in a hierarchical arrangement, the highest ranking participant on the call can be displayed at the top of the participant view and all others by hierarchy placed in rows beneath. For example, CIO (top level), Senior VPs (second level), VPs (third level), Directors (fourth level) and so forth. Hierarchy information could be saved in the user's computer controller (or call platform controller or central controller) and retrieved each time a new video call is initiated in order to display participant images by hierarchical rank. During the call, the ranking of images could be updated in real time as participants leave or join the call. In another embodiment, the participant images could be displayed in a standard grid format, but with the images sorted by hierarchy from the upper left image to the lower right.

Figure 119:
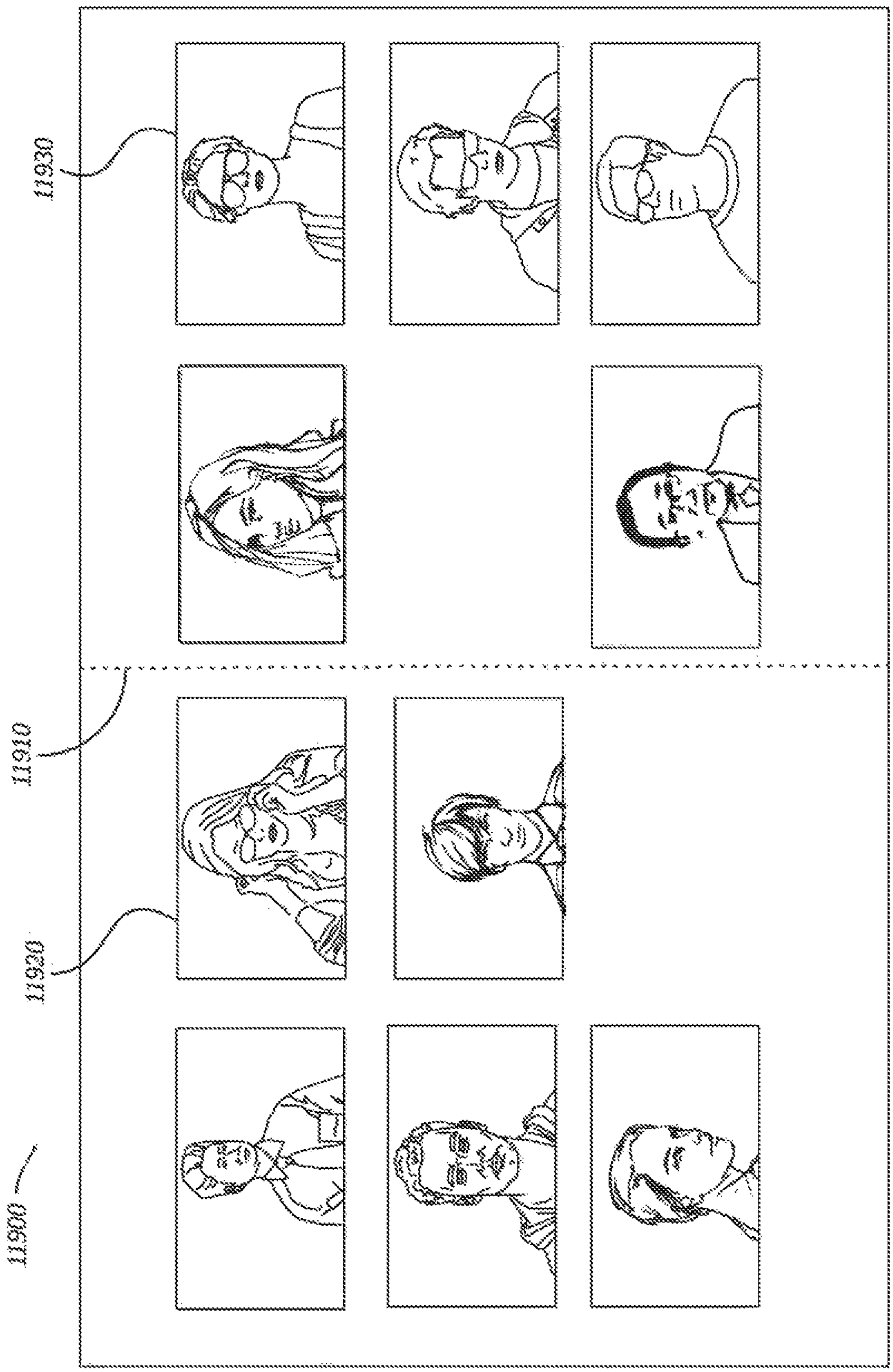

With reference to FIG. 119, there is shown an arrangement 11900 of participant images by job function in which individuals could be grouped by job function or role. For example, all of the participant images of business analysts could be grouped together on the left side of the app view (to the left of dotted line 11910) while IT architects could be grouped together on the right side of the app view (to the right side of dotted line 11910). This could make it easier for a participant with an architecture question to more quickly identify another participant who can answer the question by looking to the right side of the app view. In this example, call participant 11920 is a business analyst since she is to the left of dotted line 11910, while call participant 11930 is an IT architect since she is to the right of dotted line 11910. Dotted line 11910 is shown as a straight line, but it will be appreciated that it could take a non linear path, or might not be shown to call participants at all. Alternatively, the business analysts could have a red border around their image, while the IT architects have a blue border around their participant image, making it easy to spot an IT architect in order to ask a question. Job function information could be retrieved from an employee database table 5000 stored at the central controller 110, and used by the call platform software to apply the appropriate image border colors.

In some embodiments related to employee seniority, those with various levels of seniority (e.g. determined by retrieving a work experience field of an employee database 5000 stored at the central controller 110) could be grouped together. For example, those with 20+ years of experience are grouped together, those with 10-20 years of experience are grouped together, those with 5-9 years of experience are grouped together and those with less than 5 years of experience are grouped together. Another way to represent seniority would be to change the size of the participant images proportional to the number of years of experience that the call participants had.

In an arrangement by team, project teams could be grouped together. For example, if a project team is giving an update, all five members of the team could all be shown in the participant view and made the focus of the display for all call participants since they should be contributing the most during the meeting. The five team members could be shown in the center of the view of participant images, shown with a purple color border around each team member, shown within a designated area of the screen (such as within a circle or square boundary), or shown in larger sized participant images. All of these methods would make it easier for call participants to direct questions to members of the team during some or all of the call. Such methods of highlighting a team could switch from one team to another during the call, such as while those teams are currently providing status updates.

A participant view arrangement may be based on meeting roles. Different meetings may require different roles. For example, if there is a Learning Meeting, the person providing the information could be displayed in the center of the participant view and not change since they are continually delivering content. In Decision Making meetings, the decision makers could be displayed and highlighted in the participant view since they are the individuals making the decision on the topic. Roles defined by the meeting owner could be displayed above or below the individual's rectangular image in the participant view. For example, the meeting owner might identify one participant as a note taker, and have "Note Taker" written at the top of that participant's image rectangle.

Participant View Options Based on Activity

In some embodiments, a way to enhance the effectiveness of virtual meetings/calls is to allow for the view of participants to be determined by actions of the participants. In this embodiment, users can set a preferred participant view based on their own preferences.

A participant arrangement may be based on who currently attends adjacent meetings (e.g., many adjacent meetings). The call platform software could have access to all meeting data for all participants, such as by retrieving the data from a meetings database stored at the central controller 110. For those participants on a given call that currently attend meetings related to the current meeting, those participants could be identified in the participant view with a visual indication of some kind, such as a colored border on their participant image. For example, a Business Analyst attending a meeting for a project may have multiple meetings each day regarding the same project. This Business Analyst could be highlighted with a color indicating they attend many other meetings on the topic. Others that are only attending to gather information and rarely attend any other related meetings on the project could be shown with participant image borders of a different color, or participant images that appear smaller. In this case, those that attend many meetings on the project could be given priority for speaking displayed more visibly in the participant since they should have more depth of knowledge of the project.

Figure 108:
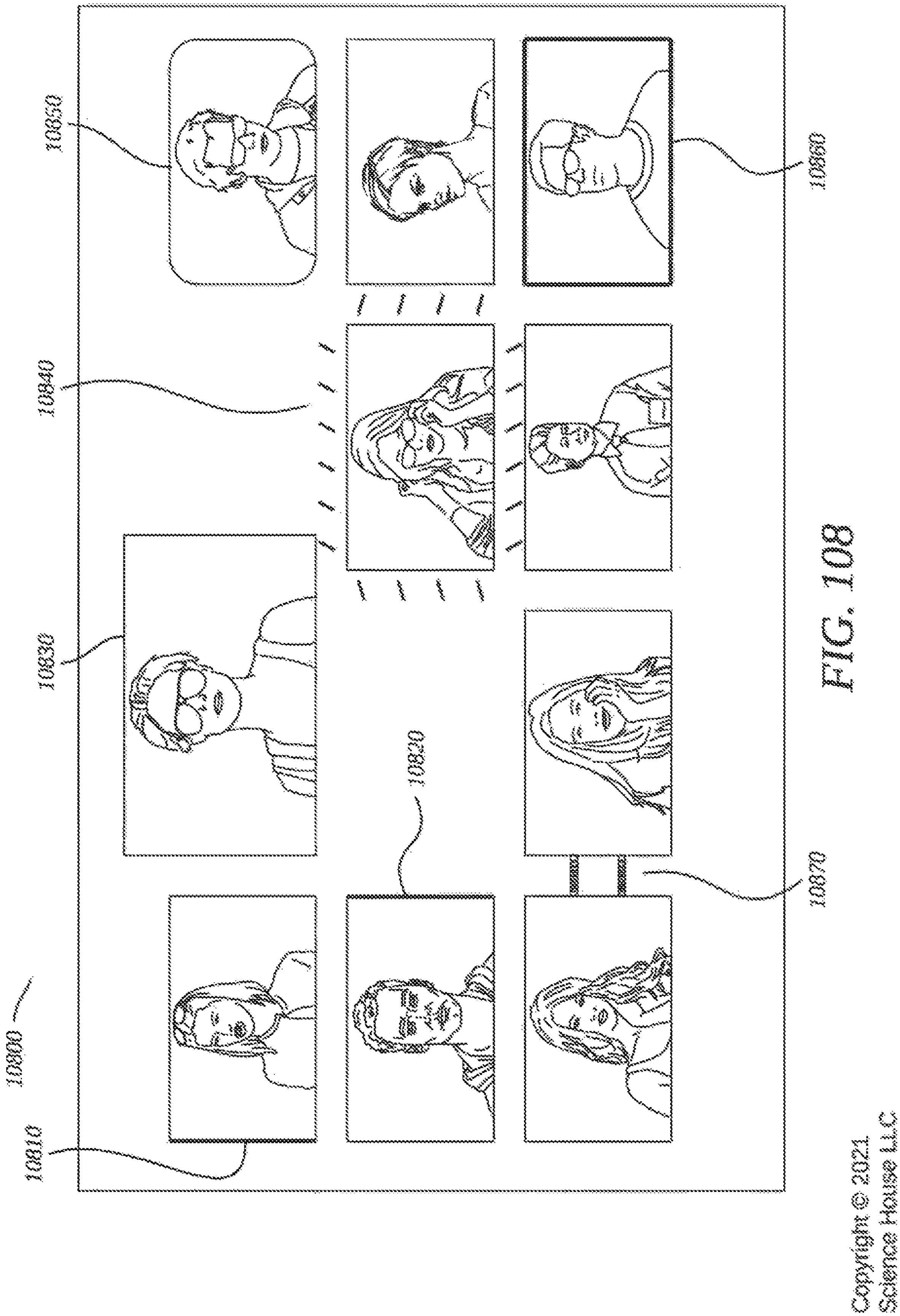

With reference to FIG. 108, a call platform app view 10800 is shown which illustrates ways in which borders may be altered in order to make calls more effective. In various embodiments, a border 10810 is made bold, but only on the left side of the border, which could indicate a job function performed by the participant (e.g. bold left border indicates that they are a developer). A right bold border 10820 may indicate other information about a call participant, such as that they are currently waiting for a chance to speak, have a question, are aligned with Option 'B", etc. An enlarged border 10830 allows for an enlarged image of a participant, such as a participant in a leadership position. In some embodiments, an enlarged border could also be used as a reward, such as a reward for a user coming up with a good idea during the call. A flashing border 10840 could be used by the participant to get the attention of others on the call, such as alerting others that the user would like to ask a question. A rounded border 10850 could be used to provide information to others on the call, such as indicating that the participant is on mute, that they are scheduled to speak next, that they will be dropping off the call soon, that they may have connection issues, etc. In some embodiments, a bolded border 10860 may be used to convey information, such as that the participant has been with the company for a long time, is a subject matter expert, is leading a project, etc. A border connection 10870 may indicate that two call participants are aligned in some way, that they work together, that they are on the same team, etc. In some embodiments, border alterations may be enabled or disabled by call participants, reflect defaults stored by call participants with central controller 110, change based on actions taken by a call participant, are managed by a meeting owner or meeting facilitator, etc.

Figure 109:
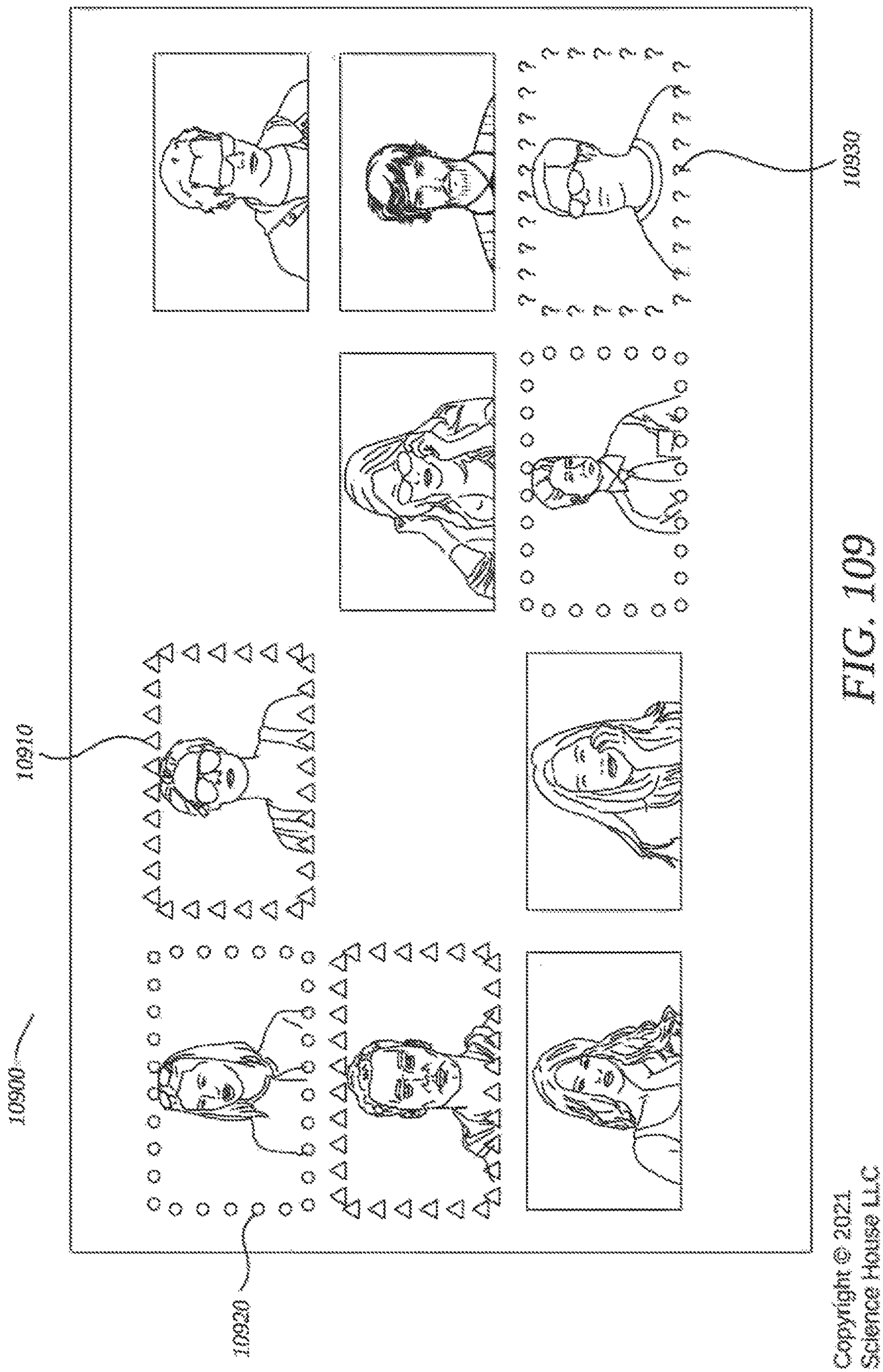

With reference to FIG. 109, a call platform app view 10900 is shown which illustrates ways in which borders may be replaced with other forms in order to make calls more effective. In various embodiments, a border may be composed of elements that provide information about the call participant. Border 10910 is composed of triangle shapes, which could indicate that a call participant is on a particular team, has a particular expertise, is the next person in a speaking queue, etc. Similarly, border 10920 (a border of circles) may convey other information to call participants. Border 10930 is composed of question marks, and may thus clearly indicate to other participants that the user has a question. In some embodiments, borders may be enabled or disabled by call participants, reflect defaults stored by call participants with central controller 110, change based on actions taken by a call participant, are managed by a meeting owner or meeting facilitator, etc.

In some embodiments, a participant arrangement may be based on who is currently the most engaged. The participant view could display those participants that are the most engaged during the call. This could be detected through sensory enabled hardware, such as via a camera of the user's computer which is capable of tracking eye gaze and translating that via appropriate software into an engagement score that is then sent to the call platform or central controller and stored for later use. This engagement score could be used to rank the level of engagement for all call participants. Those individuals with high engagement scores could then be displayed at the forefront of all other call participants in the participant view and the engagement score provided on the participant participant image for all call participants to see.

In some embodiments, a participant arrangement may be based on positive tags received. Those call participants receiving the most positive tags on a particular call could be highlighted or shown with a special visual accolade (border, star, trophy) on their picture or in the participant view. The number of positive tags could be determined through the retrieval of data from a tag database of the central controller or call platform software.

A participant arrangement may be based on who has tagged the meeting as being the most relevant to them. As participants tag the meeting and provide an indication that it is relevant to them or their goals, this could be displayed on their participant image. This view could provide the meeting owner and others an indication that the content being delivered and discussed meets the needs and goals of the participants.

A participant arrangement may be based on a number of tags received. The individual that receives the most tags (as determined by processing of a number of a tags received field of a tag database at the central controller) in a meeting could be displayed at the top of the participant view and a special trophy provided to them on their image.

A participant arrangement may take into account key participants. As meetings are established, the meeting owner could identify those key participants and roles. Once the meeting begins, the participant view could display and highlight those key participants. The other lesser important participants could display in the participant view, but be grayed out or be displayed of a lesser size participant image. If the role of the individuals change throughout the agenda or based on contribution, they could be displayed as key participants and removed from the grayed out view.

A participant arrangement may take into account mute status. Call participants who go off mute could have their image size immediately increased or highlighted in some way, such as by flashing a border around their image or moving their image within the participant view.

A participant arrangement may take into account participant mentions. When a first user mentions a second user currently on the call, the second user could be highlighted in some way.

A participant arrangement may take into account participant speaking time. As people talk more during a call, their participant image (or border size) could grow in size, eventually "crowding out" the participant images of other call participants. This visual indicator of people who are speaking a lot could encourage quieter participants to jump in to bring some balance, and could make frequent talkers more aware of their talk time. The meeting owner could also have the participant image of quiet individuals growing or rearrange them to "nudge" these individuals to participate more or speak up; could be especially useful in on-line education applications.

The alignment of call participants could also be reflected in an updated ordering/placement of the participant view. For example, a poll question could ask call participants whether they prefer Option A or Option B. The votes are then used to update the participant view by placing those call participants voting for Option A on the left side of the participant view and those voting for Option B on the right side of the participant view.

Response Queue

In large meetings, it is common for one person to make a statement and for others to then want to verbally respond. But if there are many who want to respond, there is often a confusing time when multiple people are trying to respond at the same time, creating some chaos that is disruptive to the meeting.

In various embodiments, the call platform software could determine a speaking queue by receiving requests from call participants who want to speak. As this queue is adjusted, the participants waiting to speak could be displayed in the participant view in speaking order. As the individual approaches their time to speak, the border on the participant view could begin to change colors or flash. In another example, the call platform software determines the order of the next five speakers and places a number from one to five as an overlay on top of each of the five participant's images, so the next participant due to speak has a number one on their image, the second has the number two, etc.

In some embodiments, participants who want to speak could be presented with the ability to indicate how their contribution relates to elements of the conversation. An individual who wishes to speak could be presented with choices such as "I have the answer to your question"; "I agree"; "I want to offer an example;" "I'd like to highlight something that was just said"; "I want to offer a different opinion"; "I think that's not relevant;" "I want to summarize the discussion"; "I'd like transition or move on"; "I'd like to ask for a poll" "I'd like to ask for the feeling of the room" "I'd like to ask a question"; "I'd like us to take an action or make a decision." Participants could fill a short text box with information about what they are going to say. When individuals select an option to indicate how they want to contribute or input a description of what they want to say, the type of their contribution or their rationale could be visually indicated to others on the call.

In another embodiment, individuals could select from digital representations associated with contribution types known as "intenticons." Intenticons are abstract representations of intent similar to emojis or emoticons. The intenticon could be displayed next to the participant's name, could replace the participant's name, could be placed above, below, around or composited on top of the participant's image, or could replace the participant's image.

In another embodiment, their chosen option or their text description of their contribution could be displayed above, below, or composited onto their image or the frame of their image. In one embodiment, participant view could be rearranged by type of contribution.

In some embodiments, call participants who want to respond to a current speaker could enter text summarizing the nature of their response, allowing call platform software to merge one or more responses or bump up the priority of one or more responses. For example, two users might want to respond by pointing out a security issue brought up by the current speaker, in which case the call platform software picks only one of those responses to be made, sending a message to the other responder that their response was duplicative. Information about a potential responder's response could change the prioritization level, such as by a user who wants to bring up a potential regulatory issue with a previous statement.

In some embodiments, the meeting owner could allow participants to indicate which other participants they would like to hear next. For example, participants could reorder a visual queue containing the contributions or the names of participants in the speaking queue. For example, participants could click on other participants' images, frames, or contributions to indicate. By indicating, the call platform could change the visual representation of the participant view to highlight individuals that others think should talk next. A highlighted frame could appear around the user or the user could be placed in a spotlight for example. In other embodiments, individuals could upvote or downvote individuals in a speaking queue by clicking on a button indicating thumbs up/down, "speak next"/"don't speak next", or left mouse clicking or right mouse clicking, swiping left or swiping right.

Individuals could remove themselves from the speaking queue. In one embodiment, the participant could click a "never mind" button. In another embodiment, a participant could remove oneself by right clicking on a visual representation of the queue and selecting an option to remove oneself.

The call platform could detect when a user's name is mentioned during the meeting and provide visual indication to other users on the call of the identity of the individual and to the mentioned individual. In large meetings, participants may not know each other, and/or the sheer number of participants results in small image sizes for individual participants. The call platform could reorder the participant view or resize the image of the individual mentioned, could place a frame around the mentioned individual, or could place a spotlight on the mentioned individual. In long meetings, participants may continue to engage in other forms of work or attend another meeting. Individuals whose name is mentioned could receive a visual prompt or alert if they have multiple software windows open or if the call platform interface is minimized. An individual who is mentioned on the call but is not in the meeting could receive a visual alert.

Focus

In various embodiments, it may be desirable to determine if a first participant on a conference call is focusing on (e.g., paying attention to) a second participant (e.g., who appears in a video feed).

In various embodiments, it may be determined that the first participant is focusing on the second participant if: the gaze of the first participant is directed to the feed of the second participant; the gaze of the first participant follows the feed of the second participant as the location of the second participant's feed changes (e.g., move across the first participant's screen); the first participant responds to a prompt of the second participant (e.g., answers a question asked by the second participate, makes a gesture when asked by the second participant, etc.); the first participant responds to a prompt appearing on or near the feed of the second participant (e.g., a text prompt overlaid on the video of the second participant); the first participant responds to a statement or action of the second participant (e.g., the first participant laughs at a joke of the second participant; e.g., the first participant nods after a point is made by the second participant; e.g., a heart rate or other vital sign of the first participant changes); the first participant fails to respond to a gesture, statement, and/or action of a participant other than the second participant; the first participant fails to respond to a stimuli unrelated to the second participant (e.g., video conferencing software deliberately shows a distracting animation to see if the first participant will look at it); and/or if any other suitable criteria are met.

Sensor Data Participant View Determination

In some embodiments, alterations to the way in which call participants are displayed in the participant image could be based on sensor data received and processed by the call platform software.

In one embodiment, the participant view of images reflects the call participants that a user is looking at the most (or that the user has looked at the most in the past). For example, the camera of a user computer could track the eye gaze of the user to determine which other call participants the user was looking at, and send that participant identity information to the central controller, which then provides the information to the call platform software so that those participants viewed the most are highlighted in some way, such as making their participant images larger or grouping them and moving them to the center of the participant view.

In another embodiment, a user's heart rate could be used to alter the number of call participants shown in a participant view. For example, the user's mouse could be equipped with a heart rate sensor which sends a signal representing the user's heart rate to the call platform software (or central controller) in order to reduce the number of call participant images whenever a user's heart rate goes above a predetermined level. In this manner, a participant could be presumed to be agitated when producing a high heart rate, with the call platform software reducing the number of other call participants shown to the user in order to make the call less stressful.

Movement data from a user's headset could also be used to modify a user's image on a call. For example, an accelerometer in the user's headset could report the level of movement of the upper body of the user to the central controller, which then sends a signal to the call platform software indicating whether or not the user is moving a lot. Because movement can be a signal of a desire to speak, the call platform software could then make the user's participant image more prominent, such as by making it flash for the duration of the high body movement period.

Meeting Content Driven Participant View Determination

Alterations to the layout of participant images/video could be driven by the meeting content.

In various embodiments, meeting owners can add tags to presentation slides, documents, or spreadsheets in advance of a meeting. For example, a first presentation slide could be tagged with "architecture" while a second presentation slide could be tagged with "project funding." These tags could be stored in a content database or tag database at the central controller and made available to call platform software. When the first presentation slide is displayed to the call participants, the "architecture" tag is processed and the call platform software highlights the border of all call participants who have a job title containing the word architect (which could be retrieved from an employee database), or call participants could be separated such that all architects have their participant image displayed on a first screen of images while all other call participants have their participant image displayed on a second screen of images. In this example, when the call progresses to the second presentation slide the "project funding" tag could prompt the call platform software to now highlight participants with a job title containing the word finance, and move the architects on the call back to the second screen.

In another embodiment, when a user on a call shares a screen which contains text, the call platform software could use software to process the text to find any names that match the names of current call participants. When there is such a match, the image associated with that name is highlighted in some way for other call participants to see. In some cases, multiple call participant name matches may occur, resulting in more than one participant being highlighted. In another example, a shared document might be found to mention a technology that is a skill associated with a current call participant. For example, the shared document might mention "microservices architecture." The call platform software could search an employee database at the central controller to find any employees with that expertise who are currently on the call and highlighting them if they are on the call.

Participant View Controls

In some embodiments, call participants can take direct actions to manage the participant view of participants on a call in a way that enhances the user's call experience.

In various embodiments, call participants could be provided the ability to move participant images around during a call, ordering and placing the images in a way that is most beneficial to the user. For example, the user could click on a participant image and drag that image to a new location. The user could drag multiple participant images to form a circle, with the new image locations stored in an image location field of a participant database stored with the central controller or call platform software. This stored set of image locations forming a circle could be associated with a keyword such that the user could, upon the initiation of subsequent similar calls, type in the keyword to retrieve the desired locations and have the current participant images placed into a circular arrangement. A user could also double click on a participant image to remove it, gray it out, make it black and white, make it more transparent, eliminate the background, or crop it (such as cropping to non-rectangles such as circles or ovals), or make the image smaller.

In some embodiments, call participants could alter the visual appearance of individual video feeds in the participant view—for instance cropping a video feed to focus on an individual's face, increase the brightness of particular feeds, or use other forms of video signals processing to create a customized experience. Call participants could apply filters to individual video feeds or to attributes of video feed frames such as the size or color of frames.

In another embodiment, a user is able to create and store a preferred layout of participant images for all calls that the user participates in. For example, the user might store in an employee database 5000 of the central controller 110 that the user wants to see participant images sorted by seniority for all calls with 15 or fewer participants, but the user wants to see participant images sorted by functional areas when the call contains more than 15 participants. Users could also be enabled to copy the view of another participant on the call, such as by copying the view currently being used by the user's boss. When a user is part of a larger team, such as an Agile software team, the user's default participant view setting could bring all images of team members into one section of the screen, or the images could be larger or highlighted in some way. Members of one team who are currently on a call could have digital assets used to associate them with that team. For example, each team member present could have a blue hat added to their participant view image, or a team logo could be applied to a background area behind each team member. The team name could be added to the background as well.

In some embodiments, programmable standard view buttons (such as View 1, View 2, View 3) could be used to allow the user to be able to toggle between several participant view options. These three view buttons could be included in the user interface of the call platform software. Alternatively, the three views could be selected by the user by pressing one of three function keys on a keyboard, or with a series of rapid clicks of a mouse button which are transmitted to the call platform software.

In various embodiments, participants can manage their participant view and/or modify their view of the participant view. A manager or meeting owner could set participant view controls, preventing participants on a call from changing the view, or preventing participants from changing certain participant view options.

In some embodiments, the layout of a participant view could be the same when call participants return to the meeting. For example, a weekly marketing meeting could have the same participant view image order at the start of each meeting. In addition, objects created in last week's marketing meeting could persist when the marketing meeting this week is initiated. For example, the prior week might have had a ranking of ten projects that was not completed by the end of the meeting. When the marketing meeting is initiated this week, the ranking of the ten projects from last week's meeting could be shown on screen along with the participant view images, allowing the current week meeting to quickly pick up where they left off and finish the ranking of the ten projects.

In embodiments where a user alters the layout of the participant view image, that alteration could be reflected in the participant views of all other call participants, of a subset of call participants (such as only tech leads and developers), or none of the other call participants.

In some embodiments, participant view changes could reflect the majority opinion of call participants. For example, participants could each select a preferred participant view, but the most selected participant view is then implemented for all participants.

In some embodiments, call participants could be paired or linked with another participant via a visual indicator such as a line, arrow, node connector, etc. Participants could link themselves together or could be linked based upon teams, functional areas, prior work history, etc. Individuals could toggle on/off different link overlay types. If participant views are rearranged, links between paired participants could be persistent. Participant views could be rearranged based upon link clusters, showing groups of individuals with pairings.

Call participants could have "assigned seating" for calls. For example, a group of 12 executives might have a one hour operations review meeting each week. The participant view is set to three rows of four participant images each, and each participant has an assigned position which is stored at the central controller. The VP of Finance could be assigned to the position in row 2, column 1. Her image automatically appears in that position each week, and no other alteration to the participant view is allowed. Participants who can't make the call would have an empty space or some other placeholder in their assigned position. Such assigned seating would add a sense of permanence and enable the call participants to be able to more quickly find other participants in the participant view.

In another embodiment, individuals could be placed in a "hot seat" and their participant view is centered or enlarged.

In another embodiment, users could pick a participant view grid location when they join a meeting. For example, a user might be the first to join a call and be able to select from one of 12 participant view image locations. The location chosen could allow for the kinds of social dynamics that are seen in physical meetings, like a user who wants to sit at the head of the table, or a student who wants to sit in the front row of class. In another embodiment, users could see the order in which other participants joined the call, either by allocating participant image slots in order of entrance or through a visual indicator (such as "arrived early/late" or arrival order shown numerically.) Individuals could reserve a participant image slot for another participant so they always appear next to each other.

Figure 115:
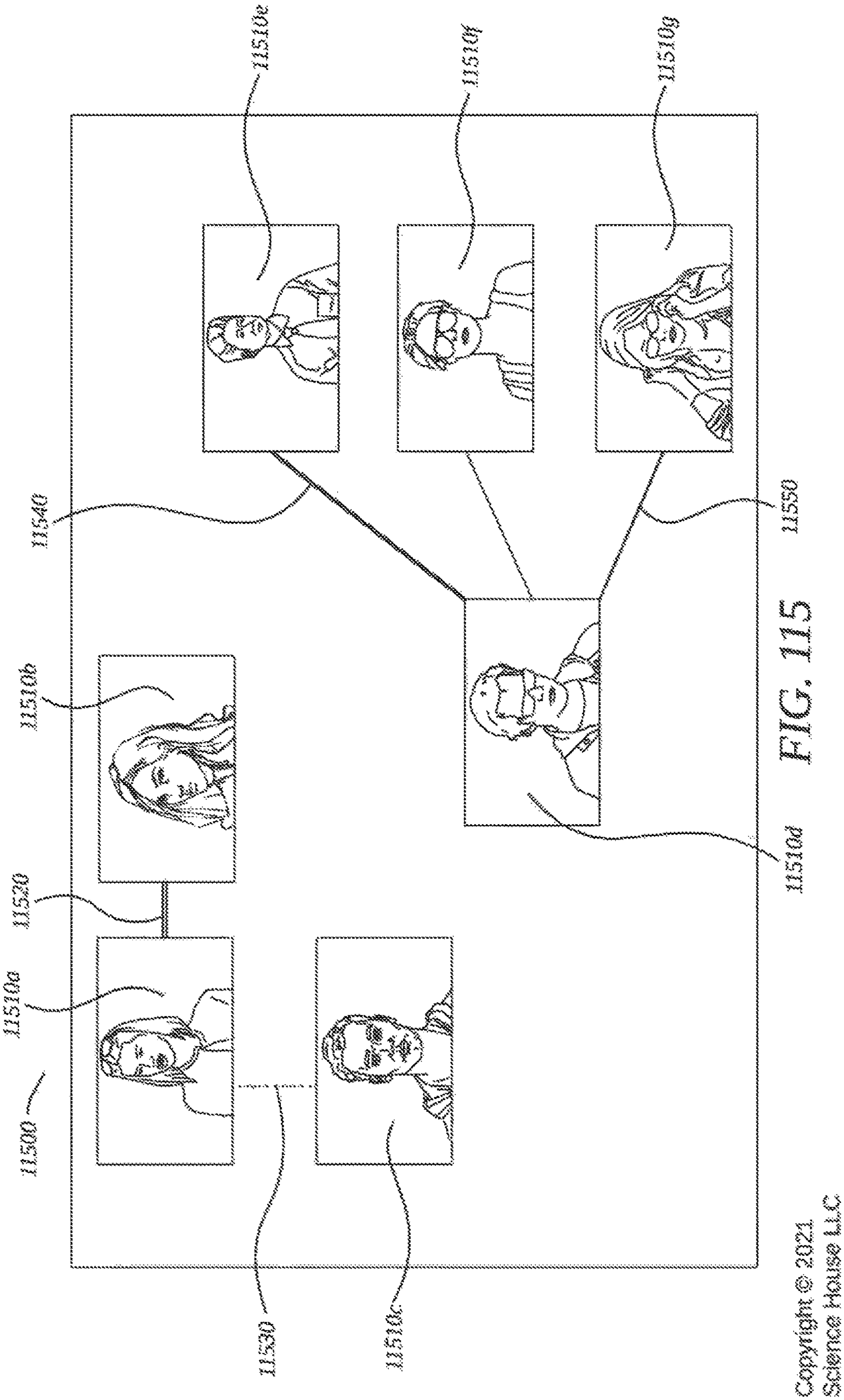

Other types of participant view structures could be used, such as a three dimensional arrangement in which call participants could rotate or spin around the participant images. With reference to FIG. 115, a call platform app view 11500 is shown which illustrates a participant view structure which is two dimensional, but more fluid than the typical rigid grid of call participant images. In this embodiment, a social graph is created of the call participants that reflects the strength of the connection between the participants. The connections are represented by stretch lines, and the participant images can be moved around—with the connected participant images being pulled along as well. Call participants 11510*a* and 11510*b* are shown connected by double line 11520, which may indicate that they work on the same team, work on the same building, share an expertise, etc. Call participant 11510*c* is connected to call participant 11510*a* with a dotted line, which may indicate that they know each other but are rarely on scheduled calls together. Call participant 11510*d* has no links to call participants 11510*a-c*, which may indicate that there is no prior working relationship between them. Call participant 11510*d* is linked to three other call participants (e.g. they are on the same team, they report to him, they have worked for him in the past) 11510*e-g*, with the thickness of the connection lines indicating how strong the connection is. For example, connection line 11540 indicated a stronger social connection than connection line 11530. Having a visual indication of social connections can provide much needed context to the work content of calls.

Individuals could control aspects of the participant view to increase accessibility for visually impaired users. Individuals could alter settings to ensure adequate color contrast, size, and usage of color. Individuals could choose to increase the size of speaker participant images, zoom in/out of presentation materials, or apply color filters/overlays. Certain functions could be controlled by voice command to increase accessibility.

Participant Image Supplemental Information

In some embodiments, call participants could be enabled to type notes during a call as to what they are thinking, such as their opinion about the current topic of the meeting or their confidence level in the plan currently being discussed. This information could be transmitted from the user's computer to the central controller 110 where it would be made available to the call platform software. The call platform software could then allow other meeting participants to click on the image of the user to see his or her thoughts. For example, a meeting participant could click on the image of the user and see it flip over, revealing a text area behind the user's image revealing the thoughts typed in by the user or statistics about the user determined by the central controller. This would enable participants to see what other participants are thinking without having to potentially disrupt the flow of a call conversation by verbally asking a question. In another example, the user types up notes about what he is thinking during the call, but his notes are overlaid onto his participant image so that anyone on the call immediately sees it.

In some embodiments, text generated by the user could also be displayed on the background behind the user's image. For example, the user could create a background image (stored at the user's computer or at the central controller) that included a digital representation of a poster behind him. The user can then type some text, send it to the call platform software, and have the text displayed on the poster in the background image.

Figure 110:
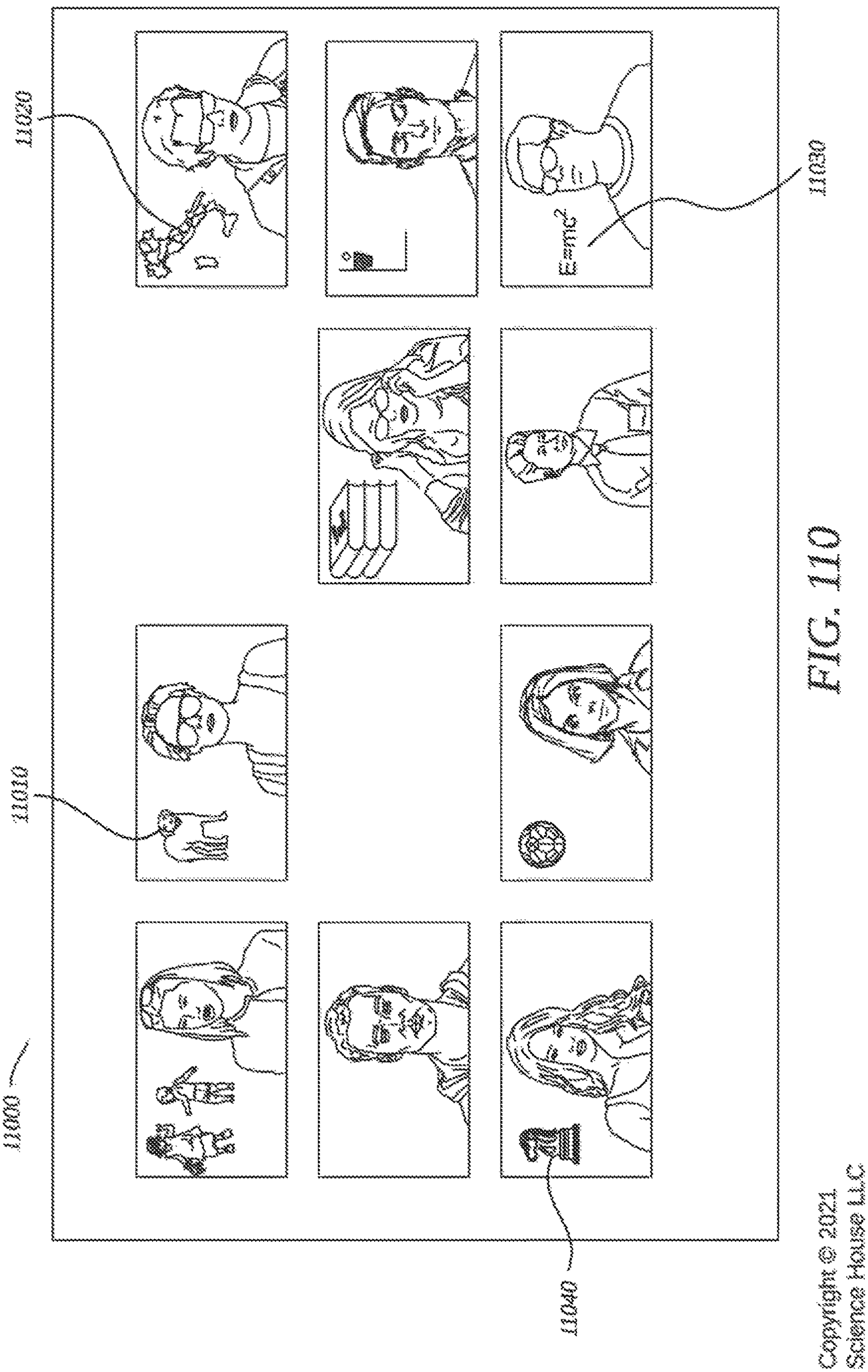

With reference to FIG. 110, a call platform app view 11000 is shown which illustrates ways in which a user may customize their background. In various embodiments, users could place images which reflect the personality of the call participant. For example, users might display images such as dog 11010 in order to help initiate a conversation with another employee that they do not know well who also has a dog. An image of a map of Italy 11020 could also serve as a conversation starter and/or indicate international cities in which the employee has done sales work on behalf of the company. Personal interests such as chess 11040 and equation e=mc squared 11030 may be added to a background by a user, or in some embodiments be stored with central controller 110 so that they can be set as default images. In other embodiments, such user images are visible only during the first five minutes of a call as a way to encourage casual conversations before the main work of a call begins.

Figure 111:
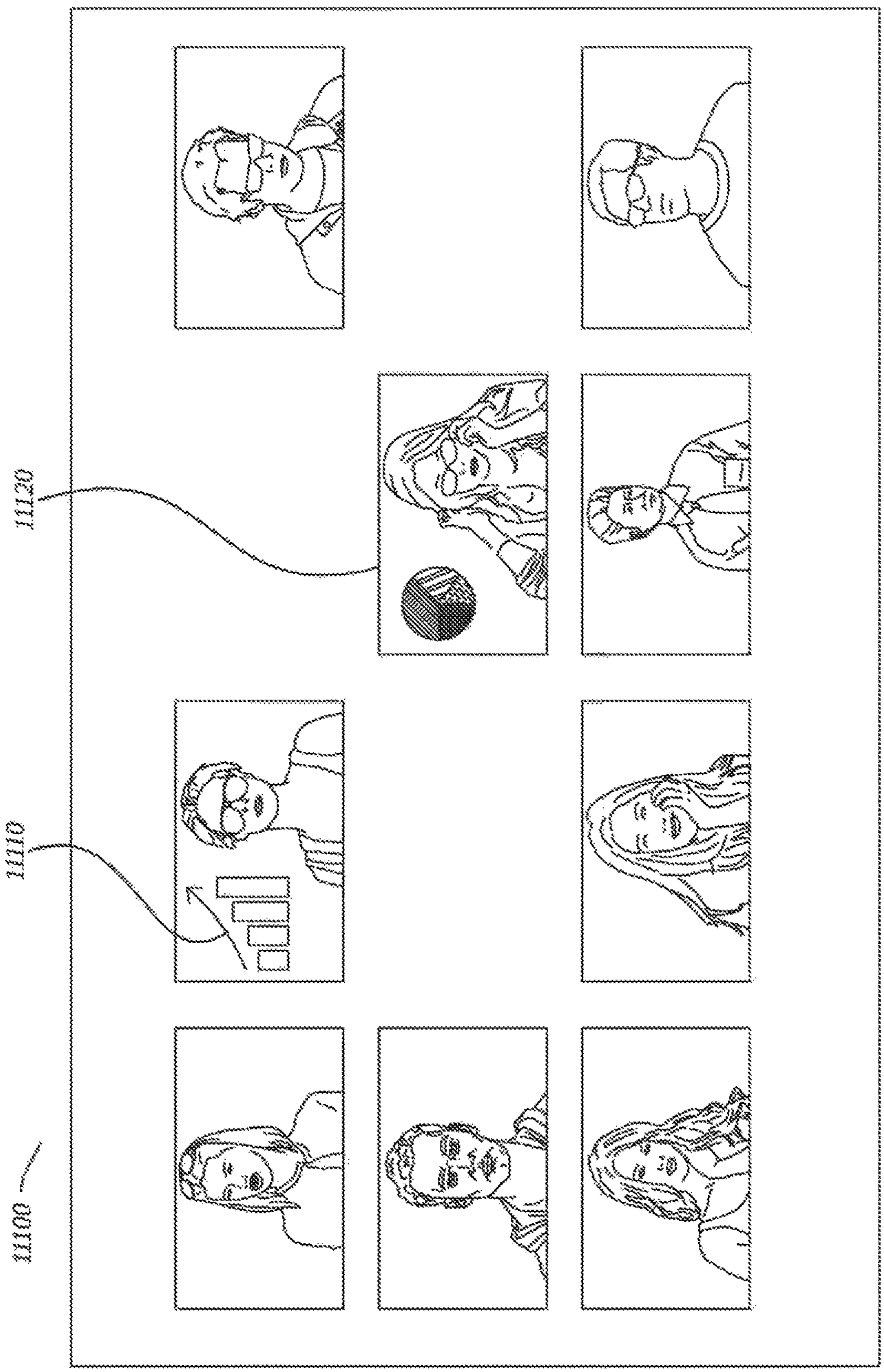

With reference to FIG. 111, a call platform app view 11100 is shown which illustrates additional ways in which a user may customize their background. In various embodiments, users are able to display images associated with projects in order to inform other call participants. In this example, a sales chart 11110 and a pie chart 11120 may provide data useful to a call, and help to keep a call focused on key agenda items. In some embodiments, a meeting owner may cause such images to be displayed in the backgrounds of one or more call participants as a means of motivating those participants to lead a discussion around the information displayed. In other embodiments, elements of a presentation slide may be shown in the background of call participants (e.g. a meeting owner tags elements of a presentation file prior to a meeting and those tagged items are distributed to the background of one or more call participants).

Figure 112:
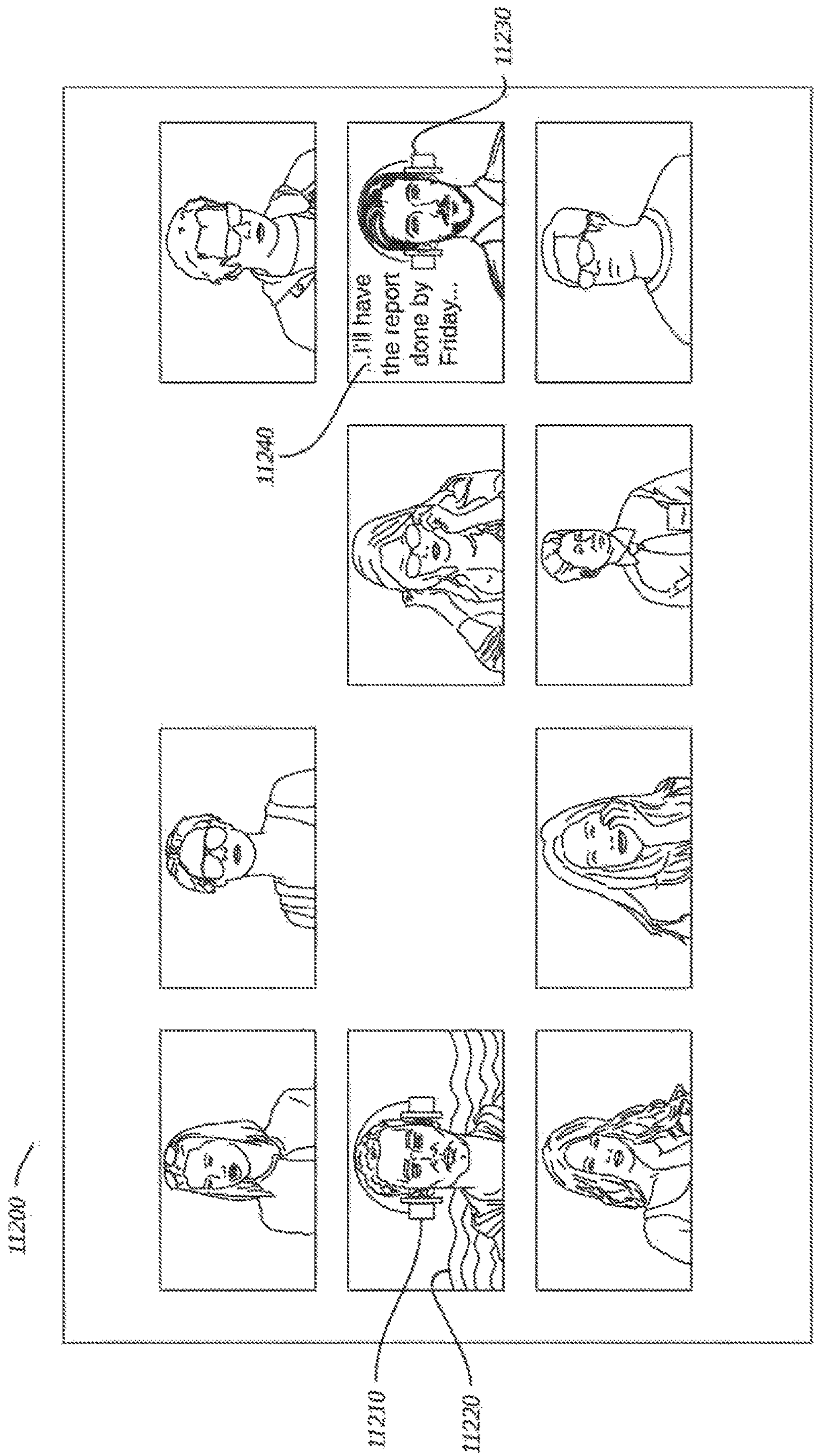

With reference to FIG. 112, a call platform app view 11200 is shown which illustrates ways in which a user may use data from a peripheral device (e.g. headset, mouse, keyboard, camera, presentation remote) in order to customize their background. Instead of putting up a photo as a virtual backdrop behind the call participant, the user could use his headset 11210 to create a dynamic background that could entertain or inform other call participants. For example, the backdrop behind him could show a digital representation of water 11220, and when he turns his head to the left an accelerometer in his headset sends a signal to the call platform software to move some of the water to the left in a wave-like motion. In another embodiment, the user might speak into a microphone of the user's headset 11230, with the audio signal being processed by the processor of the headset with speech to text software. The resulting text 11240 ('... I'll have the report done by Friday ...') could be displayed in the background of the user. Such an embodiment might be advantageous for other call participants who are hard of hearing or are in a noisy environment. In some embodiments, transcribing a participant's voice allows a user whose network signal is weak to end the video connection to save bandwidth and send just the transcribed text back to the call platform for viewing by others on the call.

In another embodiment, the user creates small drawings or doodles using a mouse that is wirelessly connected to the user's headset. The headset then sends these images to the call platform video feed so that they appear in the background of the participant during a video call. Users could create a "thought bubble" to the right or left of their image on a call. Alternatively, the user could do a drawing but have it overlaid on top of the image of another call participant's head. For example, the user could sketch a pair of eyeglasses to appear on the face of another call participant.

Supplemental information provided by a user to be displayed according to one or more of the above embodiments could include information such as team affiliation, functional area, level, skill sets, past work/project history, names of their supervisors, etc. The information could also include what the user is currently thinking (e.g. they want to respond to the last statement). In another example, a meeting owner could assign roles to call participants during the call, with those assigned roles appearing as supplemental information such as by adding a label of "note taker" below a call participant's image.

In some embodiments, supplemental information could include dynamic elements, such as showing a user's calendar information or current tasks that they are working on. Other dynamic supplemental information could include statistics around the meeting, such as the current average engagement level, percentage of agenda items completed, number of current participants, etc. This dynamic supplemental information could be about an individual, such as showing the user's current engagement level, talk time, number of tags placed, number of agenda items completed, badges received, etc. Additional information could also include social information that could help other call participants get to know a user, or as an icebreaker at the start of a meeting. For example, the user might provide names of children and pets, favorite books, games played, sporting activities, and the like.

In one embodiment, the meeting owner asks call participants in a brainstorming session to provide ideas to the call platform software such that the ideas are overlaid onto the participant view image (or hidden behind the participant view image) of each call participant.

To motivate call participants to read supplemental information provided by other call participants, a user could be rewarded with a prize by clicking on a randomly selected participant view image. For example, the call platform software could randomly select the participant image of one call participant from all 30 of those call participants. A prize could then be associated with this participant image, such as a free lunch in the company cafeteria. Once this is complete, call participants would begin clicking on other user images in an effort to find the winning image, with the first person clicking on the randomly chosen image declared the winner of the free lunch. In such a way, users could be introduced to supplemental information.

USER ALTERATION OF OTHER PARTICIPANTS' IMAGES In Addition to Changing the Look of the user's participant view image, various embodiments can also allow a user to control the look of another participant's image.

Users could alter the images of other participants on a video call, flipping the images upside down or sideways, or invert the image right to left. Such alterations could be done to appear only in the call video feed that the user sees, or in the call video feed that every call participant sees.

ALTERNATE USES FOR PARTICIPANT IMAGE SPACE While the participant image locations are normally used for images/video of call participants, that digital real estate can in some embodiments be used for other purposes.

Participant image locations could be assigned based upon individuals who were invited to the meeting or based upon team or project staffing. Individuals who do not join the call keep an empty image slot location or are represented by a picture of the missing individual. Vacant or still images of non-participants could serve as indications of people who may have information relevant to the meeting or who should be tagged with workstreams. The individual's image could be tagged.

A participant image location that is not being used, such as when a call participant leaves the call, could be used to play a corporate video. For example, a CEO might record a number of one or two minute videos that describe the mission and goals of the company. These videos could be set to play in unused participant view locations at times during the call when engagement levels are low, or during breaks.

The participant image location could also be used to display text, such corporate goals. This could be stationary text, or scrolling text that scrolls off the bottom of the participant view image.

In another embodiment, the participant image could display the image of a user currently on another virtual call meeting. For example, a call participant from another meeting might accumulate a large number of positive tags while talking in that meeting, and thus her video stream could be identified as one that should be shared with participants in other meetings.

VISUALIZING CONNECTIONS BETWEEN CALL PARTICIPANTS In addition to changing the look of the user's participant view image, various embodiments can also allow a call participant to see the ways that call participants are connected, revealing information that could help to enhance the effectiveness of the meeting.

In some embodiments, by retrieving information from an employee database 5000 stored at the central controller 110, not widely known connections between people in a meeting can be made available to call participants. For example, a user could click a button that says "show me people who currently work in building H5", with the call platform software highlighting those people by coloring their border blue. Another example would be a button saying "show me people on the call who went to college together" or "increase the image size of anyone who attended the University of Chicago."

In another embodiment, a user could request that the participant image of anyone who worked on a particular project anytime over the last three years be moved to the left. In another example, the call platform software could identify all call participants who had worked together successfully over the past six months, perhaps connecting those participant images with a purple line.

Call participants who grew up together, play on a sports team together, or who have the same hobbies could be identified on the call.

Call platform software could use information from the central controller employee database table 5000 to determine the names of call participants who are often quiet on calls in which they attend together.

Participant Image Visual Communication

There are times on a call when a user would like to communicate with another call participant, but the number of participants makes that difficult to do without waiting for an opportunity to speak.

In various embodiments, a user is able to communicate via their participant image while on the call. For example, a user could double click on their participant image in order to have the image border flash three times or change color in order to quickly get the attention of other call participants. In another example, the user could communicate by changing their participant image border color to red if they would like to make a candid statement or green if they are feeling very in tune with the other participants.

In another embodiment, users have ways to poke/nudge or prompt another participant. For example, the user could click on a call participant and a spotlight shines on the participant image of that participant, or the "lights" dim. Curtains could open or close. A user could get the attention of another call participant by throwing a virtual paper airplane at the participant view location of the call participant. This could be done in secret or seen by all participants. For example, one call participant might want to prod a second call participant to speak or to pay attention. The airplane could include a written message with a note to smile more or speak more loudly. It could include a request that the second call participant change their tone (e.g. bucket of water is splashed on them when they need to take a breath and chill). A user could let a call participant know that they have made their point and are overselling, or let them know they are being too informal (such as by putting a virtual tuxedo on them).

In various embodiments, a participant has a set period of time to speak in which no airplane can be thrown at him, no water poured on him, etc. However, once the participant exceeds the period of time, others can begin to prod the participant with airplanes, etc. In various embodiments, the longer a user goes beyond the set period of time, the more that other users are able to prod the user. For example, the user initially has five minutes to speak. If he is still speaking after five minutes, there may be up to two airplanes thrown at him in the next two minutes. Beyond those two minutes, users may throw an unlimited number of airplanes at the speaker. This may serve to pressure the speaker to stop talking once he has spoken for a reasonable amount of time.

In various embodiments, a participant may have a shield or other defense to airplanes, water and/or other prodding. The participant may earn such a shield by receiving positive tags, through other good performance, by virtue of his rank, status or stature, and/or for any other reason.

In various embodiments, when there is frequent and/or excessive communication between two participants (e.g., in the form of airplanes thrown back and forth, or in any other form), the two participants may be "separated". For example, participant images/videos of the two users may be placed further apart within the participant view (e.g., at opposite ends of the participant view). In various embodiments, the two participants may be Highlighted and/or featured more prominently, such as by being moved to the top of the participant view. In this location, the two participants may "battle it out", such as by exchanging a barrage of airplanes, thrown water, etc.

Users could put a costume on themself (or others), such as a referee outfit or the powdered wig of a judge.

Figure 117:
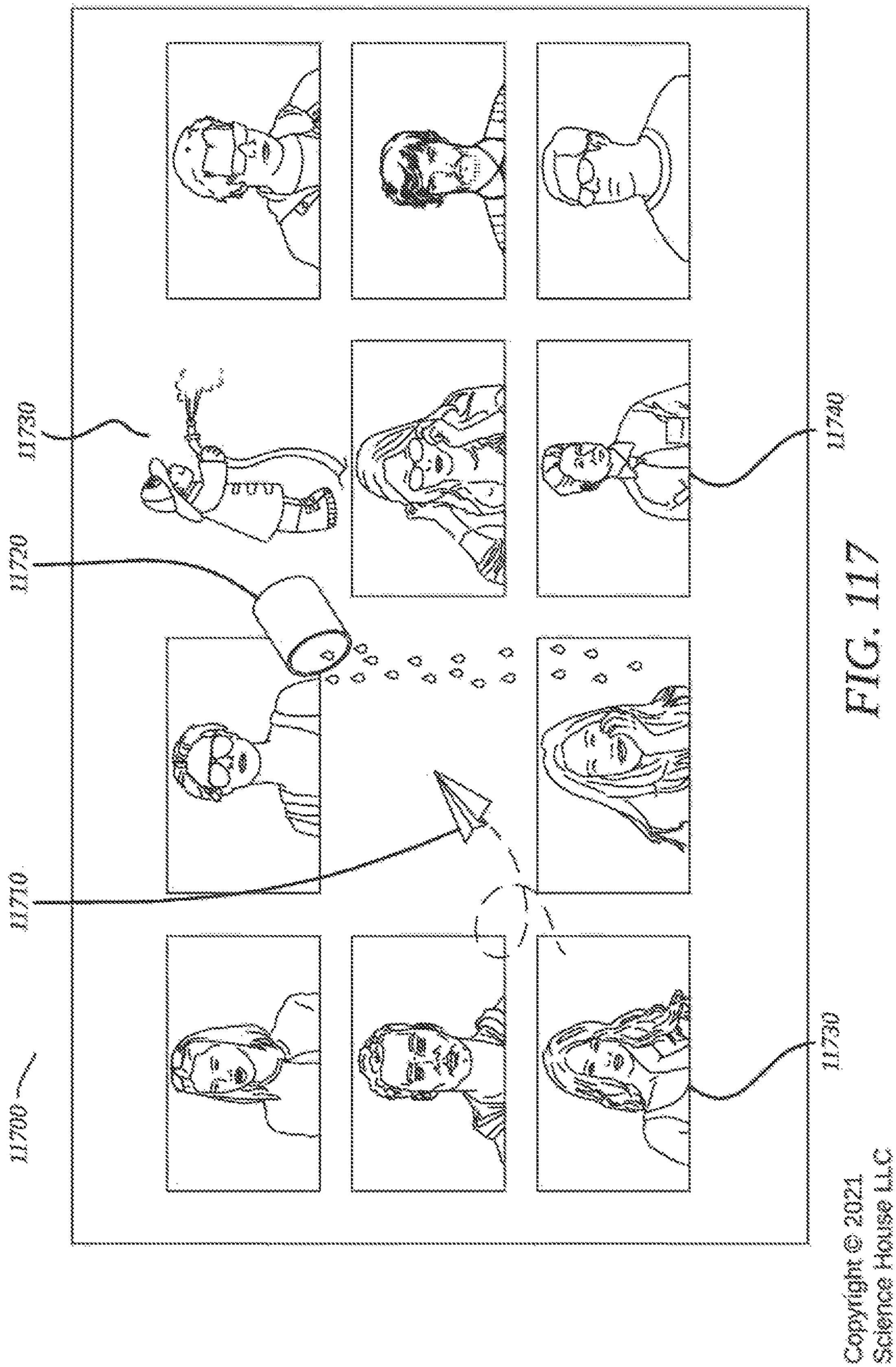

With reference to FIG. 117, a display 11700 of call platform software from an app used by meeting participants according to some embodiments is shown. As depicted, call participants are interacting in various ways, such by transferring graphical display elements (e.g., a paper airplane 11710, water 11720) between one another. For example, participant 11730 has launched a paper airplane destined for participant 11740.

Fireman character 11730 may represent a participant (e.g., it may be a chosen avatar for a participant). In various embodiments, fireman character 11730 is a system generated character. The fireman may be hosing a participant, e.g., to indicate to the participant that he is speaking too much.

In various embodiments, a first participant who chooses to interact with another participant may select from a set of available graphical elements (e.g., on a menu, on a separate screen, etc.; e.g., by typing in the name of a desired element; etc.). In various embodiments, available elements are dependent on the relationship between the two participant feeds (e.g., the spatial relationship). For example, a first participant in a first feed may only access water to use on a second participant whose feed is located spatially below the feed of the first participant.

In various embodiments, a participant may select a counterparty to an interaction (e.g., a recipient, object, victim, partner, etc.) by clicking on the feed of another participant and/or by otherwise selecting another participant. In an interaction amongst multiple parties, a participant may make multiple selections of other participants.

Various embodiments may place restrictions on interactions. For example, a first participant cannot interact with a second participant who is presenting. For example, two participants may not interact more than a predetermined number of times in a meeting. Any suitable restrictions and/or rules governing interactions may be used.

In various embodiments, the user employs degrees of blurring of their face during a video call. For example, a user just waking up might not want other call participants to see that their hair was not combed and elect to blur out their image somewhat, or elect to blur out just their hair.

Social Calls

Social calls may have different behaviors and norms than business calls, and various embodiments can be applied here as well.

In one embodiment, a meeting owner could manage a call with two families, but have the participant view arranged such that one family is shown on the left and one is shown on the right. Tags could also be made available for call participants to tag elements of the call.

If participants are having trouble being candid, the meeting owner could bring on an elephant character into the participant view of the call.

Simple decisions like where a group wants to go to dinner could be made easier, in various embodiments. For example, call participants could add restaurants into a shared space of the call and tags which could be used by software to employ voting protocols to determine the best restaurant.

Non-player characters could also help with parenting. Parent's could license their kids favorite characters, and use those characters in an educational call so that kids take the lessons more seriously.

Object Persistence

In some embodiments, objects that are created during a meeting could have some persistence from one meeting to the next.

A user could employ digital coins with storable information. For example, the user could toss a digital coin to a call participant which would add action items to that call participant or add a meeting to their calendar (for example, the digital coin could include information from a meeting invite .ics file). The coin could get passed along from one call participant to another. Puzzle pieces could be provided to multiple call participants that include sub-tasks that fit together into a larger task.

Objects on the screen with the participant views of all of the call participants could include a visual representation of time ticking down (e.g. a clock symbol), a category view of tasks on a sidebar, a visually changing meeting appearance depending on task status, and a capability to spawn another meeting by clicking on a button or selecting from a list of meeting types.

Ghost Images

When working with multiple software programs or visual interfaces during a meeting, a user might not have enough screen space to have the call platform and other necessary software open at the same time. Additionally, the call platform in participant view might not have enough space to display all necessary meeting content. Various embodiments could enable a "ghost mode" or a transparency mode to allow elements of the digital meeting environment to be semi-transparent and composited on top of other displays.

A user could specify behavior for the call platform when the software interface is minimized or reduced in size to a small portion of the screen. When "ghost mode is active" a subset of users or the current speaker could be placed into a semi-transparent viewing mode that allows the call platform window to be overlaid on other software interfaces. The ghost interface could be adjusted in size and repositioned to allow the user to see the call and use other software at the same time. For example, while working on a shared document with another user on the call, a transparent image of the other user could be displayed superimposed on the shared document.

Other semi-transparent or ghost images, graphics, videos or other visual content could be composited into the participant view, such as a watermark, a word or image, a graphic, etc. For example, a meeting owner could insert the meeting goal as a "ghost" overlay in the participant view to remind participants of why they are meeting.

An avatar representing the aggregate engagement level or the emotional state of participants in the meeting could be composited in ghost mode to display these metrics without distracting from the meeting.

Hovering a mouse over a digital artifact in ghost mode could change the transparency from semi-transparent to non-transparent.

Game Playing

Call participants are sometimes bored, and some calls can stretch into lasting the better part of an entire day. Participants sometimes need an uplifting break for a burst of energy, or a creative spark to get them thinking in a new direction.

Games could be facilitated to entertain users on a call or serve as a warm up exercise. The call platform could prompt everyone at the start of a call to say a word that begins with "R." Or the call platform randomly picks a first user and requests that they say a word or sentence beginning with the letter "A", and then picks a second user at random to start a word or sentence with the letter "B", and so on until "Z." In an improv game of Count to Twenty, users could start by shouting out the number 1, then 2, then 3, etc. But if two users say the same number at the same time, the platform determines that a word collision has occurred, and the users have to start back at number 1. A non-player character could introduce the rules to the users.

Games could also be played using some or all of the participant view images. For example, a user could challenge another call participant on a break to a game of Tic Tac Toe using the participant images. The call platform software could identify a grid of 3×3 call participant images, and then the first game player clicks on a user image and the call platform software places an "X" over that image. The second game player then clicks on another image and an "O" is placed over the image. If one player wins, the call platform software could provide a special trophy image for that user's background for the remainder of the call. In a similar manner, large calls might even accommodate a game of chess. Card games could also be played. For example, two participant images from the participant view might be a first player's initial hole cards in a game of Texas Hold'Em, with the first player clicking on the two participant images which then flip over to reveal the two card values. Five participant image view locations could be used for the flop, turn, and river.

Avatar Management

Video conferencing calls often allow participants to decide to enable a video feed of themselves if they have a camera, or they can have a still photo of themselves to represent them, or they can have a blank representation—typically with only a name or telephone number shown. There are situations, however, when a user would like a greater amount of control in how they are represented in a video call.

In various embodiments, a user can create a cartoon character as a video call avatar that embodies elements of the user without revealing all of the details of the user's face or clothing. For example, the user could be represented in the call as a less distinct cartoon character that provided a generic looking face and simplified arms and hands. The character could be animated and controlled by the user's headset (or a webcam of the user's computer detecting head movement). A user might create a cartoon character, but have his headset track movement of his head, eyes, and mouth. In this embodiment, when the user tilts his head to the left an accelerometer in his headset registers the movement and sends the movement data to the headset's processor and then to the call platform software which is in control of the user's animated avatar, tilting the avatar's head to the left to mirror the head motion of the user. In this way, the user is able to communicate an essence of himself without requiring a full video stream. The user could also provide a verbal command to his headset processor to make his avatar nod, even though the user himself is not nodding. One of the benefits to using an avatar is that it would require significantly less bandwidth to achieve (another way to reduce bandwidth used is to show a user in black and white or grayscale). The user's headset processor could also use data from an inward looking video camera to capture movement of the user's eyes and mouth, with the processor managing to send signals to the central controller or directly to the call platform software to control the user's avatar to reflect the actual facial movements of the user. In this way, the user is able to communicate some emotion via the user's avatar without using a full video feed.

Users could select an avatar to represent them on calls. For example, a very reserved and deliberate person might select a turtle to represent them—instantly communicating a lot about that participant. When a call is initiated, a participant seeing mostly turtle avatars would then quickly realize that it may be a challenge to get people talking. Conversely, a call with a preponderance of tasmanian devil avatars would be a signal that a lot of facilitation may be required to keep the conversation focused on the agenda. In another example, the central controller assigns avatars to call participants, which could be done based on participant ratings stored at the central controller.

Rather than reflecting one user, an avatar could represent an entire team. Team status could also be represented by an avatar or a digital object of some kind. For example, a team with a project falling behind schedule might have a red status illustrated by a sick character, while a team that is on track to meet deadlines is represented by a strong and healthy character.

Team progress toward goals could be represented by an object such as a thermometer or a car moving along a road or map. Team goals could be represented by avatars, characters, or objects. For example, a team goal of cutting the defect rate in half might be represented by a carton of half and half milk.

Objects, like a departmental goal of increasing sales by 20%, can have a status illustrated by a character, mood, or dashboard. In one embodiment, the object requires input to keep it alive, e.g. in a decision making meeting you have to add strengths and weaknesses to make the object thrive.

In another embodiment, the user headset includes detachable sensors that can be clipped to the clothing of the user in order to incorporate whole body movements into the control of the avatar. For example, the user might clip one sensor on each leg and one sensor on each arm. These sensors would provide position data with Bluetooth or WiFi to the user's headset processor and to the call platform software so as to generate the user's avatar to reflect the arm and leg motions of the user. For example, this would enable the user to be able to raise his right arm during a call and see his avatar raise its corresponding right arm as well. By employing a larger number of sensors, the user could enable the creation of an avatar with a greater level of position control.

The user's avatar could be created to look something like the user, such as by matching the user's hair color, hair style, color of eyes, color of clothing, height, etc. Clothing color could be picked up by an inward facing camera of the user's headset, transmitted to the central controller for storage in a user database, and reflected in the clothing color of the user's avatar as it appears in the participant view image of the call platform software. Users could also have several different avatars, selecting the one that they want to use before a call, or switching avatars during the call. Alternatively, the user could define triggers which automatically change his avatar, such as changing the avatar whenever the user is speaking. The meeting owner could also change a user's avatar, or even substitute one of the meeting owner's avatars for the one that the user is currently employing.

Avatars could be licensed characters, and could include catch phrases or motions that are associated with that character.

Users might have one avatar for use in business calls, one for game playing, another avatar for use in school online lessons, and another avatar for video calls with friends and family. The user could also deploy his video game avatar while participating in a non-game video call with friends.

Avatars could also be used as ice breakers in video meetings. For example, a user might have an avatar that can add or remove a college football helmet of his alma mater. The owner of the call might also be able to add a helmet to each meeting participant based on their alma mater. The user could have a separate avatar for his dog which appears whenever the dog begins to bark.

An avatar with controllable facial expressions or a simplified representation such as changeable emoji could be displayed in the participant view to represent the aggregate feeling of meeting participants or a subset of participants. On a large call, teams or groups of individuals with shared attributes could be represented by a shared avatar. The team leader or an aggregation process such as averaging or voting mechanism could control the expression.

Individuals could be shown how they perceive themselves compared to how meeting participants view that individual. For example, individuals could choose from a set of characters to represent themselves and then others could choose a character that they believe represents that individual. The individual could then be shown the group response to gauge self-awareness.

Meeting owners could assign individuals to avatars prior to the meeting or during a meeting to help participants embody a particular role or viewpoint during a meeting.

Avatars and other visual objects could be used to show individuals the aggregate mood in a meeting or to induce particular emotional responses, for example to break tension and introduce levity. For example, when interactions between individuals become tense, cartoon weather could appear to demonstrate that the meeting is "frosty." Other digital objects such as a boiling kettle, tachymeter, thermometer, avalanche, a steam engine could represent meeting progress or momentum. During a decision making meeting, a tug of war rope could appear between visual indications of two options and move depending on a vote, discussion, etc.

Non-Player Character Management

While call participants are used to dealing with photos and videos of other call participants, along with the occasional backdrop image, various embodiments provide options for far greater interactivity and creativity in the way the traditional video call participant looks.

In one embodiment, call platform software is enabled to allow non-player characters to move about in a participant view of call participants. For example, a non-player character could be a cartoon image of a sheriff which shows up randomly on the backdrops of users in a video call. For example, a user might have a video feed of himself displayed to all of the other participants on a video call when the sheriff character shows up next to the image of the user. These non-player characters could appear on some user backgrounds but not others. They could be programmed to only show up during breaks or in between agenda items when users are looking for a moment to have fun and relax.

In another embodiment, two non-player characters could interact with each other. For example, a sheriff character and a thief character might show up in the backgrounds of two different users. The sheriff character then throws a lasso over to the thief character and reels him into the background in which the sheriff is currently positioned.

Non-player characters could add some fun to calls, but could also serve useful roles on a call and could help to improve the behaviors of users on the call. For example, a librarian character could show up in the background of a user who seemed to have forgotten to go off mute, with the librarian character telling the user to be quiet. The participants on a call could have the option to double click on the image of a participant who they think should be on mute, summoning the librarian character to appear and give a warning to the offending user. In this way, a light hearted and anonymous measure can be taken to improve call behaviors.

Non-player characters could also be associated with particular roles on a call. For example, the call owner could have a dragon character by the side of his video image as a reminder to the rest of the users that he holds a lot of power on the call. A character with a wooden hook could "pull" a user out of a participant frame when they speak too long.

Non-player characters could be used to amplify or exaggerate the emotional state of a call participant, such as by having a devil character appear next to the image of a user who has been speaking loudly.

These characters could appear to walk by, appear behind a user, or peak out from behind the participant image of a user.

Characters could be used for building engagement levels, such as by having a King Kong climbing around the participant view area from one user image location to the next.

Examples of non-player characters include a Sheriff (who might appear when the meeting is drifting away from the agenda), Barkeep (when someone is listening and fully engaged according to that user's headset), Villain, a person in distress (for a user who is struggling with the call software), Firefighter, Trickster, Snake oil salesman, Time keeper, round keeper, Master of Ceremonies, DJ, Boxing announcer, Messenger (when one user wants to initiate a sub-channel communication with another user), Ambassador, etc.

Non-player characters could also be licensed characters that are purchased from the central controller. Examples include cartoon characters, movie characters, comic book characters, book characters, science fiction movie characters who can have laser battles during a call, and the like. These licensed characters could also have associated sound bite catch phrases or short video clips of licensed content.

Appearance of non-player characters could be determined by a vote of the call participants, or an appearance could be triggered by the request of a single call participant. In another embodiment, a user not currently on the call could initiate the appearance of a character to explain why the user was late for the call.

These characters do not have to be characters. In one embodiment, the non-player character is a lightning strike that hits a call participant who was identified by the meeting owner as having a good brainstorming idea. There could be a conch shell object that a user "hands over" to another user when the first user is done talking.

Non-player characters can interact with user images, such as a firefighter character pouring water on a user who has been talking for more than five minutes continuously.

Non-player characters could be awarded to call participants for tagging content, taking notes, helping others on the call, being supportive, or encouraging a shy participant to speak up. Meeting owners could also award participants coins for good behavior, with users buying non-player characters with those coins.

In one embodiment, call participants could buy a subscription to licensed characters, or buy clothing that would trigger the appearance of non-player characters.

Figure 120:
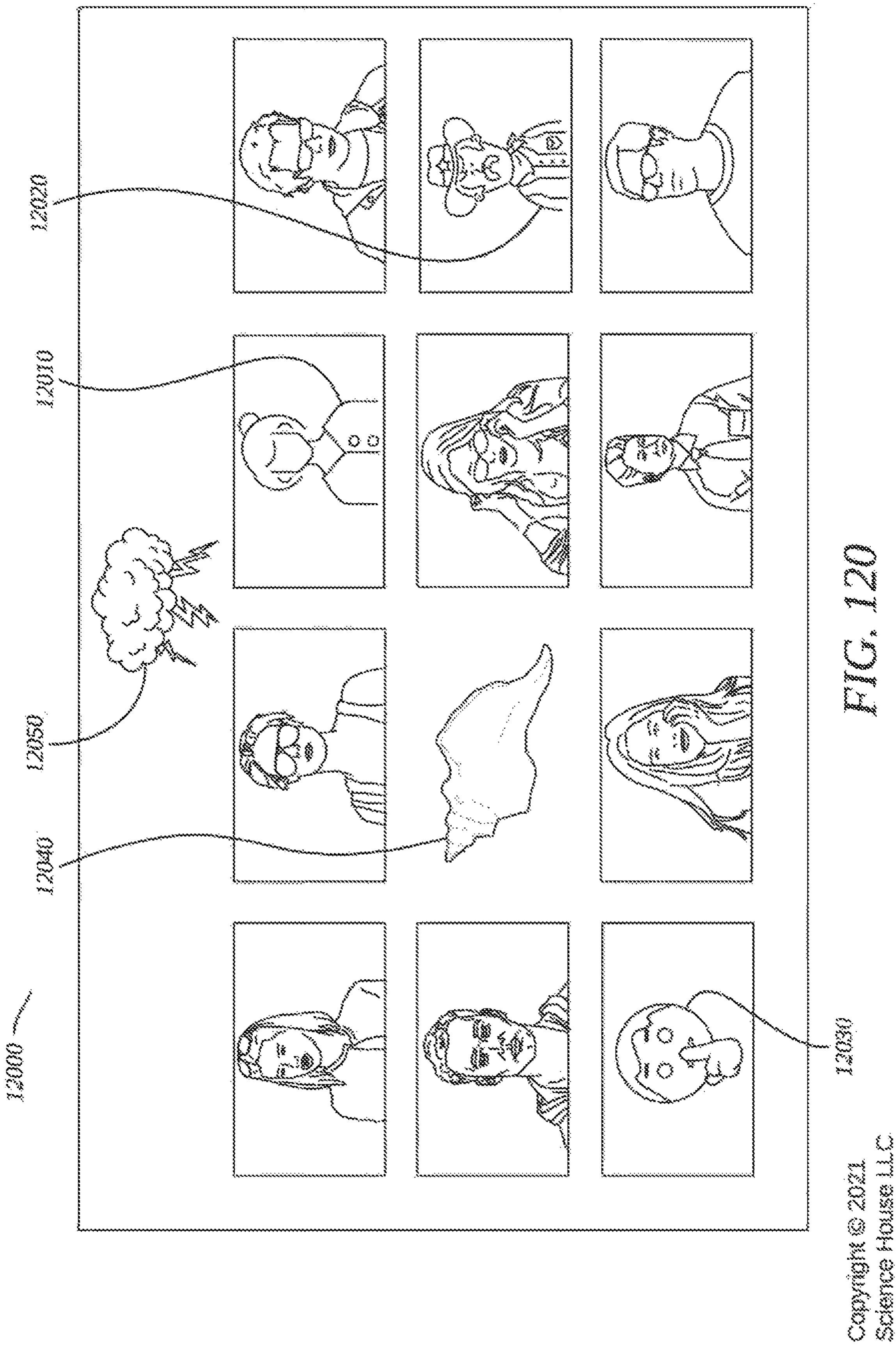

With reference to FIG. 120, a display 12000 of call platform software from an app used by meeting participants according to some embodiments is shown. As depicted, display 12000, includes various graphical display elements. These elements may provide participants with options for communicating, conveying intent or thoughts, and/or for accessing other functionality.

Conch shell 12040 may represent speaking (e.g., with its real or symbolic ability to amplify sound). Thus, a participant who wishes to speak may click on or otherwise interact with the shell. A participant who wishes another to speak may move shell 12040 to the feed of another participant. Characters 12020 and 12030 may represent enforcement of rules, norms, etiquette, etc. For example, character 12030 may appear when someone is speaking too loudly and character 12020 (e.g., the "Topic sheriff") may appear when someone is taking the meeting off topic.

In various embodiments, characters are system-generated, and may appear automatically when some violation is detected. In various embodiments, another participant may trigger the appearance of a character. For example, a participant may attempt to communicate a point to another participant using a character. This may, e.g., soften the blow of negative feedback when it is voiced through a "cute" animated character.

Cloud 12050 may be used to signify the difficulty or gravity of a situation (e.g., there is a lot of work ahead to meet an important deadline). A meeting leader (or another participant) may summon cloud 12050 (or some other appropriate graphic), to lend extra emphasis or support for a point.

In various embodiments, a participant's Internet connection may be too poor to stream a live video of the participant. Or, the participant may prefer not to stream a live video. In various embodiments, a participant may be represented by an avatar or other simplified rendering or representation of the participant 12010. This may require less bandwidth than a live video. In various embodiments, an avatar may attempt to render or replicate one or more participant actions, such as the movement of a participant's mouth while speaking.

Example Uses of Non-Player Characters

Tapping into the "ventriloquism" power of NPC usage, in which the meeting owner can communicate certain things or nudge the group in certain directions, but it doesn't look like him saying it, are the following examples.

The "Devil's Advocate" character appears and asks, "OK, how can this go wrong for us? What do we do then? How can we minimize the odds? Minimize the impact?"

The "Safety Monitor" shows up and asks "How could people get hurt doing this?Repetitive motion problems, eye strain . . . . Do we have an Ergonomics person involved?" The appearance of the character immediately gets everyone in the safety frame of mind, without the leader having to introduce the topic or really say anything.

The "Intellectual Property character" shows up and asks "OK, are we capturing all the things we need to file IP on all this? Are we looping in the right company attorney for this area?"

The "Quality Tech" shows up and asks "How are we ensuring conformance to customer requirements? Do we even know what those are? Are we building in quality at the design stage, from the beginning? . . . " or questions that are tailored to the type of group that is meeting.

The "Manufacturing Engineer" shows up and asks "How can we actually produce this? Are we thinking about Design for Manufacturability? Do we have the core competencies to do this, or the existing supply chain that can make this? Are we looping in the right people to fill in potential gaps?"

The "Time Keeper" shows up, and even though the call leader triggered them from the background, it's not the call leader being the "nag," they're the ventriloquist who is still teamed up with the group "against" the Time Keeper.

The "Money Guy" shows up and asks "Are we staying on our budget? Are we still meeting the WACC/hurdle rate for this project? Are we adding to fixed costs in a way that we wanted to avoid? What approval level do we need for this much capital?"

The "Salesman" or "Marketing Guru" shows up and asks "What's our value proposition? Do we have any customers who care about this? Is that customer segment substantial enough? Is it growing, shrinking?"

The evil boss character shows up and asks "Where's the SWOT? The 4 Ps? . . . "

An HR character shows up and asks "Are we thinking about underrepresented minorities? Are we being cognizant of differing viewpoints, diverse communities?"

The NPCs can be triggered by the call leader, some subset of the group, or anyone on the call in different embodiments; and in another embodiment the NPCs can be triggered by the central controller when certain topics come up, or specific keywords are used in the meeting, etc.

Bringing in Other Feeds

In various embodiments, a participant view may include one or more empty slots or cells. For example, if there are 11 call participants, the participant view may attempt to arrange the participants in a 4×3 grid, which represents 12 slots. Since there are only 11 participants, the remaining slot may be filled with other content or items. In various embodiments, other content may be incorporated regardless of whether there is an empty slot and/or regardless of the number of people on the call.

In various embodiments, there is a link to a shared space in an empty slot. In various embodiments, there is a view of a shared space in an empty cell (e.g., a thumbnail image of the shared space, a view of subsection of the shared space, a view of a recent change in the shared space, etc.).

In various embodiments, there could be a feed from a security camera, a baby monitor, a pet monitor, or from some other video source and/or some other source. In various embodiments, the feed could be private to a subset of participants in the call (e.g., to one participant). This may allow the participant to monitor an important feed (e.g., a feed of his child), while participating in a work-related call. In various embodiments, the feed could be available to many or all participants (e.g., the feed may represent a concurrent conference of interest, a view of customers sampling a new product, a view of a focus group, a view of market conditions, etc.).

In various embodiments, a feed may represent a video of widespread interest, such as a championship baseball game, a world cup soccer match, an olympic event, etc.

In various embodiments, a feed may represent stock market data, breaking news, traffic data, and/or any other data feed, and/or any other feed.

In various embodiments, there could be a feed from another meeting. In this way, for example, a participant in one meeting may attempt to monitor the happenings in another meeting at the same time. When a participant is receiving feeds from two or more meetings, all but one meeting may be muted at any given time. For example, a meeting where there is no speaker may be muted so that the participants can hear a speaker in the other meeting without interruption.

In various embodiments, if a new feed, and/or any other new information is presented, there may be a reward to the first participant or participants to notice the new information. This may encourage participants to pay better attention during a conference call.

Dragging Action Items

In various embodiments, action items or tasks may be assigned during a conference call. Tasks may be represented by icons, badges, images, and/or other indicia. Tasks may be represented by text descriptions or summaries of the task. Tasks may be represented by reference numbers that refer to fuller descriptions of the tasks stored or listed elsewhere. A task may be represented in any suitable fashion.

In various embodiments, tasks may be assigned to participants by dragging the tasks (e.g., representations of the tasks) onto the participants (e.g., videos or images of the participants). When a task has been dragged onto a participant, a task assignment database, a task tracker, project management software, or the like, may be updated so as to associate the task with the participant. In various embodiments, a task may be assigned to a participant in any other suitable fashion (e.g., by first clicking on a tag, then clicking on a participant).

In various embodiments, once a task has been assigned to a participant, a representation and/or indicia of the tag may be displayed in association with the participant (e.g., with the participant's video). For example, a wheelbarrow, paint bucket, broom, or other indicia of a task may be displayed in association with the participant. In various embodiments, a number is displayed indicating the number of tasks that are currently assigned to the participant.

Where it is visible to other participants that a given participant has one or more tasks already assigned, the other participants may attempt to avoid assigning further tasks to the participant so as to avoid overloading the participant. In various embodiments, a participant may instantiate a shield, barrier, force field, or other representation indicating that no more tasks can be or should be assigned to the participant behind the shield, barrier, etc. In various embodiments, a participant may instantiate a shield for himself. In various embodiments, a first participant may instantiate a shield for another participant. In various embodiments, one or more participants (e.g., a manager) has the ability to override a shield, and, e.g., assign an additional task to a shielded participant.

In various embodiments, a participant may assign an action item to himself. Such an action item (e.g., a self-assigned action item) may appear in a different color or different formats to highlight the fact that it was assigned by the participant himself. A participant may thereby obtain additional respect, deference, etc. for having taken on tasks himself. In various embodiments, during a given meeting and/or during a subsequent meeting, a participant may be recognized (e.g., with a different color border around his video) for having taken on a task.

Betting on Project Outcomes

In various embodiments, there may be a predictive market for tasks, projects, events, and/or external circumstances relevant to a company. Users may have the opportunity to bet on outcomes, such as the completion date of a project, the customer uptake of a project, the success of the project, the number of bugs that will be present in a project, the cost of a project, the revenue that will be received as a result of a project, the size of the German market, etc. Users may have the opportunity to wager with virtual currency, real currency, and/or any other token. If users are accurate in their predictions, they may accumulate more currency, and their future wagers may thus have more impact (e.g., on odds in a parimutuel setting). A user's accumulated currency may thus (or otherwise) encourage management to pay more attention to their predictions.

In various embodiments, seeing bets (e.g., large bets) on a failure outcome, management may wish to reassess a project, find out why people think it will fail, and/or take corrective action. In various embodiments, the implied odds of a project's success may feed into a company's financial models. Predictive markets may have various other uses.

Fantasy Sports

In various embodiments, a user may select a "fantasy" project team. Team members may represent actual company employees. For example, a user may select a project manager, designer, architect, engineer, marketing person, etc.

The user may have virtual currency with which to "purchase" team members. A user may have a set budget with which to purchase his team. The price of each team member may be preset or market-determined.

In various embodiments, the performance of team members are evaluated on real-life projects, though in real life, each member of a team might be on a different project. For example, any given team member may be evaluated based on whether his project finished on time, whether the team member received good feedback, etc. The performance of a fantasy team may be defined as the aggregate performance (e.g., sum, average) of one or more members of the fantasy team (e.g., all members, the top five members, etc.). In various embodiments, an owner of a winning or high-performing fantasy team may receive a reward.

In various embodiments, the demand for certain team members on fantasy teams may provide useful feedback or evaluations about such members in real project settings. For example, if a particular engineer is in high demand on fantasy teams, this may be an indication to management that the engineer is a valuable employee, and perhaps should be rewarded or given more responsibility.

Status Update

In large projects, and/or in other situations, a status update meeting may potentially last a long time, since there may be many participants who are providing updates. In various embodiments, a given participant may be interested only in some status updates (e.g., only updates on a particular task, on a particular milestone). In various embodiments, a given participant is interested in only certain categories of updates, such as updates for tasks that have run into problems, updates for tasks that have fallen behind schedule, updates for tasks on a particular topic, and/or updates for any other category of tasks. In various embodiments, if some or all participants are only interested in some updates and not others, then a meeting can be shortened to include only the updates of interests.

In various embodiments, participants in a meeting may indicate one or more updates in which they are interested and/or one or more updates in which they are not interested. Updates that receive sufficient interest (e.g., from one participant, from a predetermined percentage of participants, from a predetermined number of participants) may proceed during the meeting. Updates for which there is a lack of interest (e.g., as indicated by a predetermined percentage of participants, as indicated by a predetermined number of participants) may be skipped. In various embodiments, a participant may indicate interest in an update by designating (e.g., clicking on) an image or video of another participant who is slated to make the update. Lack of interest may be demonstrated in a similar or analogous fashion.

In various embodiments, a participant may provide an overview or summary of a status update, e.g., prior to or at the beginning of a meeting. For example, the participant may select a green border for his video to indicate that his task is complete or his project is on track. The participant may select a border of another color (e.g., yellow) to indicate partial progress. A red border may indicate problems with the task or project. As will be appreciated, any other status indicators may be used, including text summaries of a project's status. Other participants may review the overviews, and decide which updates they would like to hear in more detail. The other participants may tag particular participants whose updates they wish to hear (e.g., by clicking on such participants, by tagging such participants). In this way, interest may be gathered from meeting participants, and only status updates that have garnered sufficient interest may be made in detail during the call.

In various embodiments, a particular individual may have time constraints and wish to present first and/or at a particular time. The individual may be a subject matter expert who is in demand across a company (e.g., is asked to attend numerous meetings). In various embodiments, an individual may receive priority to speak, present, and/or otherwise participate in a meeting. It may be understood by other participants that the individual has priority and, e.g., will therefore get to speak first, will get the floor when desired, and/or will have other special privileges.

Figure 114:
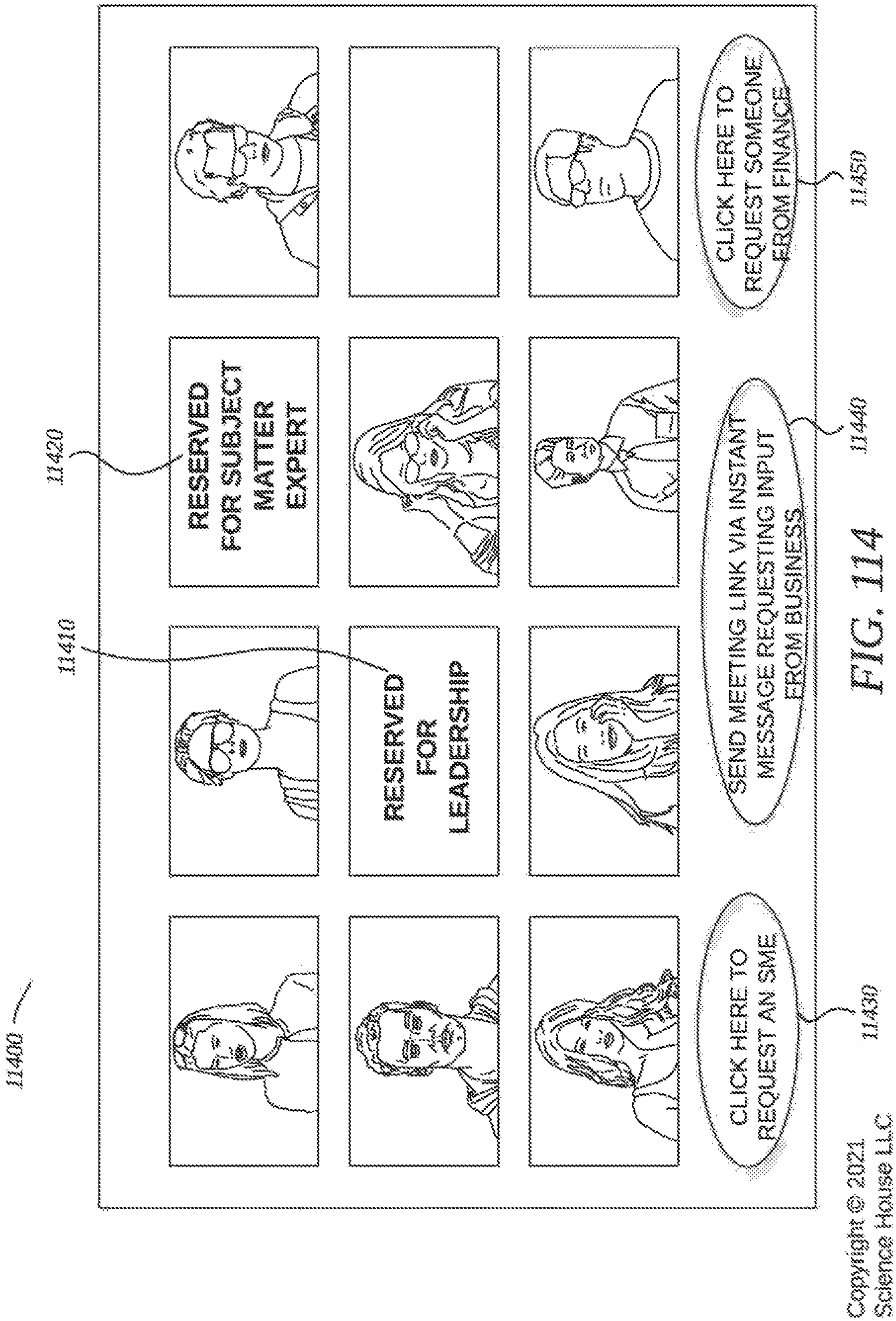

With reference to FIG. 114, a call platform app view 11400 is shown which illustrates additional ways to improve the effectiveness of calls. An individual with priority or other special status may appear in a designated location on a screen in a video conference call (e.g., a place analogous to a "reserved parking" space). In FIG. 114, cell C3 does not contain an image/video of a call participant at the moment, and it is currently displaying "Reserved for a subject matter expert" at 11420. Call platform software may prevent the image/video of a call participant from being displayed in cell C3 unless they are verified as a subject matter expert (e.g. the user is designated as a subject matter expert in table 5000 of central controller 110). Cell B2 indicates that it is "Reserved for leadership" at 11410, such that only employees of a certain level (e.g. Director level or higher) may occupy that location. In other embodiments, users on a call may need to obtain the advice of experts not currently on the call. The call platform software as shown illustrates three buttons that may be used in some embodiments to obtain expertise. Button 11430 instructs a user to "click here to request an SME", which may send a signal to central controller 110 to search employee table 5000 for an SME who is currently not occupied on another call, sending the SME a link to the call so that the SME can easily join the call and provide the needed expertise. Button 11440 allows users to "send meeting link via instant message requesting input from business", which allows a broadcast of the expertise needed in a way that business representatives can easily jump in to the call to provide help. In some embodiments, the meeting link is removed from an instant messaging feed once someone clicks on the link to join a call. A button 11450 allows a call participant to "click here to request someone from finance", such as to answer questions about available budget levels for a project being discussed on the call.

Games

Games during a video call may provide a source of entertainment, diversion, etc. Games may also provide a means for participants to learn about one another. This may be advantageous, for example, in a large company, in a geographically distributed company, etc., when participants might otherwise have little opportunity to get to know one another.

In various embodiments, a participant is associated with one or more items of trivia. Participants may provide trivia about themselves, a participant's coworkers (or supervisor, etc.) may supply the trivia, trivia may be obtained from social networks or other sources, etc. The trivia may be information about the participant. The information may be work-related, personal, etc. Exemplary information may include, a participant's name, nickname, function, job title, department, current projects, years with the company, hobbies, place of birth, type of pet owned, and/or any other information about or related to a participant.

Various games include allowing one participant to answer trivia questions about another participant and/or to act consistently with an answer to a trivia question. In one game, a participant is asked to indicate some or all call participants for which a statement is true. For example, a participant is asked to click on all participants who are in the technology department. For example, a participant is asked to click on three participants who are architects. In one or more examples, a participant is asked to click on people who joined the company in the past year, to click on marketing people, and/or any other group of people.

In various embodiments, each of a set of participants has an associated monetary and/or other reward value (e.g., $100). In various embodiments, each participant in the set of participants has the same associated value. In various embodiments, participants of the set of participants may have different associated values. A given participant may select one participant from the set of participants in an attempt to earn the reward/value associated with the selected participant. The given participant may then have the opportunity to answer a trivia question or other challenge associated with the selected participant. If the given participant answers correctly, the given participant receives the associated value. If the given participant has not answered correctly, in various embodiments, other participants may have the opportunity to answer the question and receive the associated value. In any event, the answer to that trivia question may be revealed. Since the answer to the trivia question may provide information about the associated participant, other participants may have a chance to learn about the associated participant.

In various embodiments, a game, such as a trivia game, may use a familiar format, such as a format from a popular televised game show (e.g., Jeopardy®, Hollywood Squares®, etc.). The game may incorporate tunes/music from the popular game show, colors, layouts, prize structures, wild cards, penalty cards, and/or any other features. The system or platform may license one or more aspects of the game for use in a video conference environment.

In various embodiments, a system or platform may provide trivia questions as a service or add-on service, e.g., for a fee, for a monthly fee, for a fee per question, etc. A customer of the platform may choose to receive general trivia questions, trivia within certain categories (e.g., business, sports, entertainment, etc.), trivia covering certain time periods, trivia covering certain geographic regions, etc.

In various embodiments, a game may incorporate characters from television, movies, broadway, cartoons, comics, books, stories, etc. E.g., a game may incorporate a depiction (e.g., visual, audible) of Bart Simpson from the Simpsons® television show. The system or platform may pay a license fee for the use of such characters. In various embodiments, a game may incorporate any other aspect of a television show, movie, etc., such as scenery, theme music, etc.

In various embodiments, a participant is asked to determine a statement that is not true. For example, a first participant makes a statement about himself that is deliberately false, and a second participant has to determine that the statement is false. In various embodiments, a second participant may attempt to select a false statement from among multiple statements that include both true and false statements.

In various embodiments, if a participant correctly responds to a question or prompt (e.g., by clicking on a correct set of participants), the responding participant may receive a prize, recognition (e.g., fireworks exploding over his image), an increased game score, and/or any other reward.

In various embodiments, a participant's game score may accumulate over the course of a single call, over the course of multiple calls, over the course of a break, and/or over some other period of time. At the end of a game, at the end of a call, and/or at any other time, participant scores may be shown (e.g., in rank order).

In various embodiments, a participant's performance in a game leads to placement within the participant view of the call. For example, top scorers are placed at the top of a participant view.

In various embodiments, a participant's performance in a game leads to privileges in a meeting, such as the ability to speak first, the ability to speak longer (e.g., an extra 2 minutes), the ability to decide who else well speak (e.g., who gets to ask the next question), the ability to select a topic, etc.

In various embodiments, when selecting a participant (e.g., in response to a prompt or question), information about the participant may be revealed. The information may be revealed regardless of whether the participant was correctly selected. For example, if a first participant incorrectly identifies a second participant as a member of the finance department, it may then be revealed to the first participant that the second participant is actually a member of the business development department. In various embodiments, when a first participant identifies a second participant, ancillary or tangential information about the second participant may be revealed to the first participant. For example, it may be revealed that the second participant went to a particular college, has traveled to a particular country, has a particular type of pet, etc. In this way, for example, a first participant may learn more about a second participant than merely that which was asked in a question.

In various embodiments, elements of a game may be used to advance the goals of a meeting, the goals of a company, and/or any other work-related goals, and/or to highlight accomplishments of participants. In one or more examples, a participant is asked to click on a call participant who had the best idea in the last half-hour. In one or more examples, a participant is asked to click on a call participant who broke the quarterly sales record the last quarter.

In various embodiments, a game encourages punctuality or other behavior in meeting participants. For example, the last two individuals to appear at a meeting must compete in a head-to-head trivia match. For example, the last individual to appear at a meeting must host a game show.

In various embodiments, someone who is late returning from a meeting break is placed in a virtual dunk tank, and other participants have the opportunity to aim a virtual projectile at the late participant in order to cause the participant to fall in the water.

Figure 116:
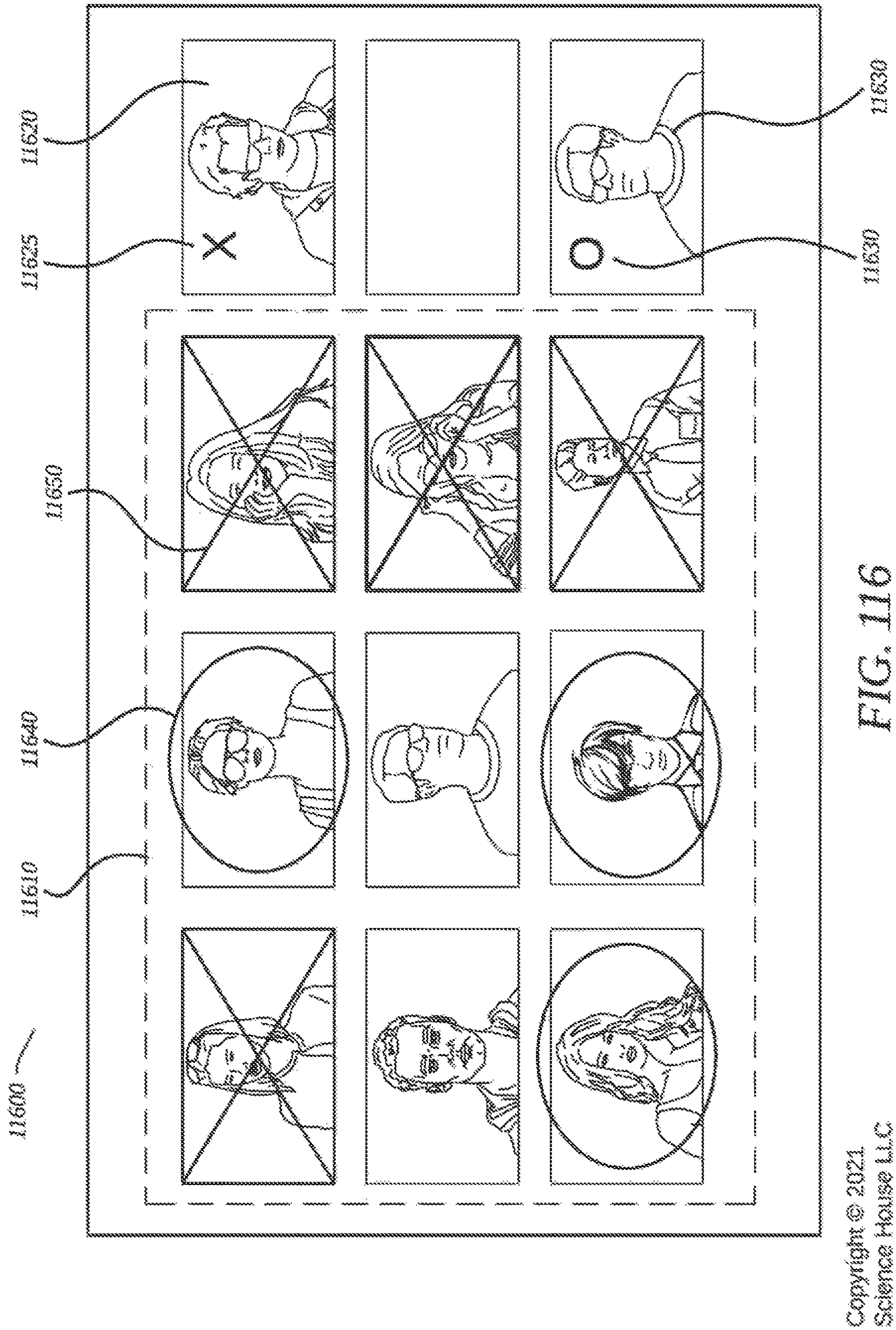

With reference to FIG. 116, a display 11600 of call platform software from an app used by meeting participants according to some embodiments is shown. As depicted, call participants are engaged in a game related to tic-tac-toe. The main playing area, delineated by border 11610, includes a 3×3 arrangement of participant feeds (e.g., videos). Contestant 11620 employs the "x" symbol 11625, while contestant 11630 employs the "o" symbol 11630.

A game objective may include placing one's symbols onto participant feeds in the main playing area, in such a way as to line up three of such symbols. As depicted, several "x" and "o" symbols have been placed, including an "o" at participant feed 11640 and an "x" at participant feed 11650.

In various embodiments, gameplay proceeds with contestants 11620 and 11630 taking alternate turns. On his turn, a contestant may select a participant feed within the main playing area. The participant is then asked a question, such as "Is project x using microservices?". The selected participant may then provide an answer (e.g., "yes", or "no"). The contestant must then decide if the participant has provided the correct answer or not. If the contestant correctly characterizes the participant's answer, then the contestant's symbol may appear on the participant's feed. Otherwise, the other contestant's symbol may appear on the participant's feed. Since questions may relate to work, to employees, to team members, etc., the game may provide a fun way to gain knowledge about work, coworkers, etc.; to promote team spirit; and/or to further any other objective.

In various embodiments, a game may use other sets of rules, etc. In various embodiments, any suitable game may be played on a conference call (e.g., video call).

Software Overlay

In various embodiments, game software may be separate from conferencing software. The game software may overlay game elements on top of the outputs from the conferencing software (e.g., Zoom® software). For example, conferencing software may display a video of a conference call participant, and the game software may overlay a point score in the game on top of the video of the conference call participant.

In various embodiments, game software may overlay information about a participant onto an image or video of the participant as output by the conferencing software. The information may include trivia information, game performance (e.g., score, rank, percentage correct, etc.), an indication of an action that the participant should take in the game (e.g., bet, draw cards, roll dice, answer a question, etc.), and/or any other information. In various embodiments, game software may overlay a caricature of the participant, an image of another character, an image of the participant himself (e.g., when the participants had previously made a funny face), and/or any other image onto the participant.

In various embodiments, game software may detect the location on a screen of a UI for the conferencing software. The detection may occur via screen capture and image analysis algorithms, via signals from the operating system hosting the UI, via signals from the conferencing software, and/or in any other fashion.

In various embodiments, game software may detect actions of participants in a conference. For example, game software may monitor video feeds of individual participants and recognize expressions, gestures, activities (e.g., speech), etc. The game software may invite or encourage a participant to take an action in a game depending on the recognized actions within the conference. For example, if a participant is currently speaking, the game software may refrain from encouraging them to participate in the game.

Common Layout

In various embodiments, each participant in a conference call (e.g., a virtual meeting) may see a different layout, format, arrangement, or any other difference, on their screen. One participant may see participant videos arranged in a first order (e.g., Bob's video feed is in the upper left hand corner, etc.), while another participant may see participant videos arranged in a second order (e.g., Sue's video feed is in the upper left hand corner, etc.). One participant may see participant videos arranged in a first (e.g., 2×2) arrangement, while another participant may see participant videos arranged in a second (e.g., 4×1) arrangement. The layout each participant sees may be based on one or more factors, such as the participant's device (e.g., PC versus mobile phone, etc.), the device shape, the device orientation (e.g., portrait vs landscape), the size of the video conference app window on the device, and/or based on any other factor.

During the ordinary course of a meeting, a particular arrangement of data feeds or video feeds (e.g., video feeds of different participants) may make little difference. However, in various embodiments, it may be desirable to ensure that two or more participants do view the same layout, arrangement, etc. For instance, it may be desirable that every participant sees Bob's video feed is in the upper left hand corner. In various embodiments, when it becomes desirable, some or all of participants' user interfaces may show a common or consistent layout. Thus, some or all of participants' user interfaces may rearrange so that all show a common layout.

In various embodiments, a common layout is desirable if participants' videos or other likenesses are to be used in a game. In such cases, the location of a participant may have game significance, such as representing a game location, a location of a game piece or token (e.g., an "x" or "o" in tic-tac-toe), an address (e.g., an address for a hidden trivia question), and/or any other aspect of a game. When all participants use a common layout, a game move or action can be specified in terms of a participant's video (or other data feed), and all participants will see the same move or action transpire in the game. For example, placing an "o" on Ralph's video in a tic-tac-toe game will mean the same thing on all participants' screens (e.g., all participants will see the "o" appear at the center of a tic-tac-toe game).

In various embodiments, a common layout is desirable if there is to be some apparent interaction between participants, and such interaction depends on the participants' relative locations on a screen. For example, if a first participant will "pour water" on top of a second participant, it may make the most sense if the first participant is located directly above the second participant. Thus, in order to appreciate the interaction between the first participant and the second participant, all participants may see a common layout (e.g., with the first participant located directly above the second participant).

A common layout may be desirable for any other reason, in various embodiments.

In various embodiments, a common layout may be determined based on the least capable device used by a participant in a meeting. The common layout may be determined as a layout that even the least capable device is capable of rendering. The least capable device may be the device with the smallest screen, the device with the highest aspect ratio, the device with the lowest aspect ratio, the device with the smallest window used for conferencing, and/or a device meeting any other criteria.

For example, a device with a small screen may not be capable of displaying a grid of participants having a large number of rows and a large number of columns. For instance, a device with a small screen may not be capable of displaying a 5×5 grid of participant videos. As such, a common layout may be determined as the layout with the largest number of rows and the largest number of columns that can be displayed by the least capable device in the meeting.

In various embodiments, a common layout may be determined based on which layout can be displayed by the most participant devices while still allowing for game play. For example, in a tic-tac-toe game, a layout of at least 3 rows and 3 columns may be required, and this layout may be used even if some participant devices cannot display a 3×3 grid of participant videos. However, the common layout may also be no more than a 3×3 grid, so that the most participant devices possible can display the grid.

In various embodiments, a common layout may be created for all participant devices when needed (e.g., for a game). However, after the game has concluded, each participant device may display whatever layout is most convenient or beneficial for that device.

In various embodiments, a participant may select a "game mode" or other specially designated mode or configuration, which may then serve to change the layout of a meeting or video conference on his device (e.g., in a way most conducive to gameplay). The participant may have the opportunity to switch back to "meeting mode", "conference mode" or the like, which may be more conducive to video conferencing.

Layout for Splitting Groups

In various embodiments, it may be desirable to show two or more distinct groups of participants on a conference call. For example, two groups may represent two different positions on an issue (e.g., a "pro" group and a "con" group). A layout may be determined or selected that most clearly allows group separation. For example, if there are two groups, one with six participants, and one with three participants, then a 3×3 grid arrangement of participant videos may be desirable. In this way, two columns may together include the first group of six participants, and the third column may include the second group of three participants. The 3×3 arrangement may be preferable to a 5×2 arrangement, when it would not be as easy to show a clean separation between the two groups.

In one or more examples, there is a group of five and a group of four. In this case, a 5×2 arrangement may be used, where one column has the group of five, and the other column has the group of four.

In various embodiments, a layout is chosen such that no column includes members of more than one group. In various embodiments, a layout is chosen such that no row includes members of more than one group.

In various embodiments, a layout is chosen such that members of a given group all fall within the same rectangular region of the grid (e.g., the same 2×2 region, the same 3×2 region, etc.). If there are groups of different sizes, then the regions containing the groups may also be of different sizes. For example, suppose there are groups of sizes six, four, and two. Then the overall layout may be 3×4, the group of six may occupy a 2×3 rectangle, the group of four may occupy a 1×4 rectangle, and the group of two may occupy a 2×1 rectangle.

In various embodiments, individual videos are given 'attractive' and/or 'repulsive' forces so that videos which should be grouped together (e.g., all videos of participants who are working on project X) will naturally find each other and clump together, regardless of a starting arrangement. For example, an algorithm specifies that videos of similarly categorized participants will attract each other, and will drift towards each other on a screen. Meanwhile, the algorithm specifies that videos of differently categorized participants will drift away from one another. The end result may be that videos of all similarly categorized participants will come together.

Cropping

In various embodiments, it may be desirable to fit additional participants on a screen. For example, a call may have a large number of participants, a game may require a large number of participants to be visible, etc.

In various embodiments, images or videos of participants may be cropped so as to reduce the display size of the image/video. A video may be cropped to show only a participants' head, only a head and shoulders, only a face, and/or only some other portion of the video or participant. In various embodiments, face, human, and/or object recognition algorithms may recognize a participant in a video and automatically crop the video to include only the participant (or other relevant portion of the video).

Once videos for one or more participants are cropped, a UI for the call may show more participants.

In various embodiments, cropping is performed only to the extent necessary to fit a desired number of participant videos. For example, if a 5×5 arrangement of participant videos is desired, then participant videos may be cropped only to the extent that they occupy approximately one fifth of the available screen space in either dimension.

In various embodiments, some participant videos may be cropped, while others are not. For example, the video of a speaker may not be cropped, while the videos for other participants may be cropped. In various embodiments, a video of a participant that is an executive or other high-ranking individual may avoid cropping. In various embodiments, any other criteria may be used for cropping some videos and for not cropping others. In various embodiments, some videos are cropped more than other videos, and differences in cropping amount may be due to participant status and/or to any other criteria.

In various embodiments, the degree to which a participant video is cropped may depend on the size of the participant within a video. For example, if a participant is far away from his camera, the participant may appear small in his video, and his video may accordingly be cropped to a large degree.

In various embodiments, videos may be shrunk (e.g., zoomed out, rendered using fewer pixels, further compressed, etc.) in order to reduce display size. In various embodiments, a combination of shrinking and cropping may be used.

Different Sizes

In various embodiments, a participant may indicate a desire to expand or shrink a video. For example, if a participant wishes to get a better view of a speaker, the participant may mouse over or click on the video of the speaker to make the video expand in size. In various embodiments, other videos may shrink or disappear to accommodate the expanded video.

Cycling Videos

In various embodiments, participant likenesses (e.g., videos) scroll through a display area. For example if there are 20 participants in a video call, but a given participant's screen can only show 12 participants at one time, then videos for the 20 participants may gradually move across the given participant's screen. As each video reaches an edge of the screen (e.g., the right edge), it may temporarily disappear, before eventually re-emerging at another edge of the screen (e.g., the left edge). In this way, for example, all participants may be visible for at least part of the time.

In various embodiments, some participant videos made cycle off the screen, while others remain visible (e.g., stationary). The video of a speaker may remain on a screen even while other videos cycle off. In various embodiments, a video may remain on a screen if the participant is a meeting owner, an upcoming speaker, a high-ranking individual, a prior speaker, a subject matter expert, and/or if the participant meets any other criteria. In various embodiments, a viewing participant may select which videos remain on screen and/or which videos can cycle off the screen.

Other Shaped Videos

Conventional conference calls use rectangular-shaped videos of participants. In various embodiments, other shaped videos may be used. Other shapes may be conducive to packing a higher density of videos into a given area. In various embodiments, other shaped videos may be obtained by cropping videos, such as by cropping rectangular videos. In various embodiments, using a shape that closely or more closely (e.g., as compared to a square) conforms to the shape of a user's image, may allow for less wasted area (e.g., area on a screen) by a video.

In various embodiments, hexagonal images/videos are used. These may be arranged in a closely packed, tiling, and/or tessellation arrangement. A hexagon may be oriented with a vertex on top. This may conform to the image of an upright human being, as the human's head may fit in the narrower portion of the hexagon towards the top, while the wider portion of the hexagon in the middle accommodates the human shoulders/torso. Thus, a hexagonal video shape may efficiently accommodate a human form while wasting less space than does a square. The hexagon may also allow for efficient packing/tiling of the display area.

In various embodiments, hexagonal tiling arrangements may also provide benefits within a game and/or scenario where two adjacent users interact. Each hexagon in a hexagon tiling arrangement may have up to six immediate neighbors, whereas in a square tiling arrangement, each square would have up to four immediate neighbors. Thus, hexagons may allow for more possibilities for interactions between neighbors (e.g., for passing a ball to a neighbor).

In one or more games, the object is to make a path using adjacent videos (e.g., hexagonally shaped videos), such that each traversed video features a participant who meets a set of criteria. For example, the object is to make a path traversing videos that feature software architects. While this may provide entertainment as a game, it may also be an opportunity to learn about coworkers.

In one or more games, the object is to make a word using adjacent videos (e.g., hexagonally shaped videos), where each video contributes a letter that is the first letter of the featured participant's name. For example, adjacent videos featuring participants named "Sam", "Tom", "Adam", "Rachel", and "Tracy" may be used to spell the word "START". In various embodiments, a game objective is to chain together adjacent videos to satisfy any other objective.

Figure 118:
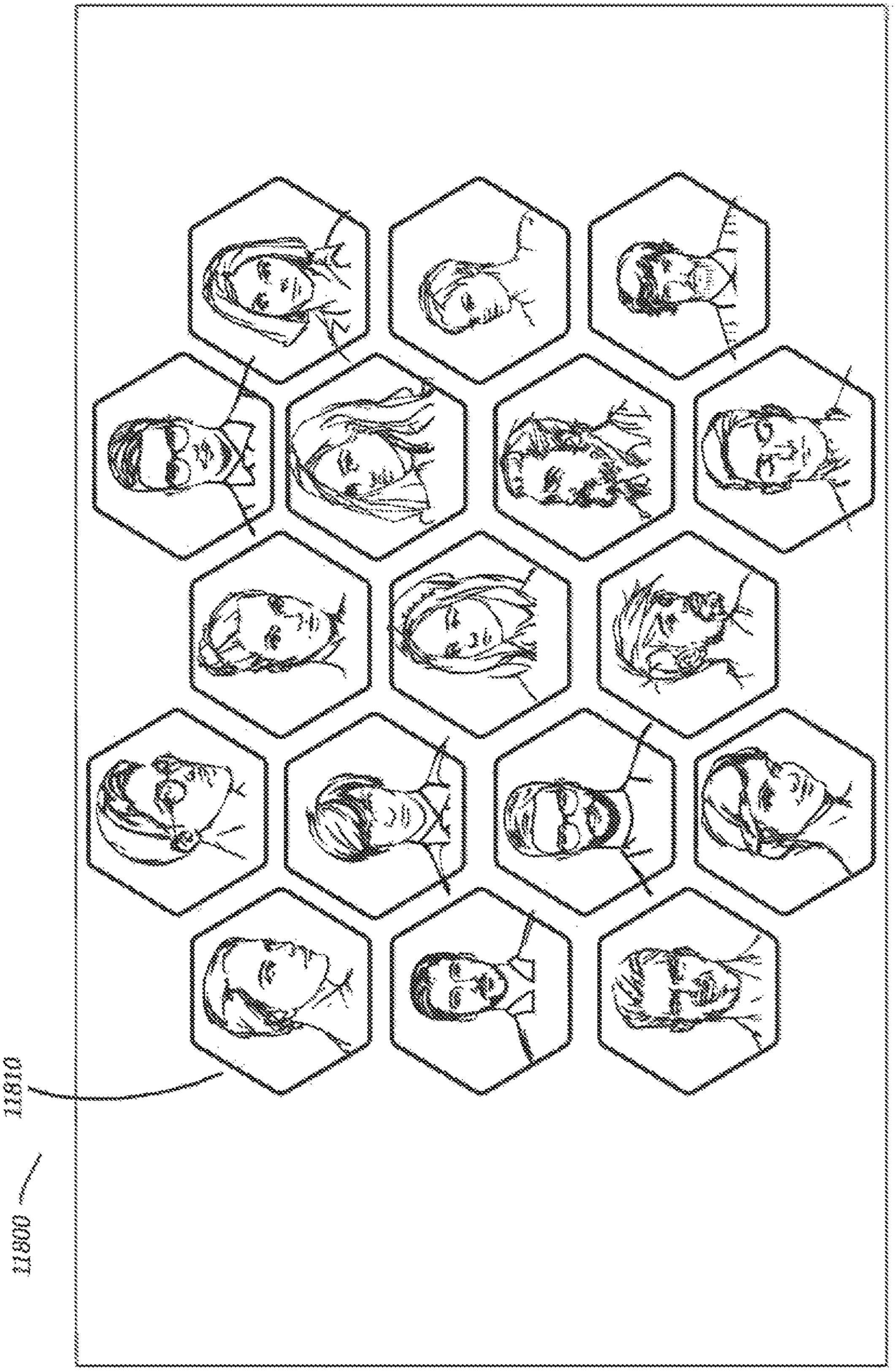

With reference to FIG. 118, a display 11800 of call platform software from an app used by meeting participants according to some embodiments is shown. Each participant feed (e.g., video feed) appears in a hexagonal shape (see e.g., feed 11810). It is thus possible, as depicted, to arrange the feeds in a packed or tessellating arrangement. This may allow more participants to fit on the screen, and may also allow participants to have additional neighbors (e.g., for the purpose of interaction or gameplay).

Other Feeds

In various embodiments, there is an empty "cell" or spot in a zoom call. For example, a call layout is a 5×5 grid having 25 "cells", but there are only 24 callers. So another data feed can be added at the empty spot. The feed could be a baby monitor feed, corporate video, stock prices, etc. The process may be set in motion when someone leaves the call, or when someone joins the call. For example, somebody leaves and now there is an empty slot for an optional data feed.

In various embodiments, the central controller 110 may determine a first number of data feeds (e.g., video feeds, such as of participants) for display on a screen. In various embodiments, 'determining a first number of data feeds' includes determining a first number of participants on a call, since each video feed may correspond to a participant.

In various embodiments, the central controller 110 may determine an arrangement for data feeds on the screen, the arrangement including a second number of available slots. In various embodiments, the arrangement is a rectangular grid arrangement that includes dimensions of width and height, and the number of available slots is equal to the product of the width and height.

In various embodiments, the arrangement of data feeds may vary by the number of data feeds. For example, four data feeds gives a 2×2 arrangement, and nine data feeds gives a 3×3 arrangement. Thus, the arrangement may be determined based on the first number of data feeds.

In various embodiments, the central controller 110 may determine that the second number is larger than the first number, thereby determining that a slot is open. E.g., if there are 25 slots but 24 participant video feeds, then there is a slot open.

In various embodiments, the central controller 110 may determine an optional data feed. An optional data feed may be a pre-recorded video, a slide show, an image, transcript, a set of stock prices, an agenda item, a clock showing a time remaining until a break in a meeting, a task item, a summary of meeting tags so far, information from another meeting, etc.

An optional data feed may be a feed of news, sports scores, weather, traffic, etc. In various embodiments, an optional data feed is public to all on a call. In various embodiments, an optional data feed is private to a single participant. E.g., this is the participant's baby monitor.

In various embodiments, the central controller 110 may cause each of the first number of data feeds, and the optional data feed, to be displayed in accordance with the arrangement.

Common Arrangement

In various embodiments, the central controller 110 may determine a first arrangement of a plurality of data feeds on a first screen of a first participant. This may include determining a respective location on the first screen for each data feed of the plurality of data feeds.

In various embodiments, the central controller 110 may determine a second arrangement of the plurality of data feeds on a second screen of a second participant.

In various embodiments, the central controller 110 may receive an instruction to initiate an interaction involving the first and second participants. An interaction may be a game, such as a game of tic-tac-toe in which nine data feeds of the plurality of data feeds together form a game board for the game. An interaction may be a transfer of a projectile (e.g., water poured by participant 1 onto participant 2; e.g., a paper airplane thrown by participant 1 at participant 2, etc.).

In various embodiments, the central controller 110 may cause, based on the received instruction, the second screen to display the first arrangement of the plurality of data feeds. In various embodiments, it may first be determined that the second screen is capable of displaying the first arrangement, but the first screen is incapable of displaying the second arrangement. Thus, the first arrangement is displayed because both screens are capable of displaying it.

Focus

In various embodiments, a system may freeze, blur, and/or otherwise modify the video of participants to which a given participant is not focusing or paying attention (e.g., looking at).

In various embodiments, the central controller 110 may determine an arrangement of a plurality of data feeds (e.g., videos; e.g., participant videos) on a screen.

The central controller 110 may determine a first data feed of the plurality of data feeds that is a subject of a first participant's focus. In various embodiments, the central controller 110 may determine a first data feed that should be a subject of a first participant's focus (e.g., because the first day to feed shows a presenter).

The central controller 110 may determine a second data feed of the plurality of data feeds that is not the subject of the first participant's focus.

The central controller 110 may reduce a bandwidth associated with the second data feed.

In various embodiments, reducing bandwidth on the second data feed (e.g., video) may entail reducing a frame rate of the video; freezing the video; reducing a resolution of the video; reducing a bit depth of color in the video; reducing a size of the video; cropping the video; employ greater compression on the video; eliminating audio from the second data feed; and/or any other modification.

In various embodiments, bandwidth is reduced based on a distance from a user's gaze. So, for example, participant videos that are farthest from a user's area of focus get blurred the most. In various embodiments, the central controller 110 may determine a first location on a screen at which a first data feed is shown (e.g., a data feed a user is looking at). The central controller 110 may determine a second location on the screen at which a second data feed is shown. The central controller 110 may determine a distance between the first and second locations (e.g., in pixels, inches, etc.). The central controller 110 may reduce a bandwidth bandwidth associated with the second data feed based on the distance (e.g., in proportion to the distance; e.g., increasing with the distance; e.g., monotonically increasing with the distance; etc.).

In various embodiments, the central controller 110 may rearrange feeds (e.g., videos) based on whom a user is focused on. For example, the feed on which a user focuses goes to the top of the user's screen. In various embodiments, the feed may go to the center, etc.

In various embodiments, the central controller 110 may reduce bandwidth for a distracting activity, such as a data feed (e.g., a video) with excessive volume/noise (e.g., with a volume level exceeding a predetermined threshold); such as a data feed (e.g., a video) where a participant is exhibiting a gesture, etc.

In various embodiments, the central controller 110 may reduce bandwidth for a participant if the participant is not the current subject of focus, and/or not predicted to speak (e.g., if a chance that the second participant will speak within a first predetermined period of time is below a second predetermined threshold). For example the central controller 110 may reduce bandwidth if a chance that the second participant will speak within the next 5 minutes is below 5%. The central controller 110 may predict the chance that the second participant will speak based on the number of times he has previously spoken, and the elapsed time of the meeting so far.

In various embodiments, the central controller 110 may reduce bandwidth based on the aggregate focus of all participants (not just based on one participant's focus).

In various embodiments the subject of a participant's focus gets increased bandwidth (e.g., size) and/or increased bandwidth relative to other feeds. In various embodiments, a feed that a user looks at gets bigger.

To ascertain a user's eye gaze, the central controller 110 may determine a location on a screen at which the first data feed is shown; capture an image of the first participant's eyes; determine a gaze direction from the image; and determine that the gaze direction corresponds to the location.

In various embodiments, to ascertain a user's eye gaze, the central controller 110 may guess or otherwise presume what feed (e.g., what participant) the user is looking at, and then move that feed on the user's screen (e.g., to the right), and see if the user's eyes follow the movement of the feed (e.g., move to the right). If the user's eyes do follow, The presumption may be assumed to be correct.

In various embodiments, it is presumed that a participant is focused on the current speaker.

In various embodiments, it is presumed that a participant is focused on someone to whom the participant has shown a reaction (e.g., a reaction in the form of waving, sitting up straight, etc.).

The central controller 110 may determine a first data feed featuring a video of a second participant speaking; determine an action of the second participant; and determine a reaction of the first participant to the action of the second participant.

Alignment

In various embodiments, participants move (e.g., change their relative locations on a video conference call) to show their views on a proposition, to show their votes, etc. In various embodiments, the central controller 110 may determine a proposition, such as a decision to be made, a vote to be taken, a course of action to be decided on, etc. A decision may be whether or not to take a certain action (e.g., whether or not to build a new product feature). A decision may when to take a certain action. A proposition or decision may be any other question or situation with multiple possible resolutions.

The central controller 110 may determine a first opinion on the proposition. This may represent an opinion on what the outcome of the proposition should be. For example, the first opinion may be "in favor", "pro", "against", "launch", "launch in 2026", and/or any other opinion.

The central controller 110 may determine a second opinion on the proposition (e.g., a different or opposing opinion from the first opinion).

The central controller 110 may associate a first area on a screen with the first opinion. The central controller 110 may associate a second area on the screen with the second opinion. In various embodiments, the first area is the left half of the screen, while the second area is the right half of the screen. The screen may be divided into two or more areas in any other fashion. In various embodiments, the respective areas may have borders, distinct colorations, and/or any other indications to visually separate the areas. In various embodiments, there could be a space between the two areas, or there could be a line drawn between the two areas.

The central controller 110 may receive a first data feed featuring a first participant. This may be a video feed of the first participant, who has called into a video conference call. The central controller 110 may receive a second data feed featuring a second participant (e.g., in the same call). The first and second feeds may both be displayed on the screens of respective participants in the video call.

The central controller 110 may receive a first instruction from the first participant to align with the first opinion (e.g., that the first participant is in agreement with the first opinion). The participant may actually provide his instruction to align with an opinion by moving his video/image to the area on screen associated with the opinion (e.g., to the left half of the screen).

The central controller 110 may receive a second instruction from the second participant to align with the second opinion.

The central controller 110 may output, based on the first instruction, the first data feed within the first area. Thus, for example, the central controller may show the video feed of the first participant in the area of the screen representing alignment with the first opinion. Thus, it may be visually seen by other participants that the first participant is in agreement with the first opinion. The central controller may output, based on the second instruction, the second data feed within the second area.

Protocols

In various embodiments, characters may serve as meeting facilitators. E.g., a sheriff character tells someone to stop talking, they've been speaking too long.

In various embodiments, the central controller 110 may determine a first protocol of a meeting. The first protocol may be a maximum speaking time per participant (e.g., 5 minutes maximum). The first protocol may be a topic to be maintained (e.g., the meeting must stay on the topic). The first protocol may specify a volume level (e.g., a maximum volume level for speaking; e.g., a minimum volume level for speaking). The first protocol may specify that one speaker should not be interrupted (or spoken over) by another speaker. The first protocol may be any other set of rules, norms, etc., governing the meeting.

The central controller 110 may receive a data feed (e.g., video) associated with a first participant in the meeting. The central controller 110 may determine, from the data feed, that the first participant has violated the protocol. For example, the central controller 110 may monitor the speaking time of the first participant from the data feed, and determine that the participant exceeded five minutes of speaking time.

The central controller 110 may cause the data feed (e.g., the first participant's video) to be displayed at a first location on a screen. The central controller may render an animated character (or any other character) on the screen proximate to the first location (e.g., next to the first location). The central controller 110 may cause the animated character to make a gesture of admonishment.

The gesture of admonishment may serve as an indication (e.g., a visual indication) to the first participant (and/or to other participants) that the first participant has violated the protocol. The implication may be that the first participant should modify his behavior in order to fall back in line with protocol (e.g., should stop speaking; e.g., should get back on topic; etc.).

In various embodiments, a gesture of admonishment may be a wag of a finger; holding a finger to pursed lips (e.g., a "be quiet" gesture); a rolling of eyes; etc. In various embodiments, the character may make other gestures or actions, such as snoring, tapping a watch, etc.

In various embodiments, a rendered plant starts to wilt/die if a meeting gets off course (e.g., if a meeting protocol is violated). Any other visual indication or other indication may be used to show that a meeting protocol has been violated. In various embodiments, a wilting plant or other visual indicator may appear in an empty "slot" or "cell" (e.g., when such a slot is not otherwise occupied by a participant video).

Chyron

In various embodiments, a ticker or chyron shows additional information about a participant.

In various embodiments, the central controller 110 may receive a video feed associated with a first participant in a meeting. The central controller may determine information about the first participant, such as biographical information; professional information; a transcript of words spoken by the first participant; and/or any other information about or related to the first participant.

The central controller may cause the video feed to be displayed at a first location on a screen. The central controller may cause a chyron to be displayed beneath the first location on the screen, the chyron featuring the information. For example, the chyron shows "Allen Jones, Developer, started in 2017". In this way, for example, people watching a speaker will have more contextual information about the speaker. In various embodiments, the chyron may be displayed above the first location, over the first location, adjacent to the first location, proximate to the first location, to the left of the first location, to the right of the first location, and/or anywhere else.

In various embodiments, the chyron's behavior may change based on the actions of the first participant. For example, a chyron may stop scrolling, or disappear entirely, if the first participant stops speaking. For example, a chyron may stop scrolling, or disappear entirely, if the first participant starts speaking (e.g., so that the chyron does not distract from the first speaker). A chyron's behavior may change in any other way based on the actions of the first participant and/or the actions of any other participant.

Figure 113:
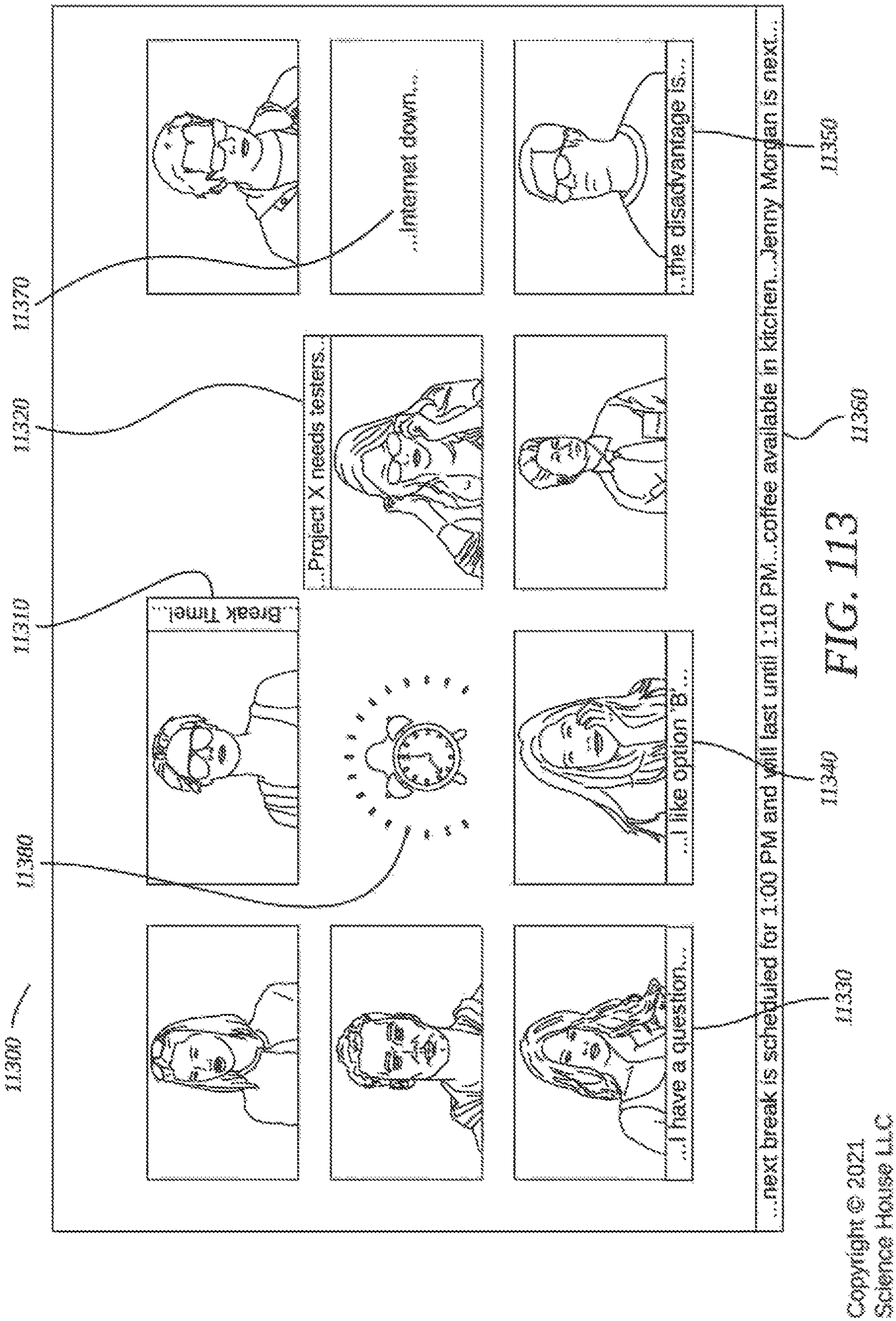

With reference to FIG. 113, a display 11300 of call platform software from an app used by meeting participants according to some embodiments is shown. One or more participant feeds (e.g., video feeds) may include a chyron. For example, chyron 11310 appears at the side of one participant video, chyron 11320 appears at the top of another, chyron 11330 appears at the bottom of another, chyron 11340 appears at the bottom of still another, and chyron 11350 appears at the bottom of yet another. Chyron 11360 appears at the bottom of the overall display 11300.

Chyron 11370 appears in place of a participant feed, and therefore occupies the entire slot where the feed might normally be. In this case, the participant's Internet is down, as indicated by the chyron. The slot may be kept available for a restored feed from the participant in the event that the participant is able to regain Internet access.

In various embodiments, one or more chyrons may include scrolling text, as indicated by depicted dots preceding and trailing the text. However, text need not scroll, but may remain stationary, may fade out, etc.

In various embodiments, a chyron represents a thought or information associated with the participant in the proximate video feed. For example, chyron 11330 indicates that the associated participant has a question, and chyron 11340 indicates that the associated participant has preference for option 'B' (e.g., in some course of action under consideration).

In various embodiments, a chyron (e.g., chyron 11360) represents information pertinent to multiple participants (e.g., to the entire meeting). For example, as indicated, chyron 11360 provides information about the next meeting break.

In various embodiments, a chyron may display a pitch, promotion, call to action, etc. For example, chyron 11320 indicates that "Project X needs testers".

In various embodiments, chyrons may be displayed or arranged in any other fashion and/or may display any other type of information. Chyrons may display information in the form of text, emojis, symbols, graphics, images, animations, videos, etc.

Alarm clock 11380 occupies a slot or space where there is no participant feed. The clock may provide useful functionality, such as alerting meeting participants that it is time to take a break, time for the next agenda item, time for the next speaker, etc. In various embodiments, any suitable item may occupy an empty slot or other screen real estate.

Relative Circumstances

In various embodiments, when two participants try to speak at the same time, the participant with the better connection (or other technical condition, environmental condition, circumstance, etc.) is allowed to speak. For example, the participant with the lower lag is allowed to speak. The other participant may get muted. In this way, for example, other participants may benefit from a better viewing or listening experience (e.g., other participants get to hear from a participant with less lag, less picture fragmentation, less background noise, etc.).

In various embodiments, the central controller 110 may receive a first data feed (e.g., video) featuring a first participant. The central controller may receive a second data feed featuring a second participant. The central controller may determine that the first participant and second participants are speaking at the same time.

The central controller 110 may determine a first circumstance (e.g., first lag) associated with the first data feed. The central controller may determine a second circumstance (e.g., second lag) associated with the second data feed. The central controller may determine that the first circumstance is preferable to the second circumstance (e.g., that the first lag is less than the second lag). The central controller may mute, based on the first circumstance being preferable to the second circumstance, the second participant. Muting the second participant may effectively give the floor to the first participant. In various embodiments, the central controller may give the floor to the first participant in any other fashion, such as with a visual indication that the first participant is the current authorized speaker (e.g., the first participant has a "gavel").

In various embodiments, the central controller may transcribe what the muted person said and display the transcript for others to view (e.g., so the thoughts of both participants can be conveyed). In various embodiments, the transcript is displayed proximate to the muted person (e.g., so it is clear who said what is written in the transcript).

In various embodiments, the central controller 110 may give any other type of preference to a first participant over a second participant based on the relative circumstances of the first and second participants. For example, the first participant may get to ask a question first, may get to speak first, may get to speak longer, may get a preferential location on a screen, may appear larger on a screen, etc.

Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which ta are described, unless expressly specified otherwise.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematical formula), deriving, and/or defining.

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices.

A "processor" generally means any one or more microprocessors, CPU devices, computing devices, microcontrollers, digital signal processors, or like devices, as further described herein.

Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi®, Bluetooth®, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein.

Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A video conferencing system hosting a dynamically customized video conference, comprising:

an electronic processing device;

a non-transitory memory device in communication with the electronic processing device, the non-transitory memory device storing (i) video conference data, (ii) participant display device data, and (iii) processing instructions that, when executed by the electronic processing device, result in:

identifying, by the electronic processing device and based on the video conference data, a plurality of data feeds of a video conference;

identifying, by the electronic processing device and based on a first subset of the participant display device data corresponding to a first display device of a first participant in the video conference, a first arrangement of the plurality of data feeds of the video conference;

identifying, by the electronic processing device, a first data feed of the plurality of data feeds of the video conference that has the focus of the first participant;

reducing, by the electronic processing device, a data feed bandwidth of at least one second data feed of the plurality of data feeds of the video conference while maintaining a data feed bandwidth of the first data feed;

computing, by the electronic processing device and based on the video conference data, a statistical likelihood that a second participant will speak in the video conference; and identifying, by the electronic processing device, that the statistical likelihood that the second participant will speak in the video conference is below a predetermined threshold.

2. The video conferencing system hosting the dynamically customized video conference of claim 1, wherein the data feeds comprise video feeds and wherein the reducing of the data feed bandwidth of at least one second data feed of the plurality of data feeds of the video conference while maintaining a data feed bandwidth of the first data feed, comprises at least one of:

(a) reducing a frame rate of the video feeds;
(b) freezing the video feeds;
(c) reducing a resolution of the video feeds;
(d) reducing a bit depth of color of the video feeds;
(e) cropping the video feeds;
(f) increasing video compression of the video feeds; and
(g) eliminating an audio channel from the video feeds.

3. The video conferencing system hosting the dynamically customized video conference of claim 1, wherein the processing instructions, when executed by the electronic processing device, further result in:

identifying, by the electronic processing device and based on the first arrangement of the plurality of data feeds of the video conference and the focus of the first participant, a first location of the focus of the participant in the first arrangement;

identifying, by the electronic processing device and based on the first arrangement of the plurality of data feeds of the video conference, a second location of the at least one second data feed of the plurality of data feeds of the video conference;

identifying, by the electronic processing device and based on the first arrangement of the plurality of data feeds of the video conference, a third location of a third data feed of the plurality of data feeds of the video conference;

computing, by the electronic processing device, a first distance between the first location and the second location; and computing, by the electronic processing device, a second distance between the first location and the third location.

4. The video conferencing system hosting the dynamically customized video conference of claim 3, wherein the reducing of the data feed bandwidth of the at least one second data feed of the plurality of data feeds of the video conference while maintaining a data feed bandwidth of the first data feed, comprises:

reducing, by the electronic processing device and based on the first distance, the data feed bandwidth of the at least one second data feed of the plurality of data feeds of the video conference by a first amount; and reducing, by the electronic processing device and based on the second distance, a data feed bandwidth of the third data feed of the plurality of data feeds of the video conference by a second amount.

5. The video conferencing system hosting the dynamically customized video conference of claim 1, wherein the first arrangement comprises a top portion and a bottom portion, wherein the first data feed of the plurality of data feeds of the video conference is in the bottom portion, and wherein the processing instructions, when executed by the electronic processing device, further result in:

altering, by the electronic processing device, the first arrangement by moving the first data feed of the plurality of data feeds of the video conference into the top portion.

6. The video conferencing system hosting the dynamically customized video conference of claim 5, wherein the altering of the first arrangement further comprises:

altering, by the electronic processing device, the first arrangement by moving the at least one second data feed of the plurality of data feeds of the video conference into the bottom portion.

7. The video conferencing system hosting the dynamically customized video conference of claim 1, wherein the reducing of the data feed bandwidth of the at least one second data feed of the plurality of data feeds of the video conference while maintaining the data feed bandwidth of the first data feed, is conducted in response to a detection of an audio volume exceeding a threshold level in the at least one second data feed of the plurality of data feeds of the video conference.

8. The video conferencing system hosting the dynamically customized video conference of claim 1, wherein the reducing of the data feed bandwidth of the at least one second data feed of the plurality of data feeds of the video conference while maintaining the data feed bandwidth of the first data feed, is conducted in response to a detection of a gesture in a video feed of the at least one second data feed of the plurality of data feeds of the video conference.

9. The video conferencing system hosting the dynamically customized video conference of claim 1, wherein the reducing of the data feed bandwidth of the at least one second data feed of the plurality of data feeds of the video conference while maintaining the data feed bandwidth of the first data feed, is conducted in response to the identifying that the statistical likelihood that the second participant will speak in the video conference is below a predetermined threshold.

10. The video conferencing system hosting the dynamically customized video conference of claim 1, wherein the predetermined threshold comprises five percent.

11. The video conferencing system hosting the dynamically customized video conference of claim 1, wherein the statistical likelihood is computed for a predetermined time period extending from a current time to a time five minutes later.

12. The video conferencing system hosting the dynamically customized video conference of claim 1, wherein computing the statistical likelihood includes:

determining an elapsed time of the video conference; and determining a number of times that the second participant has previously spoken during the video conference.

13. The video conferencing system hosting the dynamically customized video conference of claim 1, wherein identifying a first data feed that has the focus of the first participant includes:

determining, at a first time, an action exhibited by a second participant featured in the first data feed; and determining, at a second time shortly after the first time, a reaction exhibited by the first participant.

14. The video conferencing system hosting the dynamically customized video conference of claim 13, wherein the reaction is one of: (a) waving; and (b) sitting up straight.

15. The video conferencing system of claim 1 wherein the processing instructions, when executed by the electronic processing device, further result in:

determining, by the electronic processing device, that first data feed has the focus of a second participant, wherein reducing the data feed bandwidth of the at least one second data feed is performed in response to the determination that the first data feed has the focus of both the first and second participants.

16. The video conferencing system of claim 1 wherein the at least one second data feed is a side channel for text-based communication, and wherein reducing the data feed bandwidth includes terminating the side channel.

17. The video conferencing system of claim 1 further comprising a headset worn by a second participant, wherein reducing a data feed bandwidth of at least one second data feed includes:

identifying that the second participant is featured in the at least one second data feed;

replacing a live video feed of the second participant with an avatar representation of the second participant;

detecting a signal from the headset indicative of a motion of the headset;

determining a first motion of the second participant's head that is consistent with the signal; and causing the avatar to exhibit a head motion that reflects the determined first motion.

18. A video conferencing system hosting a dynamically customized video conference, comprising:

an electronic processing device;

a non-transitory memory device in communication with the electronic processing device, the non-transitory memory device storing (i) video conference data, (ii) participant display device data, and (iii) processing instructions that, when executed by the electronic processing device, result in:

identifying, by the electronic processing device and based on the video conference data, a plurality of data feeds of a video conference;

identifying, by the electronic processing device and based on a first subset of the participant display device data corresponding to a first display device of a first participant in the video conference, a first arrangement of the plurality of data feeds of the video conference;

identifying, by the electronic processing device, a first data feed of the plurality of data feeds of the video conference that has a first detectable audio volume;

identifying, by the electronic processing device, and concurrently to the identification of the first data feed, a second data feed of the plurality of data feeds of the video conference that has a second detectable audio volume;

determining a first technical condition associated with the first data feed;

determining a second technical condition associated with the second data feed;

determining that the first technical condition is more favorable than the second technical condition;

reducing, by the electronic processing device, and in response to the determination that the first technical condition is more favorable than the second technical condition, a data feed bandwidth of the second data feed while maintaining a data feed bandwidth of the first data feed;

computing, by the electronic processing device and based on the video conference data, a statistical likelihood that a second participant will speak in the video conference; and identifying, by the electronic processing device, that the statistical likelihood that the second participant will speak in the video conference is below a predetermined threshold.

19. The video conferencing system of claim 18 wherein the processing instructions, when executed by the electronic processing device, further result in:

determining, based on the identification of the first data feed having a detectable audio volume, that a first participant featured in the first data feed is speaking.

20. The video conferencing system of claim 18 wherein the first technical condition is a first lag for the first data feed, the second technical condition is a second lag for the second data feed, and wherein determining that the first technical condition is more favorable than the second technical condition includes determining that the first lag is lower than the second lag.

21. The video conferencing system of claim 18 wherein the first technical condition is a first background noise level for the first data feed, the second technical condition is a second background noise level for the second data feed, and wherein determining that the first technical condition is more favorable than the second technical condition includes determining that the first background noise level is lower than the second background noise level.

* * * * *